US010209499B2

(12) United States Patent
Shibata et al.

(10) Patent No.: US 10,209,499 B2
(45) Date of Patent: Feb. 19, 2019

(54) ZOOM OPTICAL SYSTEM, OPTICAL DEVICE AND METHOD FOR MANUFACTURING THE ZOOM OPTICAL SYSTEM

(71) Applicant: NIKON CORPORATION, Minato-ku, Tokyo (JP)

(72) Inventors: Satoru Shibata, Yokohama-shi (JP); Tomoyuki Sashima, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 15/984,347

(22) Filed: May 19, 2018

(65) Prior Publication Data

US 2018/0267281 A1 Sep. 20, 2018

Related U.S. Application Data

(60) Division of application No. 15/430,027, filed on Feb. 10, 2017, now Pat. No. 10,018,814, which is a (Continued)

(30) Foreign Application Priority Data

Aug. 29, 2014 (JP) ................................ 2014 175724
Aug. 29, 2014 (JP) ................................ 2014-175725
(Continued)

(51) Int. Cl.
*G02B 15/20* (2006.01)
*G02B 15/173* (2006.01)
*G02B 27/64* (2006.01)

(52) U.S. Cl.
CPC .......... *G02B 15/20* (2013.01); *G02B 15/173* (2013.01); *G02B 27/646* (2013.01)

(58) Field of Classification Search
CPC ..... G02B 15/20; G02B 15/173; G02B 27/646
See application file for complete search history.

(56) References Cited

U.S. PATENT DOCUMENTS

2010/0302650 A1 12/2010 Fujisaki
2012/0307129 A1 12/2012 Kai et al.
(Continued)

FOREIGN PATENT DOCUMENTS

JP 2010-276655 A 12/2010
JP 2012-252278 A 12/2012
(Continued)

OTHER PUBLICATIONS

Office Action dated Feb. 27, 2018 in Japanese Patent Application No. 2016-544969.

(Continued)

*Primary Examiner* — Joseph P Martinez
(74) *Attorney, Agent, or Firm* — Shapiro, Gabor and Rosenberger, PLLC

(57) ABSTRACT

A first lens group (G1) having positive refractive power, a front-side lens group (GX), an intermediate lens group (GM) having positive refractive power, and a rear-side lens group (GR) are arranged in order from an object side. The front-side lens group (GX) is composed of one or more lens groups and has a negative lens group At least part of the intermediate lens group (GM) is a focusing lens group (GF). The rear-side lens group (GR) is composed of one or more lens groups. Upon zooming, the first lens group (G1) is moved with respect to an image surface, a distance between the first lens group (G1) and the front-side lens group (GX) is changed, a distance between the front-side lens group (GX) and the intermediate lens group (GM) is changed, and a distance between the intermediate lens group (GM) and the rear-side lens group (GR) is changed.

20 Claims, 422 Drawing Sheets

Related U.S. Application Data continuation of application No. PCT/JP2015/004375, filed on Aug. 28, 2015.

(30) Foreign Application Priority Data

| | | |
|---|---|---|
| Aug. 29, 2014 | (JP) | 2014-175726 |
| Aug. 29, 2014 | (JP) | 2014-175727 |
| Nov. 19, 2014 | (JP) | 2014-234426 |
| Nov. 19, 2014 | (JP) | 2014-234427 |
| Nov. 19, 2014 | (JP) | 2014-234428 |
| Nov. 19, 2014 | (JP) | 2014-234429 |
| Nov. 19, 2014 | (JP) | 2014-234430 |
| Nov. 19, 2014 | (JP) | 2014-234431 |
| Jul. 16, 2015 | (JP) | 2015-141990 |
| Jul. 16, 2015 | (JP) | 2015-141991 |
| Jul. 16, 2015 | (JP) | 2015-141992 |
| Jul. 16, 2015 | (JP) | 2015-141993 |

(56) References Cited

U.S. PATENT DOCUMENTS

| | | | | |
|---|---|---|---|---|
| 2013/0093940 | A1 | 4/2013 | Matsumura | |
| 2013/0242171 | A1 | 9/2013 | Kurioka et al. | |
| 2014/0085527 | A1 | 3/2014 | Yamano | |
| 2014/0362452 | A1 | 12/2014 | Obama | |
| 2015/0234162 | A1* | 8/2015 | Obama | G02B 15/14 359/676 |
| 2015/0234163 | A1 | 8/2015 | Sashima et al. | |
| 2015/0323770 | A1 | 11/2015 | Sashima et al. | |

FOREIGN PATENT DOCUMENTS

| | | | |
|---|---|---|---|
| JP | 2013-101316 | A | 5/2013 |
| JP | 2013-182022 | A | 9/2013 |
| JP | 2013-218299 | A | 10/2013 |
| JP | 2014-066944 | A | 4/2014 |
| JP | 2014-085494 | A | 5/2014 |
| JP | 2014-089288 | A | 5/2014 |
| JP | 2014-098795 | A | 5/2014 |
| JP | 2014-137408 | A | 7/2014 |

OTHER PUBLICATIONS

International Search Report for International Patent Application No. PCT/JP2015/004375, dated Dec. 1, 2015.

Written Opinion of the International Searching Authority for PCT/JP2015/004375, dated Dec. 1, 2015.

* cited by examiner

LATERAL ABERRATION

LATERAL ABERRATION

LATERAL ABERRATION

LATERAL ABERRATION

LATERAL ABERRATION

LATERAL ABERRATION

LATERAL ABERRATION

LATERAL ABERRATION

LATERAL ABERRATION (EXAMPLE 4)

LATERAL ABERRATION

LATERAL ABERRATION

LATERAL ABERRATION

LATERAL ABERRATION

LATERAL ABERRATION

LATERAL ABERRATION

LATERAL ABERRATION

LATERAL ABERRATION

LATERAL ABERRATION (EXAMPLE 7)

LATERAL ABERRATION

LATERAL ABERRATION

LATERAL ABERRATION

LATERAL ABERRATION

LATERAL ABERRATION

LATERAL ABERRATION

LATERAL ABERRATION

LATERAL ABERRATION

LATERAL ABERRATION

LATERAL ABERRATION

LATERAL ABERRATION

LATERAL ABERRATION

LATERAL ABERRATION

LATERAL ABERRATION

LATERAL ABERRATION

LATERAL ABERRATION

LATERAL ABERRATION

LATERAL ABERRATION

LATERAL ABERRATION

LATERAL ABERRATION

LATERAL ABERRATION

LATERAL ABERRATION

LATERAL ABERRATION

LATERAL ABERRATION

LATERAL ABERRATION

LATERAL ABERRATION

LATERAL ABERRATION

LATERAL ABERRATION

LATERAL ABERRATION

LATERAL ABERRATION

LATERAL ABERRATION

LATERAL ABERRATION

LATERAL ABERRATION

COMA ABERRATION

COMA ABERRATION

COMA ABERRATION

COMA ABERRATION

COMA ABERRATION

COMA ABERRATION

COMA ABERRATION

COMA ABERRATION

COMA ABERRATION (EXAMPLE 17)

COMA ABERRATION

COMA ABERRATION

COMA ABERRATION (EXAMPLE 18)

COMA ABERRATION

COMA ABERRATION

COMA ABERRATION (EXAMPLE 19)

COMA ABERRATION

COMA ABERRATION

COMA ABERRATION (EXAMPLE 20)

ZLII(ZL20)

COMA ABERRATION

COMA ABERRATION

COMA ABERRATION (EXAMPLE 21)

COMA ABERRATION

COMA ABERRATION

COMA ABERRATION (EXAMPLE 22)

COMA ABERRATION

COMA ABERRATION

COMA ABERRATION

COMA ABERRATION

COMA ABERRATION

COMA ABERRATION (EXAMPLE 24)

COMA ABERRATION

COMA ABERRATION

COMA ABERRATION (EXAMPLE 25)

COMA ABERRATION

COMA ABERRATION

COMA ABERRATION (EXAMPLE 26)

ZLII(ZL26)

COMA ABERRATION

COMA ABERRATION

COMA ABERRATION (EXAMPLE 27)

COMA ABERRATION

COMA ABERRATION

COMA ABERRATION (EXAMPLE 28)

ZLII(ZL28)

COMA ABERRATION

COMA ABERRATION

COMA ABERRATION

COMA ABERRATION

COMA ABERRATION

COMA ABERRATION (EXAMPLE 30)

ZLII(ZL30)

COMA ABERRATION

COMA ABERRATION

COMA ABERRATION (EXAMPLE 31)

COMA ABERRATION

COMA ABERRATION

COMA ABERRATION (EXAMPLE 32)

COMA ABERRATION

COMA ABERRATION

COMA ABERRATION (EXAMPLE 33)

COMA ABERRATION

COMA ABERRATION

COMA ABERRATION (EXAMPLE 34)

COMA ABERRATION

COMA ABERRATION

COMA ABERRATION (EXAMPLE 35)

COMA ABERRATION

COMA ABERRATION

COMA ABERRATION (EXAMPLE 36)

COMA ABERRATION

COMA ABERRATION

COMA ABERRATION

ZLII(ZL37)

(EXAMPLE 37)

COMA ABERRATION

COMA ABERRATION

COMA ABERRATION (EXAMPLE 38)

COMA ABERRATION

COMA ABERRATION

COMA ABERRATION (EXAMPLE 39)

COMA ABERRATION

COMA ABERRATION

COMA ABERRATION

ZOOM OPTICAL SYSTEM, OPTICAL DEVICE AND METHOD FOR MANUFACTURING THE ZOOM OPTICAL SYSTEM

TECHNICAL FIELD

The present invention relates to a zoom optical system, an optical device, and a method for manufacturing the zoom optical system.

TECHNICAL BACKGROUND

A zoom optical system suitable for photographic cameras, electronic still cameras, video cameras, and the like has conventionally been proposed (see, for example, Patent Document 1).

Such a conventional zoom optical system includes a focusing group having a large number of lenses that is likely to lead to a large size and focusing involving large variation of image magnification.

A zoom optical system has conventionally been proposed that has an image blur (or image shake) correction mechanism and achieves focusing with smaller variation of image magnification (see, for example, Patent Document 2).

Such a conventional zoom optical system has a focusing group using a lens close to an image surface that can achieve focusing with smaller variation of image magnification but involves a large movement amount leading to a large size. Furthermore, the system involves a large and heavy vibration-proof lens group because the image blur correction is achieved with all three groups of plurality of lenses having a relatively large diameter.

A zoom optical system has conventionally been proposed that performs focusing with a second lens group including a relatively large number of lenses (see, for example, Patent Document 1).

This conventional technique is plagued by degradation of a performance upon focusing on short-distant object with the second lens group.

A zoom optical system suitable for photographic cameras, electronic still cameras, video cameras, and the like have conventionally been proposed (see, for example, Patent Document 2).

Such a conventional zoom optical system has a focusing group using a lens close to an image surface that can achieve focusing with smaller variation of image magnification but involves a large movement amount leading to a large size. Furthermore, the system involves a large and heavy vibration-proof lens group because the image blur correction is achieved with all three groups of plurality of lenses having a relatively large diameter.

A zoom optical system suitable for photographic cameras, electronic still cameras, video cameras, and the like has conventionally been proposed (see, for example, Patent Document 2).

Such a conventional zoom optical system has a focusing group using a lens close to an image surface that can achieve focusing with smaller variation of image magnification but involves a large movement amount leading to a large size.

PRIOR ART LIST

Patent Documents

Patent Document 1: Japanese Laid-Open Patent Publication No. 2012-252278(A)

Patent Document 2: Japanese Laid-Open Patent Publication No. 2010-276655(A)

SUMMARY OF THE INVENTION

Means to Solve the Problems

A zoom optical system according to a first aspect of the present invention includes a first lens group having positive refractive power, a front-side lens group, an intermediate lens group having positive refractive power, and a rear-side lens group that are arranged in order from an object side, the front-side lens group is composed of one or more lens groups and has a negative lens group, at least part of the intermediate lens group is a focusing lens group, the rear-side lens group is composed of one or more lens groups, and upon zooming, the first lens group is moved with respect to an image surface, a distance between the first lens group and the front-side lens group is changed, a distance between the front-side lens group and the intermediate lens group is changed, and a distance between the intermediate lens group and the rear-side lens group is changed.

An optical device according to the first aspect of the present invention includes the zoom optical system according to the first aspect of the present invention.

A method for manufacturing a zoom optical system according to the first aspect of the present invention is a method for manufacturing the zoom optical system including a first lens group having positive refractive power, a front-side lens group, an intermediate lens group having positive refractive power, and a rear-side lens group that are arranged in order from an object side; the front-side lens group is composed of one or more lens groups and has a negative lens group, at least part of the intermediate lens group is a focusing lens group, the rear-side lens group is composed of one or more lens groups, and lenses are arranged in a lens barrel in such a manner that upon zooming, the first lens group is moved, a distance between the first lens group and the front-side lens group is changed, a distance between the front-side lens group and the intermediate lens group is changed, and a distance between the intermediate lens group and the rear-side lens group is changed.

A zoom optical system according to a second aspect of the present invention includes a first lens group having positive refractive power, a front-side lens group, an intermediate lens group having positive refractive power, and a rear-side lens group that are arranged in order from an object side, the front-side lens group is composed of one or more lens groups and has a negative lens group, at least part of the intermediate lens group is a focusing lens group, the rear-side lens group is composed of one or more lens groups, and upon zooming, a distance between the first lens group and the front-side lens group is changed, a distance between the front-side lens group and the intermediate lens group is changed, and a distance between the intermediate lens group and the rear-side lens group is changed.

An optical device according to the second aspect of the present invention includes the zoom optical system according to the second aspect of the present invention.

A method for manufacturing the zoom optical system according to the second aspect of the present invention is a method for manufacturing the zoom optical system including a first lens group having positive refractive power, a front-side lens group, an intermediate lens group having positive refractive power, and a rear-side lens group that are arranged in order from an object side; the front-side lens group is composed of one or more lens groups and has a negative lens group, at least part of the intermediate lens group is a focusing lens group, the rear-side lens group is composed of one or more lens groups, and lenses are arranged in a lens barrel in such a manner that upon zooming, a distance between the first lens group and the front-side lens group is changed, a distance between the front-side lens group and the intermediate lens group is changed, and a distance between the intermediate lens group and the rear-side lens group is changed.

BRIEF DESCRIPTION OF THE DRAWINGS

FIG. 120 is a cross-sectional view of a zoom optical system according to Example 26.

Figure 121A:
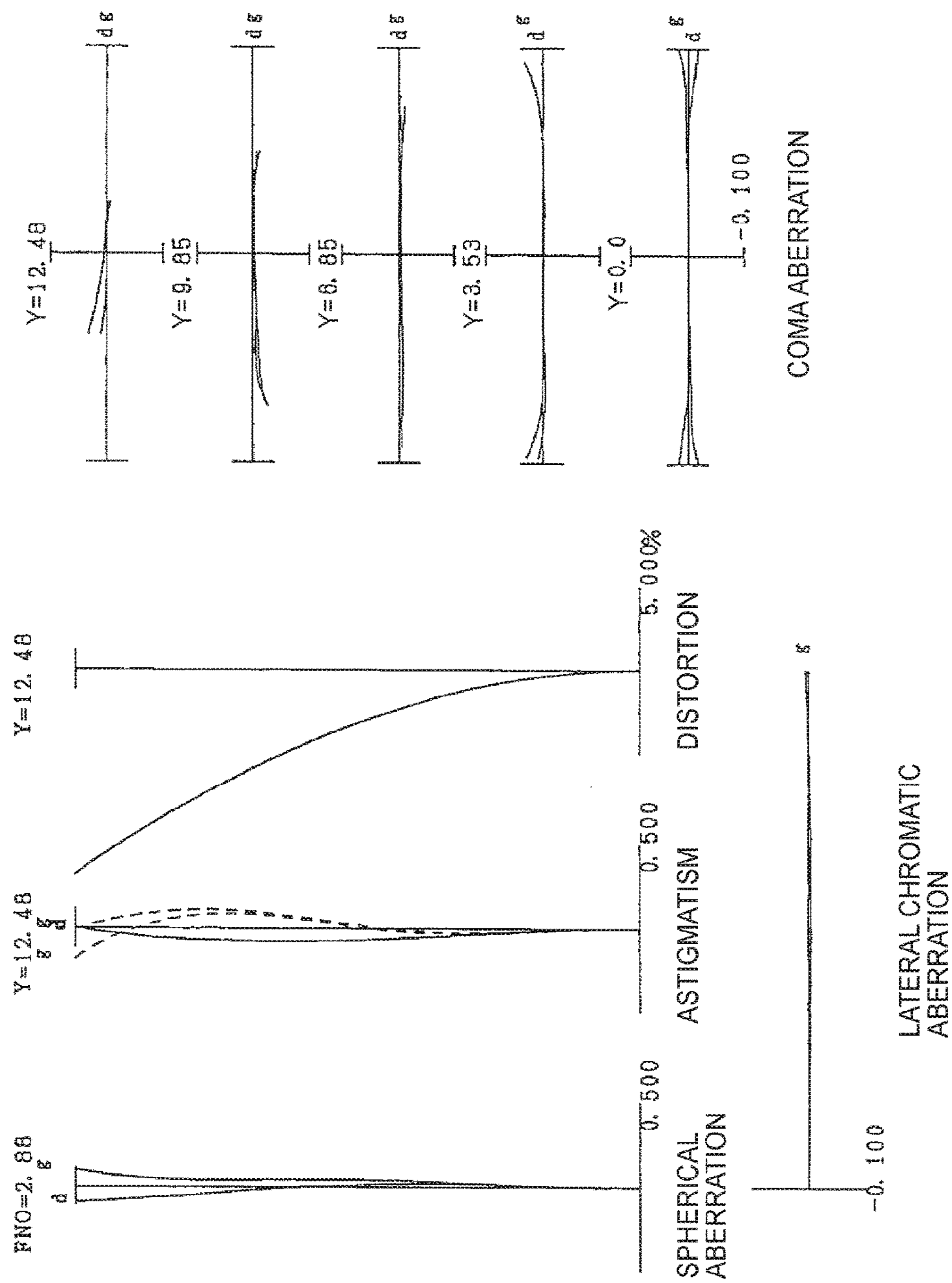
Figure 121B:
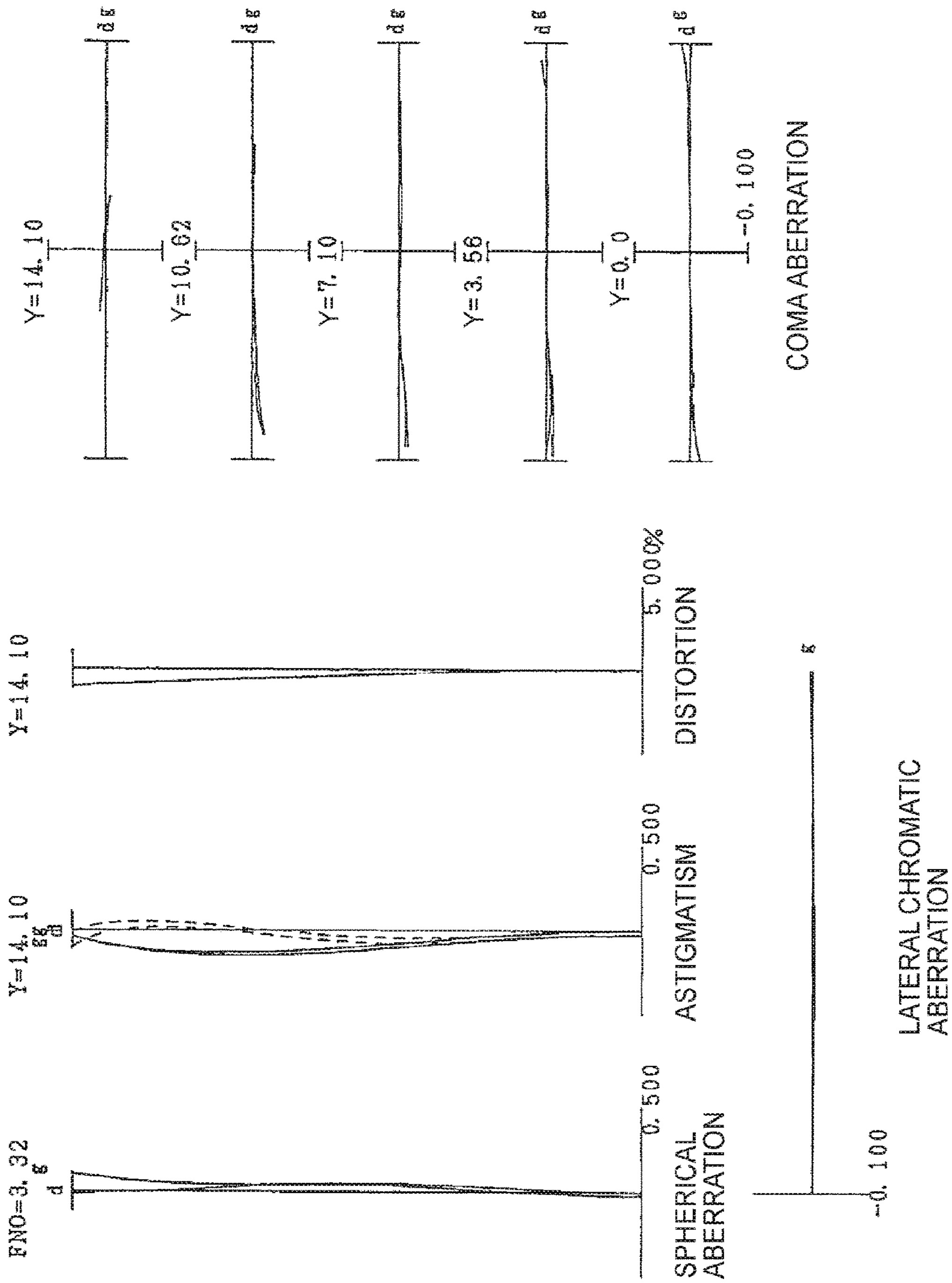
Figure 121C:
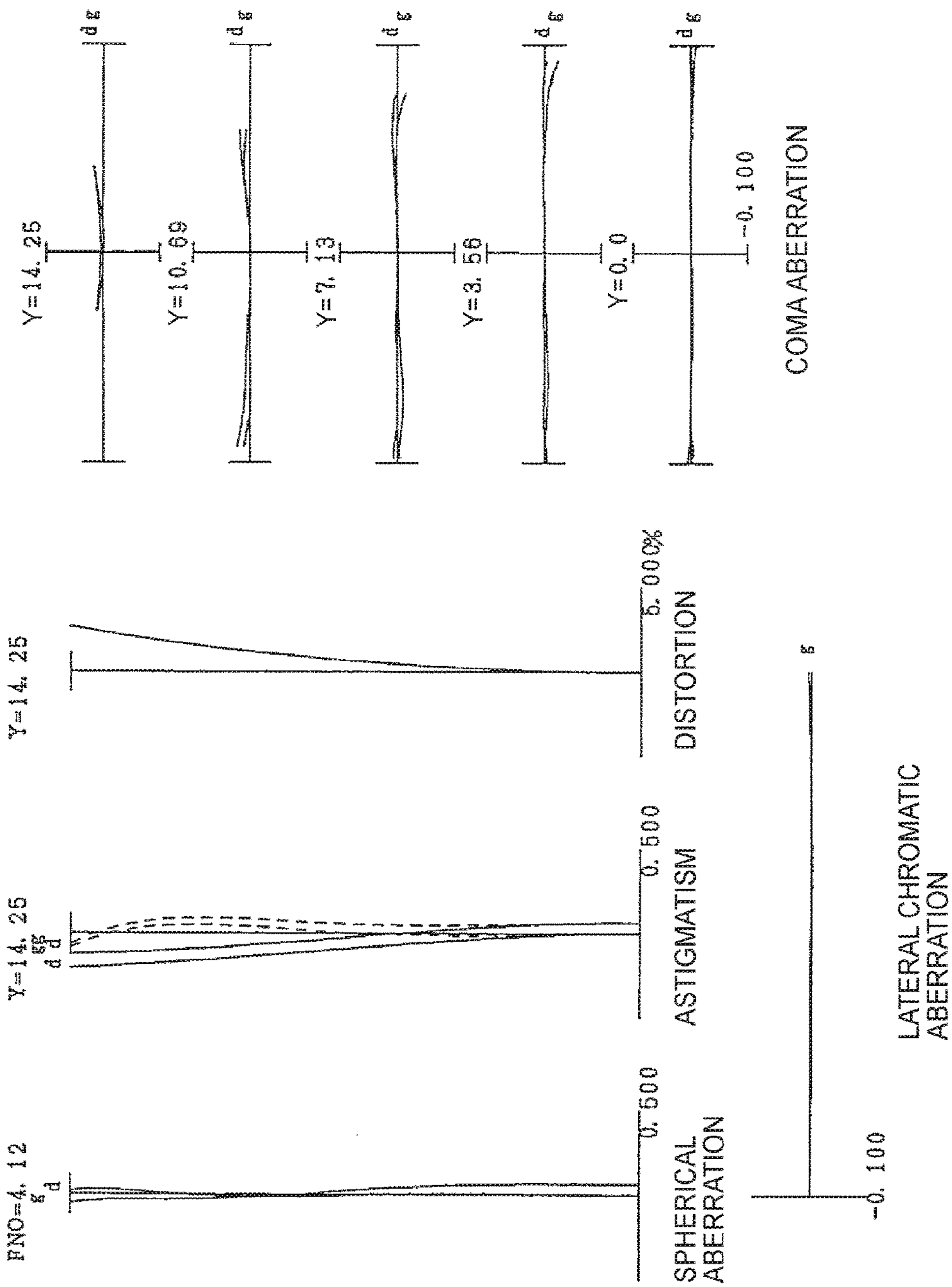

FIGS. 121A, 121B, and 121C are graphs showing various aberrations of the zoom optical system according to Example 26 upon focusing on infinity respectively in the wide angle end state, the intermediate focal length state, and the telephoto end state.

Figure 122A:
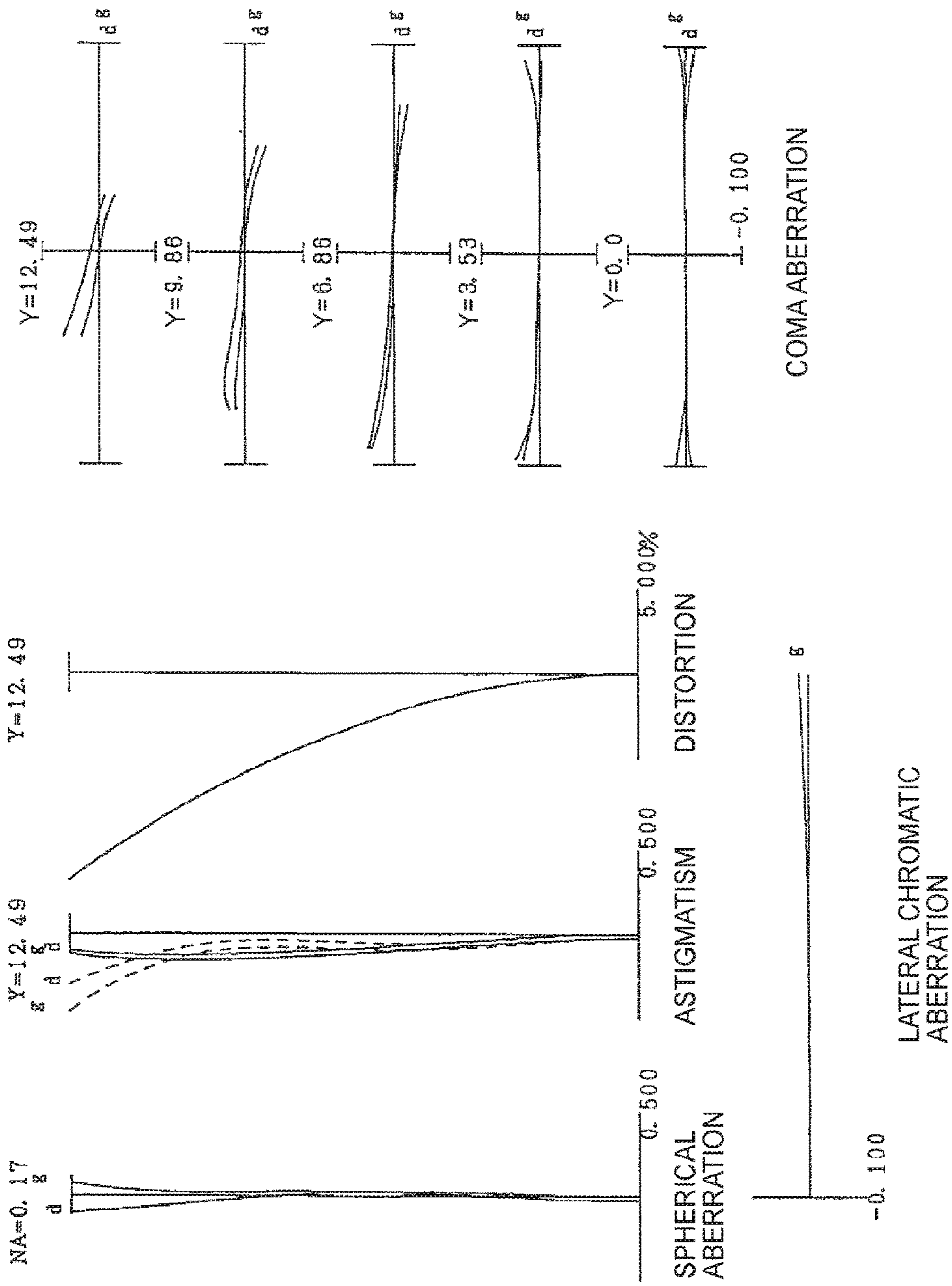
Figure 122B:
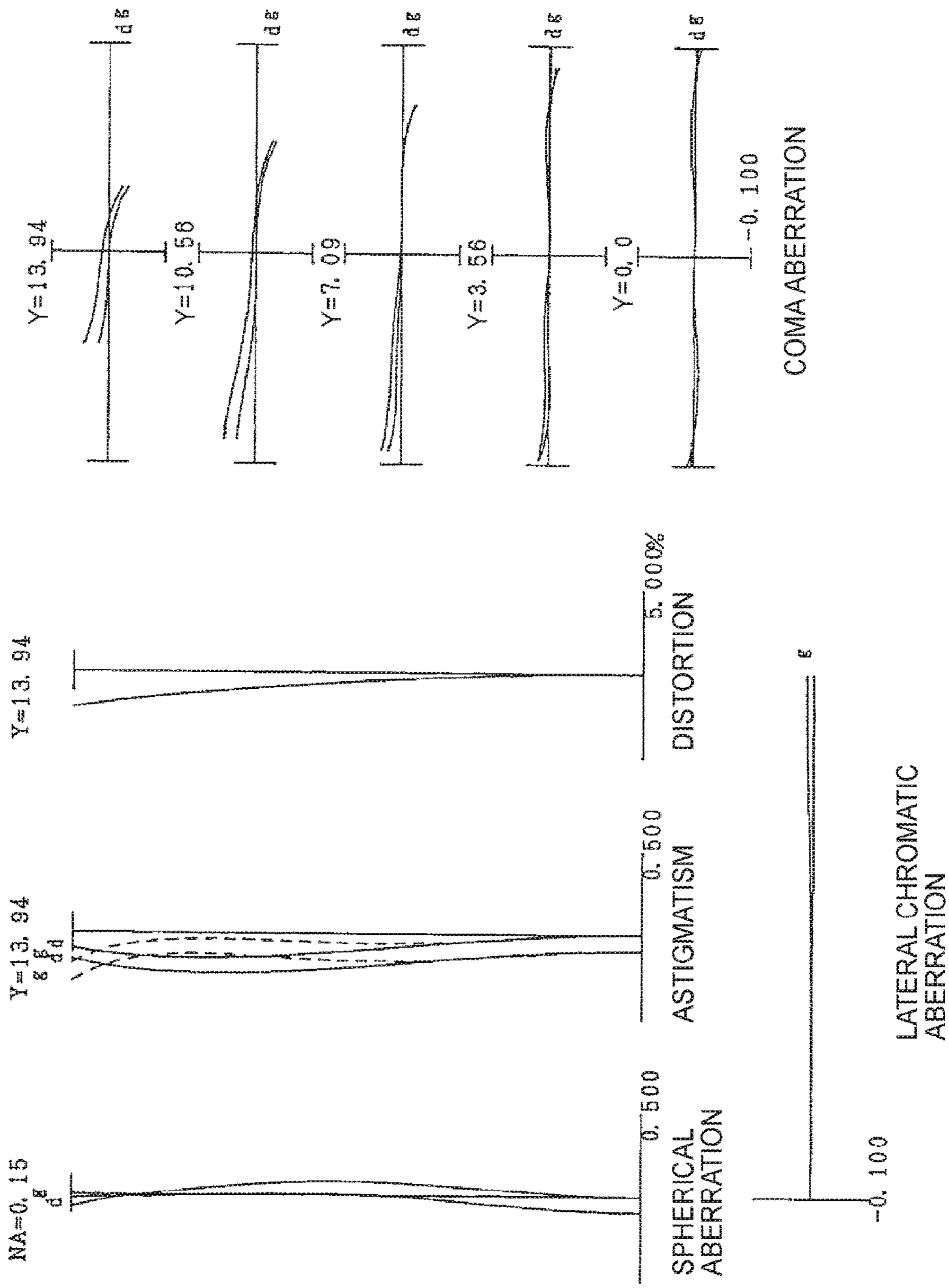
Figure 122C:
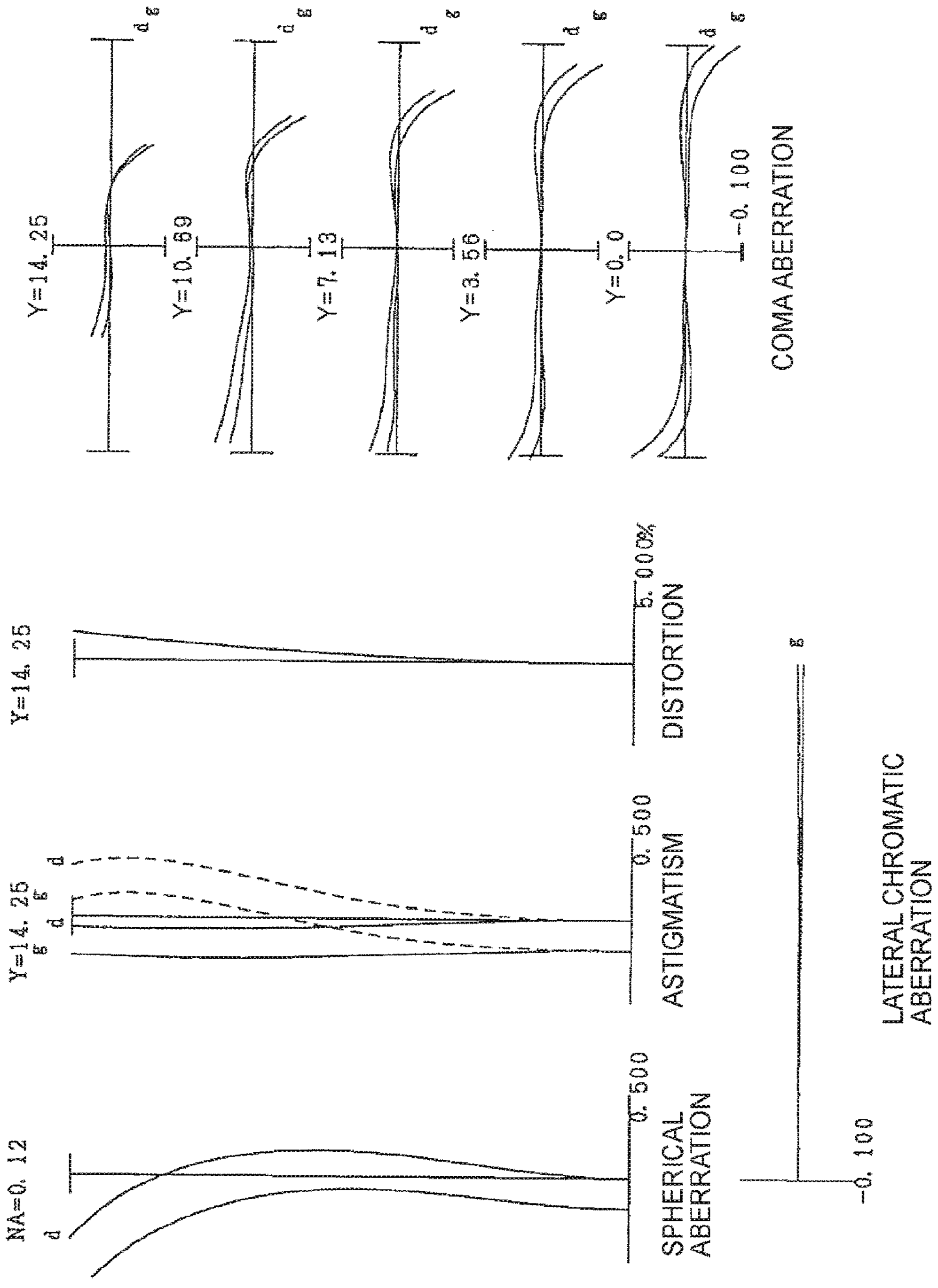

FIGS. 122A, 122B, and 122C are graphs showing various aberrations of the zoom optical system according to Example 26 upon focusing on a short distant object respectively in the wide angle end state, the intermediate focal length state, and the telephoto end state.

Figure 123A:
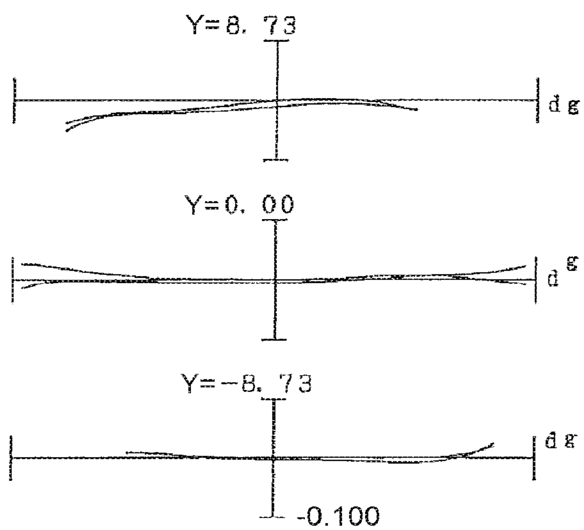
Figure 123B:
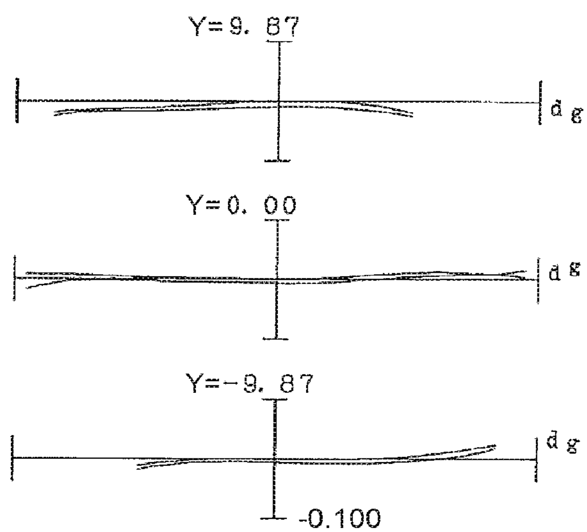
Figure 123C:
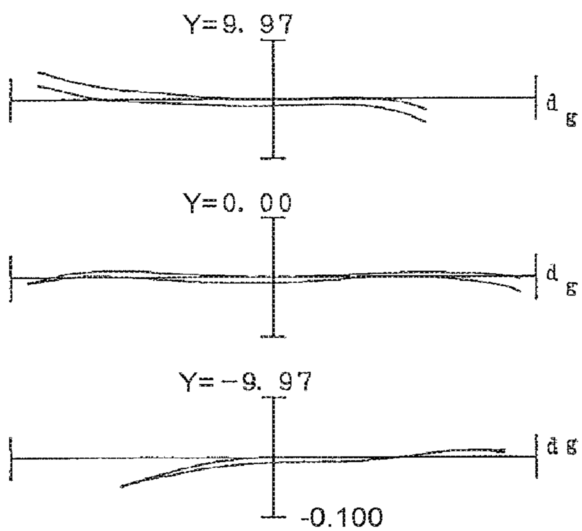

FIGS. 123A, 123B, and 123C are graphs showing coma aberrations of the zoom optical system according to Example 26 upon focusing on infinity with image blur correction performed, respectively in the wide angle end state, the intermediate focal length state, and the telephoto end state.

Figure 124:
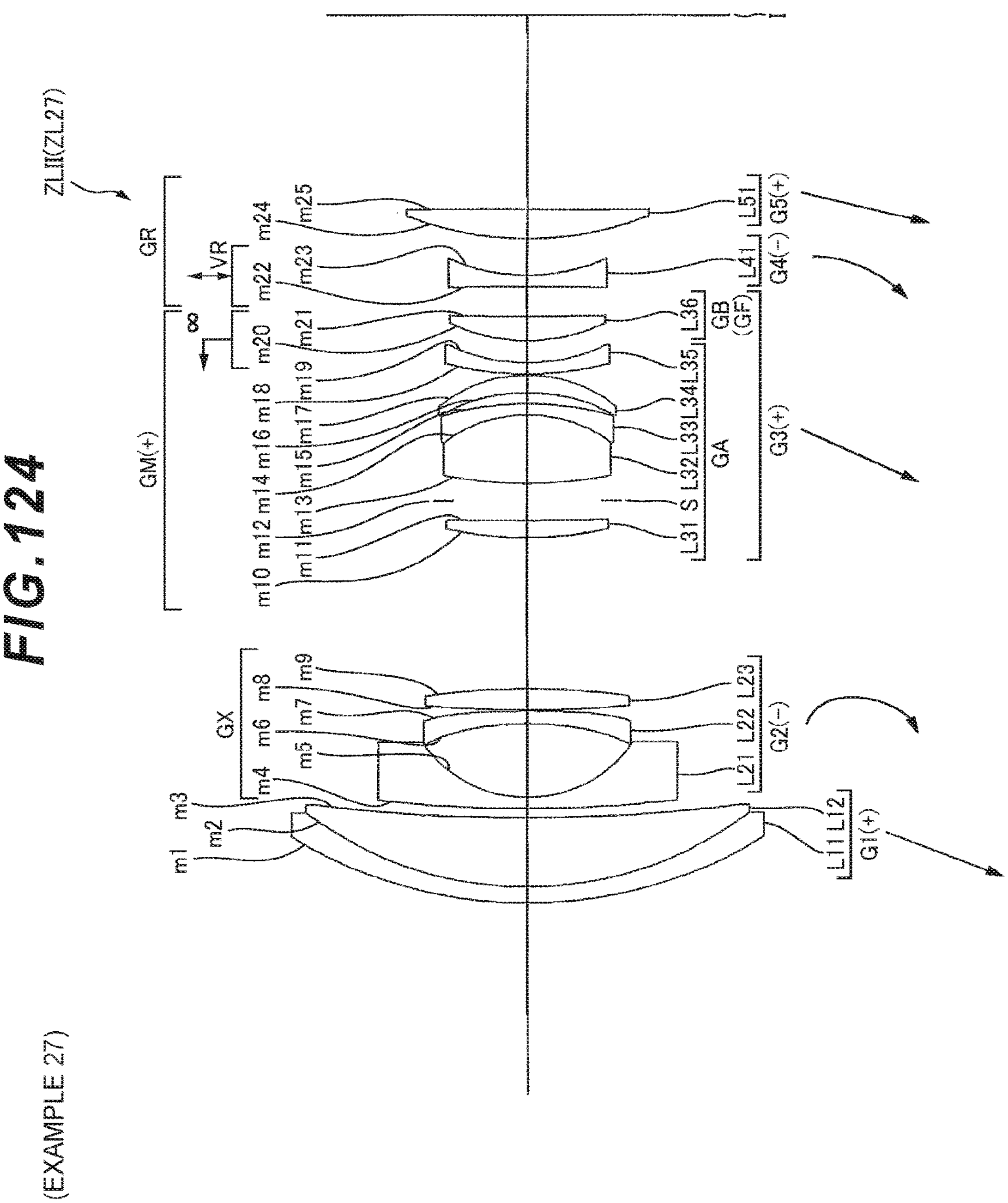

FIG. 124 is a cross-sectional view of a zoom optical system according to Example 27.

Figure 125A:
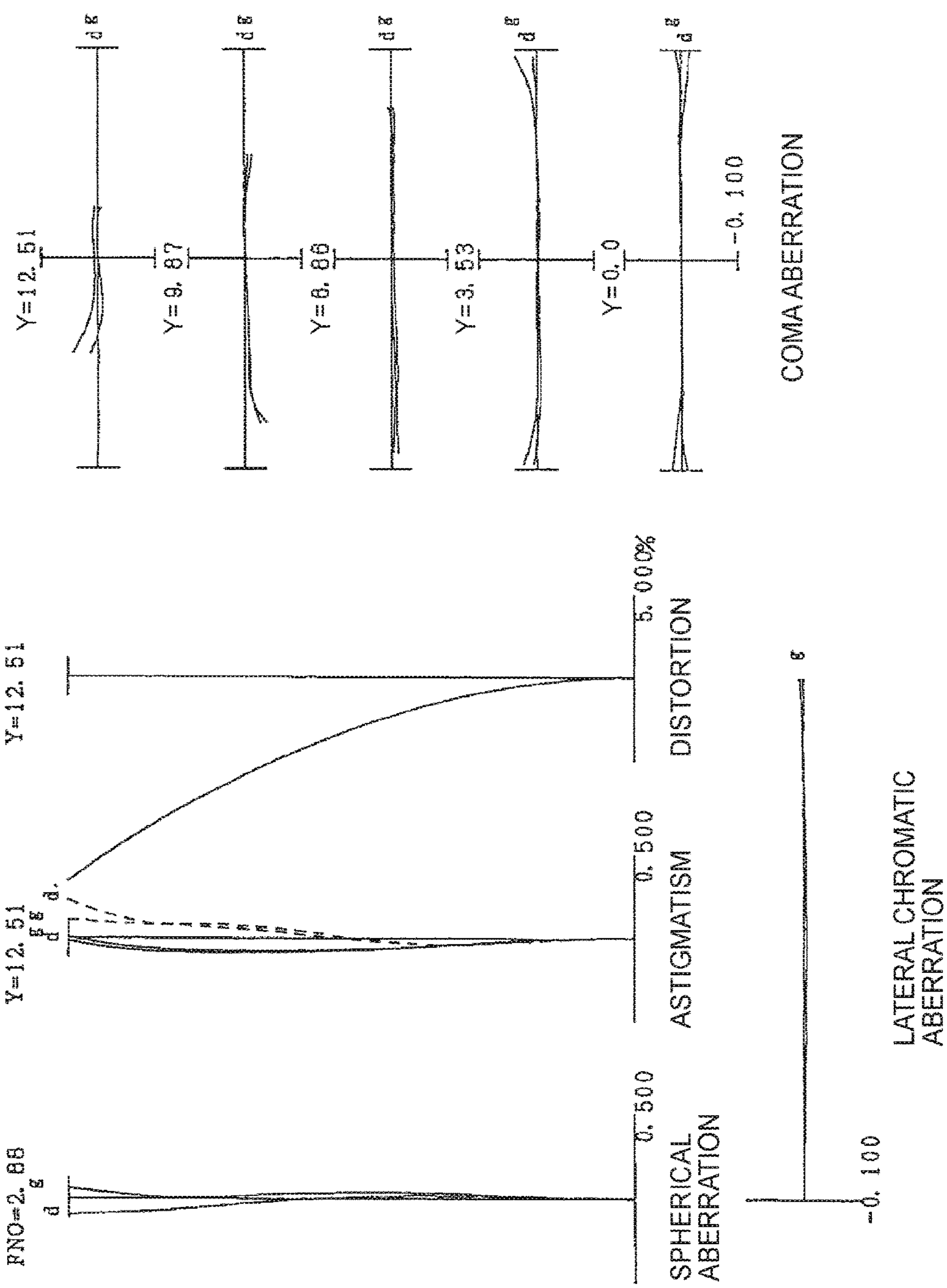
Figure 125B:
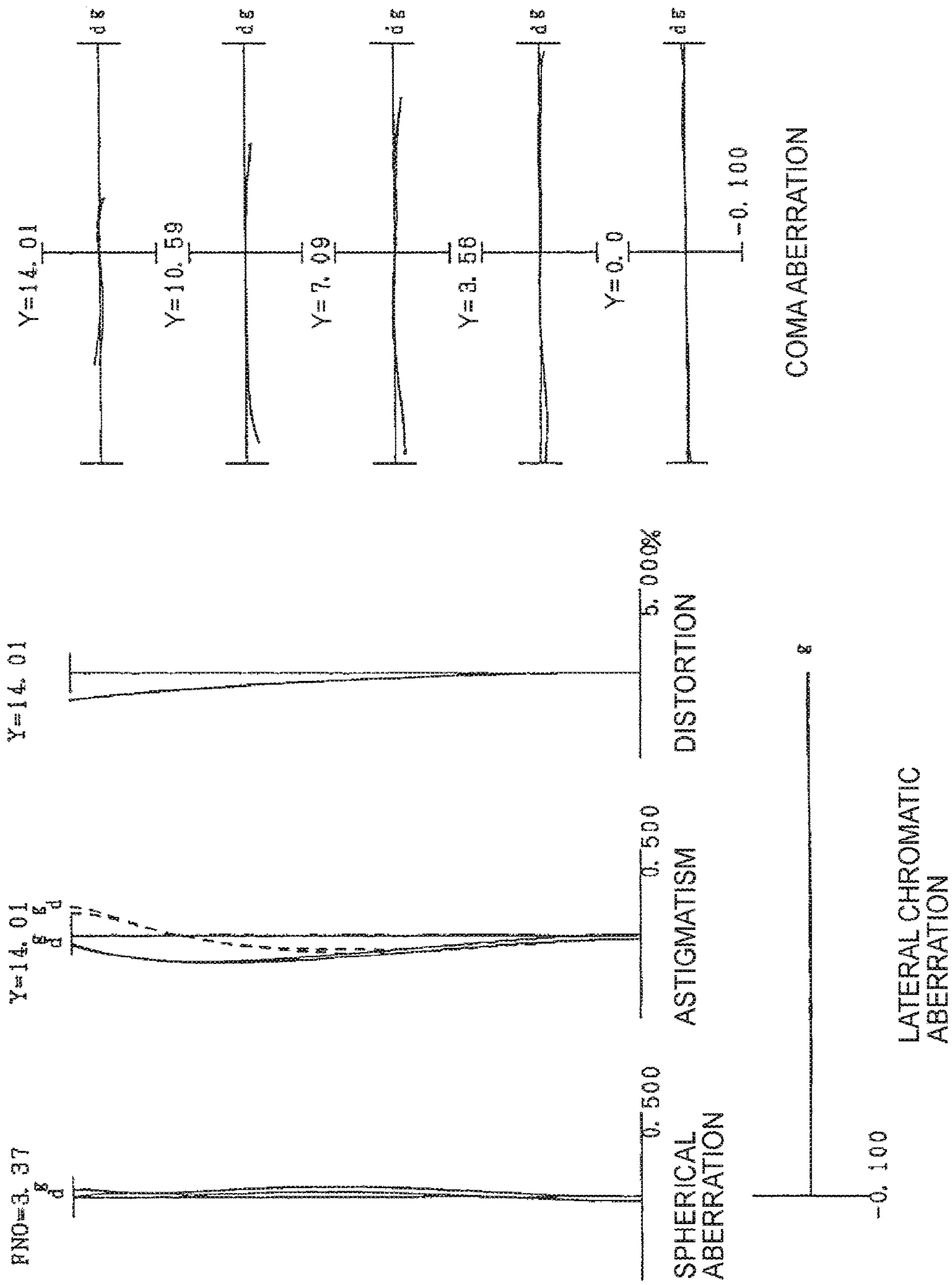
Figure 125C:
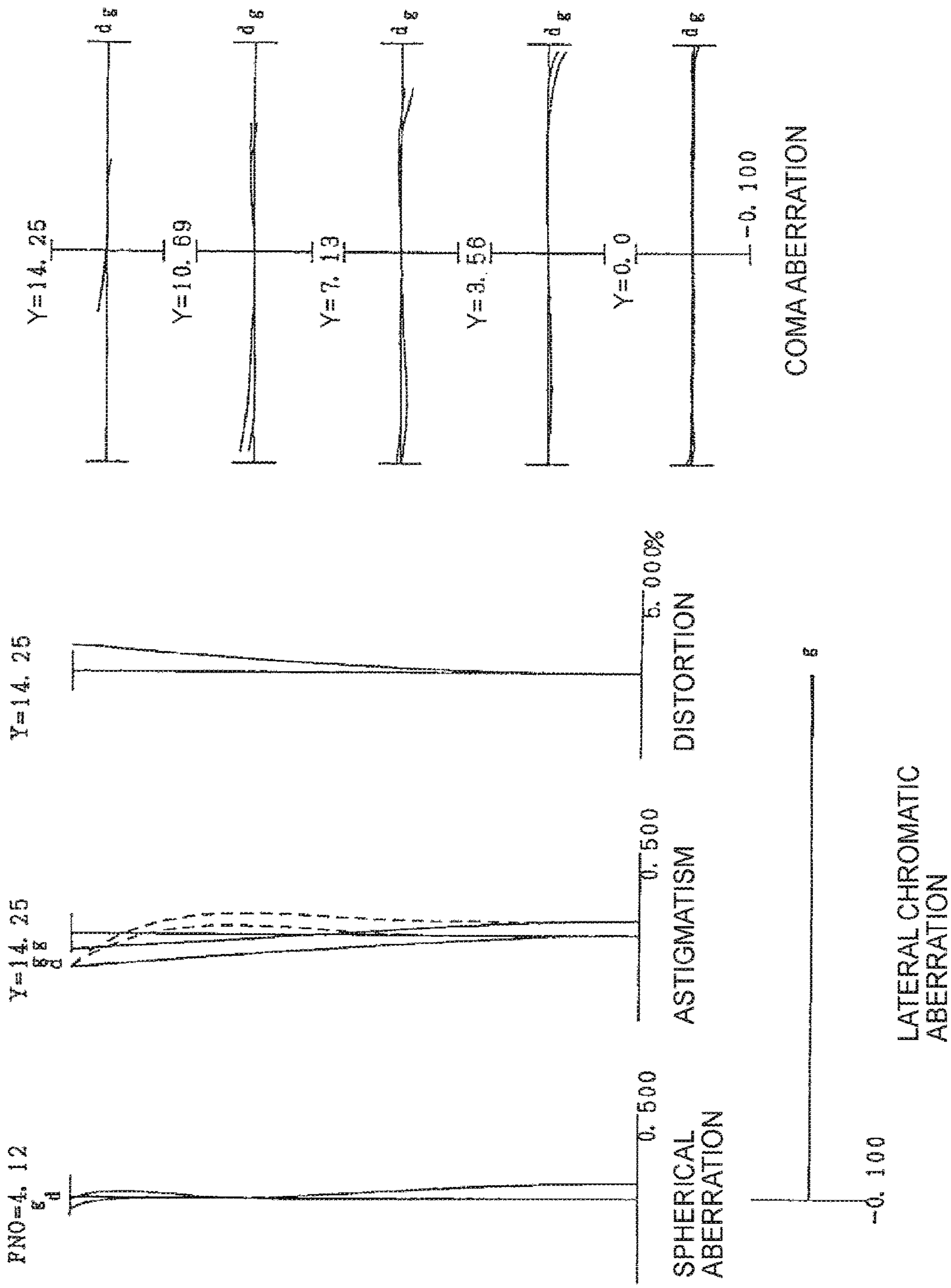

FIGS. 125A, 125B, and 125C are graphs showing various aberrations of the zoom optical system according to Example 27 upon focusing on infinity respectively in the wide angle end state, the intermediate focal length state, and the telephoto end state.

Figure 126A:
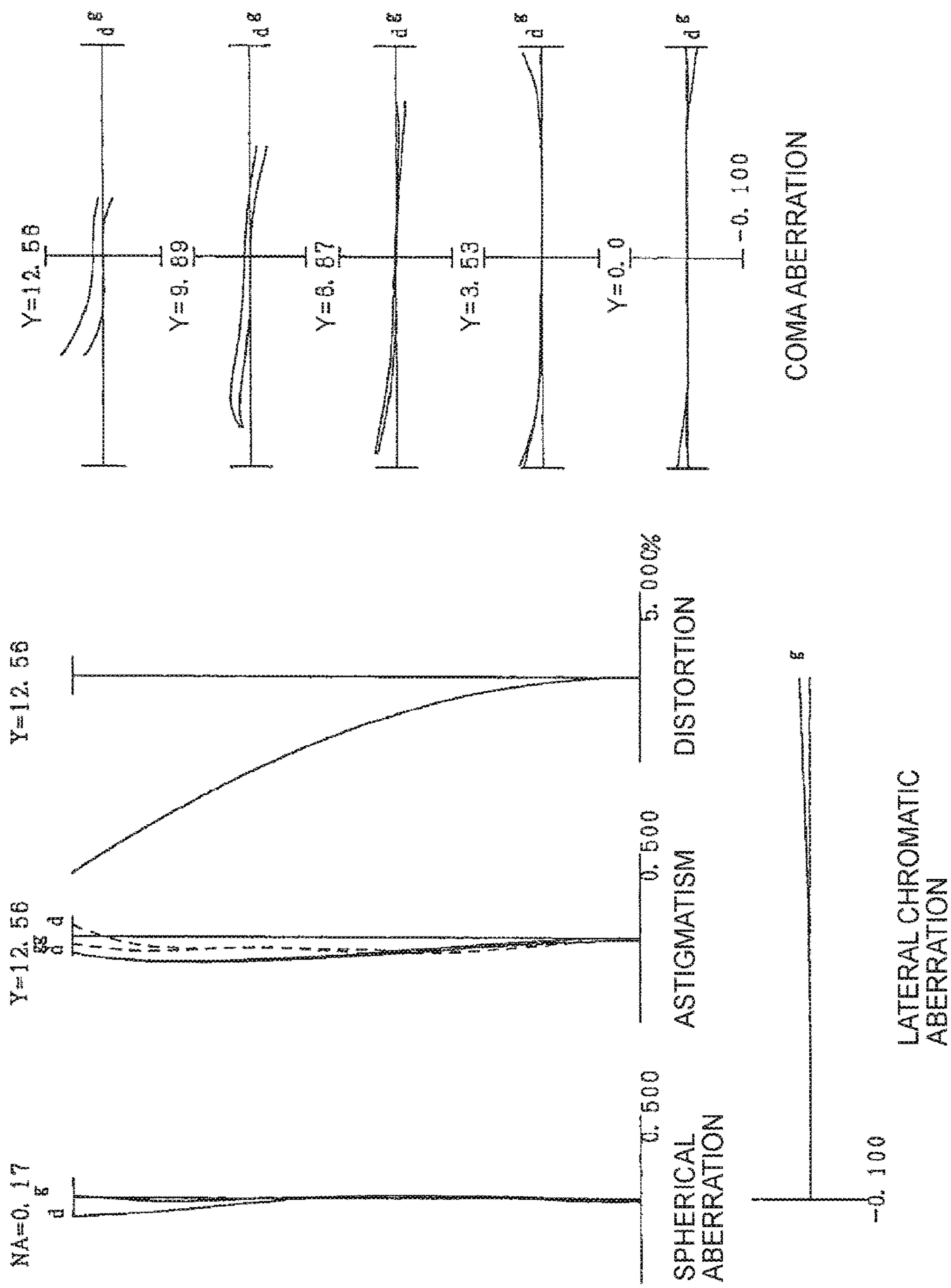
Figure 126B:
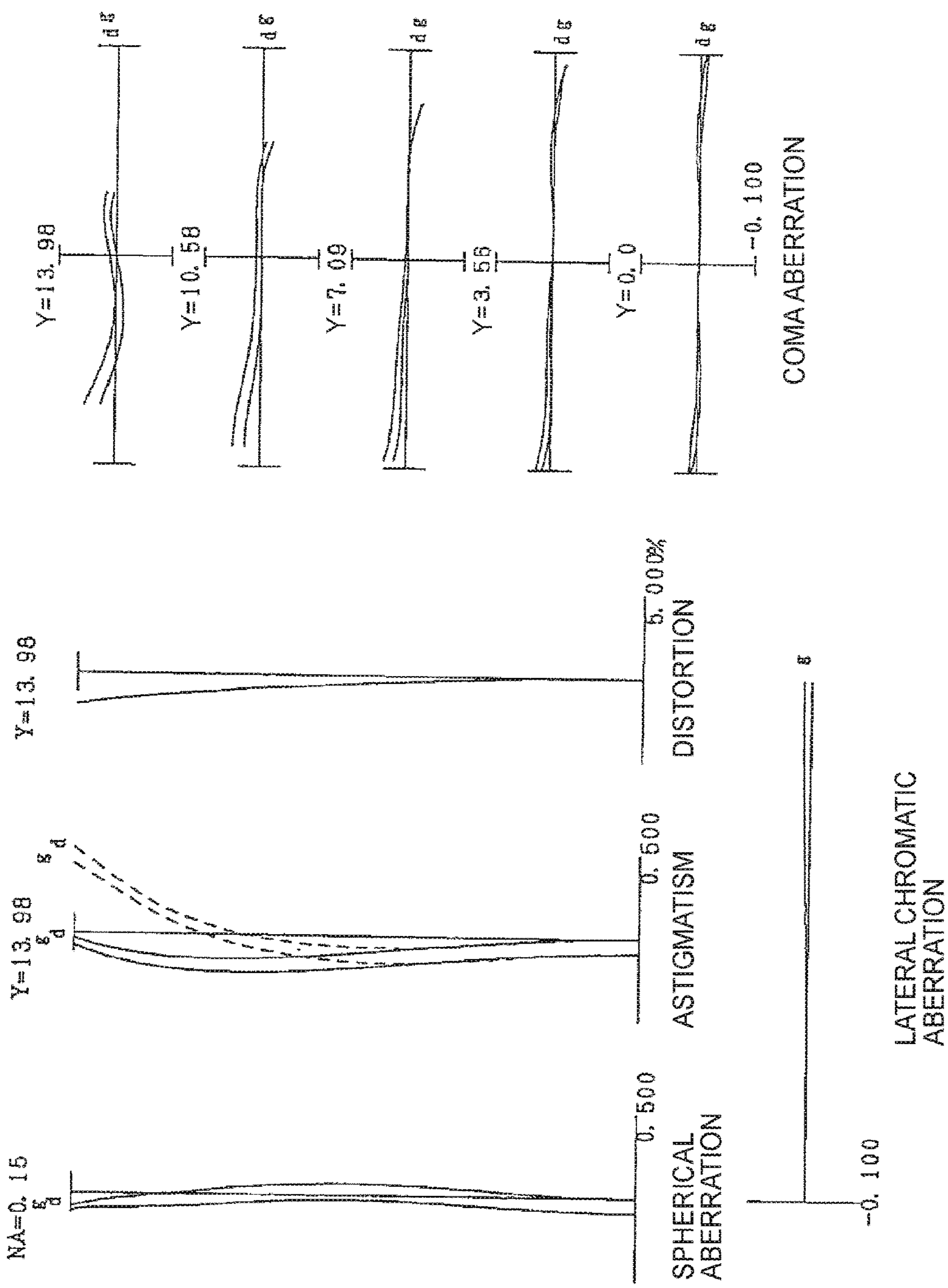
Figure 126C:
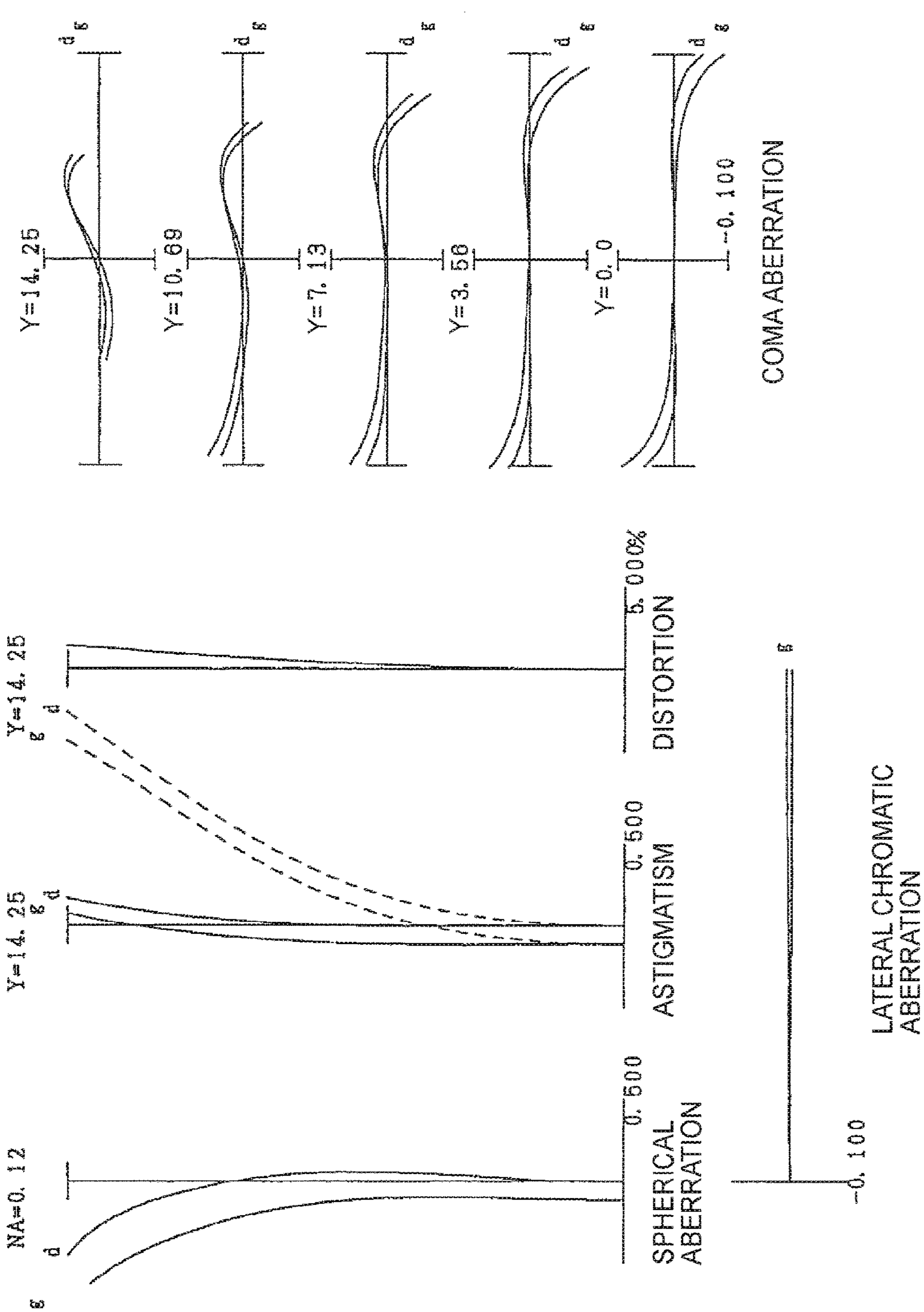

FIGS. 126A, 126B, and 126C are graphs showing various aberrations of the zoom optical system according to Example 27 upon focusing on a short distant object respectively in the wide angle end state, the intermediate focal length state, and the telephoto end state.

Figure 127A:
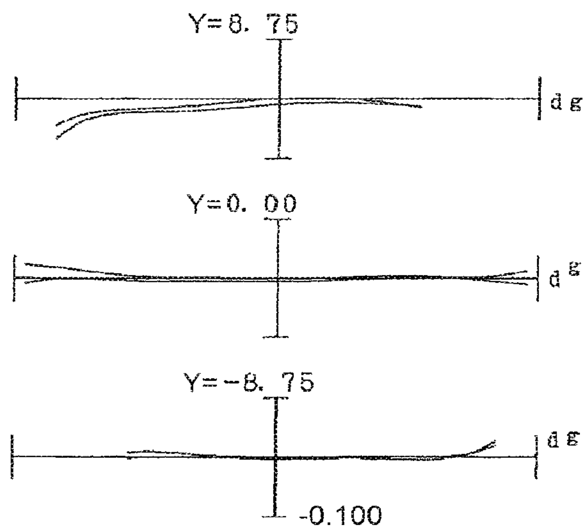
Figure 127B:
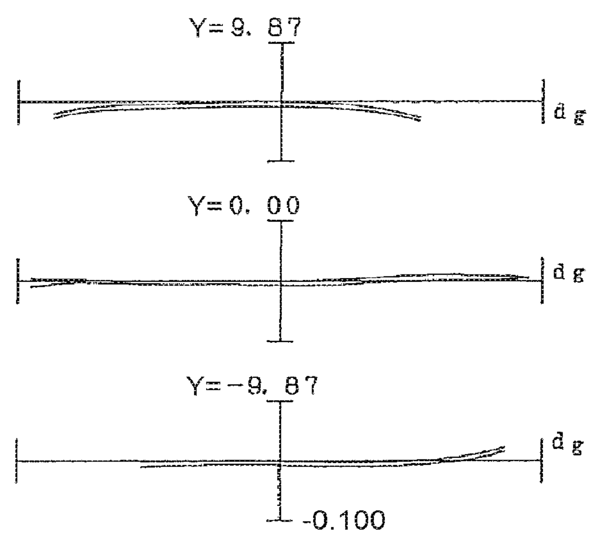
Figure 127C:
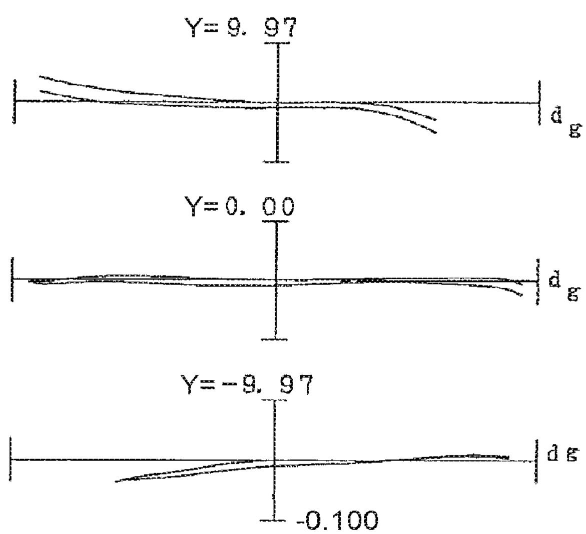

FIGS. 127A, 127B, and 127C are graphs showing coma aberrations of the zoom optical system according to Example 27 upon focusing on infinity with image blur correction performed, respectively in the wide angle end state, the intermediate focal length state, and the telephoto end state.

Figure 128:
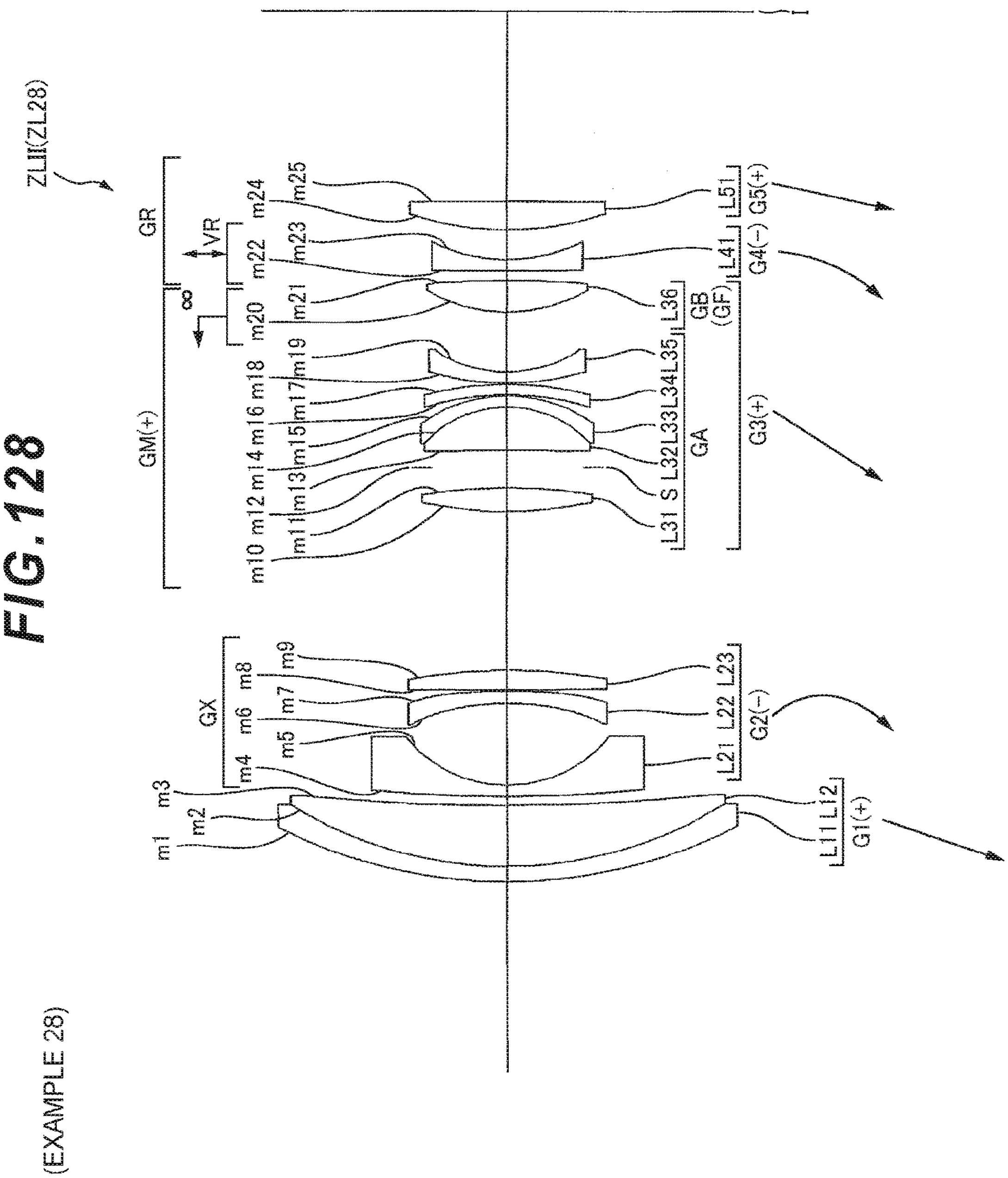

FIG. 128 is a cross-sectional view of a zoom optical system according to Example 28.

Figure 129A:
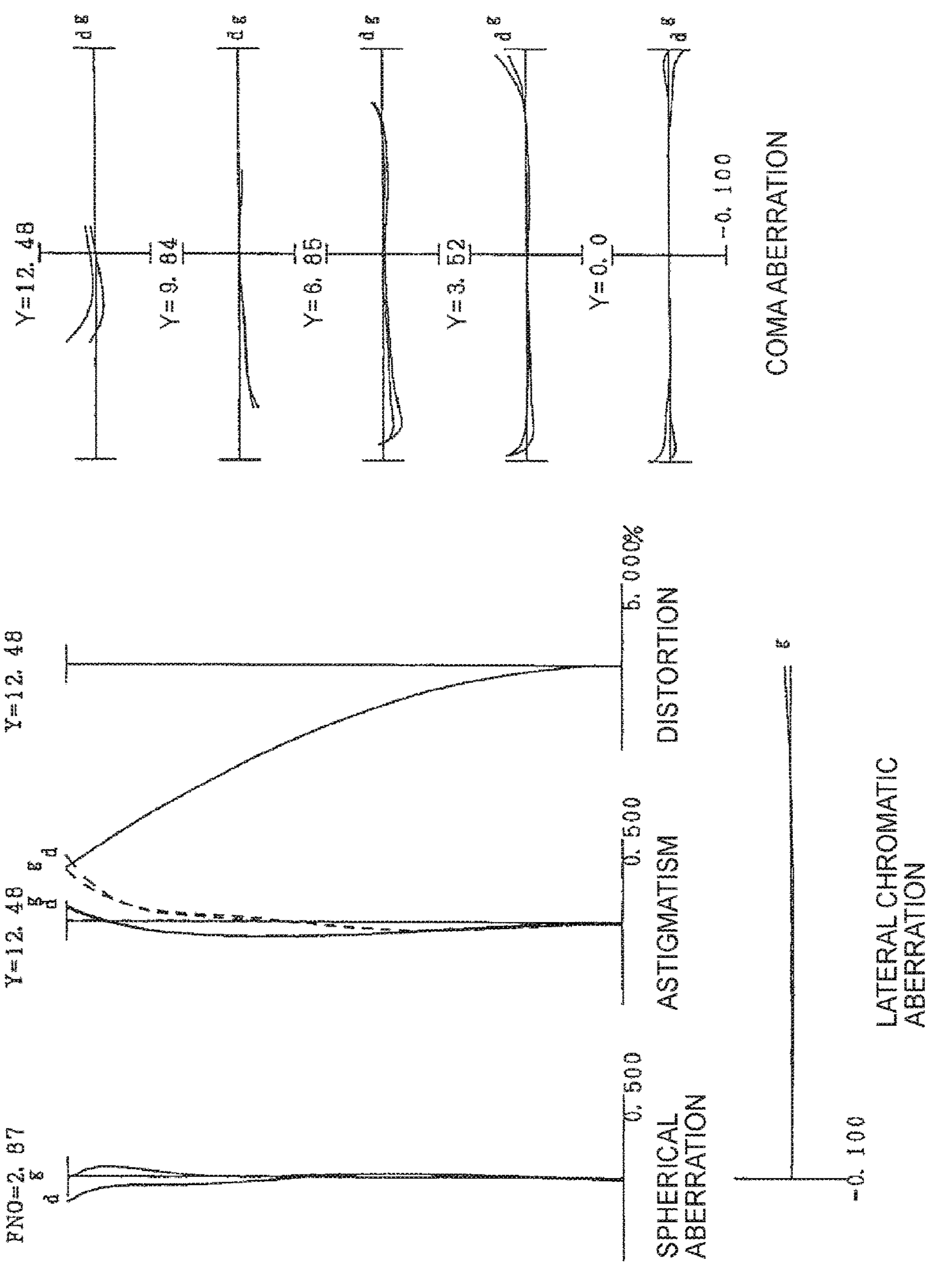
Figure 129B:
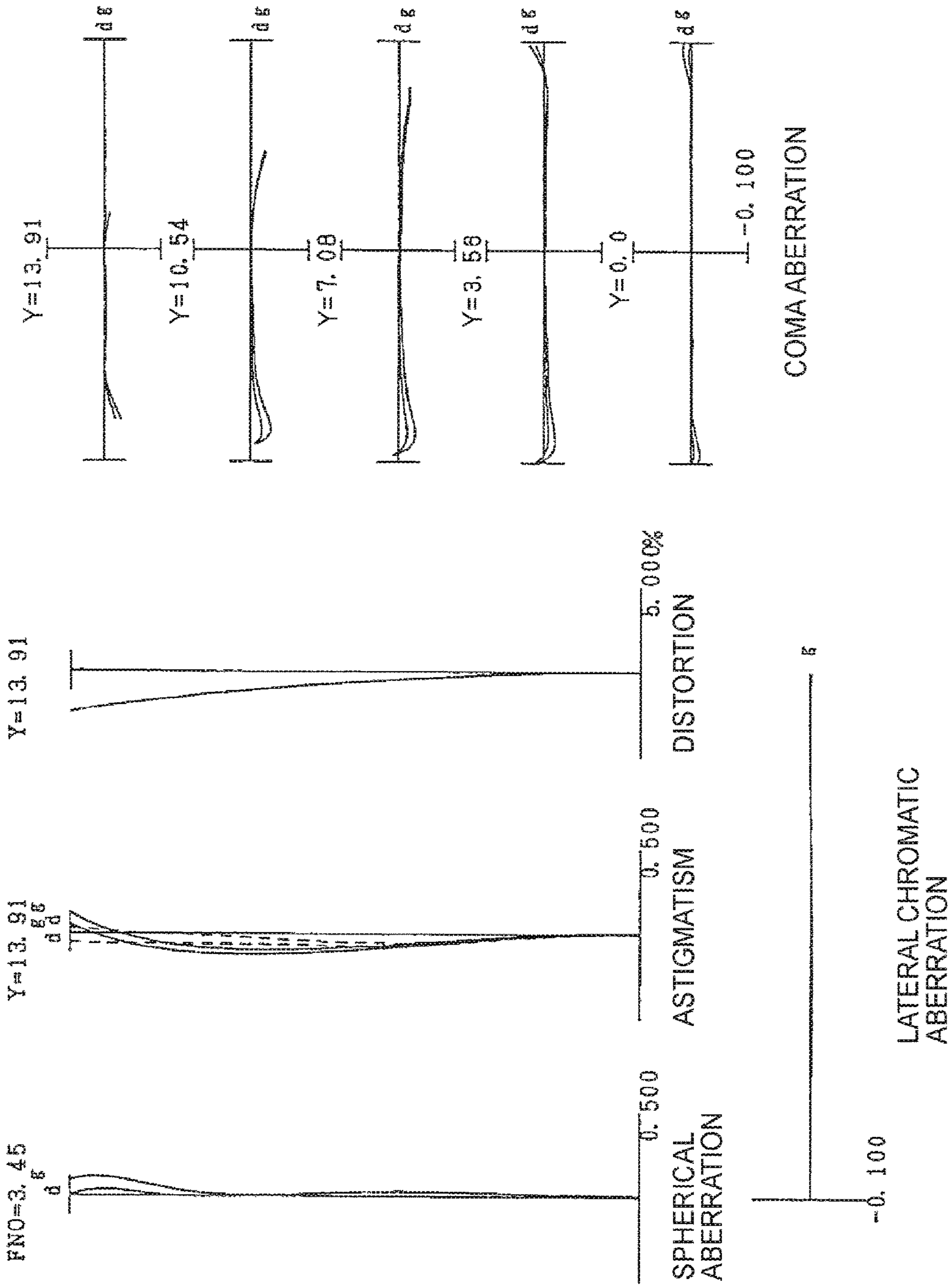
Figure 129C:
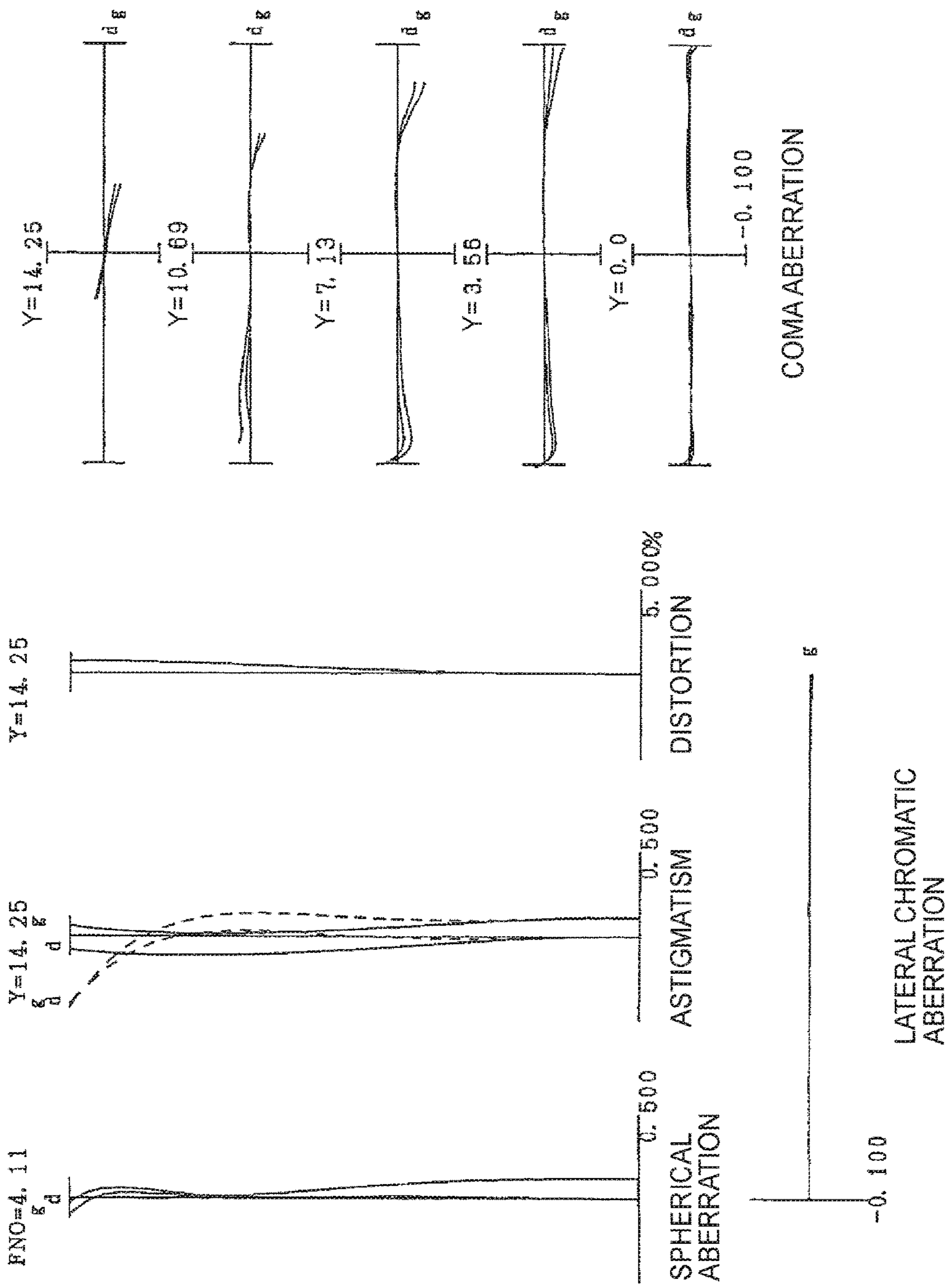

FIGS. 129A, 129B, and 129C are graphs showing various aberrations of the zoom optical system according to Example 28 upon focusing on infinity respectively in the wide angle end state, the intermediate focal length state, and the telephoto end state.

Figure 130A:
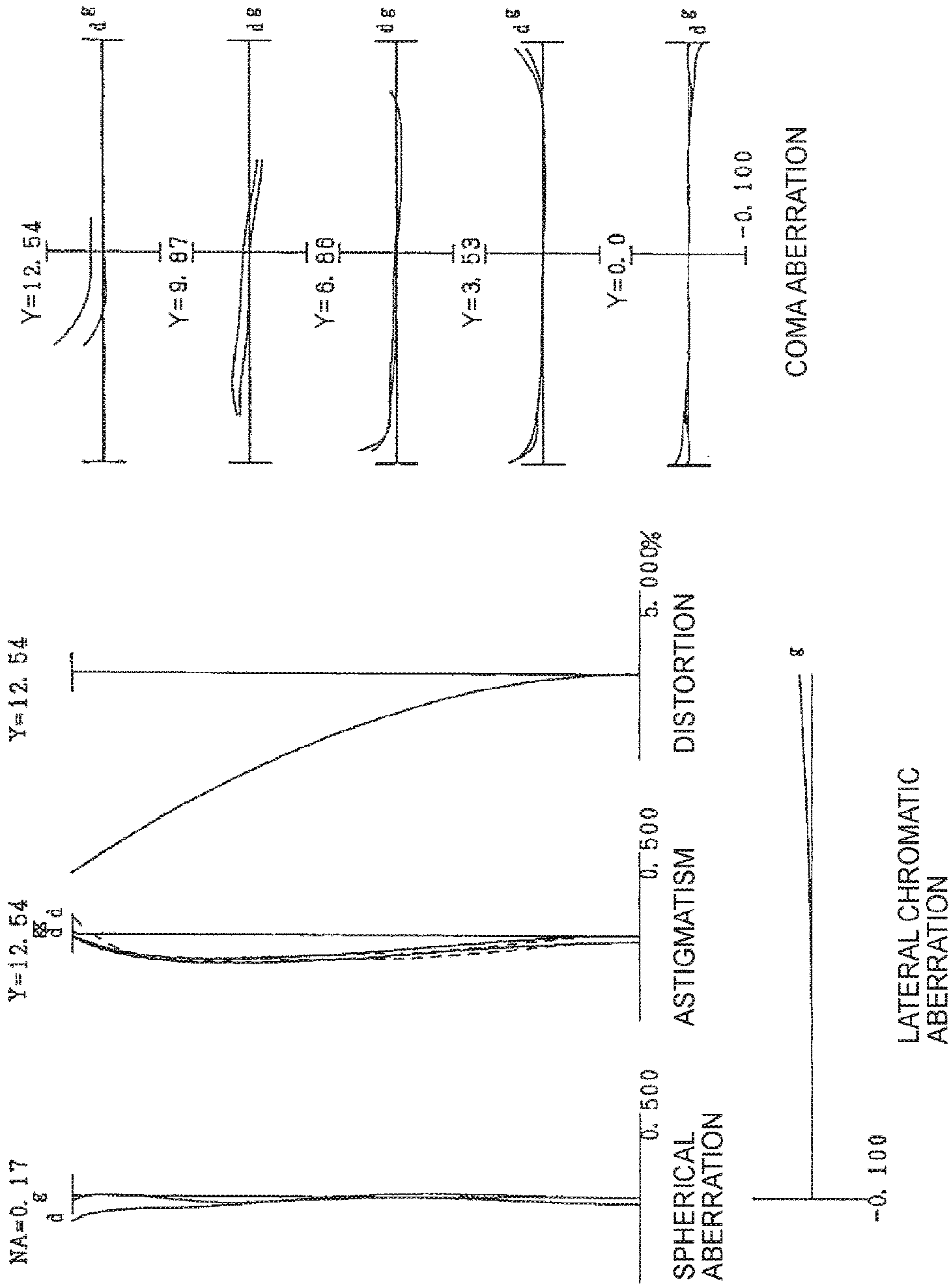
Figure 130B:
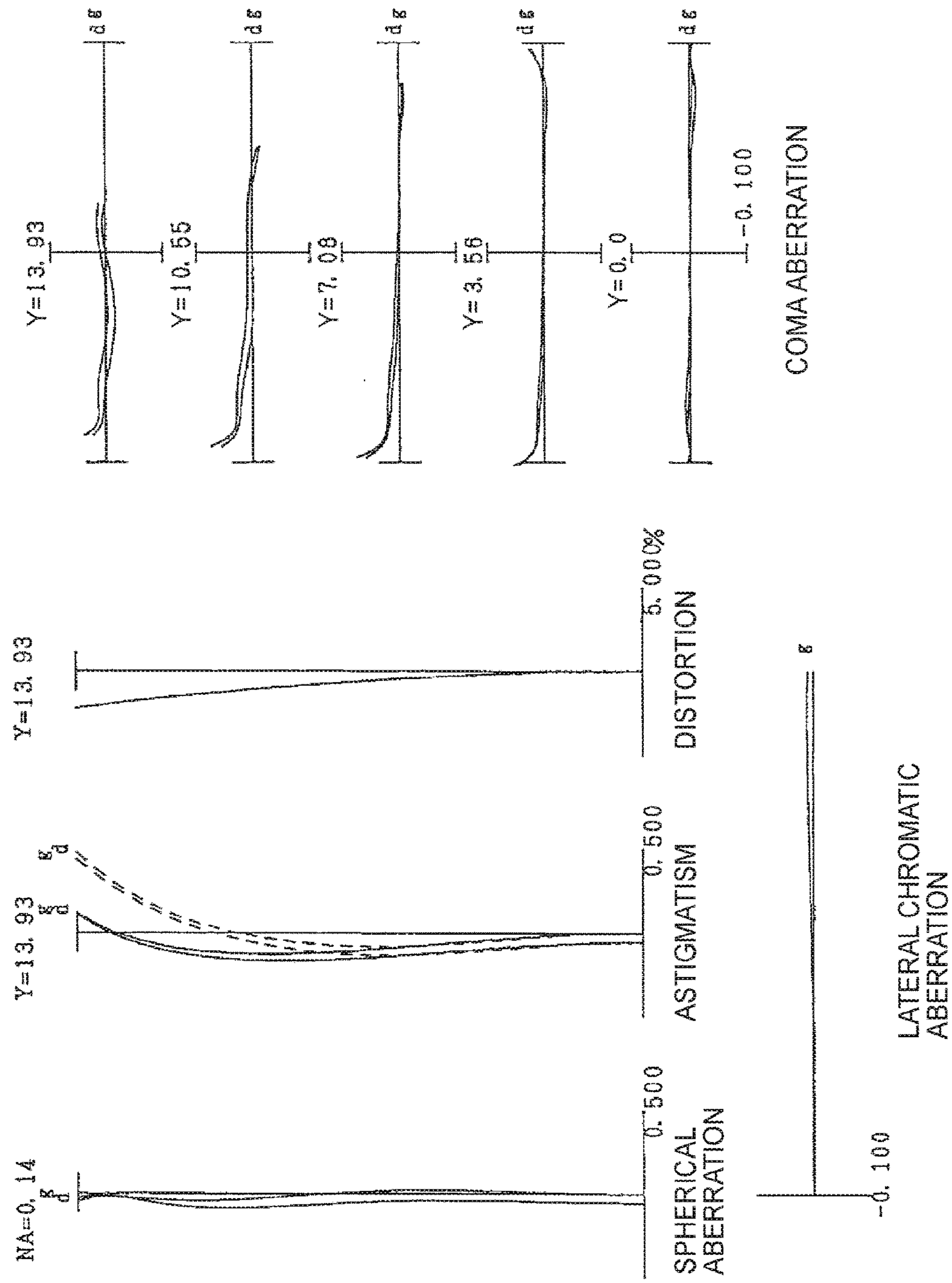
Figure 130C:
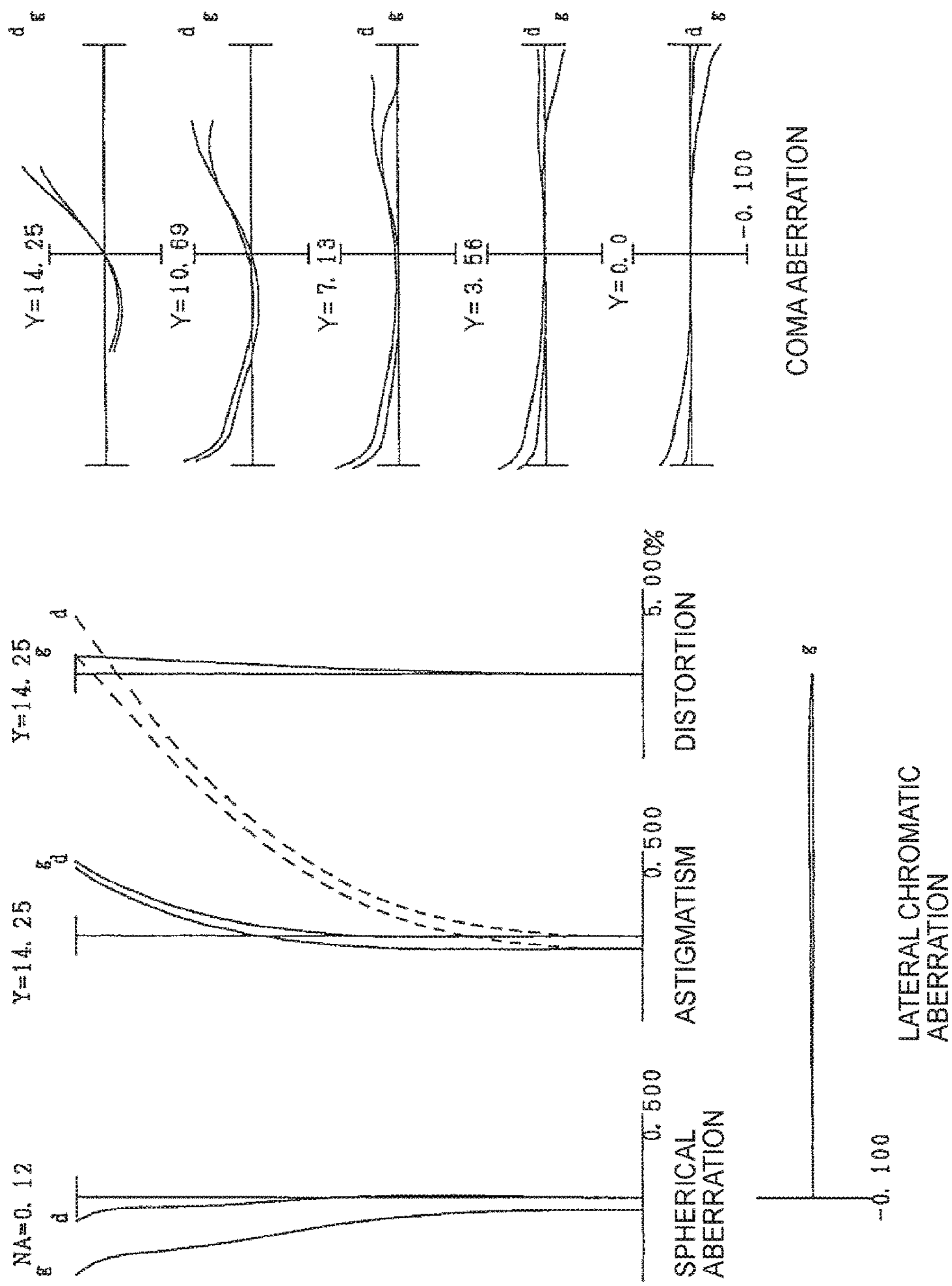

FIGS. 130A, 130B, and 130C are graphs showing various aberrations of the zoom optical system according to Example 28 upon focusing on a short distant object respectively in the wide angle end state, the intermediate focal length state, and the telephoto end state.

Figure 131A:
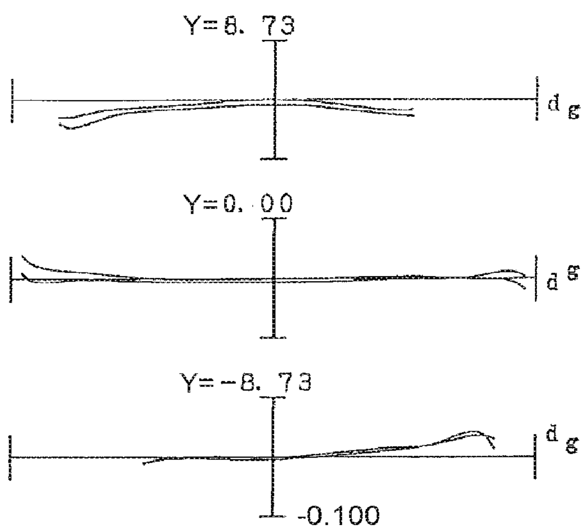
Figure 131B:
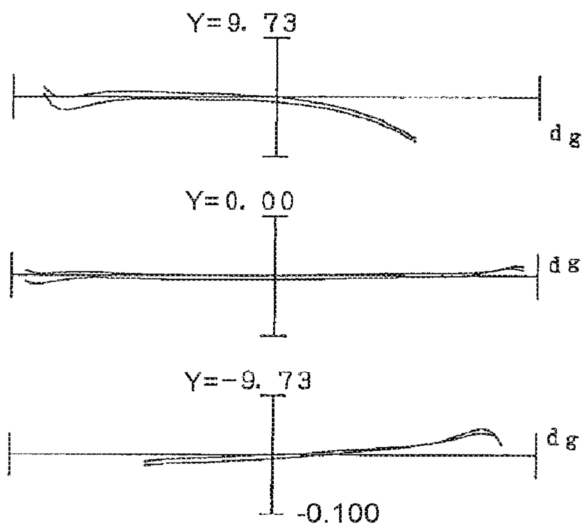
Figure 131C:
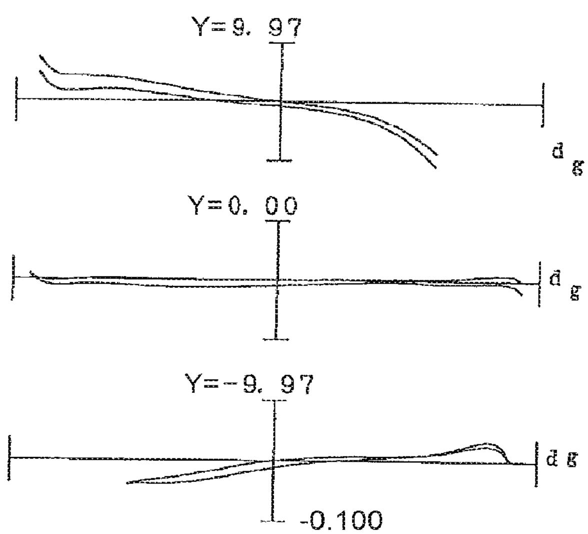

FIGS. 131A, 131B, and 131C are graphs showing coma aberrations of the zoom optical system according to Example 28 upon focusing on infinity with image blur correction performed, respectively in the wide angle end state, the intermediate focal length state, and the telephoto end state.

Figure 132:
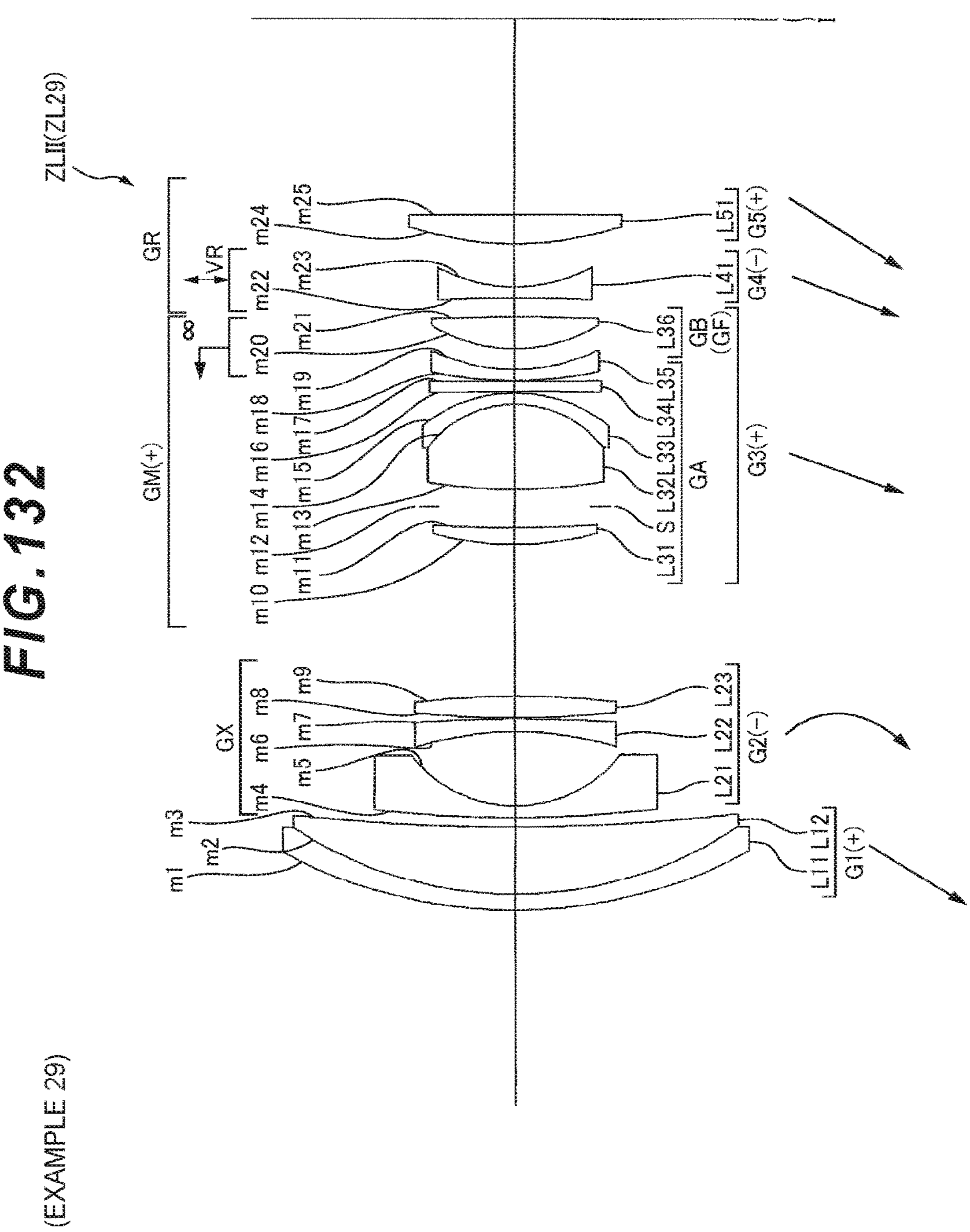

FIG. 132 is a cross-sectional view of a zoom optical system according to Example 29.

Figure 133A:
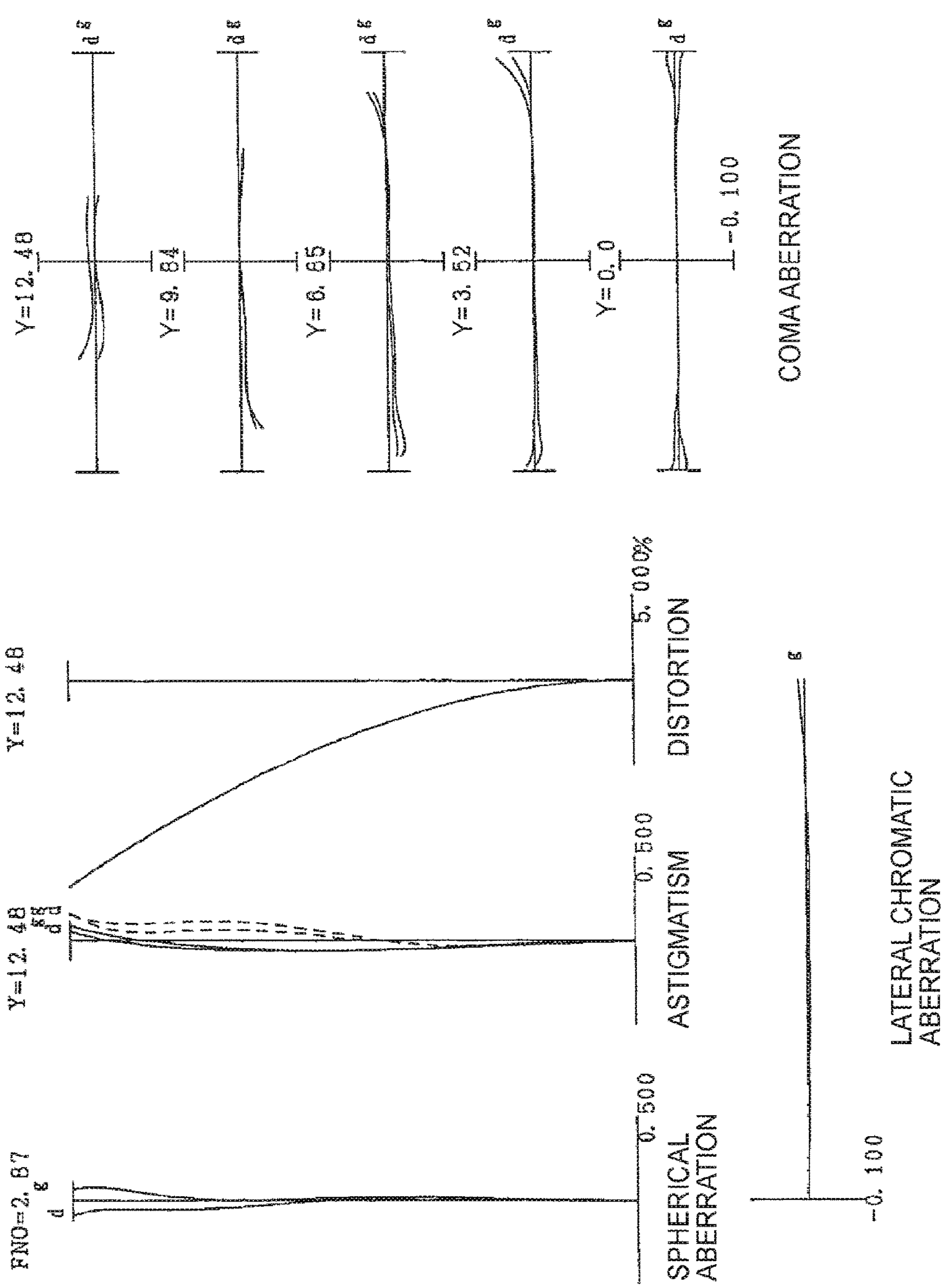
Figure 133B:
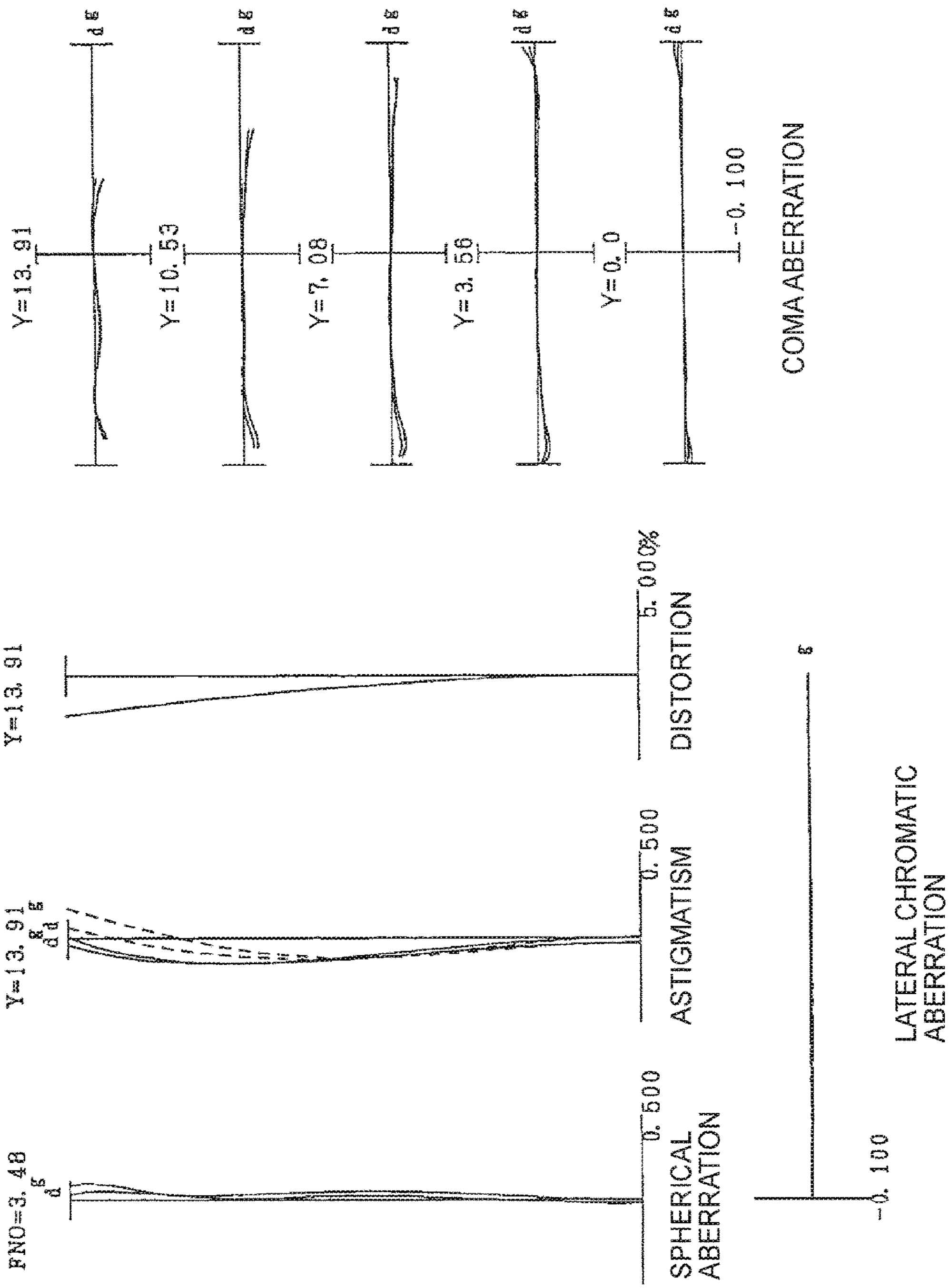
Figure 133C:
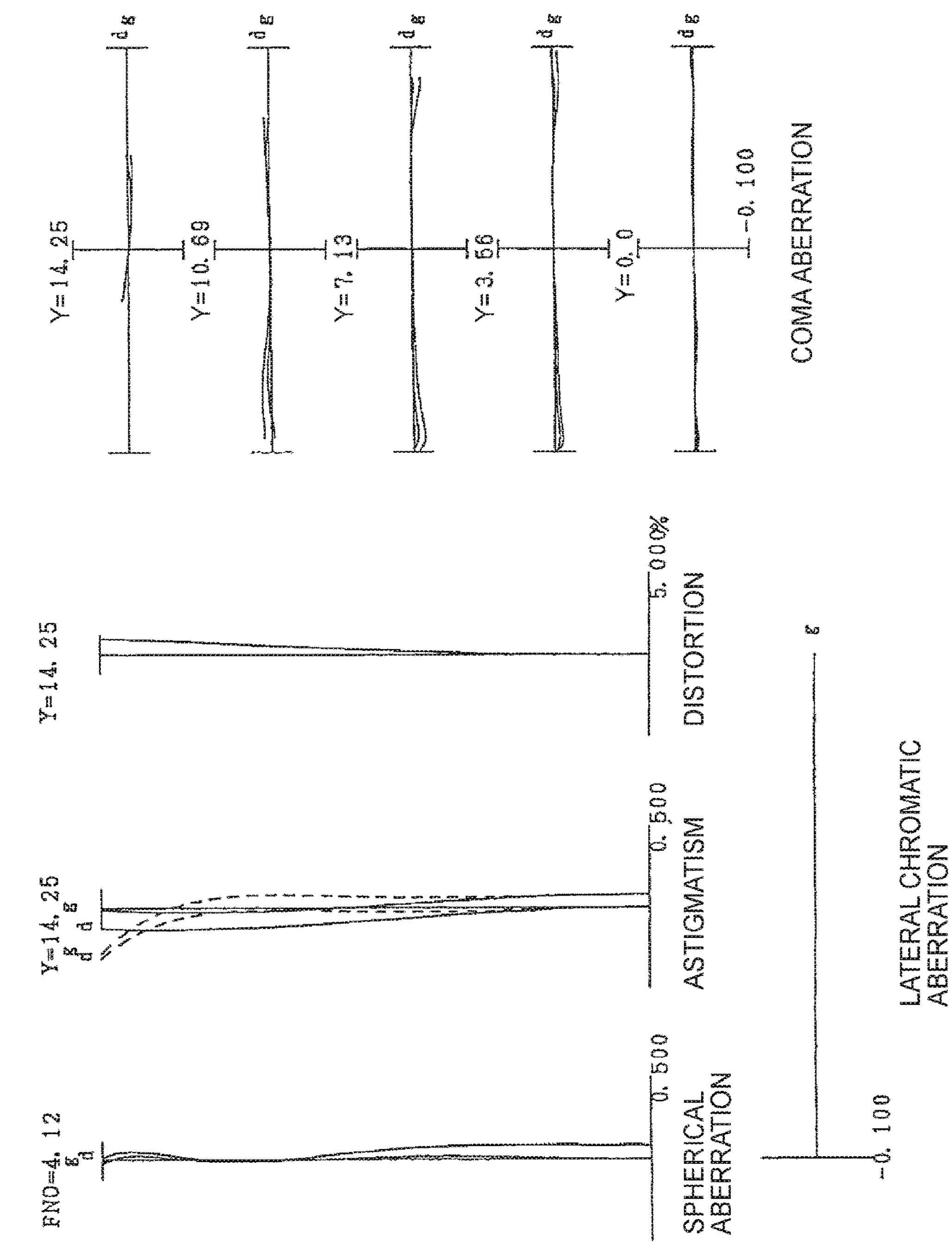

FIGS. 133A, 133B, and 133C are graphs showing various aberrations of the zoom optical system according to Example 29 upon focusing on infinity respectively in the wide angle end state, the intermediate focal length state, and the telephoto end state.

Figure 134A:
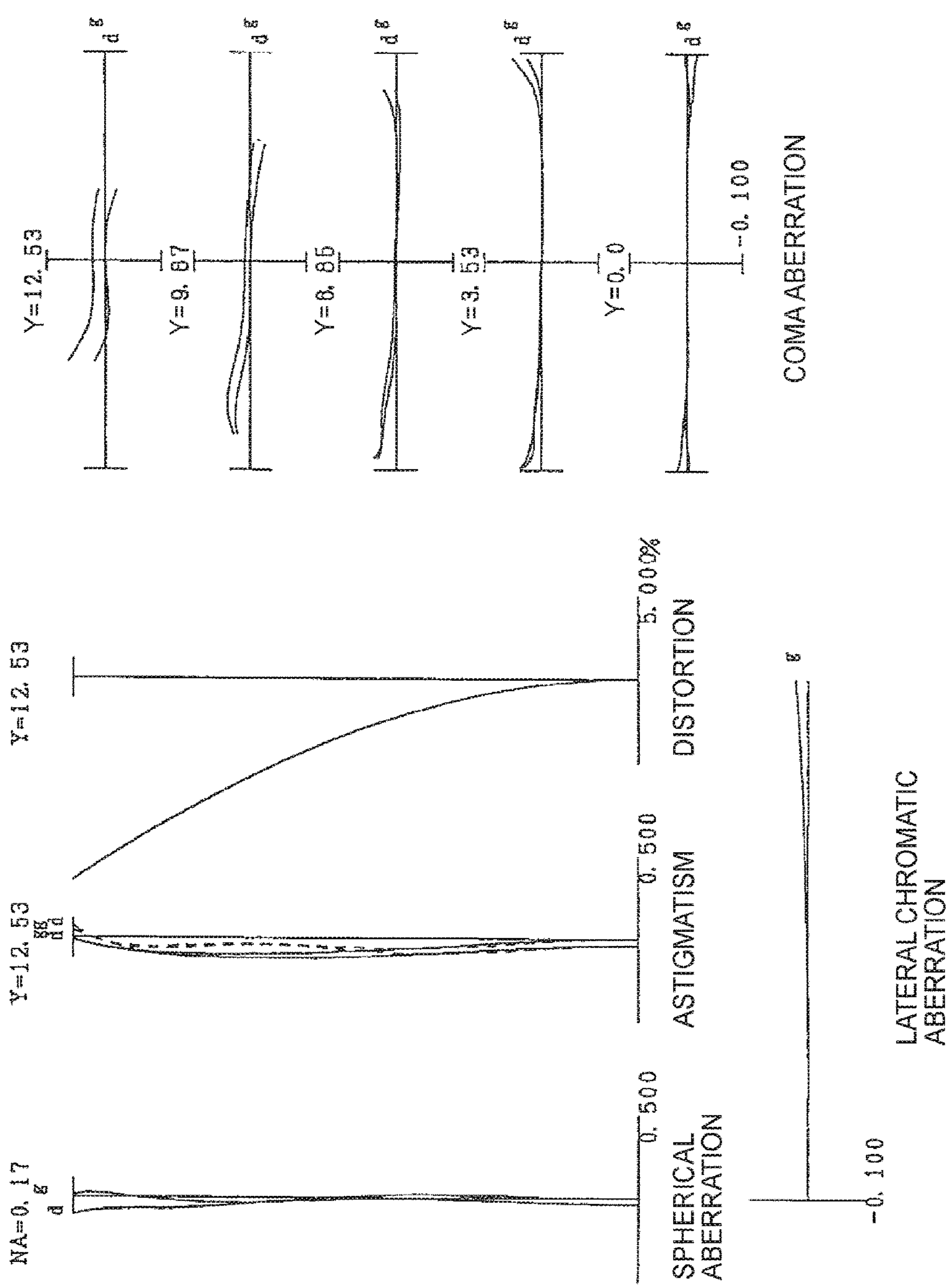
Figure 134B:
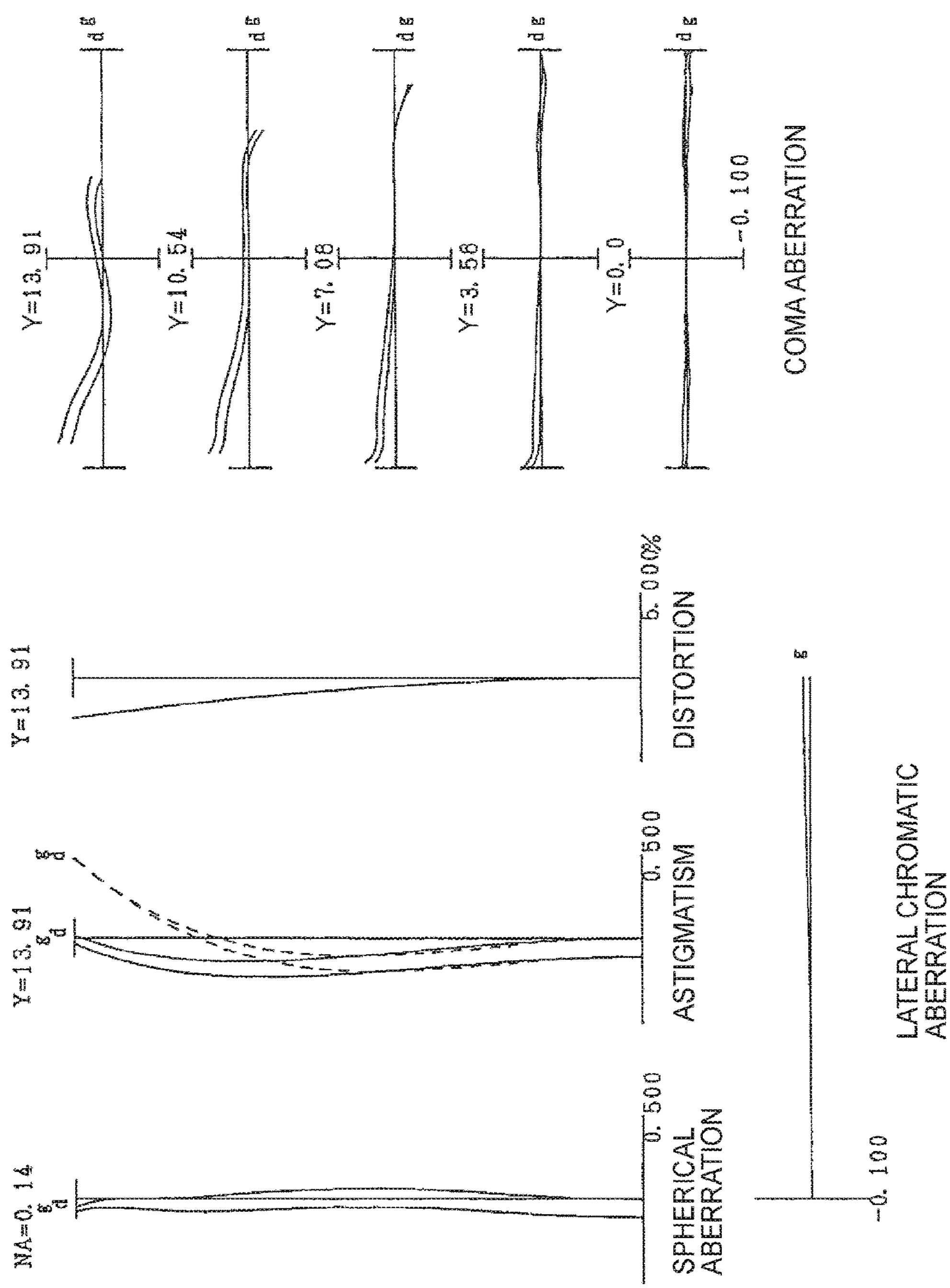
Figure 134C:
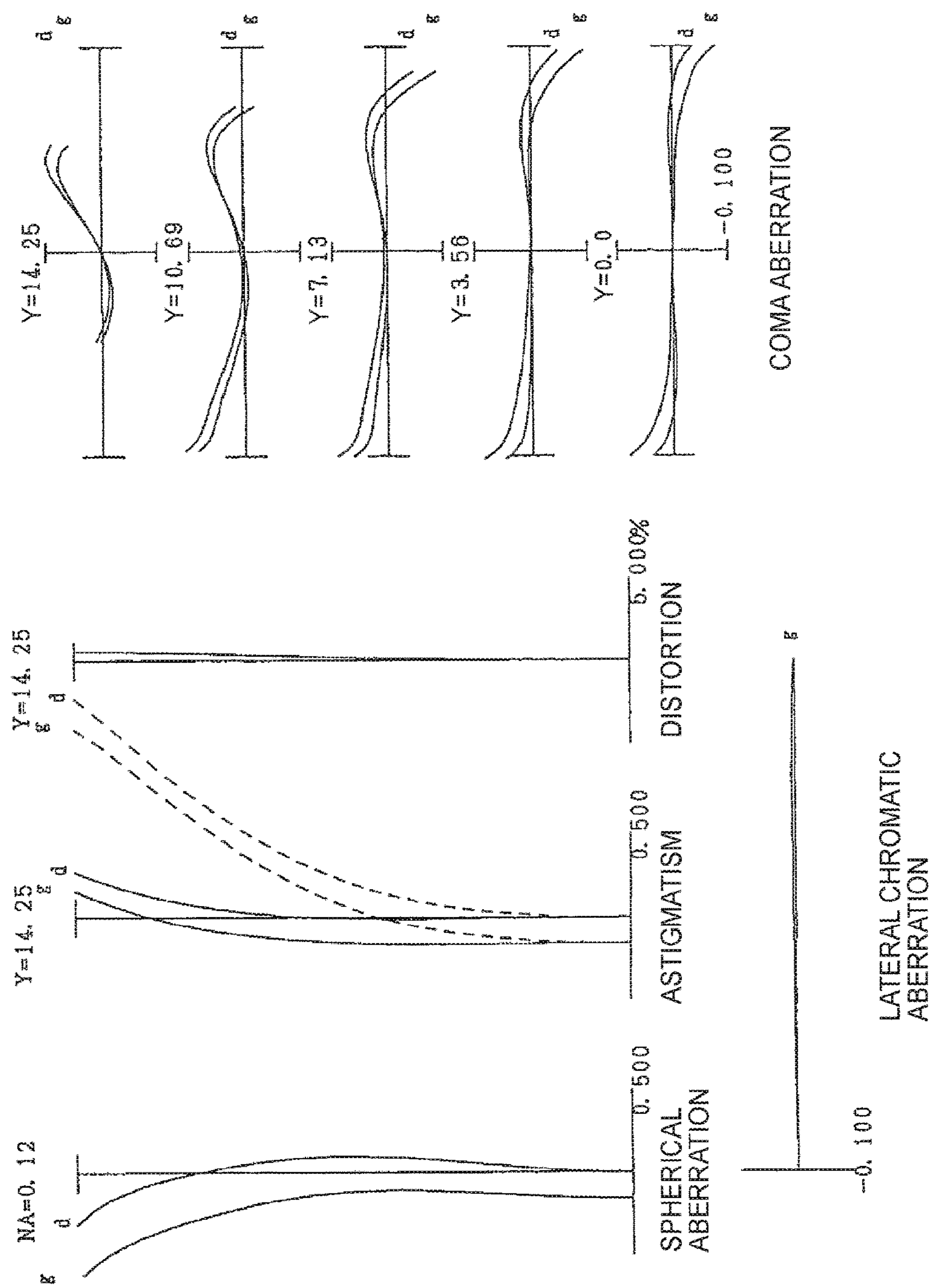

FIGS. 134A, 134B, and 134C are graphs showing various aberrations of the zoom optical system according to Example 29 upon focusing on a short distant object respectively in the wide angle end state, the intermediate focal length state, and the telephoto end state.

Figure 135A:
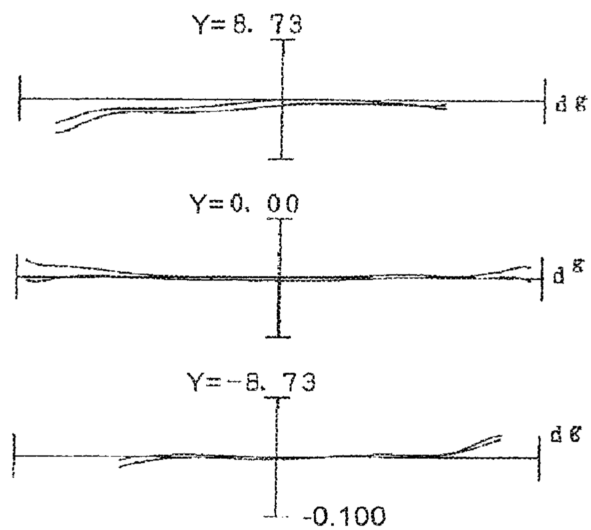
Figure 135B:
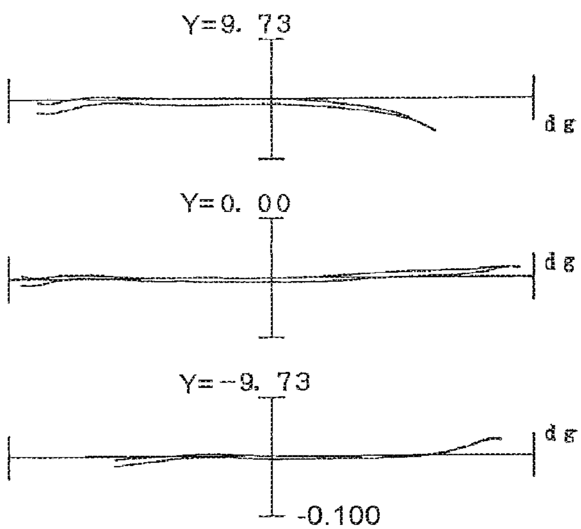
Figure 135C:
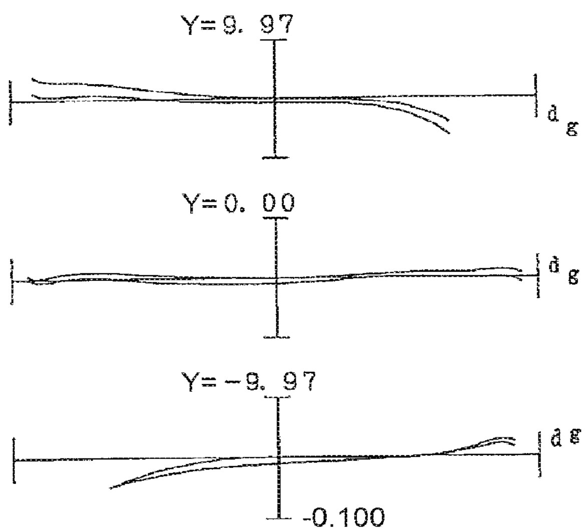

FIGS. 135A, 135B, and 135C are graphs showing coma aberrations of the zoom optical system according to Example 29 upon focusing on infinity with image blur correction performed, respectively in the wide angle end state, the intermediate focal length state, and the telephoto end state.

Figure 136:
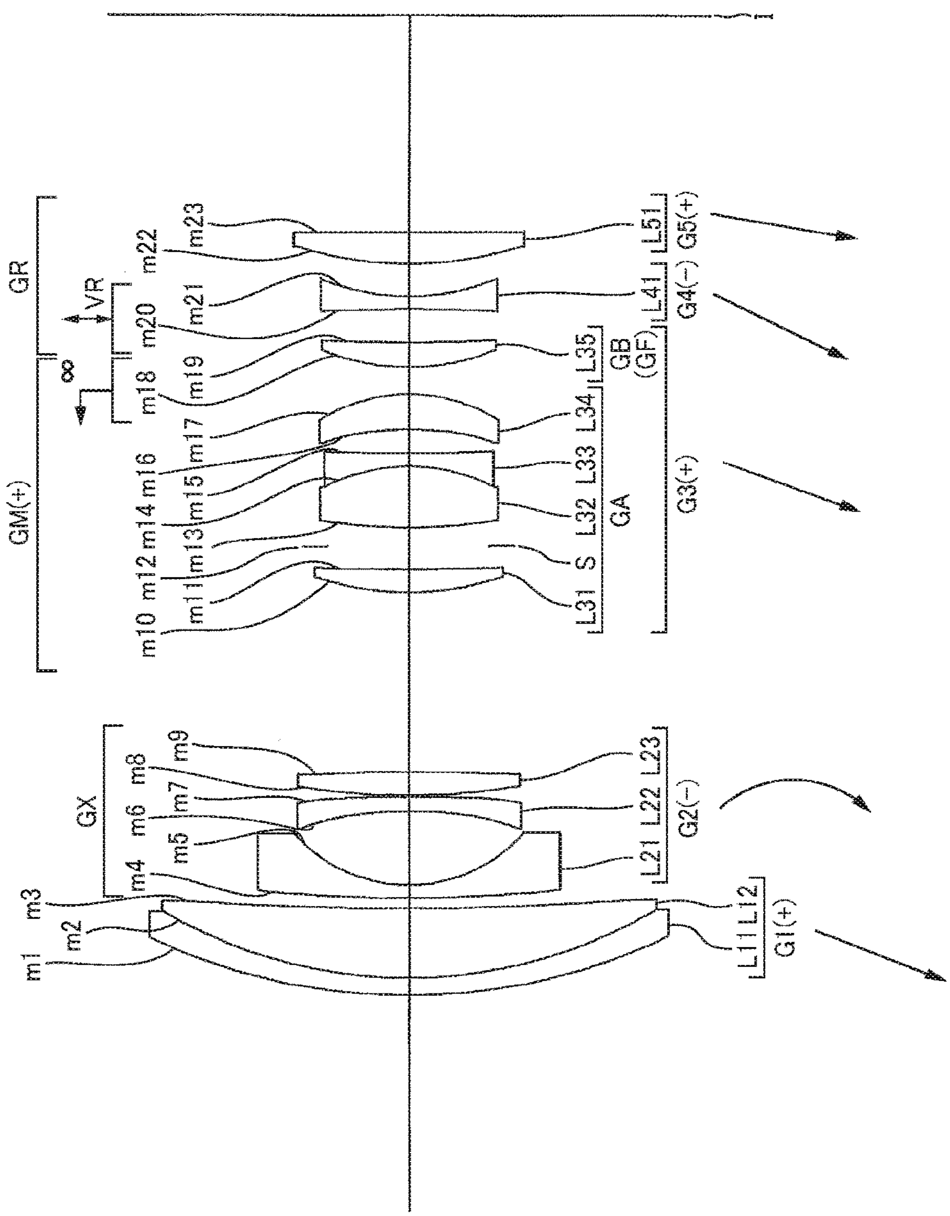

FIG. 136 is a cross-sectional view of a zoom optical system according to Example 30.

Figure 137A:
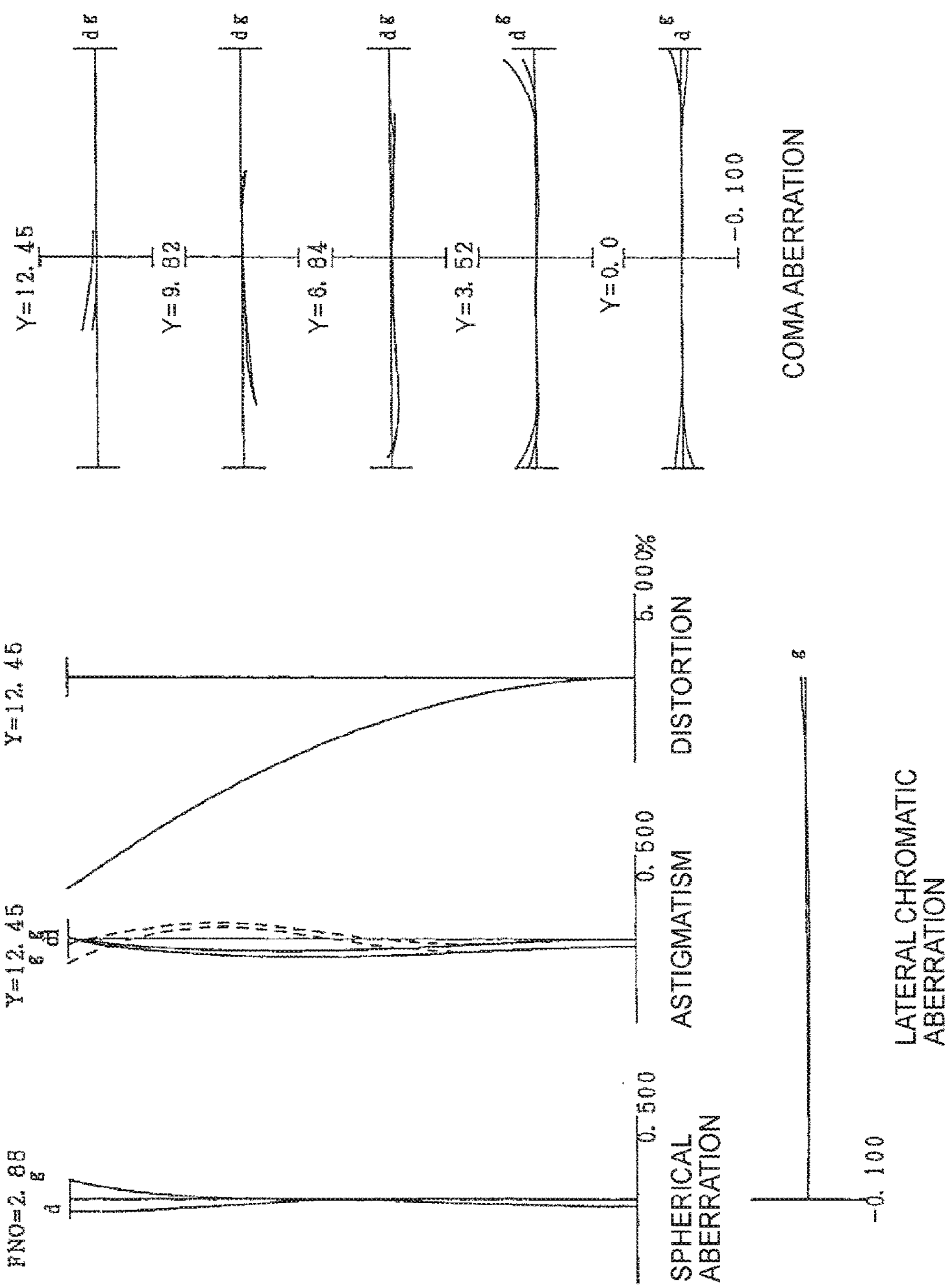
Figure 137B:
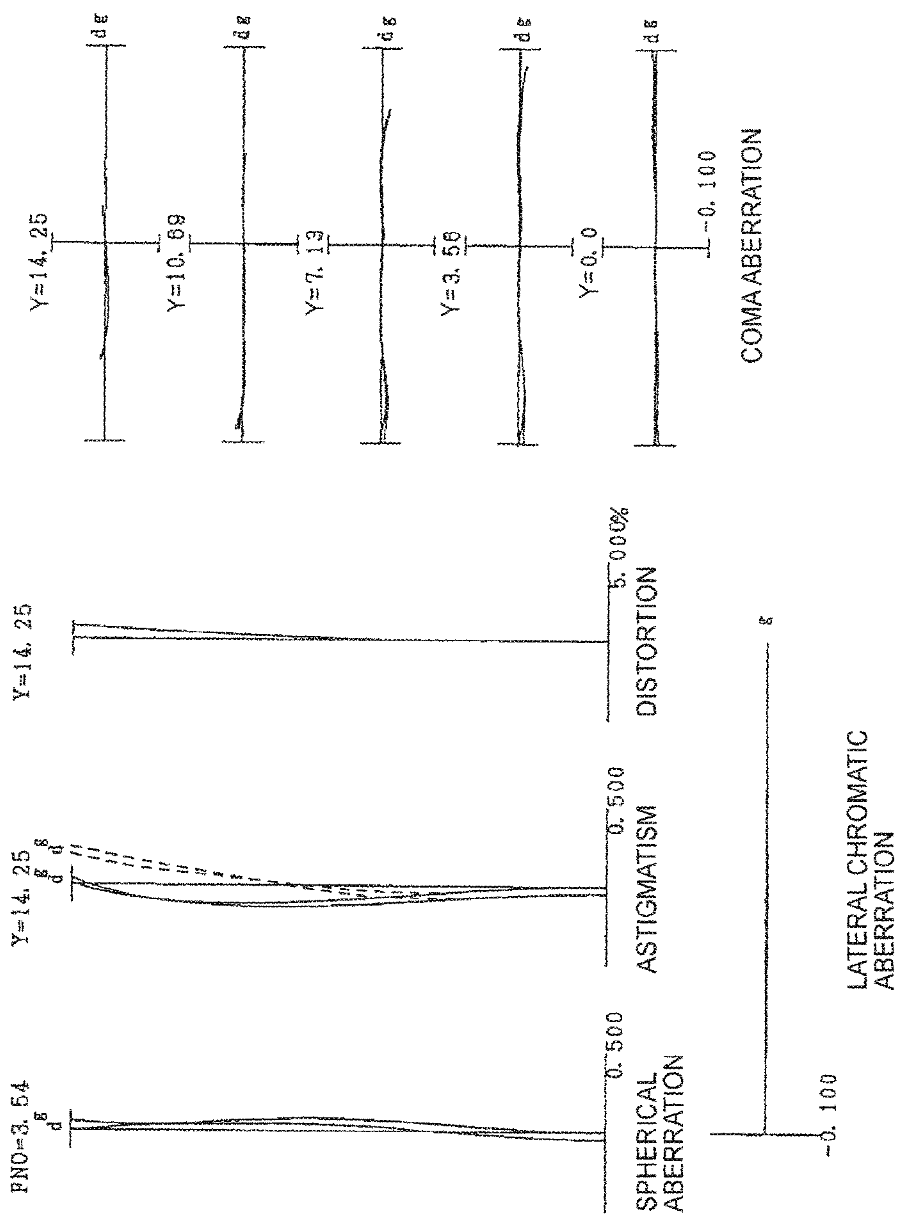
Figure 137C:
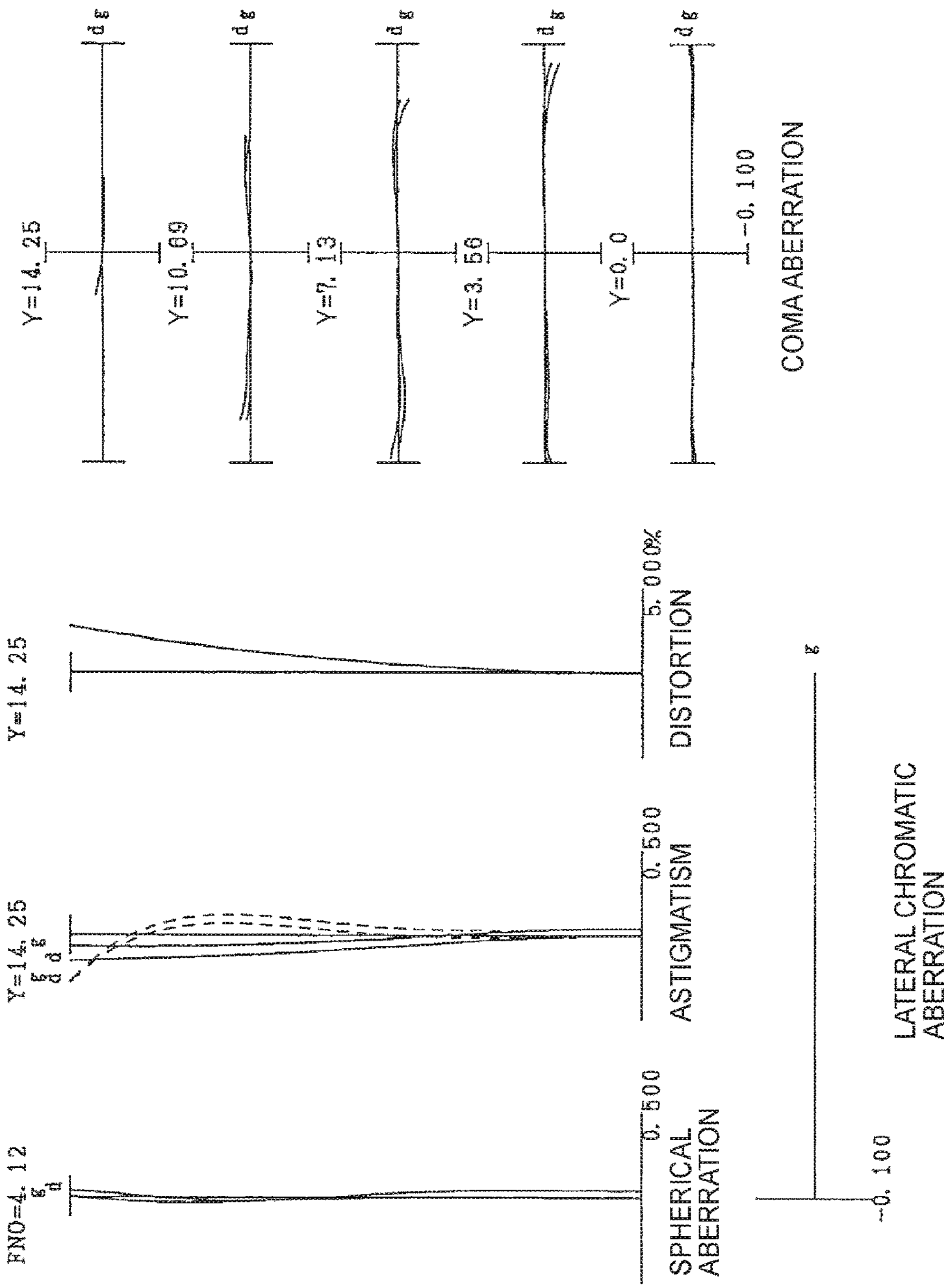

FIGS. 137A, 137B, and 137C are graphs showing various aberrations of the zoom optical system according to Example 30 upon focusing on infinity respectively in the wide angle end state, the intermediate focal length state, and the telephoto end state.

Figure 138A:
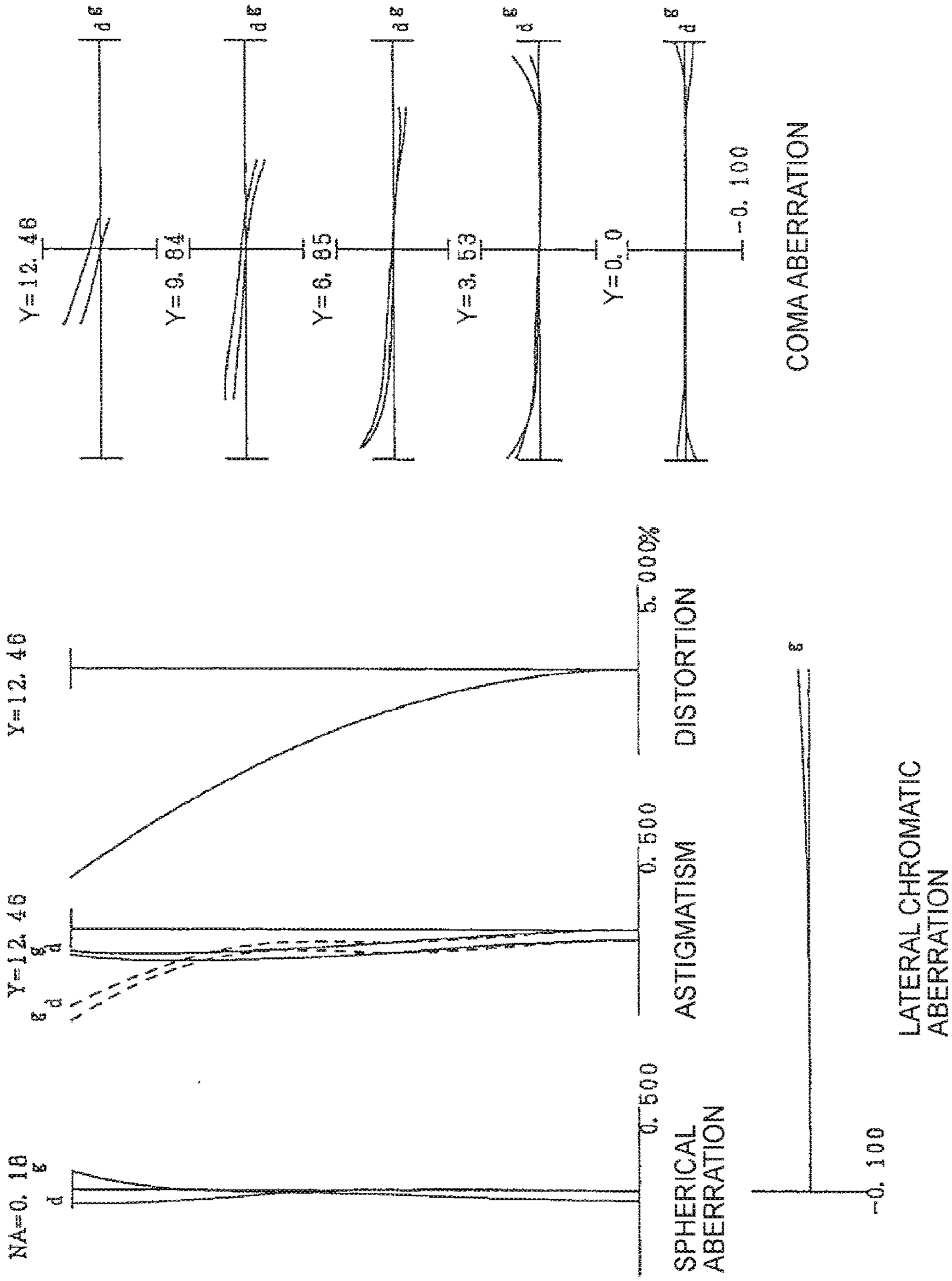
Figure 138B:
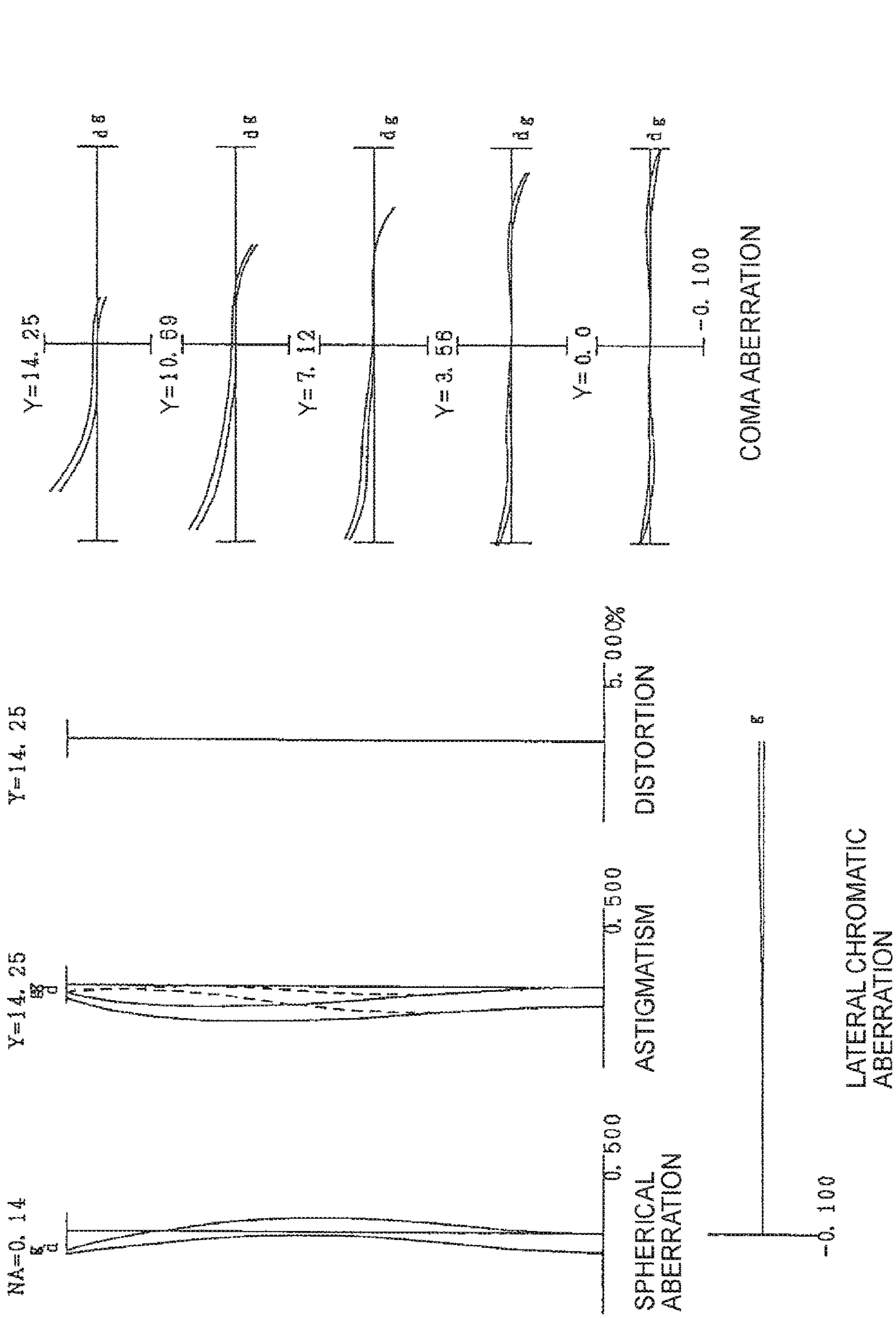
Figure 138C:
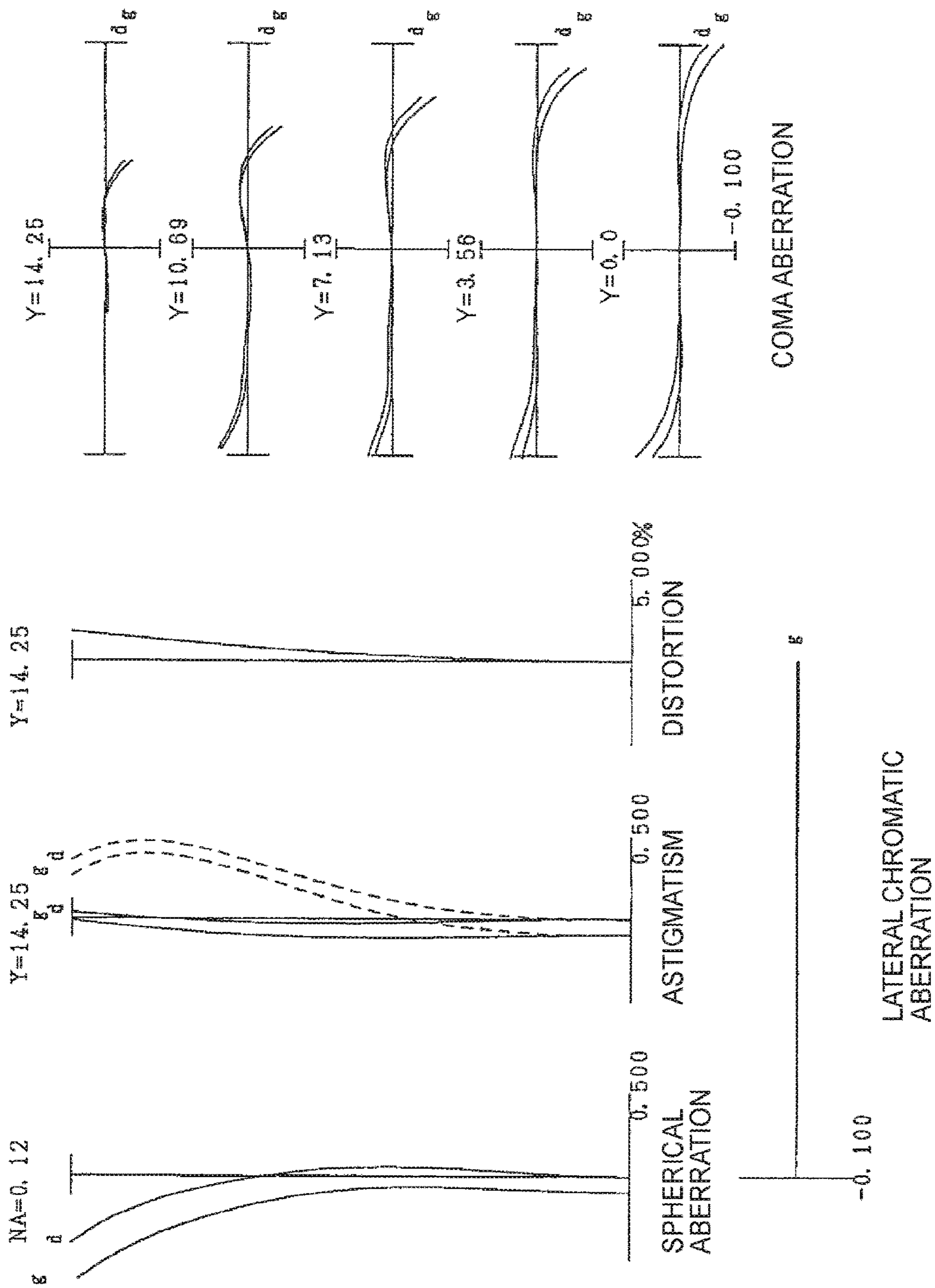

FIGS. 138A, 138B, and 138C are graphs showing various aberrations of the zoom optical system according to Example 30 upon focusing on a short distant object respectively in the wide angle end state, the intermediate focal length state, and the telephoto end state.

Figure 139A:
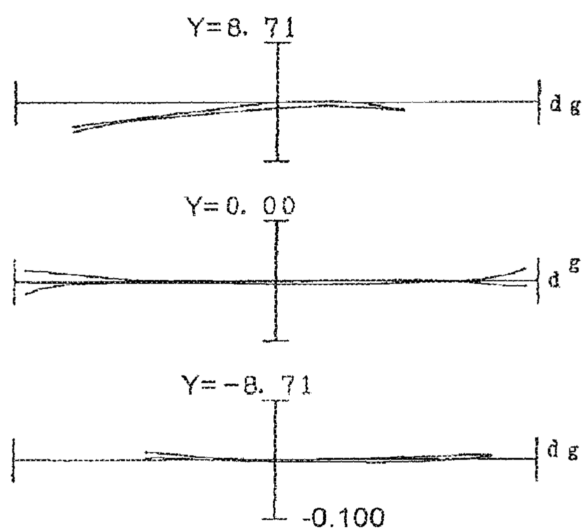
Figure 139B:
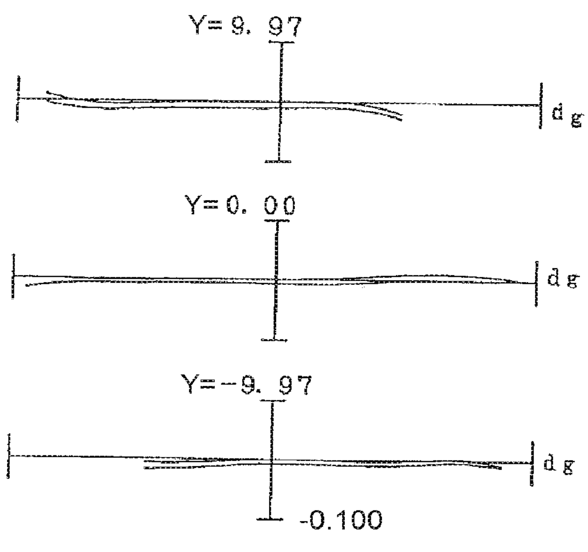
Figure 139C:
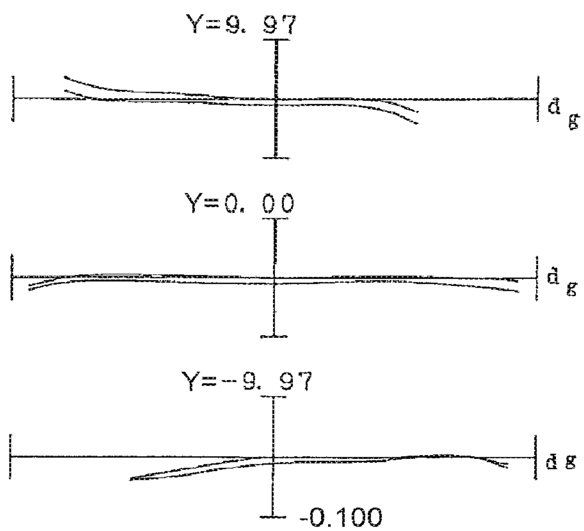

FIGS. 139A, 139B, and 139C are graphs showing coma aberrations of the zoom optical system according to Example 30 upon focusing on infinity with image blur correction performed, respectively in the wide angle end state, the intermediate focal length state, and the telephoto end state.

Figure 140:
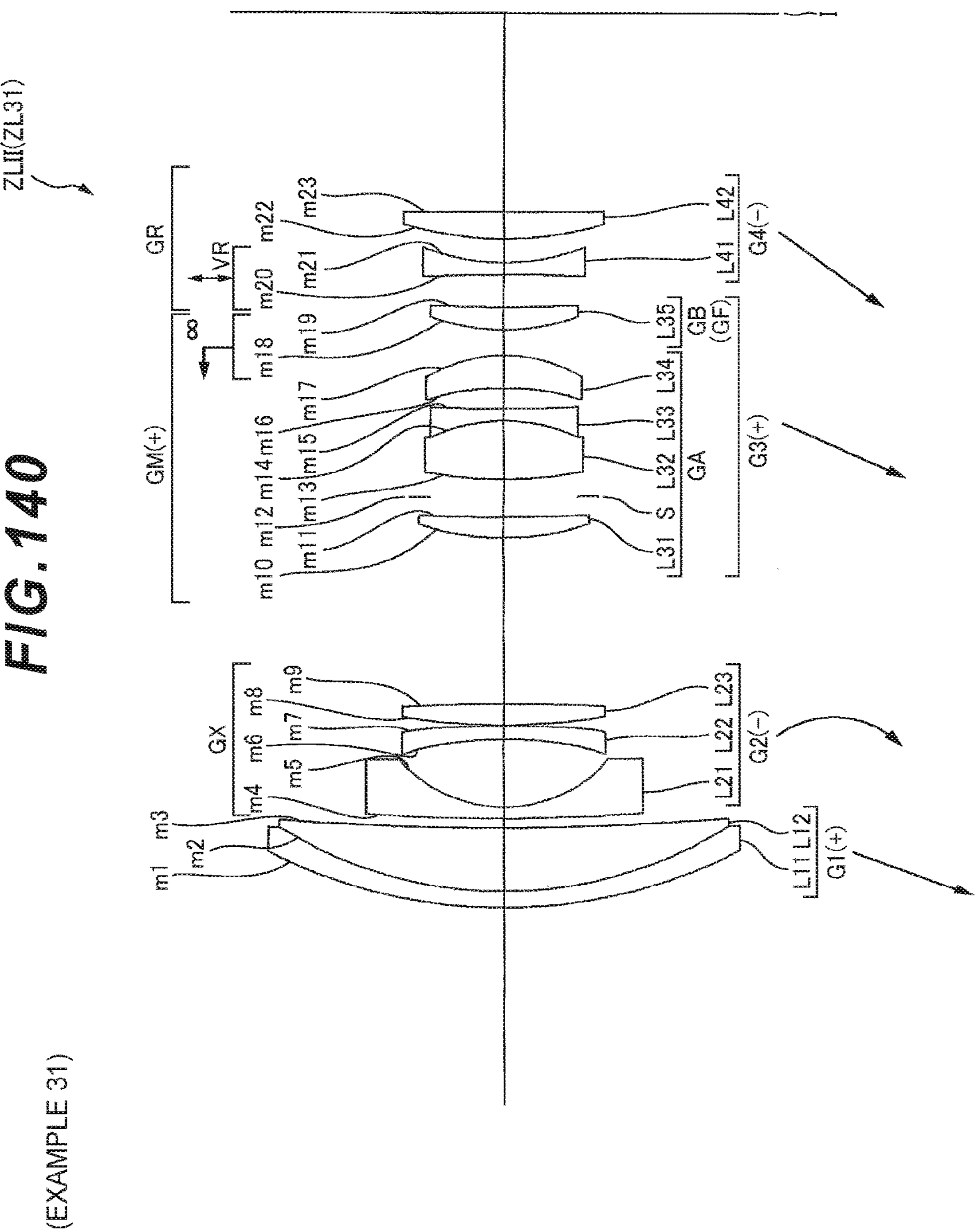

FIG. 140 is a cross-sectional view of a zoom optical system according to Example 31.

Figure 141A:
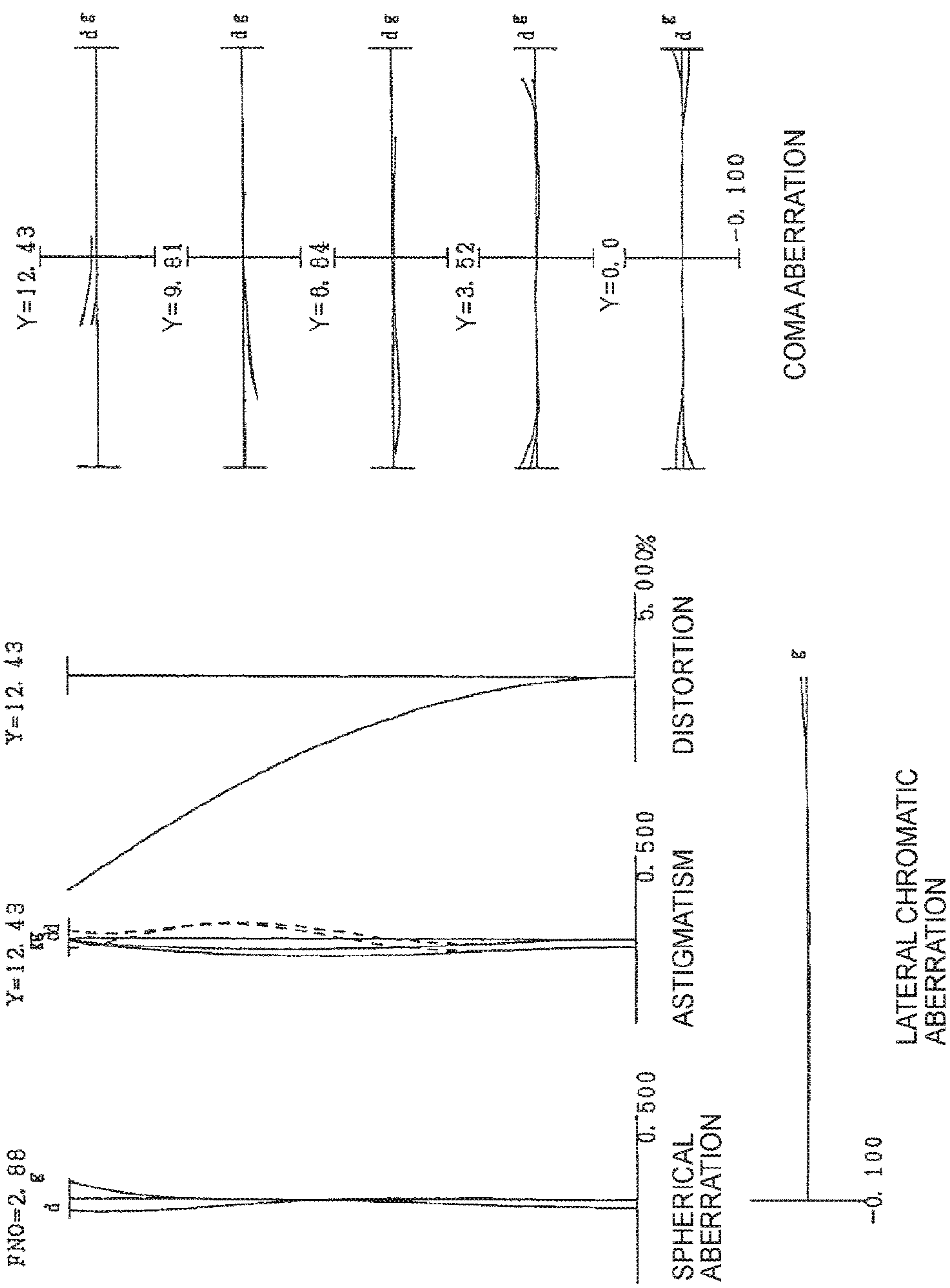
Figure 141B:
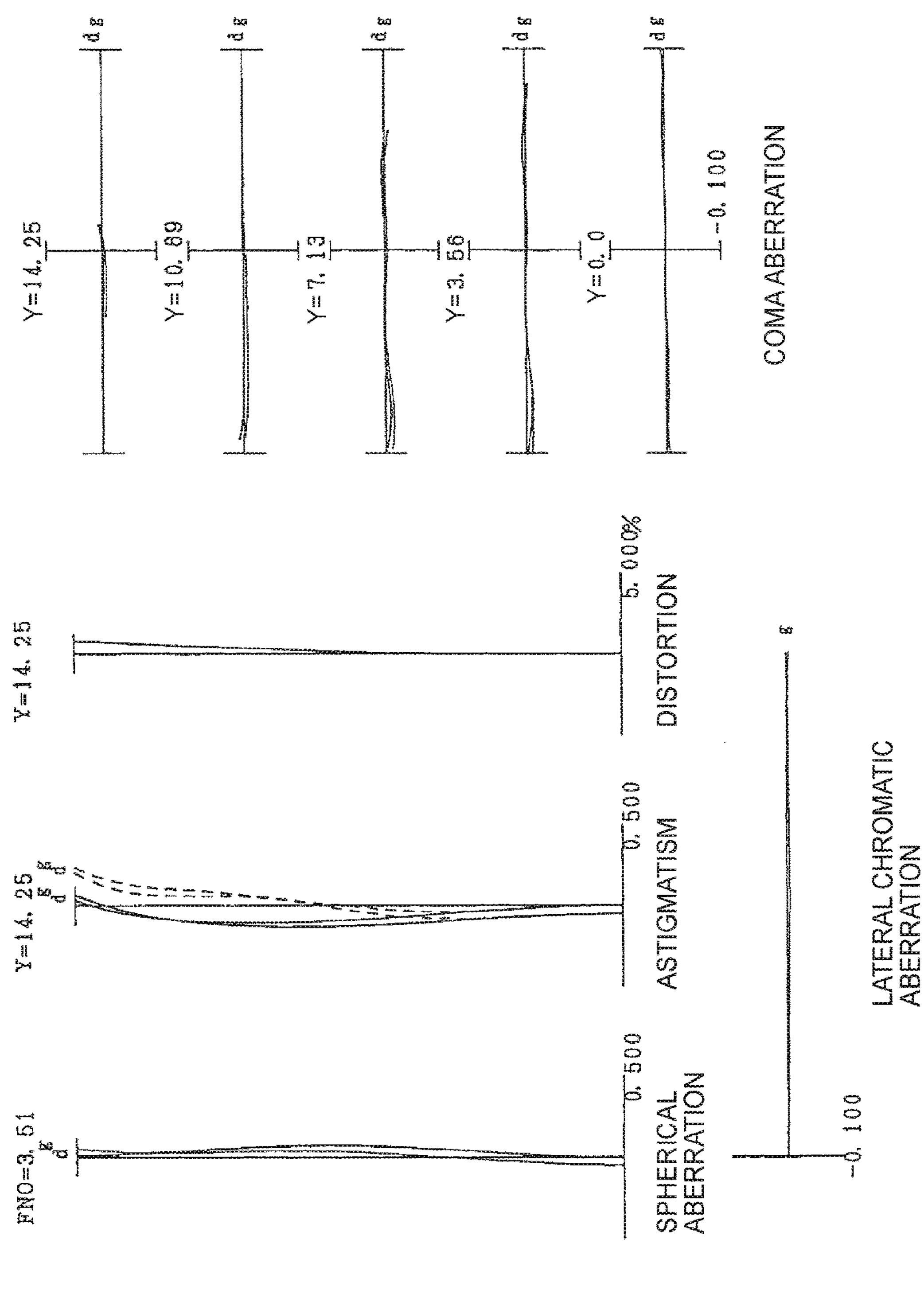
Figure 141C:
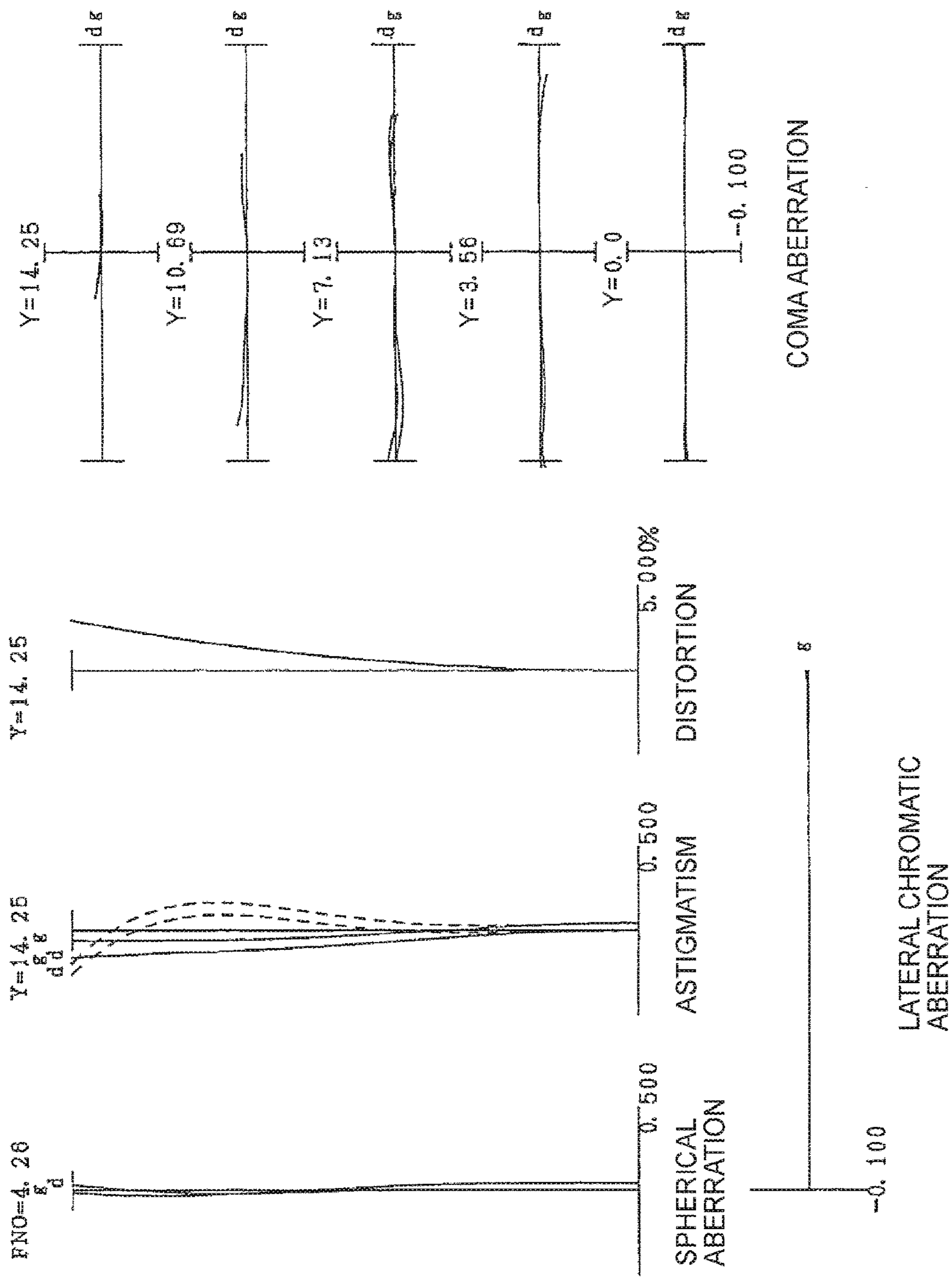

FIGS. 141A, 141B, and 141C are graphs showing various aberrations of the zoom optical system according to Example 31 upon focusing on infinity respectively in the wide angle end state, the intermediate focal length state, and the telephoto end state.

Figure 142A:
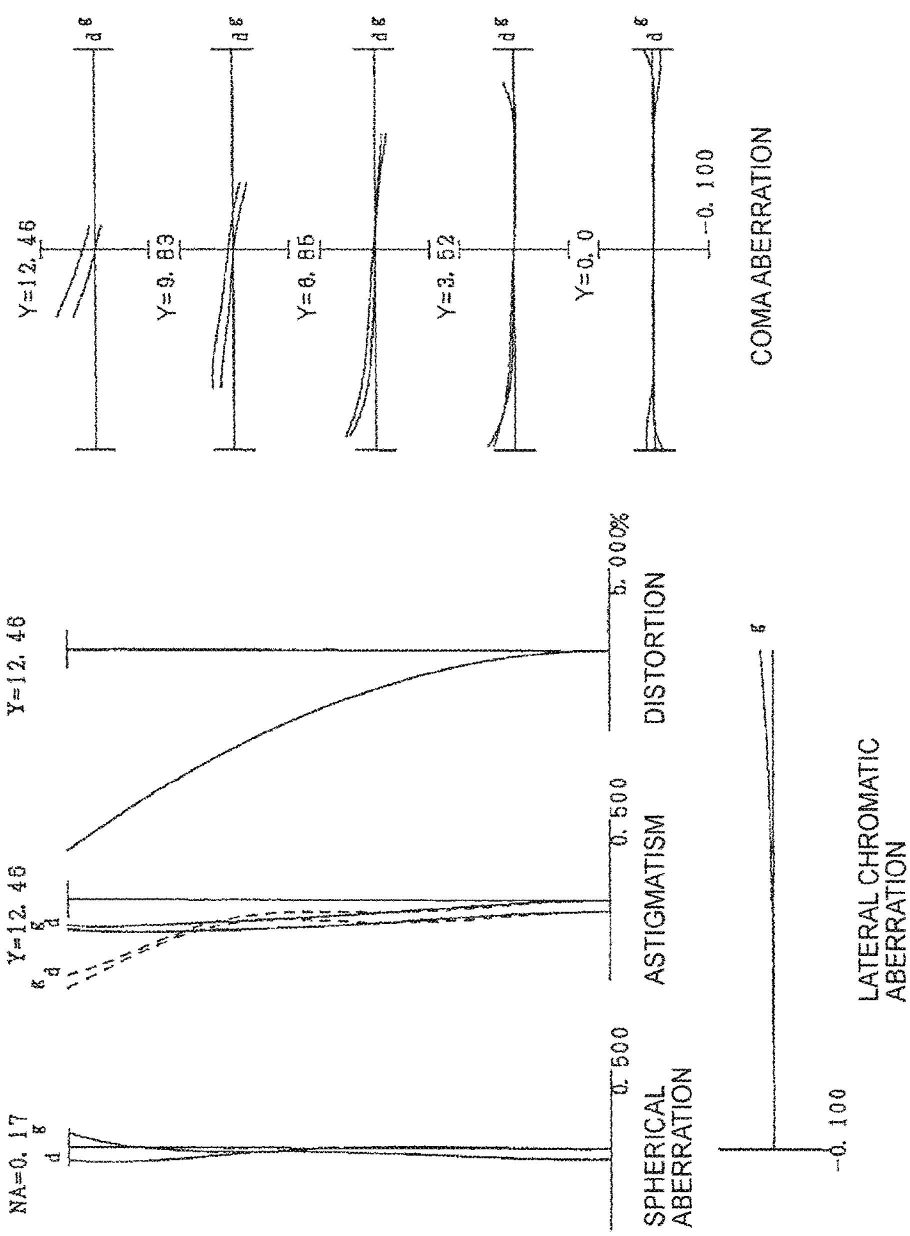
Figure 142B:
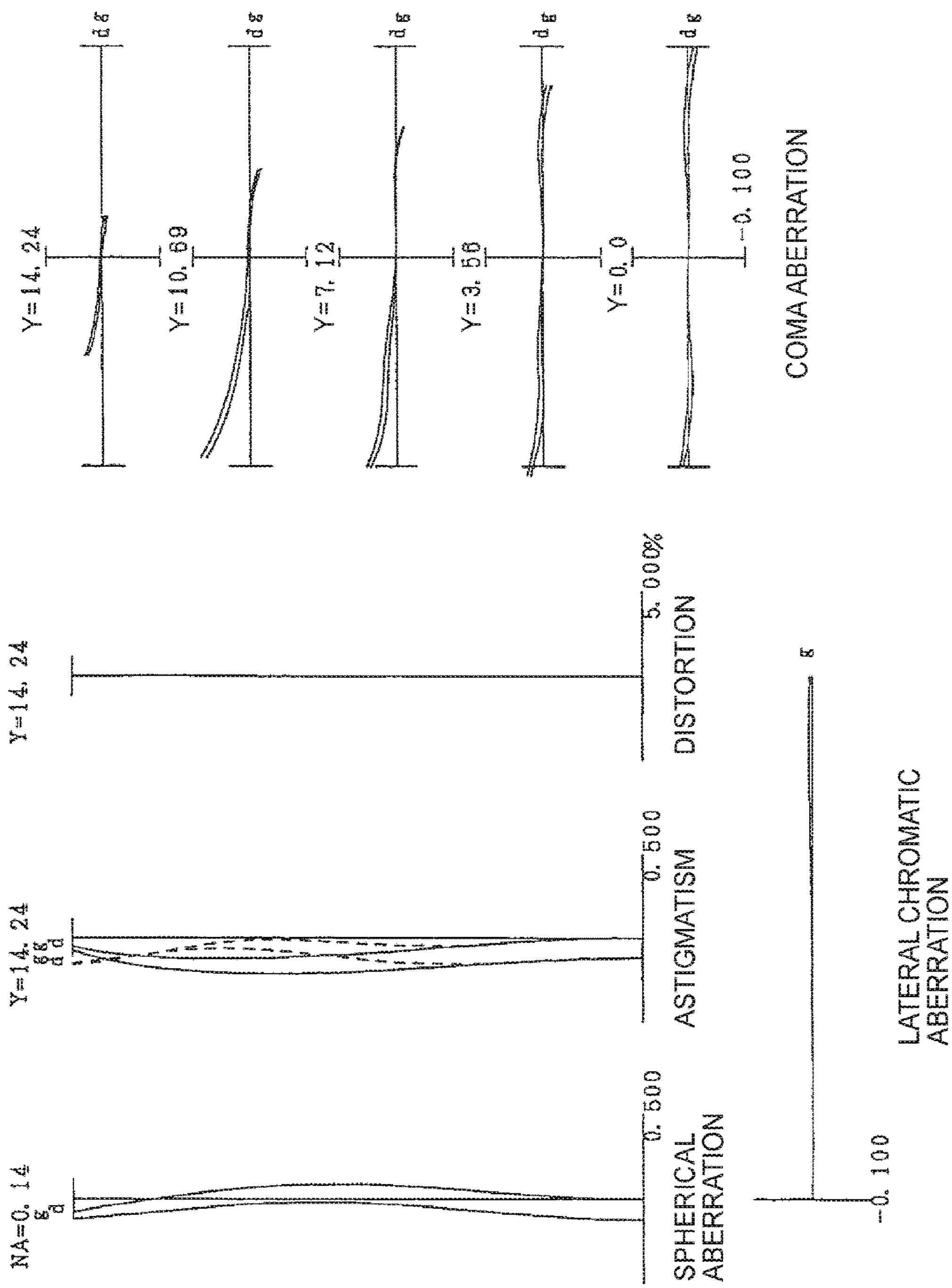
Figure 142C:
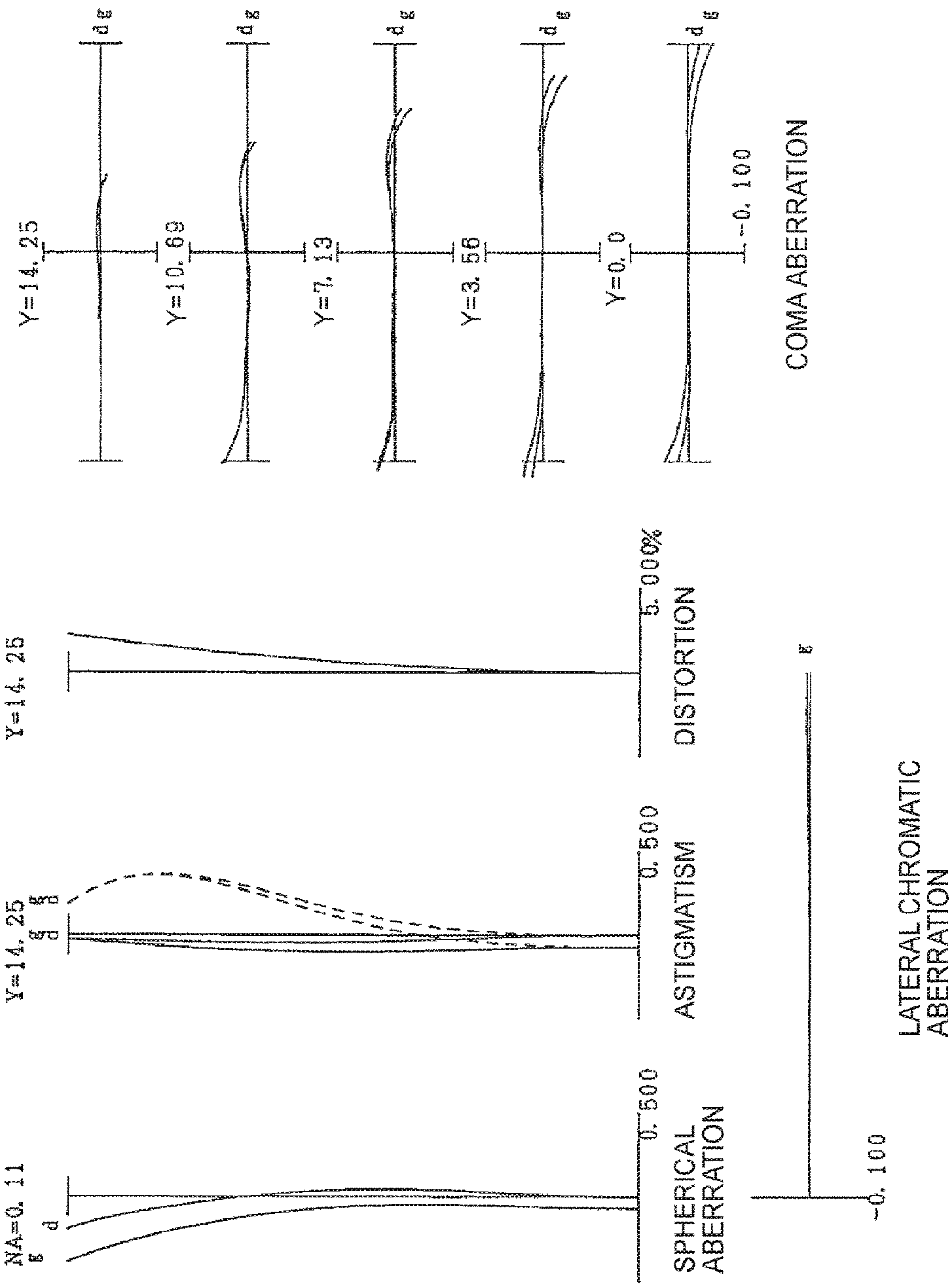

FIGS. 142A, 142B, and 142C are graphs showing various aberrations of the zoom optical system according to Example 31 upon focusing on a short distant object respectively in the wide angle end state, the intermediate focal length state, and the telephoto end state.

Figure 143A:
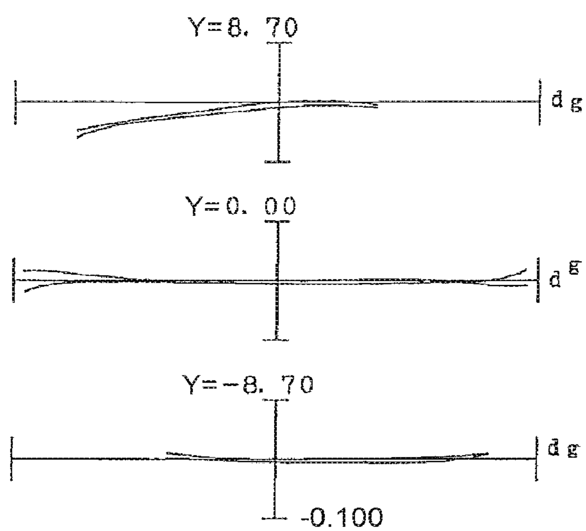
Figure 143B:
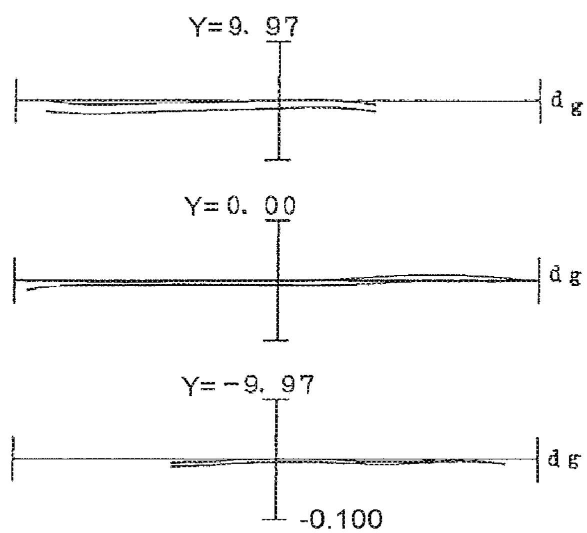
Figure 143C:
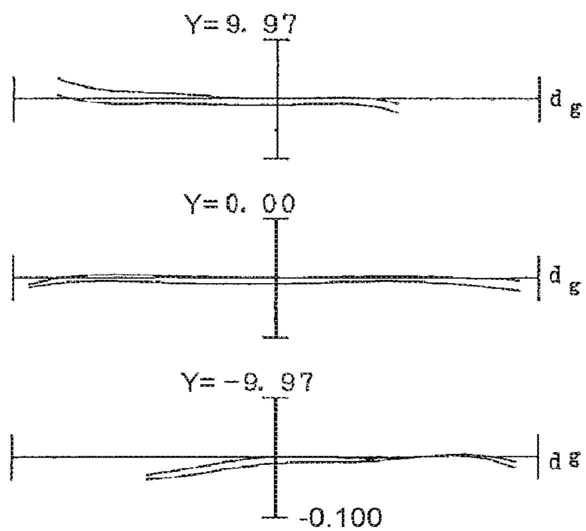

FIGS. 143A, 143B, and 143C are graphs showing coma aberrations of the zoom optical system according to Example 31 upon focusing on infinity with image blur correction performed, respectively in the wide angle end state, the intermediate focal length state, and the telephoto end state.

Figure 144:
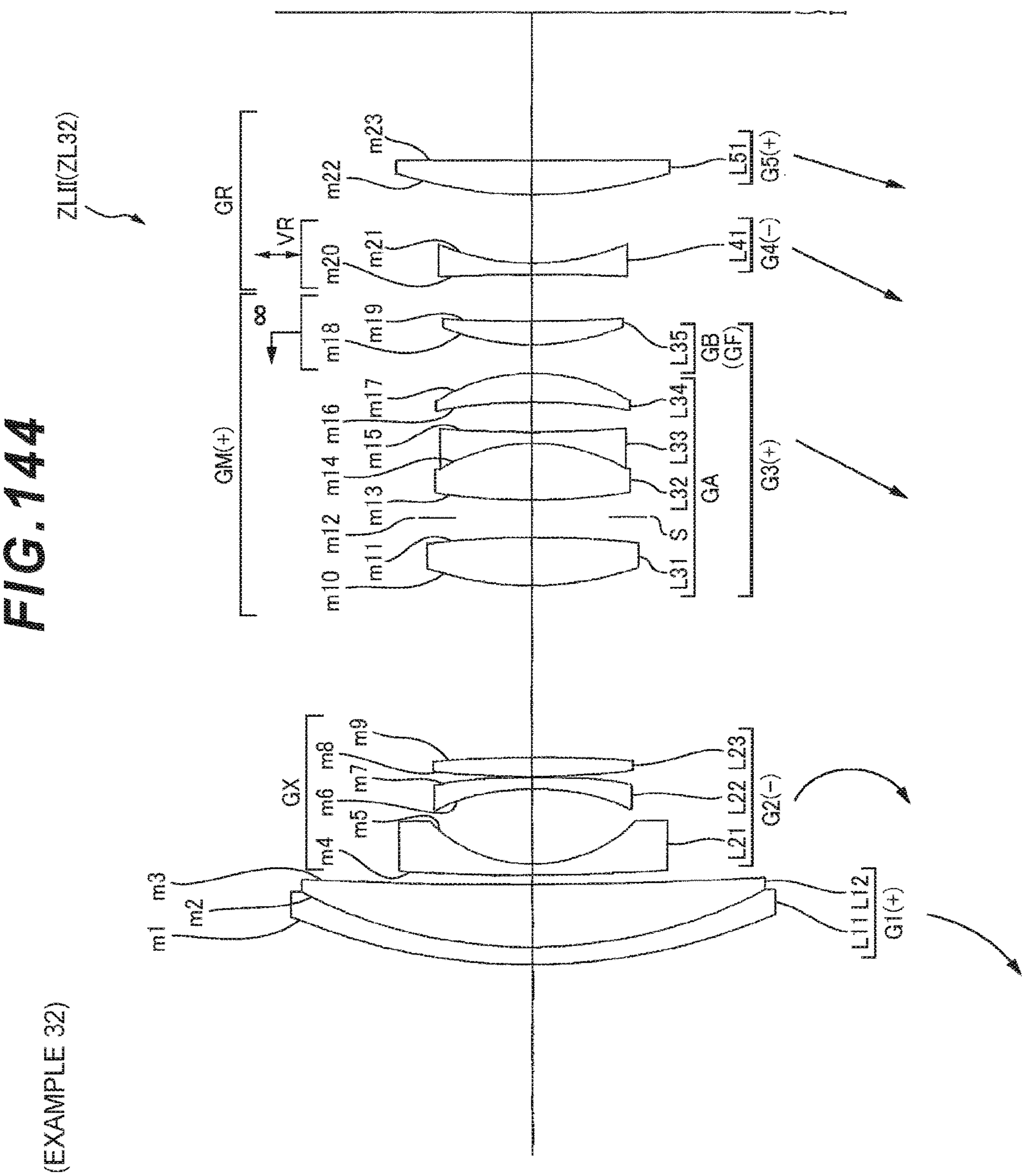

FIG. 144 is a cross-sectional view of a zoom optical system according to Example 32.

Figure 145A:
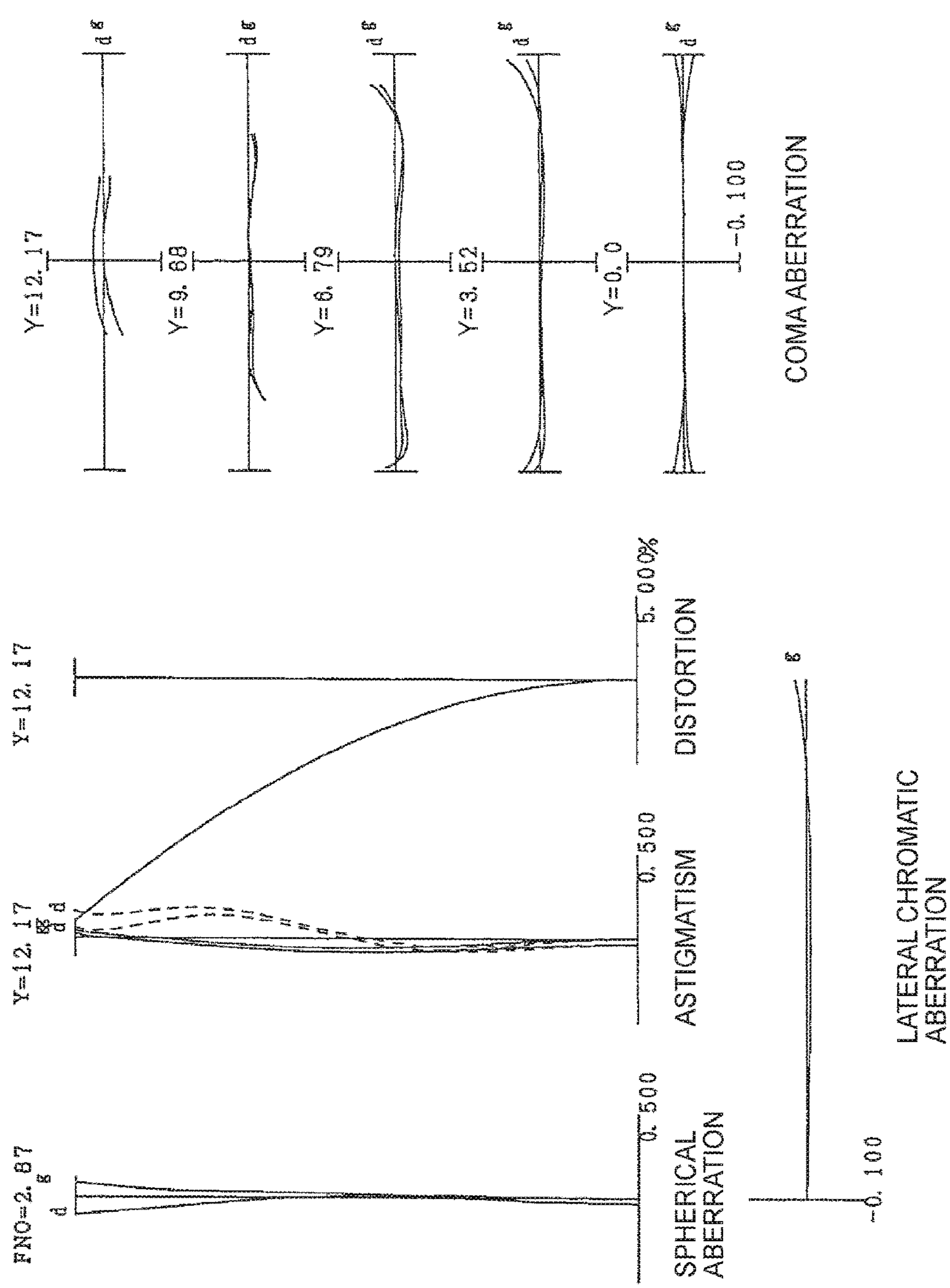
Figure 145B:
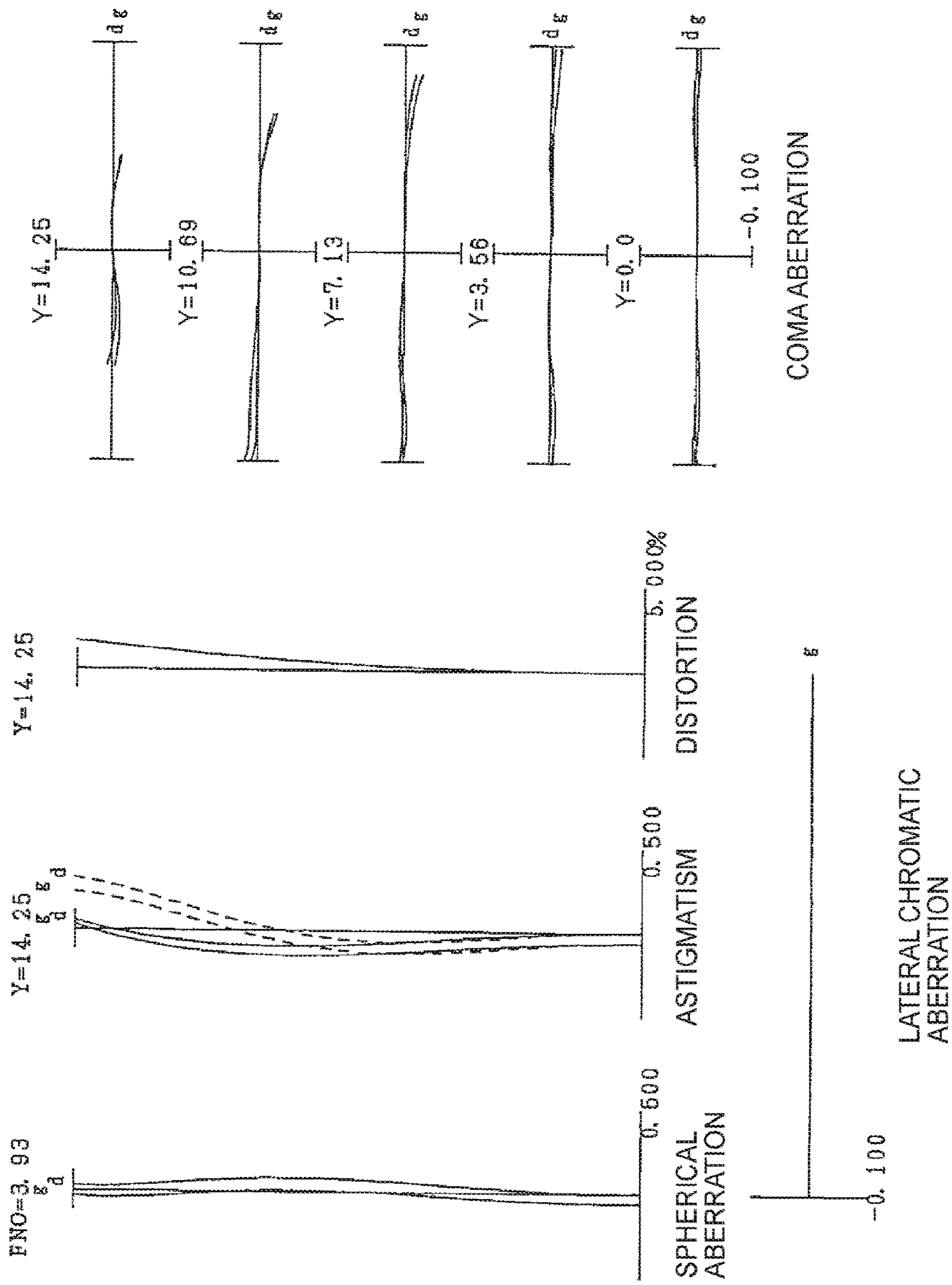
Figure 145C:
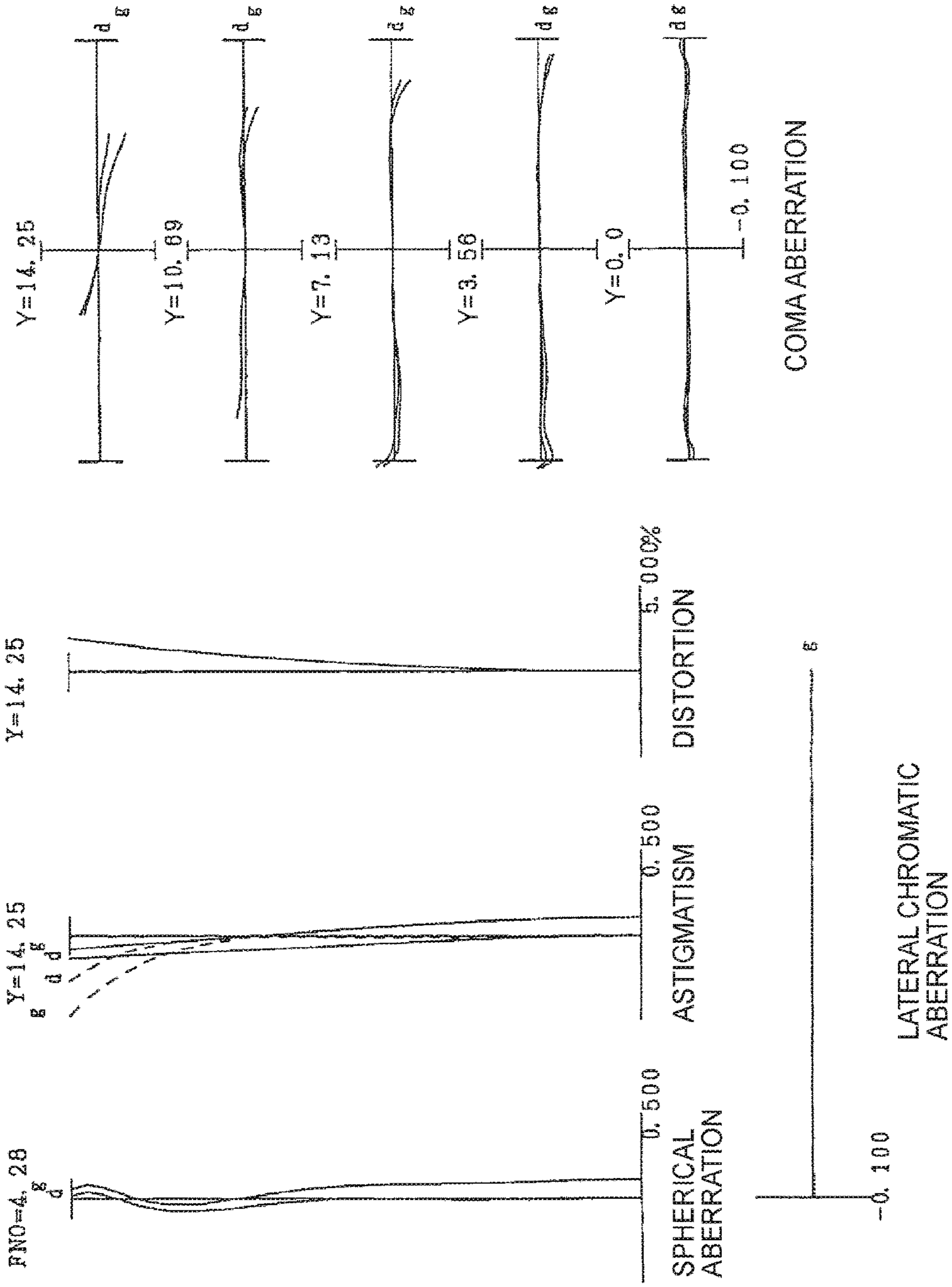

FIGS. 145A, 145B, and 145C are graphs showing various aberrations of the zoom optical system according to Example 32 upon focusing on infinity respectively in the wide angle end state, the intermediate focal length state, and the telephoto end state.

Figure 146A:
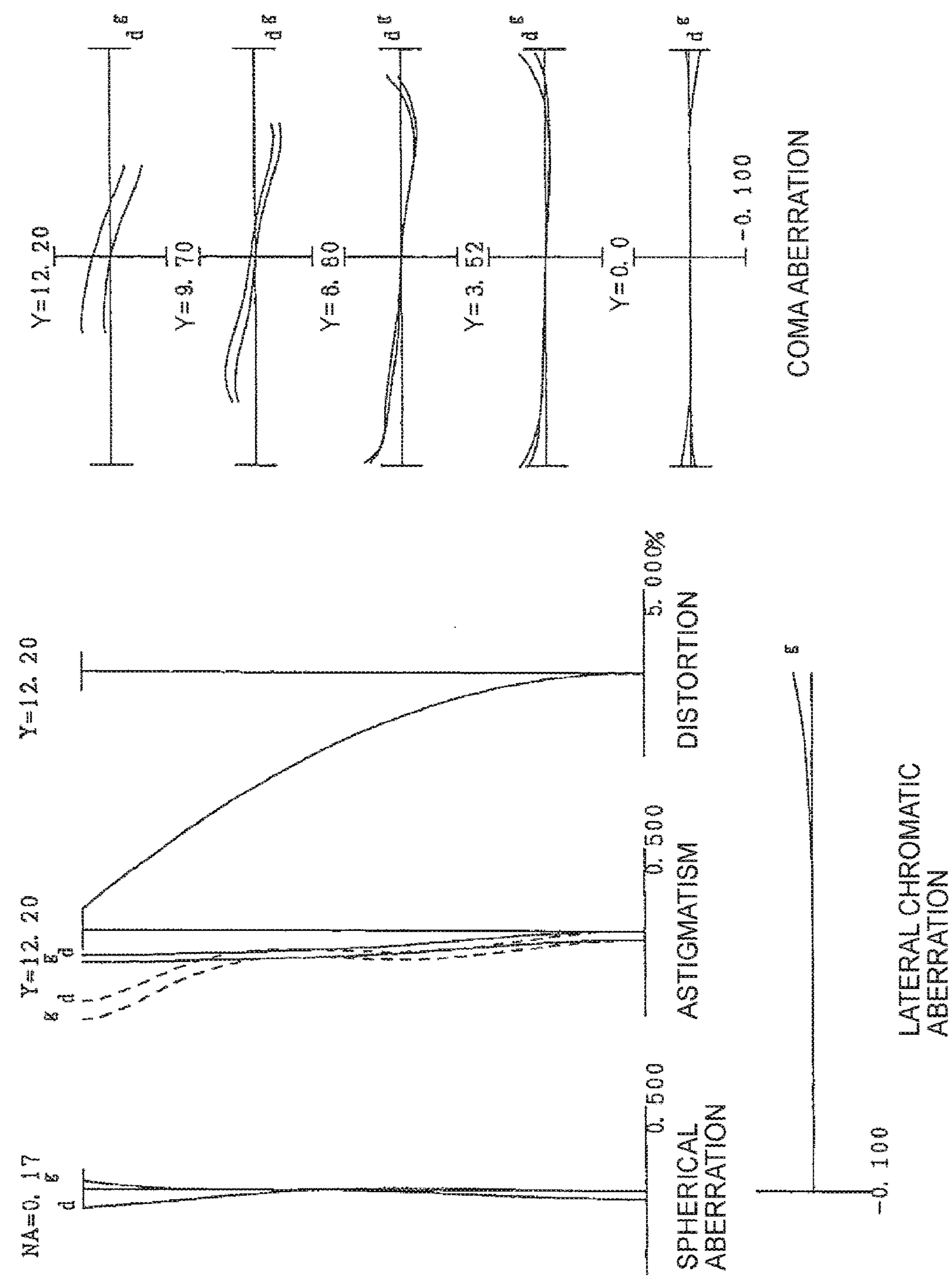
Figure 146B:
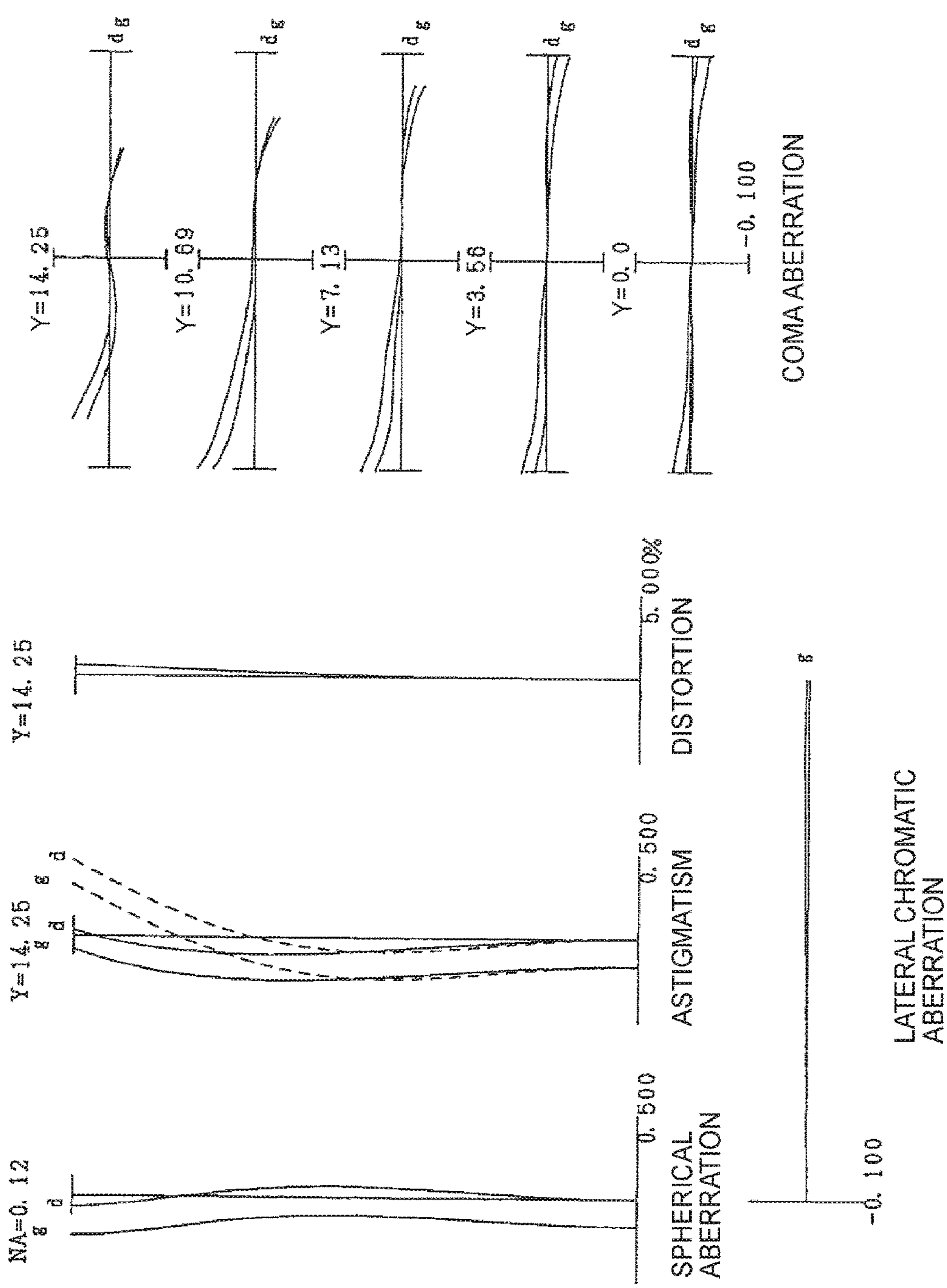
Figure 146C:
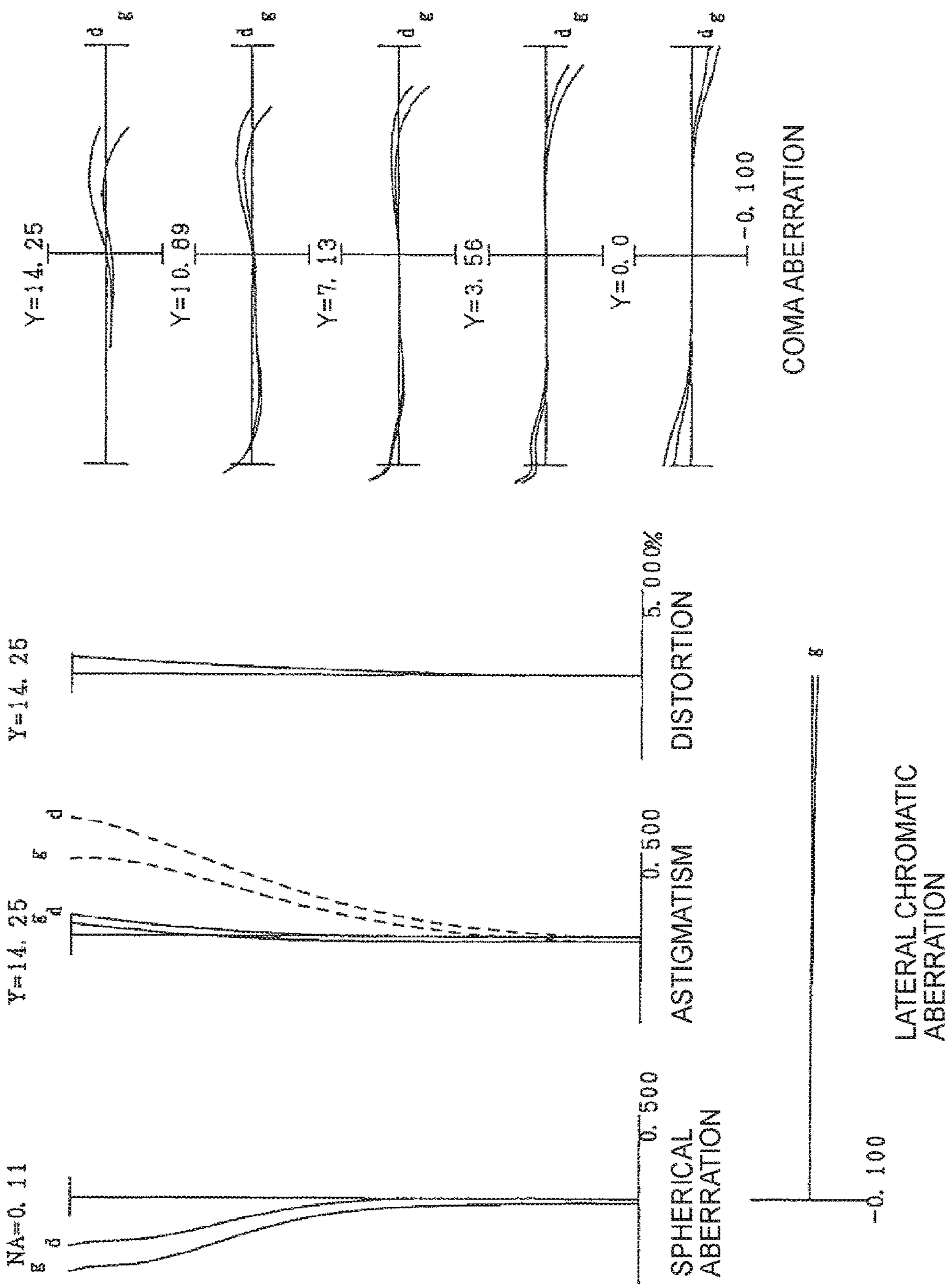

FIGS. 146A, 146B, and 146C are graphs showing various aberrations of the zoom optical system according to Example 32 upon focusing on a short distant object respectively in the wide angle end state, the intermediate focal length state, and the telephoto end state.

Figure 147A:
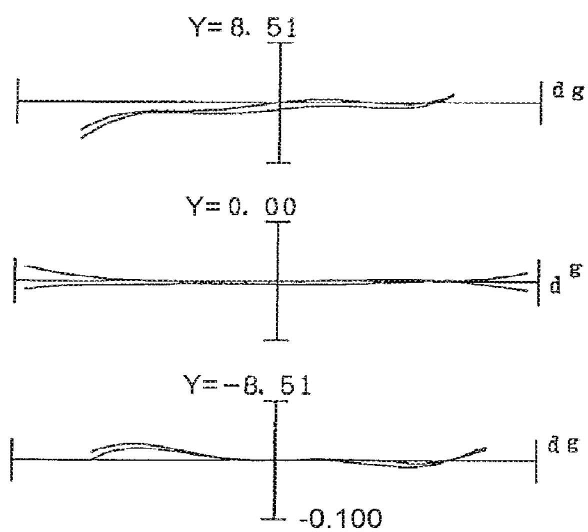
Figure 147B:
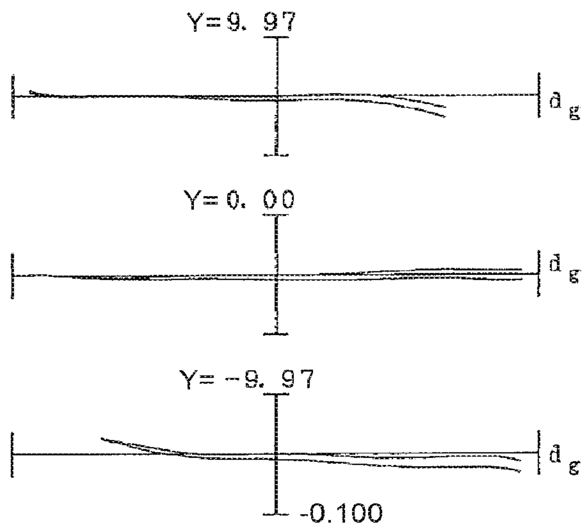
Figure 147C:
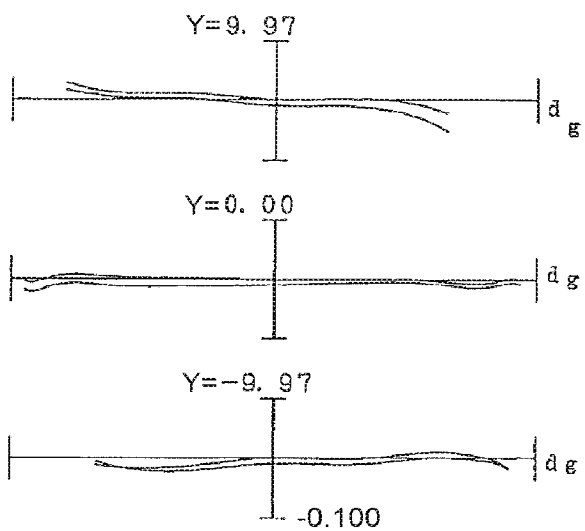

FIGS. 147A, 147B, and 147C are graphs showing coma aberrations of the zoom optical system according to Example 32 upon focusing on infinity with image blur correction performed, respectively in the wide angle end state, the intermediate focal length state, and the telephoto end state.

Figure 148:
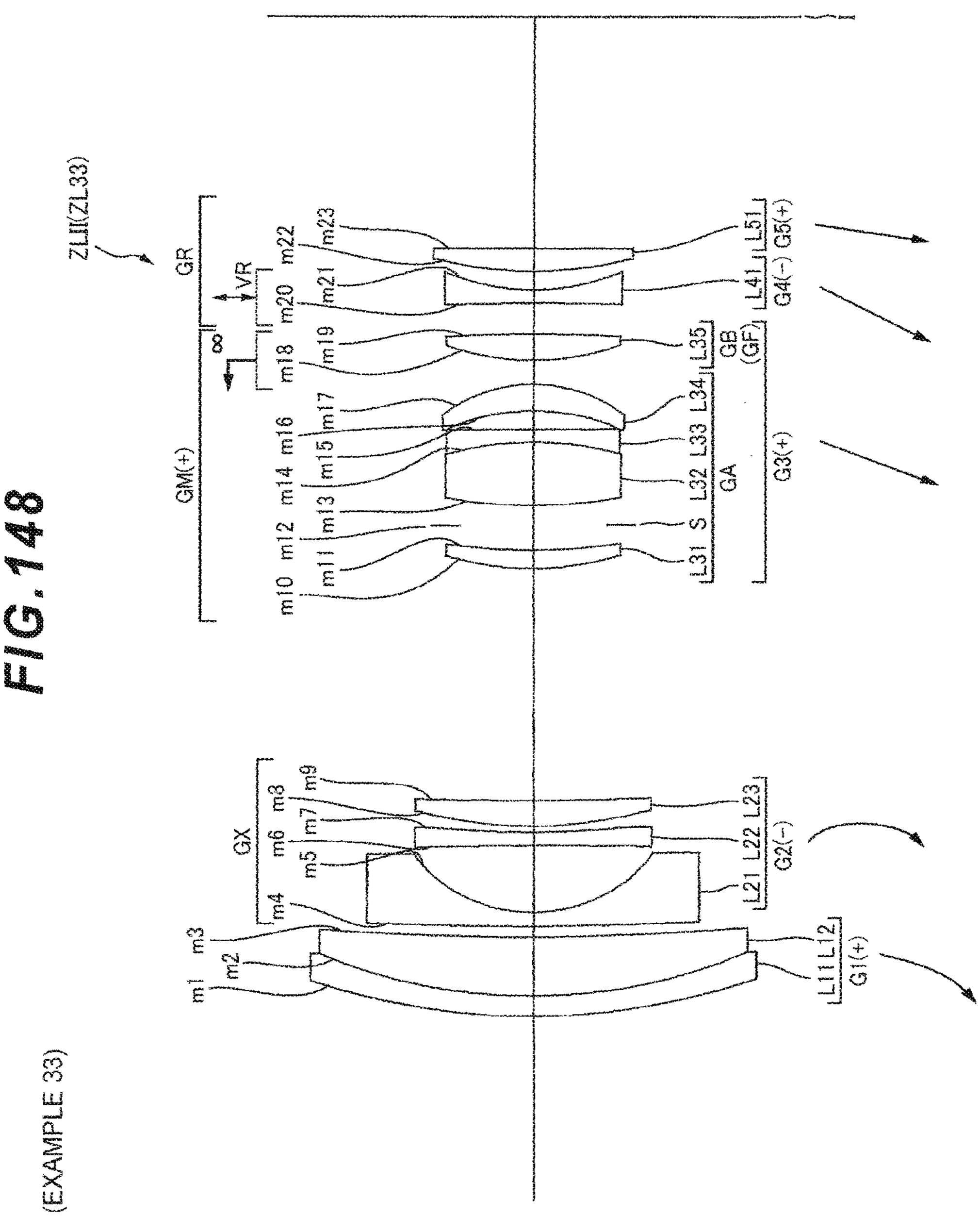

FIG. 148 is a cross-sectional view of a zoom optical system according to Example 33.

Figure 149A:
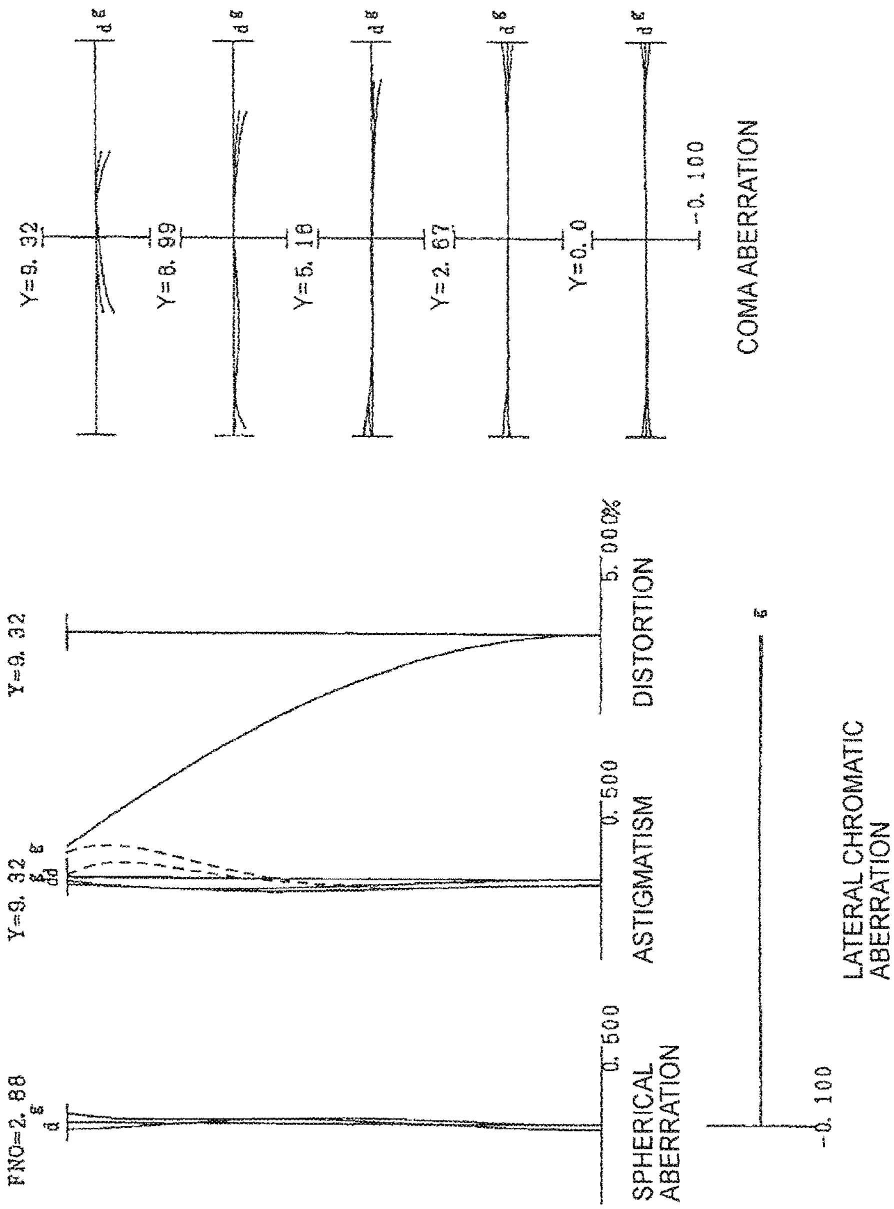
Figure 149B:
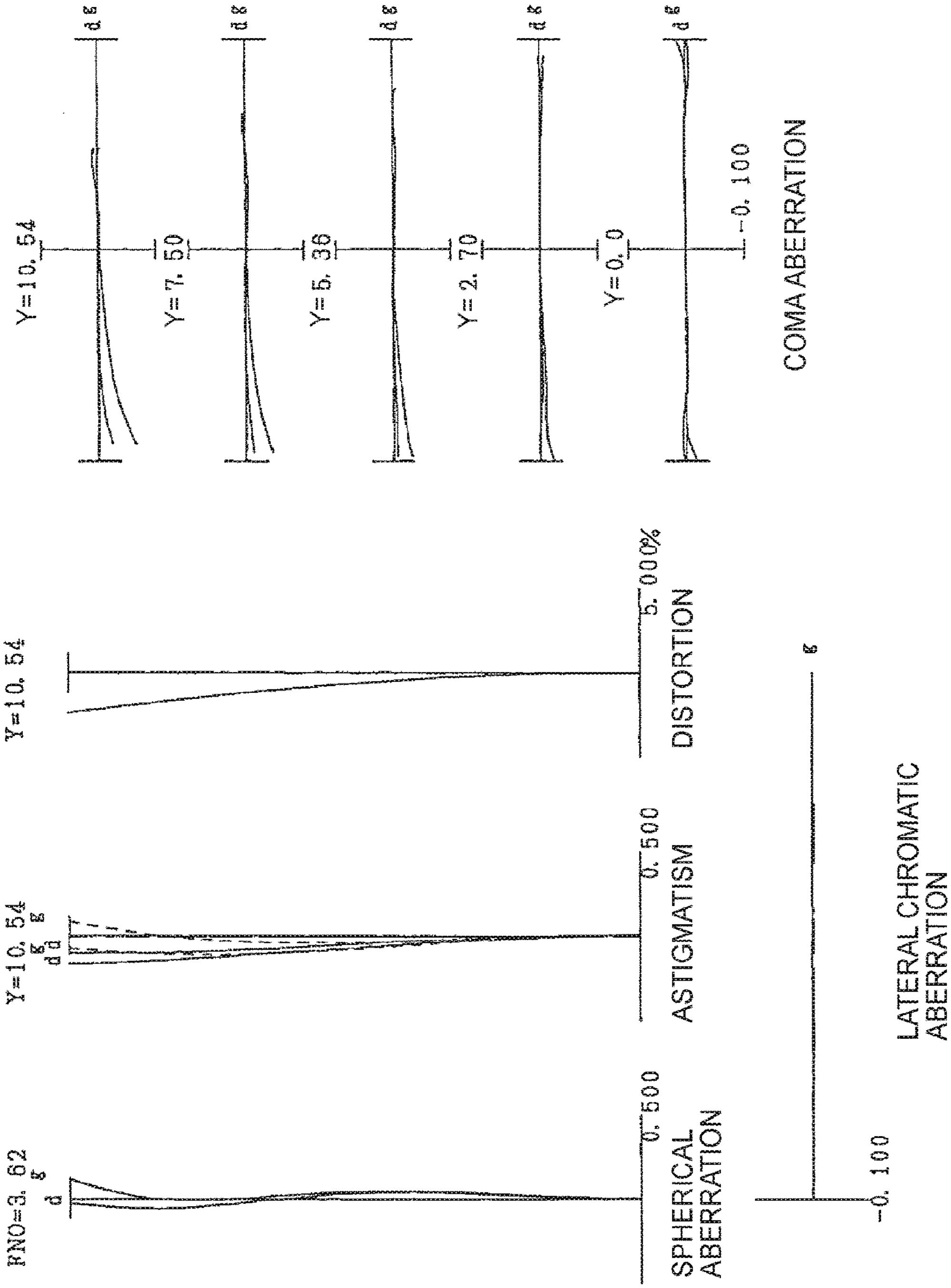
Figure 149C:
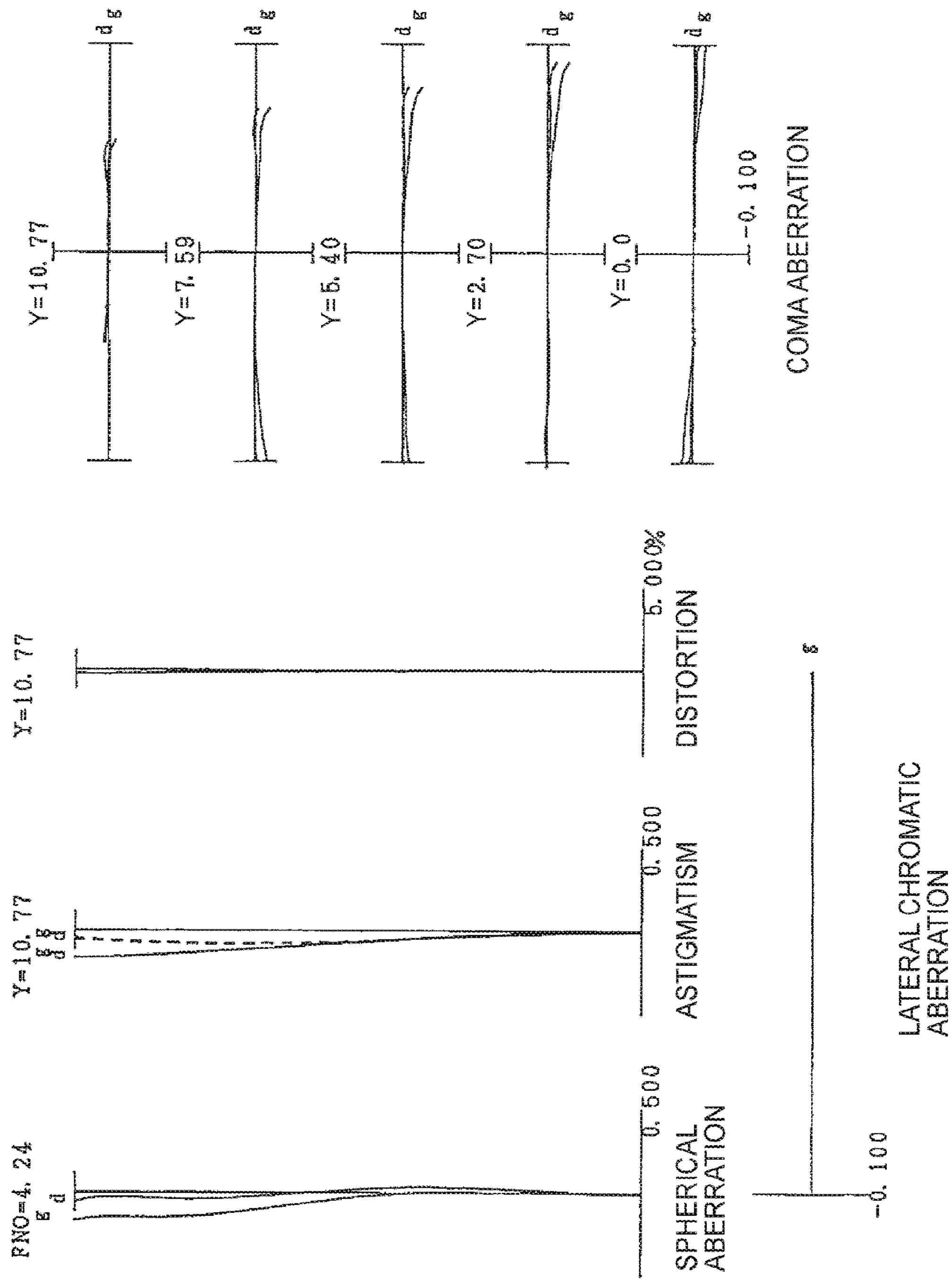

FIGS. 149A, 149B, and 149C are graphs showing various aberrations of the zoom optical system according to Example 33 upon focusing on infinity respectively in the wide angle end state, the intermediate focal length state, and the telephoto end state.

Figure 150A:
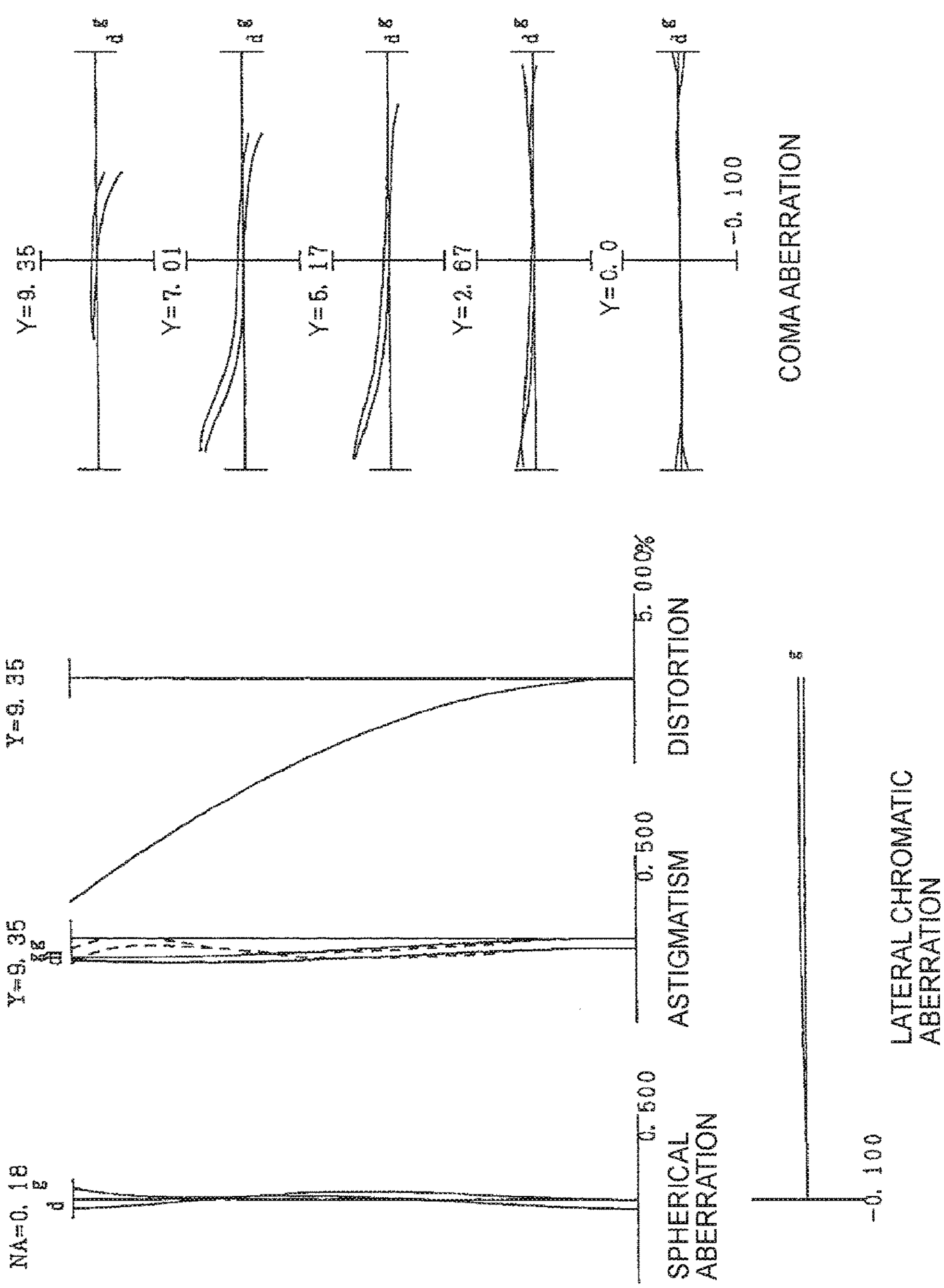
Figure 150B:
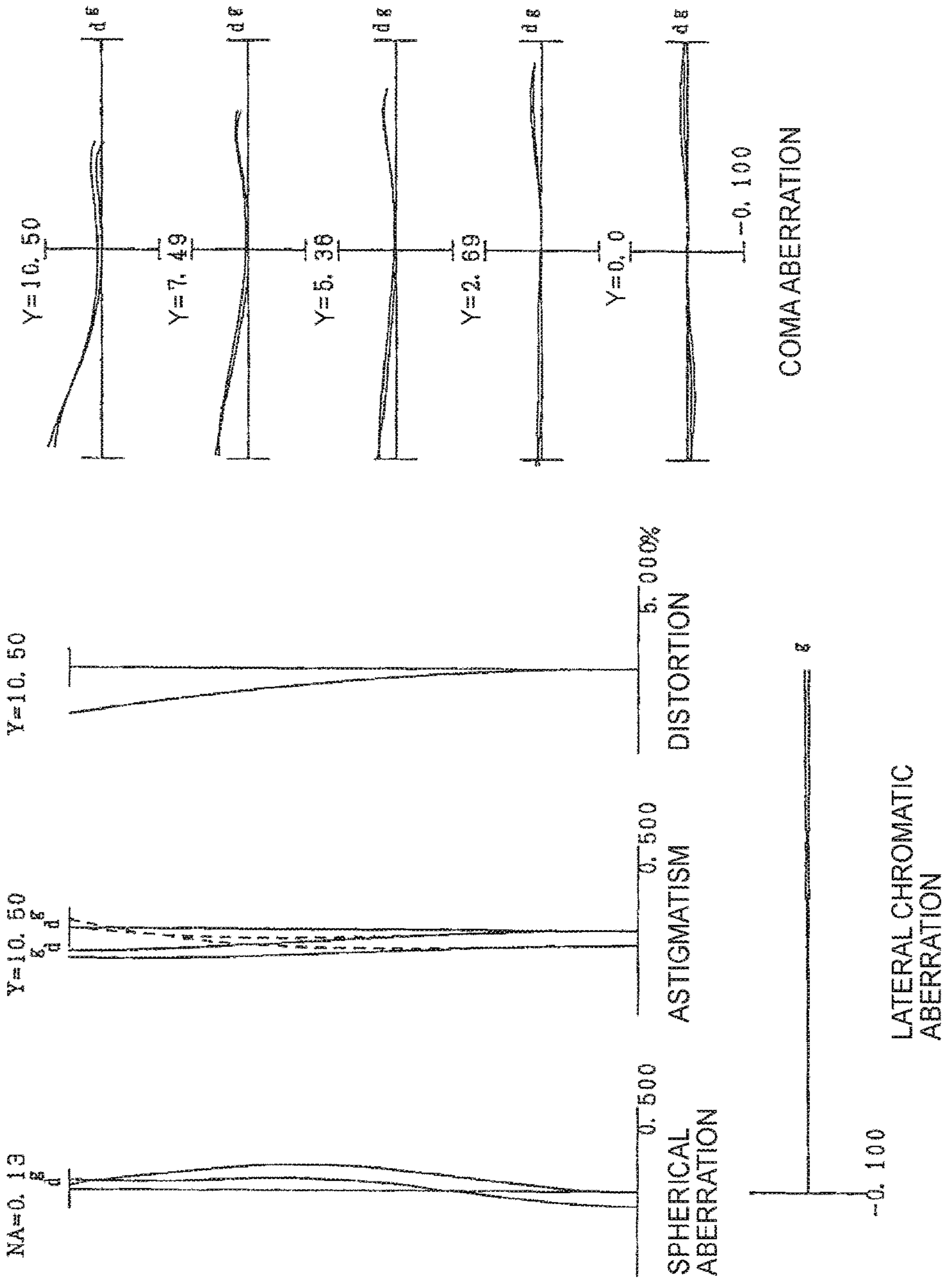
Figure 150C:
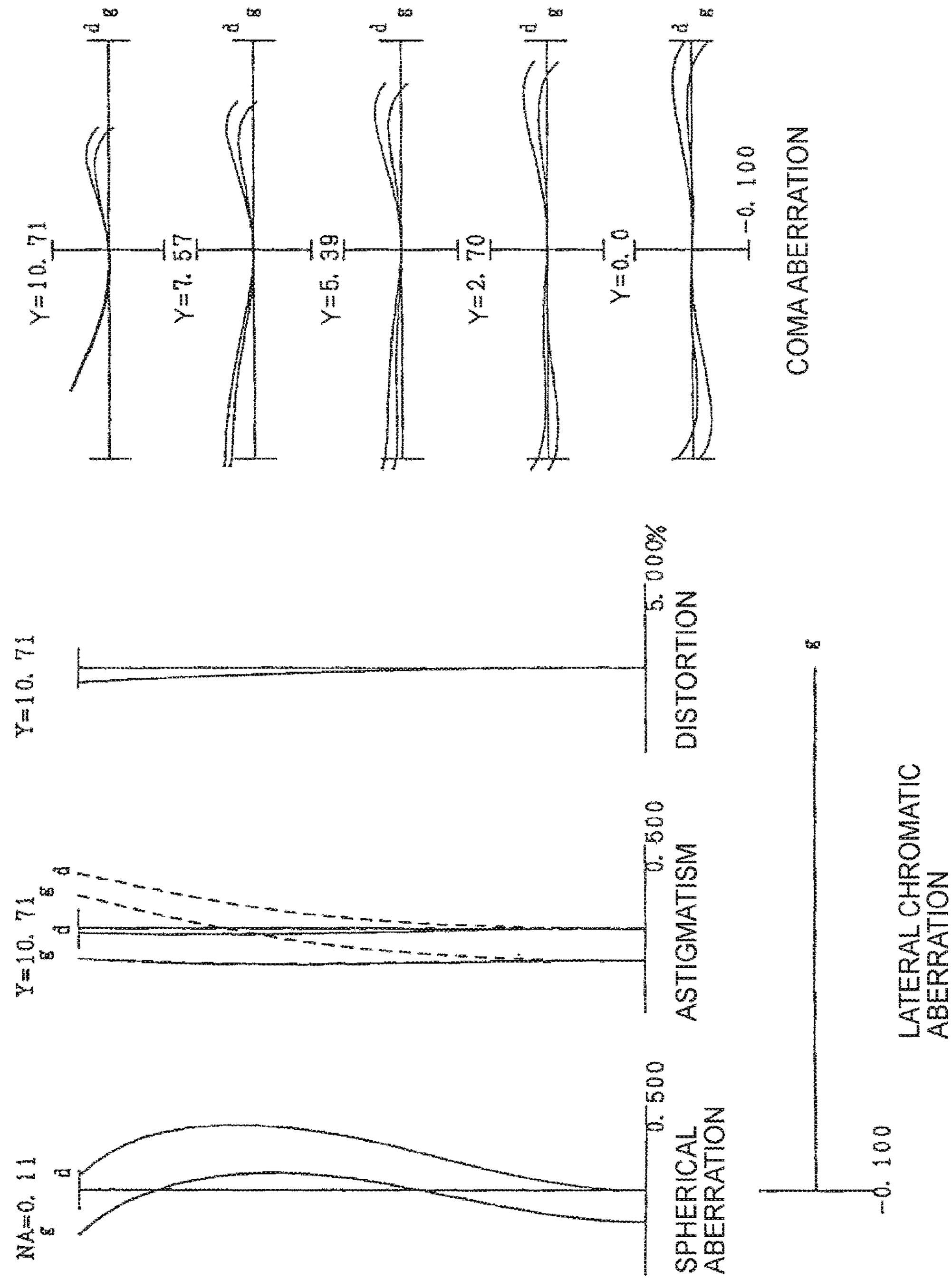

FIGS. 150A, 150B, and 150C are graphs showing various aberrations of the zoom optical system according to Example 33 upon focusing on a short distant object respectively in the wide angle end state, the intermediate focal length state, and the telephoto end state.

Figure 151A:
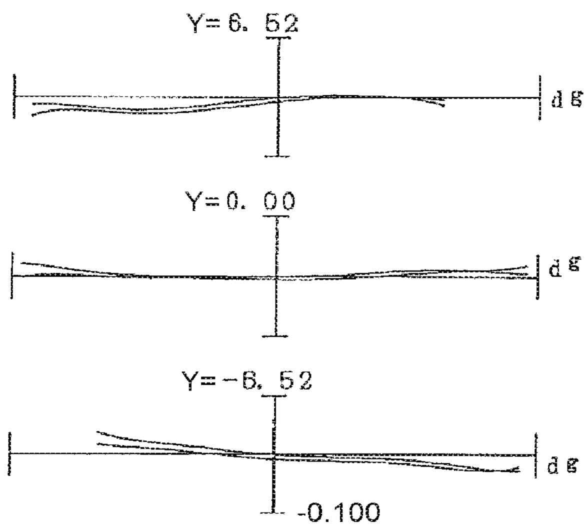
Figure 151B:
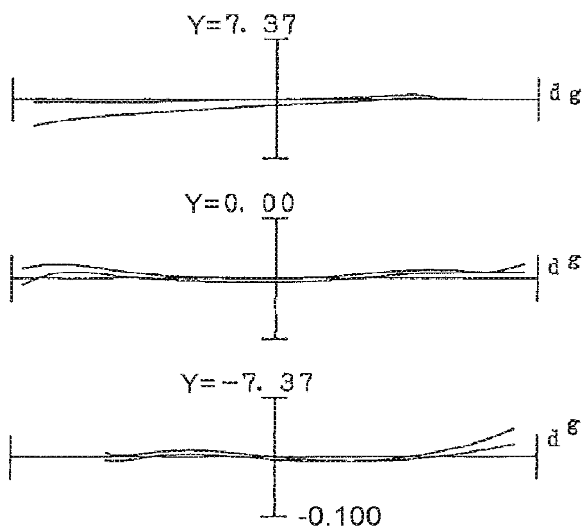
Figure 151C:
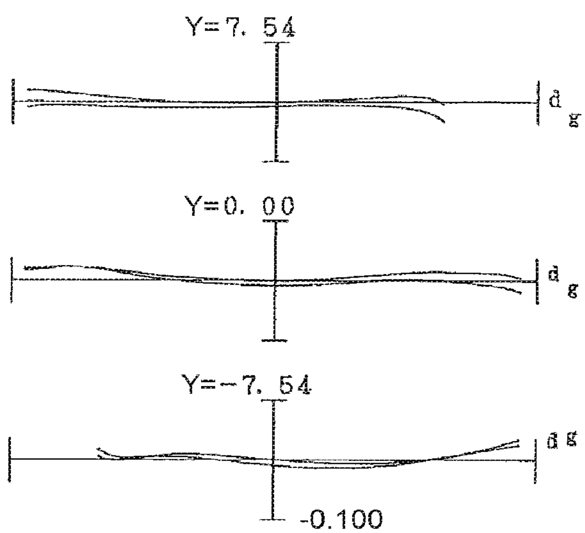

FIGS. 151A, 151B, and 151C are graphs showing coma aberrations of the zoom optical system according to Example 33 upon focusing on infinity with image blur correction performed, respectively in the wide angle end state, the intermediate focal length state, and the telephoto end state.

Figure 152:
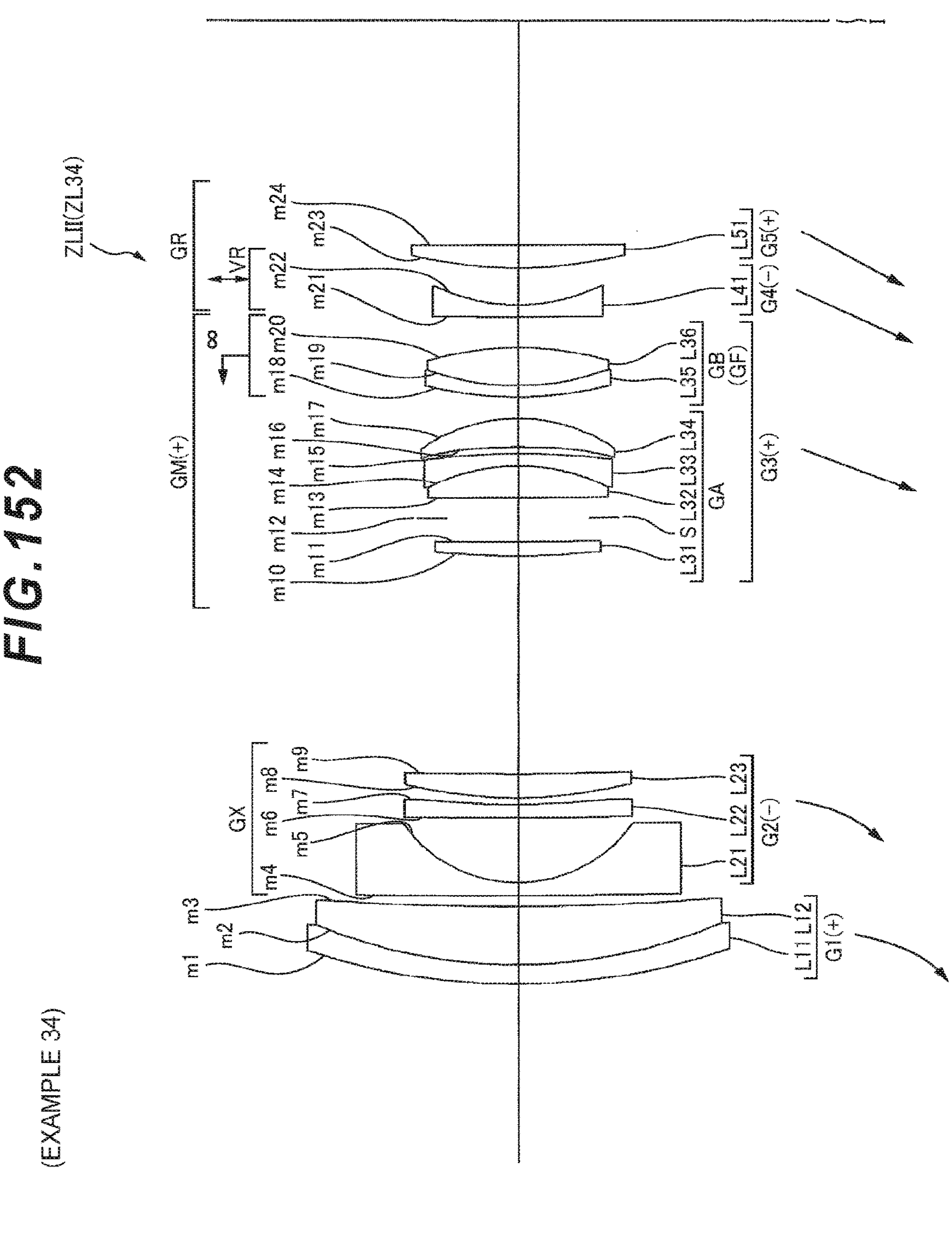

FIG. 152 is a cross-sectional view of a zoom optical system according to Example 34.

Figure 153A:
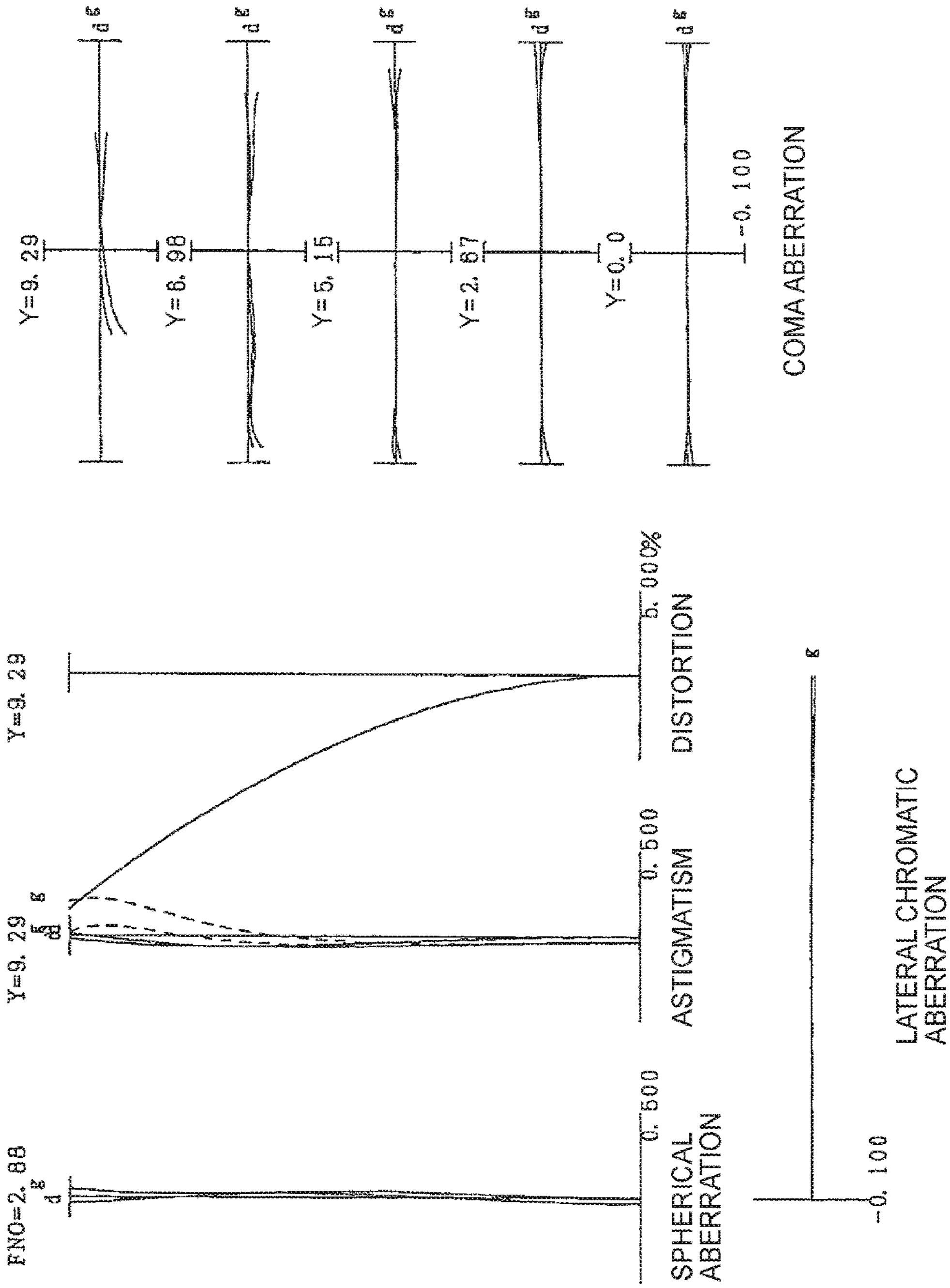
Figure 153B:
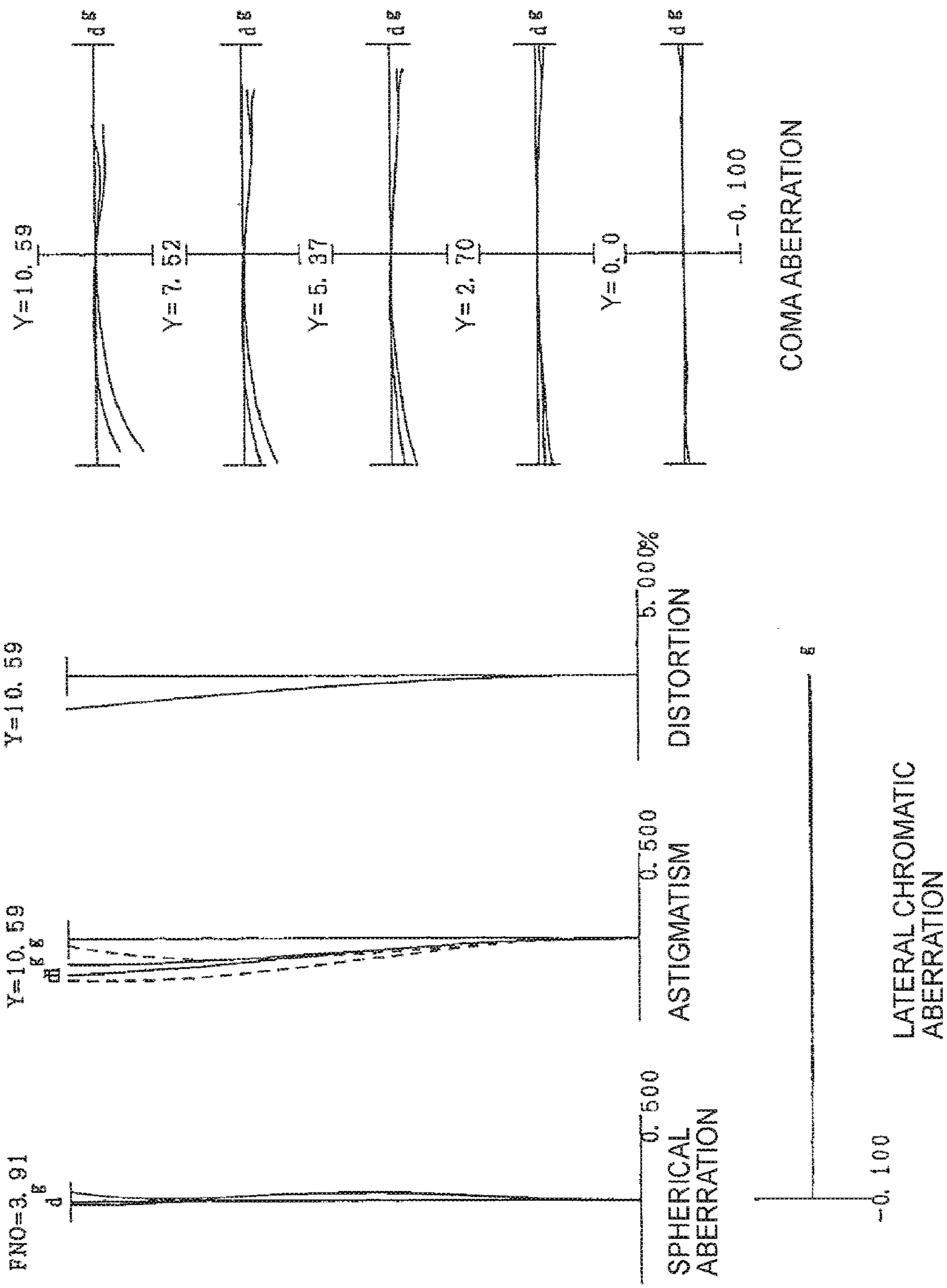
Figure 153C:
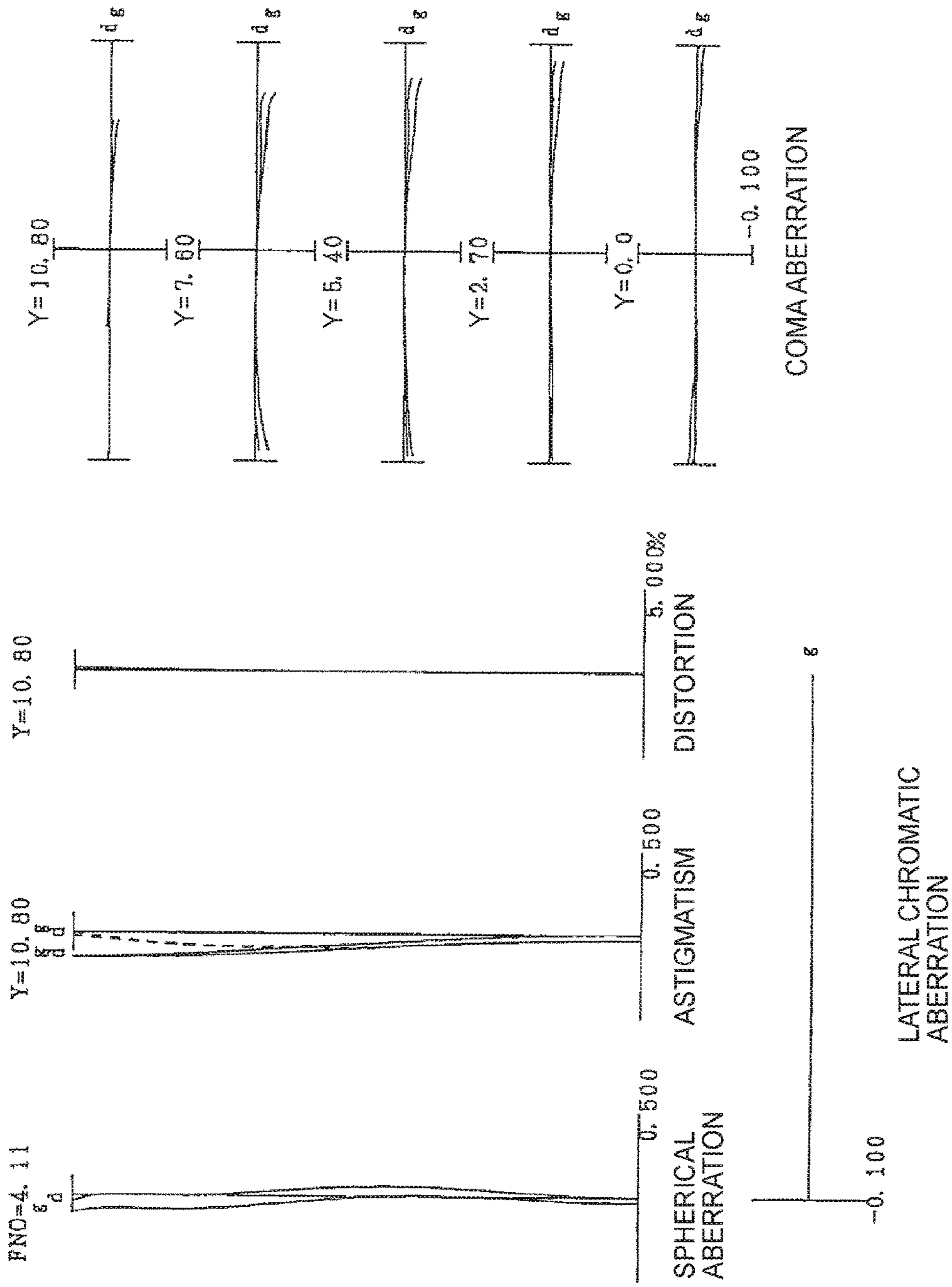

FIGS. 153A, 153B, and 153C are graphs showing various aberrations of the zoom optical system according to Example 34 upon focusing on infinity respectively in the wide angle end state, the intermediate focal length state, and the telephoto end state.

Figure 154A:
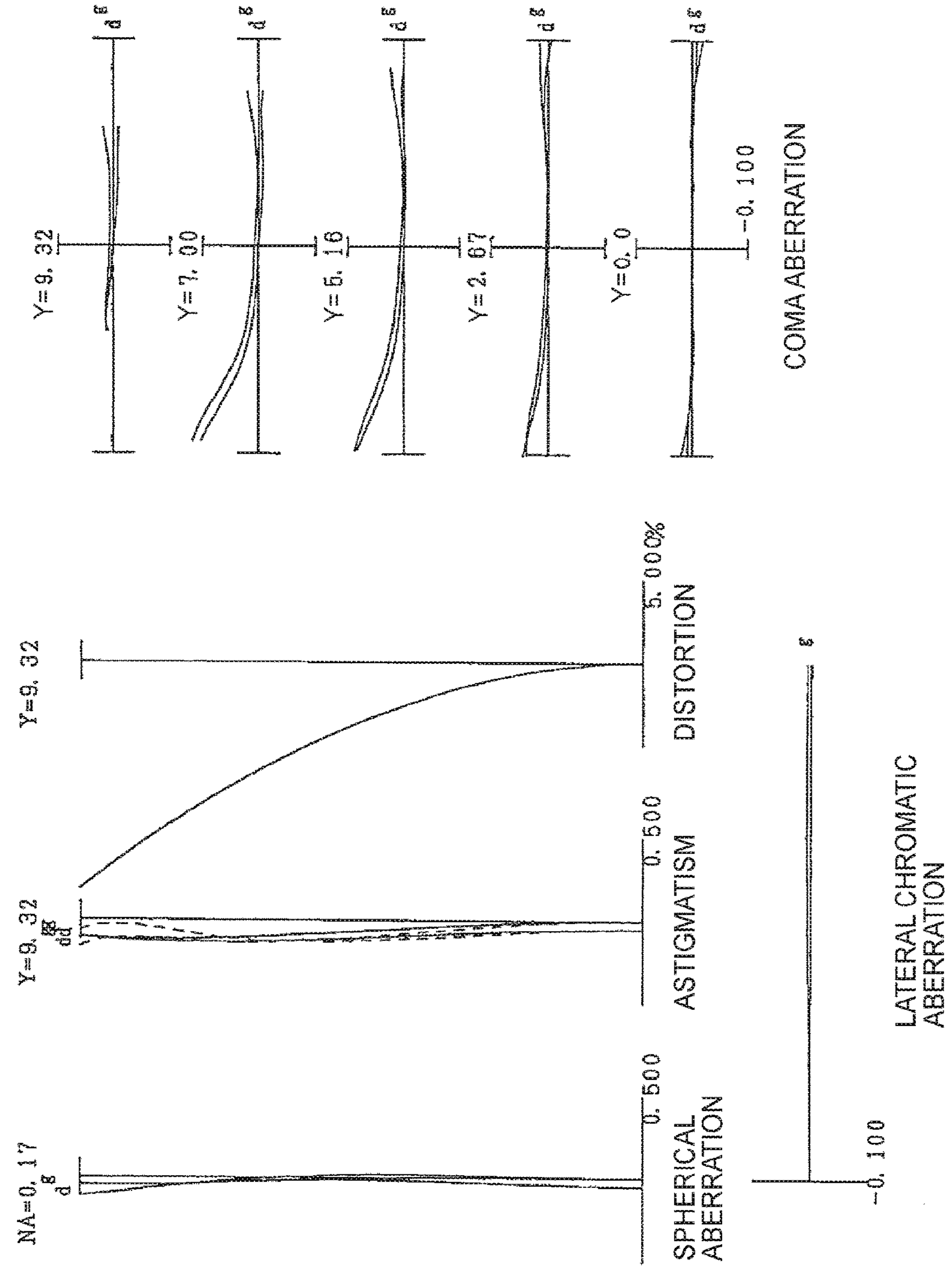
Figure 154B:
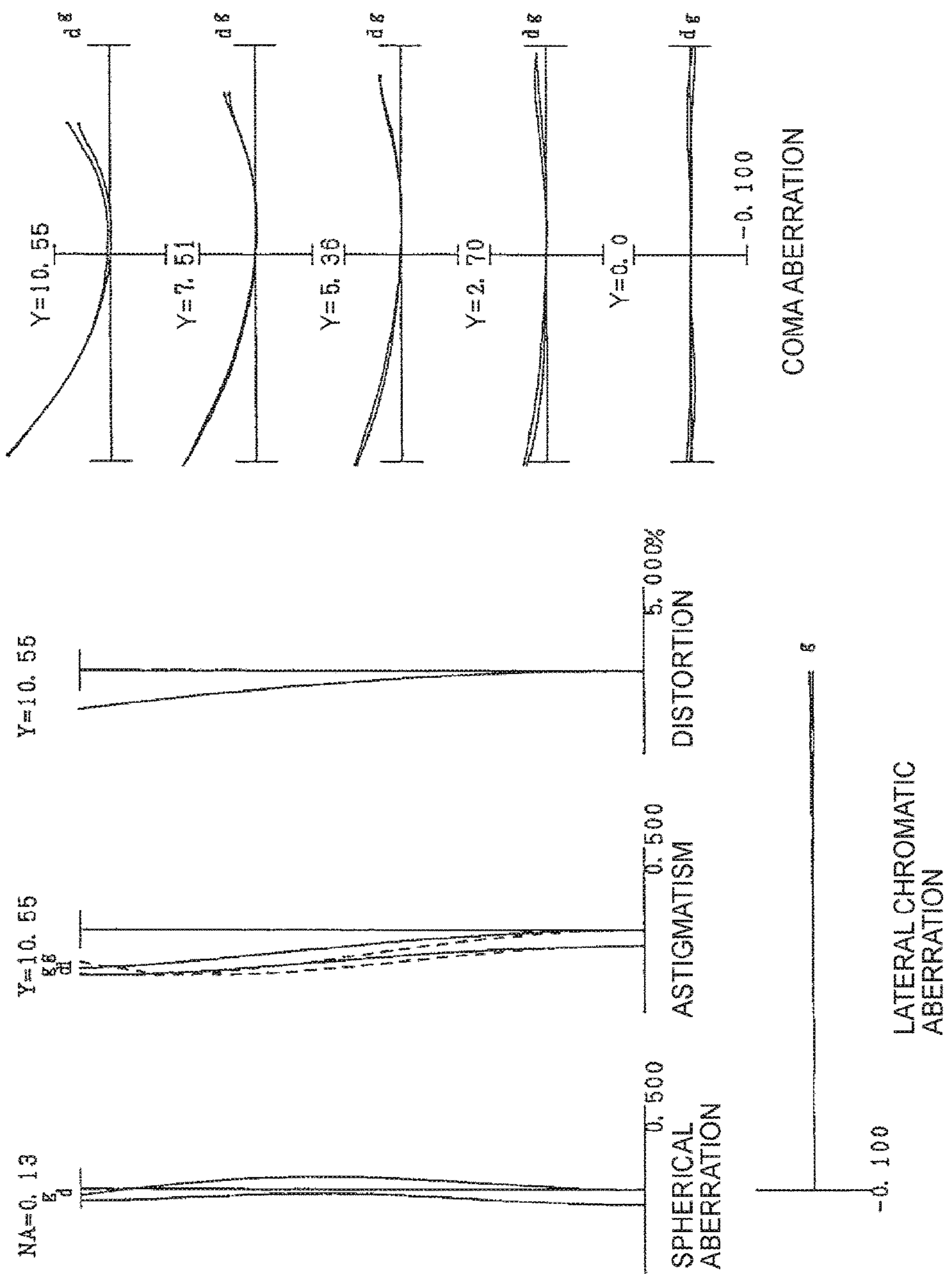
Figure 154C:
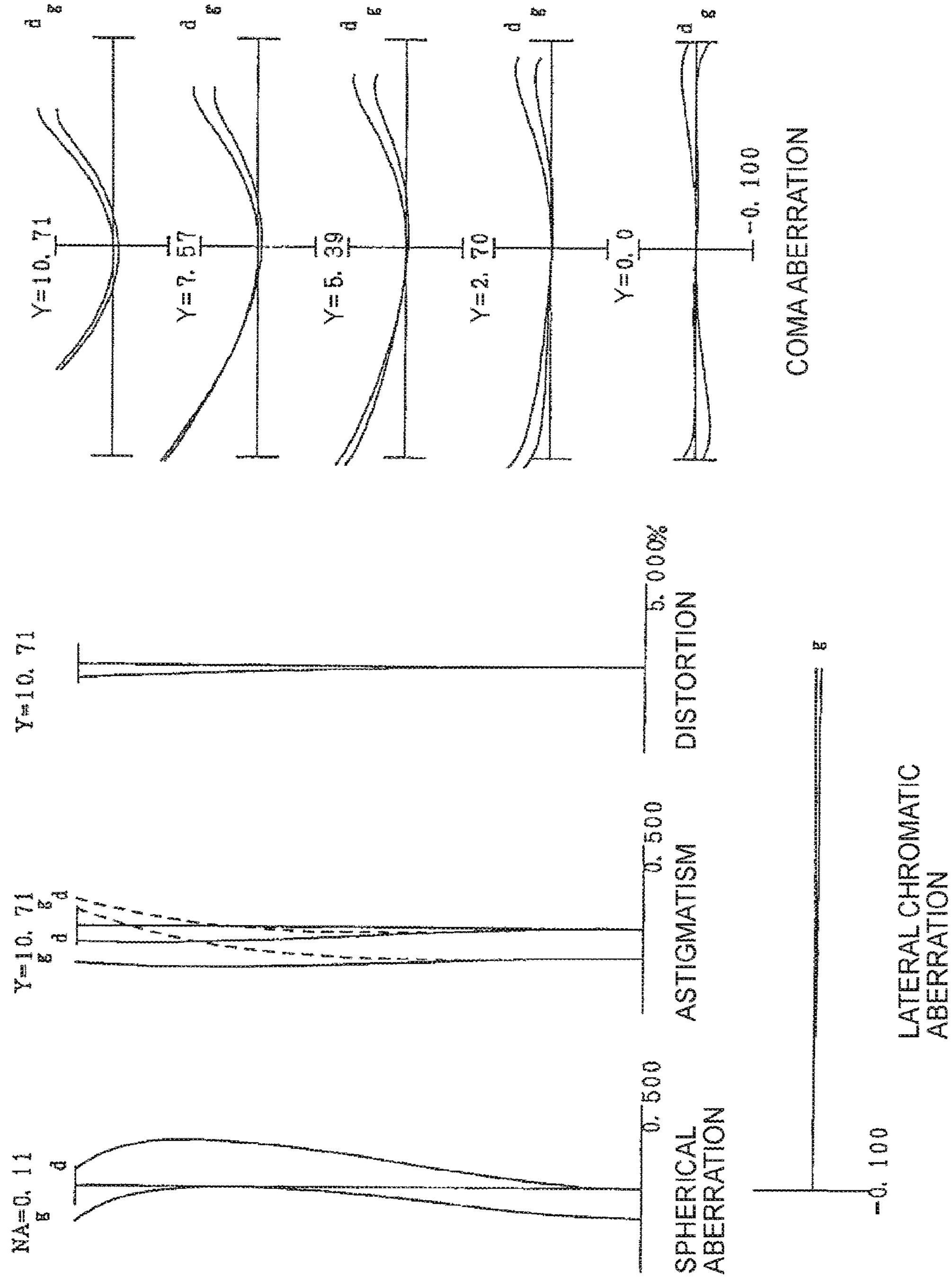

FIGS. 154A, 154B, and 154C are graphs showing various aberrations of the zoom optical system according to Example 34 upon focusing on a short distant object respectively in the wide angle end state, the intermediate focal length state, and the telephoto end state.

Figure 155A:
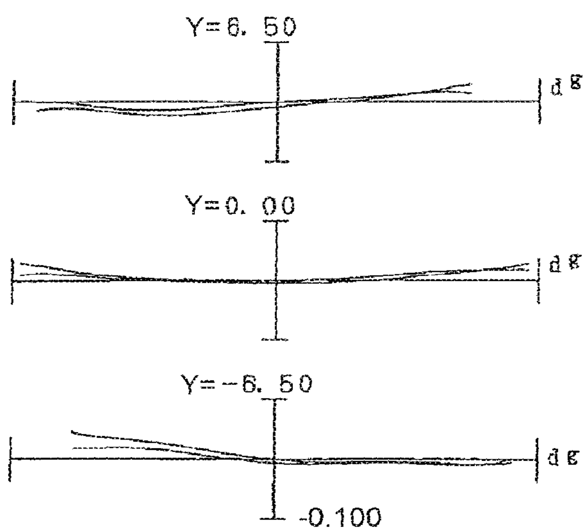
Figure 155B:
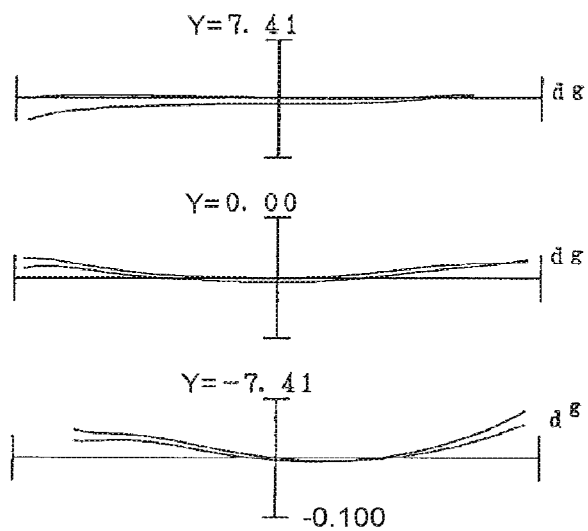
Figure 155C:
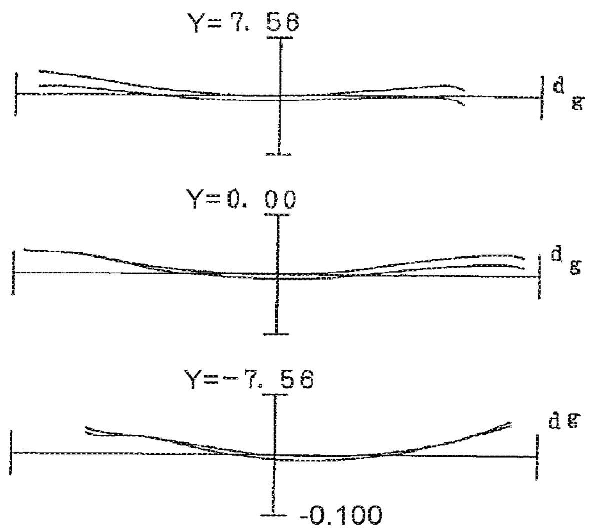

FIGS. 155A, 155B, and 155C are graphs showing coma aberrations of the zoom optical system according to Example 34 upon focusing on infinity with image blur correction performed, respectively in the wide angle end state, the intermediate focal length state, and the telephoto end state.

Figure 156:
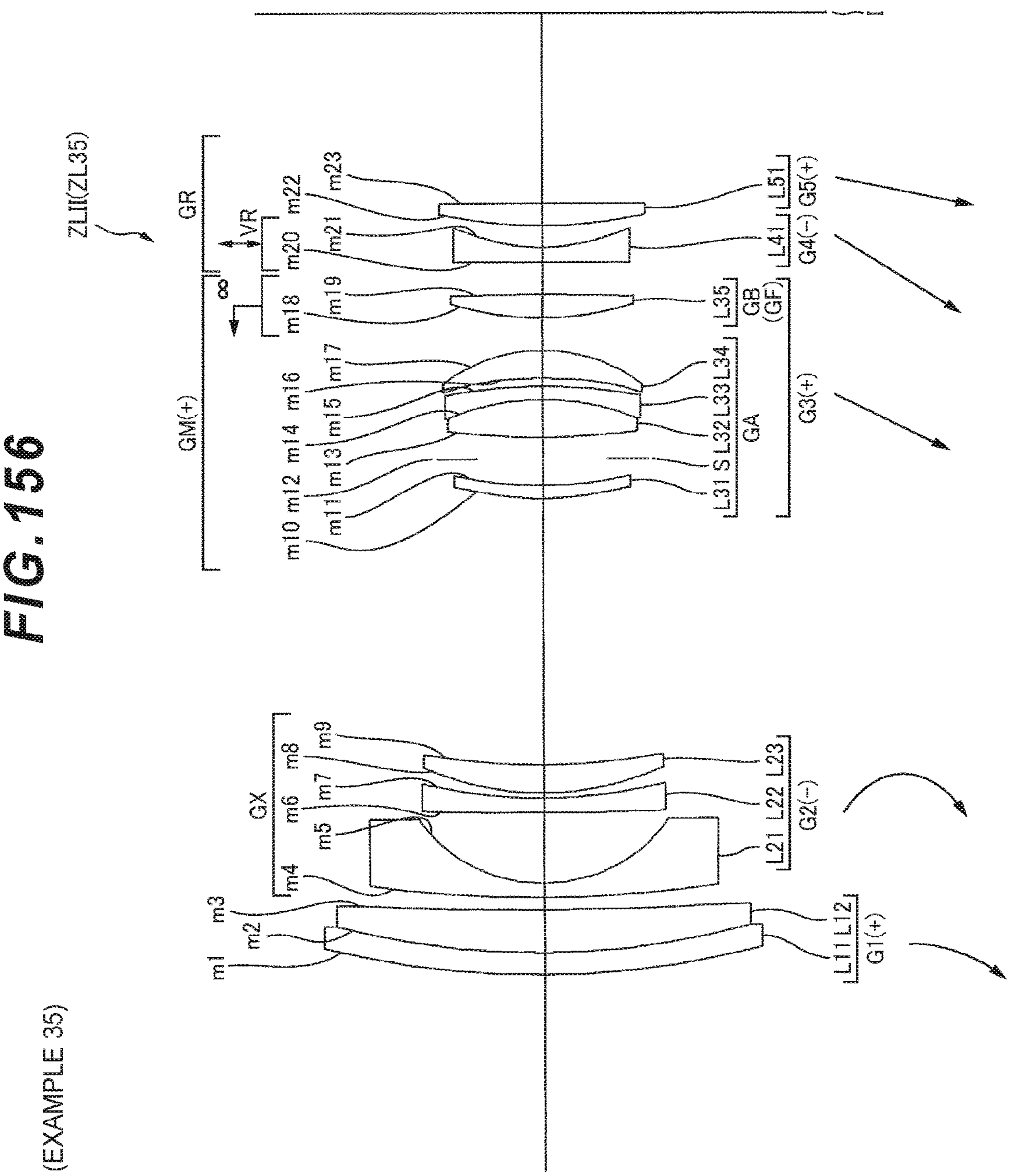

FIG. 156 is a cross-sectional view of a zoom optical system according to Example 35.

Figure 157A:
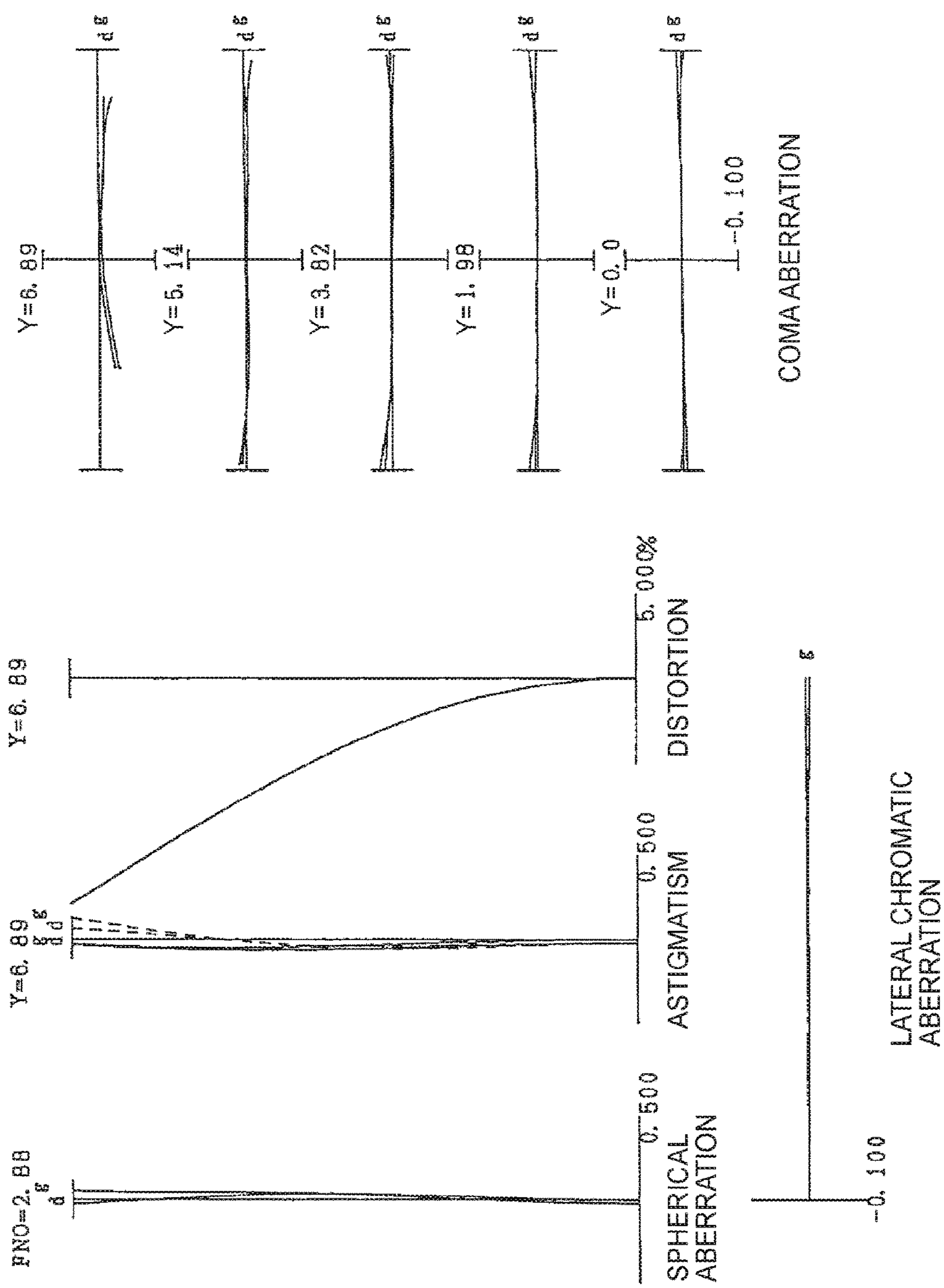
Figure 157B:
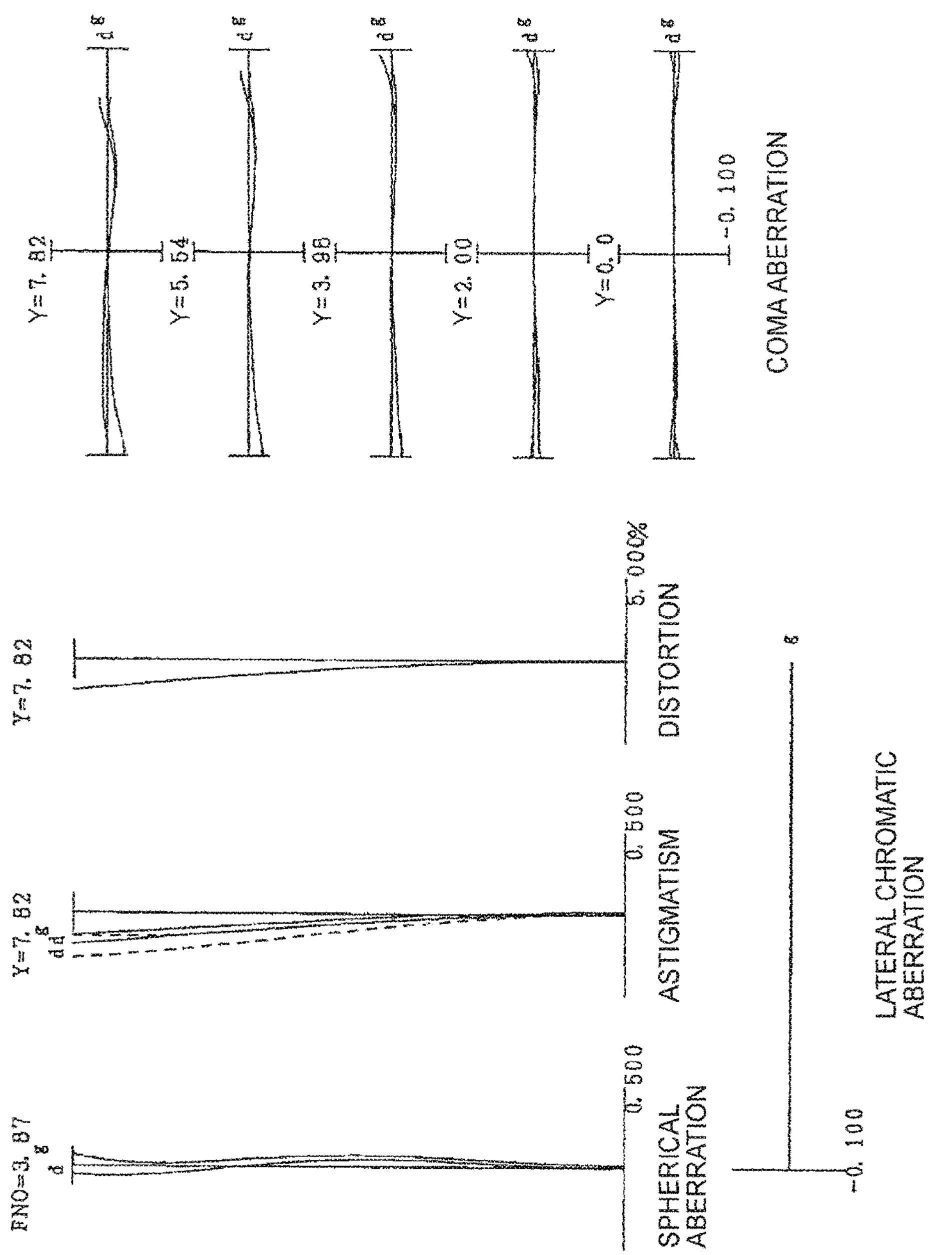
Figure 157C:
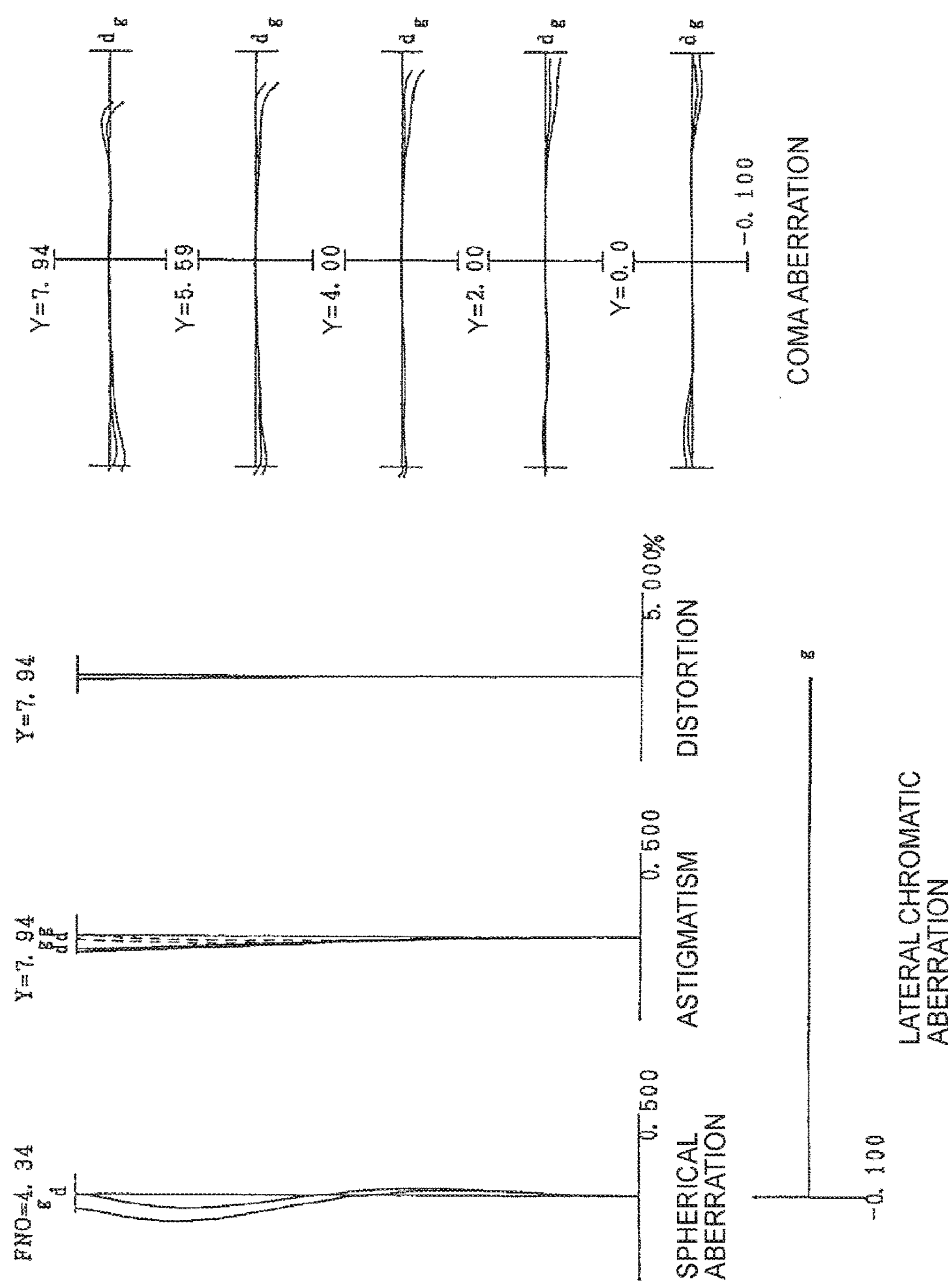

FIGS. 157A, 157B, and 157C are graphs showing various aberrations of the zoom optical system according to Example 35 upon focusing on infinity respectively in the wide angle end state, the intermediate focal length state, and the telephoto end state.

Figure 158A:
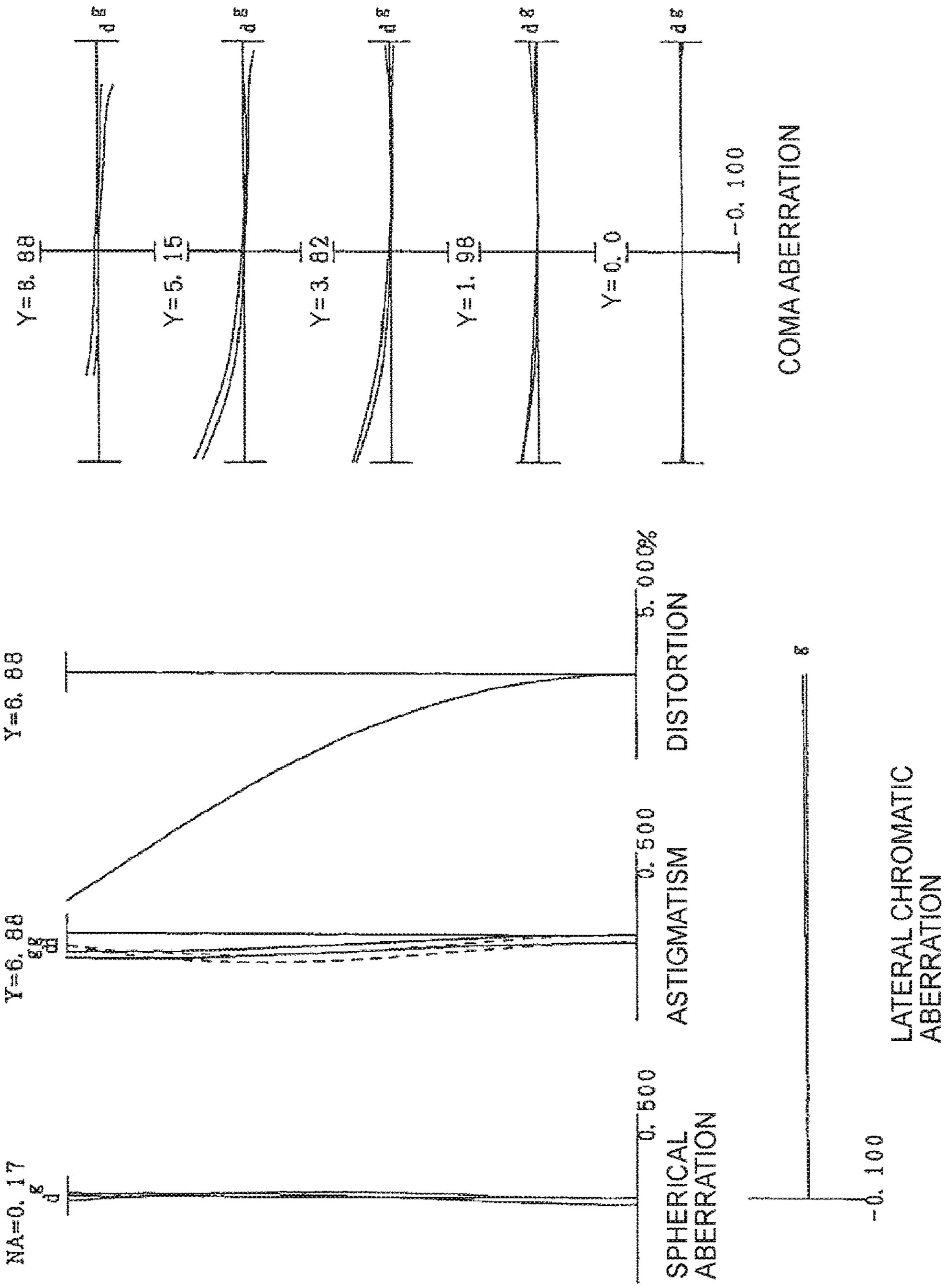
Figure 158B:
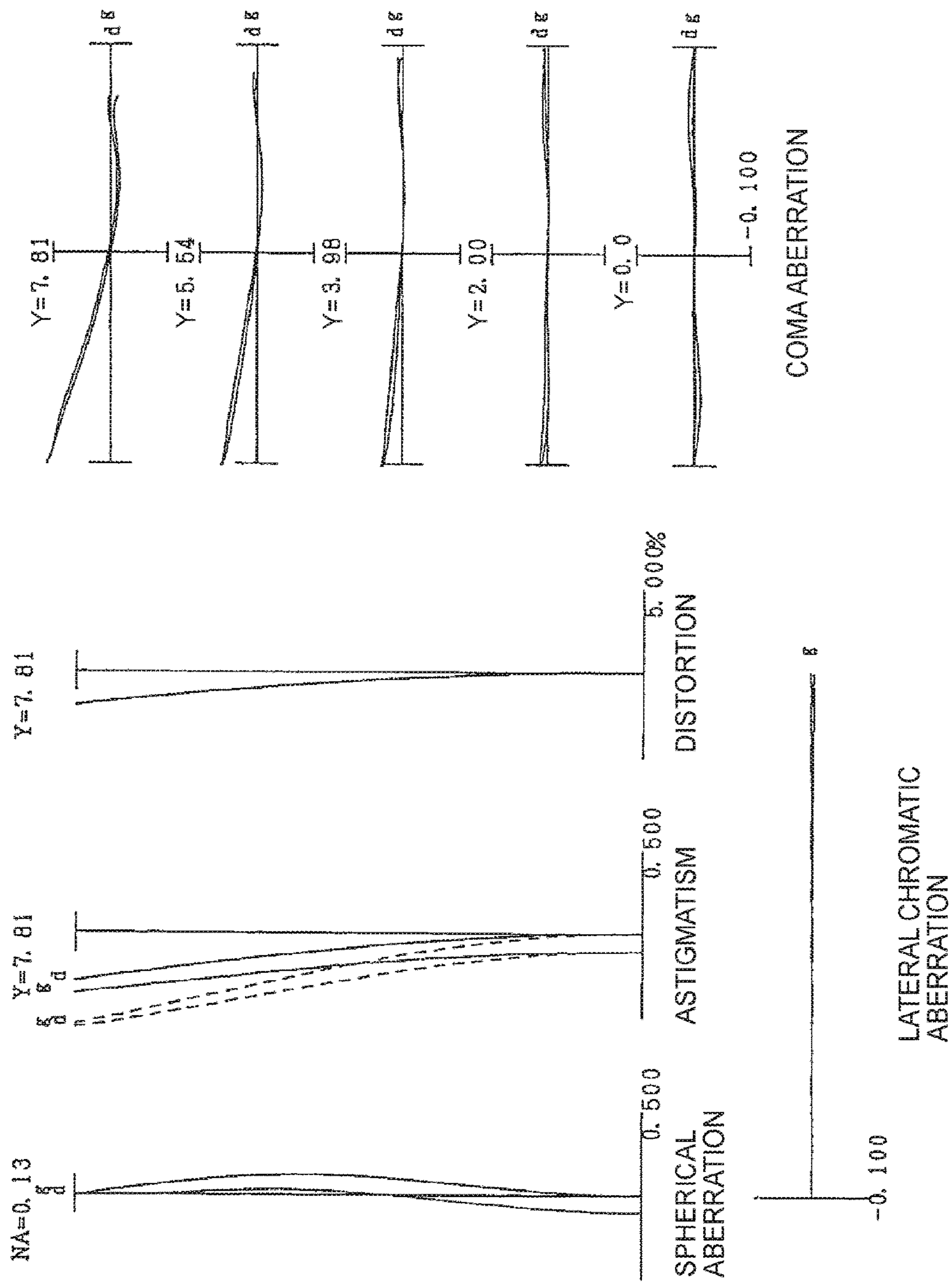
Figure 158C:
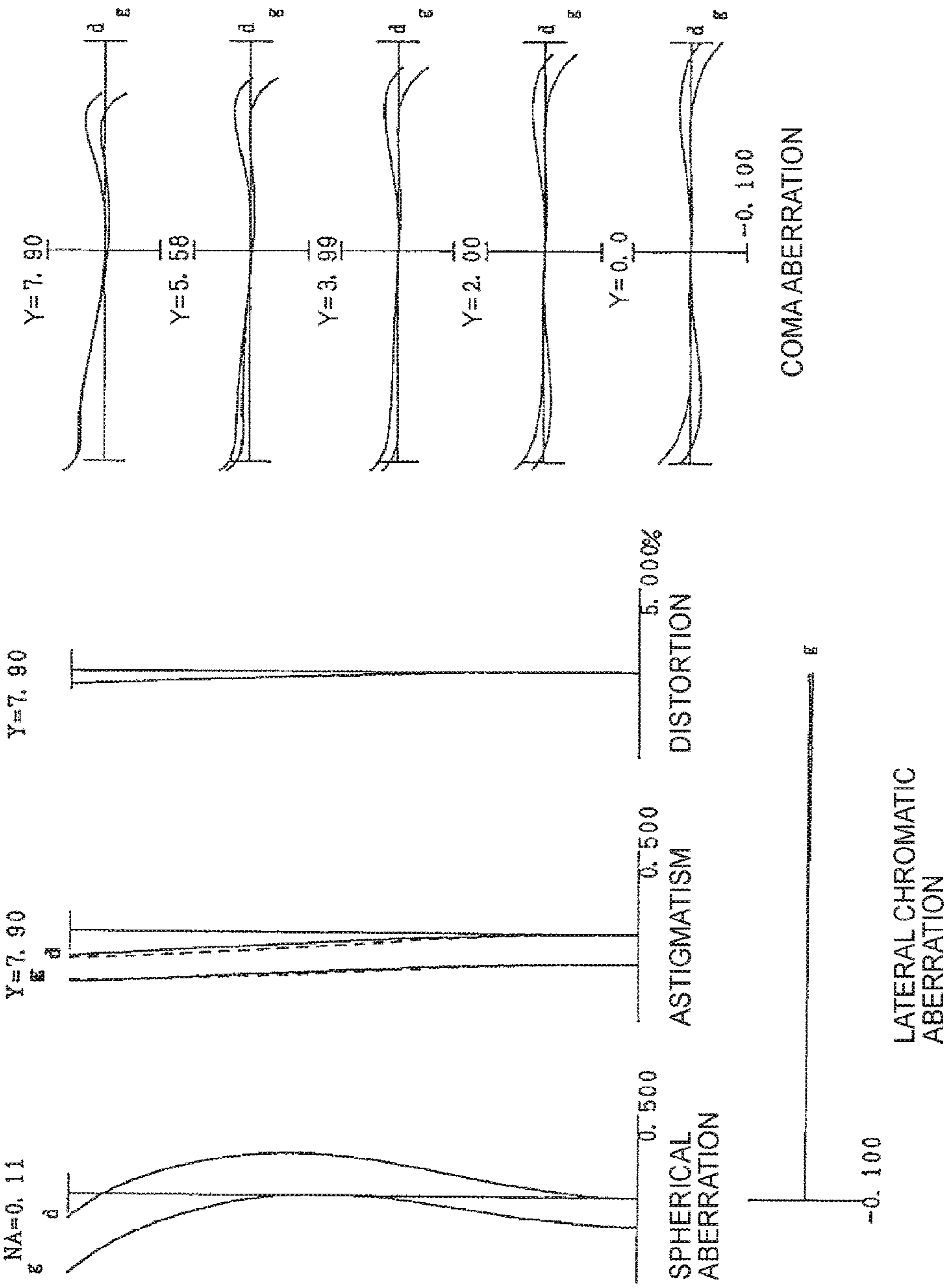

FIGS. 158A, 158B, and 158C are graphs showing various aberrations of the zoom optical system according to Example 35 upon focusing on a short distant object respectively in the wide angle end state, the intermediate focal length state, and the telephoto end state.

Figure 159A:
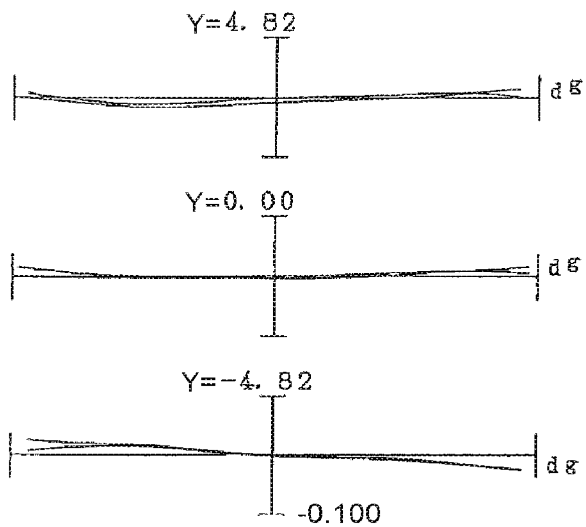
Figure 159B:
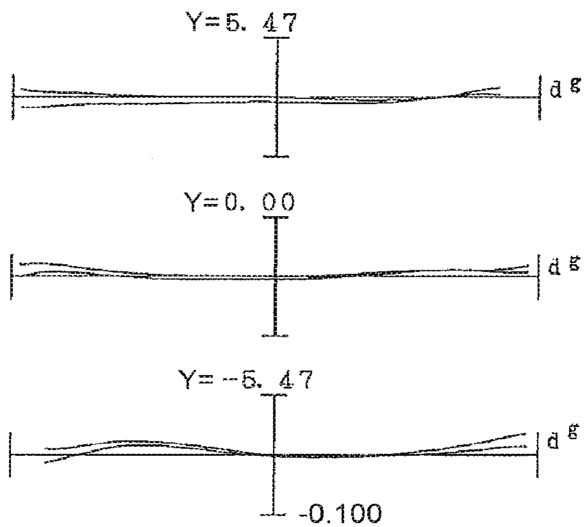
Figure 159C:
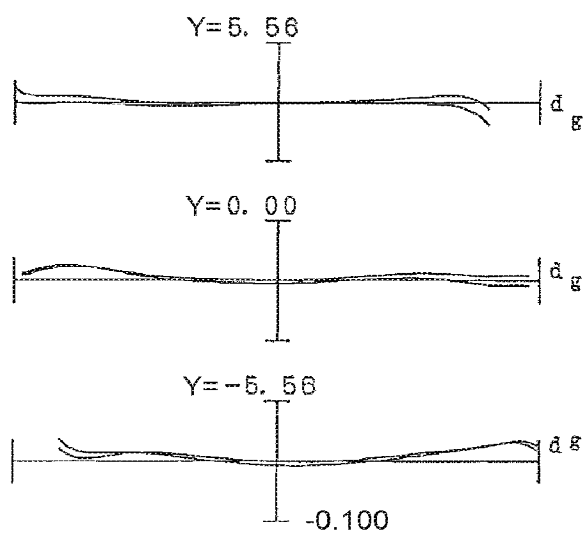

FIGS. 159A, 159B, and 159C are graphs showing coma aberrations of the zoom optical system according to Example 35 upon focusing on infinity with image blur correction performed, respectively in the wide angle end state, the intermediate focal length state, and the telephoto end state.

Figure 160:
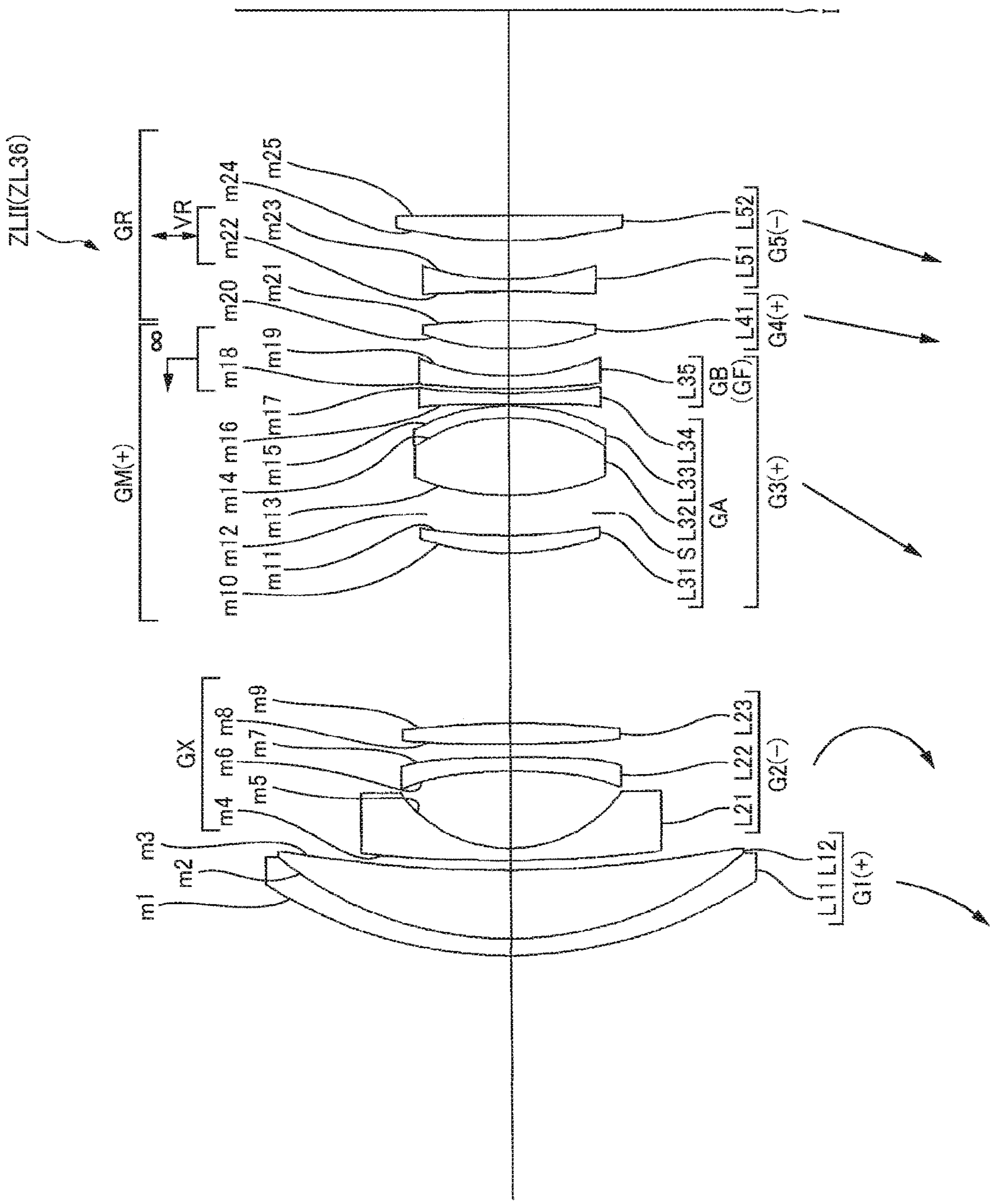

FIG. 160 is a cross-sectional view of a zoom optical system according to Example 36.

Figure 161A:
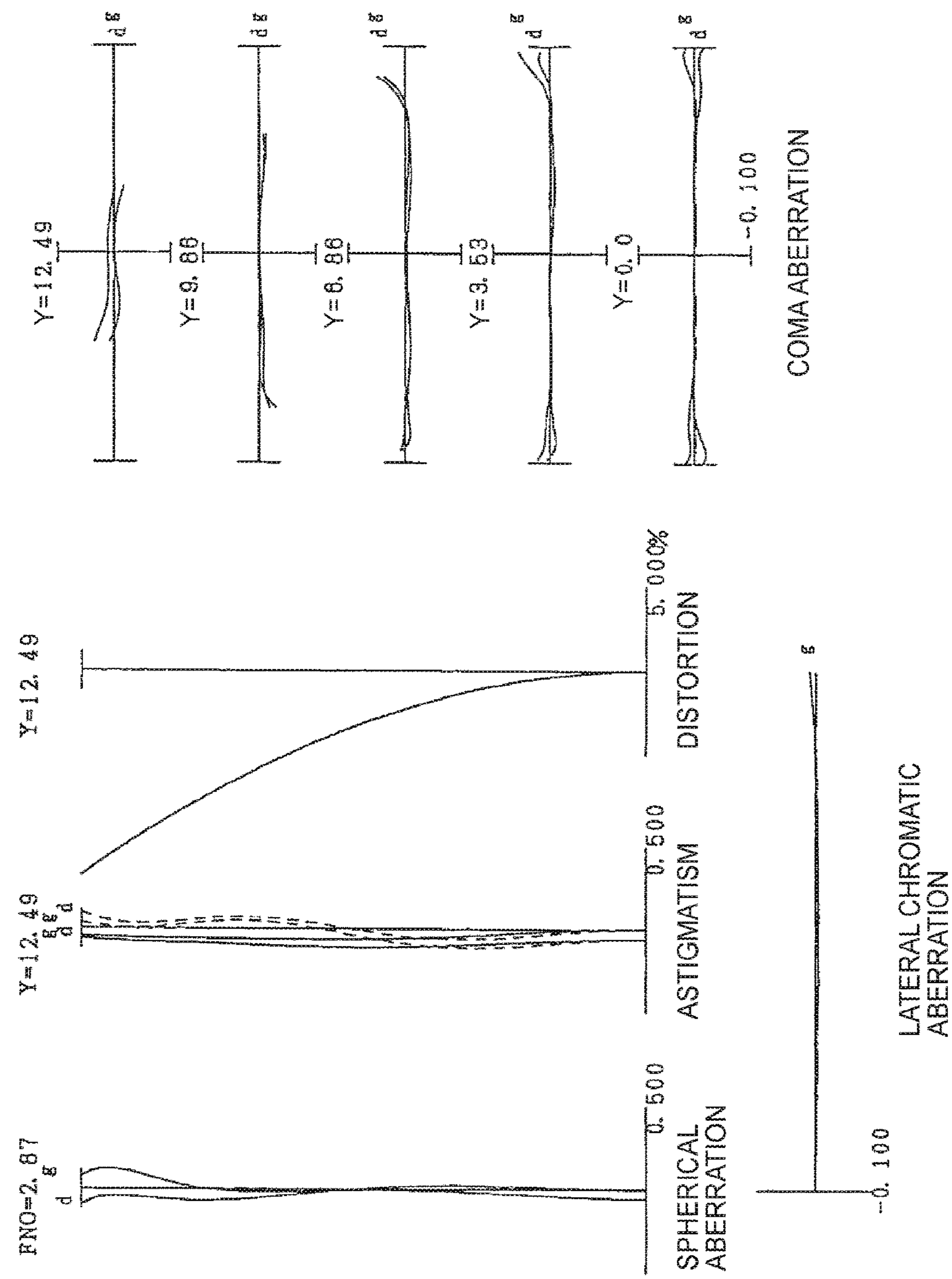
Figure 161B:
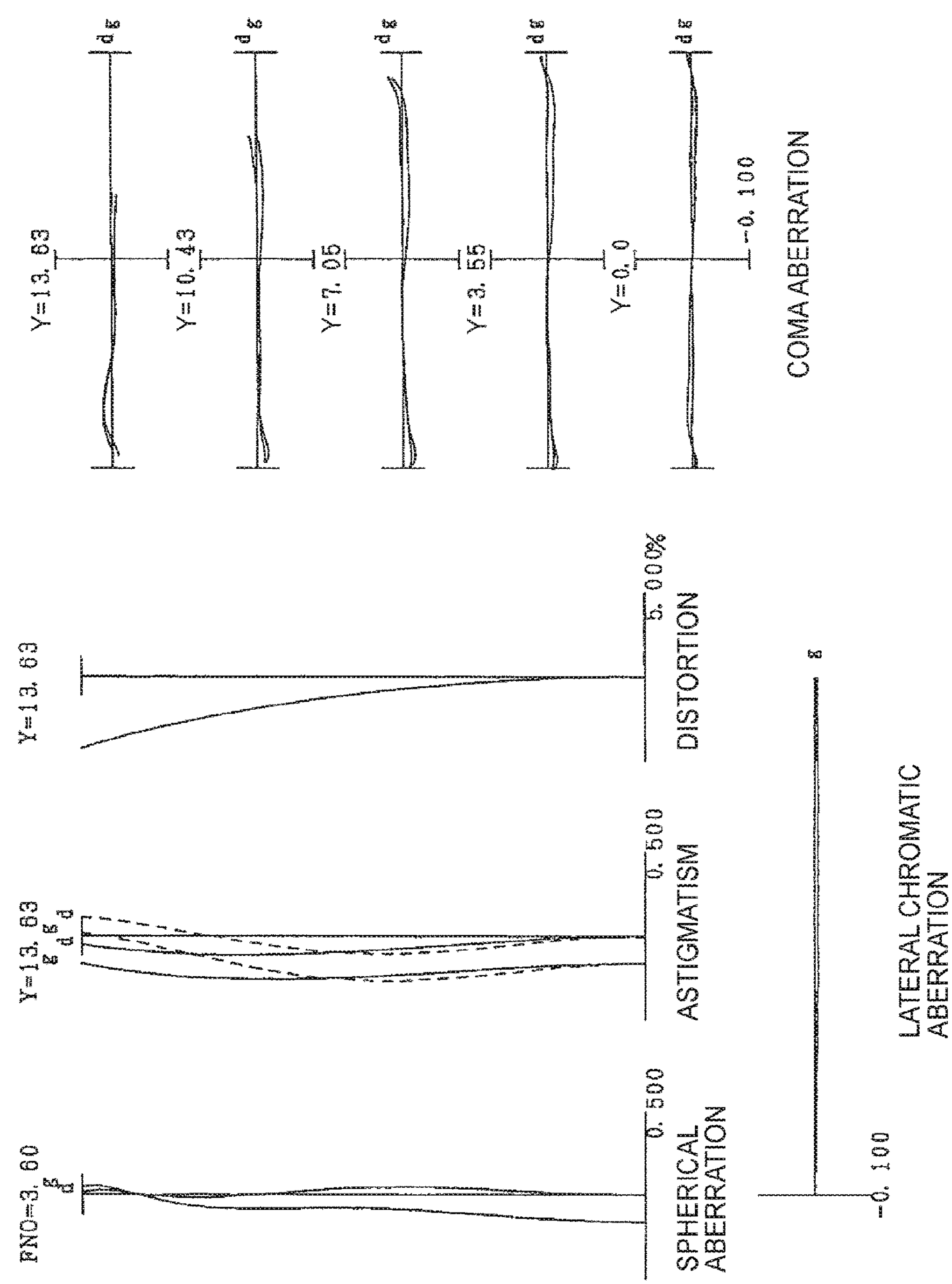
Figure 161C:
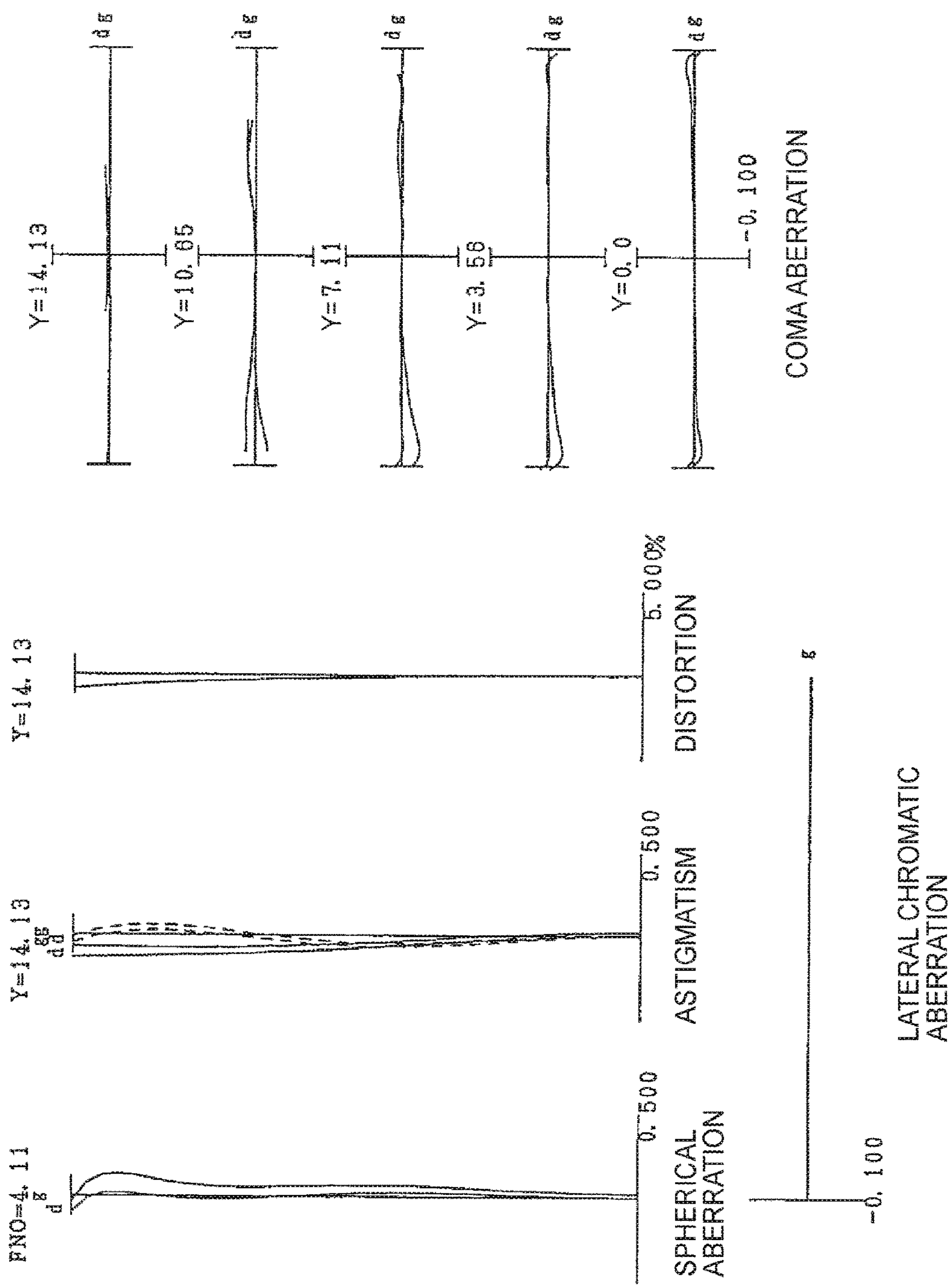

FIGS. 161A, 161B, and 161C are graphs showing various aberrations of the zoom optical system according to Example 36 upon focusing on infinity respectively in the wide angle end state, the intermediate focal length state, and the telephoto end state.

Figure 162A:
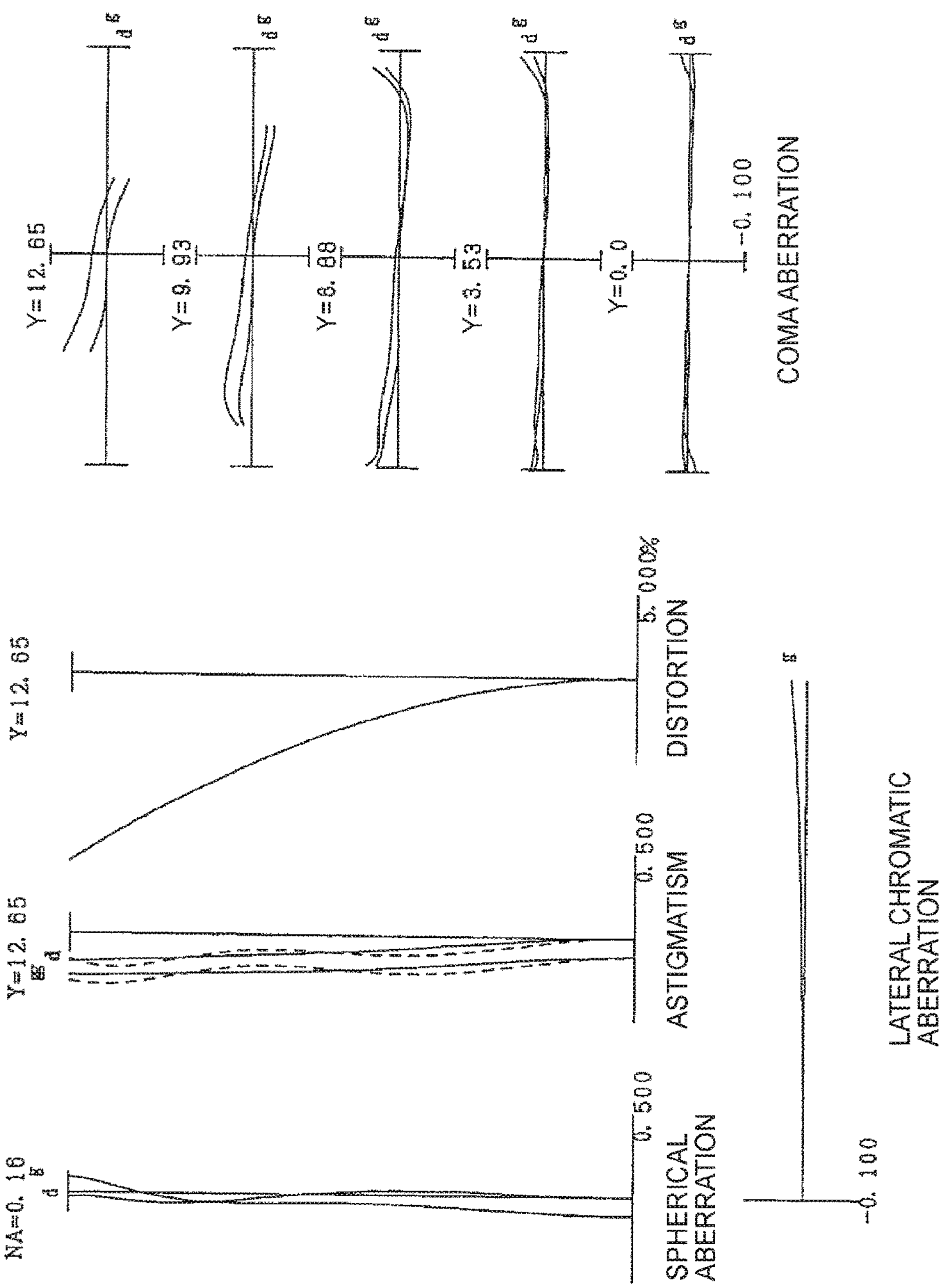
Figure 162B:
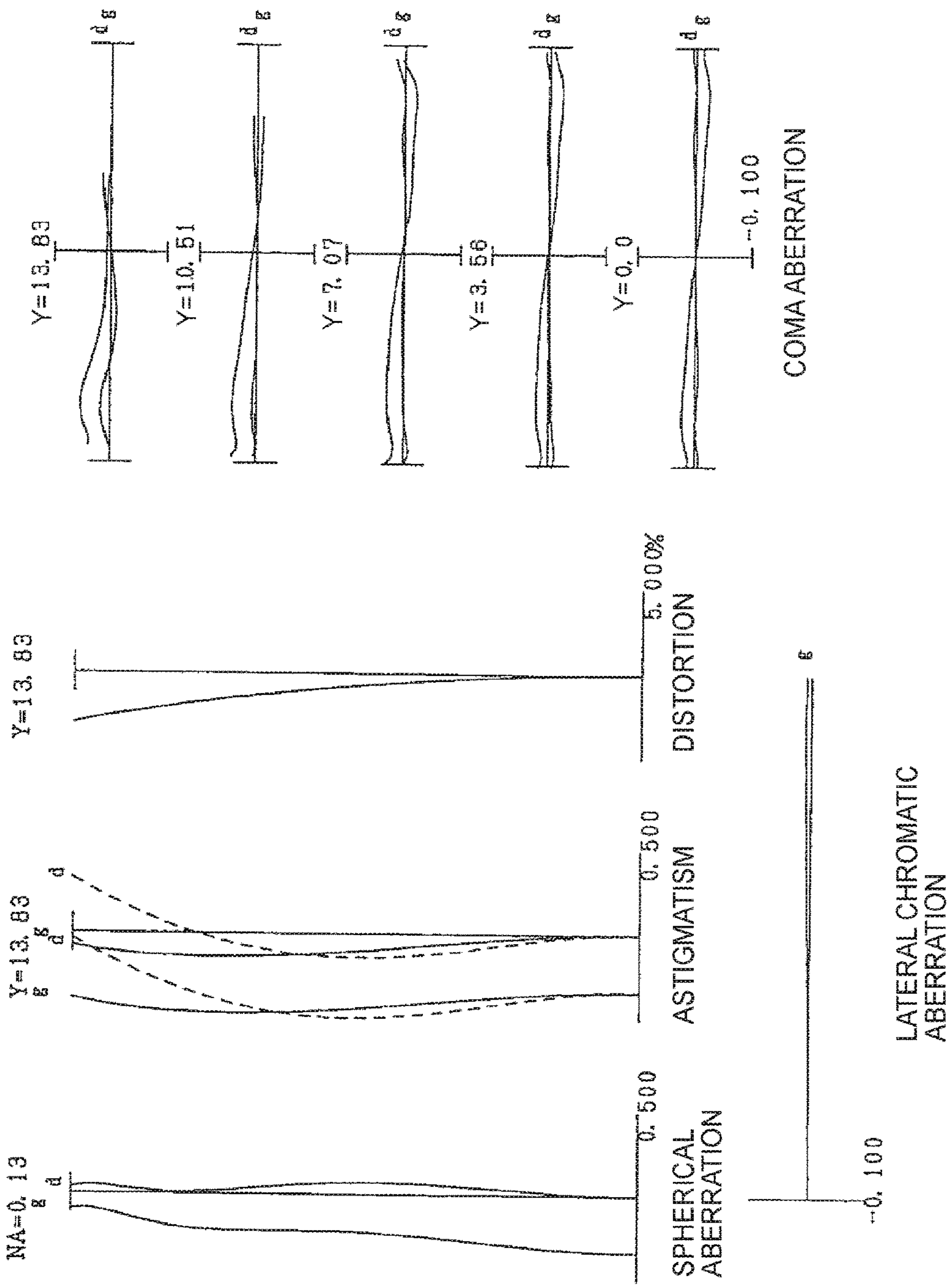
Figure 162C:
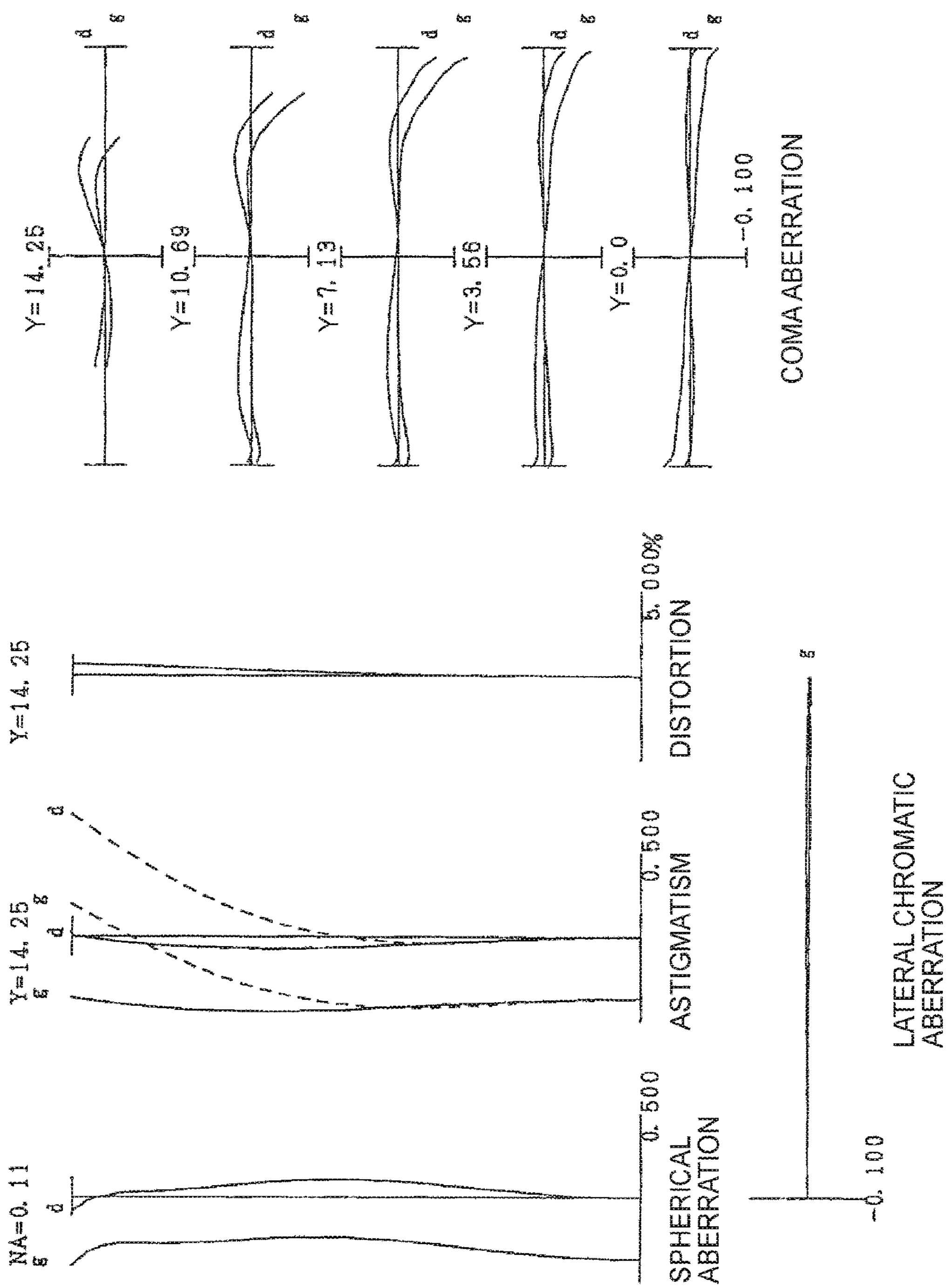

FIGS. 162A, 162B, and 162C are graphs showing various aberrations of the zoom optical system according to Example 36 upon focusing on a short distant object respectively in the wide angle end state, the intermediate focal length state, and the telephoto end state.

Figure 163A:
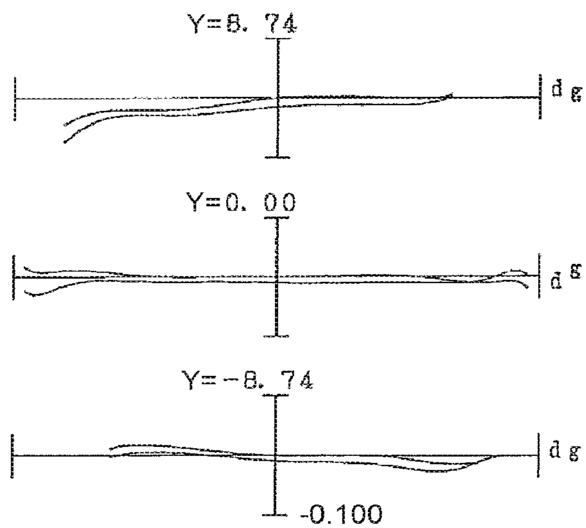
Figure 163B:
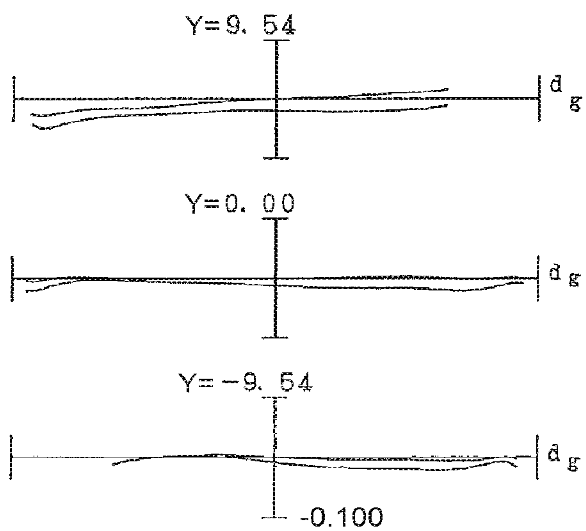
Figure 163C:
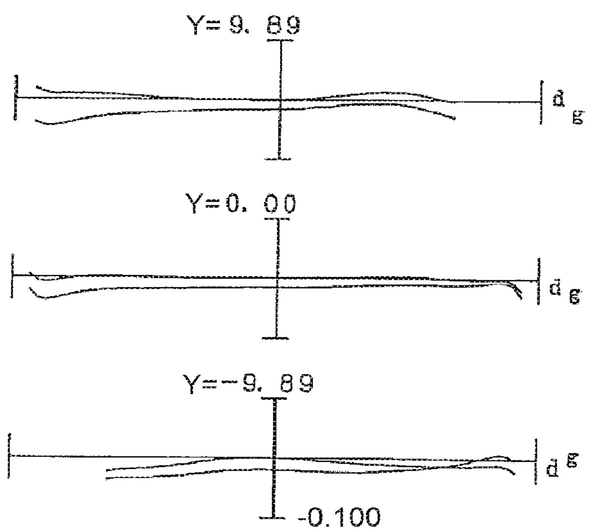

FIGS. 163A, 163B, and 163C are graphs showing coma aberrations plots of the zoom optical system according to Example 36 upon focusing on infinity with image blur correction performed, respectively in the wide angle end state, the intermediate focal length state, and the telephoto end state.

Figure 164:
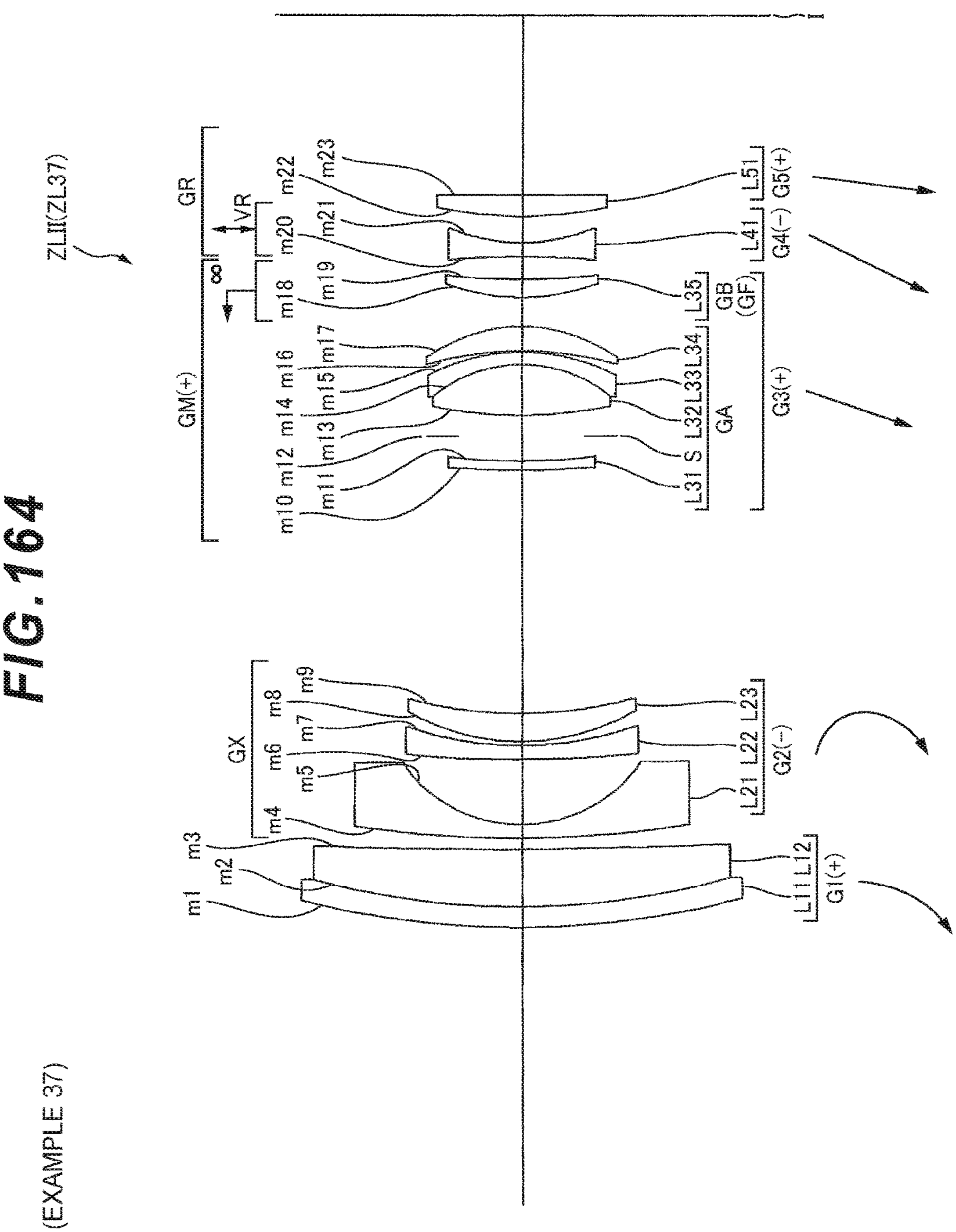

FIG. 164 is a cross-sectional view of a zoom optical system according to Example 37.

Figure 165A:
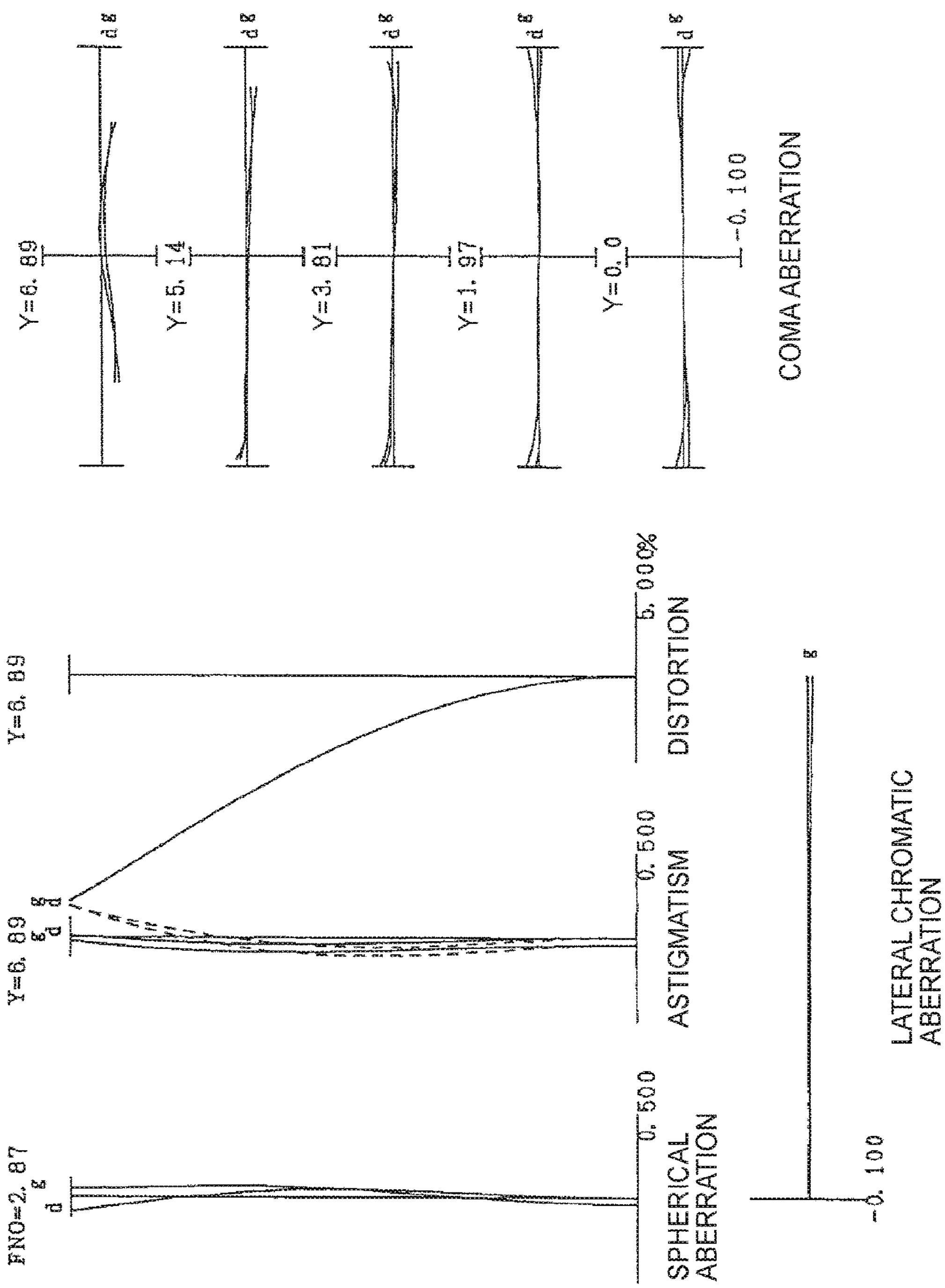
Figure 165B:
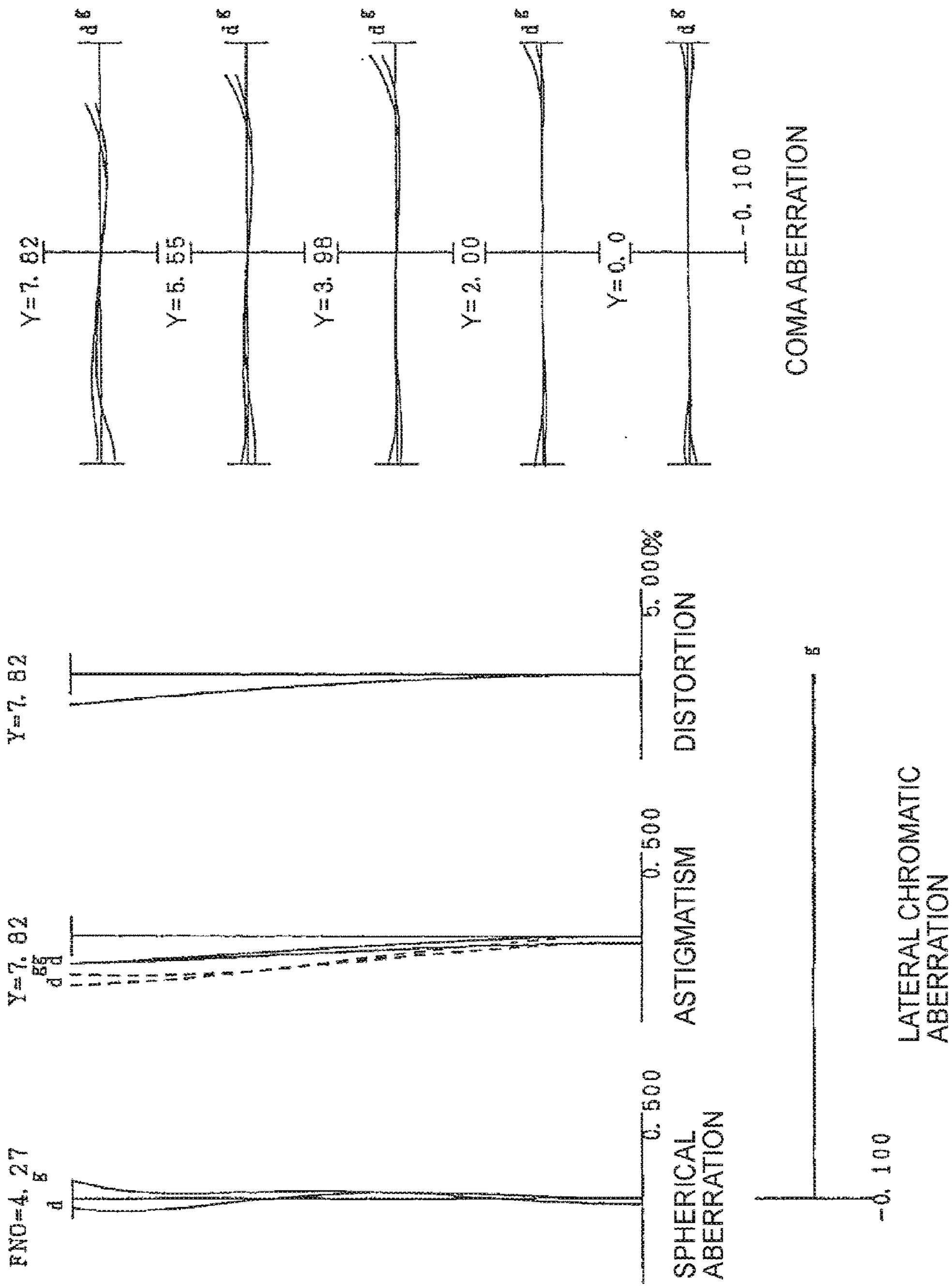
Figure 165C:
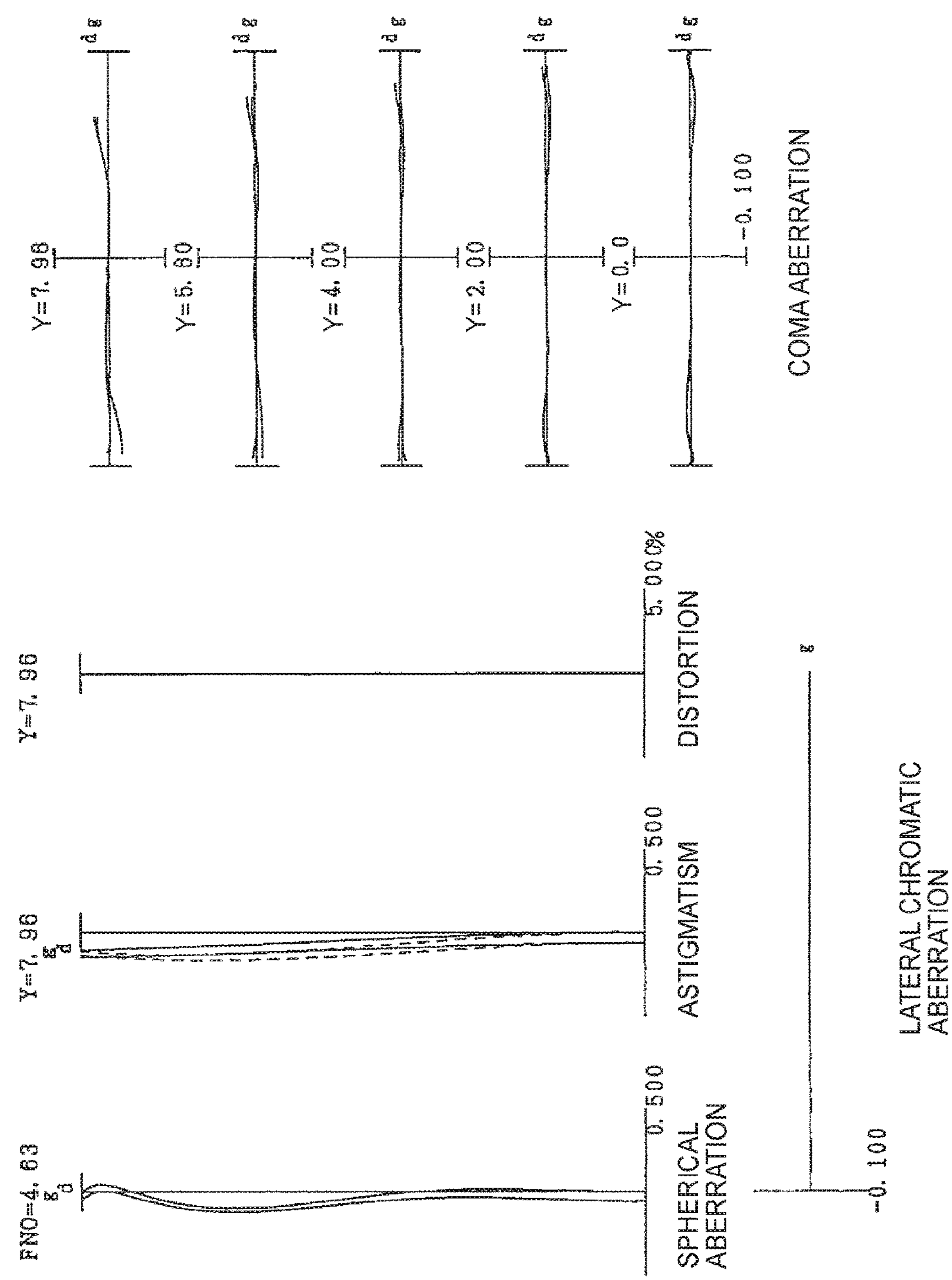

FIGS. 165A, 165B, and 165C are graphs showing various aberrations of the zoom optical system according to Example 37 upon focusing on infinity respectively in the wide angle end state, the intermediate focal length state, and the telephoto end state.

Figure 166A:
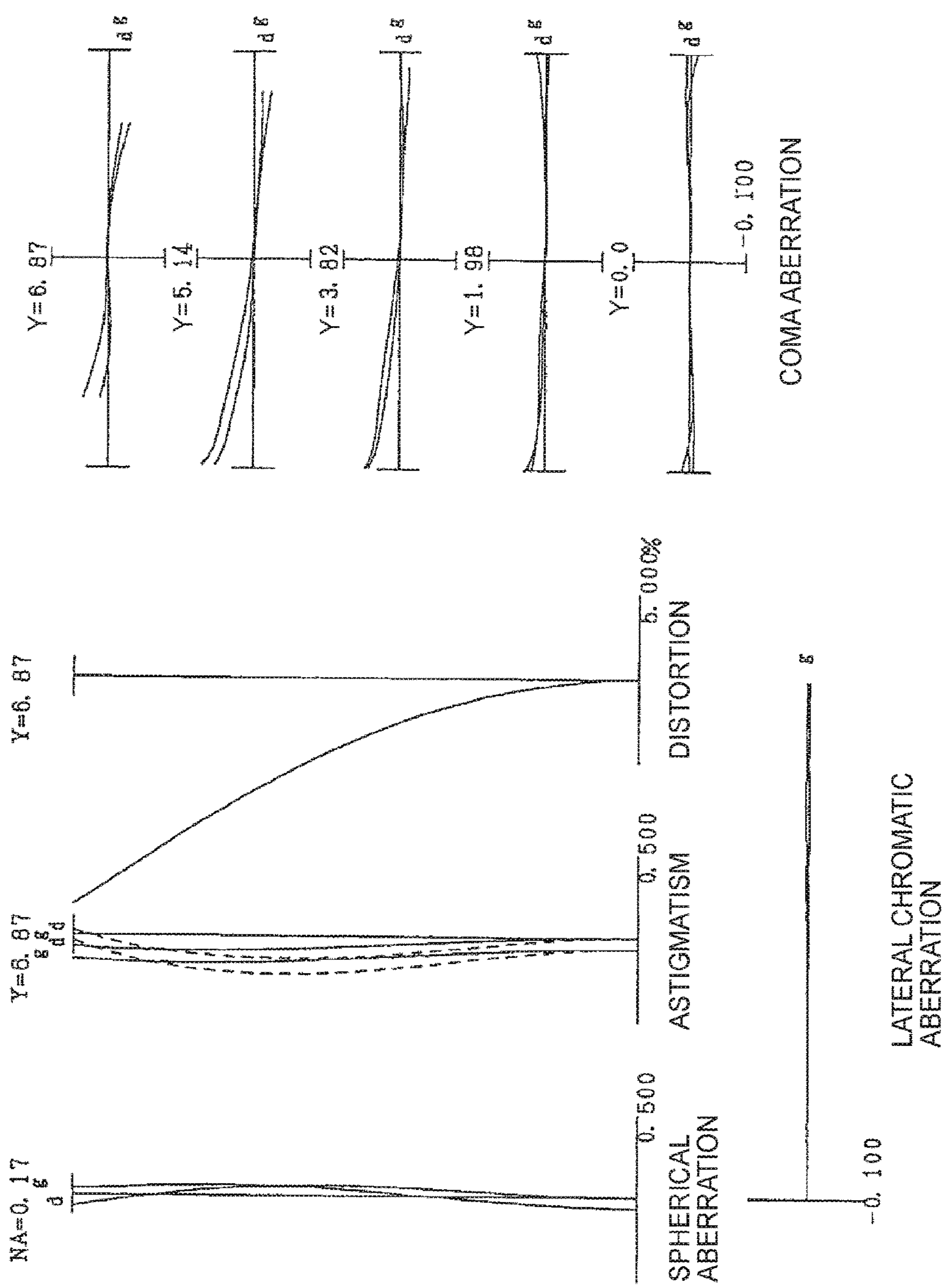
Figure 166B:
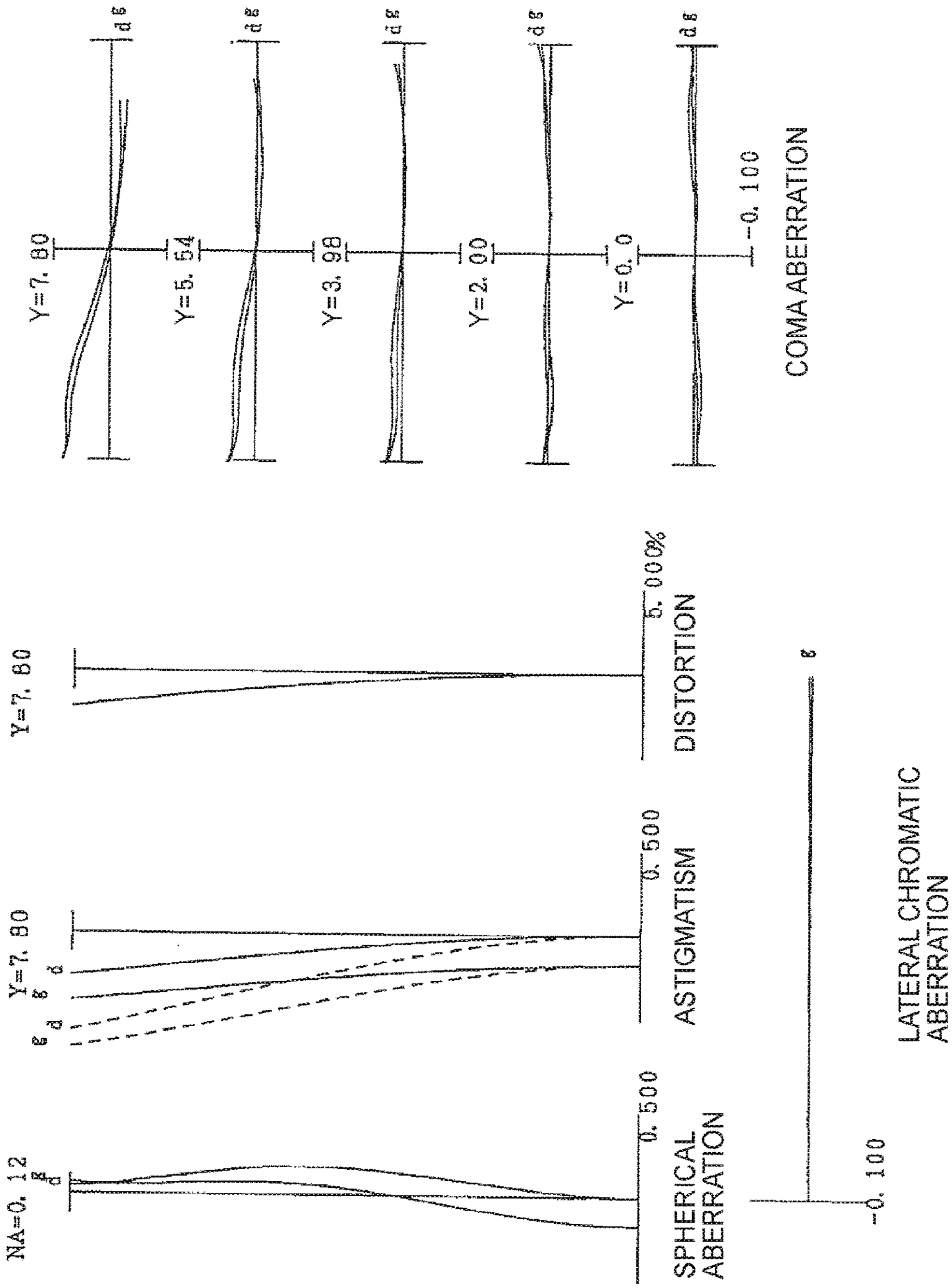
Figure 166C:
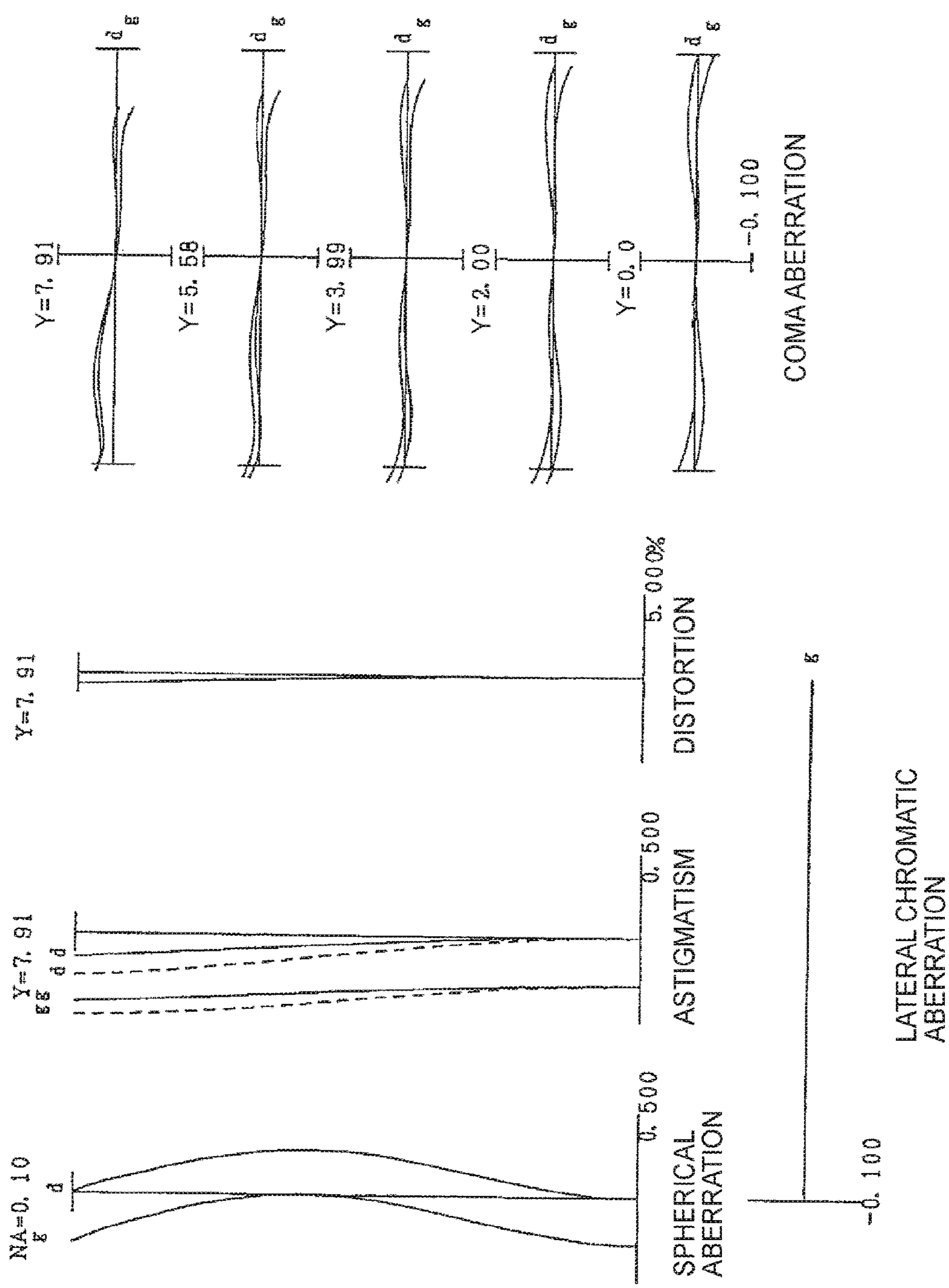

FIGS. 166A, 166B, and 166C are graphs showing various aberrations of the zoom optical system according to Example 37 upon focusing on a short distant object respectively in the wide angle end state, the intermediate focal length state, and the telephoto end state.

Figure 167A:
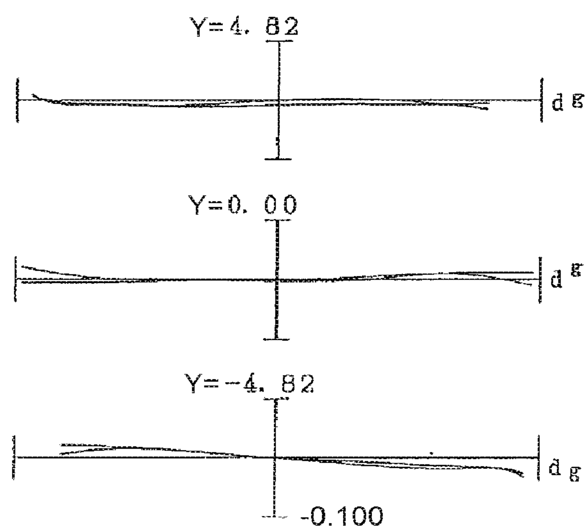
Figure 167B:
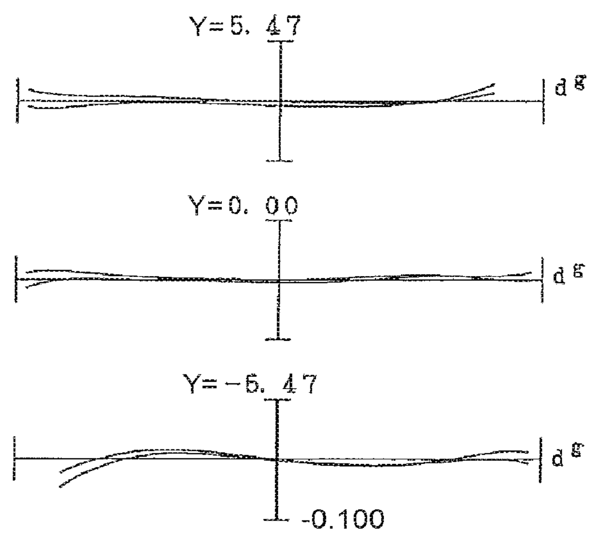
Figure 167C:
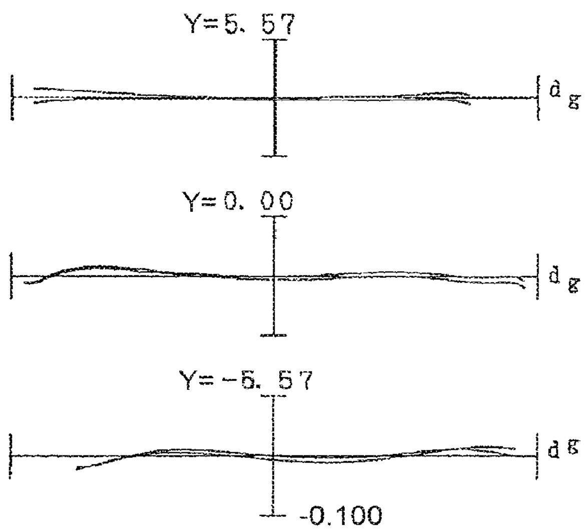

FIGS. 167A, 167B, and 167C are graphs showing coma aberrations of the zoom optical system according to Example 37 upon focusing on infinity with image blur correction performed, respectively in the wide angle end state, the intermediate focal length state, and the telephoto end state.

Figure 168:
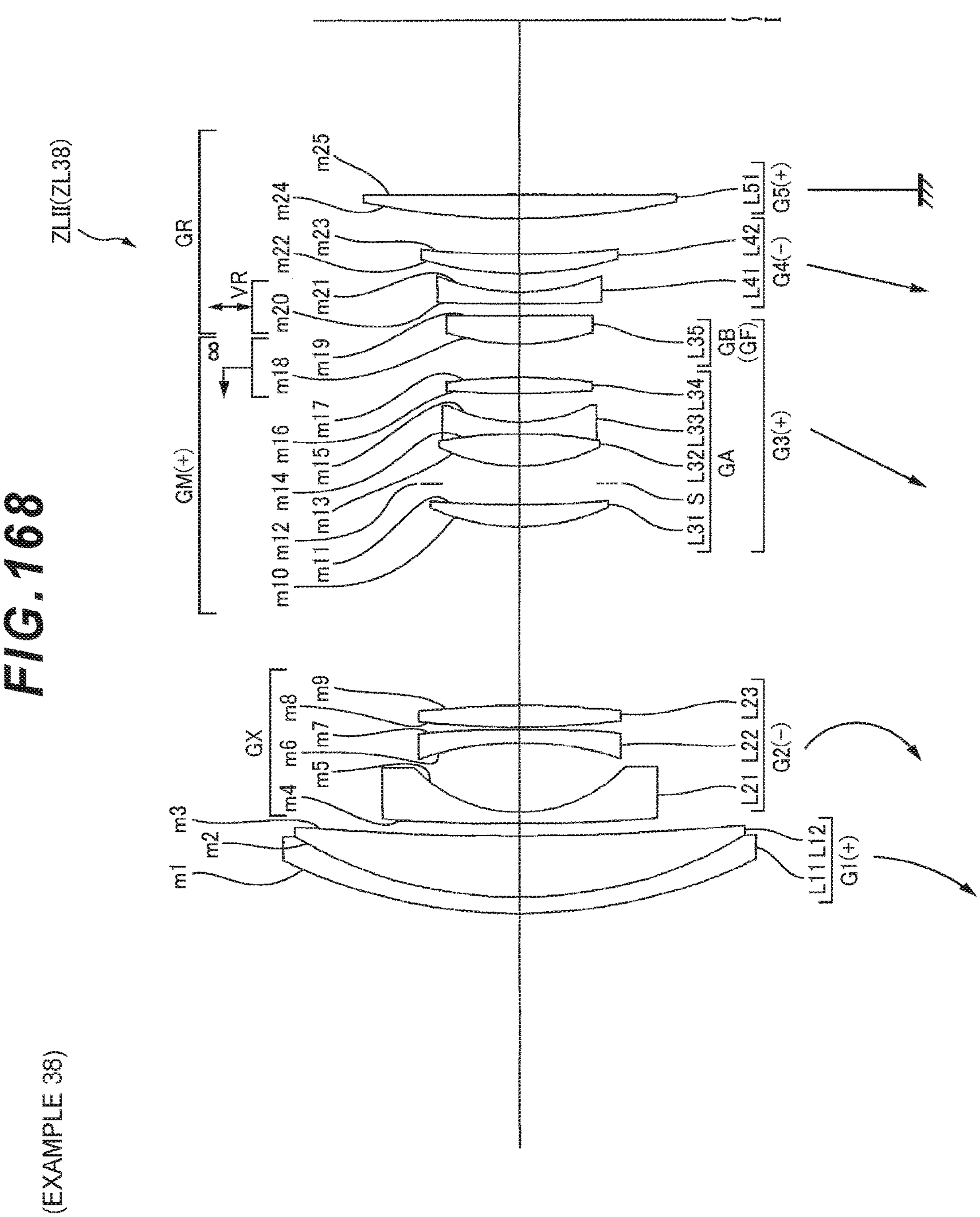

FIG. 168 is a cross-sectional view of a zoom optical system according to Example 38.

Figure 169A:
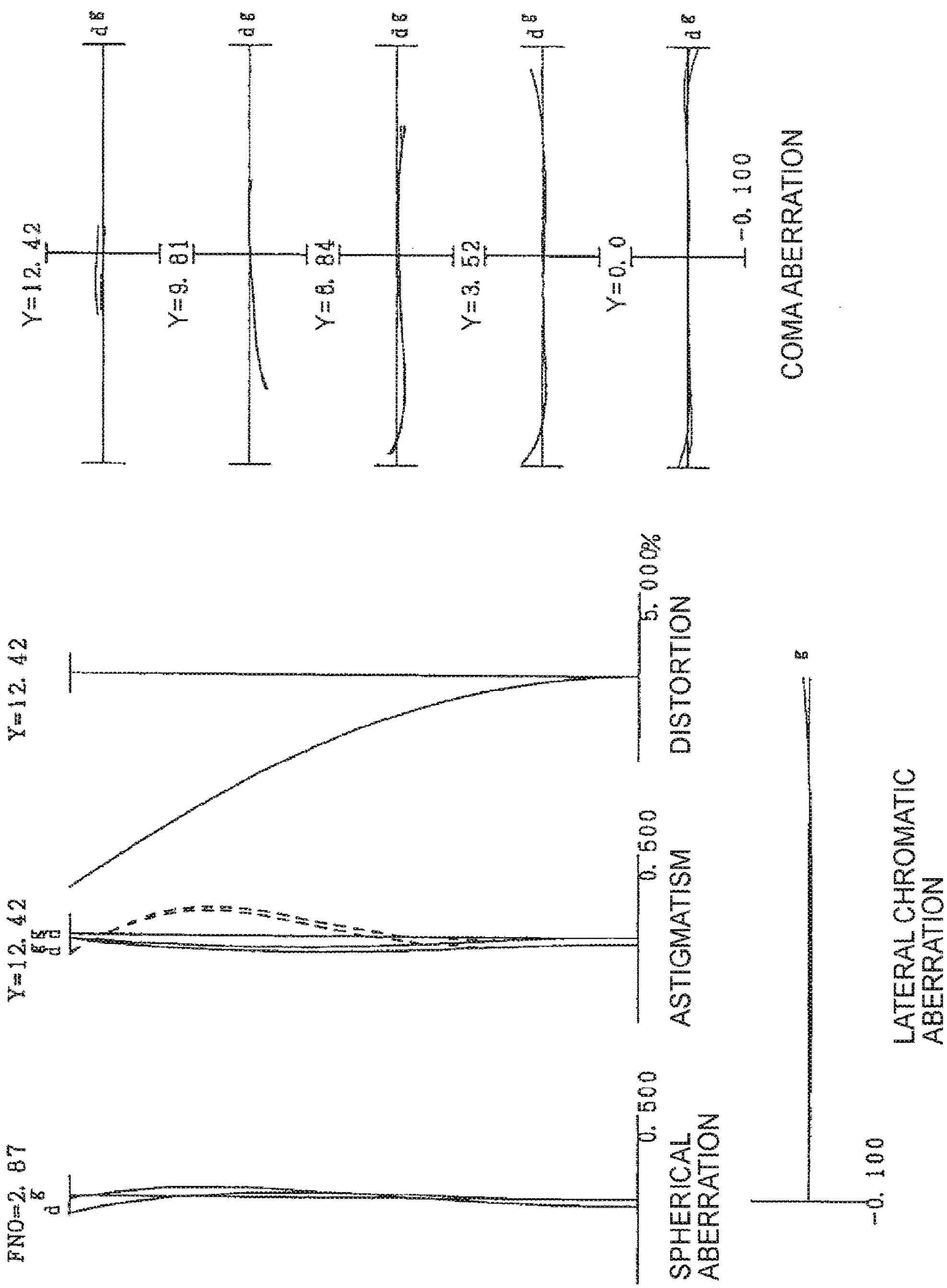
Figure 169B:
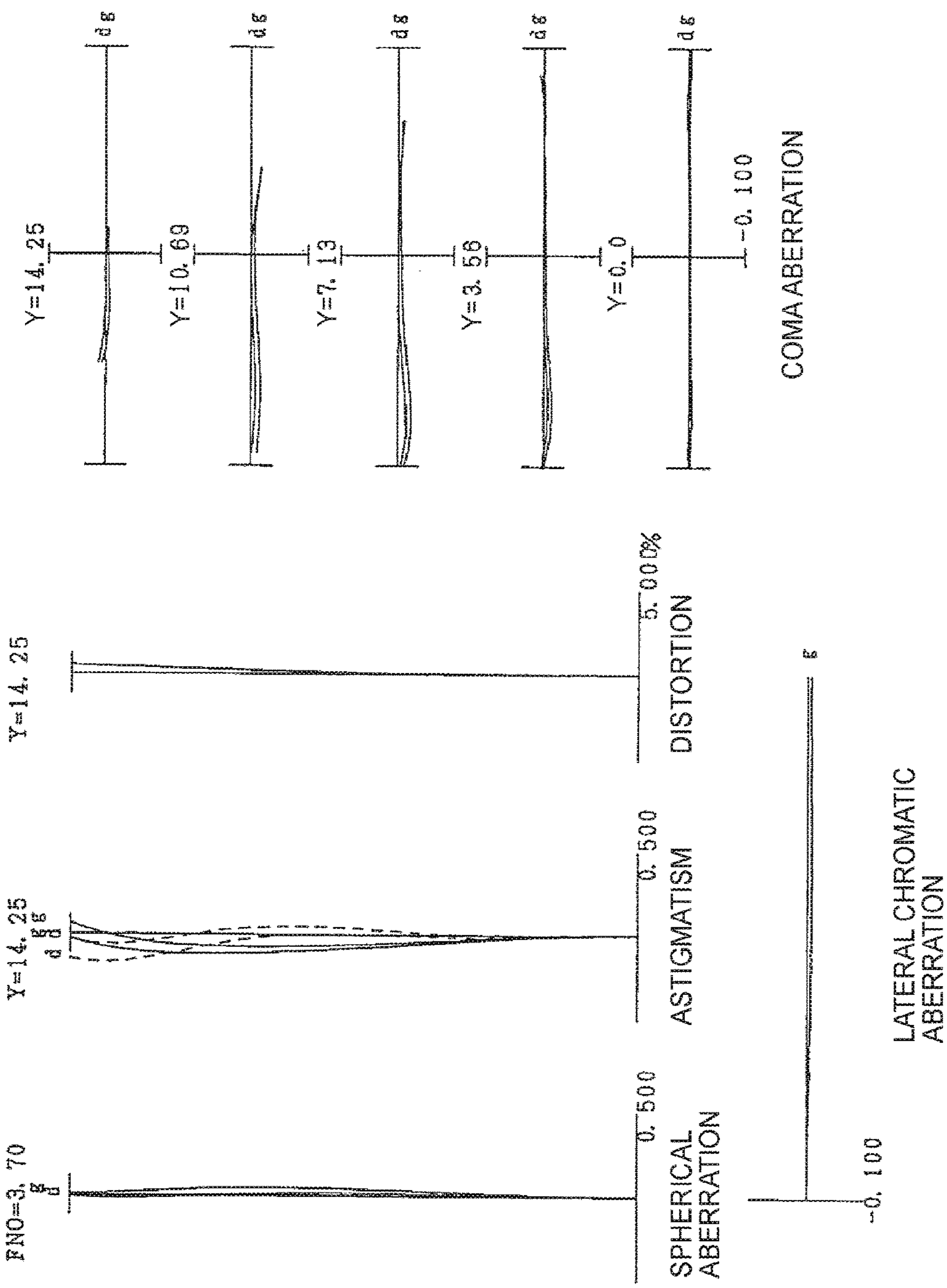
Figure 169C:
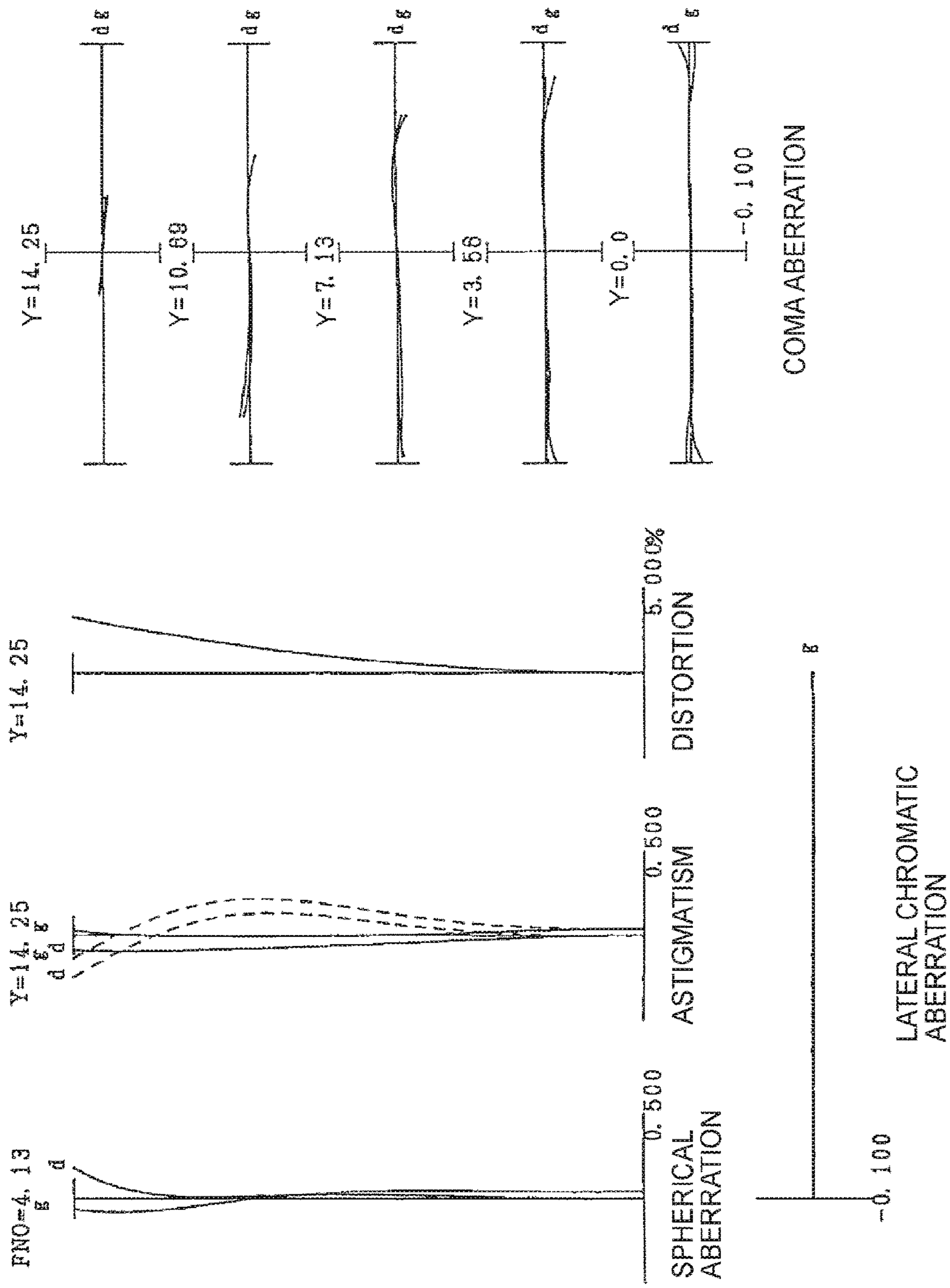

FIGS. 169A, 169B, and 169C are graphs showing various aberrations of the zoom optical system according to Example 38 upon focusing on infinity respectively in the wide angle end state, the intermediate focal length state, and the telephoto end state.

Figure 170A:
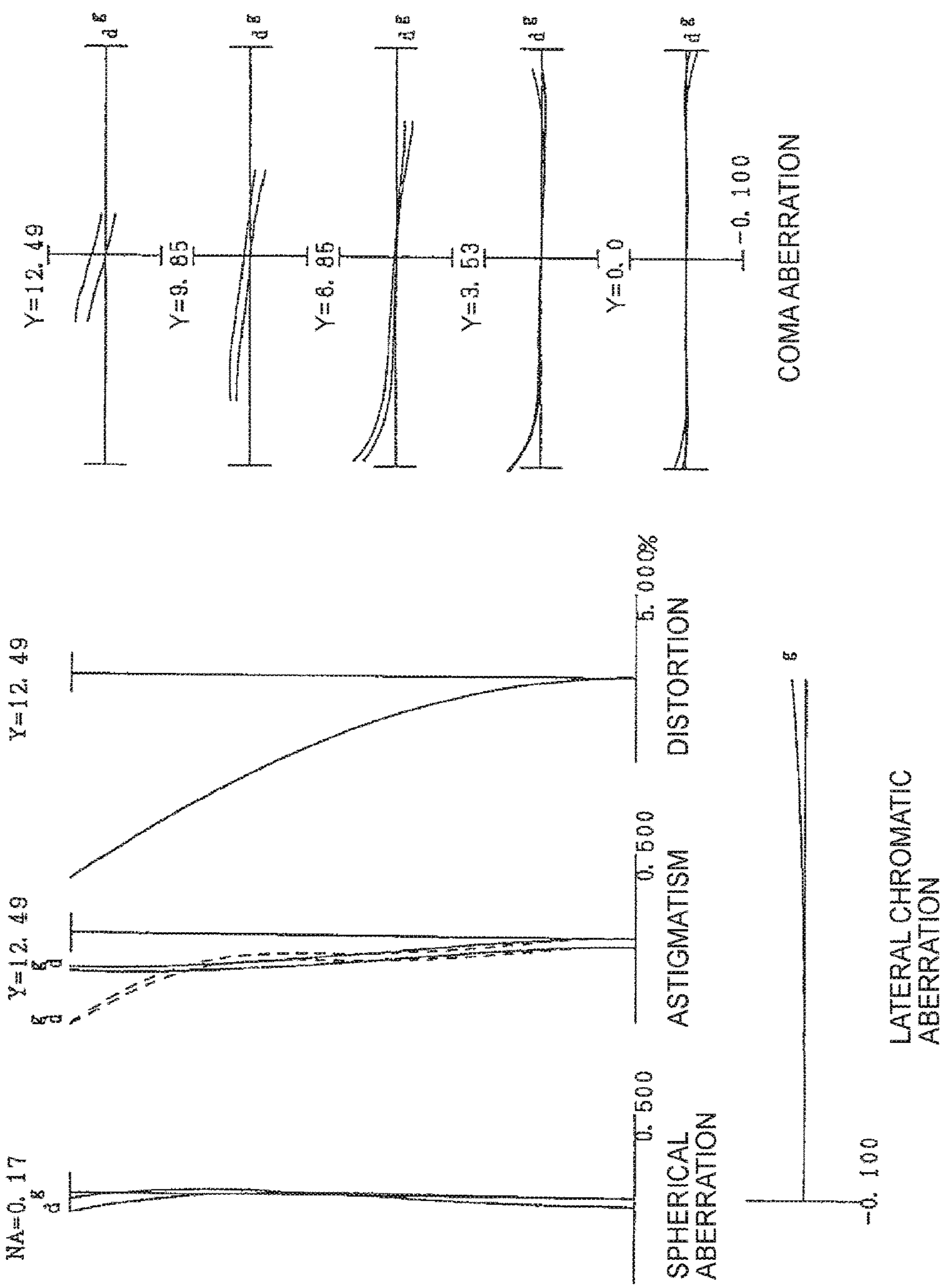
Figure 170B:
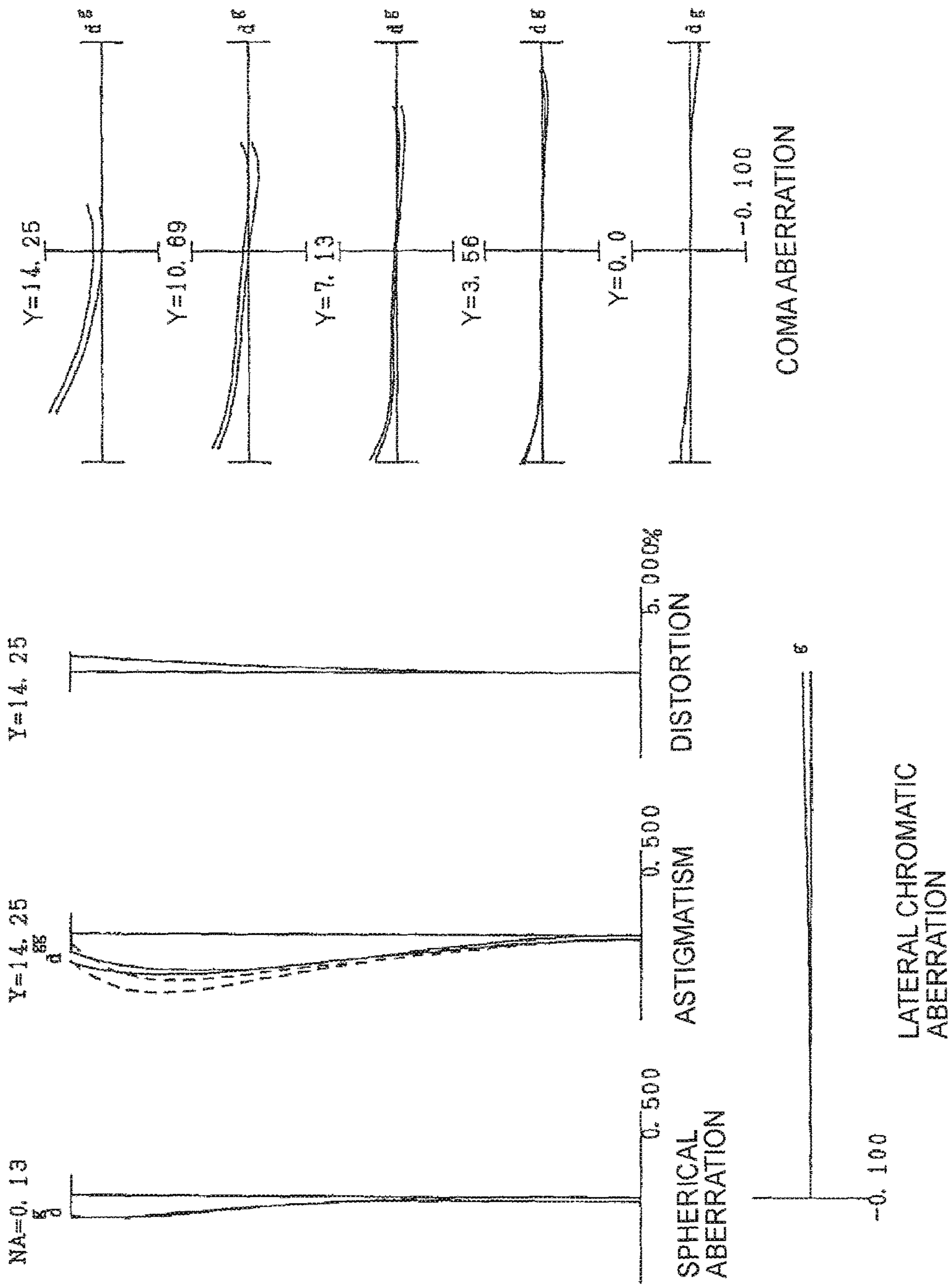
Figure 170C:
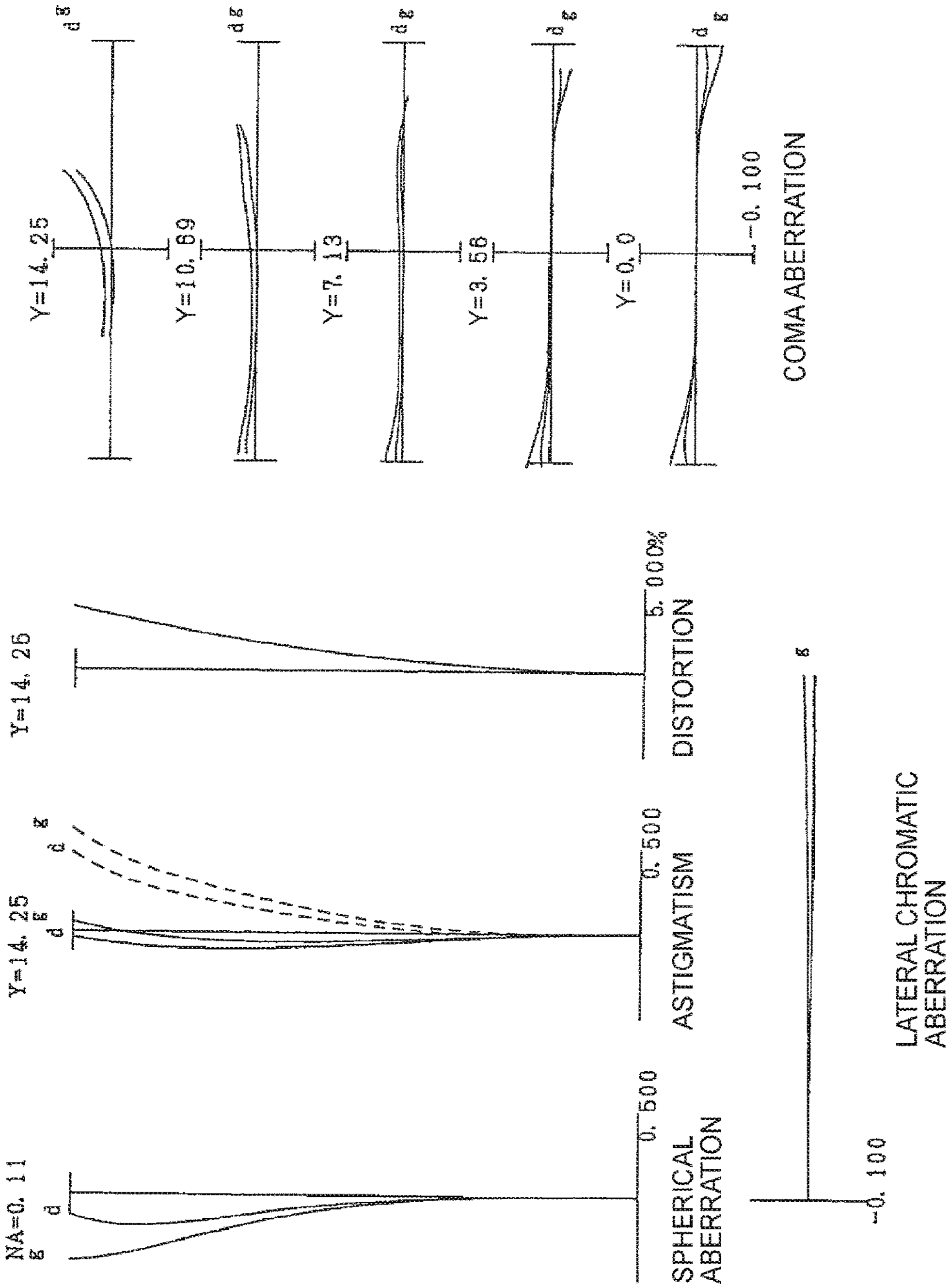

FIGS. 170A, 170B, and 170C are graphs showing various aberrations of the zoom optical system according to Example 38 upon focusing on a short distant object respectively in the wide angle end state, the intermediate focal length state, and the telephoto end state.

Figure 171A:
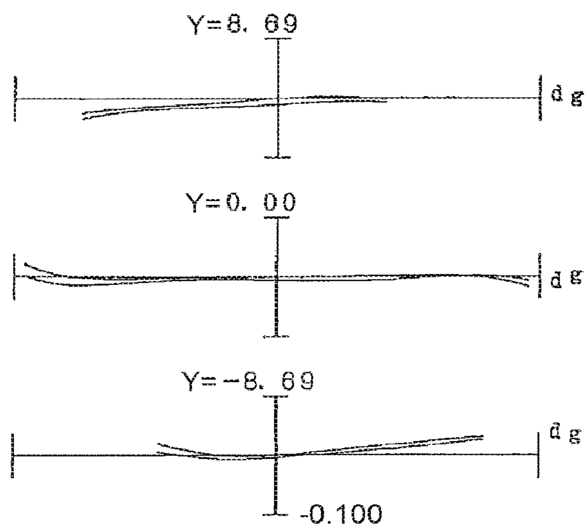
Figure 171B:
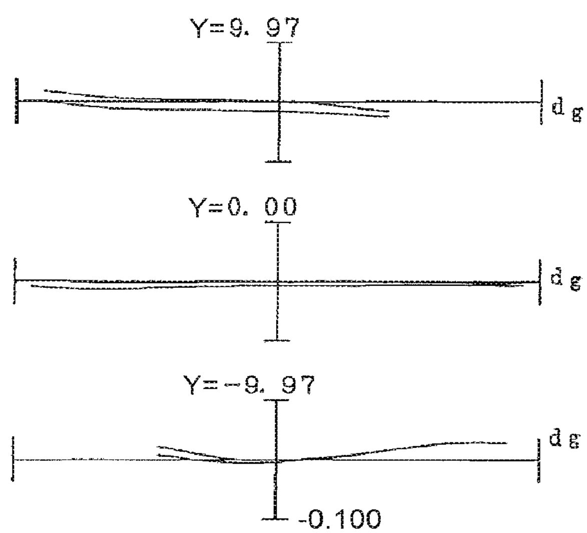
Figure 171C:
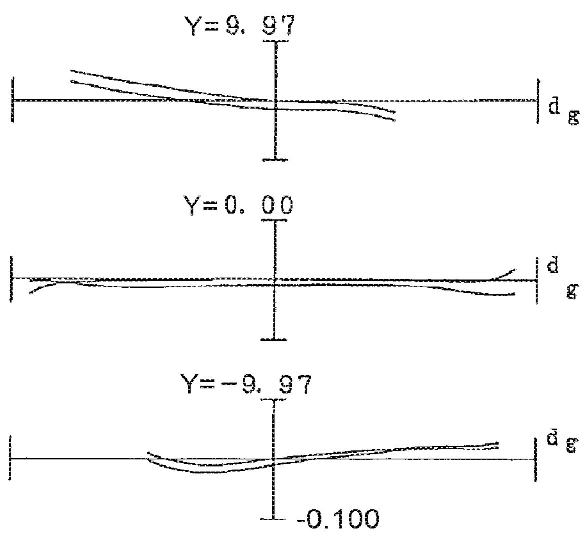

FIGS. 171A, 171B, and 171C are graphs showing coma aberrations of the zoom optical system according to Example 38 upon focusing on infinity with image blur correction performed, respectively in the wide angle end state, the intermediate focal length state, and the telephoto end state.

Figure 172:
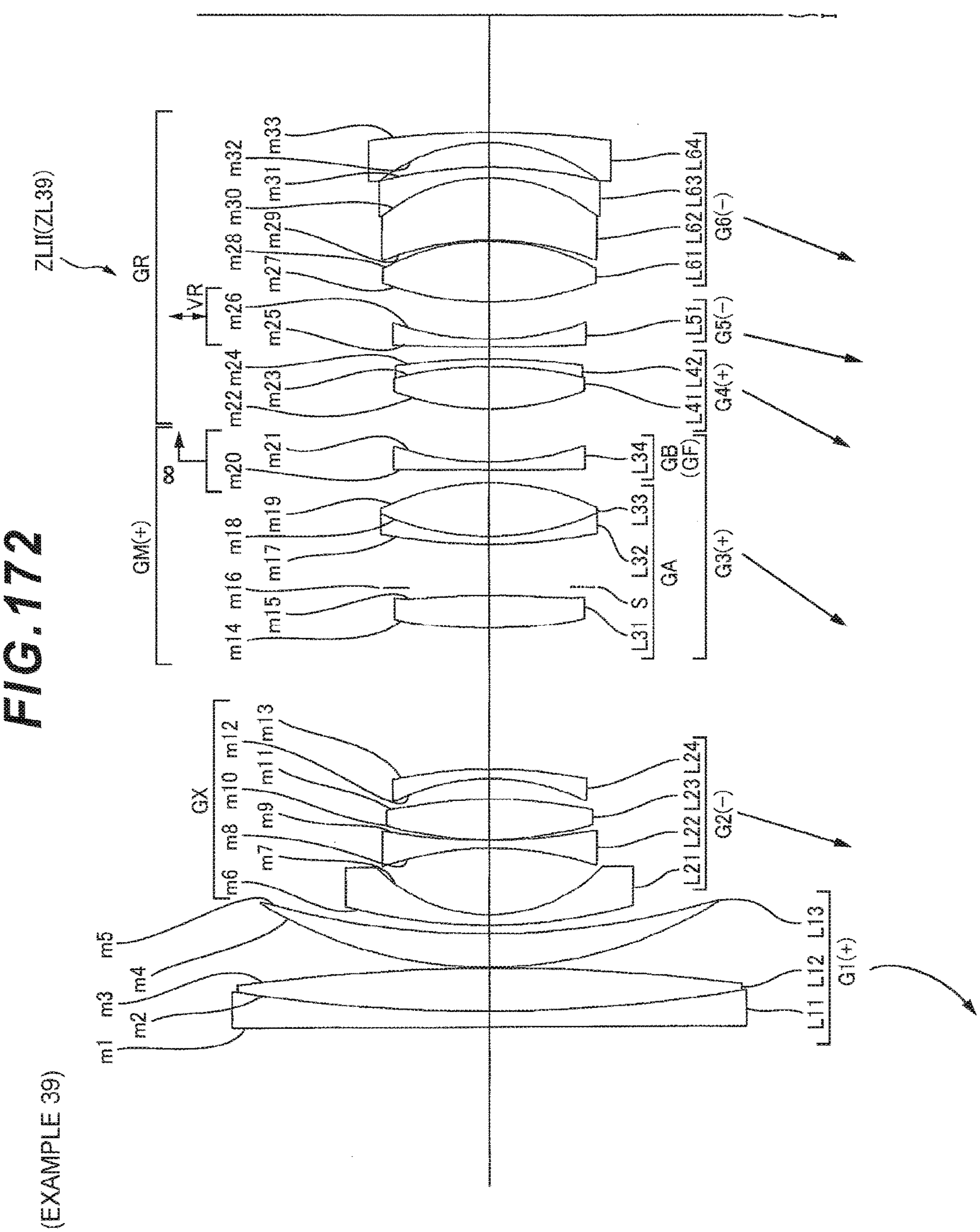

FIG. 172 is a cross-sectional view of a zoom optical system according to Example 39.

Figure 173A:
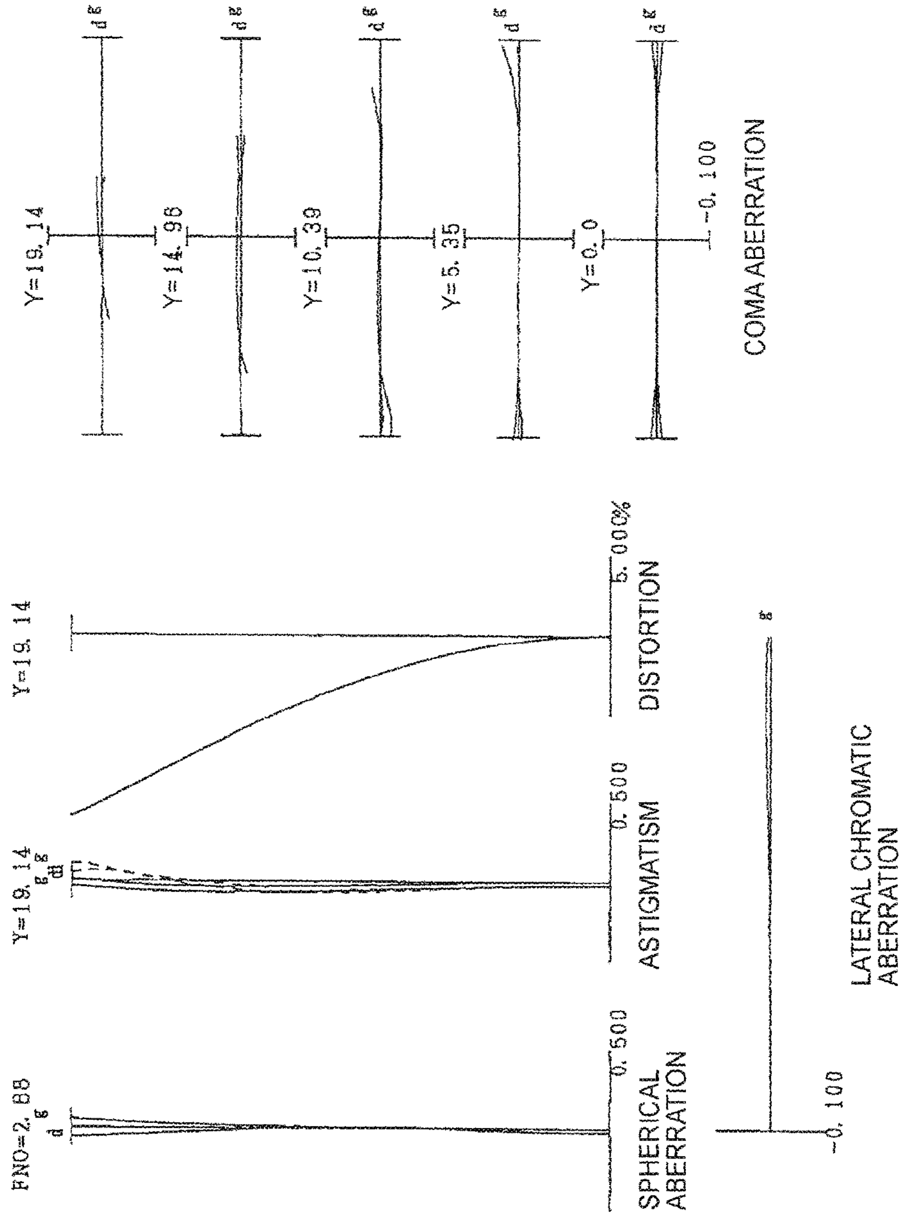
Figure 173B:
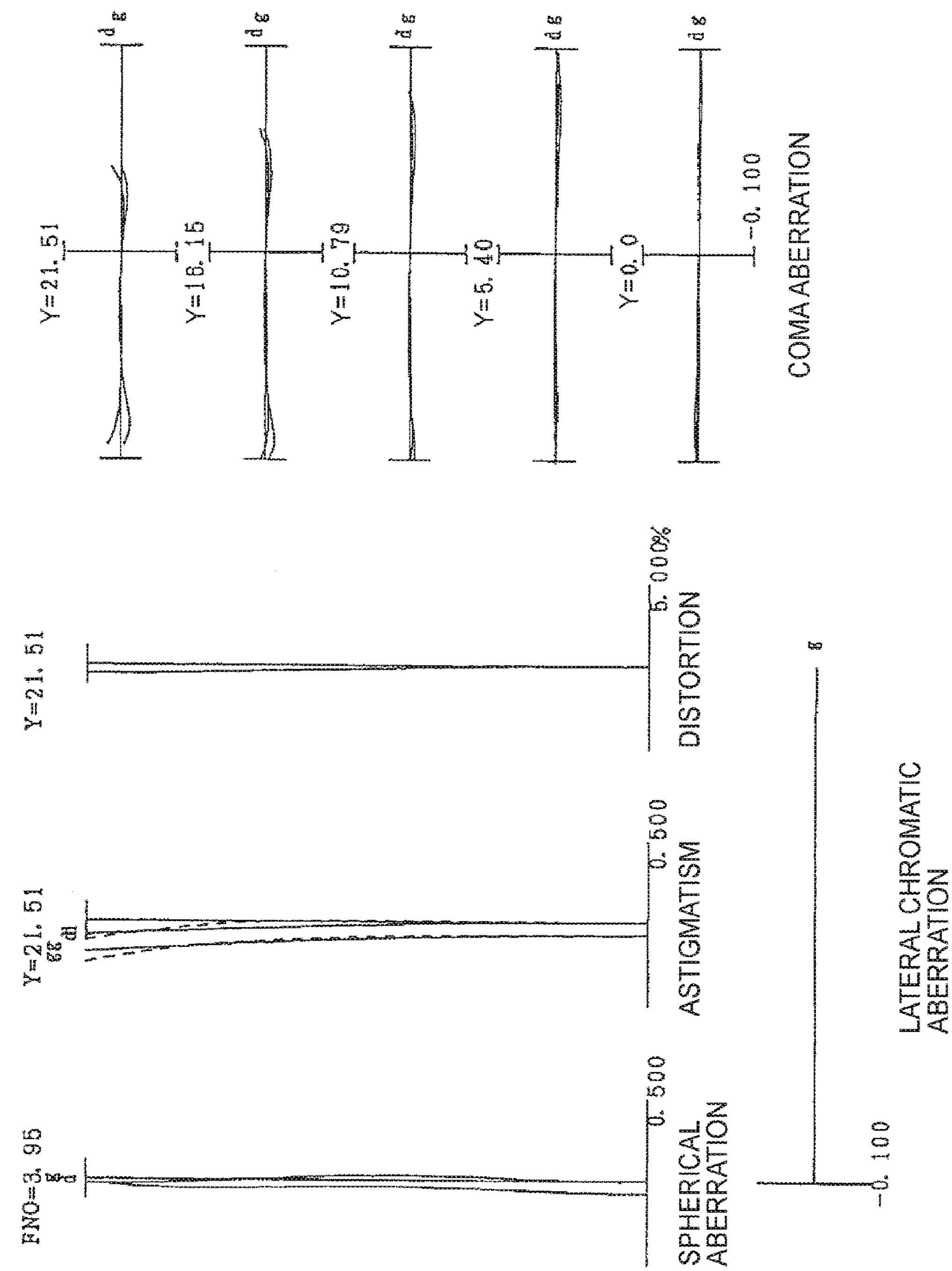
Figure 173C:
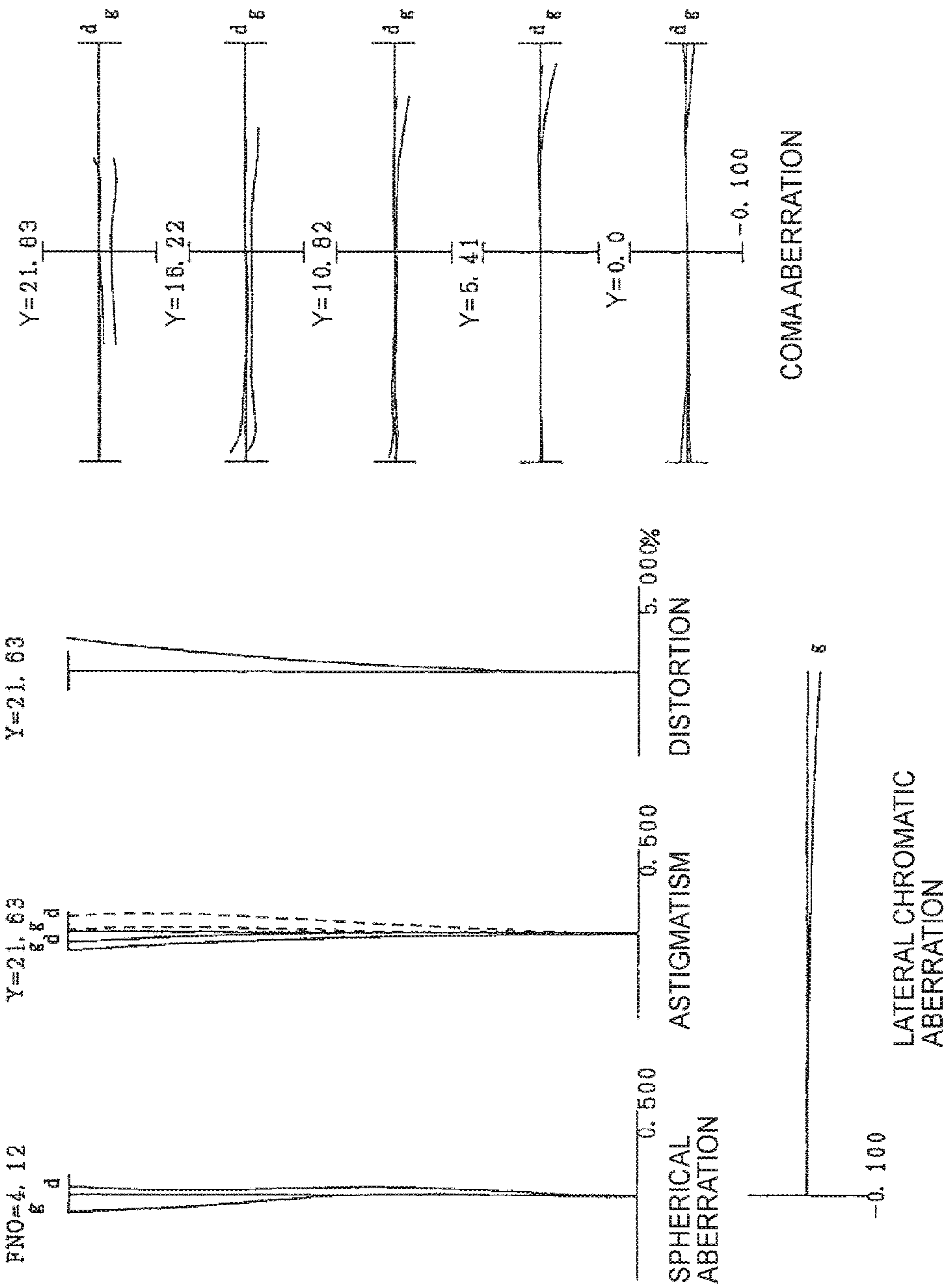

FIGS. 173A, 173B, and 173C are graphs showing various aberrations of the zoom optical system according to Example 39 upon focusing on infinity respectively in the wide angle end state, the intermediate focal length state, and the telephoto end state.

Figure 174A:
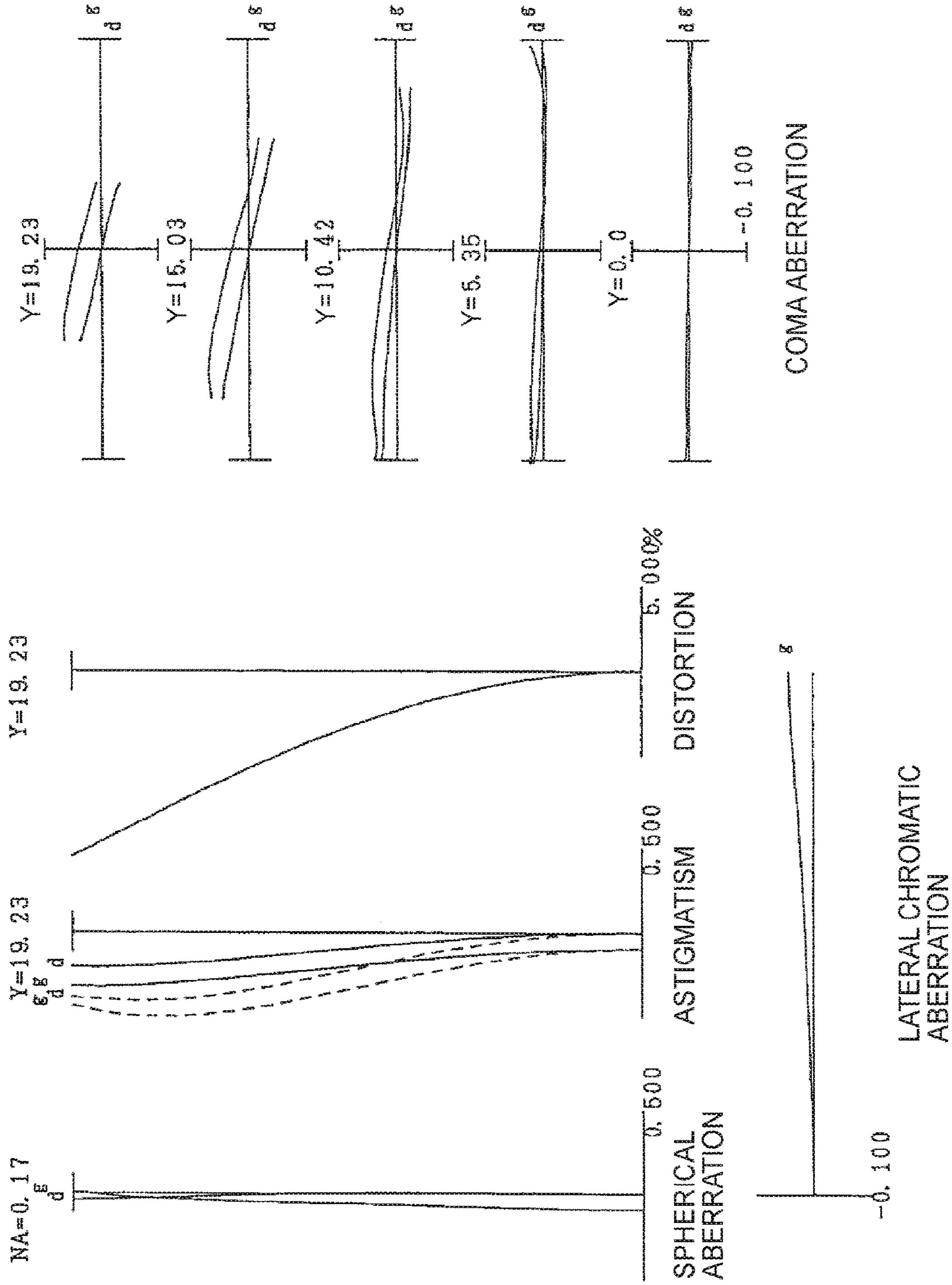
Figure 174B:
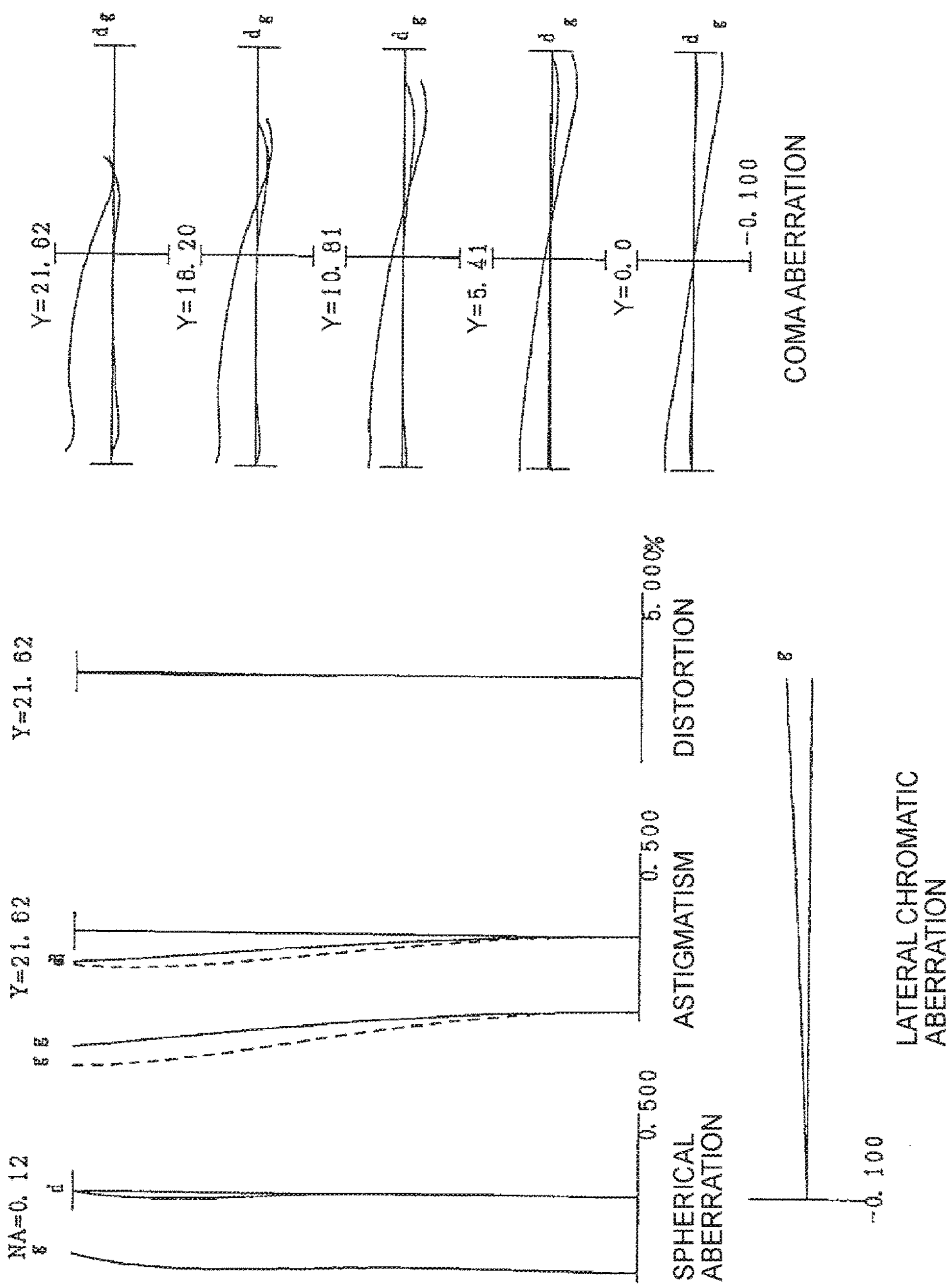
Figure 174C:
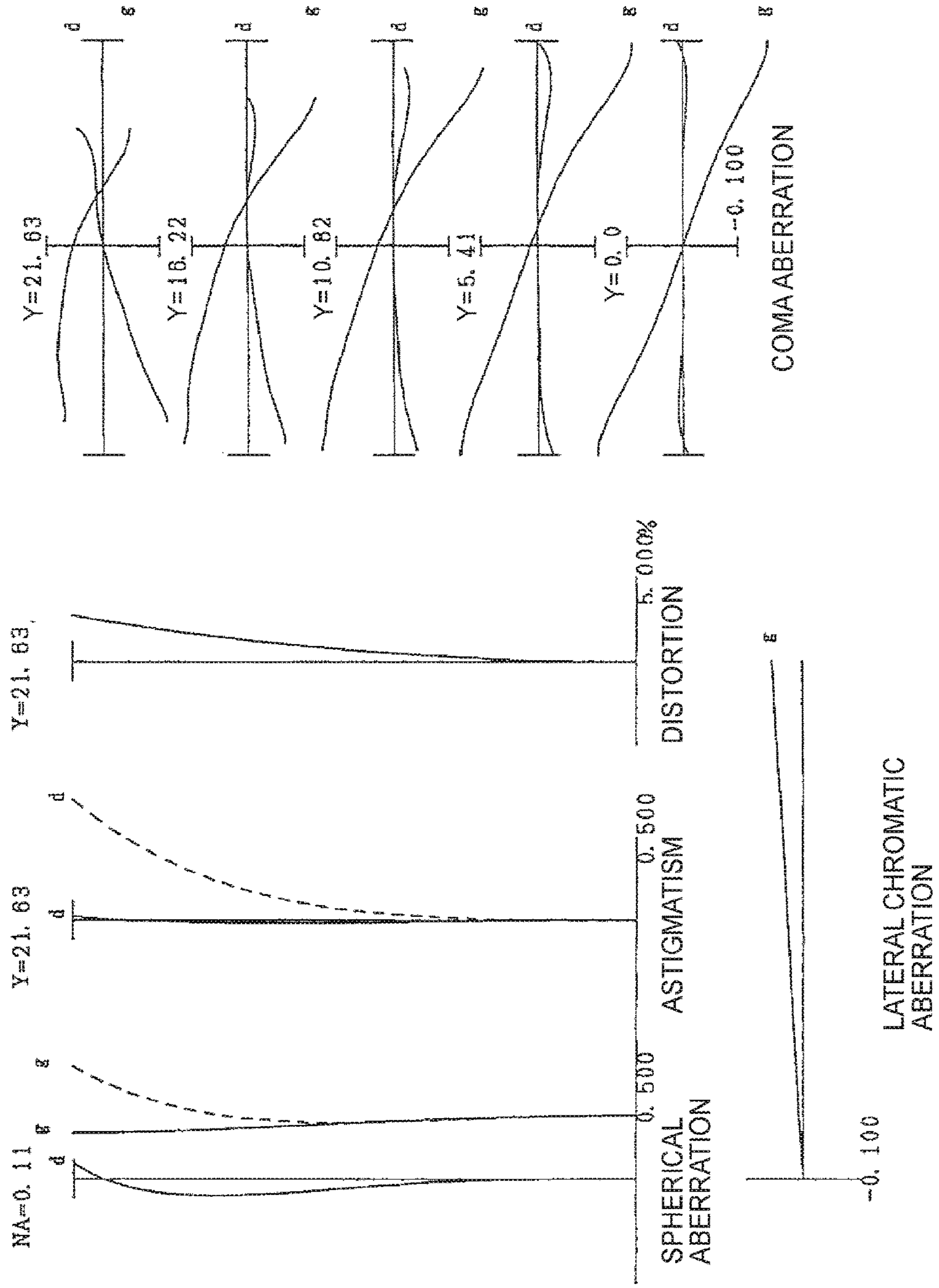

FIGS. 174A, 174B, and 174C are graphs showing various aberrations of the zoom optical system according to Example 39 upon focusing on a short distant object respectively in the wide angle end state, the intermediate focal length state, and the telephoto end state.

Figure 175A:
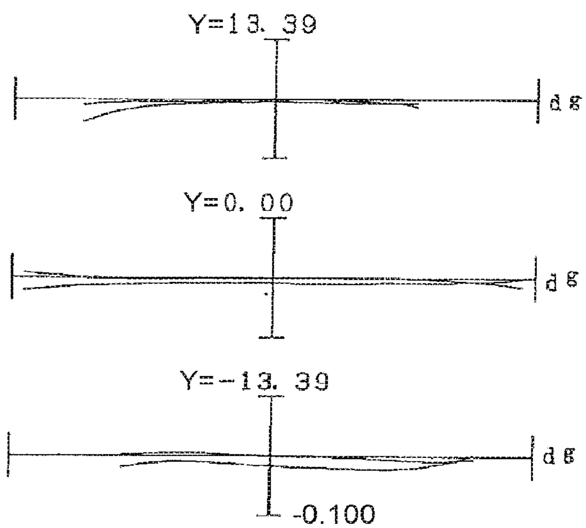
Figure 175B:
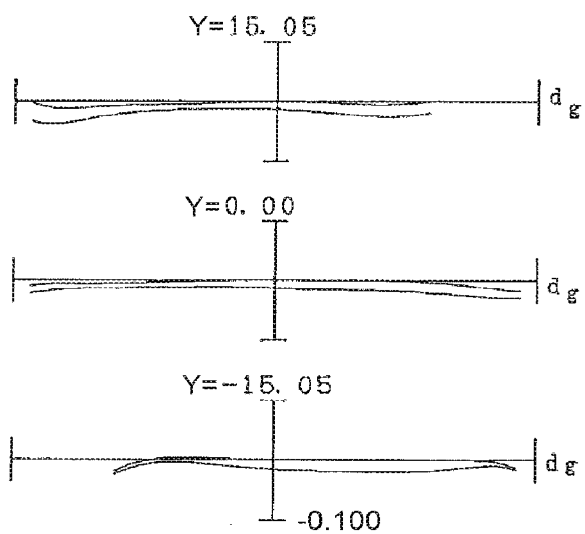
Figure 175C:
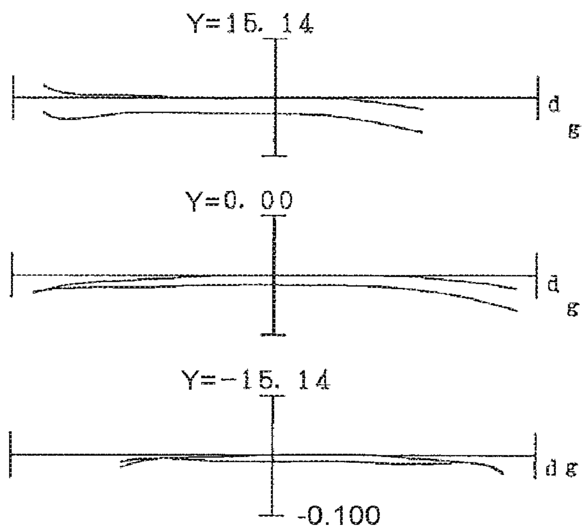

FIGS. 175A, 175B, and 175C are graphs showing coma aberrations of the zoom optical system according to Example 39 upon focusing on infinity with image blur correction performed, respectively in the wide angle end state, the intermediate focal length state, and the telephoto end state.

Figure 176:
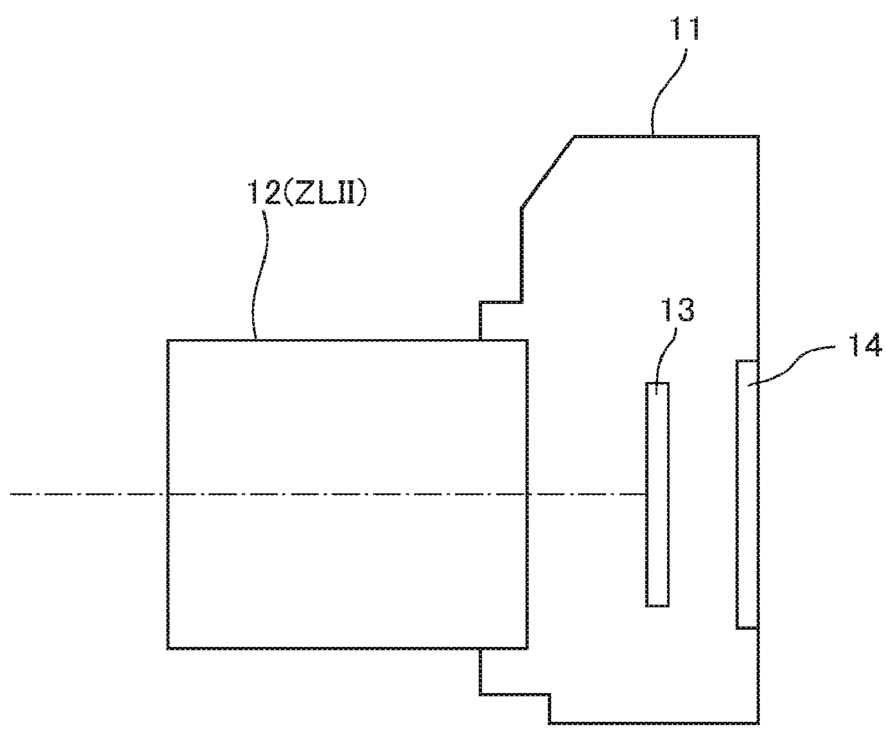

FIG. 176 is a diagram illustrating a configuration of a camera including a zoom optical system according to 11th to 14th embodiments.

Figure 177:
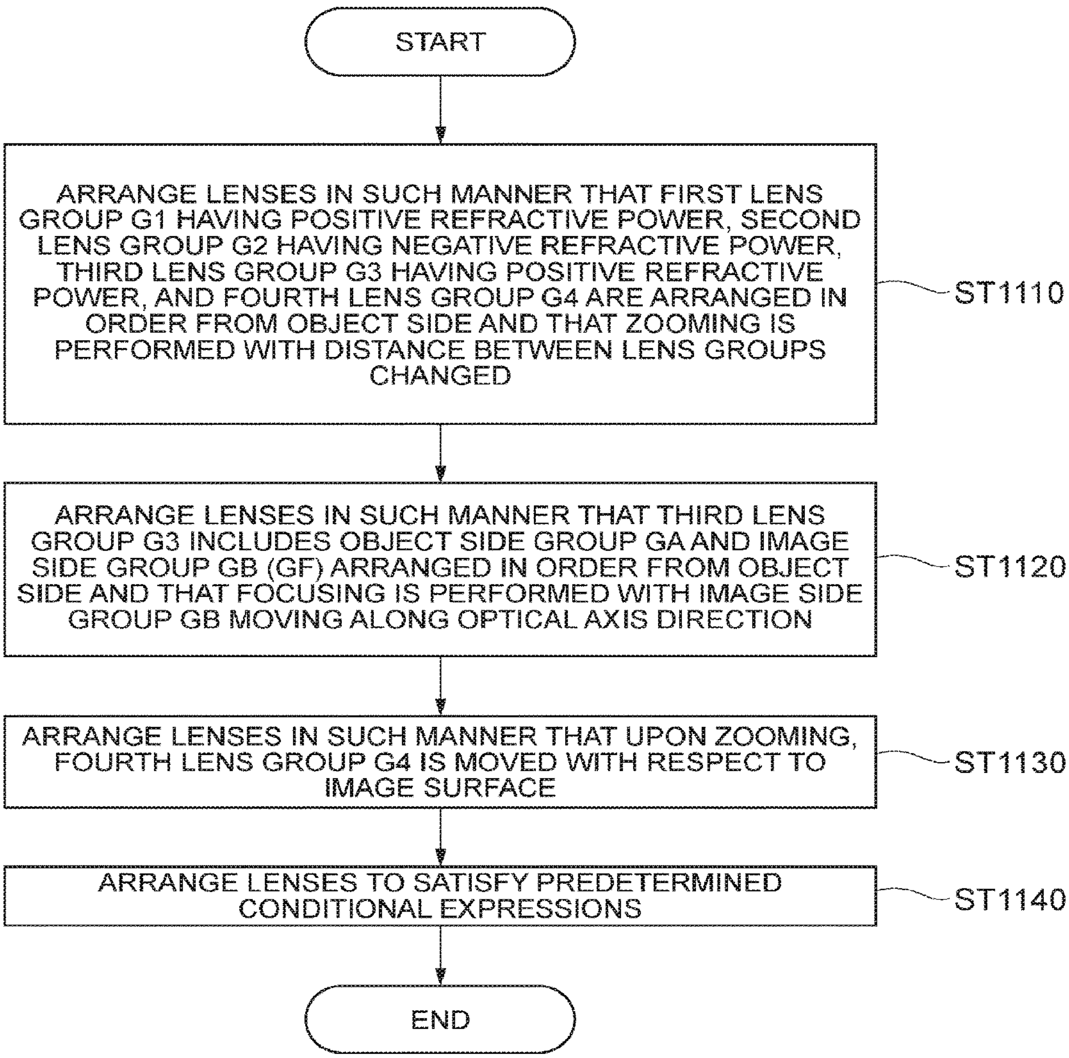

FIG. 177 is a diagram illustrating a method for manufacturing the zoom optical system according to the 11th embodiment.

Figure 178:
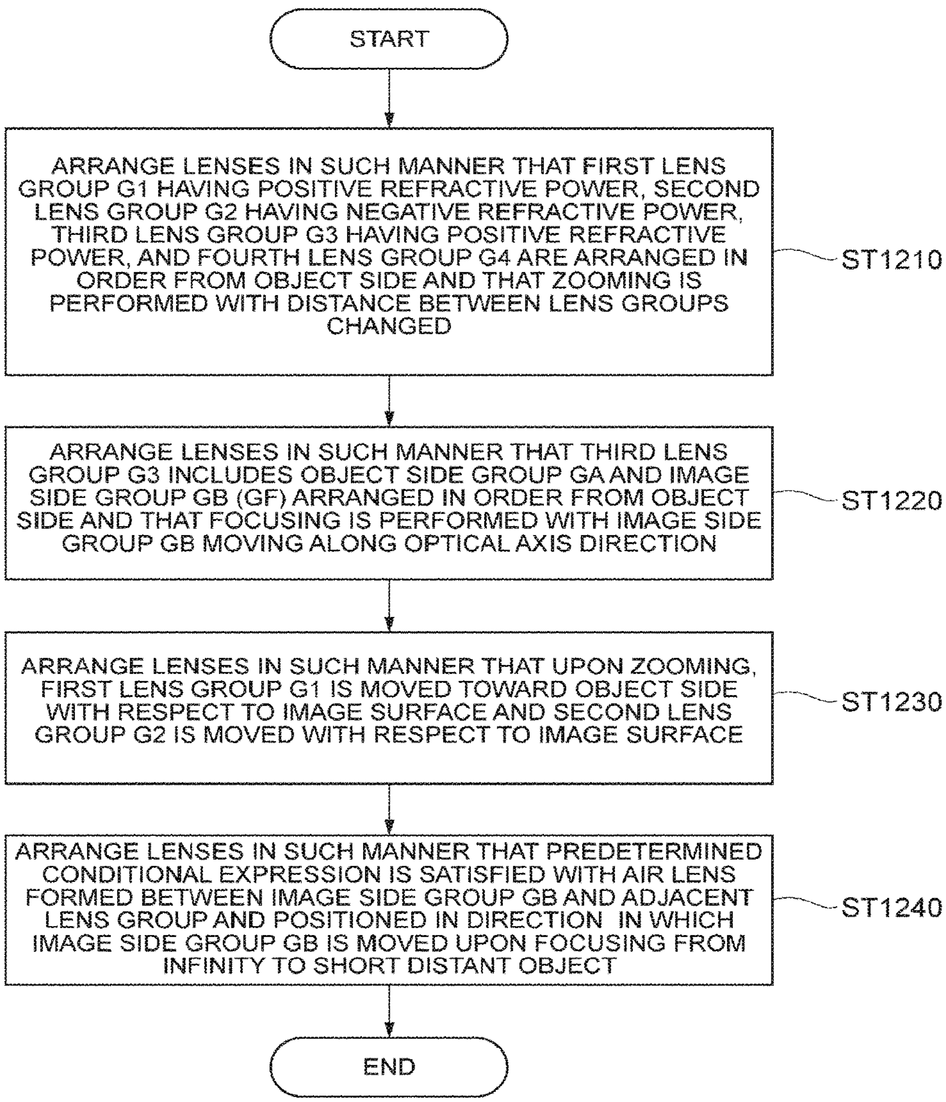

FIG. 178 is a diagram illustrating a method for manufacturing the zoom optical system according to the 12th embodiment.

Figure 179:
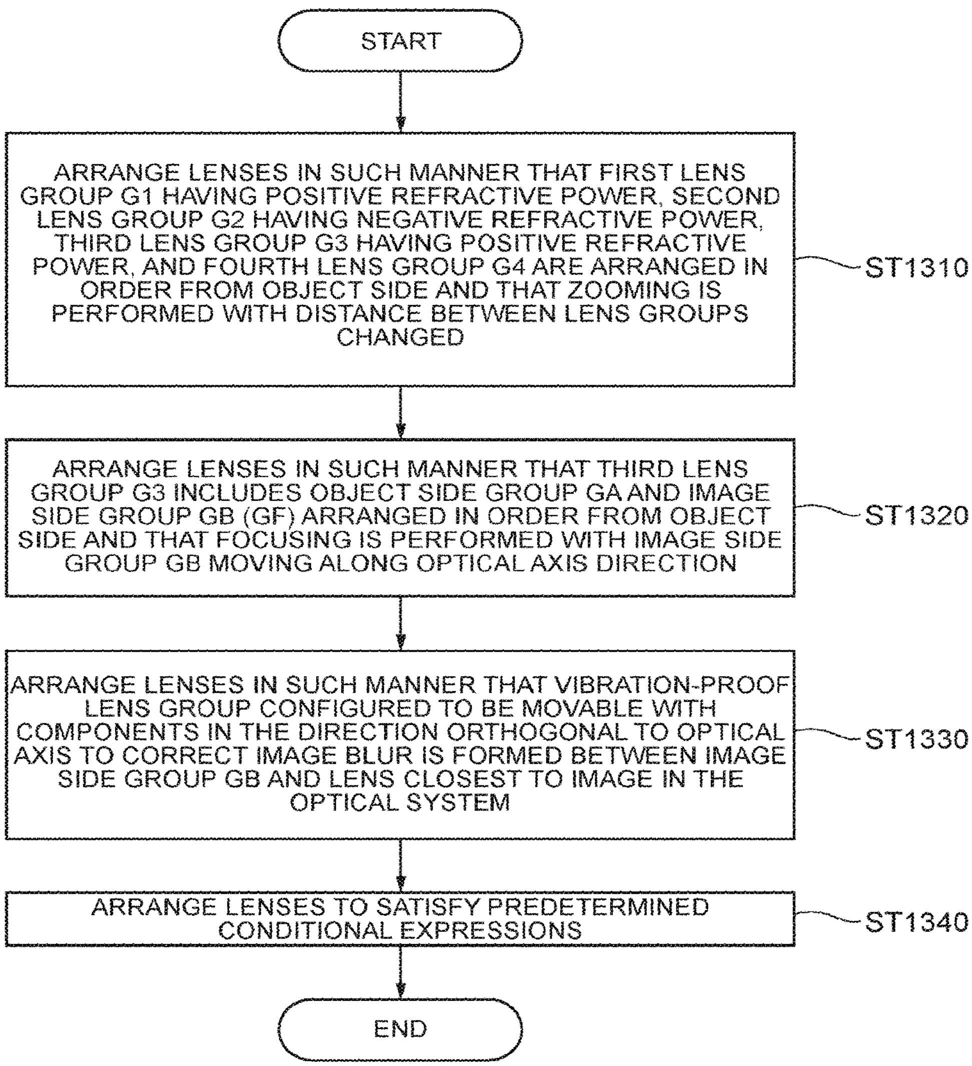

FIG. 179 is a diagram illustrating a method for manufacturing the zoom optical system according to the 13th embodiment.

Figure 180:
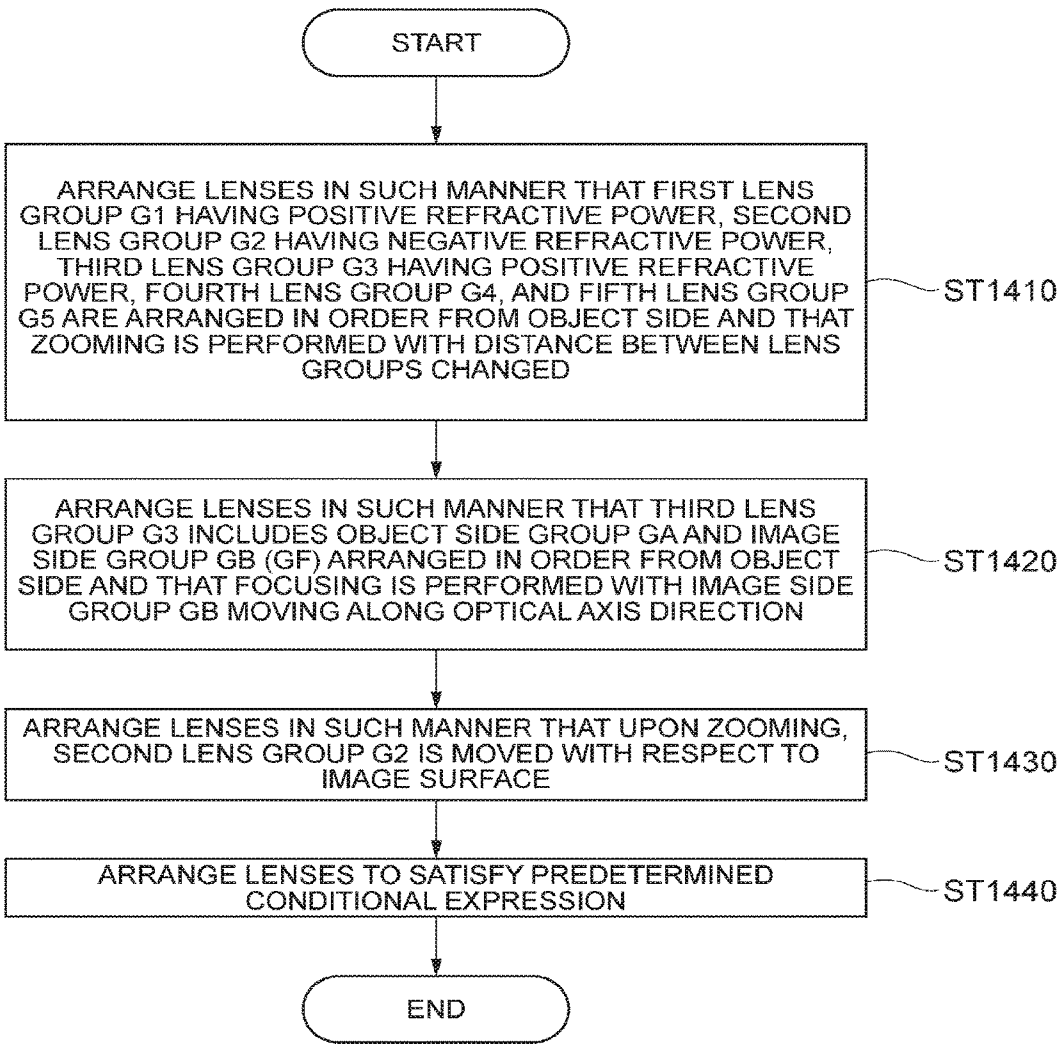

FIG. 180 is a diagram illustrating a method for manufacturing the zoom optical system according to the 14th embodiment.

DESCRIPTION OF THE EMBODIMENTS (1ST TO 10TH EMBODIMENTS)

In the description below, 1st to 10th embodiments are described with reference to drawings. A zoom optical system ZLI according to each of the embodiments includes a first lens group G1 having positive refractive power, a front-side lens group GX, an intermediate lens group GM having positive refractive power, and a rear-side lens group GR that are arranged in order from an object side. The front-side lens group GX is composed of one or more lens groups and has a negative lens group. At least part of the intermediate lens group GM is a focusing lens group GF. The rear-side lens group GR is composed of one or more lens groups. Upon zooming, the first lens group G1 is moved with respect to an image surface, the distance between the first lens group G1 and the front-side lens group GX is changed, the distance between the front-side lens group GX and the intermediate lens group GM is changed, and the distance between the intermediate lens group GM and the rear-side lens group GR is changed.

In the description of the 1st to the 10th embodiments below, a second lens group G2 is a lens group with a largest absolute value of refractive power in the negative lens group of the front-side lens group GX. A third lens group G3 is a lens group disposed closest to an image, in the front-side lens group GX. A fourth lens group G4 is the intermediate lens group GM at least partially including the focusing lens group GF. A fifth lens group G5 is a lens group disposed closest to an object, in the rear-side lens group GR. A sixth lens group G6 is a lens group disposed second closest to an object, in the rear-side lens group GR.

Figure 1:
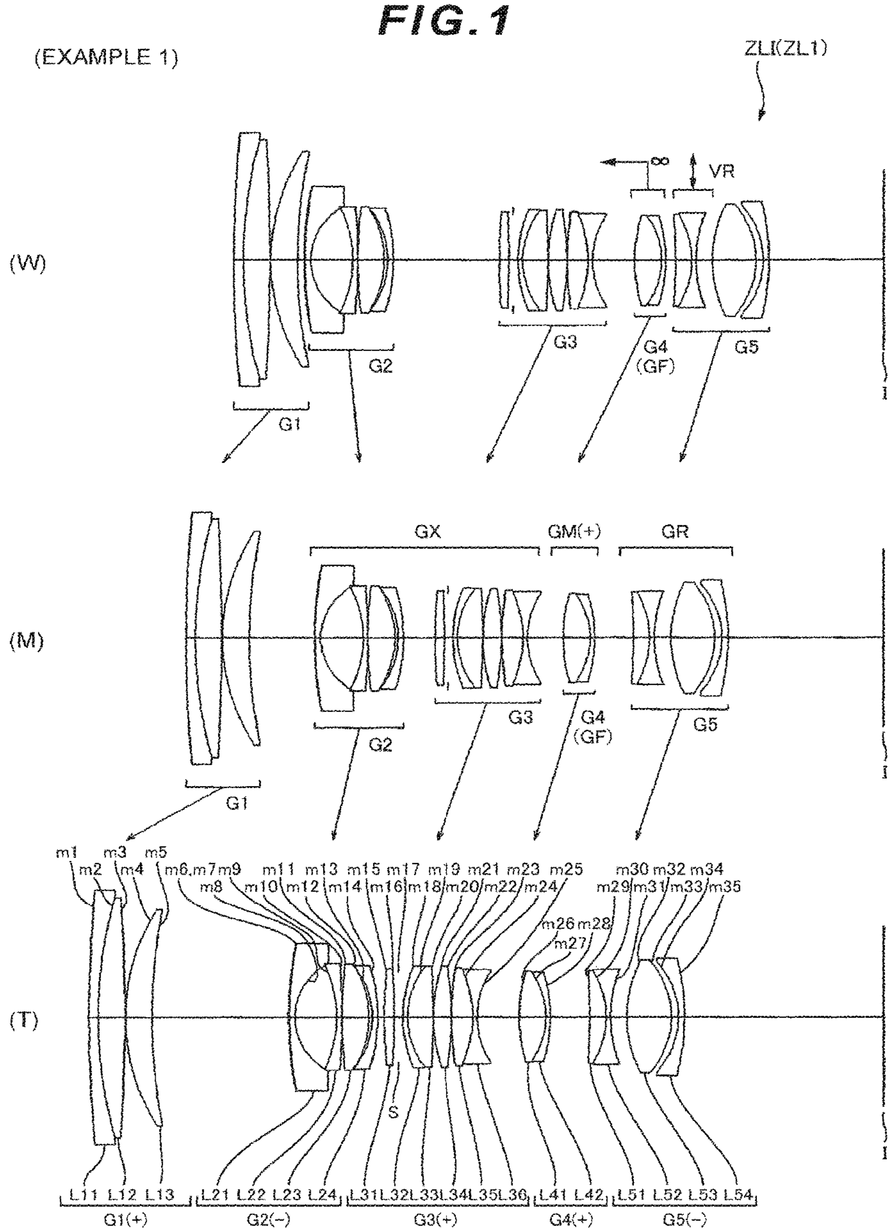
FIG. 1 is a cross-sectional view with sections (W), (M), and (T) showing a zoom optical system according to Example 1 respectively in a wide angle end state, an intermediate focal length state, and a telephoto end state.

The 1st embodiment is described below with reference to drawings. The zoom optical system ZLI (ZL1) according to the 1st embodiment includes, as illustrated in FIG. 1, the first lens group G1 having positive refractive power, the second lens group G2 having negative refractive power, the third lens group G3 having positive refractive power, the fourth lens group G4 having positive refractive power, and the fifth lens group G5 that are arranged in order from the object side, and performs zooming by changing a distance between the lens groups. Upon zooming, the first lens group G1 is moved with respect to an image surface. Upon zooming from a wide angle end state to a telephoto end state, the fourth lens group G4 moves to the object side. Focusing is performed by moving at least part of the fourth lens group G4 as the focusing lens group GF in an optical axis direction. A forefront surface of the focusing lens group GF has a convex surface facing the object side.

With the above-described configuration including the first lens group G1 having positive refractive power, the second lens group G2 having negative refractive power, the third lens group G3 having positive refractive power, the fourth lens group G4 having positive refractive power, and the fifth lens group G5 and performing the zooming by changing a distance between the lens groups, downsizing and an excellent optical performance can be achieved. The configuration in which the first lens group G1 is moved with respect to an image surface upon zooming can achieve efficient zooming, and thus can achieve further downsizing and a higher performance. The configuration in which the fourth lens group G4 moves toward the object side with respect to the image surface upon zooming from the wide angle end state to the telephoto end state can reduce a spherical aberration. The configuration in which at least part of the fourth lens group G4 serves as the focusing lens group GF can reduce variation of image magnification, and variation of the spherical aberration and the curvature of field aberration upon focusing. The configuration in which the forefront surface of the focusing lens group GF (a lens surface of the fourth lens group G4 closest to an object) has the convex surface facing the object side can reduce variation of the spherical aberration.

The zoom optical system ZLI according to the 1st embodiment with the configuration described above satisfies the following conditional expressions (JA1) to (JA4).

$$0.430<|fF/fRF|<10.000 \quad \text{(JA1)}$$

$$0.420<(-fXn)/fXR<2.000 \quad \text{(JA2)}$$

$$0.010<fF/fW<8.000 \quad \text{(JA3)}$$

$$32.000\leq W\omega \quad \text{(JA4)}$$

where, fF denotes a focal length of the focusing lens group GF, fRF denotes a focal length of the lens group closest to an object in the rear-side lens group GR (the focal length of the fifth lens group G5), fXn denotes a focal length of a lens group with the largest absolute value of refractive power in a negative lens group of the front-side lens group GX (the focal length of the second lens group G2), fXR denotes a focal length of the lens group closest to an image in the front-side lens group GX (the focal length of the third lens group G3), fW denotes a focal length of the entire system in the wide angle end state, and Wω denotes a half angle of view in the wide angle end state.

The conditional expression (JA1) is for setting an appropriate value of the focal length of the focusing lens group GF and the focal length of the lens group closest to an object in the rear-side lens group GR (the focal length of the fifth lens group G5). A sufficient performance upon focusing on short-distant object can be achieved when the conditional expression (JA1) is satisfied.

A value higher than the upper limit value of the conditional expression (JA1) leads to a long focal length, that is, a large movement amount of the focusing lens group GF upon focusing, and thus results in large spherical aberration and curvature of field aberration. The large movement amount of the focusing lens group GF leads to a large entire length. Furthermore, the focal length of the fifth lens group G5 becomes short, and thus the fifth lens group G5 involves a large curvature of field aberration.

To guarantee the effects of the 1st embodiment, the upper limit value of the conditional expression (JA1) is preferably set to be 7.000. To more effectively guarantee the effects of the 1st embodiment, the upper limit value of the conditional expression (JA1) is preferably set to be 4.000. To more effectively guarantee the effects of the 1st embodiment, the upper limit value of the conditional expression (JA1) is preferably set to be 1.415. To more effectively guarantee the effects of the 1st embodiment, the upper limit value of the conditional expression (JA1) is preferably set to be 1.300.

A value lower than the lower limit value of the conditional expression (JA1) leads to a short focal length of the focusing lens group GF, and thus results in the focusing lens group GF involving large spherical aberration and curvature of field aberration.

To guarantee the effects of the 1st embodiment, the lower limit value of the conditional expression (JA1) is preferably set to be 0.475. To more effectively guarantee the effects of the 1st embodiment, the lower limit value of the conditional expression (JA1) is preferably set to be 0.520.

The conditional expression (JA2) is for setting an appropriate value of the focal length of a lens group with the largest absolute value of refractive power in a negative lens group of the front-side lens group GX (the focal length of the second lens group G2), and the focal length of the lens group closest to an image in the front-side lens group GX (the focal length of the third lens group G3). A sufficient performance upon focusing on infinity can be achieved when the conditional expression (JA2) is satisfied.

A value higher than the upper limit value of the conditional expression (JA2) leads to a short focal length of the third lens group G3, and thus results in the third lens group G3 involving a large spherical aberration.

To guarantee the effects of the 1st embodiment, the upper limit value of the conditional expression (JA2) is preferably set to be 1.500. To more effectively guarantee the effects of the 1st embodiment, the upper limit value of the conditional expression (JA2) is preferably set to be 1.000.

A value lower than the lower limit value of the conditional expression (JA2) leads to a short focal length of the second lens group G2, and thus results in the second lens group G2 involving large spherical aberration and curvature of field aberration.

To guarantee the effects of the 1st embodiment, the lower limit value of the conditional expression (JA2) is preferably set to be 0.424. To more effectively guarantee the effects of the 1st embodiment, the lower limit value of the conditional expression (JA2) is preferably set to be 0.428.

The conditional expression (JA3) is for setting an appropriate value of the focal length of the focusing lens group GF and the focal length of the entire system in the wide angle end state. A sufficient performance upon focusing on short-distant object can be achieved when the conditional expression (JA3) is satisfied.

A value higher than the upper limit value of the conditional expression (JA3) leads to a long focal length, that is, a large movement amount of the focusing lens group GF upon focusing, and thus results in large spherical aberration and curvature of field aberration. The large movement amount of the focusing lens group GF leads to a large entire length.

To guarantee the effects of the 1st embodiment, the upper limit value of the conditional expression (JA3) is preferably set to be 6.900. To more effectively guarantee the effects of the 1st embodiment, the upper limit value of the conditional expression (JA3) is preferably set to be 5.800.

A value lower than the lower limit value of the conditional expression (JA3) leads to a short focal length of the focusing lens group GF, and thus results in the focusing lens group GF involving large spherical aberration and curvature of field aberration.

To guarantee the effects of the 1st embodiment, the lower limit value of the conditional expression (JA3) is preferably set to be 0.550. To more effectively guarantee the effects of the 1st embodiment, the lower limit value of the conditional expression (JA3) is preferably set to be 1.100.

The conditional expression (JA4) is for setting an appropriate value of the half angle of view in the wide angle end state. A value lower than the lower limit value of the conditional expression (JA4) results in failure to successfully correct the curvature of field aberration and distortion with a wide angle of view achieved.

To guarantee the effects of the 1st embodiment, the lower limit value of the conditional expression (JA4) is preferably set to be 35.000. To more effectively guarantee the effects of the 1st embodiment, the lower limit value of the conditional expression (JA4) is preferably set to be 38.000.

Preferably, the zoom optical system ZLI according to the 1st embodiment satisfies the following conditional expression (JA5).

$$0.010 < fF/fXR < 3.400 \qquad \text{(JA5)}$$

where, fXR denotes a focal length of the lens group closest to an image in the front-side lens group GX (the focal length of the third lens group G3).

The conditional expression (JA5) is for setting an appropriate value of the focal length of the focusing lens group GF and the focal length of the lens group closest to an image in the front-side lens group GX (the focal length of the third lens group G3). A sufficient performance upon focusing on short-distant object can be achieved when the conditional expression (JA5) is satisfied.

A value higher than the upper limit value of the conditional expression (JA5) leads to a long focal length, that is, a large movement amount of the focusing lens group GF upon focusing, and thus results in large variation of spherical aberration and curvature of field aberration. The large movement amount of the focusing lens group GF leads to a large entire length. Furthermore, the focal length of the third lens group G3 becomes short, and thus, the third lens group G3 involves a large spherical aberration.

To guarantee the effects of the 1st embodiment, the upper limit value of the conditional expression (JA5) is preferably set to be 3.300. To more effectively guarantee the effects of the 1st embodiment, the upper limit value of the conditional expression (JA5) is preferably set to be 3.200.

A value lower than the lower limit value of the conditional expression (JA5) leads to a short focal length of the focusing lens group GF, and thus results in the focusing lens group GF involving large spherical aberration and curvature of field aberration.

To guarantee the effects of the 1st embodiment, the lower limit value of the conditional expression (JA5) is preferably set to be 0.300. To more effectively guarantee the effects of the 1st embodiment, the lower limit value of the conditional expression (JA5) is preferably set to be 0.650.

Preferably, the zoom optical system ZLI according to the 1st embodiment satisfies the following conditional expressions (JA6) and (JA7).

$$0.001<DXRFT/fF<1.500 \quad \text{(JA6)}$$

$$T\omega \leq 20.000 \quad \text{(JA7)}$$

where, DXRFT denotes a distance between a lens group closest to an image in the front-side lens group GX and the focusing lens group GF in the telephoto end state (a distance between the third lens group G3 and the focusing lens group GF in the telephoto end state), and Tω denotes a half angle of view in the telephoto end state.

The conditional expression (JA6) is for setting an appropriate value of the distance between the lens group closest to an image in the front-side lens group GX and the focusing lens group GF in the telephoto end state (the distance between the third lens group G3 and the focusing lens group GF in the telephoto end state) and the focal length of the focusing lens group GF. A sufficient performance upon focusing on short-distant object as well as downsizing can be achieved when the conditional expression (JA6) is satisfied.

A value higher than the upper limit value of the conditional expression (JA6) leads to a long distance between the third lens group G3 and the focusing lens group GF in the telephoto end state, and thus results in a large entire length. Furthermore, the value leads to a short focal length of the focusing lens group GF, and thus results in the focusing lens group GF involving large spherical aberration and curvature of field aberration.

To guarantee the effects of the 1st embodiment, the upper limit value of the conditional expression (JA6) is preferably set to be 0.800. To more effectively guarantee the effects of the 1st embodiment, the upper limit value of the conditional expression (JA6) is preferably set to be 0.400. To more effectively guarantee the effects of the 1st embodiment, the upper limit value of the conditional expression (JA6) is preferably set to be 0.230.

A value lower than the lower limit value of the conditional expression (JA6) leads to a short distance between the third lens group G3 and the focusing lens group GF in the telephoto end state, and thus results in a risk of collision between the third lens group G3 and the focusing lens group GF upon focusing. Furthermore, the value results in a long focal length, that is, a large movement amount of the focusing lens group GF upon focusing, and thus results in large variation of spherical aberration and curvature of field aberration. The large movement amount of the focusing lens group GF leads to a large entire length.

To guarantee the effects of the 1st embodiment, the lower limit value of the conditional expression (JA6) is preferably set to be 0.020. To more effectively guarantee the effects of the 1st embodiment, the lower limit value of the conditional expression (JA6) is preferably set to be 0.040. To more effectively guarantee the effects of the 1st embodiment, the lower limit value of the conditional expression (JA6) is preferably set to be 0.070. To more effectively guarantee the effects of the 1st embodiment, the lower limit value of the conditional expression (JA6) is preferably set to be 0.114. To more effectively guarantee the effects of the 1st embodiment, the lower limit value of the conditional expression (JA6) is preferably set to be 0.130.

The conditional expression (JA7) is for setting an appropriate value of the half angle of view in the telephoto end state. A value higher than the upper limit value of the conditional expression (JA7) results in a failure to successfully correct the spherical aberration in the telephoto end state.

To guarantee the effects of the 1st embodiment, the upper limit value of the conditional expression (JA7) is preferably set to be 18.000. To more effectively guarantee the effects of the 1st embodiment, the upper limit value of the conditional expression (JA7) is preferably set to be 16.000.

Preferably, the zoom optical system ZLI according to the 1st embodiment satisfies the following conditional expression (JA8).

$$0.100<DGXR/fXR<1.500 \quad \text{(JA8)}$$

where, DGXR denotes a thickness of the lens group closest to an image in the front-side lens group GX on an optical axis (the thickness of the third lens group G3 on the optical axis), and fXR denotes a focal length of the lens group closest to an image in the front-side lens group GX (the focal length of the third lens group G3).

The conditional expression (JA8) is for setting an appropriate value of the thickness of the lens group (the third lens group G3) closest to an image in the front-side lens group GX on an optical axis (that is, a distance between a lens surface closest to an object in the third lens group G3 and a lens surface closest to an image in the third lens group G3 on the optical axis) and the focal length of the lens group closest to an image in the front-side lens group GX (the focal length of the third lens group G3). A sufficient performance upon focusing on infinity as well as excellent performance in terms of brightness can be achieved when the conditional expression (JA8) is satisfied. Furthermore, downsizing of the entire system can be achieved.

A value higher than the upper limit value of the conditional expression (JA8) leads to a short focal length of the third lens group G3, and thus results in the third lens group G3 involving a large spherical aberration. Furthermore, the value leads to the third lens group G3 with a larger thickness and thus results in a longer entire length.

To guarantee the effects of the 1st embodiment, the upper limit value of the conditional expression (JA8) is preferably set to be 1.200. To more effectively guarantee the effects of the 1st embodiment, the upper limit value of the conditional expression (JA8) is preferably set to be 1.000.

A value lower than the lower limit value of the conditional expression (JA8) leads to a long focal length, that is, a large movement amount of the third lens group G3 upon zooming, and thus results in a large variation of the spherical aberration. Furthermore, the value leads to the third lens group G3 with a smaller thickness and thus more simple configuration, and thus results in the third lens group G3 involving a large spherical aberration.

To guarantee the effects of the 1st embodiment, the lower limit value of the conditional expression (JA8) is preferably set to be 0.250. To more effectively guarantee the effects of the 1st embodiment, the lower limit value of the conditional expression (JA8) is preferably set to be 0.350.

Preferably, in the zoom optical system ZLI according to the 1st embodiment, the second lens group G2 is moved with respect to the image surface upon zooming.

The configuration can reduce variation of the spherical aberration and the curvature of field aberration upon zooming. Furthermore, efficient zooming, leading to downsizing of the optical system, can be achieved.

Preferably, in the zoom optical system ZLI according to the 1st embodiment, the third lens group G3 is moved with respect to the image surface upon zooming.

The configuration can reduce variation of the spherical aberration upon zooming. Furthermore, efficient zooming, leading to downsizing of the optical system, can be achieved.

Preferably, in the zoom optical system ZLI according to the 1st embodiment, the fifth lens group G5 is moved with respect to the image surface upon zooming.

The configuration can reduce variation of the curvature of field aberration upon zooming. Furthermore, efficient zooming, leading to downsizing of the optical system, can be achieved.

As described above, the 1st embodiment can achieve the zoom optical system ZLI featuring a small size, small variation of image magnification upon focusing, and an excellent optical performance.

Figure 65:
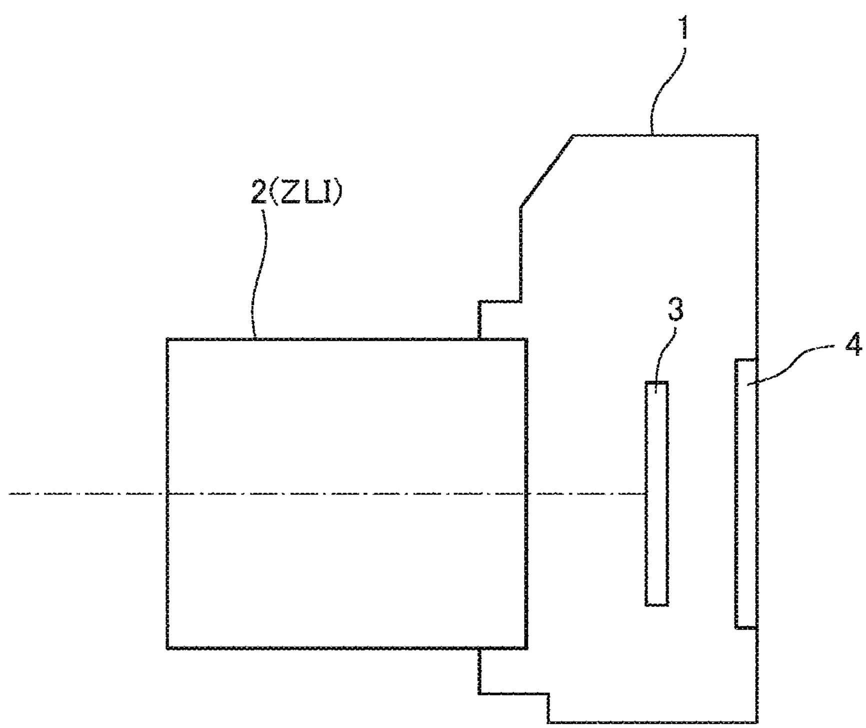
FIG. 65 is a diagram illustrating a configuration of a camera including a zoom optical system according to 1st to 10th embodiments.

Next, a camera (optical device) including the above-described zoom optical system ZLI described above will be described with reference to FIG. 65. As illustrated in FIG. 65, this camera 1 is a lens interchangeable camera (what is known as a mirrorless camera) including the above-described zoom optical system ZLI as an imaging lens 2. In the camera 1, light from an unillustrated object (subject) is collected by the imaging lens 2 and passes through an unillustrated optical low pass filter (OLPF) to be a subject image formed on an imaging plane of an imaging unit 3. Then, the subject image is photoelectrically converted into an image of the subject by a photoelectric conversion element on the imaging unit 3. The image is displayed on an Electronic view finder (EVF) 4 provided to the camera 1. Thus, a photographer can monitor the subject through the EVF 4. When the photographer presses an unillustrated release button, the image of the subject generated by the imaging unit 3 is stored in an unillustrated memory. In this manner, the photographer can capture an image of a subject with the camera 1.

The zoom optical system ZLI according to the 1st embodiment, installed in the camera 1 as the imaging lens 2, features a small size, small variation of image magnification upon focusing, and an excellent optical performance, due to its characteristic lens configuration as can be seen in Examples described later. Thus, an optical device featuring a small size, small variation of image magnification upon focusing, and an excellent optical performance can be achieved with the camera 1.

The 1st embodiment is described with the mirrorless camera as an example, but this should not be construed in a limiting sense. For example, similar or the same effects as the camera 1 can be obtained with the above-described zoom optical system ZLI installed in a single lens reflex camera in which a quick return mirror is provided to a camera main body and a subject is monitored with a view finder optical system.

Figure 66:
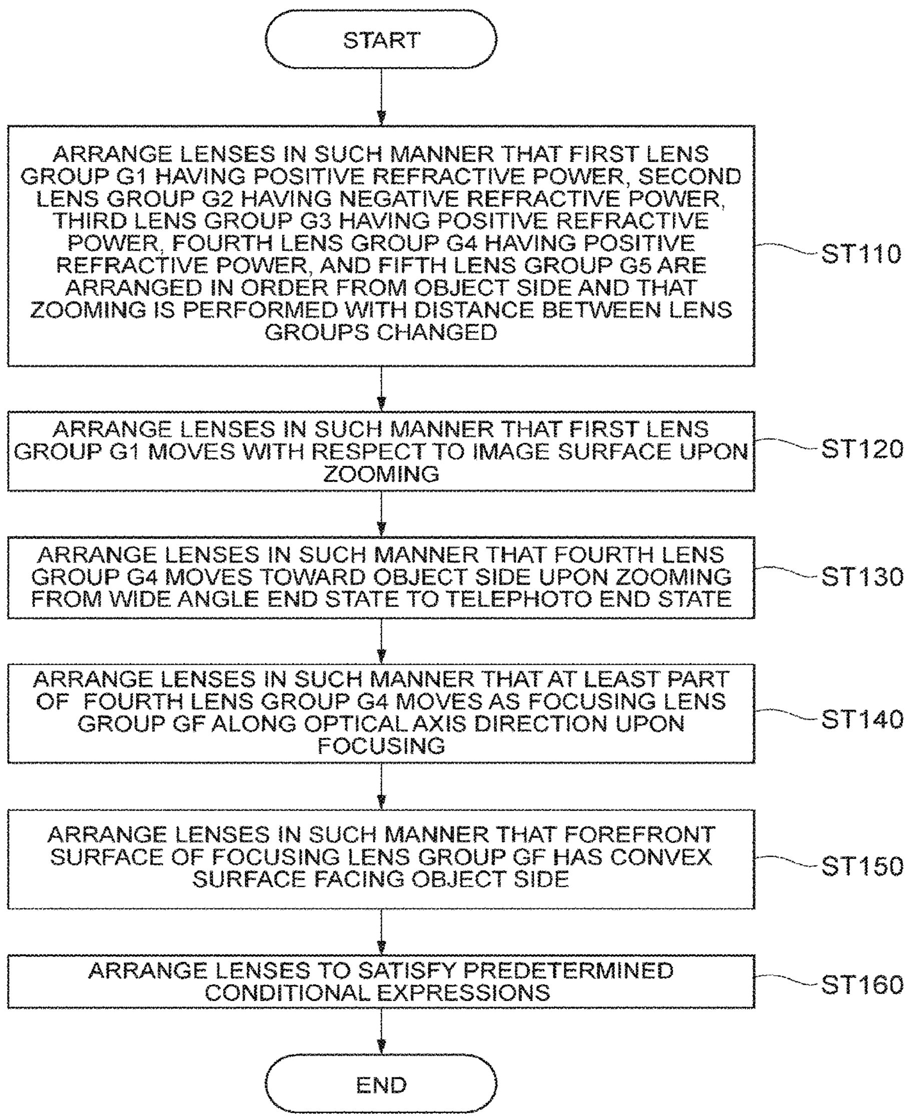
FIG. 66 is a diagram illustrating a method for manufacturing the zoom optical system according to the 1st embodiment.

Next, a method for manufacturing the above-described zoom optical system ZLI (ZL1) will be described with reference to FIG. 66. First of all, lenses are arranged in such a manner that the first lens group G1 having positive refractive power, the second lens group G2 having negative refractive power, the third lens group G3 having positive refractive power, the fourth lens group G4 having positive refractive power, and the fifth lens group G5 are arranged in a barrel in order from the object side and that the zooming is performed with the distance between the lens groups changed (step ST110). The lenses are arranged in such a manner that the first lens group G1 is moved with respect to the image surface upon zooming (step ST120). The lenses are arranged in such a manner that at least part of the fourth lens group G4 moves toward the object side upon zooming from the wide angle end state to the telephoto end state (step ST130). The lenses are arranged in such a manner that the fourth lens group G4 moves as the focusing lens group GF in the optical axis direction upon focusing (step ST140). The lenses are arranged in such a manner that the forefront surface of the focusing lens group GF has a convex surface facing the object side (step ST150). The lenses are arranged to satisfy the following conditional expressions (JA1) to (JA4) (step ST160).

$$0.430<|fF/fRF|<10.000 \quad \text{(JA1)}$$

$$0.420<(-fXn)/fXR<2.000 \quad \text{(JA2)}$$

$$0.010<fF/fW<8.000 \quad \text{(JA3)}$$

$$32.000\leq W\omega \quad \text{(JA4)}$$

where, fF denotes a focal length of the focusing lens group GF, fRF denotes a focal length of the lens group closest to an object in the rear-side lens group GR (the focal length of the fifth lens group G5), fXn denotes a focal length of a lens group with the largest absolute value of refractive power in a negative lens group of the front-side lens group GX (the focal length of the second lens group G2), fXR denotes a focal length of the lens group closest to an image in the front-side lens group GX (the focal length of the third lens group G3), fW denotes a focal length of the entire system in the wide angle end state, and Wω denotes a half angle of view in the wide angle end state.

In one example of the lens arrangement according to the 1st embodiment, as illustrated in FIG. 1, the first lens group G1 including a cemented lens including a negative meniscus lens L11 having a concave surface facing the image surface side and a biconvex lens L12, and a positive meniscus lens L13 having a convex surface facing the object side, the second lens group G2 including a negative meniscus lens L21 having a concave surface facing the image surface side, a negative meniscus lens L22 having a concave surface facing the object side, a biconvex lens L23, and a negative meniscus lens L24 having a concave surface facing the object side, the third lens group G3 including a biconvex lens L31, an aperture stop S, a cemented lens including a negative meniscus lens L32 having a concave surface facing the image surface side and a biconvex lens L33, a biconvex lens L34, and a cemented lens including a biconvex lens L35 and a biconcave lens L36, the fourth lens group G4 including a cemented lens including a biconvex lens L41 and a negative meniscus lens L42 having a concave surface facing the object side, and the fifth lens group G5 including a cemented lens including a positive meniscus lens L51 having a convex surface facing the image surface side and a biconcave lens L52, a biconvex lens L53, and a negative meniscus lens L54 having a concave surface facing the object side are arranged in order from the object side. The zoom optical system ZLI is manufactured with the lens groups thus arranged through the procedure described above.

With the manufacturing method according to the 1st embodiment, the zoom optical system ZLI featuring a small size, small variation of image magnification upon focusing, and an excellent optical performance can be manufactured.

The 2nd embodiment is described below with reference to drawings. The zoom optical system ZLI (ZL1) according to the 2nd embodiment includes, as illustrated in FIG. 1, the first lens group G1 having positive refractive power, the second lens group G2 having negative refractive power, the third lens group G3 having positive refractive power, the fourth lens group G4 having positive refractive power, and the fifth lens group G5 that are arranged in order from the object side, and performs zooming by changing a distance between the lens groups. Upon zooming, the lenses move with respect to an image surface. Upon zooming from a wide angle end state to a telephoto end state, the fourth lens group G4 moves to the object side. Upon zooming from a wide angle end state to a telephoto end state, the distance between the fourth lens group G4 and the fifth lens group G5 increases. Focusing is performed by moving at least part of the fourth lens group G4 as the focusing lens group GF in the optical axis direction.

With the above-described configuration that includes the first lens group G1 having positive refractive power, the second lens group G2 having negative refractive power, the third lens group G3 having positive refractive power, the fourth lens group G4 having positive refractive power, and the fifth lens group G5, and performs the zooming by changing a distance between the lens groups, downsizing and an excellent optical performance can be achieved. The configuration in which the lens groups move with respect to an image surface upon zooming can achieve efficient zooming, and thus can achieve further downsizing and a higher performance. The configuration in which upon zooming from the wide angle end state to the telephoto end state, the distance between the fourth lens group G4 and the fifth lens group G5 increases with the fourth lens group G4 moving toward the object side with respect to the image surface can achieve efficient zooming and reduce the variation of the spherical aberration and the curvature of field aberration. The configuration in which at least part of the fourth lens group G4 serves as the focusing lens group GF can reduce variation of variation of image magnification, the spherical aberration, and the curvature of field aberration upon focusing.

Preferably, the zoom optical system ZLI according to the 2nd embodiment satisfies the following conditional expressions (JB1) and (JB3).

$$0.001<(DMRT-DMRW)/fF<1.000 \quad \text{(JB1)}$$

$$32.000\leq W\omega \quad \text{(JB2)}$$

$$T\omega\leq 20.000 \quad \text{(JB3)}$$

where, DMRW denotes a distance between the intermediate lens group GM and a lens group closest to an object in the rear-side lens group GR in the wide angle end state (a distance between the fourth lens group G4 and the fifth lens group G5 in the wide angle end state), DMRT denotes a distance between the intermediate lens group GM and a lens group closest to an object in the rear-side lens group GR in the telephoto end state (a distance between the fourth lens group G4 and the fifth lens group G5 in the telephoto end state), Wω denotes a half angle of view in the wide angle end state, and Tω denotes a half angle of view in the telephoto end state.

The conditional expression (JB1) is for setting an appropriate value of the difference in the distance between the intermediate lens group GM and a lens group closest to an object in the rear-side lens group GR (a distance between the fourth lens group G4 and the fifth lens group G5) between the wide angle end state and the telephoto end state, and the focal length of the focusing lens group GF. A sufficient performance upon focusing on short-distant object as well as downsizing can be achieved when the conditional expression (JB1) is satisfied.

A value higher than the upper limit value of the conditional expression (JB1) leads to a short focal length of the focusing lens group GF, and thus results in the focusing lens group GF involving large spherical aberration and curvature of field aberration.

To guarantee the effects of the 2nd embodiment, the upper limit value of the conditional expression (JB1) is preferably set to be 0.700. To more effectively guarantee the effects of the 2nd embodiment, the upper limit value of the conditional expression (JB1) is preferably set to be 0.400.

A value lower than the lower limit value of the conditional expression (JB1) results in a small difference in the distance between the fourth lens group G4 and the fifth lens group G5 between the wide angle end state and the telephoto end state, and thus leads to a less configuration in terms of zooming and a large entire length. Furthermore, the value leads to a long focal length, that is, a large movement amount of the focusing lens group GF upon focusing, and thus results in large variation of spherical aberration and curvature of field aberration. The large movement amount of the focusing lens group GF leads to a large entire length.

To guarantee the effects of the 2nd embodiment, the lower limit value of the conditional expression (JB1) is preferably set to be 0.010. To more effectively guarantee the effects of the 2nd embodiment, the lower limit value of the conditional expression (JB1) is preferably set to be 0.020.

The conditional expression (JB2) is for setting an appropriate value of the half angle of view in the wide angle end state. A value lower than the lower limit value of the conditional expression (JB2) results in failure to successfully correct the curvature of field aberration and distortion with a wide angle of view achieved.

To guarantee the effects of the 2nd embodiment, the lower limit value of the conditional expression (JB2) is preferably set to be 35.000. To more effectively guarantee the effects of the 2nd embodiment, the lower limit value of the conditional expression (JB2) is preferably set to be 38.000.

The conditional expression (JB3) is for setting an appropriate value of the half angle of view in the telephoto end state. A value higher than the upper limit value of the conditional expression (JB3) results in a failure to successfully correct the spherical aberration in the telephoto end state.

To guarantee the effects of the 2nd embodiment, the upper limit value of the conditional expression (JB3) is preferably set to be 18.000. To more effectively guarantee the effects of the 2nd embodiment, the upper limit value of the conditional expression (JB3) is preferably set to be 16.000.

Preferably, the zoom optical system ZLI according to the 2nd embodiment satisfies the following conditional expression (JB4).

$$-10.000<fF/fRF<10.000 \quad \text{(JB4)}$$

where, fF denotes a focal length of the focusing lens group GF, and fRF denotes a focal length of the lens group closest to an object in the rear-side lens group GR (the focal length of the fifth lens group G5).

The conditional expression (JB4) is for setting an appropriate value of the focal length of the focusing lens group GF and the focal length of the lens group closest to an object in the rear-side lens group GR (the focal length of the fifth lens group G5). A sufficient performance upon focusing on short-distant object can be achieved when the conditional expression (JB4) is satisfied.

A value higher than the upper limit value of the conditional expression (JB4) leads to a long focal length, that is, a large movement amount of the focusing lens group GF upon focusing, and thus results in large spherical aberration and curvature of field aberration. The large movement amount of the focusing lens group GF leads to a large entire length. Furthermore, the focal length of the fifth lens group G5 becomes short, and thus, the fifth lens group G5 involves a large curvature of field aberration.

To guarantee the effects of the 2nd embodiment, the upper limit value of the conditional expression (JB4) is preferably set to be 7.000. To more effectively guarantee the effects of the 2nd embodiment, the upper limit value of the conditional expression (JB4) is preferably set to be 4.000.

A value lower than the lower limit value of the conditional expression (JB4) leads to a long focal length, that is, a large movement amount of the focusing lens group GF upon focusing, and thus results in large spherical aberration and curvature of field aberration. The large movement amount of the focusing lens group GF leads to a large entire length. Furthermore, the focal length of the fifth lens group G5 becomes short, and thus, the fifth lens group G5 involves a large curvature of field aberration.

To guarantee the effects of the 2nd embodiment, the lower limit value of the conditional expression (JB4) is preferably set to be −7.000. To more effectively guarantee the effects of the 2nd embodiment, the lower limit value of the conditional expression (JB4) is preferably set to be −4.000. To more effectively guarantee the effects of the 2nd embodiment, the lower limit value of the conditional expression (JB4) is preferably set to be −0.750. To more effectively guarantee the effects of the 2nd embodiment, the lower limit value of the conditional expression (JB4) is preferably set to be −0.650.

Preferably, the zoom optical system ZLI according to the 2nd embodiment satisfies the following conditional expression (JB5).

$$0.010<fF/fXR<10.000 \quad \text{(JB5)}$$

where, fF denotes a focal length of the focusing lens group GF, and fXR: a focal length of the lens group closest to an image in the front-side lens group GX (the focal length of the third lens group G3).

The conditional expression (JB5) is for setting an appropriate value of the focal length of the focusing lens group GF and the focal length of the lens group closest to an image in the front-side lens group GX (the focal length of the third lens group G3). A sufficient performance upon focusing on short-distant object can be achieved when the conditional expression (JB5) is satisfied.

A value higher than the upper limit value of the conditional expression (JB5) leads to a long focal length, that is, a large movement amount of the focusing lens group GF upon focusing, and thus results in large variation of spherical aberration and curvature of field aberration. The large movement amount of the focusing lens group GF leads to a large entire length. Furthermore, the focal length of the third lens group G3 becomes short, and thus, the third lens group G3 involves a large spherical aberration.

To guarantee the effects of the 2nd embodiment, the upper limit value of the conditional expression (JB5) is preferably set to be 8.000. To more effectively guarantee the effects of the 2nd embodiment, the upper limit value of the conditional expression (JB5) is preferably set to be 6.000.

A value lower than the lower limit value of the conditional expression (JB5) leads to a short focal length of the focusing lens group GF, and thus results in the focusing lens group GF involving large spherical aberration and curvature of field aberration.

To guarantee the effects of the 2nd embodiment, the lower limit value of the conditional expression (JB5) is preferably set to be 0.300. To more effectively guarantee the effects of the 2nd embodiment, the lower limit value of the conditional expression (JB5) is preferably set to be 0.650.

Preferably, the zoom optical system ZLI according to the 2nd embodiment satisfies the following conditional expression (JB6).

$$0.100<DGXR/fXR<1.500 \quad \text{(JB6)}$$

where, DGXR denotes a thickness of the lens group closest to an image in the front-side lens group GX on the optical axis (the thickness of the third lens group G3 on the optical axis), and fXR denotes a focal length of the lens group closest to an image in the front-side lens group GX (the focal length of the third lens group G3).

The conditional expression (JB6) is for setting an appropriate value of the thickness of the lens group (the third lens group G3) closest to an image in the front-side lens group GX on an optical axis (that is, a distance between a lens surface closest to an object in the third lens group G3 and a lens surface closest to an image in the third lens group G3 on the optical axis) and the focal length of the lens group closest to an image in the front-side lens group GX (the focal length of the third lens group G3). A sufficient performance upon focusing on infinity as well as excellent performance in terms of brightness can be achieved when the conditional expression (JB6) is satisfied. Furthermore, downsizing of the entire system can be achieved.

A value higher than the upper limit value of the conditional expression (JB6) leads to a short focal length of the third lens group G3, and thus results in the third lens group G3 involving a large spherical aberration. Furthermore, the value leads to the third lens group G3 with a larger thickness and thus results in a longer entire length.

To guarantee the effects of the 2nd embodiment, the upper limit value of the conditional expression (JB6) is preferably set to be 1.200. To more effectively guarantee the effects of the 2nd embodiment, the upper limit value of the conditional expression (JB6) is preferably set to be 1.000.

A value lower than the lower limit value of the conditional expression (JB6) leads to a long focal length, that is, a large movement amount of the third lens group G3 upon zooming, and thus results in a large variation of the spherical aberration. Furthermore, the value leads to the third lens group G3 with a smaller thickness and thus more simple configuration, and thus results in the third lens group G3 involving a large spherical aberration.

To guarantee the effects of the 2nd embodiment, the lower limit value of the conditional expression (JB6) is preferably set to be 0.250. To more effectively guarantee the effects of the 2nd embodiment, the lower limit value of the conditional expression (JB6) is preferably set to be 0.350.

In the zoom optical system ZLI according to the 2nd embodiment, the third lens group G3 preferably includes the aperture stop S and a lens that is disposed next to and on an image side of the aperture stop S and has a convex surface facing the object side.

The configuration can reduce the spherical aberration generated upon zooming.

Preferably, in the zoom optical system ZLI according to the 2nd embodiment, upon zooming from the wide angle end state to the telephoto end state, the distance between the third lens group G3 and the fourth lens group G4 increases as it gets closer to the intermediate focal length state from the wide angle end state and decreases as it gets closer to the telephoto end state from the intermediate focal length state.

The configuration can reduce the curvature of field aberration generated upon zooming.

As described above, the 2nd embodiment can achieve the zoom optical system ZLI featuring a small size, small variation of image magnification upon focusing, and an excellent optical performance.

Next, a camera (optical device) 1 including the above-described zoom optical system ZLI will be described with reference to FIG. 65. This camera 1 is the same as that in the 1st embodiment the configuration of which has been described above, and thus will not be described herein.

The zoom optical system ZLI according to the 2nd embodiment, installed in the camera 1 as the imaging lens 2, features a small size, small variation of image magnification upon focusing, and an excellent optical performance, due to its characteristic lens configuration as can be seen in Examples described later. Thus, an optical device featuring a small size, small variation of image magnification upon focusing, and an excellent optical performance can be achieved with the camera 1.

The 2nd embodiment is described with the mirrorless camera as an example, but this should not be construed in a limiting sense. For example, similar or the same effects as the camera 1 can be obtained with the above-described zoom optical system ZLI installed in a single lens reflex camera in which a quick return mirror is provided to a camera main body and a subject is monitored with a view finder optical system.

Figure 67:
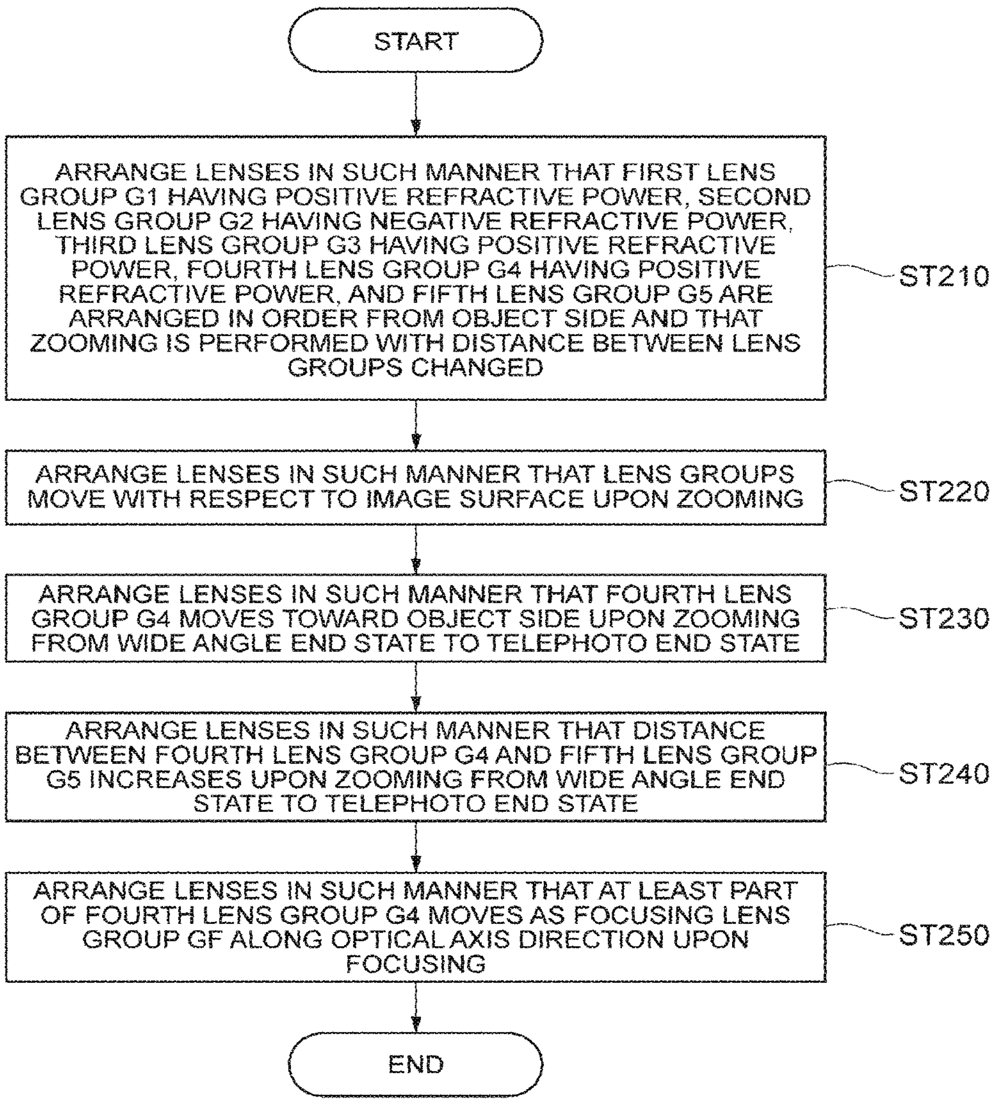
FIG. 67 is a diagram illustrating a method for manufacturing the zoom optical system according to the 2nd embodiment.

Next, a method for manufacturing the above-described zoom optical system ZLI (ZL1) will be described with reference to FIG. 67. First of all, lenses are arranged in such a manner that the first lens group G1 having positive refractive power, the second lens group G2 having negative refractive power, the third lens group G3 having positive refractive power, the fourth lens group G4 having positive refractive power, and the fifth lens group G5 are arranged in a barrel in order from the object side and that the zooming is performed with the distance between the lens groups changed (step ST210). The lenses are arranged in such a manner that the lens groups move with respect to the image surface upon zooming (step ST220). The lenses are arranged in such a manner that the fourth lens group G4 moves toward the object side upon zooming from the wide angle end state to the telephoto end state (step ST230). The lenses are arranged in such a manner that the distance between the fourth lens group G4 and the fifth lens group G5 increases upon zooming from the wide angle end state to the telephoto end state (step ST240). The lenses are arranged in such a manner that the at least part of the fourth lens group G4 moves as the focusing lens group GF in the optical axis direction upon focusing (step ST250).

In one example of the lens arrangement according to the 2nd embodiment, as illustrated in FIG. 1, the first lens group G1 including the cemented lens including the negative meniscus lens L11 having a concave surface facing the image surface side and the biconvex lens L12, and the positive meniscus lens L13 having a convex surface facing the object side, the second lens group G2 including the negative meniscus lens L21 having a concave surface facing the image surface side, the negative meniscus lens L22 having a concave surface facing the object side, the biconvex lens L23, and the negative meniscus lens L24 having a concave surface facing the object side, the third lens group G3 including the biconvex lens L31 the aperture stop S, the cemented lens including the negative meniscus lens L32 having a concave surface facing the image surface side and the biconvex lens L33, the biconvex lens L34, and the cemented lens including the biconvex lens L35 and the biconcave lens L36, the fourth lens group G4 including the cemented lens including the biconvex lens L41 and the negative meniscus lens L42 having a concave surface facing the object side, and the fifth lens group G5 including the cemented lens including a positive meniscus lens L51 having a convex surface facing the image surface side and the biconcave lens L52, the biconvex lens L53, and the negative meniscus lens L54 having a concave surface facing the object side are arranged in order from the object side. The zoom optical system ZLI is manufactured with the lens groups thus arranged through the procedure described above.

With the manufacturing method according to the 2nd embodiment, the zoom optical system ZLI featuring a small size, small variation of image magnification upon focusing, and an excellent optical performance can be manufactured.

Figure 5:
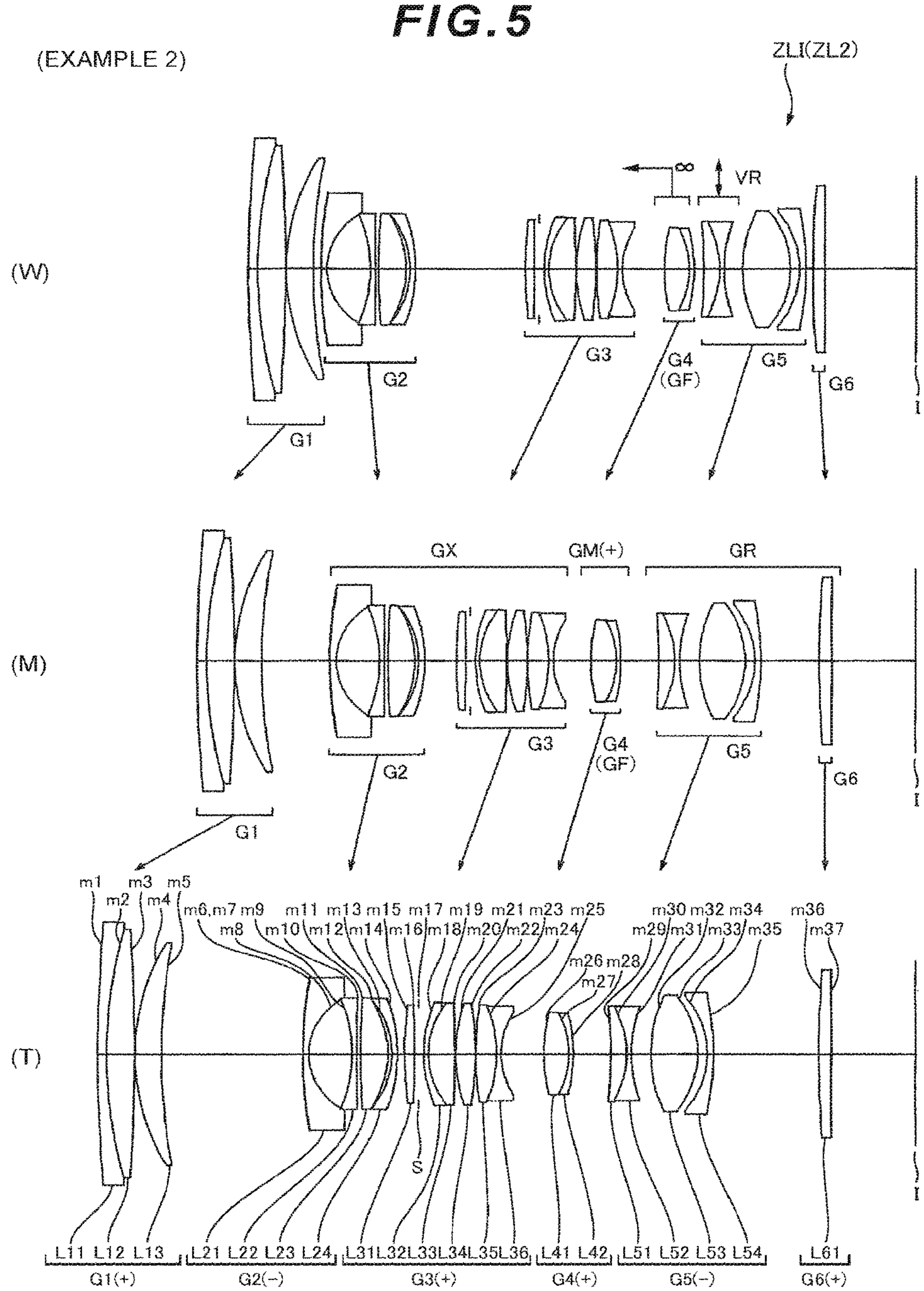
FIG. 5 is a cross-sectional view with sections (W), (M), and (T) showing a zoom optical system according to Example 2 respectively in a wide angle end state, an intermediate focal length state, and a telephoto end state.

The 3rd embodiment is described below with reference to drawings. The zoom optical system ZLI (ZL2) according to the 3rd embodiment includes, as illustrated in FIG. 5, the first lens group G1 having positive refractive power, the second lens group G2 having negative refractive power, the third lens group G3 having positive refractive power, the fourth lens group G4 having positive refractive power, the fifth lens group G5, and the sixth lens group G6 that are arranged in order from the object side, and performs zooming by changing a distance between the lens groups. Upon zooming, the first lens group G1 is moved with respect to an image surface. Upon zooming from a wide angle end state to a telephoto end state, the fourth lens group G4 moves to the object side. Upon zooming from a wide angle end state to a telephoto end state, the distance between the fourth lens group G4 and the fifth lens group G5 increases. Focusing is performed by moving at least part of the fourth lens group G4 as the focusing lens group GF in an optical axis direction.

With the above-described configuration that includes the first lens group G1 having positive refractive power, the second lens group G2 having negative refractive power, the third lens group G3 having positive refractive power, the fourth lens group G4 having positive refractive power, the fifth lens group G5, and the sixth lens group G6 and performs the zooming by changing a distance between the lens groups, downsizing and an excellent optical performance can be achieved. The configuration in which the first lens group G1 moves to an image surface upon zooming can achieve efficient zooming, and thus can achieve further downsizing and a higher performance. The configuration in which upon zooming from the wide angle end state to the telephoto end state, the distance between the fourth lens group G4 and the fifth lens group G5 increases with the fourth lens group G4 moved toward the object side with respect to the image surface can achieve efficient zooming and reduce variation of the spherical aberration and the curvature of field aberration. The configuration in which at least part of the fourth lens group G4 serves as the focusing lens group GF can reduce variation of the image magnification, the spherical aberration, and the curvature of field aberration upon focusing.

The zoom optical system ZLI according to the 3rd embodiment with the configuration described above satisfies the following conditional expressions (JC1) to (JC4).

$$0.170<|fF/fRF|<10.000 \quad \text{(JC1)}$$

$$0.010<(DMRT-DMRW)/fF<1.000 \quad \text{(JC2)}$$

$$32.000\leq W\omega \quad \text{(JC3)}$$

$$T\omega\leq 20.000 \quad \text{(JC4)}$$

where, fF denotes a focal length of the focusing lens group GF, fRF denotes a focal length of the lens group closest to an object in the rear-side lens group GR (the focal length of the fifth lens group G5), DMRW denotes a distance between the intermediate lens group GM and a lens group closest to an object in the rear-side lens group GR in the wide angle end state (a distance between the fourth lens group G4 and the fifth lens group G5 in the wide angle end state), DMRT denotes a distance between the intermediate lens group GM and a lens group closest to an object in the rear-side lens group GR in the telephoto end state (a distance between the fourth lens group G4 and the fifth lens group G5 in the telephoto end state), Wω denotes a half angle of view in the wide angle end state, and Tω denotes a half angle of view in the telephoto end state.

The conditional expression (JC1) is for setting an appropriate value of the focal length of the focusing lens group GF and the focal length of the lens group closest to an object in the rear-side lens group GR (the focal length of the fifth lens group G5). A sufficient performance upon focusing on short-distant object can be achieved when the conditional expression (JC1) is satisfied.

A value higher than the upper limit value of the conditional expression (JC1) leads to a long focal length, that is, a large movement amount of the focusing lens group GF upon focusing, and thus results in large spherical aberration and curvature of field aberration. The large movement amount of the focusing lens group GF leads to a large entire length. Furthermore, the focal length of the fifth lens group G5 becomes short, and thus, the fifth lens group G5 involves a large curvature of field aberration.

To guarantee the effects of the 3rd embodiment, the upper limit value of the conditional expression (JC1) is preferably set to be 7.000. To more effectively guarantee the effects of the 3rd embodiment, the upper limit value of the conditional expression (JC1) is preferably set to be 4.000.

A value lower than the lower limit value of the conditional expression (JC1) leads to a short focal length of the focusing lens group GF, and thus results in the focusing lens group GF involving large spherical aberration and curvature of field aberration.

To guarantee the effects of the 3rd embodiment, the lower limit value of the conditional expression (JC1) is preferably set to be 0.260. To more effectively guarantee the effects of the 3rd embodiment, the lower limit value of the conditional expression (JC1) is preferably set to be 0.350.

The conditional expression (JC2) is for setting an appropriate value of a difference in the distance between the intermediate lens group GM and a lens group closest to an object in the rear-side lens group GR (a distance between the fourth lens group G4 and the fifth lens group G5) between the wide angle end state and the telephoto end state, and the focal length of the focusing lens group GF. A sufficient performance upon focusing on short-distant object as well as downsizing can be achieved when the conditional expression (JC2) is satisfied.

A value higher than the upper limit value of the conditional expression (JC2) leads to a short focal length of the focusing lens group GF, and thus results in the focusing lens group GF involving large spherical aberration and curvature of field aberration.

To guarantee the effects of the 3rd embodiment, the upper limit value of the conditional expression (JC2) is preferably set to be 0.820. To more effectively guarantee the effects of the 3rd embodiment, the upper limit value of the conditional expression (JC2) is preferably set to be 0.640.

A value lower than the lower limit value of the conditional expression (JC2) results in a small difference in the distance between the fourth lens group G4 and the fifth lens group G5 between the wide angle end state and the telephoto end state, and thus leads to a less advantageous zooming and a large entire length. Furthermore, the value results in a long focal length, that is, a large movement amount of the focusing lens group GF upon focusing, and thus results in large variation of spherical aberration and curvature of field aberration. The large movement amount of the focusing lens group GF leads to a large entire length.

To guarantee the effects of the 3rd embodiment, the lower limit value of the conditional expression (JC2) is preferably set to be 0.016. To more effectively guarantee the effects of the 3rd embodiment, the lower limit value of the conditional expression (JC2) is preferably set to be 0.023. To more effectively guarantee the effects of the 3rd embodiment, the lower limit value of the conditional expression (JC2) is preferably set to be 0.027. To more effectively guarantee the effects of the 3rd embodiment, the lower limit value of the conditional expression (JC2) is preferably set to be 0.050.

The conditional expression (JC3) is for setting an appropriate value of the half angle of view in the wide angle end state. A value lower than the lower limit value of the conditional expression (JC3) results in failure to successfully the curvature of field aberration and distortion with a wide angle of view achieved.

To guarantee the effects of the 3rd embodiment, the lower limit value of the conditional expression (JC3) is preferably set to be 35.000. To more effectively guarantee the effects of the 3rd embodiment, the lower limit value of the conditional expression (JC3) is preferably set to be 38.000.

The conditional expression (JC4) is for setting an appropriate value of the half angle of view in the telephoto end state. A value higher than the upper limit value of the conditional expression (JC4) results in a failure to successfully correct the spherical aberration in the telephoto end state.

To guarantee the effects of the 3rd embodiment, the upper limit value of the conditional expression (JC4) is preferably set to be 18.000. To more effectively guarantee the effects of the 3rd embodiment, the upper limit value of the conditional expression (JC4) is preferably set to be 16.000.

Preferably, the zoom optical system ZLI according to the 3rd embodiment satisfies the following conditional expression (JC5).

$$-10.000<fRF/fRF2<10.000 \quad (JC5)$$

where, fRF denotes a focal length of the lens group closest to an object in the rear-side lens group GR (the focal length of the fifth lens group G5), and fRF2 denotes a focal length of the lens group second closest to an object in the rear-side lens group GR (the focal length of the sixth lens group G6).

The conditional expression (JC5) is for setting an appropriate value of the focal length of the lens group closest to an object in the rear-side lens group GR (the focal length of the fifth lens group G5) and the focal length of the lens group second closest to an object in the rear-side lens group GR (the focal length of the sixth lens group G6). A sufficient performance upon focusing on infinity can be achieved when the conditional expression (JC5) is satisfied.

A value higher than the upper limit value of the conditional expression (JC5) results in a short focal length of the sixth lens group G6, and thus leads to the fifth lens group G5 involving a large curvature of field aberration.

To guarantee the effects of the 3rd embodiment, the upper limit value of the conditional expression (JC5) is preferably set to be 5.000. To more effectively guarantee the effects of the 3rd embodiment, the upper limit value of the conditional expression (JC5) is preferably set to be 3.000. To more effectively guarantee the effects of the 3rd embodiment, the upper limit value of the conditional expression (JC5) is preferably set to be 2.500.

A value lower than the lower limit value of the conditional expression (JC5) results in a short focal length of the sixth lens group G6, and thus leads to the fifth lens group G5 involving a large curvature of field aberration.

To guarantee the effects of the 3rd embodiment, the lower limit value of the conditional expression (JC5) is preferably set to be −5.000. To more effectively guarantee the effects of the 3rd embodiment, the lower limit value of the conditional expression (JC5) is preferably set to be −3.000. To more effectively guarantee the effects of the 3rd embodiment, the lower limit value of the conditional expression (JC5) is preferably set to be −2.500.

Preferably, the zoom optical system ZLI according to the 3rd embodiment satisfies the following conditional expression (JC6).

$$0.100<DGXR/fXR<1.500 \quad (JC6)$$

where, DGXR denotes a thickness of the lens group closest to an image in the front-side lens group GX on an optical axis (the thickness of the third lens group G3 on the optical axis), and fXR denotes a focal length of the lens group closest to an image in the front-side lens group GX (the focal length of the third lens group G3).

The conditional expression (JC6) is for setting an appropriate value of the thickness of the lens group (the third lens group G3) closest to an image in the front-side lens group GX on the optical axis (that is, a distance between a lens surface closest to an object in the third lens group G3 and a lens surface closest to an image in the third lens group G3 on the optical axis) and the focal length of the lens group closest to an image in the front-side lens group GX (the focal length of the third lens group G3). A sufficient performance upon focusing on infinity as well as excellent performance in terms of brightness can be achieved when the conditional expression (JC6) is satisfied. Furthermore, downsizing of the entire system can be achieved.

A value higher than the upper limit value of the conditional expression (JC6) leads to a short focal length of the third lens group G3, and thus results in the third lens group G3 involving a large spherical aberration. Furthermore, the value leads to the third lens group G3 with a larger thickness and thus results in a longer entire length.

To guarantee the effects of the 3rd embodiment, the upper limit value of the conditional expression (JC6) is preferably set to be 1.200. To more effectively guarantee the effects of the 3rd embodiment, the upper limit value of the conditional expression (JC6) is preferably set to be 1.000.

A value lower than the lower limit value of the conditional expression (JC6) leads to a long focal length, that is, a large movement amount of the third lens group G3 upon zooming upon focusing, and thus results in a large variation of the spherical aberration. Furthermore, the value leads to the third lens group G3 with a smaller thickness and thus more simple configuration, and thus results in the third lens group G3 involving a large spherical aberration.

To guarantee the effects of the 3rd embodiment, the lower limit value of the conditional expression (JC6) is preferably set to be 0.250. To more effectively guarantee the effects of the 3rd embodiment, the lower limit value of the conditional expression (JC6) is preferably set to be 0.350.

Preferably, in the zoom optical system ZLI according to the 3rd embodiment the second lens group G2 is moved with respect to the image surface upon zooming.

The configuration can reduce variation of the spherical aberration and the curvature of field aberration upon zooming. Furthermore, efficient zooming, leading to downsizing of the optical system, can be achieved.

Preferably, in the zoom optical system ZLI according to the 3rd embodiment, the third lens group G3 is moved with respect to the image surface upon zooming.

The configuration can reduce variation of the spherical aberration upon zooming. Furthermore, efficient zooming, leading to downsizing of the optical system, can be achieved.

Preferably, in the zoom optical system ZLI according to the 3rd embodiment, the fifth lens group G5 is moved with respect to the image surface upon zooming.

The configuration can reduce variation of the curvature of field aberration upon zooming. Furthermore, efficient zooming, leading to downsizing of the optical system, can be achieved.

As described above, the 3rd embodiment can achieve the zoom optical system ZLI featuring a small size, small variation of image magnification upon focusing, and an excellent optical performance.

Next, a camera (optical device) 1 including the above-described zoom optical system ZLI will be described with reference to FIG. 65. This camera 1 is the same as that in the 1st embodiment the configuration of which has been described above, and thus will not be described herein.

The zoom optical system ZLI according to the 3rd embodiment, installed in the camera 1 as the imaging lens 2, features a small size, small variation of image magnification upon focusing, and an excellent optical performance, due to its characteristic lens configuration as can be seen in Examples described later. Thus, an optical device featuring a small size, small variation of image magnification upon focusing, and an excellent optical performance can be achieved with the camera 1.

The 3rd embodiment is described with the mirrorless camera as an example, but this should not be construed in a limiting sense. For example, similar or the same effects as the camera 1 can be obtained with the above-described zoom optical system ZLI installed in a single lens reflex camera in which a quick return mirror is provided to a camera main body and a subject is monitored with a view finder optical system.

Figure 68:
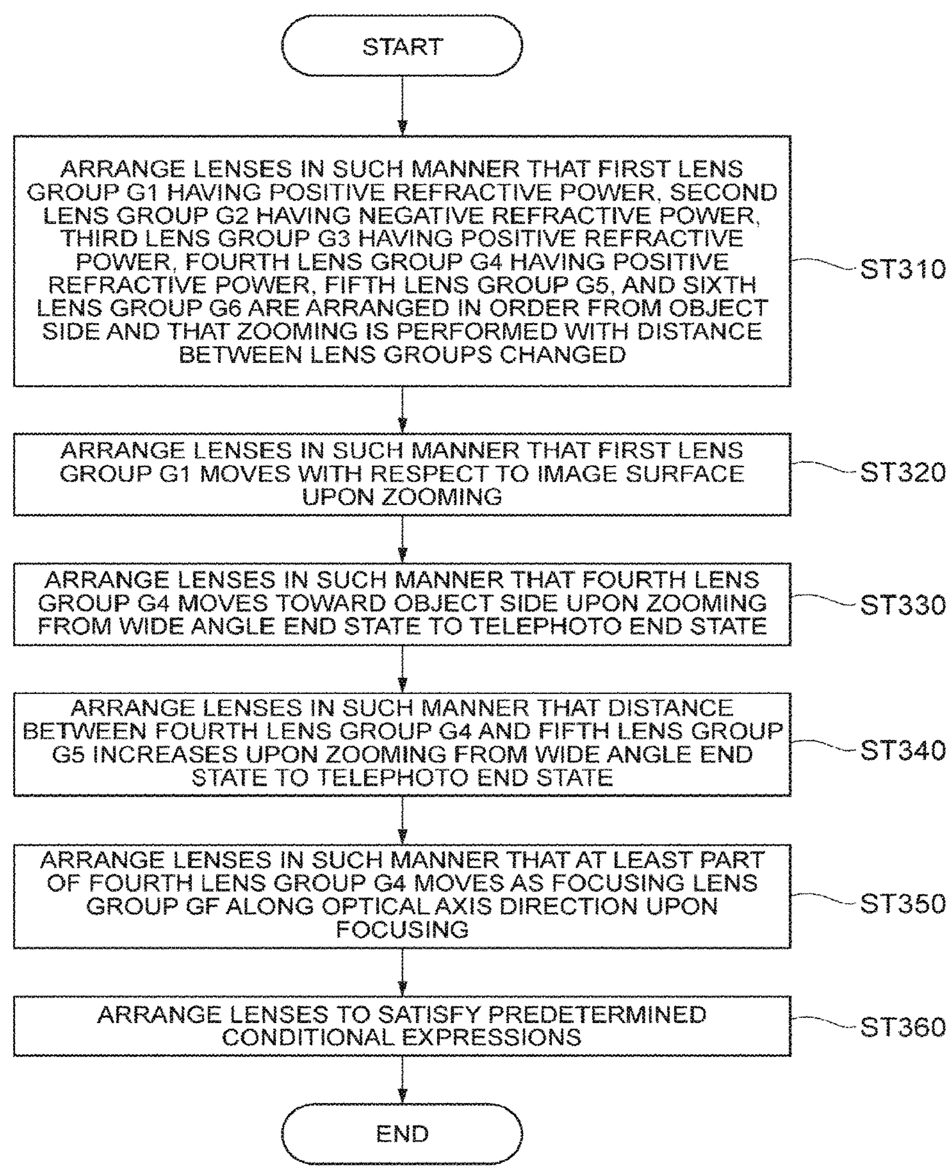
FIG. 68 is a diagram illustrating a method for manufacturing the zoom optical system according to the 3rd embodiment.

Next, a method for manufacturing the above-described zoom optical system ZLI (ZL2) will be described with reference to FIG. 68. First of all, lenses are arranged in such a manner that the first lens group G1 having positive refractive power, the second lens group G2 having negative refractive power, the third lens group G3 having positive refractive power, the fourth lens group G4 having positive refractive power, the fifth lens group G5, and the sixth lens group G6 are arranged in a barrel in order from the object side and that the zooming is performed with the distance between the lens groups changed (step ST310). The lenses are arranged in such a manner that the first lens group G1 is moved with respect to the image surface upon zooming (step ST320). The lenses are arranged in such a manner that the fourth lens group G4 moves toward the object side upon zooming from the wide angle end state to the telephoto end state (step ST330). The lenses are arranged in such a manner that the distance between the fourth lens group G4 and the fifth lens group G5 increases upon zooming from the wide angle end state to the telephoto end state (step ST340). The lenses are arranged in such a manner that the at least part of the fourth lens group G4 moves as the focusing lens group GF in the optical axis direction upon focusing (step ST350). The lenses are arranged to satisfy the following conditional expressions (JC1) to (JC4) (step ST360).

$$0.170<|fF/fRF|<10.000 \quad \text{(JC1)}$$

$$0.010<(DMRT-DMRW)/fF<1.000 \quad \text{(JC2)}$$

$$32.000\leq W\omega \quad \text{(JC3)}$$

$$T\omega\leq 20.000 \quad \text{(JC4)}$$

where, fF denotes a focal length of the focusing lens group GF, fRF denotes a focal length of the lens group closest to an object in the rear-side lens group GR (the focal length of the fifth lens group G5), DMRW denotes a distance between the intermediate lens group GM and a lens group closest to an object in the rear-side lens group GR in the wide angle end state (a distance between the fourth lens group G4 and the fifth lens group G5 in the wide angle end state), DMRT denotes a distance between the intermediate lens group GM and a lens group closest to an object in the rear-side lens group GR in the telephoto end state (a distance between the fourth lens group G4 and the fifth lens group G5 in the telephoto end state), Wω denotes a half angle of view in the wide angle end state, and Tω denotes a half angle of view in the telephoto end state.

In one example of the lens arrangement according to the 3rd embodiment, as illustrated in FIG. 5, the first lens group G1 including the cemented lens including the negative meniscus lens L11 having a concave surface facing the image surface side and the biconvex lens L12, and the positive meniscus lens L13 having a convex surface facing the object side, the second lens group G2 including the negative meniscus lens L21 having a concave surface facing the image surface side, a biconcave lens L22, the biconvex lens L23, and the negative meniscus lens L24 having a concave surface facing the object side, the third lens group G3 including the biconvex lens L31, the aperture stop S, the cemented lens including the negative meniscus lens L32 having a concave surface facing the image surface side and the biconvex lens L33, the biconvex lens L34, and the cemented lens including the biconvex lens L35 and the biconcave lens L36, the fourth lens group G4 including the cemented lens including the biconvex lens L41 and the negative meniscus lens L42 having a concave surface facing the object side, the fifth lens group G5 including the cemented lens including the positive meniscus lens L51 having a convex surface facing the image surface side and the biconcave lens L52, the biconvex lens L53, and the negative meniscus lens L54 having a concave surface facing the object side, and the sixth lens group G6 including a plano-convex lens L61 having a convex surface facing the object side are arranged in order from the object side. The zoom optical system ZLI is manufactured with the lens groups thus arranged through the procedure described above.

With the manufacturing method according to the 3rd embodiment, the zoom optical system ZLI featuring a small size, small variation of image magnification upon focusing, and an excellent optical performance can be manufactured.

The 4th embodiment is described below with reference to drawings. The zoom optical system ZLI (ZL1) according to the 4th embodiment includes, as illustrated in FIG. 1, the first lens group G1 having positive refractive power, the second lens group G2 having negative refractive power, the third lens group G3 having positive refractive power, the fourth lens group G4 having positive refractive power, and the fifth lens group G5 that are arranged in order from the object side, and performs zooming by changing a distance between the lens groups. Upon zooming, the first lens group G1 moves to an image surface. Focusing is performed by moving at least part of the fourth lens group G4 as the focusing lens group GF in an optical axis direction. A vibration-proof lens group VR is disposed closer to the image than the focusing lens group GF, and is configured to be movable with a displacement component in a direction orthogonal to the optical axis to correct image blur.

With the above-described configuration that includes the first lens group G1 having positive refractive power, the second lens group G2 having negative refractive power, the third lens group G3 having positive refractive power, the fourth lens group G4 having positive refractive power, and the fifth lens group G5, and performs the zooming by changing a distance between the lens groups, downsizing and an excellent optical performance can be achieved. The configuration in which the first lens group G1 moves to an image surface upon zooming can achieve efficient zooming, and thus can achieve further downsizing and a higher performance. The configuration in which at least part of the fourth lens group G4 serves as the focusing lens group GF can reduce variation of image magnification, and variation of the spherical aberration and the curvature of field aberration upon focusing. In the configuration in which the vibration-proof lens group VR is disposed closer to the image than the focusing lens group GF, decentering coma aberration and curvature of field aberration can be corrected upon image blur correction.

The zoom optical system ZLI according to the 4th embodiment with the configuration described above satisfies the following conditional expression (JD1).

$$-1.500<fV/fRF<0.645 \quad \text{(JD1)}$$

where, fV denotes a focal length of the vibration-proof lens group VR, and fRF denotes a focal length of the lens group closest to an object in the rear-side lens group GR (the focal length of the fifth lens group G5).

The conditional expression (JD1) is for setting an appropriate value of the focal length of the vibration-proof lens group VR and the focal length of the lens group closest to an object in the rear-side lens group GR (the focal length of the fifth lens group G5). A sufficient vibration-proof performance can be achieved when the conditional expression (JD1) is satisfied.

A value higher than the upper limit value of the conditional expression (JD1) results in a long focal length, that is, a large movement amount of the vibration-proof lens group VR upon image blur correction, making the decentering coma aberration and curvature of field aberration difficult to correct. The larger amount of the movement of the vibration-proof lens group VR leads to a larger diameter, rendering driving control for the vibration-proof lens group VR difficult. Furthermore, the focal length of the fifth lens group G5 becomes short, and thus, the fifth lens group G5 involves a large curvature of field aberration.

To guarantee the effects of the 4th embodiment, the upper limit value of the conditional expression (JD1) is preferably set to be 0.643. To more effectively guarantee the effects of the 4th embodiment, the upper limit value of the conditional expression (JD1) is preferably set to be 0.641.

A value lower than the lower limit value of the conditional expression (JD1) results in a long focal length, that is, a large movement amount of the vibration-proof lens group VR upon image blur correction, making the decentering coma aberration and curvature of field aberration difficult to correct. The larger amount of the movement of the vibration-proof lens group VR leads to a larger diameter, rendering driving control for the vibration-proof lens group VR difficult. Furthermore, the focal length of the fifth lens group G5 becomes short, and thus, the fifth lens group G5 involves a large curvature of field aberration.

To guarantee the effects of the 4th embodiment, the lower limit value of the conditional expression (JD1) is preferably set to be −1.081. To more effectively guarantee the effects of the 4th embodiment, the lower limit value of the conditional expression (JD1) is preferably set to be −0.662.

Preferably, the zoom optical system ZLI according to the 4th embodiment satisfies the following conditional expressions (JD2) and (JD3).

$$-1.000<DVW/fV<1.000 \quad \text{(JD2)}$$

$$32.000\leq W\omega \quad \text{(JD3)}$$

where, DVW denotes a distance between the vibration-proof lens group VR and a next lens in the wide angle end state, and Wω denotes a half angle of view in the wide angle end state.

The conditional expression (JD2) is for setting an appropriate value of the distance between the vibration-proof lens group VR and a next lens in the wide angle end state, and the focal length of the vibration-proof lens group VR. A sufficient vibration-proof performance can be achieved when the conditional expression (JD2) is satisfied.

A value higher than the upper limit value of the conditional expression (JD2) results in the distance being large making the decentering coma aberration and the curvature of field aberration generated at the vibration-proof lens group VR difficult to correct by the lenses after the vibration-proof lens group VR. Furthermore, the value results in a short focal length of the vibration-proof lens group VR, and thus leads to the vibration-proof lens group VR involving large decentering coma aberration and curvature of field aberration that are difficult to correct.

To guarantee the effects of the 4th embodiment, the upper limit value of the conditional expression (JD2) is preferably set to be 0.600. To more effectively guarantee the effects of the 4th embodiment, the upper limit value of the conditional expression (JD2) is preferably set to be 0.250.

A value lower than the lower limit value of the conditional expression (JD2) results in the distance being large making the decentering coma aberration and the curvature of field aberration generated at the vibration-proof lens group VR difficult to correct by a lens after the vibration-proof lens group VR. Furthermore, the value results in a short focal length of the vibration-proof lens group VR, and thus leads to the vibration-proof lens group VR involving large decentering coma aberration and curvature of field aberration that are difficult to correct.

To guarantee the effects of the 4th embodiment, the lower limit value of the conditional expression (JD2) is preferably set to be −0.750. To more effectively guarantee the effects of the 4th embodiment, the lower limit value of the conditional expression (JD2) is preferably set to be −0.400.

The conditional expression (JD3) is for setting an appropriate value of the half angle of view in the wide angle end state. A value lower than the lower limit value of the conditional expression (JD3) results in failure to successfully correct the curvature of field aberration and distortion with a wide angle of view achieved.

To guarantee the effects of the 4th embodiment, the lower limit value of the conditional expression (JD3) is preferably set to be 35.000. To more effectively guarantee the effects of the 4th embodiment, the lower limit value of the conditional expression (JD3) is preferably set to be 38.000.

Preferably, the zoom optical system according to the 4th embodiment satisfies the following conditional expression (JD4).

$$0.010<fF/fXR<10.000 \quad \text{(JD4)}$$

where, fF denotes a focal length of the focusing lens group GF, and fXR denotes a focal length of the lens group closest to an image in the front-side lens group GX (the focal length of the third lens group G3).

The conditional expression (JD4) is for setting an appropriate value of the focal length of the focusing lens group GF and the focal length of the lens group closest to an image in the front-side lens group GX (the focal length of the third lens group G3). A sufficient performance upon focusing on short-distant object can be achieved when the conditional expression (JD4) is satisfied.

A value higher than the upper limit value of the conditional expression (JD4) leads to a long focal length, that is, a large movement amount of the focusing lens group GF upon focusing, and thus results in large variation of spherical aberration and curvature of field aberration. The large movement amount of the focusing lens group GF leads to a large entire length. Furthermore, the focal length of the third lens group G3 becomes short, and thus, the third lens group G3 involves a large spherical aberration.

To guarantee the effects of the 4th embodiment, the upper limit value of the conditional expression (JD4) is preferably set to be 8.000. To more effectively guarantee the effects of the 4th embodiment, the upper limit value of the conditional expression (JD4) is preferably set to be 6.000.

A value lower than the lower limit value of the conditional expression (JD4) leads to a short focal length of the focusing lens group GF, and thus results in the focusing lens group GF involving large spherical aberration and curvature of field aberration.

To guarantee the effects of the 4th embodiment, the lower limit value of the conditional expression (JD4) is preferably set to be 0.300. To more effectively guarantee the effects of the 4th embodiment, the lower limit value of the conditional expression (JD4) is preferably set to be 0.650.

Preferably, the zoom optical system ZLI according to the 4th embodiment satisfies the following conditional expression (JD5).

$$0.010<(-fXn)/fXR<1.000 \quad \text{(JD5)}$$

where, fXn denotes a focal length of a lens group with the largest absolute value of refractive power in a negative lens group of the front-side lens group GX (the focal length of the second lens group G2), and fXR denotes a focal length of the lens group closest to an image in the front-side lens group GX (the focal length of the third lens group G3).

The conditional expression (JD5) is for setting an appropriate value of the focal length of a lens group with the largest absolute value of refractive power in a negative lens group of the front-side lens group GX (the focal length of the second lens group G2), and the focal length of the lens group closest to an image in the front-side lens group GX (the focal length of the third lens group G3). A sufficient performance upon focusing on infinity as well as downsizing of the entire system can be achieved when the conditional expression (JD5) is satisfied.

A value higher than the upper limit value of the conditional expression (JD5) results in a long focal length, that is, a large movement amount of the second lens group G2 upon focusing, leading to large variation of spherical aberration and curvature of field aberration. The larger movement amount of the second lens group G2 upon focusing leads to larger diameter and entire length. Furthermore, the focal length of the third lens group (G3) becomes short, and thus, the third lens group (G3) involves a large spherical aberration.

To guarantee the effects of the 4th embodiment, the upper limit value of the conditional expression (JD5) is preferably set to be 0.800. To more effectively guarantee the effects of the 4th embodiment, the upper limit value of the conditional expression (JD5) is preferably set to be 0.650.

A value lower than the lower limit value of the conditional expression (JD5) leads to a short focal length of the second lens group G2, and thus results in the second lens group G2 involving large spherical aberration and curvature of field aberration.

To guarantee the effects of the 4th embodiment, the lower limit value of the conditional expression (JD5) is preferably set to be 0.130. To more effectively guarantee the effects of the 4th embodiment, the lower limit value of the conditional expression (JD5) is preferably set to be 0.250.

Preferably, the zoom optical system ZLI according to the 4th embodiment satisfies the following conditional expression (JD6).

$$0.100<DGXR/fXR<1.500 \quad \text{(JD6)}$$

where, DGXR denotes a thickness of the lens group closest to an image in the front-side lens group GX on an optical axis (the thickness of the third lens group G3 on the optical axis), and fXR denotes a focal length of the lens group closest to an image in the front-side lens group GX (the focal length of the third lens group G3).

The conditional expression (JD6) is for setting an appropriate value of the thickness of the lens group (the third lens group G3) closest to an image in the front-side lens group GX on an optical axis (that is, a distance between a lens surface closest to an object in the third lens group G3 and a lens surface closest to an image in the third lens group G3 on the optical axis) and the focal length of the lens group closest to an image in the front-side lens group GX (the focal length of the third lens group G3). A sufficient performance upon focusing on infinity as well as excellent performance in terms of brightness can be achieved when the conditional expression (JD6) is satisfied. Furthermore, downsizing of the entire system can be achieved.

A value higher than the upper limit value of the conditional expression (JD6) leads to a short focal length of the third lens group G3, and thus results in the third lens group G3 involving a large spherical aberration. Furthermore, the value leads to the third lens group G3 with a larger thickness and thus results in a longer entire length.

To guarantee the effects of the 4th embodiment, the upper limit value of the conditional expression (JD6) is preferably set to be 1.200. To more effectively guarantee the effects of the 4th embodiment, the upper limit value of the conditional expression (JD6) is preferably set to be 1.000.

A value lower than the lower limit value of the conditional expression (JD6) leads to a long focal length, that is, a large movement amount of the third lens group G3 upon zooming, and thus results in a large variation of the spherical aberration. Furthermore, the value leads to the third lens group G3 with a smaller thickness and thus more simple configuration, and thus results in the third lens group G3 involving a large spherical aberration.

To guarantee the effects of the 4th embodiment, the lower limit value of the conditional expression (JD6) is preferably set to be 0.250. To more effectively guarantee the effects of the 4th embodiment, the lower limit value of the conditional expression (JD6) is preferably set to be 0.350.

Preferably, in the zoom optical system ZLI according to the 4th embodiment, the second lens group G2 is moved with respect to the image surface upon zooming.

The configuration can reduce variation of the spherical aberration and the curvature of field aberration upon zooming. Furthermore, efficient zooming, leading to downsizing of the optical system, can be achieved.

Preferably, in the zoom optical system ZLI according to the 4th embodiment, the third lens group G3 is moved with respect to the image surface upon zooming.

The configuration can reduce variation of the spherical aberration upon zooming. Furthermore, efficient zooming, leading to downsizing of the optical system, can be achieved.

Preferably, in the zoom optical system ZLI according to the 4th embodiment, the fourth lens group G4 is moved with respect to the image surface upon zooming.

The configuration can reduce variation of the spherical aberration and the curvature of field aberration upon zooming. Furthermore, efficient zooming, leading to downsizing of the optical system, can be achieved.

Preferably, in the zoom optical system ZLI according to the 4th embodiment, the fifth lens group G5 is moved with respect to the image surface upon zooming.

The configuration can reduce variation of the curvature of field aberration upon zooming. Furthermore, efficient zooming, leading to downsizing of the optical system, can be achieved.

Preferably, in the zoom optical system ZLI according to the 4th embodiment, part of the fifth lens group G5 is preferably the vibration-proof lens group VR.

The configuration is effective for correcting the decentering coma aberration and the curvature of field aberration upon image blur correction. The vibration-proof lens group VR is part of the group and is not the group as a whole, and thus can have a small size.

As described above, the 4th embodiment can achieve the zoom optical system ZLI featuring a small size, small variation of image magnification upon focusing, and an excellent optical performance.

Next, a camera (optical device) 1 including the above-described zoom optical system ZLI will be described with reference to FIG. 65. This camera 1 is the same as that in the 1st embodiment the configuration of which has been described above, and thus will not be described herein.

The zoom optical system ZLI according to the 4th embodiment, installed in the camera 1 as the imaging lens 2, features a small size, and small variation of image magnification upon focusing, and an excellent optical performance, due to its characteristic lens configuration as can be seen in Examples described later. Thus, an optical device featuring a small size, small variation of image magnification upon focusing, and an excellent optical performance can be achieved with the camera 1.

The 4th embodiment is described with the mirrorless camera as an example, but this should not be construed in a limiting sense. For example, similar or the same effects as the camera 1 can be obtained with the above-described zoom optical system ZLI installed in a single lens reflex camera in which a quick return mirror is provided to a camera main body and a subject is monitored with a view finder optical system.

Figure 69:
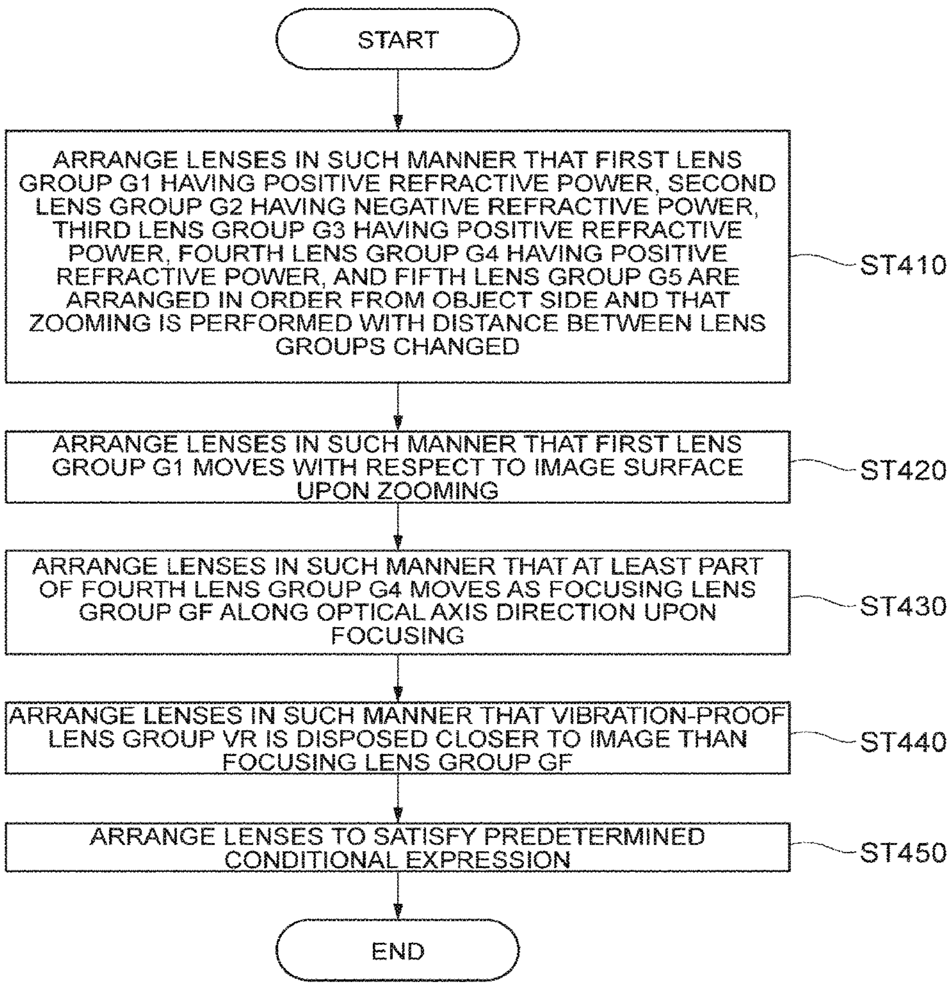
FIG. 69 is a diagram illustrating a method for manufacturing the zoom optical system according to the 4th embodiment.

Next, a method for manufacturing the above-described zoom optical system ZLI (ZL1) will be described with reference to FIG. 69. First of all, lenses are arranged in such a manner that the first lens group G1 having positive refractive power, the second lens group G2 having negative refractive power, the third lens group G3 having positive refractive power, the fourth lens group G4 having positive refractive power, and the fifth lens group G5 are arranged in a barrel in order from the object side and that the zooming is performed with the distance between the lens groups changed (step ST410). The lenses are arranged in such a manner that the first lens group G1 is moved with respect to the image surface upon zooming (step ST420). The lenses are arranged in such a manner that the at least part of the fourth lens group G4 moves as the focusing lens group GF in the optical axis direction upon focusing (step ST430). The lenses are arranged in such a manner that the vibration-proof lens group VR is disposed closer to the image than the focusing lens group GF, and is configured to be movable with a displacement component in a direction orthogonal to the optical axis to correct image blur (step ST440). The lenses are arranged to satisfy the following conditional expression (JD1) (step ST450).

$$-1.500<fV/fRF<0.645 \quad \text{(JD1)}$$

where, fV: a focal length of the vibration-proof lens group VR, and fRF: a focal length of the lens group closest to an object in the rear-side lens group GR (the focal length of the fifth lens group G5).

In one example of the lens arrangement according to the 4th embodiment, as illustrated in FIG. 1, the first lens group G1 including the cemented lens including the negative meniscus lens L11 having a concave surface facing the image surface side and the biconvex lens L12, and the positive meniscus lens L13 having a convex surface facing the object side, the second lens group G2 including the negative meniscus lens L21 having a concave surface facing the image surface side, the negative meniscus lens L22 having a concave surface facing the object side, the biconvex lens L23, and the negative meniscus lens L24 having a concave surface facing the object side, the third lens group G3 including the biconvex lens L31, the aperture stop S, the cemented lens including the negative meniscus lens L32 having a concave surface facing the image surface side and the biconvex lens L33, the biconvex lens L34, and the cemented lens including the biconvex lens L35 and the biconcave lens L36, the fourth lens group G4 including the cemented lens including the biconvex lens L41 and the negative meniscus lens L42 having a concave surface facing the object side, and the fifth lens group G5 including the cemented lens including the positive meniscus lens L51 having a convex surface facing the image surface side and the biconcave lens L52, the biconvex lens L53, and the negative meniscus lens L54 having a concave surface facing the object side are arranged in order from the object side. The cemented lens including the lenses L51 and L52 forming the fifth lens group G5 serves as the vibration-proof lens group VR. The zoom optical system ZLI is manufactured with the lens groups thus arranged through the procedure described above.

With the manufacturing method according to the 4th embodiment, the zoom optical system ZLI featuring a small size, small variation of image magnification upon focusing, and an excellent optical performance can be manufactured.

The 5th embodiment is described below with reference to drawings. The zoom optical system ZLI (ZL1) according to the 5th embodiment includes, as illustrated in FIG. 1, the first lens group G1 having positive refractive power, the second lens group G2 having negative refractive power, the third lens group G3 having positive refractive power, the fourth lens group G4 having positive refractive power, and the fifth lens group G5 that are arranged in order from the object side, and performs zooming by changing a distance between the lens groups. Upon zooming, the first lens group G1 moves to an image surface. Focusing is performed by moving at least part of the fourth lens group G4 as the focusing lens group GF in an optical axis direction. The vibration-proof lens group VR is disposed closer to the image than the focusing lens group GF, and is configured to be movable with a displacement component in a direction orthogonal to the optical axis to correct image blur.

With the above-described configuration that includes the first lens group G1 having positive refractive power, the second lens group G2 having negative refractive power, the third lens group G3 having positive refractive power, the fourth lens group G4 having positive refractive power, and the fifth lens group G5, and performs the zooming by changing a distance between the lens groups, downsizing and an excellent optical performance can be achieved. The configuration in which the first lens group G1 moves to an image surface upon zooming can achieve efficient zooming, and thus can achieve further downsizing and a higher performance. The configuration in which at least part of the fourth lens group G4 serves as the focusing lens group GF can reduce variation of image magnification, and variation of the spherical aberration and the curvature of field aberration upon focusing. In the configuration in which the vibration-proof lens group VR is disposed closer to the image than the focusing lens group GF, decentering coma aberration and curvature of field aberration can be corrected upon image blur correction.

A zoom optical system ZLI according to the 5th embodiment with the configuration described above satisfies the following conditional expressions (JE1) and (JE2).

$$-0.150<DVW/fV<1.000 \quad \text{(JE1)}$$

$$32.000 \leq W\omega \quad \text{(JE2)}$$

where, DVW denotes a distance between the vibration-proof lens group VR and a next lens in the wide angle end state, fV denotes a focal length of the vibration-proof lens group VR, and Wω denotes a half angle of view in the wide angle end state.

The conditional expression (JE1) is for setting an appropriate value of the distance between the vibration-proof lens group VR and a next lens in the wide angle end state, and the focal length of the vibration-proof lens group VR. A sufficient vibration-proof performance can be achieved when the conditional expression (JE1) is satisfied.

A value higher than the upper limit value of the conditional expression (JE1) results in the distance being large making the decentering coma aberration and the curvature of field aberration generated at the vibration-proof lens group VR difficult to correct by a lens after the vibration-proof lens group VR. Furthermore, the value results in a short focal length of the vibration-proof lens group VR, and thus leads to the vibration-proof lens group VR involving large decentering coma aberration and curvature of field aberration that are difficult to correct.

To guarantee the effects of the 5th embodiment, the upper limit value of the conditional expression (JE1) is preferably set to be 0.691. To more effectively guarantee the effects of the 5th embodiment, the upper limit value of the conditional expression (JE1) is preferably set to be 0.383.

A value lower than the lower limit value of the conditional expression (JE1) results in the distance being large making the decentering coma aberration and the curvature of field aberration generated at the vibration-proof lens group VR difficult to correct by a lens after the vibration-proof lens group VR. Furthermore, the value results in a short focal length of the vibration-proof lens group VR, and thus leads to the vibration-proof lens group VR involving large decentering coma aberration and curvature of field aberration that are difficult to correct.

To guarantee the effects of the 5th embodiment, the lower limit value of the conditional expression (JE1) is preferably set to be −0.141. To more effectively guarantee the effects of the 5th embodiment, the lower limit value of the conditional expression (JE1) is preferably set to be −0.132.

The conditional expression (JE2) is for setting an appropriate value of the half angle of view in the wide angle end state. A value lower than the lower limit value of the conditional expression (JE2) results in failure to successfully correct the curvature of field aberration and distortion with a wide angle of view achieved.

To guarantee the effects of the 5th embodiment, the lower limit value of the conditional expression (JE2) is preferably set to be 35.000. To more effectively guarantee the effects of the 5th embodiment, the lower limit value of the conditional expression (JE2) is preferably set to be 38.000.

Preferably, the zoom optical system ZLI according to the 5th embodiment satisfies the following conditional expression (JE3).

$$0.001<fF/fW<20.000 \quad \text{(JE3)}$$

where, fF denotes a focal length of the focusing lens group GF, and fW denotes a focal length of the entire system in the wide angle end state.

The conditional expression (JE3) is for setting an appropriate value of the focal length of the focusing lens group GF and the focal length of the entire system in the wide angle end state. A sufficient performance upon focusing on short-distant object can be achieved when the conditional expression (JE3) is satisfied.

A value higher than the upper limit value of the conditional expression (JE3) leads to a long focal length, that is, a large movement amount of the focusing lens group GF upon focusing, and thus results in large variation of spherical aberration and curvature of field aberration. The large movement amount of the focusing lens group GF leads to a large entire length.

To guarantee the effects of the 5th embodiment, the upper limit value of the conditional expression (JE3) is preferably set to be 15.000. To more effectively guarantee the effects of the 5th embodiment, the upper limit value of the conditional expression (JE3) is preferably set to be 10.000. To more effectively guarantee the effects of the 5th embodiment, the upper limit value of the conditional expression (JE3) is preferably set to be 8.500.

A value lower than the lower limit value of the conditional expression (JE3) leads to a short focal length of the focusing lens group GF, and thus results in the focusing lens group GF involving large spherical aberration and curvature of field aberration.

To guarantee the effects of the 5th embodiment, the lower limit value of the conditional expression (JE3) is preferably set to be 0.400. To more effectively guarantee the effects of the 5th embodiment, the lower limit value of the conditional expression (JE3) is preferably set to be 0.800. To more effectively guarantee the effects of the 5th embodiment, the lower limit value of the conditional expression (JE3) is preferably set to be 1.150.

Preferably, the zoom optical system ZLI according to the 5th embodiment satisfies the following conditional expression (JE4).

$$-1.000<fV/fRF<2.000 \quad \text{(JE4)}$$

where, fRF: a focal length of the lens group closest to an object in the rear-side lens group GR (the focal length of the fifth lens group G5).

The conditional expression (JE4) is for setting an appropriate value of the focal length of the vibration-proof lens group VR and the focal length of the lens group closest to an object in the rear-side lens group GR (the focal length of the fifth lens group G5). A sufficient vibration-proof performance can be achieved when the conditional expression (JE4) is satisfied.

A value higher than the upper limit value of the conditional expression (JE4) results in a long focal length, that is, a large movement amount of the vibration-proof lens group VR upon image blur correction, making the decentering coma aberration and curvature of field aberration difficult to correct. The larger amount of the movement of the vibration-proof lens group VR leads to a larger diameter, rendering driving control for the vibration-proof lens group VR difficult. Furthermore, the focal length of the fifth lens group G5 becomes short, and thus, the fifth lens group G5 involves a large curvature of field aberration.

To guarantee the effects of the 5th embodiment, the upper limit value of the conditional expression (JE4) is preferably set to be 1.600. To more effectively guarantee the effects of the 5th embodiment, the upper limit value of the conditional expression (JE4) is preferably set to be 1.300.

A value lower than the lower limit value of the conditional expression (JE4) results in a long focal length, that is, a large movement amount of the vibration-proof lens group VR upon image blur correction, making the decentering coma aberration and curvature of field aberration difficult to correct. The larger amount of the movement of the vibration-proof lens group VR leads to a larger diameter, rendering driving control for the vibration-proof lens group VR difficult. Furthermore, the focal length of the fifth lens group G5 becomes short, and thus, the fifth lens group G5 involves a large curvature of field aberration.

To guarantee the effects of the 5th embodiment, the lower limit value of the conditional expression (JE4) is preferably set to be −0.750. To more effectively guarantee the effects of the 5th embodiment, the lower limit value of the conditional expression (JE4) is preferably set to be −0.435.

Preferably, the zoom optical system ZLI according to the 5th embodiment satisfies the following conditional expression (JE5).

$$0.010<fF/fXR<10.000 \quad \text{(JE5)}$$

where, fF denotes a focal length of the focusing lens group GF, and fXR denotes a focal length of the lens group closest to an image in the front-side lens group GX (the focal length of the third lens group G3).

The conditional expression (JE5) is for setting an appropriate value of the focal length of the focusing lens group GF and the focal length of the lens group closest to an image in the front-side lens group GX (the focal length of the third lens group G3). A sufficient performance upon focusing on short-distant object can be achieved when the conditional expression (JE5) is satisfied.

A value higher than the upper limit value of the conditional expression (JE5) leads to a long focal length, that is, a large movement amount of the focusing lens group GF upon focusing, and thus results in large variation of spherical aberration and curvature of field aberration. The large movement amount of the focusing lens group GF leads to a large entire length. Furthermore, the focal length of the third lens group G3 becomes short, and thus, the third lens group G3 involves a large spherical aberration.

To guarantee the effects of the 5th embodiment, the upper limit value of the conditional expression (JE5) is preferably set to be 8.000. To more effectively guarantee the effects of the 5th embodiment, the upper limit value of the conditional expression (JE5) is preferably set to be 6.000.

A value lower than the lower limit value of the conditional expression (JE5) leads to a short focal length of the focusing lens group GF, and thus results in the focusing lens group GF involving large spherical aberration and curvature of field aberration.

To guarantee the effects of the 5th embodiment, the lower limit value of the conditional expression (JE5) is preferably set to be 0.300. To more effectively guarantee the effects of the 5th embodiment, the lower limit value of the conditional expression (JE5) is preferably set to be 0.650.

Preferably, the zoom optical system ZLI according to the 5th embodiment satisfies the following conditional expression (JE6).

$$0.100<DGXR/fXR<1.500 \quad \text{(JE6)}$$

where, DGXR denotes a thickness of the lens group closest to an image in the front-side lens group GX on an optical axis (the thickness of the third lens group G3 on the optical axis), and fXR denotes a focal length of the lens group closest to an image in the front-side lens group GX (the focal length of the third lens group G3).

The conditional expression (JE6) is for setting an appropriate value of the thickness of the lens group (the third lens group G3) closest to an image in the front-side lens group GX on an optical axis (that is, a distance between a lens surface closest to an object in the third lens group G3 and a lens surface closest to an image in the third lens group G3 on the optical axis) and the focal length of the lens group closest to an image in the front-side lens group GX (the focal length of the third lens group G3). A sufficient performance upon focusing on infinity as well as excellent performance in terms of brightness can be achieved when the conditional expression (JE6) is satisfied. Furthermore, downsizing of the entire system can be achieved.

A value higher than the upper limit value of the conditional expression (JE6) leads to a short focal length of the third lens group G3, and thus results in the third lens group G3 involving a large spherical aberration. Furthermore, the value leads to the third lens group G3 with a larger thickness and thus results in a longer entire length.

To guarantee the effects of the 5th embodiment, the upper limit value of the conditional expression (JE6) is preferably set to be 1.200. To more effectively guarantee the effects of the 5th embodiment, the upper limit value of the conditional expression (JE6) is preferably set to be 1.000.

A value lower than the lower limit value of the conditional expression (JE6) leads to a long focal length, that is, a large movement amount of the third lens group G3 upon zooming, and thus results in a large variation of the spherical aberration. Furthermore, the value leads to the third lens group G3 with a smaller thickness and thus more simple configuration, and thus results in the third lens group G3 involving a large spherical aberration.

To guarantee the effects of the 5th embodiment, the lower limit value of the conditional expression (JE6) is preferably set to be 0.250. To more effectively guarantee the effects of the 5th embodiment, the lower limit value of the conditional expression (JE6) is preferably set to be 0.350.

Preferably, the zoom optical system ZLI according to the 5th embodiment satisfies the following conditional expression (JE7).

$$0.390<DXnW/ZD1<5.000 \quad \text{(JE7)}$$

where, DXnW denotes a distance between a lens group with the largest absolute value of the refractive power in the negative lens groups of the front-side lens group GX and a lens group closest to the image in the front-side lens group GX in the wide angle end state, and ZD1 denotes a movement amount of the first lens group G1 upon zooming from the wide angle end state to the telephoto end state.

The conditional expression (JE7) is for setting an appropriate value of the distance between a lens group (second lens group G2) with the largest absolute value of the refractive power in the negative lens groups of the front-side lens group GX and the lens group (third lens group G3) closest to the image in the front-side lens group GX in the wide angle end state, and the movement amount of the first lens group G1 upon zooming from the wide angle end state to the telephoto end state. An excellent optical performance can be achieved when the conditional expression (JE7) is satisfied.

A value higher than the upper limit value of the conditional expression (JE7) results in a large distance between a lens group with the largest absolute value of the refractive power in the negative lens groups of the front-side lens group GX and the lens group closest to the image in the front-side lens group GX (that is, a distance between the second lens group G2 and the third lens group G3), and thus results in curvature of field aberration in the wide angle end state.

To guarantee the effects of the 5th embodiment, the upper limit value of the conditional expression (JE7) is preferably set to be 4.000. To more effectively guarantee the effects of the 5th embodiment, the upper limit value of the conditional expression (JE7) is preferably set to be 3.000. To more effectively guarantee the effects of the 5th embodiment, the upper limit value of the conditional expression (JE7) is preferably set to be 2.000. To more effectively guarantee the effects of the 5th embodiment, the upper limit value of the conditional expression (JE7) is preferably set to be 1.000.

A value lower than the lower limit value of the conditional expression (JE7) leads to a movement amount of the first lens group G1, and thus results in a zooming involving a large variation of the curvature of field aberration.

To guarantee the effects of the 5th embodiment, the lower limit value of the conditional expression (JE7) is preferably set to be 0.400. To more effectively guarantee the effects of the 5th embodiment, the lower limit value of the conditional expression (JE7) is preferably set to be 0.410. To more effectively guarantee the effects of the 5th embodiment, the lower limit value of the conditional expression (JE7) is preferably set to be 0.420. To more effectively guarantee the effects of the 5th embodiment, the lower limit value of the conditional expression (JE7) is preferably set to be 0.430.

Preferably, in the zoom optical system ZLI according to the 5th embodiment, the second lens group G2 is moved with respect to the image surface upon zooming.

The configuration can reduce variation of the spherical aberration and the curvature of field aberration upon zooming. Furthermore, efficient zooming, leading to downsizing of the optical system, can be achieved.

Preferably, in the zoom optical system ZLI according to the 5th embodiment, the third lens group G3 is moved with respect to the image surface upon zooming.

The configuration can reduce variation of the spherical aberration upon zooming. Furthermore, efficient zooming, leading to downsizing of the optical system, can be achieved.

Preferably, in the zoom optical system ZLI according to the 5th embodiment, the fourth lens group G4 is moved with respect to the image surface upon zooming.

The configuration can reduce variation of the spherical aberration and the curvature of field aberration upon zooming. Furthermore, efficient zooming, leading to downsizing of the optical system, can be achieved.

Preferably, in the zoom optical system ZLI according to the 5th embodiment, the fifth lens group G5 is moved with respect to the image surface upon zooming.

The configuration can reduce variation of the curvature of field aberration upon zooming. Furthermore, efficient zooming, leading to downsizing of the optical system, can be achieved.

Preferably, in the zoom optical system ZLI according to the 5th embodiment, part of the fifth lens group G5 is preferably the vibration-proof lens group VR.

The configuration is effective for correcting the decentering coma aberration and the curvature of field aberration upon image blur correction. The vibration-proof lens group VR is part of the group and is not the group as a whole, and thus can have a small size.

As described above, the 5th embodiment can achieve the zoom optical system ZLI featuring a small size, small variation of image magnification upon focusing, and an excellent optical performance.

Next, a camera (optical device) 1 including the above-described zoom optical system ZLI will be described with reference to FIG. 65. This camera 1 is the same as that in the 1st embodiment the configuration of which has been described above, and thus will not be described herein.

The zoom optical system ZLI according to the 5th embodiment, installed in the camera 1 as the imaging lens 2, features a small size, small variation of image magnification upon focusing, and an excellent optical performance, due to its characteristic lens configuration as can be seen in Examples described later. Thus, an optical device featuring a small size, small variation of image magnification upon focusing, and an excellent optical performance can be achieved with the camera 1.

The 5th embodiment is described with the mirrorless camera as an example, but this should not be construed in a limiting sense. For example, similar or the same effects as the camera 1 can be obtained with the above-described zoom optical system ZLI installed in a single lens reflex camera in which a quick return mirror is provided to a camera main body and a subject is monitored with a view finder optical system.

Figure 70:
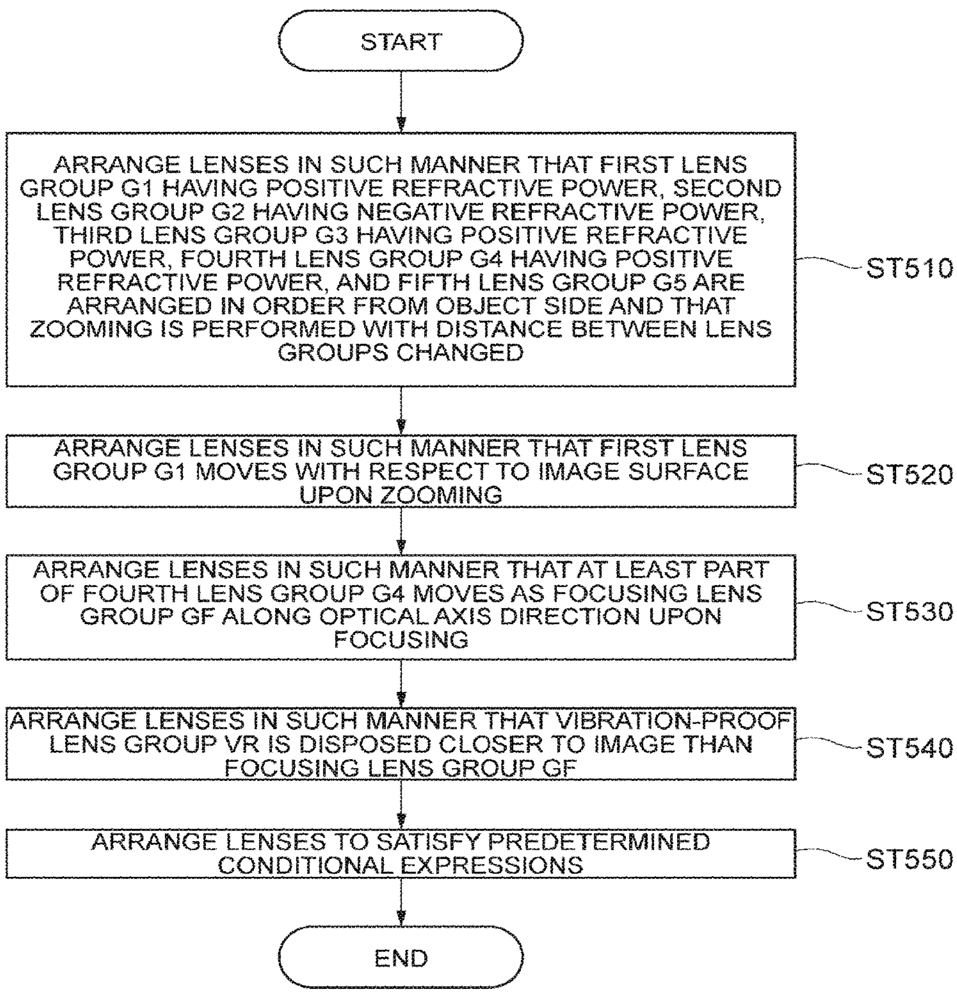
FIG. 70 is a diagram illustrating a method for manufacturing the zoom optical system according to the 5th embodiment.

Next, a method for manufacturing the above-described zoom optical system ZLI (ZL1) will be described with reference to FIG. 70. First of all, lenses are arranged in such a manner that the first lens group G1 having positive refractive power, the second lens group G2 having negative refractive power, the third lens group G3 having positive refractive power, the fourth lens group G4 having positive refractive power, and the fifth lens group G5 are arranged in a barrel in order from the object side and that the zooming is performed with the distance between the lens groups changed (step ST510). The lenses are arranged in such a manner that the first lens group G1 is moved with respect to the image surface upon zooming (step ST520). The lenses are arranged in such a manner that the at least part of the fourth lens group G4 moves as the focusing lens group GF in the optical axis direction upon focusing (step ST530). The lenses are arranged in such a manner that the vibration-proof lens group VR is disposed closer to the image than the focusing lens group GF, and is configured to be movable with a displacement component in a direction orthogonal to the optical axis to correct image blur (step ST540). The lenses are arranged to satisfy the following conditional expressions (JE1) and (JE2) (step ST550).

$$0.150<DVW/fV<1.000 \quad \text{(JE1)}$$

$$32.000\leq W\omega \quad \text{(JE2)}$$

where, DVW denotes a distance between the vibration-proof lens group VR and a next lens in the wide angle end state, fV denotes a focal length of the vibration-proof lens group VR, and Wω denotes a half angle of view in the wide angle end state.

In one example of the lens arrangement according to the 5th embodiment, as illustrated in FIG. 1, the first lens group G1 including the cemented lens including the negative meniscus lens L11 having a concave surface facing the image surface side and the biconvex lens L12, and the positive meniscus lens L13 having a convex surface facing the object side, the second lens group G2 including the negative meniscus lens L21 having a concave surface facing the image surface side, the negative meniscus lens L22 having a concave surface facing the object side, the biconvex lens L23, and the negative meniscus lens L24 having a concave surface facing the object side, the third lens group G3 including the biconvex lens L31, the aperture stop S, the cemented lens including the negative meniscus lens L32 having a concave surface facing the image surface side and the biconvex lens L33, the biconvex lens L34, and the cemented lens including the biconvex lens L35 and the biconcave lens L36, the fourth lens group G4 including the cemented lens including the biconvex lens L41 and the negative meniscus lens L42 having a concave surface facing the object side, and the fifth lens group G5 including the cemented lens including the positive meniscus lens L51 having a convex surface facing the image surface side and the biconcave lens L52, the biconvex lens L53, and the negative meniscus lens L54 having a concave surface facing the object side are arranged in order from the object side. The cemented lens including the lenses L51 and L52 forming the fifth lens group G5 serves as the vibration-proof lens group VR. The zoom optical system ZLI is manufactured with the lens groups thus arranged through the procedure described above.

With the manufacturing method according to the 5th embodiment, the zoom optical system ZLI featuring a small size, small variation of image magnification upon focusing, and an excellent optical performance can be manufactured.

The 6th embodiment is described below with reference to drawings. The zoom optical system ZLI (ZL2) according to the 6th embodiment includes, as illustrated in FIG. 5, the first lens group G1 having positive refractive power, the second lens group G2 having negative refractive power, the third lens group G3 having positive refractive power, the fourth lens group G4 having positive refractive power, the fifth lens group G5, and the sixth lens group G6 that are arranged in order from the object side, and performs zooming by changing a distance between the lens groups. Upon zooming, the first lens group G1 moves to an image surface. Focusing is performed by moving at least part of the fourth lens group G4 as the focusing lens group GF in an optical axis direction. The vibration-proof lens group VR is disposed closer to the image than the focusing lens group GF, and is configured to be movable with a displacement component in a direction orthogonal to the optical axis to correct image blur.

With the above-described configuration that includes the first lens group G1 having positive refractive power, the second lens group G2 having negative refractive power, the third lens group G3 having positive refractive power, the fourth lens group G4 having positive refractive power, the fifth lens group G5, and the sixth lens group G6 and performs the zooming by changing a distance between the lens groups, downsizing and an excellent optical performance can be achieved. The configuration in which the first lens group G1 moves to an image surface upon zooming can achieve efficient zooming, and thus can achieve further downsizing and a higher performance. The configuration in which at least part of the fourth lens group G4 serves as the focusing lens group GF can reduce variation of image magnification and variation of the spherical aberration and the curvature of field aberration upon focusing. In the configuration in which the vibration-proof lens group VR is disposed closer to the image than the focusing lens group GF, decentering coma aberration and curvature of field aberration can be corrected upon image blur correction.

Preferably, the zoom optical system ZLI according to the 6th embodiment satisfies the following conditional expression (JF1).

$$-20.000<fF/fV<20.000 \quad \text{(JF1)}$$

where, fF denotes a focal length of the focusing lens group GF, and fV denotes a focal length of the vibration-proof lens group VR.

The conditional expression (JF1) is for setting an appropriate value of the focal length of the focusing lens group GF and the focal length of the vibration-proof lens group.

A value higher than the upper limit value of the conditional expression (JF1) leads to a long focal length, that is, a large movement amount of the focusing lens group GF upon focusing, and thus results in large variation of spherical aberration and curvature of field aberration. The large movement amount of the focusing lens group GF leads to a large entire length. Furthermore, the value results in a short focal length of the vibration-proof lens group VR, and thus leads to the vibration-proof lens group VR involving large decentering coma aberration and curvature of field aberration.

To guarantee the effects of the 6th embodiment, the upper limit value of the conditional expression (JF1) is preferably set to be 15.000. To more effectively guarantee the effects of the 6th embodiment, the upper limit value of the conditional expression (JF1) is preferably set to be 10.000.

A value lower than the lower limit value of the conditional expression (JF1) leads to a long focal length, that is, a large movement amount of the focusing lens group GF upon focusing, and thus results in large variation of spherical aberration and curvature of field aberration. The large movement amount of the focusing lens group GF leads to a large entire length. Furthermore, the value results in a short focal length of the vibration-proof lens group VR, and thus leads to the vibration-proof lens group VR involving large decentering coma aberration and curvature of field aberration.

To guarantee the effects of the 6th embodiment, the lower limit value of the conditional expression (JF1) is preferably set to be −15.000. To more effectively guarantee the effects of the 6th embodiment, the lower limit value of the conditional expression (JF1) is preferably set to be −10.000.

Preferably, the zoom optical system ZLI according to the 6th embodiment satisfies the following conditional expression (JF2).

$$15.000<fV/fRF<10.000 \quad \text{(JF2)}$$

where, fV denotes a focal length of the vibration-proof lens group VR, and fRF denotes a focal length of the lens group closest to an object in the rear-side lens group GR (the focal length of the fifth lens group G5).

The conditional expression (JF2) is for setting an appropriate value of the focal length of the vibration-proof lens group VR and the focal length of the lens group closest to an object in the rear-side lens group GR (the focal length of the fifth lens group G5). A sufficient vibration-proof performance can be achieved when the conditional expression (JF2) is satisfied.

A value higher than the upper limit value of the conditional expression (JF2) results in a long focal length, that is, a large movement amount of the vibration-proof lens group VR upon image blur correction, making the decentering coma aberration and curvature of field aberration difficult to correct. The larger amount of the movement of the vibration-proof lens group VR leads to a larger diameter, rendering driving control for the vibration-proof lens group VR difficult. Furthermore, the focal length of the fifth lens group G5 becomes short, and thus, the fifth lens group G5 involves a large curvature of field aberration.

To guarantee the effects of the 6th embodiment, the upper limit value of the conditional expression (JF2) is preferably set to be 7.500. To more effectively guarantee the effects of the 6th embodiment, the upper limit value of the conditional expression (JF2) is preferably set to be 5.000.

A value lower than the lower limit value of the conditional expression (JF2) results in a long focal length, that is, a large movement amount of the vibration-proof lens group VR upon image blur correction, making the decentering coma aberration and curvature of field aberration difficult to correct. The larger amount of the movement of the vibration-proof lens group VR leads to a larger diameter, rendering driving control for the vibration-proof lens group VR difficult. Furthermore, the focal length of the fifth lens group G5 becomes short, and thus, the fifth lens group G5 involves a large curvature of field aberration.

To guarantee the effects of the 6th embodiment, the lower limit value of the conditional expression (JF2) is preferably set to be −13.000. To more effectively guarantee the effects of the 6th embodiment, the lower limit value of the conditional expression (JF2) is preferably set to be −11.000.

Preferably, the zoom optical system ZLI according to the 6th embodiment satisfies the following conditional expressions (JF3) and (JF4).

$$-1.000<DVW/fV<1.000 \quad \text{(JF3)}$$

$$32.000\leq W\omega \quad \text{(JF4)}$$

where, DVW denotes a distance between the vibration-proof lens group VR and a next lens in the wide angle end state, fV denotes a focal length of the vibration-proof lens group VR, and Wω denotes a half angle of view in the wide angle end state.

The conditional expression (JF3) is for setting an appropriate value of the distance between the vibration-proof lens group VR and a next lens in the wide angle end state, and the focal length of the vibration-proof lens group VR. A sufficient vibration-proof performance can be achieved when the conditional expression (JF3) is satisfied.

A value higher than the upper limit value of the conditional expression (JF3) results in the distance being large making the decentering coma aberration and the curvature of field aberration generated at the vibration-proof lens group VR difficult to correct by a lens after the vibration-proof lens group VR. Furthermore, the value results in a short focal length of the vibration-proof lens group VR, and thus leads to the vibration-proof lens group VR involving large decentering coma aberration and curvature of field aberration that are difficult to correct.

To guarantee the effects of the 6th embodiment, the upper limit value of the conditional expression (JF3) is preferably set to be 0.700. To more effectively guarantee the effects of the 6th embodiment, the upper limit value of the conditional expression (JF3) is preferably set to be 0.400.

A value lower than the lower limit value of the conditional expression (JF3) results in the distance being large making the decentering coma aberration and the curvature of field aberration generated at the vibration-proof lens group VR difficult to correct by a lens after the vibration-proof lens group VR. Furthermore, the value results in a short focal length of the vibration-proof lens group VR, and thus leads to the vibration-proof lens group VR involving large decentering coma aberration and curvature of field aberration that are difficult to correct.

To guarantee the effects of the 6th embodiment, the lower limit value of the conditional expression (JF3) is preferably set to be −0.700. To more effectively guarantee the effects of the 6th embodiment, the lower limit value of the conditional expression (JF3) is preferably set to be −0.450.

The conditional expression (JF4) is for setting an appropriate value of the half angle of view in the wide angle end state. A value lower than the lower limit value of the conditional expression (JF4) results in failure to successfully correct the curvature of field aberration and distortion with a wide angle of view achieved.

To guarantee the effects of the 6th embodiment, the lower limit value of the conditional expression (JF4) is preferably set to be 35.000. To more effectively guarantee the effects of the 6th embodiment, the lower limit value of the conditional expression (JF4) is preferably set to be 38.000.

Preferably, the zoom optical system ZLI according to the 6th embodiment satisfies the following conditional expression (JF5).

$$0.010<fF/fXR<10.000 \quad \text{(JF5)}$$

where, fF denotes a focal length of the focusing lens group GF, and fXR denotes a focal length of the lens group closest to an image in the front-side lens group GX (the focal length of the third lens group G3).

The conditional expression (JF5) is for setting an appropriate value of the focal length of the focusing lens group GF and the focal length of the lens group closest to an image in the front-side lens group GX (the focal length of the third lens group G3). A sufficient performance upon focusing on short-distant object can be achieved when the conditional expression (JF5) is satisfied.

A value higher than the upper limit value of the conditional expression (JF5) leads to a long focal length, that is, a large movement amount of the focusing lens group GF upon focusing, and thus results in large variation of spherical aberration and curvature of field aberration. The large movement amount of the focusing lens group GF leads to a large entire length. Furthermore, the focal length of the third lens group G3 becomes short, and thus, the third lens group G3 involves a large spherical aberration.

To guarantee the effects of the 6th embodiment, the upper limit value of the conditional expression (JF5) is preferably set to be 8.000. To more effectively guarantee the effects of the 6th embodiment, the upper limit value of the conditional expression (JF5) is preferably set to be 6.000.

A value lower than the lower limit value of the conditional expression (JF5) leads to a short focal length of the focusing lens group GF, and thus results in the focusing lens group GF involving large spherical aberration and curvature of field aberration.

To guarantee the effects of the 6th embodiment, the lower limit value of the conditional expression (JF5) is preferably set to be 0.300. To more effectively guarantee the effects of the 6th embodiment, the lower limit value of the conditional expression (JF5) is preferably set to be 0.650.

Preferably, the zoom optical system ZLI according to the 6th embodiment satisfies the following conditional expression (JF6).

$$0.100 < DGXR/fXR < 1.500 \quad \text{(JF6)}$$

where, DGXR denotes a thickness of the lens group closest to an image in the front-side lens group GX on an optical axis (the thickness of the third lens group G3 on the optical axis), and fXR denotes a focal length of the lens group closest to an image in the front-side lens group GX (the focal length of the third lens group G3).

The conditional expression (JF6) is for setting an appropriate value of the thickness of the lens group (the third lens group G3) closest to an image in the front-side lens group GX on an optical axis (that is, a distance between a lens surface closest to an object in the third lens group G3 and a lens surface closest to an image in the third lens group G3 on the optical axis) and the focal length of the lens group closest to an image in the front-side lens group GX (the focal length of the third lens group G3). A sufficient performance upon focusing on infinity as well as excellent performance in terms of brightness can be achieved when the conditional expression (JF6) is satisfied. Furthermore, downsizing of the entire system can be achieved.

A value higher than the upper limit value of the conditional expression (JF6) leads to a short focal length of the third lens group G3, and thus results in the third lens group G3 involving a large spherical aberration. Furthermore, the value leads to the third lens group G3 with a larger thickness and thus results in a longer entire length.

To guarantee the effects of the 6th embodiment, the upper limit value of the conditional expression (JF6) is preferably set to be 1.200. To more effectively guarantee the effects of the 6th embodiment, the upper limit value of the conditional expression (JF6) is preferably set to be 1.000.

A value lower than the lower limit value of the conditional expression (JF6) leads to a long focal length, that is, a large movement amount of the third lens group G3 upon zooming, and thus results in a large variation of the spherical aberration. Furthermore, the value leads to the third lens group G3 with a smaller thickness and thus more simple configuration, and thus results in the third lens group G3 involving a large spherical aberration.

To guarantee the effects of the 6th embodiment, the lower limit value of the conditional expression (JF6) is preferably set to be 0.250. To more effectively guarantee the effects of the 6th embodiment, the lower limit value of the conditional expression (JF6) is preferably set to be 0.350. To more effectively guarantee the effects of the 6th embodiment, the lower limit value of the conditional expression (JF6) is preferably set to be 0.400. To more effectively guarantee the effects of the 6th embodiment, the lower limit value of the conditional expression (JF6) is preferably set to be 0.450.

Preferably, the zoom optical system ZLI according to the 6th embodiment satisfies the following conditional expression (JF7).

$$2.250 < TLW/ZD1 < 10.000 \quad \text{(JF7)}$$

where, TLW denotes an entire length of the optical system in the wide angle end state, and ZD1 denotes a movement amount of the first lens group G1 upon zooming from the wide angle end state to the telephoto end state.

The conditional expression (JF7) is for setting an appropriate value of the entire length of the optical system in the wide angle end state, and the movement amount of the first lens group G1 upon zooming from the wide angle end state to the telephoto end state. An excellent optical performance can be achieved when the conditional expression (JF7) is satisfied.

A value higher than the upper limit value of the conditional expression (JF7) leads to an arrangement with higher power in each lens group causing increase of spherical aberration and curvature of field aberration.

To guarantee the effects of the 6th embodiment, the upper limit value of the conditional expression (JF7) is preferably set to be 9.000. To more effectively guarantee the effects of the 6th embodiment, the upper limit value of the conditional expression (JF7) is preferably set to be 7.500. To more effectively guarantee the effects of the 6th embodiment, the upper limit value of the conditional expression (JF7) is preferably set to be 6.000. To more effectively guarantee the effects of the 6th embodiment, the upper limit value of the conditional expression (JF7) is preferably set to be 5.000.

A value lower than the lower limit value of the conditional expression (JF7) leads to a large movement amount of the first lens group G1, and thus results in a zooming involving a large variation of the curvature of field aberration.

To guarantee the effects of the 6th embodiment, the lower limit value of the conditional expression (JF7) is preferably set to be 2.300. To more effectively guarantee the effects of the 6th embodiment, the lower limit value of the conditional expression (JF7) is preferably set to be 2.350. To more effectively guarantee the effects of the 6th embodiment, the lower limit value of the conditional expression (JF7) is preferably set to be 2.400. To more effectively guarantee the effects of the 6th embodiment, the lower limit value of the conditional expression (JF7) is preferably set to be 2.450.

Preferably, in the zoom optical system ZLI according to the 6th embodiment, the second lens group G2 is moved with respect to the image surface upon zooming.

The configuration can reduce variation of the spherical aberration and the curvature of field aberration upon zooming. Furthermore, efficient zooming, leading to downsizing of the optical system, can be achieved.

Preferably, in the zoom optical system ZLI according to the 6th embodiment, the third lens group G3 is moved with respect to the image surface upon zooming.

The configuration can reduce variation of the spherical aberration upon zooming. Furthermore, efficient zooming, leading to downsizing of the optical system, can be achieved.

Preferably, in the zoom optical system ZLI according to the 6th embodiment, the fourth lens group G4 is moved with respect to the image surface upon zooming.

The configuration can reduce variation of the spherical aberration and the curvature of field aberration upon zooming. Furthermore, efficient zooming, leading to downsizing of the optical system, can be achieved.

Preferably, in the zoom optical system ZLI according to the 6th embodiment, the fifth lens group G5 is moved with respect to the image surface upon zooming.

The configuration can reduce variation of the curvature of field aberration upon zooming. Furthermore, efficient zooming, leading to downsizing of the optical system, can be achieved.

Preferably, in the zoom optical system ZLI according to the 6th embodiment, a part or entirety of the fifth lens group G5 is preferably the vibration-proof lens group VR.

The configuration is effective for correcting the decentering coma aberration and the curvature of field aberration upon image blur correction. The vibration-proof lens group VR as part of the fifth lens group G5 can have a small size.

As described above, the 6th embodiment can achieve the zoom optical system ZLI featuring a small size, small variation of image magnification upon focusing, and an excellent optical performance.

Next, a camera (optical device) 1 including the above-described zoom optical system ZLI will be described with reference to FIG. 65. This camera 1 is the same as that in the 1st embodiment the configuration of which has been described above, and thus will not be described herein.

The zoom optical system ZLI according to the 6th embodiment, installed in the camera 1 as the imaging lens 2, features a small size, small variation of image magnification upon focusing and an excellent optical performance, due to its characteristic lens configuration as can be seen in Examples described later. Thus, an optical device featuring a small size, small variation of image magnification upon focusing, and an excellent optical performance can be achieved with the camera 1.

The 6th embodiment is described with the mirrorless camera as an example, but this should not be construed in a limiting sense. For example, similar or the same effects as the camera 1 can be obtained with the above-described zoom optical system ZLI installed in a single lens reflex camera in which a quick return mirror is provided to a camera main body and a subject is monitored with a view finder optical system.

Figure 71:
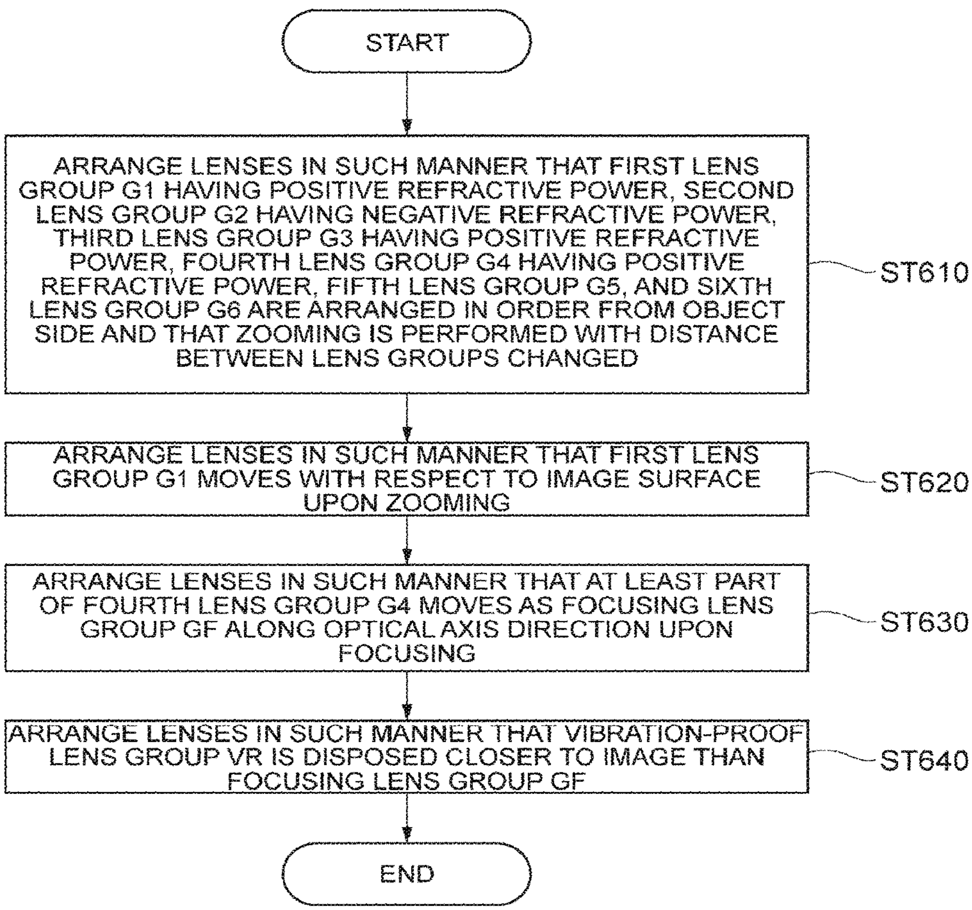
FIG. 71 is a diagram illustrating a method for manufacturing the zoom optical system according to the 6th embodiment.

Next, a method for manufacturing the above-described zoom optical system ZLI (ZL2) will be described with reference to FIG. 71. First of all, lenses are arranged in such a manner that the first lens group G1 having positive refractive power, the second lens group G2 having negative refractive power, the third lens group G3 having positive refractive power, the fourth lens group G4 having positive refractive power, the fifth lens group G5, and the sixth lens group G6 are arranged in a barrel in order from the object side and that the zooming is performed with the distance between the lens groups changed (step ST610). The lenses are arranged in such a manner that the first lens group G1 is moved with respect to the image surface upon zooming (step ST620). The lenses are arranged in such a manner that the at least part of the fourth lens group G4 moves as the focusing lens group GF in the optical axis direction upon focusing (step ST630). The lenses are arranged in such a manner that the vibration-proof lens group VR is disposed closer to the image than the focusing lens group GF, and is configured to be movable with a displacement component in a direction orthogonal to the optical axis to correct image blur (step ST640).

In one example of the lens arrangement according to the 6th embodiment, as illustrated in FIG. 5, the first lens group G1 including the cemented lens including the negative meniscus lens L11 having a concave surface facing the image surface side and the biconvex lens L12, and the positive meniscus lens L13 having a convex surface facing the object side, the second lens group G2 including the negative meniscus lens L21 having a concave surface facing the image surface side, the biconcave lens L22, the biconvex lens L23, and the negative meniscus lens L24 having a concave surface facing the object side, the third lens group G3 including the biconvex lens L31, the aperture stop S, the cemented lens including the negative meniscus lens L32 having a concave surface facing the image surface side and the biconvex lens L33, the biconvex lens L34, and the cemented lens including the biconvex lens L35 and the biconcave lens L36, the fourth lens group G4 including the cemented lens including the biconvex lens L41 and the negative meniscus lens L42 having a concave surface facing the object side, the fifth lens group G5 including the cemented lens including the positive meniscus lens L51 having a convex surface facing the image surface side and the biconcave lens L52, the biconvex lens L53, and the negative meniscus lens L54 having a concave surface facing the object side, and the sixth lens group G6 including the plano-convex lens L61 having a convex surface facing the object side are arranged in order from the object side. The cemented lens including the lenses L51 and L52 forming the fifth lens group G5 serves as the vibration-proof lens group VR. The zoom optical system ZLI is manufactured with the lens groups thus arranged through the procedure described above.

With the manufacturing method according to the 6th embodiment, the zoom optical system ZLI featuring a small size, small variation of image magnification upon focusing, and an excellent optical performance can be manufactured.

The 7th embodiment is described below with reference to drawings. As illustrated in FIG. 1, a zoom optical system ZLI (ZL1) according to the 7th embodiment includes: the first lens group G1 having positive refractive power and disposed closest to an object; the front-side lens group GX composed of one or more lens groups and disposed more on the image surface side than the first lens group G1; the intermediate lens group GM disposed more on the image surface side than the front-side lens group; and the rear-side lens group GR composed of one or more lens groups and disposed more on the image surface side than the intermediate lens group GM. The front-side lens group GX includes a lens group having negative refractive power. At least part of the intermediate lens group GM is the focusing lens group GF. The focusing lens group GF has positive refractive power and moves in the optical axis direction upon focusing. Upon zooming, the first lens group G1 is moved with respect to an image surface, the distance between the first lens group G1 and the front-side lens group GX is changed, the distance between the front-side lens group GX and the intermediate lens group GM is changed, and the distance between the intermediate lens group GM and the rear-side lens group GR is changed. An air lens having a meniscus shape is formed of: a lens surface on the image surface side of a lens closest to the image surface in lenses disposed to the object side of the focusing lens group GF; and a lens surface closest to an object in the focusing lens group GF.

The air lens may have the meniscus shape with the convex surface facing the object side, or with the convex surface facing the image surface side.

The configuration including the positive first lens group G1, the front-side lens group GX including a negative lens group, the intermediate lens group GM including the positive focusing lens group GF, and the rear-side lens group GR, and performing the zooming by changing a distance between the lens groups can have a small size and achieve an excellent optical performance. The configuration in which the first lens group G1 is moved with respect to the image surface upon zooming can achieve efficient zooming, and can achieve further downsizing and a higher performance (reduction of the curvature of field aberration upon zooming). When the zooming is performed with the first lens group G1 fixed, the second lens group G2 and the groups thereafter need to be largely moved, rendering downsizing difficult. The configuration of performing focusing by using at least part of the intermediate lens group GM disposed more on the image surface side than the front-side lens group GX can reduce variation of the image magnification, the spherical aberration, and the curvature of field aberration upon focusing. The configuration in which the air lens disposed to the object side of the focusing lens group GF (movement direction upon focusing on a short distant object) has the meniscus shape can reduce the variation of the curvature of field aberration.

For example, in Example 1 described below corresponding to the configuration according to the 7th embodiment that includes the positive first lens group G1, the negative second lens group G2, the positive third lens group G3, the positive fourth lens group G4, and the fifth lens group G5 arranged in order from the object side, and performs focusing with the entire fourth lens group G4, the second and the third lens groups G2 and G3 correspond to the front-side lens group GX, the fourth lens group G4 corresponds to the intermediate lens group GM, and the fifth lens group G5 corresponds to the rear-side lens group GR.

For example, in Example 14 described below corresponding to the configuration according to the 7th embodiment that includes the positive first lens group G1, the negative second lens group G2, the positive third lens group G3, the negative fourth lens group G4, and the fifth lens group G5 arranged in order from the object side, and performs focusing with part of the third lens group G3, the second lens group G2 corresponds to the front-side lens group GX, the third lens group G3 corresponds to the intermediate lens group GM, and the fourth and the fifth lens groups G4 and G5 correspond to the rear-side lens group GR.

It is to be noted that the front-side lens group GX in the 7th embodiment is not limited to the configuration described above, and the following configuration may be employed.

For example, in the configuration including the positive first lens group, the negative second lens group, the positive third lens group, the positive fourth lens group, and the fifth lens group arranged in order from the object side as in Example 1, when focusing is performed by using the entire fifth lens group with the negative second lens group divided into two lens groups, the second to the fourth lens groups correspond to the front-side lens group.

In the configuration including the positive first lens group, the negative second lens group, the positive third lens group, the positive fourth lens group, and the fifth lens group arranged in order from the object side as in Example 1, when focusing is performed by using the entire fifth lens group with the positive first lens group divided into two lens groups, the image side of the first lens group to the fourth lens group correspond to the front-side lens group.

In the configuration including the positive first lens group, the negative second lens group, the positive third lens group, the positive fourth lens group, and the fifth lens group arranged in order from the object side as in Example 1, when focusing is performed by using the entire fifth lens group with another lens group added between the second lens group and the third lens group, the second to the fourth lens groups, including the added other lens group, correspond to the front-side lens group.

The zoom optical system ZLI according to the 7th embodiment with the configuration described above satisfies the following conditional expression (JG1).

$$-0.400<\beta Ft<0.400 \quad \text{(JG1)}$$

where, βFt: lateral magnification of the focusing lens group GF in the telephoto end state.

The conditional expression (JG1) is for setting an appropriate value of the lateral magnification of the focusing lens group GF in the telephoto end state. A sufficient performance upon focusing on short-distant object can be guaranteed in the telephoto end state upon focusing when the conditional expression (JG1) is satisfied.

A value higher than the upper limit value of the conditional expression (JG1) results in large variation of the spherical aberration in the telephoto end state upon focusing.

To guarantee the effects of the 7th embodiment, the upper limit value of the conditional expression (JG1) is preferably set to be 0.300. To more effectively guarantee the effects of the 7th embodiment, the upper limit value of the conditional expression (JG1) is preferably set to be 0.200. To more effectively guarantee the effects of the 7th embodiment, the upper limit value of the conditional expression (JG1) is preferably set to be 0.150. To more effectively guarantee the effects of the 7th embodiment, the upper limit value of the conditional expression (JG1) is preferably set to be 0.100.

A value lower than the lower limit value of the conditional expression (JG1) leads to a large movement amount of the focusing lens group GF upon focusing in the telephoto end state, and thus results in large variation of spherical aberration and curvature of field aberration.

To guarantee the effects of the 7th embodiment, the lower limit value of the conditional expression (JG1) is preferably set to be −0.300. To more effectively guarantee the effects of the 7th embodiment, the lower limit value of the conditional expression (JG1) is preferably set to be −0.200. To more effectively guarantee the effects of the 7th embodiment, the lower limit value of the conditional expression (JG1) is preferably set to be −0.150. To more effectively guarantee the effects of the 7th embodiment, the lower limit value of the conditional expression (JG1) is preferably set to be −0.100.

In the zoom optical system ZLI according to the 7th embodiment, a lens in the intermediate lens group GM may be the same as a lens in the focusing lens group GF.

In this configuration, the distance between the focusing lens group GF (=intermediate lens group GM) and the adjacent lens groups is changed upon zooming, whereby aberration reduction due to zooming can be prevented.

In the zoom optical system ZLI according to the 7th embodiment, part of the intermediate lens group GM may serve as the focusing lens group GF.

In this configuration, the focusing lens group GF and the other lens in the intermediate lens group GM (the lens on the front side or the image side of the focusing lens group GF) can integrally move upon zooming, whereby a simple barrel configuration can be achieved.

The zoom optical system ZLI according to the 7th embodiment preferably includes the vibration-proof lens group VR that is disposed between the focusing lens group GF (=intermediate lens group GM) and the lens closest to the image surface, and can move with a displacement component in the direction orthogonal to the optical axis.

In this configuration, the vibration-proof lens group VR can be achieved that is small and can successfully correct the variation of the curvature of field aberration upon decentering, with an appropriate image shift feeling upon decentering.

In the zoom optical system ZLI according to the 7th embodiment lenses disposed between the focusing lens group GF (=intermediate lens group GM) and the lens closest to the image surface may be the same as a lens in the vibration-proof lens group VR.

With this configuration, downsizing can be achieved with the image blur correction performance maintained.

In the zoom optical system ZLI according to the 7th embodiment part of the lenses disposed between the focusing lens group GF (=intermediate lens group GM) and the lens closest to the image surface may be a lens in the vibration-proof lens group VR.

With this configuration, the optical performance can be improved with the lens other than the vibration-proof lens group VR disposed between the intermediate lens group GM and the lens closest to the image surface. The distance between lenses disposed closer to the image surface than the intermediate lens group GM may be appropriately changed upon zooming.

Preferably, in the zoom optical system ZLI according to the 7th embodiment, a distance between the lens closest to the image surface in the lenses disposed to the object side of the focusing lens group GF and the focusing lens group GF may be reduced and then increased, upon zooming from the wide angle end state to the telephoto end state.

With this configuration, successful correction can be performed to prevent excessive curvature of field upon zooming.

Preferably, the zoom optical system ZLI according to the 7th embodiment satisfies the following conditional expression (JG2).

$$1.250<(rB+rA)/(rB-rA)<10.000 \quad \text{(JG2)}$$

where, rA denotes a radius of curvature of a lens surface facing a lens surface closest to an object in the focusing lens group GF with a distance in between, and rB denotes a radius of curvature of the lens surface closest to an object in the focusing lens group GF.

The conditional expression (JG2) is for setting an appropriate shape of the air lens disposed to the object side of the focusing lens group GF (direction of movement upon focusing on a short distant object). The air lens has the meniscus shape and thus a sufficient performance upon focusing on short-distant object can be obtained on or outside the axis when the conditional expression (JG2) is satisfied.

A value higher than the upper limit value of the conditional expression (JG2) leads to rA that is too large relative to rB, and thus results in a larger curvature of field aberration at the lens surface closest to an object in the focusing lens group GF than that at the lens surface facing the lens surface closest to an object in the focusing lens group GF with the distance in between. Thus, variation of the curvature of field aberration upon focusing on infinity and upon focusing on a short distant object becomes large.

To guarantee the effects of the 7th embodiment, the upper limit value of the conditional expression (JG2) is preferably set to be 6.670. To more effectively guarantee the effects of the 7th embodiment, the upper limit value of the conditional expression (JG2) is preferably set to be 5.000. To more effectively guarantee the effects of the 7th embodiment, the upper limit value of the conditional expression (JG2) is preferably set to be 4.000.

A value lower than the lower limit value of the conditional expression (JG2) leads to rA that is too small relative to rB. Thus, a curvature of field aberration at the lens surface facing the lens surface closest to an object in the focusing lens group GF with a distance in between overwhelms the correction capacity of the lens closest to an object in the focusing lens group GF, and thus results in large variation of curvature of field aberration upon focusing on infinity and upon focusing on a short distant object.

To guarantee the effects of the 7th embodiment, the lower limit value of the conditional expression (JG2) is preferably set to be 1.540. To more effectively guarantee the effects of the 7th embodiment, the lower limit value of the conditional expression (JG2) is preferably set to be 2.000. To more effectively guarantee the effects of the 7th embodiment, the lower limit value of the conditional expression (JG2) is preferably set to be 2.500.

Preferably, the zoom optical system ZLI according to the 7th embodiment satisfies the following conditional expression (JG3).

$$0.000<\beta Fw<0.800 \quad \text{(JG3)}$$

where, βFW denotes lateral magnification of the focusing lens group GF in the wide angle end state.

The conditional expression (JG3) is for setting an appropriate range of the magnification of the focusing lens group GF in the wide angle end state. When the conditional expression (JG3) is satisfied, the magnification related to the focusing lens group GF is appropriately set even when a sensor size is large, and thus the variation of aberration can be successfully reduced.

A value higher than an upper limit value of the conditional expression (JG3) results in a successful reduction of the movement amount of the focusing lens group GF but also results in failure to successfully correct variation of the spherical aberration upon focusing on a short distant object.

To guarantee the effects of the 7th embodiment, the upper limit value of the conditional expression (JG3) is preferably set to be 0.600. To more effectively guarantee the effects of the 7th embodiment, the upper limit value of the conditional expression (JG3) is preferably set to be 0.400. To more effectively guarantee the effects of the 7th embodiment, the upper limit value of the conditional expression (JG3) is preferably set to be 0.360. To more effectively guarantee the effects of the 7th embodiment, the upper limit value of the conditional expression (JG3) is preferably set to be 0.350.

A value lower than the lower limit value of the conditional expression (JG3) leads to a large movement amount of the focusing lens group GF, and thus results in a large optical system, and failure to successfully correct variation of the spherical aberration and the curvature of field aberration upon focusing.

To guarantee the effects of the 7th embodiment, the lower limit value of the conditional expression (JG3) is preferably set to be 0.020. To more effectively guarantee the effects of the 7th embodiment, the lower limit value of the conditional expression (JG3) is preferably set to be 0.040. To more effectively guarantee the effects of the 7th embodiment, the lower limit value of the conditional expression (JG3) is preferably set to be 0.060. To more effectively guarantee the effects of the 7th embodiment, the lower limit value of the conditional expression (JG3) is preferably set to be 0.080.

As described above, the 7th embodiment can achieve the zoom optical system ZLI featuring a small size, small variation of image magnification upon focusing, and an excellent optical performance.

Next, a camera (optical device) 1 including the above-described zoom optical system ZLI will be described with reference to FIG. 65. This camera 1 is the same as that in the 1st embodiment the configuration of which has been described above, and thus will not be described herein.

The zoom optical system ZLI according to the 7th embodiment, installed in the camera 1 as the imaging lens 2, features a small size, small variation of image magnification upon focusing, and an excellent optical performance, due to its characteristic lens configuration as can be seen in Examples described later. Thus, an optical device featuring a small size, small variation of image magnification upon focusing, and an excellent optical performance can be achieved with the camera 1.

The 7th embodiment is described with the mirrorless camera as an example, but this should not be construed in a limiting sense. For example, similar or the same effects as the camera 1 can be obtained with the above-described zoom optical system ZLI installed in a single lens reflex camera in which a quick return mirror is provided to a camera main body and a subject is monitored with a view finder optical system.

Figure 72:
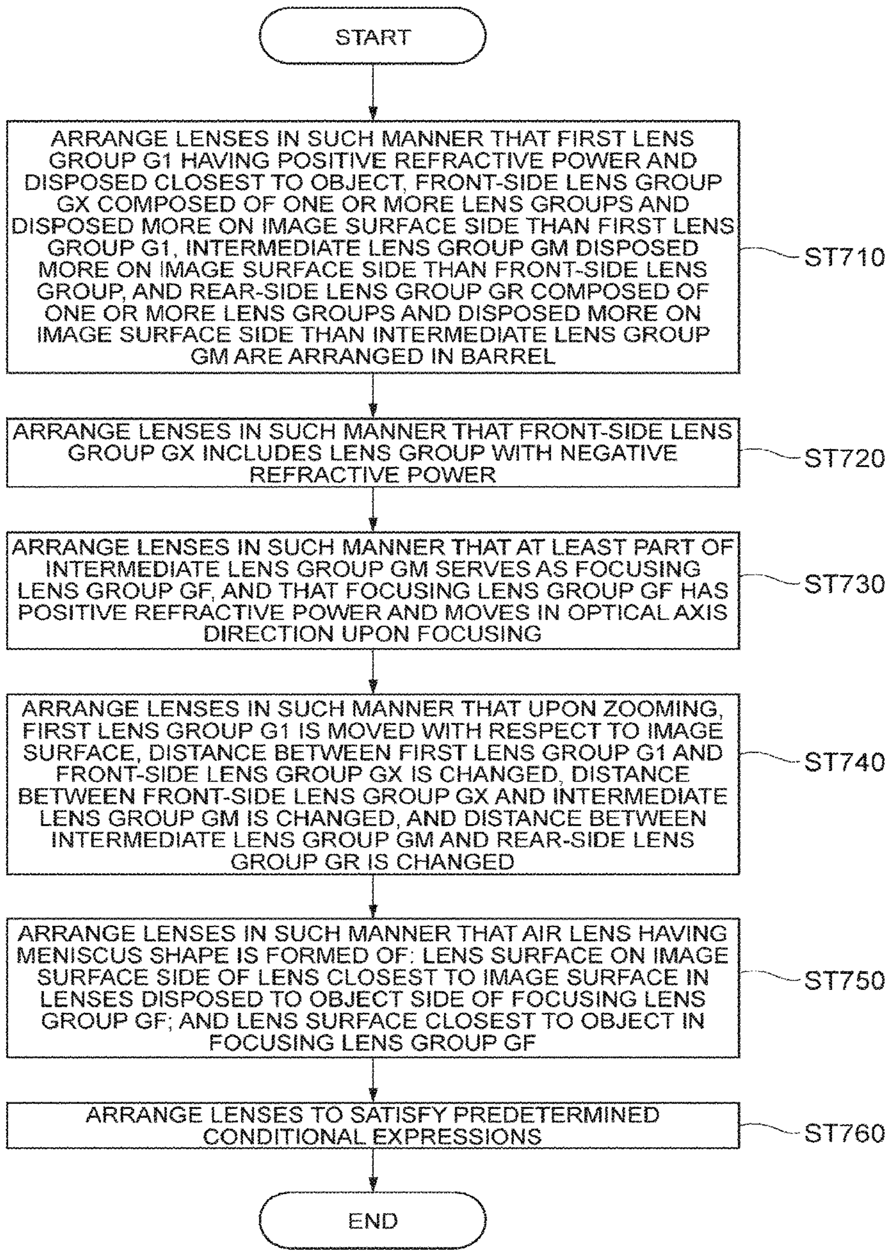
FIG. 72 is a diagram illustrating a method for manufacturing the zoom optical system according to the 7th embodiment.

Next, a method for manufacturing the above-described zoom optical system ZLI (ZL1) will be described with reference to FIG. 72. First of all, lenses are arranged in such a manner that the first lens group G1 having positive refractive power and disposed closest to an object, the front-side lens group GX composed of one or more lens groups and disposed more on the image surface side than the first lens group G1, the intermediate lens group GM disposed more on the image surface side than the front-side lens group, and the rear-side lens group GR composed of one or more lens groups and disposed more on the image surface side than the intermediate lens group GM are arranged in a barrel (step ST710). The lenses are arranged in such a manner that the front-side lens group GX includes a lens group with negative refractive power (step ST720). The lenses are arranged in such a manner that at least part of the intermediate lens group GM serves as the focusing lens group GF, and that the focusing lens group GF has positive refractive power and moves in the optical axis direction upon focusing (step ST730). The lenses are arranged in such a manner that upon zooming, the first lens group G1 is moved with respect to an image surface, the distance between the first lens group G1 and the front-side lens group GX is changed, the distance between the front-side lens group GX and the intermediate lens group GM is changed, and the distance between the intermediate lens group GM and the rear-side lens group GR is changed (step ST740). The lenses are arranged in such a manner that an air lens having a meniscus shape is formed of: a lens surface on the side of the image surface of a lens closest to the image surface in lenses disposed to the object side of the focusing lens group GF; and a lens surface closest to an object in the focusing lens group GF (step ST750). The lenses are arranged to satisfy at least the following conditional expression (JG1) in the conditional expressions described above (step ST760).

In one example of the lens arrangement according to the 7th embodiment, as illustrated in FIG. 1, the first lens group G1 including the cemented lens including the negative meniscus lens L11 having a concave surface facing the image surface side and the biconvex lens L12, and the positive meniscus lens L13 having a convex surface facing the object side, the second lens group G2 including the negative meniscus lens L21 having a concave surface facing the image surface side, the negative meniscus lens L22 having a concave surface facing the object side, the biconvex lens L23, and the negative meniscus lens L24 having a concave surface facing the object side, the third lens group G3 including the biconvex lens L31, the aperture stop S, the cemented lens including the negative meniscus lens L32 having a concave surface facing the image surface side and the biconvex lens L33, the biconvex lens L34, and the cemented lens including the biconvex lens L35 and the biconcave lens L36, the fourth lens group G4 including the cemented lens including the biconvex lens L41 and the negative meniscus lens L42 having a concave surface facing the object side, and the fifth lens group G5 including the cemented lens including a positive meniscus lens L51 having a convex surface facing the image surface side and the biconcave lens L52, the biconvex lens L53, and the negative meniscus lens L54 having a concave surface facing the object side are arranged in order from the object side. The zoom optical system ZLI is manufactured with the lens groups thus arranged through the procedure described above.

With the manufacturing method according to the 7th embodiment, the zoom optical system ZLI featuring a small size, small variation of image magnification upon focusing, and an excellent optical performance can be manufactured.

The 8th embodiment is described below with reference to drawings. As illustrated in FIG. 1, a zoom optical system ZLI (ZL1) according to the 8th embodiment includes: the first lens group G1 having positive refractive power and disposed closest to an object; the front-side lens group GX composed of one or more lens groups and disposed more on the image surface side than the first lens group G1; the intermediate lens group GM disposed more on the image surface side than the front-side lens group GX; and the rear-side lens group GR composed of one or more lens groups and disposed more on the image surface side than the intermediate lens group GM. The front-side lens group GX includes a lens group having negative refractive power. At least part of the intermediate lens group GM is the focusing lens group GF. The focusing lens group GF has positive refractive power and moves in the optical axis direction upon focusing. Upon zooming, the first lens group G1, the at least one front-side lens group GX, the intermediate lens group GM, the at least one rear-side lens group GR move with respect to the image surface, and the distance between the first lens group G1 and the front-side lens group GX is changed, the distance between the front-side lens group GX and the intermediate lens group GM is changed, and the distance between the intermediate lens group GM and the rear-side lens group GR is changed.

The configuration of including the positive first lens group G1, the front-side lens group GX including a negative lens group, the intermediate lens group GM including the positive focusing lens group GF, and the rear-side lens group GR, and performing the zooming by changing a distance between the lens groups can have a small size and achieve an excellent optical performance. The configuration in which the first lens group G1, the front-side lens group GX, the intermediate lens group GM, the rear-side lens group GR move with respect to the image surface upon zooming can achieve efficient zooming, and can achieve further downsizing and a higher performance (reduction of the curvature of field aberration upon zooming). The configuration of performing focusing by using at least part of the intermediate lens group GM disposed more on the image surface side than the front-side lens group GX can reduce variation of the image magnification, the spherical aberration, and the curvature of field aberration upon focusing.

For example, in Example 1 described below corresponding to the configuration according to the 8th embodiment that includes the positive first lens group G1, the negative second lens group G2, the positive third lens group G3, the positive fourth lens group G4, and the fifth lens group G5 arranged in order from the object side, and performs focusing with the entire fourth lens group G4, the second and the third lens groups G2 and G3 correspond to the front-side lens group GX, the fourth lens group G4 corresponds to the intermediate lens group GM, and the fifth lens group G5 corresponds to the rear-side lens group GR.

It is to be noted that the front-side lens group GX in the 8th embodiment is not limited to the configuration described above, and the following configuration may be employed.

For example, in the configuration including the positive first lens group, the negative second lens group, the positive third lens group, the positive fourth lens group, and the fifth lens group arranged in order from the object side as in Example 1, when the focusing is performed by using the entire fifth lens group with the negative second lens group divided into two lens groups, the second to the fourth lens groups correspond to the front-side lens group.

In the configuration including the positive first lens group, the negative second lens group, the positive third lens group, the positive fourth lens group, and the fifth lens group arranged in order from the object side as in Example 1, when focusing is performed by using the entire fifth lens group with the positive first lens group divided into two lens groups, the image side of the first lens group to the fourth lens group correspond to the front-side lens group.

In the configuration including the positive first lens group, the negative second lens group, the positive third lens group, the positive fourth lens group, and the fifth lens group arranged in order from the object side as in Example 1, when the focusing is performed by using the entire fifth lens group with another lens group added between the second lens group and the third lens group, the second to the fourth lens groups, including the added other lens group, correspond to the front-side lens group.

The zoom optical system ZLI according to the 8th embodiment with the configuration described above satisfies the following conditional expression (JH1).

$$1.490<(rB+rA)/(rB-rA)<3.570 \quad \text{(JH1)}$$

where rA denotes a radius of curvature of a lens surface facing a lens surface closest to an object in the focusing lens group GF with a distance in between, and rB denotes a radius of curvature of the lens surface closest to an object in the focusing lens group GF.

The conditional expression (JH1) is for setting an appropriate shape of the air lens disposed to the object side of the focusing lens group GF (direction of movement upon focusing on a short distant object). The air lens has the meniscus shape and thus a sufficient performance upon focusing on short-distant object can be obtained on or outside the axis when the conditional expression (JH1) is satisfied.

A value higher than the upper limit value of the conditional expression (JH1) leads to rA that is too large relative to rB, and thus results in a larger curvature of field aberration at the lens surface closest to an object in the focusing lens group GF than that at the lens surface facing the lens surface closest to an object in the focusing lens group GF with a distance in between. Thus, variation of the curvature of field aberration upon focusing on infinity and upon focusing on a short distant object becomes large.

To guarantee the effects of the 8th embodiment, the upper limit value of the conditional expression (JH1) is preferably set to be 3.509. To more effectively guarantee the effects of the 8th embodiment, the upper limit value of the conditional expression (JH1) is preferably set to be 3.390. To more effectively guarantee the effects of the 8th embodiment, the upper limit value of the conditional expression (JH1) is preferably set to be 3.279.

A value lower than the lower limit value of the conditional expression (JH1) leads to rA that is too small relative to rB. Thus, a curvature of field aberration at the lens surface facing the lens surface closest to an object in the focusing lens group GF with a distance in between overwhelms the correction capacity of the lens surface closest to an object in the focusing lens group GF, and thus results in large variation of curvature of field aberration upon focusing on infinity and upon focusing on a short distant object.

To guarantee the effects of the 8th embodiment, the lower limit value of the conditional expression (JH1) is preferably set to be 1.667. To more effectively guarantee the effects of the 8th embodiment, the lower limit value of the conditional expression (JH1) is preferably set to be 2.000. To more effectively guarantee the effects of the 8th embodiment, the lower limit value of the conditional expression (JH1) is preferably set to be 2.500.

In the zoom optical system ZLI according to the 8th embodiment, a lens in the intermediate lens group GM may be the same as a lens in the focusing lens group GF.

In this configuration, the distance between the focusing lens group GF (=intermediate lens group GM) and the adjacent lens groups is changed upon zooming, whereby aberration reduction due to zooming can be prevented.

In the zoom optical system ZLI according to the 8th embodiment, part of the intermediate lens group GM may serve as the focusing lens group GF.

In this configuration, the focusing lens group GF and the other lens in the intermediate lens group GM (the lens on the front side or the image side of the focusing lens group GF) can integrally move upon zooming, whereby a simple barrel configuration can be achieved.

The zoom optical system ZLI according to the 8th embodiment preferably includes the vibration-proof lens group VR that is disposed between the focusing lens group GF and the lens closest to the image surface, and can move with a displacement component in the direction orthogonal to the optical axis.

In this configuration, the vibration-proof lens group VR can be achieved that is small and can successfully correct the variation of the curvature of field aberration upon decentering, with an appropriate image shift feeling upon decentering.

In the zoom optical system ZLI according to the 8th embodiment lenses disposed between the focusing lens group GF (=intermediate lens group GM) and the lens closest to the image surface may be the same as a lens in the vibration-proof lens group VR.

With this configuration, downsizing can be achieved with the image blur correction performance maintained.

In the zoom optical system ZLI according to the 8th embodiment part of the lenses disposed between the focusing lens group GF (=intermediate lens group GM) and the lens closest to the image surface may be a lens in the vibration-proof lens group VR.

With this configuration, the optical performance can be improved with the lens other than the vibration-proof lens group VR disposed between the intermediate lens group GM and the lens closest to the image surface. The distance between lenses disposed closer to the image surface than the intermediate lens group GM may be appropriately changed upon zooming.

Preferably, in the zoom optical system ZLI according to the 8th embodiment, a distance between the lens closest to the image surface in the lenses disposed to the object side of the focusing lens group GF and the focusing lens group GF may be reduced and then increased, upon zooming from the wide angle end state to the telephoto end state.

With this configuration, successful correction can be performed to prevent excessive curvature of field upon zooming.

Preferably, the zoom optical system ZLI according to the 8th embodiment satisfies the following conditional expression (JH2).

$$0.500<(rC+rB)/(rC-rB)<0.500 \qquad \text{(JH2)}$$

where, rC: a radius of curvature of the lens closest to the image surface in the focusing lens group GF.

The conditional expression (JH2) is for setting an appropriate shape of the focusing lens group GF. A sufficient performance upon focusing on short-distant object as well as downsizing can be achieved with the movement amount of the focusing lens group GF reduced, when the conditional expression (JH2) is satisfied.

A value higher than the upper limit value of the conditional expression (JH2) leads to the radius of curvature rC of the lens surface closest to the image surface that is too large relative to the radius of curvature rB of the lens surface closest to an object in the focusing lens group GF, and thus results in a large variation of the curvature of field aberration upon focusing on infinity and focusing on a short distant object.

To guarantee the effects of the 8th embodiment, the upper limit value of the conditional expression (JH2) is preferably set to be 0.300. To more effectively guarantee the effects of the 8th embodiment, the upper limit value of the conditional expression (JH2) is preferably set to be 0.200. To more effectively guarantee the effects of the 8th embodiment, the upper limit value of the conditional expression (JH2) is preferably set to be 0.100. To more effectively guarantee the effects of the 8th embodiment, the upper limit value of the conditional expression (JH2) is preferably set to be 0.050.

A value lower than the lower limit value of the conditional expression (JH2) leads to the radius of curvature rC of the lens surface closest to the image surface that is too small relative to the radius of curvature rB of the lens surface closest to an object in the focusing lens group GF, and thus results in a large variation of the spherical aberration upon focusing on infinity and focusing on a short distant object.

To guarantee the effects of the 8th embodiment, the lower limit value of the conditional expression (JH2) is preferably set to be −0.400. To more effectively guarantee the effects of the 8th embodiment, the lower limit value of the conditional expression (JH2) is preferably set to be −0.350. To more effectively guarantee the effects of the 8th embodiment, the lower limit value of the conditional expression (JH2) is preferably set to be −0.300. To more effectively guarantee the effects of the 8th embodiment, the lower limit value of the conditional expression (JH2) is preferably set to be −0.250.

In the zoom optical system ZLI according to the 8th embodiment, the focusing lens group GF preferably includes a negative lens having a meniscus shape with the concave surface facing the object side.

With this configuration, the curvature of field aberration and coma aberration can be successfully corrected.

Preferably, the zoom optical system ZLI according to the 8th embodiment satisfies the following conditional expression (JH3).

$$0.010<|fF/fXR|<10.000 \qquad \text{(JH3)}$$

where, fF denotes a focal length of the focusing lens group GF, and fXR denotes a focal length of the lens group closest to the image surface in the front-side lens group GX.

The conditional expression (JH3) is for setting an appropriate value of the focal length of the focusing lens group GF with respect to the focal length of the lens group facing the object side of the focusing lens group GF. An appropriate movement amount of the focusing lens group GF can be obtained with the short distance performance maintained, when the conditional expression (JH3) is satisfied.

A value higher than the upper limit value of the conditional expression (JH3) results in along focal length fF, that is, a large movement amount of the focusing lens group GF upon focusing, leading to large spherical aberration and curvature of field aberration. The large movement amount of the focusing lens group GF leads to a large entire length. Furthermore, the value results in a short focal length of the lens group facing the object side of the focusing lens group GF, and thus leads to the lens group involving a large spherical aberration.

To guarantee the effects of the 8th embodiment, the upper limit value of the conditional expression (JH3) is preferably set to be 8.000. To more effectively guarantee the effects of the 8th embodiment, the upper limit value of the conditional expression (JH3) is preferably set to be 6.000.

A value lower than a lower limit value of the conditional expression (JH3) results in a short focal length of the focusing lens group GF, and thus leads to the focusing lens group GF involving large spherical aberration and curvature of field aberration.

To guarantee the effects of the 8th embodiment, the lower limit value of the conditional expression (JH3) is preferably set to be 0.300. To more effectively guarantee the effects of the 8th embodiment, the lower limit value of the conditional expression (JH3) is preferably set to be 0.650.

Preferably, the zoom optical system ZLI according to the 8th embodiment satisfies the following conditional expression (JH4).

$$0.000<\beta Fw<0.800 \qquad \text{(JH4)}$$

where, βFw denotes lateral magnification of the focusing lens group GF in the wide angle end state.

The conditional expression (JH4) is for setting an appropriate range of the magnification of the focusing lens group GF in the wide angle end state. When the conditional expression (JH4) is satisfied, the magnification related to the focusing lens group GF is appropriately set even when a sensor size is large, and thus the variation of aberration can be successfully reduced.

A value higher than an upper limit value of the conditional expression (JH4) results in a successful reduction of the movement amount of the focusing lens group GF but also results in failure to successfully correct variation of the spherical aberration upon focusing on a short distant object.

To guarantee the effects of the 8th embodiment, the upper limit value of the conditional expression (JH4) is preferably set to be 0.600. To more effectively guarantee the effects of the 8th embodiment, the upper limit value of the conditional expression (JH4) is preferably set to be 0.400. To more effectively guarantee the effects of the 8th embodiment, the upper limit value of the conditional expression (JH4) is preferably set to be 0.360. To more effectively guarantee the effects of the 8th embodiment, the upper limit value of the conditional expression (JH4) is preferably set to be 0.350.

A value lower than the lower limit value of the conditional expression (JH4) leads to a large movement amount of the focusing lens group GF, and thus results in a large optical system, and failure to successfully correct variation of the spherical aberration and the curvature of field aberration upon focusing.

To guarantee the effects of the 8th embodiment, the lower limit value of the conditional expression (JH4) is preferably set to be 0.020. To more effectively guarantee the effects of the 8th embodiment, the lower limit value of the conditional expression (JH4) is preferably set to be 0.040. To more effectively guarantee the effects of the 8th embodiment, the lower limit value of the conditional expression (JH4) is preferably set to be 0.060. To more effectively guarantee the effects of the 8th embodiment, the lower limit value of the conditional expression (JH4) is preferably set to be 0.080.

As described above, the 8th embodiment can achieve the zoom optical system ZLI featuring a small size, small variation of image magnification upon focusing, and an excellent optical performance.

Next, a camera (optical device) 1 including the above-described zoom optical system ZLI will be described with reference to FIG. 65. This camera 1 is the same as that in the 1st embodiment the configuration of which has been described above, and thus will not be described herein.

The zoom optical system ZLI according to the 8th embodiment, installed in the camera 1 as the imaging lens 2, features a small size, small variation of image magnification upon focusing, and an excellent optical performance, due to its characteristic lens configuration as can be seen in Examples described later. Thus, an optical device featuring a small size, small variation of image magnification upon focusing, and an excellent optical performance can be achieved with the camera 1.

The 8th embodiment is described with the mirrorless camera as an example, but this should not be construed in a limiting sense. For example, similar or the same effects as the camera 1 can be obtained with the above-described zoom optical system ZLI installed in a single lens reflex camera in which a quick return mirror is provided to a camera main body and a subject is monitored with a view finder optical system.

Figure 73:
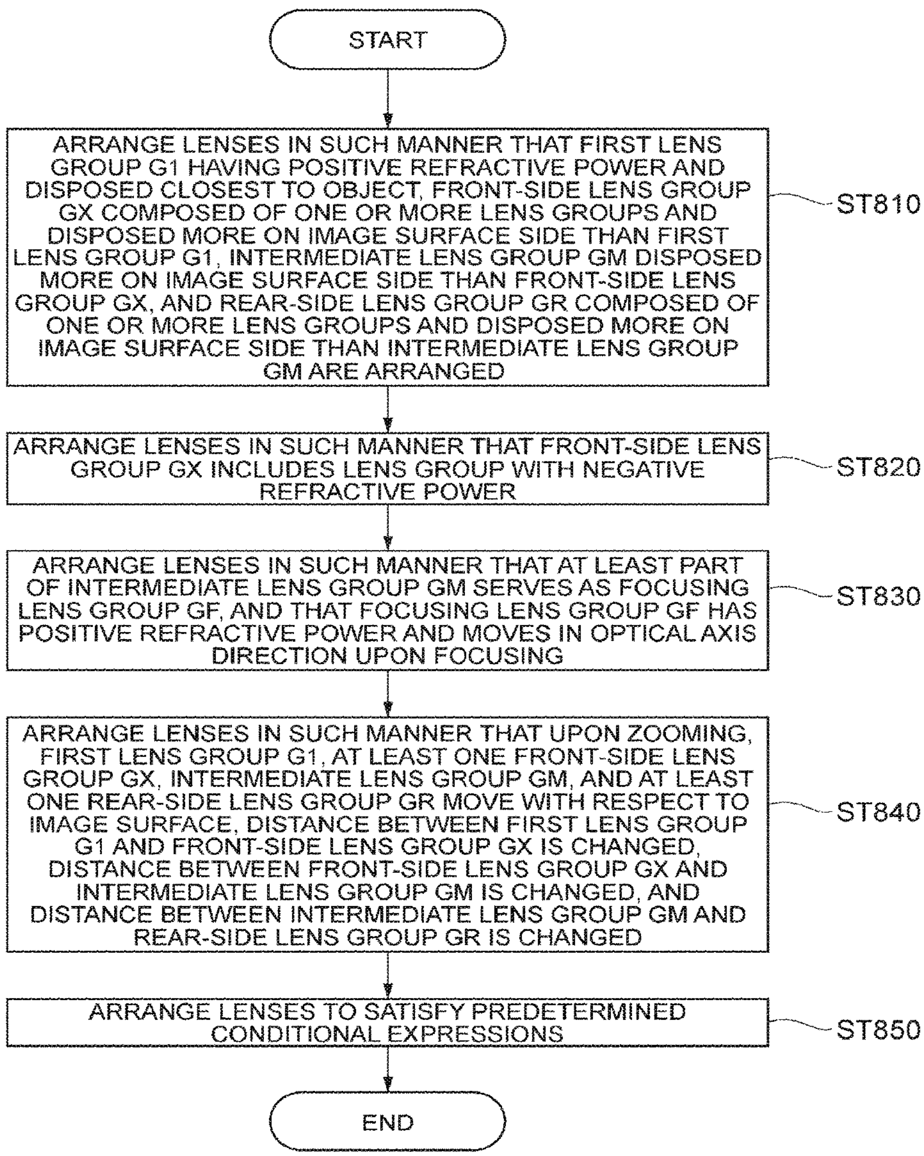
FIG. 73 is a diagram illustrating a method for manufacturing the zoom optical system according to the 8th embodiment.

Next, a method for manufacturing the above-described zoom optical system ZLI (ZL1) will be described with reference to FIG. 73. First of all, lenses are arranged in such a manner that the first lens group G1 having positive refractive power and disposed closest to an object, the front-side lens group GX composed of one or more lens groups and disposed more on the image surface side than the first lens group G1, the intermediate lens group GM disposed more on the image surface side than the front-side lens group GX, and the rear-side lens group GR composed of one or more lens groups and disposed more on the image surface side than the intermediate lens group GM are arranged in a barrel (step ST810). The lenses are arranged in such a manner that the front-side lens group GX includes a lens group with negative refractive power (step ST820). The lenses are arranged in such a manner that at least part of the intermediate lens group GM serves as the focusing lens group GF, and that the focusing lens group GF has positive refractive power and moves in the optical axis direction upon focusing (step ST830). The lenses are arranged in such a manner that upon zooming, the first lens group G1, the at least one front-side lens group GX, the intermediate lens group GM, the at least one rear-side lens group GR move with respect to the image surface, the distance between the first lens group G1 and the front-side lens group GX is changed, the distance between the front-side lens group GX and the intermediate lens group GM is changed, and the distance between the intermediate lens group GM and the rear-side lens group GR is changed (step ST840). The lenses are arranged to satisfy at least the conditional expression (JH1) in the conditional expressions described above (step ST850).

In one example of the lens arrangement according to the 8th embodiment, as illustrated in FIG. 1, the first lens group G1 including the cemented lens including the negative meniscus lens L11 having a concave surface facing the image surface side and the biconvex lens L12, and the positive meniscus lens L13 having a convex surface facing the object side, the second lens group G2 including the negative meniscus lens L21 having a concave surface facing the image surface side, the negative meniscus lens L22 having a concave surface facing the object side, the biconvex lens L23, and the negative meniscus lens L24 having a concave surface facing the object side, the third lens group G3 including the biconvex lens L31, the aperture stop S, the cemented lens including the negative meniscus lens L32 having a concave surface facing the image surface side and the biconvex lens L33, the biconvex lens L34, and the cemented lens including the biconvex lens L35 and the biconcave lens L36, the fourth lens group G4 including the cemented lens including the biconvex lens L41 and the negative meniscus lens L42 having a concave surface facing the object side, and the fifth lens group G5 including the cemented lens including a positive meniscus lens L51 having a convex surface facing the image surface side and the biconcave lens L52, the biconvex lens L53, and the negative meniscus lens L54 having a concave surface facing the object side are arranged in order from the object side The zoom optical system ZLI is manufactured with the lens groups thus arranged through the procedure described above.

With the manufacturing method according to the 8th embodiment, the zoom optical system ZLI featuring a small size, small variation of image magnification upon focusing, and an excellent optical performance can be manufactured.

Figure 25:
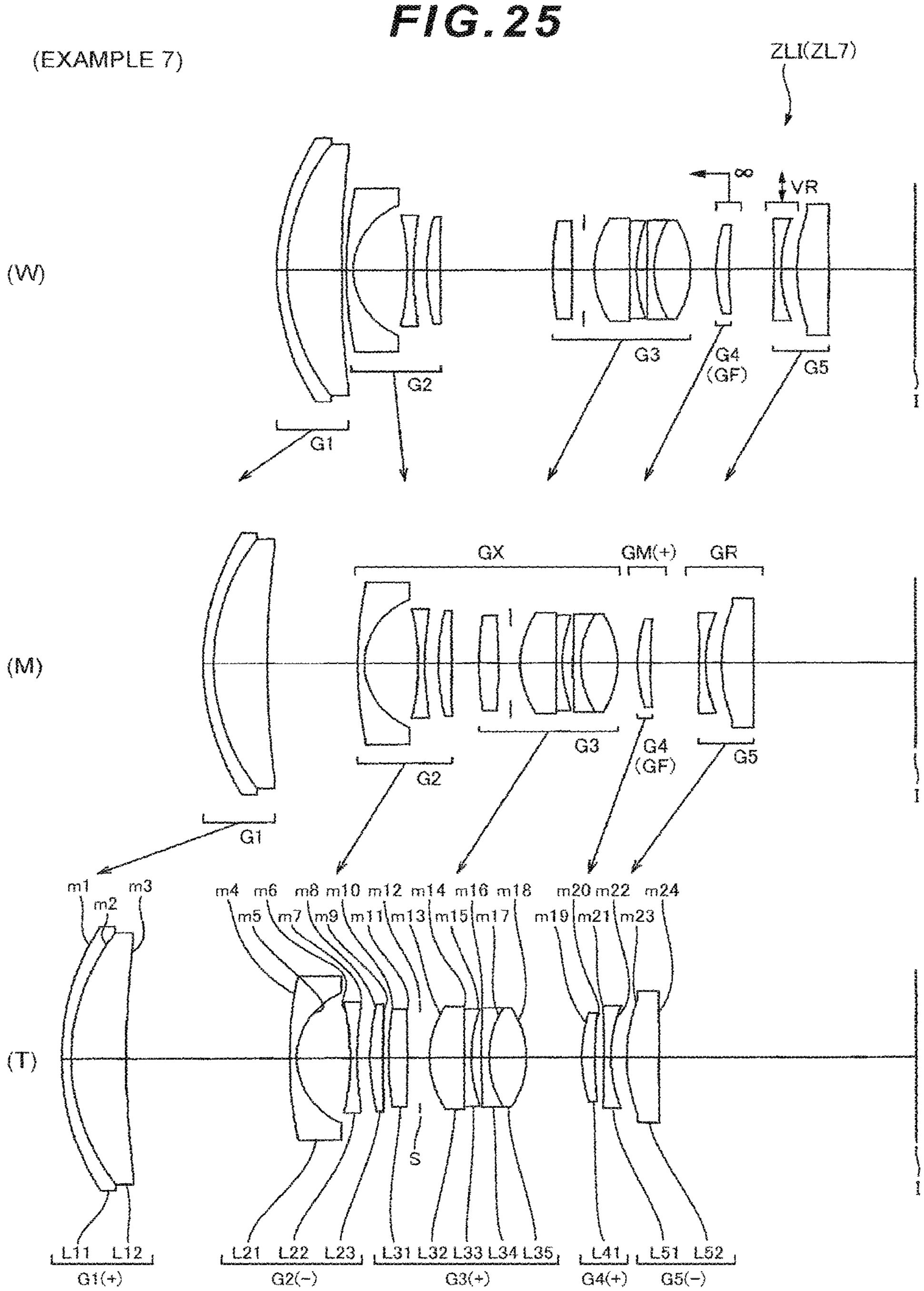
FIG. 25 is a cross-sectional view with sections (W), (M), and (T) showing a zoom optical system according to Example 7 respectively in the wide angle end state, the intermediate focal length state, and the telephoto end state.

The 9th embodiment is described below with reference to drawings. As illustrated in FIG. 25, a zoom optical system ZLI (ZL7) according to the 9th embodiment includes: the first lens group G1 having positive refractive power and disposed closest to an object; the front-side lens group GX composed of one or more lens groups and disposed more on the image surface side than the first lens group G1; the intermediate lens group GM disposed more on the image surface side than the front-side lens group GX; and the rear-side lens group GR composed of one or more lens groups and disposed more on the image surface side than the intermediate lens group GM. The front-side lens group GX includes a lens group having negative refractive power. At least part of the intermediate lens group GM is the focusing lens group GF. The focusing lens group GF has positive refractive power and moves in the optical axis direction upon focusing. The vibration-proof lens group VR is disposed between the focusing lens group GF and a lens closest to the image surface, and the vibration-proof lens group VR can move with a displacement component in the direction orthogonal to the optical axis. Upon zooming, the first lens group G1 is moved with respect to an image surface, the distance between the first lens group G1 and the front-side lens group GX is changed, the distance between the front-side lens group GX and the intermediate lens group GM is changed, and the distance between the intermediate lens group GM and the rear-side lens group GR is changed. A lens surface closest to an object in the focusing lens group GF is convex toward the object side.

The configuration including the positive first lens group G1, the front-side lens group GX including a negative lens group, the intermediate lens group GM including the positive focusing lens group GF, and the vibration-proof lens group VR, and performing the zooming by changing a distance between the lens groups can have a small size and achieve an excellent optical performance. The configuration in which the first lens group G1 is moved with respect to the image surface upon zooming can achieve efficient zooming, and can achieve further downsizing and a higher performance (reduction of the curvature of field aberration upon zooming). The configuration of performing focusing by using at least part of the intermediate lens group GM disposed more on the image surface side than the front-side lens group GX can reduce variation of the image magnification, the spherical aberration, and the curvature of field aberration upon focusing. The configuration in which the vibration-proof lens group VR is more on the image side than the focusing lens group GF and thus is not the final lens can achieve downsizing and successful image blur correction. The lens surface closest to an object in the focusing lens group GF is convex toward the object side (that is, the air lens disposed to the object side of the focusing lens group GF (the direction of movement upon focusing on a short distant object) has a concaved shape). Thus, the variation of the spherical aberration and the coma aberration upon focusing can be reduced.

For example, in Example 7 described below corresponding to the configuration according to the 9th embodiment that includes the positive first lens group G1, the negative second lens group G2, the positive third lens group G3, the positive fourth lens group G4, and the fifth lens group G5 arranged in order from the object side, and performs focusing with the entire fourth lens group G4, the second and the third lens groups G2 and G3 correspond to the front-side lens group GX, the fourth lens group G4 corresponds to the intermediate lens group GM, and the lens L51 of the fifth lens group G5 corresponds to the vibration-proof lens group VR.

It is to be noted that the front-side lens group GX in the 9th embodiment is not limited to the configuration described above, and the following configuration may be employed.

For example, in the configuration including the positive first lens group, the negative second lens group, the positive third lens group, the positive fourth lens group, and the fifth lens group arranged in order from the object side as in Example 7, when focusing is performed by using the entire fifth lens group with the negative second lens group divided into two lens groups, the second to the fourth lens groups correspond to the front-side lens group.

In the configuration including the positive first lens group, the negative second lens group, the positive third lens group, the positive fourth lens group, and the fifth lens group arranged in order from the object side as in Example 7, when focusing is performed by using the entire fifth lens group with the positive first lens group divided into two lens groups, the image side of the first lens group to the fourth lens group correspond to the front-side lens group.

In the configuration including the positive first lens group, the negative second lens group, the positive third lens group, the positive fourth lens group, and the fifth lens group arranged in order from the object side as in Example 7, when focusing is performed by using the entire fifth lens group with another lens group added between the second lens group and the third lens group, the second to the fourth lens groups, including the added other lens group, correspond to the front-side lens group.

The zoom optical system ZLI according to the 9th embodiment with the configuration described above satisfies the following conditional expressions (JI1) and (JI2).

$$0.000<(rB+rA)/(rB-rA)<1.000 \quad \text{(JI1)}$$

$$0.000<(rC+rB)/(rC-rB)<10.000 \quad \text{(JI2)}$$

where, rA denotes a radius of curvature of a lens surface facing a lens surface closest to an object in the focusing lens group GF with a distance in between, and rB denotes a radius of curvature of the lens surface closest to an object in the focusing lens group GF, and rC denotes a radius of curvature of the lens surface closest to the image surface in the focusing lens group GF.

The conditional expression (JI1) is for setting an appropriate shape of the air lens disposed to the object side of the focusing lens group GF (direction of movement upon focusing on a short distant object). The air lens has the concave shape and thus a sufficient performance upon focusing on short-distant object can be obtained on or outside the axis when the conditional expression (JI1) is satisfied.

A value exceeds the upper limit value of the conditional expression (JI1) leads to rA that is too small relative to rB. Thus, a curvature of field aberration at the lens surface closest to the image surface in the third lens group G3 overwhelms the correction capacity of the lens surface closest to an object in the fourth lens group G4, and thus results in large variation of curvature of field aberration upon focusing on infinity and upon focusing on a short distant object.

To guarantee the effects of the 9th embodiment, the upper limit value of the conditional expression (JI1) is preferably set to be 0.800. To more effectively guarantee the effects of the 9th embodiment, the upper limit value of the conditional expression (JI1) is preferably set to be 0.600. To more effectively guarantee the effects of the 9th embodiment, the upper limit value of the conditional expression (JI1) is preferably set to be 0.500. To more effectively guarantee the effects of the 9th embodiment, the upper limit value of the conditional expression (JI1) is preferably set to be 0.400.

A value lower than the lower limit value of the conditional expression (JI1) leads to rA that is too large relative to rB. Thus, a curvature of field aberration at the lens surface closest to the image surface in the third lens group G3 overwhelms the curvature of field aberration at the lens surface closest to an object in the fourth lens group G4, and thus results in large variation of curvature of field aberration upon focusing on infinity and upon focusing on a short distant object.

To guarantee the effects of the 9th embodiment, the lower limit value of the conditional expression (JI1) is preferably set to be 0.040. To more effectively guarantee the effects of the 9th embodiment, the lower limit value of the conditional expression (JI1) is preferably set to be 0.060. To more effectively guarantee the effects of the 9th embodiment, the lower limit value of the conditional expression (JI1) is preferably set to be 0.080. To more effectively guarantee the effects of the 9th embodiment, the lower limit value of the conditional expression (JI1) is preferably set to be 0.100.

The conditional expression (JI2) is for setting an appropriate shape of the focusing lens group GF. A sufficient performance upon focusing on short-distant object as well as downsizing can be achieved when the conditional expression (J12) is satisfied.

A value higher than the upper limit value of the conditional expression (JI2) leads to an excessively small difference between the radius of curvature rB of the lens surface closest to an object in the focusing lens group GF relative to the radius of curvature rC of the lens surface closest to the image surface, and thus results in a large variation of the curvature of field aberration. When the values of the radius of curvature rB and rC is close, the focusing lens group GF is difficult to have power, and thus the movement amount of the focusing lens group GF increases.

To guarantee the effects of the 9th embodiment, the upper limit value of the conditional expression (JI2) is preferably set to be 8.000. To more effectively guarantee the effects of the 9th embodiment, the upper limit value of the conditional expression (JI2) is preferably set to be 6.000. To more effectively guarantee the effects of the 9th embodiment, the upper limit value of the conditional expression (JI2) is preferably set to be 5.000. To more effectively guarantee the effects of the 9th embodiment, the upper limit value of the conditional expression (JI2) is preferably set to be 4.000.

A value lower than the lower limit value of the conditional expression (JI2) leads to an excessively large difference between the radius of curvature rB of the lens surface closest to an object in the focusing lens group GF relative to the radius of curvature rC of the lens surface closest to the image surface, and thus results in a large variation of the spherical aberration.

To guarantee the effects of the 9th embodiment, the lower limit value of the conditional expression (JI2) is preferably set to be 0.200. To more effectively guarantee the effects of the 9th embodiment, the lower limit value of the conditional expression (JI2) is preferably set to be 0.300. To more effectively guarantee the effects of the 9th embodiment, the lower limit value of the conditional expression (JI2) is preferably set to be 0.400. To more effectively guarantee the effects of the 9th embodiment, the lower limit value of the conditional expression (JI2) is preferably set to be 0.500.

In the zoom optical system ZLI according to the 9th embodiment, a lens in the intermediate lens group GM may be the same as a lens in the focusing lens group GF.

In this configuration, the distance between the focusing lens group GF (=intermediate lens group GM) and the adjacent lens groups is changed upon zooming, whereby aberration reduction due to zooming can be prevented.

In the zoom optical system ZLI according to the 9th embodiment, part of the intermediate lens group GM may serve as the focusing lens group GF.

In this configuration, the focusing lens group GF and the other lens in the intermediate lens group GM (the lens on the front side or the image side of the focusing lens group GF) can integrally move upon zooming, whereby a simple barrel configuration can be achieved.

In the zoom optical system ZLI according to the 9th embodiment lenses disposed between the focusing lens group GF (=intermediate lens group GM) and the lens closest to the image surface may be the same as a lens in the vibration-proof lens group VR.

With this configuration, downsizing can be achieved with the image blur correction performance maintained.

In the zoom optical system ZLI according to the 9th embodiment part of the lenses disposed between the focusing lens group GF (=intermediate lens group GM) and the lens closest to the image surface may be a lens in the vibration-proof lens group VR.

With this configuration, the optical performance can be improved with the lens other than the vibration-proof lens group VR disposed between the intermediate lens group GM and the lens closest to the image surface. The distance between lenses disposed closer to the image surface than the intermediate lens group GM may be appropriately changed upon zooming.

Preferably, in the zoom optical system ZLI according to the 9th embodiment, a distance between the lens closest to the image surface in the lenses disposed to the object side of the focusing lens group GF and the focusing lens group GF may be reduced and then increased, upon zooming from the wide angle end state to the telephoto end state.

With this configuration, successful correction can be performed to prevent excessive curvature of field upon zooming.

Preferably, the zoom optical system ZLI according to the 9th embodiment satisfies the following conditional expression (JI3).

$$0.010<|fF/fXR|<10.000 \quad \text{(JI3)}$$

where, fF denotes a focal length of the focusing lens group GF, and fXR denotes a focal length of the lens group closest to the image surface in the front-side lens group GX.

The conditional expression (JI3) is for setting an appropriate value of the focal length of the focusing lens group GF with respect to the focal length of the lens group facing the object side of the focusing lens group GF. An appropriate movement amount of the focusing lens group GF can be obtained with the short distance performance maintained, when the conditional expression (JI3) is satisfied.

A value higher than the upper limit value of the conditional expression (JI3) results in along focal length fF, that is, a large movement amount of the focusing lens group GF upon focusing, leading to large spherical aberration and curvature of field aberration. The large movement amount of the focusing lens group GF leads to a large entire length. Furthermore, the value results in a short focal length of the lens group facing the object side of the focusing lens group GF, and thus leads to the focusing lens group involving a large spherical aberration.

To guarantee the effects of the 9th embodiment, the upper limit value of the conditional expression (JI3) is preferably set to be 8.000. To more effectively guarantee the effects of the 9th embodiment, the upper limit value of the conditional expression (JI3) is preferably set to be 6.000.

A value lower than a lower limit value of the conditional expression (JI3) results in a short focal length of the focusing lens group GF, and thus leads to the focusing lens group GF involving large spherical aberration and curvature of field aberration.

To guarantee the effects of the 9th embodiment, the lower limit value of the conditional expression (JI3) is preferably set to be 0.300. To more effectively guarantee the effects of the 9th embodiment, the lower limit value of the conditional expression (JI3) is preferably set to be 0.650.

Preferably, in the zoom optical system ZLI according to the 9th embodiment, the focusing lens group GF includes at least one positive lens that satisfies the following conditional expression (JI4).

$$\nu dp>55.000 \quad \text{(JI4)}$$

where, νdp denotes Abbe number on the d-line of the positive lens.

The conditional expression (JI4) is for setting an appropriate value of the Abbe number of the positive lens in the focusing lens group GF. Variation of a chromatic aberration upon focusing can be successfully reduced when the conditional expression (JI4) is satisfied.

A value higher than an upper limit value of the conditional expression (JI4) results in the color aberration at the focusing lens group GF that is too large to correct.

To guarantee the effects of the 9th embodiment, the lower limit value of the conditional expression (JI4) is preferably set to be 60.000. To more effectively guarantee the effects of the 9th embodiment, the lower limit value of the conditional expression (JI4) is preferably set to be 65.000. To more effectively guarantee the effects of the 9th embodiment, the lower limit value of the conditional expression (JI4) is preferably set to be 70.000.

As described above, the 9th embodiment can achieve the zoom optical system ZLI featuring a small size, small variation of image magnification upon focusing, and an excellent optical performance.

Next, a camera (optical device) 1 including the above-described zoom optical system ZLI will be described with reference to FIG. 65. This camera 1 is the same as that in the 1st embodiment the configuration of which has been described above, and thus will not be described herein.

The zoom optical system ZLI according to the 9th embodiment, installed in the camera 1 as the imaging lens 2, features a small size, small variation of image magnification upon focusing, and an excellent optical performance, due to its characteristic lens configuration as can be seen in Examples described later. Thus, an optical device featuring a small size, small variation of image magnification upon focusing, and an excellent optical performance can be achieved with the camera 1.

The 9th embodiment is described with the mirrorless camera as an example, but this should not be construed in a limiting sense. For example, similar or the same effects as the camera 1 can be obtained with the above-described zoom optical system ZLI installed in a single lens reflex camera in which a quick return mirror is provided to a camera main body and a subject is monitored with a view finder optical system.

Figure 74:
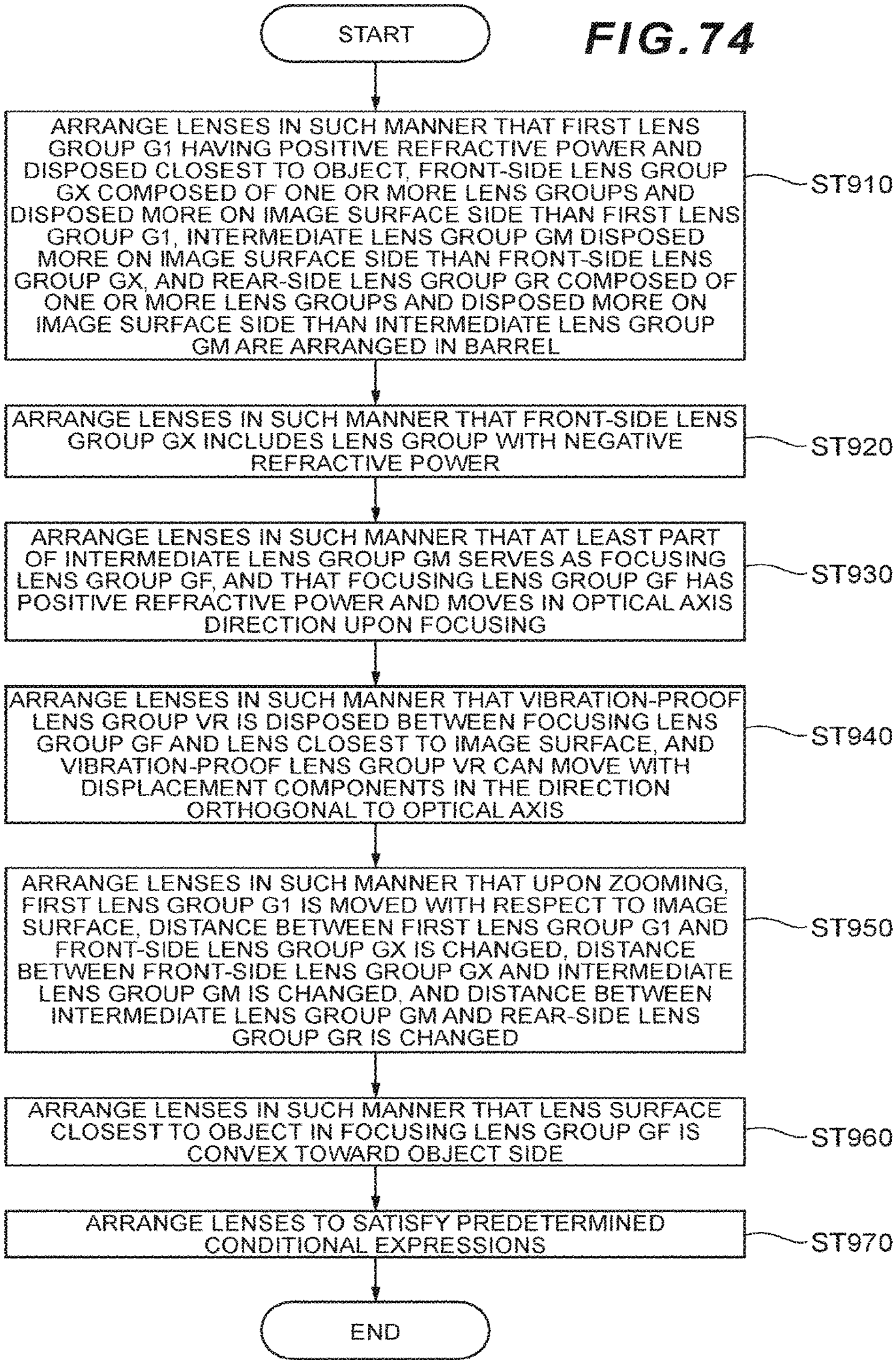
FIG. 74 is a diagram illustrating a method for manufacturing the zoom optical system according to the 9th embodiment.

Next, a method for manufacturing the above-described zoom optical system ZLI (ZL7) will be described with reference to FIG. 74. First of all, lenses are arranged in such a manner that the first lens group G1 having positive refractive power and disposed closest to an object, the front-side lens group GX composed of one or more lens groups and disposed more on the image surface side than the first lens group G1, the intermediate lens group GM disposed more on the image surface side than the front-side lens group GX, and the rear-side lens group GR composed of one or more lens groups and disposed more on the image surface side than the intermediate lens group GM are arranged in a barrel (step ST910). The lenses are arranged in such a manner that the front-side lens group GX includes a lens group with negative refractive power (step ST920). The lenses are arranged in such a manner that at least part of the intermediate lens group GM serves as the focusing lens group GF, and that the focusing lens group GF has positive refractive power and moves in the optical axis direction upon focusing (step ST930). The lenses are arranged in such a manner that the vibration-proof lens group VR is disposed between the focusing lens group GF and a lens closest to the image surface, and the vibration-proof lens group VR can move with a displacement component in the direction orthogonal to the optical axis (step ST940). The lenses are arranged in such a manner that upon zooming, the first lens group G1 is moved with respect to an image surface, the distance between the first lens group G1 and the front-side lens group GX is changed, the distance between the front-side lens group GX and the intermediate lens group GM is changed, and the distance between the intermediate lens group GM and the rear-side lens group GR is changed (step ST950). The lenses are arranged in such a manner that the lens surface closest to an object in the focusing lens group GF is convex toward the object side (step ST960). The lenses are arranged to satisfy at least the conditional expressions (JI1) and (JI2) in the conditional expressions described above (step ST970).

In one example of the lens arrangement according to the 9th embodiment, as illustrated in FIG. 25, the first lens group G1 including a cemented lens including the negative meniscus lens L11 having a concave surface facing the image surface side and a positive meniscus lens L12 having a convex surface facing the object side, the second lens group G2 including the negative meniscus lens L21 having a concave surface facing the image surface side, the biconcave lens L22, and a positive meniscus lens L23 having a convex surface facing the object side, the third lens group G3 including the biconvex lens L31, the aperture stop S, a cemented lens including a positive meniscus lens L32 having a convex surface facing the object side and a negative meniscus lens L33 having a concave surface facing the image surface side, and a cemented lens including a negative meniscus lens L34 having a concave surface facing the image surface side and the biconvex lens L35, the fourth lens group G4 including a positive meniscus lens L41 having a convex surface facing the object side, and the fifth lens group G5 including a biconcave lens L51 and a plano-convex lens L52 having a convex surface facing the object side are arranged in order from the object side. The zoom optical system ZLI is manufactured with the lens groups thus arranged through the procedure described above.

With the manufacturing method according to the 9th embodiment, the zoom optical system ZLI featuring a small size, small variation of image magnification upon focusing, and an excellent optical performance can be manufactured.

The 10th embodiment is described below with reference to drawings. As illustrated in FIG. 1, a zoom optical system ZLI (ZL1) according to the 10th embodiment includes: the first lens group G1 having positive refractive power and disposed closest to an object; the front-side lens group GX composed of one or more lens groups and disposed more on the image surface side than the first lens group G1; the intermediate lens group GM disposed more on the image surface side than the front-side lens group GX; and the rear-side lens group GR composed of one or more lens groups and disposed more on the image surface side than the intermediate lens group GM. The front-side lens group GX includes a lens group having negative refractive power. At least part of the intermediate lens group GM is the focusing lens group GF. The focusing lens group GF has positive refractive power and moves in the optical axis direction upon focusing. The vibration-proof lens group VR is disposed between the focusing lens group GF and a lens closest to the image surface, and the vibration-proof lens group VR can move with a displacement component in the direction orthogonal to the optical axis. Upon zooming, the first lens group G1 is moved with respect to an image surface, the distance between the first lens group G1 and the front-side lens group GX is changed, the distance between the front-side lens group GX and the intermediate lens group GM is changed, and the distance between the intermediate lens group GM and the rear-side lens group GR is changed.

The configuration including the positive first lens group G1, the front-side lens group GX including a negative lens group, the intermediate lens group GM including the positive focusing lens group GF, and the vibration-proof lens group VR, and performing the zooming by changing a distance between the lens groups can have a small size and achieve an excellent optical performance. The configuration in which the first lens group G1 is moved with respect to the image surface upon zooming can achieve efficient zooming, and can achieve further downsizing and a higher performance (reduction of the curvature of field aberration upon zooming). The configuration of performing focusing by using at least part of the intermediate lens group GM disposed more on the image surface side than the front-side lens group GX can reduce variation of the image magnification, the spherical aberration, and the curvature of field aberration upon focusing. The configuration in which the vibration-proof lens group VR is more on the image side than the focusing lens group GF and thus is not the final lens can achieve downsizing and successful image blur correction.

For example, in Example 1 described below corresponding to the configuration according to the 10th embodiment that includes the positive first lens group G1, the negative second lens group G2, the positive third lens group G3, the positive fourth lens group G4, and the fifth lens group G5 arranged in order from the object side, and performs focusing with the entire fourth lens group G4, the second and the third lens groups G2 and G3 correspond to the front-side lens group GX, the fourth lens group G4 corresponds to the intermediate lens group GM, and the cemented lens including the lenses L51 and L52 of the fifth lens group G5 corresponds to the vibration-proof lens group VR.

For example, in Example 14 described below that includes the positive first lens group G1, the negative second lens group G2, the positive third lens group G3, the negative fourth lens group G4, and the fifth lens group G5 arranged in order from the object side and performs focusing with a part of the third lens group G3, the second lens group G2 corresponds to the front-side lens group GX, the third lens group G3 corresponds to the intermediate lens group GM, and the fourth lens group G4 corresponds to the vibration-proof lens group VR.

It is to be noted that the front-side lens group GX in the 10th embodiment is not limited to the configuration described above, and the following configuration may be employed.

For example, in the configuration including the positive first lens group, the negative second lens group, the positive third lens group, the positive fourth lens group, and the fifth lens group arranged in order from the object side as in Example 1, when focusing is performed by using the entire fifth lens group with the negative second lens group divided into two lens groups, the second to the fourth lens groups correspond to the front-side lens group.

In the configuration including the positive first lens group, the negative second lens group, the positive third lens group, the positive fourth lens group, and the fifth lens group arranged in order from the object side as in Example 1, when focusing is performed by using the entire fifth lens group with the positive first lens group divided into two lens groups, the image side of the first lens group to the fourth lens group correspond to the front-side lens group.

In the configuration including the positive first lens group, the negative second lens group, the positive third lens group, the positive fourth lens group, and the fifth lens group arranged in order from the object side as in Example 1, when focusing is performed by using the entire fifth lens group with another lens group added between the second lens group and the third lens group, the second to the fourth lens groups, including the added other lens group, correspond to the front-side lens group.

The zoom optical system ZLI according to the 10th embodiment with the configuration described above satisfies the following conditional expression (JJ1).

$$1.050<(rB+rA)/(rB-rA) \quad \text{(JJ1)}$$

where, rA denotes a radius of curvature of a lens surface facing a lens surface closest to an object in the focusing lens group GF with a distance in between, and rB denotes a radius of curvature of the lens surface closest to an object in the focusing lens group GF.

The conditional expression (JJ1) is for setting an appropriate shape of the air lens disposed to the object side of the focusing lens group GF (direction of movement upon focusing on a short distant object). The air lens has the meniscus shape and thus a sufficient performance upon focusing on short-distant object can be obtained on or outside the axis when the conditional expression (JJ1) is satisfied.

To guarantee the effects of the 10th embodiment, the upper limit value of the conditional expression (JJ1) is preferably set to be 10.000. To more effectively guarantee the effects of the 10th embodiment, the upper limit value of the conditional expression (JJ1) is preferably set to be 6.667. To more effectively guarantee the effects of the 10th embodiment, the upper limit value of the conditional expression (JJ1) is preferably set to be 5.000.

A value higher than the upper limit value of the conditional expression (JJ1) leads to rA that is too large relative to rB, resulting in a larger curvature of field aberration at the lens surface closest to an object in the focusing lens group GF than that at the lens surface facing the lens surface closest to an object in the focusing lens group GF with a distance in between. Thus, variation of the curvature of field aberration upon focusing on infinity and upon focusing on a short distant object becomes large.

A value lower than the lower limit value of the conditional expression (JJ1) leads to rA that is too small relative to rB. Thus, a curvature of field aberration at the lens surface facing the lens surface closest to an object in the focusing lens group GF with a distance in between overwhelms the correction capacity of the lens surface closest to an object in the focusing lens group GF, resulting in large variation of curvature of field aberration upon focusing on infinity and upon focusing on a short distant object.

To guarantee the effects of the 10th embodiment, the lower limit value of the conditional expression (JJ1) is preferably set to be 1.429. To more effectively guarantee the effects of the 10th embodiment, the lower limit value of the conditional expression (JJ1) is preferably set to be 1.667. To more effectively guarantee the effects of the 10th embodiment, the lower limit value of the conditional expression (JJ1) is preferably set to be 2.000.

In the zoom, optical system ZLI according to the 10th embodiment, a lens in the intermediate lens group GM may be the same as a lens in the focusing lens group GF.

In this configuration, the distance between the focusing lens group GF (=intermediate lens group GM) and the adjacent lens groups is changed upon zooming, whereby aberration reduction due to zooming can be prevented.

In the zoom, optical system ZLI according to the 10th embodiment, part of the intermediate lens group GM may serve as the focusing lens group GF.

In this configuration, the focusing lens group GF and the other lens in the intermediate lens group GM (the lens on the front side or the image side of the focusing lens group GF)

can integrally move upon zooming, whereby a simple barrel configuration can be achieved.

In the zoom optical system ZLI according to the 10th embodiment, lenses disposed between the focusing lens group GF (=intermediate lens group GM) and the lens closest to the image surface may be the same as a lens in the vibration-proof lens group VR.

With this configuration, downsizing can be achieved with the image blur correction performance maintained.

In the zoom optical system ZLI according to the 10th embodiment, part of the lenses disposed between the focusing lens group GF (=intermediate lens group GM) and the lens closest to the image surface may be a lens in the vibration-proof lens group VR.

With this configuration, the optical performance can be improved with the lens other than the vibration-proof lens group VR disposed between the intermediate lens group GM and the lens closest to the image surface. The distance between lenses disposed closer to the image surface than the intermediate lens group GM may be appropriately changed upon zooming.

Preferably, in the zoom optical system ZLI according to the 10th embodiment, a distance between the lens closest to the image surface in the lenses disposed to the object side of the focusing lens group GF and the focusing lens group GF may be reduced and then increased, upon zooming from the wide angle end state to the telephoto end state.

With this configuration, successful correction can be performed to prevent excessive curvature of field upon zooming.

Preferably, the zoom optical system ZLI according to the 10th embodiment satisfies the following conditional expression (JJ2).

$$0.010<|fF/fXR|<10.000 \quad \text{(JJ2)}$$

where, fF denotes a focal length of the focusing lens group GF, and fXR denotes a focal length of the lens group closest to the image surface in the front-side lens group GX.

The conditional expression (JJ2) is for setting an appropriate value of the focal length of the focusing lens group GF with respect to the focal length of the lens group facing the object side of the focusing lens group GF. An appropriate movement amount of the focusing lens group GF can be obtained with the short distance performance maintained, when the conditional expression (JJ2) is satisfied.

A value higher than the upper limit value of the conditional expression (JJ2) results in along focal length fF, that is, a large movement amount of the focusing lens group GF upon focusing, leading to large spherical aberration and curvature of field aberration. The large movement amount of the focusing lens group GF leads to a large entire length. Furthermore, the value results in a short focal length of the lens group facing the object side of the focusing lens group GF, and thus leads to the focusing lens group involving a large spherical aberration.

To guarantee the effects of the 10th embodiment, the upper limit value of the conditional expression (JJ2) is preferably set to be 8.000. To more effectively guarantee the effects of the 10th embodiment, the upper limit value of the conditional expression (JJ2) is preferably set to be 6.000.

A value lower than a lower limit value of the conditional expression (JJ2) results in a short focal length of the focusing lens group GF, and thus leads to the focusing lens group GF involving large spherical aberration and curvature of field aberration.

To guarantee the effects of the 10th embodiment, the lower limit value of the conditional expression (JJ2) is preferably set to be 0.300. To more effectively guarantee the effects of the 10th embodiment, the lower limit value of the conditional expression (JJ2) is preferably set to be 0.650.

Preferably, the zoom optical system ZLI according to the 10th embodiment satisfies the following conditional expression (JJ3).

$$0.000<\beta Fw<0.800 \quad \text{(JJ3)}$$

where, βFw denotes lateral magnification of the focusing lens group GF in the wide angle end state.

The conditional expression (JJ3) is for setting an appropriate range of the magnification of the focusing lens group GF in the wide angle end state. When the conditional expression (JJ3) is satisfied, the magnification related to the focusing lens group GF is appropriately set even when a sensor size is large, and thus the variation of aberration can be successfully reduced.

A value higher than an upper limit value of the conditional expression (JJ3) results in a successful reduction of the movement amount of the focusing lens group GF but also results in failure to successfully correct variation of the spherical aberration upon focusing on a short distant object.

To guarantee the effects of the 10th embodiment, the upper limit value of the conditional expression (JJ3) is preferably set to be 0.600. To more effectively guarantee the effects of the 10th embodiment, the upper limit value of the conditional expression (JJ3) is preferably set to be 0.400. To more effectively guarantee the effects of the 10th embodiment, the upper limit value of the conditional expression (JJ3) is preferably set to be 0.360. To more effectively guarantee the effects of the 10th embodiment, the upper limit value of the conditional expression (JJ3) is preferably set to be 0.350.

A value lower than the lower limit value of the conditional expression (JJ3) leads to a large movement amount of the focusing lens group GF, and thus results in a large optical system, and failure to successfully correct variation of the spherical aberration and the curvature of field aberration upon focusing.

To guarantee the effects of the 10th embodiment, the lower limit value of the conditional expression (JJ3) is preferably set to be 0.020. To more effectively guarantee the effects of the 10th embodiment, the lower limit value of the conditional expression (JJ3) is preferably set to be 0.040. To more effectively guarantee the effects of the 10th embodiment, the lower limit value of the conditional expression (JJ3) is preferably set to be 0.060. To more effectively guarantee the effects of the 10th embodiment, the lower limit value of the conditional expression (JJ3) is preferably set to be 0.080.

Preferably, in the zoom optical system ZLI according to the 10th embodiment, the focusing lens group GF includes at least one negative lens that satisfies the following conditional expression (JJ4).

$$\nu dn<40.000 \quad \text{(JJ4)}$$

where, νdn denotes Abbe number on the d-line of the negative lens.

The conditional expression (JJ4) is for setting an appropriate value of the Abbe number of the negative lens in the focusing lens group GF. Variation of a chromatic aberration upon focusing can be successfully reduced when the conditional expression (JJ4) is satisfied.

A value higher than an upper limit value of the conditional expression (JJ4) results in a failure to successfully correct the color aberration at the focusing lens group GF.

To guarantee the effects of the 10th embodiment, the upper limit value of the conditional expression (JJ4) is preferably set to be 38.000. To more effectively guarantee the effects of the 10th embodiment, the upper limit value of the conditional expression (JJ4) is preferably set to be 36.000. To more effectively guarantee the effects of the 10th embodiment, the upper limit value of the conditional expression (JJ4) is preferably set to be 34.000.

As described above, the 10th embodiment can achieve the zoom optical system ZLI featuring a small size, small variation of image magnification upon focusing, and an excellent optical performance.

Next, a camera (optical device) 1 including the above-described zoom optical system ZLI will be described with reference to FIG. 65. This camera 1 is the same as that in the 1st embodiment the configuration of which has been described above, and thus will not be described herein.

The zoom optical system ZLI according to the 10th embodiment, installed in the camera 1 as the imaging lens 2, features a small size, small variation of image magnification upon focusing, and an excellent optical performance, due to its characteristic lens configuration as can be seen in Examples described later. Thus, an optical device with a small size, small variation of image magnification upon focusing, and an excellent optical performance can be achieved with the camera 1.

The 10th embodiment is described with the mirrorless camera as an example, but this should not be construed in a limiting sense. For example, similar or the same effects as the camera 1 can be obtained with the above-described zoom optical system ZLI installed in a single lens reflex camera in which a quick return mirror is provided to a camera main body and a subject is monitored with a view finder optical system.

Figure 75:
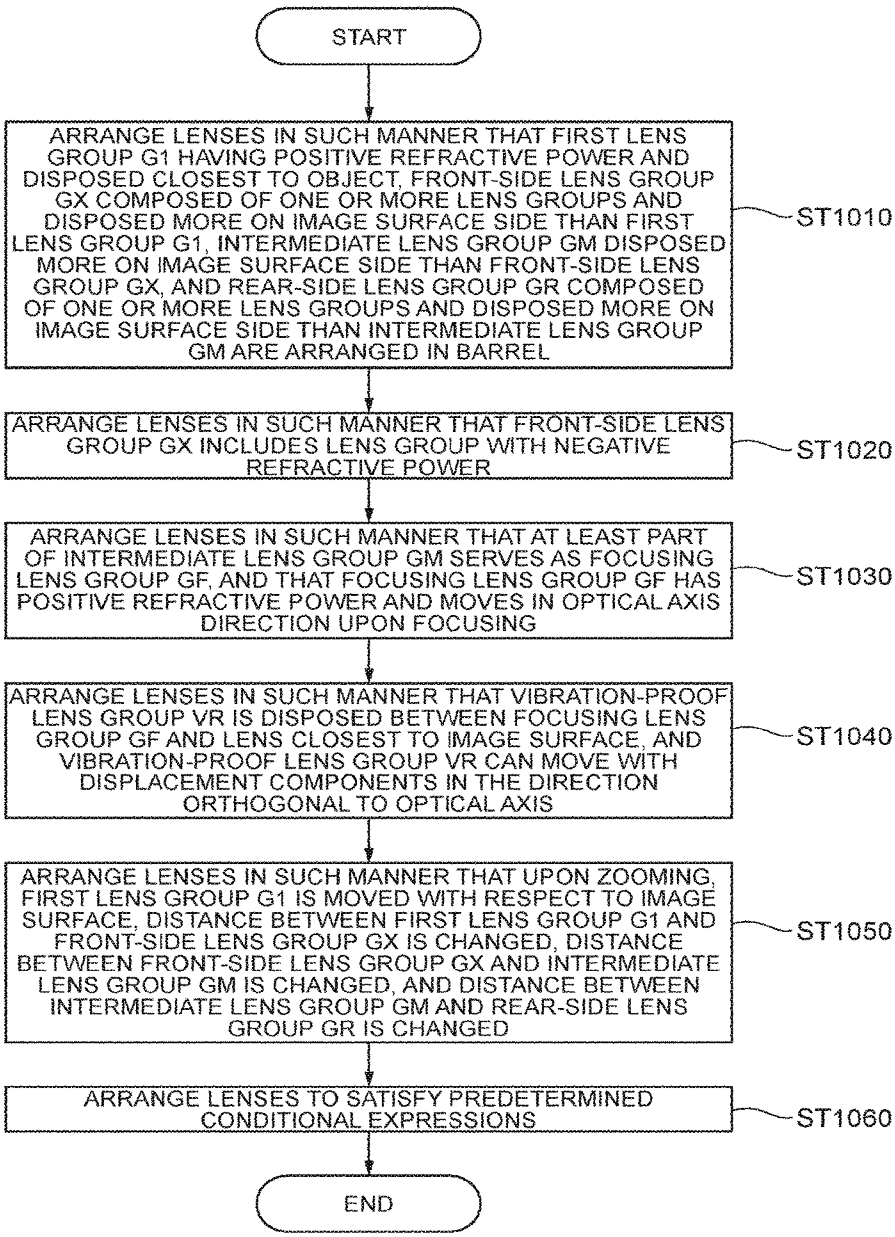
FIG. 75 is a diagram illustrating a method for manufacturing the zoom optical system according to the 10th embodiment.

Next, a method for manufacturing the above-described zoom optical system ZLI (ZL1) will be described with reference to FIG. 75. First of all, lenses are arranged in such a manner that the first lens group G1 having positive refractive power and disposed closest to an object, the front-side lens group GX composed of one or more lens groups and disposed more on the image surface side than the first lens group G1, the intermediate lens group GM disposed more on the image surface side than the front-side lens group GX, and the rear-side lens group GR composed of one or more lens groups and disposed more on the image surface side than the intermediate lens group GM are arranged in a barrel (step ST1010). The lenses are arranged in such a manner that the front-side lens group GX includes a lens group with negative refractive power (step ST1020). The lenses are arranged in such a manner that at least part of the intermediate lens group GM serves as the focusing lens group GF, and that the focusing lens group GF has positive refractive power and moves in the optical axis direction upon focusing (step ST1030). The lenses are arranged in such a manner that the vibration-proof lens group VR is disposed between the focusing lens group GF and a lens closest to the image surface, and the vibration-proof lens group VR can move with a displacement component in the direction orthogonal to the optical axis (step ST1040). The lenses are arranged in such a manner that upon zooming, the first lens group G1 is moved with respect to an image surface, the distance between the first lens group G1 and the front-side lens group GX is changed, the distance between the front-side lens group GX and the intermediate lens group GM is changed, and the distance between the intermediate lens group GM and the rear-side lens group GR is changed (step ST1050). The lenses are arranged to satisfy at least the conditional expression (JJ1) in the conditional expressions described above (step ST1060).

In one example of the lens arrangement according to the 10th embodiment, as illustrated in FIG. 1, the first lens group G1 including the cemented lens including the negative meniscus lens L11 having a concave surface facing the image surface side and the biconvex lens L12, and the positive meniscus lens L13 having a convex surface facing the object side, the second lens group G2 including the negative meniscus lens L21 having a concave surface facing the image surface side, the negative meniscus lens L22 having a concave surface facing the object side, the biconvex lens L23, and the negative meniscus lens L24 having a concave surface facing the object side, the third lens group G3 including the biconvex lens L31, the aperture stop S, the cemented lens including the negative meniscus lens L32 having a concave surface facing the image surface side and the biconvex lens L33, the biconvex lens L34, and the cemented lens including the biconvex lens L35 and the biconcave lens L36, the fourth lens group G4 including the cemented lens including the biconvex lens L41 and the negative meniscus lens L42 having a concave surface facing the object side, and the fifth lens group G5 including the cemented lens including the positive meniscus lens L51 having a convex surface facing the image surface side and the biconcave lens L52, the biconvex lens L53, and the negative meniscus lens L54 having a concave surface facing the object side are arranged in order from the object side. The zoom optical system ZLI is manufactured with the lens groups thus arranged through the procedure described above.

With the manufacturing method according to the 10th embodiment, the zoom optical system ZLI featuring a small size, small variation of image magnification upon focusing, and an excellent optical performance can be manufactured.

EXAMPLES ACCORDING TO 1ST TO 10TH EMBODIMENTS

Examples according to the 1st to the 10th embodiments are described with reference to the drawings. Table 1 to Table 14 described below are specification tables of Examples 1 to 14.

The 1st embodiment corresponds to Examples 1 to 7, Example 12, and the like.

The 2nd embodiment corresponds to Examples 1, 2, 4, 8, 10, 11, and 13, and the like.

The 3rd embodiment corresponds to Examples 2 to 6, Examples 9 to 12, and the like.

The 4th embodiment corresponds to Examples 1 to 3, Examples 6 to 11, Example 13, and the like.

The 5th embodiment corresponds to Examples 1 to 13, and the like.

The 6th embodiment corresponds to Examples 2 to 6, Examples 9 to 12, and the like.

The 7th embodiment corresponds to Examples 1 to 6, Examples 13 and 14, and the like.

The 8th embodiment corresponds to Examples 1, 2, 4, and 13, and the like.

The 9th embodiment corresponds to Examples 7 to 12, and the like.

The 10th embodiment corresponds to Examples 1 to 6, Examples 13 and 14, and the like.

Figure 53:
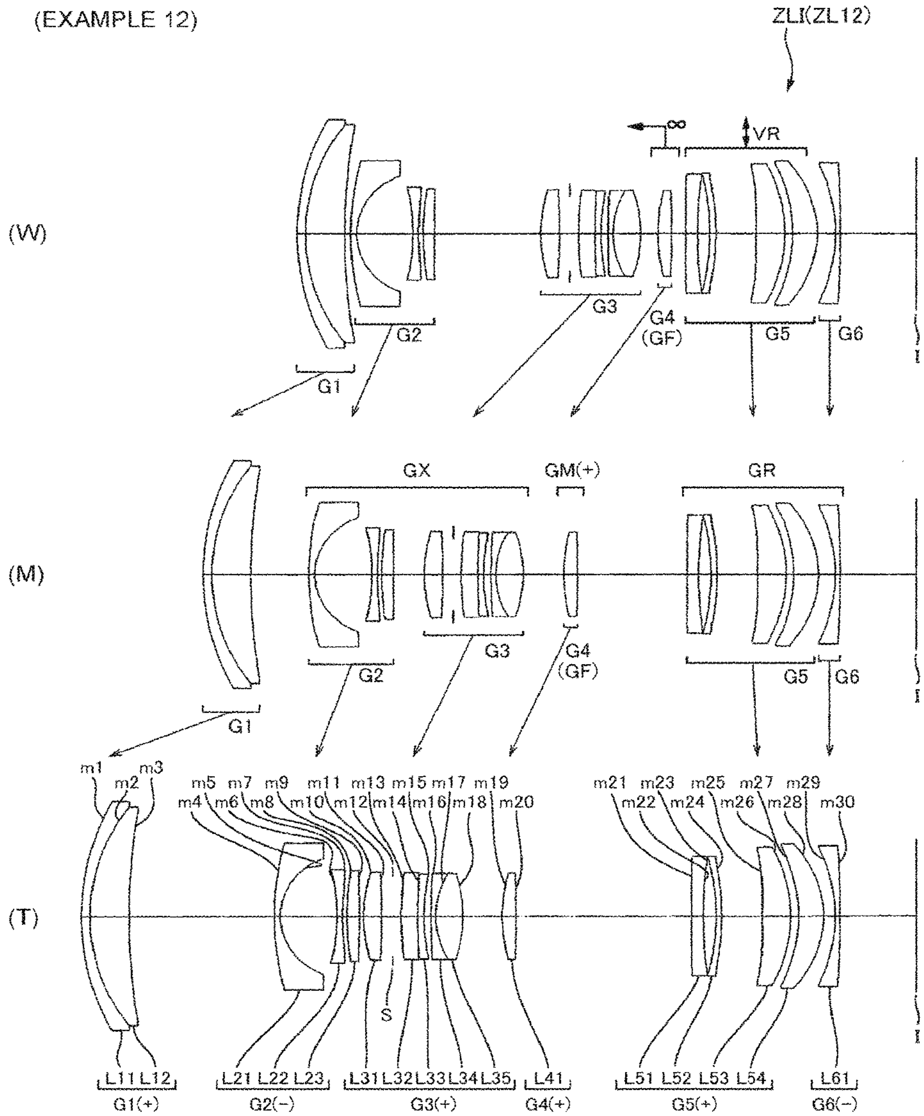
FIG. 53 is a cross-sectional view with sections (W), (M), and (T) showing a zoom optical system according to Example 12 respectively in the wide angle end state, the intermediate focal length state, and the telephoto end state.
Figure 57:
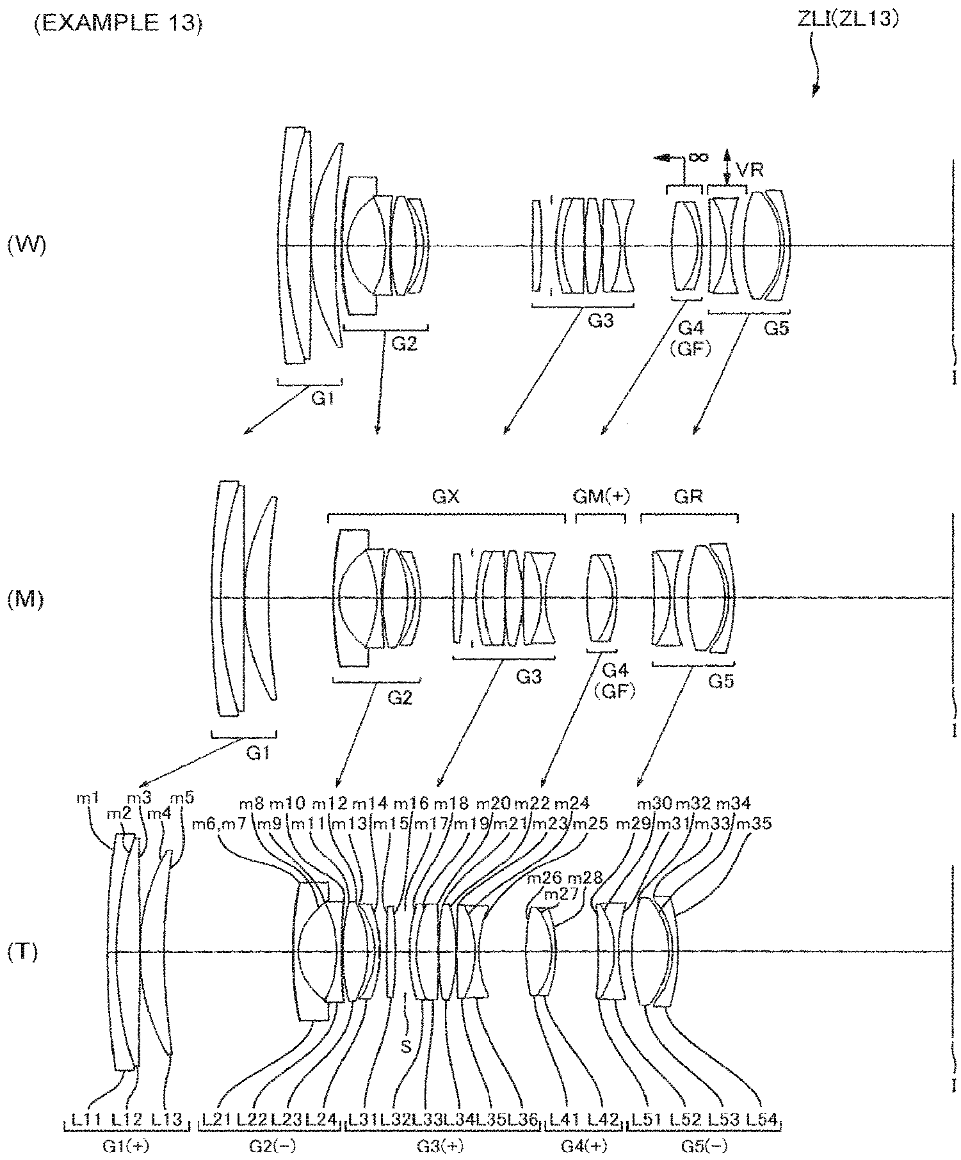
FIG. 57 is a cross-sectional view with sections (W), (M), and (T) showing a zoom optical system according to Example 13 respectively in the wide angle end state, the intermediate focal length state, and the telephoto end state.
Figure 61:
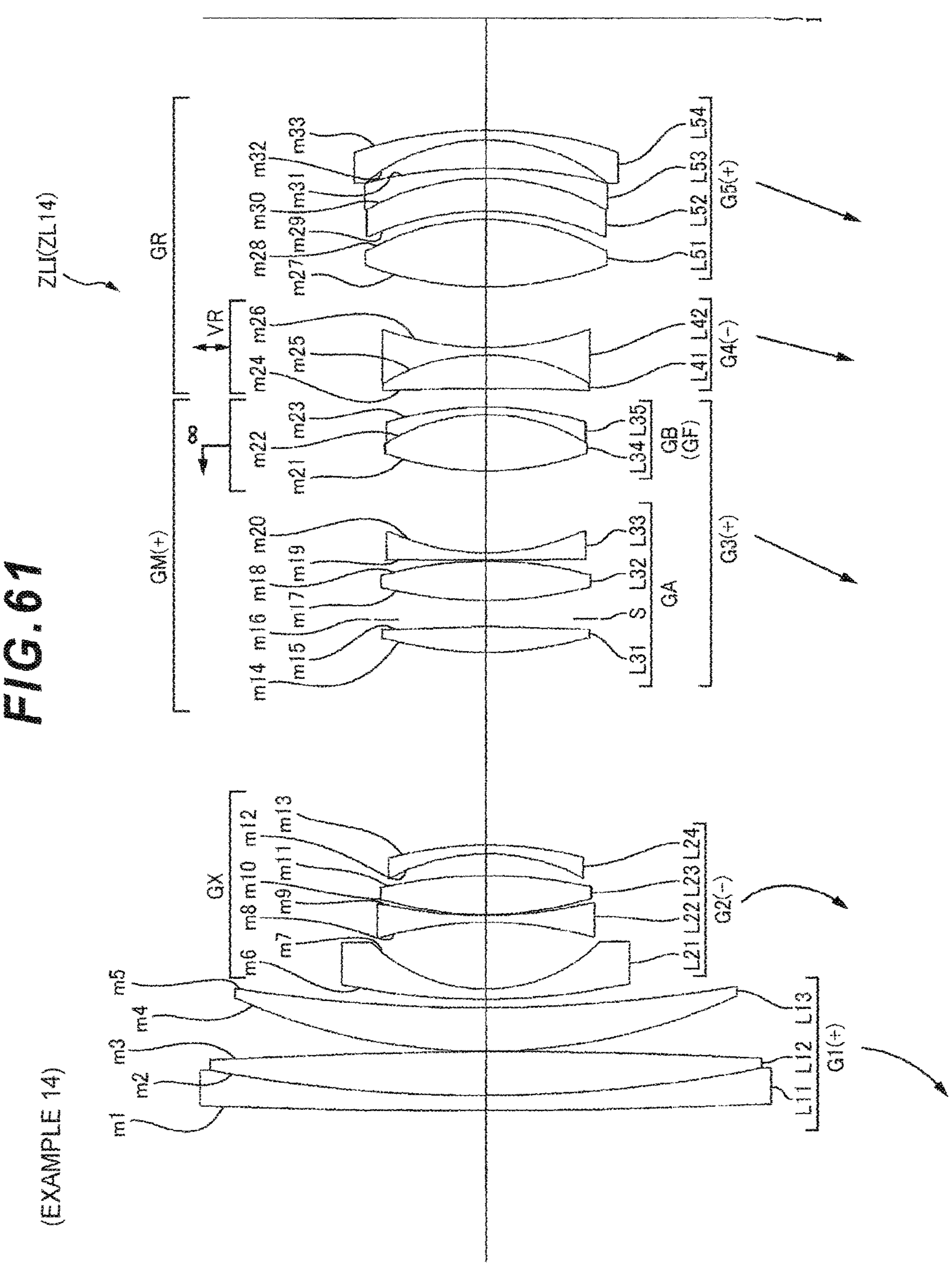
FIG. 61 is a cross-sectional view of a zoom optical system according to Example 14.

FIG. 1, FIG. 5, FIG. 9, FIG. 13, FIG. 17, FIG. 21, FIG. 25, FIG. 29 (FIG. 30), FIG. 35 (FIG. 36), FIG. 41 (FIG. 42), FIG. 47 (FIG. 48), FIG. 53, FIG. 57, FIG. 61 are cross-sectional views illustrating configurations and refractive power distributions of the zoom optical systems ZLI (ZL1 to ZL14) according to Examples. The movement directions of the lens groups along the optical axis upon zooming from the wide angle end state(W) to the telephoto end state(T) are indicated by arrows on the lower side of the cross-sectional views corresponding to the zoom optical systems ZL1 to ZL14. A movement direction of the focusing lens group GF upon focusing from infinity to a short-distant object and movement of the vibration-proof lens group VR upon image blur correction are indicated by arrows on the upper side of the cross-sectional views corresponding to the zoom optical systems ZL1 to ZL14.

Reference signs in FIG. 1 corresponding to Example 1 are independently provided for each Example, to avoid complication of description due to increase in the number of digits of the reference signs. Thus, reference signs that are the same as those in a drawing corresponding to another Example do not necessarily indicate a configuration that is the same as that in the other Example.

Table 1 to Table 14 described below are specification tables of Examples 1 to 14.

In Examples, d-line (wavelength 587.562 nm) and g-line (wavelength 435.835 nm) are selected as calculation targets of the aberration characteristics.

In [Lens specifications] in the tables, a surface number represents an order of an optical surface from the object side in a traveling direction of a light beam, R represents a radius of curvature of each optical surface, D represents a distance between each optical surface and the next optical surface (or the image surface) on the optical axis, nd represents a refractive index of a material of an optical member with respect to the d-line, and νd represents Abbe number of the material of the optical member based on the d-line. Furthermore, obj surface represents an object surface, (Di) represents a distance between an ith surface and an (i+1)th surface; "∞" of a radius of curvature represents a plane or surface of an aperture, (stop S) represents the aperture stop S, and img surface represents the image surface I. An aspherical optical surface has a * mark in the field of surface number and has a paraxial radius of curvature in the field of radius of curvature R.

In the table, [Aspherical data] has the following formula (a) indicating the shape of an aspherical surface in [Lens specifications]. In the formula, X(y) represents a distance between the tangent plane at the vertex of the aspherical surface and a position on the aspherical surface at a height y along the optical axis direction, R represents a radius of curvature (paraxial radius of curvature) of a reference spherical surface, κ represents a conical coefficient, and Ai represents ith aspherical coefficient. In the formula, "E-n" represents "$\times 10^{-n}$". For example, 1.234E-05=$1.234\times10^{-5}$. A secondary aspherical coefficient A2 is 0, and is omitted.

$$X(y)=(y^2/R)/\{1+(1-\kappa\times y^2/R^2)^{1/2}\}+A4\times y^4+A6\times y^6+A8\times y^8+A10\times y^{10}+A12\times y^{12} \quad \text{(a)}$$

In [Various data] in Tables, f represents a focal length of the whole zoom lens; FNo represents an F number, w represents a half angle of view (unit: °), Y represents the maximum image height, BF represents a distance between the lens last surface and the image surface I on the optical axis upon focusing on infinity, BF(air) represents a distance between the distance between the lens last surface and the image surface I on the optical axis upon focusing on infinity described with an air equivalent length, TL represents a value obtained by adding BF to a distance between the lens forefront surface and the lens last surface on the optical axis upon focusing on infinity, and TL(air) represents a value obtained by adding BF(air) to the distance between the lens forefront surface and the lens last surface on the optical axis upon focusing on infinity.

In [Variable distance data] in Tables, values of the focal length f of the whole system, the maximum imaging magnification β, and variable distance values Di in states such as the wide angle end state, the intermediate focal length, and the telephoto end state with respect to an infinity object point and a short-distant object point are described. In [Variable distance data], DO represents the distance between the object and the vertex of the lens surface closest to the object in the zoom optical system ZLI on the optical axis, and Di represents the variable distance between the ith surface and the (i+1)th surface.

In [Lens group data] in Tables, the starting surface and the focal length of each of the lens groups are described.

In [Conditional expression corresponding value] in Tables, values corresponding to the conditional expression are described.

The focal length f, the radius of curvature R, and the distance to the next lens surface D described below as the specification values, which are generally described with "mm" unless otherwise noted should not be construed in a limiting sense because the optical system proportionally expanded or reduced can have a similar or the same optical performance. The unit is not limited to "mm", and other appropriate units may be used.

The description on Tables described above commonly applies to all Examples, and thus will not be described below.

Example 1

Example 1 is described with reference to FIG. 1 to FIG. 4 and Table 1. A zoom optical system ZLI (ZL1) according to Example 1 includes, as illustrated in FIG. 1, the first lens group G1 having positive refractive power, the second lens group G2 having negative refractive power, the third lens group G3 having positive refractive power, the fourth lens group G4 having positive refractive power, and the fifth lens group G5 having negative refractive power that are arranged in order from the object side.

In the present example, the second lens group G2 and the third lens group G3 correspond to the front-side lens group GX. The fourth lens group G4 corresponds to the intermediate lens group GM (focusing lens group GF). The fifth lens group G5 corresponds to the rear-side lens group GR. The cemented lens including the lenses L51 and L52 forming the fifth lens group G5 corresponds to the vibration-proof lens group VR.

The first lens group G1 includes: the cemented lens including the negative meniscus lens L11 having a concave surface facing the image surface side and the biconvex lens L12; and the positive meniscus lens L13 having a convex surface facing the object side that are arranged in order from the object side.

The second lens group G2 includes: the negative meniscus lens L21 having a concave surface facing the image surface side; the negative meniscus lens L22 having a concave surface facing the object side; the biconvex lens L23; and the negative meniscus lens L24 having a concave surface facing the object side that are arranged in order from the object side.

The negative meniscus lens L21 is a composite type aspherical lens with a resin layer, formed on a glass surface on the object side, formed to have an aspherical shape. The negative meniscus lens L24 is a glass-molded aspherical lens with a lens surface, on the image surface side, having an aspherical shape.

The third lens group G3 includes: the biconvex lens L31; the aperture stop S; the cemented lens including the negative meniscus lens L32 having a concave surface facing the image surface side and the biconvex lens L33; the biconvex lens L34; and the cemented lens including the biconvex lens L35 and the biconcave lens L36 that are arranged in order from the object side.

The biconvex lens L31 is a glass-molded aspherical lens with a lens surface, on the object side, having an aspherical shape.

The fourth lens group G4 includes a cemented lens including the biconvex lens L41 and the negative meniscus lens L42 having a concave surface facing the object side that are arranged in order from the object side.

The fifth lens group G5 includes: the cemented lens including the positive meniscus lens L51 having a convex surface facing the image surface side and the biconcave lens L52; the biconvex lens L53; and the negative meniscus lens L54 having a concave surface facing the object side that are arranged in order from the object side.

The biconcave lens L52 is a glass-molded aspherical lens with a lens surface, on the image surface side, having an aspherical shape.

Upon zooming from the wide angle end state to the telephoto end state, the distance between the lens groups changes with the first lens group G1 moved toward the object side, the second lens group G2 moved toward the image surface side and then moved toward the object side, and the third lens group G3 to the fifth lens group G5 each moved toward the object side.

Upon focusing from infinity to the short-distant object, the fourth lens group G4 moves toward the object side.

When image blur occurs, image blur correction (vibration isolation) on the image surface I is performed with the cemented lens including the lenses L51 and L52 forming the fifth lens group G5, and serving as the vibration-proof lens group VR moved with a displacement component in the direction orthogonal to the optical axis.

More specifically, for correcting roll blur of an angle θ, the vibration-proof lens group VR (moved lens group) for image blur correction may be moved in a direction orthogonal to the optical axis by (f×tan θ)/K, where f represents the focal length of the entire system and K represents a vibration proof coefficient (a rate of an image movement amount of the imaging surface to the movement amount of the moved lens group in the image blur correction) (the same applies to Examples described hereafter).

In Example 1, in the wide angle end state, the vibration proof coefficient is −0.94 and the focal length is 24.70 (mm), and thus the movement amount of the vibration-proof lens group VR for correcting the roll blur of 0.66° is −0.30 (mm). In the intermediate focal length state, the vibration proof coefficient is −1.18 and the focal length is 49.50 (mm), and thus the movement amount of the vibration-proof lens group VR for correcting the roll blur of 0.47° is −0.34 (mm). In the telephoto end state, the vibration proof coefficient is −1.42 and the focal length is 82.45 (mm), and thus the movement amount of the vibration-proof lens group VR for correcting the roll blur of 0.36° is −0.37 (mm).

In Table 1 below, specification values in Example 1 are listed. Surface numbers 1 to 35 in Table 1 respectively correspond to the optical surfaces m1 to m35 in FIG. 1.

TABLE 1

[Lens specifications]

| Surface number | R | D | nd | νd |
|---|---|---|---|---|
| Obj surface | ∞ | | | |
| 1 | 381.35819 | 2.000 | 1.92286 | 20.9 |
| 2 | 118.42462 | 5.839 | 1.59319 | 67.9 |
| 3 | −500.00000 | 0.100 | 1.00000 | |
| 4 | 51.34579 | 5.946 | 1.75500 | 52.3 |
| 5 | 140.29515 | (D5) | 1.00000 | |
| *6 | 153.53752 | 0.100 | 1.56093 | 36.6 |
| 7 | 100.88513 | 1.250 | 1.83481 | 42.7 |
| 8 | 15.12764 | 9.324 | 1.00000 | |
| 9 | −29.69865 | 1.000 | 1.80400 | 46.6 |
| 10 | −197.12774 | 0.100 | 1.00000 | |
| 11 | 127.34178 | 5.891 | 1.80809 | 22.7 |
| 12 | −24.40815 | 0.725 | 1.00000 | |
| 13 | −21.03104 | 1.200 | 1.88202 | 37.2 |
| *14 | −47.84526 | (D14) | 1.00000 | |
| *15 | 104.68107 | 2.068 | 1.72903 | 54.0 |
| 16 | −238.15028 | 1.000 | 1.00000 | |
| 17 | (stop S) | 1.000 | 1.00000 | |
| 18 | 33.71098 | 1.000 | 1.71999 | 50.3 |
| 19 | 21.08311 | 5.564 | 1.49782 | 82.6 |
| 20 | −287.32080 | 0.100 | 1.00000 | |
| 21 | 44.42896 | 4.104 | 1.48749 | 70.3 |
| 22 | −74.98744 | 0.100 | 1.00000 | |
| 23 | 93.37205 | 4.530 | 1.95000 | 29.4 |
| 24 | −30.50479 | 1.000 | 1.79504 | 28.7 |
| 25 | 21.31099 | (D25) | 1.00000 | |
| 26 | 42.79038 | 5.914 | 1.58313 | 59.4 |
| 27 | −19.56656 | 1.000 | 1.79504 | 28.7 |
| 28 | −36.93977 | (D28) | 1.00000 | |
| 29 | −157.49872 | 3.569 | 1.84666 | 23.8 |
| 30 | −23.26034 | 1.000 | 1.76802 | 49.2 |

TABLE 1-continued

| | | | | |
|---|---|---|---|---|
| *31 | 33.47331 | 3.639 | 1.00000 | |
| 32 | 32.59617 | 9.754 | 1.49782 | 82.6 |
| 33 | −21.57307 | 1.578 | 1.00000 | |
| 34 | −20.70024 | 1.350 | 1.90366 | 31.3 |
| 35 | −59.06966 | (D35) | 1.00000 | |
| Img surface | ∞ | | | |

[Aspherical data]

6th surface

κ = 1.00000e+00
A4 = 1.00626e−05
A6 = −2.34691e−08
A8 = 4.64513e−11
A10 = −8.81427e−14
A12 = 1.22100e−16

14th surface

κ = 1.00000e+00
A4 = −5.05678e−06
A6 = −8.17158e−09
A8 = −3.38974e−11
A10 = 0.00000e+00
A12 = 0.00000e+00

15th surface

κ = 1.00000e+00
A4 = −8.97022e−06
A6 = −1.67376e−09
A8 = −7.29023e−12
A10 = 0.00000e+00
A12 = 0.00000e+00

31st surface

κ = 1.00000e+00
A4 = 1.12150e−06
A6 = −1.21533e−08
A8 = 6.82916e−11
A10 = 0.00000e+00
A12 = 0.00000e+00

[Various data]

Zoom ratio 3.34

| | Wide angle end | Intermediate | Telephoto end |
|---|---|---|---|
| f | 24.70 | 49.50 | 82.45 |
| FNo | 2.88 | 3.61 | 4.12 |
| ω | 41.2 | 23.5 | 14.4 |
| Y | 19.55 | 21.63 | 21.63 |
| TL | 143.097 | 153.553 | 175.036 |
| BF | 25.126 | 34.230 | 43.854 |
| BF(air) | 25.126 | 34.230 | 43.854 |

[Variable distance data]

| | Upon focusing on infinity | | | Upon focusing on short distant object | | |
|---|---|---|---|---|---|---|
| | Wide angle end | Intermediate | Telephoto end | Wide angle end | Intermediate | Telephoto end |
| f | 24.70 | 49.50 | 82.45 | — | — | — |
| β | — | — | — | −0.1348 | −0.1762 | −0.2540 |
| D0 | ∞ | ∞ | ∞ | 156.90 | 246.45 | 274.96 |
| D5 | 1.500 | 14.321 | 30.131 | 1.500 | 14.321 | 30.131 |
| D14 | 23.482 | 6.878 | 1.500 | 23.482 | 6.878 | 1.500 |
| D25 | 9.245 | 7.876 | 9.245 | 7.646 | 4.490 | 2.131 |
| D28 | 2.000 | 8.505 | 8.562 | 3.599 | 11.891 | 15.675 |
| D35 | 25.126 | 34.230 | 43.854 | 25.126 | 34.230 | 43.854 |

TABLE 1-continued

| [Lens group data] | | |
|---|---|---|
| | Group starting surface | Group focal length |
| First lens group | 1 | 95.95 |
| Second lens group | 6 | −18.31 |
| Third lens group | 15 | 41.62 |
| Fourth lens group | 26 | 42.13 |
| Fifth lens group | 29 | −75.33 |

| [Conditional expression corresponding value] | |
|---|---|
| Conditional expression(JA1) | \|fF/fRF\| = 0.559 |
| Conditional expression(JA2) | (−fXn)/fXR = 0.440 |
| Conditional expression(JA3) | fF/fW = 1.706 |
| Conditional expression(JA4) | Wω = 41.209 |
| Conditional expression(JA5) | fF/fXR = 1.012 |
| Conditional expression(JA6) | DXRFT/fF = 0.219 |
| Conditional expression(JA7) | Tω = 14.424 |
| Conditional expression(JA8) | DGXR/fXR = 0.492 |
| Conditional expression(JB1) | (DMRT − DMRW)/fF = 0.156 |
| Conditional expression(JB2) | Wω = 41.209 |
| Conditional expression(JB3) | Tω = 14.424 |
| Conditional expression(JB4) | fF/fRF = −0.559 |
| Conditional expression(JB5) | fF/fXR = 1.012 |
| Conditional expression(JB6) | DGXR/fXR = 0.492 |
| Conditional expression(JD1) | fV/fRF = 0.527 |
| Conditional expression(JD2) | DVW/fV = −0.092 |
| Conditional expression(JD3) | Wω = 41.209 |
| Conditional expression(JD4) | fF/fXR = 1.012 |
| Conditional expression(JD5) | (−fXn)/fXR = 0.440 |
| Conditional expression(JD6) | DGXR/fXR = 0.492 |
| Conditional expression(JE1) | DVW/fV = −0.092 |
| Conditional expression(JE2) | Wω = 41.209 |
| Conditional expression(JE3) | fF/fW = 1.706 |
| Conditional expression(JE4) | fV/fRF = 0.527 |
| Conditional expression(JE5) | fF/fXR = 1.012 |
| Conditional expression(JE6) | DGXR/fXR = 0.492 |
| Conditional expression(JE7) | DXnW/ZD1 = 0.735 |
| Conditional expression(JG1) | βFt = −0.077 |
| Conditional expression(JG2) | (rB + rA)/(rB − rA) = 2.984 |
| Conditional expression(JG3) | βFw = 0.252 |
| Conditional expression(JH1) | (rB + rA)/(rB − rA) = 2.984 |
| Conditional expression(JH2) | (rC + rB)/(rC − rB) = −0.073 |
| Conditional expression(JH3) | \|fF/fXR\| = 1.012 |
| Conditional expression(JH4) | βFw = 0.252 |
| Conditional expression(JJ1) | (rB + rA)/(rB − rA) = 2.984 |
| Conditional expression(JJ2) | \|fF/fXR\| = 1.012 |
| Conditional expression(JJ3) | βFw = 0.252 |
| Conditional expression(JJ4) | νdn = 28.690 |

It can be seen in Table 1 that the zoom optical system ZL1 according to Example 1 satisfies the conditional expressions (JA1) to (JA8), (JB1) to (JB6), (JD1) to (JD6), (JE1) to (JE7), (JG1) to (JG3), (JH1) to (JH4), and (JJ1) to (JJ4).

Figure 2A:
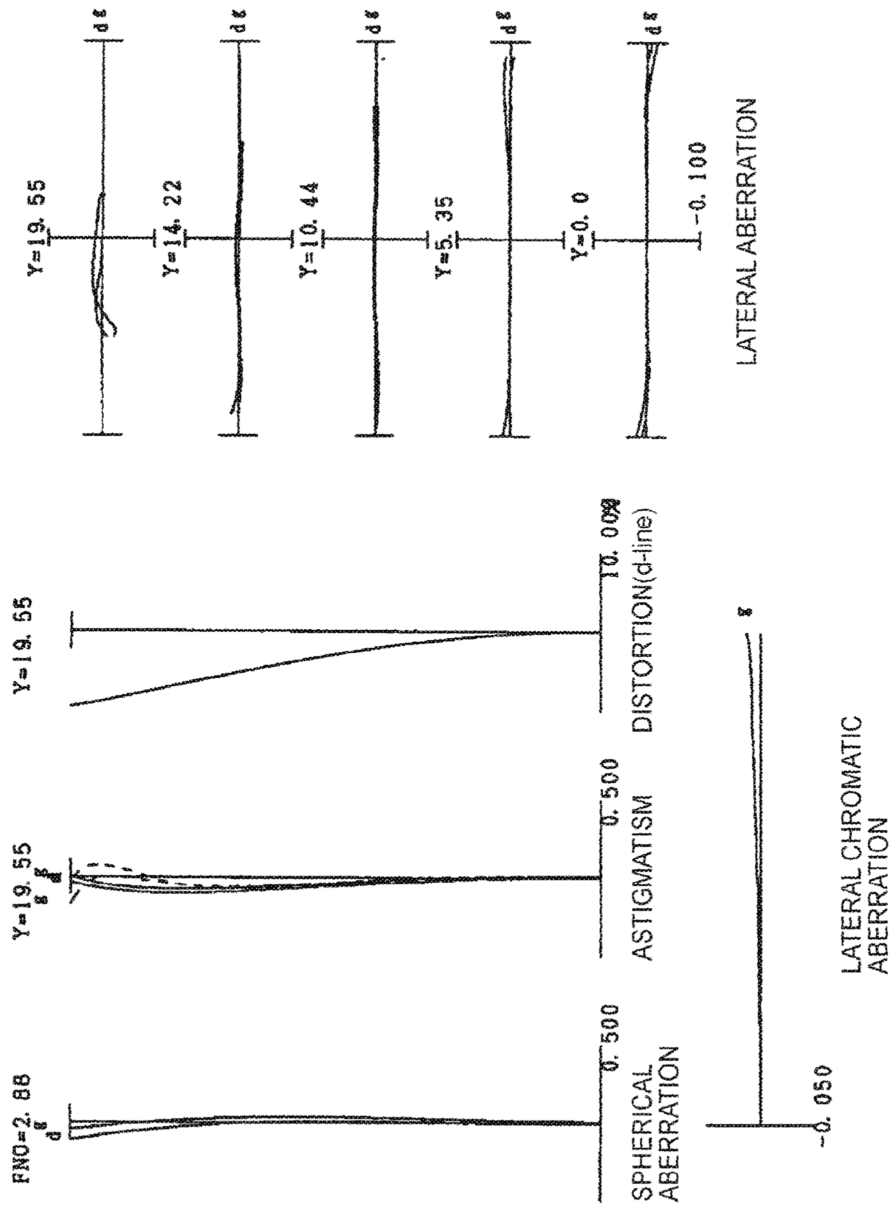
FIGS. 2A, 2B, and 2C are graphs showing various aberrations of the zoom optical system according to Example 1 upon focusing on infinity respectively in the wide angle end state, the intermediate focal length state, and the telephoto end state.
Figure 2B:
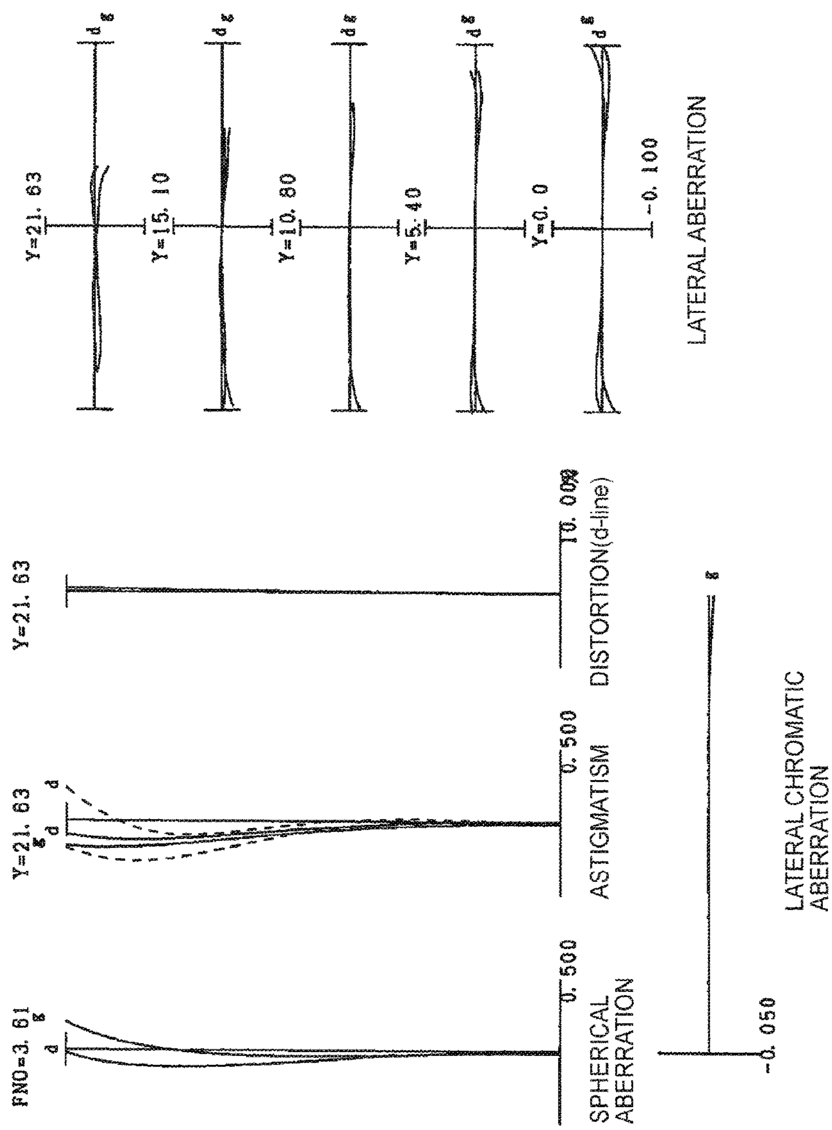
Figure 2C:
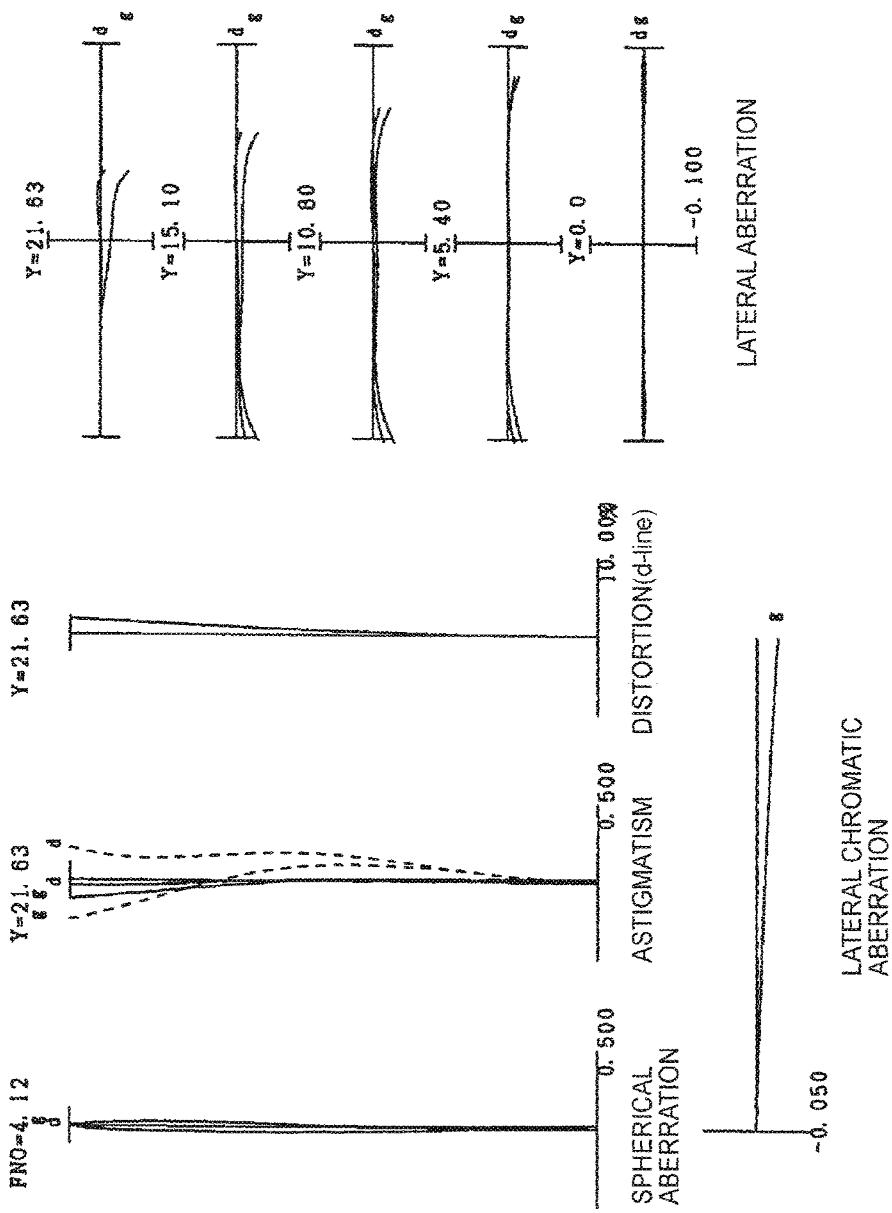
Figure 3A:
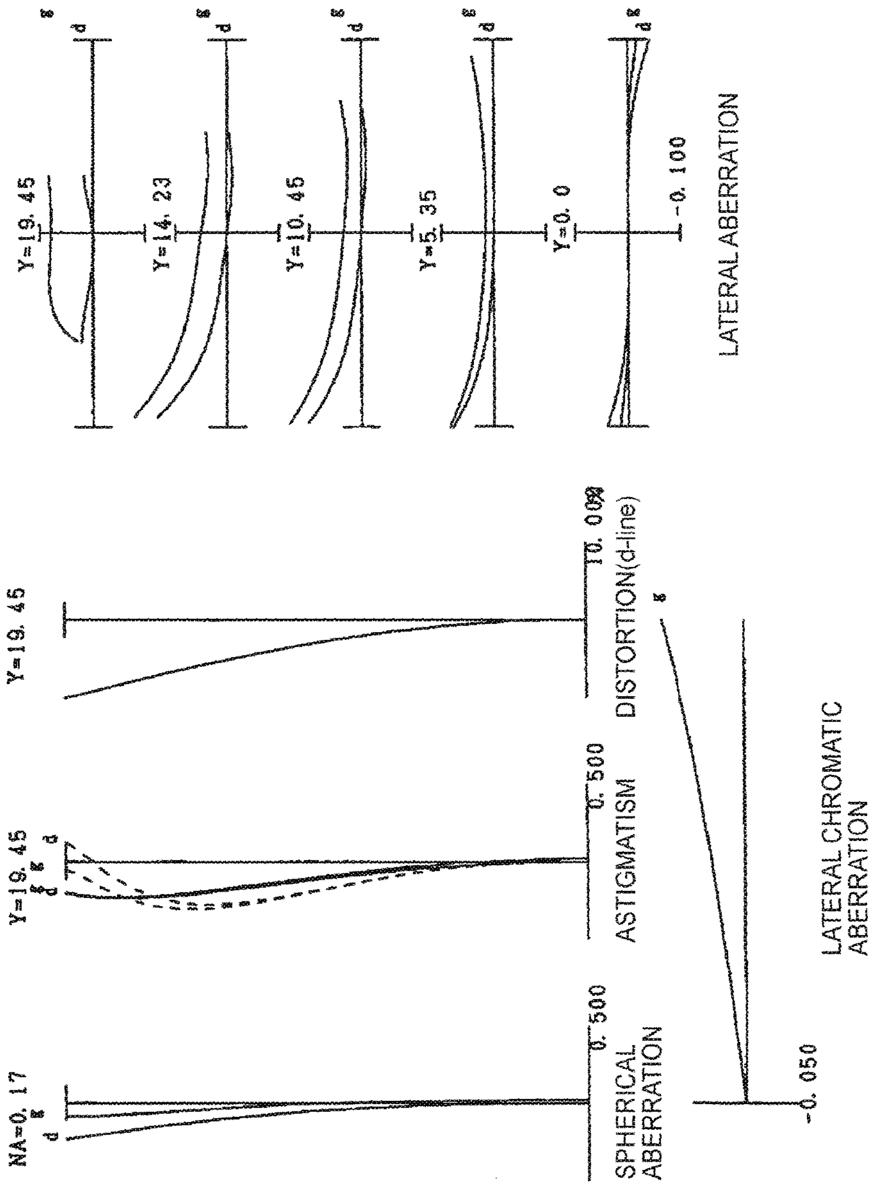
FIGS. 3A, 3B, and 3C are graphs showing various aberrations of the zoom optical system according to Example 1 upon focusing on a short distant object respectively in the wide angle end state, the intermediate focal length state, and the telephoto end state.
Figure 3B:
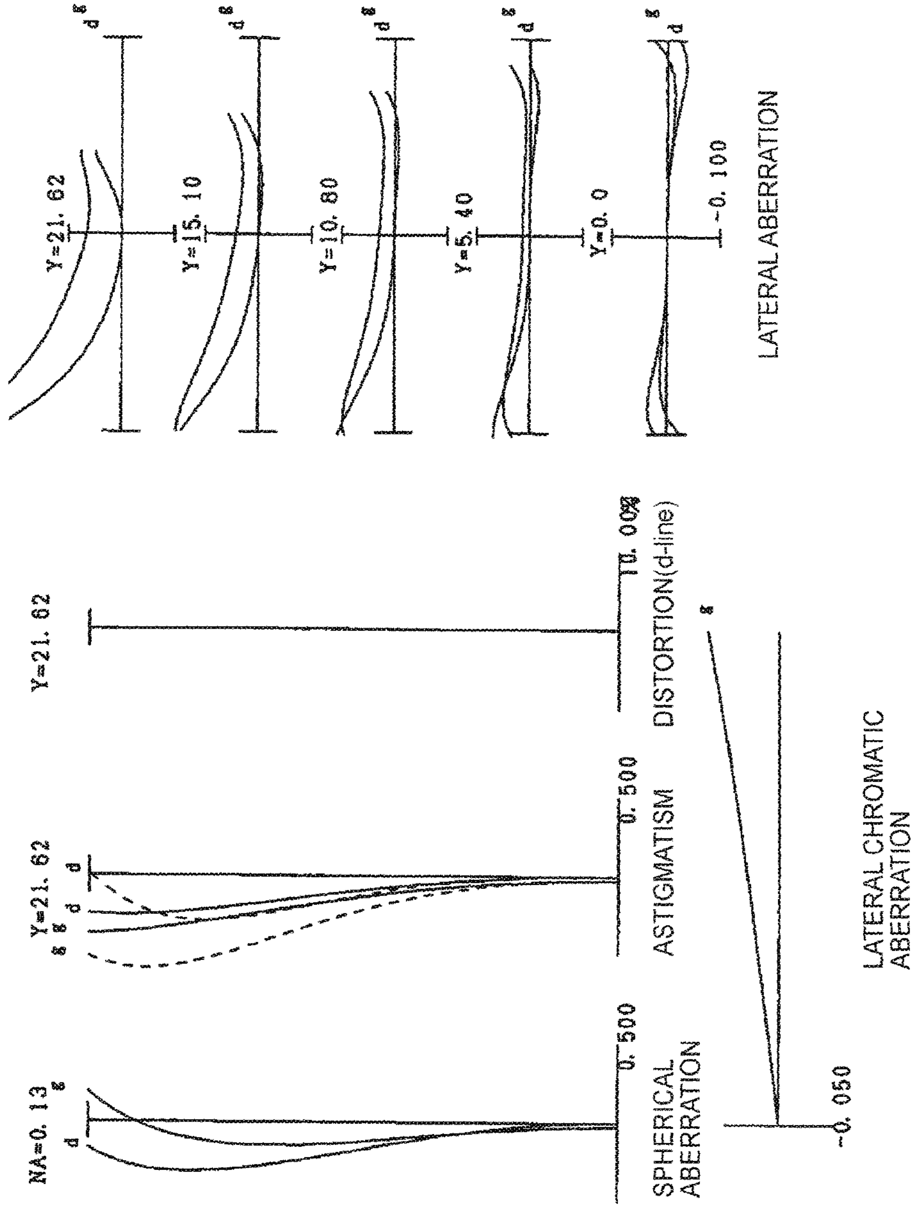
Figure 3C:
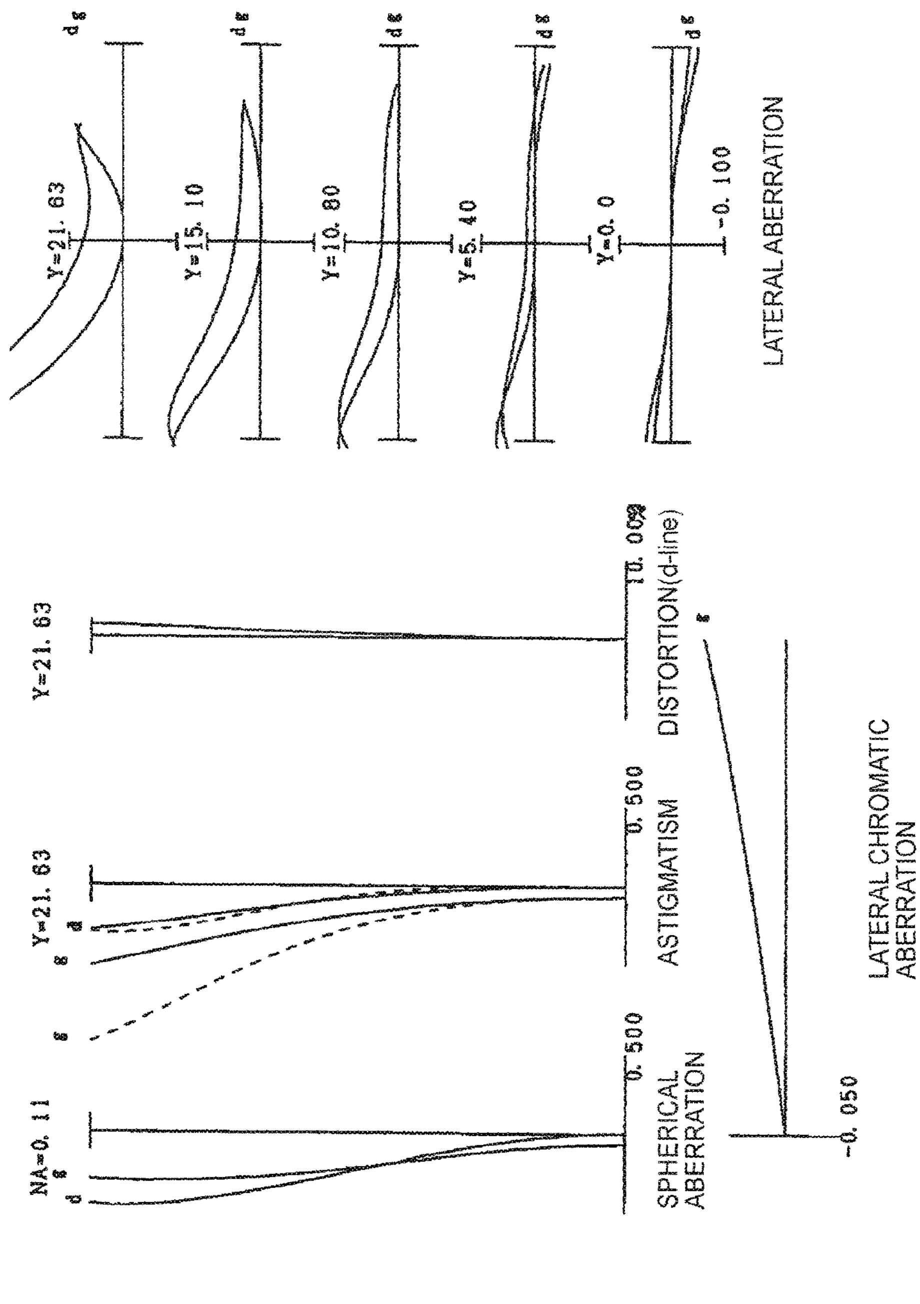
Figure 4A:
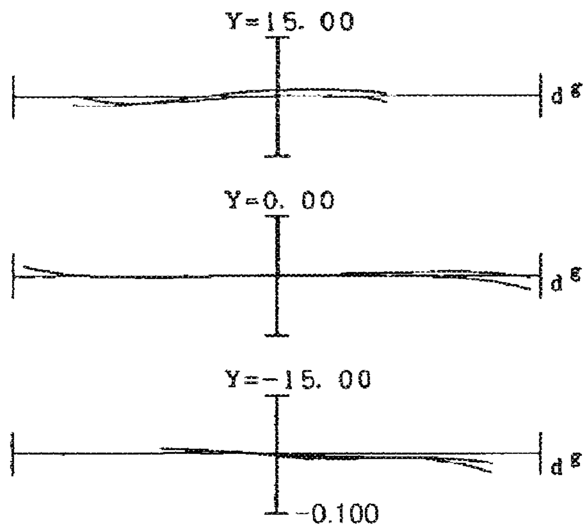
FIGS. 4A, 4B, and 4C are graphs showing lateral aberrations of the zoom optical system according to Example 1 upon focusing on infinity with image blur correction performed, respectively in the wide angle end state, the intermediate focal length state, and the telephoto end state.
Figure 4B:
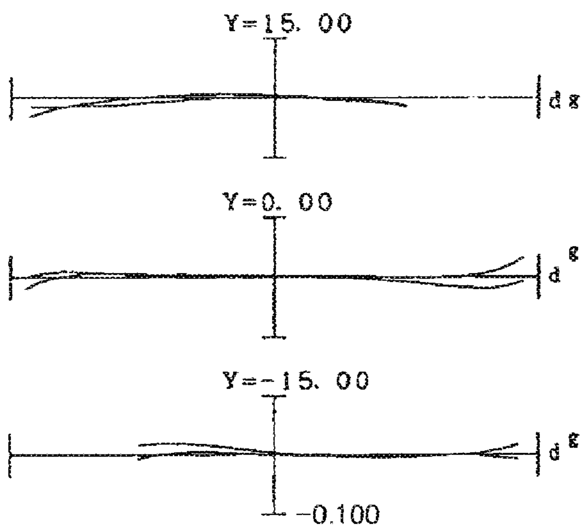
Figure 4C:
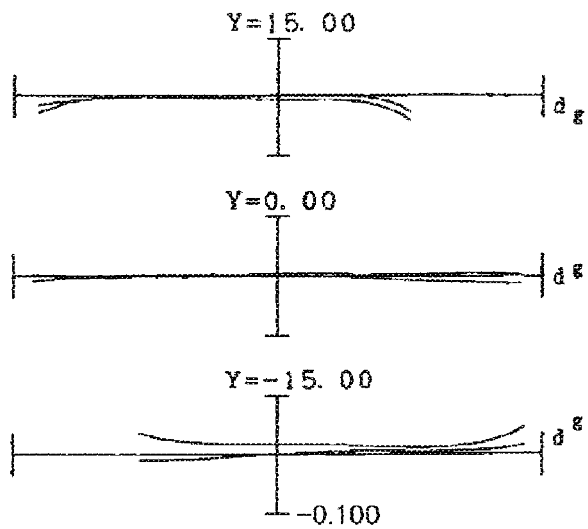

FIG. 2 is various aberration graphs (a spherical aberration graph, an astigmatism graph, a distortion graph, a lateral chromatic aberration graph, and a lateral aberration graph) of the zoom optical system ZL1 according to Example 1 upon focusing on infinity with FIG. 2A corresponding to the wide angle end state, FIG. 2B corresponding to the intermediate focal length state, and FIG. 2C corresponding to the telephoto end state. FIG. 3 is various aberration graphs (a spherical aberration graph, an astigmatism graph, a distortion graph, a lateral chromatic aberration graph, and a lateral aberration graph) of the zoom optical system ZL1 according to Example 1 upon focusing on a short distant object with FIG. 3A corresponding to the wide angle end state, a section FIG. 3B corresponding to the intermediate focal length state, and a section FIG. 3C corresponding to the telephoto end state. FIG. 4 is lateral aberration graphs at the time of image blur correction for the zoom optical system ZL1 according to Example 1 upon focusing on infinity with FIG. 4A corresponding to the wide angle end state, FIG. 4B corresponding to the intermediate focal length state, and FIG. 4C corresponding to the telephoto end state.

In the aberration graphs, FNO represents an F number, NA represents numerical aperture, and Y represents an image height. In the spherical aberration graph illustrating the case of focusing on infinity, a value of the F number corresponding to the maximum aperture is described. In the spherical aberration graph illustrating the case of focusing on a short distant object, a value of the numerical aperture corresponding to the maximum aperture is described. In each of the astigmatism graph and the distortion graph, the maximum value of the image height is described. In each lateral aberration graph, a value of a corresponding image height is described. In the astigmatism graph, a solid line represents a sagittal image surface, and a broken line represents a meridional image surface. Furthermore, d and g respectively represent aberrations on the d-line and the g-line. In the aberration graphs in Examples described hereafter, the same reference signs as in this Example are used.

It can be seen in FIG. 2 to FIG. 4 that the zoom optical system ZL1 according to Example 1 can achieve an excellent optical performance with various aberrations successfully corrected from the wide angle end state to the telephoto end state and from the infinity focusing state to the short-distant object focusing state. Furthermore, it can be seen that a high imaging performance can be achieved upon image blur correction.

Example 2

Example 2 is described with reference to FIG. 5 to FIG. 8 and Table 2. A zoom optical system ZLI (ZL2) according to Example 2 includes, as illustrated in FIG. 5, the first lens group G1 having positive refractive power, the second lens group G2 having negative refractive power, the third lens group G3 having positive refractive power, the fourth lens group G4 having positive refractive power, the fifth lens group G5 having negative refractive power, and the sixth lens group G6 having positive refractive power that are arranged in order from the object side.

In the present example, the second lens group G2 and the third lens group G3 correspond to the front-side lens group GX. The fourth lens group G4 corresponds to the intermediate lens group GM (focusing lens group GF). The fifth lens group G5 and the sixth lens group G6 correspond to the rear-side lens group GR. The cemented lens including the lenses L51 and L52 forming the fifth lens group G5 corresponds to the vibration-proof lens group VR.

The first lens group G1 includes: the cemented lens including the negative meniscus lens L11 having a concave surface facing the image surface side and the biconvex lens L12; and the positive meniscus lens L13 having a convex surface facing the object side that are arranged in order from the object side.

The second lens group G2 includes the negative meniscus lens L21 having a concave surface facing the image surface side, the biconcave lens L22, the biconvex lens L23, and the negative meniscus lens L24 having a concave surface facing the object side that are arranged in order from the object side.

The negative meniscus lens L21 is a composite type aspherical lens with a resin layer, formed on a glass surface on the object side, formed to have an aspherical shape. The negative meniscus lens L24 is a glass-molded aspherical lens with a lens surface, on the image surface side, having an aspherical shape.

The third lens group G3 includes: the biconvex lens L31; the aperture stop S; the cemented lens including the negative meniscus lens L32 having a concave surface facing the image surface side and the biconvex lens L33; the biconvex lens L34; and the cemented lens including the biconvex lens L35 and the biconcave lens L36 that are arranged in order from the object side.

The biconvex lens L31 is a glass-molded aspherical lens with a lens surface, on the object side, having an aspherical shape.

The fourth lens group G4 includes a cemented lens including the biconvex lens L41 and the negative meniscus lens L42 having a concave surface facing the object side that are arranged in order from the object side.

The fifth lens group G5 includes: the cemented lens including the positive meniscus lens L51 having a convex surface facing the image surface side and the biconcave lens L52; the biconvex lens L53; and the negative meniscus lens L54 having a concave surface facing the object side that are arranged in order from the object side.

The biconcave lens L52 is a glass-molded aspherical lens with a lens surface, on the image surface side, having an aspherical shape.

The sixth lens group G6 includes the plano-convex lens L61 having a convex surface facing the object side.

Upon zooming from the wide angle end state to the telephoto end state, the distance between the lens groups changes with the first lens group G1 moved toward the object side, the second lens group G2 moved toward the image surface side and then moved toward the object side, the third lens group G3 to the fifth lens group G5 each moved toward the object side, and the sixth lens group G6 moved toward the image surface side and stopped.

Upon focusing from infinity to the short-distant object, the fourth lens group G4 moves toward the object side.

When image blur occurs, image blur correction (vibration isolation) on the image surface I is performed with the cemented lens including the lenses L51 and L52 forming the fifth lens group G5, and serving as the vibration-proof lens group VR moved with a displacement component in the direction orthogonal to the optical axis.

In Example 2, in the wide angle end state, the vibration proof coefficient is −0.90 and the focal length is 24.70 (mm), and thus the movement amount of the vibration-proof lens group VR for correcting the roll blur of 0.66° is −0.32 (mm). In the intermediate focal length state, the vibration proof coefficient is −1.13 and the focal length is 49.50 (mm), and thus the movement amount of the vibration-proof lens group VR for correcting the roll blur of 0.47° is −0.36 (mm). In the telephoto end state, the vibration proof coefficient is −1.39 and the focal length is 82.45 (mm), and thus the movement amount of the vibration-proof lens group VR for correcting the roll blur of 0.36° is −0.38 (mm).

In Table 2 below, specification values in Example 2 are listed. Surface numbers 1 to 37 in Table 2 respectively correspond to the optical surfaces m1 to m37 in FIG. 5.

TABLE 2

[Lens specifications]

| Surface number | R | D | nd | νd |
|---|---|---|---|---|
| Obj surface | ∞ | | | |
| 1 | 359.61837 | 2.000 | 1.92286 | 20.9 |
| 2 | 116.11567 | 5.903 | 1.59319 | 67.9 |
| 3 | −500.00000 | 0.100 | 1.00000 | |
| 4 | 52.83898 | 5.793 | 1.75500 | 52.3 |
| 5 | 147.40256 | (D5) | 1.00000 | |
| *6 | 115.98790 | 0.100 | 1.56093 | 36.6 |
| 7 | 104.86281 | 1.250 | 1.83481 | 42.7 |
| 8 | 15.37855 | 9.261 | 1.00000 | |

TABLE 2-continued

| | | | | |
|---|---|---|---|---|
| 9 | −34.42374 | 1.000 | 1.80400 | 46.6 |
| 10 | 1416.33070 | 0.793 | 1.00000 | |
| 11 | 227.12896 | 5.779 | 1.80809 | 22.7 |
| 12 | −24.67083 | 0.853 | 1.00000 | |
| 13 | −21.21084 | 1.200 | 1.88202 | 37.2 |
| *14 | −41.40267 | (D14) | 1.00000 | |
| *15 | 85.72894 | 2.079 | 1.72903 | 54.0 |
| 16 | −479.69633 | 1.000 | 1.00000 | |
| 17 | (stop S) | 1.000 | 1.00000 | |
| 18 | 32.99718 | 1.000 | 1.71999 | 50.3 |
| 19 | 20.35793 | 5.787 | 1.49782 | 82.6 |
| 20 | −240.67823 | 0.100 | 1.00000 | |
| 21 | 38.71137 | 4.194 | 1.48749 | 70.3 |
| 22 | −88.89400 | 0.100 | 1.00000 | |
| 23 | 79.80151 | 4.537 | 1.95000 | 29.4 |
| 24 | −31.24970 | 1.000 | 1.79504 | 28.7 |
| 25 | 19.62299 | (D25) | 1.00000 | |
| 26 | 42.91576 | 5.430 | 1.58313 | 59.4 |
| 27 | −21.06499 | 1.000 | 1.79504 | 28.7 |
| 28 | −40.55627 | (D28) | 1.00000 | |
| 29 | −146.83351 | 3.433 | 1.84666 | 23.8 |
| 30 | −24.26623 | 1.000 | 1.76801 | 49.2 |
| *31 | 34.22177 | 4.214 | 1.00000 | |
| 32 | 32.96615 | 10.097 | 1.49782 | 82.6 |
| 33 | −22.52074 | 2.026 | 1.00000 | |
| 34 | −21.40929 | 1.350 | 1.90366 | 31.3 |
| 35 | −71.06117 | (D35) | 1.00000 | |
| 36 | 264.25001 | 2.645 | 1.75500 | 52.3 |
| 37 | 0.00000 | (D37) | 1.00000 | |
| Img surface | ∞ | | | |

[Aspherical data]

6th surface

κ = 1.00000e+00
A4 = 4.18792e−06
A6 = −1.42449e−08
A8 = 2.61317e−11
A10 = −5.51120e−14
A12 = 7.44400e−17

14th surface

κ = 1.00000e+00
A4 = −6.91770e−06
A6 = −9.53529e−09
A8 = −3.52582e−11
A10 = 000000e+00
A12 = 000000e+00

15th surface

κ = 1.00000e+00
A4 = −8.57335e−06
A6 = −1.84259e−09
A8 = −2.99082e−12
A10 = 000000e+00
A12 = 000000e+00

31st surface

κ = 1.00000e+00
A4 = 9.53637e−07
A6 = −1.23037e−08
A8 = 6.38181e−11
A10 = 000000e+00
A12 = 000000e+00

[Various data]
Zoom ratio 3.34

| | Wide angle end | Intermediate | Telephoto end |
|---|---|---|---|
| f | 24.70 | 49.50 | 82.45 |
| FNo | 2.88 | 3.66 | 4.18 |
| ω | 41.2 | 23.5 | 14.4 |
| Y | 19.53 | 21.63 | 21.63 |
| TL | 143.097 | 153.886 | 175.269 |

TABLE 2-continued

| | | | |
|---|---|---|---|
| BF | 19.550 | 18.000 | 18.000 |
| BF(air) | 19.550 | 18.000 | 18.000 |

[Variable distance data]

| | Upon focusing on infinity | | | Upon focusing on short distant object | | |
|---|---|---|---|---|---|---|
| | Wide angle end | Intermediate | Telephoto end | Wide angle end | Intermediate | Telephoto end |
| f | 24.70 | 49.50 | 82.45 | — | — | — |
| β | — | — | — | −0.1347 | −0.1757 | −0.2508 |
| D0 | ∞ | ∞ | ∞ | 156.90 | 246.11 | 274.73 |
| D5 | 1.500 | 14.377 | 30.069 | 1.500 | 14.377 | 30.069 |
| D14 | 23.496 | 6.830 | 1.500 | 23.496 | 6.830 | 1.500 |
| D25 | 9.027 | 8.025 | 9.027 | 7.291 | 4.564 | 2.193 |
| D28 | 2.000 | 8.179 | 7.861 | 3.736 | 11.640 | 14.695 |
| D35 | 1.500 | 12.451 | 22.788 | 1.500 | 12.451 | 22.788 |
| D37 | 19.550 | 18.000 | 18.000 | 19.550 | 18.000 | 18.000 |

[Lens group data]

| | Group starting surface | Group focal length |
|---|---|---|
| First lens group | 1 | 96.84 |
| Second lens group | 6 | −19.18 |
| Third lens group | 15 | 40.71 |
| Fourth lens group | 26 | 44.16 |
| Fifth lens group | 29 | −63.84 |
| Sixth lens group | 36 | 350.00 |

[Conditional expression corresponding value]

Conditional expression(JA1) |fF/fRF| = 0.692
Conditional expression(JA2) (−fXn)/fXR = 0.471
Conditional expression(JA3) fF/fW = 1.788
Conditional expression(JA4) Wω = 41.170
Conditional expression(JA5) fF/fXR = 1.085
Conditional expression(JA6) DXRFT/fF = 0.204
Conditional expression(JA7) Tω = 14.405
Conditional expression(JA8) DGXR/fXR = 0.511
Conditional expression(JB1) (DMRT − DMRW)/fF = 0.133
Conditional expression(JB2) Wω = 41.170
Conditional expression(JB3) Tω = 14.405
Conditional expression(JB4) fF/fRF = −0.692
Conditional expression(JB5) fF/fXR = 1.085
Conditional expression(JB6) DGXR/fXR = 0.511
Conditional expression(JC1) |fF/fRF| = 0.692
Conditional expression(JC2) (DMRT − DMRW)/fF = 0.133
Conditional expression(JC3) Wω = 41.170
Conditional expression(JC4) Tω = 14.405
Conditional expression(JC5) fRF/fRF2 = −0.182
Conditional expression(JC6) DGXR/fXR = 0.511
Conditional expression(JD1) fV/fRF = 0.621
Conditional expression(JD2) DVW/fV = −0.106
Conditional expression(JD3) Wω = 41.170
Conditional expression(JD4) fF/fXR = 1.085
Conditional expression(JD5) (−fXn)/fXR = 0.471
Conditional expression(JD6) DGXR/fXR = 0.511
Conditional expression(JE1) DVW/fV = −0.106
Conditional expression(JE2) Wω = 41.170
Conditional expression(JE3) fF/fW = 1.788
Conditional expression(JE4) fV/fRF = 0.621
Conditional expression(JE5) fF/fXR = 1.085
Conditional expression(JE6) DGXR/fXR = 0.511
Conditional expression(JE7) DXnW/ZD1 = 0.730
Conditional expression(JF1) fF/fV = −1.113
Conditional expression(JF2) fV/fRF = 0.621
Conditional expression(JF3) DVW/fV = −0.106
Conditional expression(JF4) Wω = 41.170
Conditional expression(JF5) fF/fXR = 1.085
Conditional expression(JF6) DGXR/fXR = 0.511
Conditional expression(JF7) TLW/ZD1 = 4.448
Conditional expression(JG1) βFt = 0.011
Conditional expression(JG2) (rB + rA)/(rB − rA) = 2.685
Conditional expression(JG3) βFw = 0.301
Conditional expression(JH1) (rB + rA)/(rB − rA) = 2.685
Conditional expression(JH2) (rC + rB)/(rC − rB) = −0.028

TABLE 2-continued

| |
|---|
| Conditional expression(JH3) $|fF/fXR| = 1.085$ |
| Conditional expression(JH4) $\beta Fw = 0.301$ |
| Conditional expression(JJ1) $(rB + rA)/(rB - rA) = 2.685$ |
| Conditional expression(JJ2) $|fF/fXR| = 1.085$ |
| Conditional expression(JJ3) $\beta Fw = 0.301$ |
| Conditional expression(JJ4) $\nu dn = 28.690$ |

It can be seen in Table 2 that the zoom optical system ZL2 according to Example 2 satisfies the conditional expressions (JA1) to (JA8), (JB1) to (JB6), (JC1) to (JC6), (JD1) to (JD6), (JE1) to (JE7), (JF1) to (JF7), (JG1) to (JG3), (JH1) to (JH4), and (JJ1) to (JJ4).

Figure 6A:
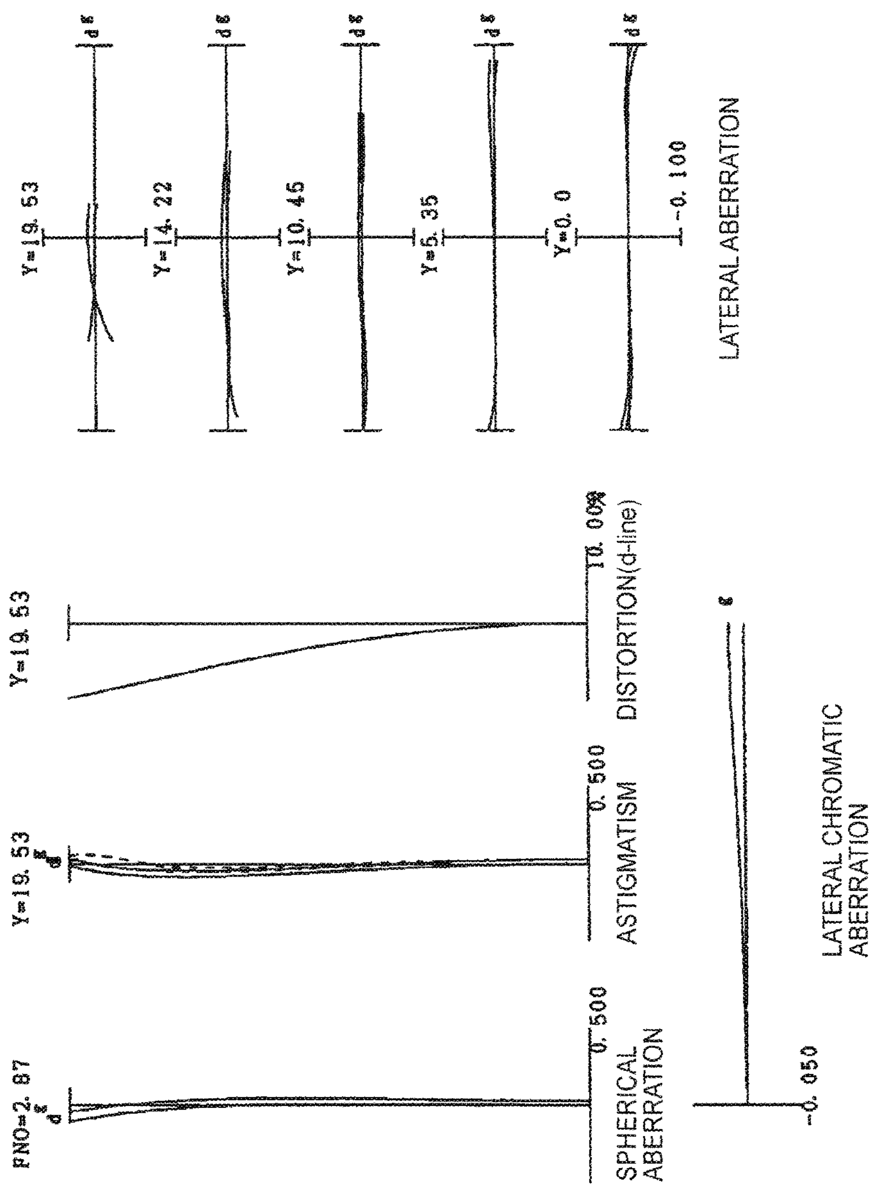
FIGS. 6A, 6B, and 6C are graphs showing various aberrations of the zoom optical system according to Example 2 upon focusing on infinity respectively in the wide angle end state, the intermediate focal length state, and the telephoto end state.
Figure 6B:
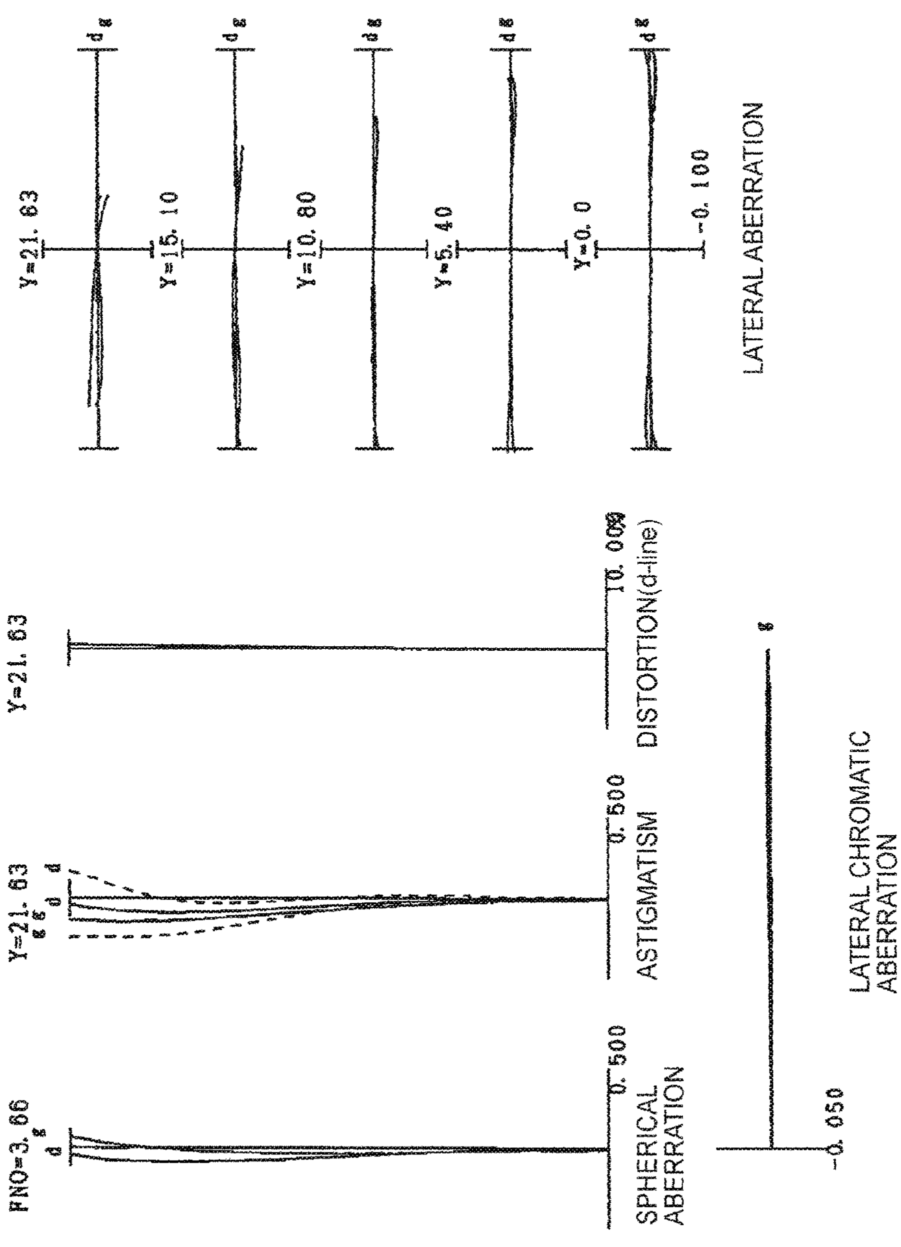
Figure 6C:
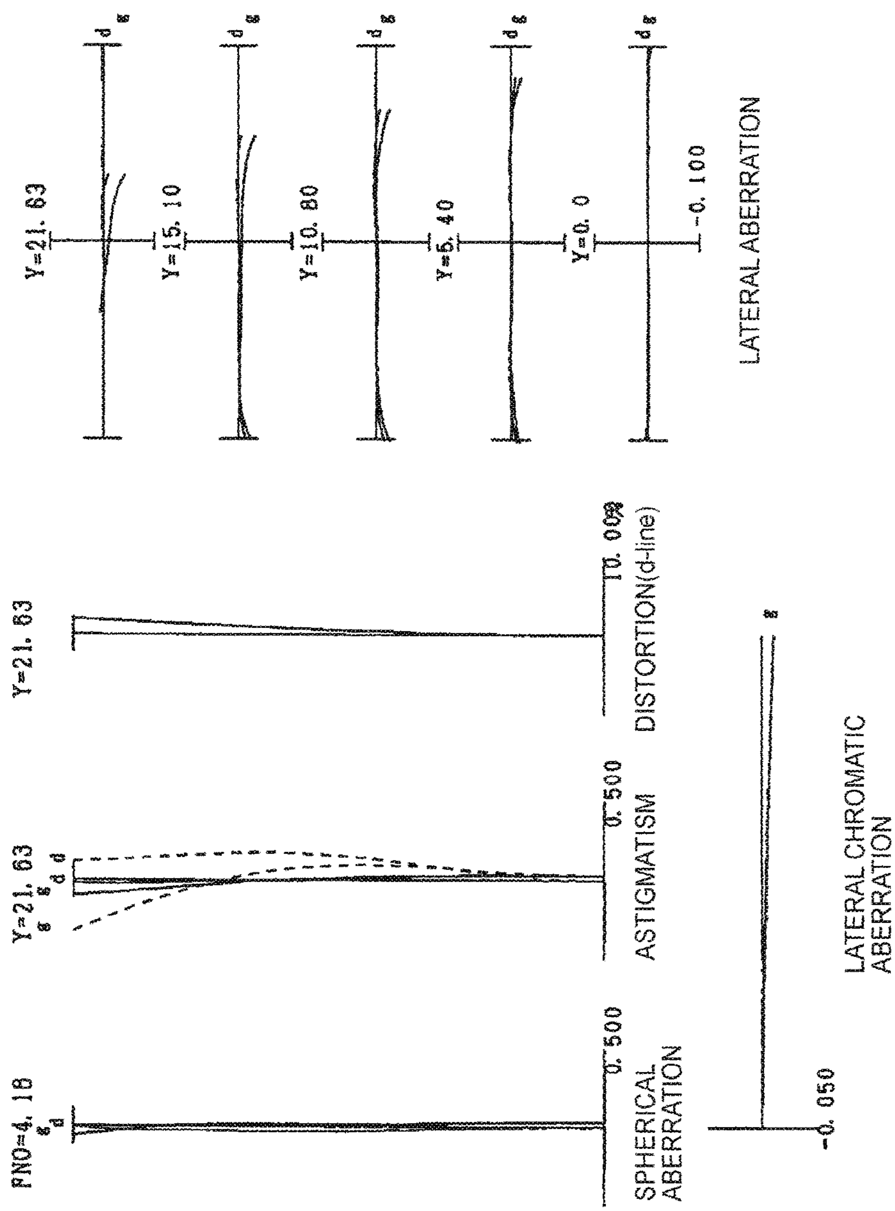
Figure 7A:
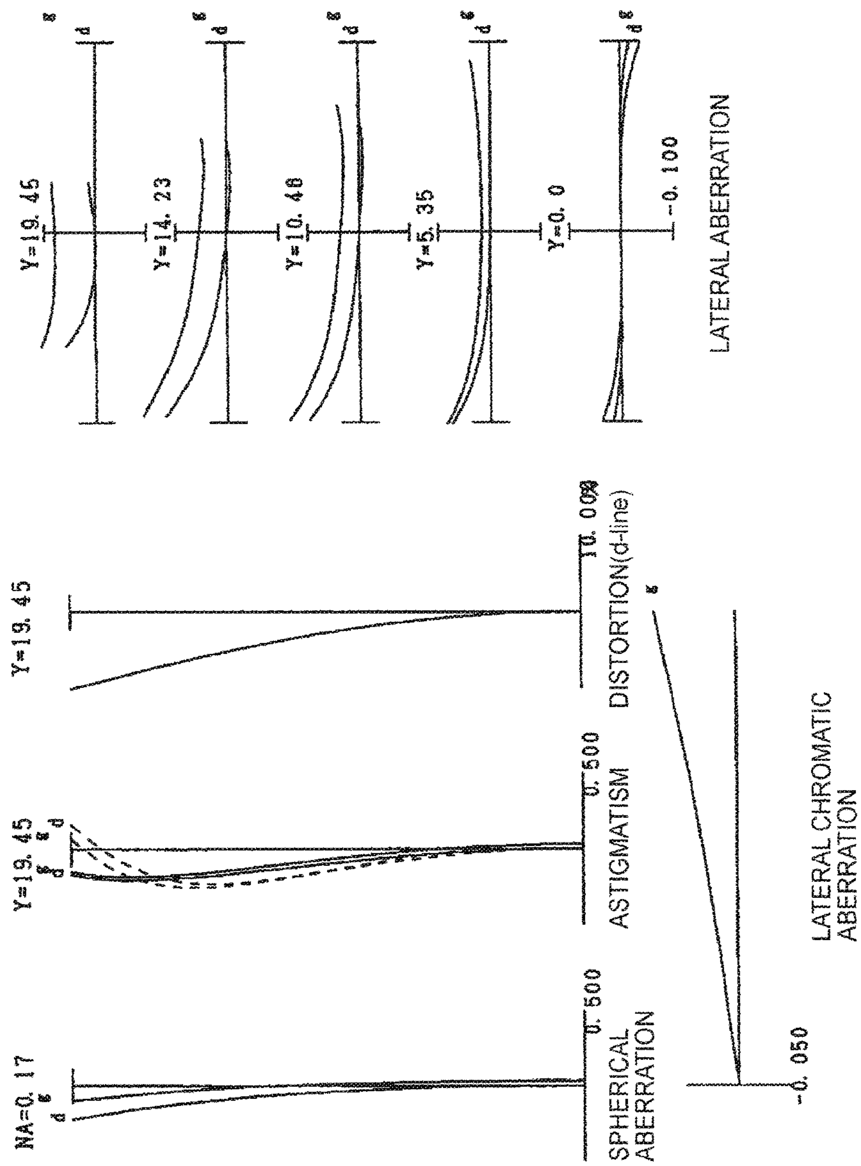
FIGS. 7A, 7B, and 7C are graphs showing various aberrations of the zoom optical system according to Example 2 upon focusing on a short distant object respectively in the wide angle end state, the intermediate focal length state, and the telephoto end state.
Figure 7B:
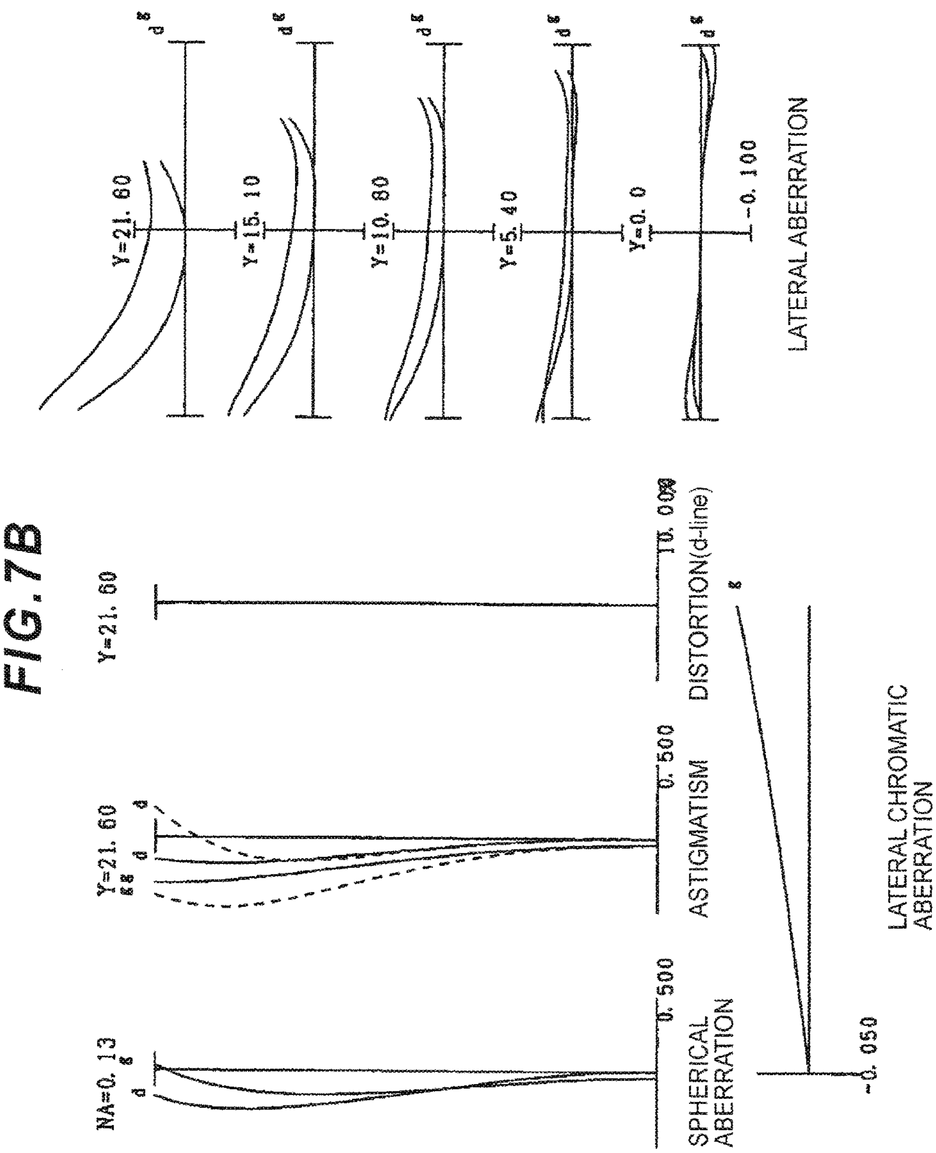
Figure 7C:
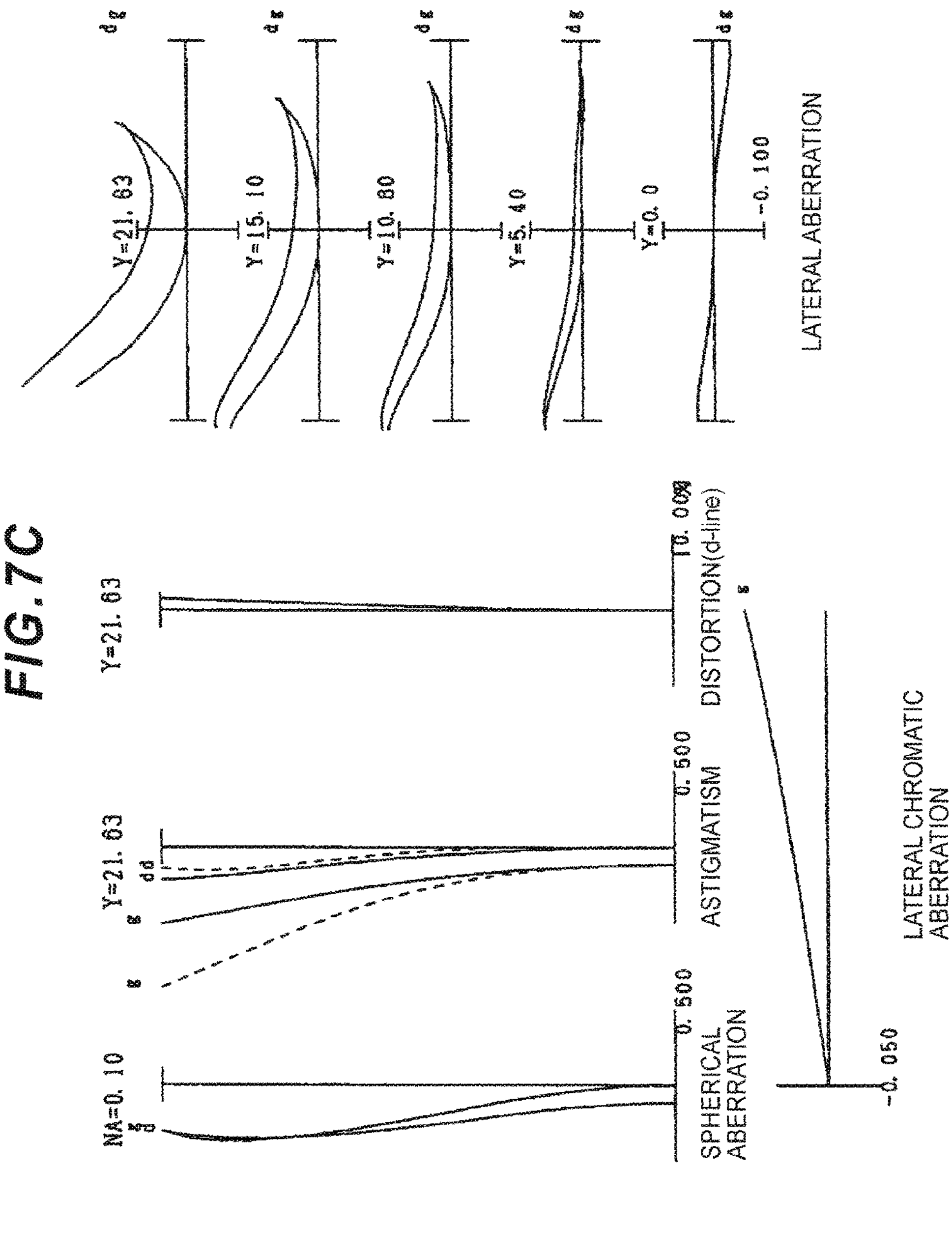
Figure 8A:
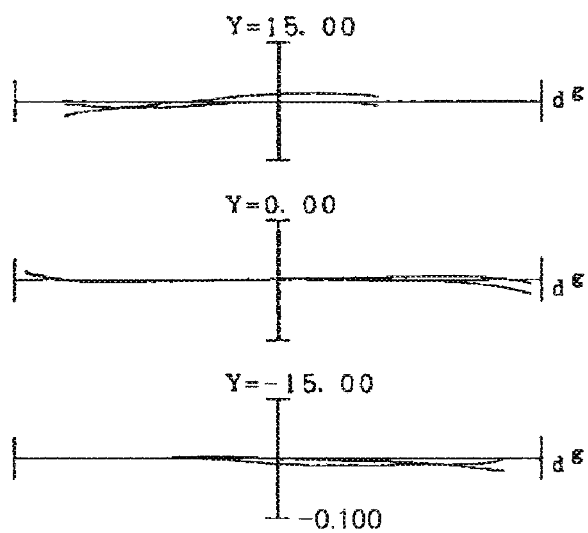
FIGS. 8A, 8B, and 8C are graphs showing lateral aberrations of the zoom optical system according to Example 2 upon focusing on infinity with image blur correction performed, respectively in the wide angle end state, the intermediate focal length state, and the telephoto end state.
Figure 8B:
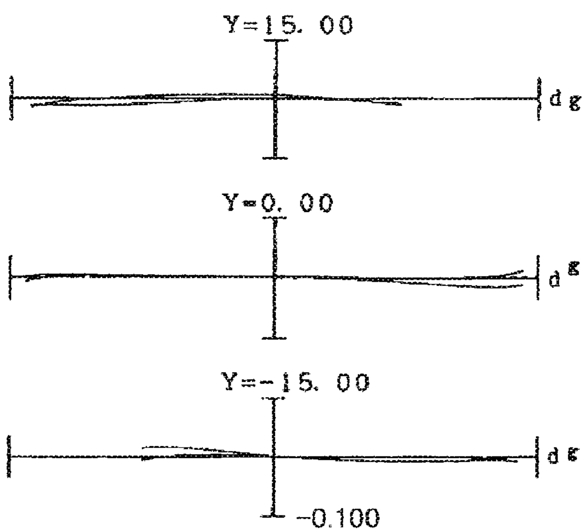
Figure 8C:
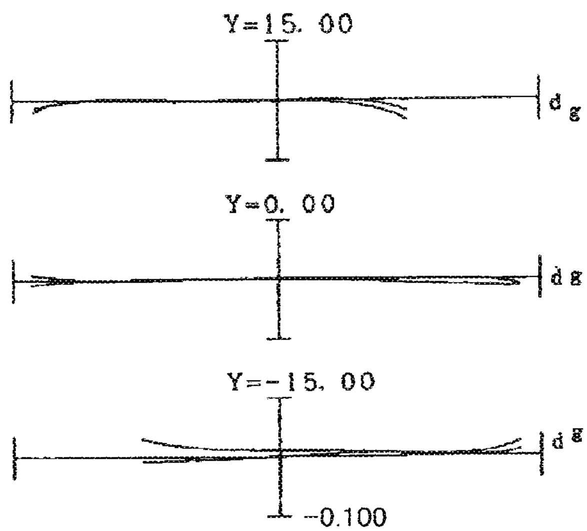

FIG. 6 is various aberration graphs (a spherical aberration graph, an astigmatism graph, a distortion graph, a lateral chromatic aberration graph, and a lateral aberration graph) of the zoom optical system ZL2 according to Example 2 upon focusing on infinity with FIG. 6A corresponding to the wide angle end state, FIG. 6B corresponding to the intermediate focal length state, and FIG. 6C corresponding to the telephoto end state. FIG. 7 is various aberration graphs (a spherical aberration graph, an astigmatism graph, a distortion graph, a lateral chromatic aberration graph, and a lateral aberration graph) of the zoom optical system ZL2 according to Example 2 upon focusing on a short distant object with FIG. 7A corresponding to the wide angle end state, FIG. 7B corresponding to the intermediate focal length state, and FIG. 7C corresponding to the telephoto end state. FIG. 8 is lateral aberration graphs at the time of image blur correction for the zoom optical system ZL2 according to Example 2 upon focusing on infinity with FIG. 8A corresponding to the wide angle end state, FIG. 8B corresponding to the intermediate focal length state, and FIG. 8C corresponding to the telephoto end state.

It can be seen in FIG. 6 to FIG. 8 that the zoom optical system ZL2 according to Example 2 can achieve an excellent optical performance with various aberrations successfully corrected from the wide angle end state to the telephoto end state and from the infinity focusing state to the short-distant object focusing state. Furthermore, it can be seen that a high imaging performance can be achieved upon image blur correction.

Example 3

Figure 9:
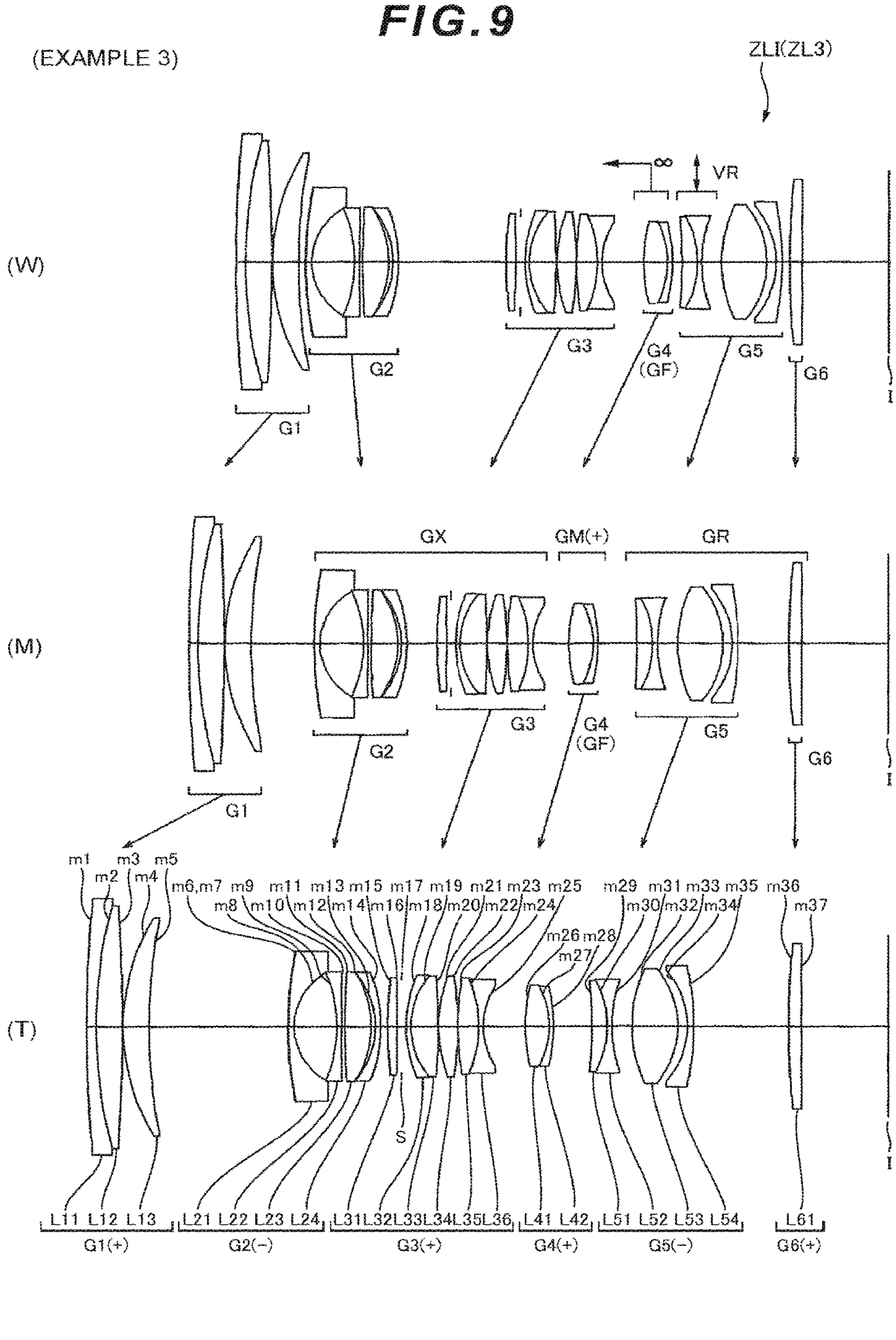
FIG. 9 is a cross-sectional view with sections (W), (M), and (T) showing a zoom optical system according to Example 3 respectively in the wide angle end state, the intermediate focal length state, and the telephoto end state.

Example 3 is described with reference to FIG. 9 to FIG. 12 and Table 3. A zoom optical system ZLI (ZL3) according to Example 3 includes, as illustrated in FIG. 9, the first lens group G1 having positive refractive power, the second lens group G2 having negative refractive power, the third lens group G3 having positive refractive power, the fourth lens group G4 having positive refractive power, the fifth lens group G5 having negative refractive power, and the sixth lens group G6 having positive refractive power that are arranged in order from the object side.

In the present example, the second lens group G2 and the third lens group G3 correspond to the front-side lens group GX. The fourth lens group G4 corresponds to the intermediate lens group GM (focusing lens group GF). The fifth lens group G5 and the sixth lens group G6 correspond to the rear-side lens group GR. The cemented lens including the lenses L51 and L52 forming the fifth lens group G5 corresponds to the vibration-proof lens group VR.

The first lens group G1 includes: the cemented lens including the negative meniscus lens L11 having a concave surface facing the image surface side and the biconvex lens L12; and the positive meniscus lens L13 having a convex surface facing the object side that are arranged in order from the object side.

The second lens group G2 includes the negative meniscus lens L21 having a concave surface facing the image surface side, the biconcave lens L22, the biconvex lens L23, and the negative meniscus lens L24 having a concave surface facing the object side that are arranged in order from the object side.

The negative meniscus lens L21 is a composite type aspherical lens with a resin layer, formed on a glass surface on the object side, formed to have an aspherical shape. The negative meniscus lens L24 is a glass-molded aspherical lens with a lens surface, on the image surface side, having an aspherical shape.

The third lens group G3 includes: the biconvex lens L31; the aperture stop S; the cemented lens including the negative meniscus lens L32 having a concave surface facing the image surface side and the biconvex lens L33; the biconvex lens L34; and the cemented lens including the biconvex lens L35 and the biconcave lens L36 that are arranged in order from the object side.

The biconvex lens L31 is a glass-molded aspherical lens with a lens surface, on the object side, having an aspherical shape.

The fourth lens group G4 includes the cemented lens including the biconvex lens L41 and the negative meniscus lens L42 having a concave surface facing the object side that are arranged in order from the object side.

The fifth lens group G5 includes: the cemented lens including the positive meniscus lens L51 having a convex surface facing the image surface side and the biconcave lens L52; the biconvex lens L53; and the negative meniscus lens L54 having a concave surface facing the object side that are arranged in order from the object side.

The biconcave lens L52 is a glass-molded aspherical lens with a lens surface, on the image surface side, having an aspherical shape.

The sixth lens group G6 includes the plano-convex lens L61 having a convex surface facing the object side.

Upon zooming from the wide angle end state to the telephoto end state, the distance between the lens groups changes with the first lens group G1 moved toward the object side, the second lens group G2 moved toward the image surface side and then moved toward the object side, the third lens group G3 to the fifth lens group G5 each moved toward the object side, and the sixth lens group G6 fixed.

Upon focusing from infinity to the short-distant object, the fourth lens group G4 moves toward the object side.

When image blur occurs, image blur correction (vibration isolation) on the image surface I is performed with the cemented lens including the lenses L51 and L52 forming the fifth lens group G5, and serving as the vibration-proof lens group VR moved with a displacement component in the direction orthogonal to the optical axis.

In Example 3, in the wide angle end state, the vibration proof coefficient is −0.89 and the focal length is 24.70 (mm), and thus the movement amount of the vibration-proof lens group VR for correcting the roll blur of 0.66° is −0.32 (mm). In the intermediate focal length state, the vibration proof coefficient is −1.12 and the focal length is 49.50 (mm), and thus the movement amount of the vibration-proof lens group VR for correcting the roll blur of 0.47° is −0.36 (mm). In the telephoto end state, the vibration proof coefficient is −1.36 and the focal length is 82.45 (mm), and thus the movement amount of the vibration-proof lens group VR for correcting the roll blur of 0.36° is −0.38 (mm).

In Table 3 below, specification values in Example 3 are listed. Surface numbers 1 to 37 in Table 3 respectively correspond to the optical surfaces m1 to m37 in FIG. 9.

TABLE 3

[Lens specifications]

| Surface number | R | D | nd | νd |
|---|---|---|---|---|
| Obj surface | ∞ | | | |
| 1 | 401.00863 | 2.000 | 1.92286 | 20.9 |
| 2 | 121.16792 | 5.742 | 1.59319 | 67.9 |
| 3 | −500.00000 | 0.100 | 1.00000 | |
| 4 | 52.80844 | 5.796 | 1.75500 | 52.3 |
| 5 | 147.40686 | (D5) | 1.00000 | |
| *6 | 108.54719 | 0.100 | 1.56093 | 36.6 |
| 7 | 99.55361 | 1.250 | 1.83481 | 42.7 |
| 8 | 15.35689 | 9.477 | 1.00000 | |
| 9 | −34.05998 | 1.000 | 1.80400 | 46.6 |
| 10 | 2673.65980 | 0.729 | 1.00000 | |
| 11 | 251.58062 | 5.749 | 1.80809 | 22.7 |
| 12 | −24.57937 | 0.829 | 1.00000 | |
| 13 | −21.23925 | 1.200 | 1.88202 | 37.2 |
| *14 | −41.22866 | (D14) | 1.00000 | |
| *15 | 86.90278 | 2.077 | 1.72903 | 54.0 |
| 16 | −447.48345 | 1.000 | 1.00000 | |
| 17 | (stop S) | 1.000 | 1.00000 | |
| 18 | 33.03101 | 1.012 | 1.71999 | 50.3 |
| 19 | 19.99010 | 5.930 | 1.49782 | 82.6 |
| 20 | −183.22190 | 0.100 | 1.00000 | |
| 21 | 37.75493 | 4.200 | 1.48749 | 70.3 |
| 22 | −92.50584 | 0.100 | 1.00000 | |
| 23 | 79.05844 | 4.581 | 1.95000 | 29.4 |
| 24 | −30.34409 | 1.000 | 1.79504 | 28.7 |
| 25 | 19.34777 | (D25) | 1.00000 | |
| 26 | 42.98351 | 5.284 | 1.58313 | 59.4 |
| 27 | −22.08681 | 1.000 | 1.79504 | 28.7 |
| 28 | −42.74259 | (D28) | 1.00000 | |
| 29 | −142.46452 | 3.388 | 1.84666 | 23.8 |
| 30 | −24.56214 | 1.000 | 1.76801 | 49.2 |
| *31 | 34.56633 | 4.383 | 1.00000 | |
| 32 | 34.09549 | 10.068 | 1.49782 | 82.6 |
| 33 | −22.62444 | 2.036 | 1.00000 | |
| 34 | −21.66642 | 1.350 | 1.90366 | 31.3 |
| 35 | −72.61079 | (D35) | 1.00000 | |
| 36 | 211.40000 | 2.805 | 1.75500 | 52.3 |
| 37 | 0.00000 | (D37) | 1.00000 | |
| Img surface | ∞ | | | |

[Aspherical data]

6th surface

κ = 1.00000e+00
A4 = 3.98249e−06
A6 = −1.35472e−08
A8 = 2.33425e−11
A10 = −4.97934e−14
A12 = 6.80330e−17

14th surface

κ = 1.00000e+00
A4 = −6.91076e−06
A6 = −9.38363e−09
A8 = −3.61645e−11
A10 = 0.00000e+00
A12 = 0.00000e+00

15th surface

κ = 1.00000e+00
A4 = −8.54887e−06
A6 = −1.66295e−09
A8 = −2.55600e−12

TABLE 3-continued

| |
|---|
| A10 = 0.00000e+00 |
| A12 = 0.00000e+00 |
| 31st surface |
| κ = 1.00000e+00 |
| A4 = 9.30632e−07 |
| A6 = −1.25999e−08 |
| A8 = 6.47905e−11 |
| A10 = 0.00000e+00 |
| A12 = 0.00000e+00 |

[Various data]
Zoom ratio 3.34

| | Wide angle end | Intermediate | Telephoto end |
|---|---|---|---|
| f | 24.70 | 49.50 | 82.45 |
| FNo | 2.88 | 3.69 | 4.17 |
| ω | 41.2 | 23.5 | 14.4 |
| Y | 19.51 | 21.63 | 21.63 |
| TL | 143.096 | 153.330 | 175.621 |
| BF | 18.993 | 18.993 | 18.993 |
| BF(air) | 18.993 | 18.993 | 18.993 |

[Variable distance data]

| | Upon focusing on infinity | | | Upon focusing on short distant object | | |
|---|---|---|---|---|---|---|
| | Wide angle end | Intermediate | Telephoto end | Wide angle end | Intermediate | Telephoto end |
| f | 24.70 | 49.50 | 82.45 | — | — | — |
| β | — | — | — | −0.1347 | −0.1763 | −0.2504 |
| D0 | ∞ | ∞ | ∞ | 156.90 | 246.67 | 274.38 |
| D5 | 1.500 | 13.708 | 30.328 | 1.500 | 13.708 | 30.328 |
| D14 | 23.612 | 6.595 | 1.500 | 23.612 | 6.595 | 1.500 |
| D25 | 9.104 | 7.953 | 9.104 | 7.333 | 4.455 | 2.224 |
| D28 | 2.000 | 8.603 | 8.304 | 3.771 | 12.101 | 15.183 |
| D35 | 1.602 | 11.192 | 21.108 | 1.602 | 11.192 | 21.108 |
| D37 | 18.993 | 18.993 | 18.993 | 18.993 | 18.993 | 18.993 |

[Lens group data]

| | Group starting surface | Group focal length |
|---|---|---|
| First lens group | 1 | 98.11 |
| Second lens group | 6 | −19.28 |
| Third lens group | 15 | 40.04 |
| Fourth lens group | 26 | 45.21 |
| Fifth lens group | 29 | −62.15 |
| Sixth lens group | 36 | 280.00 |

[Conditional expression corresponding value]

Conditional expression(JA1) |fF/fRF| = 0.727
Conditional expression(JA2) (−fXn)/fXR = 0.482
Conditional expression(JA3) fF/fW = 1.830
Conditional expression(JA4) Wω = 41.170
Conditional expression(JA5) fF/fXR = 1.129
Conditional expression(JA6) DXRFT/fF = 0.201
Conditional expression(JA7) Tω = 14.423
Conditional expression(JA8) DGXR/fXR = 0.525
Conditional expression(JC1) |fF/fRF| = 0.727
Conditional expression(JC2) (DMRT − DMRW)/fF = 0.139
Conditional expression(JC3) Wω = 41.170
Conditional expression(JC4) Tω = 14.423
Conditional expression(JC5) fRF/fRF2 = −0.222
Conditional expression(JC6) DGXR/fXR = 0.525
Conditional expression(JD1) fV/fRF = 0.639
Conditional expression(JD2) DVW/fV = −0.110
Conditional expression(JD3) Wω = 41.170
Conditional expression(JD4) fF/fXR = 1.129
Conditional expression(JD5) (−fXn)/fXR = 0.482
Conditional expression(JD6) DGXR/fXR = 0.525
Conditional expression(JE1) DVW/fV = −0.110
Conditional expression(JE2) Wω = 41.170
Conditional expression(JE3) fF/fW = 1.830

TABLE 3-continued

| |
|---|
| Conditional expression(JE4) fV/fRF = 0.639 |
| Conditional expression(JE5) fF/fXR = 1.129 |
| Conditional expression(JE6) DGXR/fXR = 0.525 |
| Conditional expression(JE7) DXnW/ZD1 = 0.726 |
| Conditional expression(JF1) fF/fV = −1.139 |
| Conditional expression(JF2) fV/fRF = 0.639 |
| Conditional expression(JF3) DVW/fV = −0.110 |
| Conditional expression(JF4) Wω = 41.170 |
| Conditional expression(JF5) fF/fXR = 1.129 |
| Conditional expression(JF6) DGXR/fXR = 0.525 |
| Conditional expression(JF7) TLW/ZD1= 4.399 |
| Conditional expression(JG1) βFt = 0.035 |
| Conditional expression(JG2) (rB + rA)/(rB − rA) = 2.637 |
| Conditional expression(JG3) βFw = 0.323 |
| Conditional expression(JJ1) (rB + rA)/(rB − rA) = 2.637 |
| Conditional expression(JJ2) \|fF/fXR\| = 1.129 |
| Conditional expression(JJ3) βFw = 0.323 |
| Conditional expression(JJ4) νdn = 28.690 |

It can be seen in Table 3 that the zoom optical system ZL3 according to Example 3 satisfies the conditional expressions (JA1) to (JA8), (JC1) to (JC6), (JD1) to (JD6), (JE1) to (JE7), (JF1) to (JF7), (JG1) to (JG3), and (JJ1) to (JJ4).

Figure 10A:
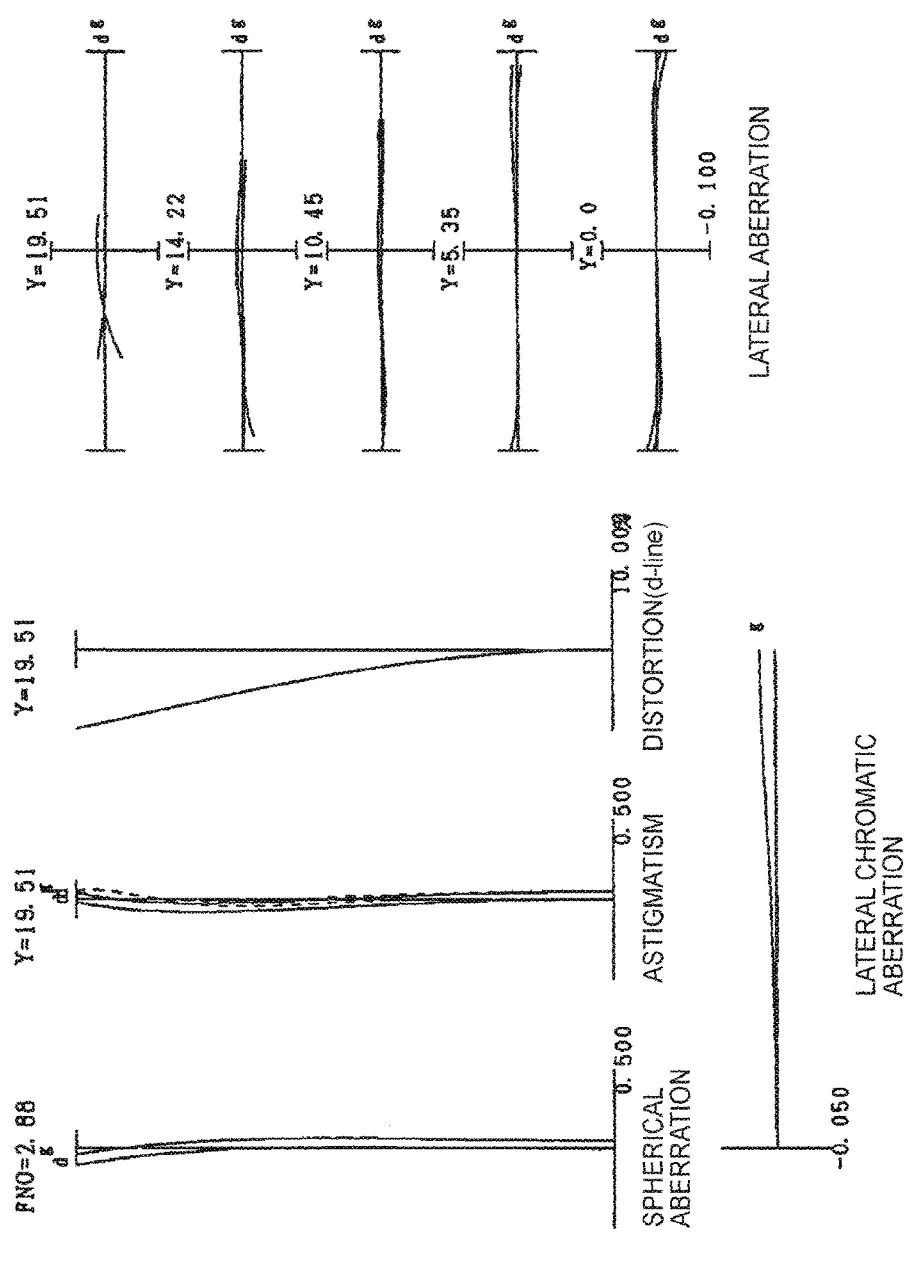
FIGS. 10A, 10B, and 10C are graphs showing various aberrations of the zoom optical system according to Example 3 upon focusing on infinity respectively in the wide angle end state, the intermediate focal length state, and the telephoto end state.
Figure 10B:
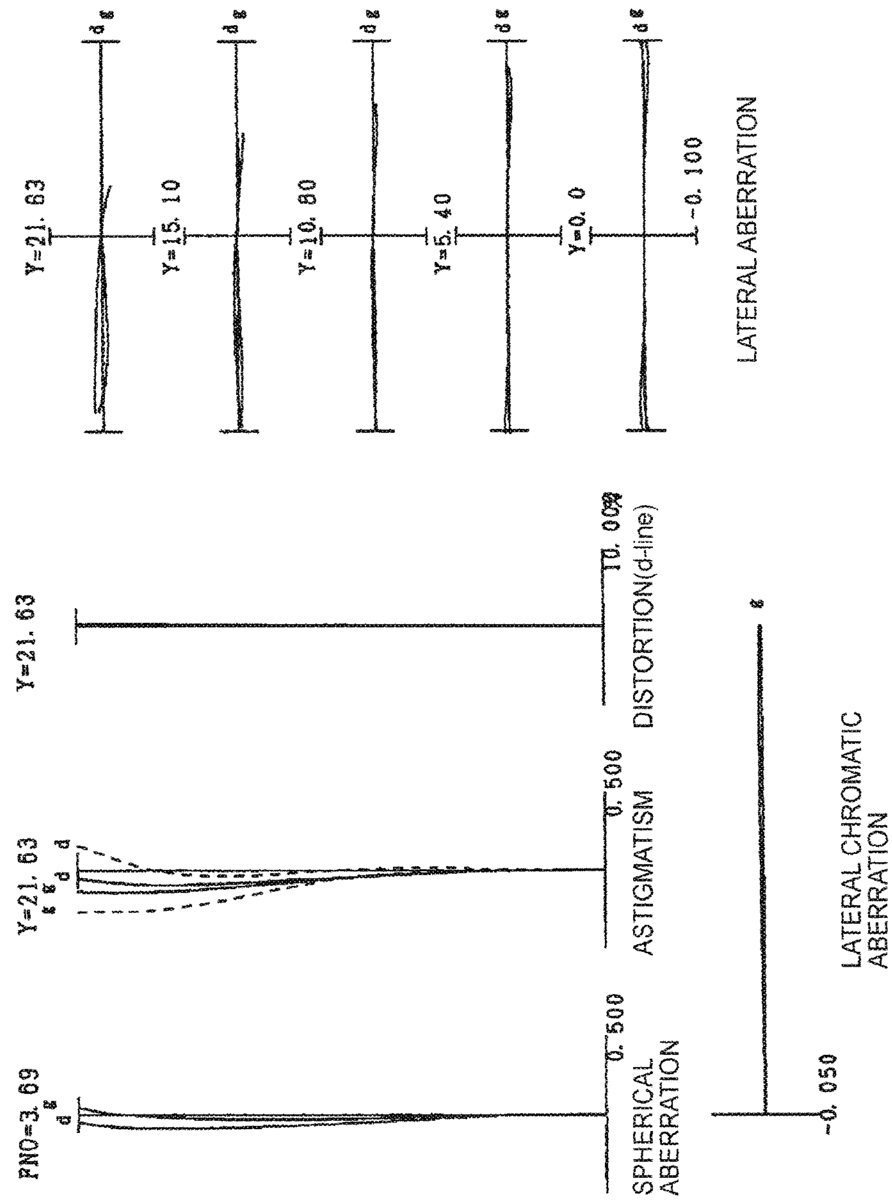
Figure 10C:
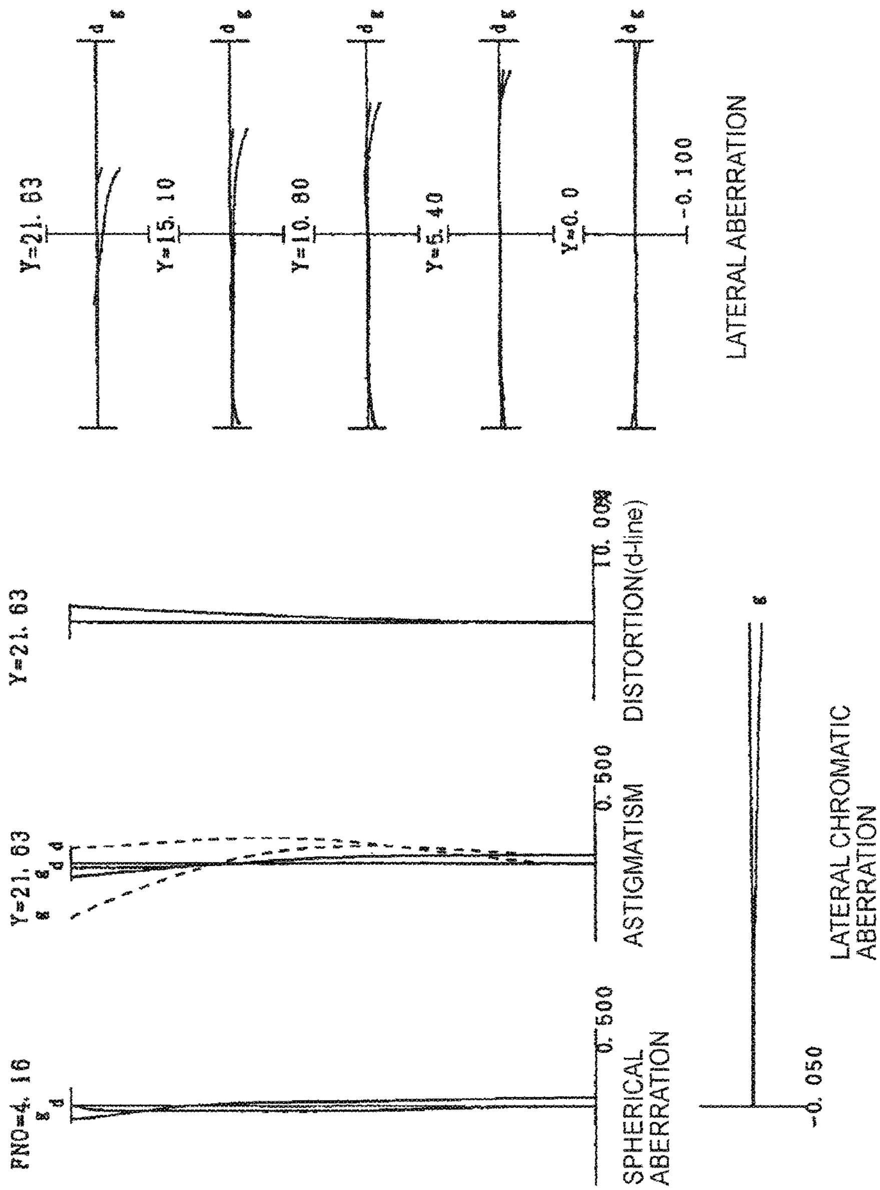
Figure 11A:
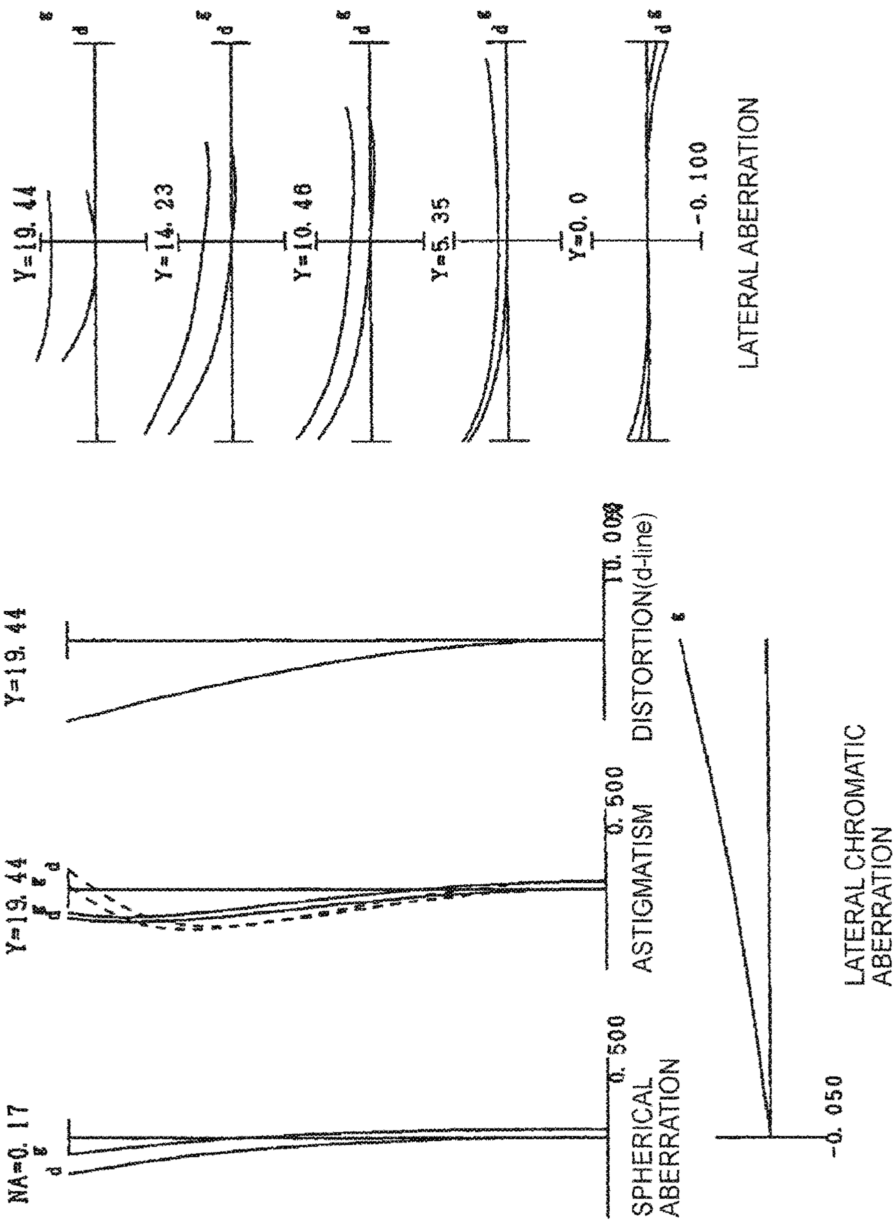
FIGS. 11A, 11B, and 11C are graphs showing various aberrations of the zoom optical system according to Example 3 upon focusing on a short distant object respectively in the wide angle end state, the intermediate focal length state, and the telephoto end state.
Figure 11B:
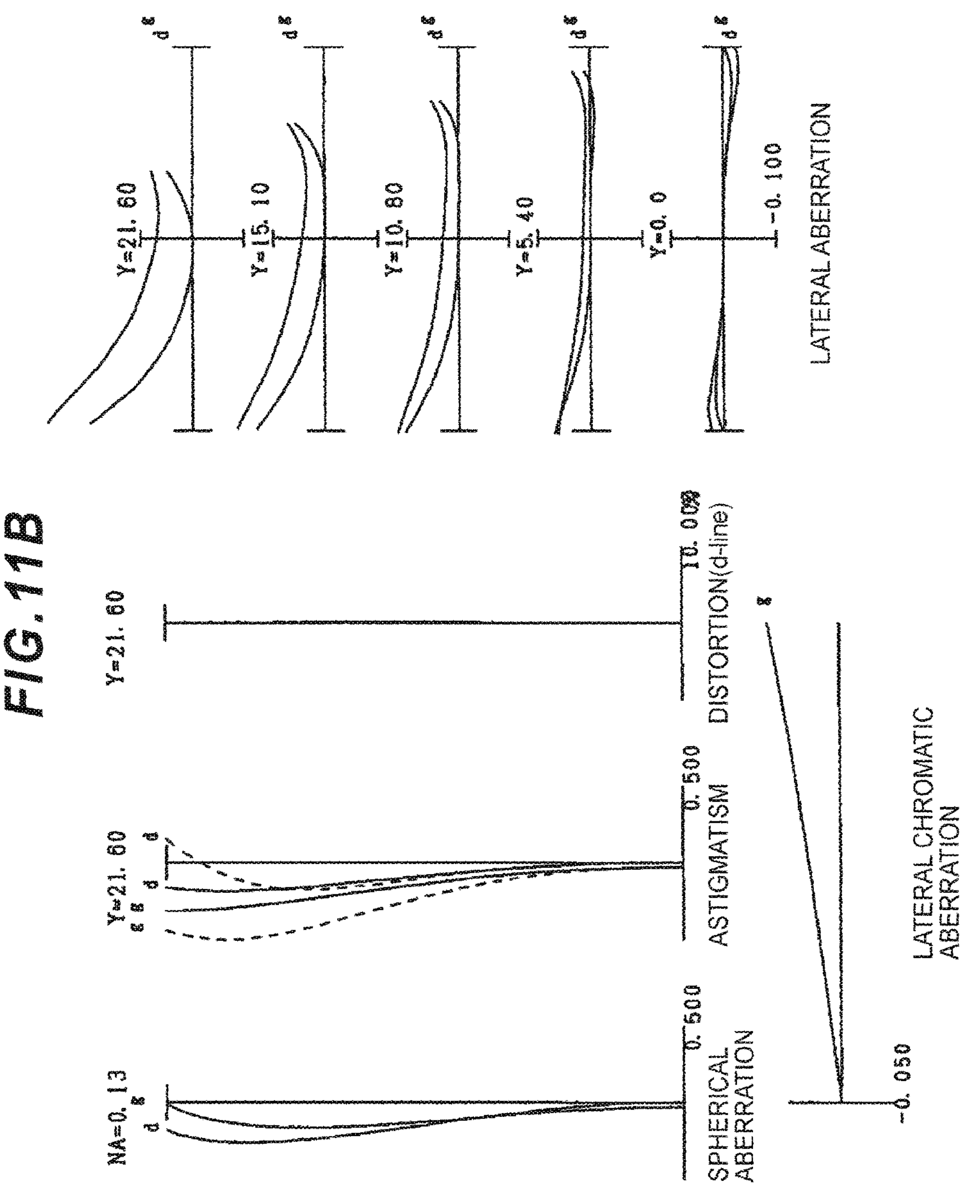
Figure 11C:
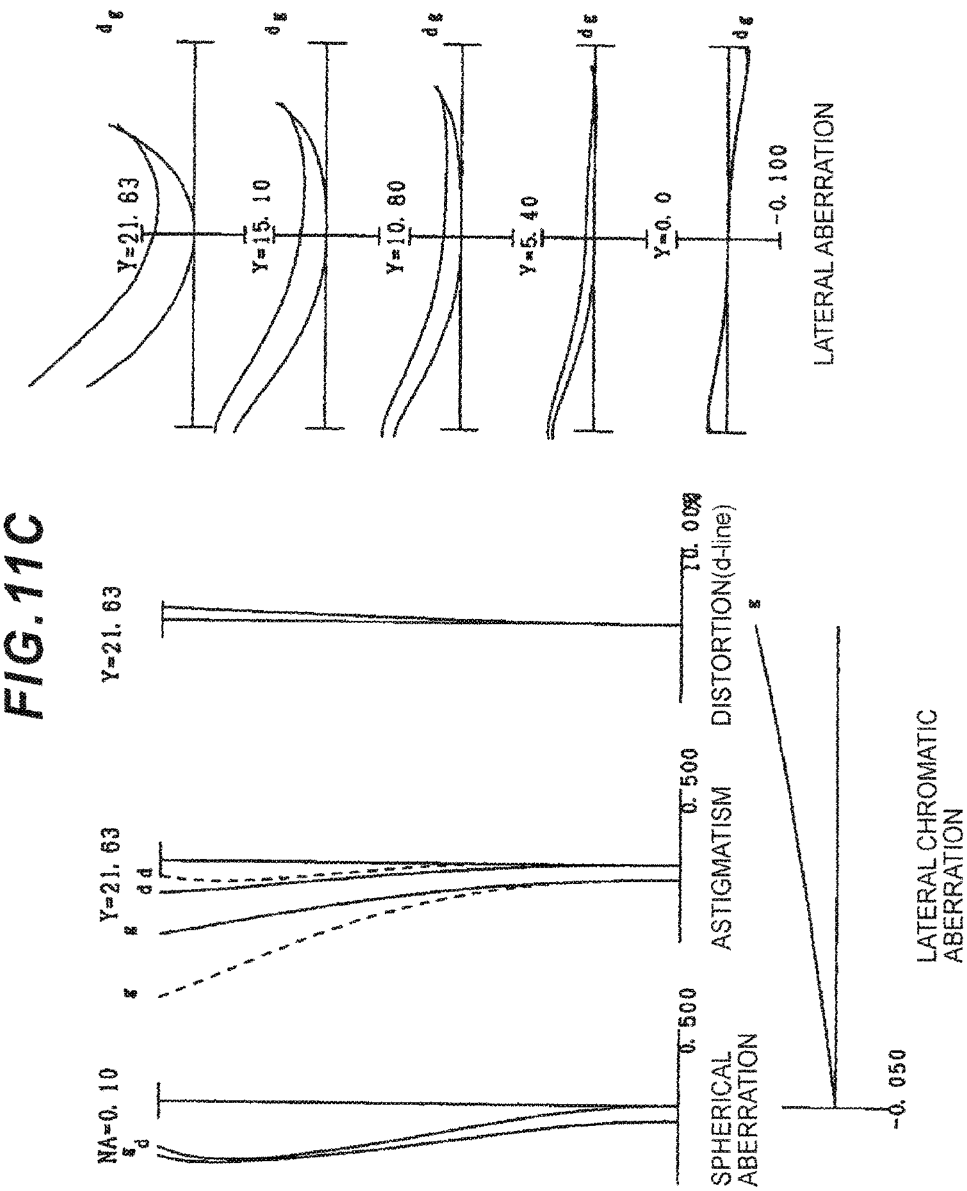
Figure 12A:
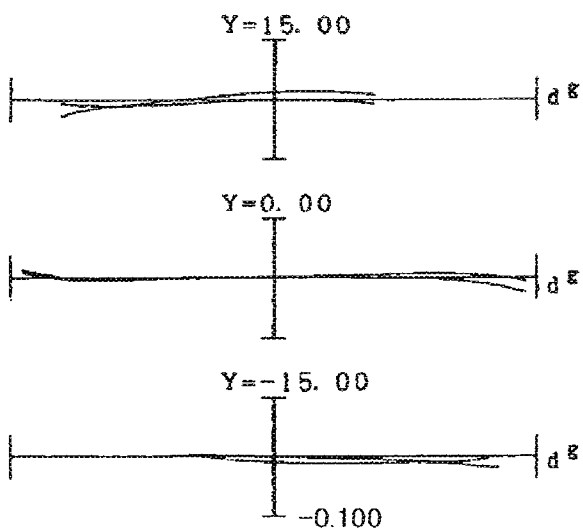
FIGS. 12A, 12B, and 12C are graphs showing lateral aberrations of the zoom optical system according to Example 3 upon focusing on infinity with image blur correction performed, respectively in the wide angle end state, the intermediate focal length state, and the telephoto end state.
Figure 12B:
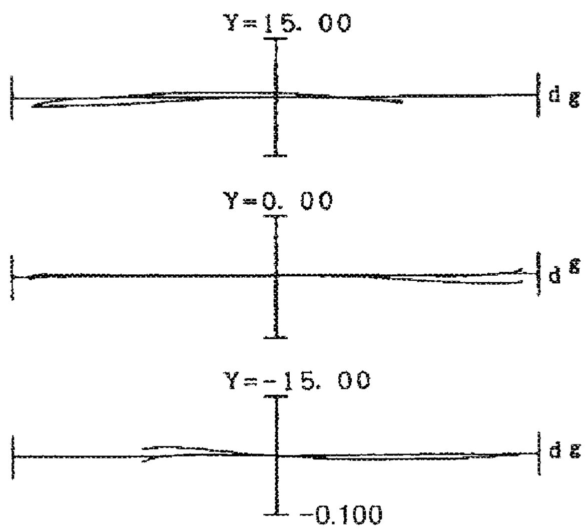
Figure 12C:
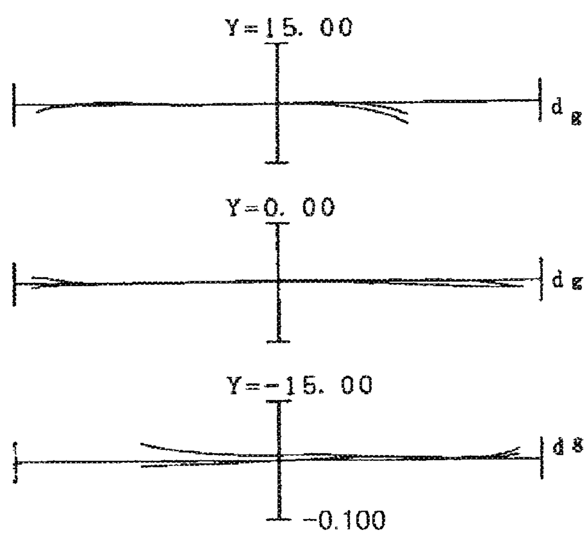

FIG. 10 is various aberration graphs (a spherical aberration graph, an astigmatism graph, a distortion graph, a lateral chromatic aberration graph, and a lateral aberration graph) of the zoom optical system ZL3 according to Example 3 upon focusing on infinity with FIG. 10A corresponding to the wide angle end state, FIG. 10B corresponding to the intermediate focal length state, and FIG. 10C corresponding to the telephoto end state. FIG. 11 is various aberration graphs (a spherical aberration graph, an astigmatism graph, a distortion graph, a lateral chromatic aberration graph, and a lateral aberration graph) of the zoom optical system ZL3 according to Example 3 upon focusing on a short distant object with FIG. 11A corresponding to the wide angle end state, FIG. 11B corresponding to the intermediate focal length state, and FIG. 11C corresponding to the telephoto end state. FIG. 12 is lateral aberration graphs at the time of image blur correction for the zoom optical system ZL3 according to Example 3 upon focusing on infinity with FIG. 12A corresponding to the wide angle end state, FIG. 12B corresponding to the intermediate focal length state, and FIG. 12C corresponding to the telephoto end state.

It can be seen in FIG. 10 to FIG. 12 that the zoom optical system ZL3 according to Example 3 can achieve an excellent optical performance with various aberrations successfully corrected from the wide angle end state to the telephoto end state and from the infinity focusing state to the short-distant object focusing state. Furthermore, it can be seen that a high imaging performance can be achieved upon image blur correction.

Example 4

Figure 13:
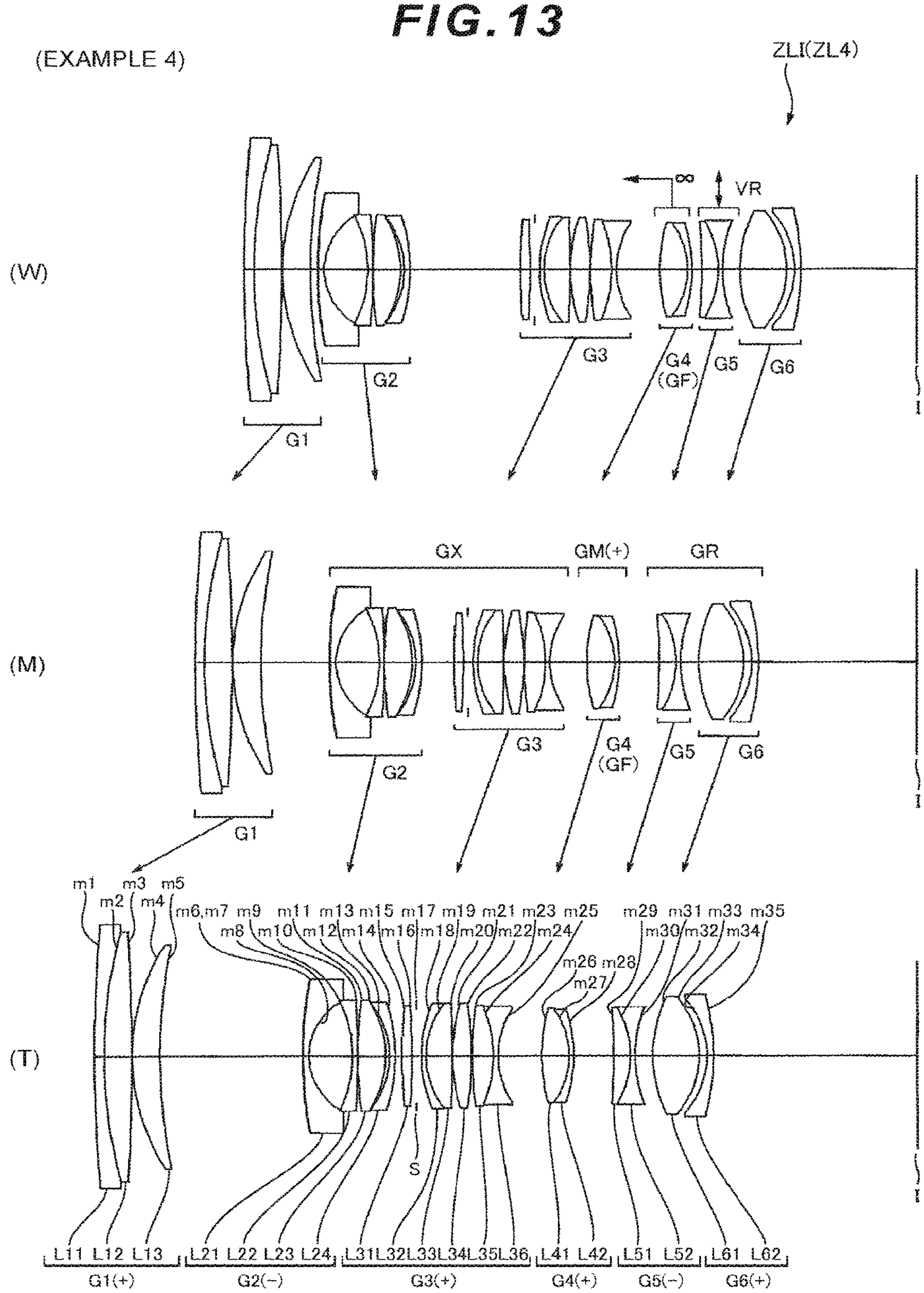
FIG. 13 is a cross-sectional view with sections (W), (M), and (T) showing a zoom optical system according to Example 4 respectively in the wide angle end state, the intermediate focal length state, and the telephoto end state.

Example 4 is described with reference to FIG. 13 to FIG. 16 and Table 4. A zoom optical system ZLI (ZL4) according to Example 4 includes, as illustrated in FIG. 13, the first lens group G1 having positive refractive power, the second lens group G2 having negative refractive power, the third lens group G3 having positive refractive power, the fourth lens group G4 having positive refractive power, the fifth lens group G5 having negative refractive power, and the sixth lens group G6 having positive refractive power that are arranged in order from the object side.

In the present example, the second lens group G2 and the third lens group G3 correspond to the front-side lens group GX. The fourth lens group G4 corresponds to the intermediate lens group GM (focusing lens group GF). The fifth lens group G5 and the sixth lens group G6 correspond to the rear-side lens group GR. The fifth lens group G5 corresponds to the vibration-proof lens group VR.

The first lens group G1 includes: the cemented lens including the negative meniscus lens L11 having a concave surface facing the image surface side and the biconvex lens L12; and the positive meniscus lens L13 having a convex surface facing the object side that are arranged in order from the object side.

The second lens group G2 includes: the negative meniscus lens L21 having a concave surface facing the image surface side; the negative meniscus lens L22 having a concave surface facing the object side; the biconvex lens L23; and the negative meniscus lens L24 having a concave surface facing the object side that are arranged in order from the object side.

The negative meniscus lens L21 is a composite type aspherical lens with a resin layer, formed on a glass surface on the object side, formed to have an aspherical shape. The negative meniscus lens L24 is a glass-molded aspherical lens with a lens surface, on the image surface side, having an aspherical shape.

The third lens group G3 includes: the biconvex lens L31; the aperture stop S; the cemented lens including the negative meniscus lens L32 having a concave surface facing the image surface side and the biconvex lens L33; the biconvex lens L34; and the cemented lens including the biconvex lens L35 and the biconcave lens L36 that are arranged in order from the object side.

The biconvex lens L31 is a glass-molded aspherical lens with a lens surface, on the object side, having an aspherical shape.

The fourth lens group G4 includes the cemented lens including the biconvex lens L41 and the negative meniscus lens L42 having a concave surface facing the object side that are arranged in order from the object side.

The fifth lens group G5 includes the cemented lens including the positive meniscus lens L51 having a convex surface facing the image surface side and the biconcave lens L52 arranged in order from the object side.

The biconcave lens L52 is a glass-molded aspherical lens with a lens surface, on the image surface side, having an aspherical shape.

The sixth lens group G6 is composed a biconvex lens L61 and the negative meniscus lens L62 having a concave surface facing the object side that are arranged in order from the object side.

Upon zooming from the wide angle end state to the telephoto end state, the distance between the lens groups changes with the first lens group G1 moved toward the object side, the second lens group G2 moved toward the image surface side and then moved toward the object side, and the third lens group G3 to the sixth lens group G6 each moved toward the object side.

Upon focusing from infinity to the short-distant object, the fourth lens group G4 moves toward the object side.

When image blur occurs, image blur correction (vibration isolation) on the image surface I is performed with the fifth lens group G5 serving as the vibration-proof lens group VR moved with a displacement component in the direction orthogonal to the optical axis.

In Example 4, in the wide angle end state, the vibration proof coefficient is −0.94 and the focal length is 24.70 (mm), and thus the movement amount of the vibration-proof lens group VR for correcting the roll blur of 0.66° is −0.30 (mm). In the intermediate focal length state, the vibration proof coefficient is −1.17 and the focal length is 49.50 (mm), and thus the movement amount of the vibration-proof lens group VR for correcting the roll blur of 0.47° is −0.34 (mm). In the telephoto end state, the vibration proof coefficient is −1.42 and the focal length is 82.45 (mm), and thus the movement amount of the vibration-proof lens group VR for correcting the roll blur of 0.36° is −0.37 (mm).

In Table 4 below, specification values in Example 4 are listed. Surface numbers 1 to 35 in Table 4 respectively correspond to the optical surfaces m1 to m35 in FIG. 13.

TABLE 4

[Lens specifications]

| Surface number | R | D | nd | νd |
|---|---|---|---|---|
| Obj surface | ∞ | | | |
| 1 | 378.17737 | 2.000 | 1.92286 | 20.9 |
| 2 | 118.11934 | 5.844 | 1.59319 | 67.9 |
| 3 | −500.00000 | 0.100 | 1.00000 | |
| 4 | 51.63655 | 5.920 | 1.75500 | 52.3 |
| 5 | 141.87634 | (D5) | 1.00000 | |
| *6 | 158.15149 | 0.100 | 1.56093 | 36.6 |
| 7 | 102.00883 | 1.250 | 1.83481 | 42.7 |
| 8 | 15.22160 | 9.303 | 1.00000 | |
| 9 | −29.63785 | 1.000 | 1.80400 | 46.6 |
| 10 | −225.21525 | 0.104 | 1.00000 | |
| 11 | 119.10029 | 5.891 | 1.80809 | 22.7 |
| 12 | −24.72064 | 0.782 | 1.00000 | |
| 13 | −21.10048 | 1.200 | 1.88202 | 37.2 |
| *14 | −47.00882 | (D14) | 1.00000 | |
| *15 | 109.65633 | 2.066 | 1.72903 | 54.0 |
| 16 | −215.77979 | 1.000 | 1.00000 | |
| 17 | (stop S) | 1.000 | 1.00000 | |
| 18 | 33.67783 | 1.000 | 1.71999 | 50.3 |
| 19 | 20.98173 | 5.562 | 1.49782 | 82.6 |
| 20 | −304.24111 | 0.100 | 1.00000 | |
| 21 | 43.99361 | 4.136 | 1.48749 | 70.3 |
| 22 | −73.22133 | 0.100 | 1.00000 | |
| 23 | 94.72252 | 4.517 | 1.95000 | 29.4 |
| 24 | −30.47819 | 1.000 | 1.79504 | 28.7 |
| 25 | 21.31000 | (D25) | 1.00000 | |
| 26 | 42.90428 | 5.891 | 1.58313 | 59.4 |
| 27 | −19.57454 | 1.000 | 1.79504 | 28.7 |
| 28 | −36.90143 | (D28) | 1.00000 | |
| 29 | −156.74405 | 3.568 | 1.84666 | 23.8 |
| 30 | −23.21215 | 1.000 | 1.76801 | 49.2 |
| *31 | 33.50218 | (D31) | 1.00000 | |
| 32 | 32.35097 | 9.840 | 1.49782 | 82.6 |
| 33 | −21.82936 | 1.696 | 1.00000 | |
| 34 | −20.79382 | 1.350 | 1.90366 | 31.3 |
| 35 | −59.98623 | (D35) | 1.00000 | |
| Img surface | ∞ | | | |

[Aspherical data]

6th surface

κ = 1.00000e+00
A4 = 1.01851e−05
A6 = −2.38470e−08
A8 = 4.98807e−11
A10 = −9.80153e−14
A12 = 1.34160e−16

14th surface

κ = 1.00000e+00
A4 = −4.81580e−06
A6 = −8.49768e−09
A8 = −2.93682e−11

TABLE 4-continued

| |
|---|
| A10 = 0.00000e+00 |
| A12 = 0.00000e+00 |
| 15th surface |
| κ = 1.00000e+00 |
| A4 = −8.99460e−06 |
| A6 = −2.39078e−09 |
| A8 = −4.17876e−12 |
| A10 = 0.00000e+00 |
| A12 = 0.00000e+00 |
| 31st surface |
| κ = 1.00000e+00 |
| A4 = 1.13063e−06 |
| A6 = −1.26643e−08 |
| A8 = 6.92538e−11 |
| A10 = 0.00000e+00 |
| A12 = 0.00000e+00 |

[Various data]
Zoom ratio 3.34

| | Wide angle end | Intermediate | Telephoto end |
|---|---|---|---|
| f | 24.70 | 49.50 | 82.45 |
| FNo | 2.88 | 3.61 | 4.12 |
| ω | 41.2 | 23.5 | 14.4 |
| Y | 19.55 | 21.63 | 21.63 |
| TL | 143.097 | 153.486 | 174.987 |
| BF | 24.715 | 33.738 | 43.584 |
| BF(air) | 24.715 | 33.738 | 43.584 |

[Variable distance data]

| | Upon focusing on infinity | | | Upon focusing on short distant object | | |
|---|---|---|---|---|---|---|
| | Wide angle end | Intermediate | Telephoto end | Wide angle end | Intermediate | Telephoto end |
| f | 24.70 | 49.50 | 82.45 | — | — | — |
| β | — | — | — | −0.1348 | −0.1761 | −0.2538 |
| D0 | ∞ | ∞ | ∞ | 156.90 | 246.51 | 275.01 |
| D5 | 1.500 | 14.376 | 30.144 | 1.500 | 14.376 | 30.144 |
| D14 | 23.482 | 6.861 | 1.500 | 23.482 | 6.861 | 1.500 |
| D25 | 9.211 | 7.842 | 9.211 | 7.612 | 4.456 | 2.133 |
| D28 | 2.000 | 8.508 | 8.464 | 3.599 | 11.894 | 15.542 |
| D31 | 3.868 | 3.841 | 3.763 | 3.868 | 3.841 | 3.763 |
| D35 | 24.715 | 33.738 | 43.584 | 24.715 | 33.738 | 43.584 |

[Lens group data]

| | Group starting surface | Group focal length |
|---|---|---|
| First lens group | 1 | 96.10 |
| Second lens group | 6 | −18.35 |
| Third lens group | 15 | 41.62 |
| Fourth lens group | 26 | 42.14 |
| Fifth lens group | 29 | −39.73 |
| Sixth lens group | 32 | 82.66 |

[Conditional expression corresponding value]

Conditional expression(JA1) |fF/fRF| = 1.061
Conditional expression(JA2) (−fXn)/fXR = 0.441
Conditional expression(JA3) fF/fW = 1.706
Conditional expression(JA4) Wω = 41.170
Conditional expression(JA5) fF/fXR = 1.013
Conditional expression(JA6) DXRFT/fF = 0.219
Conditional expression(JA7) Tω = 14.405
Conditional expression(JA8) DGXR/fXR = 0.492
Conditional expression(JB1) (DMRT − DMRW)/fF = 0.153
Conditional expression(JB2) Wω = 41.170
Conditional expression(JB3) Tω = 14.405
Conditional expression(JB4) fF/fRF = −1.061
Conditional expression(JB5) fF/fXR = 1.013
Conditional expression(JB6) DGXR/fXR = 0.492
Conditional expression(JC1) |fF/fRF| = 1.061

TABLE 4-continued

| |
|---|
| Conditional expression(JC2) (DMRT − DMRW)/fF = 0.153 |
| Conditional expression(JC3) Wω = 41.170 |
| Conditional expression(JC4) Tω = 14.405 |
| Conditional expression(JC5) fRF/fRF2 = −0.481 |
| Conditional expression(JC6) DGXR/fXR = 0.492 |
| Conditional expression(JE1) DVW/fV = −0.097 |
| Conditional expression(JE2) Wω = 41.170 |
| Conditional expression(JE3) fF/fW = 1.706 |
| Conditional expression(JE4) fV/fRF = 1.000 |
| Conditional expression(JE5) fF/fXR = 1.013 |
| Conditional expression(JE6) DGXR/fXR = 0.492 |
| Conditional expression(JE7) DXnW/ZD1 = 0.736 |
| Conditional expression(JF1) fF/fV = −1.061 |
| Conditional expression(JF2) fV/fRF = 1.000 |
| Conditional expression(JF3) DVW/fV = −0.097 |
| Conditional expression(JF4) Wω = 41.170 |
| Conditional expression(JF5) fF/fXR = 1.013 |
| Conditional expression(JF6) DGXR/fXR = 0.492 |
| Conditional expression(JF7) TLW/ZD1 = 4.487 |
| Conditional expression(JG1) βFt = −0.075 |
| Conditional expression(JG2) (rB + rA)/(rB − rA) = 2.974 |
| Conditional expression(JG3) βFw = 0.252 |
| Conditional expression(JH1) (rB + rA)/(rB − rA) = 2.974 |
| Conditional expression(JH2) (rC + rB)/(rC − rB) = −0.075 |
| Conditional expression(JH3) \|fF/fXR\| = 1.013 |
| Conditional expression(JH4) βFw = 0.252 |
| Conditional expression(JJ1) (rB + rA)/(rB − rA) = 2.974 |
| Conditional expression(JJ2) \|fF/fXR\| = 1.013 |
| Conditional expression(JJ3) βFw = 0.252 |
| Conditional expression(JJ4) νdn = 28.690 |

It can be seen in Table 4 that the zoom optical system ZL4 according to Example 4 satisfies the conditional expressions (JA1) to (JA8), (JB1) to (JB6), (JC1) to (JC6), (JE1) to (JE7), (JF1) to (JF7), (JG1) to (JG3), (JH1) to (JH4), and (JJ1) to (JJ4).

Figure 14A:
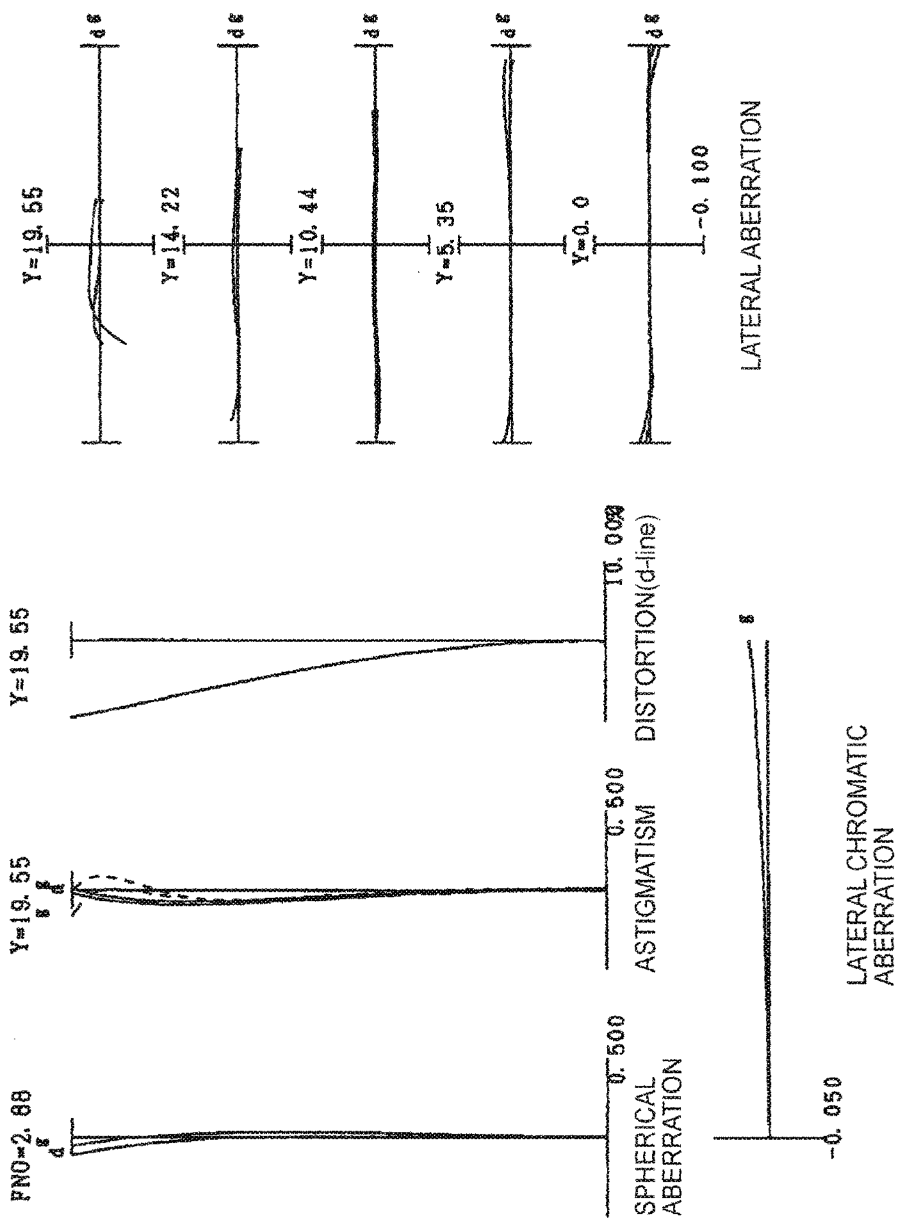
FIGS. 14A, 14B, and 14C are graphs showing various aberrations of the zoom optical system according to Example 4 upon focusing on infinity respectively in the wide angle end state, the intermediate focal length state, and the telephoto end state.
Figure 14B:
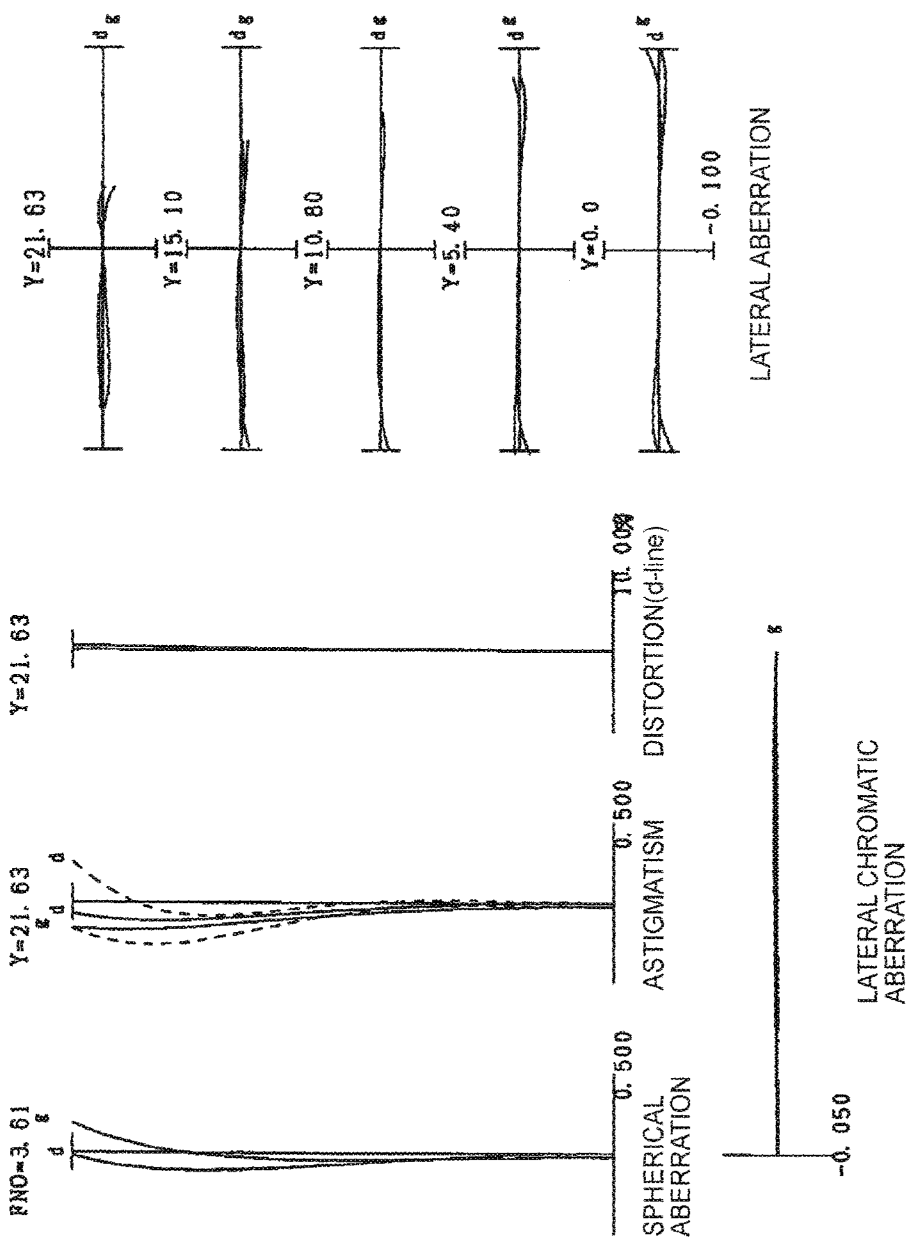
Figure 14C:
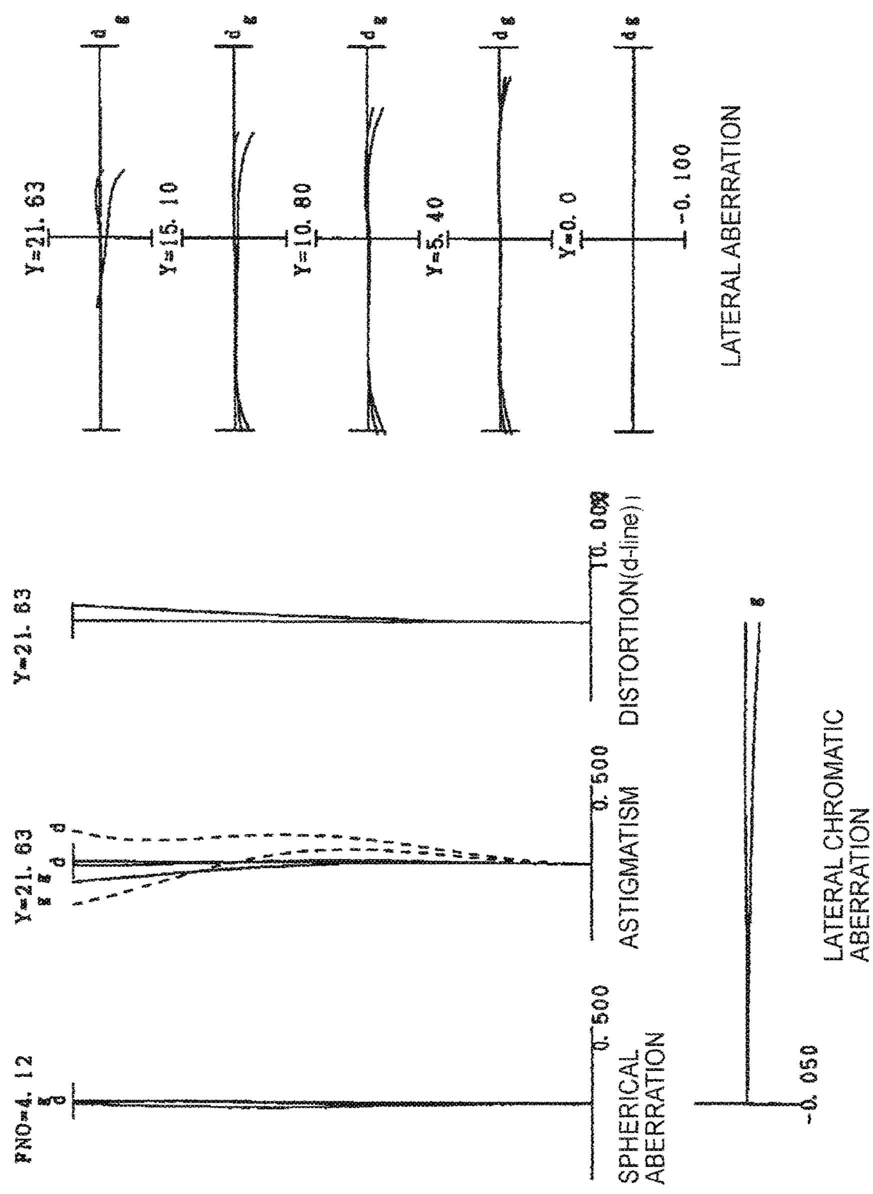
Figure 15A:
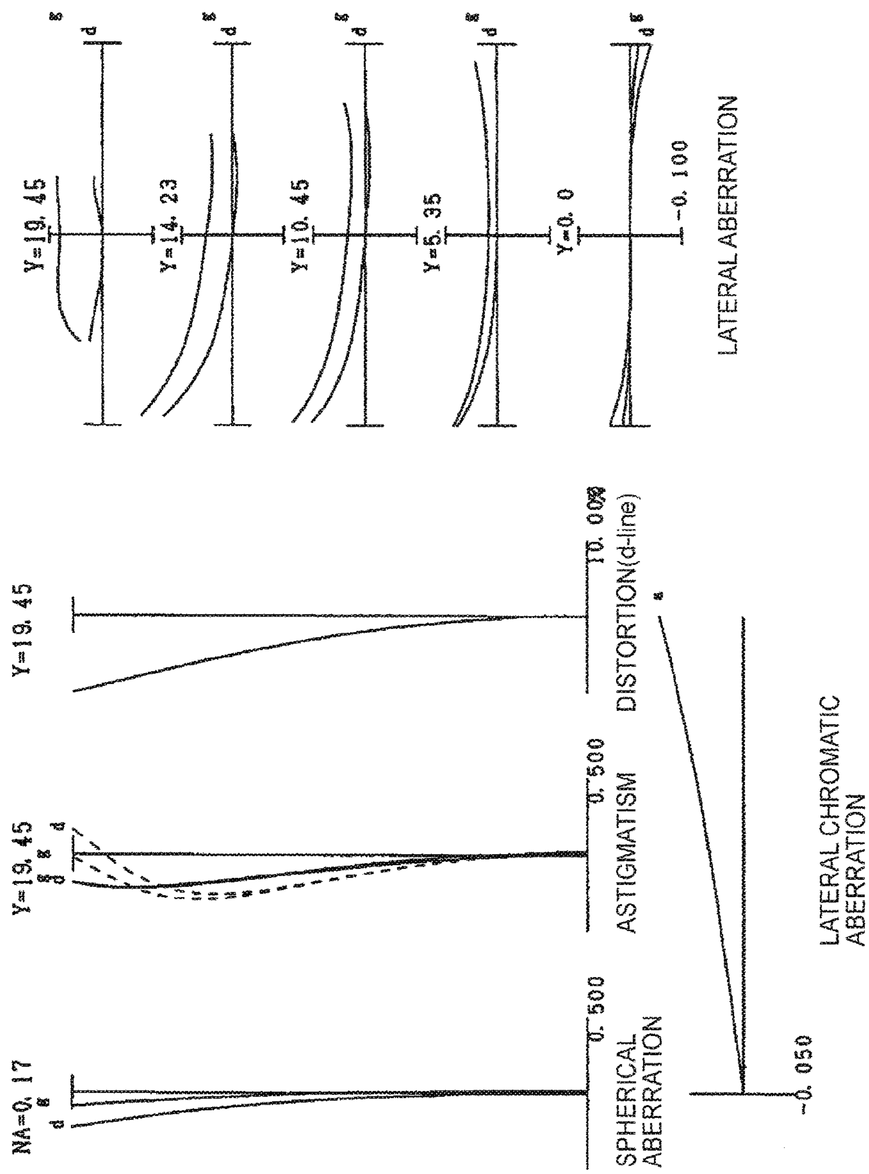
FIGS. 15A, 15B, and 15C are graphs showing various aberrations of the zoom optical system according to Example 4 upon focusing on a short distant object respectively in the wide angle end state, the intermediate focal length state, and the telephoto end state.
Figure 15B:
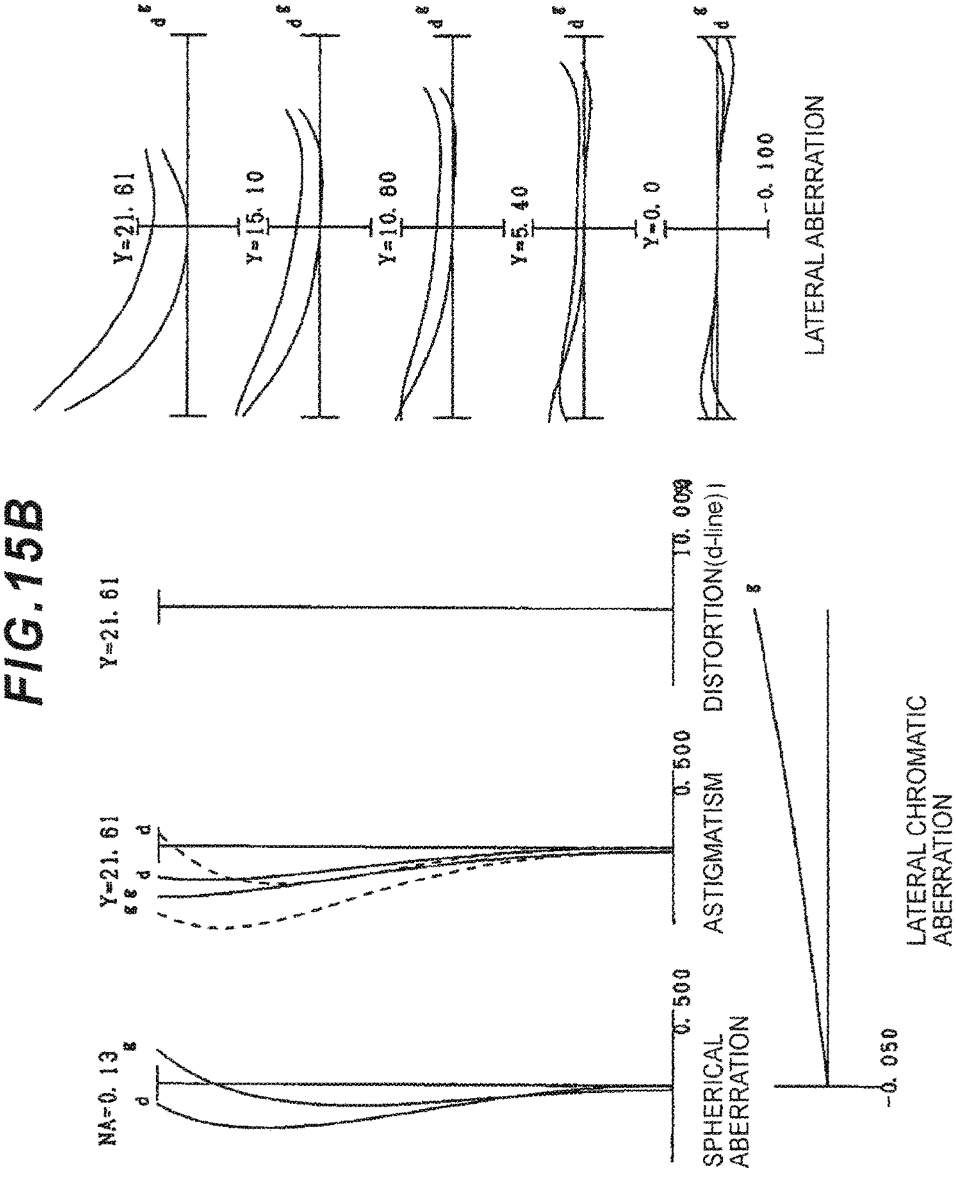
Figure 15C:
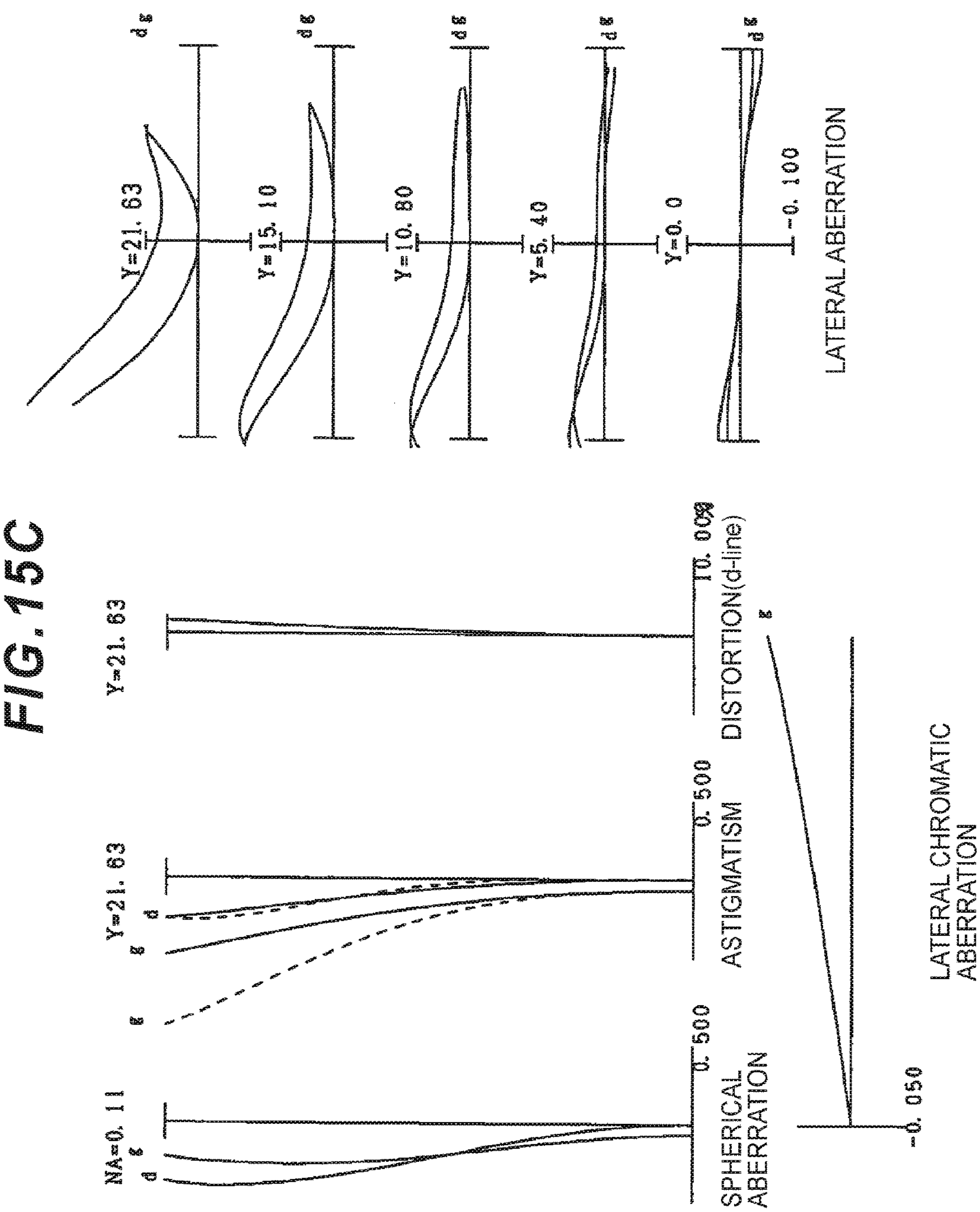
Figure 16A:
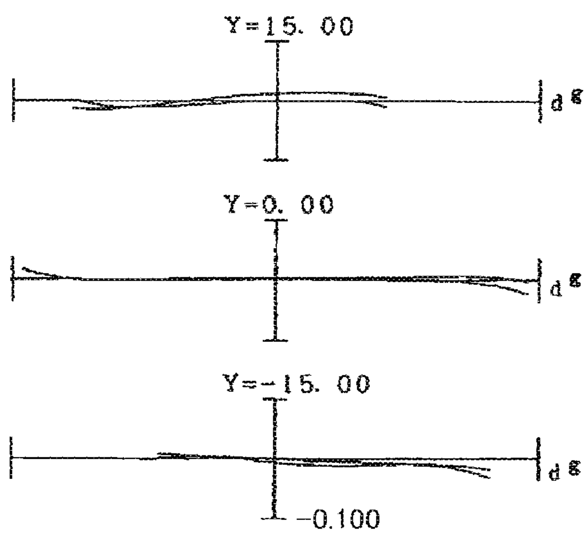
FIGS. 16A, 16B, and 16C are graphs showing lateral aberrations of the zoom optical system according to Example 4 upon focusing on infinity with image blur correction performed, respectively in the wide angle end state, the intermediate focal length state, and the telephoto end state.
Figure 16B:
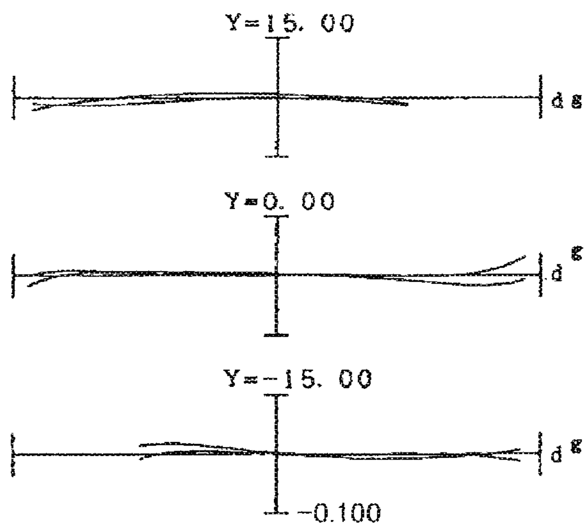
Figure 16C:
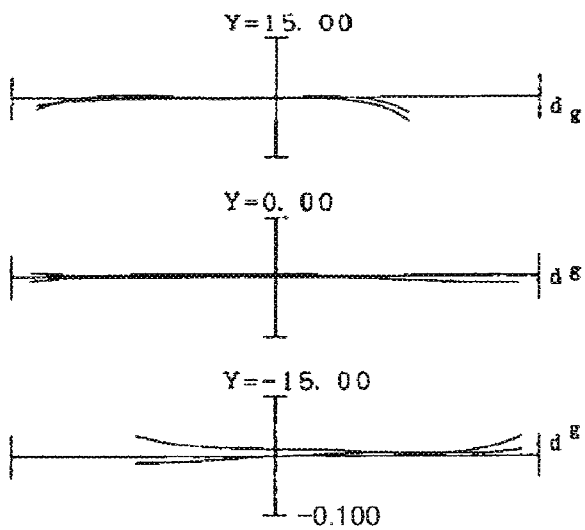

FIG. 14 is various aberration graphs (a spherical aberration graph, an astigmatism graph, a distortion graph, a lateral chromatic aberration graph, and a lateral aberration graph) of the zoom optical system ZL4 according to Example 4 upon focusing on infinity with FIG. 14A corresponding to the wide angle end state, FIG. 14B corresponding to the intermediate focal length state, and FIG. 14C corresponding to the telephoto end state. FIG. 15 is various aberration graphs (a spherical aberration graph, an astigmatism graph, a distortion graph, a lateral chromatic aberration graph, and a lateral aberration graph) of the zoom optical system ZL4 according to Example 4 upon focusing on a short distant object with FIG. 15A corresponding to the wide angle end state, FIG. 15B corresponding to the intermediate focal length state, and FIG. 15C corresponding to the telephoto end state. FIG. 16 is lateral aberration graphs at the time of image blur correction for the zoom optical system ZL4 according to Example 4 upon focusing on infinity with FIG. 16A corresponding to the wide angle end state, FIG. 16B corresponding to the intermediate focal length state, and FIG. 16C corresponding to the telephoto end state.

It can be seen in FIG. 14 to FIG. 16 that the zoom optical system ZL4 according to Example 4 can achieve an excellent optical performance with various aberrations successfully corrected from the wide angle end state to the telephoto end state and from the infinity focusing state to the short-distant object focusing state. Furthermore, it can be seen that a high imaging performance can be achieved upon image blur correction.

Example 5

Figure 17:
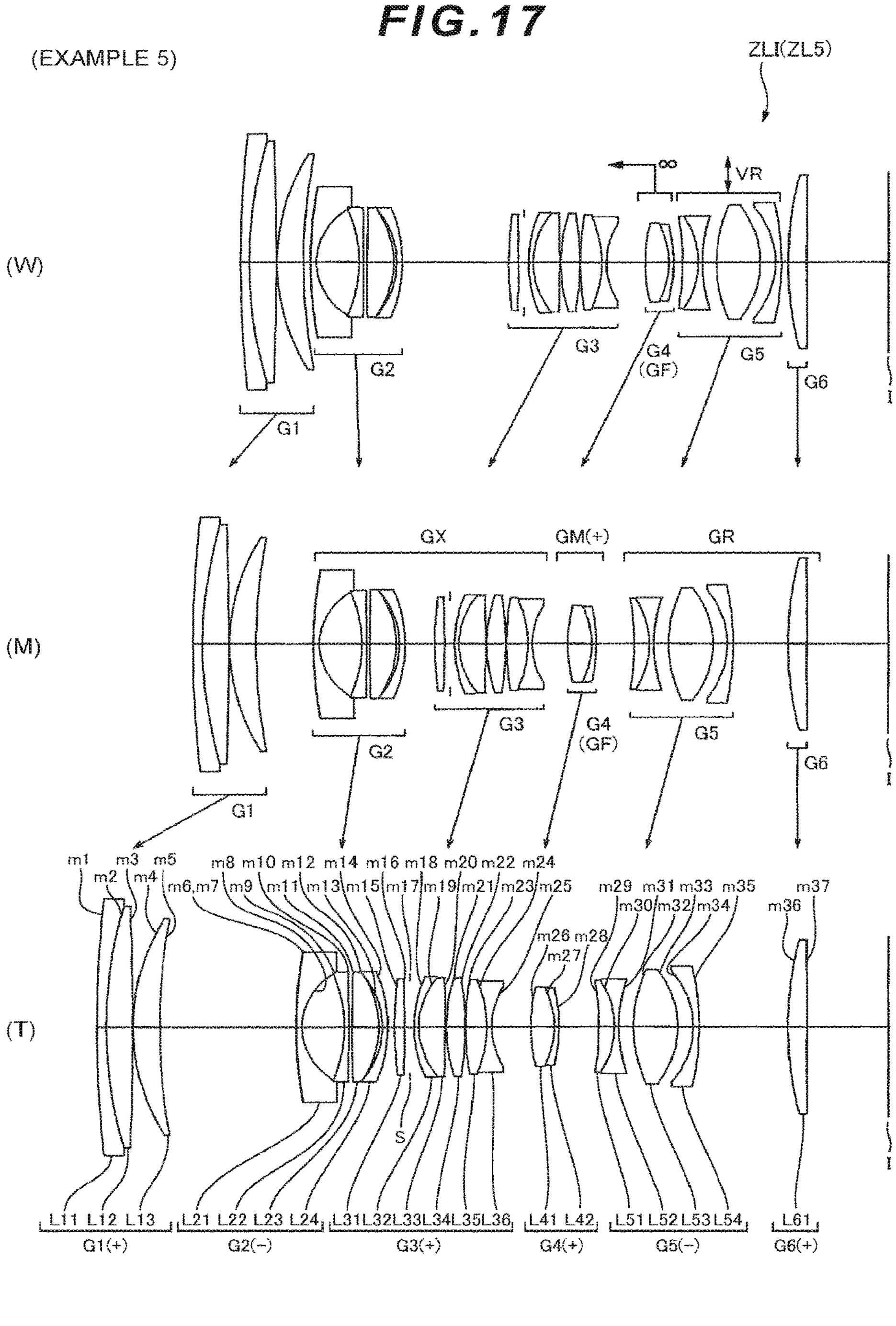
FIG. 17 is a cross-sectional view with sections (W), (M), and (T) showing a zoom optical system according to Example 5 respectively in the wide angle end state, the intermediate focal length state, and the telephoto end state.

Example 5 is described with reference to FIG. 17 to FIG. 20 and Table 5. A zoom optical system ZLI (ZL5) according to Example 5 includes, as illustrated in FIG. 17, the first lens group G1 having positive refractive power, the second lens group G2 having negative refractive power, the third lens group G3 having positive refractive power, the fourth lens group G4 having positive refractive power, the fifth lens group G5 having negative refractive power, and the sixth lens group G6 having positive refractive power that are arranged in order from the object side.

In the present example, the second lens group G2 and the third lens group G3 correspond to the front-side lens group GX. The fourth lens group G4 corresponds to the intermediate lens group GM (focusing lens group GF). The fifth lens group G5 and the sixth lens group G6 correspond to the rear-side lens group GR. The fifth lens group G5 corresponds to the vibration-proof lens group VR.

The first lens group G1 includes: the cemented lens including the negative meniscus lens L11 having a concave surface facing the image surface side and the biconvex lens L12; and the positive meniscus lens L13 having a convex surface facing the object side that are arranged in order from the object side.

The second lens group G2 includes: the negative meniscus lens L21 having a concave surface facing the image surface side; the negative meniscus lens L22 having a concave surface facing the object side; the biconvex lens L23; and the negative meniscus lens L24 having a concave surface facing the object side that are arranged in order from the object side.

The negative meniscus lens L21 is a composite type aspherical lens with a resin layer, formed on a glass surface on the object side, formed to have an aspherical shape. The negative meniscus lens L24 is a glass-molded aspherical lens with a lens surface, on the image surface side, having an aspherical shape.

The third lens group G3 includes: the biconvex lens L31; the aperture stop S; the cemented lens including the negative meniscus lens L32 having a concave surface facing the image surface side and the biconvex lens L33; the biconvex lens L34; and the cemented lens including the biconvex lens L35 and the biconcave lens L36 that are arranged in order from the object side.

The biconvex lens L31 is a glass-molded aspherical lens with a lens surface, on the object side, having an aspherical shape.

The fourth lens group G4 includes the cemented lens including the biconvex lens L41 and the negative meniscus lens L42 having a concave surface facing the object side that are arranged in order from the object side.

The fifth lens group G5 includes: the cemented lens including the positive meniscus lens L51 having a convex surface facing the image surface side and the biconcave lens L52; the biconvex lens L53; and the negative meniscus lens L54 having a concave surface facing the object side that are arranged in order from the object side.

The biconcave lens L52 is a glass-molded aspherical lens with a lens surface, on the image surface side, having an aspherical shape.

The sixth lens group G6 includes the biconvex lens L61.

Upon zooming from the wide angle end state to the telephoto end state, the distance between the lens groups changes with the first lens group G1 moved toward the object side, the second lens group G2 moved toward the image surface side and then moved toward the object side, the third lens group G3 to the fifth lens group G5 each moved toward the object side, and the sixth lens group G6 fixed.

Upon focusing from infinity to the short-distant object, the fourth lens group G4 moves toward the object side.

When image blur occurs, image blur correction (vibration isolation) on the image surface I is performed with the fifth lens group G5 serving as the vibration-proof lens group VR moved with a displacement component in the direction orthogonal to the optical axis.

In Example 5, in the wide angle end state, the vibration proof coefficient is −0.62 and the focal length is 24.70 (mm), and thus the movement amount of the vibration-proof lens group VR for correcting the roll blur of 0.66° is −0.46 (mm). In the intermediate focal length state, the vibration proof coefficient is −0.81 and the focal length is 49.50 (mm), and thus the movement amount of the vibration-proof lens group VR for correcting the roll blur of 0.47° is −0.50 (mm). In the telephoto end state, the vibration proof coefficient is −0.95 and the focal length is 82.45 (mm), and thus the movement amount of the vibration-proof lens group VR for correcting the roll blur of 0.36° is −0.55 (mm).

In Table 5 below, specification values in Example 5 are listed. Surface numbers 1 to 37 in Table 5 respectively correspond to the optical surfaces m1 to m37 in FIG. 17.

TABLE 5

[Lens specifications]

| Surface number | R | D | nd | νd |
|---|---|---|---|---|
| Obj surface | ∞ | | | |
| 1 | 295.45596 | 2.000 | 1.92286 | 20.9 |
| 2 | 110.24643 | 5.870 | 1.59319 | 67.9 |
| 3 | −762.56799 | 0.100 | 1.00000 | |
| 4 | 52.19538 | 5.859 | 1.75500 | 52.3 |
| 5 | 144.16926 | (D5) | 1.00000 | |
| *6 | 109.99857 | 0.100 | 1.56093 | 36.6 |
| 7 | 103.82935 | 1.250 | 1.83481 | 42.7 |
| 8 | 15.13651 | 9.424 | 1.00000 | |
| 9 | −34.78713 | 1.000 | 1.80400 | 46.6 |
| 10 | −503.06886 | 0.819 | 1.00000 | |
| 11 | 2775.06080 | 5.758 | 1.80809 | 22.7 |
| 12 | −23.63444 | 0.718 | 1.00000 | |
| 13 | −20.84765 | 1.200 | 1.88202 | 37.2 |
| *14 | −39.84738 | (D14) | 1.00000 | |
| *15 | 82.51823 | 2.198 | 1.72903 | 54.0 |
| 16 | −285.57791 | 1.186 | 1.00000 | |
| 17 | (stop S) | 1.000 | 1.00000 | |
| 18 | 32.15650 | 1.000 | 1.71999 | 50.3 |
| 19 | 19.37917 | 5.884 | 1.49782 | 82.6 |
| 20 | −409.37679 | 0.249 | 1.00000 | |
| 21 | 41.07452 | 4.188 | 1.48749 | 70.3 |
| 22 | −76.88713 | 0.100 | 1.00000 | |
| 23 | 74.66430 | 4.688 | 1.95000 | 29.4 |
| 24 | −29.06368 | 1.000 | 1.79504 | 28.7 |
| 25 | 18.99382 | (D25) | 1.00000 | |
| 26 | 41.64101 | 5.232 | 1.58313 | 59.4 |
| 27 | −21.80056 | 1.000 | 1.79504 | 28.7 |
| 28 | −43.03347 | (D28) | 1.00000 | |
| 29 | −68.65494 | 3.317 | 1.84666 | 23.8 |
| 30 | −21.63496 | 1.000 | 1.76801 | 49.2 |
| *31 | 37.94747 | 3.255 | 1.00000 | |
| 32 | 35.65453 | 9.755 | 1.49782 | 82.6 |
| 33 | −23.00928 | 3.310 | 1.00000 | |
| 34 | −21.30043 | 1.350 | 1.90366 | 31.3 |
| 35 | −68.20008 | (D35) | 1.00000 | |
| 36 | 90.55364 | 4.191 | 1.75500 | 52.3 |
| 37 | −30469.89300 | (D37) | 1.00000 | |
| Img surface | ∞ | | | |

TABLE 5-continued

[Aspherical data]

6th surface

κ = 1.00000e+00
A4 = 3.67375e−06
A6 = −1.67560e−08
A8 = 4.54335e−11
A10 = −1.18164e−13
A12 = 1.47210e−16

14th surface

κ = 1.00000e+00
A4 = −7.51479e−06
A6 = −1.04712e−08
A8 = −4.76282e−11
A10 = 0.00000e+00
A12 = 0.00000e+00

15th surface

κ = 1.00000e+00
A4 = −8.62200e−06
A6 = −1.80573e−09
A8 = −3.76827e−12
A10 = 0.00000e+00
A12 = 0.00000e+00

31st surface

κ = 1.00000e+00
A4 = 2.00569e−07
A6 = −8.00922e−09
A8 = 2.97959e−11
A10 = 0.00000e+00
A12 = 0.00000e+00

[Various data]
Zoom ratio 3.34

| | Wide angle end | Intermediate | Telephoto end |
|---|---|---|---|
| f | 24.70 | 49.50 | 82.45 |
| FNo | 2.88 | 3.77 | 4.18 |
| ω | 41.2 | 23.6 | 14.4 |
| Y | 19.46 | 21.58 | 21.63 |
| TL | 143.097 | 153.446 | 174.658 |
| BF | 18.000 | 18.000 | 18.000 |
| BF(air) | 18.000 | 18.000 | 18.000 |

[Variable distance data]

| | Upon focusing on infinity | | | Upon focusing on short distant object | | |
|---|---|---|---|---|---|---|
| | Wide angle end. | Intermediate. | Telephoto end | Wide angle end | Intermediate | Telephoto end |
| f | 24.70 | 49.50 | 82.45 | — | — | — |
| β | — | — | — | −0.1344 | −0.1767 | −0.2469 |
| D0 | ∞ | ∞ | ∞ | 156.90 | 246.55 | 275.34 |
| D5 | 1.500 | 12.508 | 29.852 | 1.500 | 12.508 | 29.852 |
| D14 | 23.482 | 6.573 | 1.500 | 23.482 | 6.573 | 1.500 |
| D25 | 8.585 | 7.859 | 8.614 | 6.830 | 4.586 | 2.213 |
| D28 | 2.028 | 8.415 | 8.819 | 3.783 | 11.689 | 15.219 |
| D35 | 1.500 | 12.088 | 19.873 | 1.500 | 12.088 | 19.873 |
| D37 | 18.000 | 18.000 | 18.000 | 18.000 | 18.000 | 18.000 |

[Lens group data]

| | Group starting surface | Group focal length |
|---|---|---|
| First lens group | 1 | 96.36 |
| Second lens group | 6 | −19.49 |
| Third lens group | 15 | 39.23 |
| Fourth lens group | 26 | 44.83 |
| Fifth lens group | 29 | −46.93 |
| Sixth lens group | 36 | 119.59 |

TABLE 5-continued

| [Conditional expression corresponding value] |
| --- |
| Conditional expression(JA1) \|fF/fRF\| = 0.955 |
| Conditional expression(JA2) (−fXn)/fXR = 0.497 |
| Conditional expression(JA3) fF/fW = 1.815 |
| Conditional expression(JA4) Wω = 41.170 |
| Conditional expression(JA5) fF/fXR = 1.143 |
| Conditional expression(JA6) DXRFT/fF = 0.192 |
| Conditional expression(JA7) Tω = 14.423 |
| Conditional expression(JA8) DGXR/fXR = 0.548 |
| Conditional expression(JC1) \|fF/fRF\| = 0.955 |
| Conditional expression(JC2) (DMRT − DMRW)/fF = 0.151 |
| Conditional expression(JC3) Wω = 41.170 |
| Conditional expression(JC4) Tω = 14.423 |
| Conditional expression(JC5) fRF/fRF2 = −0.392 |
| Conditional expression(JC6) DGXR/fXR = 0.548 |
| Conditional expression(JE1) DVW/fV = −0.032 |
| Conditional expression(JE2) Wω = 41.170 |
| Conditional expression(JE3) fF/fW = 1.815 |
| Conditional expression(JE4) fV/fRF = 1.000 |
| Conditional expression(JE5) fF/fXR = 1.143 |
| Conditional expression(JE6) DGXR/fXR = 0.548 |
| Conditional expression(JE7) DXnW/ZD1 = 0.744 |
| Conditional expression(JF1) fF/fV = −0.955 |
| Conditional expression(JF2) fV/fRF = 1.000 |
| Conditional expression(JF3) DVW/fV = −0.032 |
| Conditional expression(JF4) Wω = 41.170 |
| Conditional expression(JF5) fF/fXR = 1.143 |
| Conditional expression(JF6) DGXR/fXR = 0.548 |
| Conditional expression(JF7) TLW/ZD1 = 4.534 |
| Conditional expression(JG1) βFt = 0.084 |
| Conditional expression(JG2) (rB + rA)/(rB − rA) = 2.677 |
| Conditional expression(JG3) βFw = 0.344 |
| Conditional expression(JJ1) (rB + rA)/(rB − rA) = 2.677 |
| Conditional expression(JJ2) \|fF/fXR\| = 1.143 |
| Conditional expression(JJ3) βFw = 0.344 |
| Conditional expression(JJ4) νdn = 28.690 |

It can be seen in Table 5 that the zoom optical system ZL5 according to Example 5 satisfies the conditional expressions (JA1) to (JA8), (JC1) to (JC6), (JE1) to (JE7), (JF1) to (JF7), (JG1) to (JG3), and (JJ1) to (JJ4).

Figure 18A:
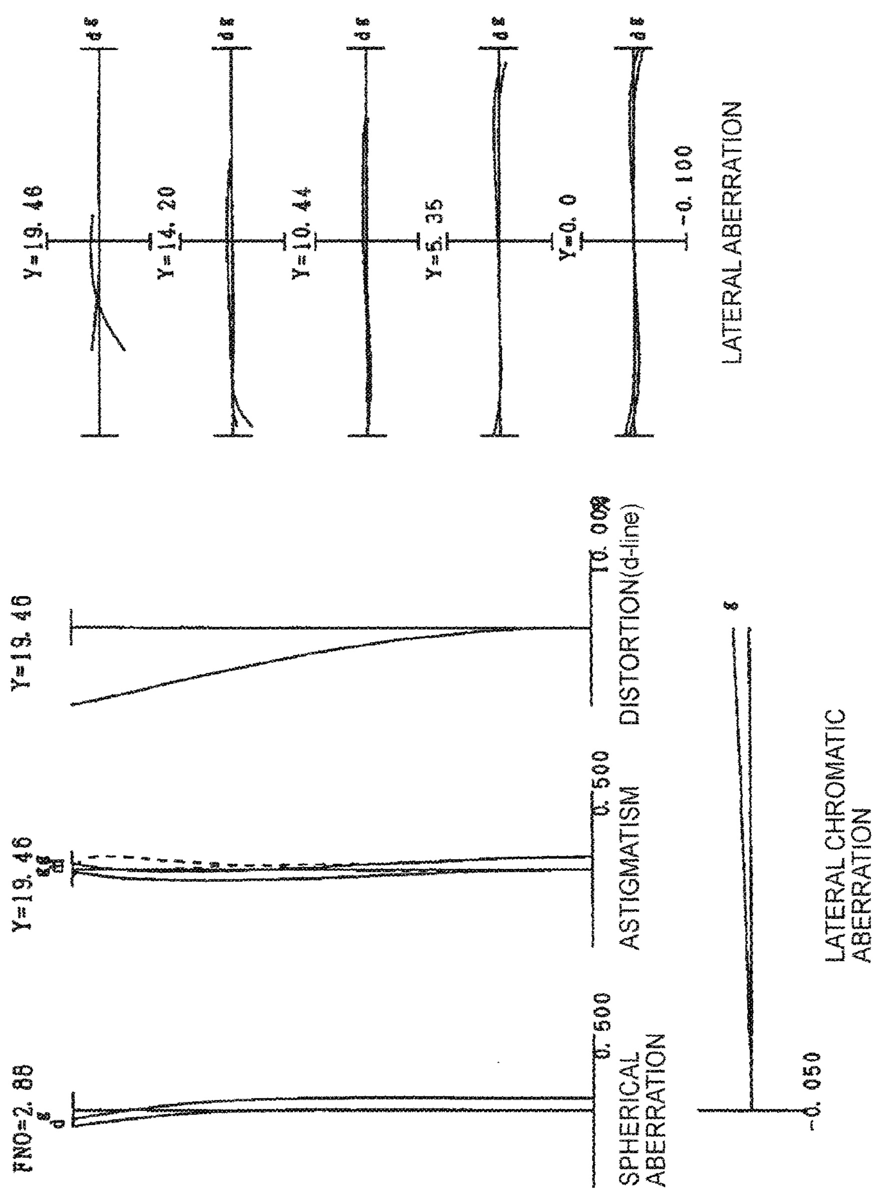
FIGS. 18A, 18B, and 18C are graphs showing various aberrations of the zoom optical system according to Example 5 upon focusing on infinity respectively in the wide angle end state, the intermediate focal length state, and the telephoto end state.
Figure 18B:
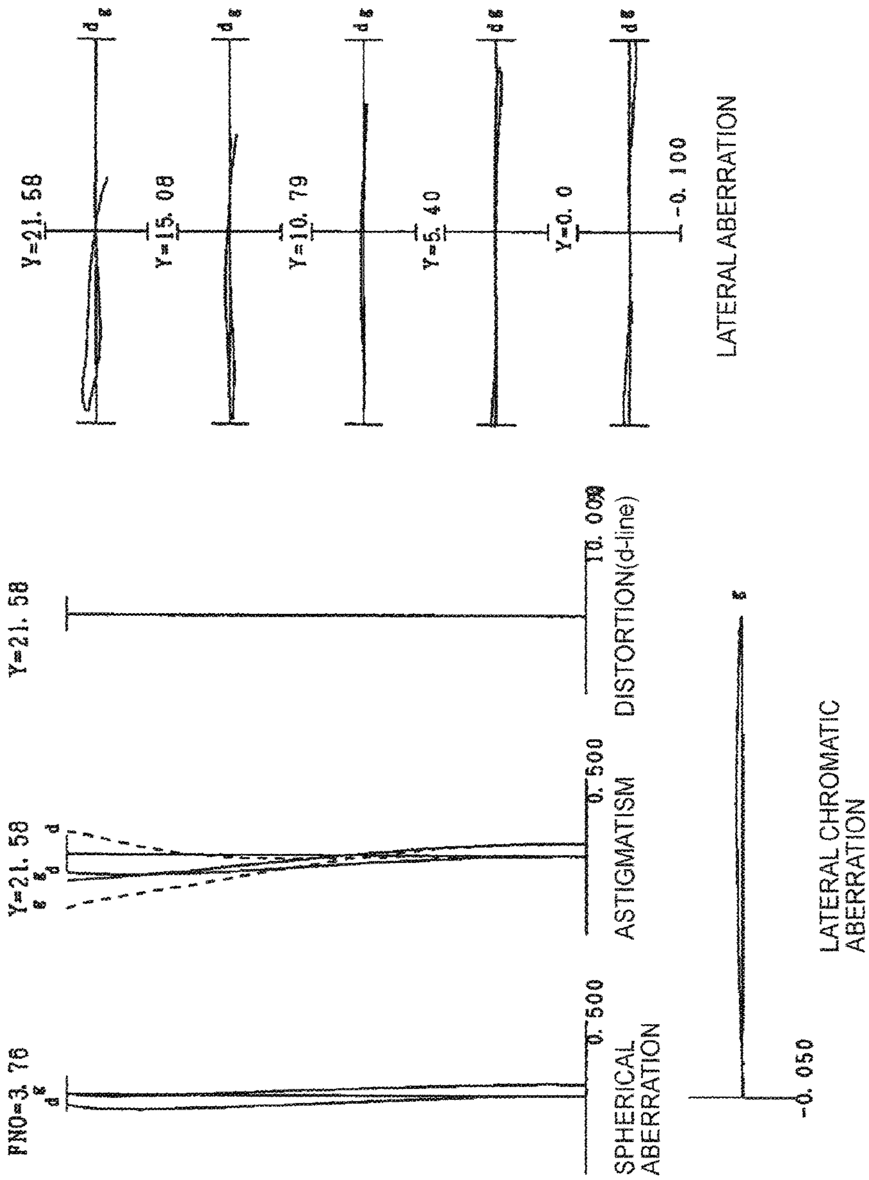
Figure 18C:
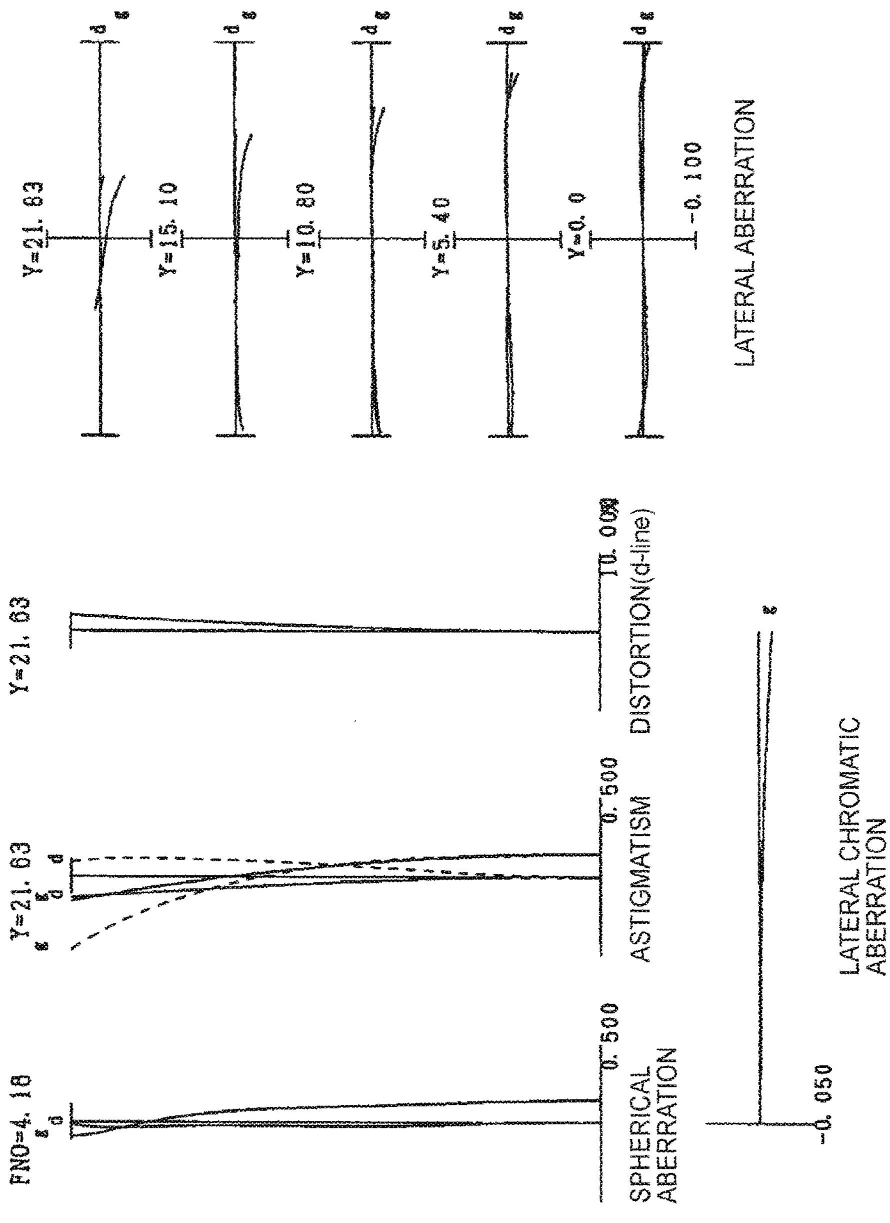
Figure 19A:
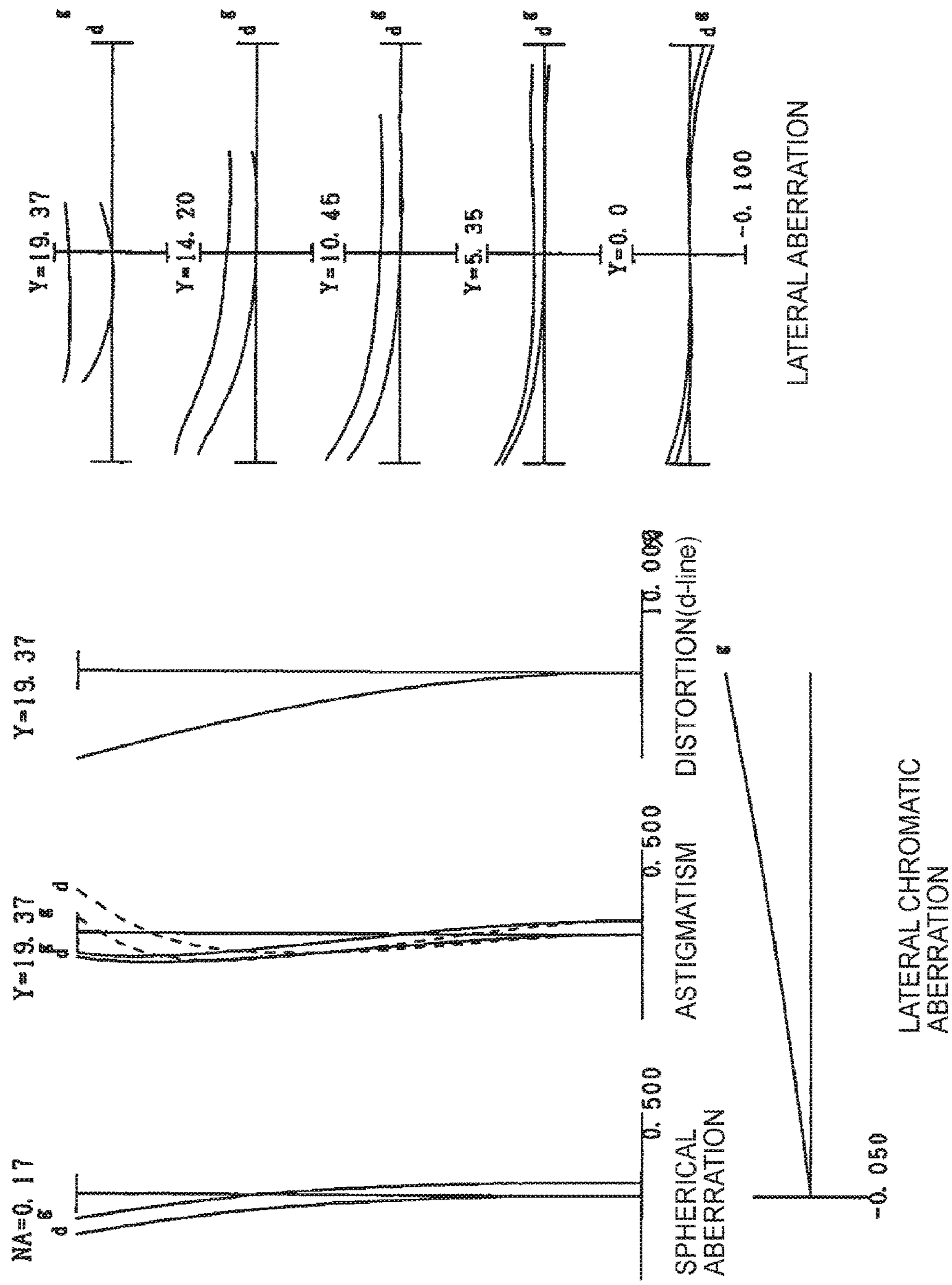
FIGS. 19A, 19B, and 19C are graphs showing various aberrations of the zoom optical system according to Example 5 upon focusing on a short distant object respectively in the wide angle end state, the intermediate focal length state, and the telephoto end state.
Figure 19B:
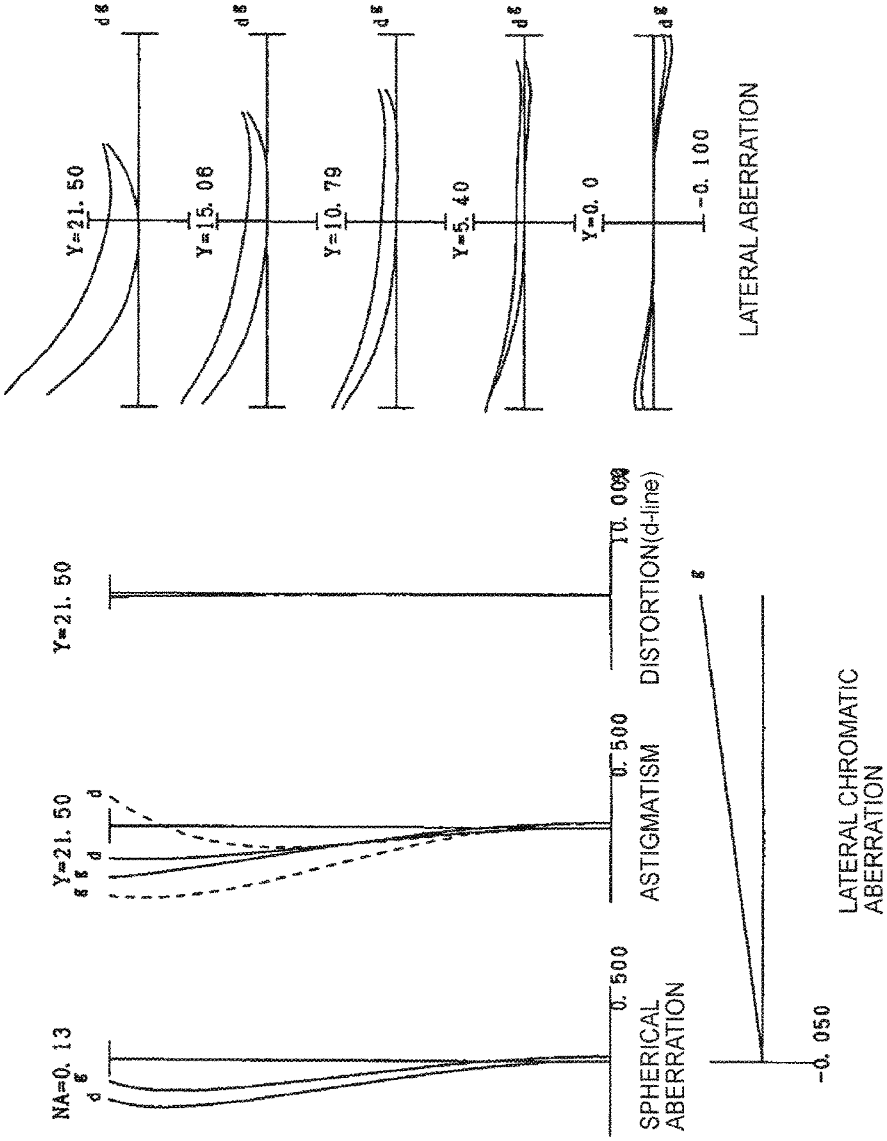
Figure 19C:
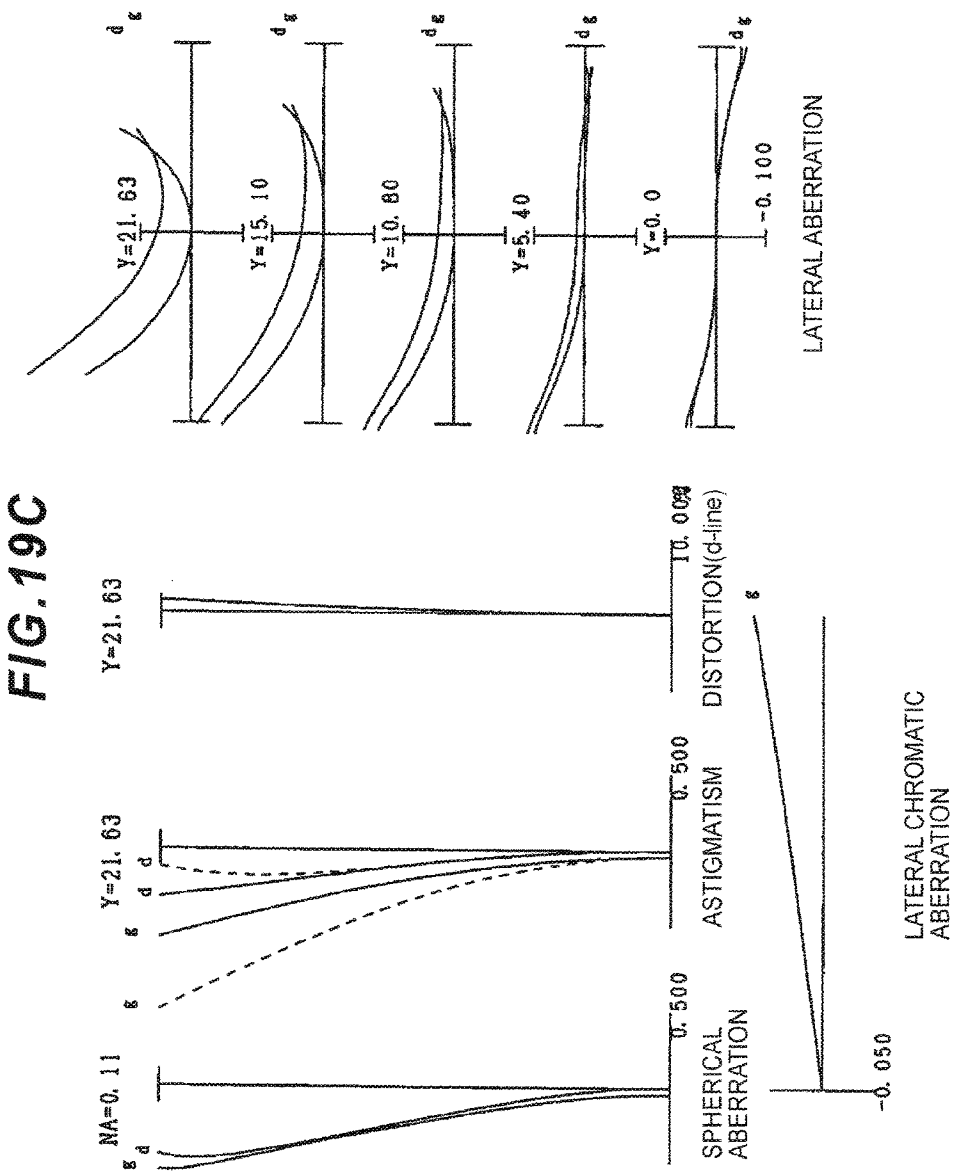
Figure 20A:
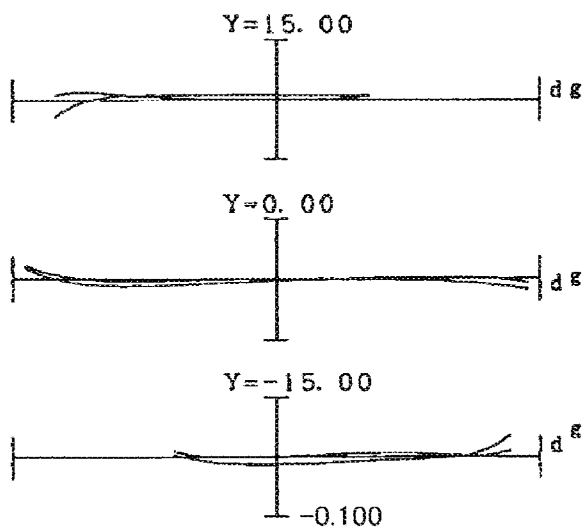
FIGS. 20A, 20B, and 20C are graphs showing lateral aberrations of the zoom optical system according to Example 5 upon focusing on infinity with image blur correction performed, respectively in the wide angle end state, the intermediate focal length state, and the telephoto end state.
Figure 20B:
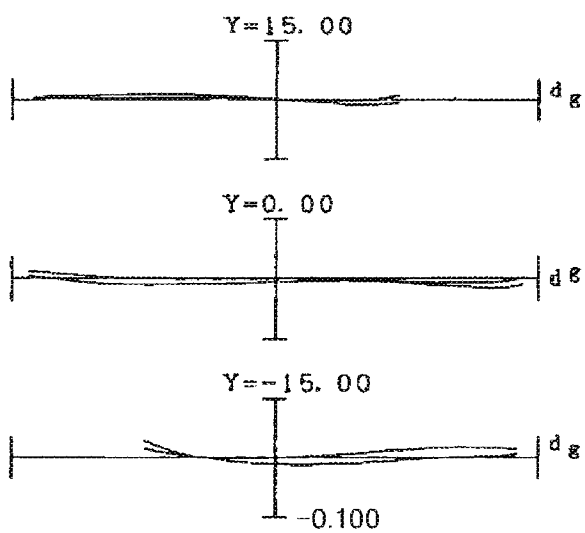
Figure 20C:
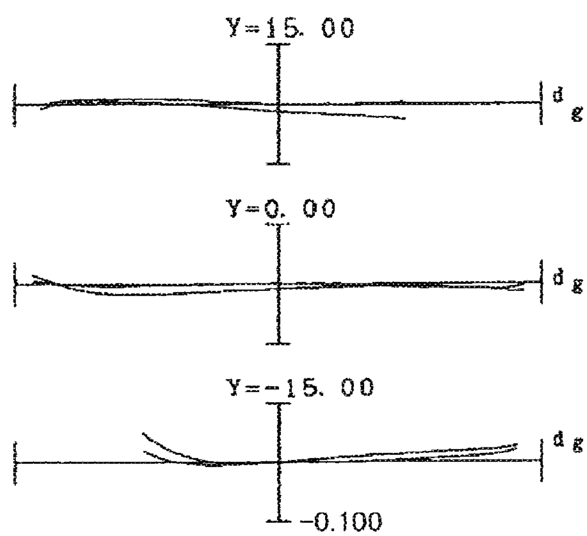

FIG. 18 is various aberration graphs (a spherical aberration graph, an astigmatism graph, a distortion graph, a lateral chromatic aberration graph, and a lateral aberration graph) of the zoom optical system ZL5 according to Example 5 upon focusing on infinity with FIG. 18A corresponding to the wide angle end state, FIG. 18B corresponding to the intermediate focal length state, and FIG. 18C corresponding to the telephoto end state. FIG. 19 is various aberration graphs (a spherical aberration graph, an astigmatism graph, a distortion graph, a lateral chromatic aberration graph, and a lateral aberration graph) of the zoom optical system ZL5 according to Example 5 upon focusing on a short distant object with FIG. 19A corresponding to the wide angle end state, FIG. 19B corresponding to the intermediate focal length state, and FIG. 19C corresponding to the telephoto end state. FIG. 20 is lateral aberration graphs at the time of image blur correction for the zoom optical system ZL5 according to Example 5 upon focusing on infinity with FIG. 20A corresponding to the wide angle end state, FIG. 20B corresponding to the intermediate focal length state, and FIG. 20C corresponding to the telephoto end state.

It can be seen in FIG. 18 to FIG. 20 that the zoom optical system ZL5 according to Example 5 can achieve an excellent optical performance with various aberrations successfully corrected from the wide angle end state to the telephoto end state and from the infinity focusing state to the short-distant object focusing state. Furthermore, it can be seen that a high imaging performance can be achieved upon image blur correction.

Example 6

Figure 21:
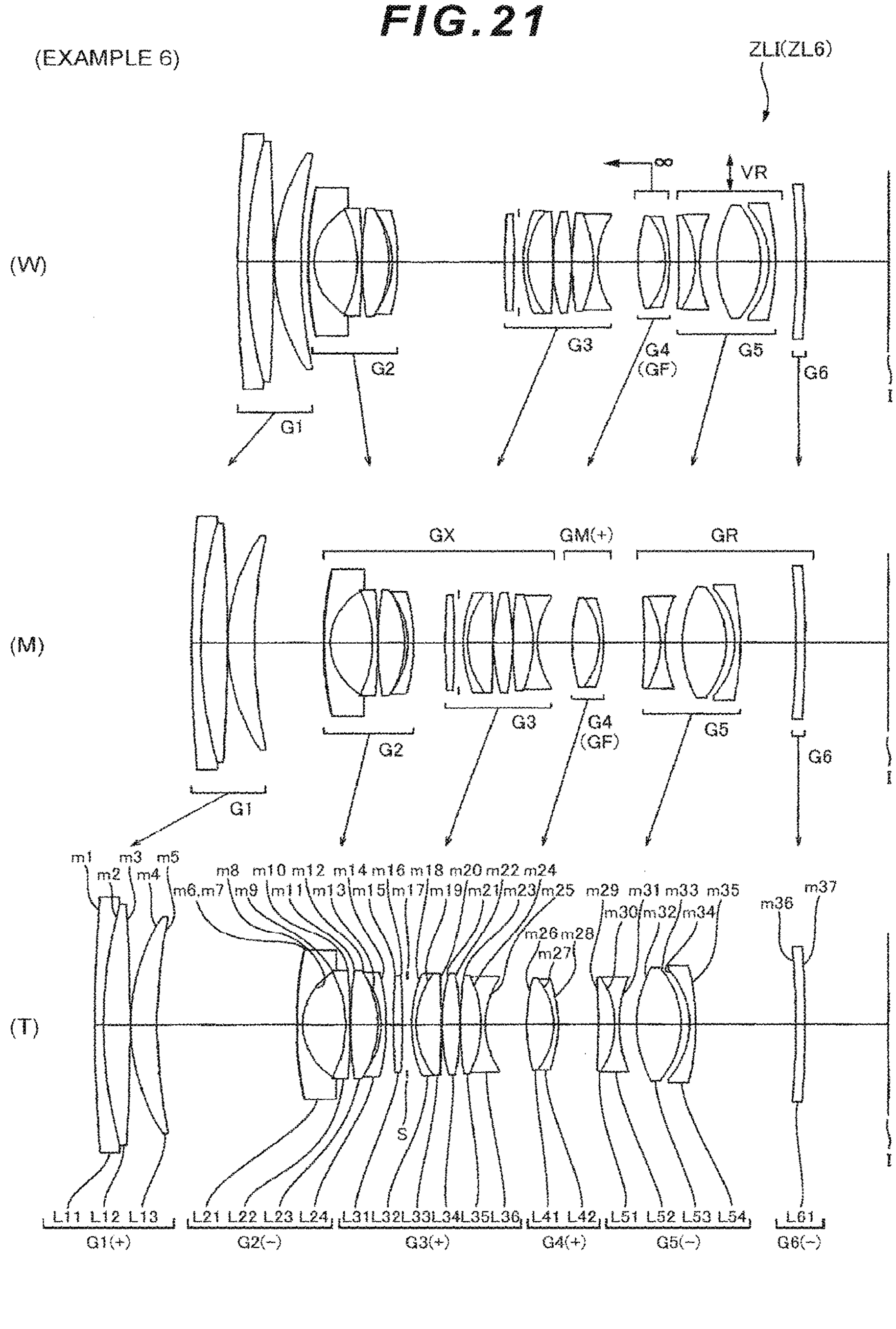
FIG. 21 is a cross-sectional view with sections (W), (M), and (T) showing a zoom optical system according to Example 6 respectively in the wide angle end state, the intermediate focal length state, and the telephoto end state.

Example 6 is described with reference to FIG. 21 to FIG. 24 and Table 6. A zoom optical system ZLI (ZL6) according to Example 6 includes, as illustrated in FIG. 21, the first lens group G1 having positive refractive power, the second lens group G2 having negative refractive power, the third lens group G3 having positive refractive power, the fourth lens group G4 having positive refractive power, the fifth lens group G5 having negative refractive power, and the sixth lens group G6 having negative refractive power that are arranged in order from the object side.

In the present example, the second lens group G2 and the third lens group G3 correspond to the front-side lens group GX. The fourth lens group G4 corresponds to the intermediate lens group GM (focusing lens group GF). The fifth lens group G5 and the sixth lens group G6 correspond to the rear-side lens group GR. The fifth lens group G5 corresponds to the vibration-proof lens group VR.

The first lens group G1 includes: the cemented lens including the negative meniscus lens L11 having a concave surface facing the image surface side and the biconvex lens L12; and the positive meniscus lens L13 having a convex surface facing the object side that are arranged in order from the object side.

The second lens group G2 includes: the negative meniscus lens L21 having a concave surface facing the image surface side; the negative meniscus lens L22 having a concave surface facing the object side; the biconvex lens L23; and the negative meniscus lens L24 having a concave surface facing the object side that are arranged in order from the object side.

The negative meniscus lens L21 is a composite type aspherical lens with a resin layer, formed on a glass surface on the object side, formed to have an aspherical shape. The negative meniscus lens L24 is a glass-molded aspherical lens with a lens surface, on the image surface side, having an aspherical shape.

The third lens group G3 includes: the biconvex lens L31; the aperture stop S; the cemented lens including the negative meniscus lens L32 having a concave surface facing the image surface side and the biconvex lens L33; the biconvex lens L34; and the cemented lens including the biconvex lens L35 and the biconcave lens L36 that are arranged in order from the object side.

The biconvex lens L31 is a glass-molded aspherical lens with a lens surface, on the object side, having an aspherical shape.

The fourth lens group G4 includes the cemented lens including the biconvex lens L41 and the negative meniscus lens L42 having a concave surface facing the object side that are arranged in order from the object side.

The fifth lens group G5 includes: the cemented lens including the positive meniscus lens L51 having a convex surface facing the image surface side and the biconcave lens L52; the biconvex lens L53; and the negative meniscus lens L54 having a concave surface facing the object side that are arranged in order from the object side.

The biconcave lens L52 is a glass-molded aspherical lens with a lens surface, on the image surface side, having an aspherical shape.

The sixth lens group G6 includes a negative meniscus lens L61 having a concave surface facing the object side.

Upon zooming from the wide angle end state to the telephoto end state, the distance between the lens groups changes with the first lens group G1 moved toward the object side, the second lens group G2 moved toward the image surface side and then moved toward the object side, the third lens group G3 to the fifth lens group G5 each moved toward the object side, and the sixth lens group G6 fixed.

Upon focusing from infinity to the short-distant object, the fourth lens group G4 moves toward the object side.

When image blur occurs, image blur correction (vibration isolation) on the image surface I is performed with the fifth lens group G5 serving as the vibration-proof lens group VR moved with a displacement component in the direction orthogonal to the optical axis.

In Example 6, in the wide angle end state, the vibration proof coefficient is −0.48 and the focal length is 24.70 (mm), and thus the movement amount of the vibration-proof lens group VR for correcting the roll blur of 0.66° is −0.59 (mm). In the intermediate focal length state, the vibration proof coefficient is −0.59 and the focal length is 49.50 (mm), and thus the movement amount of the vibration-proof lens group VR for correcting the roll blur of 0.47° is −0.68 (mm). In the telephoto end state, the vibration proof coefficient is −0.74 and the focal length is 82.46 (mm), and thus the movement amount of the vibration-proof lens group VR for correcting the roll blur of 0.36° is −0.71 (mm).

In Table 6 below, specification values in Example 6 are listed. Surface numbers 1 to 37 in Table 6 respectively correspond to the optical surfaces m1 to m37 in FIG. 21.

TABLE 6

[Lens specifications]

| Surface number | R | D | nd | νd |
|---|---|---|---|---|
| Obj surface | ∞ | | | |
| 1 | 392.75985 | 2.000 | 1.92286 | 20.9 |
| 2 | 119.59613 | 5.794 | 1.59319 | 67.9 |
| 3 | −500.00000 | 0.100 | 1.00000 | |
| 4 | 51.57912 | 5.854 | 1.75500 | 52.3 |
| 5 | 137.74730 | (D5) | 1.00000 | |
| *6 | 161.69102 | 0.100 | 1.56093 | 36.6 |
| 7 | 96.90163 | 1.250 | 1.83481 | 42.7 |
| 8 | 15.23869 | 9.338 | 1.00000 | |
| 9 | −29.78956 | 1.000 | 1.80400 | 46.6 |
| 10 | −188.44242 | 0.100 | 1.00000 | |
| 11 | 95.54244 | 5.972 | 1.80809 | 22.7 |
| 12 | −25.31883 | 0.699 | 1.00000 | |
| 13 | −21.69584 | 1.200 | 1.88202 | 37.2 |
| *14 | −54.45730 | (D14) | 1.00000 | |
| *15 | 115.10942 | 2.078 | 1.72903 | 54.0 |
| 16 | −187.67701 | 1.000 | 1.00000 | |
| 17 | (stop S) | 1.000 | 1.00000 | |
| 18 | 34.13749 | 1.000 | 1.71999 | 50.3 |
| 19 | 21.51053 | 5.519 | 1.49782 | 82.6 |
| 20 | −269.16753 | 0.100 | 1.00000 | |
| 21 | 46.87275 | 4.114 | 1.48749 | 70.3 |
| 22 | −68.86740 | 0.100 | 1.00000 | |
| 23 | 101.74251 | 4.500 | 1.95000 | 29.4 |
| 24 | −30.45826 | 1.000 | 1.79504 | 28.7 |
| 25 | 21.82068 | (D25) | 1.00000 | |
| 26 | 42.76309 | 5.976 | 1.58313 | 59.4 |
| 27 | −18.88564 | 1.000 | 1.79504 | 28.7 |
| 28 | −35.66684 | (D28) | 1.00000 | |
| 29 | −173.43687 | 3.567 | 1.84666 | 23.8 |
| 30 | −23.10720 | 1.000 | 1.76801 | 49.2 |
| *31 | 32.70838 | 3.851 | 1.00000 | |
| 32 | 31.14900 | 9.731 | 1.49782 | 82.6 |
| 33 | −21.98428 | 1.876 | 1.00000 | |
| 34 | −20.68510 | 1.350 | 1.90366 | 31.3 |

TABLE 6-continued

| | | | | |
|---|---|---|---|---|
| 35 | −63.60008 | (D35) | 1.00000 | |
| 36 | −198.28686 | 2.001 | 1.75500 | 52.3 |
| 37 | −270.03296 | (D37) | 1.00000 | |
| Img surface | ∞ | | | |

[Aspherical data]

6th surface

κ = 1.00000e+00
A4 = 1.15342e−05
A6 = −2.68541e−08
A8 = 6.60621e−11
A10 = −1.47648e−13
A12 = 2.00960e−16

14th surface

κ = 1.00000e+00
A4 = −3.91709e−06
A6 = −7.48599e−09
A8 = −2.82710e−11
A10 = 0.00000e+00
A12 = 0.00000e+00

15th surface

κ = 1.00000e+00
A4 = −9.35866e−06
A6 = −2.05242e−09
A8 = −7.75454e−12
A10 = 0.00000e+00
A12 = 0.00000e+00

31st surface

κ = 1.00000e+00
A4 = 1.33757e−06
A6 = −1.37803e−08
A8 = 7.72183e−11
A10 = 0.00000e+00
A12 = 0.00000e+00

[Various data]
Zoom ratio 3.34

| | Wide angle end | Intermediate | Telephoto end |
|---|---|---|---|
| f | 24.70 | 49.50 | 82.46 |
| FNo | 2.88 | 3.58 | 4.12 |
| ω | 41.2 | 23.5 | 14.4 |
| Y | 19.60 | 21.63 | 21.63 |
| TL | 143.097 | 153.272 | 174.682 |
| BF | 18.314 | 18.314 | 18.314 |
| BF(air) | 18.314 | 18.314 | 18.314 |

[Variable distance data]

| | Upon focusing on infinity | | | Upon focusing on short distant object | | |
|---|---|---|---|---|---|---|
| | Wide angle end | Intermediate | Telephoto end | Wide angle end | Intermediate | Telephoto end |
| f | 24.70 | 49.50 | 82.46 | — | — | — |
| β | — | — | — | −0.1348 | −0.1751 | −0.2532 |
| D0 | ∞ | ∞ | ∞ | 156.90 | 246.73 | 275.32 |
| D5 | 1.500 | 15.191 | 30.588 | 1.500 | 15.191 | 30.588 |
| D14 | 23.482 | 6.907 | 1.500 | 23.482 | 6.907 | 1.500 |
| D25 | 8.944 | 7.575 | 8.944 | 7.398 | 4.258 | 2.057 |
| D28 | 2.000 | 8.848 | 8.851 | 3.546 | 12.165 | 15.738 |
| D35 | 4.687 | 12.268 | 22.315 | 4.687 | 12.268 | 22.315 |
| D37 | 18.314 | 18.314 | 18.314 | 18.314 | 18.314 | 18.314 |

[Lens group data]

| | Group starting surface | Group focal length |
|---|---|---|
| First lens group | 1 | 97.91 |
| Second lens group | 6 | −18.30 |

TABLE 6-continued

| | | |
|---|---|---|
| Third lens group | 15 | 41.55 |
| Fourth lens group | 26 | 41.49 |
| Fifth lens group | 29 | −71.27 |
| Sixth lens group | 36 | −1000.48 |

[Conditional expression corresponding value]

Conditional expression(JA1) $|fF/fRF| = 0.582$
Conditional expression(JA2) $(-fXn)/fXR = 0.440$
Conditional expression(JA3) $fF/fW = 1.680$
Conditional expression(JA4) $W\omega = 41.166$
Conditional expression(JA5) $fF/fXR = 0.999$
Conditional expression(JA6) $DXRFT/fF = 0.216$
Conditional expression(JA7) $T\omega = 14.422$
Conditional expression(JA8) $DGXR/fXR = 0.491$
Conditional expression(JC1) $|fF/fRF| = 0.582$
Conditional expression(JC2) $(DMRT - DMRW)/fF = 0.165$
Conditional expression(JC3) $W\omega = 41.166$
Conditional expression(JC4) $T\omega = 14.422$
Conditional expression(JC5) $fRF/fRF2 = 0.071$
Conditional expression(JC6) $DGXR/fXR = 0.491$
Conditional expression(JD1) $fV/fRF = 0.558$
Conditional expression(JD2) $DVW/fV = -0.097$
Conditional expression(JD3) $W\omega = 41.166$
Conditional expression(JD4) $fF/fXR = 0.999$
Conditional expression(JD5) $(-fXn)/fXR = 0.440$
Conditional expression(JD6) $DGXR/fXR = 0.491$
Conditional expression(JE1) $DVW/fV = -0.097$
Conditional expression(JE2) $W\omega = 41.166$
Conditional expression(JE3) $fF/fW = 1.680$
Conditional expression(JE4) $fV/fRF = 0.558$
Conditional expression(JE5) $fF/fXR = 0.999$
Conditional expression(JE6) $DGXR/fXR = 0.491$
Conditional expression(JE7) $DXnW/ZD1 = 0.743$
Conditional expression(JF1) $fF/fV = -1.044$
Conditional expression(JF2) $fV/fRF = 0.558$
Conditional expression(JF3) $DVW/fV = -0.097$
Conditional expression(JF4) $W\omega = 41.166$
Conditional expression(JF5) $fF/fXR = 0.999$
Conditional expression(JF6) $DGXR/fXR = 0.491$
Conditional expression(JF7) $TLW/ZD1 = 4.531$
Conditional expression(JG1) $\beta Ft = -0.086$
Conditional expression(JG2) $(rB + rA)/(rB - rA) = 3.084$
Conditional expression(JG3) $\beta Fw = 0.247$
Conditional expression(JJ1) $(rB + rA)/(rB - rA) = 3.084$
Conditional expression(JJ2) $|fF/fXR| = 0.999$
Conditional expression(JJ3) $\beta Fw = 0.247$
Conditional expression(JJ4) $\nu dn = 28.690$ It can be seen in Table 6 that the zoom optical system ZL6 according to Example 6 satisfies the conditional expressions (JA1) to (JA8), (JC1) to (JC6), (JD1) to (JD6), (JE1) to (JE7), (JF1) to (JF7), (JG1) to (JG3), and (JJ1) to (JJ4).

Figure 22A:
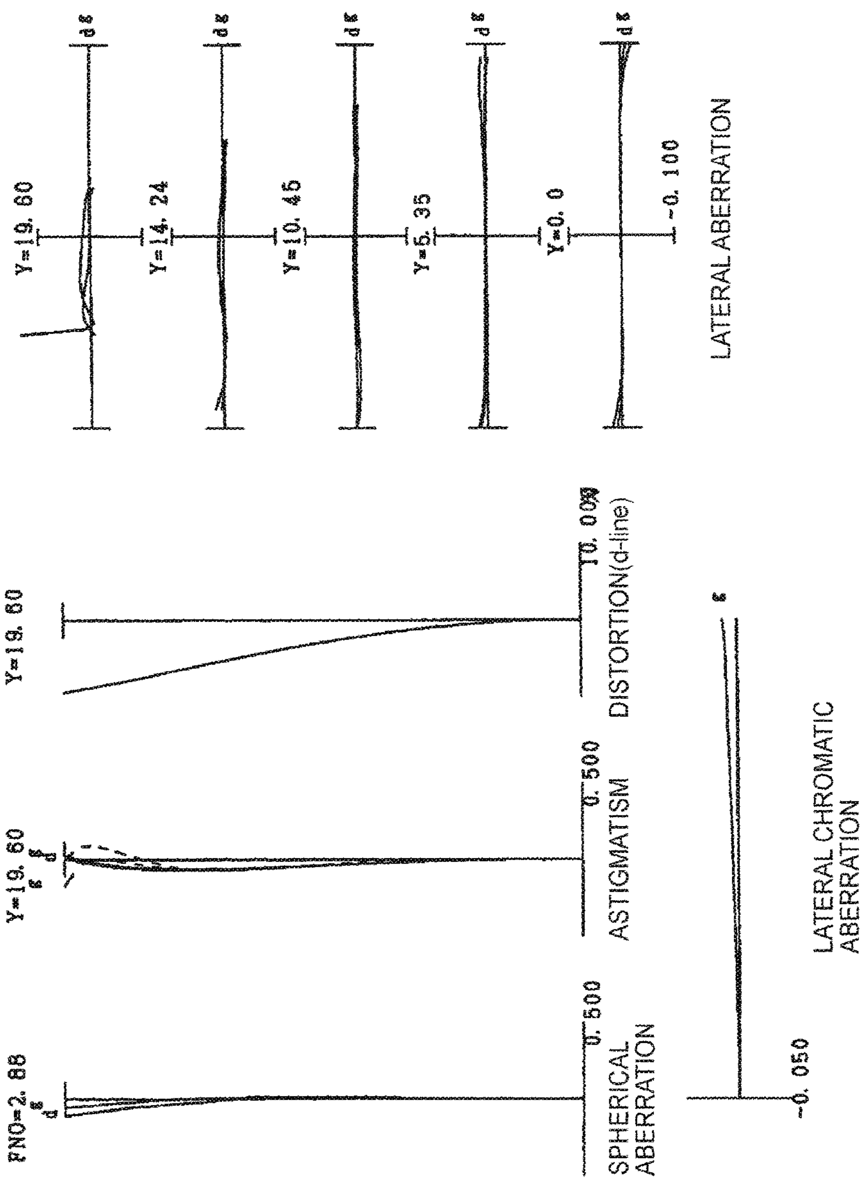
FIGS. 22A, 22B, and 22C are graphs showing various aberrations of the zoom optical system according to Example 6 upon focusing on infinity respectively in the wide angle end state, the intermediate focal length state, and the telephoto end state.
Figure 22B:
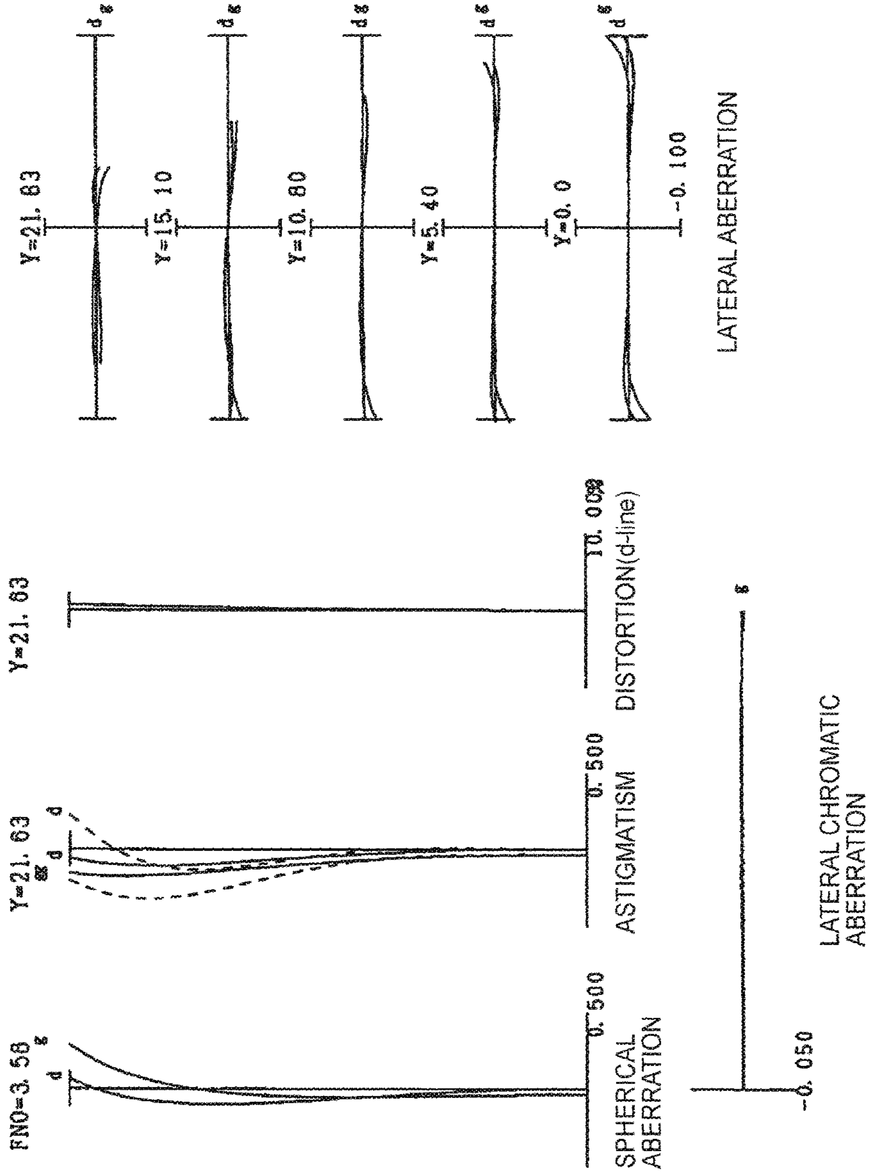
Figure 22C:
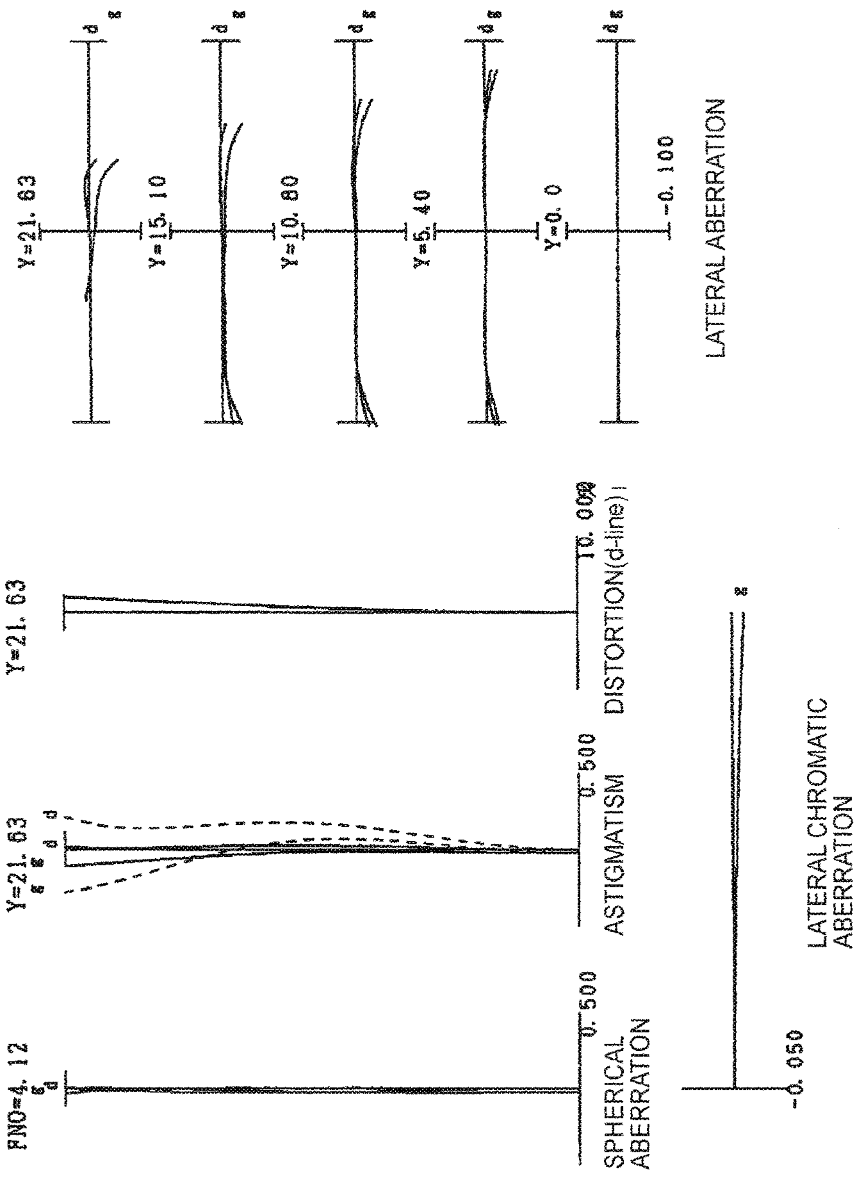
Figure 23A:
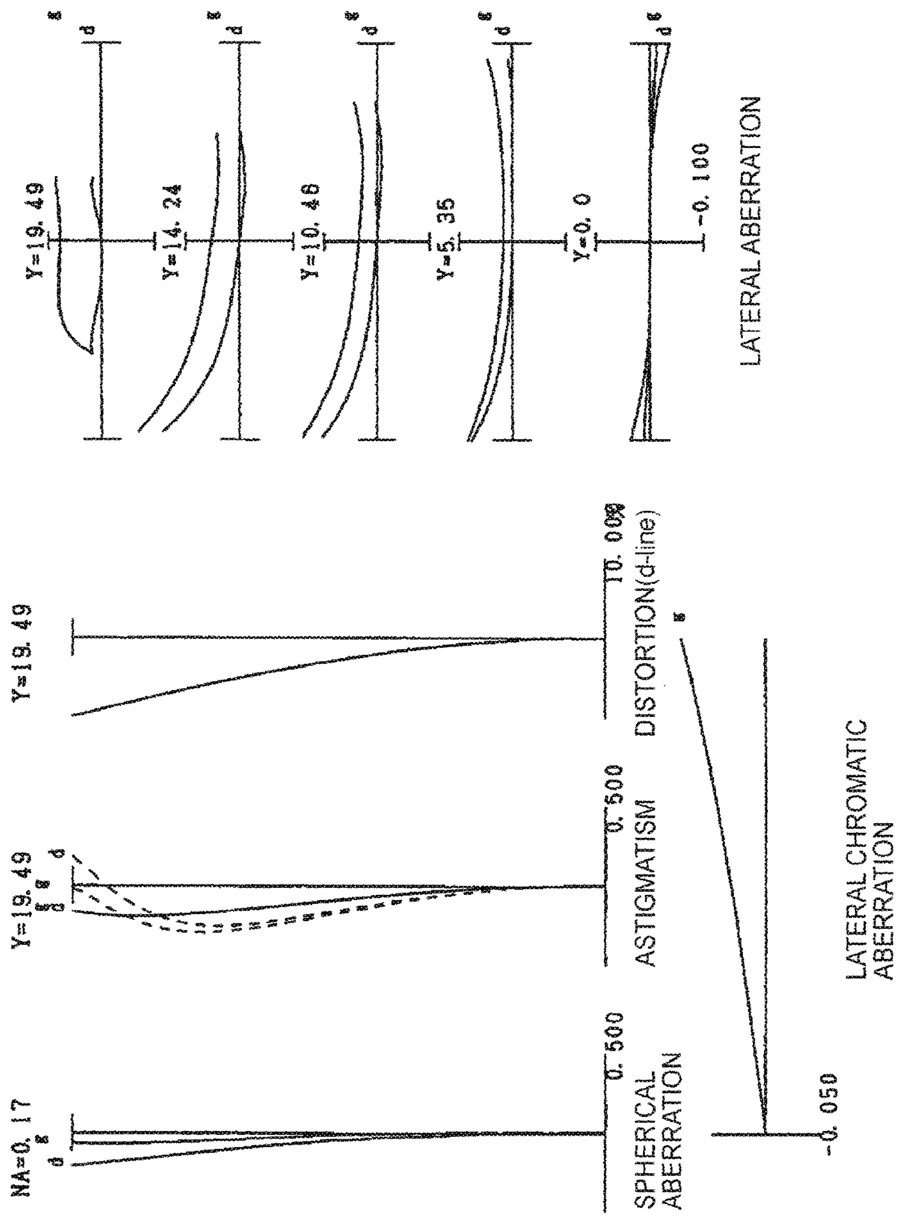
FIGS. 23A, 23B, and 23C are graphs showing various aberrations of the zoom optical system according to Example 6 upon focusing on a short distant object respectively in the wide angle end state, the intermediate focal length state, and the telephoto end state.
Figure 23B:
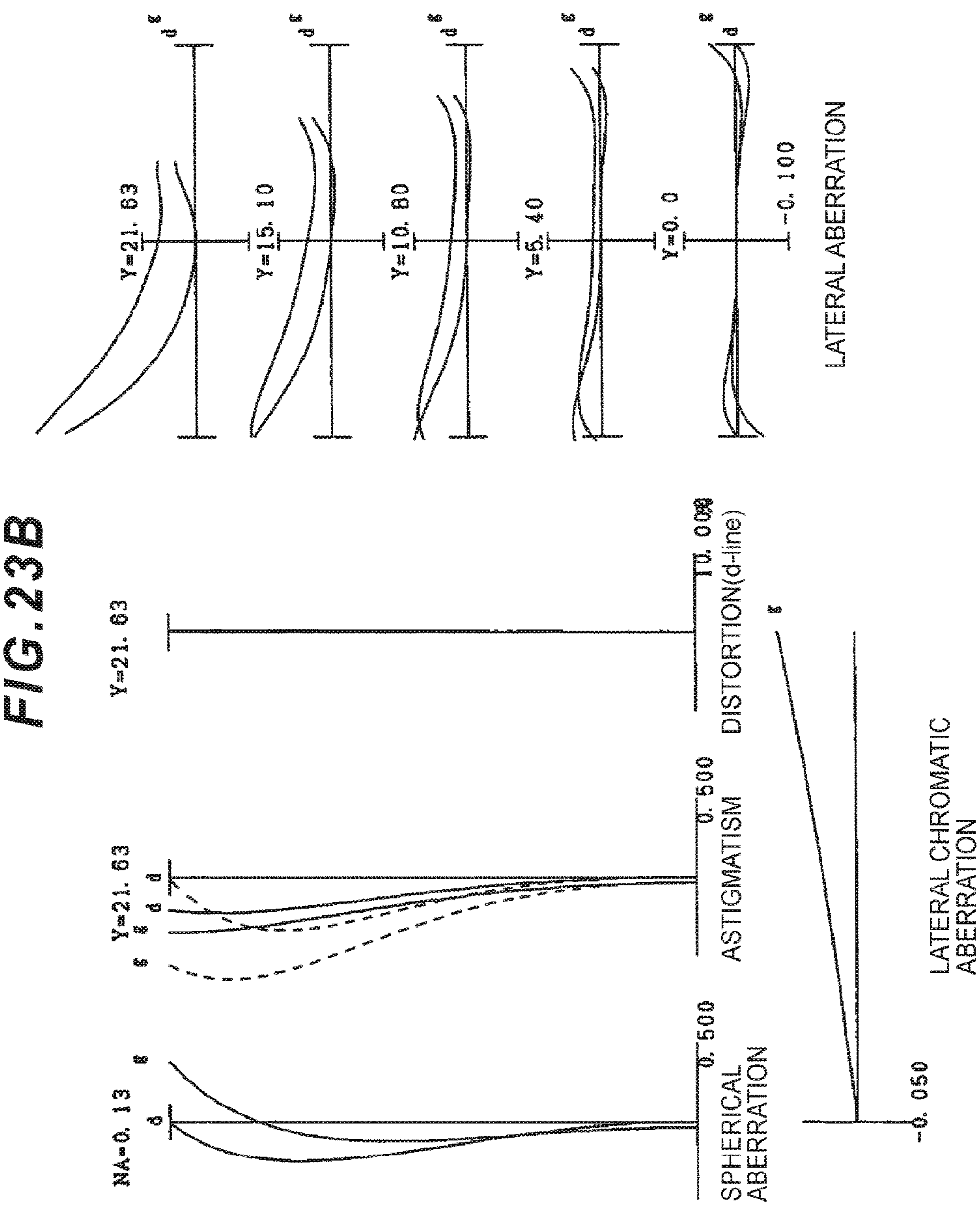
Figure 23C:
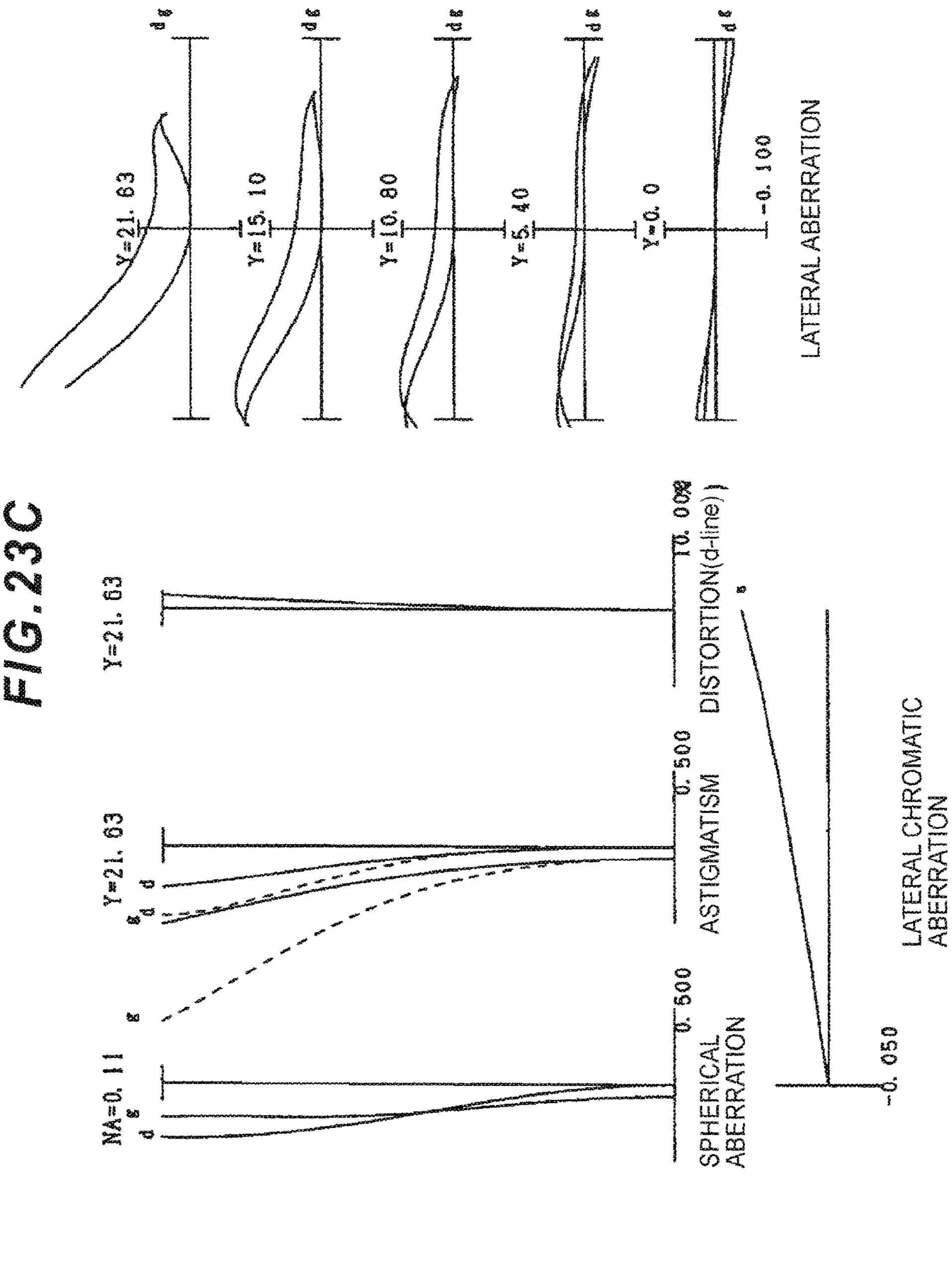
Figure 24A:
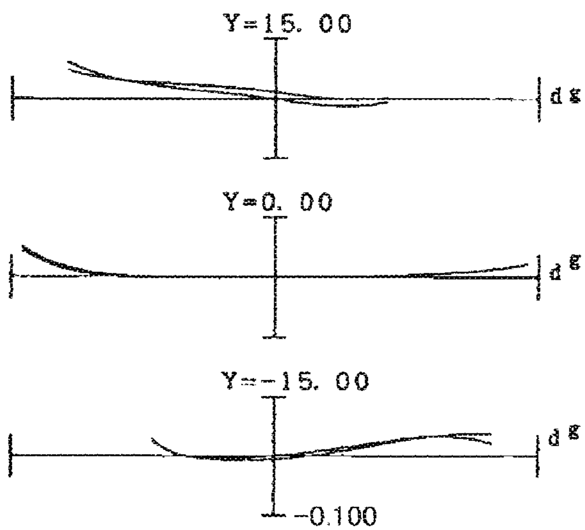
FIGS. 24A, 24B, and 24C are graphs showing lateral aberrations of the zoom optical system according to Example 6 upon focusing on infinity with image blur correction performed, respectively in the wide angle end state, the intermediate focal length state, and the telephoto end state.
Figure 24B:
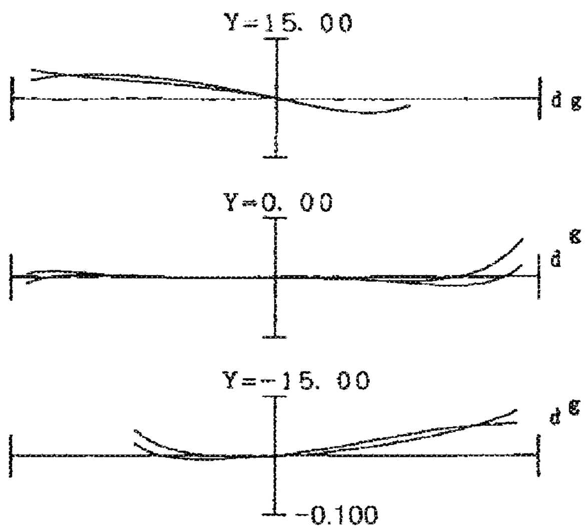
Figure 24C:
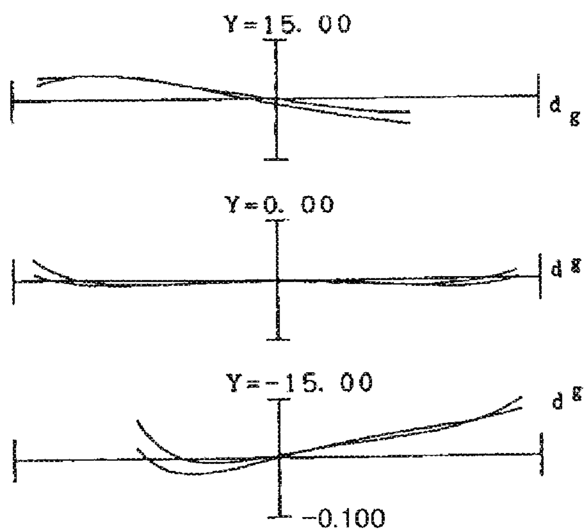

FIG. 22 is various aberration graphs (a spherical aberration graph, an astigmatism graph, a distortion graph, a lateral chromatic aberration graph, and a lateral aberration graph) of the zoom optical system ZL6 according to Example 6 upon focusing on infinity with FIG. 22A corresponding to the wide angle end state, FIG. 22B corresponding to the intermediate focal length state, and FIG. 22C corresponding to the telephoto end state. FIG. 23 is various aberration graphs (a spherical aberration graph, an astigmatism graph, a distortion graph, a lateral chromatic aberration graph, and a lateral aberration graph) of the zoom optical system ZL6 according to Example 6 upon focusing on a short distant object with FIG. 23A corresponding to the wide angle end state, FIG. 23B corresponding to the intermediate focal length state, and FIG. 23C corresponding to the telephoto end state. FIG. 24 is lateral aberration graphs at the time of image blur correction for the zoom optical system ZL6 according to Example 6 upon focusing on infinity with FIG. 24A corresponding to the wide angle end state, FIG. 24B corresponding to the intermediate focal length state, and FIG. 24C corresponding to the telephoto end state.

It can be seen in FIG. 22 to FIG. 24 that the zoom optical system ZL6 according to Example 6 can achieve an excellent optical performance with various aberrations successfully corrected from the wide angle end state to the telephoto end state and from the infinity focusing state to the short-distant object focusing state. Furthermore, it can be seen that a high imaging performance can be achieved upon image blur correction.

Example 7

Example 7 is described with reference to FIG. 25 to FIG. 28 and Table 7. A zoom optical system ZLI (ZL7) according to Example 7 includes, as illustrated in FIG. 25, the first lens group G1 having positive refractive power, the second lens group G2 having negative refractive power, the third lens group G3 having positive refractive power, the fourth lens group G4 having positive refractive power, and the fifth lens group G5 having negative refractive power that are arranged in order from the object side.

In the present example, the second lens group G2 and the third lens group G3 correspond to the front-side lens group GX. The fourth lens group G4 corresponds to the intermediate lens group GM (focusing lens group GF). The fifth lens group G5 corresponds to the rear-side lens group GR. The lens L51 forming the fifth lens group G5 corresponds to the vibration-proof lens group VR.

The first lens group G1 includes the cemented lens including the negative meniscus lens L11 having a concave surface facing the image surface side and the positive meniscus lens L12 having a convex surface facing the object side that are arranged in order from the object side.

The second lens group G2 includes the negative meniscus lens L21 having a concave surface facing the image surface side, the biconcave lens L22, and the positive meniscus lens L23 having a convex surface facing the object side that are arranged in order from the object side.

The biconcave lens L22 is a glass-molded aspherical lens with lens surfaces, on the object side and on the image surface side, having an aspherical shape.

The third lens group G3 includes the biconvex lens L31; the aperture stop S; the cemented lens including the positive meniscus lens L32 having a convex surface facing the object side and the negative meniscus lens L33 having a concave surface facing the image surface side; and the cemented lens including the negative meniscus lens L34 having a concave surface facing the image surface side and the biconvex lens L35 that are arranged in order from the object side.

The biconvex lens L31 is a glass-molded aspherical lens with a lens surface, on the object side, having an aspherical shape. The negative meniscus lens L34 is a glass-molded aspherical lens with a lens surface, on the object side, having an aspherical shape.

The fourth lens group G4 includes the positive meniscus lens L41 having a convex surface facing the object side.

The fifth lens group G5 includes the biconcave lens L51 and the plano-convex lens L52 having a convex surface facing the object side that are arranged in order from the object side.

The biconcave lens L51 is a glass-molded aspherical lens with a lens surface, on the image surface side, having an aspherical shape.

Upon zooming from the wide angle end state to the telephoto end state, the distance between the lens groups changes with the first lens group G1 moved toward the object side, the second lens group G2 moved toward the image surface side and then moved toward the object side, and the third lens group G3 to the fifth lens group G5 each moved toward the object side.

Upon focusing from infinity to the short-distant object, the fourth lens group G4 moves toward the object side.

When image blur occurs, image blur correction (vibration isolation) on the image surface I is performed with the lens L51 forming the fifth lens group G5 serving as the vibration-proof lens group VR moved with a displacement component in the direction orthogonal to the optical axis.

More specifically, for correcting roll blur of an angle θ, the vibration-proof lens group VR for image blur correction may be moved in a direction orthogonal to the optical axis by (f·tan θ)/K, where f represents the focal length of the entire system and K represents a vibration proof coefficient (a rate of an image movement amount of the imaging surface to the movement amount of the vibration-proof lens group VR in the image blur correction) (the same applies to Examples described hereafter).

In the wide angle end state, the vibration proof coefficient is −0.62 and the focal length is 16.48 (mm), and thus the movement amount of the vibration-proof lens group VR for correcting the roll blur of 0.66° is −0.31 (mm). In the intermediate focal length state, the vibration proof coefficient is −0.99 and the focal length is 34.25 (mm), and thus the movement amount of the vibration-proof lens group VR for correcting the roll blur of 0.46° is −0.28 (mm). In the telephoto end state, the vibration proof coefficient is −1.46 and the focal length is 58.20 (mm), and thus the movement amount of the vibration-proof lens group VR for correcting the roll blur of 0.35° is −0.24 (mm).

In Table 7 below, specification values in Example 7 are listed. Surface numbers 1 to 24 in Table 7 respectively correspond to the optical surfaces m1 to m24 in FIG. 25.

TABLE 7

[Lens specifications]

| Surface number | R | D | nd | νd |
|---|---|---|---|---|
| Obj surface | ∞ | | | |
| 1 | 43.79676 | 1.500 | 1.94594 | 18.0 |
| 2 | 35.71919 | 8.259 | 1.72916 | 54.6 |
| 3 | 168.44179 | (D3) | 1.00000 | |
| 4 | 76.58634 | 1.000 | 1.83481 | 42.7 |
| 5 | 11.93768 | 8.172 | 1.00000 | |
| *6 | −54.31728 | 1.000 | 1.72903 | 54.0 |
| *7 | 44.95600 | 2.010 | 1.00000 | |
| 8 | 38.50340 | 1.960 | 1.94594 | 18.0 |
| 9 | 296.58796 | (D9) | 1.00000 | |
| *10 | 49.99513 | 2.935 | 1.72903 | 54.0 |
| 11 | −182.58975 | 1.800 | 1.00000 | |
| 12 | (stop S) | 1.500 | 1.00000 | |
| 13 | 16.31284 | 5.400 | 1.49782 | 82.6 |
| 14 | 1195.94540 | 1.000 | 1.79504 | 28.7 |
| 15 | 24.50722 | 1.600 | 1.00000 | |
| *16 | 125.06202 | 1.163 | 1.61881 | 63.9 |
| 17 | 16.61859 | 5.607 | 1.49782 | 82.6 |
| 18 | −16.44266 | (D18) | 1.00000 | |
| 19 | 26.26030 | 1.950 | 1.49782 | 82.6 |
| 20 | 77.07450 | (D20) | 1.00000 | |
| 21 | −278.32369 | 1.000 | 1.72903 | 54.0 |
| *22 | 23.32173 | 2.400 | 1.00000 | |
| 23 | 28.41583 | 5.000 | 1.49782 | 82.6 |
| 24 | 0.00000 | (D24) | 1.00000 | |
| Img | ∞ | | | |

TABLE 7-continued

| surface | | | | | |
|---|---|---|---|---|---|

[Aspherical data]

| Surface | κ | A4 | A6 | A8 | A10 |
|---|---|---|---|---|---|
| 6 | 1.00000e+00 | −4.02893e−05 | 1.52864e−07 | 2.23393e−11 | −1.05980e−11 |
| 7 | 1.00000e+00 | −5.21860e−05 | 2.50219e−07 | −1.77796e−09 | 0.00000e+00 |
| 10 | 1.00000e+00 | −8.87905e−06 | −4.22167e−08 | 4.77859e−11 | 1.70976e−13 |
| 16 | 1.00000e+00 | −4.52195e−05 | −6.85752e−08 | 7.76036e−10 | −8.98336e−12 |
| 22 | 1.00000e+00 | −3.30586e−06 | 5.77655e−09 | −7.26907e−10 | 1.01636e−11 |

[Various data]
Zoom ratio 3.53

| | Wide angle end | Intermediate | Telephoto end |
|---|---|---|---|
| f | 16.48 | 34.25 | 58.20 |
| FNo | 2.85 | 3.89 | 3.99 |
| ω | 40.8 | 22.6 | 13.6 |
| Y | 12.66 | 14.19 | 14.25 |
| TL | 97.178 | 108.425 | 130.072 |
| BF | 13.112 | 24.600 | 39.181 |
| BF(air) | 13.112 | 24.600 | 39.181 |

[Variable distance data]

| | Upon focusing on infinity | | | Upon focusing on short distant object | | |
|---|---|---|---|---|---|---|
| | Wide angle end | Intermediate | Telephoto end | Wide angle end | Intermediate | Telephoto end |
| f | 16.48 | 34.25 | 58.20 | — | — | — |
| β | — | — | — | −0.1314 | −0.1025 | −0.2407 |
| D0 | ∞ | ∞ | ∞ | 102.82 | 291.57 | 169.93 |
| D3 | 0.800 | 13.732 | 25.000 | 0.800 | 13.732 | 25.000 |
| D9 | 17.218 | 4.344 | 0.800 | 17.218 | 4.344 | 0.800 |
| D18 | 3.824 | 3.000 | 8.436 | 1.470 | 0.510 | 1.217 |
| D20 | 6.968 | 7.494 | 1.400 | 9.322 | 9.984 | 8.618 |
| D24 | 13.112 | 24.600 | 39.181 | 13.112 | 24.600 | 39.181 |

[Lens group data]

| | Group starting surface | Group focal length |
|---|---|---|
| First lens group | 1 | 85.49 |
| Second lens group | 4 | −15.08 |
| Third lens group | 10 | 25.39 |
| Fourth lens group | 19 | 79.00 |
| Fifth lens group | 21 | −66.87 |

[Conditional expression corresponding value]

Conditional expression(JA1) |fF/fRF| = 1.181
Conditional expression(JA2) (−fXn)/fXR = 0.594
Conditional expression(JA3) fF/fW = 4.793
Conditional expression(JA4) Wω = 40.739
Conditional expression(JA5) fF/fXR = 3.112
Conditional expression(JA6) DXRFT/fF = 0.107
Conditional expression(JA7) Tω = 13.730
Conditional expression(JA8) DGXR/fXR = 0.827
Conditional expression(JD1) fV/fRF = 0.441
Conditional expression(JD2) DVW/fV = −0.081
Conditional expression(JD3) Wω = 40.739
Conditional expression(JD4) fF/fXR = 3.112
Conditional expression(JD5) (−fXn)/fXR = 0.594
Conditional expression(JD6) DGXR/fXR = 0.827
Conditional expression(JE1) DVW/fV = −0.081
Conditional expression(JE2) Wω = 40.739
Conditional expression(JE3) fF/fW = 4.793
Conditional expression(JE4) fV/fRF = 0.441
Conditional expression(JE5) fF/fXR = 3.112
Conditional expression(JE6) DGXR/fXR = 0.827
Conditional expression(JE7) DXnW/ZD1 = 0.523
Conditional expression(JI1) (rB + rA)/(rB − rA) = 0.230

TABLE 7-continued

| |
|---|
| Conditional expression(JI2) (rC + rB)/(rC − rB) = 2.034 |
| Conditional expression(JI3) \|fF/fXR\| = 3.112 |
| Conditional expression(JI4) νdp = 82.570 |

It can be seen in Table 7 that the zoom optical system ZL7 according to Example 7 satisfies the conditional expressions (JA1) to (JA8), (JD1) to (JD6), (JE1) to (JE7), and (JI1) to (JI4).

Figure 26A:
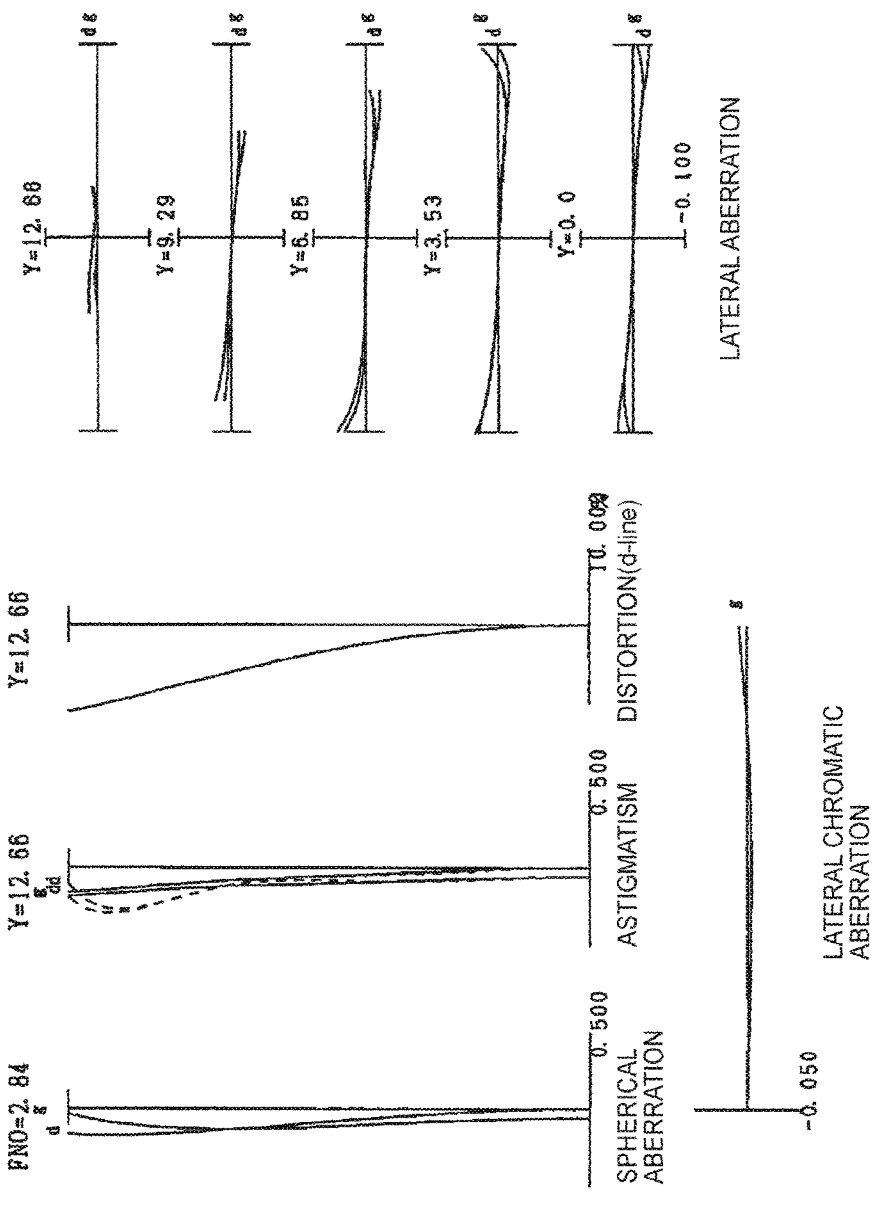
FIGS. 26A, 26B, and 26C are graphs showing various aberrations of the zoom optical system according to Example 7 upon focusing on infinity respectively in the wide angle end state, the intermediate focal length state, and the telephoto end state.
Figure 26B:
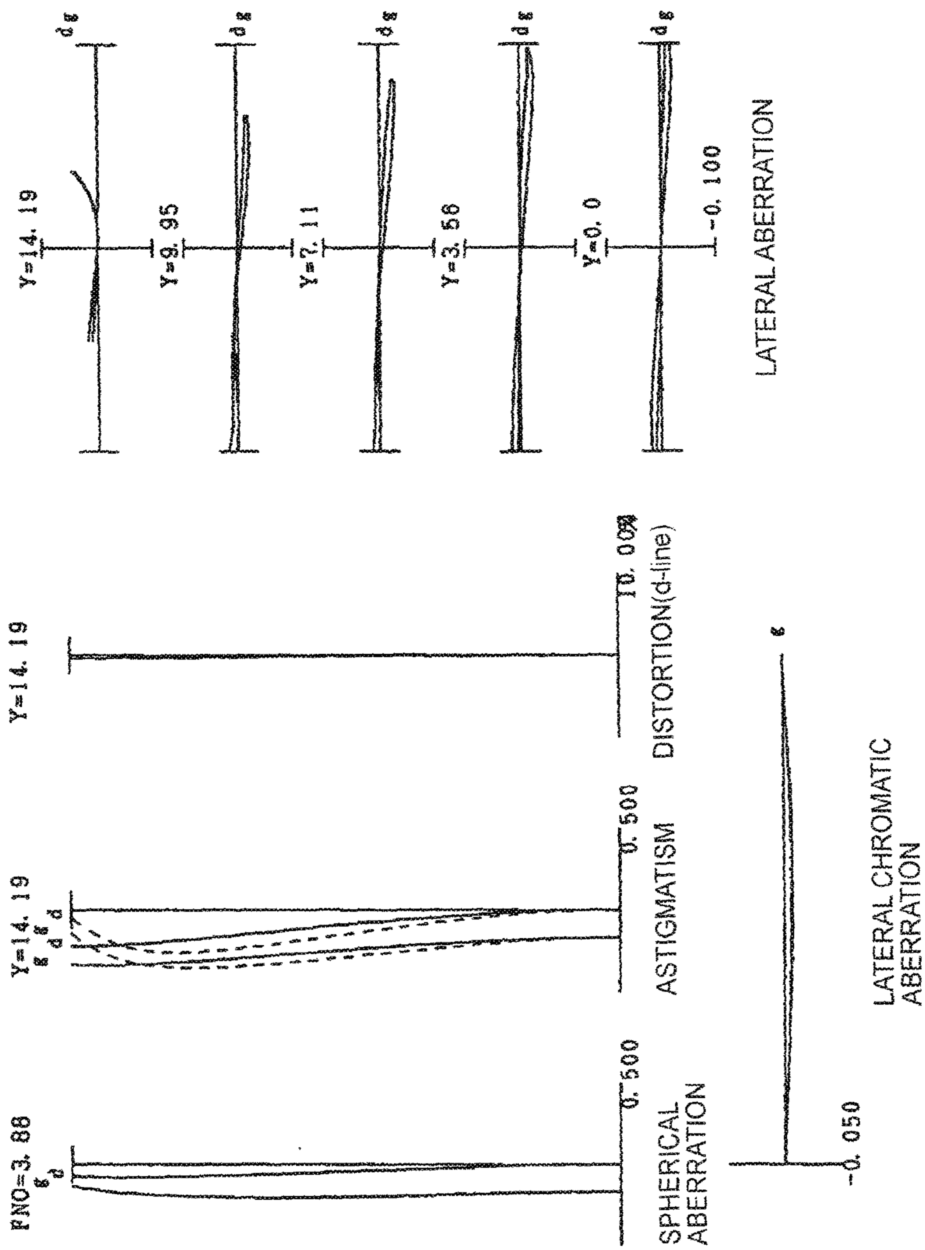
Figure 26C:
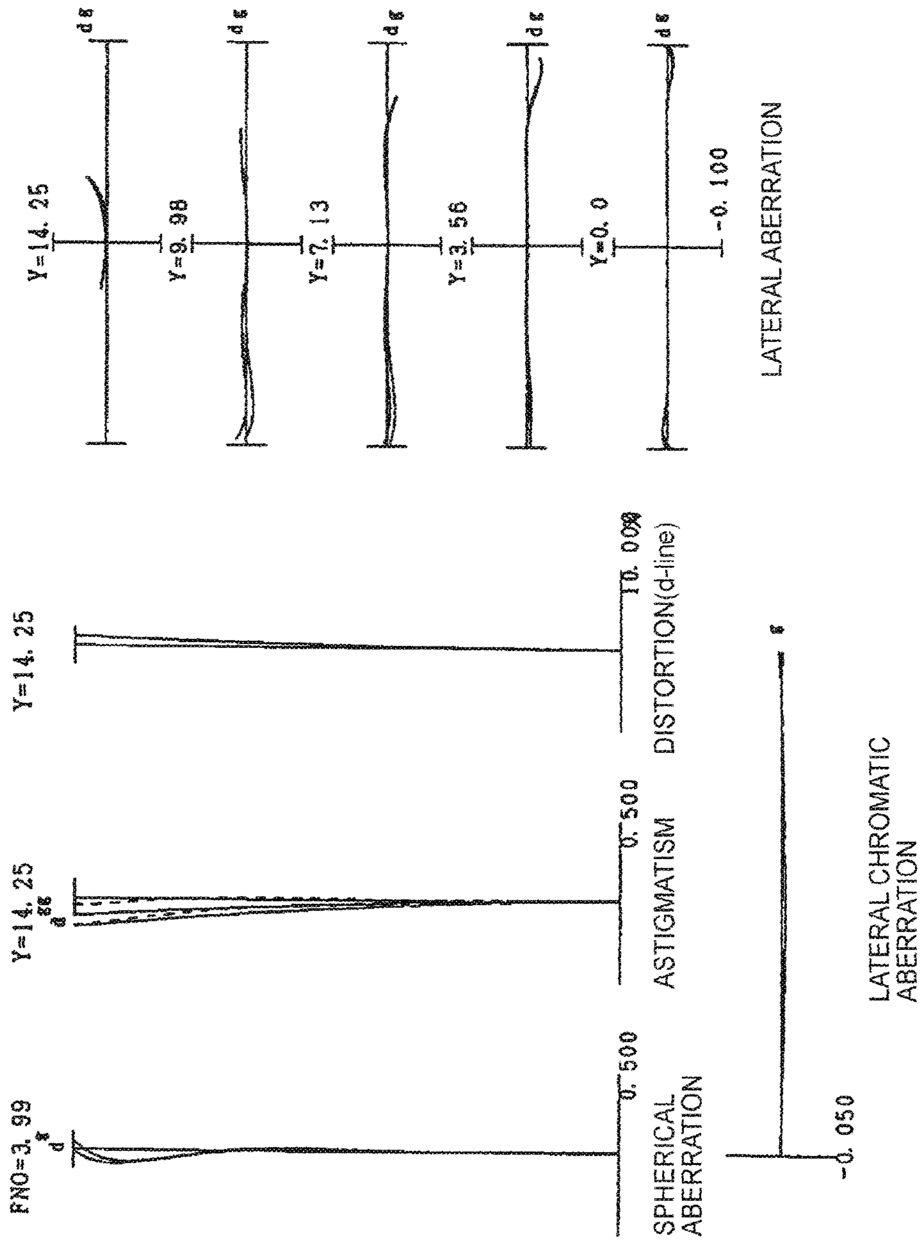
Figure 27A:
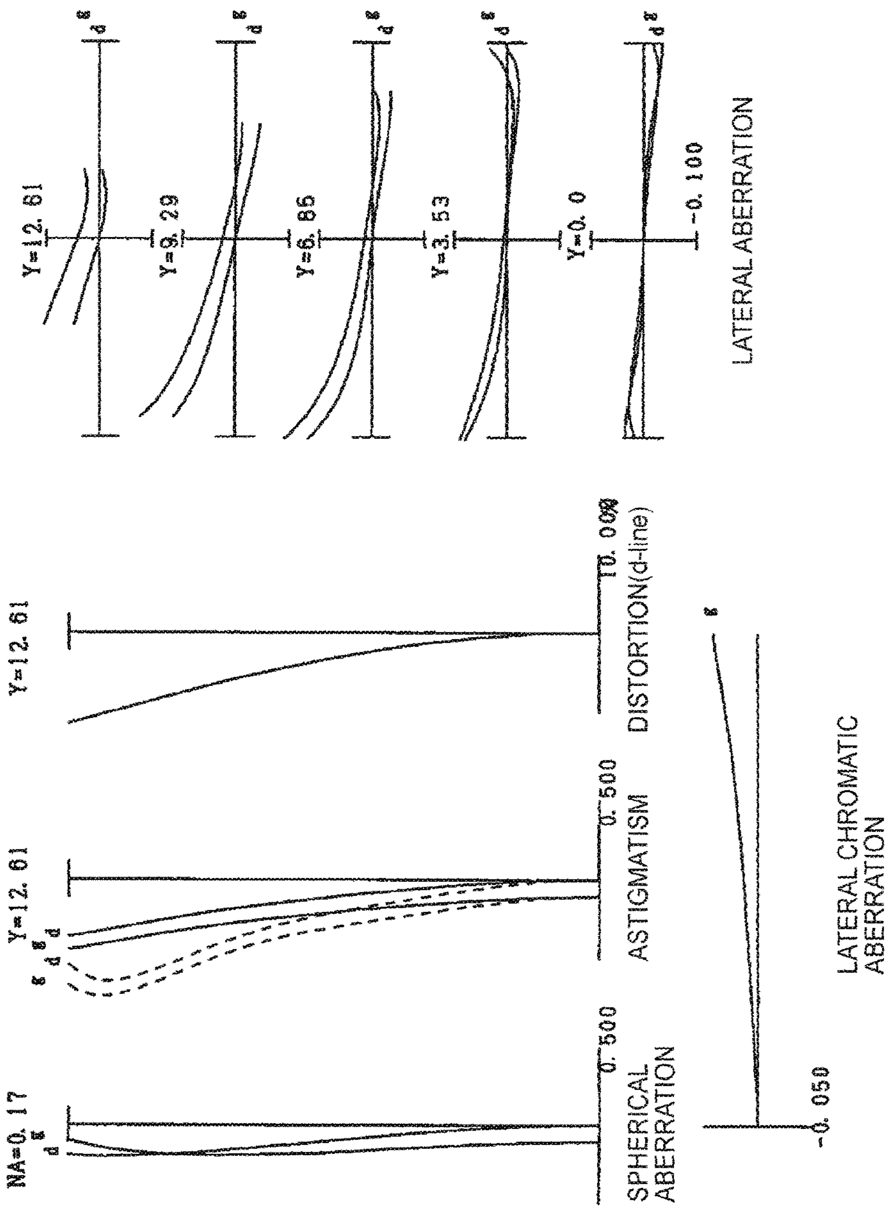
FIGS. 27A, 27B, and 27C are graphs showing various aberrations of the zoom optical system according to Example 7 upon focusing on a short distant object respectively in the wide angle end state, the intermediate focal length state, and the telephoto end state.
Figure 27B:
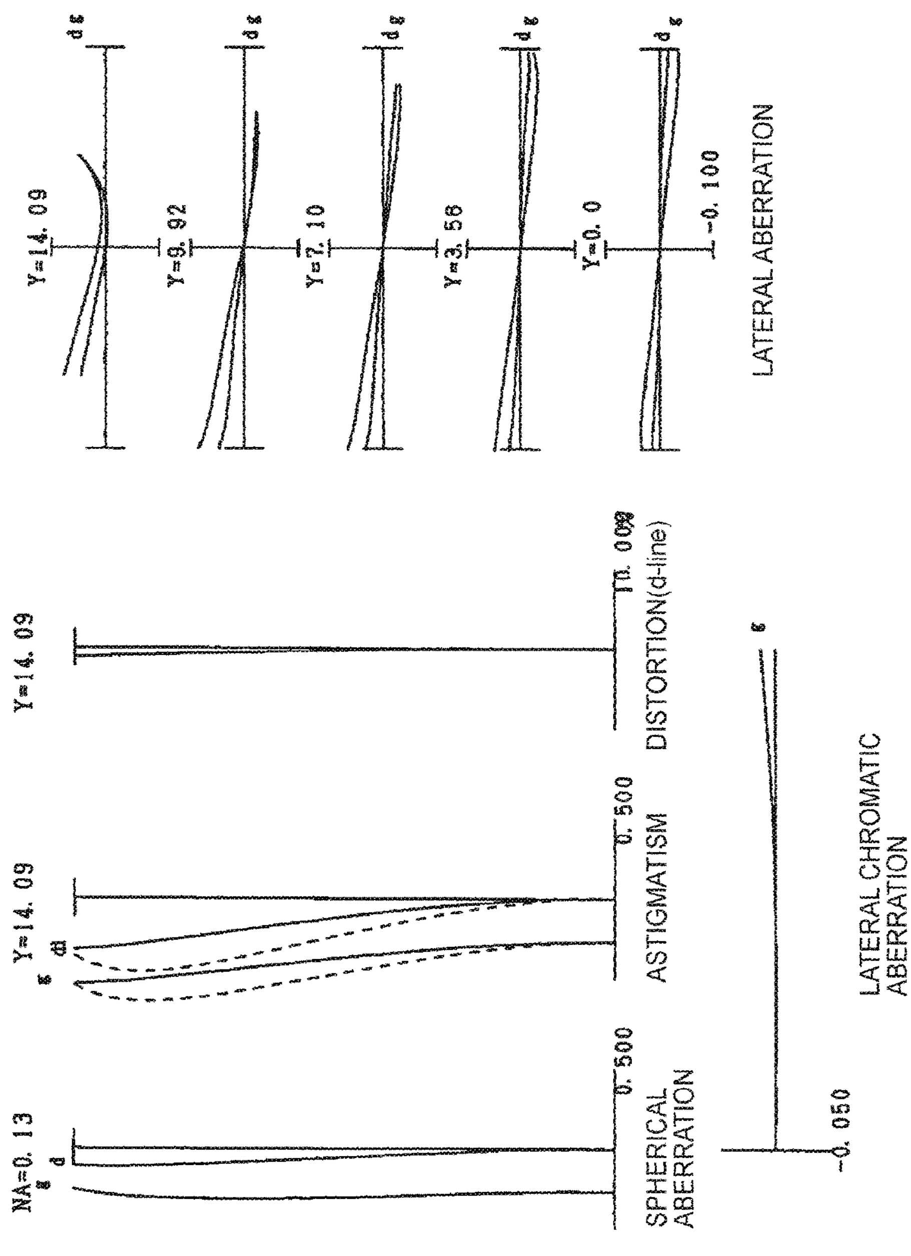
Figure 27C:
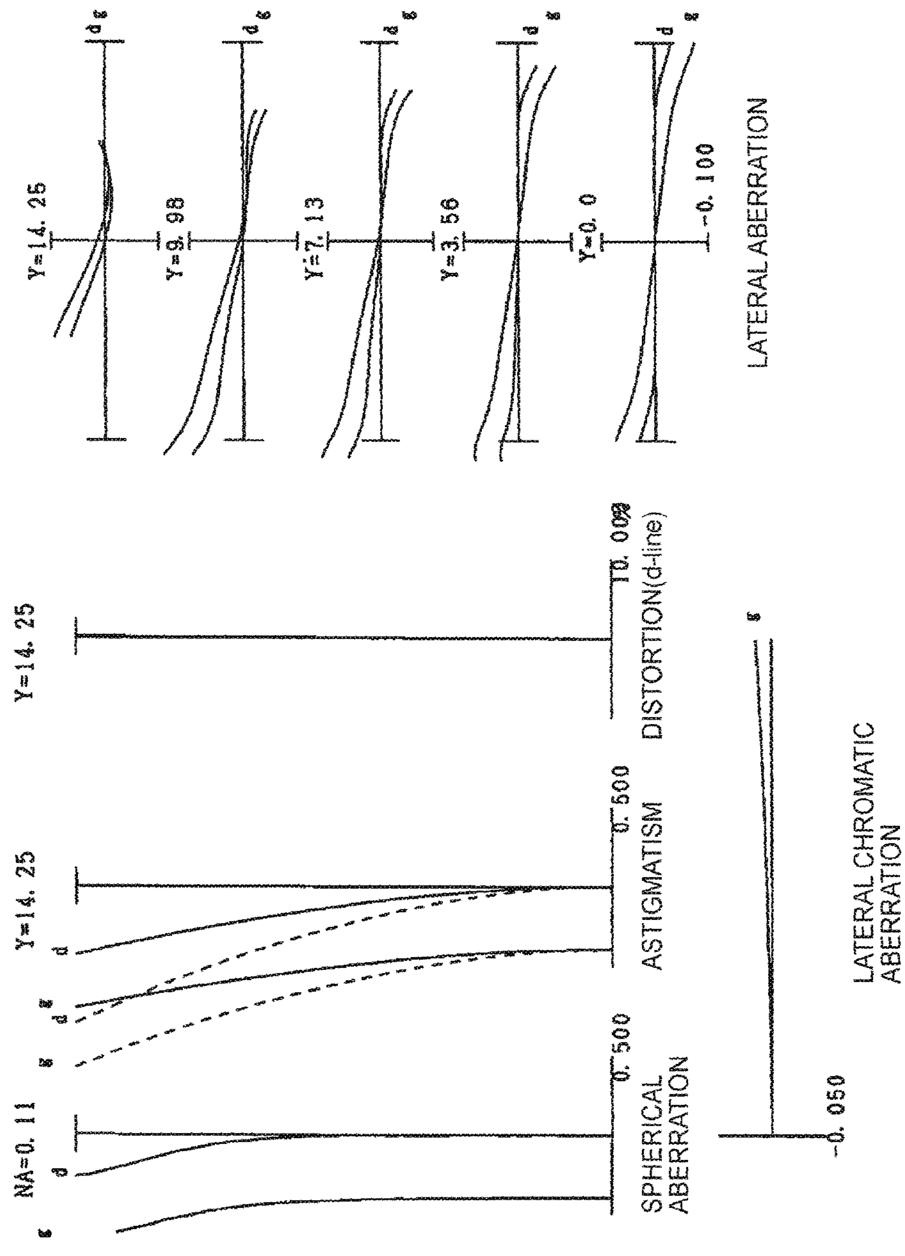
Figure 28A:
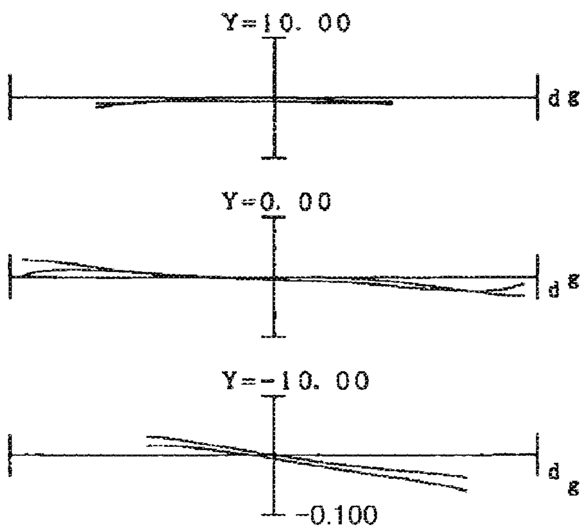
FIGS. 28A, 28B, and 28C are graphs showing lateral aberrations of the zoom optical system according to Example 7 upon focusing on infinity with image blur correction performed, respectively in the wide angle end state, the intermediate focal length state, and the telephoto end state.
Figure 28B:
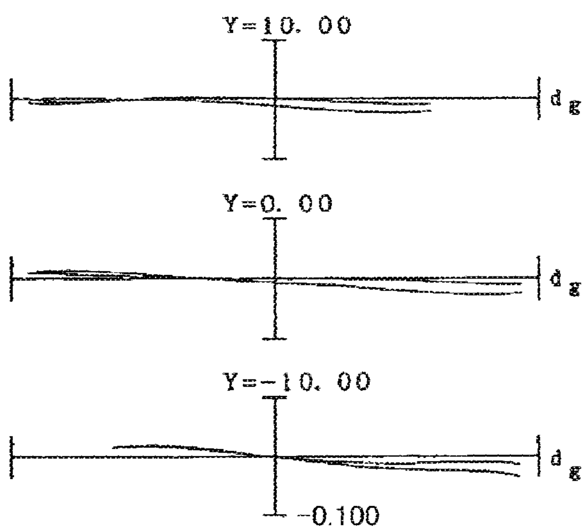
Figure 28C:
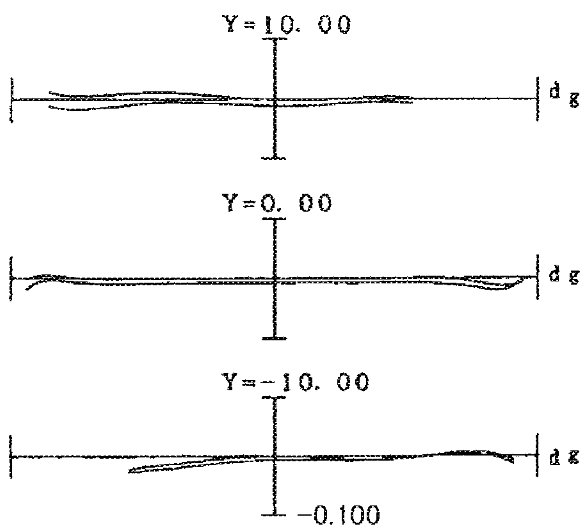

FIG. 26 is various aberration graphs (a spherical aberration graph, an astigmatism graph, a distortion graph, a lateral chromatic aberration graph, and a lateral aberration graph) of the zoom optical system ZL7 according to Example 7 upon focusing on infinity with FIG. 26A corresponding to the wide angle end state, FIG. 26B corresponding to the intermediate focal length state, and FIG. 26C corresponding to the telephoto end state. FIG. 27 is various aberration graphs (a spherical aberration graph, an astigmatism graph, a distortion graph, a lateral chromatic aberration graph, and a lateral aberration graph) of the zoom optical system ZL7 according to Example 7 upon focusing on a short distant object with FIG. 27A corresponding to the wide angle end state, FIG. 27B corresponding to the intermediate focal length state, and FIG. 27C corresponding to the telephoto end state. FIG. 28 is lateral aberration graphs at the time of image blur correction for the zoom optical system ZL7 according to Example 7 upon focusing on infinity with FIG. 28A corresponding to the wide angle end state, FIG. 28B corresponding to the intermediate focal length state, and FIG. 28C corresponding to the telephoto end state.

It can be seen in FIG. 26 to FIG. 28 that the zoom optical system ZL7 according to Example 7 can achieve an excellent optical performance with various aberrations successfully corrected from the wide angle end state to the telephoto end state and from the infinity focusing state to the short-distant object focusing state. Furthermore, it can be seen that a high imaging performance can be achieved upon image blur correction.

Example 8

Example 8 is described with reference to FIG. 29 to FIG. 34 and Table 8. A zoom optical system ZLI (ZL8) according to Example 8 includes, as illustrated in FIG. 29 (FIG. 30), the first lens group G1 having positive refractive power, the second lens group G2 having negative refractive power, the third lens group G3 having positive refractive power, the fourth lens group G4 having positive refractive power, and the fifth lens group G5 having positive refractive power that are arranged in order from the object side.

Figure 29:
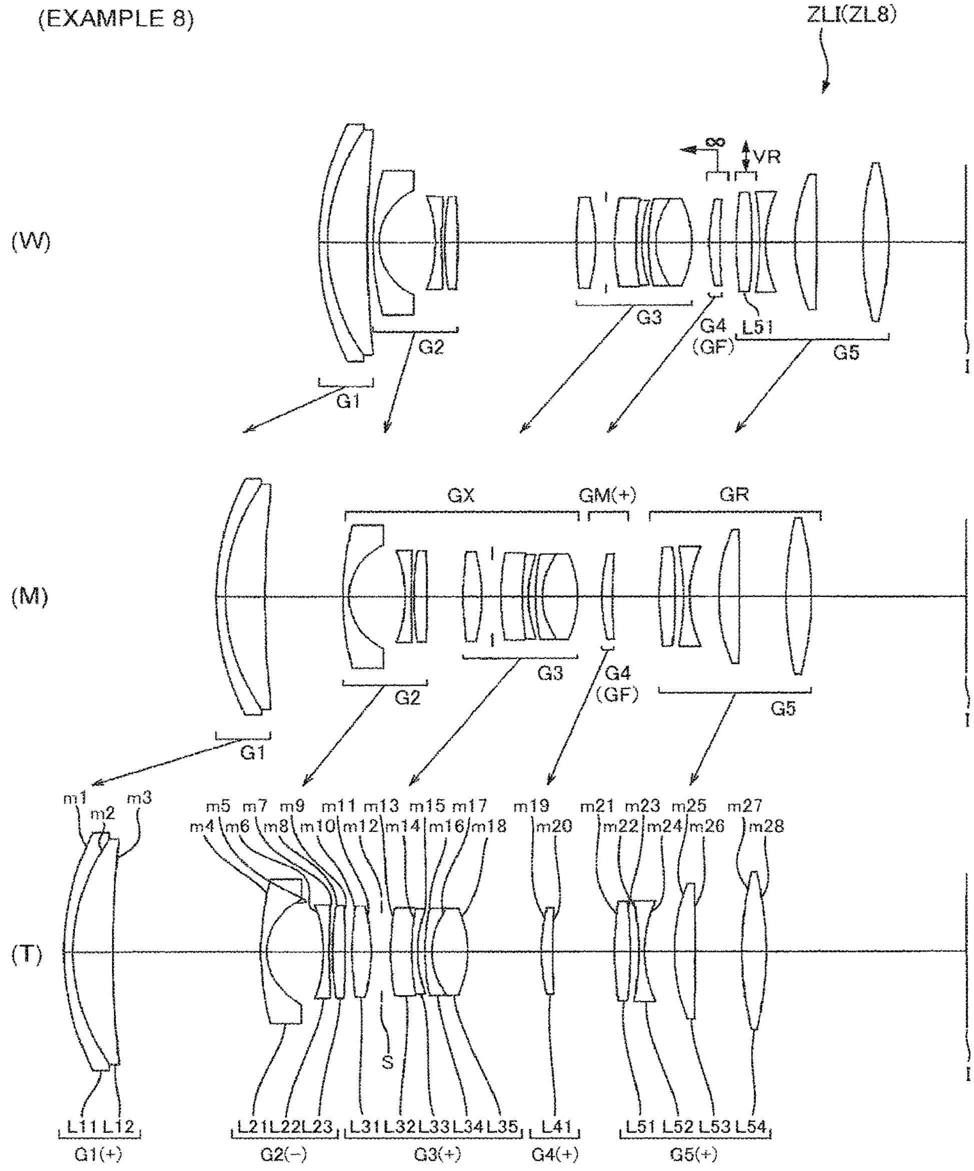
FIG. 29 is a cross-sectional view with sections (W), (M), and (T) showing a zoom optical system (using a lens L51 as a vibration-proof lens group VR) according to Example 8 respectively in the wide angle end state, the intermediate focal length state, and the telephoto end state.

The example illustrated in FIG. 29, the second lens group G2 and the third lens group G3 correspond to the front-side lens group GX. The fourth lens group G4 corresponds to the intermediate lens group GM (focusing lens group GF). The fifth lens group G5 corresponds to the rear-side lens group GR. The lens L51 forming the fifth lens group G5 corresponds to the vibration-proof lens group VR.

Figure 30:
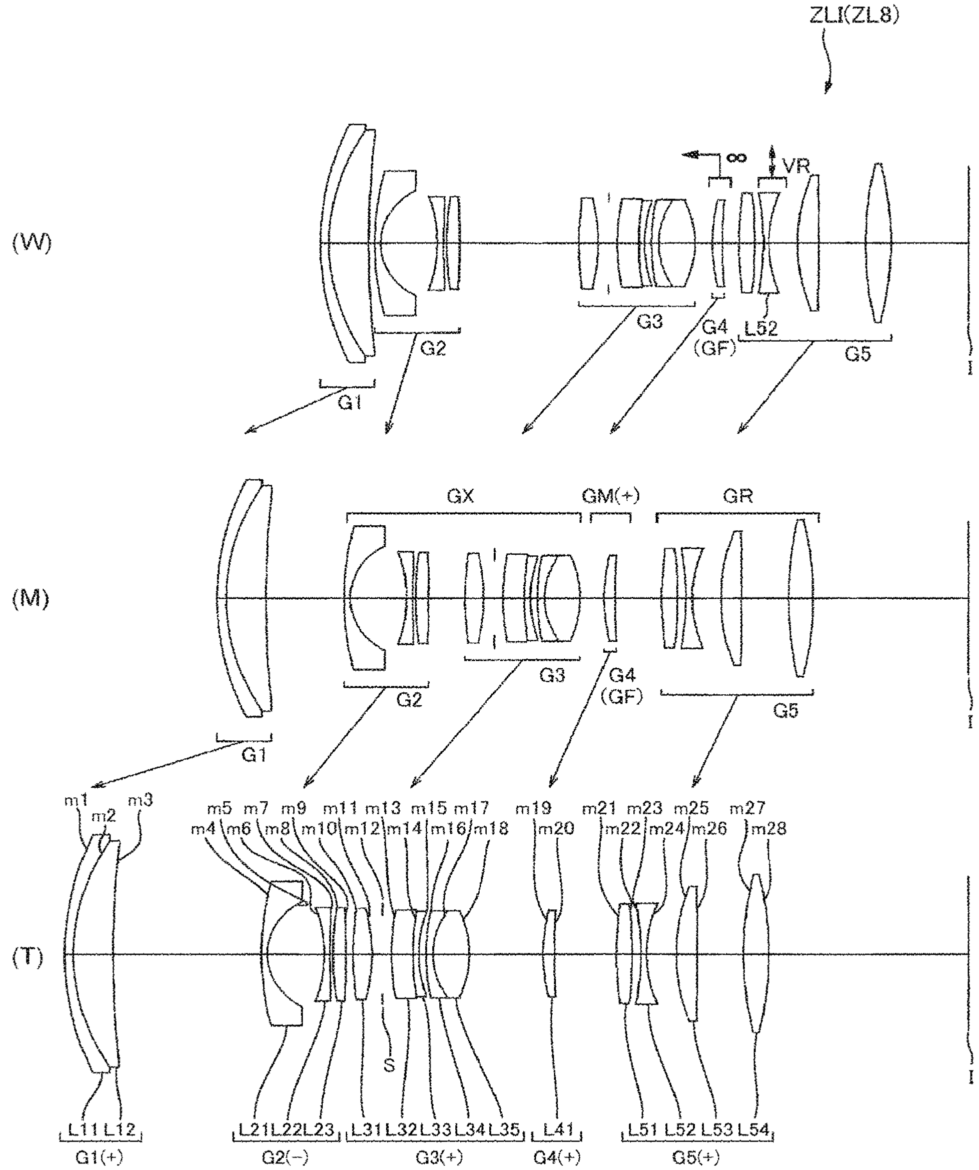
FIG. 30 is a cross-sectional view with sections (W), (M), and (T) showing a zoom optical system (using a lens L52 as a vibration-proof lens group VR) according to Example 8 respectively in the wide angle end state, the intermediate focal length state, and the telephoto end state.

The example illustrated in FIG. 30, the second lens group G2 and the third lens group G3 correspond to the front-side lens group GX. The fourth lens group G4 corresponds to the intermediate lens group GM (focusing lens group GF). The fifth lens group G5 corresponds to the rear-side lens group GR. The lens L52 forming the fifth lens group G5 corresponds to the vibration-proof lens group VR.

The first lens group G1 includes the cemented lens including the negative meniscus lens L11 having a concave surface facing the image surface side and the positive meniscus lens L12 having a convex surface facing the object side that are arranged in order from the object side.

The second lens group G2 includes the negative meniscus lens L21 having a concave surface facing the image surface side, the biconcave lens L22, and the biconvex lens L23 that are arranged in order from the object side.

The biconcave lens L22 is a glass-molded aspherical lens with lens surfaces, on the object side and on the image surface side, having an aspherical shape.

The third lens group G3 includes the biconvex lens L31; the aperture stop S; the cemented lens including the positive meniscus lens L32 having a convex surface facing the object side and the negative meniscus lens L33 having a concave surface facing the image surface side; and the cemented lens including the negative meniscus lens L34 having a concave surface facing the image surface side and the biconvex lens L35 that are arranged in order from the object side.

The biconvex lens L31 is a glass-molded aspherical lens with a lens surface, on the object side, having an aspherical shape. The negative meniscus lens L34 is a glass-molded aspherical lens with a lens surface, on the object side, having an aspherical shape.

The fourth lens group G4 includes the positive meniscus lens L41 having a convex surface facing the object side.

The fifth lens group G5 includes a biconvex lens L51, the biconcave lens L52, the biconvex lens L53, and a biconvex lens L54 that are arranged in order from the object side.

The biconvex lens L51 is a glass-molded aspherical lens with lens surfaces, on the object side and on the image surface side, having an aspherical shape. The biconcave lens L52 is a glass-molded aspherical lens with a lens surface, on the image surface side, having an aspherical shape.

Upon zooming from the wide angle end state to the telephoto end state, the distance between lens groups changes with the first lens group G1 to the fifth lens group G5 each moved toward the object side.

Upon focusing from infinity to the short-distant object, the fourth lens group G4 moves toward the object side.

When image blur occurs, as illustrated in FIG. 29, image blur correction (vibration isolation) on the image surface I is performed with the lens L51 forming the fifth lens group G5 serving as the vibration-proof lens group VR moved with a displacement component in the direction orthogonal to the optical axis.

In the wide angle end state, the vibration proof coefficient is 0.41 and the focal length is 16.48 (mm), and thus the movement amount of the vibration-proof lens group VR for correcting the roll blur of 0.66° is 0.47 (mm). In the intermediate focal length state, the vibration proof coefficient is 0.52 and the focal length is 34.52 (mm), and thus the movement amount of the vibration-proof lens group VR for correcting the roll blur of 0.46° is 0.53 (mm). In the telephoto end state, the vibration proof coefficient is 0.59 and the focal length is 58.20 (mm), and thus the movement amount of the vibration-proof lens group VR for correcting the roll blur of 0.35° is 0.61 (mm).

In this Example, when image blur occurs, as illustrated in FIG. 30, image blur correction (vibration isolation) on the image surface I may be performed with the lens L52 forming the fifth lens group G5 serving as the vibration-proof lens group VR moved with a displacement component in the direction orthogonal to the optical axis.

In the wide angle end state, the vibration proof coefficient is −1.29 and the focal length is 16.48 (mm), and thus the movement amount of the vibration-proof lens group VR for correcting the roll blur of 0.66° is −0.15 (mm). In the intermediate focal length state, the vibration proof coefficient is −1.74 and the focal length is 34.52 (mm), and thus the movement amount of the vibration-proof lens group VR for correcting the roll blur of 0.46° is −0.16 (mm). In the telephoto end state, the vibration proof coefficient is −2.00 and the focal length is 58.20 (mm), and thus the movement amount of the vibration-proof lens group VR for correcting the roll blur of 0.35° is −0.18 (mm).

In Table 8 below, specification values in Example 8 are listed. Surface numbers 1 to 28 in Table 8 respectively correspond to the optical surfaces m1 to m28 in FIG. 29 (FIG. 30).

TABLE 8

[Lens specifications]

| Surface number | R | D | nd | νd |
|---|---|---|---|---|
| Obj surface | ∞ | | | |
| 1 | 52.01929 | 1.500 | 1.94594 | 18.0 |
| 2 | 38.70649 | 6.705 | 1.80400 | 46.6 |
| 3 | 208.84711 | (D3) | 1.00000 | |
| 4 | 54.86747 | 1.000 | 1.80400 | 46.6 |
| 5 | 10.90252 | 9.493 | 1.00000 | |
| *6 | −29.74452 | 1.000 | 1.72903 | 54.0 |
| *7 | 85.46789 | 0.533 | 1.00000 | |
| 8 | 62.70343 | 2.179 | 1.94594 | 18.0 |
| 9 | −203.90514 | (D9) | 1.00000 | |
| *10 | 52.30971 | 3.200 | 1.72903 | 54.0 |
| 11 | −35.75411 | 1.800 | 1.00000 | |
| 12 | (stop S) | 1.500 | 1.00000 | |
| 13 | 47.59945 | 3.600 | 1.48749 | 70.3 |
| 14 | 54.00000 | 1.000 | 1.78472 | 25.6 |
| 15 | 25.22974 | 1.200 | 1.00000 | |
| *16 | 51.22589 | 1.186 | 1.72903 | 54.0 |
| 17 | 14.51681 | 6.030 | 1.49782 | 82.6 |
| 18 | −19.84549 | (D18) | 1.00000 | |
| 19 | 35.07568 | 1.811 | 1.49782 | 82.6 |
| 20 | 102.41627 | (D20) | 1.00000 | |
| *21 | 44.70967 | 2.605 | 1.55332 | 71.7 |
| *22 | −956.47865 | 1.500 | 1.00000 | |
| 23 | −53.34248 | 1.000 | 1.82080 | 42.7 |
| *24 | 23.47902 | 4.995 | 1.00000 | |
| 25 | 35.66383 | 3.530 | 1.59319 | 67.9 |
| 26 | −477.30582 | 7.997 | 1.00000 | |
| 27 | 69.46909 | 4.200 | 1.48749 | 70.3 |
| 28 | −64.23027 | (D28) | 1.00000 | |
| Img surface | ∞ | | | |

[Aspherical data]

| Surface | κ | A4 | A6 | A8 | A10 |
|---|---|---|---|---|---|
| 6 | 1.00000e+00 | −4.63019e−05 | 2.03870e−07 | −6.42078e−10 | −2.02412e−11 |
| 7 | 1.00000e+00 | −6.23690e−05 | 3.31714e−07 | −2.89054e−09 | 0.00000e+00 |
| 10 | 1.00000e+00 | −3.57796e−05 | −1.16911e−08 | 2.44047e−10 | −3.29234e−12 |
| 16 | 1.00000e+00 | 3.71472e−05 | 4.09580e−08 | 1.14439e−10 | −6.41586e−14 |
| 21 | 1.00000e+00 | −6.15920e−05 | −4.51551e−07 | 1.01307e−08 | −4.84337e−11 |
| 22 | 1.00000e+00 | −6.60557e−05 | −7.74103e−07 | 2.02734e−08 | −1.26330e−10 |
| 24 | 1.00000e+00 | −8.16006e−06 | 2.18577e−07 | −6.23271e−09 | 4.73302e−11 |

[Various data]
Zoom ratio 3.53

| | Wide angle end | Intermediate | Telephoto end |
|---|---|---|---|
| f | 16.48 | 34.52 | 58.20 |
| FNo | 2.88 | 4.00 | 4.60 |
| ω | 40.8 | 22.4 | 13.8 |
| Y | 12.51 | 13.77 | 13.93 |
| TL | 109.577 | 126.782 | 152.506 |
| BF | 13.038 | 26.069 | 33.683 |
| BF(air) | 13.038 | 26.069 | 33.683 |

TABLE 8-continued

[Variable distance data]

| | Upon focusing on infinity | | | Upon focusing on short distant object | | |
|---|---|---|---|---|---|---|
| | Wide angle end | Intermediate | Telephoto end | Wide angle end | Intermediate | Telephoto end |
| f | 16.48 | 34.52 | 58.20 | — | — | — |
| β | — | — | — | −0.1026 | −0.0965 | −0.2077 |
| D0 | ∞ | ∞ | ∞ | 140.42 | 323.22 | 227.49 |
| D3 | 1.000 | 13.111 | 25.000 | 1.000 | 13.111 | 25.000 |
| D9 | 20.211 | 6.075 | 1.169 | 20.211 | 6.075 | 1.169 |
| D18 | 3.000 | 4.000 | 12.524 | 0.838 | 0.578 | 1.421 |
| D20 | 2.763 | 7.962 | 10.565 | 4.924 | 11.384 | 21.668 |
| D28 | 13.038 | 26.069 | 33.683 | 13.038 | 26.069 | 33.683 |

[Lens group data]

| | Group starting surface | Group focal length |
|---|---|---|
| First lens group | 1 | 91.06 |
| Second lens group | 4 | −13.01 |
| Third lens group | 10 | 26.36 |
| Fourth lens group | 19 | 106.21 |
| Fifth lens group | 21 | 249.80 |

[Conditional expression corresponding value]

Conditional expression(JB1) (DMRT − DMRW)/fF = 0.073
Conditional expression(JB2) Wω = 40.847
Conditional expression(JB3) Tω = 13.758
Conditional expression(JB4) fF/fRF = 0.425
Conditional expression(JB5) fF/fXR = 4.029
Conditional expression(JB6) DGXR/fXR = 0.740
Conditional expression(JD1) fV/fRF = 0.309(in the event that the vibration-proof lens group comprises lens L51)
fV/fRF = −0.079(in the event that the vibration-proof lens group comprises lens L52)
Conditional expression(JD2) DVW/fV = 0.019(in the event that the vibration-proof lens group comprises lens L51)
DVW/fV = −0.253(in the event that the vibration-proof lens group comprises lens L52)
Conditional expression(JD3) Wω = 40.847
Conditional expression(JD4) fF/fXR = 4.029
Conditional expression(JD5) (−fXn)/fXR = 0.493
Conditional expression(JD6) DGXR/fXR = 0.740
Conditional expression(JE1) DVW/fV = 0.019(in the event that the vibration-proof lens group comprises lens L51)
Conditional expression(JE2) Wω = 40.847
Conditional expression(JE3) fF/fW = 6.444
Conditional expression(JE4) fV/fRF = 0.309(in the event that the vibration-proof lens group comprises lens L51)
Conditional expression(JE5) fF/fXR = 4.029
Conditional expression(JE6) DGXR/fXR = 0.740
Conditional expression(JE7) DXnW/ZD1 = 0.471
Conditional expression(JI1) (rB + rA)/(rB − rA) = 0.277
Conditional expression(JI2) (rC + rB)/(rC − rB) = 2.042
Conditional expression(JI3) |fF/fXR| = 4.029
Conditional expression(JI4) νdp = 82.570

It can be seen in Table 8 that the zoom optical system ZL8 according to Example 8 satisfies the conditional expressions (JB1) to (JB6), (JD1) to (JD6), (JE1) to (JE7), and (JI1) to (JI4).

Figure 31A:
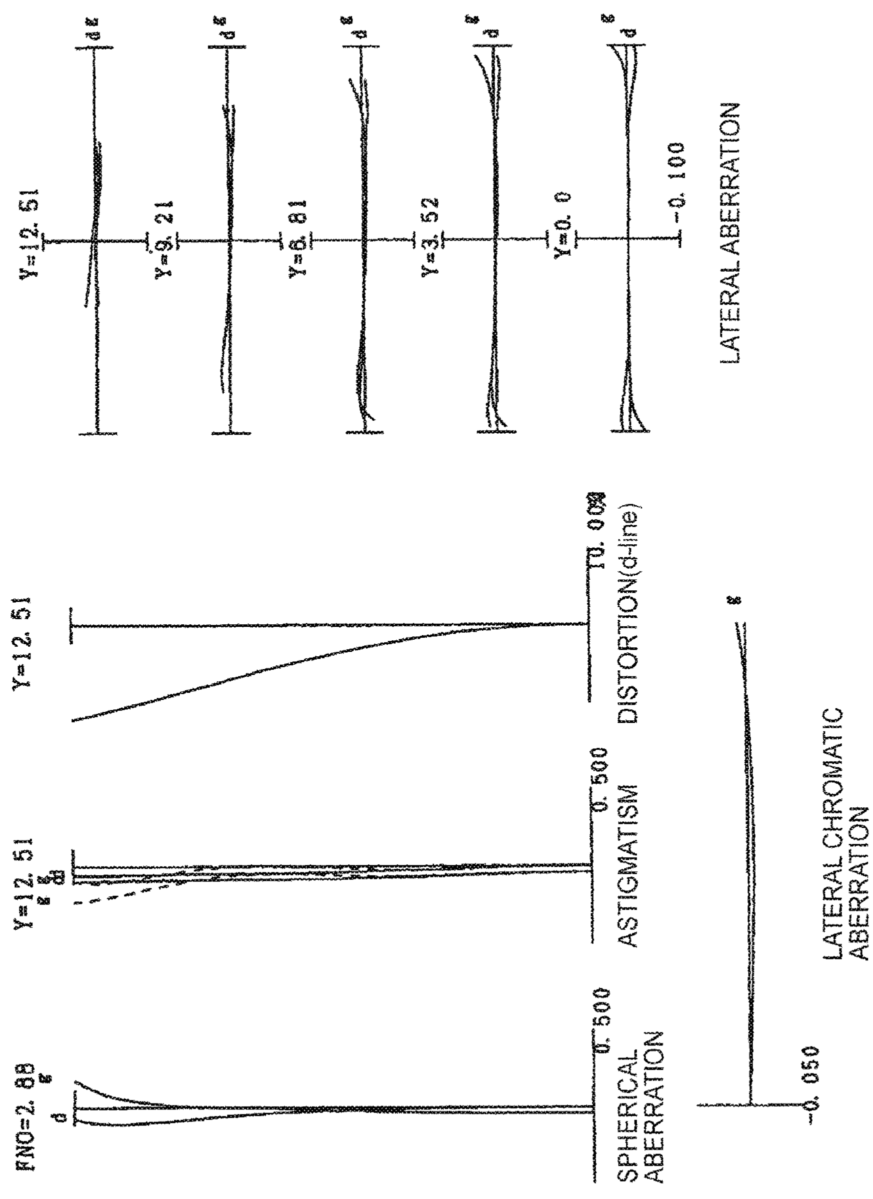
FIGS. 31A, 31B, and 31C are graphs showing various aberrations of the zoom optical system according to Example 8 upon focusing on infinity respectively in the wide angle end state, the intermediate focal length state, and the telephoto end state.
Figure 31B:
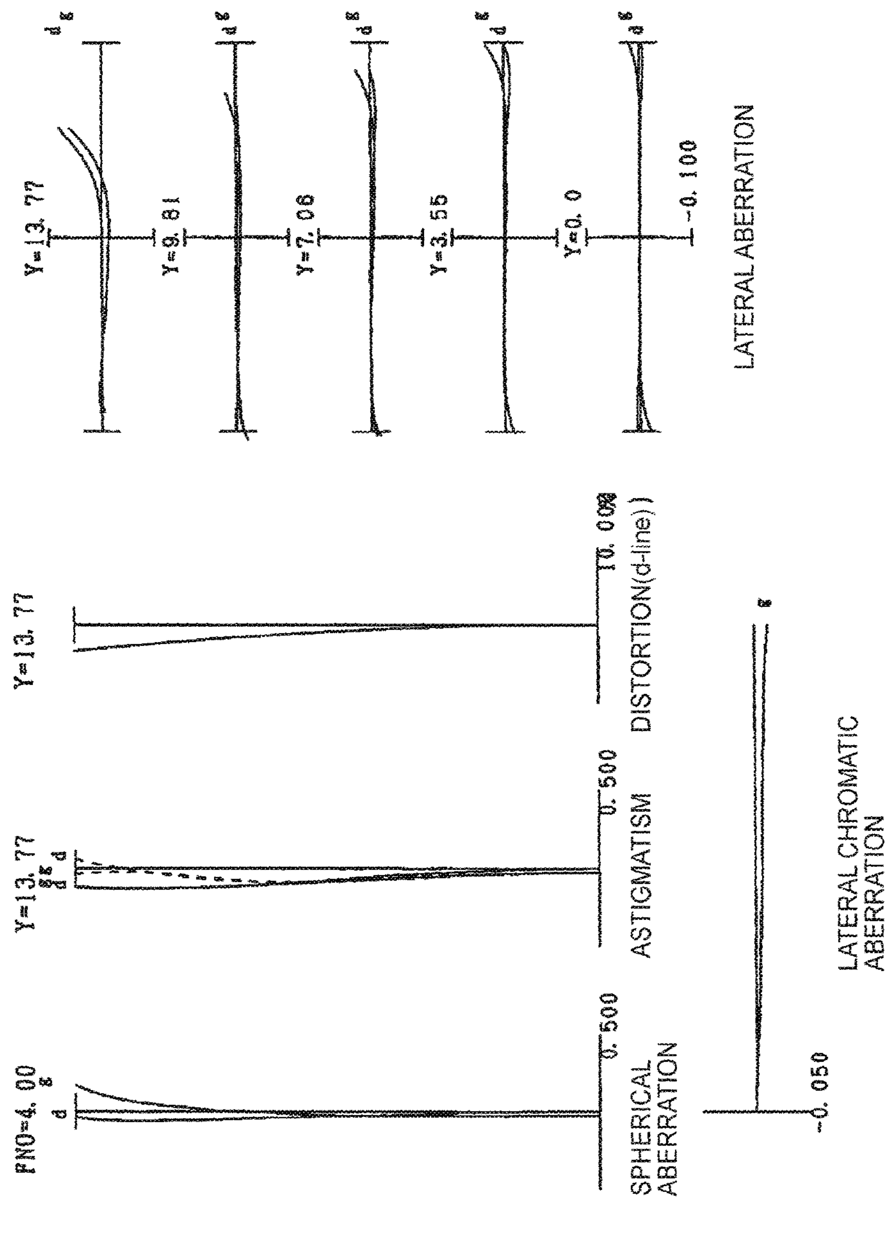
Figure 31C:
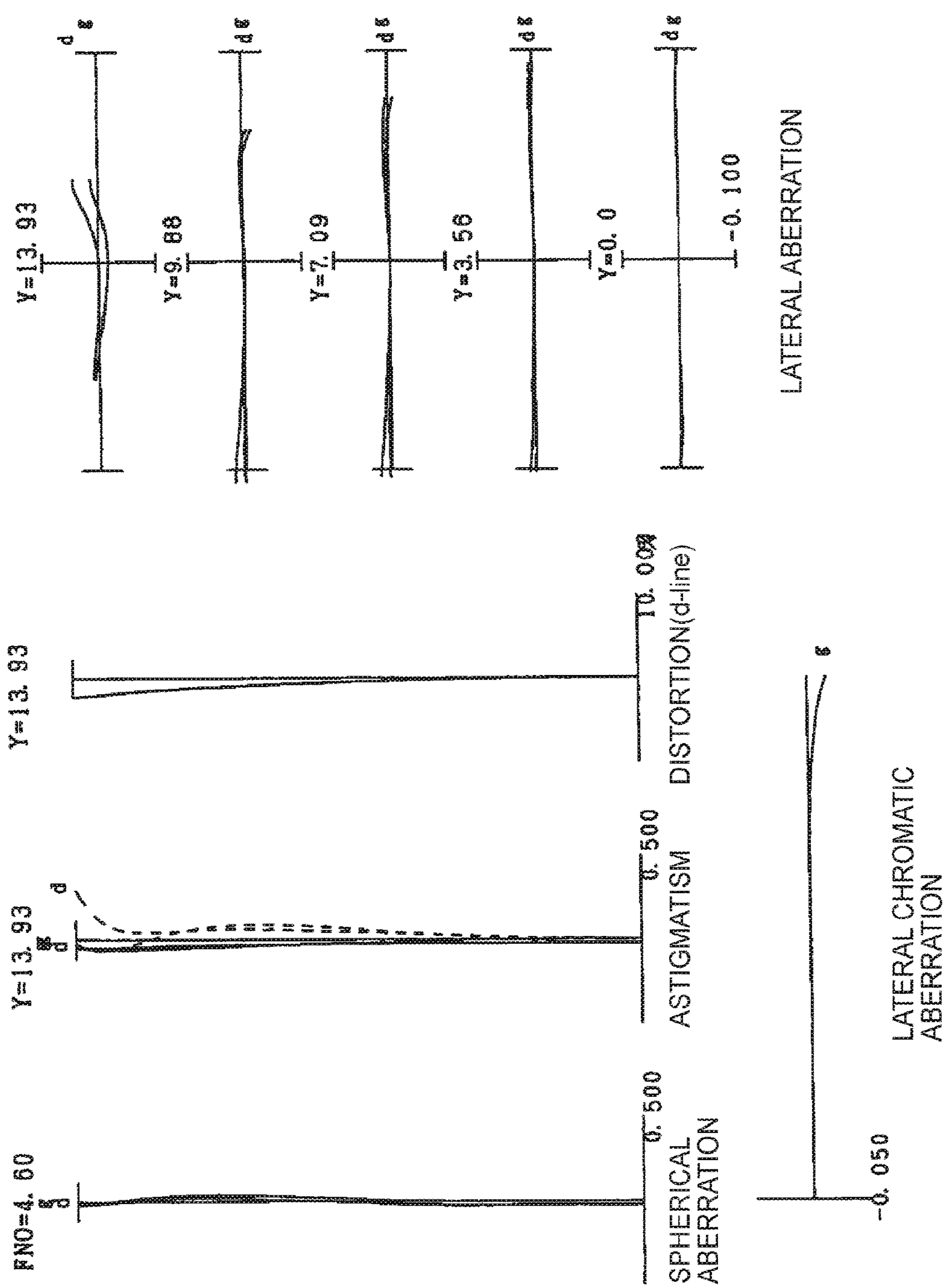
Figure 32A:
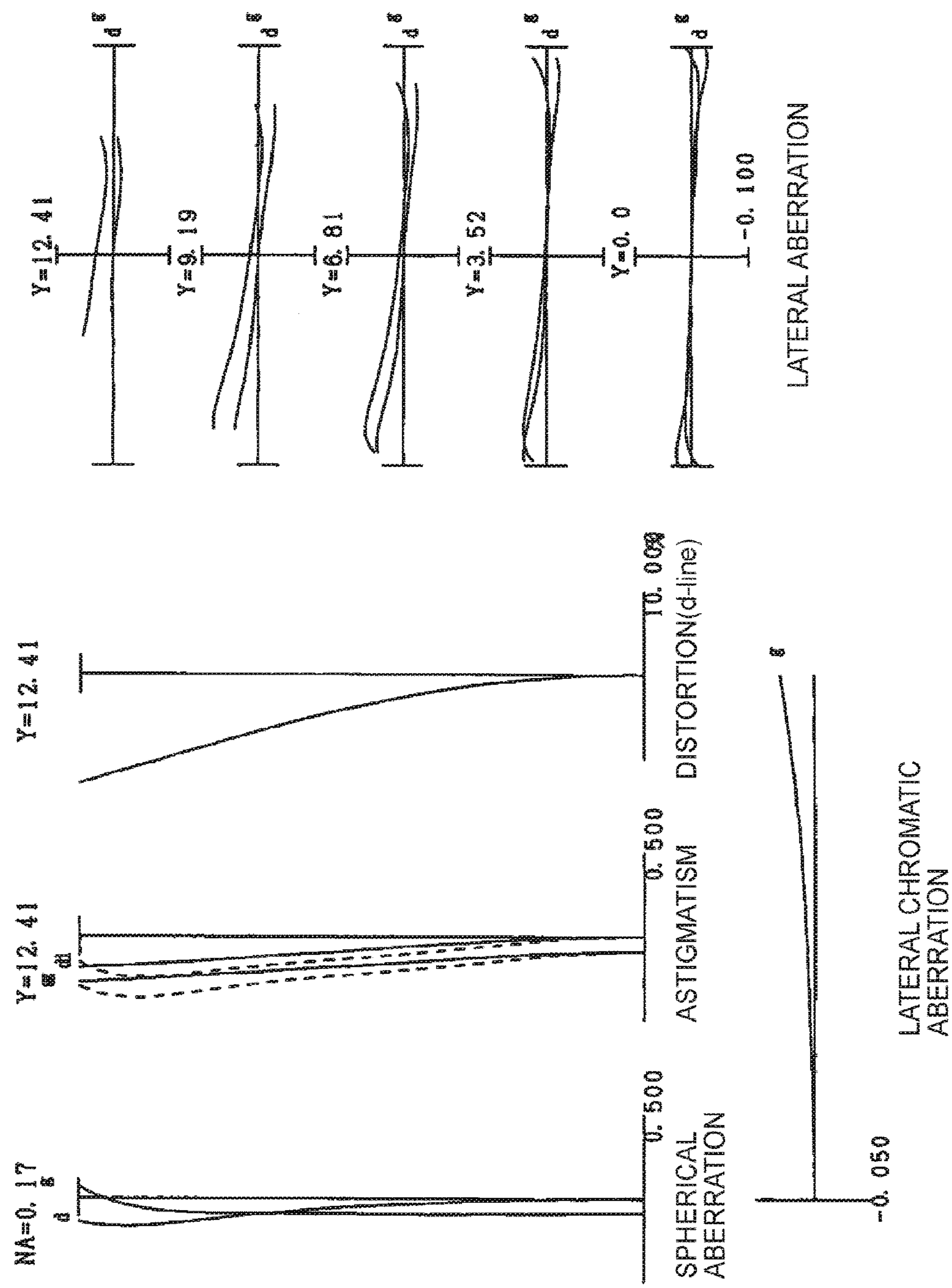
FIGS. 32A, 32B, and 32C are graphs showing various aberrations of the zoom optical system according to Example 8 upon focusing on a short distant object respectively in the wide angle end state, the intermediate focal length state, and the telephoto end state.
Figure 32B:
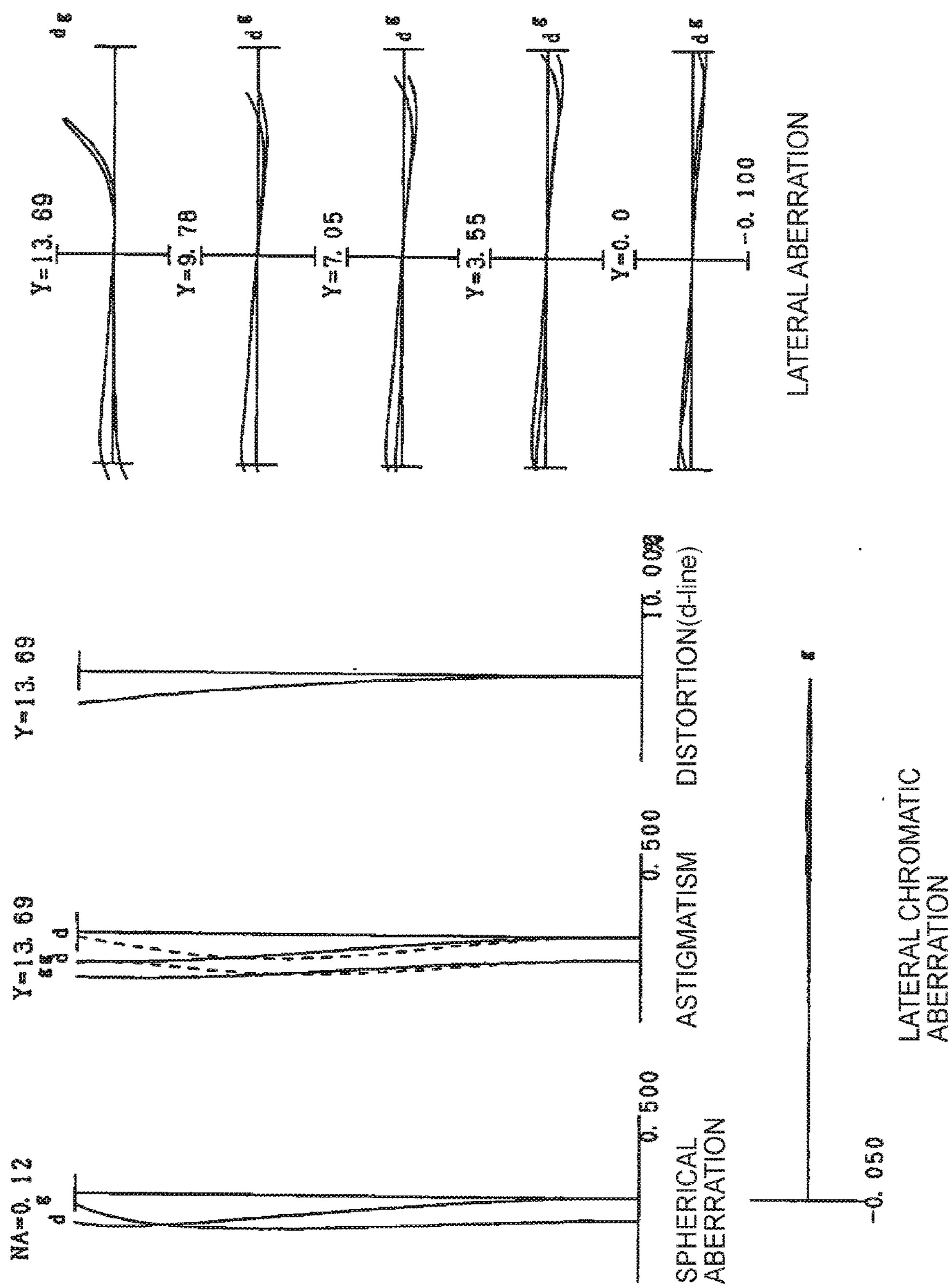
Figure 32C:
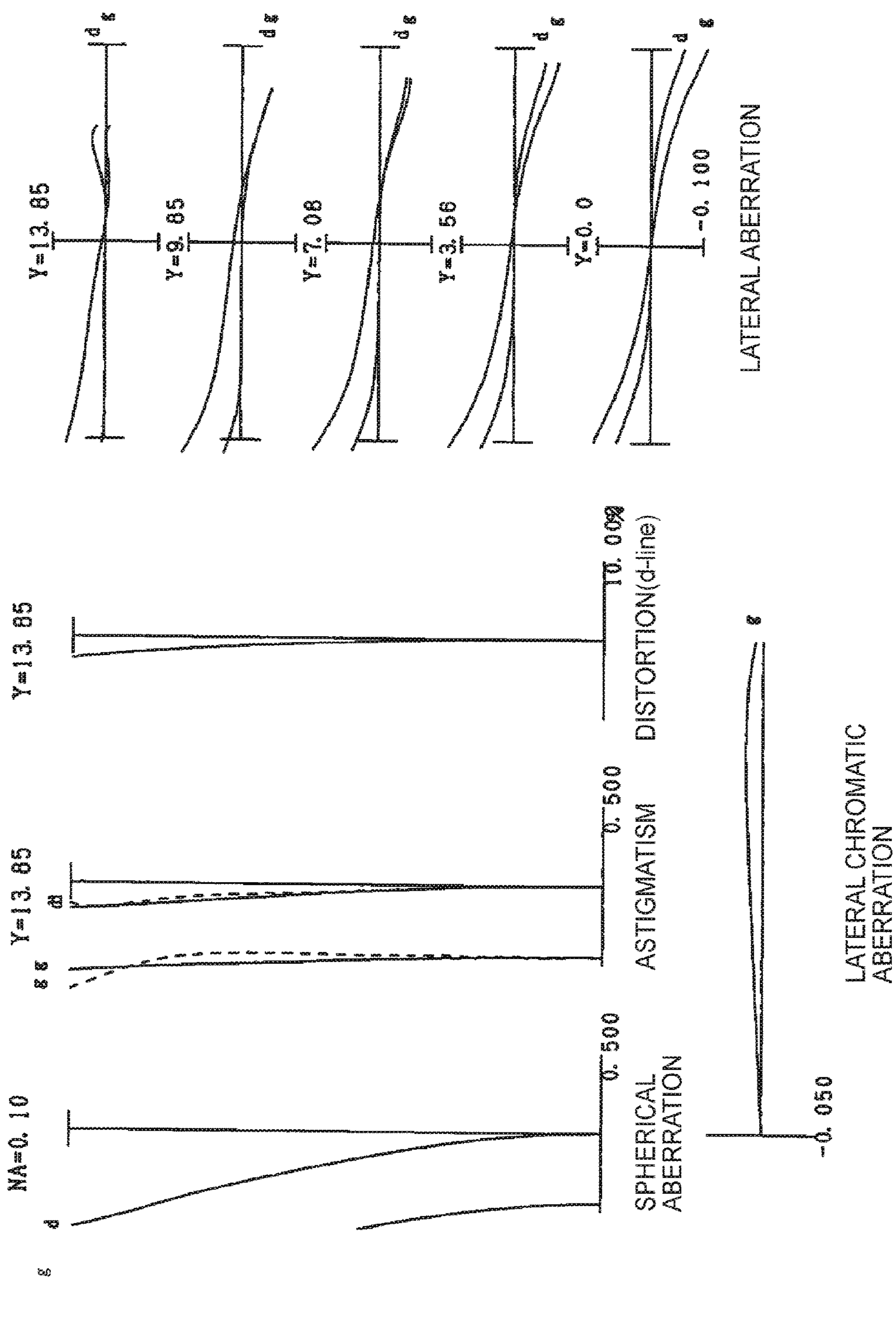
Figure 33A:
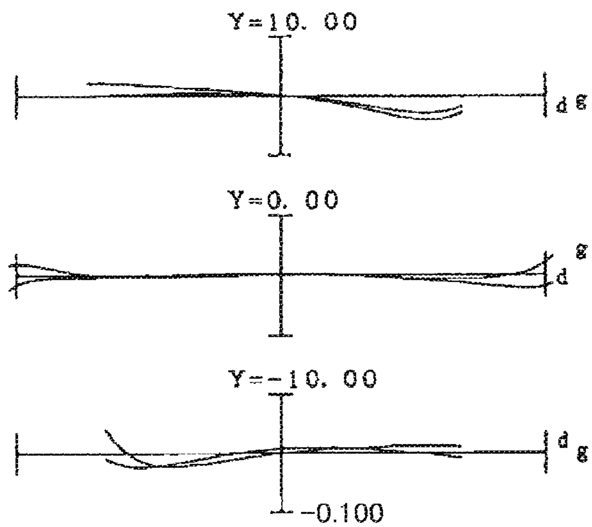
FIGS. 33A, 33B, and 33C are graphs showing lateral aberrations of the zoom optical system (using the lens L51 as the vibration-proof lens group VR) according to Example 8 upon focusing on infinity with image blur correction performed, respectively in the wide angle end state, the intermediate focal length state, and the telephoto end state.
Figure 33B:
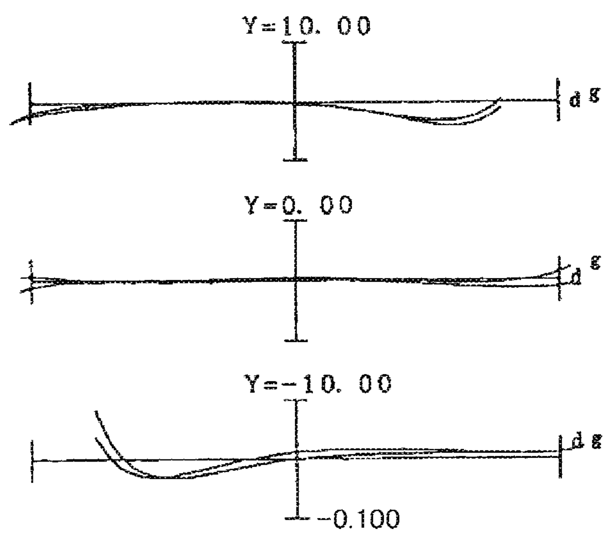
Figure 33C:
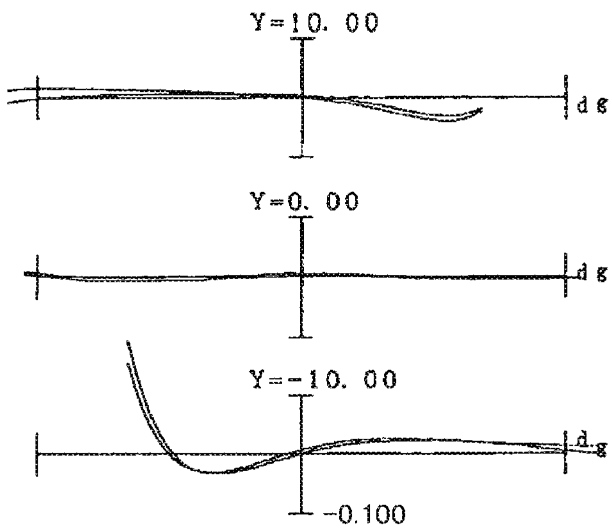
Figure 34A:
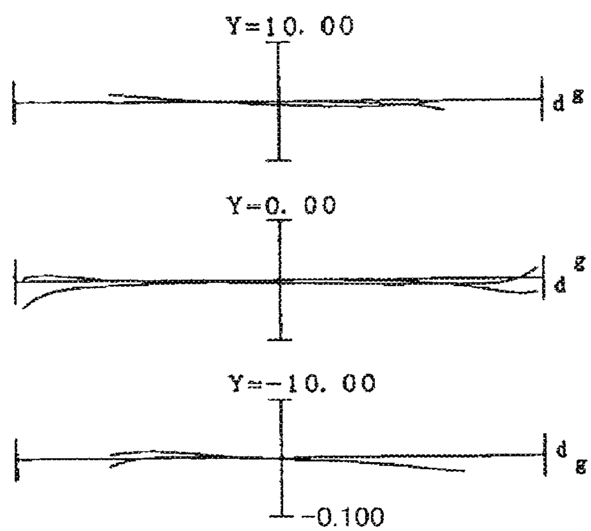
FIGS. 34A, 34B, and 34C are graphs showing lateral aberrations of the zoom optical system (using the lens L52 as the vibration-proof or image-stabilization lens group VR) according to Example 8 upon focusing on infinity with image blur correction performed, respectively in the wide angle end state, the intermediate focal length state, and the telephoto end state.
Figure 34B:
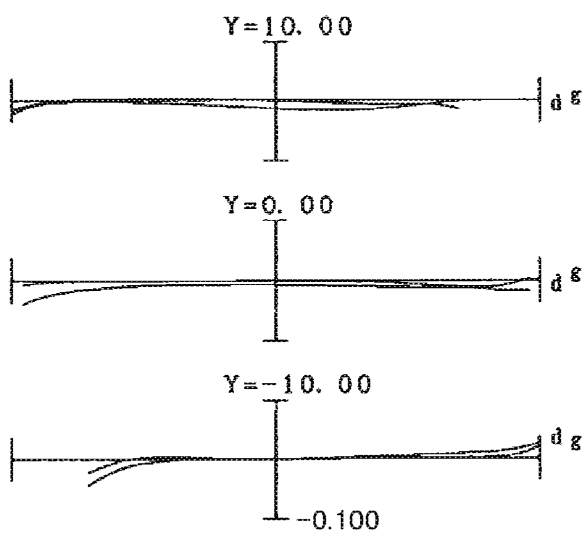
Figure 34C:
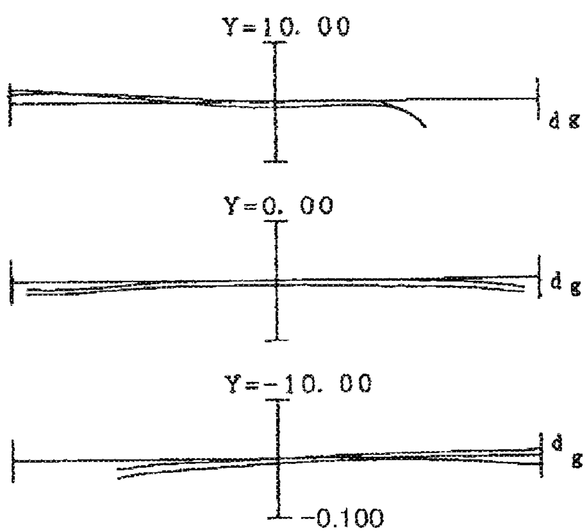

FIG. 31 is various aberration graphs (a spherical aberration graph, an astigmatism graph, a distortion graph, a lateral chromatic aberration graph, and a lateral aberration graph) of the zoom optical system ZL8 according to Example 8 upon focusing on infinity with FIG. 31A corresponding to the wide angle end state, FIG. 31B corresponding to the intermediate focal length state, and FIG. 31C corresponding to the telephoto end state. FIG. 32 is various aberration graphs (a spherical aberration graph, an astigmatism graph, a distortion graph, a lateral chromatic aberration graph, and a lateral aberration graph) of the zoom optical system ZL8 according to Example 8 upon focusing on a short distant object with FIG. 32A corresponding to the wide angle end state, FIG. 32B corresponding to the intermediate focal length state, and FIG. 32C corresponding to the telephoto end state. FIG. 33 is lateral aberration graphs at the time of image blur correction for the zoom optical system ZL8 according to Example 8 with the lens L51 serving as the vibration-proof lens group VR upon focusing on infinity with FIG. 33A corresponding to the wide angle end state, FIG. 33B corresponding to the intermediate focal length state, and FIG. 33C corresponding to the telephoto end state. FIG. 34 is lateral aberration graphs at the time of image blur correction for the zoom optical system ZL8 according to Example 8 with the lens L52 serving as the vibration-proof lens group VR upon focusing on infinity with FIG. 34A corresponding to the wide angle end state, FIG. 34B corresponding to the intermediate focal length state, and FIG. 34C corresponding to the telephoto end state.

It can be seen in FIG. 31 to FIG. 34 that the zoom optical system ZL8 according to Example 8 can achieve an excellent optical performance with various aberrations successfully corrected from the wide angle end state to the telephoto end state and from the infinity focusing state to the short-distant object focusing state. Furthermore, it can be seen that a high imaging performance can be achieved upon image blur correction.

Example 9

Example 9 is described with reference to FIG. 35 to FIG. 40 and Table 9. A zoom optical system ZLI (ZL9) according to Example 9 includes, as illustrated in FIG. 35 (FIG. 36), the first lens group G1 having positive refractive power, the second lens group G2 having negative refractive power, the third lens group G3 having positive refractive power, the fourth lens group G4 having positive refractive power, the fifth lens group G5 having positive refractive power, and the sixth lens group G6 having negative refractive power that are arranged in order from the object side.

Figure 35:
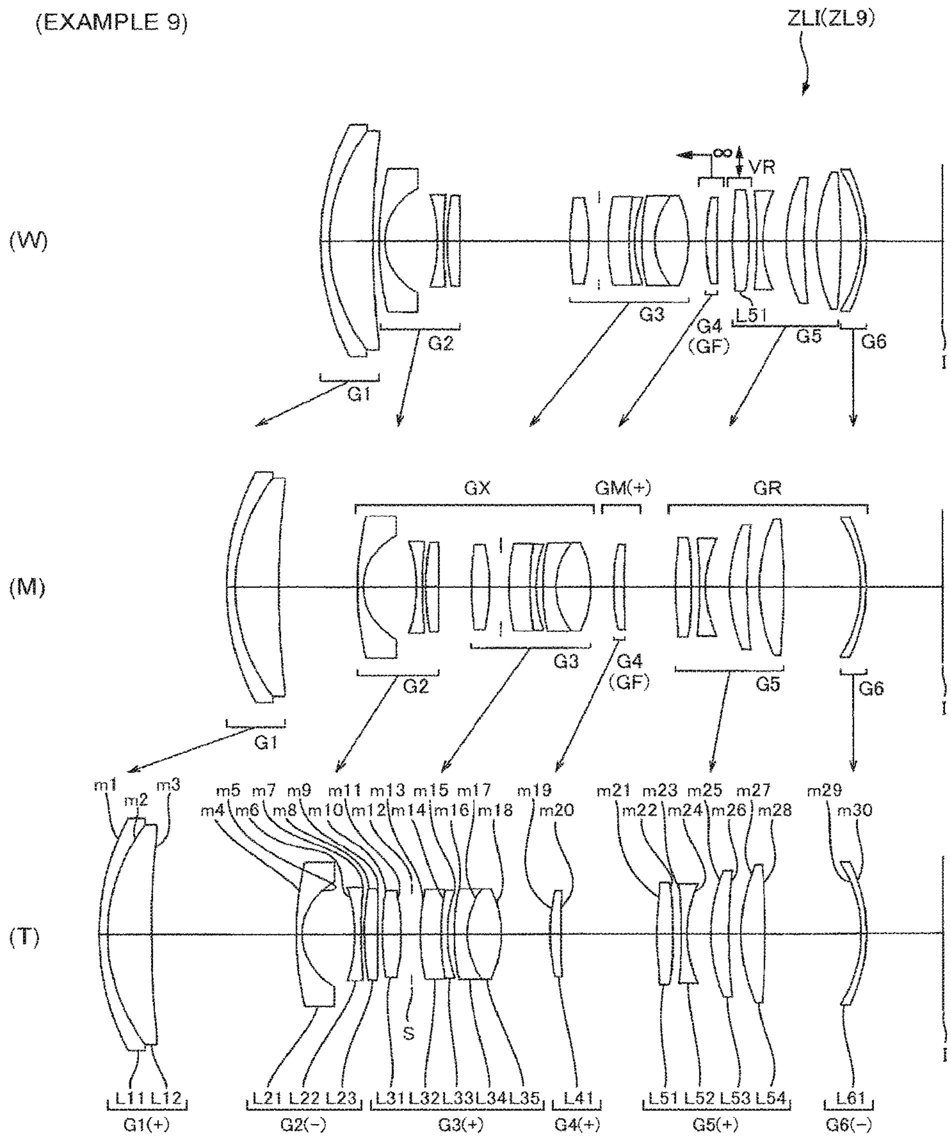
FIG. 35 is a cross-sectional view with sections (W), (M), and (T) showing a zoom optical system (using the lens L51 as the vibration-proof lens group VR) according to Example 9 respectively in the wide angle end state, the intermediate focal length state, and the telephoto end state.

The example illustrated in FIG. 35, the second lens group G2 and the third lens group G3 correspond to the front-side lens group GX. The fourth lens group G4 corresponds to the intermediate lens group GM (focusing lens group GF). The fifth lens group G5 and the sixth lens group G6 correspond to the rear-side lens group GR. The lens L51 forming the fifth lens group G5 corresponds to the vibration-proof lens group VR.

Figure 36:
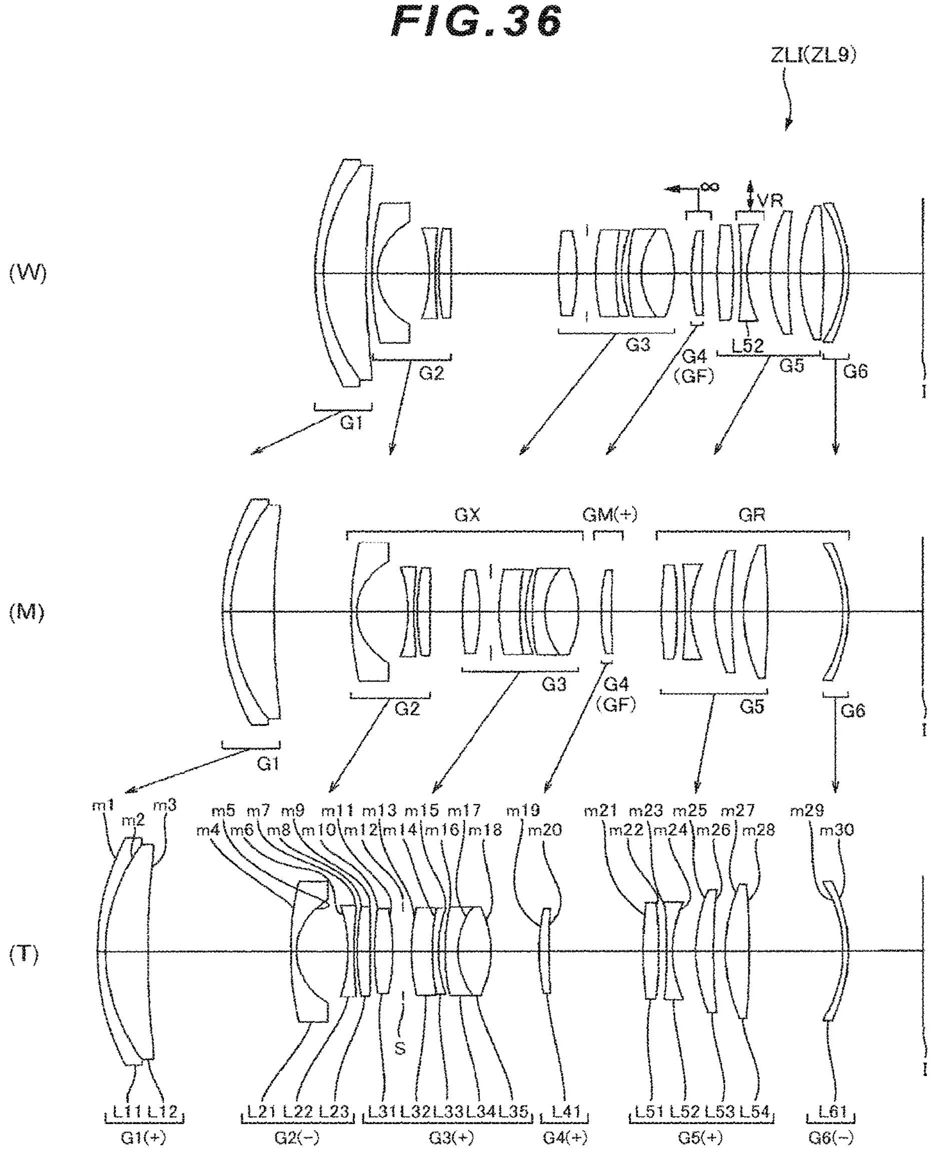
FIG. 36 is a cross-sectional view with sections (W), (M), and (T) showing a zoom optical system (using the lens L52 as the vibration-proof lens group VR) according to Example 9 respectively in the wide angle end state, the intermediate focal length state, and the telephoto end state.

The example illustrated in FIG. 36, the second lens group G2 and the third lens group G3 correspond to the front-side lens group GX. The fourth lens group G4 corresponds to the intermediate lens group GM (focusing lens group GF). The fifth lens group G5 and the sixth lens group G6 correspond to the rear-side lens group GR. The lens L52 forming the fifth lens group G5 corresponds to the vibration-proof lens group VR.

The first lens group G1 includes the cemented lens including the negative meniscus lens L11 having a concave surface facing the image surface side and the positive meniscus lens L12 having a convex surface facing the object side that are arranged in order from the object side.

The second lens group G2 includes the negative meniscus lens L21 having a concave surface facing the image surface side, the biconcave lens L22, and the biconvex lens L23 that are arranged in order from the object side.

The biconcave lens L22 is a glass-molded aspherical lens with lens surfaces, on the object side and on the image surface side, having an aspherical shape.

The third lens group G3 includes the biconvex lens L31; the aperture stop S; the cemented lens including the positive meniscus lens L32 having a convex surface facing the object side and the negative meniscus lens L33 having a concave surface facing the image surface side; and the cemented lens including the negative meniscus lens L34 having a concave surface facing the image surface side and the biconvex lens L35 that are arranged in order from the object side.

The biconvex lens L31 is a glass-molded aspherical lens with a lens surface, on the object side, having an aspherical shape. The negative meniscus lens L34 is a glass-molded aspherical lens with a lens surface, on the object side, having an aspherical shape.

The fourth lens group G4 includes the positive meniscus lens L41 having a convex surface facing the object side.

The fifth lens group G5 includes the biconvex lens L51, the biconcave lens L52, a positive meniscus lens L53 having a convex surface facing the object side, and the biconvex lens L54 that are arranged in order from the object side.

The biconvex lens L51 is a glass-molded aspherical lens with lens surfaces, on the object side and on the image surface side, having an aspherical shape. The biconcave lens L52 is a glass-molded aspherical lens with a lens surface, on the image surface side, having an aspherical shape.

The sixth lens group G6 includes the negative meniscus lens L61 having a concave surface facing the object side.

Upon zooming from the wide angle end state to the telephoto end state, the distance between lens groups changes with the first lens group G1 to the fifth lens group G5 each moved toward the object side, and the sixth lens group G6 fixed.

Upon focusing from infinity to the short-distant object, the fourth lens group G4 moves toward the object side.

When image blur occurs, as illustrated in FIG. 35, image blur correction (vibration isolation) on the image surface I is performed with the lens L51 forming the fifth lens group G5 serving as the vibration-proof lens group VR moved with a displacement component in the direction orthogonal to the optical axis.

In the wide angle end state, the vibration proof coefficient is 0.38 and the focal length is 16.48 (mm), and thus the movement amount of the vibration-proof lens group VR for correcting the roll blur of 0.66° is 0.51 (mm). In the intermediate focal length state, the vibration proof coefficient is 0.49 and the focal length is 34.64 (mm), and thus the movement amount of the vibration-proof lens group VR for correcting the roll blur of 0.46° is 0.57 (mm). In the telephoto end state, the vibration proof coefficient is 0.52 and the focal length is 58.22 (mm), and thus the movement amount of the vibration-proof lens group VR for correcting the roll blur of 0.35° is 0.69 (mm).

In this Example, when image blur occurs, as illustrated in FIG. 36, image blur correction (vibration isolation) on the image surface I may be performed with the lens L52 forming the fifth lens group G5 serving as the vibration-proof lens group VR moved with a displacement component in the direction orthogonal to the optical axis.

In the wide angle end state, the vibration proof coefficient is −1.09 and the focal length is 16.48 (mm), and thus the movement amount of the vibration-proof lens group VR for correcting the roll blur of 0.66° is −0.18 (mm). In the intermediate focal length state, the vibration proof coefficient is −1.46 and the focal length is 34.64 (mm), and thus the movement amount of the vibration-proof lens group VR for correcting the roll blur of 0.46° is −0.19 (mm). In the telephoto end state, the vibration proof coefficient is −1.58 and the focal length is 58.22 (mm), and thus the movement amount of the vibration-proof lens group VR for correcting the roll blur of 0.35° is −0.23 (mm).

In Table 9 below, specification values in Example 9 are listed. Surface numbers 1 to 30 in Table 9 respectively correspond to the optical surfaces m1 to m30 in FIG. 35 (FIG. 36).

TABLE 9

[Lens specifications]

| Surface number | R | D | nd | vd |
|---|---|---|---|---|
| Obj surface | ∞ | | | |
| 1 | 49.45687 | 1.500 | 1.94594 | 18.0 |
| 2 | 36.05142 | 7.422 | 1.80400 | 46.6 |
| 3 | 182.73858 | (D3) | 1.00000 | |
| 4 | 62.21144 | 1.000 | 1.80400 | 46.6 |
| 5 | 11.36518 | 9.019 | 1.00000 | |
| *6 | −34.02591 | 1.000 | 1.72903 | 54.0 |
| *7 | 59.56235 | 0.635 | 1.00000 | |
| 8 | 53.35980 | 2.208 | 1.94594 | 18.0 |
| 9 | −520.59677 | (D9) | 1.00000 | |
| *10 | 48.74985 | 3.200 | 1.72903 | 54.0 |
| 11 | −39.98129 | 1.800 | 1.00000 | |
| 12 | (stop S) | 1.500 | 1.00000 | |
| 13 | 40.73217 | 3.600 | 1.48749 | 70.3 |
| 14 | 55.90792 | 1.000 | 1.78472 | 25.6 |
| 15 | 26.30167 | 1.200 | 1.00000 | |
| *16 | 53.91013 | 2.184 | 1.72903 | 54.0 |
| 17 | 14.60197 | 5.855 | 1.49782 | 82.6 |
| 18 | −21.69065 | (D18) | 1.00000 | |
| 19 | 42.13616 | 1.825 | 1.49782 | 82.6 |
| 20 | 237.39522 | (D20) | 1.00000 | |
| *21 | 47.17680 | 2.761 | 1.55332 | 71.7 |
| *22 | −706.53520 | 1.500 | 1.00000 | |
| 23 | −100.28754 | 1.000 | 1.82080 | 42.7 |
| *24 | 23.18550 | 4.031 | 1.00000 | |
| 25 | 31.73237 | 3.065 | 1.59319 | 67.9 |
| 26 | 115.97342 | 2.129 | 1.00000 | |
| 27 | 33.27145 | 4.200 | 1.48749 | 70.3 |
| 28 | −144.40572 | (D28) | 1.00000 | |
| 29 | −26.64822 | 0.900 | 1.71736 | 29.6 |
| 30 | −33.43786 | (D30) | 1.00000 | |
| Img surface | ∞ | | | |

[Aspherical data]

| Surface | κ | A4 | A6 | A8 | A10 |
|---|---|---|---|---|---|
| 6 | 1.00000e+00 | −4.69588e−05 | 3.57214e−07 | −1.35769e−09 | −1.23340e−11 |
| 7 | 1.00000e+00 | −6.31417e−05 | 4.33769e−07 | −2.98689e−09 | 0.00000e+00 |
| 10 | 1.00000e+00 | −3.33886e−05 | −8.50862e−09 | 6.57751e−11 | −1.10130e−12 |
| 16 | 1.00000e+00 | 3.56341e−05 | 2.95618e−08 | 4.30018e−10 | −3.03421e−12 |
| 21 | 1.00000e+00 | −4.67403e−05 | −4.29180e−07 | 6.51605e−09 | −3.80050e−11 |
| 22 | 1.00000e+00 | −5.25513e−05 | −5.32941e−07 | 1.01564e−08 | −6.36780e−11 |
| 24 | 1.00000e+00 | −3.65458e−06 | 5.64899e−08 | −2.32781e−09 | 1.69874e−11 |

[Various data]
Zoom ratio 3.53

| | Wide angle end | Intermediate | Telephoto end |
|---|---|---|---|
| f | 16.48 | 34.64 | 58.22 |
| FNo | 2.88 | 4.00 | 4.12 |
| ω | 40.8 | 22.4 | 13.8 |
| Y | 12.53 | 13.69 | 13.92 |
| TL | 106.299 | 122.339 | 144.292 |
| BF | 13.038 | 13.038 | 13.038 |
| BF(air) | 13.038 | 13.038 | 13.038 |

[Variable distance data]

| | Upon focusing on infinity | | | Upon focusing on short distant object | | |
|---|---|---|---|---|---|---|
| | Wide angle end | Intermediate | Telephoto end | Wide angle end | Intermediate | Telephoto end |
| f | 16.48 | 34.64 | 58.22 | — | — | — |
| β | — | — | — | −0.1003 | −0.0840 | −0.1283 |
| D0 | ∞ | ∞ | ∞ | 143.70 | 377.66 | 405.71 |
| D3 | 1.000 | 13.429 | 24.874 | 1.000 | 13.429 | 24.874 |
| D9 | 18.736 | 5.550 | 0.800 | 18.736 | 5.550 | 0.800 |
| D18 | 3.000 | 4.000 | 8.400 | 0.517 | 0.419 | 0.235 |
| D20 | 2.622 | 8.667 | 16.304 | 5.105 | 12.247 | 24.469 |

TABLE 9-continued

| | | | | | | |
|---|---|---|---|---|---|---|
| D28 | 3.371 | 13.123 | 16.343 | 3.371 | 13.123 | 16.343 |
| D30 | 13.038 | 13.038 | 13.038 | 13.038 | 13.038 | 13.038 |

[Lens group data]

| | Group starting surface | Group focal length |
|---|---|---|
| First lens group | 1 | 89.38 |
| Second lens group | 4 | −13.03 |
| Third lens group | 10 | 26.87 |
| Fourth lens group | 19 | 102.59 |
| Fifth lens group | 21 | 181.59 |
| Sixth lens group | 29 | −193.67 |

[Conditional expression corresponding value]

Conditional expression(JC1) |fF/fRF| = 0.565
Conditional expression(JC2) (DMRT − DMRW)/fF = 0.133
Conditional expression(JC3) Wω = 40.846
Conditional expression(JC4) Tω = 13.754
Conditional expression(JC5) fRF/fRF2 = −0.938
Conditional expression(JC6) DGXR/fXR = 0.757
Conditional expression(JD1) fV/fRF = 0.441(in the event that the vibration-proof lens group comprises lens L51)
fV/fRF = −0.126(in the event that the vibration-proof lens group comprises lens L52)
Conditional expression(JD2) DVW/fV = 0.019(in the event that the vibration-proof lens group comprises lens L51)
DVW/fV = −0.176(in the event that the vibration-proof lens group comprises lens L52)
Conditional expression(JD3) Wω = 40.846
Conditional expression(JD4) fF/fXR = 3.818
Conditional expression(JD5) (−fXn)/fXR = 0.485
Conditional expression(JD6) DGXR/fXR = 0.757
Conditional expression(JE1) DVW/fV = 0.019(in the event that the vibration-proof lens group comprises lens L51)
Conditional expression(JE2) Wω = 40.846
Conditional expression(JE3) fF/fW = 6.224
Conditional expression(JE4) fV/fRF = 0.441(in the event that the vibration-proof lens group comprises lens L51)
Conditional expression(JE5) fF/fXR = 3.818
Conditional expression(JE6) DGXR/fXR = 0.757
Conditional expression(JE7) DXnW/ZD1 = 0.436
Conditional expression(JF1) fF/fV = 1.282(in the event that the vibration-proof lens group comprises lens L51)
fF/fV = −4.488(in the event that the vibration-proof lens group comprises lens L52)
Conditional expression(JF2) fV/fRF = 0.441(in the event that the vibration-proof lens group comprises lens L51)
fV/fRF = −0.126(in the event that the vibration-proof lens group comprises lens L52)
Conditional expression(JF3) DVW/fV = 0.019(in the event that the vibration-proof lens group comprises lens L51)
DVW/fV = −0.176(in the event that the vibration-proof lens group comprises lens L52)
Conditional expression(JF4) Wω = 40.846
Conditional expression(JF5) fF/fXR = 3.818
Conditional expression(JF6) DGXR/fXR = 0.757
Conditional expression(JF7) TLW/ZD1 = 2.552
Conditional expression(JI1) (rB + rA)/(rB − rA) = 0.320
Conditional expression(JI2) (rC + rB)/(rC − rB) = 1.432
Conditional expression(JI3) |fF/fXR| = 3.818
Conditional expression(JI4) vdp = 82.570

It can be seen in Table 9 that the zoom optical system ZL9 according to Example 9 satisfies the conditional expressions (JC1) to (JC6), (JD1) to (JD6), (JE1) to (JE7), (JF1) to (JF7), and (JI1) to (JI4).

Figure 37A:
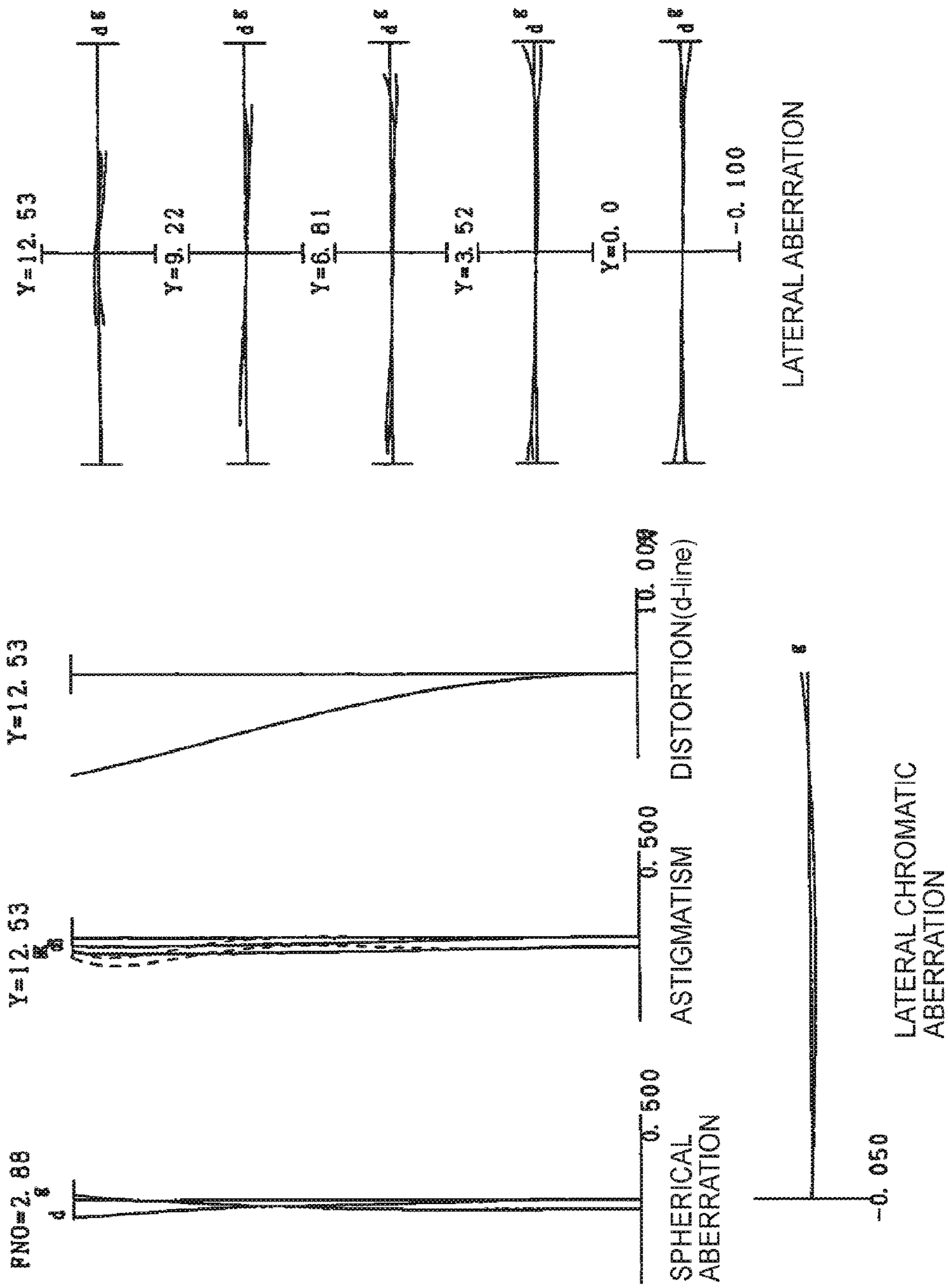
FIGS. 37A, 37B, and 37C are graphs showing various aberrations of the zoom optical system according to Example 9 upon focusing on infinity respectively in the wide angle end state, the intermediate focal length state, and the telephoto end state.
Figure 37B:
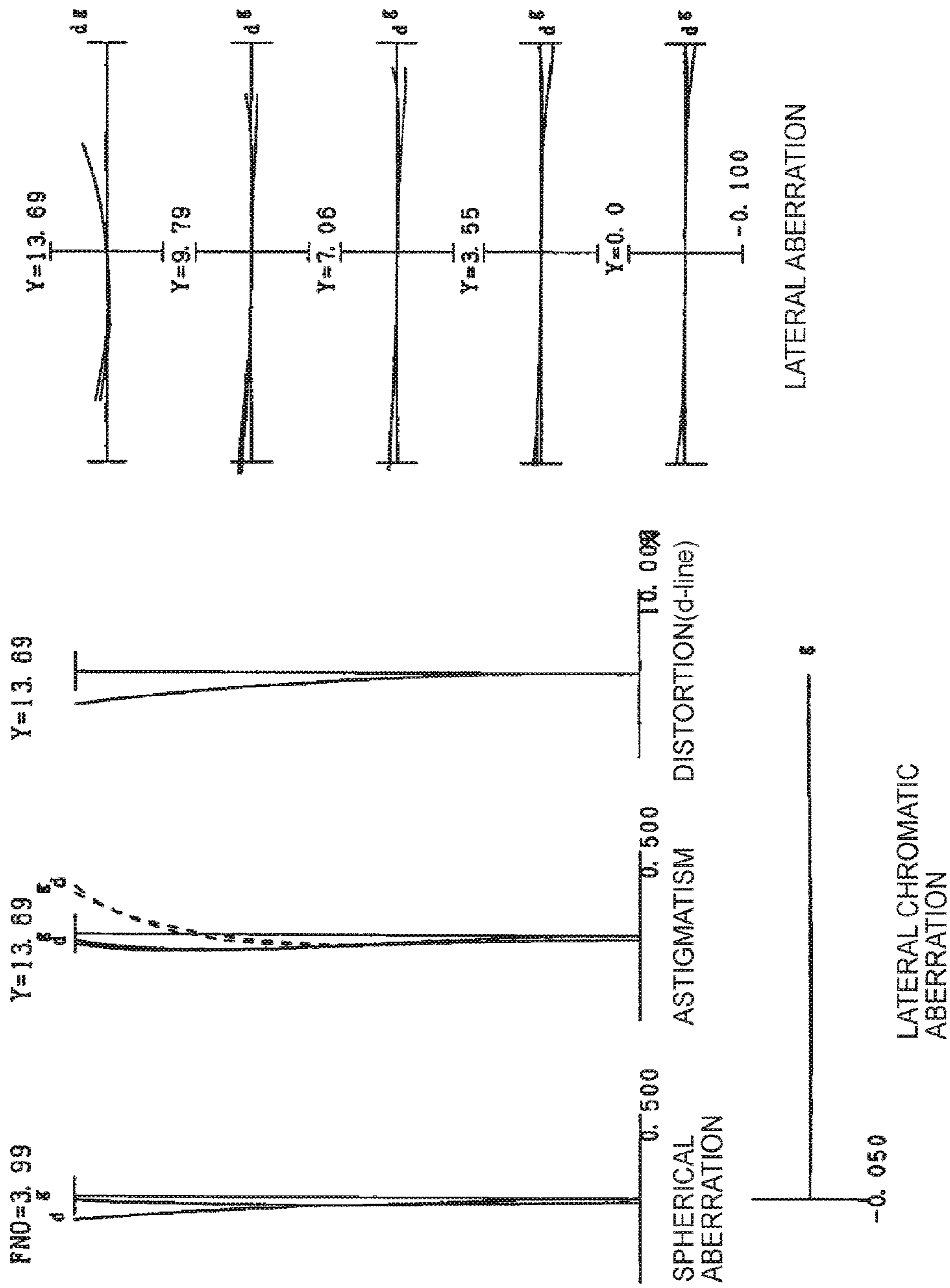
Figure 37C:
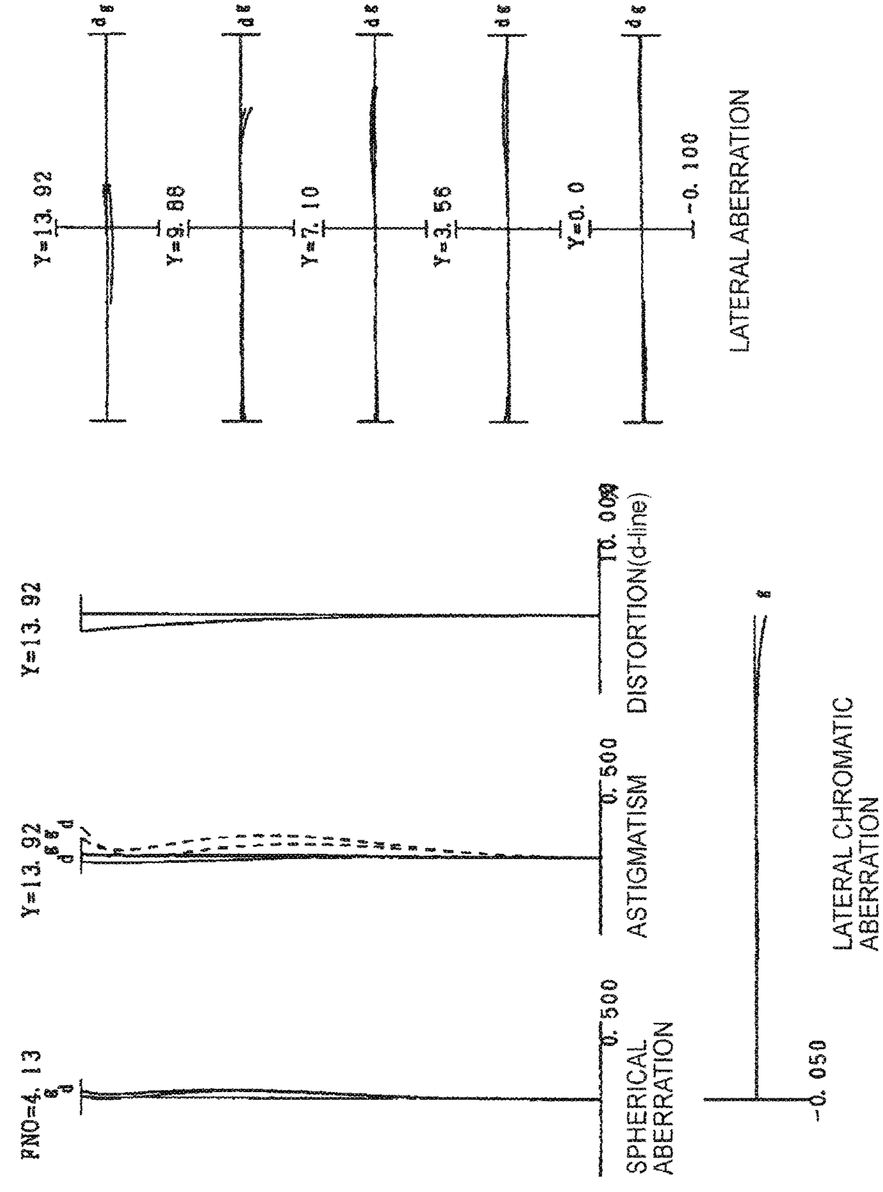
Figure 38A:
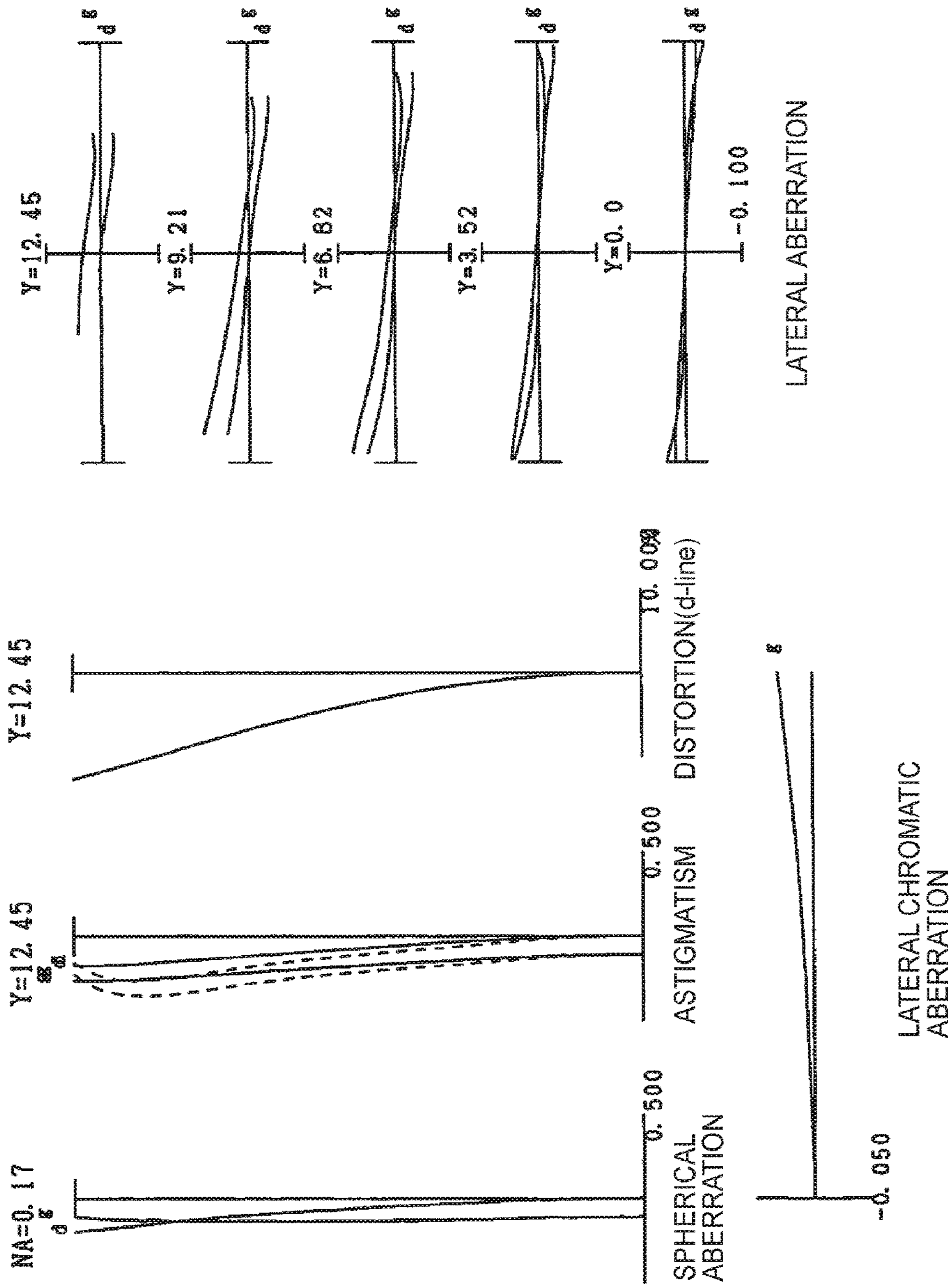
FIGS. 38A, 38B, and 38C are graphs showing various aberrations of the zoom optical system according to Example 9 upon focusing on a short distant object respectively in the wide angle end state, the intermediate focal length state, and the telephoto end state.
Figure 38B:
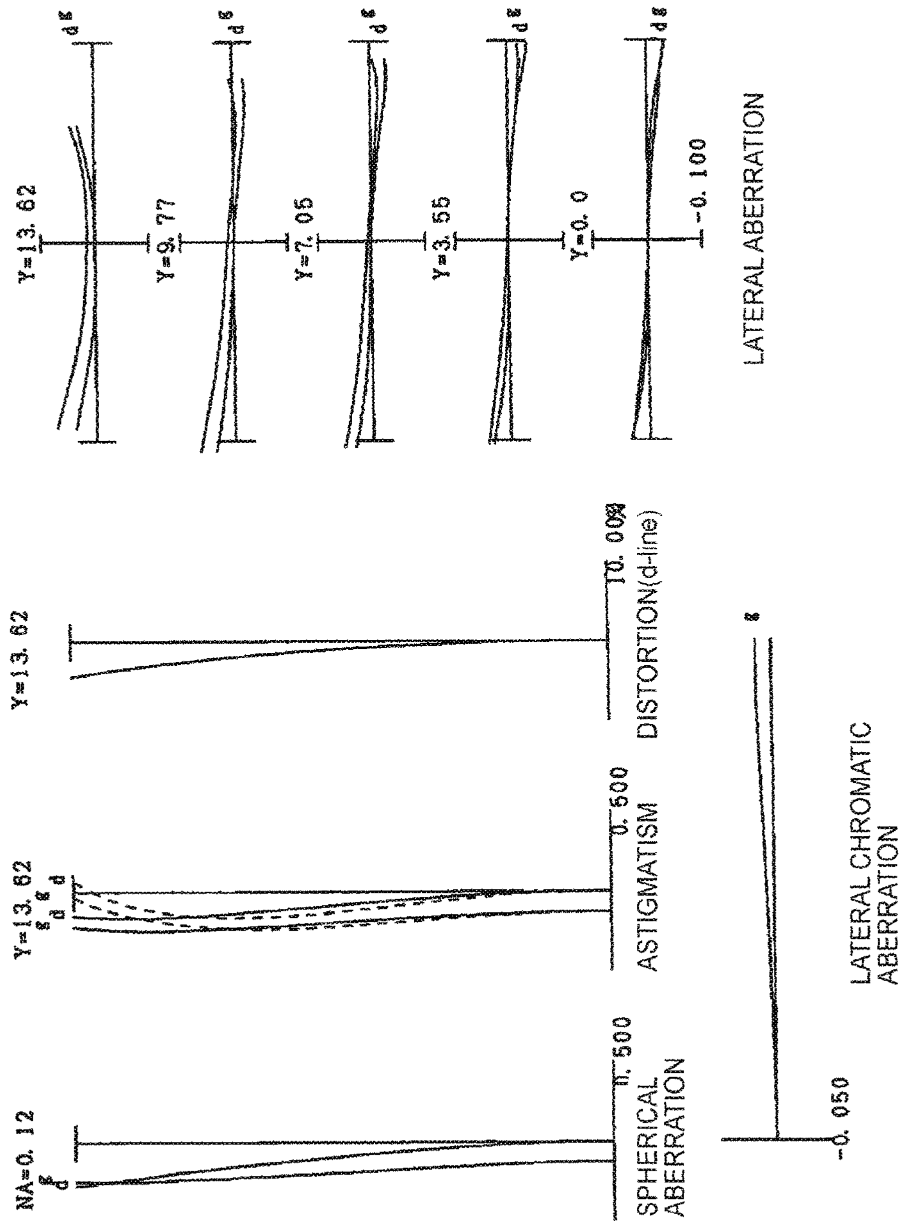
Figure 38C:
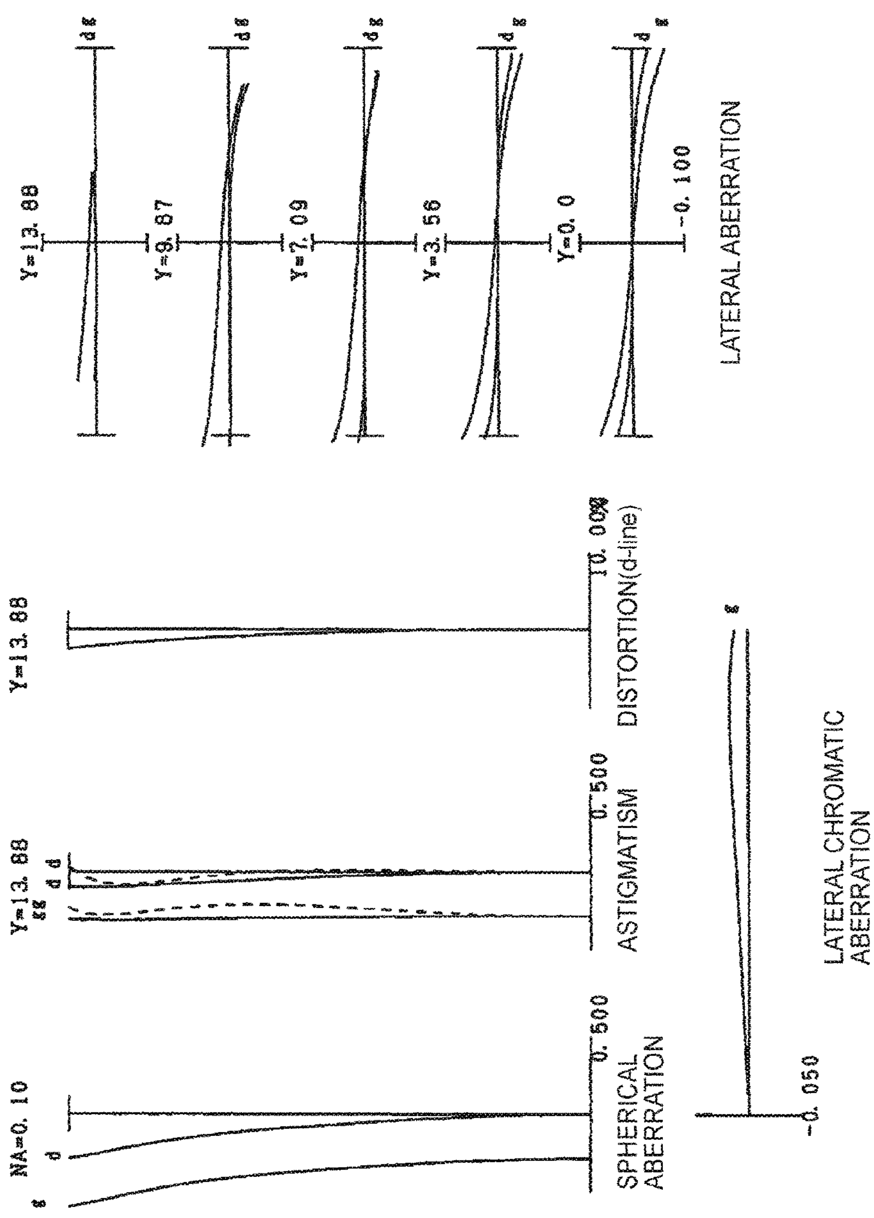
Figure 39A:
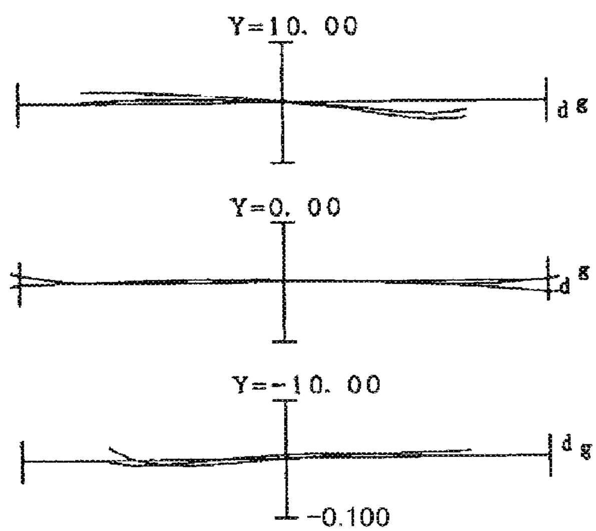
FIGS. 39A, 39B, and 39C are graphs showing lateral aberrations of the zoom optical system (using the lens L51 as the vibration-proof lens group VR) according to Example 9 upon focusing on infinity with image blur correction performed, respectively in the wide angle end state, the intermediate focal length state, and the telephoto end state.
Figure 39B:
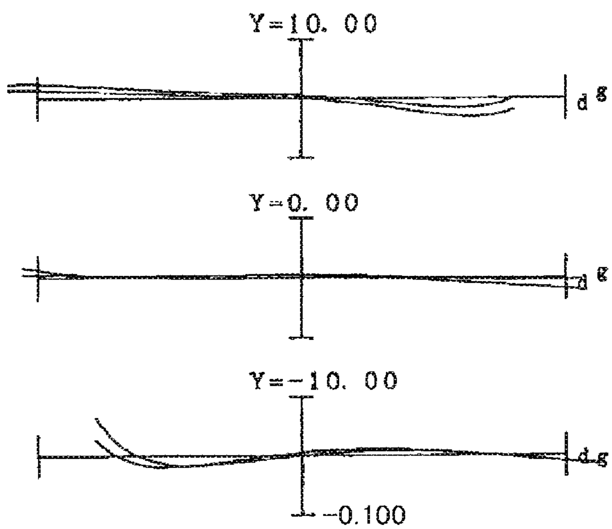
Figure 39C:
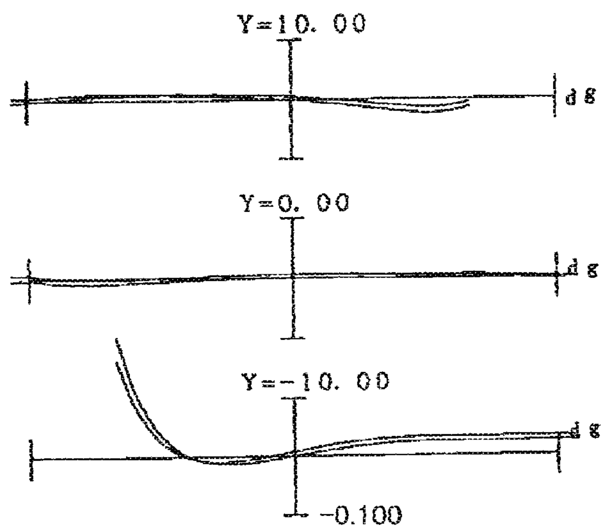
Figure 40A:
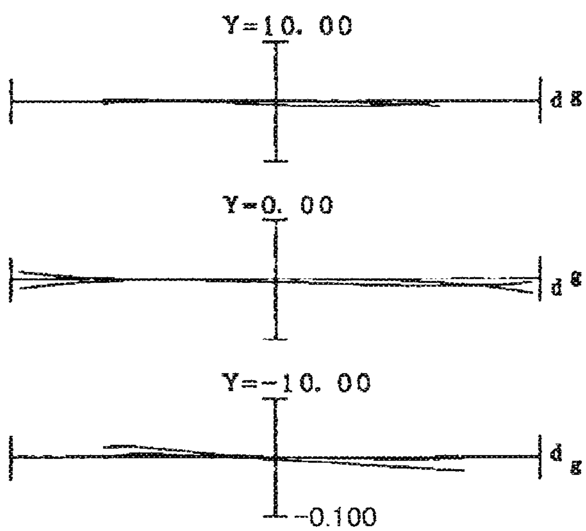
FIGS. 40A, 40B, and 40C are graphs showing lateral aberrations of the zoom optical system (using the lens L52 as the vibration-proof lens group VR) according to Example 9 upon focusing on infinity with image blur correction performed, respectively in the wide angle end state, the intermediate focal length state, and the telephoto end state.
Figure 40B:
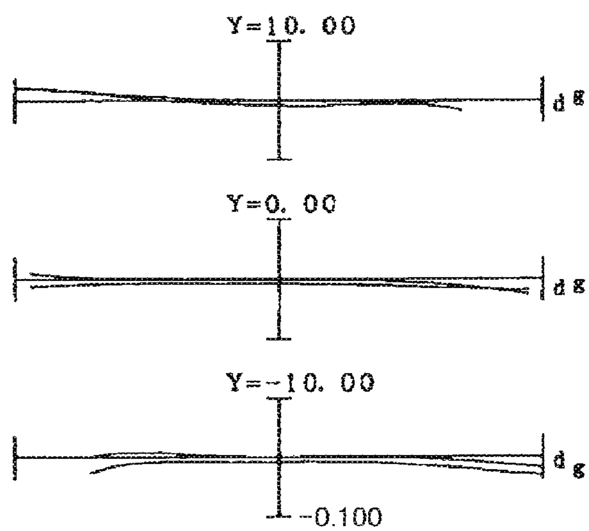
Figure 40C:
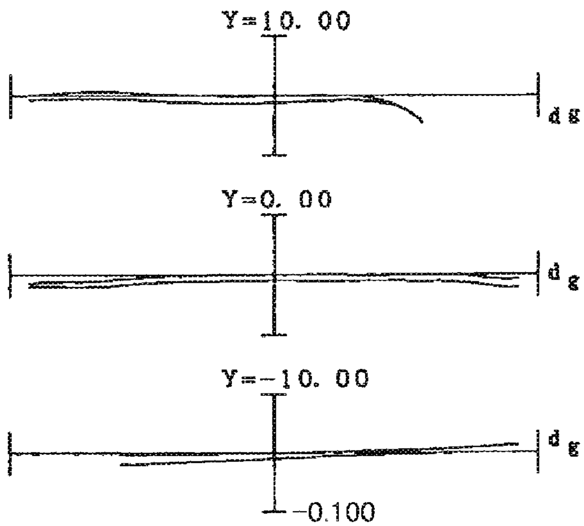

FIG. 37 is various aberration graphs (a spherical aberration graph, an astigmatism graph, a distortion graph, a lateral chromatic aberration graph, and a lateral aberration graph) of the zoom optical system ZL9 according to Example 9 upon focusing on infinity with FIG. 37A corresponding to the wide angle end state, FIG. 37B corresponding to the intermediate focal length state, and FIG. 37C corresponding to the telephoto end state. FIG. 38 is various aberration graphs (a spherical aberration graph, an astigmatism graph, a distortion graph, a lateral chromatic aberration graph, and a lateral aberration graph) of the zoom optical system ZL9 according to Example 9 upon focusing on a short distant object with FIG. 38A corresponding to the wide angle end state, FIG. 38B corresponding to the intermediate focal length state, and FIG. 38C corresponding to the telephoto end state. FIG. 39 is lateral aberration graphs at the time of image blur correction for the zoom optical system ZL9 according to Example 9 with the lens L51 serving as the vibration-proof lens group VR upon focusing on infinity with FIG. 39A corresponding to the wide angle end state, FIG. 39B corresponding to the intermediate focal length state, and FIG. 39C corresponding to the telephoto end state. FIG. 40 is lateral aberration graphs at the time of image blur correction for the zoom optical system ZL9 according to Example 9 with the lens L52 serving as the vibration-proof lens group VR upon focusing on infinity with FIG. 40A corresponding to the wide angle end state, FIG. 40B corresponding to the intermediate focal length state, and FIG. 40C corresponding to the telephoto end state.

It can be seen in FIG. 37 to FIG. 40 that the zoom optical system ZL9 according to Example 9 can achieve an excellent optical performance with various aberrations successfully corrected from the wide angle end state to the telephoto end state and from the infinity focusing state to the short-distant object focusing state. Furthermore, it can be seen that a high imaging performance can be achieved upon image blur correction.

Example 10

Example 10 is described with reference to FIG. 41 to FIG. 46 and Table 10. A zoom optical system ZLI (ZL10) according to Example 10 includes, as illustrated in FIG. 41 (FIG. 42), the first lens group G1 having positive refractive power, the second lens group G2 having negative refractive power, the third lens group G3 having positive refractive power, the fourth lens group G4 having positive refractive power, the fifth lens group G5 having positive refractive power, and the sixth lens group G6 having negative refractive power that are arranged in order from the object side.

Figure 41:
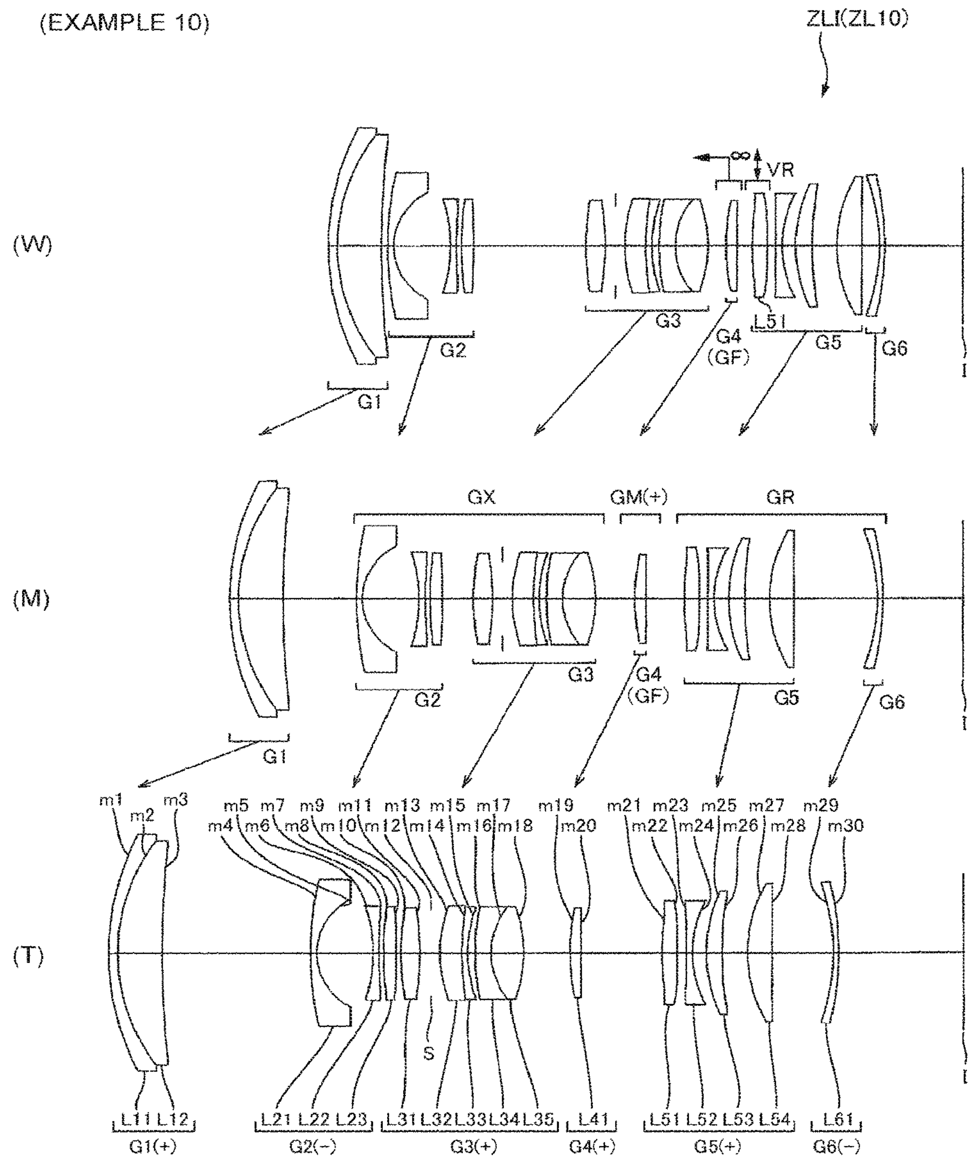
FIG. 41 is a cross-sectional view with sections (W), (M), and (T) showing a zoom optical system (using the lens L51 as the vibration-proof lens group VR) according to Example 10 respectively in the wide angle end state, the intermediate focal length state, and the telephoto end state.

The example illustrated in FIG. 41, the second lens group G2 and the third lens group G3 correspond to the front-side lens group GX. The fourth lens group G4 corresponds to the intermediate lens group GM (focusing lens group GF). The fifth lens group G5 and the sixth lens group G6 correspond to the rear-side lens group GR. The lens L51 forming the fifth lens group G5 corresponds to the vibration-proof lens group VR.

Figure 42:
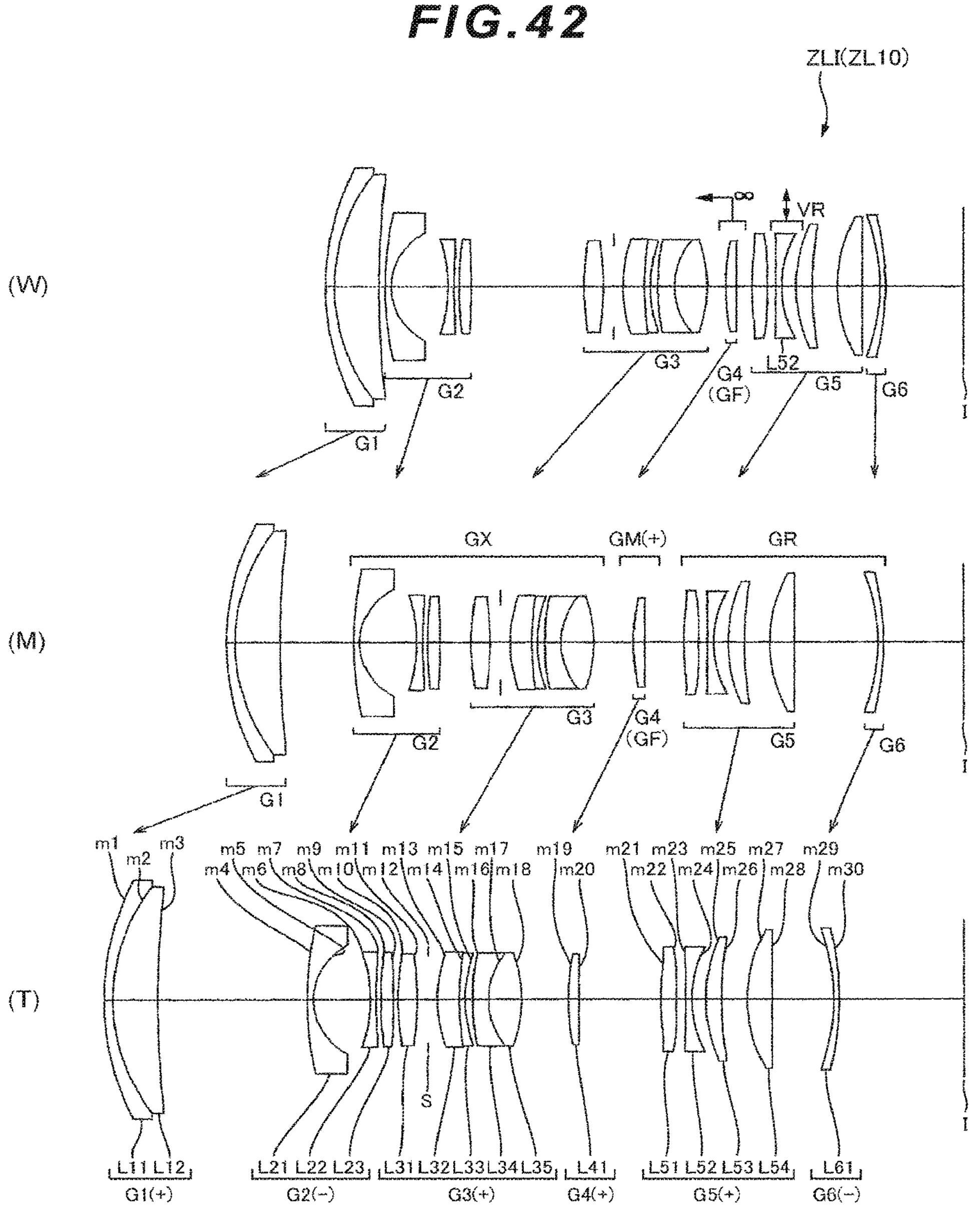
FIG. 42 is a cross-sectional view with sections (W), (M), and (T) showing a zoom optical system (using the lens L52 as the vibration-proof lens group VR) according to Example 10 respectively in the wide angle end state, the intermediate focal length state, and the telephoto end state.

The example illustrated in FIG. 42, the second lens group G2 and the third lens group G3 correspond to the front-side lens group GX. The fourth lens group G4 corresponds to the intermediate lens group GM (focusing lens group GF). The fifth lens group G5 and the sixth lens group G6 correspond to the rear-side lens group GR. The lens L52 forming the fifth lens group G5 corresponds to the vibration-proof lens group VR.

The first lens group G1 includes the cemented lens including the negative meniscus lens L11 having a concave surface facing the image surface side and the positive meniscus lens L12 having a convex surface facing the object side that are arranged in order from the object side.

The second lens group G2 includes the negative meniscus lens L21 having a concave surface facing the image surface side, the biconcave lens L22, and the biconvex lens L23 that are arranged in order from the object side.

The biconcave lens L22 is a glass-molded aspherical lens with lens surfaces, on the object side and on the image surface side, having an aspherical shape.

The third lens group G3 includes the biconvex lens L31; the aperture stop S; the cemented lens including the positive meniscus lens L32 having a convex surface facing the object side and the negative meniscus lens L33 having a concave surface facing the image surface side; and the cemented lens including the negative meniscus lens L34 having a concave surface facing the image surface side and the biconvex lens L35 that are arranged in order from the object side.

The biconvex lens L31 is a glass-molded aspherical lens with a lens surface, on the object side, having an aspherical shape. The negative meniscus lens L34 is a glass-molded aspherical lens with a lens surface, on the object side, having an aspherical shape.

The fourth lens group G4 includes the positive meniscus lens L41 having a convex surface facing the object side.

The fifth lens group G5 includes the biconvex lens L51, the biconcave lens L52, the positive meniscus lens L53 having a convex surface facing the object side, and the biconvex lens L54 that are arranged in order from the object side.

The biconvex lens L51 is a glass-molded aspherical lens with lens surfaces, on the object side and on the image surface side, having an aspherical shape. The biconcave lens L52 is a glass-molded aspherical lens with a lens surface, on the image surface side, having an aspherical shape.

The sixth lens group G6 includes the negative meniscus lens L61 having a concave surface facing the object side.

Upon zooming from the wide angle end state to the telephoto end state, the distance between lens groups changes with the first lens group G1 to the sixth lens group G6 each moved toward the object side.

Upon focusing from infinity to the short-distant object, the fourth lens group G4 moves toward the object side.

When image blur occurs, as illustrated in FIG. 41, image blur correction (vibration isolation) on the image surface I is performed with the lens L51 forming the fifth lens group G5 serving as the vibration-proof lens group VR moved with a displacement component in the direction orthogonal to the optical axis.

In the wide angle end state, the vibration proof coefficient is 0.38 and the focal length is 16.48 (mm), and thus the movement amount of the vibration-proof lens group VR for correcting the roll blur of 0.66° is 0.50 (mm). In the intermediate focal length state, the vibration proof coefficient is 0.51 and the focal length is 34.61 (mm), and thus the movement amount of the vibration-proof lens group VR for correcting the roll blur of 0.46° is 0.54 (mm). In the telephoto end state, the vibration proof coefficient is 0.56 and the focal length is 58.20 (mm), and thus the movement amount of the vibration-proof lens group VR for correcting the roll blur of 0.35° is 0.64 (mm).

In this Example, when image blur occurs, as illustrated in FIG. 42, image blur correction (vibration isolation) on the image surface I may be performed with the lens L52 forming the fifth lens group G5 serving as the vibration-proof lens group VR moved with a displacement component in the direction orthogonal to the optical axis.

In the wide angle end state, the vibration proof coefficient is −1.07 and the focal length is 16.48 (mm), and thus the movement amount of the vibration-proof lens group VR for correcting the roll blur of 0.66° is −0.18 (mm). In the intermediate focal length state, the vibration proof coefficient is −1.51 and the focal length is 34.61 (mm), and thus the movement amount of the vibration-proof lens group VR for correcting the roll blur of 0.46° is −0.18 (mm). In the telephoto end state, the vibration proof coefficient is −1.66 and the focal length is 58.20 (mm), and thus the movement amount of the vibration-proof lens group VR for correcting the roll blur of 0.35° is −0.22 (mm).

In Table 10 below, specification values in Example 10 are listed. Surface numbers 1 to 30 in Table 10 respectively correspond to the optical surfaces m1 to m30 in FIG. 41 (FIG. 42).

TABLE 10

[Lens specifications]

| Surface number | R | D | nd | νd |
|---|---|---|---|---|
| Obj surface | ∞ | | | |
| 1 | 49.78243 | 1.500 | 1.94594 | 18.0 |
| 2 | 35.86372 | 7.402 | 1.80400 | 46.6 |
| 3 | 189.18021 | (D3) | 1.00000 | |
| 4 | 65.76146 | 1.000 | 1.80400 | 46.6 |
| 5 | 11.29701 | 9.472 | 1.00000 | |
| *6 | −33.17281 | 1.000 | 1.72903 | 54.0 |
| *7 | 76.05400 | 0.811 | 1.00000 | |
| 8 | 77.87737 | 2.053 | 1.94594 | 18.0 |
| 9 | −132.46424 | (D9) | 1.00000 | |
| *10 | 47.23987 | 3.200 | 1.72903 | 54.0 |
| 11 | −56.29315 | 1.800 | 1.00000 | |
| 12 | (stop S) | 1.500 | 1.00000 | |
| 13 | 27.78078 | 3.600 | 1.48749 | 70.3 |
| 14 | 56.24176 | 1.000 | 1.78472 | 25.6 |
| 15 | 27.11197 | 1.200 | 1.00000 | |
| *16 | 53.80018 | 2.710 | 1.72903 | 54.0 |
| 17 | 13.92675 | 5.537 | 1.49782 | 82.6 |
| 18 | −25.09848 | (D18) | 1.00000 | |
| 19 | 45.33900 | 1.837 | 1.49782 | 82.6 |
| 20 | 1599.96080 | (D20) | 1.00000 | |
| *21 | 45.65101 | 2.532 | 1.55332 | 71.7 |
| *22 | −1447.10910 | 1.500 | 1.00000 | |
| 23 | −452.24207 | 1.000 | 1.82080 | 42.7 |
| *24 | 20.22114 | 2.400 | 1.00000 | |
| 25 | 28.39789 | 2.688 | 1.59319 | 67.9 |
| 26 | 71.92350 | 4.215 | 1.00000 | |
| 27 | 27.16600 | 4.200 | 1.48749 | 70.3 |
| 28 | −4665.16500 | (D28) | 1.00000 | |
| 29 | −38.79932 | 0.900 | 1.71736 | 29.6 |
| 30 | −56.54936 | (D30) | 1.00000 | |
| Img surface | ∞ | | | |

[Aspherical data]

| Surface | κ | A4 | A6 | A8 | A10 |
|---|---|---|---|---|---|
| 6 | 1.00000e+00 | −4.94676e−05 | 3.71757e−07 | −1.44242e−09 | −1.29921e−11 |
| 7 | 1.00000e+00 | −6.87910e−05 | 4.47896e−07 | −3.21751e−09 | 0.00000e+00 |
| 10 | 1.00000e+00 | −2.34156e−05 | −1.78545e−08 | 2.23796e−10 | −2.47091e−12 |
| 16 | 1.00000e+00 | 2.60151e−05 | 1.85464e−08 | 4.45711e−10 | −2.73163e−12 |
| 21 | 1.00000e+00 | −5.37696e−05 | −4.53146e−07 | 5.81104e−09 | −3.49284e−11 |
| 22 | 1.00000e+00 | −6.07160e−05 | −5.10190e−07 | 8.74421e−09 | −5.59878e−11 |
| 24 | 1.00000e+00 | −3.13598e−06 | 3.51177e−08 | −2.23705e−09 | 1.68047e−11 |

[Various data]
Zoom ratio 3.53

| | Wide angle end | Intermediate | Telephoto end |
|---|---|---|---|
| f | 16.48 | 34.61 | 58.20 |
| FNo | 2.88 | 4.00 | 4.12 |
| ω | 40.8 | 22.4 | 13.8 |
| Y | 12.52 | 13.61 | 13.91 |
| TL | 106.296 | 122.654 | 142.974 |
| BF | 13.035 | 13.326 | 20.633 |
| BF(air) | 13.035 | 13.326 | 20.633 |

[Variable distance data]

| | Upon focusing on infinity | | | Upon focusing on short distant object | | |
|---|---|---|---|---|---|---|
| | Wide angle end | Intermediate | Telephoto end | Wide angle end | Intermediate | Telephoto end |
| f | 16.48 | 34.61 | 58.20 | — | — | — |
| β | — | — | — | −0.1004 | −0.1450 | −0.1279 |
| D0 | ∞ | ∞ | ∞ | 143.70 | 207.35 | 407.03 |
| D3 | 1.000 | 12.229 | 24.863 | 1.000 | 12.229 | 24.863 |
| D9 | 18.828 | 5.162 | 0.800 | 18.828 | 5.162 | 0.800 |
| D18 | 3.000 | 6.584 | 7.754 | 0.633 | 0.720 | 0.369 |
| D20 | 2.518 | 6.412 | 13.599 | 4.885 | 12.275 | 20.984 |

TABLE 10-continued

| | | | | | | |
|---|---|---|---|---|---|---|
| D28 | 2.858 | 13.885 | 10.268 | 2.858 | 13.885 | 10.268 |
| D30 | 13.035 | 13.326 | 20.633 | 13.035 | 13.326 | 20.633 |

[Lens group data]

| | Group starting surface | Group focal length |
|---|---|---|
| First lens group | 1 | 89.47 |
| Second lens group | 4 | −13.41 |
| Third lens group | 10 | 27.83 |
| Fourth lens group | 19 | 93.69 |
| Fifth lens group | 21 | 216.45 |
| Sixth lens group | 29 | −176.04 |

[Conditional expression corresponding value]

Conditional expression(JB1) (DMRT − DMRW)/fF = 0.118
Conditional expression(JB2) Wω = 40.847
Conditional expression(JB3) Tω = 13.758
Conditional expression(JB4) fF/fRF = 0.433
Conditional expression(JB5) fF/fXR = 3.367
Conditional expression(JB6) DGXR/fXR = 0.738
Conditional expression(JC1) |fF/fRF| = 0.433
Conditional expression(JC2) (DMRT − DMRW)/fF = 0.118
Conditional expression(JC3) Wω = 40.847
Conditional expression(JC4) Tω = 13.758
Conditional expression(JC5) fRF/fRF2 = −1.230
Conditional expression(JC6) DGXR/fXR = 0.738
Conditional expression(JD1) fV/fRF = 0.370(in the event that the vibration-proof lens group comprises lens L51)
fV/fRF = −0.109(in the event that the vibration-proof lens group comprises lens L52)
Conditional expression(JD2) DVW/fV = 0.019(in the event that the vibration-proof lens group comprises lens L51)
DVW/fV = −0.102(in the event that the vibration-proof lens group comprises lens L52)
Conditional expression(JD3) Wω = 40.847
Conditional expression(JD4) fF/fXR = 3.367
Conditional expression(JD5) (−fXn)/fXR = 0.482
Conditional expression(JD6) DGXR/fXR = 0.738
Conditional expression(JE1) DVW/fV = 0.019(in the event that the vibration-proof lens group comprises lens L51)
DVW/fV = −0.102(in the event that the vibration-proof lens group comprises lens L52)
Conditional expression(JE2) Wω = 40.847
Conditional expression(JE3) fF/fW = 5.685
Conditional expression(JE4) fV/fRF = 0.370(in the event that the vibration-proof lens group comprises lens L51)
fV/fRF = −0.109(in the event that the vibration-proof lens group comprises lens L52)
Conditional expression(JE5) fF/fXR = 3.367
Conditional expression(JE6) DGXR/fXR = 0.738
Conditional expression(JE7) DXnW/ZD1 = 0.496
Conditional expression(JF1) fF/fV = 1.171(in the event that the vibration-proof lens group comprises lens L51)
fF/fV = −3.977(in the event that the vibration-proof lens group comprises lens L52)
Conditional expression(JF2) fV/fRF = 0.370(in the event that the vibration-proof lens group comprises lens L51)
fV/fRF = −0.109(in the event that the vibration-proof lens group comprises lens L52)
Conditional expression(JF3) DVW/fV = 0.019(in the event that the vibration-proof lens group comprises lens L51)
DVW/fV = −0.102(in the event that the vibration-proof lens group comprises lens L52)
Conditional expression(JF4) Wω = 40.847
Conditional expression(JF5) fF/fXR = 3.367
Conditional expression(JF6) DGXR/fXR = 0.738
Conditional expression(JF7) TLW/ZD1 = 2.798
Conditional expression(JI1) (rB + rA)/(rB − rA) = 0.287
Conditional expression(JI2) (rC + rB)/(rC − rB) = 1.058
Conditional expression(JI3) |fF/fXR| = 3.367
Conditional expression(JI4) νdp = 82.570

It can be seen in Table 10 that the zoom optical system ZL10 according to Example 10 satisfies the conditional expressions (JB1) to (JB6), (JC1) to (JC6), (JD1) to (JD6), (JE1) to (JE7), (JF1) to (JF7), and (JI1) to (JI4).

Figure 43A:
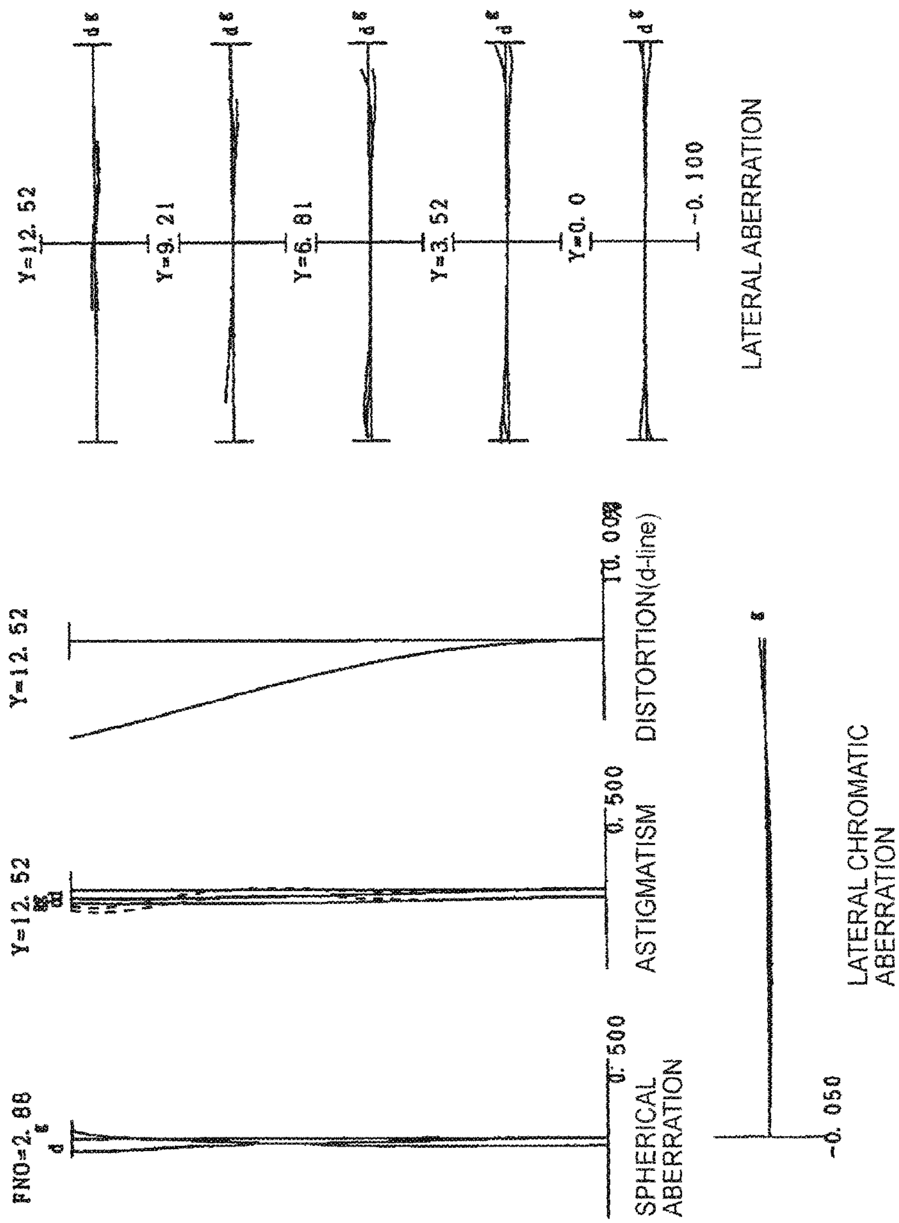
FIGS. 43A, 43B, and 43C are graphs showing various aberrations of the zoom optical system according to Example 10 upon focusing on infinity respectively in the wide angle end state, the intermediate focal length state, and the telephoto end state.
Figure 43B:
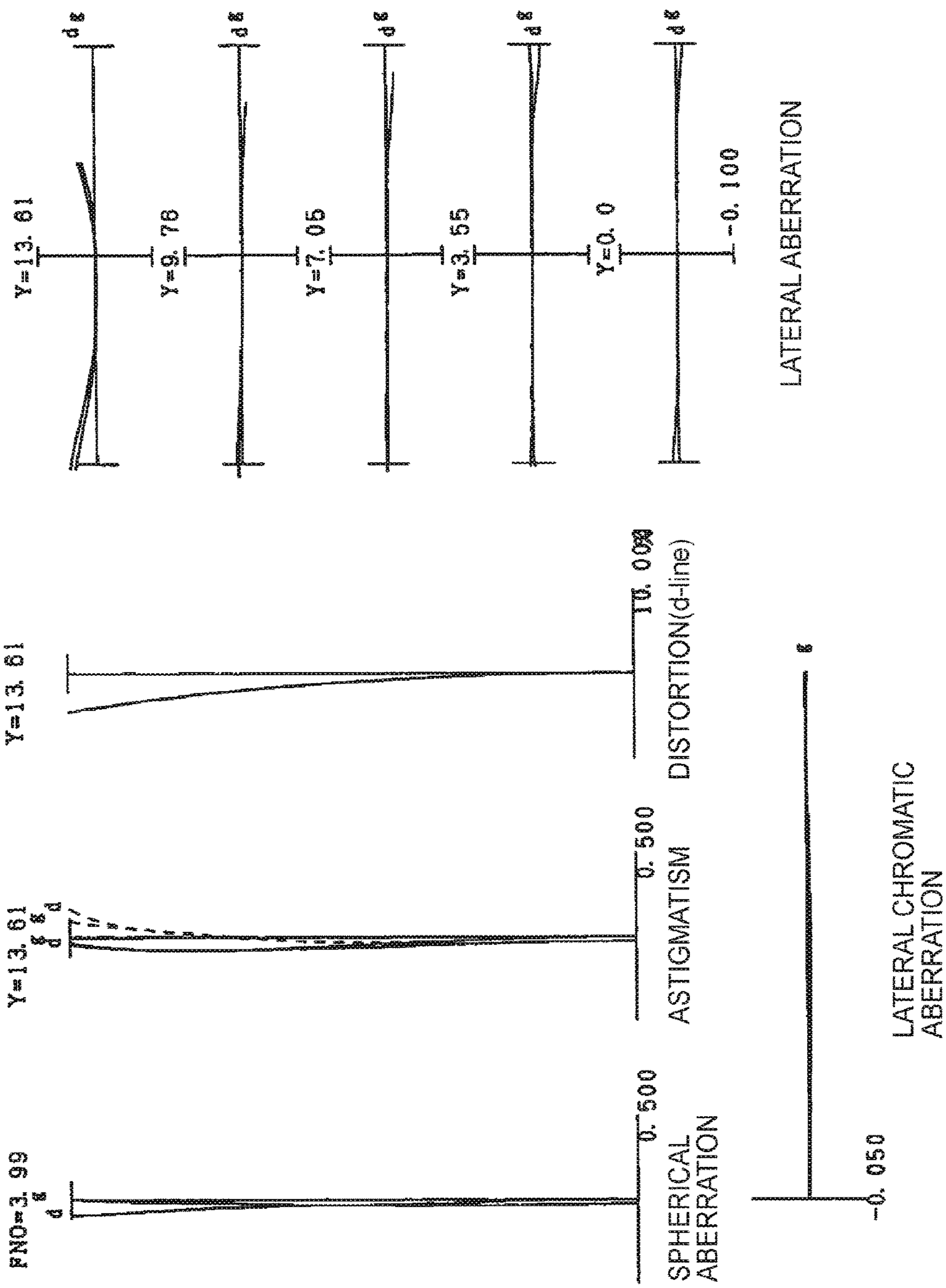
Figure 43C:
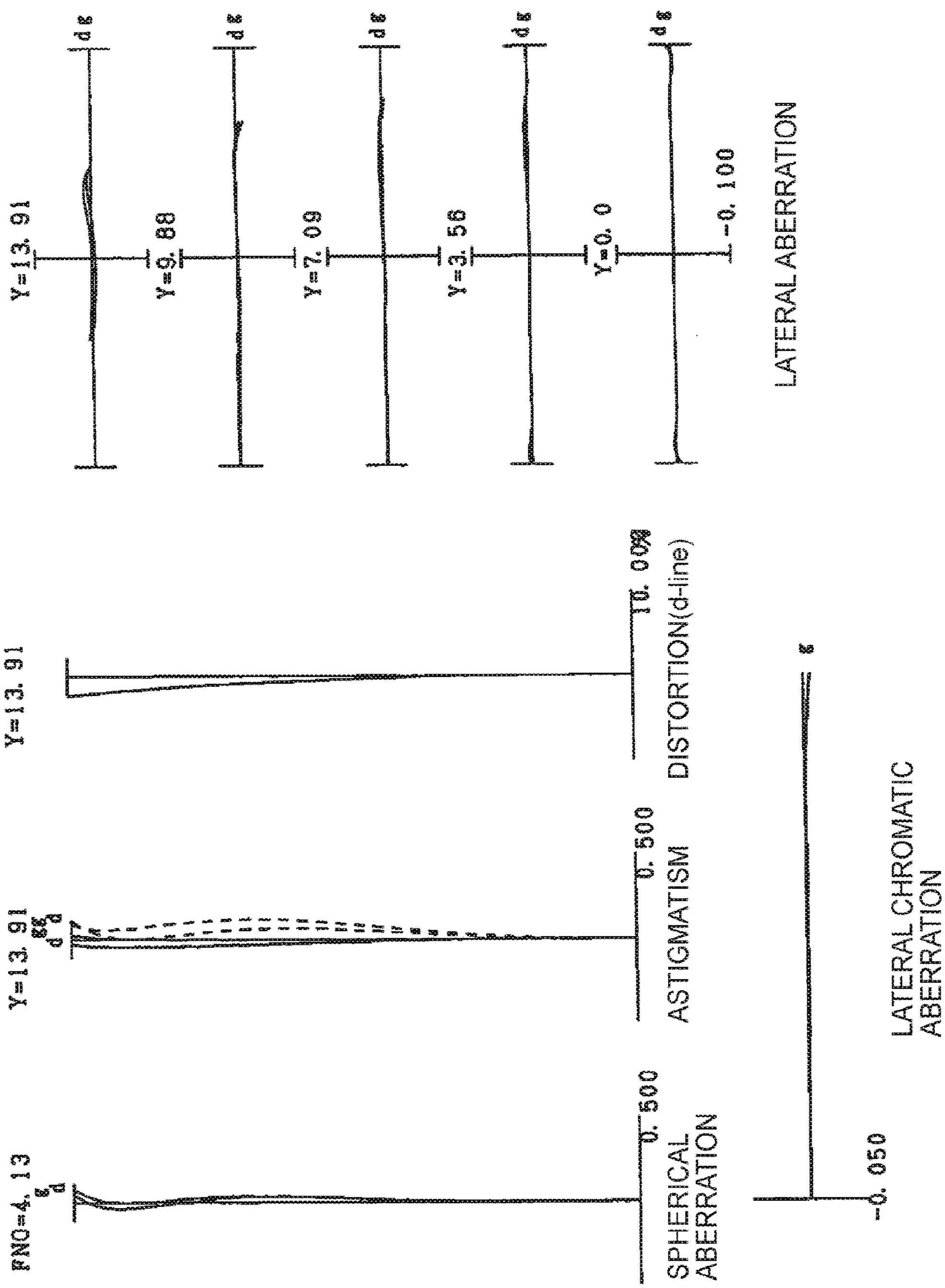
Figure 44A:
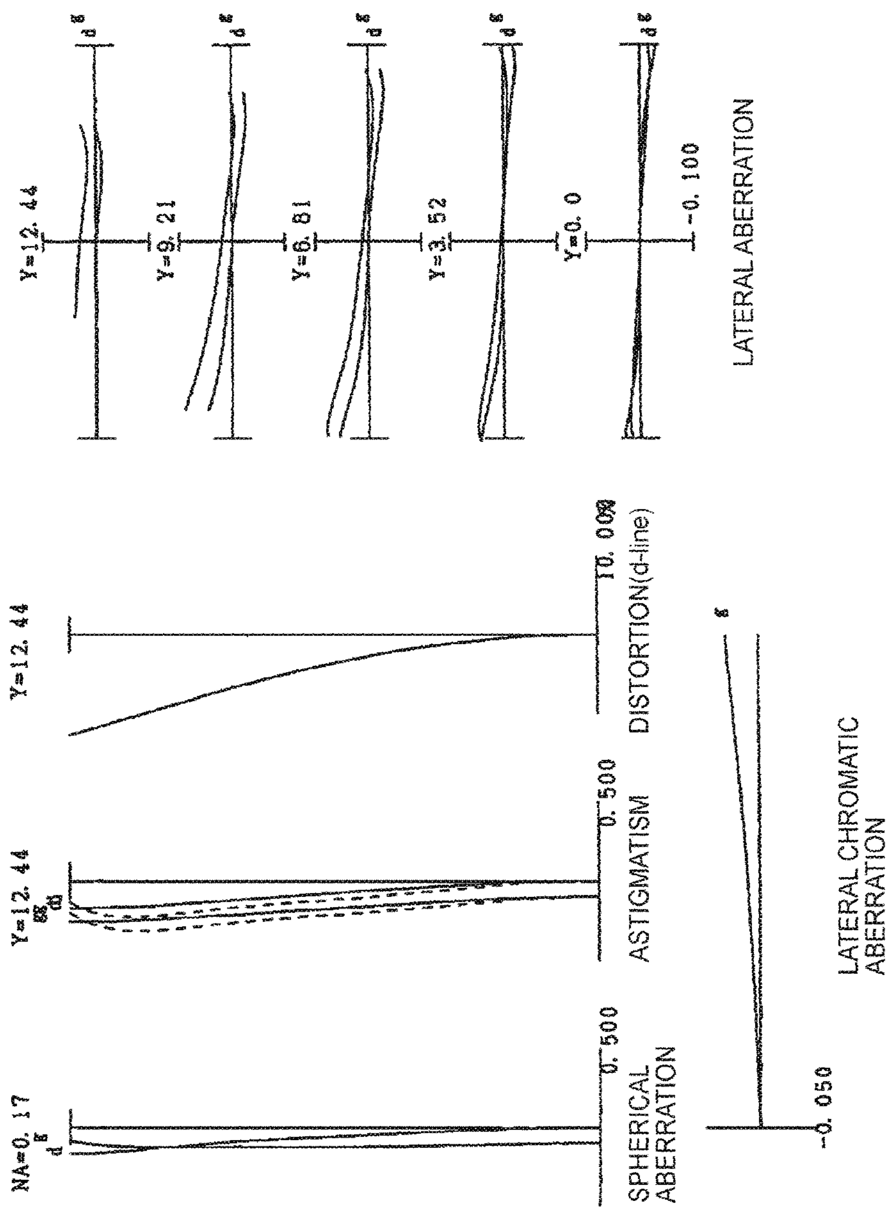
FIGS. 44A, 44B, and 44C are graphs showing various aberrations of the zoom optical system according to Example 10 upon focusing on a short distant object respectively in the wide angle end state, the intermediate focal length state, and the telephoto end state.
Figure 44B:
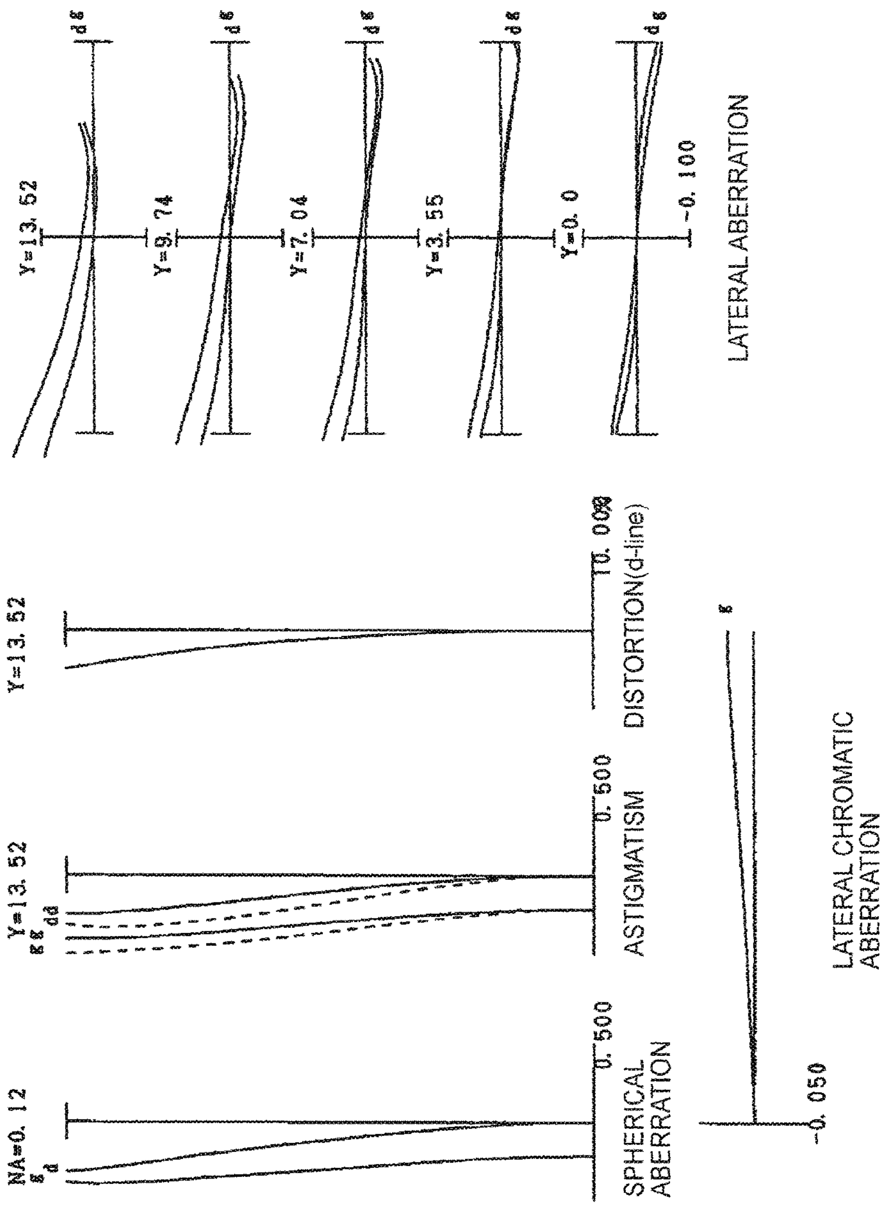
Figure 44C:
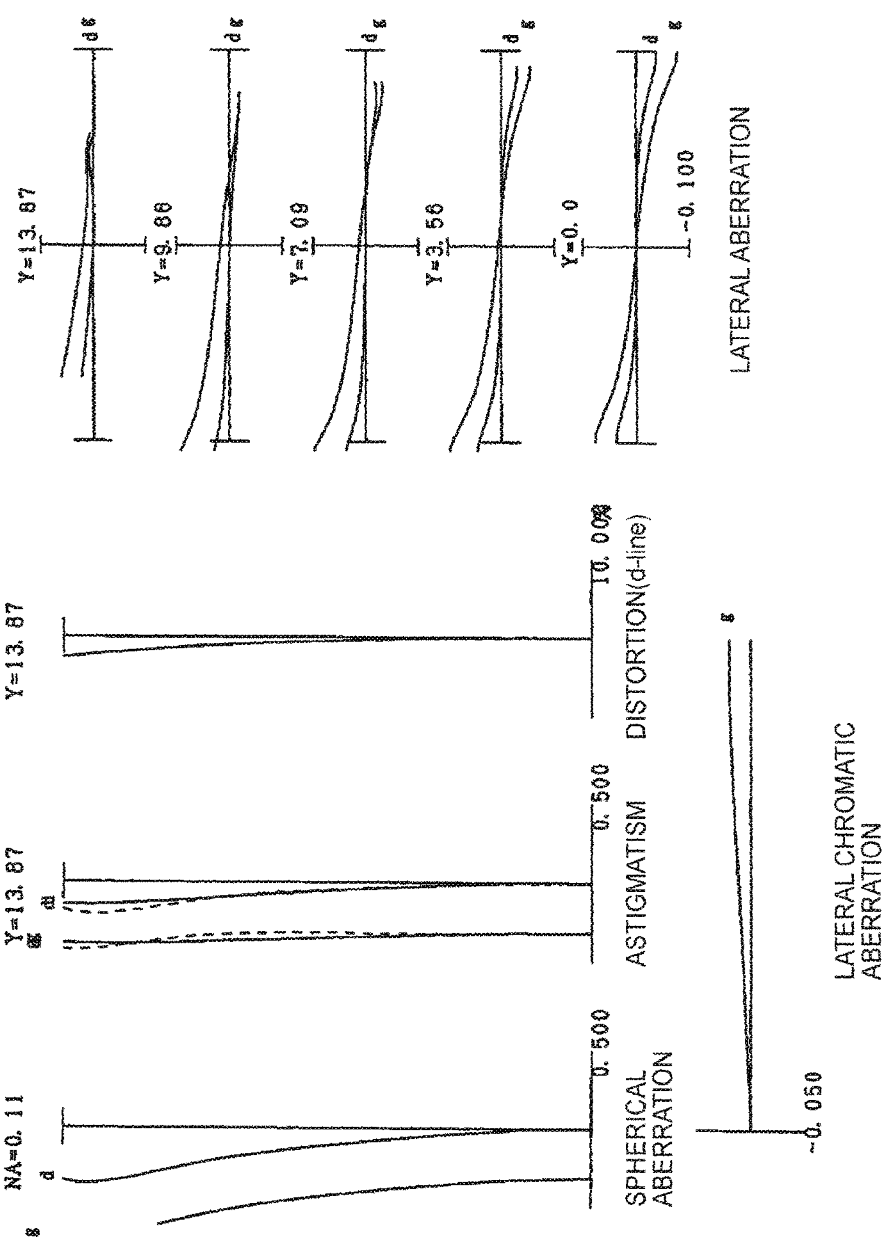
Figure 45A:
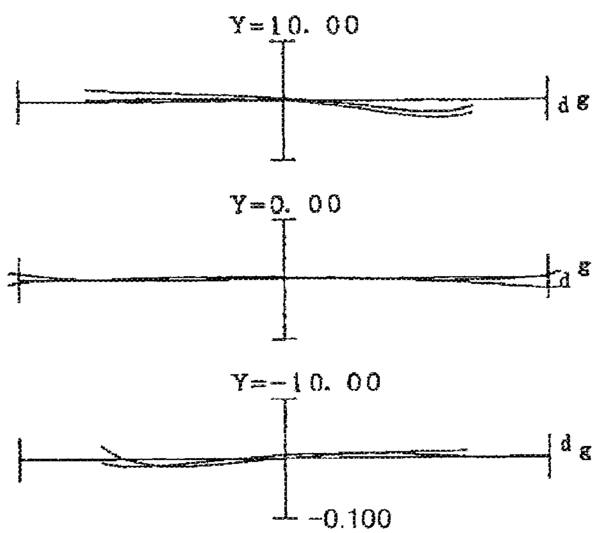
FIGS. 45A, 45B, and 45C are graphs showing lateral aberrations of the zoom optical system (using the lens L51 as the vibration-proof lens group VR) according to Example 10 upon focusing on infinity with image blur correction performed, respectively in the wide angle end state, the intermediate focal length state, and the telephoto end state.
Figure 45B:
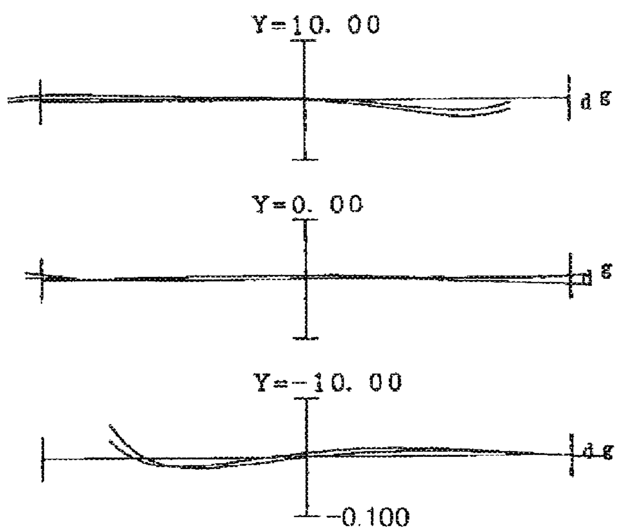
Figure 45C:
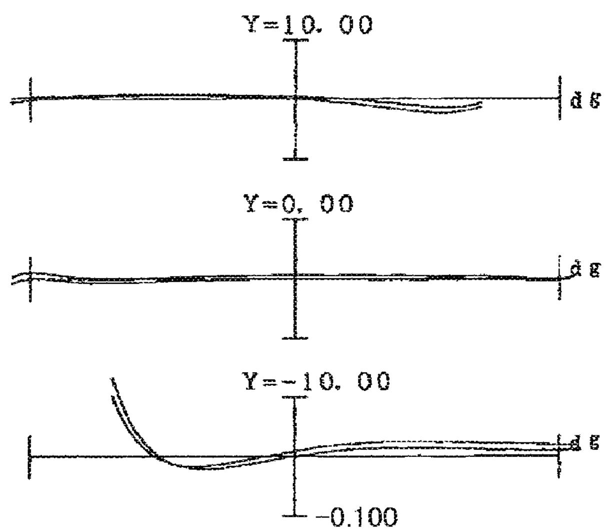
Figure 46A:
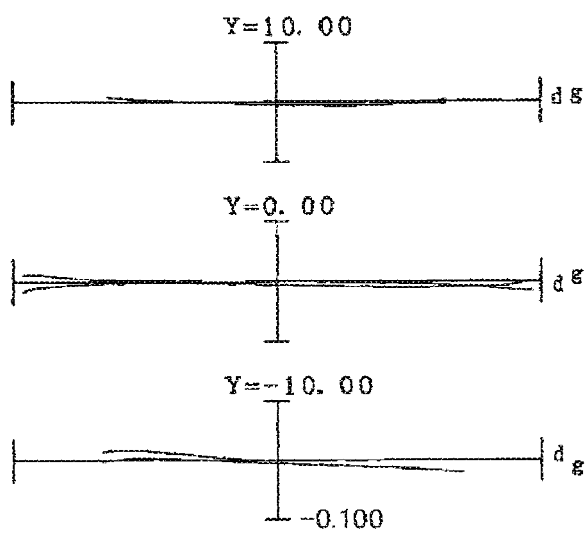
FIGS. 46A, 46B, and 46C are graphs showing lateral aberrations of the zoom optical system (using the lens L52 as the vibration-proof lens group VR) according to Example 10 upon focusing on infinity with image blur correction performed, respectively in the wide angle end state, the intermediate focal length state, and the telephoto end state.
Figure 46B:
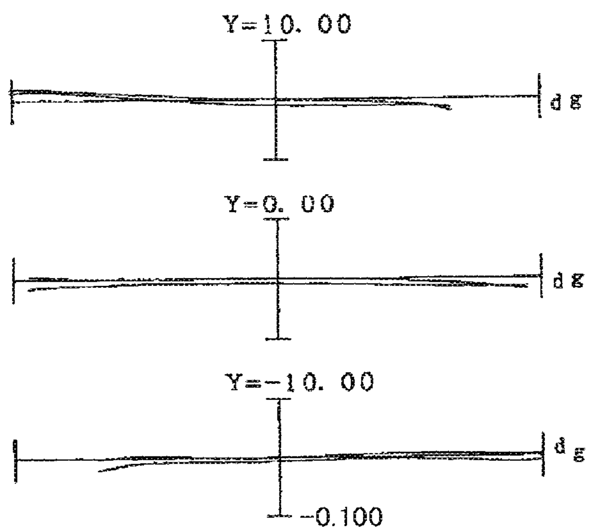
Figure 46C:
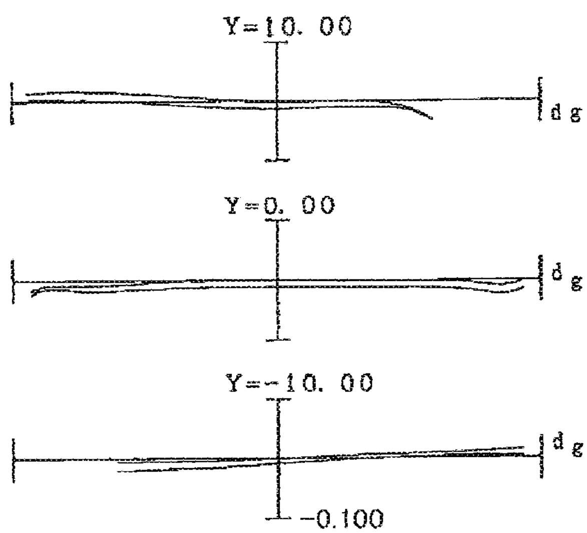

FIG. 43 is various aberration graphs (a spherical aberration graph, an astigmatism graph, a distortion graph, a lateral chromatic aberration graph, and a lateral aberration graph) of the zoom optical system ZL10 according to Example 10 upon focusing on infinity with FIG. 43A corresponding to the wide angle end state, FIG. 43B corresponding to the intermediate focal length state, and FIG. 43C corresponding to the telephoto end state. FIG. 44 is various aberration graphs (a spherical aberration graph, an astigmatism graph, a distortion graph, a lateral chromatic aberration graph, and a lateral aberration graph) of the zoom optical system ZL10 according to Example 10 upon focusing on a short distant object with FIG. 44A corresponding to the wide angle end state, FIG. 44B corresponding to the intermediate focal length state, and FIG. 44C corresponding to the telephoto end state. FIG. 45 is lateral aberration graphs at the time of image blur correction for the zoom optical system ZL10 according to Example 10 with the lens L51 serving as the vibration-proof lens group VR upon focusing on infinity with FIG. 45A corresponding to the wide angle end state, FIG. 45B corresponding to the intermediate focal length state, and FIG. 45C corresponding to the telephoto end state. FIG. 46 is lateral aberration graphs at the time of image blur correction for the zoom optical system ZL10 according to Example 10 with the lens L52 serving as the vibration-proof lens group VR upon focusing on infinity with FIG. 46A corresponding to the wide angle end state, FIG. 46B corresponding to the intermediate focal length state, and FIG. 46C corresponding to the telephoto end state.

It can be seen in FIG. 43 to FIG. 46 that the zoom optical system ZL10 according to Example 10 can achieve an excellent optical performance with various aberrations successfully corrected from the wide angle end state to the telephoto end state and from the infinity focusing state to the short-distant object focusing state. Furthermore, it can be seen that a high imaging performance can be achieved upon image blur correction.

Example 11

Example 11 is described with reference to FIG. 47 to FIG. 52 and Table 11. A zoom optical system ZLI (ZL11) according to Example 11 includes, as illustrated in FIG. 47 (FIG. 48), the first lens group G1 having positive refractive power, the second lens group G2 having negative refractive power, the third lens group G3 having positive refractive power, the fourth lens group G4 having positive refractive power, the fifth lens group G5 having positive refractive power, and the sixth lens group G6 having negative refractive power that are arranged in order from the object side.

Figure 47:
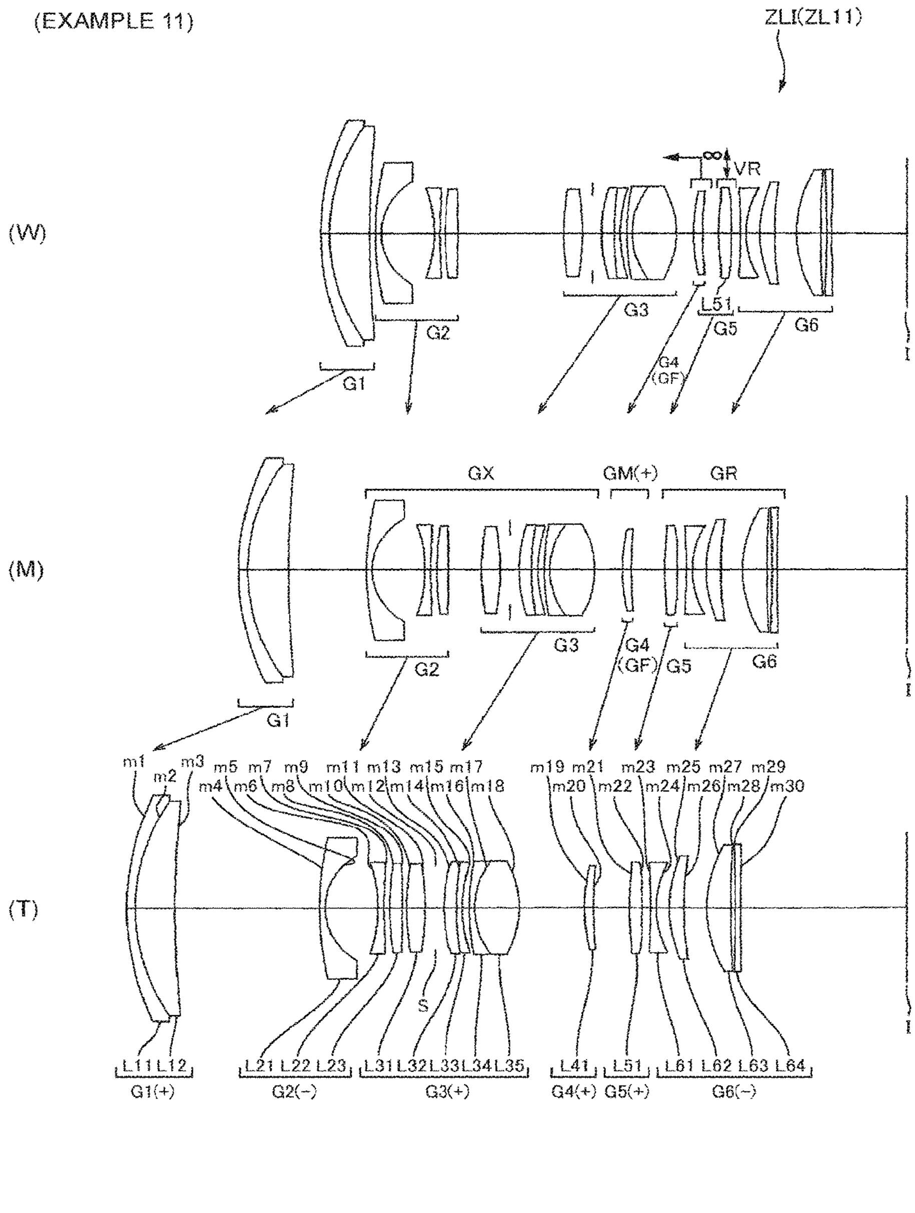
FIG. 47 is a cross-sectional view with sections (W), (M), and (T) showing a zoom optical system (using the lens L51 as the vibration-proof lens group VR) according to Example 11 respectively in the wide angle end state, the intermediate focal length state, and the telephoto end state.

The example illustrated in FIG. 47, the second lens group G2 and the third lens group G3 correspond to the front-side lens group GX. The fourth lens group G4 corresponds to the intermediate lens group GM (focusing lens group GF). The fifth lens group G5 and the sixth lens group G6 correspond to the rear-side lens group GR. The fifth lens group G5 corresponds to the vibration-proof lens group VR.

Figure 48:
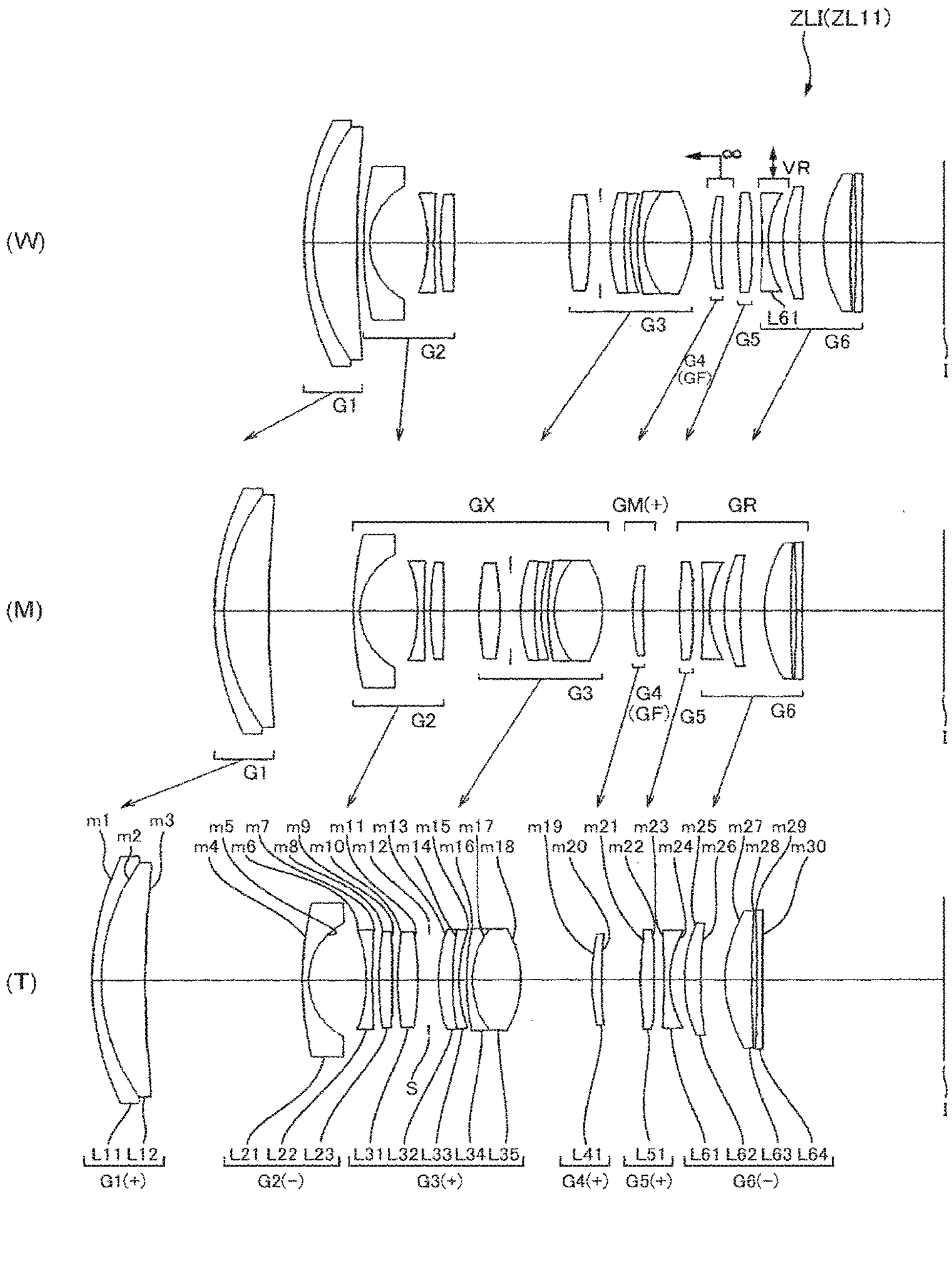
FIG. 48 is a cross-sectional view with sections (W), (M), and (T) showing a zoom optical system (using the lens L52 as the vibration-proof lens group VR) according to Example 11 respectively in the wide angle end state, the intermediate focal length state, and the telephoto end state.

The example illustrated in FIG. 48, the second lens group G2 and the third lens group G3 correspond to the front-side lens group GX. The fourth lens group G4 corresponds to the intermediate lens group GM (focusing lens group GF). The fifth lens group G5 and the sixth lens group G6 correspond to the rear-side lens group GR. The lens L61 forming the sixth lens group G6 corresponds to the vibration-proof lens group VR.

The first lens group G1 includes the cemented lens including the negative meniscus lens L11 having a concave surface facing the image surface side and the positive meniscus lens L12 having a convex surface facing the object side that are arranged in order from the object side.

The second lens group G2 includes the negative meniscus lens L21 having a concave surface facing the image surface side, the biconcave lens L22, and the biconvex lens L23 that are arranged in order from the object side.

The biconcave lens L22 is a glass-molded aspherical lens with lens surfaces, on the object side and on the image surface side, having an aspherical shape.

The third lens group G3 includes the biconvex lens L31; the aperture stop S; the cemented lens including the positive meniscus lens L32 having a convex surface facing the object side and the negative meniscus lens L33 having a concave surface facing the image surface side; and the cemented lens including the negative meniscus lens L34 having a concave surface facing the image surface side and the biconvex lens L35 that are arranged in order from the object side.

The biconvex lens L31 is a glass-molded aspherical lens with a lens surface, on the object side, having an aspherical shape. The negative meniscus lens L34 is a glass-molded aspherical lens with a lens surface, on the object side, having an aspherical shape.

The fourth lens group G4 includes the positive meniscus lens L41 having a convex surface facing the object side.

The fifth lens group G5 includes the positive meniscus lens L51 having a convex surface facing the object side.

The positive meniscus lens L51 is a glass-molded aspherical lens with lens surfaces, on the object side and on the image surface side, having an aspherical shape.

The sixth lens group G6 includes a biconcave lens L61; a positive meniscus lens L62 having a convex surface facing the object side; a positive meniscus lens L63 having a convex surface facing the object side; and a biconcave lens L64 that are arranged in order from the object side.

The biconcave lens L61 is a glass-molded aspherical lens with a lens surface, on the image surface side, having an aspherical shape.

Upon zooming from the wide angle end state to the telephoto end state, the distance between lens groups changes with the first lens group G1 to the sixth lens group G6 each moved toward the object side.

Upon focusing from infinity to the short-distant object, the fourth lens group G4 moves toward the object side.

When image blur occurs, as illustrated in FIG. 47, image blur correction (vibration isolation) on the image surface I is performed with the fifth lens group G5 serving as the vibration-proof lens group VR moved with a displacement component in the direction orthogonal to the optical axis.

In the wide angle end state, the vibration proof coefficient is 0.37 and the focal length is 16.48 (mm), and thus the movement amount of the vibration-proof lens group VR for correcting the roll blur of 0.66° is 0.52 (mm). In the intermediate focal length state, the vibration proof coefficient is 0.48 and the focal length is 34.55 (mm), and thus the movement amount of the vibration-proof lens group VR for correcting the roll blur of 0.46° is 0.58 (mm). In the telephoto end state, the vibration proof coefficient is 0.55 and the focal length is 58.20 (mm), and thus the movement amount of the vibration-proof lens group VR for correcting the roll blur of 0.35° is 0.65 (mm).

In this Example, when image blur occurs, as illustrated in FIG. 48, image blur correction (vibration isolation) on the image surface I may be performed with the lens L61 forming the sixth lens group G6 serving as the vibration-proof lens group VR moved with a displacement component in the direction orthogonal to the optical axis.

In the wide angle end state, the vibration proof coefficient is −1.20 and the focal length is 16.48 (mm), and thus the movement amount of the vibration-proof lens group VR for correcting the roll blur of 0.66° is −0.16 (mm). In the intermediate focal length state, the vibration proof coefficient is −1.63 and the focal length is 34.55 (mm), and thus the movement amount of the vibration-proof lens group VR for correcting the roll blur of 0.46° is −0.17 (mm). In the telephoto end state, the vibration proof coefficient is −1.92 and the focal length is 58.20 (mm), and thus the movement amount of the vibration-proof lens group VR for correcting the roll blur of 0.35° is −0.19 (mm).

In Table 11 below, specification values in Example 11 are listed. Surface numbers 1 to 30 in Table 11 respectively correspond to the optical surfaces m1 to m30 in FIG. 47 (FIG. 48).

TABLE 11

[Lens specifications]

| Surface number | R | D | nd | νd |
|---|---|---|---|---|
| Obj surface | ∞ | | | |
| 1 | 52.30855 | 1.500 | 1.94594 | 18.0 |
| 2 | 37.33284 | 7.071 | 1.80400 | 46.6 |
| 3 | 216.54215 | (D3) | 1.00000 | |
| 4 | 61.38788 | 1.000 | 1.80400 | 46.6 |
| 5 | 11.65182 | 9.233 | 1.00000 | |
| *6 | −32.14862 | 1.000 | 1.72903 | 54.0 |
| *7 | 74.53588 | 1.024 | 1.00000 | |
| 8 | 60.50694 | 2.193 | 1.94594 | 18.0 |
| 9 | −258.79475 | (D9) | 1.00000 | |
| *10 | 46.01441 | 3.200 | 1.72903 | 54.0 |
| 11 | −56.40981 | 1.800 | 1.00000 | |
| 12 | (stop S) | 1.500 | 1.00000 | |
| 13 | 29.53961 | 2.255 | 1.51860 | 69.9 |
| 14 | 62.01786 | 1.000 | 1.78472 | 25.6 |
| 15 | 28.20544 | 1.200 | 1.00000 | |
| *16 | 55.69244 | 0.900 | 1.72903 | 54.0 |
| 17 | 15.23446 | 7.773 | 1.49782 | 82.6 |
| 18 | −19.05606 | (D18) | 1.00000 | |
| 19 | 36.98318 | 1.625 | 1.49782 | 82.6 |
| 20 | 105.10268 | (D20) | 1.00000 | |
| *21 | 43.20902 | 2.199 | 1.55332 | 71.7 |
| *22 | 1751.40520 | (D22) | 1.00000 | |
| 23 | −171.60024 | 1.000 | 1.82080 | 42.7 |
| *24 | 17.59425 | 2.400 | 1.00000 | |
| 25 | 26.33835 | 2.542 | 1.48749 | 70.3 |
| 26 | 72.49985 | 3.966 | 1.00000 | |
| 27 | 25.12670 | 4.200 | 1.48749 | 70.3 |
| 28 | 221.49212 | 0.920 | 1.00000 | |
| 29 | −248.05584 | 0.900 | 1.71736 | 29.6 |
| 30 | 676.75372 | (D30) | 1.00000 | |
| Img surface | ∞ | | | |

[Aspherical data]

| Surface | κ | A4 | A6 | A8 | A10 |
|---|---|---|---|---|---|
| 6 | 1.00000e+00 | −5.77765e−05 | 3.44287e−07 | −6.22102e−10 | −1.57242e−11 |
| 7 | 1.00000e+00 | −6.99357e−05 | 4.62841e−07 | −2.74060e−09 | 0.00000e+00 |
| 10 | 1.00000e+00 | −2.68855e−05 | −4.61691e−08 | 5.50569e−11 | −1.70214e−12 |
| 16 | 1.00000e+00 | 1.11787e−05 | 5.00773e−08 | 1.88833e−10 | −7.71465e−15 |
| 21 | 1.00000e+00 | −5.10052e−05 | −6.02110e−07 | 6.11612e−09 | −6.10307e−11 |
| 22 | 1.00000e+00 | −6.30677e−05 | −4.65571e−07 | 4.57749e−09 | −4.89754e−11 |
| 24 | 1.00000e+00 | −1.61208e−06 | −1.18039e−07 | 4.93252e−10 | 5.31842e−13 |

[Various data]
Zoom ratio 3.53

| | Wide angle end | Intermediate | Telephoto end |
|---|---|---|---|
| f | 16.48 | 34.55 | 58.20 |
| FNo | 2.88 | 4.00 | 4.12 |
| ω | 40.8 | 22.4 | 13.8 |
| Y | 12.54 | 13.83 | 14.06 |
| TL | 102.322 | 116.417 | 135.956 |

TABLE 11-continued

| | | | |
|---|---|---|---|
| BF | 13.054 | 22.464 | 28.774 |
| BF(air) | 13.054 | 22.464 | 28.774 |

[Variable distance data]

| | Upon focusing on infinity | | | Upon focusing on short distant object | | |
|---|---|---|---|---|---|---|
| | Wide angle end | Intermediate | Telephoto end | Wide angle end | Intermediate | Telephoto end |
| f | 16.48 | 34.55 | 58.20 | — | — | — |
| β | — | — | — | −0.0977 | −0.1271 | −0.1908 |
| D0 | ∞ | ∞ | ∞ | 147.68 | 233.58 | 244.04 |
| D3 | 1.000 | 13.610 | 25.000 | 1.000 | 13.610 | 25.000 |
| D9 | 18.408 | 5.666 | 0.800 | 18.408 | 5.666 | 0.800 |
| D18 | 3.000 | 4.809 | 11.304 | 0.806 | 0.661 | 2.678 |
| D20 | 2.759 | 5.833 | 6.177 | 4.952 | 9.982 | 14.803 |
| D22 | 1.700 | 1.633 | 1.500 | 1.700 | 1.633 | 1.500 |
| D30 | 13.054 | 22.464 | 28.774 | 13.054 | 22.464 | 28.774 |

[Lens group data]

| | Group starting surface | Group focal length |
|---|---|---|
| First lens group | 1 | 91.89 |
| Second lens group | 4 | −13.83 |
| Third lens group | 10 | 24.94 |
| Fourth lens group | 19 | 113.72 |
| Fifth lens group | 21 | 80.03 |
| Sixth lens group | 23 | −46.99 |

[Conditional expression corresponding value]

Conditional expression(JB1) (DMRT − DMRW)/fF = 0.030
Conditional expression(JB2) Wω = 40.846
Conditional expression(JB3) Tω = 13.758
Conditional expression(JB4) fF/fRF = 1.421
Conditional expression(JB5) fF/fXR = 4.559
Conditional expression(JB6) DGXR/fXR = 0.787
Conditional expression(JC1) |fF/fRF| = 1.421
Conditional expression(JC2) (DMRT − DMRW)/fF = 0.030
Conditional expression(JC3) Wω = 40.846
Conditional expression(JC4) Tω = 13.758
Conditional expression(JC5) fRF/fRF2 = −1.703
Conditional expression(JC6) DGXR/fXR = 0.787
Conditional expression(JD1) fV/fRF = −0.242(in the event that the vibration-proof lens group comprises lens L61)
Conditional expression(JD2) DVW/fV = −0.124(in the event that the vibration-proof lens group comprises lens L61)
Conditional expression(JD3) Wω = 40.846
Conditional expression(JD4) fF/fXR = 4.559
Conditional expression(JD5) (−fXn)/fXR = 0.554
Conditional expression(JD6) DGXR/fXR = 0.787
Conditional expression(JE1) DVW/fV = 0.021(in the event that the vibration-proof lens group comprises lens L51)
DVW/fV = −0.124(in the event that the vibration-proof lens group comprises lens L61)
Conditional expression(JE2) Wω = 40.846
Conditional expression(JE3) fF/fW = 6.900
Conditional expression(JE4) fV/fRF = 1.000(in the event that the vibration-proof lens group comprises lens L51)
fV/fRF = −0.242(in the event that the vibration-proof lens group comprises lens L61)
Conditional expression(JE5) fF/fXR = 4.559
Conditional expression(JE6) DGXR/fXR = 0.787
Conditional expression(JE7) DXnW/ZD1 = 0.502
Conditional expression(JF1) fF/fV = 1.421(in the event that the vibration-proof lens group comprises lens L51)
fF/fV = −5.863(in the event that the vibration-proof lens group comprises lens L61)
Conditional expression(JF2) fV/fRF = 1.000(in the event that the vibration-proof lens group comprises lens L51)
fV/fRF = −0.242(in the event that the vibration-proof lens group comprises lens L61)
Conditional expression(JF3) DVW/fV = 0.021(in the event that the vibration-proof lens group comprises lens L51)
DVW/fV = −0.124(in the event that the vibration-proof lens group comprises lens L61)

TABLE 11-continued

| |
|---|
| Conditional expression(JF4) Wω = 40.846 |
| Conditional expression(JF5) fF/fXR = 4.559 |
| Conditional expression(JF6) DGXR/fXR = 0.787 |
| Conditional expression(JF7) TLW/ZD1 = 2.898 |
| Conditional expression(JI1) (rB + rA)/(rB − rA) = 0.320 |
| Conditional expression(JI2) (rC + rB)/(rC − rB) = 1.043 |
| Conditional expression(JI3) \|fF/fXR\| = 4.559 |
| Conditional expression(JI4) νdp = 82.570 |

It can be seen in Table 11 that the zoom optical system ZL11 according to Example 11 satisfies the conditional expressions (JB1) to (JB6), (JC1) to (JC6), (JD1) to (JD6), (JE1) to (JE7), (JF1) to (JF7), and (JI1) to (JI4).

Figure 49A:
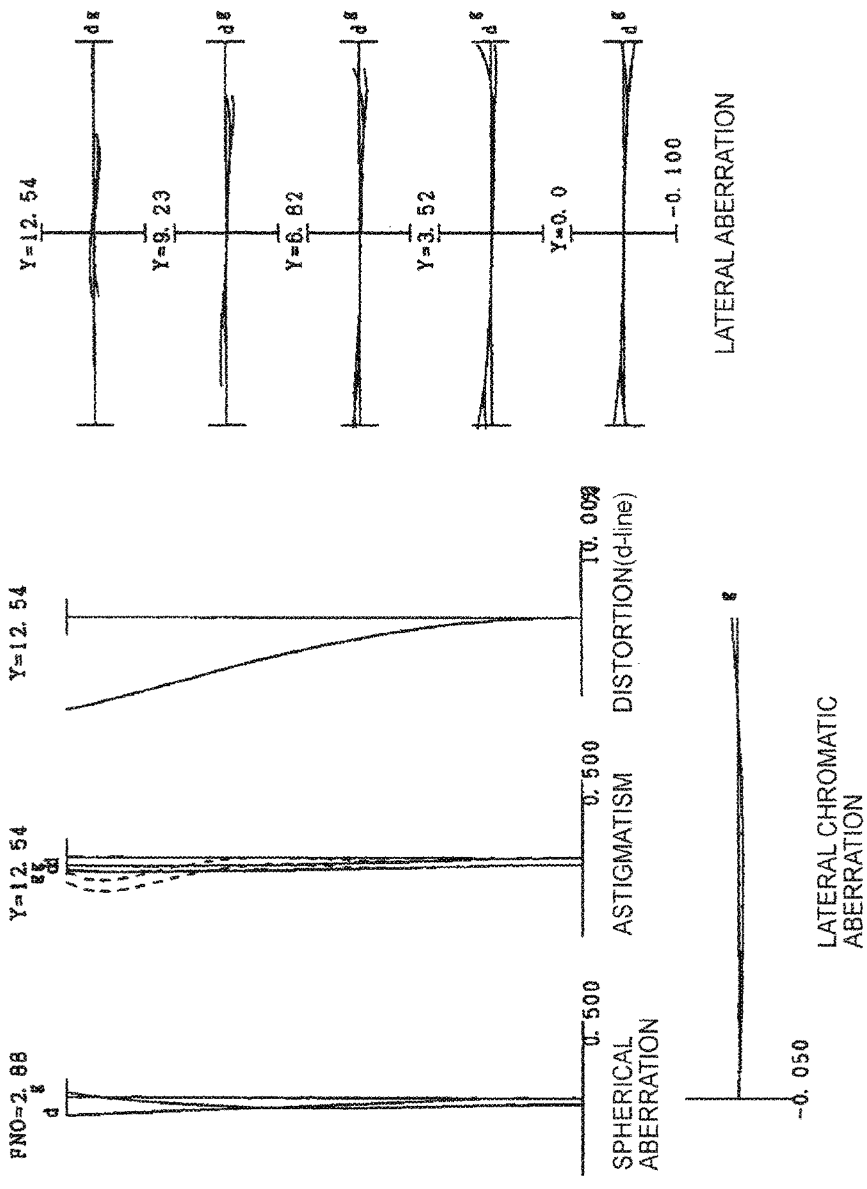
FIGS. 49A, 49B, and 49C are graphs showing various aberrations of the zoom optical system according to Example 11 upon focusing on infinity respectively in the wide angle end state, the intermediate focal length state, and the telephoto end state.
Figure 49B:
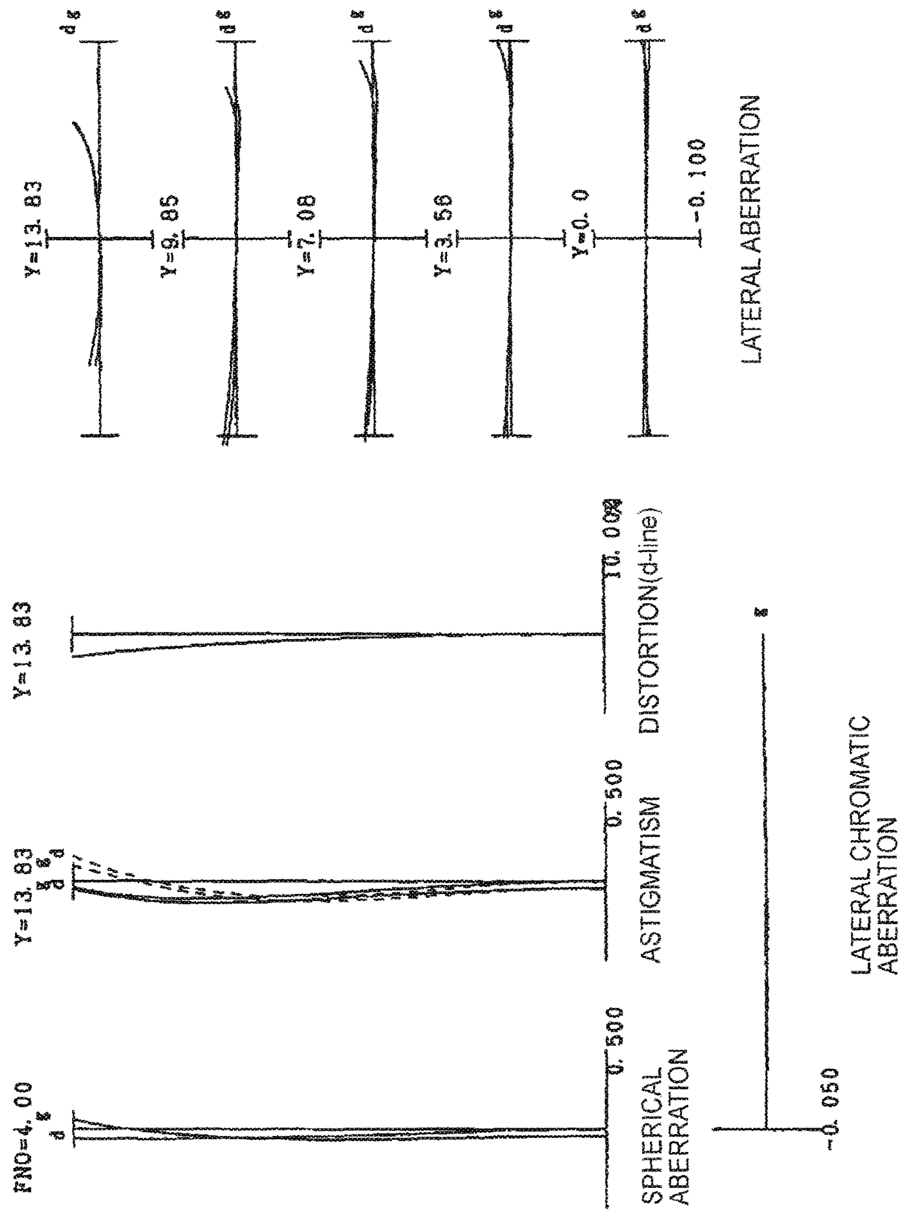
Figure 49C:
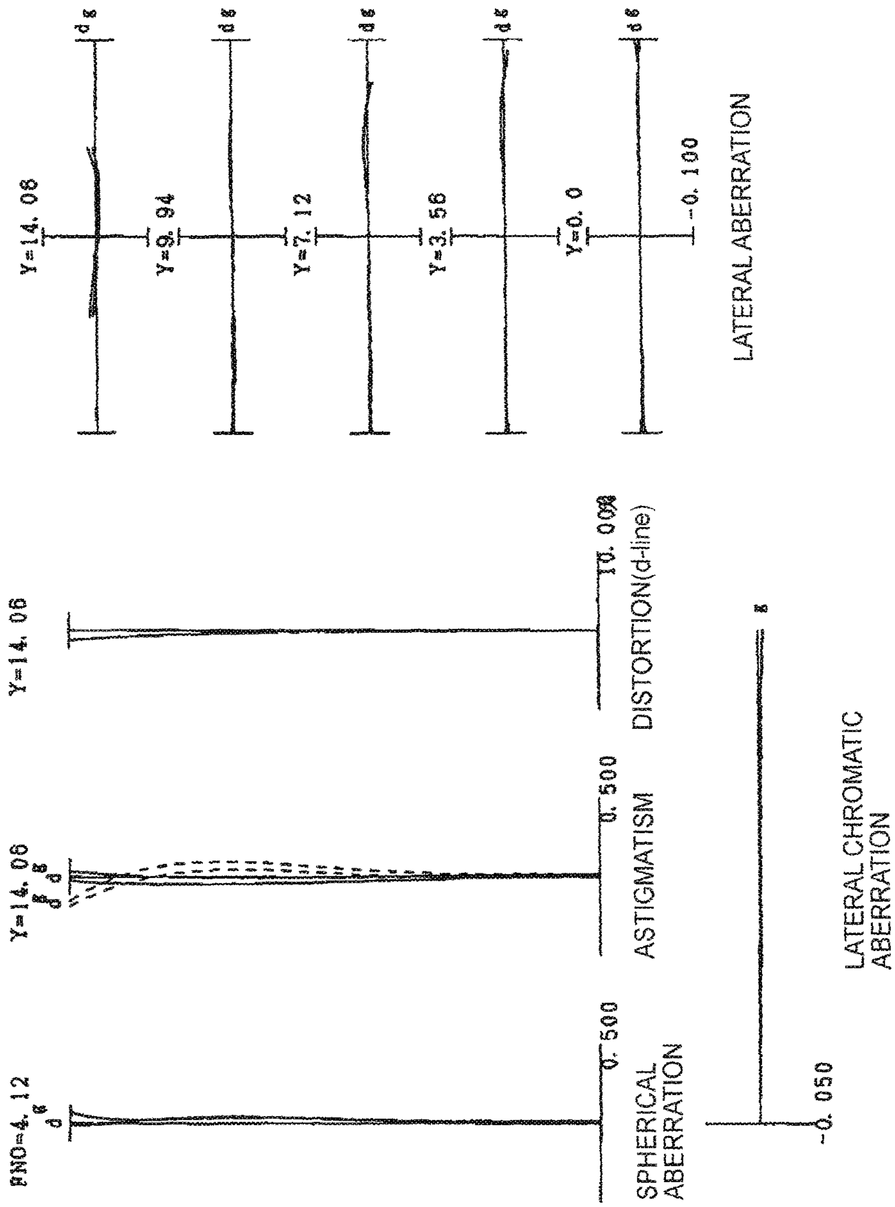
Figure 50A:
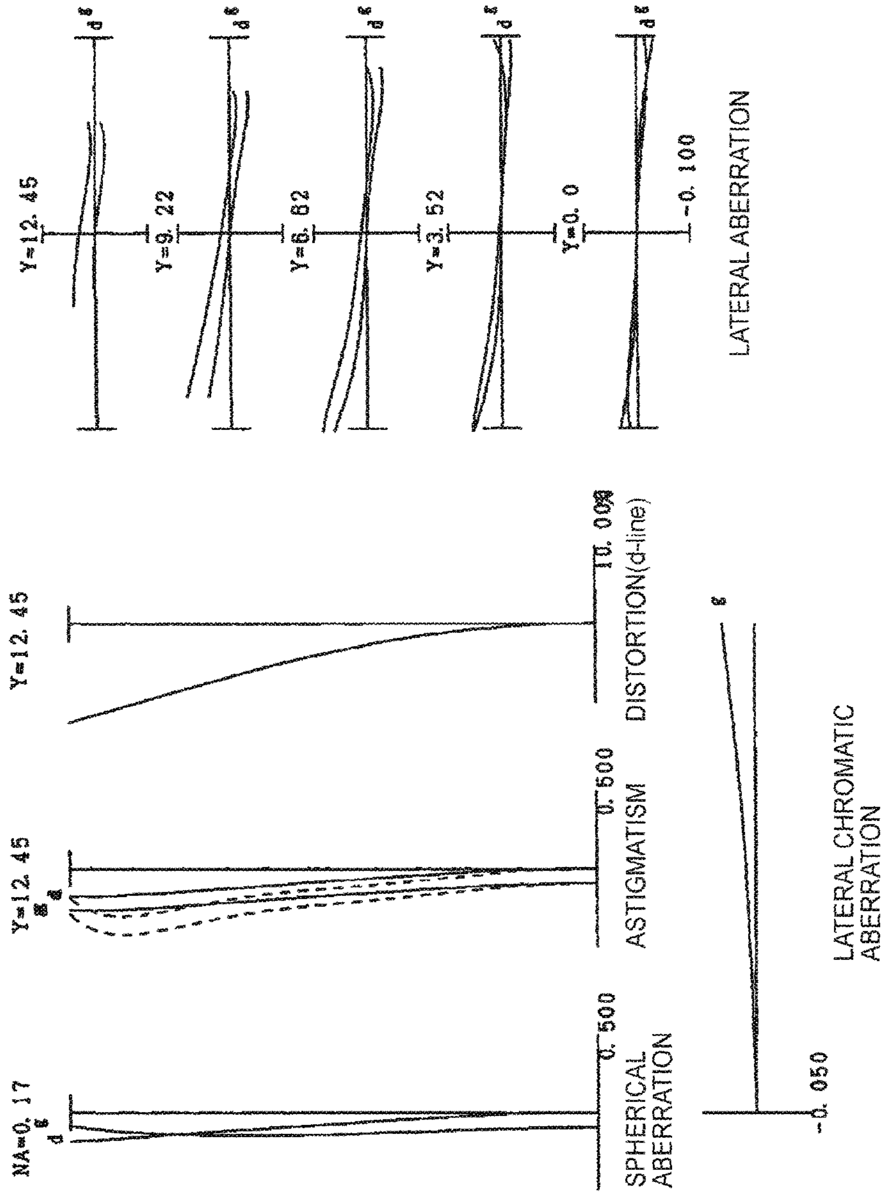
FIGS. 50A, 50B, and 50C are graphs showing various aberrations of the zoom optical system according to Example 11 upon focusing on a short distant object respectively in the wide angle end state, the intermediate focal length state, and the telephoto end state.
Figure 50B:
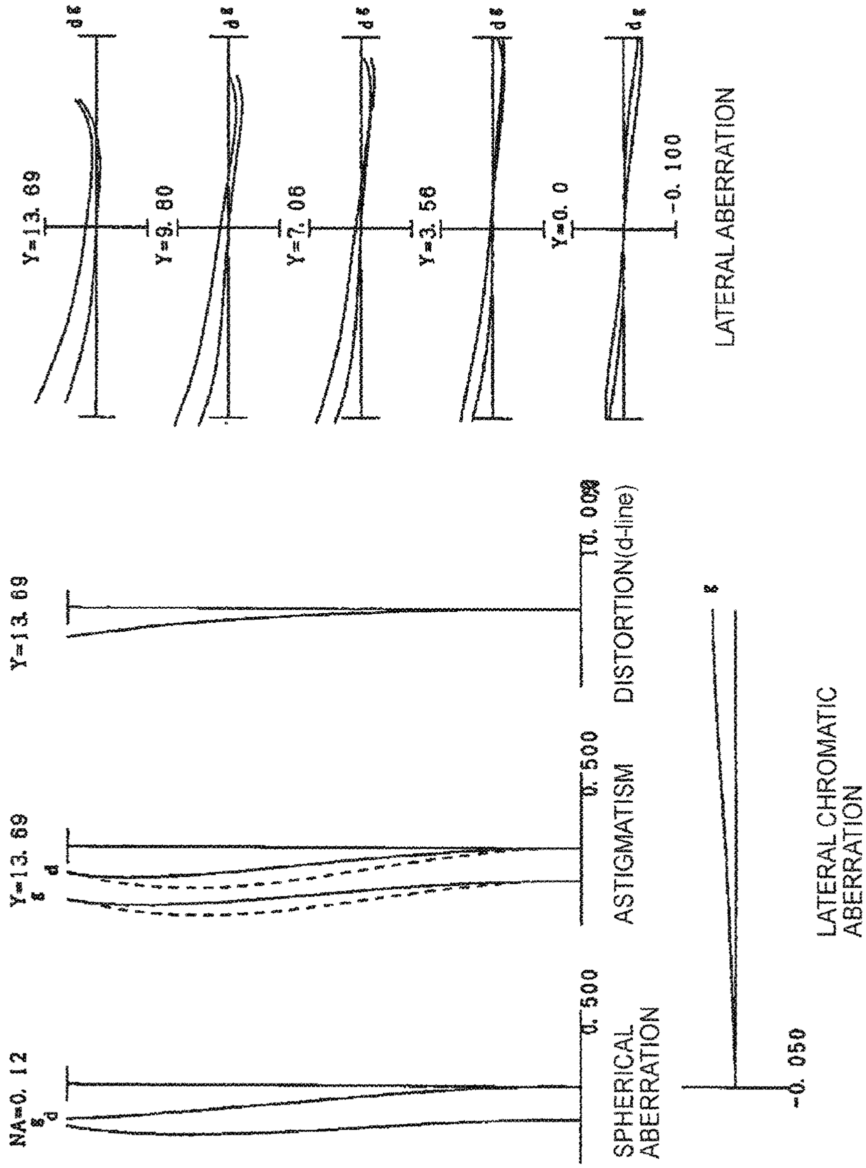
Figure 50C:
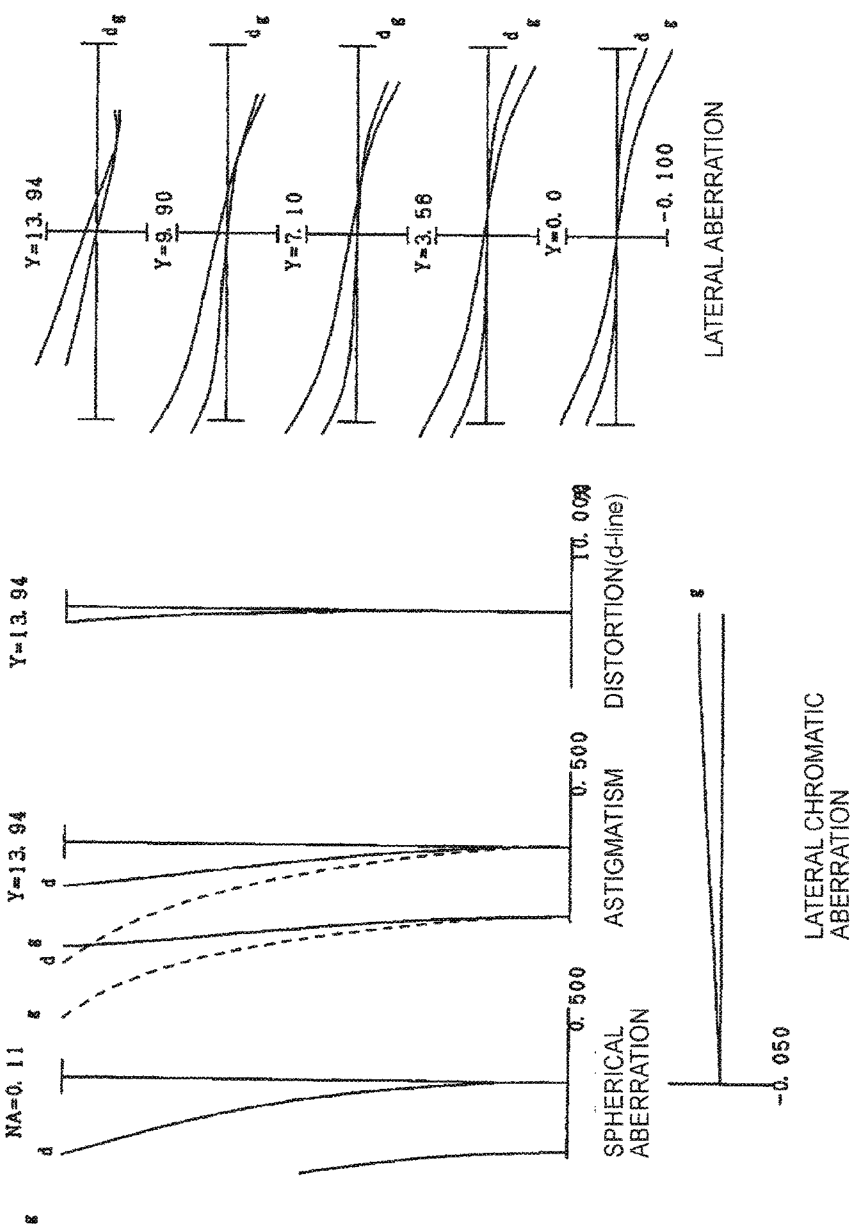
Figure 51A:
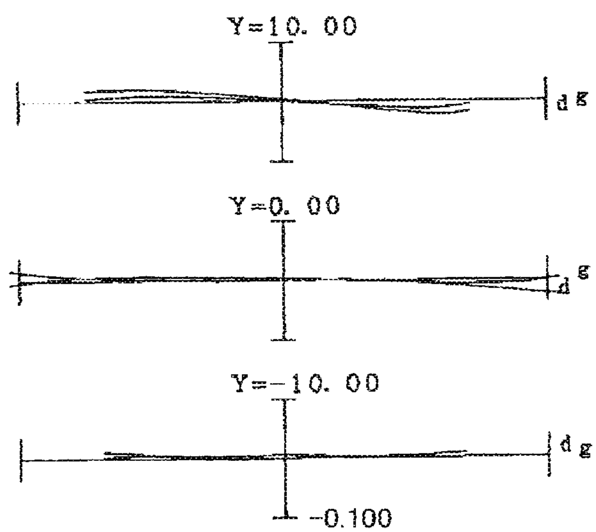
FIGS. 51A, 51B, and 51C are graphs showing lateral aberrations of the zoom optical system (using the lens L51 as the vibration-proof lens group VR) according to Example 11 upon focusing on infinity with image blur correction performed, respectively in the wide angle end state, the intermediate focal length state, and the telephoto end state.
Figure 51B:
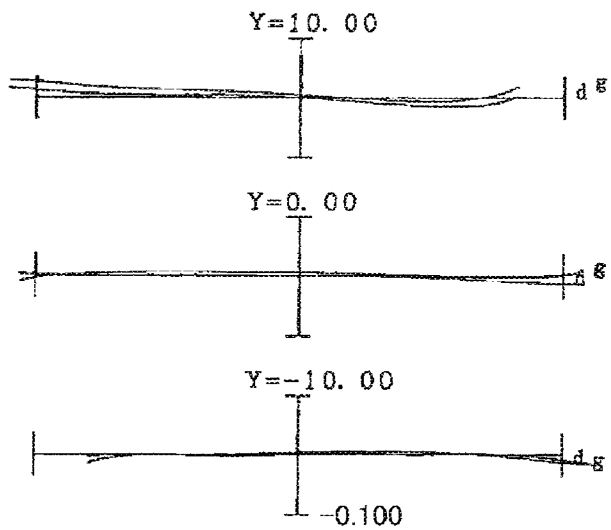
Figure 51C:
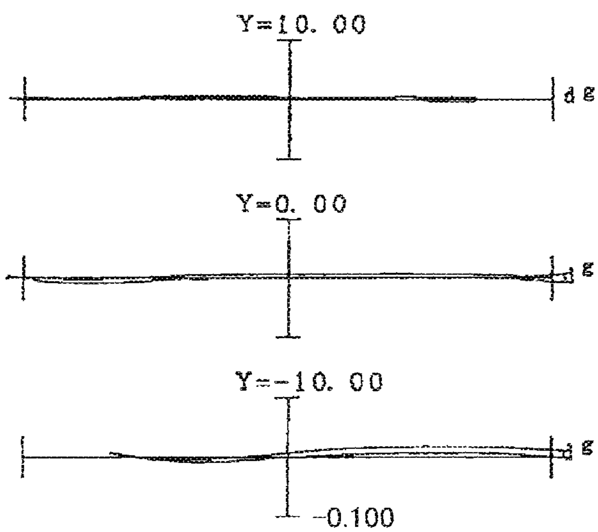
Figure 52A:
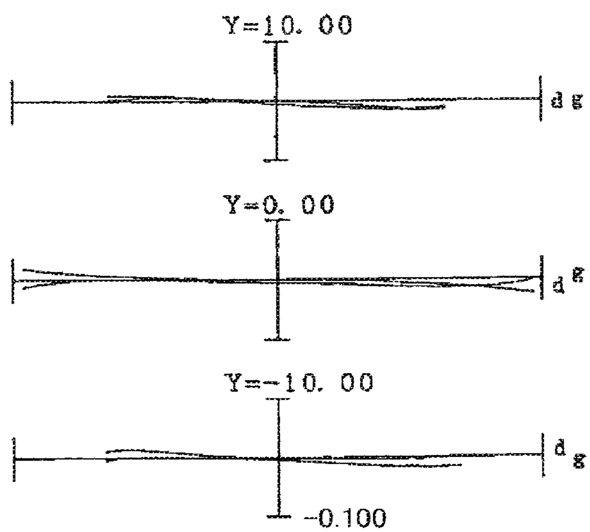
FIGS. 52A, 52B, and 52C are graphs showing lateral aberrations of the zoom optical system (using the lens L52 as the vibration-proof lens group VR) according to Example 11 upon focusing on infinity with image blur correction performed, respectively in the wide angle end state, the intermediate focal length state, and the telephoto end state.
Figure 52B:
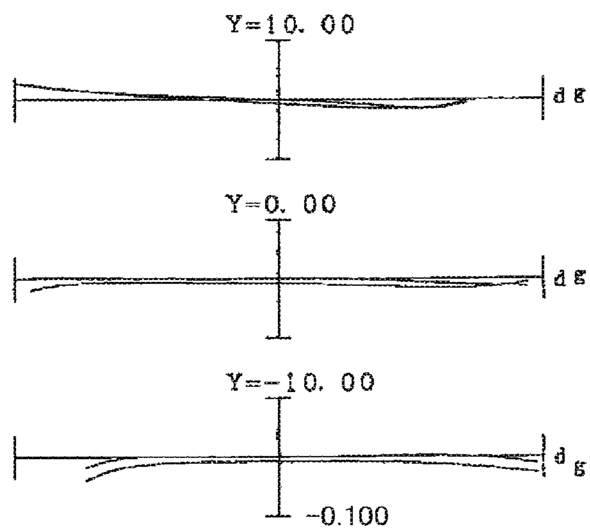
Figure 52C:
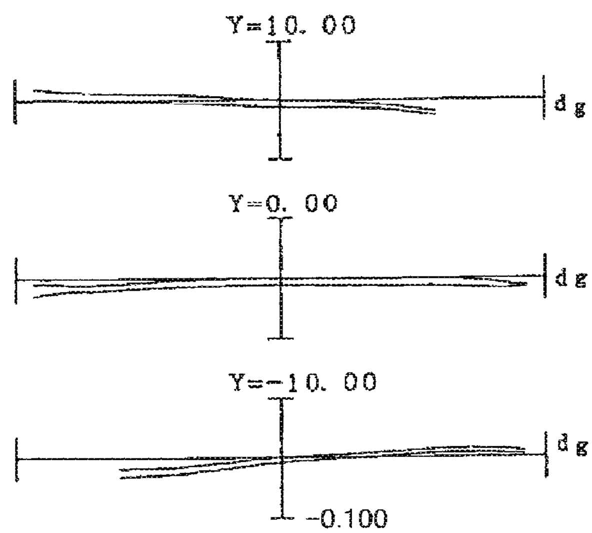

FIG. 49 is various aberration graphs (a spherical aberration graph, an astigmatism graph, a distortion graph, a lateral chromatic aberration graph, and a lateral aberration graph) of the zoom optical system ZL11 according to Example 11 upon focusing on infinity with FIG. 49A corresponding to the wide angle end state, FIG. 49B corresponding to the intermediate focal length state, and FIG. 49C corresponding to the telephoto end state. FIG. 50 is various aberration graphs (a spherical aberration graph, an astigmatism graph, a distortion graph, a lateral chromatic aberration graph, and a lateral aberration graph) of the zoom optical system ZL11 according to Example 11 upon focusing on a short distant object with FIG. 50A corresponding to the wide angle end state, FIG. 50B corresponding to the intermediate focal length state, and FIG. 50C corresponding to the telephoto end state. FIG. 51 is lateral aberration graphs at the time of image blur correction for the zoom optical system ZL11 according to Example 11 with the fifth lens group G5 serving as the vibration-proof lens group VR upon focusing on infinity with FIG. 51A corresponding to the wide angle end state, FIG. 51B corresponding to the intermediate focal length state, and FIG. 51C corresponding to the telephoto end state. FIG. 52 is lateral aberration graphs at the time of image blur correction for the zoom optical system ZL11 according to Example 11 with the lens L61 serving as the vibration-proof lens group VR upon focusing on infinity with FIG. 52A corresponding to the wide angle end state, FIG. 52B corresponding to the intermediate focal length state, and FIG. 52C corresponding to the telephoto end state.

It can be seen in FIG. 49 to FIG. 52 that the zoom optical system ZL11 according to Example 11 can achieve an excellent optical performance with various aberrations successfully corrected from the wide angle end state to the telephoto end state and from the infinity focusing state to the short-distant object focusing state. Furthermore, it can be seen that a high imaging performance can be achieved upon image blur correction.

Example 12

Example 12 is described with reference to FIG. 53 to FIG. 56 and Table 12. A zoom optical system ZLI (ZL12) according to Example 12 includes, as illustrated in FIG. 53, the first lens group G1 having positive refractive power, the second lens group G2 having negative refractive power, the third lens group G3 having positive refractive power, the fourth lens group G4 having positive refractive power, the fifth lens group G5 having positive refractive power, and the sixth lens group G6 having negative refractive power that are arranged in order from the object side.

In the present example, the second lens group G2 and the third lens group G3 correspond to the front-side lens group GX. The fourth lens group G4 corresponds to the intermediate lens group GM (focusing lens group GF). The fifth lens group G5 and the sixth lens group G6 correspond to the rear-side lens group GR. The fifth lens group G5 corresponds to the vibration-proof lens group VR.

The first lens group G1 includes the cemented lens including the negative meniscus lens L11 having a concave surface facing the image surface side and the positive meniscus lens L12 having a convex surface facing the object side that are arranged in order from the object side.

The second lens group G2 includes the negative meniscus lens L21 having a concave surface facing the image surface side, the biconcave lens L22, and the biconvex lens L23 that are arranged in order from the object side.

The biconcave lens L22 is a glass-molded aspherical lens with lens surfaces, on the object side and on the image surface side, having an aspherical shape.

The third lens group G3 includes the biconvex lens L31; the aperture stop S; the cemented lens including the positive meniscus lens L32 having a convex surface facing the object side and the negative meniscus lens L33 having a concave surface facing the image surface side; and the cemented lens including the negative meniscus lens L34 having a concave surface facing the image surface side and the biconvex lens L35 that are arranged in order from the object side.

The biconvex lens L31 is a glass-molded aspherical lens with a lens surface, on the object side, having an aspherical shape. The negative meniscus lens L34 is a glass-molded aspherical lens with a lens surface, on the object side, having an aspherical shape.

The fourth lens group G4 includes the biconvex lens L41.

The fifth lens group G5 includes a negative meniscus lens L51 having a concave surface facing the image surface side; a negative meniscus lens L52 having a concave surface facing the object side; the positive meniscus lens L53 having a convex surface facing the image surface side; and a positive meniscus lens L54 having a convex surface facing the image surface side that are arranged in order from the object side.

The negative meniscus lens L51 is a glass-molded aspherical lens with a lens surface, on the object side, having an aspherical shape. The negative meniscus lens L52 is a glass-molded aspherical lens with a lens surface, on the image surface side, having an aspherical shape. The positive meniscus lens L53 is a glass-molded aspherical lens with a lens surface, on the object side, having an aspherical shape.

The sixth lens group G6 includes the negative meniscus lens L61 having a concave surface facing the object side.

Upon zooming from the wide angle end state to the telephoto end state, the distance between lens groups changes with the first lens group G1 to the fourth lens group G4 each moved toward the object side, the fifth lens group G5 moved toward the image surface side, and the sixth lens group G6 fixed.

Upon focusing from infinity to the short-distant object, the fourth lens group G4 moves toward the object side.

When image blur occurs, image blur correction (vibration isolation) on the image surface I is performed with the fifth lens group G5 serving as the vibration-proof lens group VR moved with a displacement component in the direction orthogonal to the optical axis.

In the wide angle end state, the vibration proof coefficient is 0.23 and the focal length is 16.48 (mm), and thus the movement amount of the vibration-proof lens group VR for correcting the roll blur of 0.66° is 0.81 (mm). In the intermediate focal length state, the vibration proof coefficient is 0.23 and the focal length is 34.23 (mm), and thus the movement amount of the vibration-proof lens group VR for correcting the roll blur of 0.46° is 1.21 (mm). In the telephoto end state, the vibration proof coefficient is 0.20 and the focal length is 58.22 (mm), and thus the movement amount of the vibration-proof lens group VR for correcting the roll blur of 0.35° is 1.79 (mm).

In Table 12 below, specification values in Example 12 are listed. Surface numbers 1 to 30 in Table 12 respectively correspond to the optical surfaces m1 to m30 in FIG. 53.

TABLE 12

[Lens specifications]

| Surface number | R | D | nd | νd |
|---|---|---|---|---|
| Obj surface | ∞ | | | |
| 1 | 46.40832 | 1.500 | 1.94594 | 18.0 |
| 2 | 34.66455 | 6.713 | 1.80400 | 46.6 |
| 3 | 127.07483 | (D3) | 1.00000 | |
| 4 | 55.81938 | 1.000 | 1.80400 | 46.6 |
| 5 | 11.58349 | 9.722 | 1.00000 | |
| *6 | −46.86550 | 1.000 | 1.72903 | 54.0 |
| *7 | 51.87909 | 0.783 | 1.00000 | |
| 8 | 59.79626 | 2.014 | 1.94594 | 18.0 |
| 9 | −2186.07280 | (D9) | 1.00000 | |
| *10 | 27.26861 | 3.200 | 1.72903 | 54.0 |
| 11 | −129.16671 | 1.800 | 1.00000 | |
| 12 | (stop S) | 1.500 | 1.00000 | |
| 13 | 68.38177 | 2.869 | 1.48749 | 70.3 |
| 14 | 202.75413 | 1.000 | 1.78472 | 25.6 |
| 15 | 39.83391 | 1.200 | 1.00000 | |
| *16 | 142.37742 | 0.850 | 1.72903 | 54.0 |
| 17 | 16.28016 | 4.757 | 1.49782 | 82.6 |
| 18 | −23.81991 | (D18) | 1.00000 | |
| 19 | 34.83439 | 2.380 | 1.49782 | 82.6 |
| 20 | −181.29602 | (D20) | 1.00000 | |
| *21 | 318.18531 | 2.000 | 1.69350 | 53.2 |
| 22 | 79.44709 | 2.209 | 1.00000 | |
| 23 | −45.33154 | 1.000 | 1.77377 | 47.2 |
| *24 | −60.05145 | 7.053 | 1.00000 | |
| *25 | −1295.54840 | 5.000 | 1.59255 | 67.9 |
| 26 | −26.79305 | 1.384 | 1.00000 | |
| 27 | −28.73919 | 4.200 | 1.59319 | 67.9 |
| 28 | −20.59136 | (D28) | 1.00000 | |
| 29 | −30.60749 | 0.850 | 1.80809 | 22.7 |
| 30 | −206.61166 | (D30) | 1.00000 | |
| Img surface | ∞ | | | |

[Aspherical data]

| Surface | κ | A4 | A6 | A8 | A10 |
|---|---|---|---|---|---|
| 6 | 1.00000e+00 | −4.29550e−05 | 2.50726e−07 | −1.33649e−09 | −9.20595e−12 |
| 7 | 1.00000e+00 | −6.40436e−05 | 3.01735e−07 | −2.60073e−09 | 0.00000e+00 |
| 10 | 1.00000e+00 | −1.85190e−05 | −4.30274e−09 | −2.14140e−10 | 6.29617e−13 |
| 16 | 1.00000e+00 | 1.21548e−05 | −3.28136e−08 | 1.45941e−09 | −1.15076e−11 |
| 21 | 1.00000e+00 | −2.85327e−05 | 8.17418e−08 | 1.11021e−09 | 0.00000e+00 |
| 24 | 1.00000e+00 | −3.56325e−05 | 1.57588e−07 | 3.97044e−10 | 5.59729e−12 |
| 25 | 1.00000e+00 | −4.55529e−05 | 4.82262e−08 | 1.53635e−10 | 0.00000e+00 |

[Various data]
Zoom ratio 3.53

| | Wide angle end | Intermediate | Telephoto end |
|---|---|---|---|
| f | 16.48 | 34.23 | 58.22 |
| FNo | 2.88 | 3.99 | 4.49 |
| ω | 40.8 | 22.0 | 13.0 |
| Y | 13.01 | 14.25 | 14.25 |
| TL | 106.751 | 122.797 | 143.722 |
| BF | 12.997 | 12.997 | 12.997 |
| BF(air) | 12.997 | 12.997 | 12.997 |

TABLE 12-continued

[Variable distance data]

| | Upon focusing on infinity | | | Upon focusing on short distant object | | |
|---|---|---|---|---|---|---|
| | Wide angle end | Intermediate | Telephoto end | Wide angle end | Intermediate | Telephoto end |
| f | 16.48 | 34.23 | 58.22 | — | — | — |
| β | — | — | — | −0.1012 | −0.1708 | −0.1329 |
| D0 | ∞ | ∞ | ∞ | 143.25 | 177.20 | 406.28 |
| D3 | 1.000 | 10.016 | 25.000 | 1.000 | 10.016 | 25.000 |
| D9 | 18.296 | 5.240 | 0.800 | 18.296 | 5.240 | 0.800 |
| D18 | 3.000 | 6.945 | 6.827 | 1.247 | 1.855 | 0.461 |
| D20 | 2.354 | 18.768 | 30.128 | 4.107 | 23.857 | 36.495 |
| D28 | 3.120 | 2.848 | 1.986 | 3.120 | 2.848 | 1.986 |
| D30 | 12.997 | 12.997 | 12.997 | 12.997 | 12.997 | 12.997 |

[Lens group data]

| | Group starting surface | Group focal length |
|---|---|---|
| First lens group | 1 | 95.15 |
| Second lens group | 4 | −13.63 |
| Third lens group | 10 | 31.54 |
| Fourth lens group | 19 | 58.91 |
| Fifth lens group | 21 | 42.02 |
| Sixth lens group | 29 | −44.56 |

[Conditional expression corresponding value]

Conditional expression(JA1) |fF/fRF| = 1.402
Conditional expression(JA2) (−fXn)/fXR = 0.432
Conditional expression(JA3) fF/fW = 3.575
Conditional expression(JA4) Wω = 40.848
Conditional expression(JA5) fF/fXR = 1.868
Conditional expression(JA6) DXRFT/fF = 0.116
Conditional expression(JA7) Tω = 13.014
Conditional expression(JA8) DGXR/fXR = 0.619
Conditional expression(JC1) |fF/fRF| = 1.402
Conditional expression(JC2) (DMRT − DMRW)/fF = 0.471
Conditional expression(JC3) Wω = 40.848
Conditional expression(JC4) Tω = 13.014
Conditional expression(JC5) fRF/fRF2 = −0.943
Conditional expression(JC6) DGXR/fXR = 0.545
Conditional expression(JE1) DVW/fV = 0.074
Conditional expression(JE2) Wω = 40.848
Conditional expression(JE3) fF/fW = 3.575
Conditional expression(JE4) fV/fRF = 1.000
Conditional expression(JE5) fF/fXR = 1.868
Conditional expression(JE6) DGXR/fXR = 0.545
Conditional expression(JE7) DXnW/ZD1 = 0.544
Conditional expression(JF1) fF/fV = 1.402
Conditional expression(JF2) fV/fRF = 1.000
Conditional expression(JF3) DVW/fV = 0.074
Conditional expression(JF4) Wω = 40.848
Conditional expression(JF5) fF/fXR = 1.868
Conditional expression(JF6) DGXR/fXR = 0.545
Conditional expression(JF7) TLW/ZD1 = 3.042
Conditional expression(JI1) (rB + rA)/(rB − rA) = 0.188
Conditional expression(JI2) (rC + rB)/(rC − rB) = 0.678
Conditional expression(JI3) |fF/fXR| = 1.868
Conditional expression(JI4) νdp = 82.570

It can be seen in Table 12 that the zoom optical system ZL12 according to Example 12 satisfies the conditional expressions (JA1) to (JA8), (JC1) to (JC6), (JE1) to (JE7), (JF1) to (JF7), and (JI1) to (JI4).

Figure 54A:
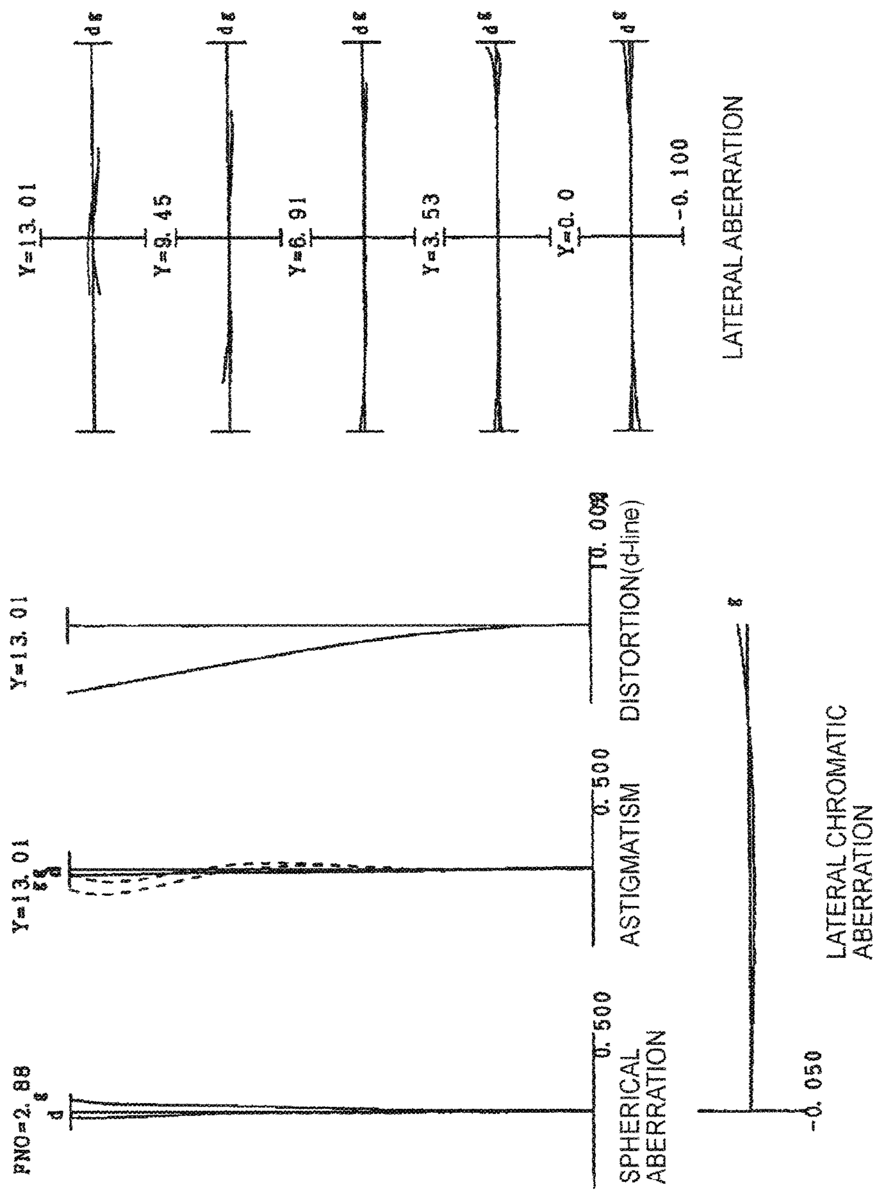
FIGS. 54A, 54B, and 54C are graphs showing various aberrations of the zoom optical system according to Example 12 upon focusing on infinity respectively in the wide angle end state, the intermediate focal length state, and the telephoto end state.
Figure 54B:
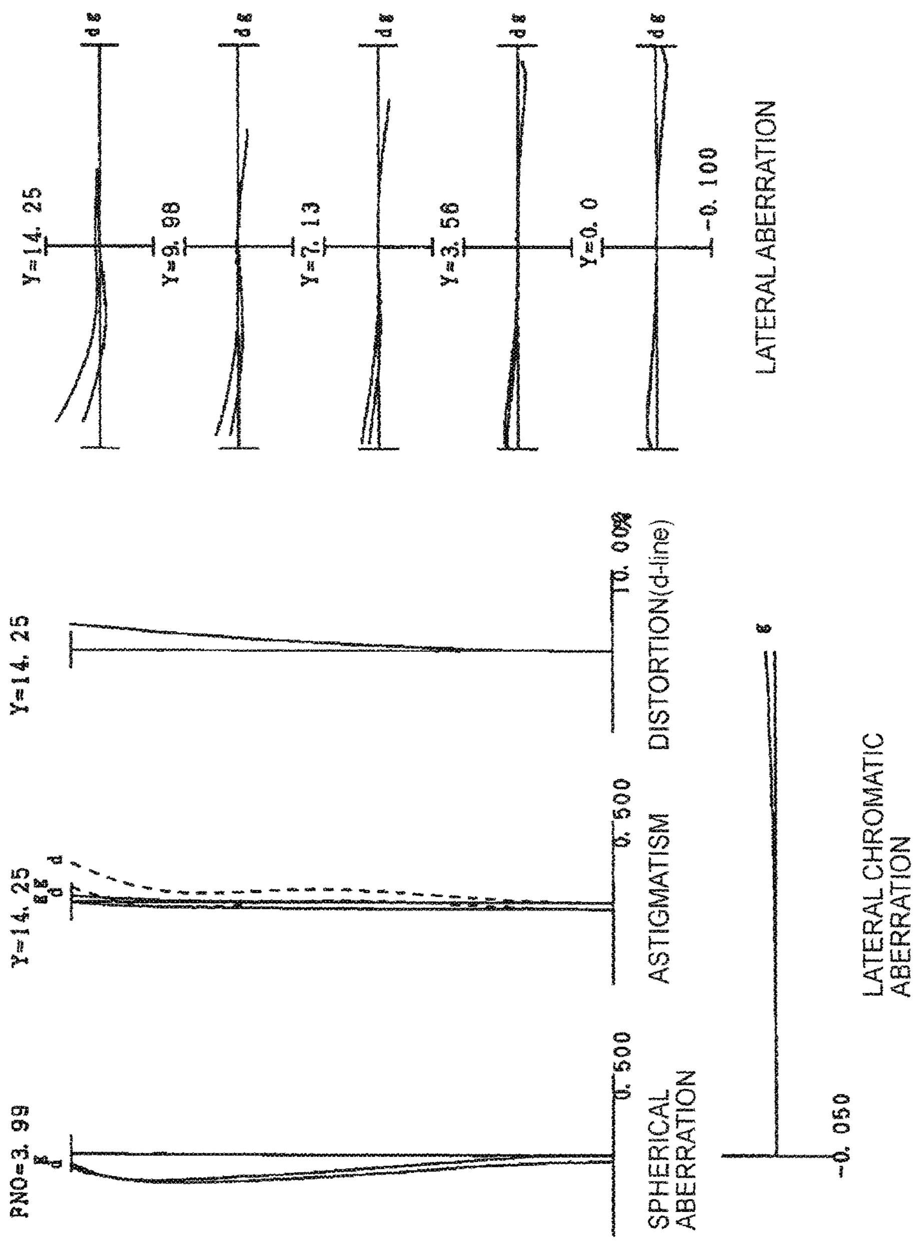
Figure 54C:
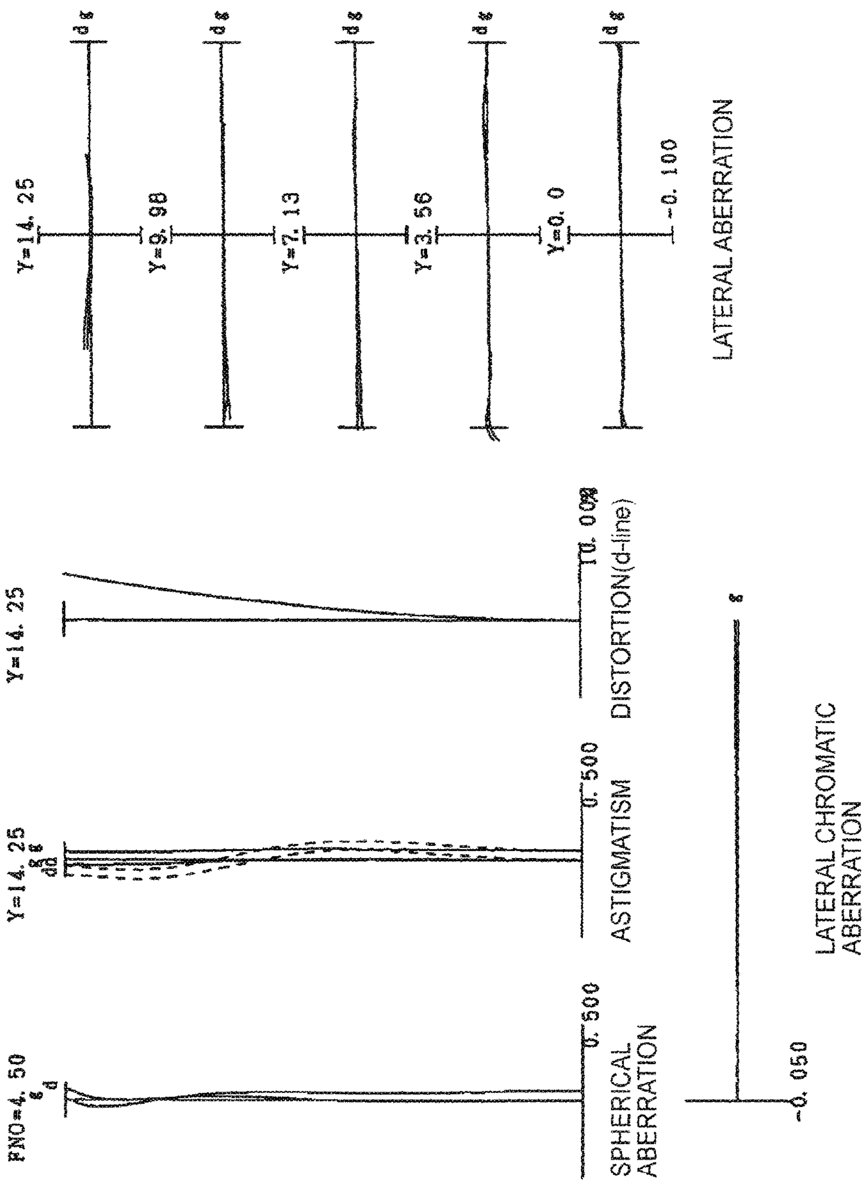
Figure 55A:
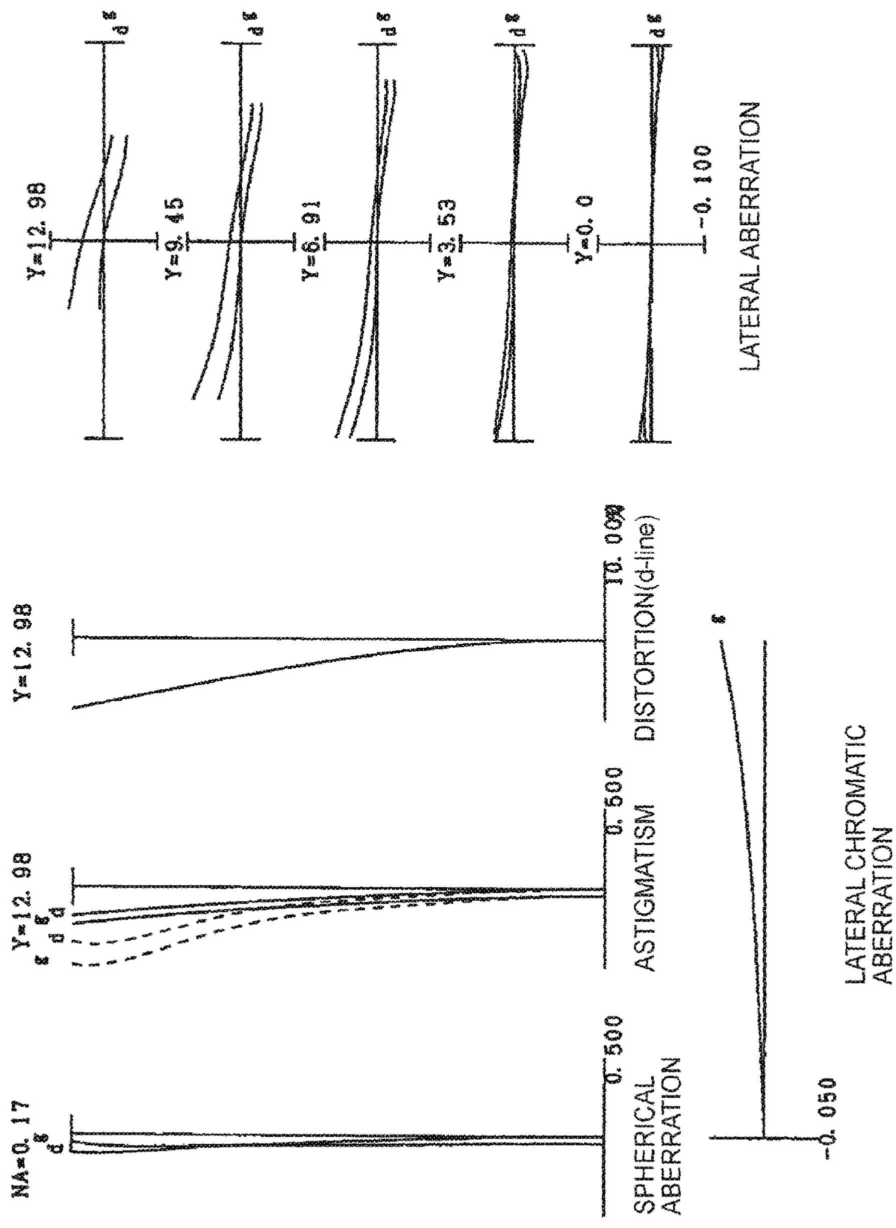
FIGS. 55A, 55B, and 55C are graphs showing various aberrations of the zoom optical system according to Example 12 upon focusing on a short distant object respectively in the wide angle end state, the intermediate focal length state, and the telephoto end state.
Figure 55B:
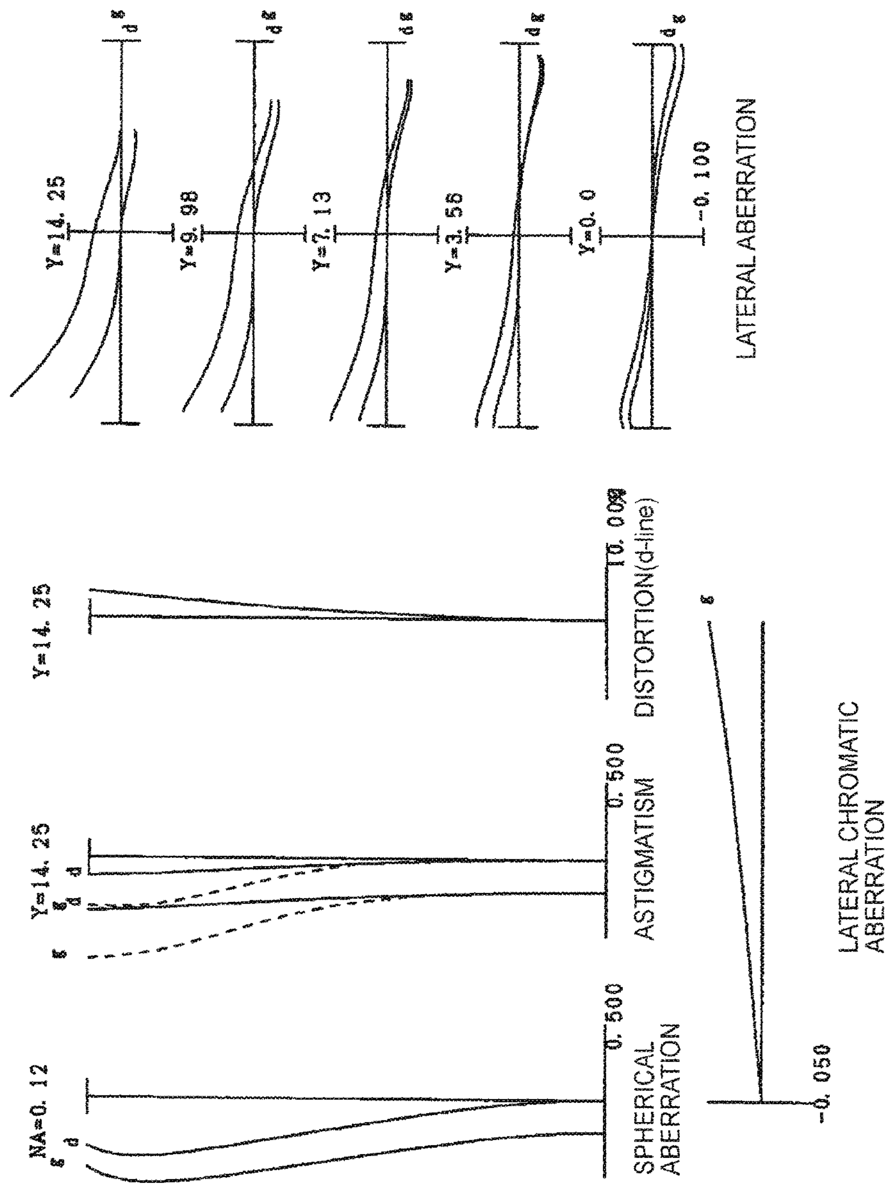
Figure 55C:
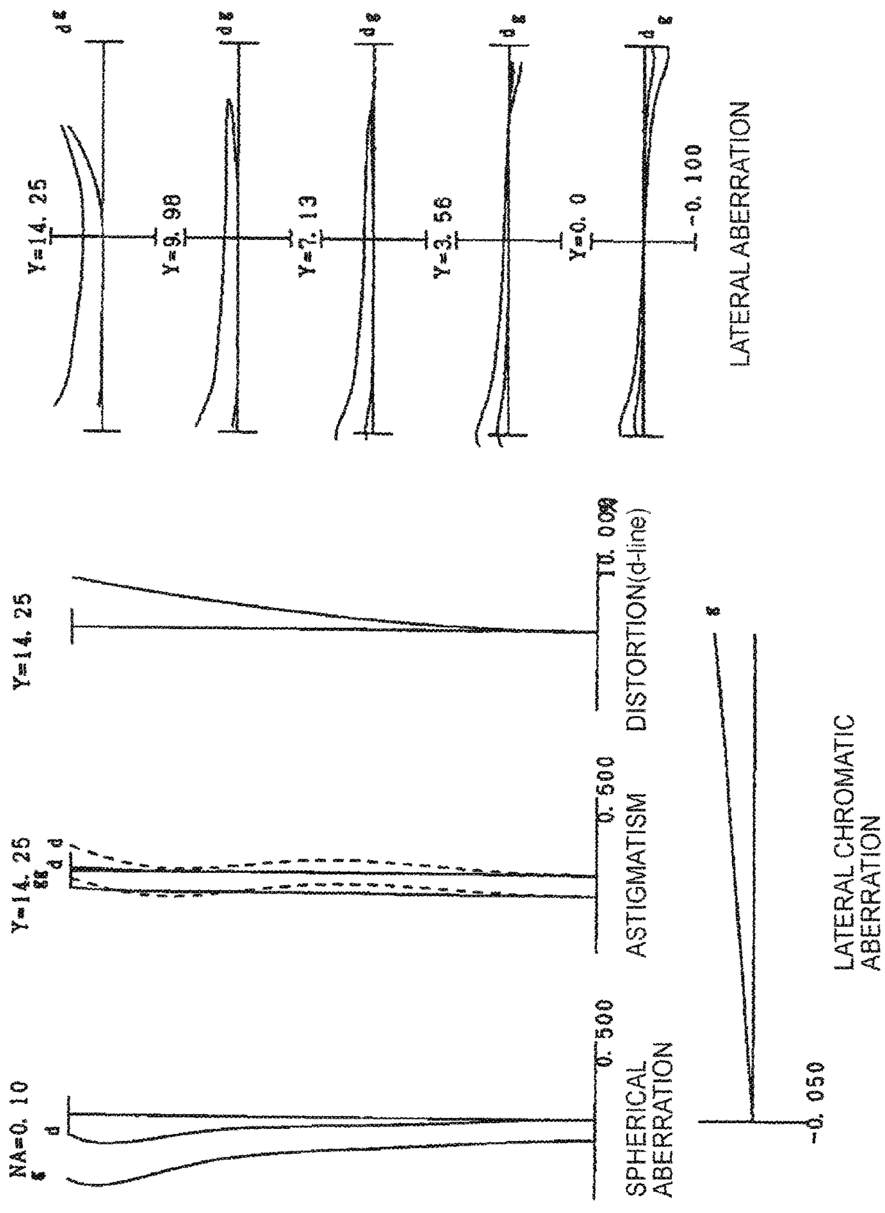
Figure 56A:
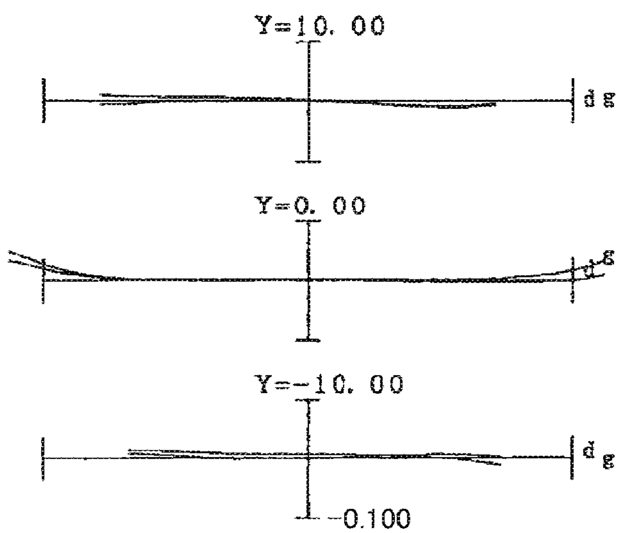
FIGS. 56A, 56B, and 56C are graphs showing lateral aberrations of the zoom optical system according to Example 12 upon focusing on infinity with image blur correction performed, respectively in the wide angle end state, the intermediate focal length state, and the telephoto end state.
Figure 56B:
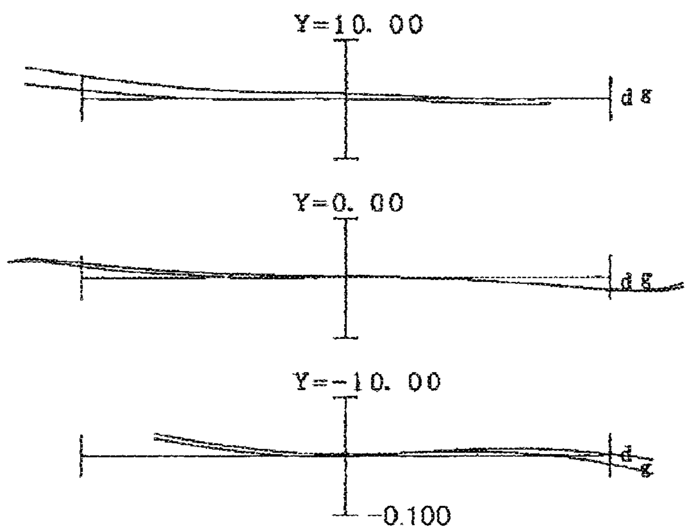

FIG. 54 is various aberration graphs (a spherical aberration graph, an astigmatism graph, a distortion graph, a lateral chromatic aberration graph, and a lateral aberration graph) of the zoom optical system ZL12 according to Example 12 upon focusing on infinity with FIG. 54A corresponding to the wide angle end state, FIG. 54B corresponding to the intermediate focal length state, and FIG. 54C corresponding to the telephoto end state. FIG. 55 is various aberration graphs (a spherical aberration graph, an astigmatism graph, a distortion graph, a lateral chromatic aberration graph, and a lateral aberration graph) of the zoom optical system ZL12 according to Example 12 upon focusing on a short distant object with FIG. 55A corresponding to the wide angle end state, FIG. 55B corresponding to the intermediate focal length state, and FIG. 55C corresponding to the telephoto end state. FIG. 56 is lateral aberration graphs at the time of image blur correction for the zoom optical system ZL12 according to Example 12 upon focusing on infinity with FIG. 56A corresponding to the wide angle end state, FIG.

Figure 56C:
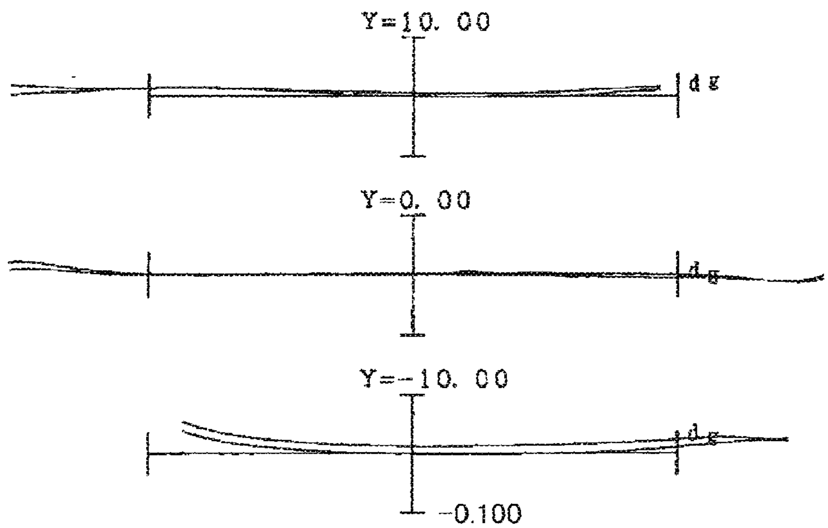

56B corresponding to the intermediate focal length state, and FIG. 56C corresponding to the telephoto end state.

It can be seen in FIG. 54 to FIG. 56 that the zoom optical system ZL12 according to Example 12 can achieve an excellent optical performance with various aberrations successfully corrected from the wide angle end state to the telephoto end state and from the infinity focusing state to the short-distant object focusing state. Furthermore, it can be seen that a high imaging performance can be achieved upon image blur correction.

Example 13

Example 13 is described with reference to FIG. 57 to FIG. 60 and Table 13. A zoom optical system ZLI (ZL13) according to Example 13 includes, as illustrated in FIG. 57, the first lens group G1 having positive refractive power, the second lens group G2 having negative refractive power, the third lens group G3 having positive refractive power, the fourth lens group G4 having positive refractive power, and the fifth lens group G5 having negative refractive power that are arranged in order from the object side.

In the present example, the second lens group G2 and the third lens group G3 correspond to the front-side lens group GX. The fourth lens group G4 corresponds to the intermediate lens group GM (focusing lens group GF). The fifth lens group G5 corresponds to the rear-side lens group GR. The cemented lens including the lenses L51 and L52 forming the fifth lens group G5 corresponds to the vibration-proof lens group VR.

The first lens group G1 includes: the cemented lens including the negative meniscus lens L11 having a concave surface facing the image surface side and the biconvex lens L12; and the positive meniscus lens L13 having a convex surface facing the object side that are arranged in order from the object side.

The second lens group G2 includes the negative meniscus lens L21 having a concave surface facing the image surface side, the biconcave lens L22, the biconvex lens L23, and the negative meniscus lens L24 having a concave surface facing the object side that are arranged in order from the object side.

The negative meniscus lens L21 is a composite type aspherical lens with a resin layer, formed on a glass surface on the object side, formed to have an aspherical shape. The negative meniscus lens L24 is a glass-molded aspherical lens with a lens surface, on the image surface side, having an aspherical shape.

The third lens group G3 includes: the biconvex lens L31; the aperture stop S; the cemented lens including the negative meniscus lens L32 having a concave surface facing the image surface side and the biconvex lens L33; the biconvex lens L34; and the cemented lens including the biconvex lens L35 and the biconcave lens L36 that are arranged in order from the object side.

The biconvex lens L31 is a glass-molded aspherical lens with a lens surface, on the object side, having an aspherical shape.

The fourth lens group G4 includes a cemented lens including the biconvex lens L41 and the negative meniscus lens L42 having a concave surface facing the object side that are arranged in order from the object side.

The fifth lens group G5 includes: the cemented lens including the positive meniscus lens L51 having a convex surface facing the image surface side and the biconcave lens L52; the biconvex lens L53; and the negative meniscus lens L54 having a concave surface facing the object side that are arranged in order from the object side.

The biconcave lens L52 is a glass-molded aspherical lens with a lens surface, on the image surface side, having an aspherical shape.

Upon zooming from the wide angle end state to the telephoto end state, the distance between lens groups changes with the first lens group G1 to the fifth lens group G5 each moved toward the object side.

Upon focusing from infinity to the short-distant object, the fourth lens group G4 moves toward the object side.

When image blur occurs, image blur correction (vibration isolation) on the image surface I is performed with the cemented lens including the lenses L51 and L52 forming the fifth lens group G5, and serving as the vibration-proof lens group VR moved with a displacement component in the direction orthogonal to the optical axis.

In Example 13, in the wide angle end state, the vibration proof coefficient is −0.97 and the focal length is 24.70 (mm), and thus the movement amount of the vibration-proof lens group VR for correcting the roll blur of 0.66° is −0.29 (mm). In the intermediate focal length state, the vibration proof coefficient is −1.23 and the focal length is 49.50 (mm), and thus the movement amount of the vibration-proof lens group VR for correcting the roll blur of 0.47° is −0.33 (mm). In the telephoto end state, the vibration proof coefficient is −1.48 and the focal length is 82.45 (mm), and thus the movement amount of the vibration-proof lens group VR for correcting the roll blur of 0.36° is −0.35 (mm).

In Table 13 below, specification values in Example 13 are listed. Surface numbers 1 to 35 in Table 13 respectively correspond to the optical surfaces m1 to m35 in FIG. 57.

TABLE 13

[Lens specifications]

| Surface number | R | D | nd | νd |
|---|---|---|---|---|
| Obj surface | ∞ | | | |
| 1 | 241.11515 | 2.000 | 1.92286 | 20.9 |
| 2 | 103.44771 | 5.420 | 1.59319 | 67.9 |
| 3 | −7416.50890 | 0.100 | 1.00000 | |
| 4 | 56.35289 | 5.617 | 1.75500 | 52.3 |
| 5 | 189.71095 | (D5) | 1.00000 | |
| *6 | 180.45884 | 0.100 | 1.56093 | 36.6 |
| 7 | 93.90256 | 1.250 | 1.83481 | 42.7 |
| 8 | 15.53782 | 8.861 | 1.00000 | |
| 9 | −29.30755 | 1.000 | 1.80400 | 46.6 |
| 10 | 125.24231 | 0.299 | 1.00000 | |

TABLE 13-continued

| | | | | |
|---|---|---|---|---|
| 11 | 56.49561 | 5.857 | 1.80809 | 22.7 |
| 12 | −29.68309 | 1.683 | 1.00000 | |
| 13 | −20.94818 | 1.200 | 1.88202 | 37.2 |
| *14 | −36.26558 | (D14) | 1.00000 | |
| *15 | 208.43307 | 2.148 | 1.72903 | 54.0 |
| 16 | −111.63066 | 2.282 | 1.00000 | |
| 17 | (stop S) | 1.000 | 1.00000 | |
| 18 | 46.77320 | 1.500 | 1.71999 | 50.3 |
| 19 | 31.72866 | 5.122 | 1.49782 | 82.6 |
| 20 | −453.18879 | 0.100 | 1.00000 | |
| 21 | 76.84303 | 4.093 | 1.48749 | 70.3 |
| 22 | −45.25442 | 0.100 | 1.00000 | |
| 23 | 263.80748 | 4.141 | 1.95000 | 29.4 |
| 24 | −31.17139 | 1.000 | 1.79504 | 28.7 |
| 25 | 29.03381 | (D25) | 1.00000 | |
| 26 | 55.64853 | 5.981 | 1.58313 | 59.4 |
| 27 | −19.40195 | 1.000 | 1.79504 | 28.7 |
| 28 | −35.38084 | (D28) | 1.00000 | |
| 29 | −141.22564 | 3.677 | 1.84666 | 23.8 |
| 30 | −23.75223 | 1.000 | 1.76801 | 49.2 |
| *31 | 43.50066 | 3.075 | 1.00000 | |
| 32 | 44.96093 | 8.708 | 1.49782 | 82.6 |
| 33 | −21.83258 | 0.911 | 1.00000 | |
| 34 | −21.94603 | 1.350 | 1.90366 | 31.3 |
| 35 | −48.91548 | (D35) | 1.00000 | |
| Img surface | ∞ | | | |

[Aspherical data]

6th surface

κ = 1.00000e+00
A4 = 1.29884e−05
A6 = −2.61296e−08
A8 = 6.74064e−11
A10 = −1.41771e−13
A12 = 2.18700e−16

14th surface

κ = 1.00000e+00
A4 = −1.60620e−06
A6 = −8.46210e−09
A8 = 1.06446e−12
A10 = 0.00000e+00
A12 = 0.00000e+00

15th surface

κ = 1.00000e+00
A4 = −9.77451e−06
A6 = −5.03316e−09
A8 = −7.08144e−12
A10 = 0.00000e+00
A12 = 0.00000e+00

31st surface

κ = 1.00000e+00
A4 = 4.03997e−07
A6 = −2.51998e−09
A8 = 2.61375e−11
A10 = 0.00000e+00
A12 = 0.00000e+00

[Various data]
Zoom ratio 3.34

| | Wide angle end | Intermediate | Telephoto end |
|---|---|---|---|
| f | 24.70 | 49.50 | 82.45 |
| FNo | 3.08 | 3.85 | 4.60 |
| ω | 41.2 | 23.6 | 14.4 |
| Y | 19.46 | 21.63 | 21.63 |
| TL | 157.364 | 172.583 | 196.763 |
| BF | 38.000 | 51.002 | 63.987 |
| BF(air) | 38.000 | 51.002 | 63.987 |

TABLE 13-continued

[Variable distance data]

| | Upon focusing on infinity | | | Upon focusing on short distant object | | |
|---|---|---|---|---|---|---|
| | Wide angle end | Intermediate | Telephoto end | Wide angle end | Intermediate | Telephoto end |
| f | 24.70 | 49.50 | 82.45 | — | — | — |
| β | — | — | — | −0.1467 | −0.1894 | −0.2422 |
| D0 | ∞ | ∞ | ∞ | 142.64 | 227.42 | 303.24 |
| D5 | 1.500 | 14.906 | 29.804 | 1.500 | 14.906 | 29.804 |
| D14 | 24.244 | 7.638 | 1.500 | 24.244 | 7.638 | 1.500 |
| D25 | 11.046 | 9.677 | 11.046 | 9.229 | 5.570 | 2.629 |
| D28 | 2.000 | 8.785 | 9.851 | 3.817 | 12.891 | 18.268 |
| D35 | 38.000 | 51.002 | 63.987 | 38.000 | 51.002 | 63.987 |

[Lens group data]

| | Group starting surface | Group focal length |
|---|---|---|
| First lens group | 1 | 97.37 |
| Second lens group | 6 | −17.47 |
| Third lens group | 15 | 48.40 |
| Fourth lens group | 26 | 46.36 |
| Fifth lens group | 29 | −128.60 |

[Conditional expression corresponding value]

Conditional expression(JB1) (DMRT − DMRW)/fF = 0.169
Conditional expression(JB2) Wω = 41.170
Conditional expression(JB3) Tω = 14.419
Conditional expression(JB4) fF/fRF = −0.361
Conditional expression(JB5) fF/fXR = 0.958
Conditional expression(JB6) DGXR/fXR = 0.444
Conditional expression(JD1) fV/fRF = 0.379
Conditional expression(JD2) DVW/fV = −0.063
Conditional expression(JD3) Wω = 41.170
Conditional expression(JD4) fF/fXR = 0.958
Conditional expression(JD5) (−fXn)/fXR = 0.361
Conditional expression(JD6) DGXR/fXR = 0.444
Conditional expression(JE1) DVW/fV = −0.063
Conditional expression(JE2) Wω = 41.170
Conditional expression(JE3) fF/fW = 1.877
Conditional expression(JE4) fV/fRF = 0.379
Conditional expression(JE5) fF/fXR = 0.958
Conditional expression(JE6) DGXR/fXR = 0.444
Conditional expression(JE7) DXnW/ZD1 = 0.721
Conditional expression(JG1) βFt = −0.247
Conditional expression(JG2) (rB + rA)/(rB − rA) = 3.182
Conditional expression(JG3) βFw = 0.163
Conditional expression(JH1) (rB + rA)/(rB − rA) = 3.182
Conditional expression(JH2) (rC + rB)/(rC − rB) = −0.223
Conditional expression(JH3) |fF/fXR| = 0.958
Conditional expression(JH4) βFw = 0.163
Conditional expression(JJ1) (rB + rA)/(rB − rA) = 3.182
Conditional expression(JJ2) |fF/fXR| = 0.958
Conditional expression(JJ3) βFw = 0.163
Conditional expression(JJ4) νdn = 28.690

It can be seen in Table 13 that the zoom optical system ZL13 according to Example 13 satisfies the conditional expressions (JB1) to (JB6), (JD1) to (JD6), (JE1) to (JE7), (JG1) to (JG3), (JH1) to (JH4), and (JJ1) to (JJ4).

Figure 58A:
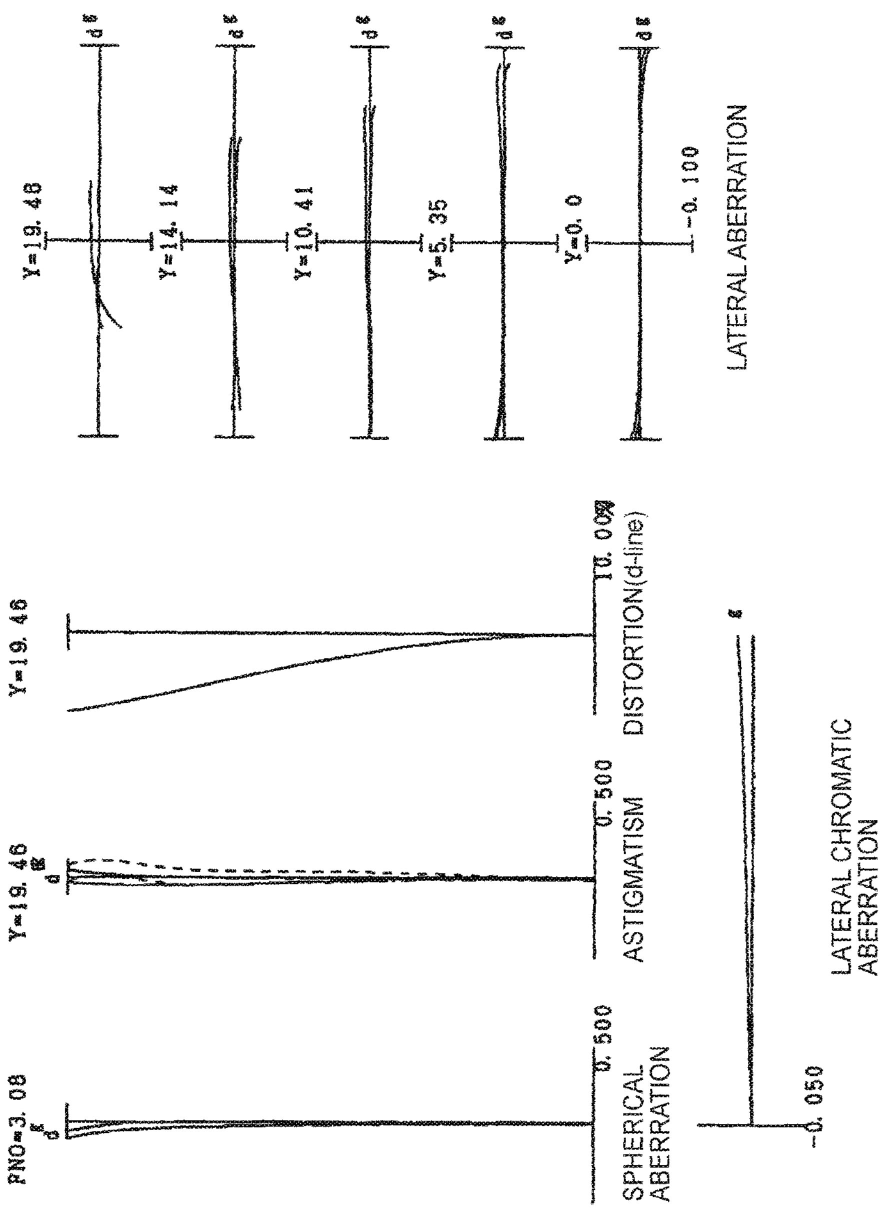
FIGS. 58A, 58B, and 58C are graphs showing various aberrations of the zoom optical system according to Example 13 upon focusing on infinity respectively in the wide angle end state, the intermediate focal length state, and the telephoto end state.
Figure 58B:
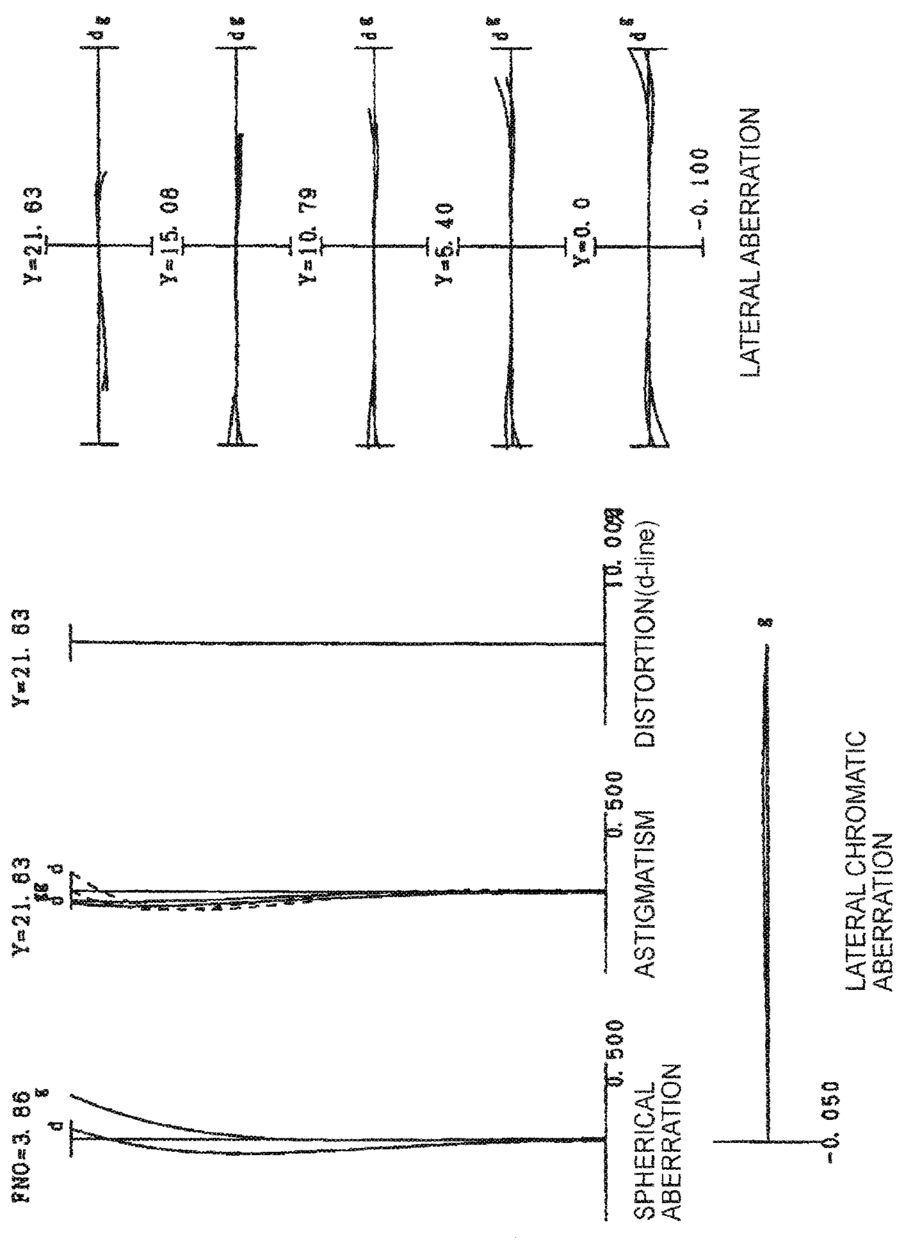
Figure 58C:
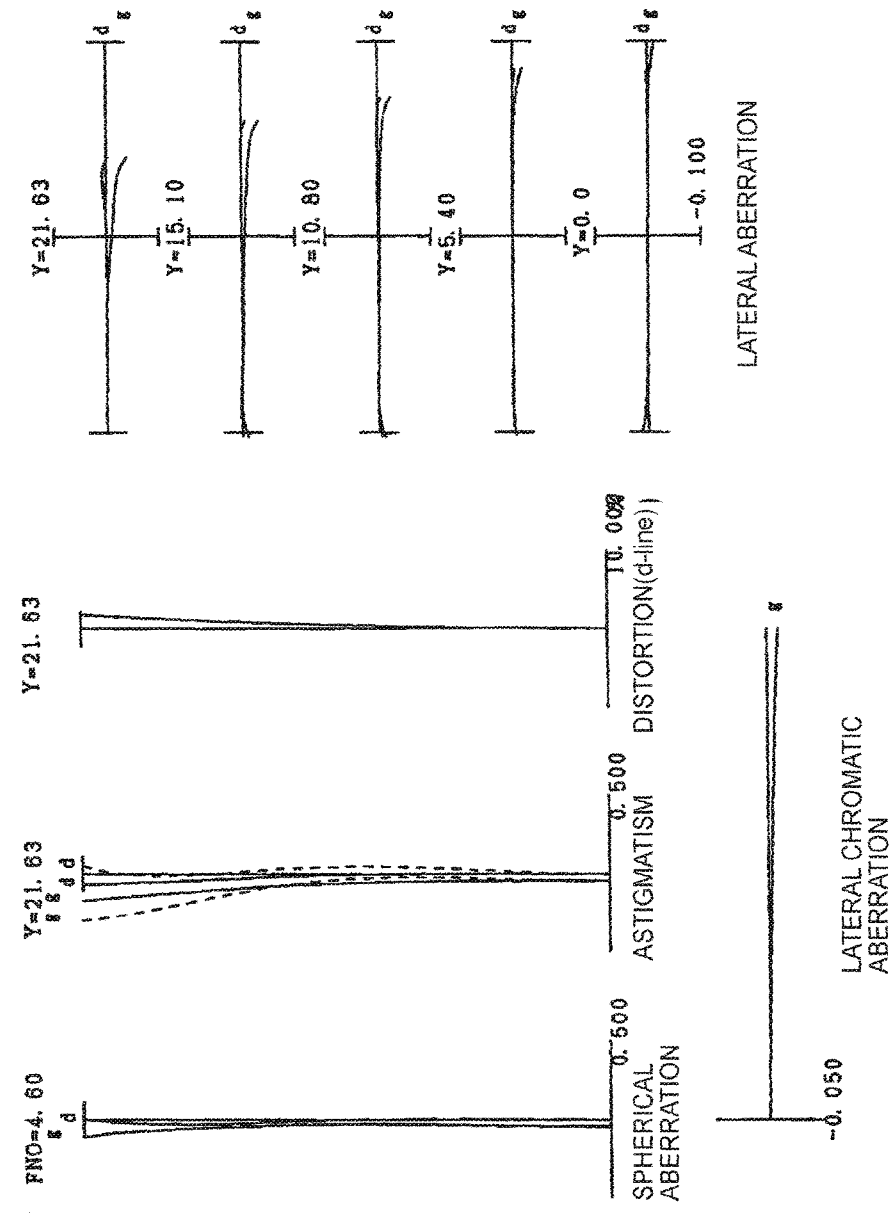
Figure 59A:
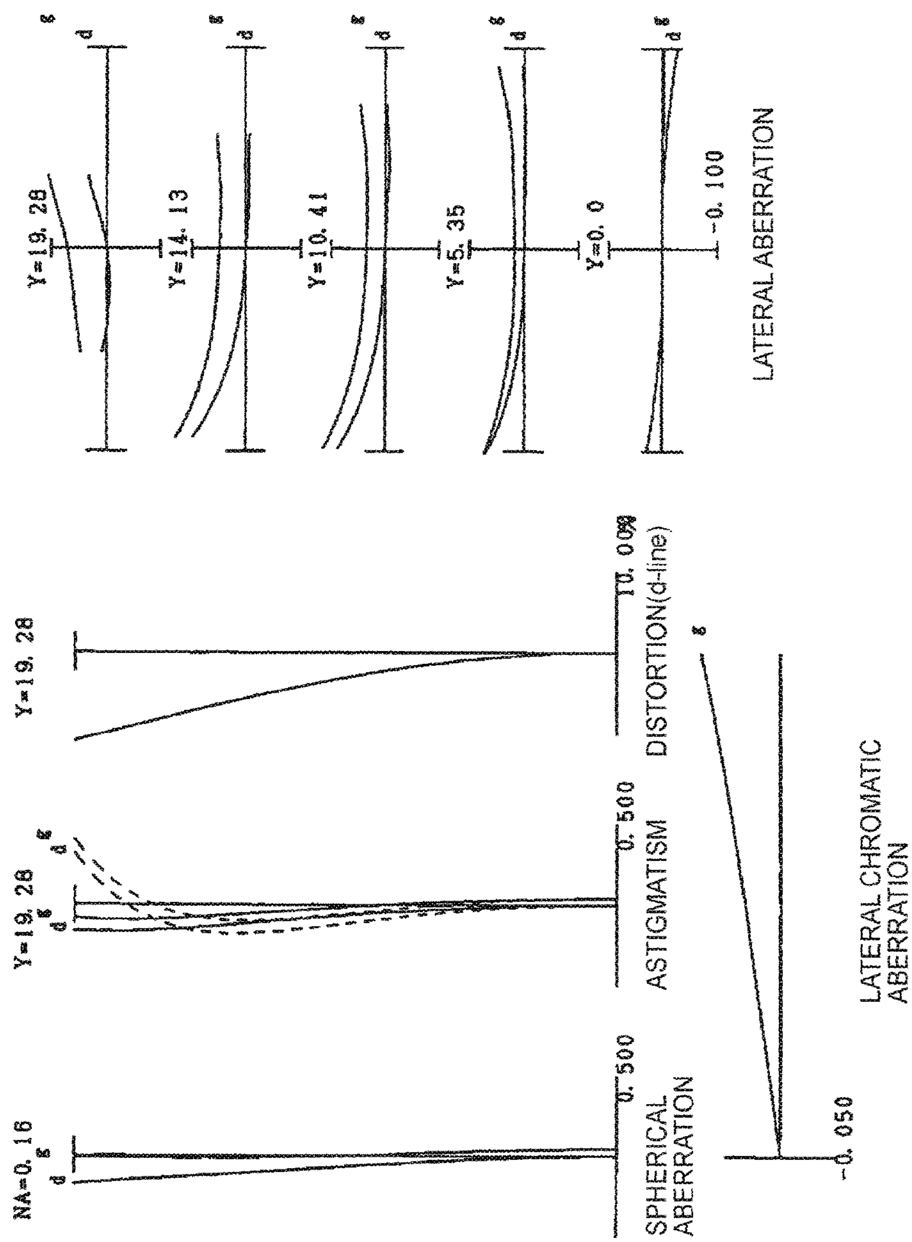
FIGS. 59A, 59B, and 59C are graphs showing various aberrations of the zoom optical system according to Example 13 upon focusing on a short distant object respectively in the wide angle end state, the intermediate focal length state, and the telephoto end state.
Figure 59B:
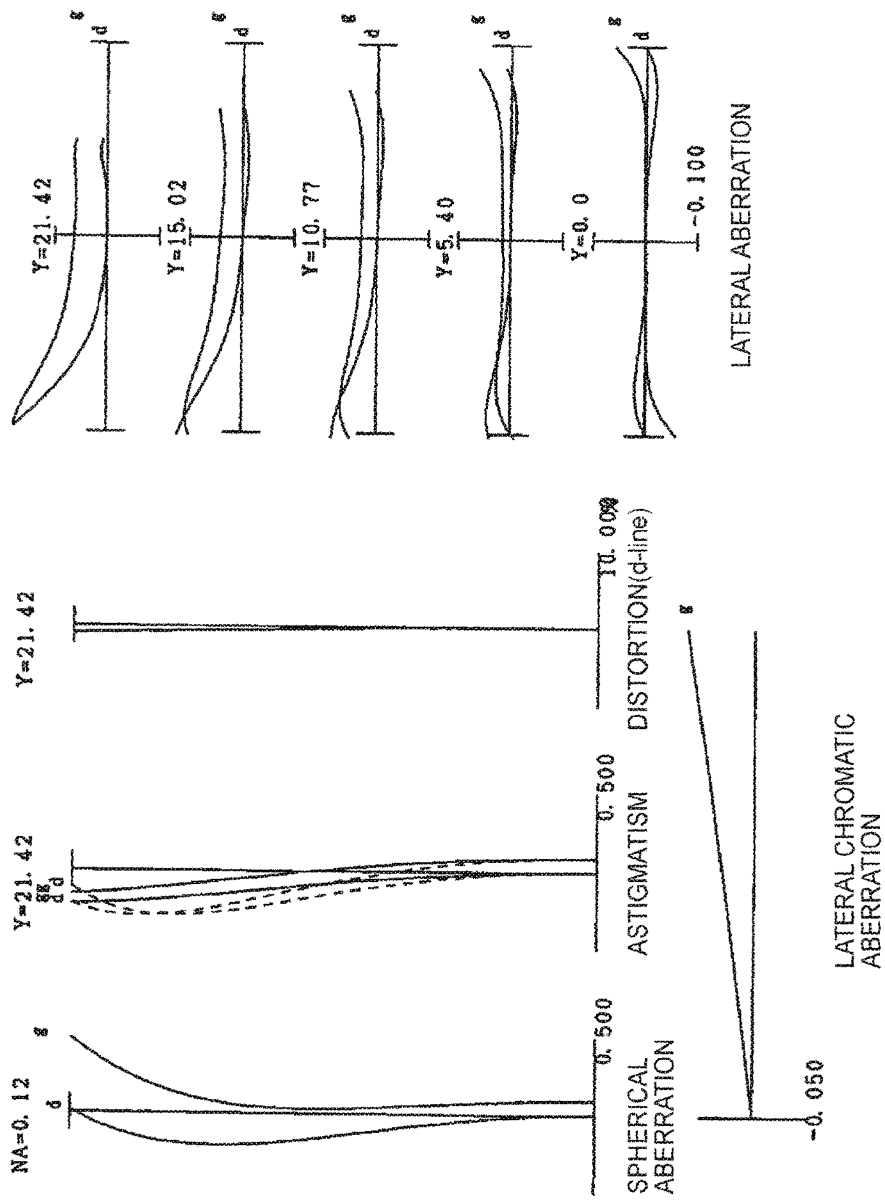
Figure 59C:
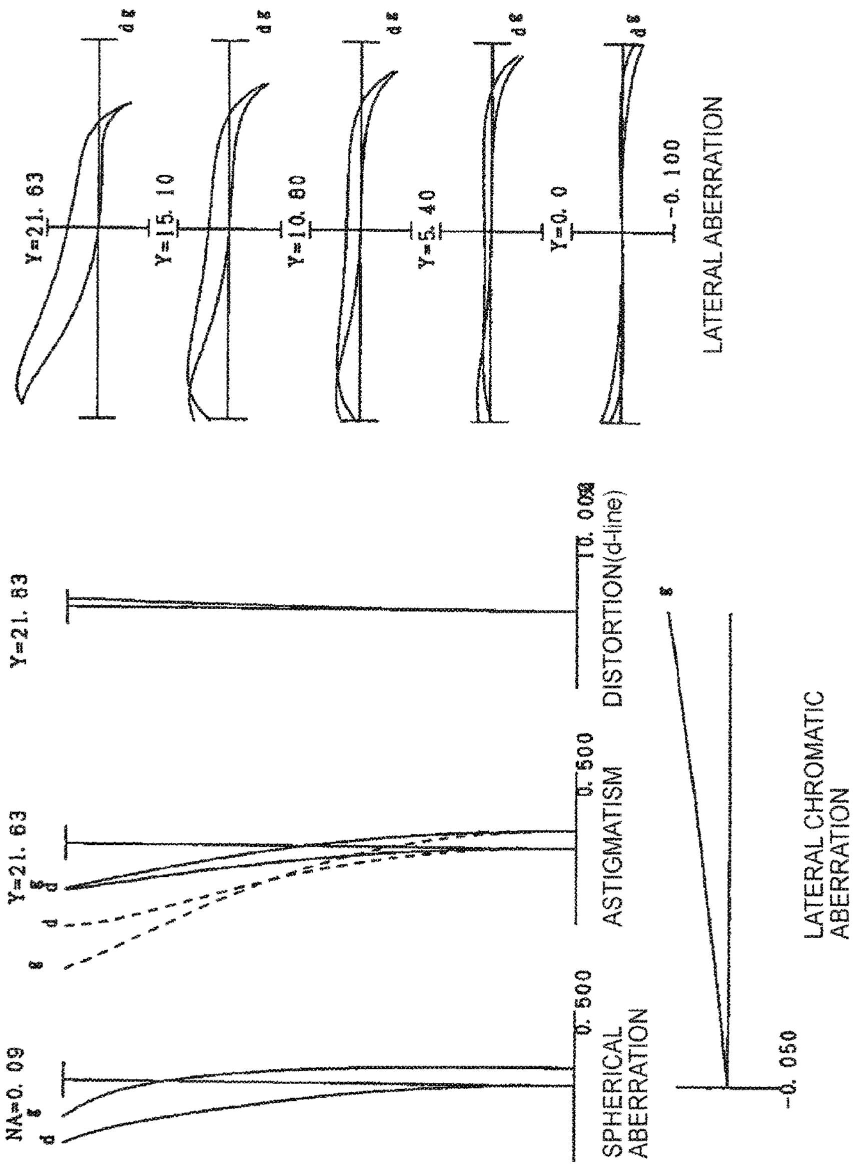
Figure 60A:
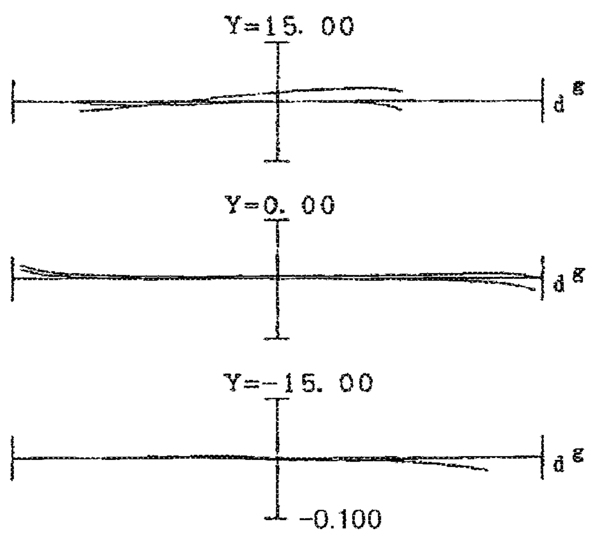
FIGS. 60A, 60B, and 60C are graphs showing lateral aberrations of the zoom optical system according to Example 13 upon focusing on infinity with image blur correction performed, respectively in the wide angle end state, the intermediate focal length state, and the telephoto end state.
Figure 60B:
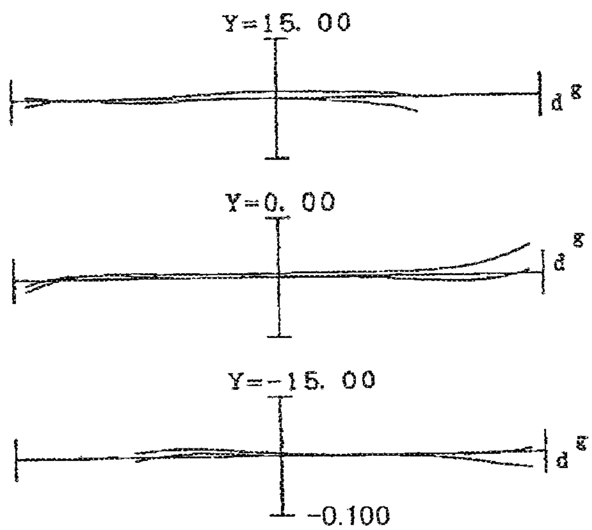
Figure 60C:
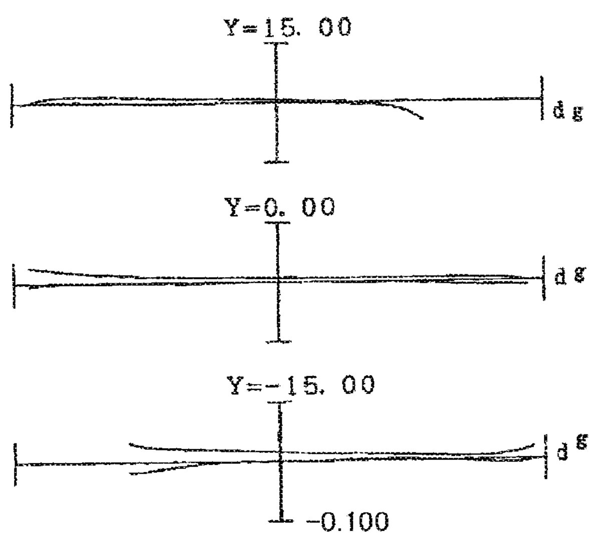

FIG. 58 is various aberration graphs (a spherical aberration graph, an astigmatism graph, a distortion graph, a lateral chromatic aberration graph, and a lateral aberration graph) of the zoom optical system ZL13 according to Example 13 upon focusing on infinity with FIG. 58A corresponding to the wide angle end state, FIG. 58B corresponding to the intermediate focal length state, and FIG. 58C corresponding to the telephoto end state. FIG. 59 is various aberration graphs (a spherical aberration graph, an astigmatism graph, a distortion graph, a lateral chromatic aberration graph, and a lateral aberration graph) of the zoom optical system ZL13 according to Example 13 upon focusing on a short distant object with FIG. 59A corresponding to the wide angle end state, FIG. 59B corresponding to the intermediate focal length state, and FIG. 59C corresponding to the telephoto end state. FIG. 60 is lateral aberration graphs at the time of image blur correction for the zoom optical system ZL13 according to Example 13 upon focusing on infinity with FIG. 60A corresponding to the wide angle end state, FIG. 60B corresponding to the intermediate focal length state, and FIG. 60C corresponding to the telephoto end state.

It can be seen in FIG. 58 to FIG. 60 that the zoom optical system ZL13 according to Example 13 can achieve an excellent optical performance with various aberrations successfully corrected from the wide angle end state to the telephoto end state and from the infinity focusing state to the short-distant object focusing state. Furthermore, it can be seen that a high imaging performance can be achieved upon image blur correction.

Example 14

Example 14 is described with reference to FIG. 61 to FIG. 64 and Table 14. A zoom optical system ZLI (ZL14) according to Example 14 includes, as illustrated in FIG. 61, the first lens group G1 having positive refractive power, the second lens group G2 having negative refractive power, the third lens group G3 having positive refractive power, the fourth lens group G4 having negative refractive power, and the fifth lens group G5 having positive refractive power that are arranged in order from the object side.

In the present example, the second lens group G2 corresponds to the front-side lens group GX. The third lens group G3 corresponds to the intermediate lens group GM. The third lens group G3 includes an object side group GA and an image side group GB that are arranged in order from the object side, and the image side group GB corresponds to the focusing lens group GF. The fourth lens group G4 and the fifth lens group G5 correspond to the rear-side lens group GR. The fourth lens group G4 corresponds to the vibration-proof lens group VR.

The first lens group G1 includes: a cemented lens including the negative meniscus lens L11 having a concave surface facing the image side and the biconvex lens L12; and the positive meniscus lens L13 having a convex surface facing the object side that are arranged in order from the object side.

The second lens group G2 includes the negative meniscus lens L21 having a concave surface facing the image side, the biconcave lens L22, the biconvex lens L23, and the negative meniscus lens L24 having a concave surface facing the object side that are arranged in order from the object side. The biconcave lens L22 is a glass-molded aspherical lens with a lens surface, on the object side, having an aspherical shape.

The third lens group G3 includes the object side group GA and the image side group GB having positive refractive power that are arranged in order from the object side. The object side group GA includes the biconvex lens L31, the aperture stop S, a biconvex lens L32, and the negative meniscus lens L33 having a concave surface facing the image side that are arranged in order from the object side. The image side group GB includes the cemented lens including the biconvex lens L34 and a negative meniscus lens L35 having a concave surface facing the object side.

The biconvex lens L31 is a glass-molded aspherical lens with lens surfaces, on the object side and on the image surface side, having an aspherical shape. The biconvex lens L34 is a glass-molded aspherical lens with a lens surface, on the object side, having an aspherical shape.

The fourth lens group G4 includes a cemented lens including the positive meniscus lens L41 having a convex surface facing the image surface side and a biconcave lens L42 arranged in order from the object side.

The fifth lens group G5 includes: the biconvex lens L51; a cemented lens including a positive meniscus lens L52 having a convex surface facing the image side and a negative meniscus lens L53 having a concave surface facing the object side; and the negative meniscus lens L54 having a concave surface facing the object side that are arranged in order from the object side.

The zooming from the wide angle end state to the telephoto end state is achieved with the first lens group G1 moved toward the object side, the second lens group G2 moved toward the image surface side and then moved toward the object side; and the third lens group G3, the fourth lens group G4, and the fifth lens group G5 moved toward the object side, in such a manner that the distance between the first lens group G1 and the second lens group G2 increases and the distance between the second lens group G2 and the third lens group G3 decreases, the distance between the third lens group G3 and the fourth lens group G4 increases, and the distance between the fourth lens group G4 and the fifth lens group G5 decreases.

Focusing from infinity to the short-distant object is achieved with the image side group GB forming the third lens group G3, serving as the focusing lens group GF, moved toward the object side.

When image blur occurs, image blur correction (vibration isolation) on the image surface I is performed with the fourth lens group G4 serving as the vibration-proof lens group VR moved with a displacement component in the direction orthogonal to the optical axis.

In Example 14, in the wide angle end state, the shifted amount of the vibration-proof lens group is −0.338 mm when the correction angle is 0.664°. In the intermediate focal length state, the shifted amount of the vibration-proof lens group is −0.358 mm when the correction angle is 0.469°. In the telephoto end state, the shifted amount of the vibration-proof lens group is −0.389 mm when the correction angle is 0.327°.

In Table 14 below, specification values in Example 14 are listed. Surface numbers 1 to 33 in Table 14 respectively correspond to the optical surfaces m1 to m33 in FIG. 61.

TABLE 14

[Lens specifications]

| Surface number | R | D | νd | nd |
|---|---|---|---|---|
| Obj surface | ∞ | | | |
| 1 | 755.7151 | 2.00 | 22.74 | 1.80809 |
| 2 | 161.3459 | 5.78 | 67.90 | 1.59319 |
| 3 | −580.4059 | 0.10 | | |
| 4 | 67.8395 | 5.80 | 54.61 | 1.72916 |
| 5 | 174.6045 | D5(variable) | | |
| 6 | 76.4442 | 1.35 | 35.73 | 1.90265 |
| 7 | 18.5155 | 8.86 | | |
| *8 | −39.7788 | 1.00 | 51.15 | 1.75501 |
| 9 | 52.4007 | 0.10 | | |
| 10 | 40.3224 | 5.17 | 22.74 | 1.80809 |
| 11 | −52.2736 | 2.86 | | |

TABLE 14-continued

| | | | | |
|---|---|---|---|---|
| 12 | −23.0648 | 1.20 | 58.12 | 1.62299 |
| 13 | −42.3507 | D13(variable) | | |
| *14 | 38.7318 | 3.48 | 51.15 | 1.75501 |
| *15 | −132.1314 | 1.00 | | |
| 16 | ∞ | 2.50 | (aperture stop) | |
| 17 | 46.8922 | 5.22 | 82.57 | 1.49782 |
| 18 | −42.6707 | 0.10 | | |
| 19 | 755.7937 | 1.00 | 37.18 | 1.83400 |
| 20 | 25.3493 | D20(variable) | | |
| *21 | 32.5284 | 7.45 | 67.02 | 1.59201 |
| 22 | −21.4485 | 1.00 | 23.80 | 1.84666 |
| 23 | −37.3054 | D23(variable) | | |
| 24 | −269.6872 | 4.53 | 22.74 | 1.80809 |
| 25 | −22.2495 | 1.00 | 35.25 | 1.74950 |
| 26 | 33.9362 | D26(variable) | | |
| 27 | 39.0406 | 8.96 | 81.49 | 1.49710 |
| 28 | −26.9857 | 1.06 | | |
| 29 | −31.8633 | 4.36 | 22.74 | 1.80809 |
| 30 | −27.4771 | 1.35 | 52.34 | 1.75500 |
| 31 | −56.0731 | 3.74 | | |
| 32 | −21.6584 | 1.30 | 54.61 | 1.72916 |
| 33 | −45.4890 | D33(variable) | | |
| Img surface | ∞ | | | |

[Aspherical data]

| Surface number | κ | A4 | A6 | A8 | A10 |
|---|---|---|---|---|---|
| 8th surface | 0.00 | 4.46184E−06 | 6.59185E−09 | −2.42201E−11 | 2.59662E−13 |
| 14th surface | 0.00 | −3.88209E−06 | 2.73780E−08 | −1.55431E−10 | 0.00000E+00 |
| 15th surface | 0.00 | 7.82327E−06 | 2.51863E−08 | −1.15048E−10 | −1.28188E−13 |
| 21st surface | 0.00 | −3.14303E−06 | 5.83544E−10 | −1.13942E−11 | 0.00000E+00 |

[Various data]
Zoom ratio 4.13

| | Wide angle end | Intermediate | Telephoto end |
|---|---|---|---|
| f | 24.7~ | 49.5~ | 102.0 |
| FNo | 2.9~ | 3.7~ | 4.1 |
| 2ω | 82.4~ | 47.2~ | 23.5 |
| Y | 19.2~ | 21.6~ | 21.6 |
| TL(air) | 145.2~ | 160.9~ | 196.8 |
| BF(air) | 14.9~ | 28.9~ | 43.9 |

[Variable distance data]

| | Upon focusing on infinity | | | Upon focusing on short distant object | | |
|---|---|---|---|---|---|---|
| | Wide angle end | Intermediate | Telephoto end | Wide angle end | Intermediate | Telephoto end |
| f | 24.7 | 49.5 | 102.0 | 24.7 | 49.5 | 102.0 |
| D5 | 1.10 | 19.44 | 48.07 | | | |
| D13 | 25.53 | 8.90 | 1.10 | | | |
| D20 | 10.87 | 10.87 | 10.87 | 10.20 | 8.66 | 2.09 |
| D23 | 2.50 | 6.70 | 7.68 | 3.17 | 8.91 | 16.46 |
| D26 | 8.08 | 3.88 | 2.90 | | | |
| D33 | 14.92 | 28.89 | 43.95 | | | |

[Lens group data]

| | Group starting surface | Group focal length |
|---|---|---|
| First lens group | 1 | 133.47 |
| Second lens group | 6 | −20.32 |
| Third lens group | 14 | 30.32 |
| Fourth lens group | 24 | −44.25 |
| Fifth lens group | 27 | 151.19 |

TABLE 14-continued

| [Conditional expression corresponding value] |
|---|
| Conditional expression(JG1) βFt = −0.306 |
| Conditional expression(JG2) (rB + rA)/(rB − rA) = 8.062 |
| Conditional expression(JG3) βFw = 0.085 |
| Conditional expression(JJ1) (rB + rA)/(rB − rA) = 8.062 |
| Conditional expression(JJ2) \|fF/fXR\| = 1.760 |
| Conditional expression(JJ3) βFw = 0.085 |
| Conditional expression(JJ4) νdn = 23.800 |

It can be seen in Table 14 that the zoom optical system ZL14 according to this Example satisfies the conditional expression (JG1) to (JG3) and (JJ1) to (JJ4).

Figure 62A:
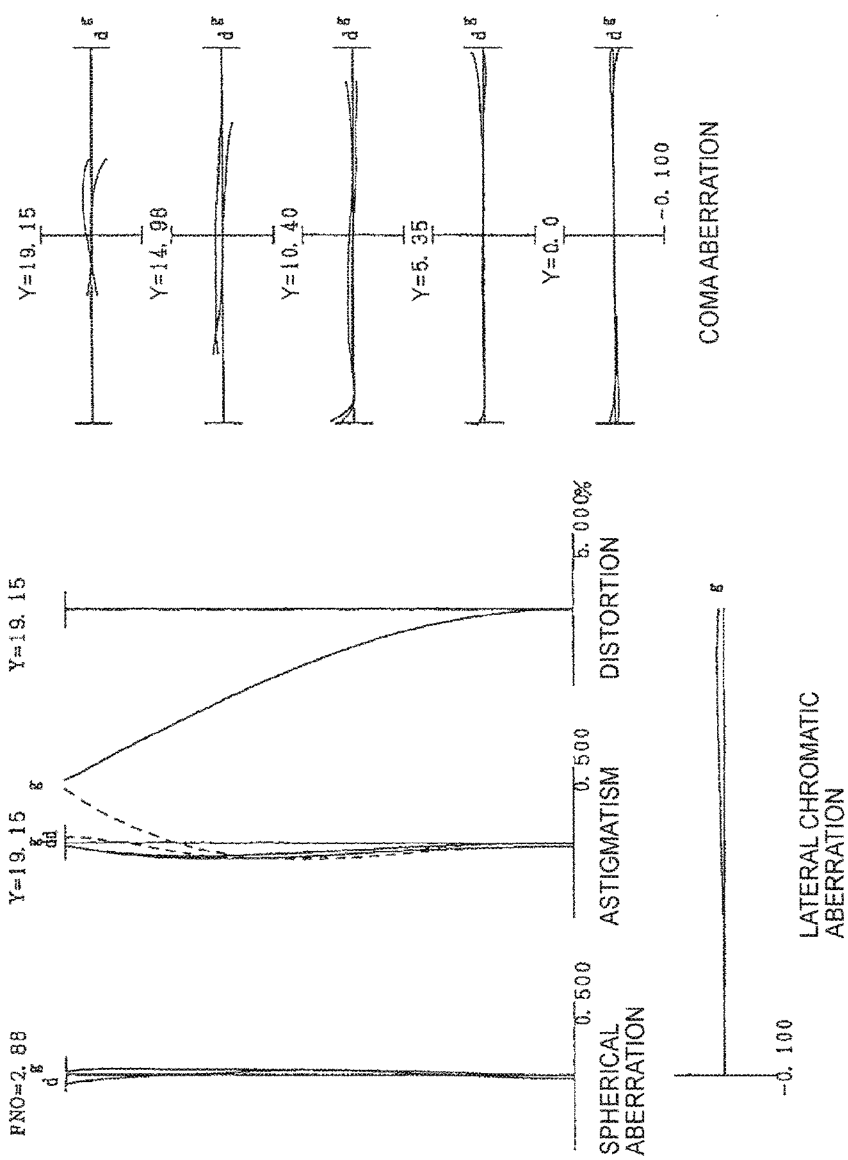
FIGS. 62A, 62B, and 62C are graphs showing various aberrations of the zoom optical system according to Example 14 upon focusing on infinity respectively in the wide angle end state, the intermediate focal length state, and the telephoto end state.
Figure 62B:
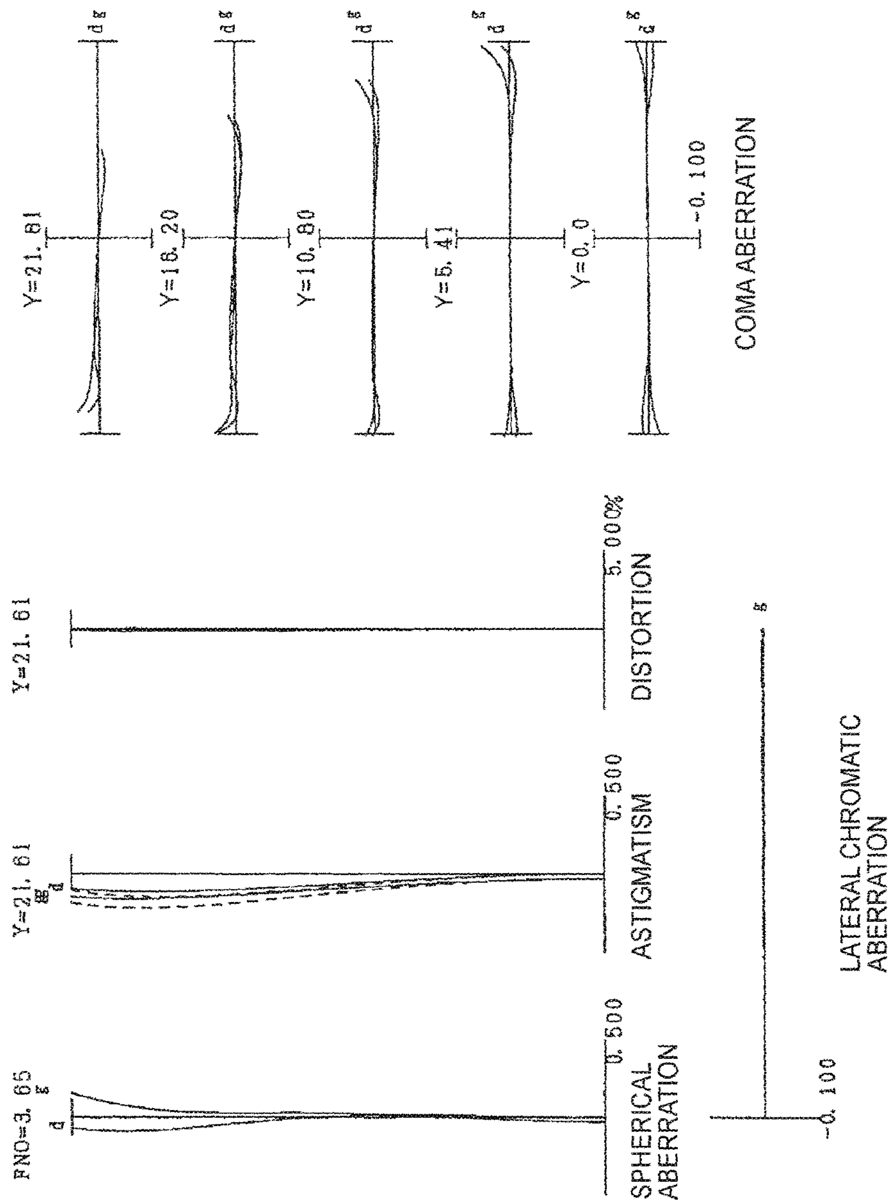
Figure 62C:
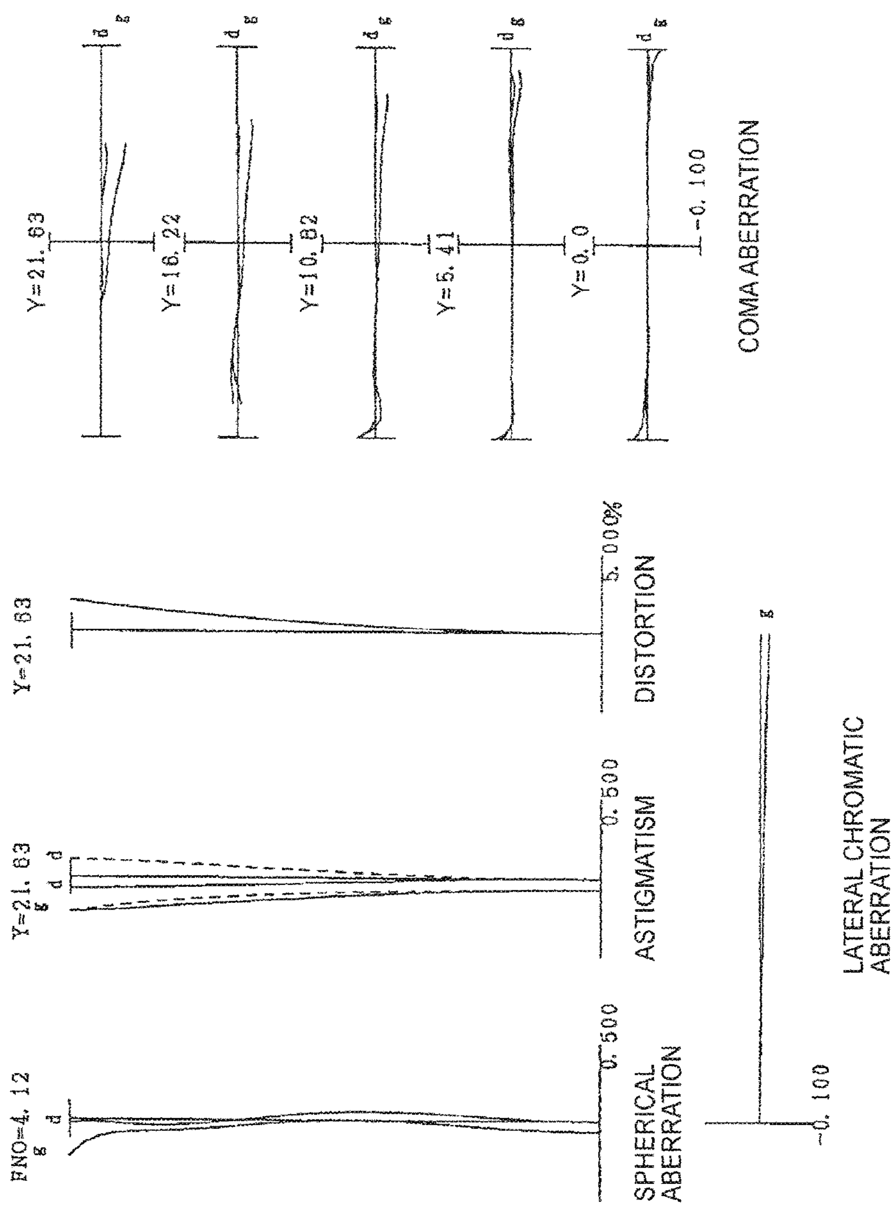
Figure 63A:
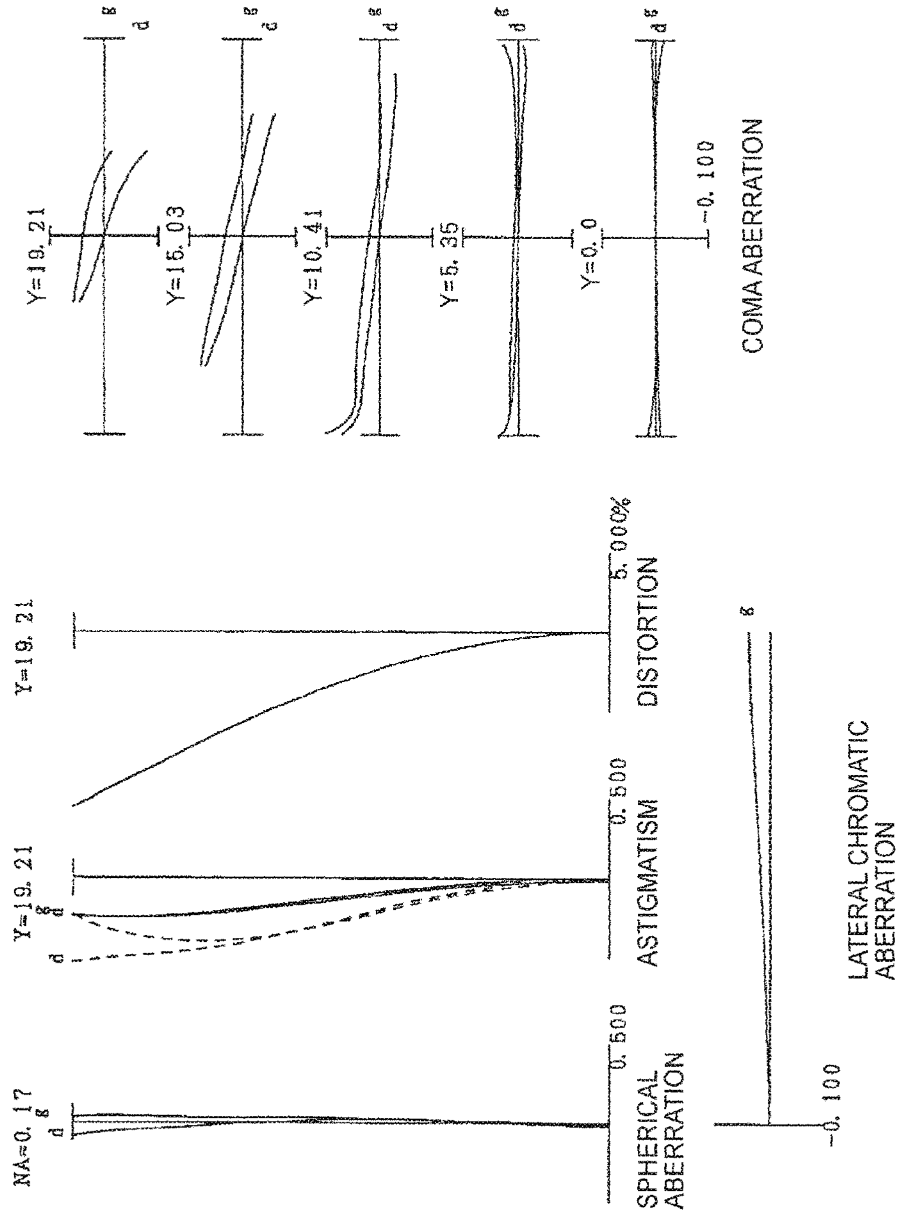
FIGS. 63A, 63B, and 63C are graphs showing various aberrations of the zoom optical system according to Example 14 upon focusing on a short distant object respectively in the wide angle end state, the intermediate focal length state, and the telephoto end state.
Figure 63B:
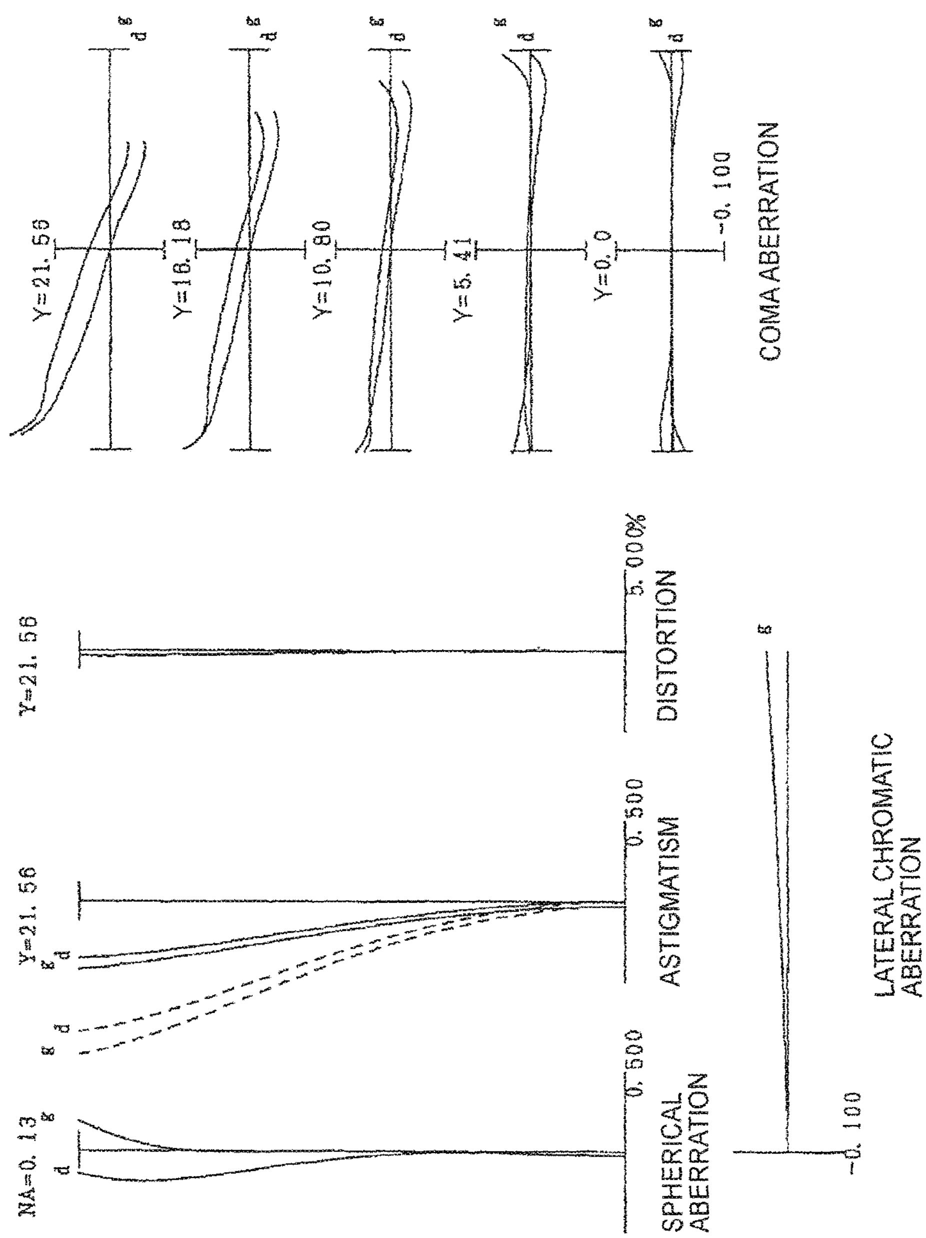
Figure 63C:
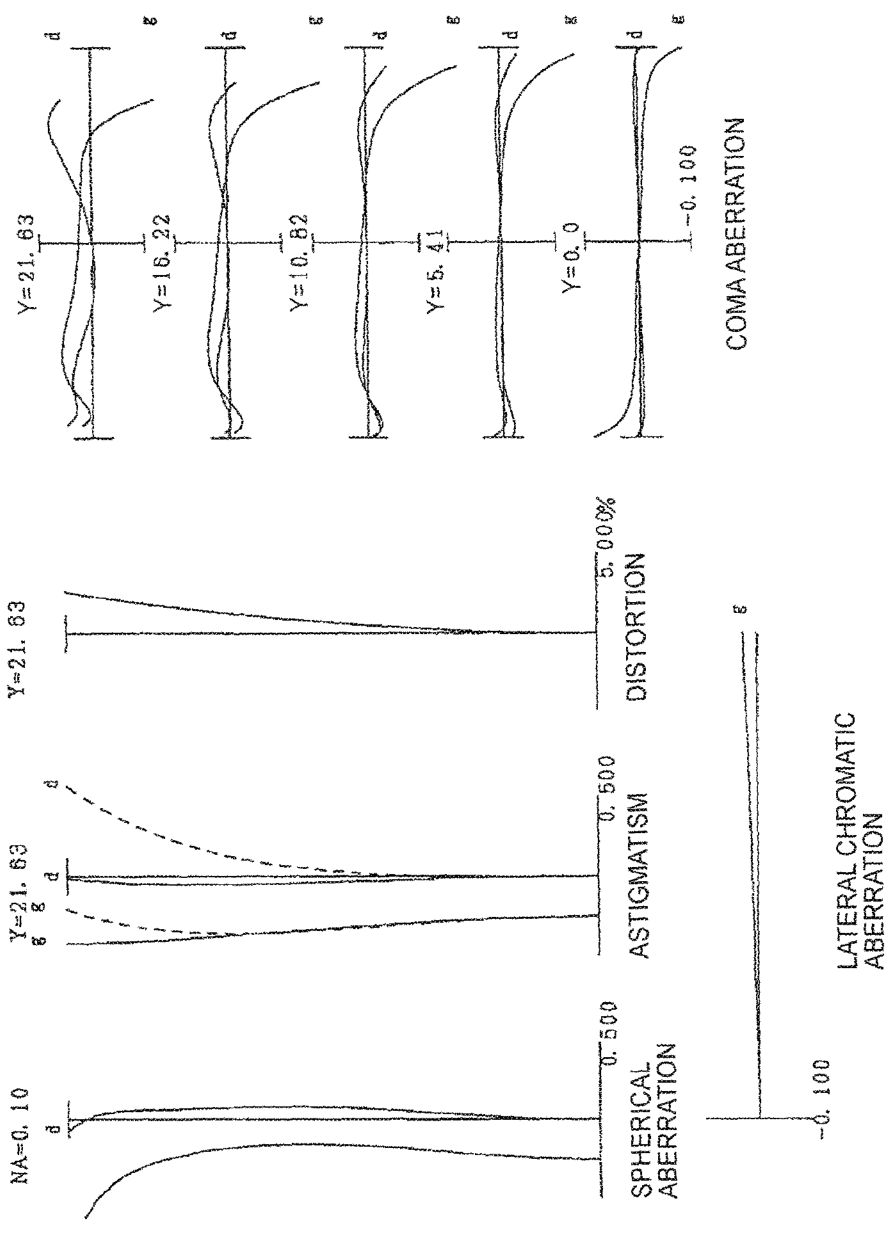
Figure 64A:
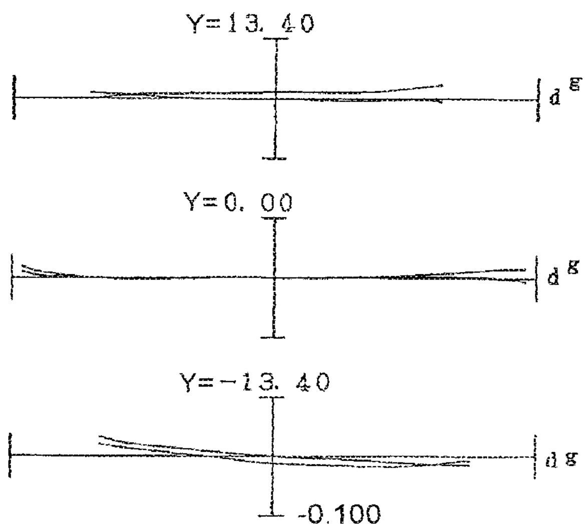
FIGS. 64A, 64B, and 64C are graphs showing lateral aberrations of the zoom optical system according to Example 14 upon focusing on infinity with image blur correction performed, respectively in the wide angle end state, the intermediate focal length state, and the telephoto end state.
Figure 64B:
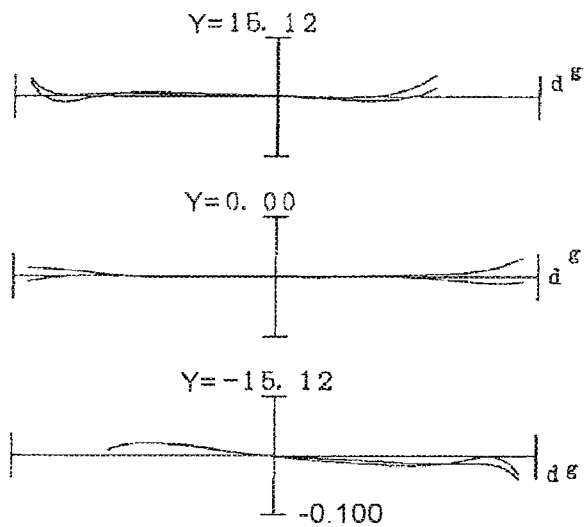
Figure 64C:
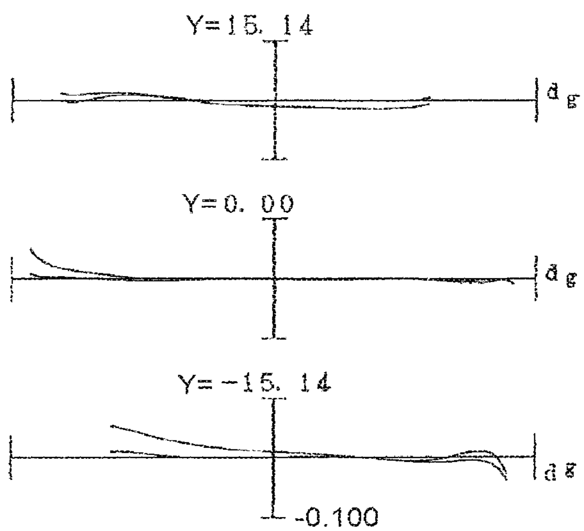

FIG. 62 is various aberration graphs (a spherical aberration graph, an astigmatism graph, a distortion graph, a lateral chromatic aberration graph, and a coma aberration graph) of the zoom optical system ZL14 according to Example 14 upon focusing on infinity with FIG. 62A corresponding to the wide angle end state, FIG. 62B corresponding to the intermediate focal length state, and FIG. 62C corresponding to the telephoto end state. FIG. 63 is various aberration graphs (a spherical aberration graph, an astigmatism graph, a distortion graph, a lateral chromatic aberration graph, and a coma aberration graph) of the zoom optical system ZL14 according to Example 14 upon focusing on a short distant object with FIG. 63A corresponding to the wide angle end state, FIG. 63B corresponding to the intermediate focal length state, and FIG. 63C corresponding to the telephoto end state. FIG. 64 is a coma aberration graph at the time of image blur correction for the zoom optical system ZL14 according to Example 14 upon focusing on infinity with FIG. 64A corresponding to the wide angle end state, FIG. 64B corresponding to the intermediate focal length state, and FIG. 64C corresponding to the telephoto end state.

In the aberration graphs, FNO represents an F number, NA represents numerical aperture, and Y represents an image height. Furthermore, d and g respectively represent aberrations on the d-line and the g-line. Those denoted with none of the above represent aberrations on the d-line. In the spherical aberration graph illustrating the case of focusing on infinity, a value of the F number corresponding to the maximum aperture is described. In the spherical aberration graph illustrating the case of focusing on a short distant object, a value of the numerical aperture corresponding to the maximum aperture is described. In each of the astigmatism graph and the distortion graph, the maximum value of the image height is described. In the coma aberration graph, a value of a corresponding image height is described. In the astigmatism graph, a solid line represents a sagittal image surface, and a broken line represents a meridional image surface.

It can be seen in FIG. 62 to FIG. 64 that the zoom optical system ZL14 according to Example 14 can achieve an excellent optical performance with various aberrations successfully corrected from the wide angle end state to the telephoto end state and from the infinity focusing state to the short-distant object focusing state. Furthermore, it can be seen that a high imaging performance can be achieved upon image blur correction.

Examples described above can achieve the zoom optical system featuring a small size, small variation of image magnification upon focusing, and an excellent optical performance.

Elements of the embodiments are described above to facilitate the understanding of the present invention. It is a matter of course that the present invention is not limited to these. The following configurations can be appropriately employed without compromising the optical performance of the zoom optical system according to the present application. The present invention further includes sub combinations of feature groups of Examples.

The numerical values of the configuration with the five groups or six groups are described as an example of values of the zoom optical system ZLI according to the 1st to the 6th embodiments. However, this should not be construed in a limiting sense, and the present invention can be applied to a configuration with other number of groups (for example, seven groups or the like). More specifically, a configuration further provided with a lens or a lens group closest to an object or further provided with a lens or a lens group closest to the image may be employed. The first to the sixth lens groups, the front-side lens group, the intermediate lens group, and the rear-side lens group are each a portion including at least one lens separated from another lens with a distance varying upon zooming. The focusing lens group GF is a portion including at least one lens separated from another lens with a distance varying upon focusing. The vibration-proof lens group is a portion including at least one lens and is defined by a portion that moves upon image stabilization and a portion that does not move upon image stabilization.

In the zoom optical system ZLI according to the 1st to the 6th embodiment may have the following configuration. Specifically, upon focusing on a short-distant object from infinity, part of a lens group, one entire lens group, or a plurality of lens groups may be moved in the optical axis direction as the focusing lens group GF. The focusing lens group GF may be applied to auto focusing, and can be suitably driven by a motor (such as an ultrasonic motor for example) for auto focusing. At least part of the fourth lens group G4 is especially preferably used as the focusing lens group GF.

In the zoom optical system ZLI according to the 1st to the 6th embodiments, any of the lens group may be entirely or partially moved with a component in a direction orthogonal to the optical axis, or may be moved and rotated (swing) within an in-plane direction including the optical axis, to serve as the vibration-proof lens group for correcting image blur due to camera shake or the like. At least part of the fifth lens group G5 or at least part of the sixth lens group G6 is especially preferably used as the vibration-proof lens group.

In the zoom optical system ZLI according to the 1st to the 6th embodiments, the lens surface may be formed to have a spherical surface or a planer surface, or may be formed to have an aspherical shape. The lens surface having a spherical surface or a planer surface features easy lens processing and assembly adjustment, which leads to the processing and assembly adjustment less likely to involve an error compromising the optical performance, and thus is preferable. Furthermore, there is an advantage that a rendering performance is not largely compromised even when the image surface is displaced. The lens surface having an aspherical shape may be achieved with any one of an aspherical shape formed by grinding, a glass-molded aspherical shape obtained by molding a glass piece into an aspherical shape, and a composite type aspherical surface obtained by providing an aspherical shape resin piece on a glass surface. A lens surface may be a diffractive surface. The lens may be a gradient index lens (GRIN lens) or a plastic lens.

In the zoom optical system ZLI according to the 1st to the 6th embodiments, the aperture stop S is preferably disposed in the neighborhood of the third lens group G3. Alternatively, a lens frame may serve as the aperture stop so that the member serving as the aperture stop needs not to be provided.

In the zoom optical system ZLI according to the 1st to the 6th embodiments, the lens surfaces may be provided with an antireflection film featuring high transmittance over a wide range of wavelengths to achieve an excellent optical performance with reduced flare and ghosting and increased contract.

The zoom optical system ZLI according to the 1st to the 6th embodiment has a zooming rate of about 300 to 450%.

The numerical values of the configuration with the five groups or six groups are described as an example of values of the zoom optical system ZLI according to the 7th to 10th embodiments. However, this should not be construed in a limiting sense, and the present invention can be applied to a configuration with other number of groups (for example, seven groups or the like). More specifically, a configuration further provided with a lens or a lens group closest to an object or further provided with a lens or a lens group closest to the image surface may be employed. The first to the sixth lens groups, the front-side lens group, the intermediate lens group, and the rear-side lens group are each a portion including at least one lens separated from another lens with a distance varying upon zooming. The focusing lens group GF is a portion including at least one lens separated from another lens with a distance varying upon focusing. The vibration-proof lens group is a portion including at least one lens and is defined by a portion that moves upon image stabilization and a portion that does not move upon image stabilization.

In the zoom optical system ZLI according to the 7th to the 10th embodiments may have the following configuration. Specifically, upon focusing on a short-distant object from infinity, part of a lens group, one entire lens group, or a plurality of lens groups may be moved in the optical axis direction as the focusing lens group GF. The focusing lens group GF may be applied to auto focusing, and can be suitably driven by a motor (such as an ultrasonic motor, a stepping motor, or a voice coil motor for example) for auto focusing. At least part of the third lens group G3 or at least part of the fourth lens group G4 is especially preferably used as the focusing lens group GF. The focusing lens group GF may include a single cemented lens as in Examples described above. Alternatively, the number of lenses is not particularly limited, and one or more lens components, such as a single lens and a single cemented lens, may be used.

In the zoom optical system ZLI according to the 7th to the 10th embodiments, any of the lens group may be entirely or partially moved with a component in a direction orthogonal to the optical axis, or may be moved and rotated (swing) within an in-plane direction including the optical axis, to serve as the vibration-proof lens group for correcting image blur due to camera shake or the like. At least part of the fifth lens group G5 or at least part of the sixth lens group G6 is especially preferably used as the vibration-proof lens group.

In the zoom optical system ZLI according to the 7th to the 10th embodiments, the lens surface may be formed to have a spherical surface or a planer surface, or may be formed to have an aspherical shape. The lens surface having a spherical surface or a planer surface features easy lens processing and assembly adjustment, which leads to the processing and assembly adjustment less likely to involve an error compromising the optical performance, and thus is preferable. Furthermore, there is an advantage that a rendering performance is not largely compromised even when the image surface is displaced. The lens surface having an aspherical shape may be achieved with any one of an aspherical shape formed by grinding, a glass-molded aspherical shape obtained by molding a glass piece into an aspherical shape, and a composite type aspherical surface obtained by providing an aspherical shape resin piece on a glass surface. A lens surface may be a diffractive surface. The lens may be a gradient index lens (GRIN lens) or a plastic lens.

In the zoom optical system ZLI according to the 7th to the 10th embodiments, the aperture stop S is preferably disposed in the neighborhood of the third lens group G3. Alternatively, a lens frame may serve as the aperture stop so that the member serving as the aperture stop needs not to be provided.

In the zoom optical system ZLI according to the 7th to the 10th embodiments, the lens surfaces may be provided with an antireflection film featuring high transmittance over a wide range of wavelengths to achieve an excellent optical performance with reduced flare and ghosting and increased contract. The antireflection film may be selected as appropriate. Specifically, multilayer film coating or an antireflection film having an ultra low refractive index layer including minute crystal particle may be employed. The number of surfaces provided with the antireflection film is not particularly limited.

The zoom optical system ZLI according to the 7th to the 10th embodiment has a zooming rate of about 290 to 500%. The 35 mm equivalent focal length in the wide angle end state is about 22 to 30 mm, and Fno is about f/1.8 to 3.7 in the wide angle end state, and is about f/2.8 to 5.9 in the telephoto end state. However, these values should not be construed in a limiting sense.

DESCRIPTION OF THE EMBODIMENTS (11TH TO 14TH EMBODIMENTS)

The 11th to 14th embodiments are described below with reference to drawings. A zoom optical system ZLII according to each of the embodiments includes the first lens group G1 having positive refractive power, a front-side lens group GX, an intermediate lens group GM having positive refractive power, and a rear-side lens group GR that are arranged in order from an object side; the front-side lens group GX is composed of one or more lens groups and has a negative lens group, at least part of the intermediate lens group GM is a focusing lens group GF, the rear-side lens group GR is composed of one or more lens groups, and upon zooming, the distance between the first lens group G1 and the front-side lens group GX is changed, the distance between the front-side lens group GX and the intermediate lens group GM is changed, and the distance between the intermediate lens group GM and the rear-side lens group GR is changed.

In the description of the 11th to the 14th embodiments below, the second lens group G2 is the front-side lens group GX. The third lens group G3 is the intermediate lens group GM at least partially including the focusing lens group GF. The third lens group G3 includes the object side group GA and the image side group GB that are arranged in order from the object side, and the image side group GB is the focusing lens group GF. The fourth lens group G4 is a lens group disposed closest to an object, in the rear-side lens group GR. The fifth lens group G5 is a lens group disposed second closest to an object, in the rear-side lens group GR.

Figure 76:
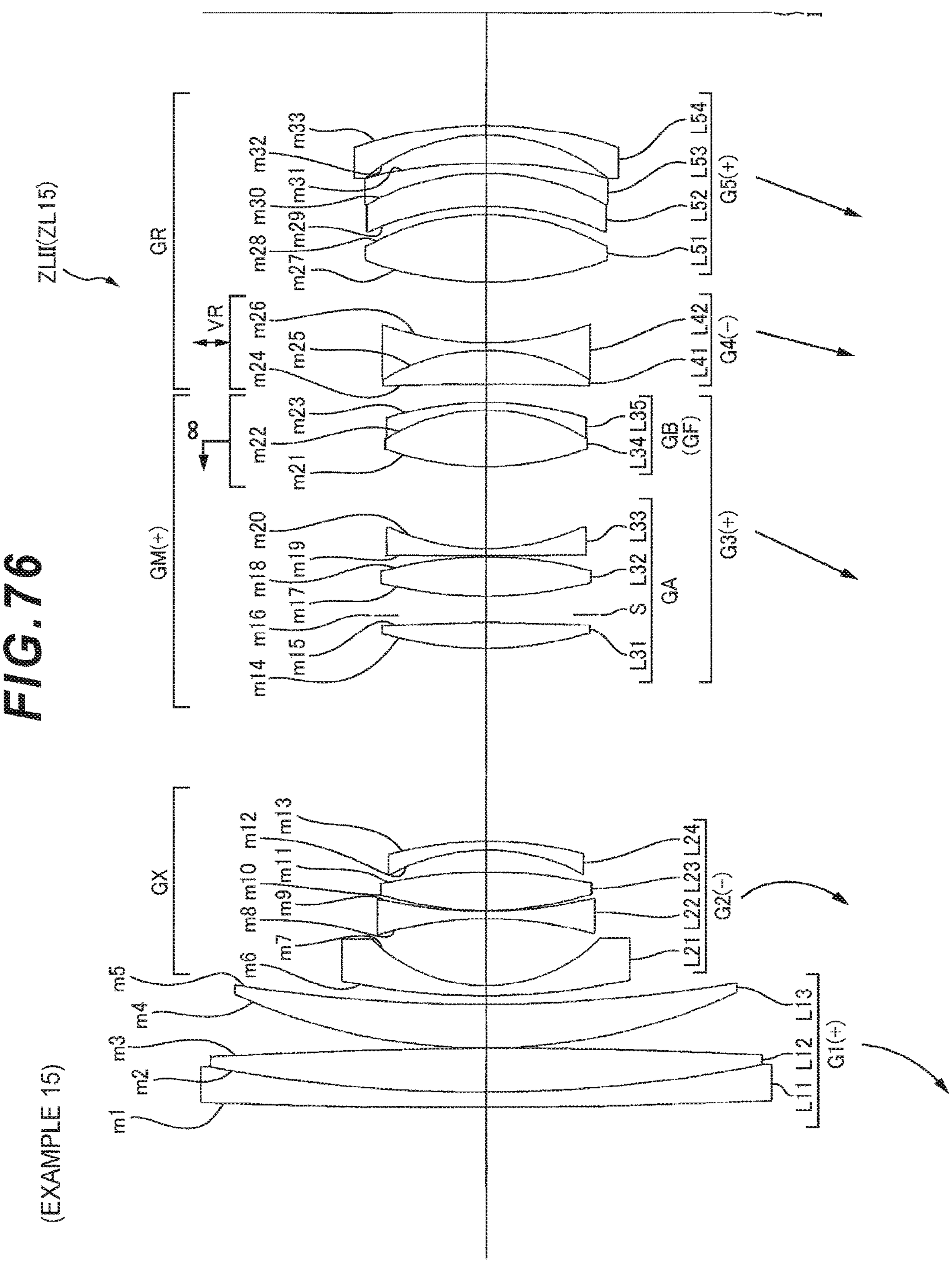
FIG. 76 is a cross-sectional view of a zoom optical system according to Example 15.

The 11th embodiment is described below with reference to drawings. The zoom optical system ZLII according to the 11th embodiment includes, as illustrated in FIG. 76, the first lens group G1 having positive refractive power, the second lens group G2 having negative refractive power, the third lens group G3 having positive refractive power, and the fourth lens group G4 that are arranged in order from the object side, and performs zooming by changing a distance between the lens groups. The third lens group G3 includes the object side group GA and the image side group GB arranged in order from the object side. Upon focusing, the image side group GB (=the focusing lens group GF) is moved along the optical axis direction with the object side group GA fixed with respect to the image surface. Upon zooming, the fourth lens group G4 is moved with respect to the image surface.

With this configuration, the entire optical system can have a smaller size and simpler configuration. Furthermore, variation of image magnification can be reduced.

The zoom optical system ZLII according to the 11th embodiment satisfies the following conditional expressions (JK1) and (JK2) to achieve a higher optical performance.

$$0.50<|fF|/fM<5.00 \quad \text{(JK1)}$$

$$0.51<(-fXn)/fM<1.60 \quad \text{(JK2)}$$

where, fF denotes a focal length of the focusing lens group GF (the focal length of the image side group GB), fM denotes a focal length of the intermediate lens group GM (the focal length of the third lens group G3), and fXn denotes a focal length of a lens group with the largest absolute value of refractive power in a negative lens group of the front-side lens group GX (the focal length of the second lens group G2).

The conditional expression (JK1) is for setting the focal length of the image side group GB as the focusing group and the focal length of the intermediate lens group GM (the focal length of the third lens group G3). A value higher than an upper limit value of the conditional expression (JK1) leads to low refractive power and thus a large movement amount of the focusing group upon focusing, rendering reduction of the minimum imaging distance difficult, or leads to excessively high refractive power of the third lens group G3 resulting in failure to successfully correct the spherical aberration upon zooming, and thus is unfavorable.

To guarantee the effects of the 11th embodiment, the upper limit value of the conditional expression (JK1) is preferably set to be 4.50. To more effectively guarantee the effects of the 11th embodiment, the upper limit value of the conditional expression (JK1) is preferably set to be 4.30. To more effectively guarantee the effects of the 11th embodiment, the upper limit value of the conditional expression (JK1) is preferably set to be 4.00.

A value lower than a lower limit value of the conditional expression (JK1) leads to high refractive power of the focusing group resulting in failure to successfully correct the spherical aberration upon focusing on a short distant object, and thus is unfavorable.

To guarantee the effects of the 11th embodiment, the lower limit value of the conditional expression (JK1) is preferably set to be 0.70. To more effectively guarantee the effects of the 11th embodiment, the lower limit value of the conditional expression (JK1) is preferably set to be 0.90. To more effectively guarantee the effects of the 11th embodiment, the lower limit value of the conditional expression (JK1) is preferably set to be 1.10.

The conditional expression (JK2) is for setting the focal length of a lens group with the largest absolute value of refractive power in a negative lens group of the front-side lens group GX (the focal length of the second lens group G2), and the focal length of the intermediate lens group GM (the focal length of the third lens group G3). A value higher than the upper limit value of the conditional expression (JK2) leads to low refractive power and thus a large movement amount of the second lens group G2 upon zooming, resulting in a large optical system and rendering correction of the curvature of field aberration difficult, and thus is unfavorable.

To guarantee the effects of the 11th embodiment, the upper limit value of the conditional expression (JK2) is preferably set to be 1.55. To more effectively guarantee the effects of the 11th embodiment, the upper limit value of the conditional expression (JK2) is preferably set to be 1.50. To more effectively guarantee the effects of the 11th embodiment, the upper limit value of the conditional expression (JK2) is preferably set to be 1.45.

A value lower than a lower limit value of the conditional expression (JK2) results in failure to successfully correct variation of the spherical aberration and the curvature of field aberration upon zooming, and thus is unfavorable.

To guarantee the effects of the 11th embodiment, the lower limit value of the conditional expression (JK2) is preferably set to be 0.53. To more effectively guarantee the effects of the 11th embodiment, the lower limit value of the conditional expression (JK2) is preferably set to be 0.55. To more effectively guarantee the effects of the 11th embodiment, the lower limit value of the conditional expression (JK2) is preferably set to be 0.57.

Preferably, the zoom optical system ZLII according to the 11th embodiment satisfies the following conditional expression (JK3).

$$0.01<dAB/|fF|<0.50 \quad \text{(JK3)}$$

where, dAB denotes a distance between the focusing lens group GF and a lens disposed to the object side of the focusing lens group GF on the optical axis, upon focusing on infinity in the telephoto end state (the distance between the image side group GB and a lens closest to the image side group GB in a direction in which the image side group GB moves on the optical axis upon focusing from infinity to a short-distance object, upon focusing on infinity in the telephoto end state).

For example, in Example illustrated in FIG. 76, the distance dAB is a distance between a lens L34 closest to an object in the image side group GB and a lens L33 closest to an image in the object side group GA disposed to the object side of the image side group GB, on the optical axis, upon focusing on infinity in the telephoto end state.

The conditional expression (JK3) is for setting the focal length of the image side group GB as the focusing group and the distance between the focusing group and the lens disposed to the object side of the focusing group upon focusing from infinity to a short-distance object. A value higher than an upper limit value of the conditional expression (JK3) leads to high refractive power of the focusing group resulting in failure to successfully correct the variation of spherical aberration upon focusing, and thus is unfavorable.

To guarantee the effects of the 11th embodiment, the upper limit value of the conditional expression (JK3) is preferably set to be 0.46. To more effectively guarantee the effects of the 11th embodiment, the upper limit value of the conditional expression (JK3) is preferably set to be 0.42. To more effectively guarantee the effects of the 11th embodiment, the upper limit value of the conditional expression (JK3) is preferably set to be 0.38.

A value lower than a lower limit value of the conditional expression (JK3) leads to excessively low refractive power and thus a large movement amount of the image side group GB as the focusing group upon focusing on a short distant object, resulting in a large entire lens and failure to successfully correct the curvature of field aberration, and thus is unfavorable.

To guarantee the effects of the 11th embodiment, the lower limit value of the conditional expression (JK3) is preferably set to be 0.02. To more effectively guarantee the effects of the 11th embodiment, the lower limit value of the conditional expression (JK3) is preferably set to be 0.03. To more effectively guarantee the effects of the 11th embodiment, the lower limit value of the conditional expression (JK3) is preferably set to be 0.04.

Preferably, in the zoom optical system ZLII according to the 11th embodiment, the first lens group G1 is moved with respect to the image surface upon zooming. With this configuration, effective zooming can be achieved, and a spherical aberration can be successfully corrected in the telephoto end state.

Preferably, in the zoom optical system ZLII according to the 11th embodiment, the second lens group G2 is moved with respect to the image surface upon zooming. With this configuration, effective zooming can be achieved, and variation of a spherical aberration and a curvature of field occurring upon zooming can be reduced.

Preferably, in the zoom optical system ZLII according to the 11th embodiment, the third lens group G3 is moved with respect to the image surface upon zooming. With this configuration, effective zooming can be achieved, and variation of a spherical aberration and a curvature of field aberration occurring upon zooming can be reduced.

Preferably, in the zoom optical system ZLII according to the 11th embodiment, the fourth lens group G4 is moved with respect to the image surface upon zooming. With this configuration, effective zooming can be achieved, and variation of a spherical aberration and a curvature of field aberration occurring upon zooming can be reduced.

Preferably, in the zoom optical system ZLII according to the 11th embodiment, the focusing lens group (the image side group GB forming the third lens group G3) includes a positive lens when having positive refractive power as a whole, and the following conditional expressions (JK4) and (JK5) are satisfied.

$$ndp+0.0075\times\nu dp-2.175<0 \quad \text{(JK4)}$$

$$\nu dp>50.00 \quad \text{(JK5)}$$

where, ndp denotes a refractive index of the medium as the positive lens in the focusing lens group GF (image side group GB) with respect to the d-line, and νdp denotes Abbe number based on the d-line of the medium as the positive lens in the focusing lens group GF (image side group GB).

The conditional expression (JK4) is for setting a glass material of a lens used in the image side group GB as the focusing group. A value higher than an upper limit value of the conditional expression (JK4) leads to excessively high refractive power with respect to a glass's dispersion, rendering correction of a chromatic aberration upon focusing on a short distant object difficult, and thus is unfavorable.

To guarantee the effects of the 11th embodiment, the upper limit value of the conditional expression (JK4) is preferably set to be −0.015. To more effectively guarantee the effects of the 11th embodiment, the upper limit value of the conditional expression (JK4) is preferably set to be −0.030. To more effectively guarantee the effects of the 11th embodiment, the upper limit value of the conditional expression (JK4) is preferably set to be −0.045.

The conditional expression (JK5) is for setting a glass material of a lens used in the image side group GB as the focusing group. A value lower than a lower limit value of the conditional expression (JK5) leads to a large glass's dispersion, rendering correction of a chromatic aberration upon focusing on a short distant object difficult even when the lens is cemented with a negative lens, and thus is unfavorable.

To guarantee the effects of the 11th embodiment, the lower limit value of the conditional expression (JK5) is preferably set to be 52.00. To more effectively guarantee the effects of the 11th embodiment, the upper limit value of the conditional expression (JK5) is preferably set to be 54.00. To more effectively guarantee the effects of the 11th embodiment, the upper limit value of the conditional expression (JK5) is preferably set to be 55.00.

Preferably, in the zoom optical system ZLII according to the 11th embodiment, the focusing lens group (the image side group GB forming the third lens group G3) includes a negative lens when having negative refractive power as a whole, and the following conditional expressions (JK6) and (JK7) are satisfied.

$$ndn+0.0075\times\nu dn-2.175<0 \quad \text{(JK6)}$$

$$\nu dn>50.00 \quad \text{(JK7)}$$

where ndn denotes a refractive index of the medium as the negative lens in the focusing lens group GF (image side group GB) with respect to the d-line, and νdn denotes Abbe number based on the d-line of the medium as the negative lens in the focusing lens group GF (image side group GB).

The conditional expression (JK6) is for setting a glass material of a lens used in the image side group GB as the focusing group. A value higher than an upper limit value of the conditional expression (JK6) leads to excessively high refractive power with respect to a glass's dispersion, rendering correction of a chromatic aberration upon focusing on a short distant object difficult, and thus is unfavorable.

To guarantee the effects of the 11th embodiment, the upper limit value of the conditional expression (JK6) is preferably set to be −0.015. To more effectively guarantee the effects of the 11th embodiment, the upper limit value of the conditional expression (JK6) is preferably set to be −0.030. To more effectively guarantee the effects of the 11th embodiment, the upper limit value of the conditional expression (JK6) is preferably set to be −0.045.

The conditional expression (JK7) is for setting a glass material of a lens used in the image side group GB as the focusing group. A value lower than a lower limit value of the conditional expression (JK7) leads to a large glass's dispersion, rendering correction of a chromatic aberration upon focusing on a short distant object difficult even when the lens is cemented with a positive lens, and thus is unfavorable.

To guarantee the effects of the 11th embodiment, the lower limit value of the conditional expression (JK7) is preferably set to be 52.00. To more effectively guarantee the effects of the 11th embodiment, the upper limit value of the conditional expression (JK7) is preferably set to be 54.00. To more effectively guarantee the effects of the 11th embodiment, the upper limit value of the conditional expression (JK7) is preferably set to be 55.00.

The zoom optical system ZLII according to the 11th embodiment preferably includes the vibration-proof lens group VR that is disposed between the image side group GB and the lens disposed closest to an image in the optical system, and can move with a displacement component in the direction orthogonal to the optical axis to correct image blur. For example, in Example illustrated in FIG. 76, the vibration-proof lens group VR is the fourth lens group G4 disposed between the image side group GB and the lens disposed closest to an image in the optical system.

With this configuration, the decentering coma aberration of the vibration-proof lens group VR and astigmatism can be successfully corrected with small variation of image magnification upon focusing.

As described above, the 11th embodiment can achieve the zoom optical system ZLII featuring a small size, small variation of image magnification upon focusing, and an excellent optical performance.

Next, a camera (optical device) including the above-described zoom optical system ZLII described above will be described with reference to FIG. 176. As illustrated in FIG. 176, this camera 11 is a lens interchangeable camera (what is known as a mirrorless camera) including the above described zoom optical system ZLII as an imaging lens 12. In the camera 11, light from an unillustrated object (subject) is collected by the imaging lens 12 and passes through an unillustrated Optical low pass filter (OLPF) to be a subject image formed on an imaging plane of an imaging unit 13. Then, the subject image is photoelectrically converted into an image of the subject by a photoelectric conversion element on the imaging unit 13. The image is displayed on an Electronic view finder (EVF) 14 provided to the camera 11. Thus, a photographer can monitor the subject through the EVF 14. When the photographer presses an unillustrated release button, the image of the subject generated by the imaging unit 13 is stored in an unillustrated memory. In this manner, the photographer can capture an image of a subject with the camera 11.

The zoom optical system ZLII according to the 11th embodiment, installed in the camera 11 as the imaging lens 12, features a small size, small variation of image magnification upon focusing, and an excellent optical performance, due to its characteristic lens configuration as can be seen in Examples described later. Thus, an optical device featuring a small size, small variation of image magnification upon focusing, and an excellent optical performance can be achieved with the camera 11.

The 11th embodiment is described with the mirrorless camera as an example, but this should not be construed in a limiting sense. For example, similar or the same effects as the camera 11 can be obtained with the above-described zoom optical system ZLII installed in a single lens reflex camera in which a quick return mirror is provided to a camera main body and a subject is monitored with a view finder optical system.

Next, a method for manufacturing the above-described zoom optical system ZLII will be described with reference to FIG. 177. First of all, lenses are arranged in such a manner that the first lens group G1 having positive refractive power, the second lens group G2 having negative refractive power, the third lens group G3 having positive refractive power, and the fourth lens group G4 are arranged in a barrel in order from the object side and that the zooming is performed with the distance between the lens groups changed (step ST1110). The third lens group G3 includes the object side group GA and the image side group GB arranged in order from the object side, and the lenses are arranged in such a manner that the image side group GB (=the focusing lens group GF) moves along the optical axis direction upon focusing (step ST1120). The lenses are arranged in such a manner that the fourth lens group G4 is moved with respect to the image surface upon zooming (step ST1130). The lenses are arranged in the barrel to satisfy the following conditional expressions (JK1) and (JK2) (step ST1140).

$$0.50<|fF|/fM<5.00 \tag{JK1}$$

$$0.51<(-fXn)/fM<1.60 \tag{JK2}$$

where, fF denotes a focal length of the focusing lens group GF (the focal length of the image side group GB), fM denotes a focal length of the intermediate lens group GM (the focal length of the third lens group G3), and fXn denotes a focal length of a lens group with the largest absolute value of refractive power in a negative lens group of the front-side lens group GX (the focal length of the second lens group G2).

In one example of the lens arrangement according to the 11th embodiment, as illustrated in FIG. 76, the first lens group G1 including the cemented lens including the negative meniscus lens L11 having a concave surface facing the image side and the biconvex lens L12, and the positive meniscus lens L13 having a convex surface facing the object side, the second lens group G2 including the negative meniscus lens L21 having a concave surface facing the image side, the biconcave lens L22, the biconvex lens L23, and the negative meniscus lens L24 having a concave surface facing the object side, the third lens group G3 including the object side group GA including the biconvex lens L31, the aperture stop S, the biconvex lens L32, and the negative meniscus lens L33 having a concave surface facing the image side, and the image side group GB including a cemented lens including the biconvex lens L34 and the negative meniscus lens L35 having a concave surface facing the object side, the fourth lens group G4 including the cemented lens including the positive meniscus lens L41 having a convex surface facing the image side and the biconcave lens L42, and the fifth lens group G5 including the biconvex lens L51, a cemented lens including the positive meniscus lens L52 having a convex surface facing the image side and the negative meniscus lens L53 having a concave surface facing the object side, and the negative meniscus lens L54 having a concave surface facing the object side are arranged in order from the object side. The zoom optical system ZLII is manufactured with the lens groups thus arranged through the procedure described above.

With the manufacturing method according to the 11th embodiment, the zoom optical system ZLII featuring a small size, small variation of image magnification upon focusing, and an excellent optical performance can be manufactured.

The 12th embodiment is described below with reference to drawings. The zoom optical system ZLII according to the 12th embodiment includes, as illustrated in FIG. 76, the first lens group G1 having positive refractive power, the second lens group G2 having negative refractive power, the third lens group G3 having positive refractive power, and the fourth lens group G4 that are arranged in order from the object side, and performs zooming by changing a distance between the lens groups. The third lens group G3 includes the object side group GA and the image side group GB arranged in order from the object side. Upon focusing, the image side group GB (=the focusing lens group GF) is moved along the optical axis direction with the object side group GA fixed with respect to the image surface. Upon zooming, the first lens group G1 is moved toward the object side with respect to the image surface, and the second lens group G2 is moved with respect to the image surface.

With this configuration, the entire optical system can have a smaller size and simpler configuration. Furthermore, variation of image magnification can be reduced.

To achieve an even higher optical performance, the zoom optical system ZLII according to the 12th embodiment includes an air lens, formed between the image side group GB and an adjacent lens group and positioned on a side on which the image side group GB is moved upon focusing from infinity to a short-distance object, satisfies the following conditional expression (JL1).

For example, in Example illustrated in FIG. 76, the air lens is an air lens that includes a 20th surface and a 21st surface and is formed between the image side group GB and an adjacent lens group (the object side group GA in this example) and positioned on a side on which the image side group GB is moved upon zooming from infinity to a short-distance object.

$$1.50<|(rB+rA)/(rB-rA)| \quad \text{(JL1)}$$

where, rA denotes a radius of curvature of an object side lens surface of the air lens, and rB denotes a radius of curvature of an image side lens surface of the air lens.

The conditional expression (JL1) is for setting a shape of the air lens formed between the image side group GB as the focusing group and an adjacent lens group. A value lower than a lower limit value of the conditional expression (JL1) leads to high refractive power of the air lens resulting in failure to successfully correct the spherical aberration and the curvature of field aberration upon focusing on a short distant object, and thus is unfavorable.

To guarantee the effects of the 12th embodiment, the lower limit value of the conditional expression (JL1) is preferably set to be 2.10. To more effectively guarantee the effects of the 12th embodiment, the lower limit value of the conditional expression (JL1) is preferably set to be 2.70. To more effectively guarantee the effects of the 12th embodiment, the lower limit value of the conditional expression (JL1) is preferably set to be 3.30.

Preferably, the zoom optical system ZLII according to the 12th embodiment satisfies the following conditional expression (JL2).

$$0.50<|fF|/fM<5.00 \quad \text{(JL2)}$$

where, fF denotes a focal length of the focusing lens group GF (the focal length of the image side group GB), and fM denotes a focal length of the intermediate lens group GM (the focal length of the third lens group G3).

The conditional expression (JL2) is for setting the focal length of the image side group GB as the focusing group and the focal length of the intermediate lens group GM (the focal length of the third lens group G3). A value higher than an upper limit value of the conditional expression (JL2) leads to low refractive power and thus a large movement amount of the focusing group upon focusing, rendering reduction of the minimum imaging distance difficult, or leads to excessively high refractive power of the third lens group G3 resulting in failure to successfully correct the spherical aberration upon zooming, and thus is unfavorable.

To guarantee the effects of the 12th embodiment, the upper limit value of the conditional expression (JL2) is preferably set to be 4.15. To more effectively guarantee the effects of the 12th embodiment, the upper limit value of the conditional expression (JL2) is preferably set to be 3.35. To more effectively guarantee the effects of the 12th embodiment, the upper limit value of the conditional expression (JL2) is preferably set to be 2.55.

A value lower than a lower limit value of the conditional expression (JL2) leads to high refractive power of the focusing group resulting in failure to successfully correct the spherical aberration upon focusing on a short distant object, and thus is unfavorable.

To guarantee the effects of the 12th embodiment, the lower limit value of the conditional expression (JL2) is preferably set to be 0.70. To more effectively guarantee the effects of the 12th embodiment, the lower limit value of the conditional expression (JL2) is preferably set to be 0.90. To more effectively guarantee the effects of the 12th embodiment, the lower limit value of the conditional expression (JL2) is preferably set to be 1.10.

Preferably, the zoom optical system ZLII according to the 12th embodiment satisfies the following conditional expression (JL3).

$$0.01<dAB/|fF|<0.50 \quad \text{(JL3)}$$

where, dAB denotes a distance between the focusing lens group GF and a lens disposed to the object side of the focusing lens group GF upon focusing on infinity in the telephoto end state on the optical axis (the distance between the image side group GB and a lens closest to the image side group GB in a direction in which the image side group GB moves on the optical axis upon focusing from infinity to a short-distance object, upon focusing on infinity in the telephoto end state), and fF denotes a focal length of the focusing lens group GF (the focal length of the image side group GB).

For example, in Example illustrated in FIG. 76, the distance dAB is a distance between the lens L34 closest to an object in the image side group GB and the lens L33 closest to an image in the object side group GA disposed to the object side of the image side group GB, on the optical axis, upon focusing on infinity in the telephoto end state.

The conditional expression (JL3) is for setting the focal length of the image side group GB as the focusing group and the distance between the focusing group and the lens disposed to the object side of the focusing group upon focusing from infinity to a short-distance object. A value higher than an upper limit value of the conditional expression (JL3) leads to high refractive power of the focusing group resulting in failure to successfully correct the variation of spherical aberration upon focusing, and thus is unfavorable.

To guarantee the effects of the 12th embodiment, the upper limit value of the conditional expression (JL3) is preferably set to be 0.46. To more effectively guarantee the effects of the 12th embodiment, the upper limit value of the conditional expression (JL3) is preferably set to be 0.42. To more effectively guarantee the effects of the 12th embodiment, the upper limit value of the conditional expression (JL3) is preferably set to be 0.38.

A value lower than a lower limit value of the conditional expression (JL3) leads to excessively low refractive power and thus a large movement amount of the image side group GB as the focusing group upon focusing on a short distant object, resulting in a large entire lens and failure to successfully correct the curvature of field aberration, and thus is unfavorable.

To guarantee the effects of the 12th embodiment, the lower limit value of the conditional expression (JL3) is preferably set to be 0.02. To more effectively guarantee the effects of the 12th embodiment, the lower limit value of the conditional expression (JL3) is preferably set to be 0.03. To more effectively guarantee the effects of the 12th embodiment, the lower limit value of the conditional expression (JL3) is preferably set to be 0.04.

Preferably, in the zoom optical system ZLII according to the 12th embodiment, the firth lens group G1 is moved with respect to the image surface upon zooming. With this configuration, effective zooming can be achieved, and spherical aberration can be successfully corrected in the telephoto end state.

Preferably, in the zoom optical system ZLII according to the 12th embodiment, the second lens group G2 is moved with respect to the image surface upon zooming. With this configuration, effective zooming can be achieved, and variation of a spherical aberration and a curvature of field occurring upon zooming can be reduced.

Preferably, in the zoom optical system ZLII according to the 12th embodiment, the fourth lens group G4 and all the lens groups disposed to the image side of the fourth lens group G4 or at least the fourth lens group G4 is moved with respect to the image surface upon zooming. With this configuration, effective zooming can be achieved, and variation of a spherical aberration and a curvature of field aberration occurring upon zooming can be reduced.

Preferably, the zoom optical system ZLII according to the 12th embodiment satisfies the following conditional expression (JL4).

$$0.20<(-fXn)/fM<1.60 \quad \text{(JL4)}$$

where, fXn denotes a focal length of a lens group with the largest absolute value of refractive power in a negative lens group of the front-side lens group GX (the focal length of the second lens group G2).

The conditional expression (JL4) is for setting the focal length of a lens group with the largest absolute value of refractive power in a negative lens group of the front-side lens group GX (the focal length of the second lens group G2), and the focal length of the intermediate lens group GM (the focal length of the third lens group G3). A value higher than the upper limit value of the conditional expression (JL4) leads to low refractive power and thus a large movement amount of the second lens group G2 upon zooming, resulting in a large optical system and rendering correction of the curvature of field aberration difficult, and thus is unfavorable.

To guarantee the effects of the 12th embodiment, the upper limit value of the conditional expression (JL4) is preferably set to be 1.55. To more effectively guarantee the effects of the 12th embodiment, the upper limit value of the conditional expression (JL4) is preferably set to be 1.50. To more effectively guarantee the effects of the 12th embodiment, the upper limit value of the conditional expression (JL4) is preferably set to be 1.45. To more effectively guarantee the effects of the 12th embodiment, the upper limit value of the conditional expression (JL4) is preferably set to be 1.20.

A value lower than a lower limit value of the conditional expression (JL4) results in failure to successfully correct variation of the spherical aberration and the curvature of field aberration upon zooming, and thus is unfavorable.

To guarantee the effects of the 12th embodiment, the lower limit value of the conditional expression (JL4) is preferably set to be 0.25. To more effectively guarantee the effects of the 12th embodiment, the lower limit value of the conditional expression (JL4) is preferably set to be 0.30. To more effectively guarantee the effects of the 12th embodiment, the lower limit value of the conditional expression (JL4) is preferably set to be 0.35.

Preferably, in the zoom optical system ZLII according to the 12th embodiment, the focusing lens group GF (the image side group GB) includes a positive lens when having positive refractive power as a whole, and the following conditional expressions (JL5) and (JL6) are satisfied.

$$ndp+0.0075\times\nu dp-2.175<0 \quad \text{(JL5)}$$

$$\nu dp>50.00 \quad \text{(JL6)}$$

where, ndp denotes a refractive index of the medium as the positive lens in the focusing lens group GF (image side group GB) with respect to the d-line, and νdp denotes Abbe number based on the d-line of the medium as the positive lens in the focusing lens group GF (image side group GB).

The conditional expression (JL5) is for setting a glass material of a lens used in the image side group GB as the focusing group. A value higher than an upper limit value of the conditional expression (JL5) leads to excessively high refractive power with respect to a glass's dispersion, rendering correction of a chromatic aberration upon focusing on a short distant object difficult, and thus is unfavorable.

To guarantee the effects of the 12th embodiment, the upper limit value of the conditional expression (JL5) is preferably set to be −0.015. To more effectively guarantee the effects of the 12th embodiment, the upper limit value of the conditional expression (JL5) is preferably set to be −0.030. To more effectively guarantee the effects of the 12th embodiment, the upper limit value of the conditional expression (JL5) is preferably set to be −0.045.

The conditional expression (JL6) is for setting a glass material of a lens used in the image side group GB as the focusing group. A value lower than a lower limit value of the conditional expression (JL6) leads to a large glass's dispersion, rendering correction of a chromatic aberration upon focusing on a short distant object difficult even when the lens is cemented with a negative lens, and thus is unfavorable.

To guarantee the effects of the 12th embodiment, the lower limit value of the conditional expression (JL6) is preferably set to be 52.00. To more effectively guarantee the effects of the 12th embodiment, the upper limit value of the conditional expression (JL6) is preferably set to be 54.00. To more effectively guarantee the effects of the 12th embodiment, the upper limit value of the conditional expression (JL6) is preferably set to be 55.00.

Preferably, in the zoom optical system ZLII according to the 12th embodiment, the focusing lens group GF (the image side group GB) includes a negative lens when having negative refractive power as a whole, and the following conditional expressions (JL7) and (JL8) are satisfied.

$$ndn+0.0075\times\nu dn-2.175<0 \quad \text{(JL7)}$$

$$\nu dn>50.00 \quad \text{(JL8)}$$

where, ndn denotes a refractive index of the medium as the negative lens in the focusing lens group GF (image side group GB) with respect to the d-line, and νdn denotes Abbe number based on the d-line of the medium as the negative lens in the focusing lens group GF (image side group GB).

The conditional expression (JL7) is for setting a glass material of a lens used in the image side group GB as the focusing group. A value higher than an upper limit value of the conditional expression (JL7) leads to excessively high refractive power with respect to a glass's dispersion, rendering correction of a chromatic aberration upon focusing on a short distant object difficult, and thus is unfavorable.

To guarantee the effects of the 12th embodiment, the upper limit value of the conditional expression (JL7) is preferably set to be −0.015. To more effectively guarantee the effects of the 12th embodiment, the upper limit value of the conditional expression (JL7) is preferably set to be −0.030. To more effectively guarantee the effects of the 12th embodiment, the upper limit value of the conditional expression (JL7) is preferably set to be −0.045.

The conditional expression (JL8) is for setting a glass material of a lens used in the image side group GB as the focusing group. A value lower than a lower limit value of the conditional expression (JL8) leads to a large glass's dispersion, rendering correction of a chromatic aberration upon focusing on a short distant object difficult even when the lens is cemented with a positive lens, and thus is unfavorable.

To guarantee the effects of the 12th embodiment, the lower limit value of the conditional expression (JL8) is preferably set to be 52.00. To more effectively guarantee the effects of the 12th embodiment, the upper limit value of the conditional expression (JL8) is preferably set to be 54.00. To more effectively guarantee the effects of the 12th embodiment, the upper limit value of the conditional expression (JL8) is preferably set to be 55.00.

The zoom optical system ZLII according to the 12th embodiment preferably includes the vibration-proof lens group VR that is disposed between the image side group GB and the lens disposed closest to an image in the optical system, and can move with a displacement component in the direction orthogonal to the optical axis to correct image blur. For example, in Example illustrated in FIG. 76, the vibration-proof lens group VR is the fourth lens group G4 disposed between the image side group GB and the lens disposed closest to an image in the optical system.

With this configuration, the decentering coma aberration of the vibration-proof lens group VR and astigmatism can be successfully corrected with small variation of image magnification upon focusing.

As described above, the 12th embodiment can achieve the zoom optical system ZLII featuring a small size, small variation of image magnification upon focusing, and an excellent optical performance.

Next, a camera (optical device) 11 including the above-described zoom optical system ZLII described above will be described with reference to FIG. 176. This camera 11 is the same as that in the 11th embodiment the configuration of which has been described above, and thus will not be described herein.

The zoom optical system ZLII according to the 12th embodiment, installed in the camera 11 as the imaging lens 12, featuring a small size, small variation of image magnification upon focusing, and an excellent optical performance, due to its characteristic lens configuration as can be seen in Examples described later. Thus, an optical device featuring a small size, small variation of image magnification upon focusing, and an excellent optical performance can be achieved with the camera 11.

The 12th embodiment is described with the mirrorless camera as an example, but this should not be construed in a limiting sense. For example, similar or the same effects as the camera 11 can be obtained with the above-described zoom optical system ZLII installed in a single lens reflex camera in which a quick return mirror is provided to a camera main body and a subject is monitored with a view finder optical system.

Next, a method for manufacturing the above-described zoom optical system ZLII will be described with reference to FIG. 178. First of all, lenses are arranged in such a manner that the first lens group G1 having positive refractive power, the second lens group G2 having negative refractive power, the third lens group G3 having positive refractive power, and the fourth lens group G4 are arranged in a barrel in order from the object side and that the zooming is performed with the distance between the lens groups changed (step ST1210). The third lens group G3 includes the object side group GA and the image side group GB arranged in order from the object side, and the lenses are arranged in such a manner that the image side group GB (=the focusing lens group GF) moves along the optical axis direction upon focusing (step ST1220). The lenses are arranged in such a manner that the first lens group G1 moves toward the object side with respect to the image surface and the second lens group G2 is moved with respect to the image surface upon zooming (step ST1230). The lenses are arranged in such a manner that an air lens, formed between the image side group GB and an adjacent lens group and positioned in direction in which the image side group GB is moved upon focusing from infinity to a short-distance object, satisfies the following conditional expression (JL1) (step ST1240).

$$1.50<|(rB+rA)/(rB-rA)| \quad \text{(JL1)}$$

where, rA denotes a radius of curvature of an object side lens surface of the air lens, and rB denotes a radius of curvature of an image side lens surface of the air lens.

In one example of the lens arrangement according to the 12th embodiment, as illustrated in FIG. 76, the first lens group G1 including the cemented lens including the negative meniscus lens L11 having a concave surface facing the image side and the biconvex lens L12, and the positive meniscus lens L13 having a convex surface facing the object side, the second lens group G2 including the negative meniscus lens L21 having a concave surface facing the image side, the biconcave lens L22, the biconvex lens L23, and the negative meniscus lens L24 having a concave surface facing the object side, the third lens group G3 including the object side group GA including the biconvex lens L31, the aperture stop S, the biconvex lens L32, and the negative meniscus lens L33 having a concave surface facing the image side, and the image side group GB including the cemented lens including the biconvex lens L34 and the negative meniscus lens L35 having a concave surface facing the object side, the fourth lens group G4 including the cemented lens including the positive meniscus lens L41 having a convex surface facing the image side and the biconcave lens L42, and the fifth lens group G5 including the biconvex lens L51, the cemented lens including the positive meniscus lens L52 having a convex surface facing the image side and the negative meniscus lens L53 having a concave surface facing the object side, and the negative meniscus lens L54 having a concave surface facing the object side are arranged in order from the object side. The zoom optical system ZLII is manufactured with the lens groups thus arranged through the procedure described above.

With the manufacturing method according to the 12th embodiment, the zoom optical system featuring a small size, small variation of image magnification upon focusing, and an excellent optical performance can be manufactured.

The 13th embodiment is described below with reference to drawings. The zoom optical system ZLII according to the 13th embodiment includes, as illustrated in FIG. 76, the first lens group G1 having positive refractive power, the second lens group G2 having negative refractive power, the third lens group G3 having positive refractive power, and the fourth lens group G4 that are arranged in order from the object side, and performs zooming by changing a distance between the lens groups. The third lens group G3 includes the object side group GA and the image side group GB arranged in order from the object side. Upon focusing, the image side group GB (=the focusing lens group GF) is moved along the optical axis direction with the object side group GA fixed with respect to the image surface.

With this configuration, the entire optical system can have a smaller size and simpler configuration.

The zoom optical system ZLII according to the 13th embodiment includes the vibration-proof lens group VR that is disposed between the image side group GB and the lens disposed closest to an image in the optical system, and can move with a displacement component in the direction orthogonal to the optical axis to correct image blur.

For example, in Example illustrated in FIG. 76, the vibration-proof lens group VR is the fourth lens group G4 disposed between the image side group GB and the lens disposed closest to an image in the optical system.

With this configuration, the decentering coma aberration of the vibration-proof lens group VR and astigmatism can be successfully corrected with small variation of image magnification upon focusing.

The zoom optical system ZLII according to the 13th embodiment satisfies the following conditional expressions (JM1) and (JM2) to achieve a higher optical performance.

$$0.01<dV/|fV|<0.50 \qquad \text{(JM1)}$$

$$0.50<|fF|/fM<3.00 \qquad \text{(JM2)}$$

where, dV denotes a distance between the vibration-proof lens group VR and a lens disposed to the image side thereof in the telephoto end state on the optical axis, fV denotes a focal length of the vibration-proof lens group VR, fF denotes a focal length of the focusing lens group GF (the focal length of the image side group GB), and fM denotes a focal length of the intermediate lens group GM (the focal length of the third lens group G3).

The conditional expression (JM1) is for setting the distance of what is known as an air lens formed between the vibration-proof lens group VR and a lens disposed to the image side thereof that area separated from each other with a distance in between. A value higher than an upper limit value of the conditional expression (JM1) leads to an excessive large distance of the air lens, resulting in failure to successfully correct the decentering coma aberration and the curvature of field aberration upon image blur correction, or leads to excessively high refractive power of the vibration-proof lens group VR resulting in failure to successfully correct the decentering coma aberration and the curvature of field aberration, and thus is unfavorable.

To guarantee the effects of the 13th embodiment, the upper limit value of the conditional expression (JM1) is preferably set to be 0.47. To more effectively guarantee the effects of the 13th embodiment, the lower limit value of the conditional expression (JM1) is preferably set to be 0.44. To more effectively guarantee the effects of the 13th embodiment, the lower limit value of the conditional expression (JM1) is preferably set to be 0.42.

A value lower than a lower limit value of the conditional expression (JM1) leads to no distance of the air lens, resulting in collision between the vibration-proof lens group VR and a lens disposed to the image side thereof, or leads to an excessively long focal length, that is, a large movement amount of the vibration-proof lens group VR, rendering the control difficult or resulting in a failure to successfully correct the decentering coma aberration when the vibration-proof lens is decentered and the curvature of field aberration, and thus is unfavorable.

To guarantee the effects of the 13th embodiment, the lower limit value of the conditional expression (JM1) is preferably set to be 0.015. To more effectively guarantee the effects of the 13th embodiment, the lower limit value of the conditional expression (JM1) is preferably set to be 0.016.

The conditional expression (JM2) is for setting the focal length of the image side group GB as the focusing group and the focal length of the intermediate lens group GM (the focal length of the third lens group G3). A value higher than an upper limit value of the conditional expression (JM2) leads to low refractive power and thus a large movement amount of the focusing group upon focusing, rendering reduction of the minimum imaging distance difficult, or leads to excessively high refractive power of the third lens group G3 resulting in failure to successfully correct the spherical aberration upon zooming, and thus is unfavorable.

To guarantee the effects of the 13th embodiment, the upper limit value of the conditional expression (JM2) is preferably set to be 2.90. To more effectively guarantee the effects of the 13th embodiment, the upper limit value of the conditional expression (JM2) is preferably set to be 2.80. To more effectively guarantee the effects of the 13th embodiment, the upper limit value of the conditional expression (JM2) is preferably set to be 2.75.

A value lower than a lower limit value of the conditional expression (JM2) leads to high refractive power of the focusing group resulting in failure to successfully correct the spherical aberration upon focusing on a short distant object, and thus is unfavorable.

To guarantee the effects of the 13th embodiment, the lower limit value of the conditional expression (JM2) is preferably set to be 0.70. To more effectively guarantee the effects of the 13th embodiment, the lower limit value of the conditional expression (JM2) is preferably set to be 0.90. To more effectively guarantee the effects of the 13th embodiment, the lower limit value of the conditional expression (JM2) is preferably set to be 1.10.

Preferably, the zoom optical system ZLII according to the 13th embodiment satisfies the following conditional expression (JM3).

$$0.01<dAB/|fF|<0.50 \qquad \text{(JM3)}$$

where, dAB denotes a distance between the focusing lens group GF and a lens disposed to the object side of the focusing lens group GF upon focusing on infinity in the telephoto end state on the optical axis (the distance between the image side group GB and a lens closest to the image side group GB in a direction in which the image side group GB moves on the optical axis upon focusing from infinity to a short-distance object, upon focusing on infinity in the telephoto end state).

For example, in Example illustrated in FIG. 76, the distance dAB is a distance between the lens L34 closest to an object in the image side group GB and the lens L33 closest to an image in the object side group GA disposed to the object side of the image side group GB, on the optical axis, upon focusing on infinity in the telephoto end state.

The conditional expression (JM3) is for setting the focal length of the image side group GB as the focusing group and the distance between the focusing group and the lens disposed to the object side of the focusing group upon focusing from infinity to a short-distance object. A value higher than an upper limit value of the conditional expression (JM3) leads to high refractive power of the focusing group resulting in failure to successfully correct the variation of spherical aberration upon focusing, and thus is unfavorable.

To guarantee the effects of the 13th embodiment, the upper limit value of the conditional expression (JM3) is preferably set to be 0.46. To more effectively guarantee the effects of the 13th embodiment, the upper limit value of the conditional expression (JM3) is preferably set to be 0.42. To more effectively guarantee the effects of the 13th embodiment, the upper limit value of the conditional expression (JM3) is preferably set to be 0.38.

A value lower than a lower limit value of the conditional expression (JM3) leads to excessively low refractive power and thus a large movement amount of the image side group GB as the focusing group upon focusing on a short distant object, resulting in a large entire lens and failure to successfully correct the curvature of field aberration, and thus is unfavorable.

To guarantee the effects of the 13th embodiment, the lower limit value of the conditional expression (JM3) is preferably set to be 0.02. To more effectively guarantee the effects of the 13th embodiment, the lower limit value of the conditional expression (JM3) is preferably set to be 0.03. To more effectively guarantee the effects of the 13th embodiment, the lower limit value of the conditional expression (JM3) is preferably set to be 0.04.

Preferably, in the zoom optical system ZLII according to the 13th embodiment, the first lens group G1 is moved with respect to the image surface upon zooming. With this configuration, effective zooming can be achieved, and spherical aberration can be successfully corrected in the telephoto end state.

Preferably, in the zoom optical system ZLII according to the 13th embodiment, the second lens group G2 is moved with respect to the image surface upon zooming. With this configuration, effective zooming can be achieved, and variation of a spherical aberration and a curvature of field occurring upon zooming can be reduced.

Preferably, in the zoom optical system ZLII according to the 13th embodiment, the fourth lens group G4 and all the lens group disposed to the image side thereof or at least the fourth lens group G4 is moved with respect to the image surface upon zooming. With this configuration, effective zooming can be achieved, and variation of a spherical aberration and a curvature of field aberration occurring upon zooming can be reduced.

Preferably, the zoom optical system ZLII according to the 13th embodiment satisfies the following conditional expression (JM4).

$$0.20<(-fXn)/fM<1.60 \quad \text{(JM4)}$$

where, fXn denotes a focal length of a lens group with the largest absolute value of refractive power in a negative lens group of the front-side lens group GX (the focal length of the second lens group G2).

The conditional expression (JM4) is for setting the focal length of a lens group with the largest absolute value of refractive power in a negative lens group of the front-side lens group GX (the focal length of the second lens group G2), and the focal length of the intermediate lens group GM (the focal length of the third lens group G3). A value higher than the upper limit value of the conditional expression (JM4) leads to low refractive power and thus a large movement amount of the second lens group G2 upon zooming, resulting in a large optical system and rendering correction of the curvature of field aberration difficult, and thus is unfavorable.

To guarantee the effects of the 13th embodiment, the upper limit value of the conditional expression (JM4) is preferably set to be 1.55. To more effectively guarantee the effects of the 13th embodiment, the upper limit value of the conditional expression (JM4) is preferably set to be 1.50. To more effectively guarantee the effects of the 13th embodiment, the upper limit value of the conditional expression (JM4) is preferably set to be 1.45. To more effectively guarantee the effects of the 13th embodiment, the upper limit value of the conditional expression (JM4) is preferably set to be 1.20.

A value lower than a lower limit value of the conditional expression (JM4) results in failure to successfully correct variation of the spherical aberration and the curvature of field aberration upon zooming, and thus is unfavorable.

To guarantee the effects of the 13th embodiment, the lower limit value of the conditional expression (JM4) is preferably set to be 0.25. To more effectively guarantee the effects of the 13th embodiment, the lower limit value of the conditional expression (JM4) is preferably set to be 0.30. To more effectively guarantee the effects of the 13th embodiment, the lower limit value of the conditional expression (JM4) is preferably set to be 0.35.

Preferably, in the zoom optical system ZLII according to the 13th embodiment, the focusing lens group GF (the image side group GB) includes a positive lens when having positive refractive power as a whole, and the following conditional expressions (JM5) and (JM6) are satisfied.

$$ndp+0.0075\times\nu dp-2.175<0 \quad \text{(JM5)}$$

$$\nu dp>50.00 \quad \text{(JM6)}$$

where, ndp denotes a refractive index of the medium as the positive lens in the focusing lens group GF (image side group GB) with respect to the d-line, and νdp denotes Abbe number based on the d-line of the medium as the positive lens in the focusing lens group GF (image side group GB).

The conditional expression (JM5) is for setting a glass material of a lens used in the image side group GB as the focusing group. A value higher than an upper limit value of the conditional expression (JM5) leads to excessively high refractive power with respect to a glass's dispersion, rendering correction of a chromatic aberration upon focusing on a short distant object difficult, and thus is unfavorable.

To guarantee the effects of the 13th embodiment, the upper limit value of the conditional expression (JM5) is preferably set to be −0.015. To more effectively guarantee the effects of the 13th embodiment, the upper limit value of the conditional expression (JM5) is preferably set to be −0.030. To more effectively guarantee the effects of the 13th embodiment, the upper limit value of the conditional expression (JM5) is preferably set to be −0.045.

The conditional expression (JM6) is for setting a glass material of a lens used in the image side group GB as the focusing group. A value lower than a lower limit value of the conditional expression (JM6) leads to a large glass's dispersion, rendering correction of a chromatic aberration upon focusing on a short distant object difficult even when the lens is cemented with a negative lens, and thus is unfavorable.

To guarantee the effects of the 13th embodiment, the lower limit value of the conditional expression (JM6) is preferably set to be 52.00. To more effectively guarantee the effects of the 13th embodiment, the upper limit value of the conditional expression (JM6) is preferably set to be 54.00. To more effectively guarantee the effects of the 13th embodiment, the upper limit value of the conditional expression (JM6) is preferably set to be 55.00.

Preferably, in the zoom optical system ZLII according to the 13th embodiment, the focusing lens group GF (the image side group GB) includes a negative lens when having negative refractive power as a whole, and the following conditional expressions (JM7) and (JM8) are satisfied.

$$ndn+0.0075\times\nu dn-2.175<0 \qquad \text{(JM7)}$$

$$\nu dn>50.00 \qquad \text{(JM8)}$$

where, ndn denotes a refractive index of the medium as the negative lens in the focusing lens group GF (image side group GB) with respect to the d-line, and νdn denotes Abbe number based on the d-line of the medium as the negative lens in the focusing lens group GF (image side group GB).

The conditional expression (JM7) is for setting a glass material of a lens used in the image side group GB as the focusing group. A value higher than an upper limit value of the conditional expression (JM7) leads to excessively high refractive power with respect to a glass's dispersion, rendering correction of a chromatic aberration upon focusing on a short distant object difficult, and thus is unfavorable.

To guarantee the effects of the 13th embodiment, the upper limit value of the conditional expression (JM7) is preferably set to be −0.015. To more effectively guarantee the effects of the 13th embodiment, the upper limit value of the conditional expression (JM7) is preferably set to be −0.030. To more effectively guarantee the effects of the 13th embodiment, the upper limit value of the conditional expression (JM7) is preferably set to be −0.045.

The conditional expression (JM8) is for setting a glass material of a lens used in the image side group GB as the focusing group. A value lower than a lower limit value of the conditional expression (JM8) leads to a large glass's dispersion, rendering correction of a chromatic aberration upon focusing on a short distant object difficult even when the lens is cemented with a positive lens, and thus is unfavorable.

To guarantee the effects of the 13th embodiment, the lower limit value of the conditional expression (JM8) is preferably set to be 52.00. To more effectively guarantee the effects of the 13th embodiment, the upper limit value of the conditional expression (JM8) is preferably set to be 54.00. To more effectively guarantee the effects of the 13th embodiment, the upper limit value of the conditional expression (JM8) is preferably set to be 55.00.

As described above, the 13th embodiment can achieve the zoom optical system ZLII featuring a small size and an excellent optical performance.

Next, a camera (optical device) 11 including the above-described zoom optical system ZLII described above will be described with reference to FIG. 176. This camera 11 is the same as that in the 11th embodiment the configuration of which has been described above, and thus will not be described herein.

The zoom optical system ZLII according to the 13th embodiment, installed in the camera 11 as the imaging lens 12, featuring a small size and an excellent optical performance, due to its characteristic lens configuration as can be seen in Examples described later. Thus, an optical device featuring a small size and an excellent optical performance can be achieved with the camera 11.

The 13th embodiment is described with the mirrorless camera as an example, but this should not be construed in a limiting sense. For example, similar or the same effects as the camera 11 can be obtained with the above-described zoom optical system ZLII installed in a single lens reflex camera in which a quick return mirror is provided to a camera main body and a subject is monitored with a view finder optical system.

Next, a method for manufacturing the above-described zoom optical system ZLII will be described with reference to FIG. 179. First of all, lenses are arranged in such a manner that the first lens group G1 having positive refractive power, the second lens group G2 having negative refractive power, the third lens group G3 having positive refractive power, and the fourth lens group G4 are arranged in a barrel in order from the object side along the optical axis and that the zooming is performed with the distance between the lens groups changed (step ST1310). The third lens group G3 includes the object side group GA and the image group GB arranged in order from the object side, and the lenses are arranged in such a manner that the image side group GB (=the focusing lens group GF) moves along the optical axis direction upon focusing (step ST1320). The lenses are arranged in such a manner that the vibration-proof lens group VR configured to be movable with a displacement component in a direction orthogonal to the optical axis to correct image blur is disposed between the image side group GB and the lens closest to the image in the optical system (step ST1330). The lenses are arranged to satisfy the following conditional expressions (JM1) and (JM2) (step S1340).

$$0.01<dV/|fV|<0.50 \qquad \text{(JM1)}$$

$$0.50<|fF|/fM<3.00 \qquad \text{(JM2)}$$

where, dV denotes a distance between the vibration-proof lens group VR and a lens disposed to the image side thereof in the telephoto end state on the optical axis, fV denotes a focal length of the vibration-proof lens group VR, fF denotes a focal length of the focusing lens group GF (the focal length of the image side group GB), and fM denotes a focal length of the intermediate lens group GM (the focal length of the third lens group G3).

In one example of the lens arrangement according to the 13th embodiment, as illustrated in FIG. 76, the first lens group G1 including the cemented lens including the negative meniscus lens L11 having a concave surface facing the image side and the biconvex lens L12, and the positive meniscus lens L13 having a convex surface facing the object side, the second lens group G2 including the negative meniscus lens L21 having a concave surface facing the image side, the biconcave lens L22, the biconvex lens L23, and the negative meniscus lens L24 having a concave surface facing the object side, the third lens group G3 including the object side group GA including the biconvex lens L31, the aperture stop S, the biconvex lens L32, and the negative meniscus lens L33 having a concave surface facing the image side, and the image side group GB including the cemented lens including the biconvex lens L34 and the negative meniscus lens L35 having a concave surface facing the object side, the fourth lens group G4 including the cemented lens including the positive meniscus lens L41 having a convex surface facing the image side and the biconcave lens L42, and the fifth lens group G5 including the biconvex lens L51, the cemented lens including the positive meniscus lens L52 having a convex surface facing the image side and the negative meniscus lens L53 having a concave surface facing the object side, and the negative meniscus lens L54 having a concave surface facing the object side are arranged in order from the object side. The zoom optical system ZLII is manufactured with the lens groups thus arranged through the procedure described above.

With the manufacturing method according to the 13th embodiment, the zoom optical system featuring a small size and an excellent optical performance can be manufactured.

The 14th embodiment is described below with reference to drawings. The zoom optical system ZLII according to the 14th embodiment includes, as illustrated in FIG. 76, the first lens group G1 having positive refractive power, the second lens group G2 having negative refractive power, the third lens group G3 having positive refractive power, the fourth lens group G4, and the fifth lens group G5 that are arranged in order from the object side, and performs zooming by changing a distance between the lens groups. The third lens group G3 includes the object side group GA and the image side group GB arranged in order from the object side. Upon focusing, the image side group GB (=the focusing lens group GF) is moved along the optical axis direction with the object side group GA fixed with respect to the image surface. Upon zooming, the second lens group G2 is moved with respect to the image surface.

With this configuration, the entire optical system can have a smaller size and simpler configuration. Furthermore, variation of image magnification can be reduced.

The zoom optical system ZLII according to the 14th embodiment satisfies the following conditional expression (JN1) to achieve a higher optical performance.

$$0.50<|fF|/fM<5.00 \quad \text{(JN1)}$$

where, fF denotes a focal length of the focusing lens group GF (the focal length of the image side group GB), and fM denotes a focal length of the intermediate lens group GM (the focal length of the third lens group G3).

The conditional expression (JN1) is for setting the focal length of the image side group GB as the focusing group and the focal length of the intermediate lens group GM (the focal length of the third lens group G3). A value higher than an upper limit value of the conditional expression (JN1) leads to low refractive power and thus a large movement amount of the focusing group upon focusing, rendering reduction of the minimum imaging distance difficult, or leads to excessively high refractive power of the third lens group G3 resulting in failure to successfully correct the spherical aberration upon zooming, and thus is unfavorable.

To guarantee the effects of the 14th embodiment, the upper limit value of the conditional expression (JN1) is preferably set to be 4.50. To more effectively guarantee the effects of the 14th embodiment, the upper limit value of the conditional expression (JN1) is preferably set to be 4.30. To more effectively guarantee the effects of the 14th embodiment, the upper limit value of the conditional expression (JN1) is preferably set to be 4.00.

A value lower than a lower limit value of the conditional expression (JN1) leads to high refractive power of the focusing group resulting in failure to successfully correct the spherical aberration upon focusing on a short distant object, and thus is unfavorable.

To guarantee the effects of the 14th embodiment, the lower limit value of the conditional expression (JN1) is preferably set to be 0.70. To more effectively guarantee the effects of the 14th embodiment, the lower limit value of the conditional expression (JN1) is preferably set to be 0.90. To more effectively guarantee the effects of the 14th embodiment, the lower limit value of the conditional expression (JN1) is preferably set to be 1.10.

The zoom optical system ZLII according to the 14th embodiment preferably includes the vibration-proof lens group VR that is disposed between the image side group GB and the lens disposed closest to an image in the optical system, and can move with a displacement component in the direction orthogonal to the optical axis to correct image blur.

For example, in Example illustrated in FIG. 76, the vibration-proof lens group VR is the fourth lens group G4 disposed between the image side group GB and the lens disposed closest to an image in the optical system.

With this configuration, the decentering coma aberration of the vibration-proof lens group VR and astigmatism can be successfully corrected with small variation of image magnification upon focusing.

Preferably, the zoom optical system ZLII according to the 14th embodiment satisfies the following conditional expression (JN2).

$$0.01<dV/|fV|<0.50 \quad \text{(JN2)}$$

where, dV denotes a distance between the vibration-proof lens group VR and a lens disposed to the image side thereof in the telephoto end state on the optical axis, and fV denotes a focal length of the vibration-proof lens group VR.

The conditional expression (JN2) is for setting the distance of what is known as an air lens formed between the vibration-proof lens group VR and a lens disposed to the image side thereof that area separated from each other with a distance in between. A value higher than an upper limit value of the conditional expression (JN2) leads to an excessive large distance of the air lens, resulting in failure to successfully correct the decentering coma aberration and the curvature of field aberration upon image blur correction, or leads to excessively high refractive power of the vibration-proof lens group VR resulting in failure to successfully correct the decentering coma aberration and the curvature of field aberration, and thus is unfavorable.

To guarantee the effects of the 14th embodiment, the upper limit value of the conditional expression (JN2) is preferably set to be 0.47. To more effectively guarantee the effects of the 14th embodiment, the lower limit value of the conditional expression (JN2) is preferably set to be 0.44. To more effectively guarantee the effects of the 14th embodiment, the lower limit value of the conditional expression (JN2) is preferably set to be 0.42.

A value lower than a lower limit value of the conditional expression (JN2) leads to no distance of the air lens, resulting in collision between the vibration-proof lens group VR and a lens disposed to the image side thereof, or leads to an excessively long focal length, that is, a large movement amount of the vibration-proof lens group VR, rendering the control difficult or resulting in a failure to successfully correct the decentering coma aberration when the vibration-proof lens is decentered and the curvature of field aberration, and thus is unfavorable.

To guarantee the effects of the 14th embodiment, the lower limit value of the conditional expression (JN2) is preferably set to be 0.015. To more effectively guarantee the effects of the 14th embodiment, the lower limit value of the conditional expression (JN2) is preferably set to be 0.016.

Preferably, the zoom optical system ZLII according to the 14th embodiment satisfies the following conditional expression (JN3).

$$0.01<dAB/|fF|<0.50 \quad \text{(JN3)}$$

where, dAB denotes a distance between the focusing lens group GF and a lens disposed to the object side of the focusing lens group GF upon focusing on infinity in the telephoto end state on the optical axis (the distance between the image side group GB and a lens closest to the image side group GB in a direction in which the image side group GB moves on the optical axis upon focusing from infinity to a short-distance object, upon focusing on infinity in the telephoto end state).

For example, in Example illustrated in FIG. 76, the distance dAB is a distance between the lens L34 closest to an object in the image side group GB and the lens L33 closest to an image in the object side group GA disposed to the object side of the image side group GB, on the optical axis, upon focusing on infinity in the telephoto end state.

The conditional expression (JN3) is for setting the focal length of the image side group GB as the focusing group and the distance between the focusing group and the lens disposed to the object side of the focusing group upon focusing from infinity to a short-distance object. A value higher than an upper limit value of the conditional expression (JN3) leads to high refractive power of the focusing group resulting in failure to successfully correct the variation of spherical aberration upon focusing, and thus is unfavorable.

To guarantee the effects of the 14th embodiment, the upper limit value of the conditional expression (JN3) is preferably set to be 0.46. To more effectively guarantee the effects of the 14th embodiment, the upper limit value of the conditional expression (JN3) is preferably set to be 0.42. To more effectively guarantee the effects of the 14th embodiment, the upper limit value of the conditional expression (JN3) is preferably set to be 0.38.

A value lower than a lower limit value of the conditional expression (JN3) leads to excessively low refractive power and thus a large movement amount of the image side group GB as the focusing group upon focusing on a short distant object, resulting in a large entire lens and failure to successfully correct the curvature of field aberration, and thus is unfavorable.

To guarantee the effects of the 14th embodiment, the lower limit value of the conditional expression (JN3) is preferably set to be 0.02. To more effectively guarantee the effects of the 14th embodiment, the lower limit value of the conditional expression (JN3) is preferably set to be 0.03. To more effectively guarantee the effects of the 14th embodiment, the lower limit value of the conditional expression (JN3) is preferably set to be 0.04.

Preferably, in the zoom optical system ZLII according to the 14th embodiment, the first lens group G1 is moved with respect to the image surface upon zooming. With this configuration, effective zooming can be achieved, and spherical aberration can be successfully corrected in the telephoto end state.

Preferably, in the zoom optical system. ZLII according to the 14th embodiment, the second lens group G2 is moved with respect to the image surface upon zooming. With this configuration, effective zooming can be achieved, and variation of a spherical aberration and a curvature of field occurring upon zooming can be reduced.

Preferably, in the zoom optical system. ZLII according to the 14th embodiment, the fifth lens group G5 and all the lens group disposed to the image side thereof or at least the fifth lens group G5 is moved with respect to the image surface upon zooming. With this configuration, effective zooming can be achieved, and variation of a curvature of field aberration occurring upon zooming can be reduced.

Preferably, the zoom optical system. ZLII according to the 14th embodiment satisfies the following conditional expression (JN4).

$$0.20<(-fXn)/fM<1.60 \quad \text{(JN4)}$$

where, fXn denotes a focal length of a lens group with the largest absolute value of refractive power in a negative lens group of the front-side lens group GX (the focal length of the second lens group G2).

The conditional expression (JN4) is for setting the focal length of a lens group with the largest absolute value of refractive power in a negative lens group of the front-side lens group GX (the focal length of the second lens group G2), and the focal length of the intermediate lens group GM (the focal length of the third lens group G3). A value higher than the upper limit value of the conditional expression (JN4) leads to low refractive power and thus a large movement amount of the second lens group G2 upon zooming, resulting in a large optical system and rendering correction of the curvature of field aberration difficult, and thus is unfavorable.

To guarantee the effects of the 14th embodiment, the upper limit value of the conditional expression (JN4) is preferably set to be 1.55. To more effectively guarantee the effects of the 14th embodiment, the upper limit value of the conditional expression (JN4) is preferably set to be 1.50. To more effectively guarantee the effects of the 14th embodiment, the upper limit value of the conditional expression (JN4) is preferably set to be 1.45. To more effectively guarantee the effects of the 14th embodiment, the upper limit value of the conditional expression (JN4) is preferably set to be 1.20.

A value lower than a lower limit value of the conditional expression (JN4) results in failure to successfully correct variation of the spherical aberration and the curvature of field aberration upon zooming, and thus is unfavorable.

To guarantee the effects of the 14th embodiment, the lower limit value of the conditional expression (JN4) is preferably set to be 0.25. To more effectively guarantee the effects of the 14th embodiment, the lower limit value of the conditional expression (JN4) is preferably set to be 0.30. To more effectively guarantee the effects of the 14th embodiment, the lower limit value of the conditional expression (JN4) is preferably set to be 0.35.

Preferably, in the zoom optical system ZLII according to the 14th embodiment, the focusing lens group GF (the image side group GB) includes a positive lens when having positive refractive power as a whole, and the following conditional expressions (JN5) and (JN6) are satisfied.

$$ndp+0.0075\times\nu dp-2.175<0 \quad \text{(JN5)}$$

$$\nu dp>50.00 \quad \text{(JN6)}$$

where, ndp denotes a refractive index of the medium as the positive lens in the focusing lens group GF (image side group GB) with respect to the d-line, and νdp denotes Abbe number based on the d-line of the medium as the positive lens in the focusing lens group GF (image side group GB).

The conditional expression (JN5) is for setting a glass material of a lens used in the image side group GB as the focusing group. A value higher than an upper limit value of the conditional expression (JN5) leads to excessively high refractive power with respect to a glass's dispersion, rendering correction of a chromatic aberration upon focusing on a short distant object difficult, and thus is unfavorable.

To guarantee the effects of the 14th embodiment, the upper limit value of the conditional expression (JN5) is preferably set to be −0.015. To more effectively guarantee the effects of the 14th embodiment, the upper limit value of the conditional expression (JN5) is preferably set to be −0.030. To more effectively guarantee the effects of the 14th embodiment, the upper limit value of the conditional expression (JN5) is preferably set to be −0.045.

The conditional expression (JN6) is for setting a glass material of a lens used in the image side group GB as the focusing group. A value lower than a lower limit value of the conditional expression (JN6) leads to a large glass's dispersion, rendering correction of a chromatic aberration upon focusing on a short distant object difficult even when the lens is cemented with a negative lens, and thus is unfavorable.

To guarantee the effects of the 14th embodiment, the lower limit value of the conditional expression (JN6) is preferably set to be 52.00. To more effectively guarantee the effects of the 14th embodiment, the upper limit value of the conditional expression (JN6) is preferably set to be 54.00. To more effectively guarantee the effects of the 14th embodiment, the upper limit value of the conditional expression (JN6) is preferably set to be 55.00.

Preferably, in the zoom optical system ZLII according to the 14th embodiment, the focusing lens group GF (the image side group GB) includes a negative lens when having negative refractive power as a whole, and the following conditional expressions (JN7) and (JN8) are satisfied.

$$ndn+0.0075\times\nu dn-2.175<0 \quad \text{(JN7)}$$

$$\nu dn>50.00 \quad \text{(JN8)}$$

where, ndn denotes a refractive index of the medium as the negative lens in the focusing lens group GF (image side group GB) with respect to the d-line, and vdn denotes Abbe number based on the d-line of the medium as the negative lens in the focusing lens group GF (image side group GB).

The conditional expression (JN7) is for setting a glass material of a lens used in the image side group GB as the focusing group. A value higher than an upper limit value of the conditional expression (JN7) leads to excessively high refractive power with respect to a glass's dispersion, rendering correction of a chromatic aberration upon focusing on a short distant object difficult, and thus is unfavorable.

To guarantee the effects of the 14th embodiment, the upper limit value of the conditional expression (JN7) is preferably set to be −0.015. To more effectively guarantee the effects of the 14th embodiment, the upper limit value of the conditional expression (JN7) is preferably set to be −0.030. To more effectively guarantee the effects of the 14th embodiment, the upper limit value of the conditional expression (JN7) is preferably set to be −0.045.

The conditional expression (JN8) is for setting a glass material of a lens used in the image side group GB as the focusing group. A value lower than a lower limit value of the conditional expression (JN8) leads to a large glass's dispersion, rendering correction of a chromatic aberration upon focusing on a short distant object difficult even when the lens is cemented with a positive lens, and thus is unfavorable.

To guarantee the effects of the 14th embodiment, the lower limit value of the conditional expression (JN8) is preferably set to be 52.00. To more effectively guarantee the effects of the 14th embodiment, the upper limit value of the conditional expression (JN8) is preferably set to be 54.00. To more effectively guarantee the effects of the 14th embodiment, the upper limit value of the conditional expression (JN8) is preferably set to be 55.00.

As described above, the 14th embodiment can achieve the zoom optical system ZLII featuring a small size and an excellent optical performance.

Next, a camera (optical device) 11 including the above-described zoom optical system ZLII described above will be described with reference to FIG. 176. This camera 11 is the same as that in the 11th embodiment the configuration of which has been described above, and thus will not be described herein.

The zoom optical system ZLII according to the 14th embodiment, installed in the camera 11 as the imaging lens 12, featuring a small size and an excellent optical performance, due to its characteristic lens configuration as can be seen in Examples described later. Thus, an optical device featuring a small size and an excellent optical performance can be achieved with the camera 11.

The 14th embodiment is described with the mirrorless camera as an example, but this should not be construed in a limiting sense. For example, similar or the same effects as the camera 11 can be obtained with the above-described zoom optical system ZLII installed in a single lens reflex camera in which a quick return mirror is provided to a camera main body and a subject is monitored with a view finder optical system.

Next, a method for manufacturing the above-described zoom optical system ZLII will be described with reference to FIG. 180. First of all, lenses are arranged in such a manner that the first lens group G1 having positive refractive power, the second lens group G2 having negative refractive power, the third lens group G3 having positive refractive power, the fourth lens group G4, and the fifth lens group G5 are arranged in a barrel in order from the object side and that the zooming is performed with the distance between the lens groups changed (step ST1410). The third lens group G3 includes the object side group GA and the image side group GB arranged in order from the object side, and the lenses are arranged in such a manner that the image side group GB (=the focusing lens group GF) moves along the optical axis direction upon focusing (step ST1420). The lenses are arranged in such a manner that the second lens group G2 is moved with respect to the image surface upon zooming (step ST1430). The lenses are arranged in the barrel to satisfy the following conditional expression (JN1) (step S1440).

$$0.50<|fF|/fM<5.00 \quad \text{(JN1)}$$

where, fF denotes a focal length of the focusing lens group GF (the focal length of the image side group GB), and fM denotes a focal length of the intermediate lens group GM (the focal length of the third lens group G3).

In one example of the lens arrangement according to the 14th embodiment, as illustrated in FIG. 76, the first lens group G1 including the cemented lens including the negative meniscus lens L11 having a concave surface facing the image side and the biconvex lens L12, and the positive meniscus lens L13 having a convex surface facing the object side, the second lens group G2 including the negative meniscus lens L21 having a concave surface facing the image side, the biconcave lens L22, the biconvex lens L23, and the negative meniscus lens L24 having a concave surface facing the object side, the third lens group G3 including the object side group GA including the biconvex lens L31, the aperture stop S, the biconvex lens L32, and the negative meniscus lens L33 having a concave surface facing the image side, and the image side group GB including the cemented lens including the biconvex lens L34 and the negative meniscus lens L35 having a concave surface facing the object side, the fourth lens group G4 including the cemented lens including the positive meniscus lens L41 having a convex surface facing the image side and the biconcave lens L42, and the fifth lens group G5 including the biconvex lens L51, the cemented lens including the positive meniscus lens L52 having a convex surface facing the image side and the negative meniscus lens L53 having a concave surface facing the object side, and the negative meniscus lens L54 having a concave surface facing the object side are arranged in order from the object side. The zoom optical system ZLII is manufactured with the lens groups thus arranged through the procedure described above.

With the manufacturing method according to the 14th embodiment, the zoom optical system ZLII featuring a small size and an excellent optical performance can be manufactured.

EXAMPLES ACCORDING TO 11TH TO 14TH EMBODIMENTS

Examples according to the 11th to the 14th embodiments are described with reference to the drawings. Table 15 to Table 39 described below are specification tables of Examples 15 to 39.

The 11th embodiment corresponds to Examples 15 to 38, and the like.

The 12th embodiment corresponds to Examples 15, 17 to 21, 23, 24, 27 to 29, 36, and 39 and the like.

The 13th embodiment corresponds to Examples 15 to 24, 26 to 36, 38, and 39 and the like.

The 14th embodiment corresponds to Examples 15 to 18, 20 to 23, 25 to 30, and 32 to 39 and the like.

FIG. 76, FIG. 80, FIG. 84, FIG. 88, FIG. 92, FIG. 96, FIG. 100, FIG. 104, FIG. 108, FIG. 112, FIG. 116, FIG. 120, FIG. 124, FIG. 128, FIG. 132, FIG. 136, FIG. 140, FIG. 144, FIG. 148, FIG. 152, FIG. 156, FIG. 160, FIG. 164, FIG. 168, and FIG. 172 are cross-sectional views illustrating configurations and refractive power distributions of the zoom optical systems ZLII (ZL15 to ZL39) according to Examples. The movement directions of the lens groups along the optical axis upon zooming from the wide angle end state (W) to the telephoto end state (T) are indicated by arrows on the lower side of the cross-sectional views corresponding to the zoom optical systems ZL15 to ZL39. The movement direction of the focusing lens group GF (GA) upon focusing from infinity to a short-distant object and movement of the vibration-proof lens group VR upon image blur correction is indicated by arrows on the upper side of the cross-sectional views corresponding to the zoom optical systems ZL15 to ZL39.

Reference signs in FIG. 76 corresponding to Example 15 are independently provided for each Example, to avoid complication of description due to increase in the number of digits of the reference signs. Thus, reference signs that are the same as those in a drawing corresponding to another Example do not necessarily indicate a configuration that is the same as that in the other Example.

In Examples, d-line (wavelength 587.562 nm) and g-line (wavelength 435.835 nm) are selected as calculation targets of the aberration characteristics.

In [lens specifications] in the tables, a surface number represents an order of an optical surface from the object side in a traveling direction of a light beam, R represents a radius of curvature of each optical surface, D represents a distance between each optical surface and the next optical surface (or the image surface) on the optical axis, nd represents a refractive index of a material of an optical member with respect to the d-line, and νd represents Abbe number of the material of the optical member based on the d-line. Furthermore, obj surface represents an object surface, (variable) represents a variable surface distance, "∞" of a radius of curvature represents a plane or an aperture, (stop S) represents the aperture stop S, and img surface represents the image surface I. The refractive index "1.00000" of air is omitted. An aspherical optical surface has a * mark in the field of surface number and has a paraxial radius of curvature in the field of radius of curvature R.

In the table, [aspherical data] has the following formula (a) indicating the shape of an aspherical surface in [lens specifications]. In the formula, X(y) represents a distance between the tangent plane at the vertex of the aspherical surface and a position on the aspherical surface at a height y along the optical axis direction, R represents a radius of curvature (paraxial radius of curvature) of a reference spherical surface, κ represents a conical coefficient, and Ai represents ith aspherical coefficient. In the formula, "E-n" represents "$\times 10^{-n}$". For example, 1.234E-05=$1.234\times 10^{-5}$. A secondary aspherical coefficient A2 is 0, and thus is omitted.

$$X(y)=(y^2/R)/\{1+(1-\kappa\times y^2/R^2)^{1/2}\}+A4\times y^4+A6\times y^6+A8\times y^8+A10\times y^{10} \quad (a)$$

In [various data] in Tables, f represents a focal length of the whole zoom lens; FNO represents F number, 2ω represents an angle of view (unit: °), Y represents the maximum image height, BF(air) represents a distance between the lens last surface and the image surface I on the optical axis upon focusing on infinity described with an air equivalent length, TL(air) represents a value obtained by adding BF(air) to the distance between the lens forefront surface and the lens last surface on the optical axis upon focusing on infinity.

In [variable distance data] in Tables, variable distance values Di in states such as the wide-angle end state, the intermediate focal length, and the telephoto end state are described. Di represents a variable distance between an ith surface and a (i+1)th surface.

In [lens group data] in Tables, the starting surface and the focal length of each of the lens groups are described.

In [conditional expression corresponding value] in Tables, values corresponding to the conditional expression are described.

The focal length f, the radius of curvature R, and the distance to the next lens surface D described below as the specification values, which are generally described with "mm" unless otherwise noted should not be construed in a limiting sense because the optical system proportionally expanded or reduced can have a similar or the same optical performance. The unit is not limited to "mm", and other appropriate units may be used.

The description on Tables described above commonly applies to all Examples, and thus will not be described below.

Example 15

Example 15 is described with reference to FIG. 76 to FIG. 79 and Table 15. A zoom optical system ZLII (ZL15)

according to Example 15 includes, as illustrated in FIG. 76, the first lens group G1 having positive refractive power, the second lens group G2 having negative refractive power, the third lens group G3 having positive refractive power, the fourth lens group G4 having negative refractive power, and the fifth lens group G5 having positive refractive power that are arranged in order from the object side.

The first lens group G1 includes: the cemented lens including the negative meniscus lens L11 having a concave surface facing the image side and the biconvex lens L12; and the positive meniscus lens L13 having a convex surface facing the object side that are arranged in order from the object side.

The second lens group G2 includes the negative meniscus lens L21 having a concave surface facing the image side, the biconcave lens L22, the biconvex lens L23, and the negative meniscus lens L24 having a concave surface facing the object side that are arranged in order from an object side. The biconcave lens L22 is a glass-molded aspherical lens with a lens surface, on the object side, having an aspherical shape.

The third lens group G3 includes the object side group GA and the image side group GB having positive refractive power that are arranged in order from the object side. The object side group GA includes the biconvex lens L31, the aperture stop S, the biconvex lens L32, and the negative meniscus lens L33 having a concave surface facing the image side that are arranged in order from the object side. The image side group GB includes the cemented lens including the biconvex lens L34 and the negative meniscus lens L35 having a concave surface facing the object side. The biconvex lens L31 is a glass-molded aspherical lens with lens surfaces, on the object side and on the image surface side, having an aspherical shape. The biconvex lens L34 is a glass-molded aspherical lens with a lens surface, on the object side, having an aspherical shape.

The fourth lens group G4 includes a cemented lens including the positive meniscus lens L41 having a convex surface facing the image side and the biconcave lens L42 arranged in order from the object side.

The fifth lens group G5 includes: the biconvex lens L51; the cemented lens including the positive meniscus lens L52 having a convex surface facing the image side and the negative meniscus lens L53 having a concave surface facing the object side; and the negative meniscus lens L54 having a concave surface facing the object side that are arranged in order from the object side.

The zooming from the wide angle end state to the telephoto end state is achieved with: the first lens group G1 moved toward the object side, the second lens group G2 moved toward the image surface side and then moved toward the object side, and the third lens group G3, the fourth lens group G4, and the fifth lens group G5 each moved toward the object side in such a manner that the distance between the first lens group G1 and the second lens group G2 increases, the distance between the second lens group G2 and the third lens group G3 decreases, the distance between the third lens group G3 and the fourth lens group G4 increases, and the distance between the fourth lens group G4 and the fifth lens group G5 decreases.

Focusing from infinity to the short-distant object is achieved with the image side group GB (=focusing lens group GF) forming the third lens group G3 moved toward the object side.

When image blur occurs, image blur correction (vibration isolation) on the image surface I is performed with the fourth lens group G4 serving as the vibration-proof lens group VR moved with a displacement component in the direction orthogonal to the optical axis. In Example 15, in the wide angle end state, the shifted amount of the vibration-proof lens group VR is −0.338 mm when the correction angle is 0.664°. In the intermediate focal length state, the shifted amount of the vibration-proof lens group VR is −0.358 mm when the correction angle is 0.469°. In the telephoto end state, the shifted amount of the vibration-proof lens group VR is −0.389 mm when the correction angle is 0.327°.

In Table 15 below, specification values in Example 15 are listed. Surface numbers 1 to 33 in Table 15 respectively correspond to the optical surfaces m1 to m33 in FIG. 76.

TABLE 15

[Lens specifications]

| Surface number | R | D | νd | nd |
|---|---|---|---|---|
| Obj surface | ∞ | | | |
| 1 | 755.7151 | 2.00 | 22.74 | 1.80809 |
| 2 | 161.3459 | 5.78 | 67.90 | 1.59319 |
| 3 | −580.4059 | 0.10 | | |
| 4 | 67.8395 | 5.80 | 54.61 | 1.72916 |
| 5 | 174.6045 | D5(variable) | | |
| 6 | 76.4442 | 1.35 | 35.73 | 1.90265 |
| 7 | 18.5155 | 8.86 | | |
| *8 | −39.7788 | 1.00 | 51.15 | 1.75501 |
| 9 | 52.4007 | 0.10 | | |
| 10 | 40.3224 | 5.17 | 22.74 | 1.80809 |
| 11 | −52.2736 | 2.86 | | |
| 12 | −23.0648 | 1.20 | 58.12 | 1.62299 |
| 13 | −42.3507 | D13(variable) | | |
| *14 | 38.7318 | 3.48 | 51.15 | 1.75501 |
| *15 | −132.1314 | 1.00 | | |
| 16 | ∞ | 2.50 | (aperture stop) | |
| 17 | 46.8922 | 5.22 | 82.57 | 1.49782 |
| 18 | −42.6707 | 0.10 | | |
| 19 | 755.7937 | 1.00 | 37.18 | 1.83400 |
| 20 | 25.3493 | D20(variable) | | |
| *21 | 32.5284 | 7.45 | 67.02 | 1.59201 |
| 22 | −21.4485 | 1.00 | 23.80 | 1.84666 |

TABLE 15-continued

| | | | | |
|---|---|---|---|---|
| 23 | −37.3054 | D23(variable) | | |
| 24 | −269.6872 | 4.53 | 22.74 | 1.80809 |
| 25 | −22.2495 | 1.00 | 35.25 | 1.74950 |
| 26 | 33.9362 | D26(variable) | | |
| 27 | 39.0406 | 8.96 | 81.49 | 1.49710 |
| 28 | −26.9857 | 1.06 | | |
| 29 | −31.8633 | 4.36 | 22.74 | 1.80809 |
| 30 | −27.4771 | 1.35 | 52.34 | 1.75500 |
| 31 | −56.0731 | 3.74 | | |
| 32 | −21.6584 | 1.30 | 54.61 | 1.72916 |
| 33 | −45.4890 | D33(variable) | | |
| Img surface | ∞ | | | |

[Aspherical data]

| Surface number | κ | A4 | A6 | A8 | A10 |
|---|---|---|---|---|---|
| 8th surface | 0.00 | 4.46184E−06 | 6.59185E−09 | −2.42201E−11 | 2.59662E−13 |
| 14th surface | 0.00 | −3.88209E−06 | 2.73780E−08 | −1.55431E−10 | 0.00000E+00 |
| 15th surface | 0.00 | 7.82327E−06 | 2.51863E−08 | −1.15048E−10 | −1.28188E−13 |
| 21st surface | 0.00 | −3.14303E−06 | 5.83544E−10 | −1.13942E−11 | 0.00000E+00 |

[Various data]
Zoom ratio 4.13

| | Wide angle end | Intermediate | Telephoto end |
|---|---|---|---|
| f | 24.7~ | 49.5~ | 102.0 |
| FNO | 2.9~ | 3.7~ | 4.1 |
| 2ω | 82.4~ | 47.2~ | 23.5 |
| Y | 19.2~ | 21.6~ | 21.6 |
| TL(air) | 145.2~ | 160.9~ | 196.8 |
| BF(air) | 14.9~ | 28.9~ | 43.9 |

[Variable distance data]

| | Upon focusing on infinity | | | Upon focusing on short distant object | | |
|---|---|---|---|---|---|---|
| | Wide angle end | Intermediate | Telephoto end | Wide angle end | Intermediate | Telephoto end |
| f | 24.7 | 49.5 | 102.0 | 24.7 | 49.5 | 102.0 |
| D5 | 1.10 | 19.44 | 48.07 | | | |
| D13 | 25.53 | 8.90 | 1.10 | | | |
| D20 | 10.87 | 10.87 | 10.87 | 10.20 | 8.66 | 2.09 |
| D23 | 2.50 | 6.70 | 7.68 | 3.17 | 8.91 | 16.46 |
| D26 | 8.08 | 3.88 | 2.90 | | | |
| D33 | 14.92 | 28.89 | 43.95 | | | |

[Lens group data]

| | Group starting surface | Group focal length |
|---|---|---|
| First lens group | 1 | 133.47 |
| Second lens group | 6 | −20.32 |
| Third lens group | 14 | 30.32 |
| Fourth lens group | 24 | −44.25 |
| Fifth lens group | 27 | 151.19 |

[Conditional expression corresponding value]

Conditional expression(JK1) $|fF|/fM = 1.178$
Conditional expression(JK2) $(-fXn)/fM = 0.670$
Conditional expression(JK3) $dAB/|fF| = 0.304$
Conditional expression(JK4) $ndp + 0.0075 \times \nu dp - 2.175 = -0.080$
Conditional expression(JK5) $\nu dp = 67.02$
Conditional expression(JL1) $|(rB + rA)/(rB - rA)| = 8.062$
Conditional expression(JL2) $|fF|/fM = 1.178$
Conditional expression(JL3) $dAB/|fF| = 0.304$
Conditional expression(JL4) $(-fXn)/fM = 0.670$
Conditional expression(JL5) $ndp + 0.0075 \times \nu dp - 2.175 = -0.080$ TABLE 15-continued

| |
|---|
| Conditional expression(JL6) νdp = 67.02 |
| Conditional expression(JM1) dV/\|fV\| = 0.066 |
| Conditional expression(JM2) \|fF\|/fM = 1.178 |
| Conditional expression(JM3) dAB/\|fF\| = 0.304 |
| Conditional expression(JM4) (−fXn)/fM = 0.670 |
| Conditional expression(JM5) ndp + 0.0075 × νdp − 2.175 = −0.080 |
| Conditional expression(JM6) νdp = 67.02 |
| Conditional expression(JN1) \|fF\|/fM = 1.178 |
| Conditional expression(JN2) dV/\|fV\| = 0.066 |
| Conditional expression(JN3) dAB/\|fF\| = 0.304 |
| Conditional expression(JN4) (−fXn)/fM = 0.670 |
| Conditional expression(JN5) ndp + 0.0075 × νdp − 2.175 = −0.080 |
| Conditional expression(JN6) νdp = 67.02 |

It can be seen in Table 15 that the zoom optical system ZL15 according to this Example satisfies the conditional expressions (JK1) to (JK5), (JL1) to (JL6), (JM1) to (JM6), and (JN1) to (JN6).

Figure 77A:
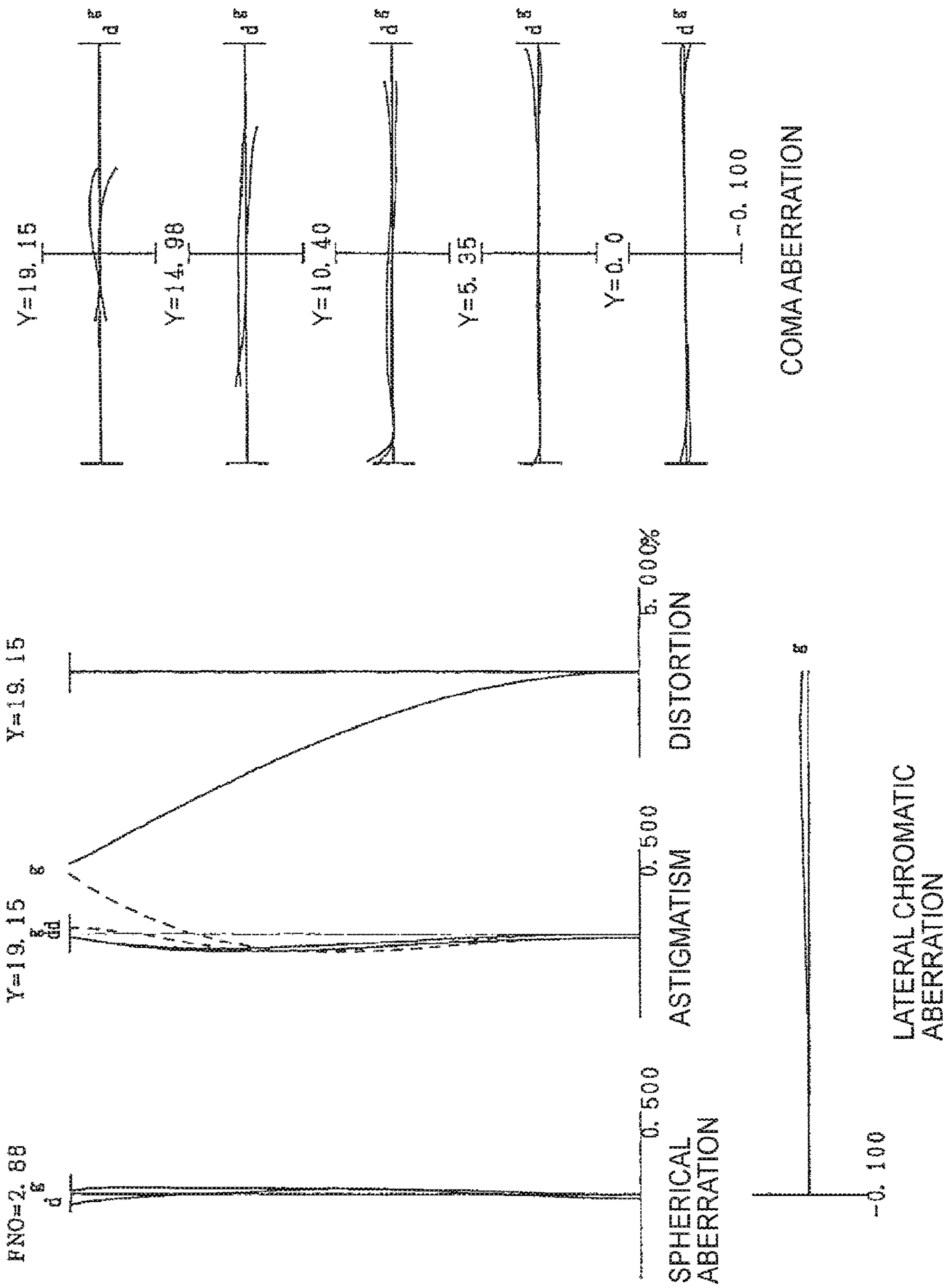
FIGS. 77A, 77B, and 77C are graphs showing various aberrations of the zoom optical system according to Example 15 upon focusing on infinity respectively in the wide angle end state, the intermediate focal length state, and the telephoto end state.
Figure 77B:
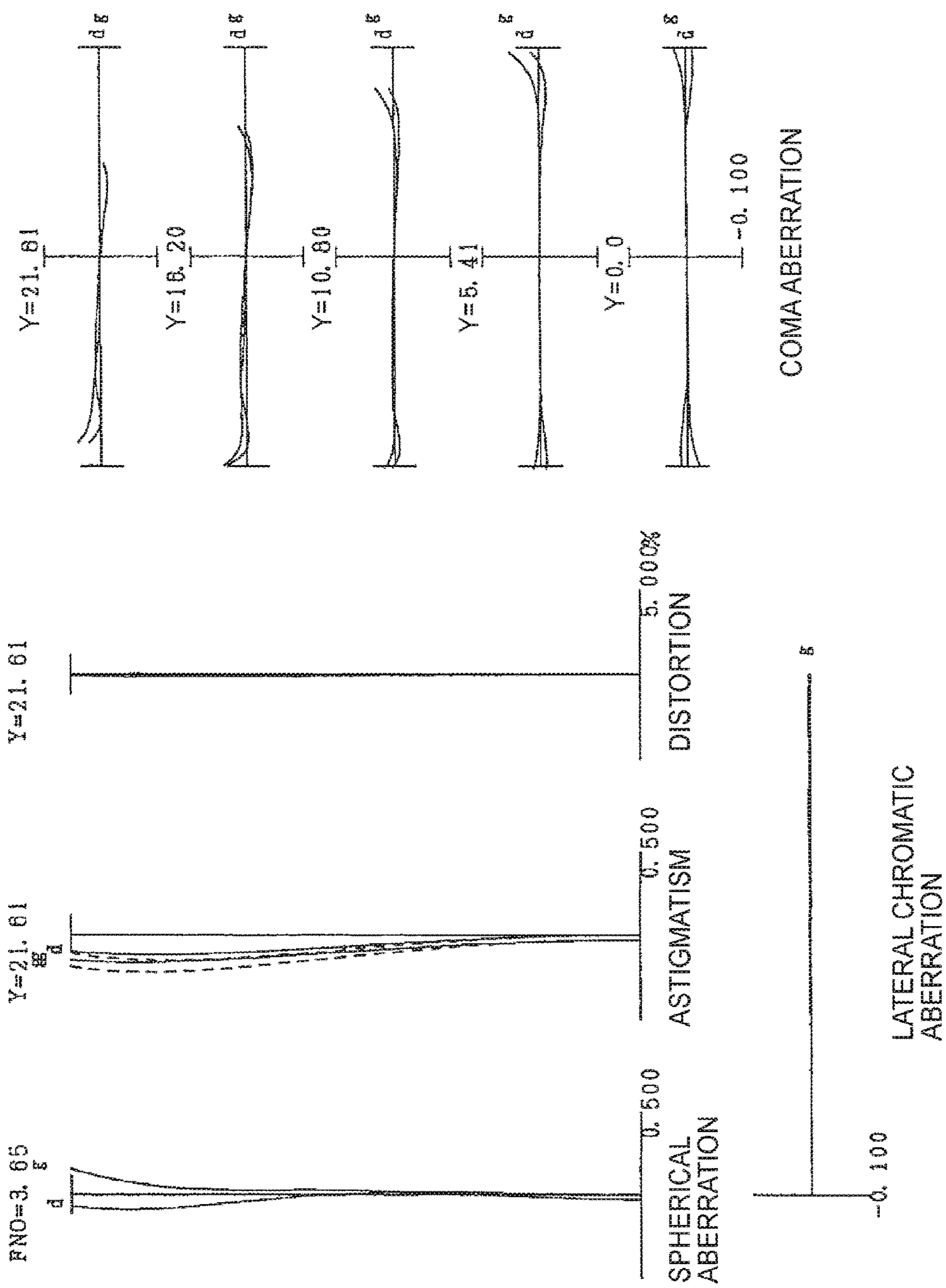
Figure 77C:
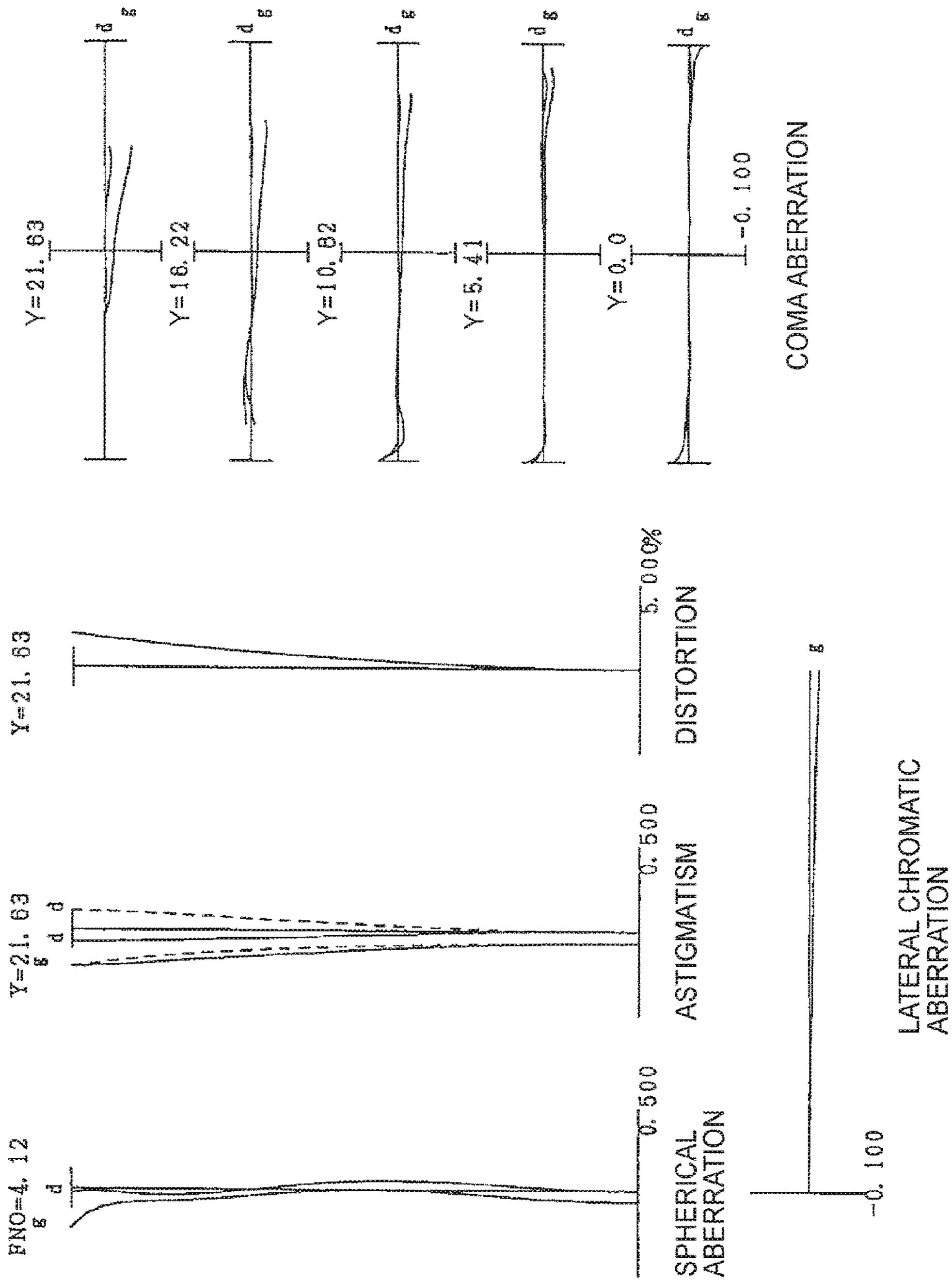
Figure 78A:
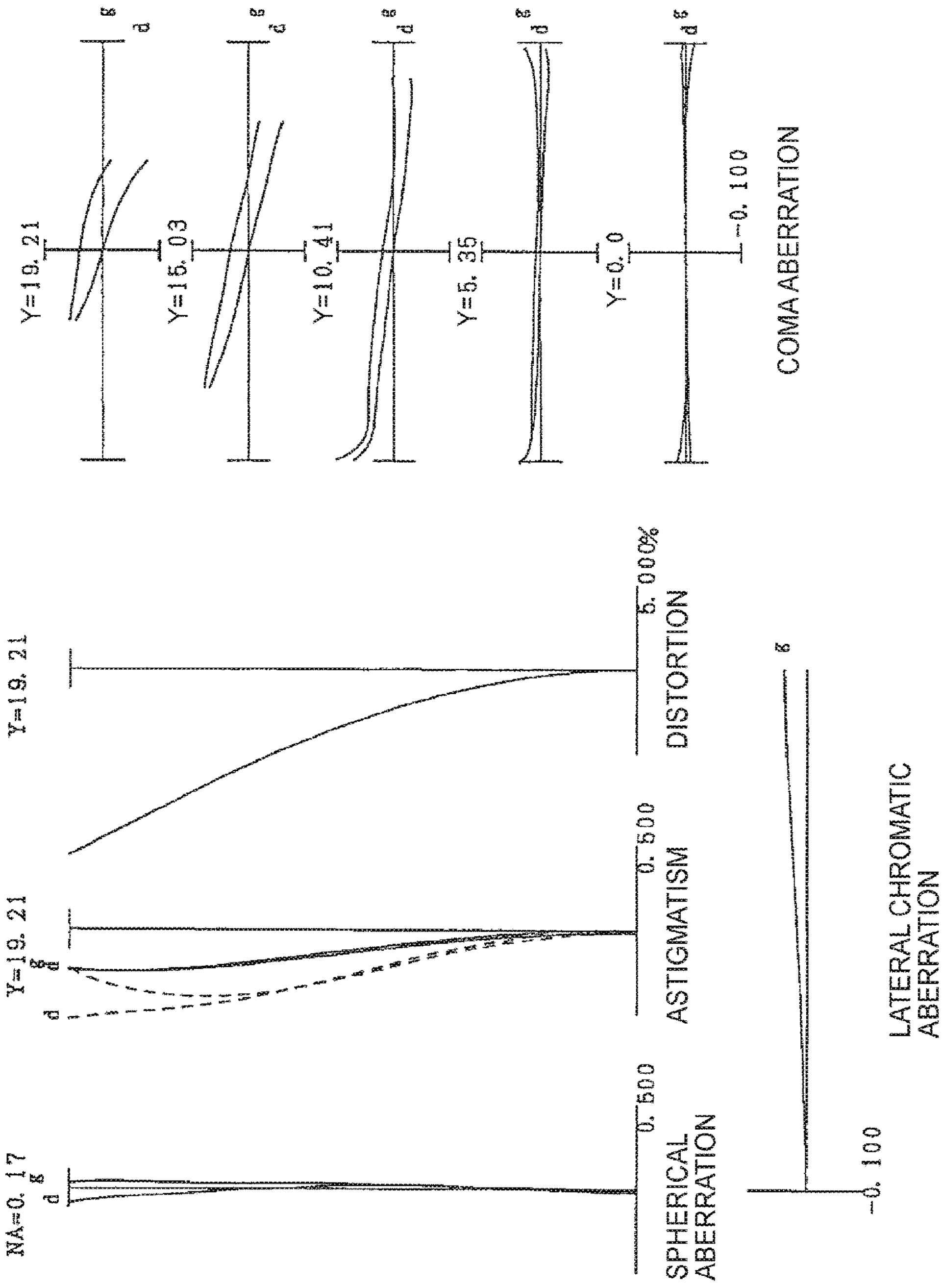
FIGS. 78A, 78B, and 78C are graphs showing various aberrations of the zoom optical system according to Example 15 upon focusing on a short distant object respectively in the wide angle end state, the intermediate focal length state, and the telephoto end state.
Figure 78B:
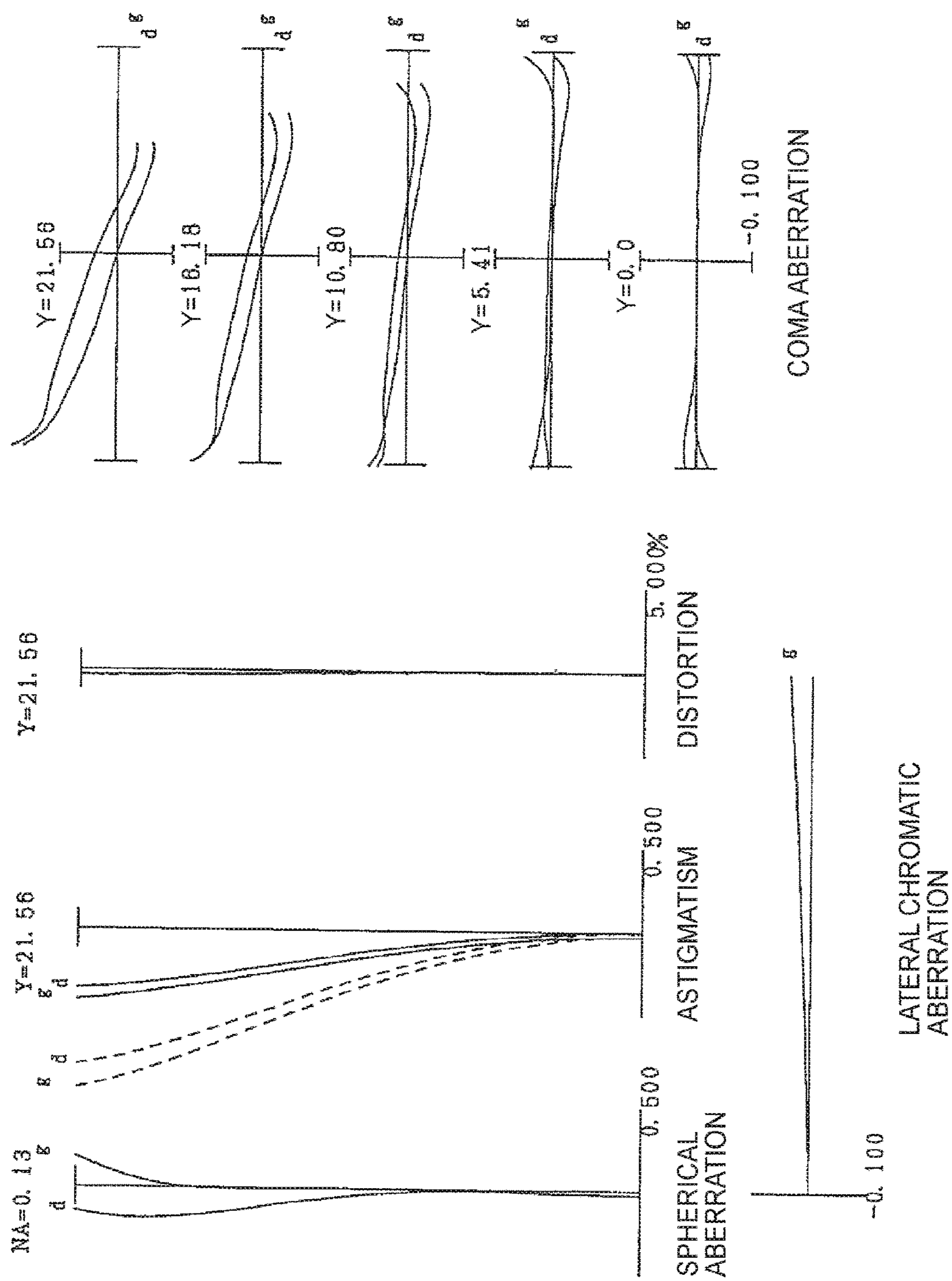
Figure 78C:
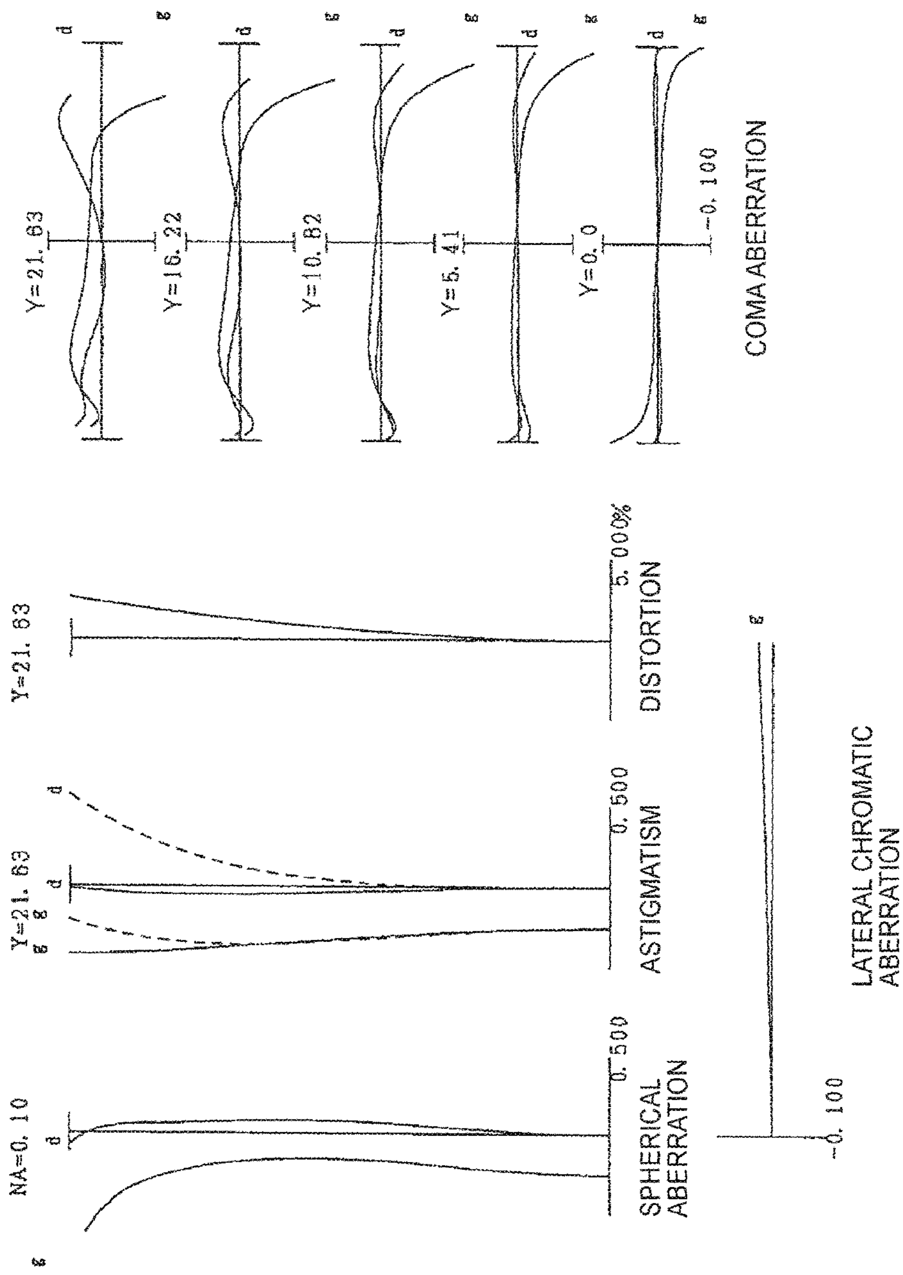
Figure 79A:
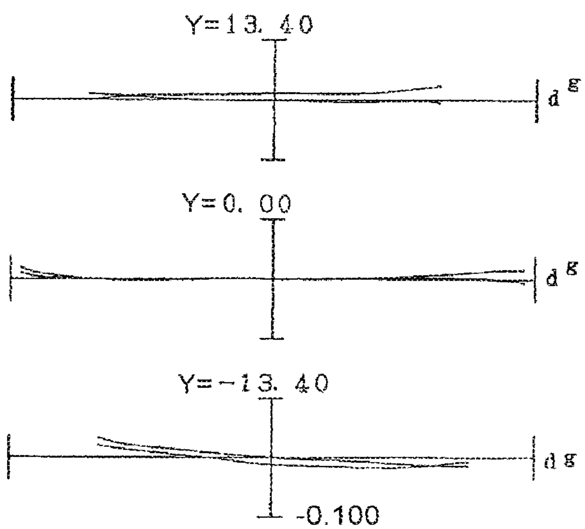
FIGS. 79A, 79B, and 79C are graphs showing coma aberrations of the zoom optical system according to Example 15 upon focusing on infinity with image blur correction performed, respectively in the wide angle end state, the intermediate focal length state, and the telephoto end state.
Figure 79B:
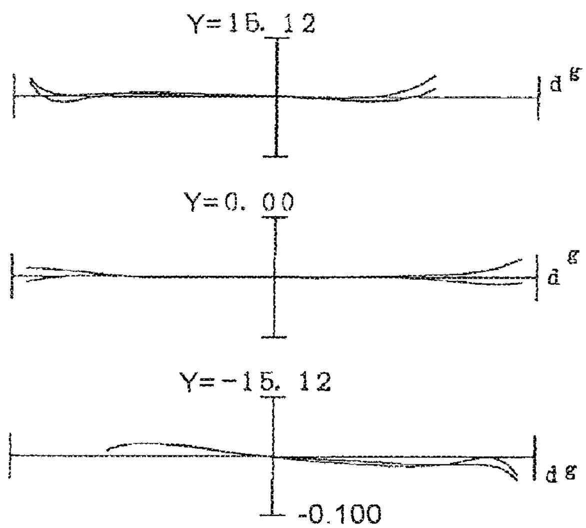
Figure 79C:
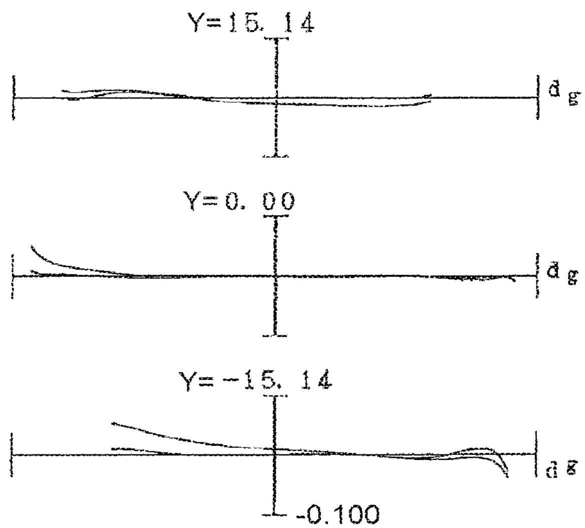

FIG. 77 is various aberration graphs (a spherical aberration graph, an astigmatism graph, a distortion graph, a lateral chromatic aberration graph, and a coma aberration graph) of the zoom optical system ZL15 according to Example 15 upon focusing on infinity with FIG. 77A corresponding to the wide angle end state, FIG. 77B corresponding to the intermediate focal length state, and FIG. 77C corresponding to the telephoto end state. FIG. 78 is various aberration graphs (a spherical aberration graph, an astigmatism graph, a distortion graph, a lateral chromatic aberration graph, and a coma aberration graph) of the zoom optical system ZL15 according to Example 15 upon focusing on a short distant object with FIG. 78A corresponding to the wide angle end state, FIG. 78B corresponding to the intermediate focal length state, and FIG. 78C corresponding to the telephoto end state. FIG. 79 is a coma aberration graph at the time of image blur correction for the zoom optical system ZL15 according to Example 15 upon focusing on infinity with FIG. 79A corresponding to the wide angle end state, FIG. 79B corresponding to the intermediate focal length state, and FIG. 79C corresponding to the telephoto end state.

In the aberration graphs, FNO represents F number, NA represents numerical aperture, and Y represents an image height. Furthermore, d and g respectively represent aberrations on the d-line and the g-line. Those denoted with none of the above represent aberrations on the d-line. In the spherical aberration graph illustrating the case of focusing on infinity, a value of the F number corresponding to the maximum aperture is described. In the spherical aberration graph illustrating the case of focusing on a short distant object, a value of the numerical aperture corresponding to the maximum aperture is described. In each of the astigmatism graph and the distortion graph, the maximum value of the image height is described. In the coma aberration graph, a value of a corresponding image height is described. In the astigmatism graph, a solid line represents a sagittal image surface, and a broken line represents a meridional image surface.

In the aberration graphs in other Examples, the same reference signs as in this Example are used.

It can be seen in the aberration graphs in FIG. 77 to FIG. 79 that the zoom optical system ZL15 according to Example 15 can achieve an excellent optical performance with various aberrations successfully corrected from the wide angle end state to the telephoto end state and from the infinity focusing state to the short-distant object focusing state. Furthermore, it can be seen that a high imaging performance can be achieved upon image blur correction.

Example 16

Figure 80:
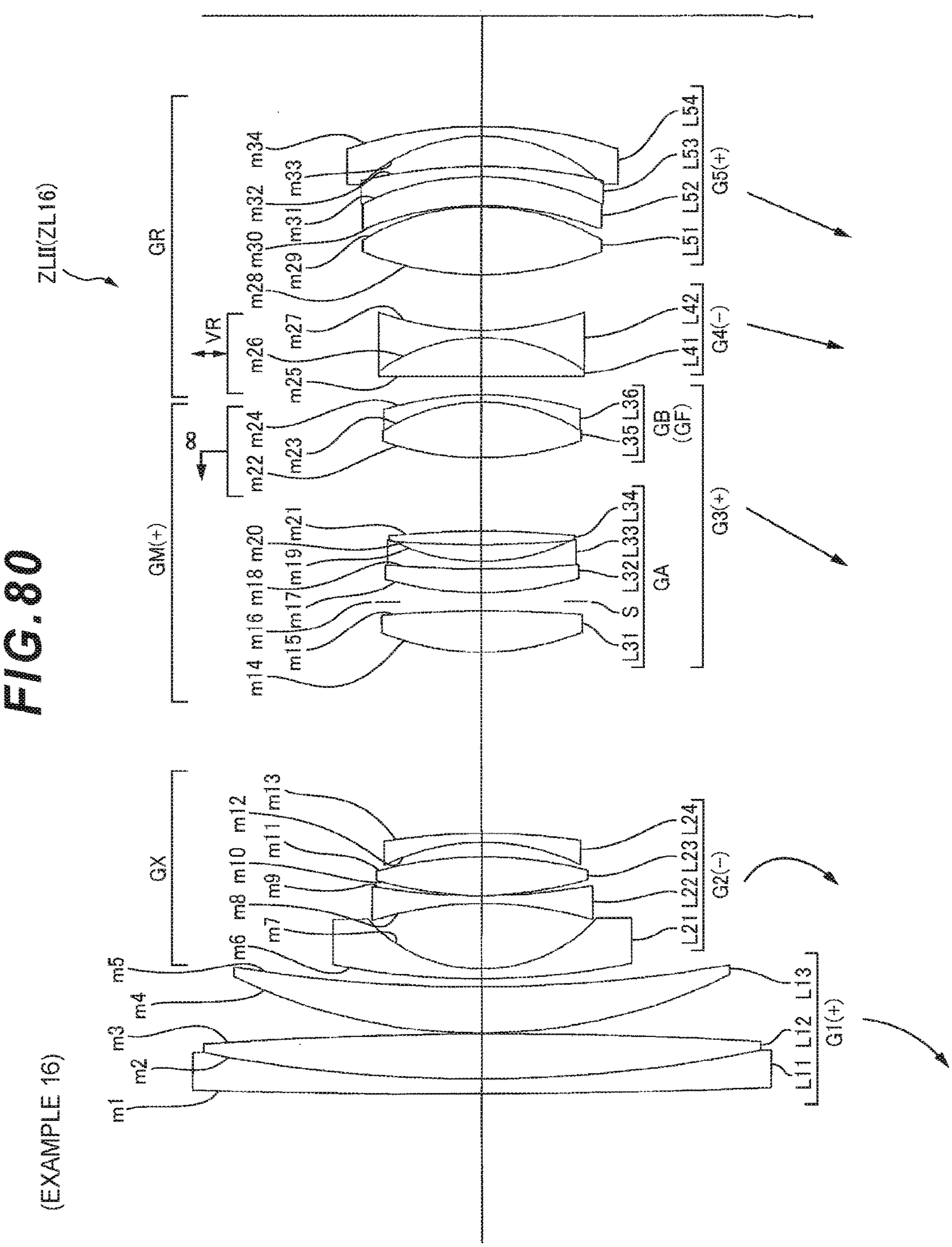
FIG. 80 is a cross-sectional view of a zoom optical system according to Example 16.

Example 16 is described with reference to FIG. 80 to FIG. 83 and Table 16. A zoom optical system ZLII (ZL16) according to Example 16 includes, as illustrated in FIG. 80, the first lens group G1 having positive refractive power, the second lens group G2 having negative refractive power, the third lens group G3 having positive refractive power, the fourth lens group G4 having negative refractive power, and the fifth lens group G5 having positive refractive power that are arranged in order from the object side.

The first lens group G1 includes: the cemented lens including the negative meniscus lens L11 having a concave surface facing the image side and the biconvex lens L12; and the positive meniscus lens L13 having a convex surface facing the object side that are arranged in order from the object side.

The second lens group G2 includes the negative meniscus lens L21 having a concave surface facing the image side, the biconcave lens L22, the biconvex lens L23, and the negative meniscus lens L24 having a concave surface facing the object side that are arranged in order from an object side. The biconcave lens L22 is a glass-molded aspherical lens with a lens surface, on the object side, having an aspherical shape.

The third lens group G3 includes the object side group GA and the image side group GB having positive refractive power that are arranged in order from the object side. The object side group GA includes: the biconvex lens L31; the aperture stop S; the cemented lens including the positive meniscus lens L32 having a convex surface facing the object side and the negative meniscus lens L33 having a concave surface facing the image side; and the biconvex lens L34 that are arranged in order from the object side. The image side group GB includes a cemented lens including the biconvex lens L35 and a negative meniscus lens L36 having a concave surface facing the object side. The biconvex lens L31 is a glass-molded aspherical lens with lens surfaces, on the object side and on the image surface side, having an aspherical shape. The biconvex lens L35 is a glass-molded aspherical lens with a lens surface, on the object side, having an aspherical shape.

The fourth lens group G4 includes a cemented lens including the positive meniscus lens L41 having a convex surface facing the image side and the biconcave lens L42 arranged in order from the object side.

The fifth lens group G5 includes: the biconvex lens L51; the cemented lens including the positive meniscus lens L52 having a convex surface facing the image side and the negative meniscus lens L53 having a concave surface facing the object side; and the negative meniscus lens L54 having a concave surface facing the object side that are arranged in order from the object side.

The zooming from the wide angle end state to the telephoto end state is achieved with: the first lens group G1 moved toward the object side, the second lens group G2 moved toward the image surface side and then moved toward the object side, and the third lens group G3, the fourth lens group G4, and the fifth lens group G5 moved toward the object side in such a manner that the distance between the first lens group G1 and the second lens group G2 increases, the distance between the second lens group G2 and the third lens group G3 decreases, the distance between the third lens group G3 and the fourth lens group G4 increases, and the distance between the fourth lens group G4 and the fifth lens group G5 decreases.

Focusing from infinity to the short-distant object is achieved with the image side group GB (=focusing lens group GF) forming the third lens group G3 moved toward the object side.

When image blur occurs, image blur correction (vibration isolation) on the image surface I is performed with the fourth lens group G4 serving as the vibration-proof lens group VR moved with a displacement component in the direction orthogonal to the optical axis. In Example 16, in the wide angle end state, the shifted amount of the vibration-proof lens group VR is −0.364 mm when the correction angle is 0.664°. In the intermediate focal length state, the shifted amount of the vibration-proof lens group VR is −0.380 mm when the correction angle is 0.469°. In the telephoto end state, the shifted amount of the vibration-proof lens group VR is −0.411 mm when the correction angle is 0.327°.

In Table 16 below, specification values in Example 16 are listed. Surface numbers 1 to 34 in Table 16 respectively correspond to the optical surfaces m1 to m34 in FIG. 80.

TABLE 16

[Lens specifications]

| Surface number | R | D | νd | nd |
|---|---|---|---|---|
| Obj surface | ∞ | | | |
| 1 | 916.8489 | 2.00 | 22.74 | 1.80809 |
| 2 | 158.3187 | 6.08 | 67.90 | 1.59319 |
| 3 | −493.5781 | 0.10 | | |
| 4 | 63.9801 | 6.17 | 54.61 | 1.72916 |
| 5 | 163.4366 | D5 (variable) | | |
| 6 | 83.3961 | 1.35 | 35.72 | 1.90265 |
| 7 | 18.1108 | 8.76 | | |
| *8 | −40.2536 | 1.00 | 51.16 | 1.75501 |
| 9 | 68.0742 | 0.10 | | |
| 10 | 42.0171 | 5.22 | 22.74 | 1.80809 |
| 11 | −46.3761 | 1.93 | | |
| 12 | −25.6000 | 1.20 | 58.12 | 1.62299 |
| 13 | −74.9844 | D13 (variable) | | |
| *14 | 29.1065 | 5.62 | 53.94 | 1.71300 |
| *15 | −124.6985 | 1.23 | | |
| 16 | ∞ | 1.18 | (aperture stop) | |
| 17 | 39.1990 | 3.24 | 82.57 | 1.49782 |
| 18 | 126.0827 | 1.00 | 35.72 | 1.90265 |
| 19 | 23.4224 | 2.24 | | |
| 20 | 118.9234 | 1.83 | 82.57 | 1.49782 |
| 21 | −101.4424 | D21 (variable) | | |
| *22 | 33.6941 | 7.47 | 67.02 | 1.59201 |
| 23 | −21.0000 | 1.00 | 23.80 | 1.84666 |
| 24 | −38.3994 | D24 (variable) | | |
| 25 | −6161.8654 | 5.21 | 23.80 | 1.84666 |
| 26 | −20.1408 | 1.00 | 34.92 | 1.80100 |
| 27 | 33.4655 | D27 (variable) | | |
| 28 | 37.1236 | 9.10 | 81.56 | 1.49710 |
| 29 | −26.2445 | 0.10 | | |
| 30 | −35.8475 | 3.96 | 22.74 | 1.80809 |
| 31 | −31.3729 | 1.35 | 52.33 | 1.75500 |
| 32 | −59.8216 | 4.09 | | |
| 33 | −20.2772 | 1.30 | 54.61 | 1.72916 |
| 34 | −47.4793 | D34 (variable) | | |
| Img surface | ∞ | | | |

[Aspherical data]

| Surface number | κ | A4 | A6 | A8 | A10 |
|---|---|---|---|---|---|
| 8th surface | 0.00 | 3.42226E−06 | 6.05569E−09 | −3.11555E−11 | 2.54097E−13 |
| 14th surface | 0.00 | −4.80738E−06 | 5.41541E−09 | −4.65291E−11 | 0.00000E+00 |

TABLE 16-continued

| | | | | | |
|---|---|---|---|---|---|
| 15th surface | 0.00 | 3.66826E−06 | 1.07444E−09 | −3.77085E−11 | −1.05724E−14 |
| 22nd surface | 0.00 | −1.57492E−06 | 3.71675E−09 | −1.27040E−11 | 0.00000E+00 |

[Various data]
Zoom ratio 4.13

| | Wide angle end | | Intermediate | | Telephoto end |
|---|---|---|---|---|---|
| f | 24.7 | ~ | 49.5 | ~ | 102.0 |
| FNO | 2.9 | ~ | 3.7 | ~ | 4.1 |
| 2ω | 82.4 | ~ | 47.2 | ~ | 23.5 |
| Y | 19.1 | ~ | 21.6 | ~ | 21.6 |
| TL (air) | 145.0 | ~ | 161.2 | ~ | 195.8 |
| BF (air)) | 14.9 | ~ | 29.0 | ~ | 43.7 |

[Variable distance data]

| | Upon focusing on infinity | | | Upon focusing on short distant object | | |
|---|---|---|---|---|---|---|
| | Wide angle end | Intermediate | Telephoto end | Wide angle end | Intermediate | Telephoto end |
| f | 24.7 | 49.5 | 102.0 | 24.7 | 49.5 | 102.0 |
| D5 | 1.10 | 19.00 | 46.32 | | | |
| D13 | 24.37 | 8.60 | 1.10 | | | |
| D21 | 9.79 | 9.79 | 9.79 | 9.06 | 7.42 | 0.62 |
| D24 | 2.50 | 6.73 | 7.54 | 3.23 | 9.10 | 16.70 |
| D27 | 7.55 | 3.32 | 2.51 | | | |
| D34 | 14.92 | 28.97 | 43.69 | | | |

[Lens group data]

| | Group starting surface | Group focal length |
|---|---|---|
| First lens group | 1 | 127.20 |
| Second lens group | 6 | −19.77 |
| Third lens group | 14 | 30.89 |
| Fourth lens group | 25 | −45.90 |
| Fifth lens group | 28 | 151.64 |

[Conditional expression corresponding value]

| | |
|---|---|
| Conditional expression (JK1) | $\lvert fF\rvert/fM = 1.217$ |
| Conditional expression (JK2) | $(-fXn)/fM = 0.640$ |
| Conditional expression (JK3) | $dAB/\lvert fF\rvert = 0.260$ |
| Conditional expression (JK4) | $ndp + 0.0075 \times \nu dp - 2.175 = -0.080$ |
| Conditional expression (JK5) | $\nu dp = 67.02$ |
| Conditional expression (JM1) | $dV/\lvert fV\rvert = 0.055$ |
| Conditional expression (JM2) | $\lvert fF\rvert/fM = 1.217$ |
| Conditional expression (JM3) | $dAB/\lvert fF\rvert = 0.260$ |
| Conditional expression (JM4) | $(-fXn)/fM = 0.640$ |
| Conditional expression (JM5) | $ndp + 0.0075 \times \nu dp - 2.175 = -0.080$ |
| Conditional expression (JM6) | $\nu dp = 67.02$ |
| Conditional expression (JN1) | $\lvert fF\rvert/fM = 1.217$ |
| Conditional expression (JN2) | $dV/\lvert fV\rvert = 0.055$ |
| Conditional expression (JN3) | $dAB/\lvert fF\rvert = 0.260$ |
| Conditional expression (JN4) | $(-fXn)/fM = 0.640$ |
| Conditional expression (JN5) | $ndp + 0.0075 \times \nu dp - 2.175 = -0.080$ |
| Conditional expression (JN6) | $\nu dp = 67.02$ |

It can be seen in Table 16 that the zoom optical system ZL16 according to this Example satisfies the conditional expressions (JK1) to (JK5), (JM1) to (JM6), and (JN1) to (JN6).

Figure 81A:
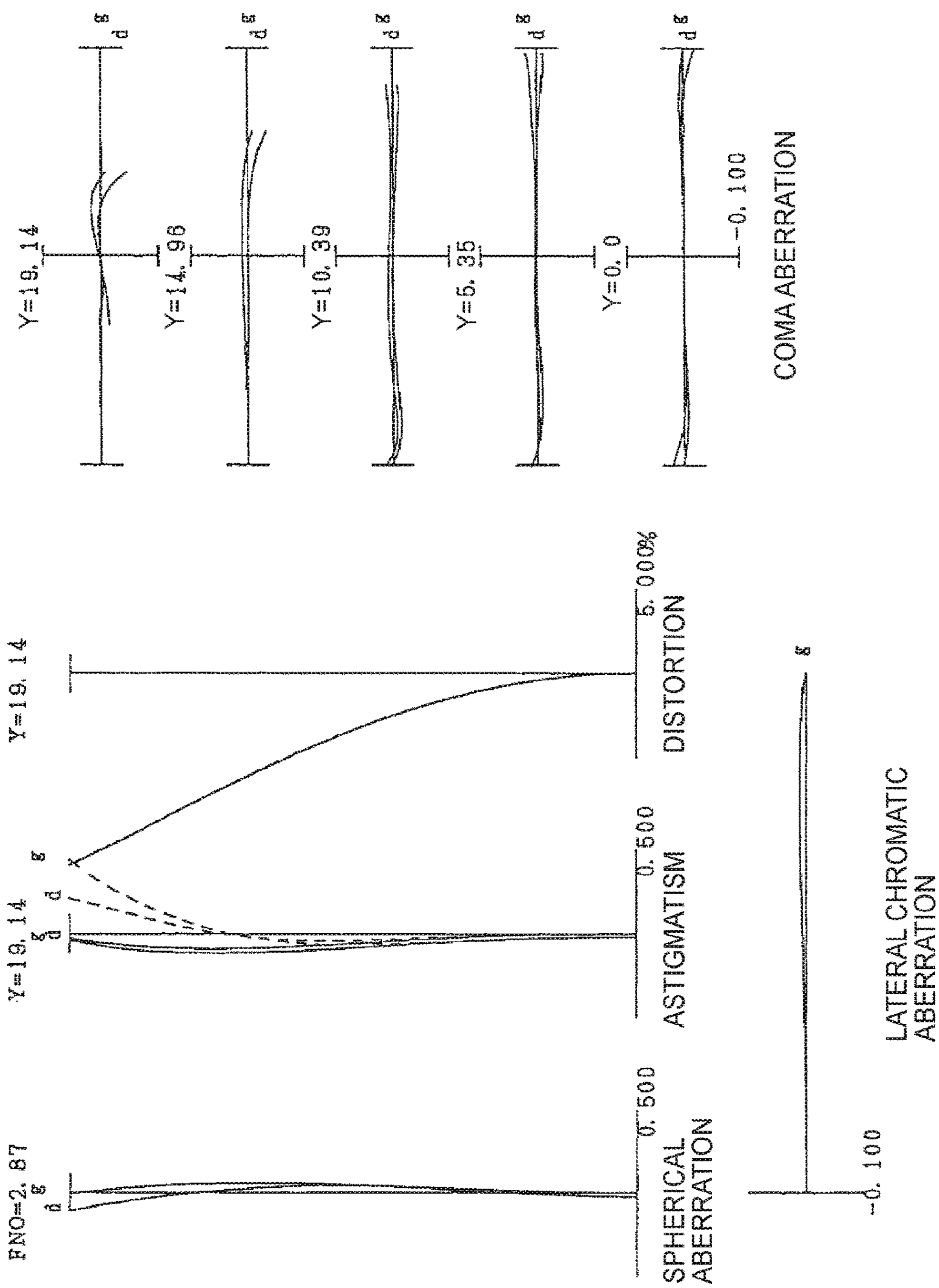
FIGS. 81A, 81B, and 81C are graphs showing various aberrations of the zoom optical system according to Example 16 upon focusing on infinity respectively in the wide angle end state, the intermediate focal length state, and the telephoto end state.
Figure 81B:
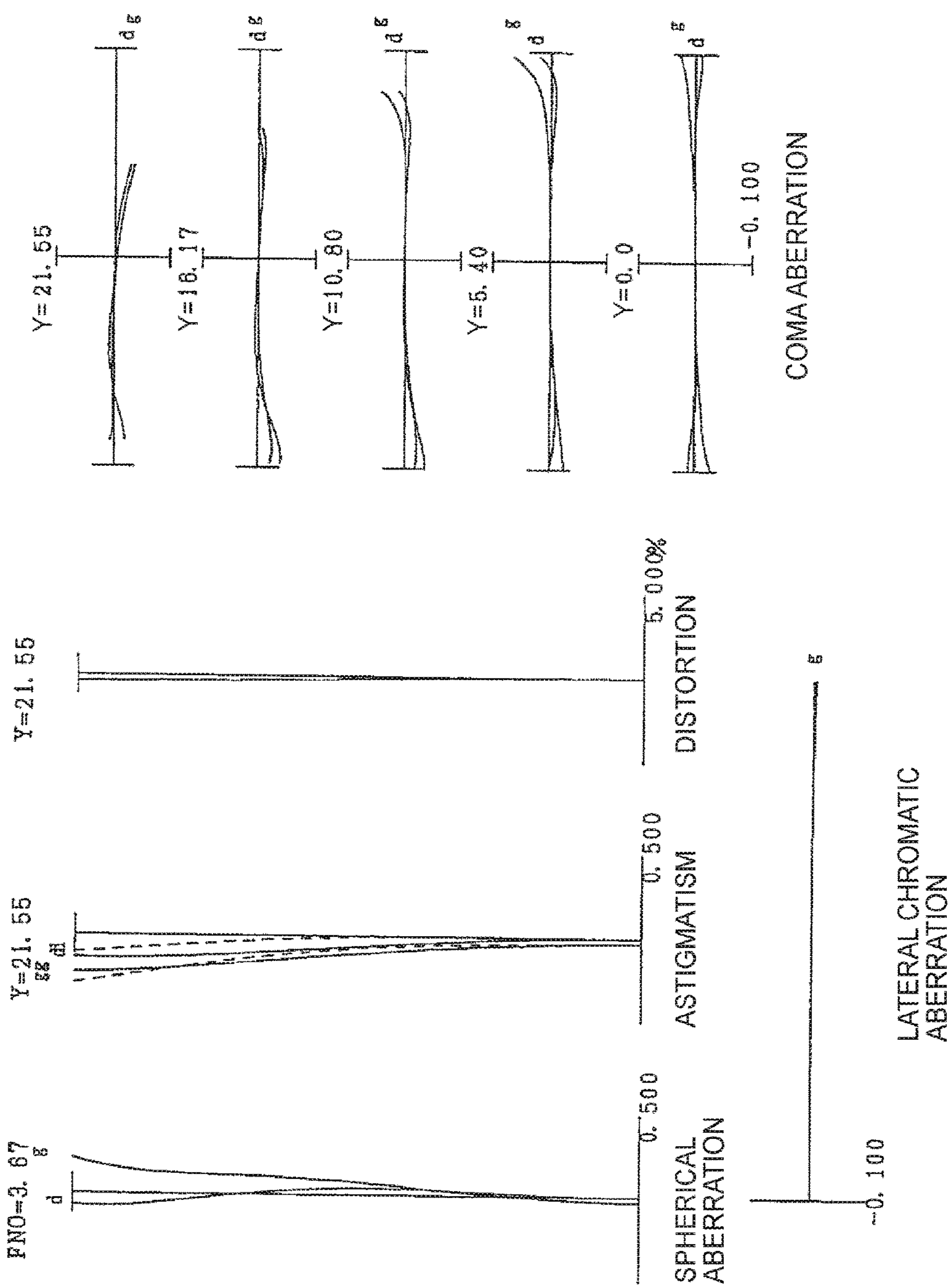
Figure 81C:
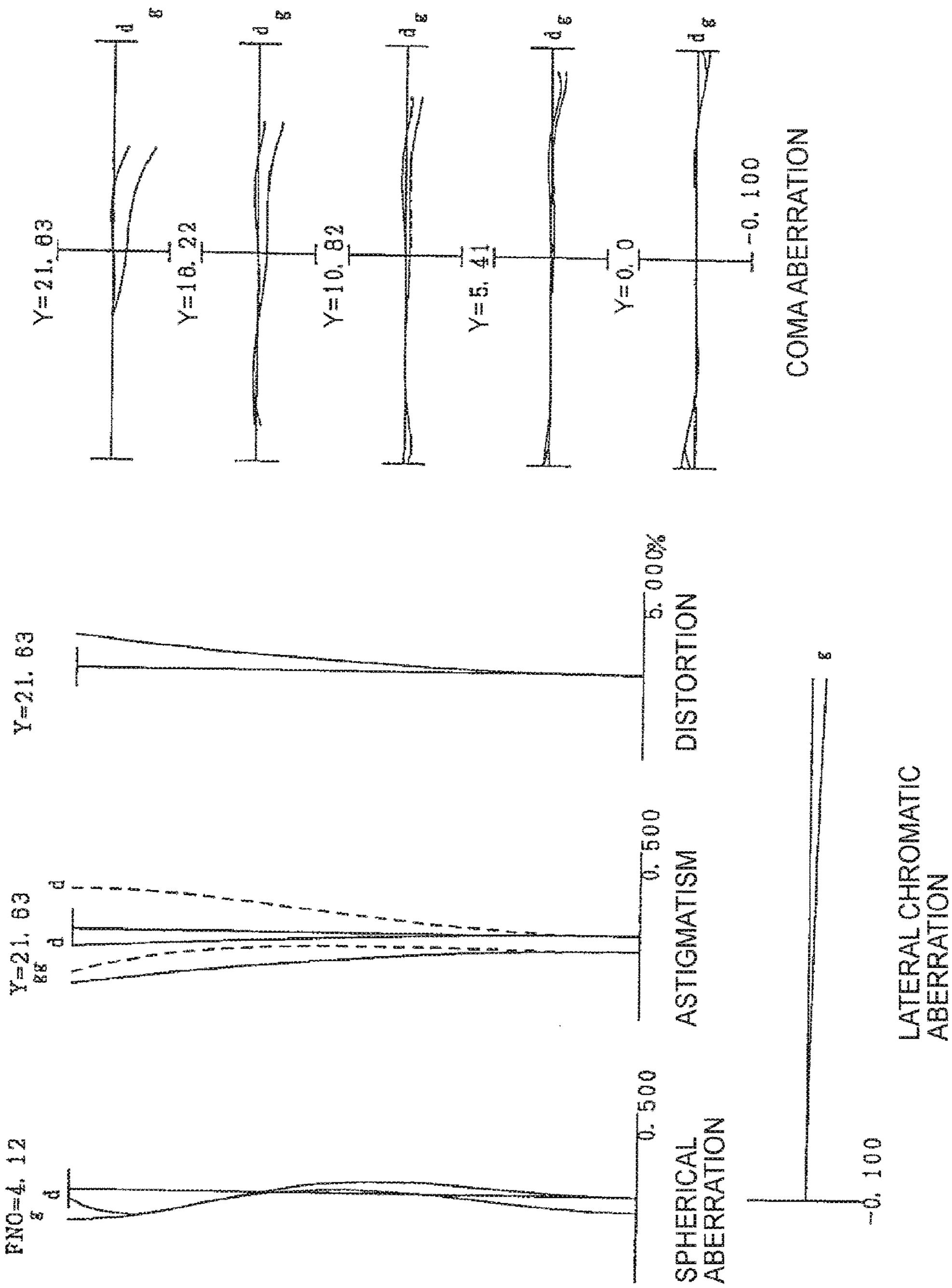
Figure 82A:
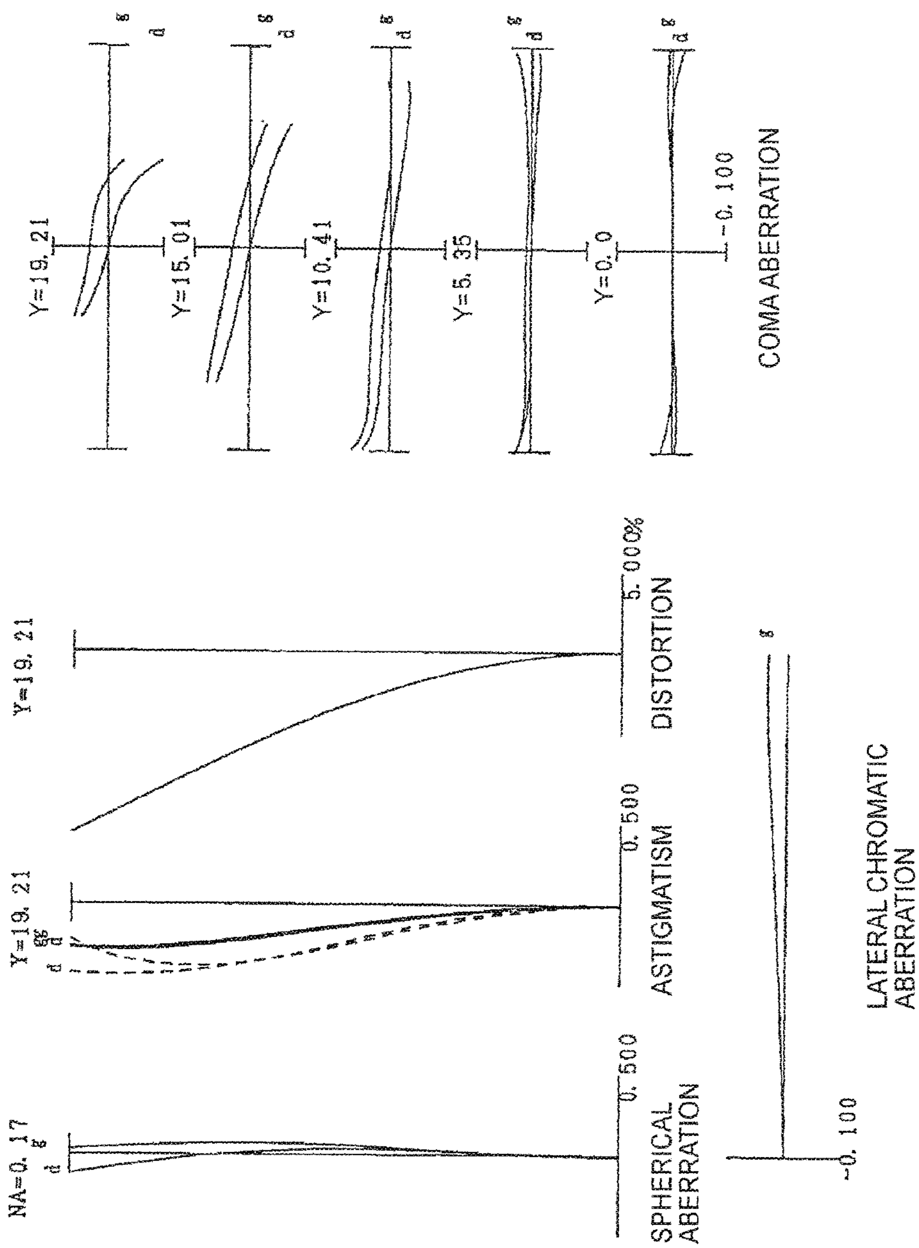
FIGS. 82A, 82B, and 82C are graphs showing various aberrations of the zoom optical system according to Example 16 upon focusing on a short distant object respectively in the wide angle end state, the intermediate focal length state, and the telephoto end state.
Figure 82B:
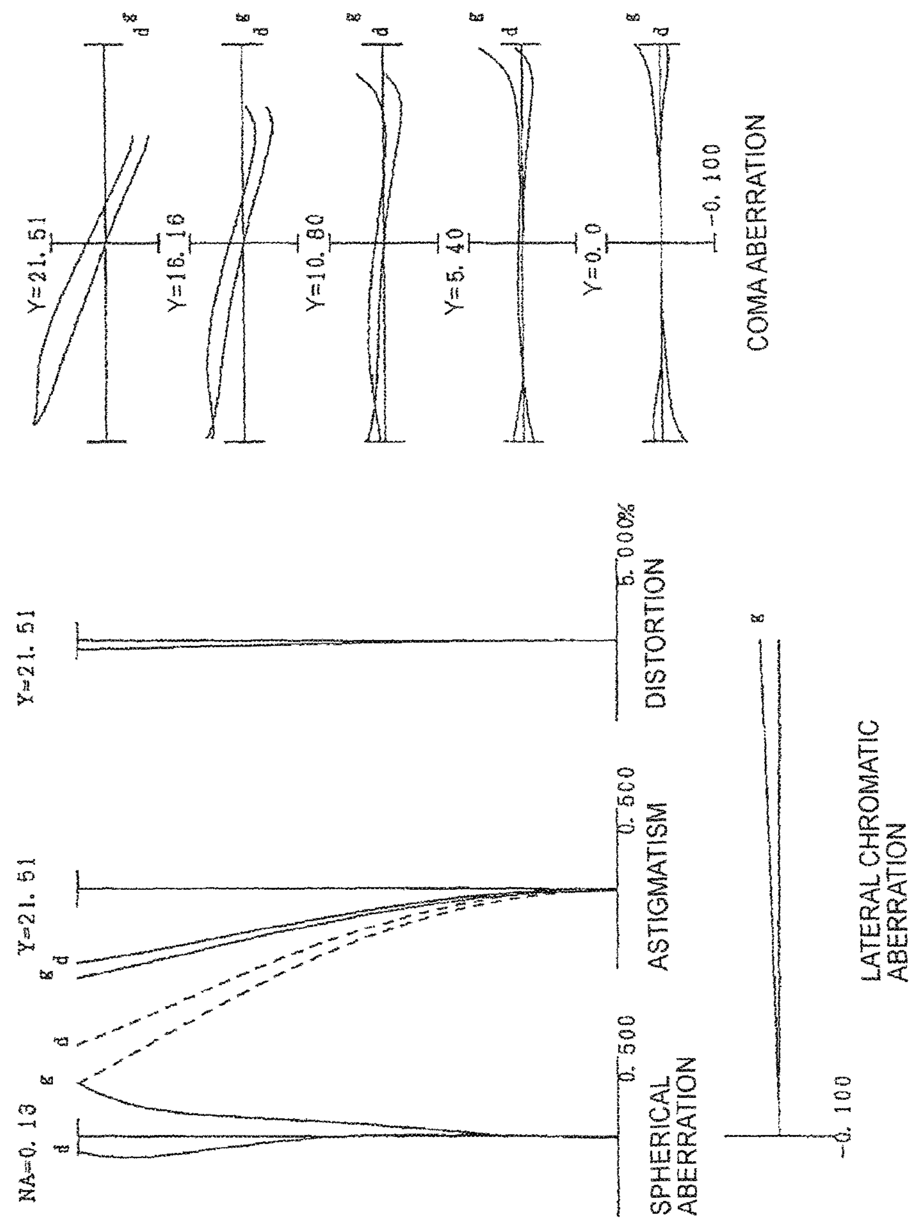
Figure 82C:
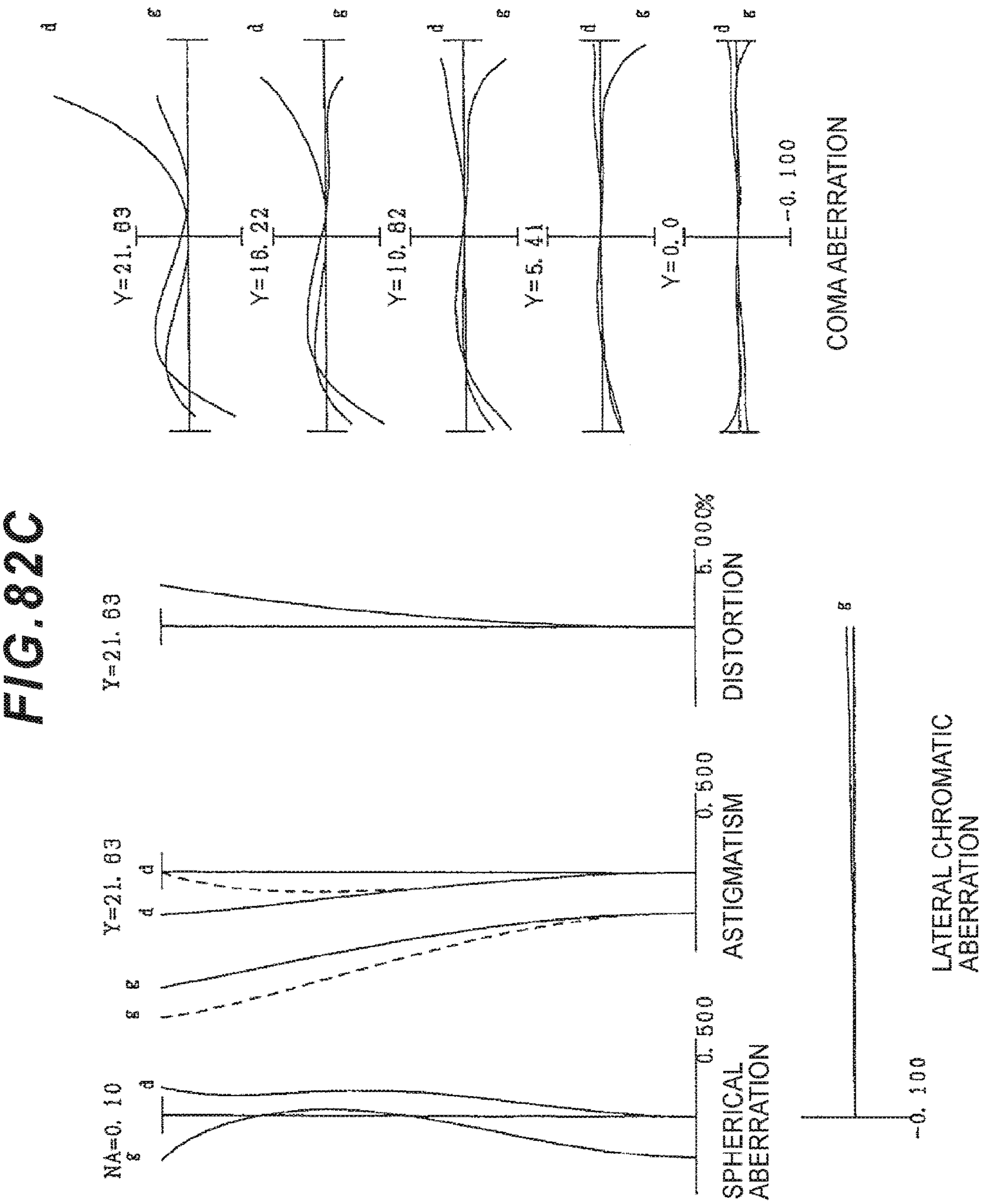
Figure 83A:
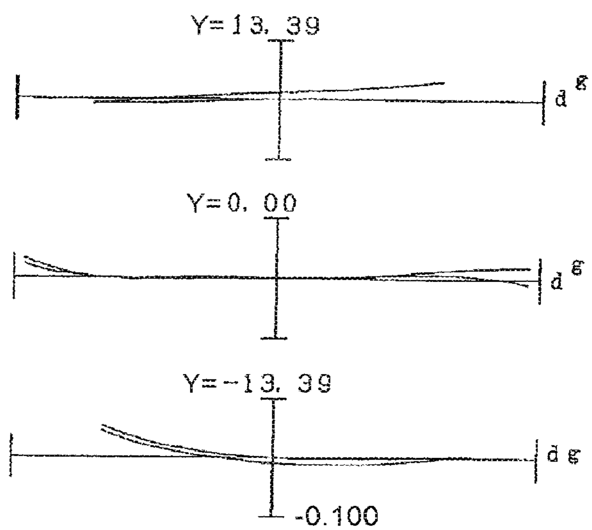
FIGS. 83A, 83B, and 83C are graphs showing coma aberrations of the zoom optical system according to Example 16 upon focusing on infinity with image blur correction performed, respectively in the wide angle end state, the intermediate focal length state, and the telephoto end state.
Figure 83B:
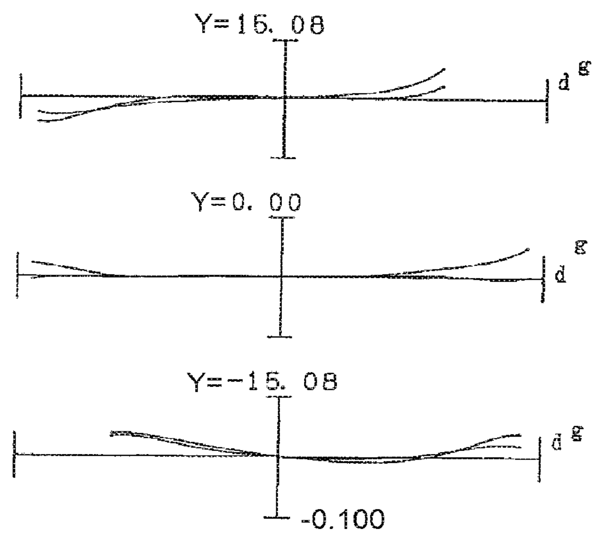

FIG. 81 is various aberration graphs (a spherical aberration graph, an astigmatism graph, a distortion graph, a lateral chromatic aberration graph, and a coma aberration graph) of the zoom optical system ZL16 according to Example 16 upon focusing on infinity with FIG. 81A corresponding to the wide angle end state, FIG. 81B corresponding to the intermediate focal length state, and FIG. 81C corresponding to the telephoto end state. FIG. 82 is various aberration graphs (a spherical aberration graph, an astigmatism graph, a distortion graph, a lateral chromatic aberration graph, and a coma aberration graph) of the zoom optical system ZL16 according to Example 16 upon focusing on a short distant object with FIG. 82A corresponding to the wide angle end state, FIG. 82B corresponding to the intermediate focal length state, and FIG. 82C corresponding to the telephoto end state. FIG. 83 is a coma aberration graph at the time of image blur correction for the zoom optical system ZL16 according to Example 16 upon focusing on infinity with FIG. 83A corresponding to the wide angle end state, FIG.

Figure 83C:
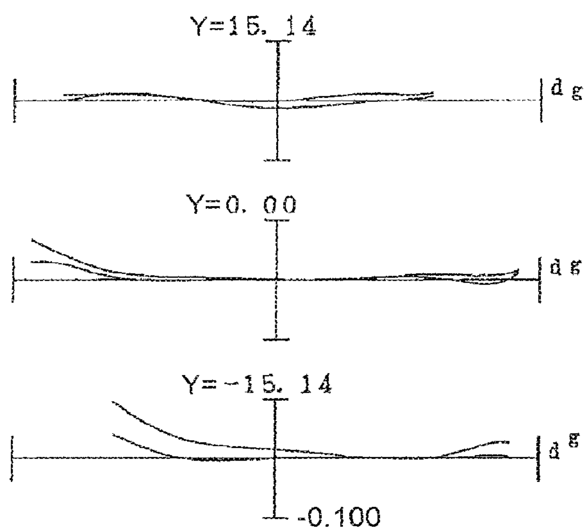

83B corresponding to the intermediate focal length state, and FIG. 83C corresponding to the telephoto end state.

It can be seen in the aberration graphs in FIG. 81 to FIG. 83 that the zoom optical system ZL16 according to Example 16 can achieve an excellent optical performance with various aberrations successfully corrected from the wide angle end state to the telephoto end state and from the infinity focusing state to the short-distant object focusing state. Furthermore, it can be seen that a high imaging performance can be achieved upon image blur correction.

Example 17

Figure 84:
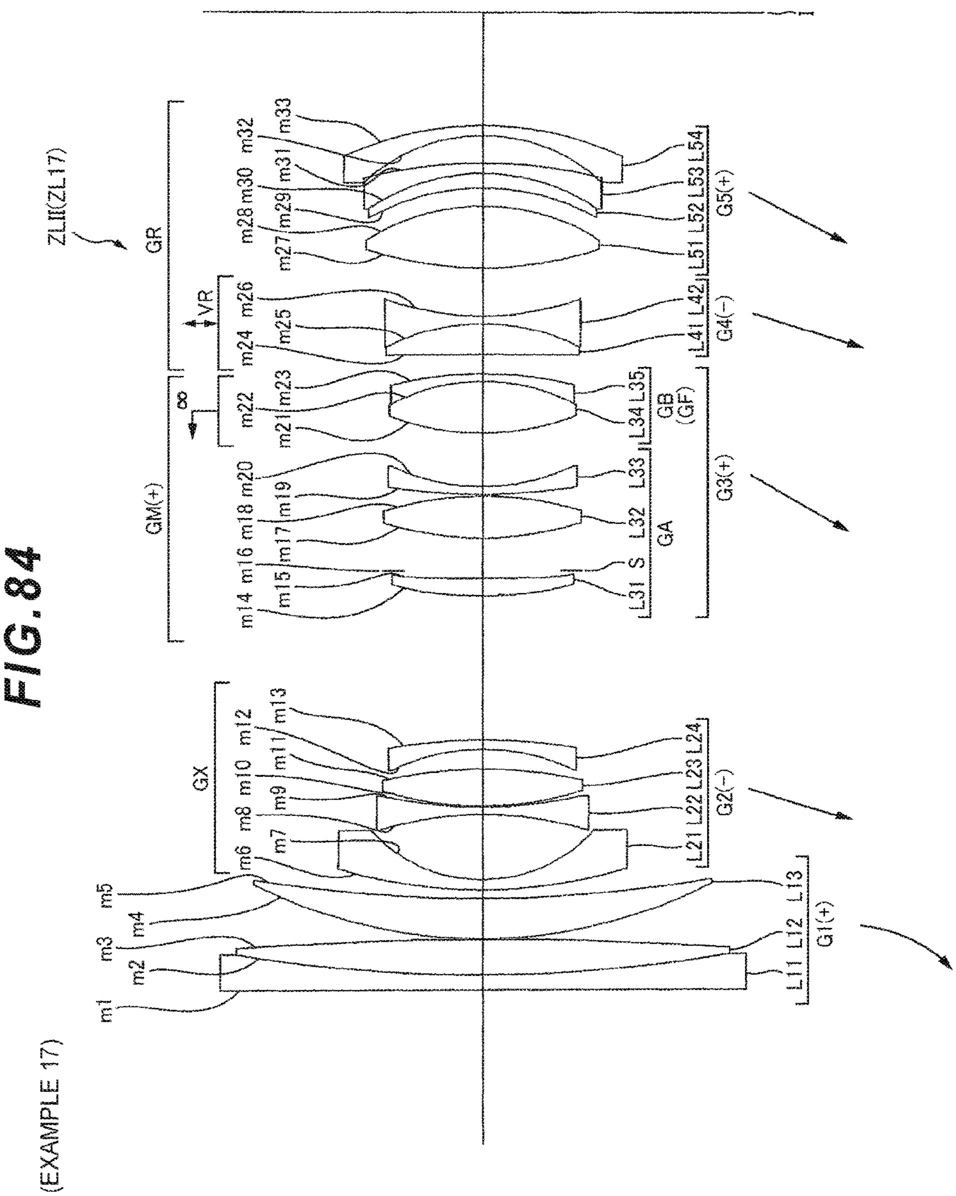
FIG. 84 is a cross-sectional view of a zoom optical system according to Example 17.

Example 17 is described with reference to FIG. 84 to FIG. 87 and Table 17. A zoom optical system ZLII (ZL17) according to Example 17 includes, as illustrated in FIG. 84, the first lens group G1 having positive refractive power, the second lens group G2 having negative refractive power, the third lens group G3 having positive refractive power, the fourth lens group G4 having negative refractive power, and the fifth lens group G5 having positive refractive power that are arranged in order from the object side.

The first lens group G1 includes: a cemented lens including a plano-concave lens L11 having a concave surface facing the image side and the biconvex lens L12; and the positive meniscus lens L13 having a convex surface facing the object side that are arranged in order from the object side.

The second lens group G2 includes the negative meniscus lens L21 having a concave surface facing the image side, the biconcave lens L22, the biconvex lens L23, and the negative meniscus lens L24 having a concave surface facing the object side that are arranged in order from an object side. The biconcave lens L22 is a glass-molded aspherical lens with a lens surface, on the object side, having an aspherical shape.

The third lens group G3 includes the object side group GA and the image side group GB having positive refractive power that are arranged in order from the object side. The object side group GA includes a positive meniscus lens L31 having a convex surface facing the object side, the aperture stop S, the biconvex lens L32, and the negative meniscus lens L33 having a concave surface facing the image side that are arranged in order from the object side. The image side group GB includes the cemented lens including the biconvex lens L34 and the negative meniscus lens L35 having a concave surface facing the object side. The positive meniscus lens L31 is a glass-molded aspherical lens with lens surfaces, on the object side and on the image surface side, having an aspherical shape. The biconvex lens L34 is a glass-molded aspherical lens with a lens surface, on the object side, having an aspherical shape.

The fourth lens group G4 includes a cemented lens including the positive meniscus lens L41 having a convex surface facing the image side and the biconcave lens L42 arranged in order from the object side.

The fifth lens group G5 includes: the biconvex lens L51; the cemented lens including the positive meniscus lens L52 having a convex surface facing the image side and the negative meniscus lens L53 having a concave surface facing the object side; and the negative meniscus lens L54 having a concave surface facing the object side that are arranged in order from the object side.

The zooming from the wide angle end state to the telephoto end state is achieved with: the first lens group G1, the second lens group G2, the third lens group G3, the fourth lens group G4, and the fifth lens group G5 each moved toward the object side in such a manner that the distance between the first lens group G1 and the second lens group G2 increases, the distance between the second lens group G2 and the third lens group G3 decreases, the distance between the third lens group G3 and the fourth lens group G4 increases, and the distance between the fourth lens group G4 and the fifth lens group G5 decreases.

Focusing from infinity to the short-distant object is achieved with the image side group GB (=focusing lens group GF) forming the third lens group G3 moved toward the object side.

When image blur occurs, image blur correction (vibration isolation) on the image surface I is performed with the fourth lens group G4 serving as the vibration-proof lens group VR moved with a displacement component in the direction orthogonal to the optical axis. In Example 17, in the wide angle end state, the shifted amount of the vibration-proof lens group VR is −0.350 mm when the correction angle is 0.664°. In the intermediate focal length state, the shifted amount of the vibration-proof lens group VR is −0.355 mm when the correction angle is 0.469°. In the telephoto end state, the shifted amount of the vibration-proof lens group VR is −0.386 mm when the correction angle is 0.363°.

In Table 17 below, specification values in Example 17 are listed. Surface numbers 1 to 33 in Table 17 respectively correspond to the optical surfaces m1 to m33 in FIG. 84.

TABLE 17

[Lens specifications]

| Surface number | R | D | νd | nd |
|---|---|---|---|---|
| Obj surface | ∞ | | | |
| 1 | ∞ | 2.00 | 22.74 | 1.80809 |
| 2 | 164.5846 | 4.60 | 67.90 | 1.59319 |
| 3 | −389.8904 | 0.10 | | |
| 4 | 55.4599 | 5.31 | 54.61 | 1.72916 |
| 5 | 150.4285 | D5 (variable) | | |
| 6 | 54.6982 | 1.35 | 35.72 | 1.90265 |
| 7 | 16.8605 | 8.51 | | |
| *8 | −37.7660 | 1.00 | 51.16 | 1.75501 |
| 9 | 51.1682 | 0.10 | | |
| 10 | 36.5172 | 4.82 | 22.74 | 1.80809 |
| 11 | −49.3429 | 2.60 | | |
| 12 | −23.0376 | 1.20 | 58.12 | 1.62299 |
| 13 | −60.9926 | D13 (variable) | | |

TABLE 17-continued

| | | | | |
|---|---|---|---|---|
| *14 | 46.7844 | 2.29 | 51.16 | 1.75501 |
| *15 | 5406.1506 | 1.00 | | |
| 16 | ∞ | 4.27 | (aperture stop) | |
| 17 | 36.7260 | 5.45 | 82.57 | 1.49782 |
| 18 | −36.4581 | 0.20 | | |
| 19 | 63.6179 | 1.01 | 37.18 | 1.83400 |
| 20 | 23.0943 | D20 | | |
| *21 | 28.3732 | 6.76 | 67.02 | 1.59201 |
| 22 | −21.5653 | 1.00 | 23.80 | 1.84666 |
| 23 | −41.8197 | D23 (variable) | | |
| 24 | −803.2372 | 4.05 | 22.74 | 1.80809 |
| 25 | −23.2794 | 1.00 | 35.25 | 1.74950 |
| 26 | 31.2651 | D26 (variable) | | |
| 27 | 41.1138 | 8.00 | 81.56 | 1.49710 |
| 28 | −24.2908 | 2.40 | | |
| 29 | −25.4480 | 1.91 | 22.74 | 1.80809 |
| 30 | −22.3045 | 1.35 | 52.33 | 1.75500 |
| 31 | −52.8943 | 3.61 | | |
| 32 | −19.4109 | 1.30 | 54.61 | 1.72916 |
| 33 | −36.3707 | D33 (variable) | | |
| Img surface | ∞ | | | |

[Aspherical data]

| Surface number | κ | A4 | A6 | A8 | A10 |
|---|---|---|---|---|---|
| 8th surface | 0.00 | 3.61252E−06 | 1.12702E−08 | −7.62519E−11 | 5.02576E−13 |
| 14th surface | 0.00 | 1.31110E−05 | 2.61938E−08 | 2.79550E−10 | 0.00000E+00 |
| 15th surface | 0.00 | 2.79617E−05 | 3.21704E−08 | 3.63604E−10 | −1.50000E−13 |
| 21st surface | 0.00 | −1.16278E−06 | −6.94619E−10 | −3.31502E−11 | 0.00000E+00 |

[Various data]
Zoom ratio 3.34

| | Wide angle end | | Intermediate | | Telephoto end |
|---|---|---|---|---|---|
| f | 24.7 | ~ | 49.5 | ~ | 82.4 |
| FNO | 2.9 | ~ | 3.6 | ~ | 4.1 |
| 2ω | 82.4 | ~ | 47.2 | ~ | 28.8 |
| Y | 19.1 | ~ | 21.6 | ~ | 21.6 |
| TL (air) | 127.9 | ~ | 142.1 | ~ | 166.0 |
| BF (air) | 14.9 | ~ | 29.3 | ~ | 37.6 |

[Variable distance data]

| | Upon focusing on infinity | | | Upon focusing on short distant object | | |
|---|---|---|---|---|---|---|
| | Wide angle end | Intermediate | Telephoto end | Wide angle end | Intermediate | Telephoto end |
| f | 24.7 | 49.5 | 82.4 | 24.7 | 49.5 | 82.4 |
| D5 | 1.10 | 14.23 | 34.24 | | | |
| D13 | 18.86 | 5.52 | 1.10 | | | |
| D20 | 7.01 | 7.01 | 7.01 | 6.36 | 5.03 | 2.15 |
| D23 | 2.50 | 5.70 | 6.08 | 3.15 | 7.68 | 10.94 |
| D26 | 6.33 | 3.13 | 2.75 | | | |
| D33 | 14.92 | 29.34 | 37.63 | | | |

[Lens group data]

| | Group starting surface | Group focal length |
|---|---|---|
| First lens group | 1 | 114.25 |
| Second lens group | 6 | −18.62 |
| Third lens group | 14 | 26.30 |
| Fourth lens group | 24 | −44.47 |
| Fifth lens group | 27 | 221.10 |

TABLE 17-continued

| [Conditional expression corresponding value] | |
|---|---|
| Conditional expression (JK1) | \|fF\|/fM = 1.337 |
| Conditional expression (JK2) | (−fXn)/fM = 0.708 |
| Conditional expression (JK3) | dAB/\|fF\| = 0.199 |
| Conditional expression (JK4) | ndp + 0.0075 × νdp − 2.175 = −0.080 |
| Conditional expression (JK5) | νdp = 67.02 |
| Conditional expression (JL1) | \|(rB + rA)/(rB − rA)\| = 9.750 |
| Conditional expression (JL2) | \|fF\|/fM = 1.337 |
| Conditional expression (JL3) | dAB/\|fF\| = 0.199 |
| Conditional expression (JL4) | (−fXn)/fM = 0.708 |
| Conditional expression (JL5) | ndp + 0.0075 × νdp − 2.175 = −0.080 |
| Conditional expression (JL6) | νdp = 67.02 |
| Conditional expression (JM1) | dV/\|fV\| = 0.062 |
| Conditional expression (JM2) | \|fF\|/fM = 1.337 |
| Conditional expression (JM3) | dAB/\|fF\| = 0.199 |
| Conditional expression (JM4) | (−fXn)/fM = 0.708 |
| Conditional expression (JM5) | ndp + 0.0075 × νdp − 2.175 = −0.080 |
| Conditional expression (JM6) | νdp = 67.02 |
| Conditional expression (JN1) | \|fF\|/fM = 1.337 |
| Conditional expression (JN2) | dV/\|fV\| = 0.062 |
| Conditional expression (JN3) | dAB/\|fF\| = 0.199 |
| Conditional expression (JN4) | (−fXn)/fM = 0.708 |
| Conditional expression (JN5) | ndp + 0.0075 × νdp − 2.175 = −0.080 |
| Conditional expression (JN6) | νdp = 67.02 |

It can be seen in Table 17 that the zoom optical system ZL17 according to this Example satisfies the conditional expressions (JK1) to (JK5), (JL1) to (JL6), (JM1) to (JM6), and (JN1) to (JN6).

Figure 85A:
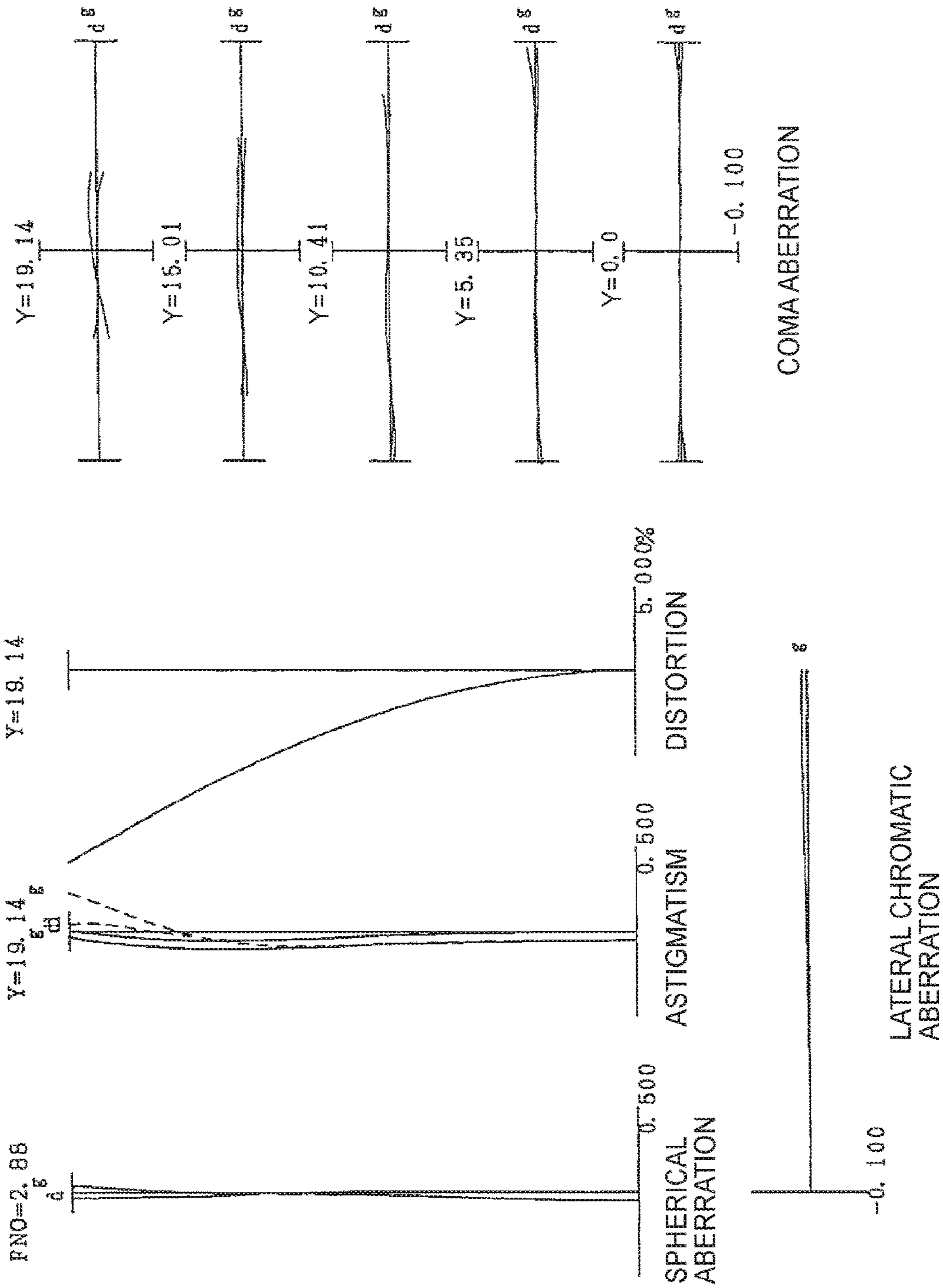
FIGS. 85A, 85B, and 85C are graphs showing various aberrations of the zoom optical system according to Example 17 upon focusing on infinity respectively in the wide angle end state, the intermediate focal length state, and the telephoto end state.
Figure 85B:
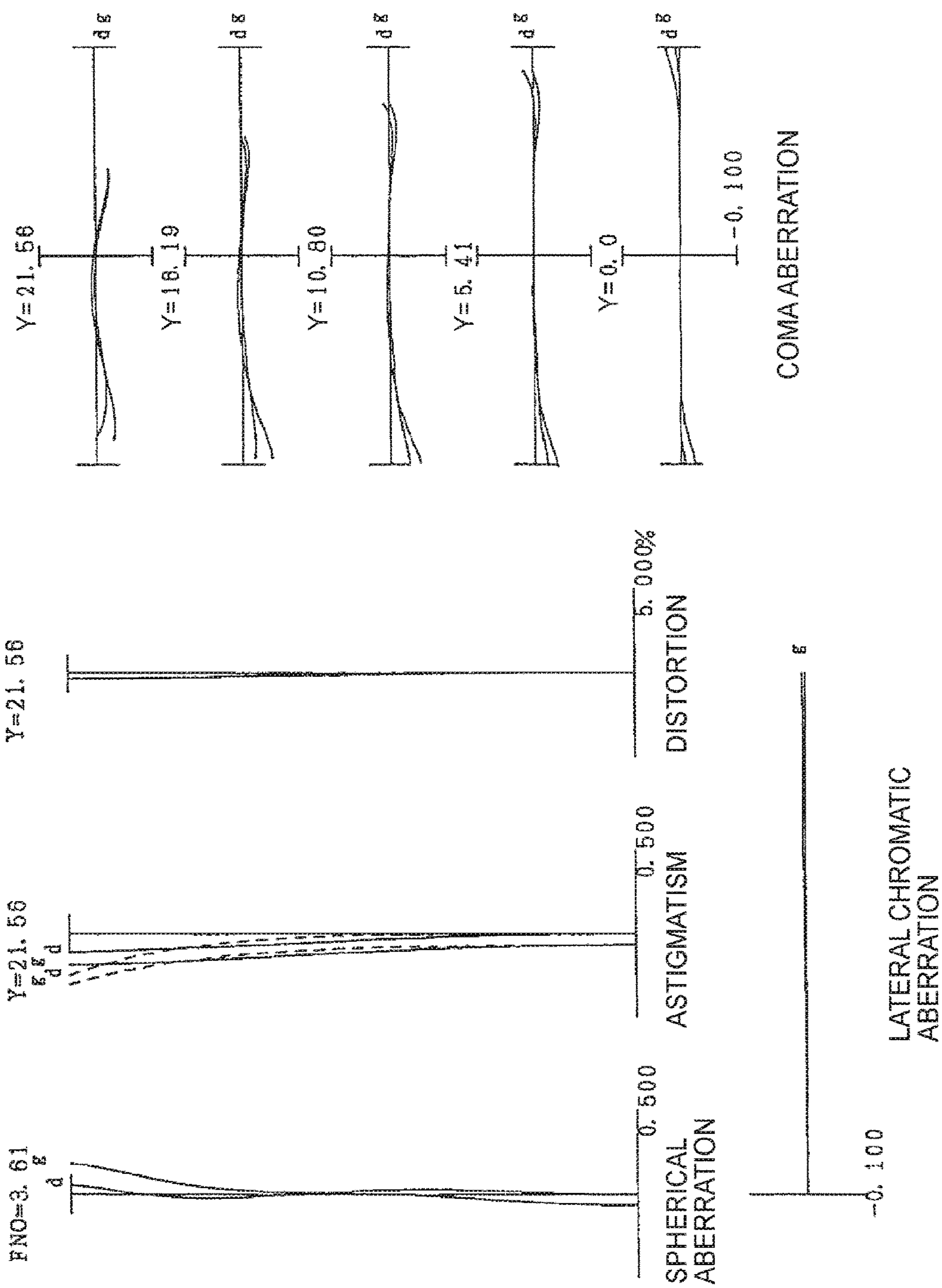
Figure 85C:
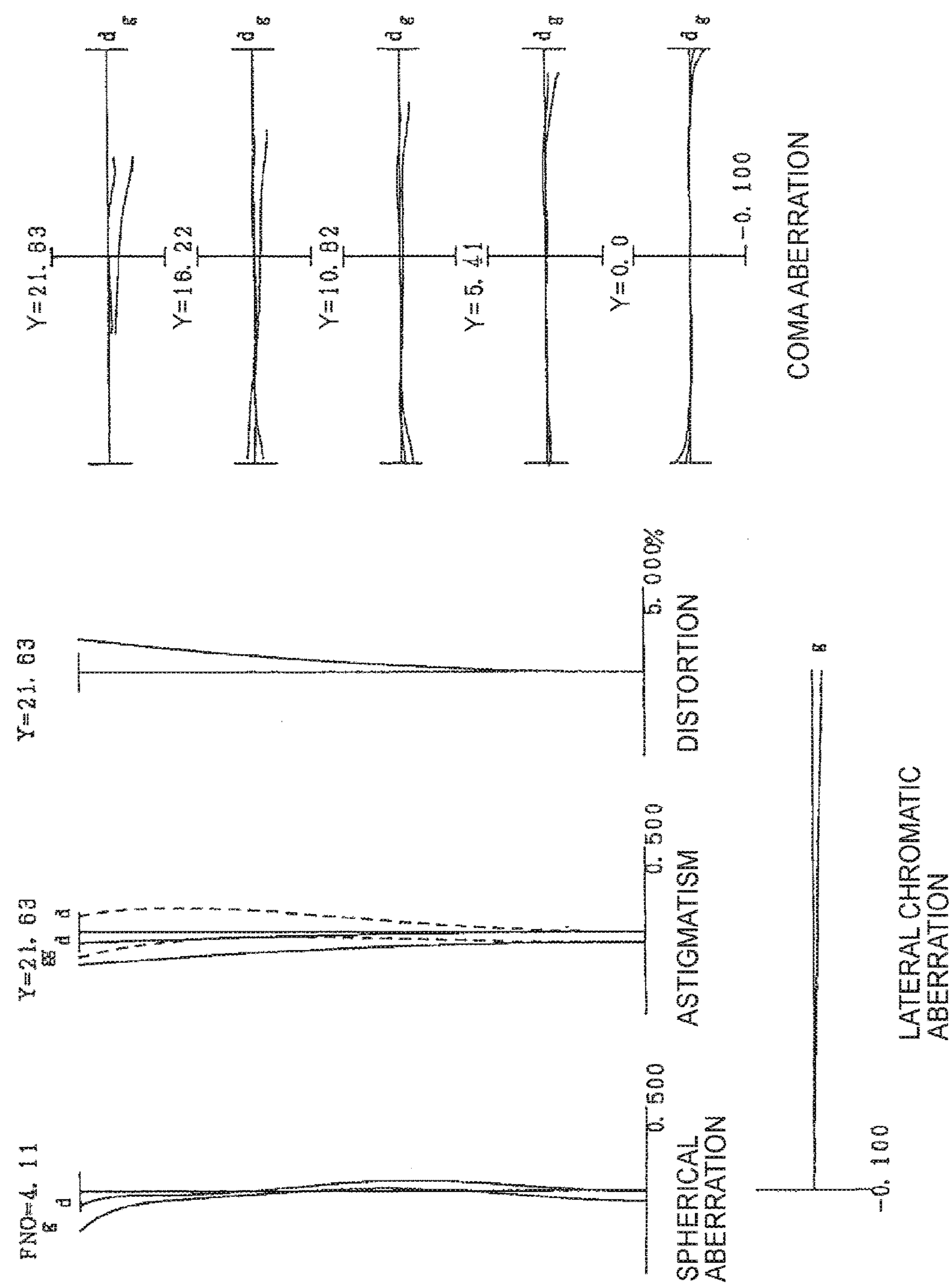
Figure 86A:
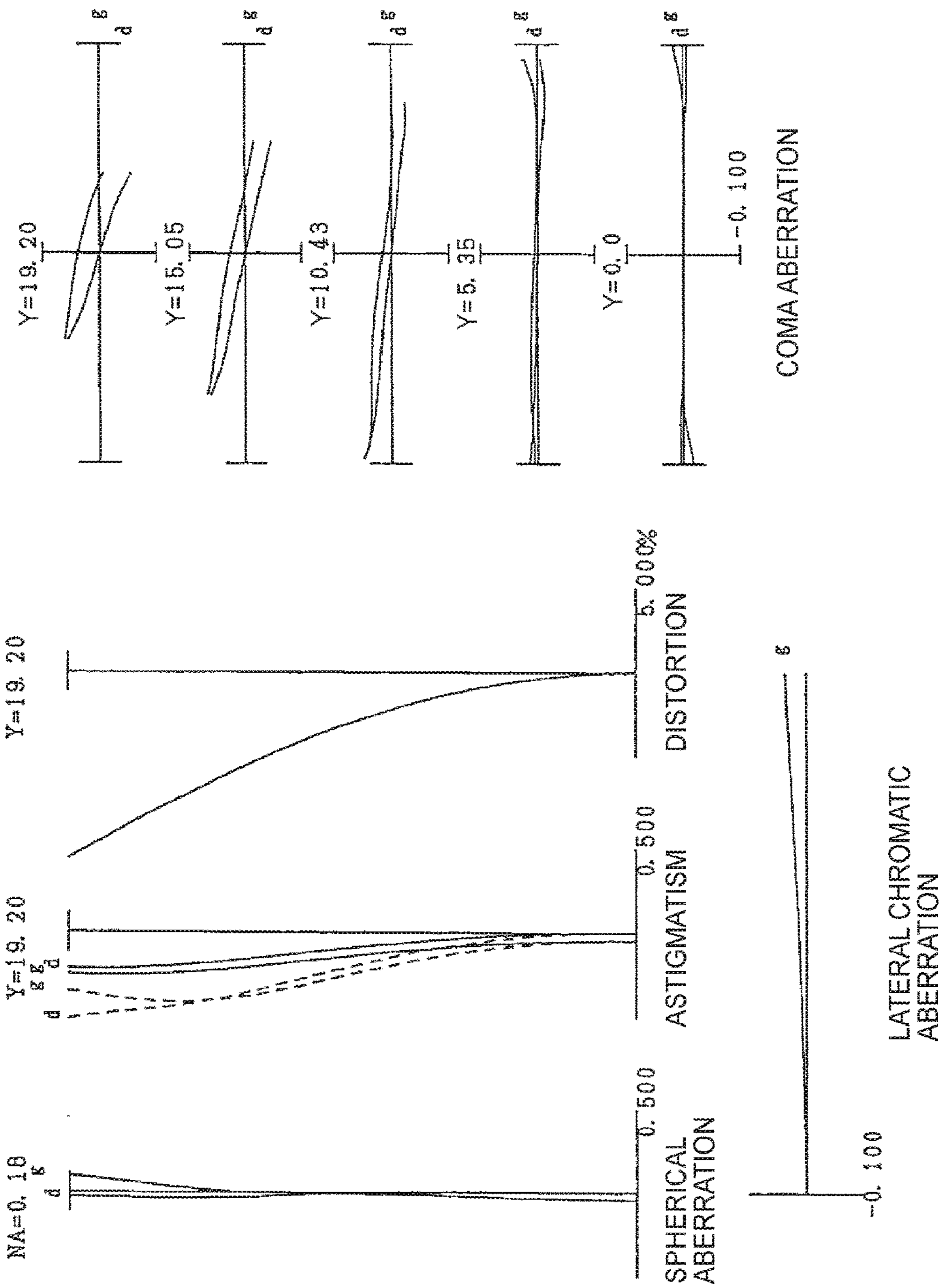
FIGS. 86A, 86B, and 86C are graphs showing various aberrations of the zoom optical system according to Example 17 upon focusing on a short distant object respectively in the wide angle end state, the intermediate focal length state, and the telephoto end state.
Figure 86B:
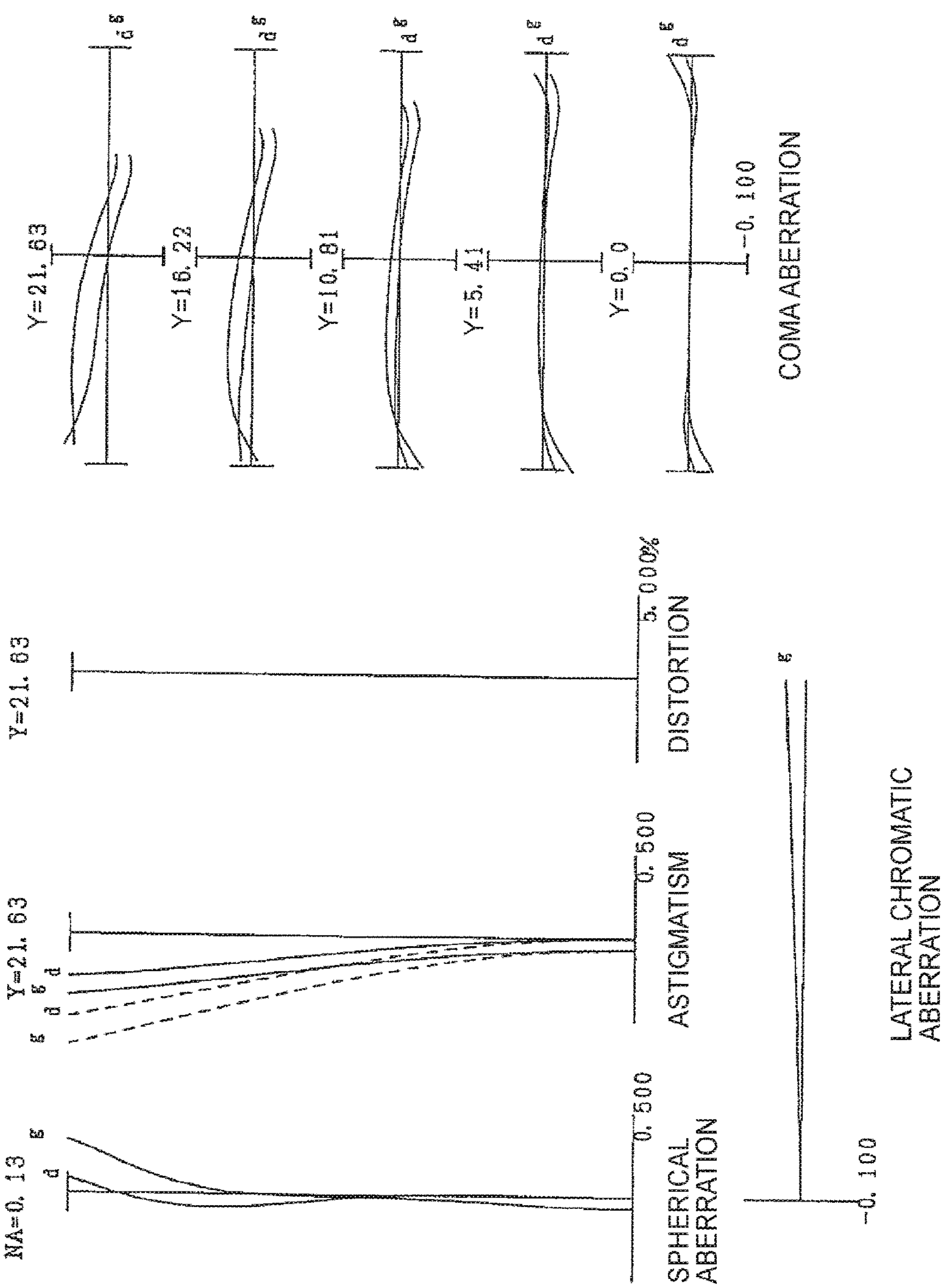
Figure 86C:
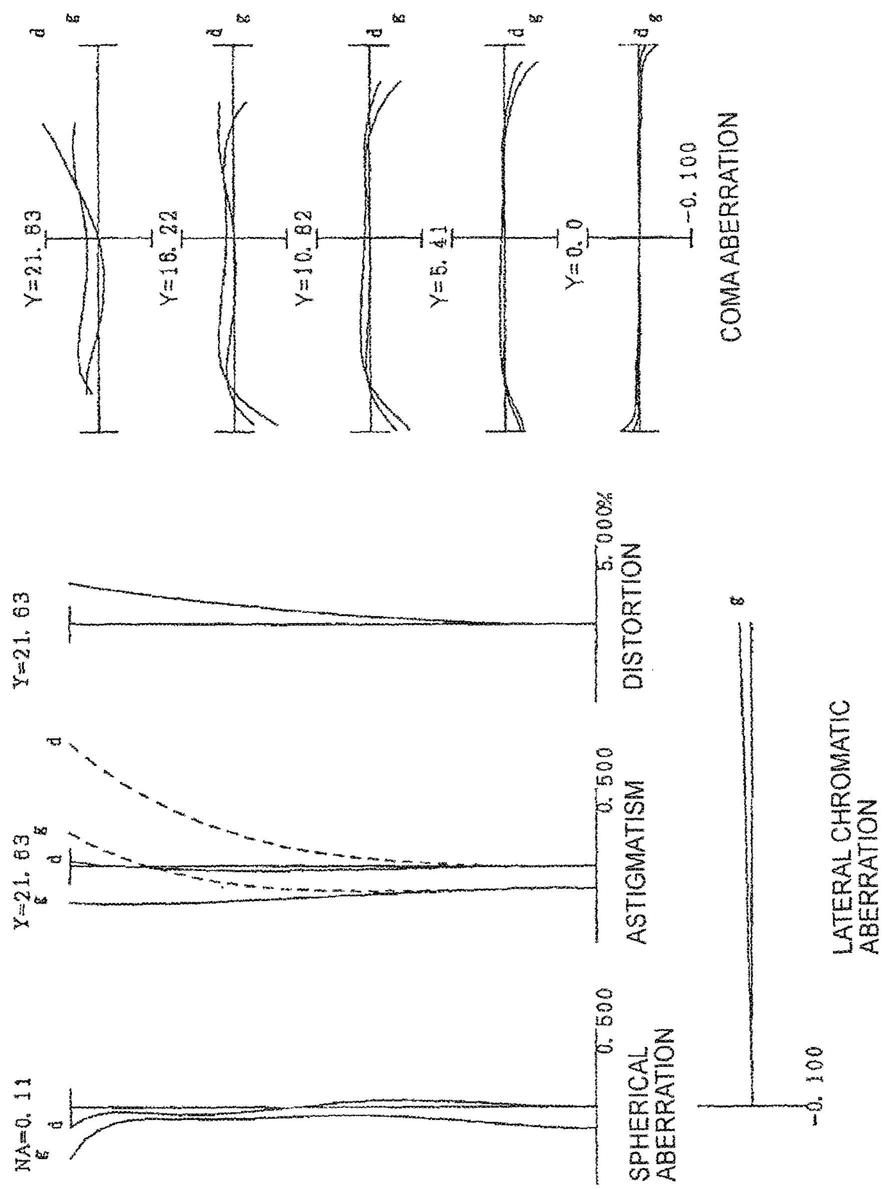
Figure 87A:
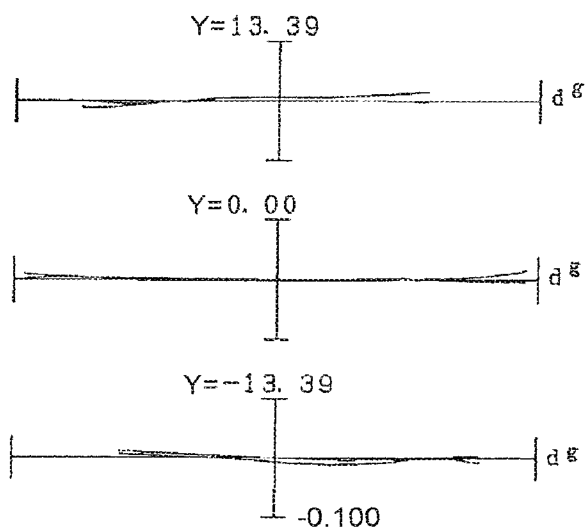
FIGS. 87A, 87B, and 87C are graphs showing coma aberrations of the zoom optical system according to Example 17 upon focusing on infinity with image blur correction performed, respectively in the wide angle end state, the intermediate focal length state, and the telephoto end state.
Figure 87B:
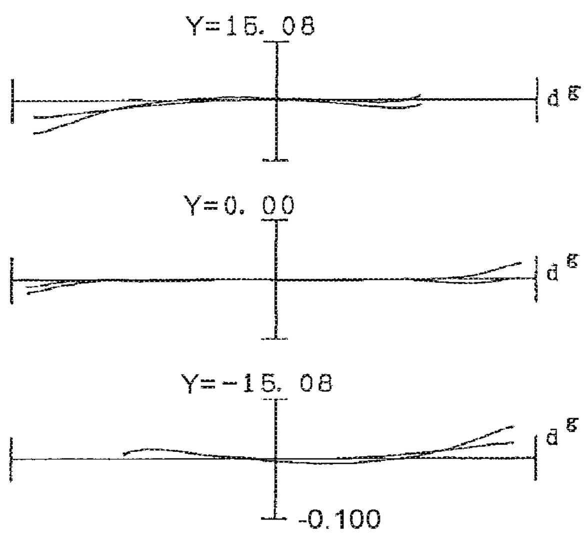
Figure 87C:
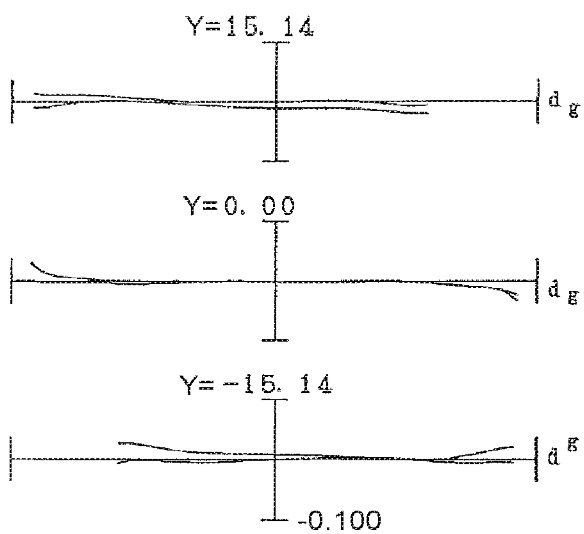

FIG. 85 is various aberration graphs (a spherical aberration graph, an astigmatism graph, a distortion graph, a lateral chromatic aberration graph, and a coma aberration graph) of the zoom optical system ZL17 according to Example 17 upon focusing on infinity with FIG. 85A corresponding to the wide angle end state, FIG. 85B corresponding to the intermediate focal length state, and FIG. 85C corresponding to the telephoto end state. FIG. 86 is various aberration graphs (a spherical aberration graph, an astigmatism graph, a distortion graph, a lateral chromatic aberration graph, and a coma aberration graph) of the zoom optical system ZL17 according to Example 17 upon focusing on a short distant object with FIG. 86A corresponding to the wide angle end state, FIG. 86B corresponding to the intermediate focal length state, and FIG. 86C corresponding to the telephoto end state. FIG. 87 is a coma aberration graph at the time of image blur correction for the zoom optical system ZL17 according to Example 17 upon focusing on infinity with FIG. 87A corresponding to the wide angle end state, FIG. 87B corresponding to the intermediate focal length state, and FIG. 87C corresponding to the telephoto end state.

It can be seen in the aberration graphs in FIG. 85 to FIG. 87 that the zoom optical system ZL17 according to Example 17 can achieve an excellent optical performance with various aberrations successfully corrected from the wide angle end state to the telephoto end state and from the infinity focusing state to the short-distant object focusing state. Furthermore, it can be seen that a high imaging performance can be achieved upon image blur correction.

Example 18

Figure 88:
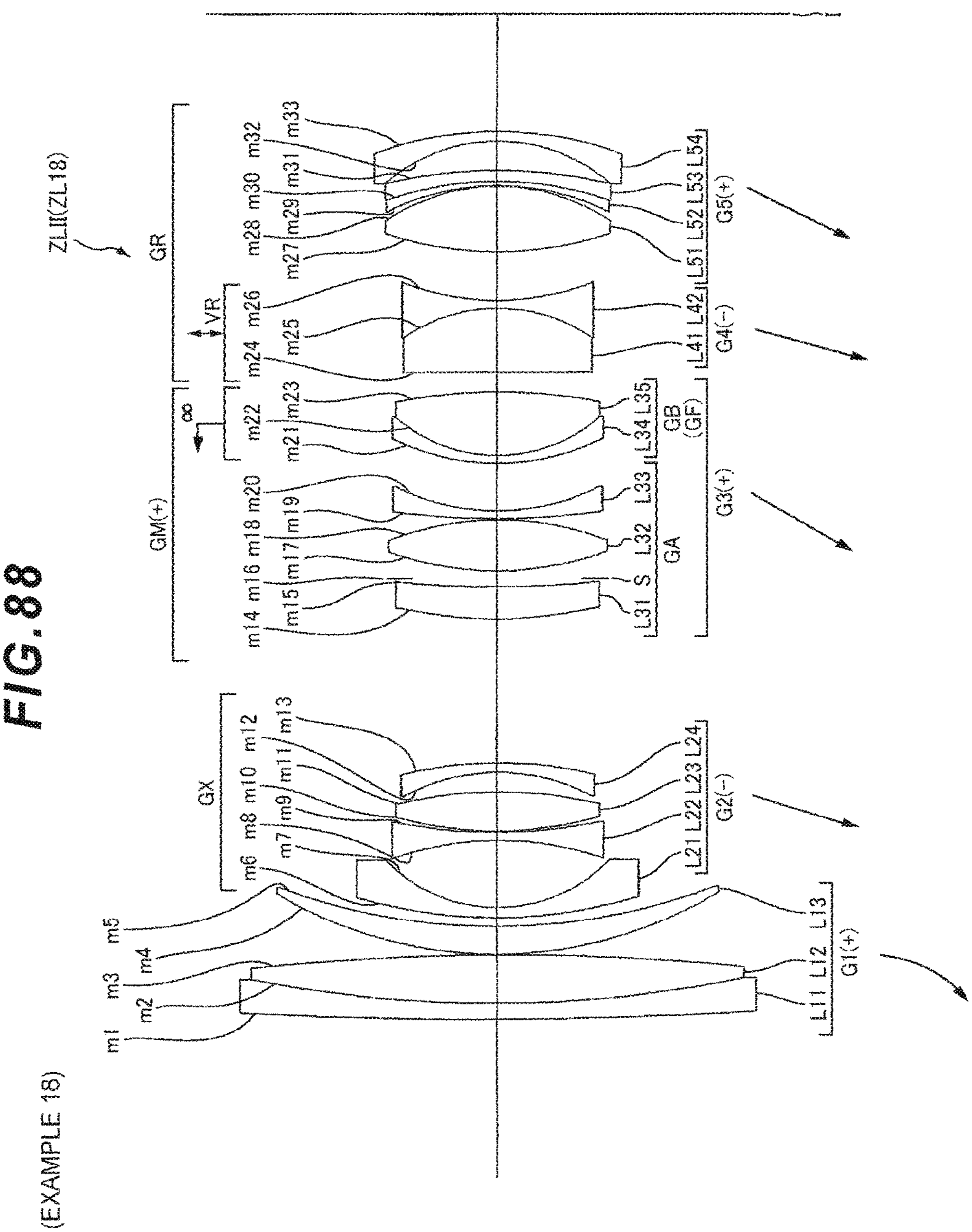
FIG. 88 is a cross-sectional view of a zoom optical system according to Example 18.

Example 18 is described with reference to FIG. 88 to FIG. 91 and Table 18. A zoom optical system ZLII (ZL18) according to Example 18 includes, as illustrated in FIG. 88, the first lens group G1 having positive refractive power, the second lens group G2 having negative refractive power, the third lens group G3 having positive refractive power, the fourth lens group G4 having negative refractive power, and the fifth lens group G5 having positive refractive power that are arranged in order from the object side.

The first lens group G1 includes: the cemented lens including the negative meniscus lens L11 having a concave surface facing the image side and the biconvex lens L12; and the positive meniscus lens L13 having a convex surface facing the object side that are arranged in order from the object side.

The second lens group G2 includes the negative meniscus lens L21 having a concave surface facing the image side, the biconcave lens L22, the biconvex lens L23, and the negative meniscus lens L24 having a concave surface facing the object side that are arranged in order from an object side. The biconcave lens L22 is a glass-molded aspherical lens with a lens surface, on the object side, having an aspherical shape.

The third lens group G3 includes the object side group GA and the image side group GB having positive refractive power that are arranged in order from the object side. The object side group GA includes the positive meniscus lens L31 having a convex surface facing the object side, the aperture stop S, the biconvex lens L32, and the negative meniscus lens L33 having a concave surface facing the image side that are arranged in order from the object side. The image side group GB includes the cemented lens including the negative meniscus lens L34 having a concave surface facing the image side, and the biconvex lens L35 arranged in order from the object side. The positive meniscus lens L31 is a glass-molded aspherical lens with lens surfaces, on the object side and on the image surface side, having an aspherical shape. The negative meniscus lens L34 is a glass-molded aspherical lens with a lens surface, on the object side, having an aspherical shape.

The fourth lens group G4 includes a cemented lens including the biconvex lens L41 and the biconcave lens L42 arranged in order from the object side.

The fifth lens group G5 includes: the biconvex lens L51; the cemented lens including the positive meniscus lens L52 having a convex surface facing the image side and the negative meniscus lens L53 having a concave surface facing the object side; and the negative meniscus lens L54 having a concave surface facing the object side that are arranged in order from the object side.

The zooming from the wide angle end state to the telephoto end state is achieved with: the first lens group G1, the second lens group G2, the third lens group G3, the fourth lens group G4, and the fifth lens group G5 each moved toward the object side in such a manner that the distance between the first lens group G1 and the second lens group G2 increases, the distance between the second lens group G2 and the third lens group G3 decreases, the distance between the third lens group G3 and the fourth lens group G4 increases, and the distance between the fourth lens group G4 and the fifth lens group G5 decreases.

Focusing from infinity to the short-distant object is achieved with the image side group GB (=focusing lens group GF) forming the third lens group G3 moved toward the object side.

When image blur occurs, image blur correction (vibration isolation) on the image surface I is performed with the fourth lens group G4 serving as the vibration-proof lens group VR moved with a displacement component in the direction orthogonal to the optical axis. In Example 18, in the wide angle end state, the shifted amount of the vibration-proof lens group VR is −0.380 mm when the correction angle is 0.664. In the intermediate focal length state, the shifted amount of the vibration-proof lens group VR is −0.373 mm when the correction angle is 0.469°. In the telephoto end state, the shifted amount of the vibration-proof lens group VR is −0.379 mm when the correction angle is 0.363°.

In Table 18 below, specification values in Example 18 are listed. Surface numbers 1 to 33 in Table 18 respectively correspond to the optical surfaces m1 to m33 in FIG. 88.

TABLE 18

[Lens specifications]

| Surface number | R | D | νd | nd |
|---|---|---|---|---|
| Obj surface | ∞ | | | |
| 1 | 477.6359 | 2.00 | 22.74 | 1.80809 |
| 2 | 130.7220 | 6.15 | 67.90 | 1.59319 |
| 3 | −262.1234 | 0.10 | | |
| 4 | 45.8222 | 3.53 | 54.61 | 1.72916 |
| 5 | 65.7498 | D5 (variable) | | |
| 6 | 50.7306 | 1.35 | 35.72 | 1.90265 |
| 7 | 17.0914 | 8.44 | | |
| *8 | −32.4922 | 1.00 | 51.16 | 1.75501 |
| 9 | 52.3984 | 0.17 | | |
| 10 | 39.5501 | 5.00 | 22.74 | 1.80809 |
| 11 | −45.2417 | 2.46 | | |
| 12 | −21.0150 | 1.20 | 58.12 | 1.62299 |
| 13 | −44.1009 | D13 (variable) | | |
| *14 | 42.6978 | 4.05 | 51.16 | 1.75501 |
| *15 | 146.0908 | 1.00 | | |
| 16 | ∞ | 1.00 | (aperture stop) | |
| 17 | 33.8176 | 6.49 | 82.57 | 1.49782 |
| 18 | −31.9561 | 0.10 | | |
| 19 | 77.2065 | 1.00 | 37.18 | 1.83400 |
| 20 | 24.0818 | D20 (variable) | | |
| *21 | 24.6808 | 1.00 | 24.06 | 1.82115 |
| 22 | 16.8495 | 8.03 | 67.90 | 1.59319 |
| 23 | −56.7300 | D23 (variable) | | |
| 24 | 2528.2943 | 8.17 | 22.74 | 1.80809 |
| 25 | −17.9755 | 1.00 | 35.25 | 1.74950 |
| 26 | 28.0350 | D26 (variable) | | |
| 27 | 37.6901 | 8.33 | 81.56 | 1.49710 |
| 28 | −21.5347 | 0.10 | | |
| 29 | −26.4036 | 0.51 | 22.74 | 1.80809 |
| 30 | −36.3850 | 1.35 | 52.33 | 1.75500 |
| 31 | −53.3386 | 3.71 | | |
| 32 | −18.6338 | 1.30 | 54.61 | 1.72916 |
| 33 | −37.2073 | D33 (variable) | | |
| Img surface | ∞ | | | |

[Aspherical data]

| Surface number | κ | A4 | A6 | A8 | A10 |
|---|---|---|---|---|---|
| 8th surface | 0.00 | 5.54472E−06 | 1.39612E−08 | −1.09701E−10 | 7.98071E−13 |
| 14th surface | 0.00 | −1.56610E−07 | −6.56482E−08 | −8.11234E−11 | 0.00000E+00 |
| 15th surface | 0.00 | 1.77641E−05 | −6.07679E−08 | −3.87866E−11 | 1.00000E−17 |
| 21st surface | 0.00 | −2.60317E−06 | −8.10030E−10 | −3.36331E−11 | 0.00000E+00 |

TABLE 18-continued

[Various data]
Zoom ratio 3.34

| | Wide angle end | | Intermediate | | Telephoto end |
|---|---|---|---|---|---|
| f | 24.7 | ~ | 49.5 | ~ | 82.5 |
| FNO | 2.9 | ~ | 3.9 | ~ | 4.1 |
| 2ω | 82.4 | ~ | 47.2 | ~ | 28.8 |
| Y | 19.1 | ~ | 21.6 | ~ | 21.6 |
| TL (air) | 127.5 | ~ | 144.9 | ~ | 171.9 |
| BF (air) | 14.9 | ~ | 30.1 | ~ | 41.9 |

[Variable distance data]

| | Upon focusing on infinity | | | Upon focusing on short distant object | | |
|---|---|---|---|---|---|---|
| | Wide angle end | Intermediate | Telephoto end | Wide angle end | Intermediate | Telephoto end |
| f | 24.7 | 49.5 | 82.5 | 24.7 | 49.5 | 82.5 |
| D5 | 1.10 | 16.11 | 35.76 | | | |
| D13 | 18.31 | 5.55 | 1.10 | | | |
| D20 | 6.00 | 6.00 | 6.00 | 5.35 | 3.94 | 0.92 |
| D23 | 2.50 | 5.48 | 5.88 | 3.15 | 7.54 | 10.97 |
| D26 | 6.14 | 3.16 | 2.76 | | | |
| D33 | 14.92 | 30.05 | 41.88 | | | |

[Lens group data]

| | Group starting surface | Group focal length |
|---|---|---|
| First lens group | 1 | 132.75 |
| Second lens group | 6 | −18.98 |
| Third lens group | 14 | 25.60 |
| Fourth lens group | 24 | −43.35 |
| Fifth lens group | 27 | 226.32 |

[Conditional expression corresponding value]

| | |
|---|---|
| Conditional expression (JK1) | $\|fF\|/fM = 1.338$ |
| Conditional expression (JK2) | $(-fXn)/fM = 0.741$ |
| Conditional expression (JK3) | $dAB/\|fF\| = 0.175$ |
| Conditional expression (JK4) | $ndp + 0.0075 \times \nu dp - 2.175 = -0.073$ |
| Conditional expression (JK5) | $\nu dp = 67.90$ |
| Conditional expression (JL1) | $\|(rB + rA)/(rB - rA)\| = 81.411$ |
| Conditional expression (JL2) | $\|fF\|/fM = 1.338$ |
| Conditional expression (JL3) | $dAB/\|fF\| = 0.175$ |
| Conditional expression (JL4) | $(-fXn)/fM = 0.741$ |
| Conditional expression (JL5) | $ndp + 0.0075 \times \nu dp - 2.175 = -0.073$ |
| Conditional expression (JL6) | $\nu dp = 67.90$ |
| Conditional expression (JM1) | $dV/\|fV\| = 0.064$ |
| Conditional expression (JM2) | $\|fF\|/fM = 1.338$ |
| Conditional expression (JM3) | $dAB/\|fF\| = 0.175$ |
| Conditional expression (JM4) | $(-fXn)/fM = 0.741$ |
| Conditional expression (JM5) | $ndp + 0.0075 \times \nu dp - 2.175 = -0.073$ |
| Conditional expression (JM6) | $\nu dp = 67.90$ |
| Conditional expression (JN1) | $\|fF\|/fM = 1.338$ |
| Conditional expression (JN2) | $dV/\|fV\| = 0.064$ |
| Conditional expression (JN3) | $dAB/\|fF\| = 0.175$ |
| Conditional expression (JN4) | $(-fXn)/fM = 0.741$ |
| Conditional expression (JN5) | $ndp + 0.0075 \times \nu dp - 2.175 = -0.073$ |
| Conditional expression (JN6) | $\nu dp = 67.90$ |

It can be seen in Table 18 that the zoom optical system ZL18 according to this Example satisfies the conditional expressions (JK1) to (JK5), (JL1) to (JL6), (JM1) to (JM6), and (JN1) to (JN6).

Figure 89A:
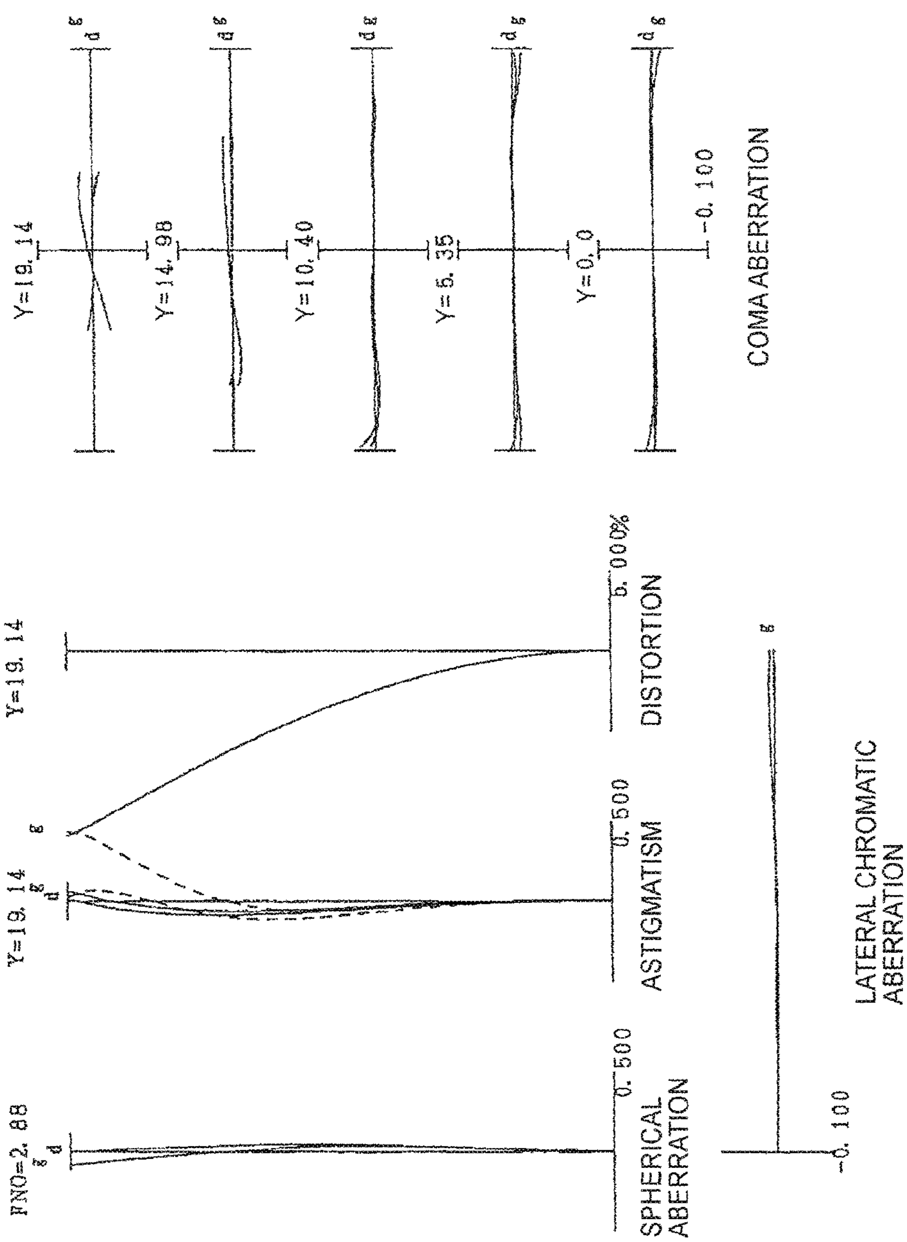
FIGS. 89A, 89B, and 89C are graphs showing various aberrations of the zoom optical system according to Example 18 upon focusing on infinity respectively in the wide angle end state, the intermediate focal length state, and the telephoto end state.
Figure 89B:
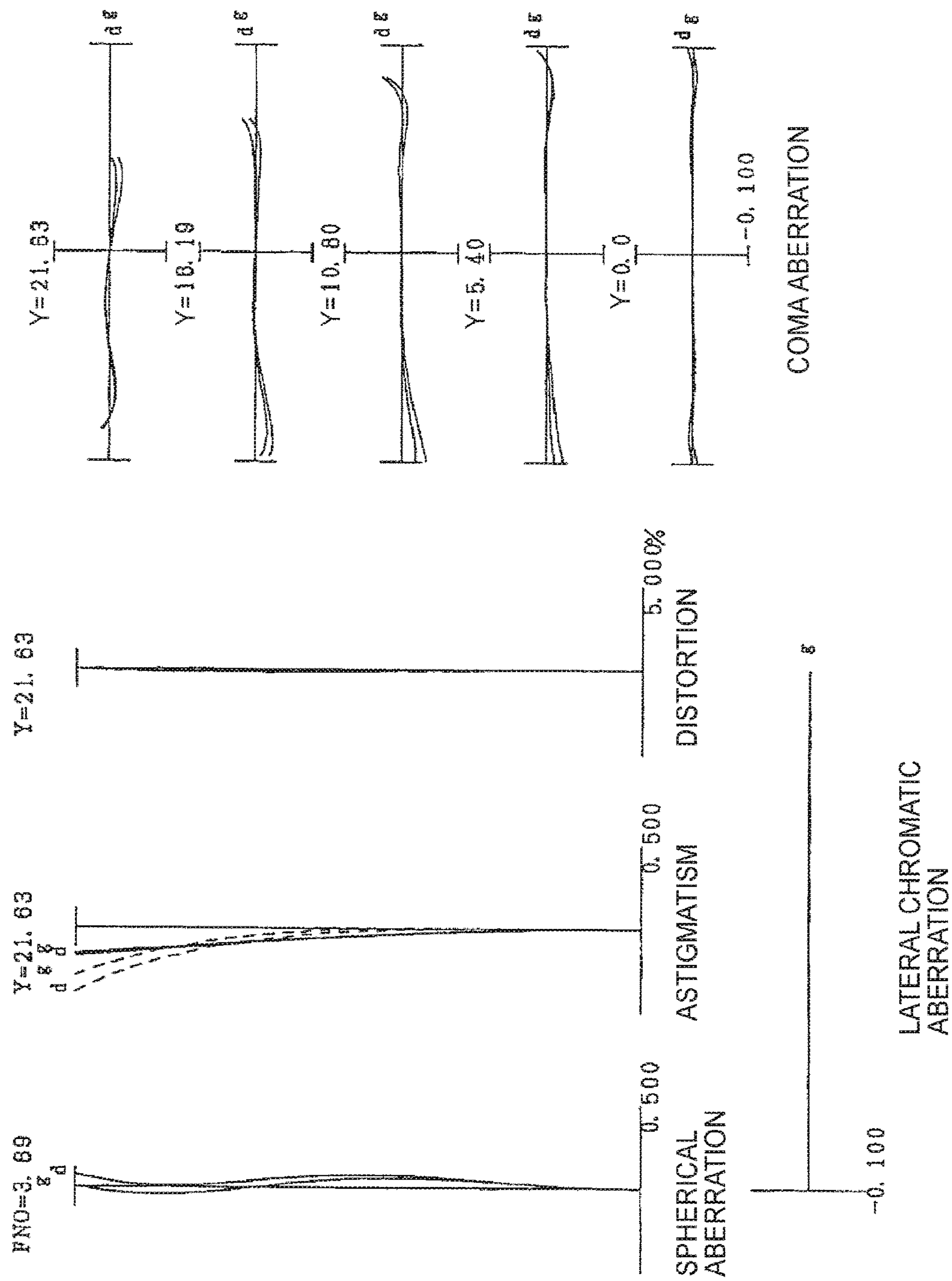
Figure 89C:
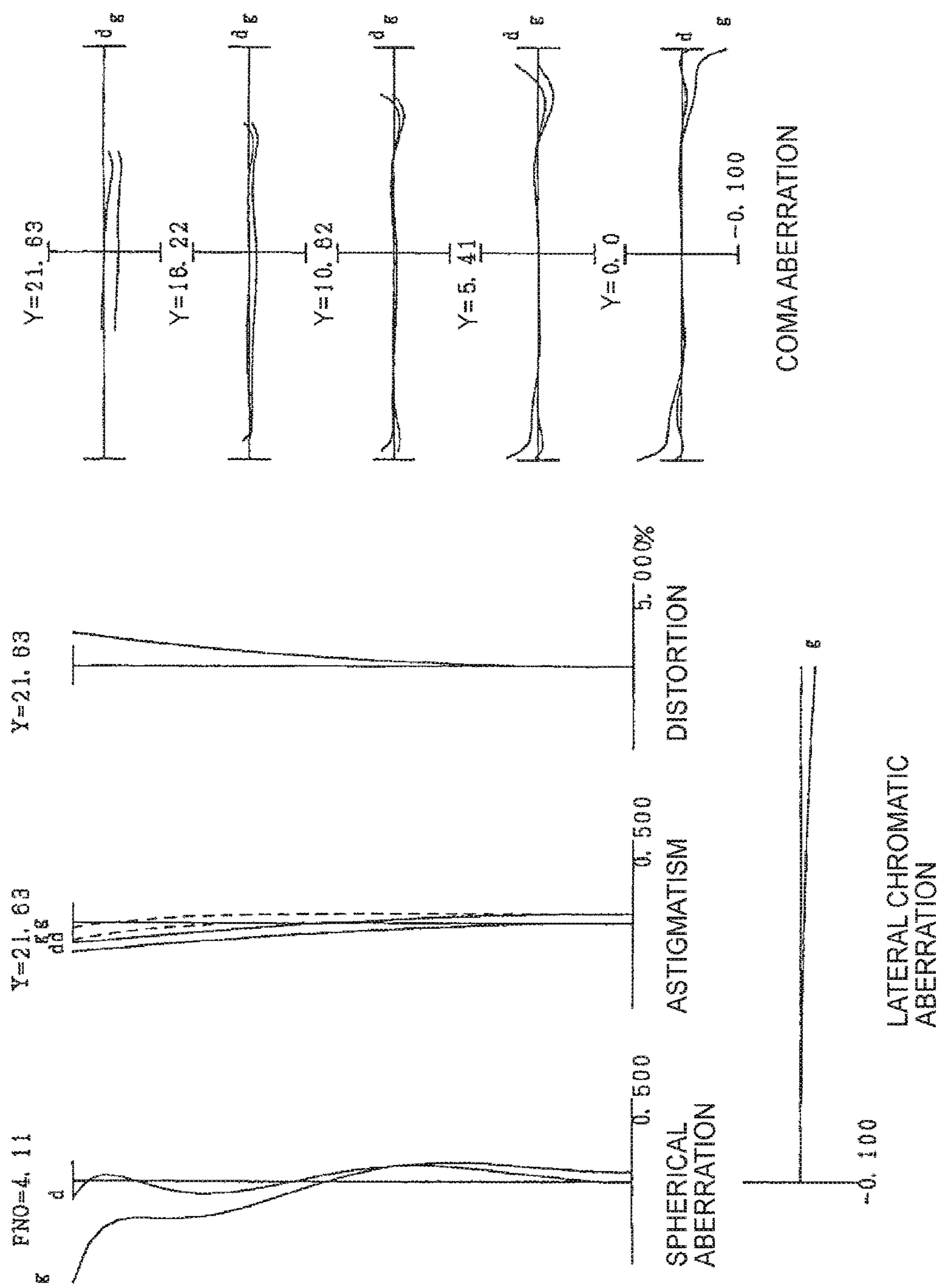
Figure 90A:
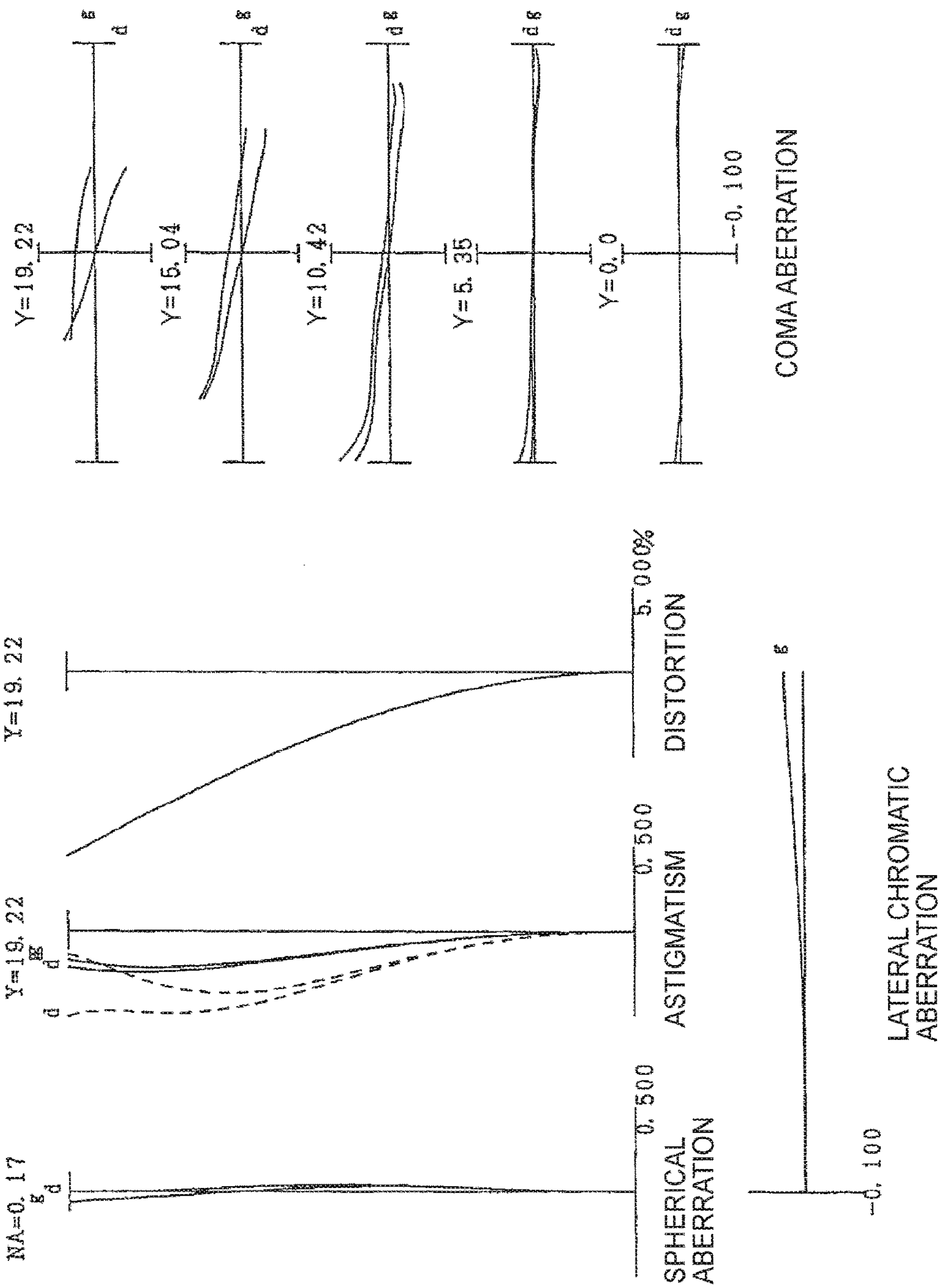
FIGS. 90A, 90B, and 90C are graphs showing various aberrations of the zoom optical system according to Example 18 upon focusing on a short distant object respectively in the wide angle end state, the intermediate focal length state, and the telephoto end state.
Figure 90B:
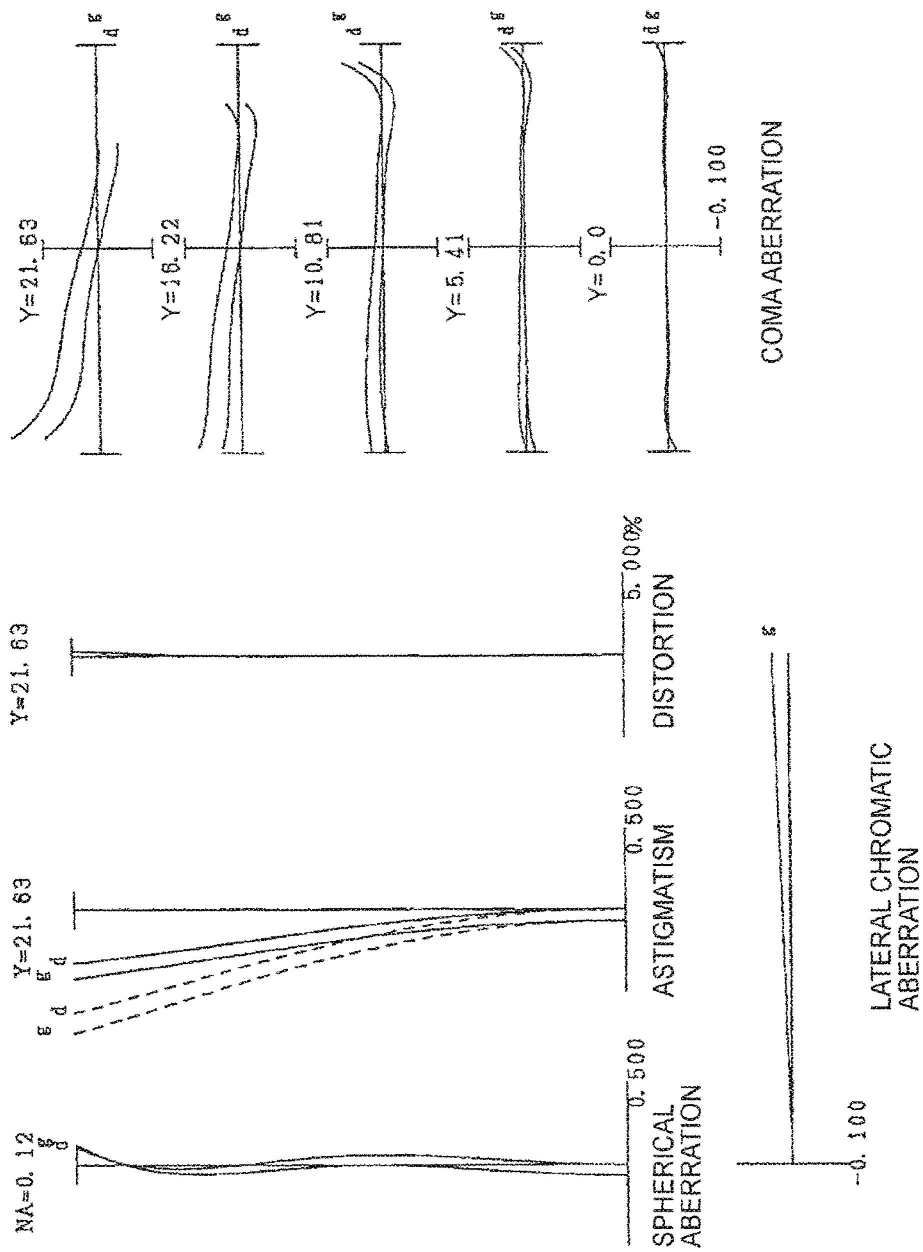
Figure 90C:
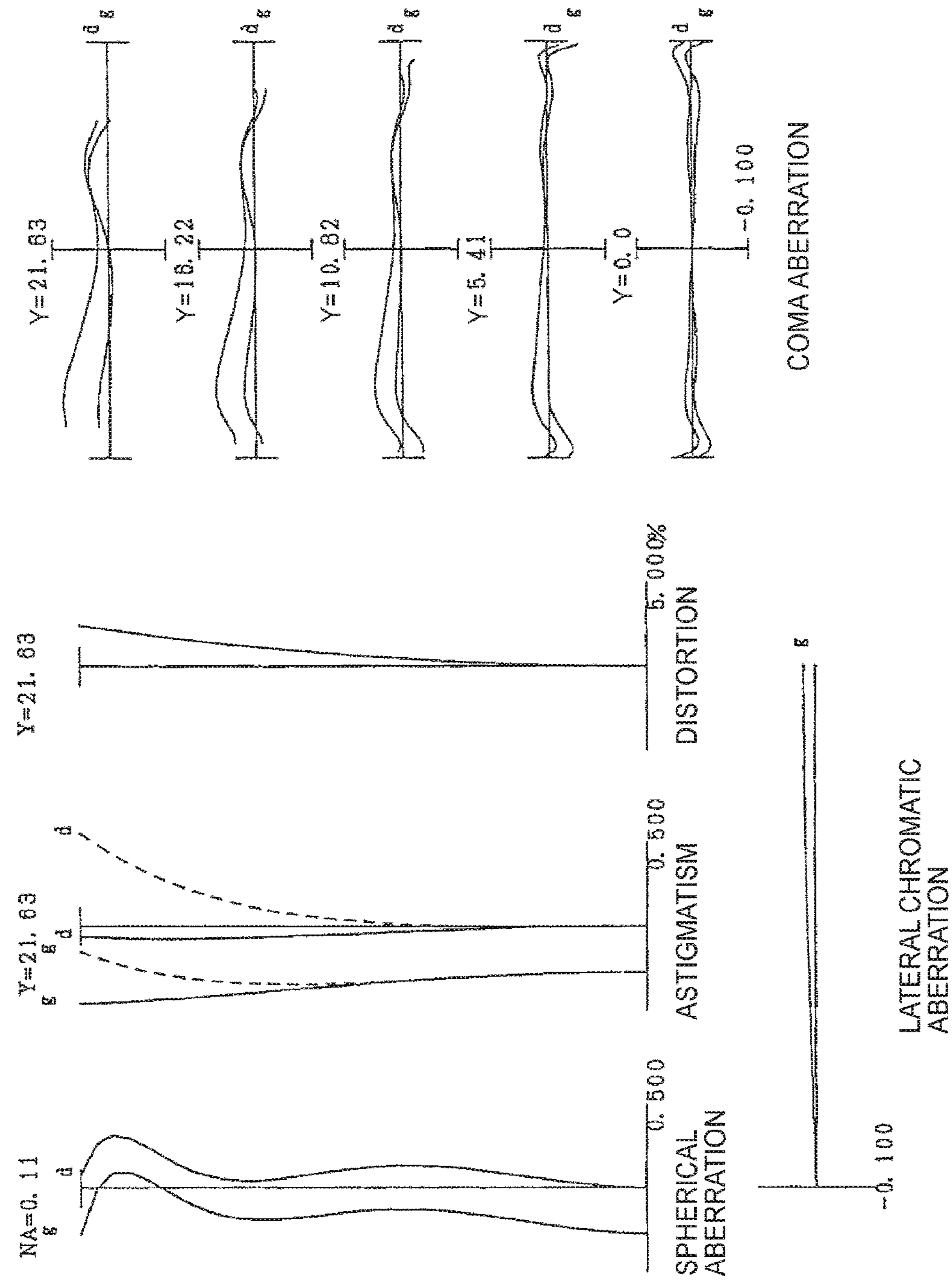
Figure 91A:
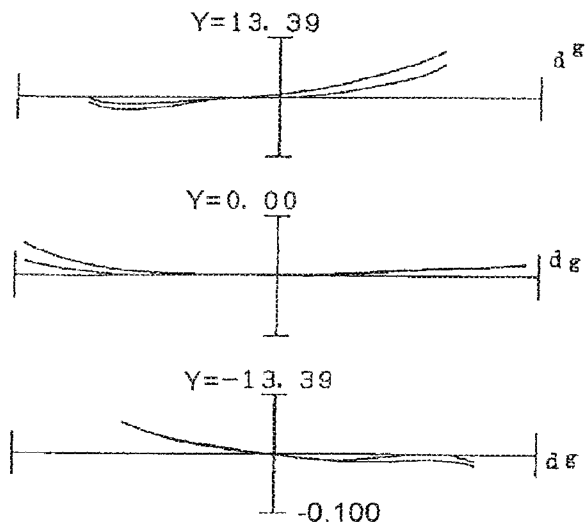
FIGS. 91A, 91B, and 91C are graphs showing coma aberrations of the zoom optical system according to Example 18 upon focusing on infinity with image blur correction performed, respectively in the wide angle end state, the intermediate focal length state, and the telephoto end state.
Figure 91B:
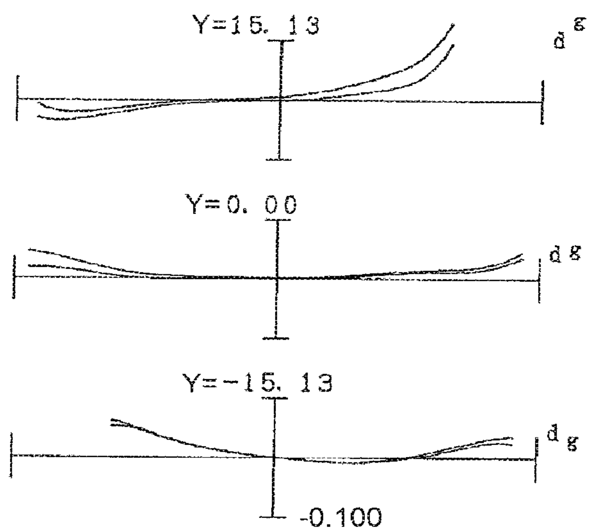
Figure 91C:
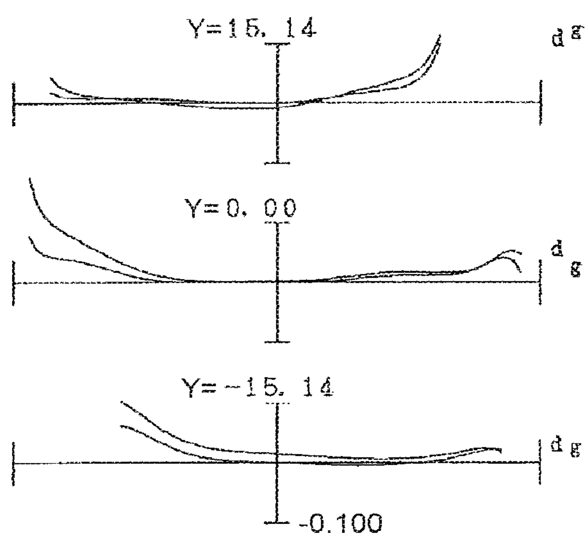

FIG. 89 is various aberration graphs (a spherical aberration graph, an astigmatism graph, a distortion graph, a lateral chromatic aberration graph, and a coma aberration graph) of the zoom optical system ZL18 according to Example 18 upon focusing on infinity with FIG. 89A corresponding to the wide angle end state, FIG. 89B corresponding to the intermediate focal length state, and FIG. 89C corresponding to the telephoto end state. FIG. 90 is various aberration graphs (a spherical aberration graph, an astigmatism graph, a distortion graph, a lateral chromatic aberration graph, and a coma aberration graph) of the zoom optical system ZL18 according to Example 18 upon focusing on a short distant object with FIG. 90A corresponding to the wide angle end state, FIG. 90B corresponding to the intermediate focal length state, and FIG. 90C corresponding to the telephoto end state. FIG. 91 is a coma aberration graph at the time of image blur correction for the zoom optical system ZL18 according to Example 18 upon focusing on infinity with FIG. 91A corresponding to the wide angle end state, FIG. 91B corresponding to the intermediate focal length state, and FIG. 91C corresponding to the telephoto end state.

It can be seen in the aberration graphs in FIG. 89 to FIG. 91 that the zoom optical system ZL18 according to Example 18 can achieve an excellent optical performance with various aberrations successfully corrected from the wide angle end state to the telephoto end state and from the infinity focusing state to the short-distant object focusing state. Furthermore, it can be seen that a high imaging performance can be achieved upon image blur correction.

Example 19

Figure 92:
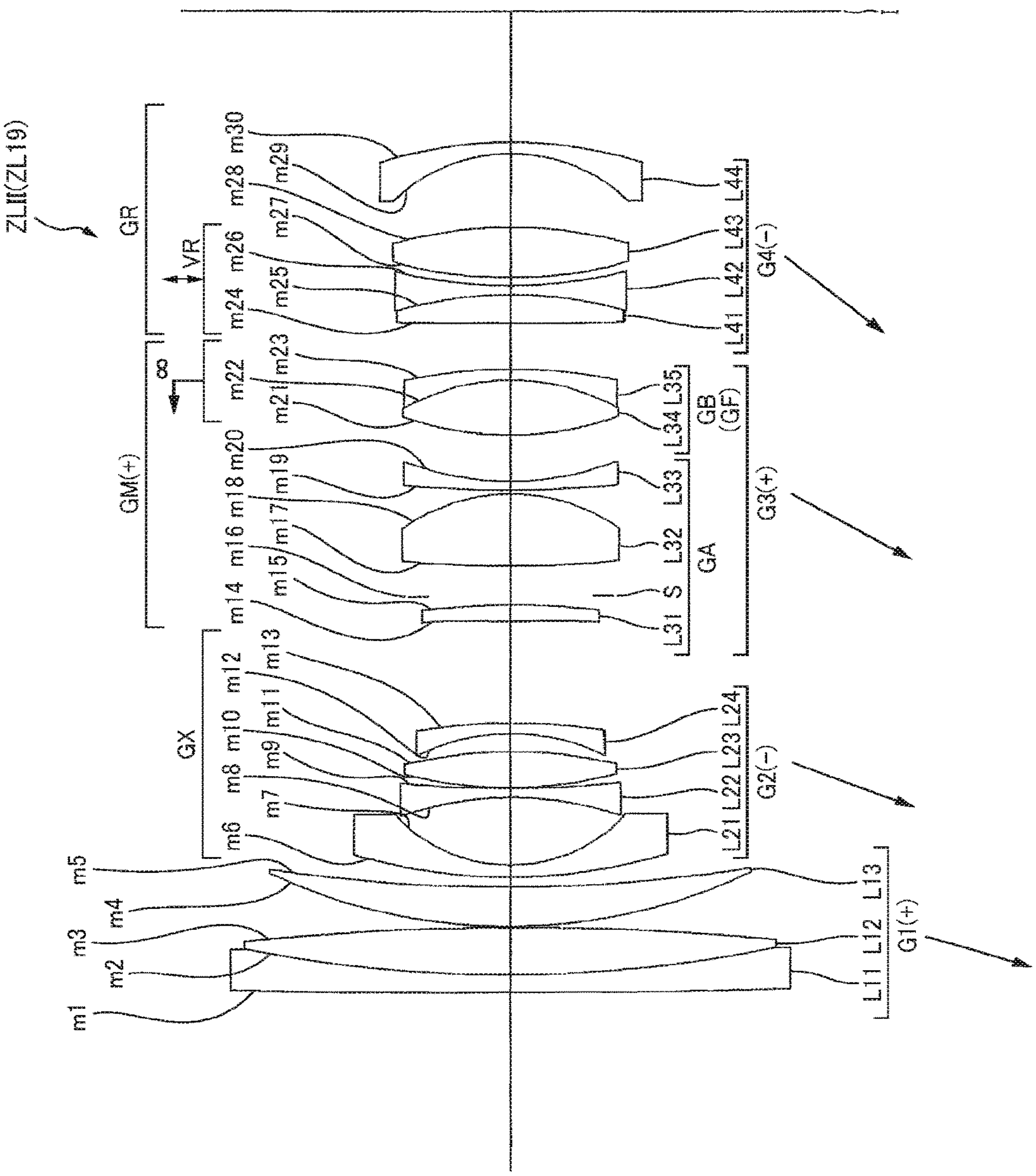
FIG. 92 is a cross-sectional view of a zoom optical system according to Example 19.

Example 19 is described with reference to FIG. 92 to FIG. 95 and Table 19. A zoom optical system ZLII (ZL19) according to Example 19 includes, as illustrated in FIG. 92, the first lens group G1 having positive refractive power, the second lens group G2 having negative refractive power, the third lens group G3 having positive refractive power, and the fourth lens group G4 having negative refractive power that are arranged in order from the object side.

The first lens group G1 includes: the cemented lens including the negative meniscus L11 having a concave surface facing the image side and the biconvex lens L12; and the positive meniscus lens L13 having a convex surface facing the object side that are arranged in order from the object side.

The second lens group G2 includes the negative meniscus lens L21 having a concave surface facing the image side, the biconcave lens L22, the biconvex lens L23, and the negative meniscus lens L24 having a concave surface facing the object side that are arranged in order from an object side. The biconcave lens L22 is a glass-molded aspherical lens with a lens surface, on the object side, having an aspherical shape.

The third lens group G3 includes the object side group GA and the image side group GB having positive refractive power that are arranged in order from the object side. The object side group GA includes the biconvex lens L31, the aperture stop S, the biconvex lens L32, and the negative meniscus lens L33 having a concave surface facing the image side that are arranged in order from the object side. The image side group GB includes the cemented lens including the biconvex lens L34 and the negative meniscus lens L35 having a concave surface facing the object side. The biconvex lens L31 is a glass-molded aspherical lens with lens surfaces, on the object side and on the image surface side, having an aspherical shape. The biconvex lens L34 is a glass-molded aspherical lens with a lens surface, on the object side, having an aspherical shape.

The fourth lens group G4 includes: a cemented lens including the biconvex lens L41 and the biconcave lens L42; the biconvex lens L43; and the negative meniscus lens L44 having a concave surface facing the object side that are arranged in order from the object side. The biconvex lens L43 is a glass-molded aspherical lens with a lens surface, on the object side, having an aspherical shape.

The zooming from the wide angle end state to the telephoto end state is achieved with: the first lens group G1, the second lens group G2, the third lens group G3, and the fourth lens group G4 each moved toward the object side in such a manner that the distance between the first lens group G1 and the second lens group G2 increases, the distance between the second lens group G2 and the third lens group G3 decreases, and the distance between the third lens group G3 and the fourth lens group G4 decreases.

Focusing from infinity to the short-distant object is achieved with the image side group GB (=focusing lens group GF) forming the third lens group G3 moved toward the object side.

When image blur occurs, image blur correction (vibration isolation) on the image surface I is performed with the cemented lens including the biconvex lenses L41 and the biconcave lens L42 forming the fourth lens group G4, and serving as the vibration-proof lens group VR moved with a displacement component in the direction orthogonal to the optical axis. In Example 19, in the wide angle end state, the shifted amount of the vibration-proof lens group VR is −0.506 mm when the correction angle is 0.664°. In the intermediate focal length state, the shifted amount of the vibration-proof lens group VR is −0.449 mm when the correction angle is 0.469°. In the telephoto end state, the shifted amount of the vibration-proof lens group VR is −0.446 mm when the correction angle is 0.401°.

In Table 19 below, specification values in Example 19 are listed. Surface numbers 1 to 30 in Table 19 respectively correspond to the optical surfaces m1 to m30 in FIG. 92.

TABLE 19

[Lens specifications]

| Surface number | R | D | νd | nd |
|---|---|---|---|---|
| Obj surface | ∞ | | | |
| 1 | 1193.7961 | 2.00 | 22.74 | 1.80809 |
| 2 | 124.6072 | 5.44 | 67.90 | 1.59319 |
| 3 | −251.5182 | 0.10 | | |
| 4 | 53.9338 | 4.39 | 54.61 | 1.72916 |
| 5 | 148.4536 | D5 (variable) | | |
| 6 | 52.0263 | 1.35 | 35.72 | 1.90265 |
| 7 | 15.1015 | 7.62 | | |
| *8 | −30.5049 | 1.00 | 51.16 | 1.75501 |
| 9 | 93.9602 | 0.10 | | |
| 10 | 39.5192 | 4.07 | 22.74 | 1.80809 |
| 11 | −41.3448 | 1.99 | | |
| 12 | −20.4648 | 1.20 | 58.12 | 1.62299 |
| 13 | −53.5027 | D13 (variable) | | |
| *14 | 213.8825 | 1.87 | 51.16 | 1.75501 |
| *15 | −64.5513 | 1.00 | | |
| 16 | ∞ | 3.38 | (aperture stop) | |

TABLE 19-continued

| | | | | |
|---|---|---|---|---|
| 17 | 110.8652 | 8.03 | 82.57 | 1.49782 |
| 18 | −18.2246 | 0.48 | | |
| 19 | 116.2881 | 1.00 | 37.18 | 1.83400 |
| 20 | 28.0153 | D20 (variable) | | |
| *21 | 30.2797 | 6.11 | 67.02 | 1.59201 |
| 22 | −21.0000 | 1.33 | 23.80 | 1.84666 |
| 23 | −44.7009 | D23 (variable) | | |
| 24 | 549.5106 | 3.21 | 22.74 | 1.80809 |
| 25 | −38.9378 | 1.00 | 42.73 | 1.83481 |
| 26 | 44.8125 | 0.94 | | |
| *27 | 53.1149 | 5.61 | 81.56 | 1.49710 |
| 28 | −41.5964 | 8.34 | | |
| 29 | −16.1731 | 1.30 | 50.67 | 1.67790 |
| 30 | −40.6492 | D30 (variable) | | |
| Img surface | ∞ | | | |

[Aspherical data]

| Surface number | κ | A4 | A6 | A8 | A10 |
|---|---|---|---|---|---|
| 8th surface | 0.00 | 5.94537E−06 | −1.85599E−09 | 5.98429E−11 | 6.60655E−13 |
| 14th surface | 0.00 | −4.52248E−05 | 7.78703E−08 | −1.06200E−09 | 0.00000E+00 |
| 15th surface | 0.00 | −6.29335E−06 | 1.07534E−07 | −1.16673E−10 | 1.00000E−17 |
| 21st surface | 0.00 | −3.63068E−06 | 2.68872E−08 | −2.41333E−11 | 0.00000E+00 |
| 27th surface | 0.00 | 1.77742E−05 | −4.96065E−09 | 1.03075E−10 | 0.00000E+00 |

[Various data]
Zoom ratio 2.75

| | Wide angle end | | Intermediate | | Telephoto end |
|---|---|---|---|---|---|
| f | 24.7 | ~ | 49.5 | ~ | 67.9 |
| FNO | 2.9 | ~ | 3.9 | ~ | 4.1 |
| 2ω | 82.4 | ~ | 47.0 | ~ | 34.7 |
| Y | 19.1 | ~ | 21.6 | ~ | 21.6 |
| TL (air) | 110.8 | ~ | 131.5 | ~ | 145.4 |
| BF (air) | 14.9 | ~ | 30.3 | ~ | 37.7 |

[Variable distance data]

| | Upon focusing on infinity | | | Upon focusing on short distant object | | |
|---|---|---|---|---|---|---|
| | Wide angle end | Intermediate | Telephoto end | Wide angle end | Intermediate | Telephoto end |
| f | 24.7 | 49.5 | 67.9 | 24.7 | 49.5 | 67.9 |
| D5 | 1.10 | 16.06 | 26.09 | | | |
| D13 | 11.54 | 3.19 | 1.10 | | | |
| D20 | 5.19 | 5.19 | 5.19 | 4.36 | 2.99 | 1.69 |
| D23 | 5.16 | 3.92 | 2.50 | 5.99 | 6.11 | 5.99 |
| D30 | 14.90 | 30.26 | 37.67 | | | |

[Lens group data]

| | Group starting surface | Group focal length |
|---|---|---|
| First lens group | 1 | 98.67 |
| Second lens group | 6 | −17.73 |
| Third lens group | 14 | 24.81 |
| Fourth lens group | 24 | −48.06 |

[Conditional expression corresponding value]

| | |
|---|---|
| Conditional expression (JK1) | $|fF|/fM = 1.566$ |
| Conditional expression (JK2) | $(-fXn)/fM = 0.715$ |
| Conditional expression (JK3) | $dAB/|fF| = 0.133$ |
| Conditional expression (JK4) | $ndp + 0.0075 \times \nu dp - 2.175 = -0.080$ |
| Conditional expression (JK5) | $\nu dp = 67.02$ |
| Conditional expression (JL1) | $|(rB + rA)/(rB - rA)| = 25.744$ |
| Conditional expression (JL2) | $|fF|/fM = 1.566$ |

TABLE 19-continued

| | |
|---|---|
| Conditional expression (JL3) | dAB/\|fF\| = 0.133 |
| Conditional expression (JL4) | (−fXn)/fM = 0.715 |
| Conditional expression (JL5) | ndp + 0.0075 × νdp − 2.175 = −0.080 |
| Conditional expression (JL6) | νdp = 67.02 |
| Conditional expression (JM1) | dV/\|fV\| = 0.017 |
| Conditional expression (JM2) | \|fF\|/fM = 1.566 |
| Conditional expression (JM3) | dAB/\|fF\| = 0.133 |
| Conditional expression (JM4) | (−fXn)/fM = 0.715 |
| Conditional expression (JM5) | ndp + 0.0075 × νdp − 2.175 = −0.080 |
| Conditional expression (JM6) | νdp = 67.02 |

It can be seen in Table 19 that the zoom optical system ZL19 according to this Example satisfies the conditional expressions (JK1) to (JK5), (JL1) to (JL6), and (JM1) to (JM6).

Figure 93A:
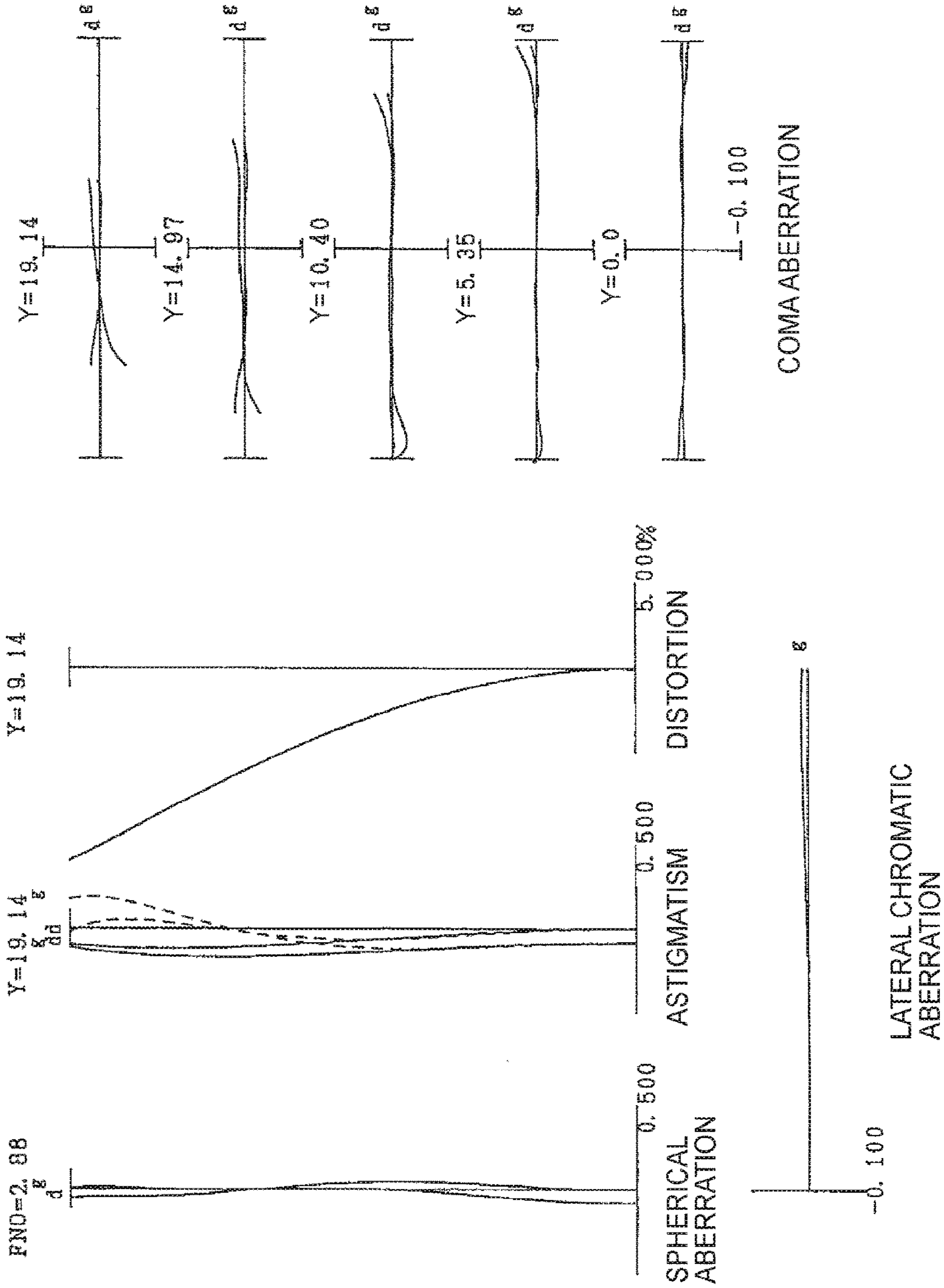
FIGS. 93A, 93B, and 93C are graphs showing various aberrations of the zoom optical system according to Example 19 upon focusing on infinity respectively in the wide angle end state, the intermediate focal length state, and the telephoto end state.
Figure 93B:
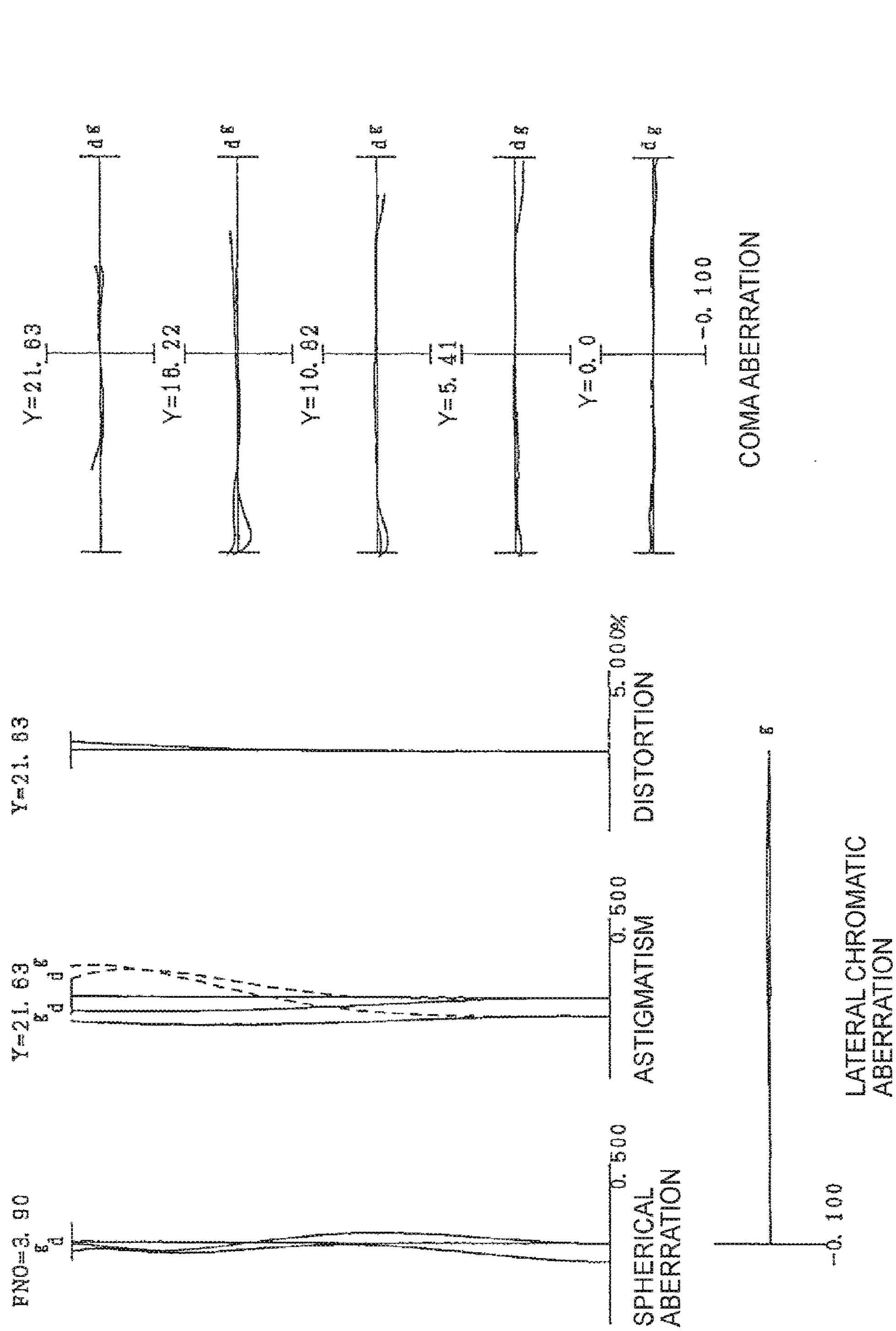
Figure 93C:
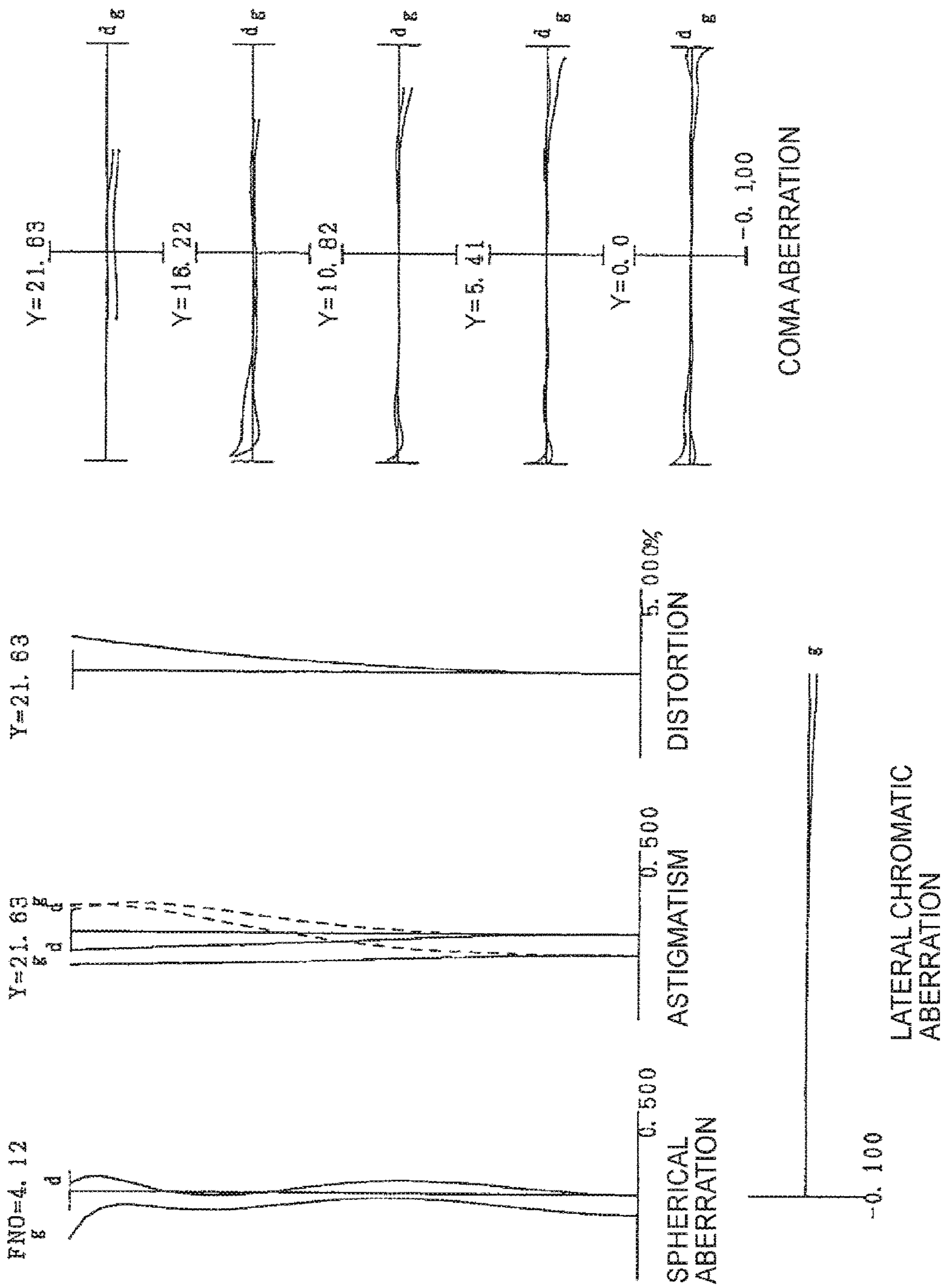
Figure 94A:
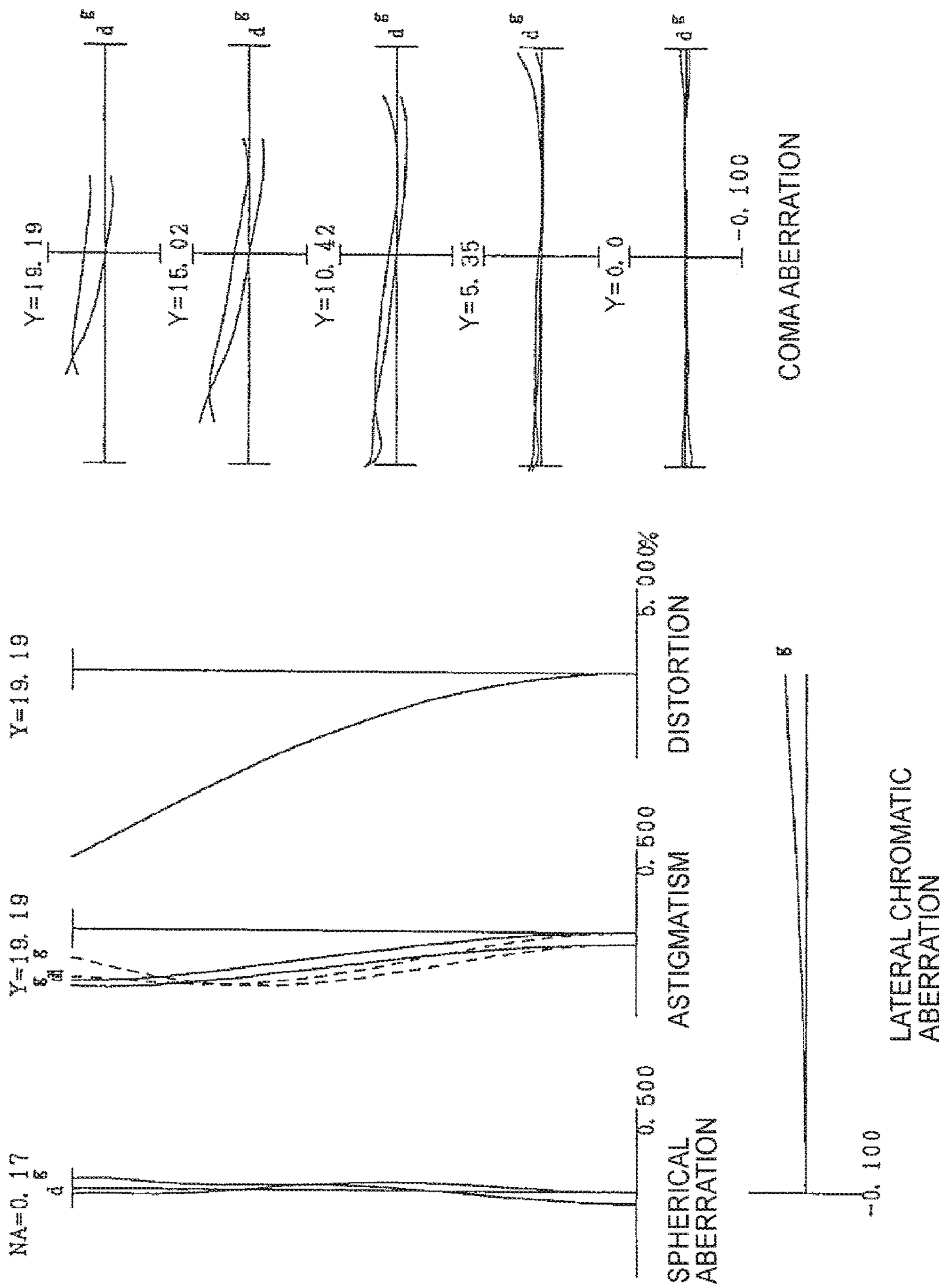
FIGS. 94A, 94B, and 94C are graphs showing various aberrations of the zoom optical system according to Example 19 upon focusing on a short distant object respectively in the wide angle end state, the intermediate focal length state, and the telephoto end state.
Figure 94B:
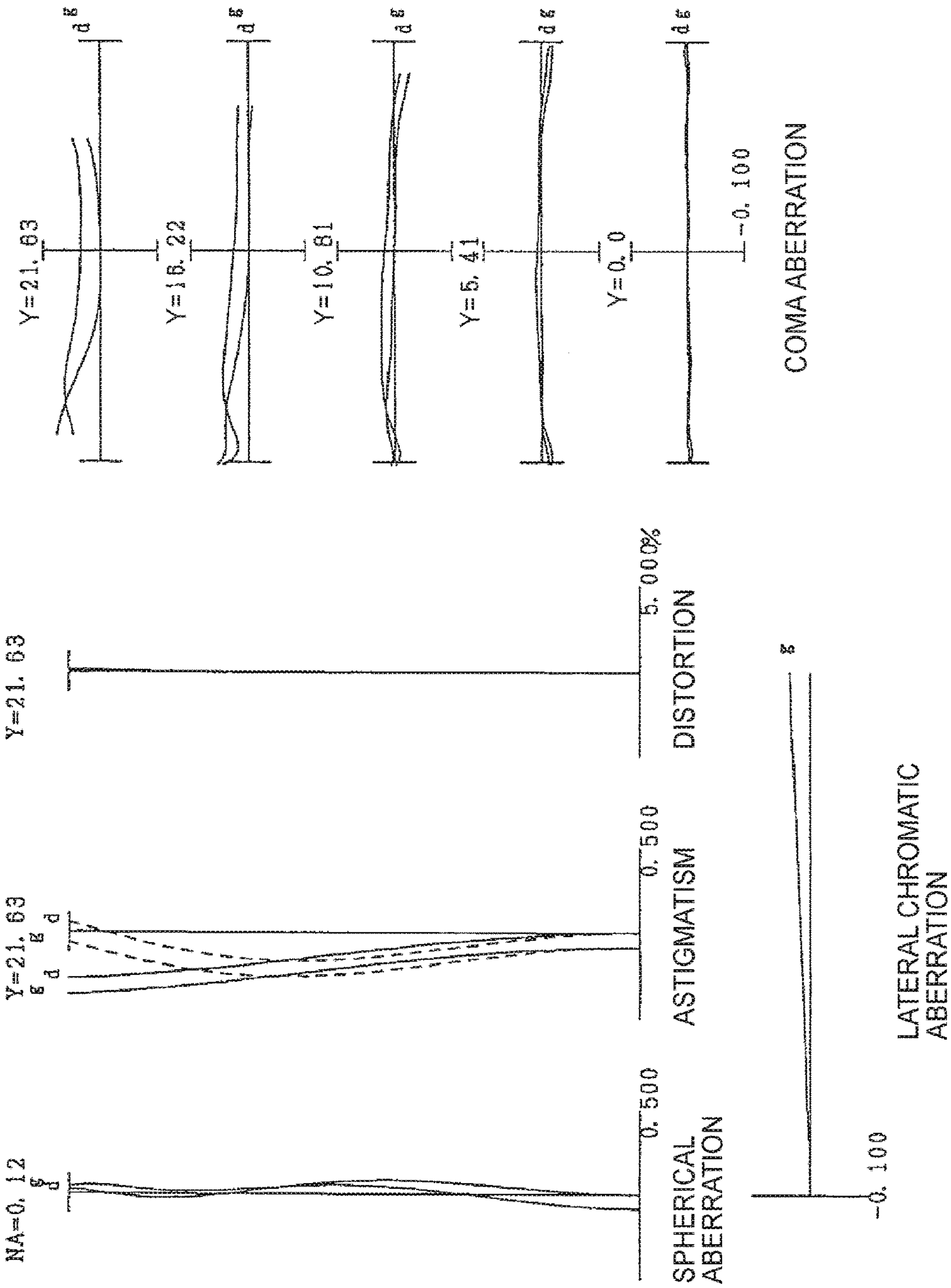
Figure 94C:
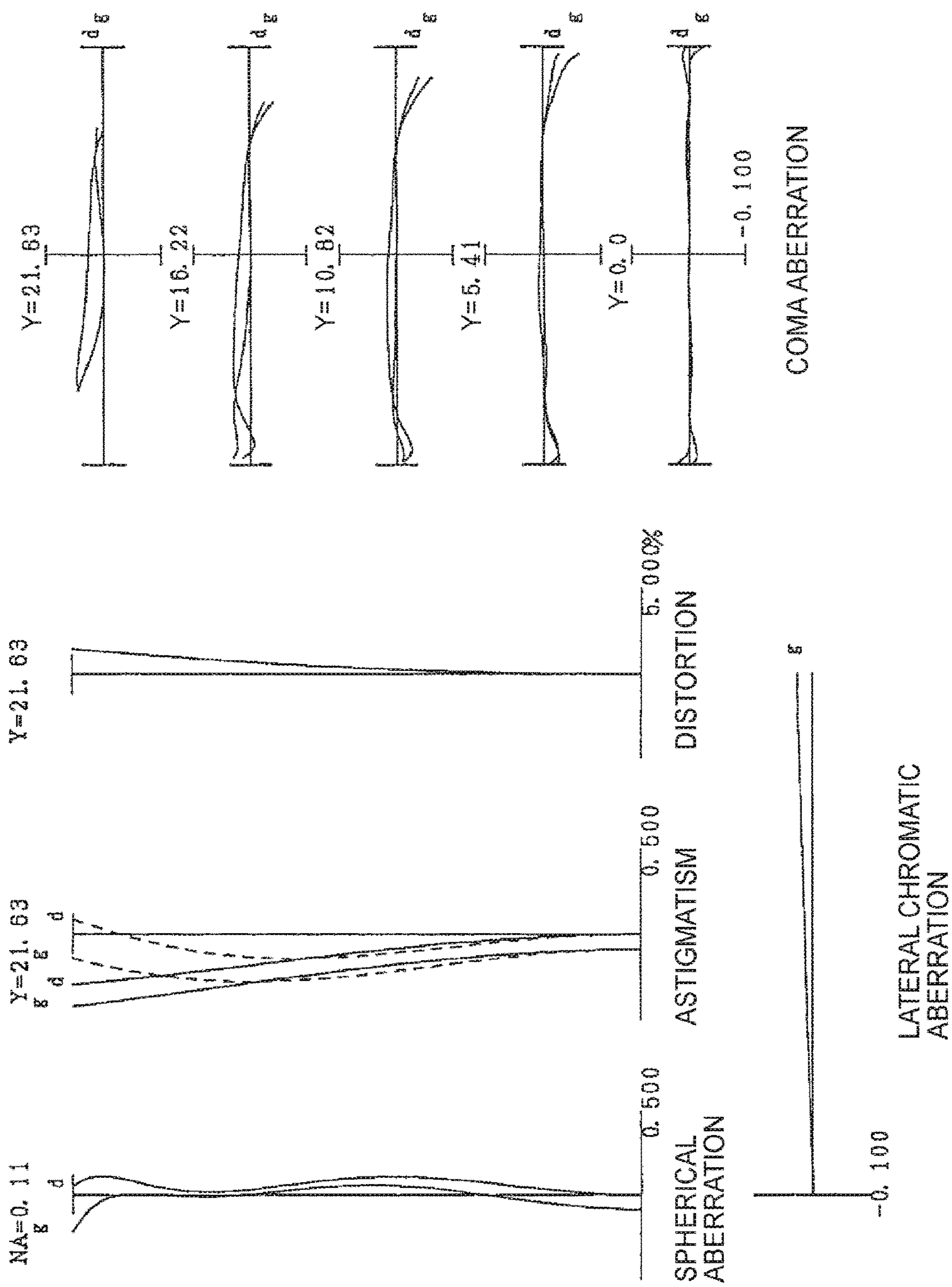
Figure 95A:
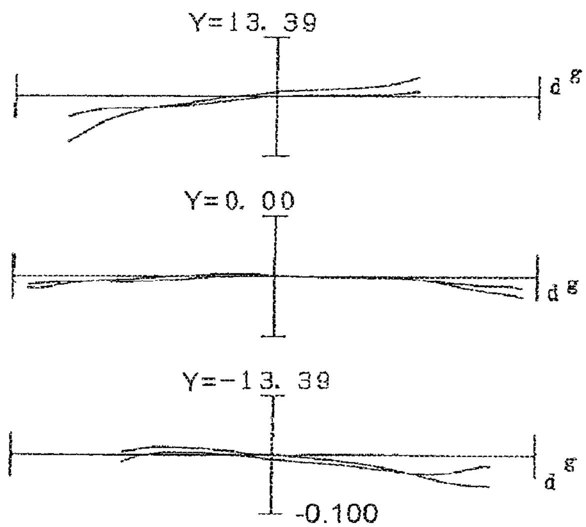
FIGS. 95A, 95B, and 95C are graphs showing coma aberrations of the zoom optical system according to Example 19 upon focusing on infinity with image blur correction performed, respectively in the wide angle end state, the intermediate focal length state, and the telephoto end state.
Figure 95B:
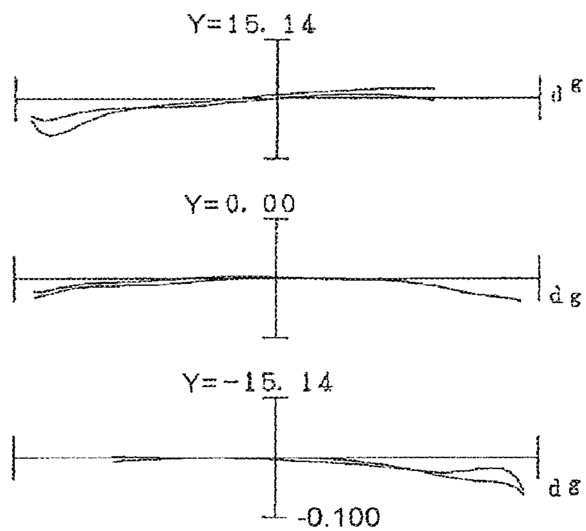
Figure 95C:
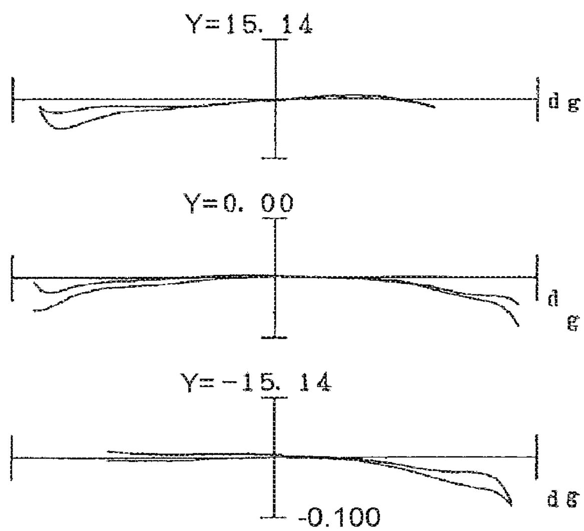

FIG. 93 is various aberration graphs (a spherical aberration graph, an astigmatism graph, a distortion graph, a lateral chromatic aberration graph, and a coma aberration graph) of the zoom optical system ZL19 according to Example 19 upon focusing on infinity with FIG. 93A corresponding to the wide angle end state, FIG. 93B corresponding to the intermediate focal length state, and FIG. 93C corresponding to the telephoto end state. FIG. 94 is various aberration graphs (a spherical aberration graph, an astigmatism graph, a distortion graph, a lateral chromatic aberration graph, and a coma aberration graph) of the zoom optical system ZL19 according to Example 19 upon focusing on a short distant object with FIG. 94A corresponding to the wide angle end state, FIG. 94B corresponding to the intermediate focal length state, and FIG. 94C corresponding to the telephoto end state. FIG. 95 is a coma aberration graph at the time of image blur correction for the zoom optical system ZL19 according to Example 19 upon focusing on infinity with FIG. 95A corresponding to the wide angle end state, FIG. 95B corresponding to the intermediate focal length state, and FIG. 95C corresponding to the telephoto end state.

It can be seen in the aberration graphs in FIG. 93 to FIG. 95 that the zoom optical system ZL19 according to Example 19 can achieve an excellent optical performance with various aberrations successfully corrected from the wide angle end state to the telephoto end state and from the infinity focusing state to the short-distant object focusing state. Furthermore, it can be seen that a high imaging performance can be achieved upon image blur correction.

Example 20

Figure 96:
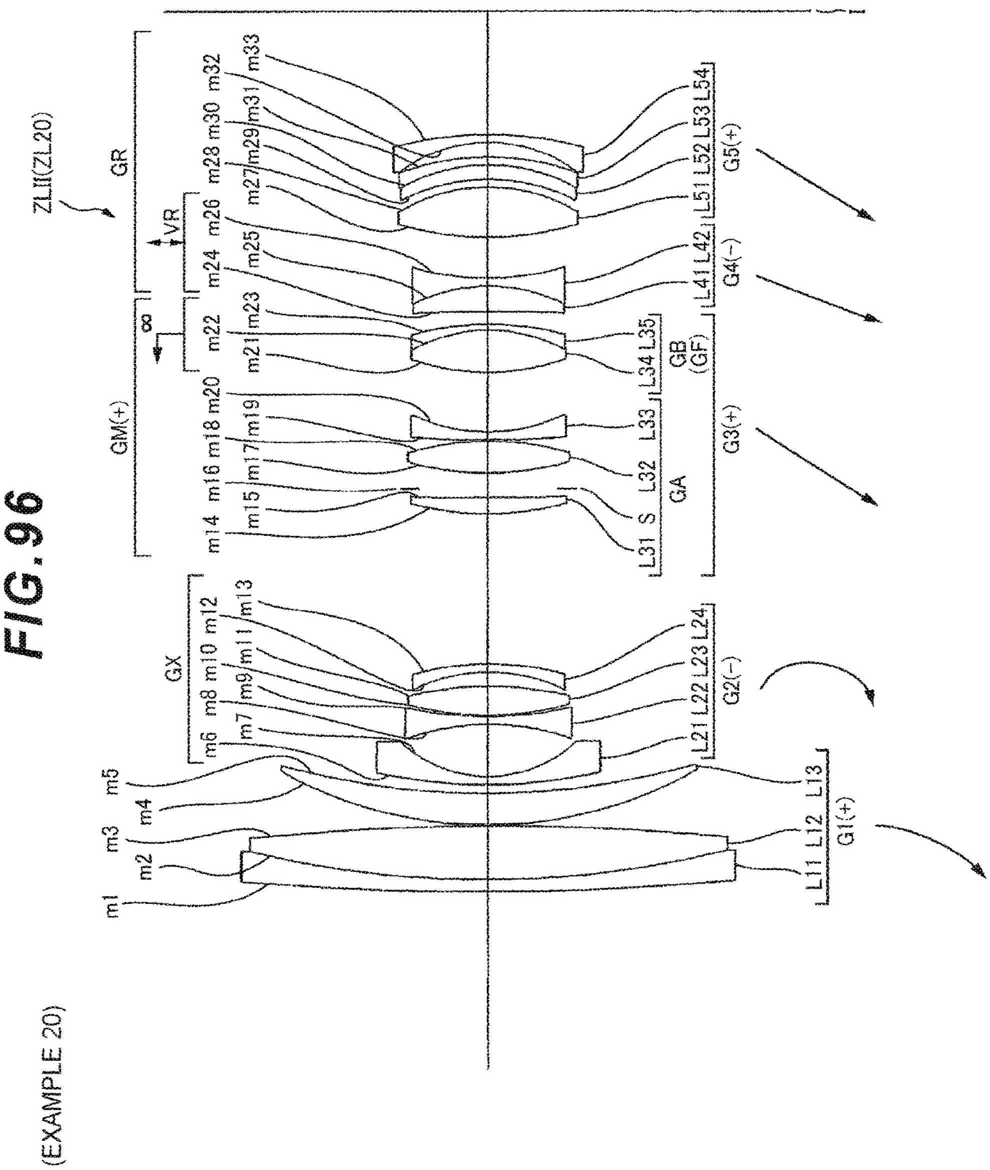
FIG. 96 is a cross-sectional view of a zoom optical system according to Example 20.

Example 20 is described with reference to FIG. 96 to FIG. 99 and Table 20. A zoom optical system ZLII (ZL20) according to Example 20 includes, as illustrated in FIG. 96, the first lens group G1 having positive refractive power, the second lens group G2 having negative refractive power, the third lens group G3 having positive refractive power, the fourth lens group G4 having negative refractive power, and the fifth lens group G5 having positive refractive power that are arranged in order from the object side.

The first lens group G1 includes: the cemented lens including the negative meniscus lens L11 having a concave surface facing the image side and the biconvex lens L12; and the positive meniscus lens L13 having a convex surface facing the object side that are arranged in order from the object side.

The second lens group G2 includes the negative meniscus lens L21 having a concave surface facing the image side, the biconcave lens L22, the biconvex lens L23, and the negative meniscus lens L24 having a concave surface facing the object side that are arranged in order from an object side. The biconcave lens L22 is a glass-molded aspherical lens with a lens surface, on the object side, having an aspherical shape.

The third lens group G3 includes the object side group GA and the image side group GB having positive refractive power that are arranged in order from the object side. The object side group GA includes the biconvex lens L31, the aperture stop S, the biconvex lens L32, and the negative meniscus lens L33 having a concave surface facing the image side that are arranged in order from the object side. The image side group GB includes the cemented lens including the biconvex lens L34 and the negative meniscus lens L35 having a concave surface facing the object side. The biconvex lens L31 is a glass-molded aspherical lens with lens surfaces, on the object side and on the image surface side, having an aspherical shape. The biconvex lens L34 is a glass-molded aspherical lens with a lens surface, on the object side, having an aspherical shape.

The fourth lens group G4 includes a cemented lens including the positive meniscus lens L41 having a convex surface facing the image side and the biconcave lens L42 arranged in order from the object side.

The fifth lens group G5 includes: the biconvex lens L51; the cemented lens including the positive meniscus lens L52 having a convex surface facing the image side and the negative meniscus lens L53 having a concave surface facing the object side; and the negative meniscus lens L54 having a concave surface facing the object side that are arranged in order from the object side.

The zooming from the wide angle end state to the telephoto end state is achieved with: the first lens group G1 moved toward the object side, the second lens group G2 moved toward the image surface side and then moved toward the object side, and the third lens group G3, the fourth lens group G4, and the fifth lens group G5 moved toward the object side in such a manner that the distance between the first lens group G1 and the second lens group G2 increases, the distance between the second lens group G2 and the third lens group G3 decreases, the distance between the third lens group G3 and the fourth lens group G4 increases, and the distance between the fourth lens group G4 and the fifth lens group G5 decreases.

Focusing from infinity to the short-distant object is achieved with the image side group GB (=focusing lens group GF) forming the third lens group G3 moved toward the object side.

When image blur occurs, image blur correction (vibration isolation) on the image surface I is performed with the fourth lens group G4 serving as the vibration-proof lens group VR moved with a displacement component in the direction orthogonal to the optical axis. In Example 20, in the wide angle end state, the shifted amount of the vibration-proof lens group VR is −0.226 mm when the correction angle is 0.664°. In the intermediate focal length state, the shifted amount of the vibration-proof lens group VR is −0.241 mm when the correction angle is 0.469°. In the telephoto end state, the shifted amount of the vibration-proof lens group VR is −0.274 mm when the correction angle is 0.327°.

In Table 20 below, specification values in Example 20 are listed. Surface numbers 1 to 33 in Table 20 respectively correspond to the optical surfaces m1 to m33 in FIG. 96.

TABLE 20

[Lens specifications]

| Surface number | R | D | νd | nd |
|---|---|---|---|---|
| Obj surface | ∞ | | | |
| 1 | 282.7218 | 1.33 | 22.74 | 1.80809 |
| 2 | 94.7445 | 6.10 | 67.90 | 1.59319 |
| 3 | −226.9827 | 0.10 | | |
| 4 | 40.7799 | 3.54 | 54.61 | 1.72916 |
| 5 | 73.5746 | D5 (variable) | | |
| 6 | 49.4466 | 0.90 | 35.72 | 1.90265 |
| 7 | 12.2660 | 5.90 | | |
| *8 | −22.9424 | 0.90 | 51.16 | 1.75501 |
| 9 | 36.0329 | 0.13 | | |
| 10 | 28.3106 | 3.27 | 22.74 | 1.80809 |
| 11 | −33.3406 | 1.61 | | |
| 12 | −16.3903 | 0.90 | 58.12 | 1.62299 |
| 13 | −28.7665 | D13 (variable) | | |
| *14 | 27.1836 | 1.87 | 51.16 | 1.75501 |
| *15 | −883.8798 | 1.00 | | |
| 16 | ∞ | 1.74 | (aperture stop) | |
| 17 | 29.1431 | 3.58 | 82.57 | 1.49782 |
| 18 | −27.0053 | 0.10 | | |
| 19 | 90.6365 | 0.93 | 37.18 | 1.83400 |
| 20 | 16.9325 | D20 (variable) | | |
| *21 | 21.6272 | 4.71 | 67.02 | 1.59201 |
| 22 | −15.3834 | 0.67 | 23.80 | 1.84666 |
| 23 | −27.6370 | D23 (variable) | | |
| 24 | −197.6287 | 2.84 | 22.74 | 1.80809 |
| 25 | −16.1995 | 0.90 | 35.25 | 1.74950 |
| 26 | 24.2531 | D26 (variable) | | |
| 27 | 29.8965 | 5.67 | 81.56 | 1.49710 |
| 28 | −16.6499 | 0.85 | | |
| 29 | −18.7793 | 1.65 | 22.74 | 1.80809 |
| 30 | −17.2583 | 0.90 | 52.33 | 1.75500 |
| 31 | −25.1119 | 1.61 | | |
| 32 | −14.5032 | 0.90 | 54.61 | 1.72916 |
| 33 | −34.8046 | D33 (variable) | | |
| Img surface | ∞ | | | |

[Aspherical data]

| Surface number | κ | A4 | A6 | A8 | A10 |
|---|---|---|---|---|---|
| 8th surface | 0.00 | 1.17630E−05 | 3.52411E−08 | −1.08429E−09 | 1.00133E−11 |
| 14th surface | 0.00 | −1.66916E−06 | 1.91542E−07 | −3.91949E−09 | 0.00000E+00 |
| 15th surface | 0.00 | 3.85171E−05 | 2.06325E−07 | −3.70351E−09 | −2.61997E−12 |
| 21st surface | 0.00 | −5.08719E−06 | 5.18792E−09 | −3.38472E−10 | 0.00000E+00 |

[Various data]
Zoom ratio 4.13

| | Wide angle end | | Intermediate | | Telephoto end |
|---|---|---|---|---|---|
| f | 16.5 | ~ | 33.0 | ~ | 68.0 |
| FNO | 2.9 | ~ | 3.6 | ~ | 4.1 |
| 2ω | 81.7 | ~ | 46.7 | ~ | 23.2 |
| Y | 12.6 | ~ | 14.3 | ~ | 14.3 |
| TL (air) | 99.5 | ~ | 111.4 | ~ | 133.9 |
| BF (air) | 14.0 | ~ | 23.8 | ~ | 32.9 |

TABLE 20-continued

| [Variable distance data] | | | | | | |
|---|---|---|---|---|---|---|
| | Upon focusing on infinity | | | Upon focusing on short distant object | | |
| | Wide angle end | Intermediate | Telephoto end | Wide angle end | Intermediate | Telephoto end |
| f | 16.5 | 33.0 | 68.0 | 16.5 | 33.0 | 68.0 |
| D5 | 1.00 | 13.94 | 32.81 | | | |
| D13 | 17.01 | 6.25 | 0.73 | | | |
| D20 | 6.71 | 6.71 | 6.71 | 6.43 | 5.79 | 3.08 |
| D23 | 1.50 | 3.72 | 4.55 | 1.78 | 4.65 | 8.18 |
| D26 | 4.68 | 2.46 | 1.63 | | | |
| D33 | 14.00 | 23.77 | 32.89 | | | |

[Lens group data]

| | Group starting surface | Group focal length |
|---|---|---|
| First lens group | 1 | 86.55 |
| Second lens group | 6 | −13.34 |
| Third lens group | 14 | 20.21 |
| Fourth lens group | 24 | −31.69 |
| Fifth lens group | 27 | 90.43 |

[Conditional expression corresponding value]

| | |
|---|---|
| Conditional expression (JK1) | $\|fF\|/fM = 1.231$ |
| Conditional expression (JK2) | $(-fXn)/fM = 0.660$ |
| Conditional expression (JK3) | $dAB/\|fF\| = 0.270$ |
| Conditional expression (JK4) | $ndp + 0.0075 \times vdp - 2.175 = -0.080$ |
| Conditional expression (JK5) | $vdp = 67.02$ |
| Conditional expression (JL1) | $\|(rB + rA)/(rB - rA)\| = 8.213$ |
| Conditional expression (JL2) | $\|fF\|/fM = 1.231$ |
| Conditional expression (JL3) | $dAB/\|fF\| = 0.270$ |
| Conditional expression (JL4) | $(-fXn)/fM = 0.660$ |
| Conditional expression (JL5) | $ndp + 0.0075 \times vdp - 2.175 = -0.080$ |
| Conditional expression (JL6) | $vdp = 67.02$ |
| Conditional expression (JM1) | $dV/\|fV\| = 0.051$ |
| Conditional expression (JM2) | $\|fF\|/fM = 1.231$ |
| Conditional expression (JM3) | $dAB/\|fF\| = 0.270$ |
| Conditional expression (JM4) | $(-fXn)/fM = 0.660$ |
| Conditional expression (JM5) | $ndp + 0.0075 \times vdp - 2.175 = -0.080$ |
| Conditional expression (JM6) | $vdp = 67.02$ |
| Conditional expression (JN1) | $\|fF\|/fM = 1.231$ |
| Conditional expression (JN2) | $dV/\|fV\| = 0.051$ |
| Conditional expression (JN3) | $dAB/\|fF\| = 0.270$ |
| Conditional expression (JN4) | $(-fXn)/fM = 0.660$ |
| Conditional expression (JN5) | $ndp + 0.0075 \times vdp - 2.175 = -0.080$ |
| Conditional expression (JN6) | $vdp = 67.02$ |

It can be seen in Table 20 that the zoom optical system ZL20 according to this Example satisfies the conditional expressions (JK1) to (JK5), (JL1) to (JL6), (JM1) to (JM6), and (JN1) to (JN6).

Figure 97A:
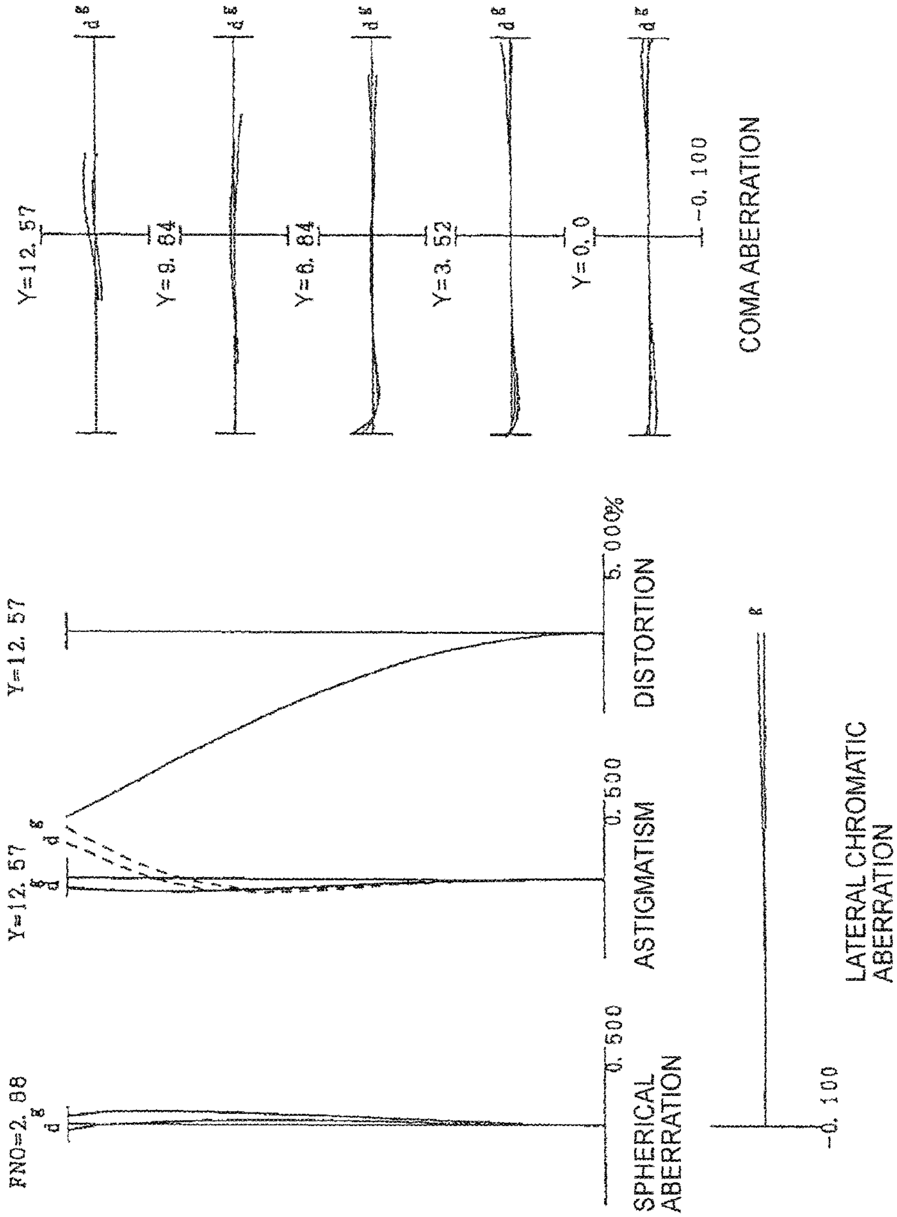
FIGS. 97A, 97B, and 97C are graphs showing various aberrations of the zoom optical system according to Example 20 upon focusing on infinity respectively in the wide angle end state, the intermediate focal length state, and the telephoto end state.
Figure 97B:
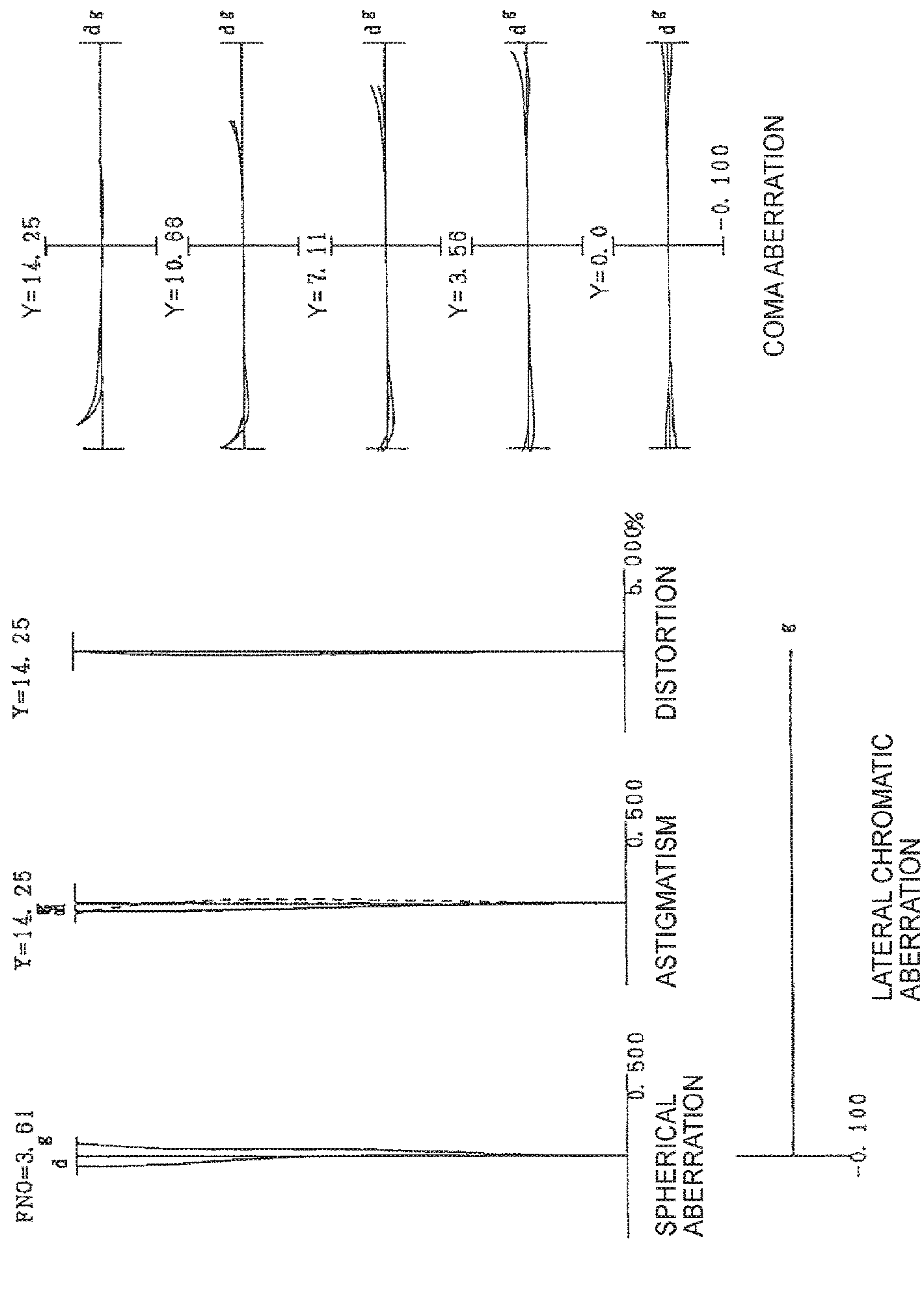
Figure 97C:
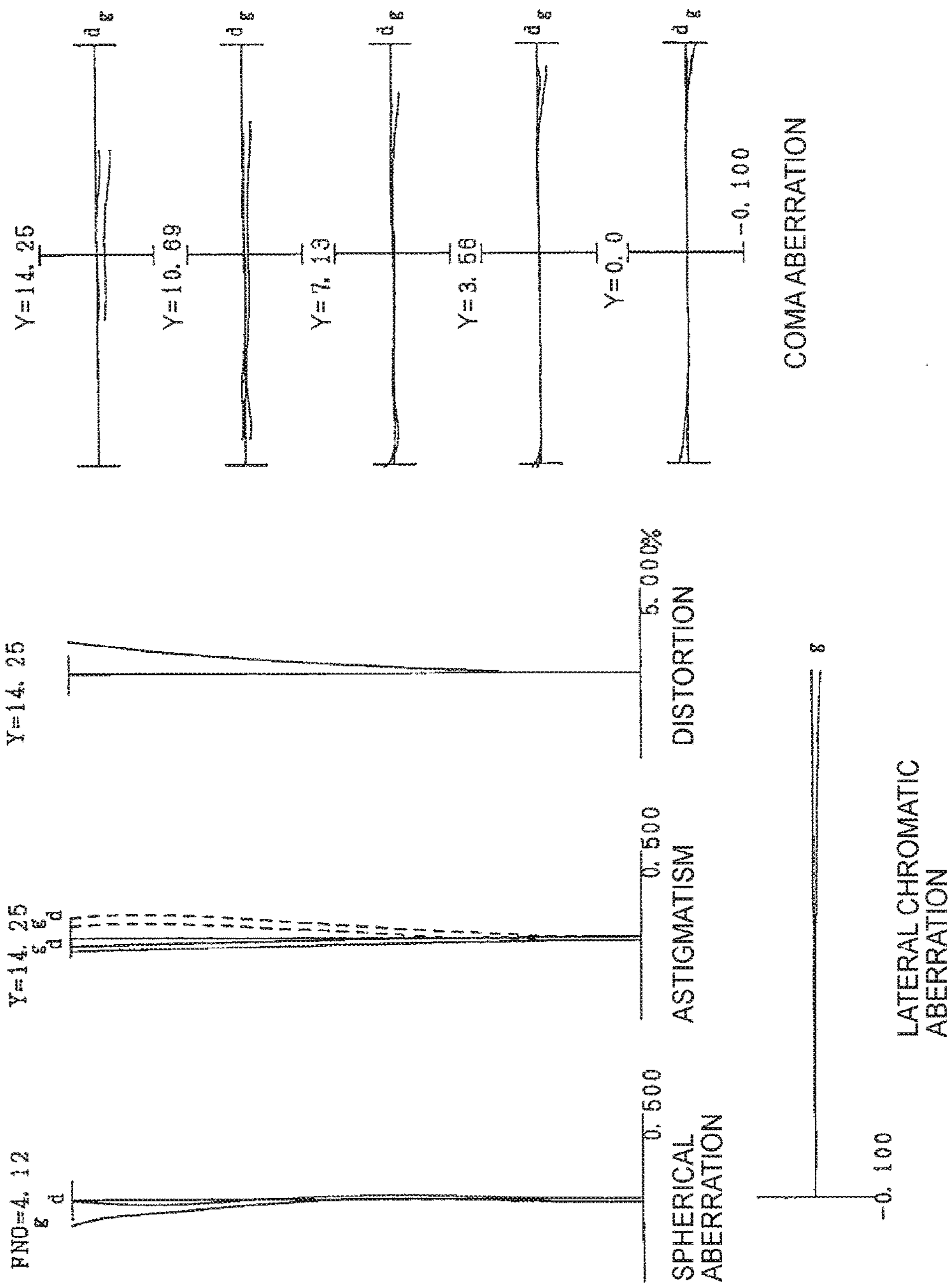
Figure 98A:
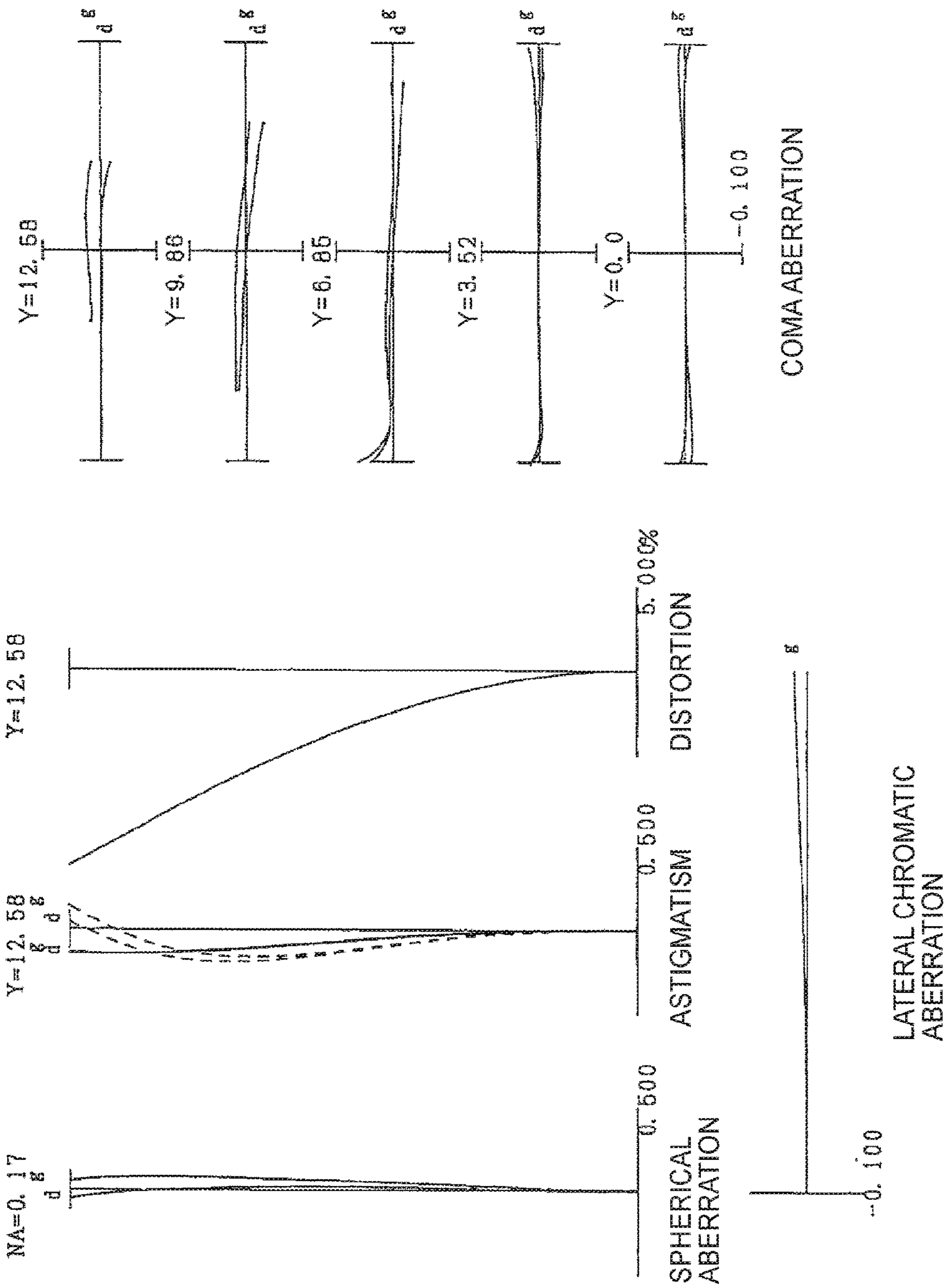
FIGS. 98A, 98B, and 98C are graphs showing various aberrations of the zoom optical system according to Example 20 upon focusing on a short distant object respectively in the wide angle end state, the intermediate focal length state, and the telephoto end state.
Figure 98B:
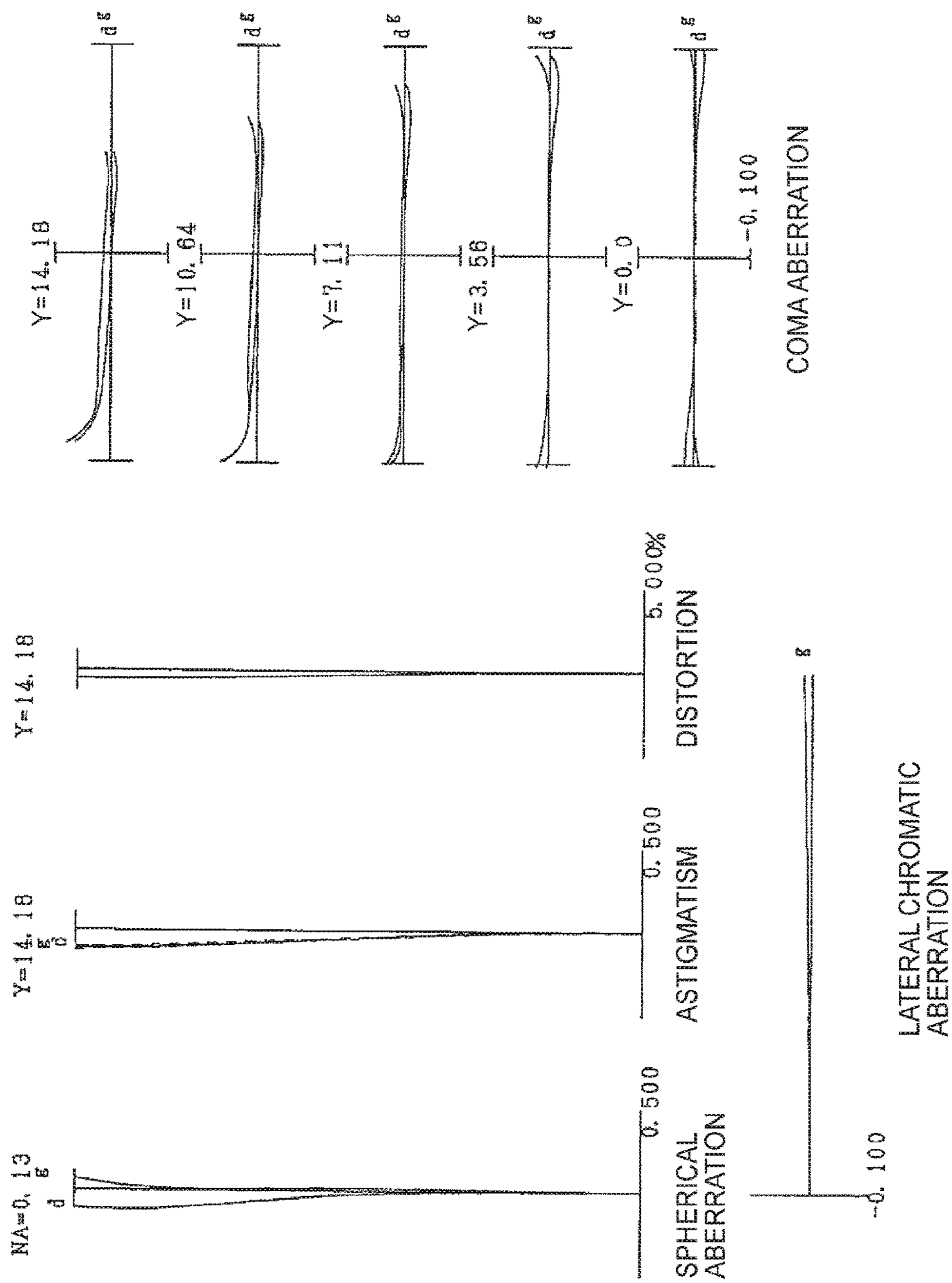
Figure 98C:
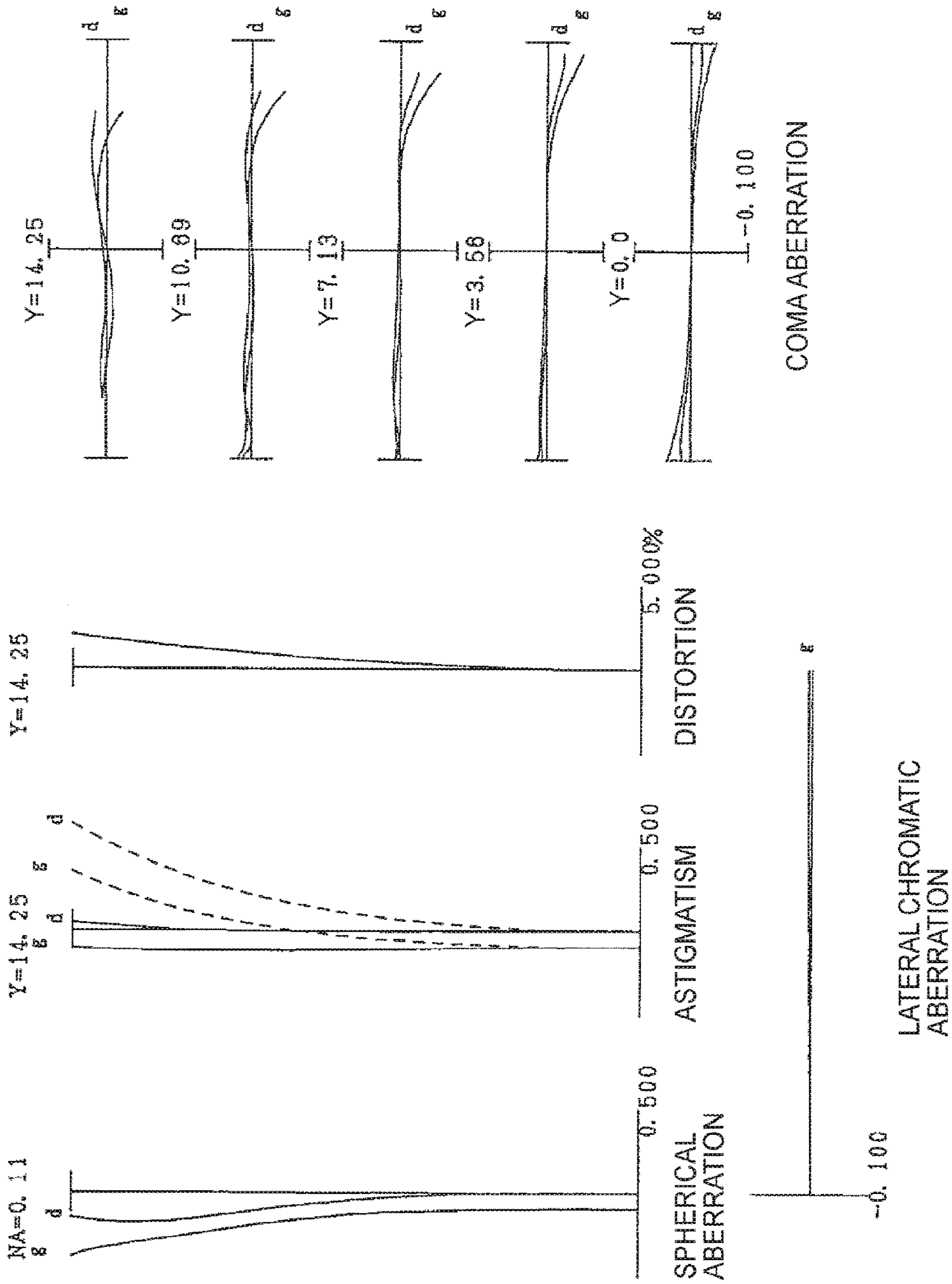
Figure 99A:
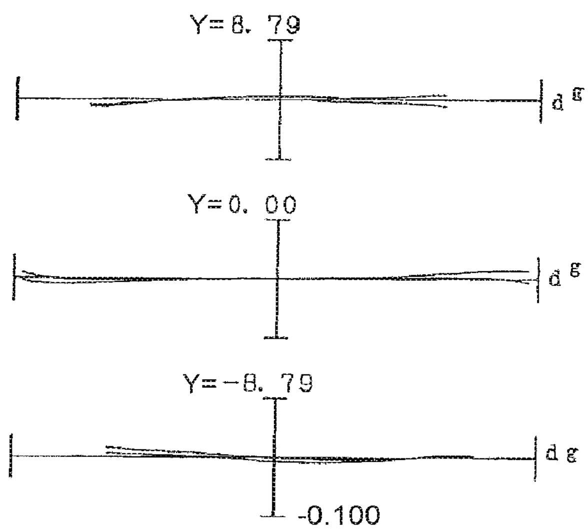
FIGS. 99A, 99B, and 99C are graphs showing coma aberrations of the zoom optical system according to Example 20 upon focusing on infinity with image blur correction performed, respectively in the wide angle end state, the intermediate focal length state, and the telephoto end state.
Figure 99B:
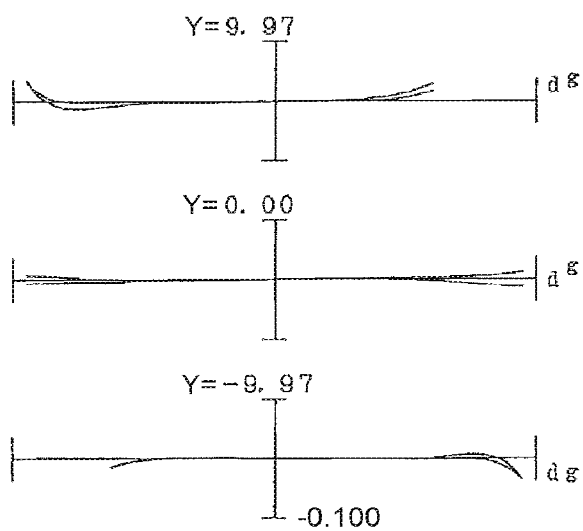
Figure 99C:
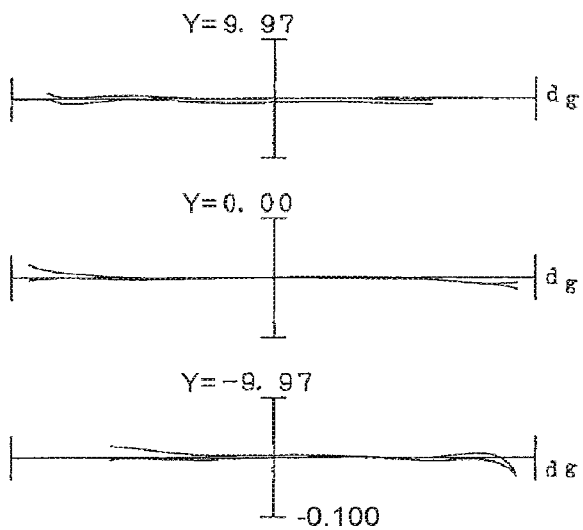

FIG. 97 is various aberration graphs (a spherical aberration graph, an astigmatism graph, a distortion graph, a lateral chromatic aberration graph, and a coma aberration graph) of the zoom optical system ZL20 according to Example 20 upon focusing on infinity with FIG. 97A corresponding to the wide angle end state, FIG. 97B corresponding to the intermediate focal length state, and FIG. 97C corresponding to the telephoto end state. FIG. 98 is various aberration graphs (a spherical aberration graph, an astigmatism graph, a distortion graph, a lateral chromatic aberration graph, and a coma aberration graph) of the zoom optical system ZL20 according to Example 20 upon focusing on a short distant object with FIG. 98A corresponding to the wide angle end state, FIG. 98B corresponding to the intermediate focal length state, and FIG. 98C corresponding to the telephoto end state. FIG. 99 is a coma aberration graph at the time of image blur correction for the zoom optical system ZL20 according to Example 20 upon focusing on infinity with FIG. 99A corresponding to the wide angle end state, FIG. 99B corresponding to the intermediate focal length state, and FIG. 99C corresponding to the telephoto end state.

It can be seen in the aberration graphs in FIG. 97 to FIG. 99 that the zoom optical system ZL20 according to Example 20 can achieve an excellent optical performance with various aberrations successfully corrected from the wide angle end state to the telephoto end state and from the infinity focusing state to the short-distant object focusing state. Furthermore, it can be seen that a high imaging performance can be achieved upon image blur correction.

Example 21

Figure 100:
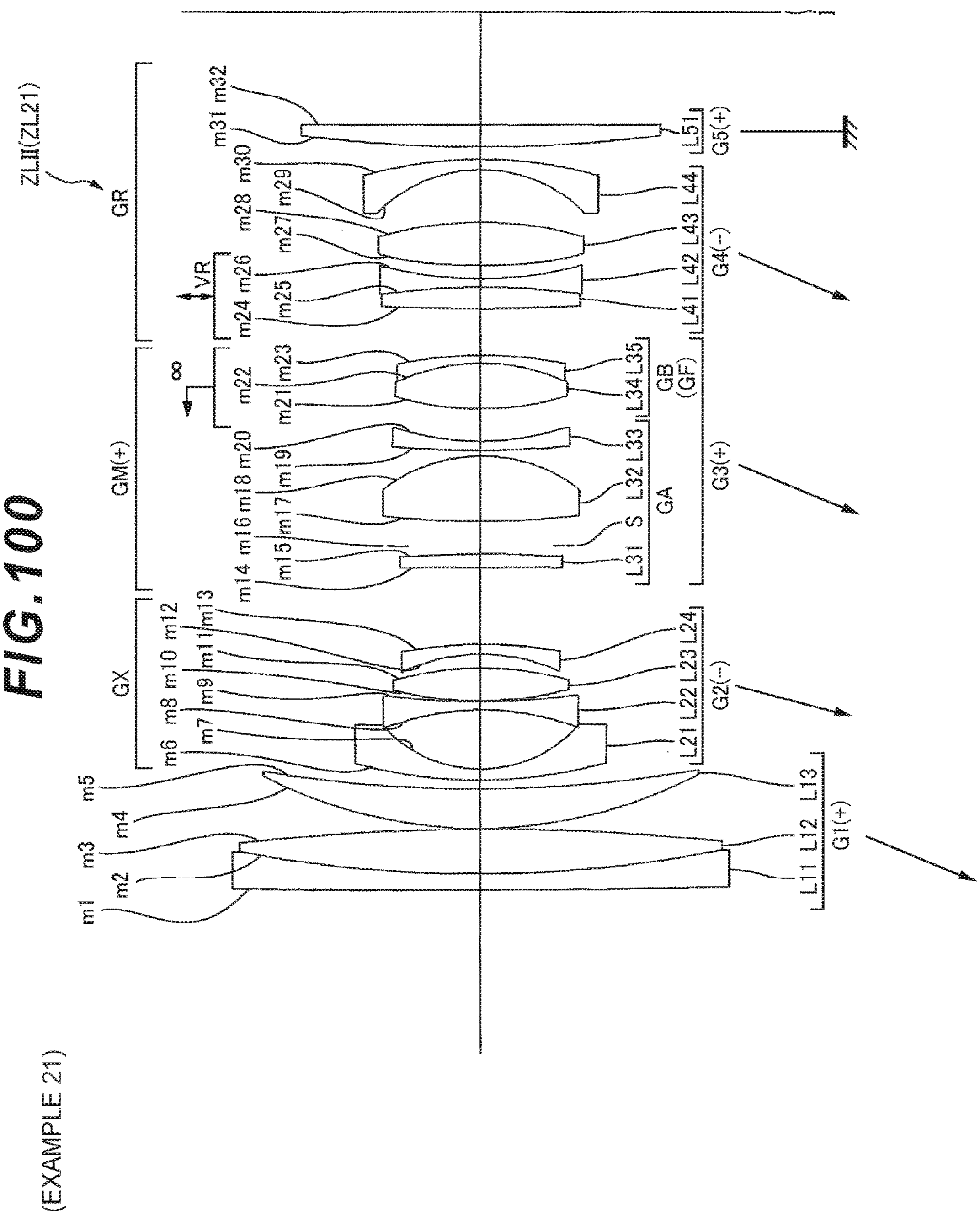
FIG. 100 is a cross-sectional view of a zoom optical system according to Example 21.

Example 21 is described with reference to FIG. 100 to FIG. 103 and Table 21. A zoom optical system ZLII (ZL21) according to Example 21 includes, as illustrated in FIG. 100, the first lens group G1 having positive refractive power, the second lens group G2 having negative refractive power, the third lens group G3 having positive refractive power, the fourth lens group G4 having negative refractive power, and the fifth lens group G5 having positive refractive power that are arranged in order from the object side.

The first lens group G1 includes: the cemented lens including the negative meniscus lens L11 having a concave surface facing the image side and the biconvex lens L12; and the positive meniscus lens L13 having a convex surface facing the object side that are arranged in order from the object side.

The second lens group G2 includes the negative meniscus lens L21 having a concave surface facing the image side, the biconcave lens L22, the biconvex lens L23, and the negative meniscus lens L24 having a concave surface facing the object side that are arranged in order from an object side. The biconcave lens L22 is a glass-molded aspherical lens with a lens surface, on the object side, having an aspherical shape.

The third lens group G3 includes the object side group GA and the image side group GB having positive refractive power that are arranged in order from the object side. The object side group GA includes the biconvex lens L31, the aperture stop S, the biconvex lens L32, and the negative meniscus lens L33 having a concave surface facing the image side that are arranged in order from the object side. The image side group GB includes the cemented lens including the biconvex lens L34 and the negative meniscus lens L35 having a concave surface facing the object side. The biconvex lens L31 is a glass-molded aspherical lens with lens surfaces, on the object side and on the image surface side, having an aspherical shape. The biconvex lens L34 is a glass-molded aspherical lens with a lens surface, on the object side, having an aspherical shape.

The fourth lens group G4 includes: the cemented lens including the biconvex lens L41 and the biconcave lens L42; the biconvex lens L43; and the negative meniscus lens L44 having a concave surface facing the object side that are arranged in order from the object side. The biconvex lens L43 is a glass-molded aspherical lens with a lens surface, on the object side, having an aspherical shape.

The fifth lens group G5 includes a plano-convex lens L51 having a convex surface facing the object side.

The zooming from the wide angle end state to the telephoto end state is achieved with: the first lens group G1, the second lens group G2, the third lens group G3, and the fourth lens group G4 each moved toward the object side, and the fifth lens group G5 fixed in such a manner that the distance between the first lens group G1 and the second lens group G2 increases, the distance between the second lens group G2 and the third lens group G3 decreases, the distance between the third lens group G3 and the fourth lens group G4 decreases, and the distance between the fourth lens group G4 and the fifth lens group G5 increases.

Focusing from infinity to the short-distant object is achieved with the image side group GB (=focusing lens group GF) forming the third lens group G3 moved toward the object side.

When image blur occurs, image blur correction (vibration isolation) on the image surface I is performed with the cemented lens including the biconvex lenses L41 and the biconcave lens L42 forming the fourth lens group G4, and serving as the vibration-proof lens group VR moved with a displacement component in the direction orthogonal to the optical axis. In Example 21, in the wide angle end state, the shifted amount of the vibration-proof lens group VR is −0.568 mm when the correction angle is 0.664°. In the intermediate focal length state, the shifted amount of the vibration-proof lens group VR is −0.473 mm when the correction angle is 0.469°. In the telephoto end state, the shifted amount of the vibration-proof lens group VR is −0.498 mm when the correction angle is 0.401°.

In Table 21 below, specification values in Example 21 are listed. Surface numbers 1 to 32 in Table 21 respectively correspond to the optical surfaces m1 to m32 in FIG. 100.

TABLE 21

[Lens specifications]

| Surface number | R | D | νd | nd |
|---|---|---|---|---|
| Obj surface | ∞ | | | |
| 1 | 1587.6950 | 2.00 | 22.74 | 1.80809 |
| 2 | 129.2311 | 5.54 | 67.90 | 1.59319 |
| 3 | −234.0081 | 0.10 | | |
| 4 | 49.3184 | 4.83 | 54.61 | 1.72916 |
| 5 | 133.6129 | D5 (variable) | | |
| 6 | 50.3607 | 1.35 | 35.72 | 1.90265 |
| 7 | 13.9849 | 7.29 | | |
| *8 | −26.5646 | 1.00 | 51.16 | 1.75501 |
| 9 | 75.5170 | 0.10 | | |
| 10 | 37.4790 | 4.06 | 22.74 | 1.80809 |
| 11 | −33.7046 | 1.73 | | |
| 12 | −19.4446 | 1.20 | 58.12 | 1.62299 |
| 13 | −45.6085 | D13 (variable) | | |
| *14 | 213.8825 | 1.67 | 51.16 | 1.75501 |
| *15 | −82.3988 | 1.00 | | |
| 16 | ∞ | 3.03 | (aperture stop) | |
| 17 | 94.6893 | 7.99 | 82.57 | 1.49782 |
| 18 | −17.1738 | 0.71 | | |
| 19 | 111.0410 | 1.07 | 37.18 | 1.83400 |
| 20 | 27.8731 | D20 (variable) | | |
| *21 | 30.7270 | 5.62 | 67.02 | 1.59201 |
| 22 | −21.0000 | 1.00 | 23.80 | 1.84666 |
| 23 | −41.6131 | D23 (variable) | | |
| 24 | 199.8522 | 2.64 | 22.74 | 1.80809 |
| 25 | −71.5415 | 1.00 | 39.61 | 1.80440 |

TABLE 21-continued

| | | | | |
|---|---|---|---|---|
| 26 | 39.6118 | 1.67 | | |
| *27 | 69.1913 | 5.36 | 81.56 | 1.49710 |
| 28 | −38.3308 | 6.47 | | |
| 29 | −15.4809 | 1.30 | 55.52 | 1.69680 |
| 30 | −44.4855 | D30 (variable) | | |
| 31 | 147.3134 | 2.68 | 23.80 | 1.84666 |
| 32 | ∞ | D32 (variable) | | |
| Img surface | ∞ | | | |

[Aspherical data]

| Surface number | κ | A4 | A6 | A8 | A10 |
|---|---|---|---|---|---|
| 8th surface | 0.00 | 8.49130E−06 | −5.54309E−09 | 7.89989E−11 | 9.93584E−13 |
| 14th surface | 0.00 | −4.27481E−05 | 3.37131E−07 | −3.01232E−09 | 0.00000E+00 |
| 15th surface | 0.00 | 3.68942E−06 | 3.86199E−07 | −1.66414E−09 | 1.00000E−17 |
| 21st surface | 0.00 | −4.28039E−06 | 3.72554E−08 | −4.57534E−11 | 0.00000E+00 |
| 27th surface | 0.00 | 2.35154E−05 | −3.28269E−09 | 1.82075E−10 | 0.00000E+00 |

[Various data]
Zoom ratio 2.75

| | Wide angle end | | Intermediate | | Telephoto end |
|---|---|---|---|---|---|
| f | 24.7 | ~ | 49.5 | ~ | 67.9 |
| FNO | 2.9 | ~ | 4.1 | ~ | 4.1 |
| 2ω | 82.4 | ~ | 47.2 | ~ | 34.7 |
| Y | 19.1 | ~ | 21.6 | ~ | 21.6 |
| TL (air) | 108.3 | ~ | 131.2 | ~ | 145.7 |
| BF (air) | 14.0 | ~ | 14.0 | ~ | 14.0 |

[Variable distance data]

| | Upon focusing on infinity | | | Upon focusing on short distant object | | |
|---|---|---|---|---|---|---|
| | Wide angle end | Intermediate | Telephoto end | Wide angle end | Intermediate | Telephoto end |
| f | 24.7 | 49.5 | 67.9 | 24.7 | 49.5 | 67.9 |
| D5 | 1.10 | 13.33 | 25.21 | | | |
| D13 | 9.54 | 2.72 | 1.10 | | | |
| D20 | 4.02 | 4.02 | 4.02 | 3.22 | 2.12 | 0.92 |
| D23 | 5.77 | 3.65 | 2.50 | 6.56 | 5.54 | 5.60 |
| D30 | 1.50 | 21.08 | 26.51 | | | |
| D32 | 14.00 | 14.00 | 14.00 | | | |

[Lens group data]

| | Group starting surface | Group focal length |
|---|---|---|
| First lens group | 1 | 90.94 |
| Second lens group | 6 | −16.97 |
| Third lens group | 14 | 23.60 |
| Fourth lens group | 24 | −40.81 |
| Fifth lens group | 31 | 173.99 |

[Conditional expression corresponding value]

| | |
|---|---|
| Conditional expression (JK1) | $|fF|/fM = 1.579$ |
| Conditional expression (JK2) | $(-fXn)/fM = 0.719$ |
| Conditional expression (JK3) | $dAB/|fF| = 0.108$ |
| Conditional expression (JK4) | $ndp + 0.0075 \times \nu dp - 2.175 = -0.080$ |
| Conditional expression (JK5) | $\nu dp = 67.02$ |
| Conditional expression (JL1) | $|(rB + rA)/(rB - rA)| = 20.533$ |
| Conditional expression (JL2) | $|fF|/fM = 1.579$ |
| Conditional expression (JL3) | $dAB/|fF| = 0.108$ |
| Conditional expression (JL4) | $(-fXn)/fM = 0.719$ |
| Conditional expression (JL5) | $ndp + 0.0075 \times \nu dp - 2.175 = -0.080$ |
| Conditional expression (JL6) | $\nu dp = 67.02$ |
| Conditional expression (JM1) | $dV/|fV| = 0.027$ |

TABLE 21-continued

| | |
|---|---|
| Conditional expression (JM2) | \|fF\|/fM = 1.579 |
| Conditional expression (JM3) | dAB/\|fF\| = 0.108 |
| Conditional expression (JM4) | (−fXn)/fM = 0.719 |
| Conditional expression (JM5) | ndp + 0.0075 × νdp − 2.175 = −0.080 |
| Conditional expression (JM6) | νdp = 67.02 |
| Conditional expression (JN1) | \|fF\|/fM = 1.579 |
| Conditional expression (JN2) | dV/\|fV\| = 0.027 |
| Conditional expression (JN3) | dAB/\|fF\| = 0.108 |
| Conditional expression (JN4) | (−fXn)/fM = 0.719 |
| Conditional expression (JN5) | ndp + 0.0075 × νdp − 2.175 = −0.080 |
| Conditional expression (JN6) | νdp = 67.02 |

It can be seen in Table 21 that the zoom optical system ZL21 according to this Example satisfies the conditional expressions (JK1) to (JK5), (JL1) to (JL6), (JM1) to (JM6), and (JN1) to (JN6).

Figure 101A:
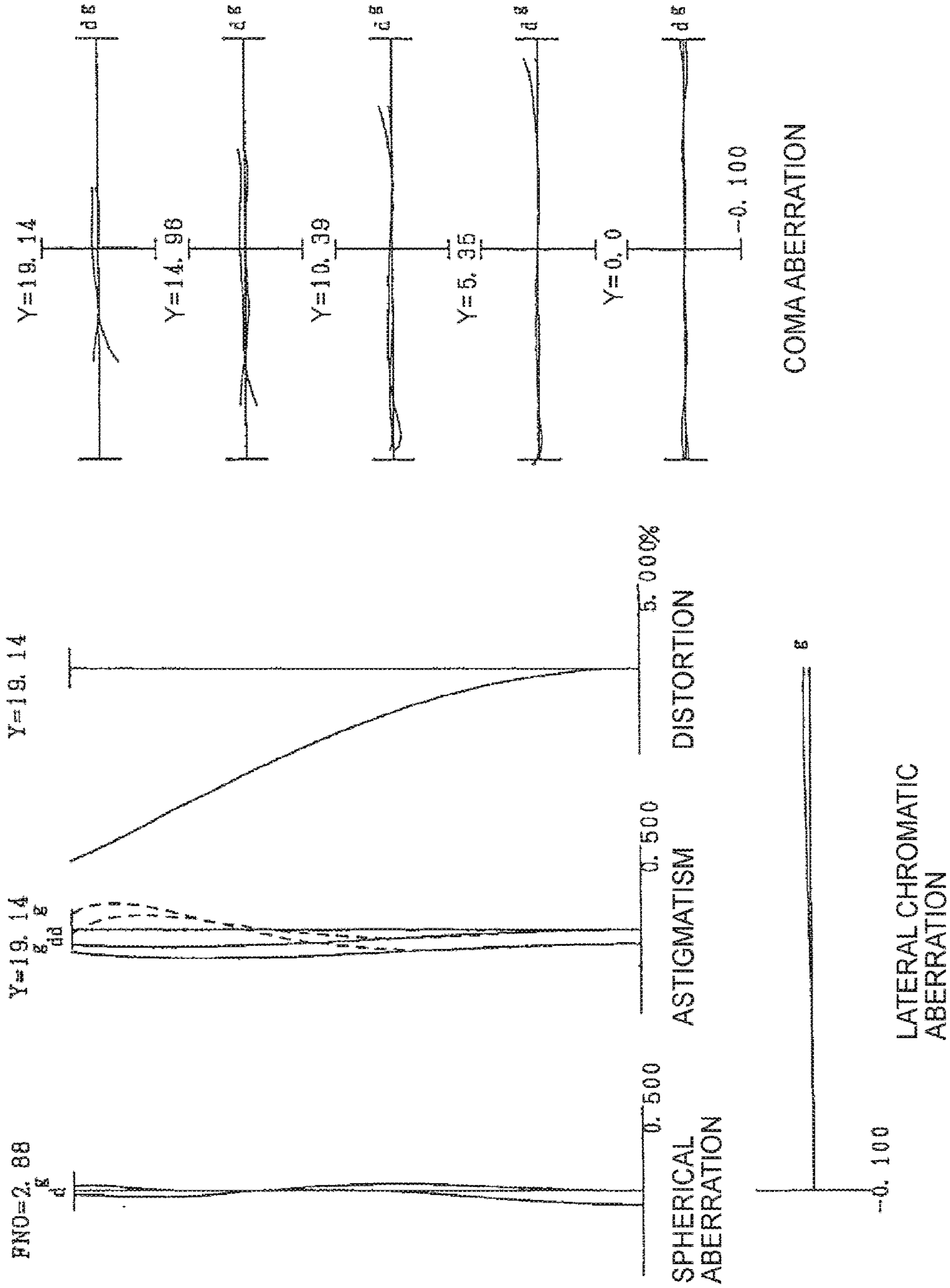
FIGS. 101A, 101B, and 101C are graphs showing various aberrations of the zoom optical system according to Example 21 upon focusing on infinity respectively in the wide angle end state, the intermediate focal length state, and the telephoto end state.
Figure 101B:
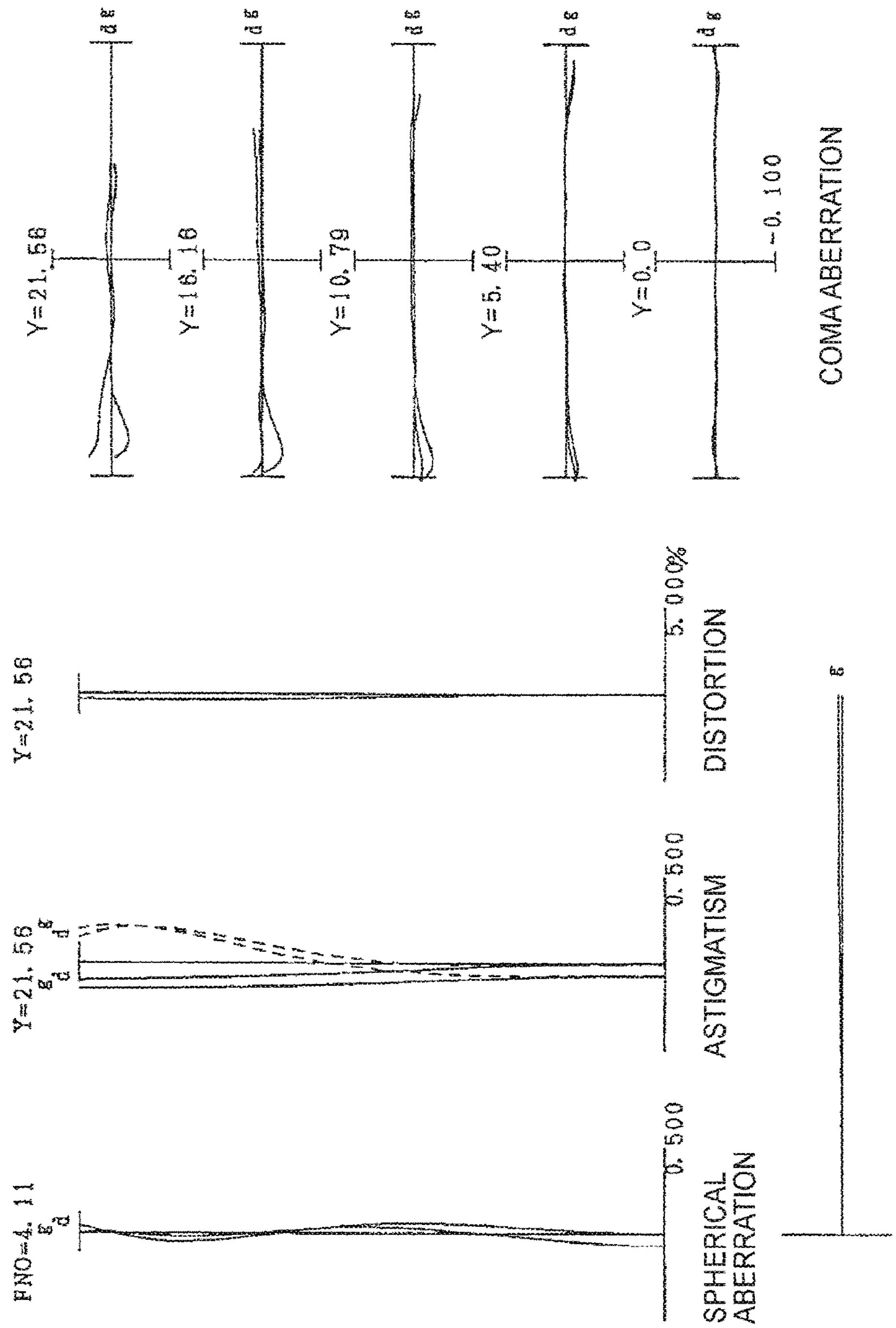
Figure 101C:
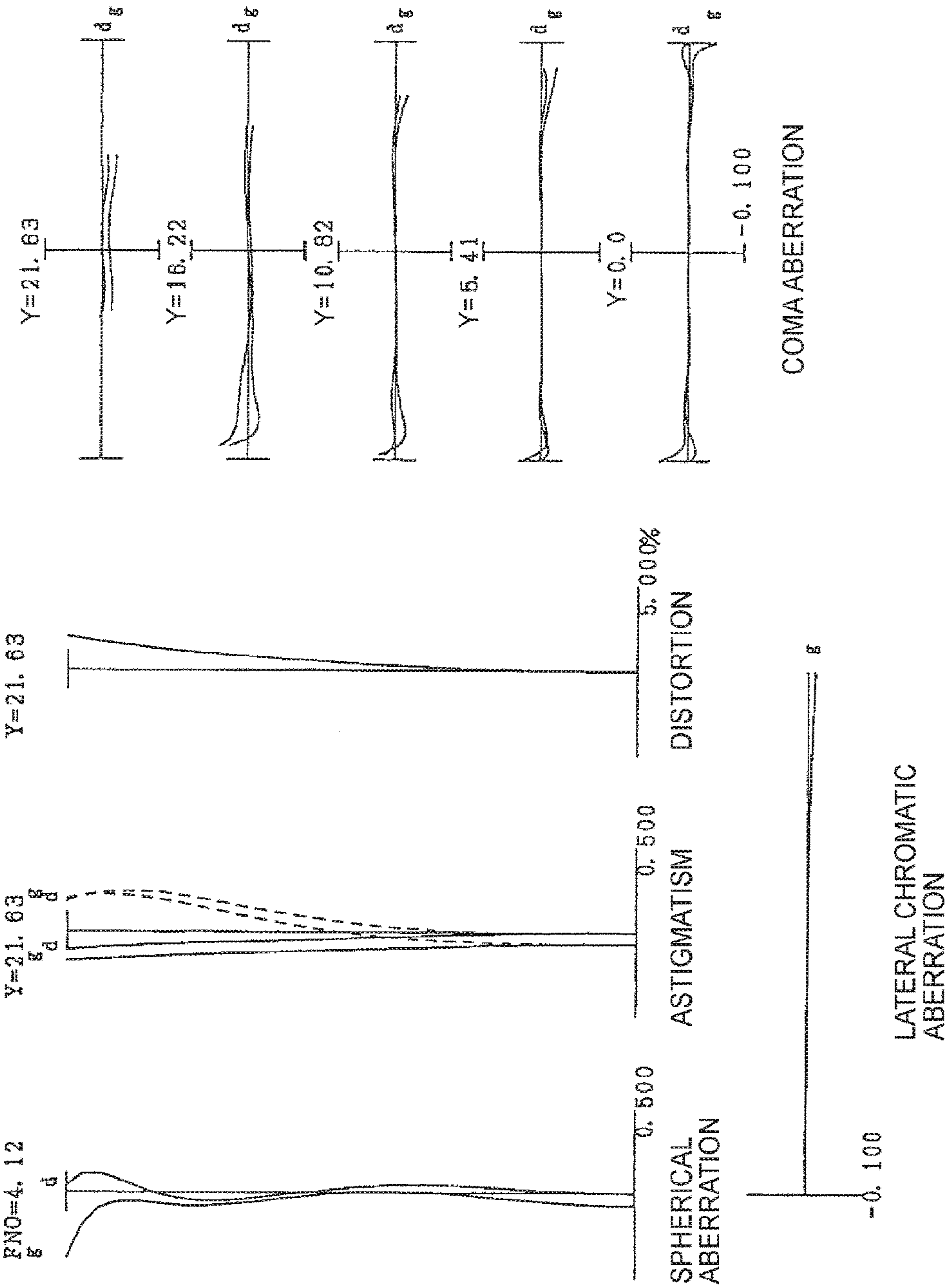
Figure 102A:
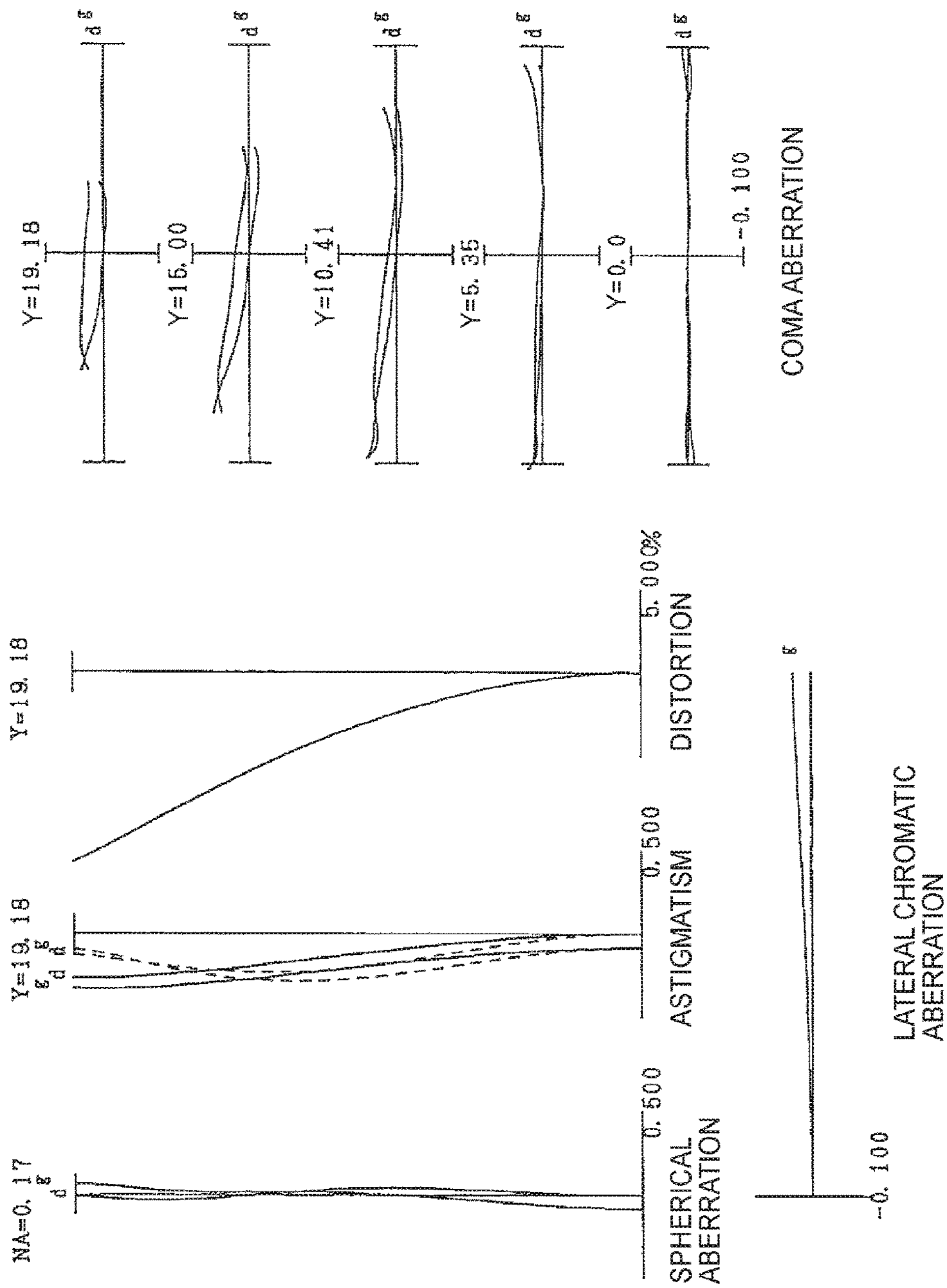
FIGS. 102A, 102B, and 102C are graphs showing various aberrations of the zoom optical system according to Example 21 upon focusing on a short distant object respectively in the wide angle end state, the intermediate focal length state, and the telephoto end state.
Figure 102B:
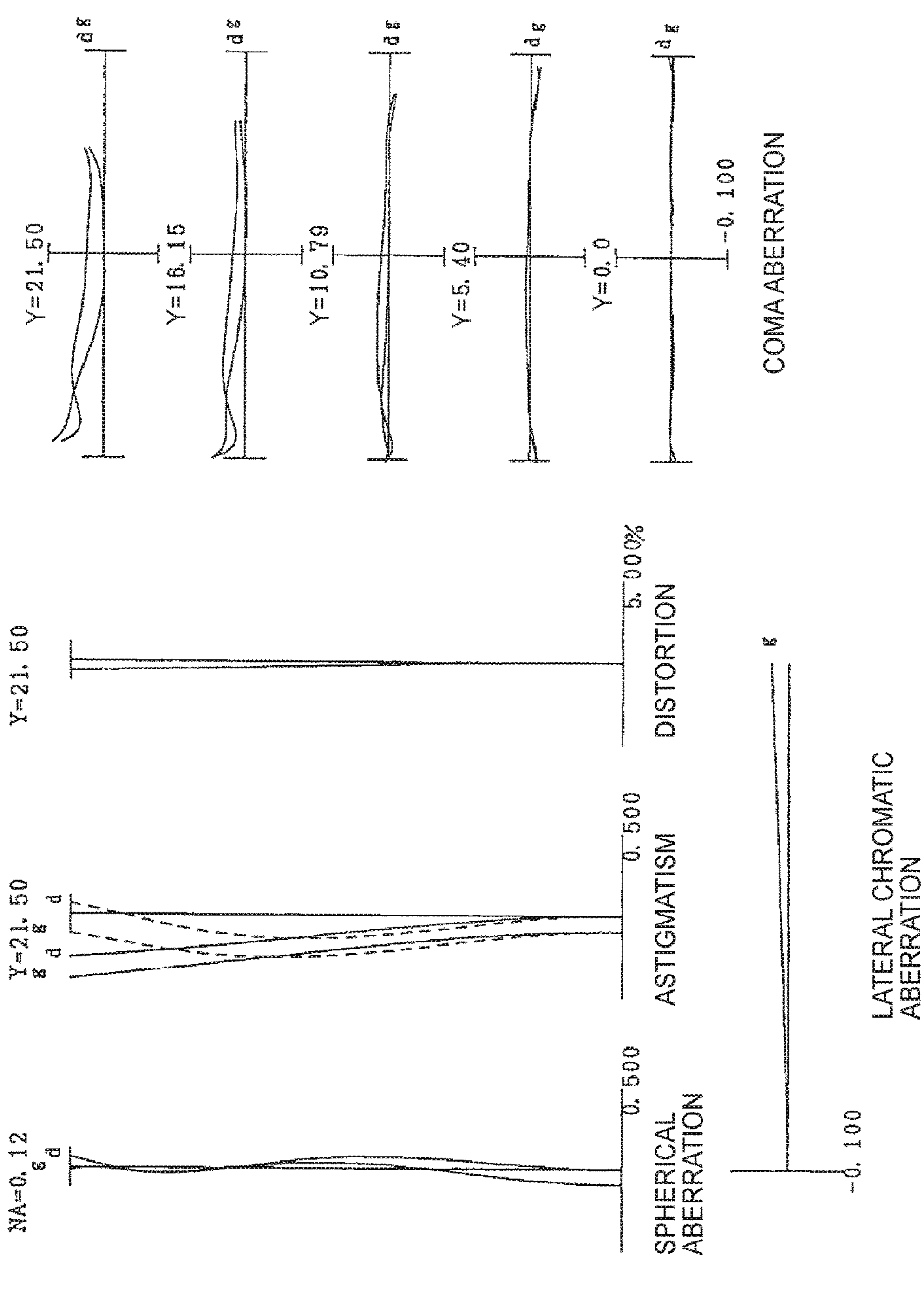
Figure 102C:
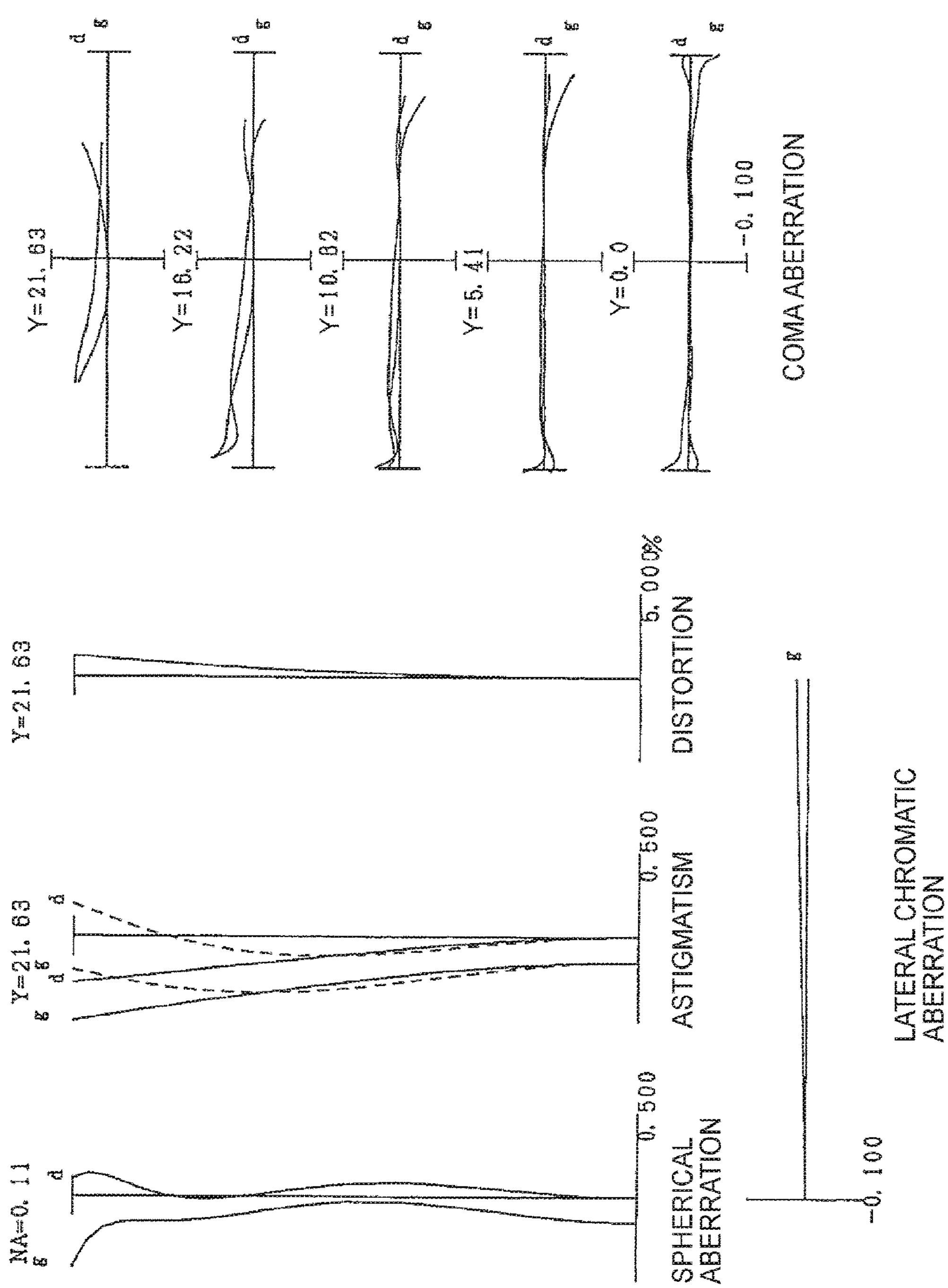
Figure 103A:
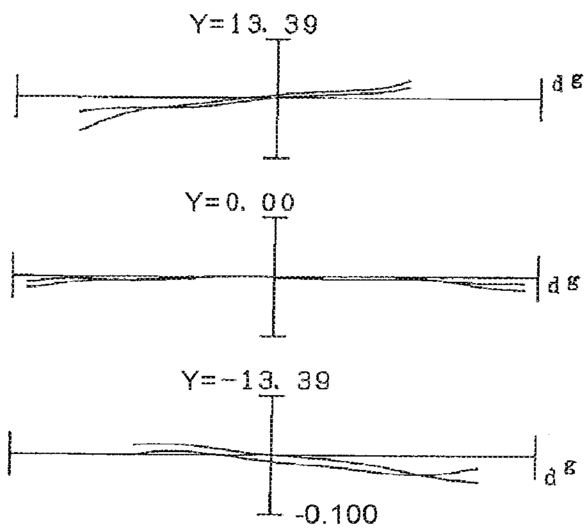
FIGS. 103A, 103B, and 103C are graphs showing coma aberrations of the zoom optical system according to Example 21 upon focusing on infinity with image blur correction performed, respectively in the wide angle end state, the intermediate focal length state, and the telephoto end state.
Figure 103B:
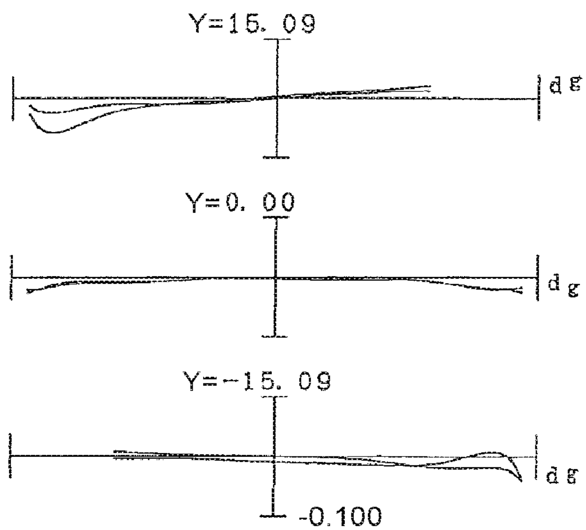
Figure 103C:
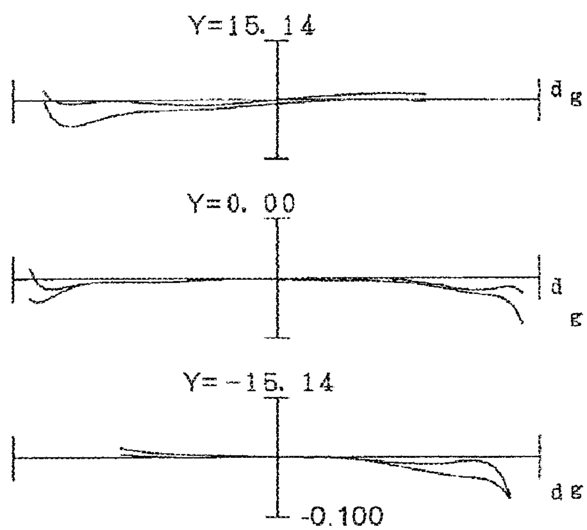

FIG. 101 is various aberration graphs (a spherical aberration graph, an astigmatism graph, a distortion graph, a lateral chromatic aberration graph, and a coma aberration graph) of the zoom optical system ZL21 according to Example 21 upon focusing on infinity with FIG. 101A corresponding to the wide angle end state, FIG. 101B corresponding to the intermediate focal length state, and FIG. 101C corresponding to the telephoto end state. FIG. 102 is various aberration graphs (a spherical aberration graph, an astigmatism graph, a distortion graph, a lateral chromatic aberration graph, and a coma aberration graph) of the zoom optical system ZL21 according to Example 21 upon focusing on a short distant object with FIG. 102A corresponding to the wide angle end state, FIG. 102B corresponding to the intermediate focal length state, and FIG. 102C corresponding to the telephoto end state. FIG. 103 is a coma aberration graph at the time of image blur correction for the zoom optical system ZL21 according to Example 21 upon focusing on infinity with FIG. 103A corresponding to the wide angle end state, FIG. 103B corresponding to the intermediate focal length state, and FIG. 103C corresponding to the telephoto end state.

It can be seen in the aberration graphs in FIG. 101 to FIG. 103 that the zoom optical system ZL21 according to Example 21 can achieve an excellent optical performance with various aberrations successfully corrected from the wide angle end state to the telephoto end state and from the infinity focusing state to the short-distant object focusing state. Furthermore, it can be seen that a high imaging performance can be achieved upon image blur correction.

Example 22

Figure 104:
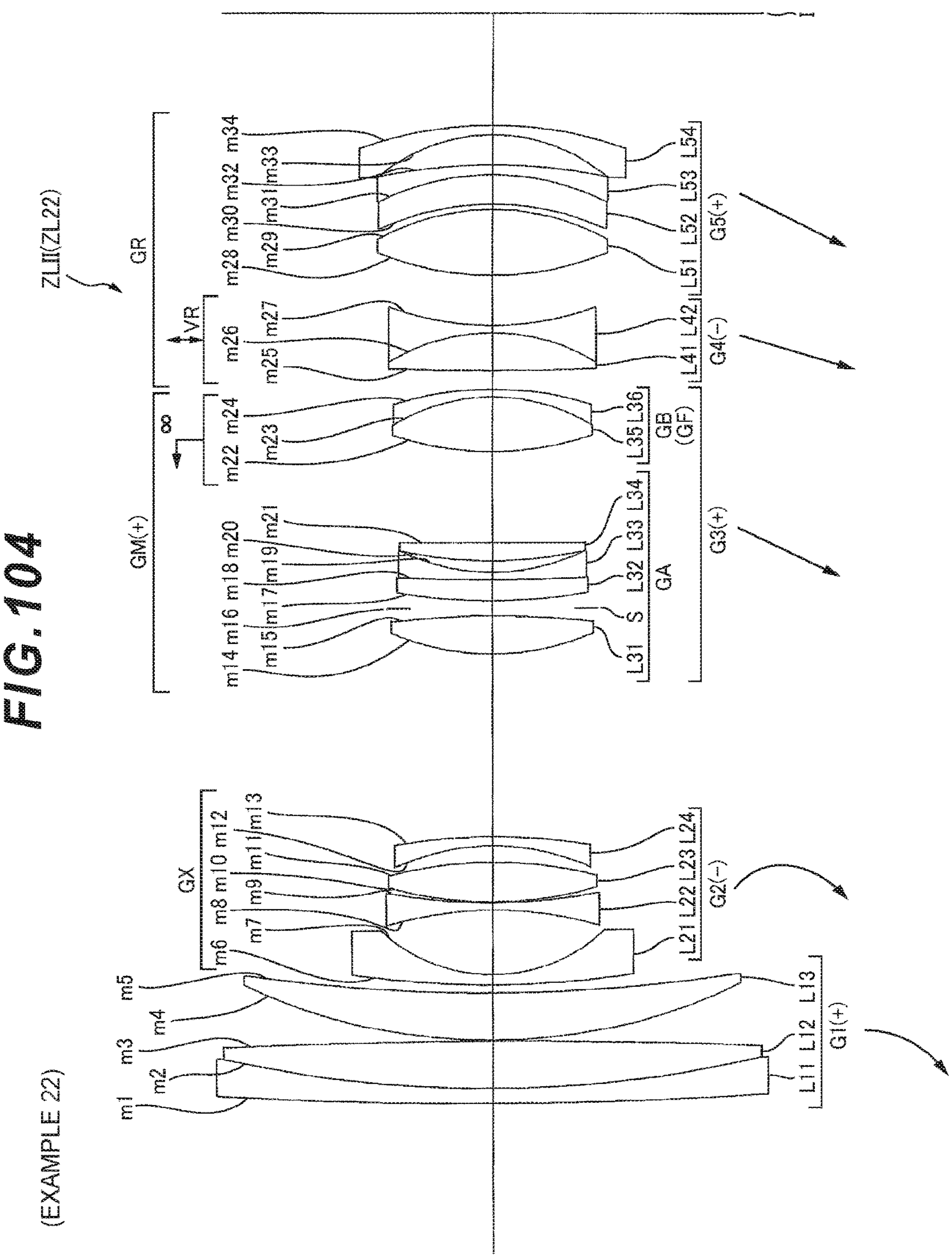
FIG. 104 is a cross-sectional view of a zoom optical system according to Example 22.

Example 22 is described with reference to FIG. 104 to FIG. 108 and Table 22. A zoom optical system ZLII (ZL22) according to Example 22 includes, as illustrated in FIG. 104, the first lens group G1 having positive refractive power, the second lens group G2 having negative refractive power, the third lens group G3 having positive refractive power, the fourth lens group G4 having negative refractive power, and the fifth lens group G5 having positive refractive power that are arranged in order from the object side.

The first lens group G1 includes: the cemented lens including the negative meniscus lens L11 having a concave surface facing the image side and the biconvex lens L12; and the positive meniscus lens L13 having a convex surface facing the object side that are arranged in order from the object side.

The second lens group G2 includes the negative meniscus lens L21 having a concave surface facing the image side, the biconcave lens L22, the biconvex lens L23, and the negative meniscus lens L24 having a concave surface facing the object side that are arranged in order from an object side. The biconcave lens L22 is a glass-molded aspherical lens with a lens surface, on the object side, having an aspherical shape.

The third lens group G3 includes the object side group GA and the image side group GB having positive refractive power that are arranged in order from the object side. The object side group GA includes: the biconvex lens L31; the aperture stop S; the cemented lens including the positive meniscus lens L32 having a convex surface facing the object side and the negative meniscus lens L33 having a concave surface facing the image side; and a plano-convex lens L34 having a convex surface facing the object side that are arranged in order from the object side. The image side group GB includes the cemented lens including the biconvex lens L35 and the negative meniscus lens L36 having a concave surface facing the object side. The biconvex lens L31 is a glass-molded aspherical lens with lens surfaces, on the object side and on the image surface side, having an aspherical shape. The biconvex lens L35 is a glass-molded aspherical lens with a lens surface, on the object side, having an aspherical shape.

The fourth lens group G4 includes a cemented lens including the biconvex lens L41 and the biconcave lens L42 arranged in order from the object side.

The fifth lens group G5 includes: the biconvex lens L51; the cemented lens including the positive meniscus lens L52 having a convex surface facing the image side and the negative meniscus lens L53 having a concave surface facing the object side; and the negative meniscus lens L54 having a concave surface facing the object side that are arranged in order from the object side.

The zooming from the wide angle end state to the telephoto end state is achieved with: the first lens group G1 moved toward the object side, the second lens group G2 moved toward the image surface side and then moved toward the object side, and the third lens group G3, the fourth lens group G4, and the fifth lens group G5 each moved toward the object side in such a manner that the distance between the first lens group G1 and the second lens group G2 increases, the distance between the second lens group G2 and the third lens group G3 decreases, the distance between the third lens group G3 and the fourth lens group G4 increases, and the distance between the fourth lens group G4 and the fifth lens group G5 decreases.

Focusing from infinity to the short-distant object is achieved with the image side group GB (=focusing lens group GF) forming the third lens group G3 moved toward the object side.

When image blur occurs, image blur correction (vibration isolation) on the image surface I is performed with the fourth lens group G4 serving as the vibration-proof lens group VR moved with a displacement component in the direction orthogonal to the optical axis. In Example 22, in the wide angle end state, the shifted amount of the vibration-proof lens group VR is −0.411 mm when the correction angle is 0.664°. In the intermediate focal length state, the shifted amount of the vibration-proof lens group VR is −0.410 mm when the correction angle is 0.469°. In the telephoto end state, the shifted amount of the vibration-proof lens group VR is −0.457 mm when the correction angle is 0.327°.

In Table 22 below, specification values in Example 22 are listed. Surface numbers 1 to 34 in Table 22 respectively correspond to the optical surfaces m1 to m34 in FIG. 104.

TABLE 22

[Lens specifications]

| Surface number | R | D | νd | nd |
|---|---|---|---|---|
| Obj surface | ∞ | | | |
| 1 | 524.4509 | 2.00 | 22.74 | 1.80809 |
| 2 | 136.5814 | 6.32 | 67.90 | 1.59319 |
| 3 | −713.0593 | 0.10 | | |
| 4 | 65.1416 | 6.39 | 54.61 | 1.72916 |
| 5 | 186.0464 | D5 (variable) | | |
| 6 | 108.5540 | 1.35 | 35.72 | 1.90265 |
| 7 | 18.6469 | 8.64 | | |
| *8 | −40.1904 | 1.00 | 51.16 | 1.75501 |
| 9 | 65.4869 | 0.10 | | |
| 10 | 43.0188 | 5.29 | 22.74 | 1.80809 |
| 11 | −46.1246 | 2.17 | | |
| 12 | −26.2743 | 1.20 | 58.12 | 1.62299 |
| 13 | −65.0579 | D13 (variable) | | |
| *14 | 27.5180 | 5.10 | 53.94 | 1.71300 |
| *15 | −84.3430 | 1.00 | | |
| 16 | ∞ | 1.00 | (aperture stop) | |
| 17 | 62.3923 | 2.81 | 82.57 | 1.49782 |
| 18 | 214.3713 | 1.00 | 35.72 | 1.90265 |
| 19 | 23.1110 | 1.60 | | |
| 20 | 49.5946 | 2.41 | 82.57 | 1.49782 |
| 21 | ∞ | D21 (variable) | | |
| *22 | 35.3414 | 7.32 | 67.02 | 1.59201 |
| 23 | −21.4664 | 1.00 | 23.80 | 1.84666 |
| 24 | −38.1772 | D24 (variable) | | |
| 25 | 319.0764 | 5.02 | 23.80 | 1.84666 |
| 26 | −22.4269 | 1.00 | 34.92 | 1.80100 |
| 27 | 33.3745 | D27 (variable) | | |
| 28 | 33.9494 | 8.88 | 81.56 | 1.49710 |
| 29 | −26.6215 | 0.73 | | |
| 30 | −30.2862 | 3.94 | 22.74 | 1.80809 |
| 31 | −28.5529 | 1.35 | 52.33 | 1.75500 |
| 32 | −61.3691 | 4.03 | | |
| 33 | −20.0622 | 1.30 | 54.61 | 1.72916 |
| 34 | −43.5447 | D34 (variable) | | |
| Img surface | ∞ | | | |

[Aspherical data]

| Surface number | κ | A4 | A6 | A8 | A10 |
|---|---|---|---|---|---|
| 8th surface | 0.00 | 3.38423E−06 | 2.84604E−09 | −1.31614E−11 | 1.46359E−13 |
| 14th surface | 0.00 | −4.98461E−06 | −5.66401E−10 | 1.28428E−11 | 0.00000E+00 |
| 15th surface | 0.00 | 6.02589E−06 | −9.27295E−09 | 6.23729E−11 | −1.21951E−13 |
| 22nd surface | 0.00 | −7.15516E−07 | 1.57972E−09 | −6.46596E−12 | 0.00000E+00 |

[Various data]

Zoom ratio 4.13

| | Wide angle end | | Intermediate | | Telephoto end |
|---|---|---|---|---|---|
| f | 24.7 | ~ | 49.5 | ~ | 102.0 |
| FNO | 2.9 | ~ | 3.7 | ~ | 4.1 |
| 2ω | 82.4 | ~ | 47.2 | ~ | 23.5 |
| Y | 19.1 | ~ | 21.5 | ~ | 21.6 |

TABLE 22-continued

| | | | | | |
|---|---|---|---|---|---|
| TL(air) | 146.1 | ~ | 161.6 | ~ | 194.8 |
| BF(air) | 14.9 | ~ | 30.2 | ~ | 43.4 |

[Variable distance data]

| | Upon focusing on infinity | | | Upon focusing on short distant object | | |
|---|---|---|---|---|---|---|
| | Wide angle end | Intermediate | Telephoto end | Wide angle end | Intermediate | Telephoto end |
| f | 24.7 | 49.5 | 102.0 | 24.7 | 49.5 | 102.0 |
| D5 | 1.10 | 17.10 | 44.71 | | | |
| D13 | 24.52 | 8.75 | 1.10 | | | |
| D21 | 12.24 | 12.24 | 12.24 | 11.44 | 9.69 | 1.62 |
| D24 | 2.50 | 6.02 | 6.72 | 3.31 | 8.58 | 17.34 |
| D27 | 6.72 | 3.20 | 2.50 | | | |
| D34 | 14.92 | 30.24 | 43.44 | | | |

[Lens group data]

| | Group starting surface | Group focal length |
|---|---|---|
| First lens group | 1 | 121.41 |
| Second lens group | 6 | −20.01 |
| Third lens group | 14 | 32.50 |
| Fourth lens group | 25 | −52.38 |
| Fifth lens group | 28 | 201.85 |

[Conditional expression corresponding value]

| | |
|---|---|
| Conditional expression(JK1) | $\lvert fF\rvert/fM = 1.174$ |
| Conditional expression(JK2) | $(-fXn)/fM = 0.616$ |
| Conditional expression(JK3) | $dAB/\lvert fF\rvert = 0.321$ |
| Conditional expression(JK4) | $ndp + 0.0075 \times \nu dp - 2.175 = -0.080$ |
| Conditional expression(JK5) | $\nu dp = 67.02$ |
| Conditional expression(JM1) | $dV/\lvert fV\rvert = 0.048$ |
| Conditional expression(JM2) | $\lvert fF\rvert/fM = 1.174$ |
| Conditional expression(JM3) | $dAB/\lvert fF\rvert = 0.321$ |
| Conditional expression(JM4) | $(-fXn)/fM = 0.616$ |
| Conditional expression(JM5) | $ndp + 0.0075 \times \nu dp - 2.175 = -0.080$ |
| Conditional expression(JM6) | $\nu dp = 67.02$ |
| Conditional expression(JN1) | $\lvert fF\rvert/fM = 1.174$ |
| Conditional expression(JN2) | $dV/\lvert fV\rvert = 0.048$ |
| Conditional expression(JN3) | $dAB/\lvert fF\rvert = 0.321$ |
| Conditional expression(JN4) | $(-fXn)/fM = 0.616$ |
| Conditional expression(JN5) | $ndp + 0.0075 \times \nu dp - 2.175 = -0.080$ |
| Conditional expression(JN6) | $\nu dp = 67.02$ |

It can be seen in Table 22 that the zoom optical system ZL22 according to this Example satisfies the conditional expressions (JK1) to (JK5), (JM1) to (JM6), and (JN1) to (JN6).

Figure 105A:
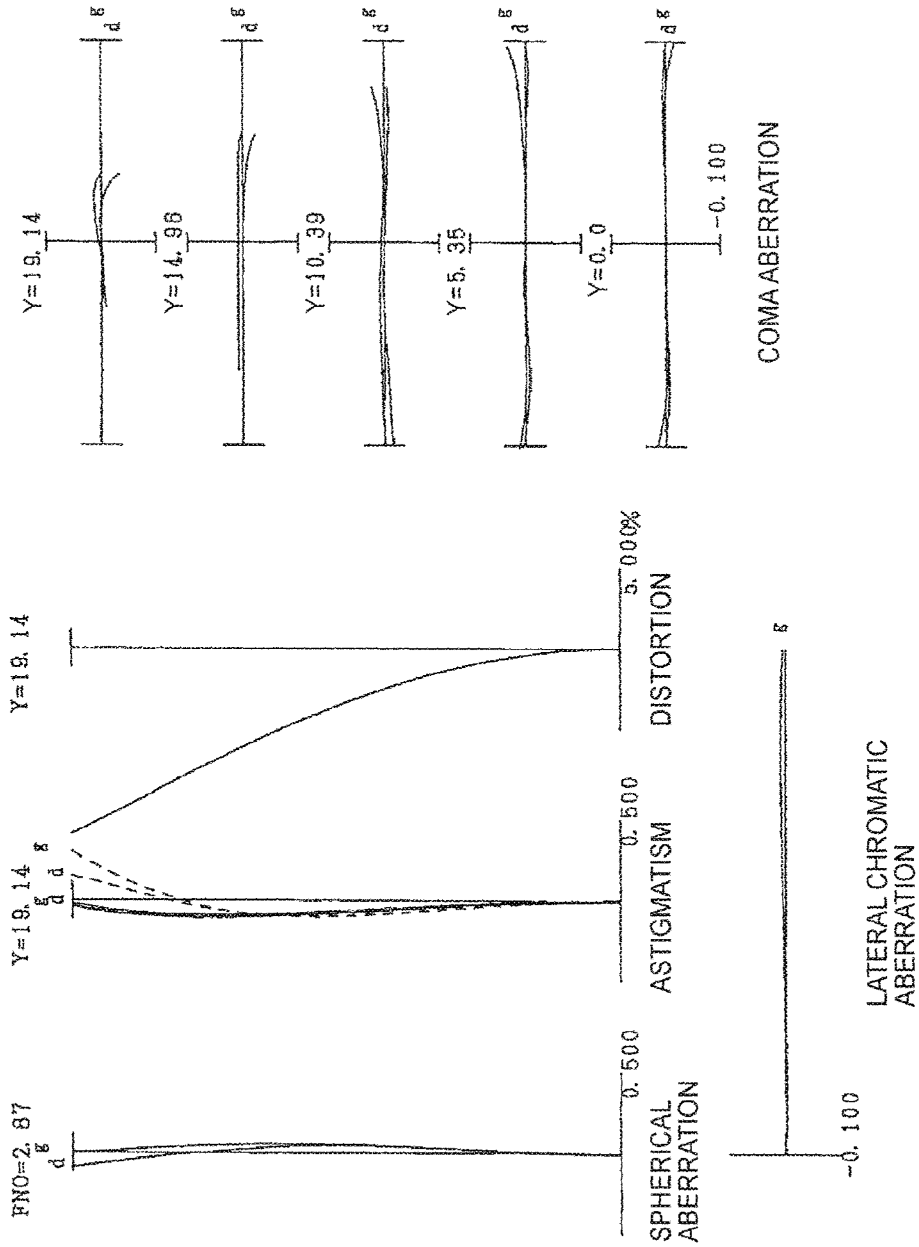
FIGS. 105A, 105B, and 105C are graphs showing various aberrations of the zoom optical system according to Example 22 upon focusing on infinity respectively in the wide angle end state, the intermediate focal length state, and the telephoto end state.
Figure 105B:
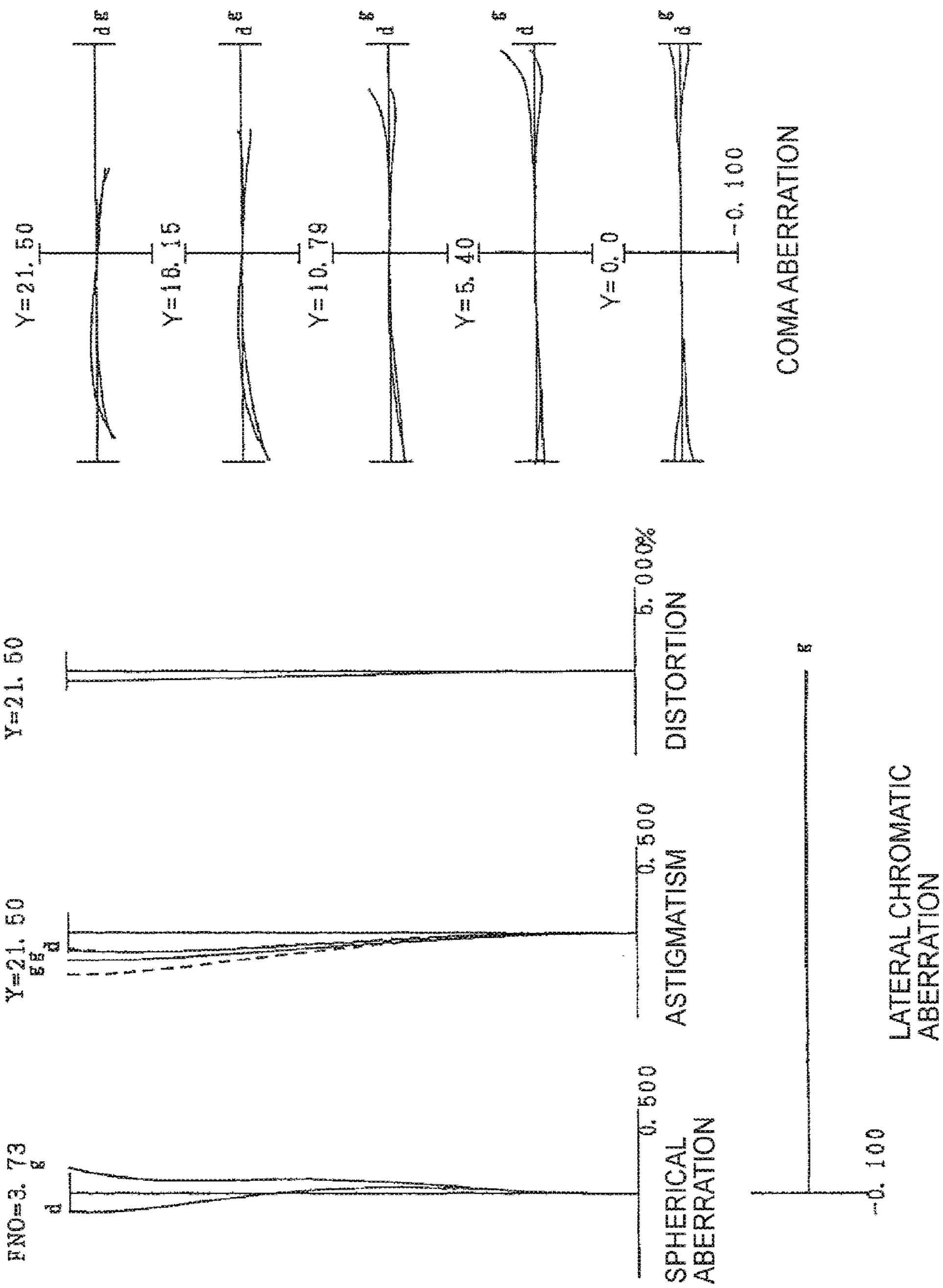
Figure 105C:
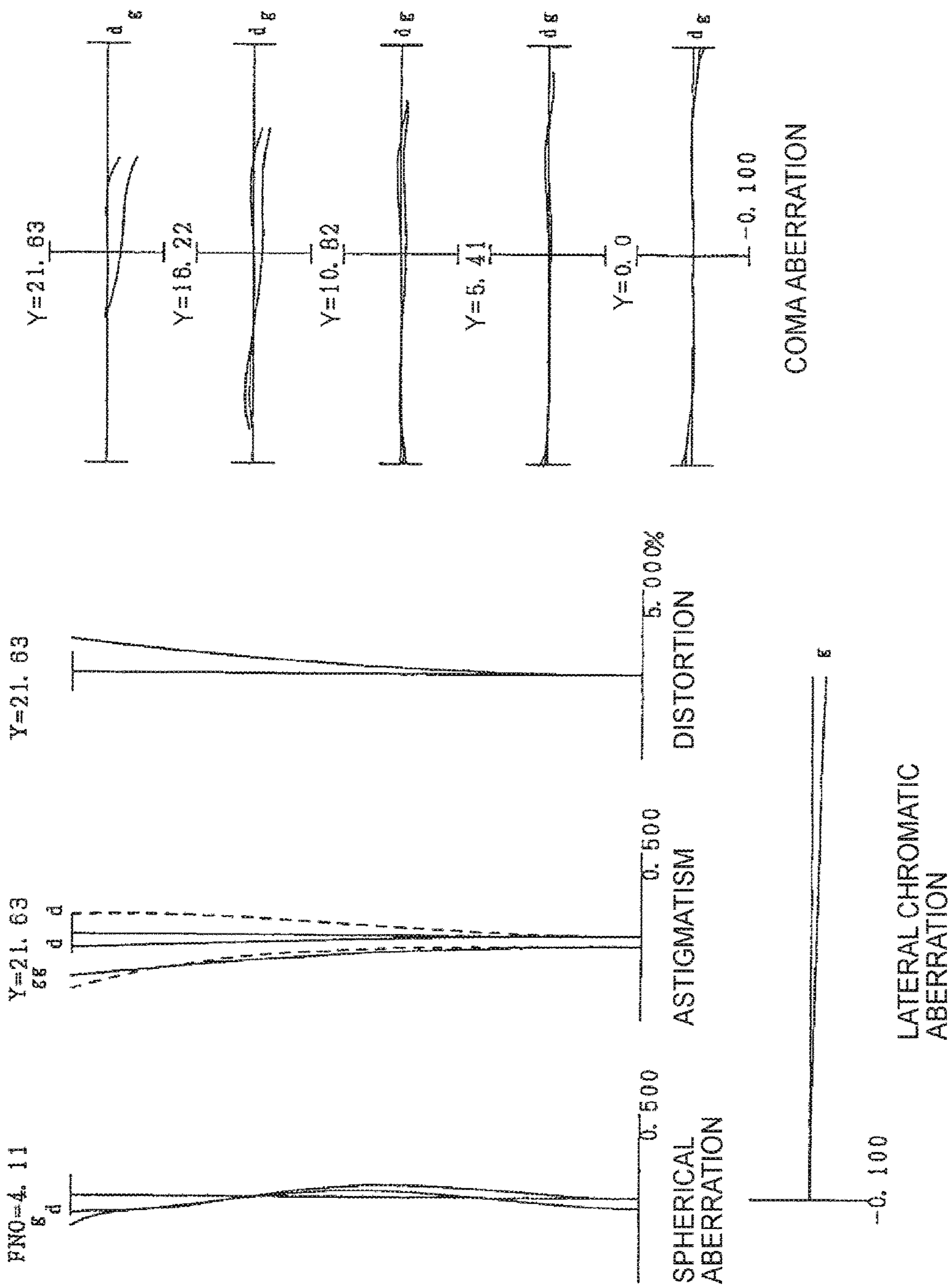
Figure 106A:
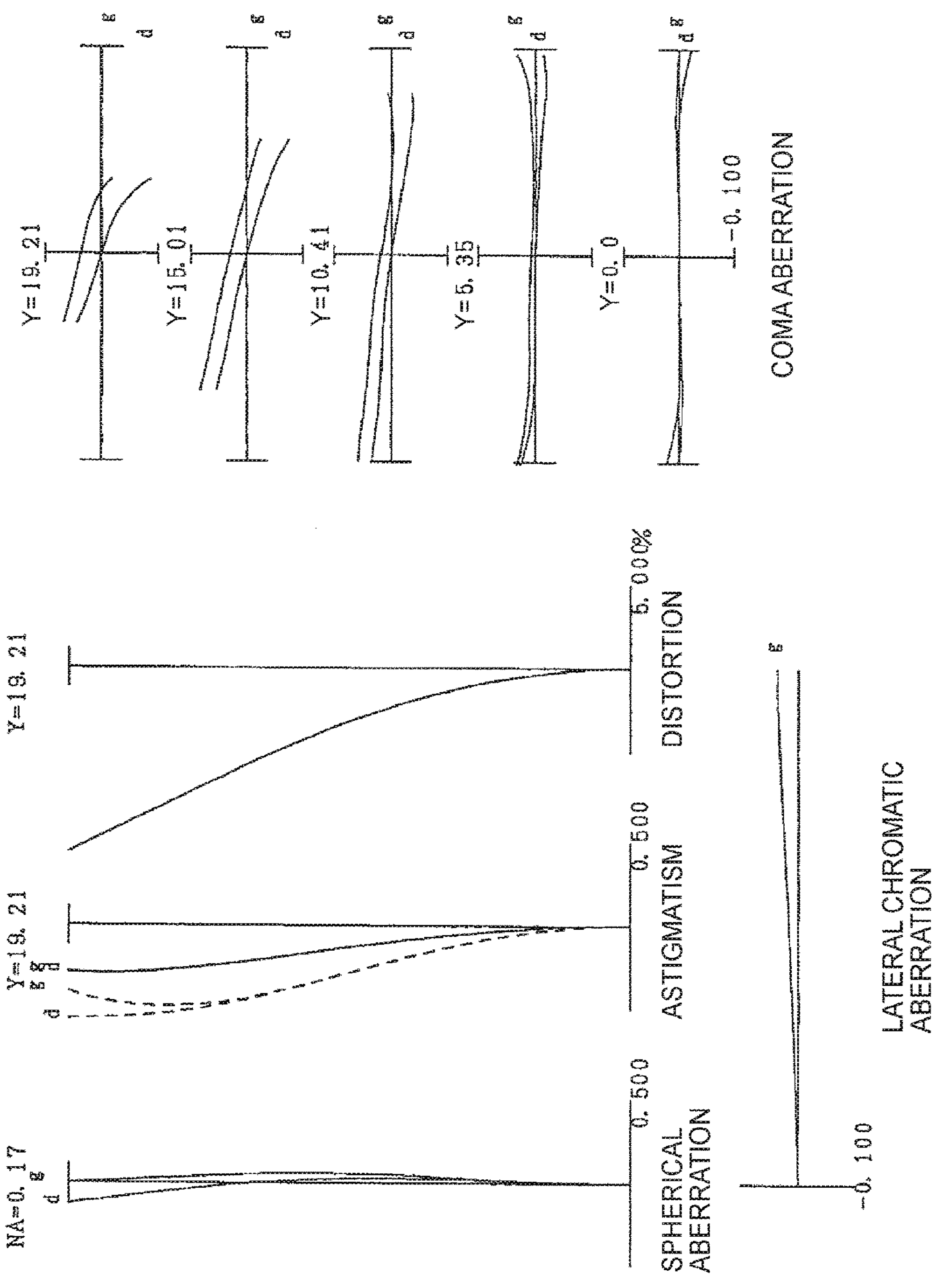
FIGS. 106A, 106B, and 106C are graphs showing various aberrations of the zoom optical system according to Example 22 upon focusing on a short distant object respectively in the wide angle end state, the intermediate focal length state, and the telephoto end state.
Figure 106B:
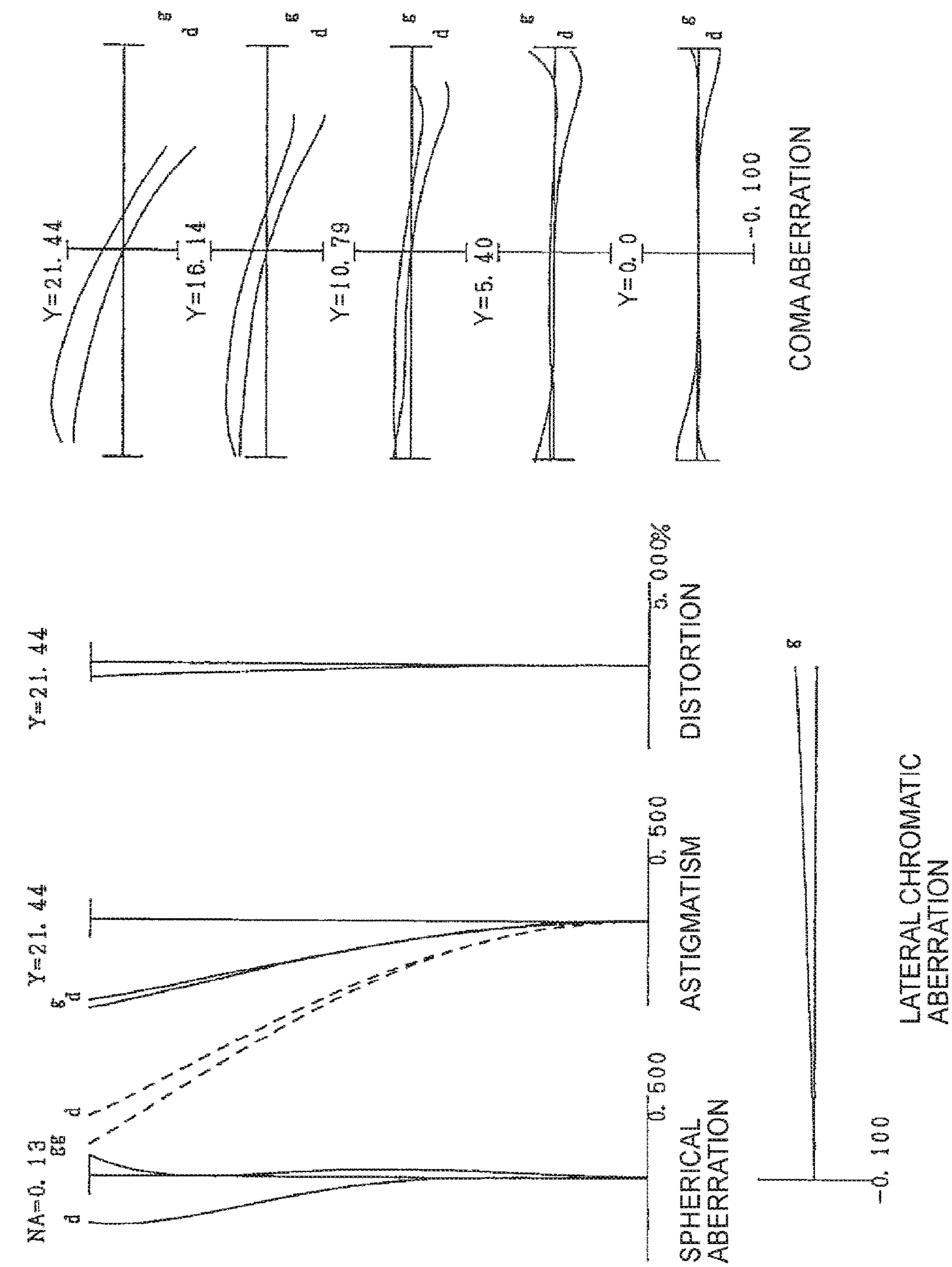
Figure 106C:
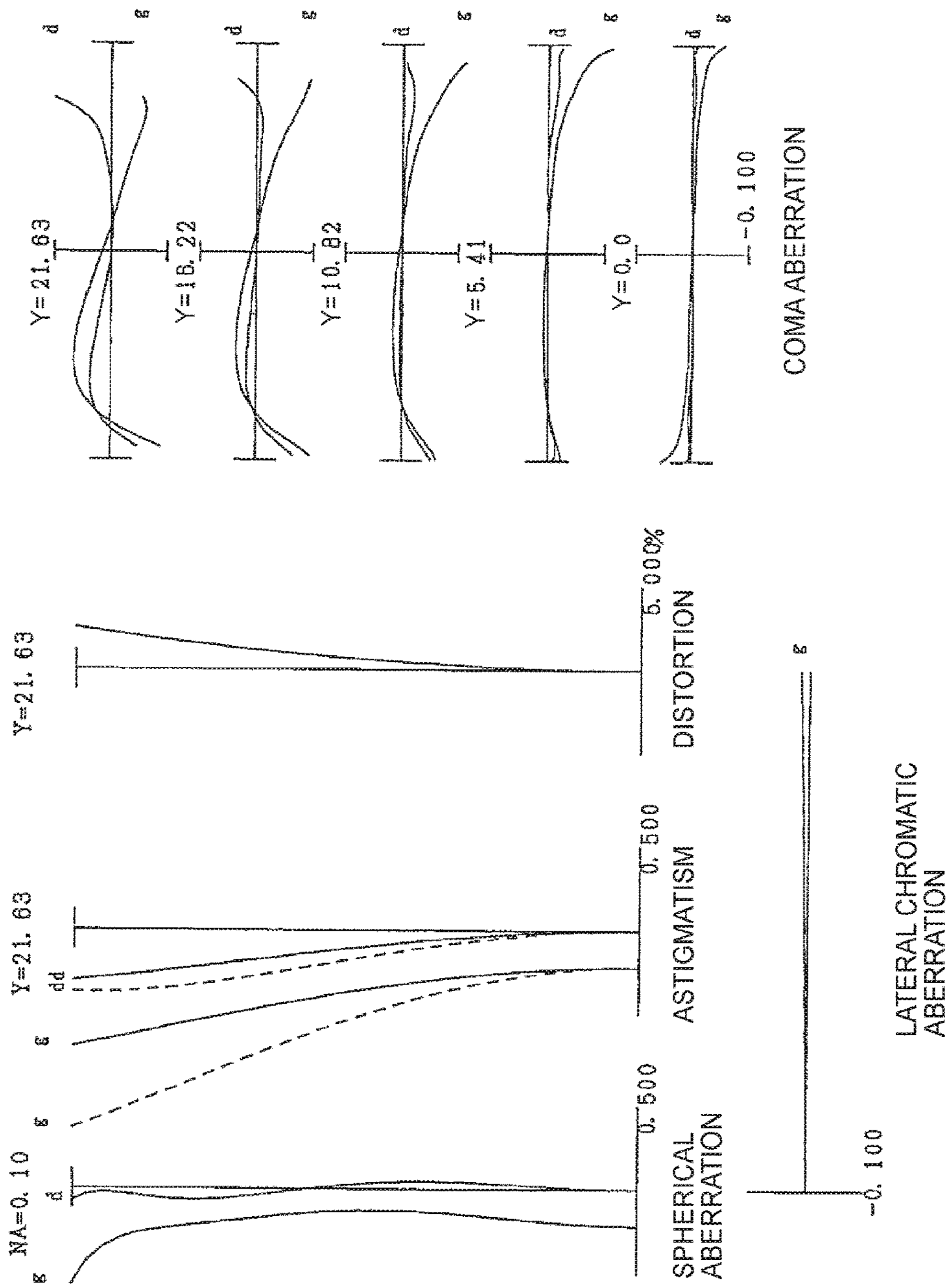
Figure 107A:
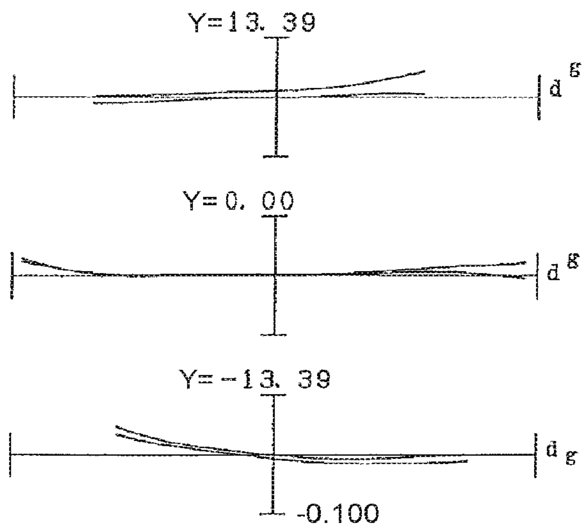
FIGS. 107A, 107B, and 107C are graphs showing coma aberrations of the zoom optical system according to Example 22 upon focusing on infinity with image blur correction performed, respectively in the wide angle end state, the intermediate focal length state, and the telephoto end state.
Figure 107B:
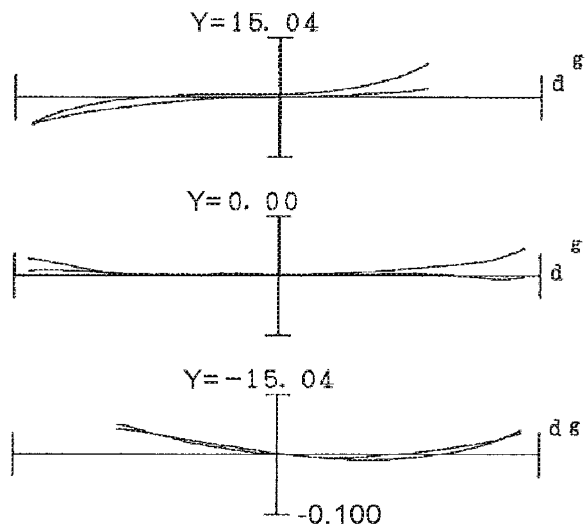
Figure 107C:
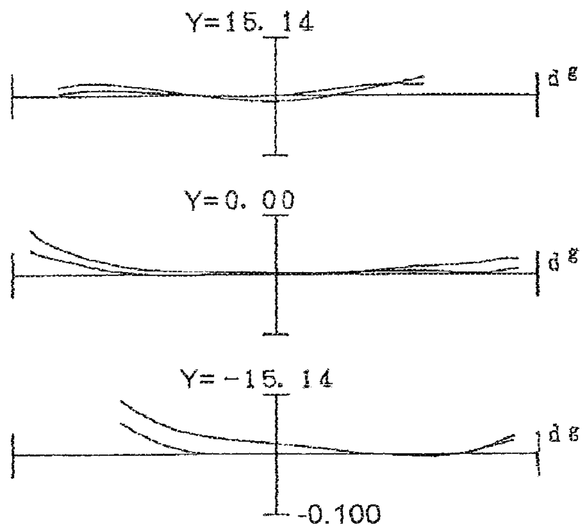

FIG. 105 is various aberration graphs (a spherical aberration graph, an astigmatism graph, a distortion graph, a lateral chromatic aberration graph, and a coma aberration graph) of the zoom optical system ZL22 according to Example 22 upon focusing on infinity with FIG. 105A corresponding to the wide angle end state, FIG. 105B corresponding to the intermediate focal length state, and FIG. 105C corresponding to the telephoto end state. FIG. 106 is various aberration graphs (a spherical aberration graph, an astigmatism graph, a distortion graph, a lateral chromatic aberration graph, and a coma aberration graph) of the zoom optical system ZL22 according to Example 22 upon focusing on a short distant object with FIG. 106A corresponding to the wide angle end state, FIG. 106B corresponding to the intermediate focal length state, and FIG. 106C corresponding to the telephoto end state. FIG. 107 is a coma aberration graph at the time of image blur correction for the zoom optical system ZL22 according to Example 22 upon focusing on infinity with FIG. 107A corresponding to the wide angle end state, FIG. 107B corresponding to the intermediate focal length state, and FIG. 107C corresponding to the telephoto end state.

It can be seen in the aberration graphs in FIG. 105 to FIG. 107 that the zoom optical system ZL22 according to Example 22 can achieve an excellent optical performance with various aberrations successfully corrected from the wide angle end state to the telephoto end state and from the infinity focusing state to the short-distant object focusing state. Furthermore, it can be seen that a high imaging performance can be achieved upon image blur correction.

Example 23

Figure 108:
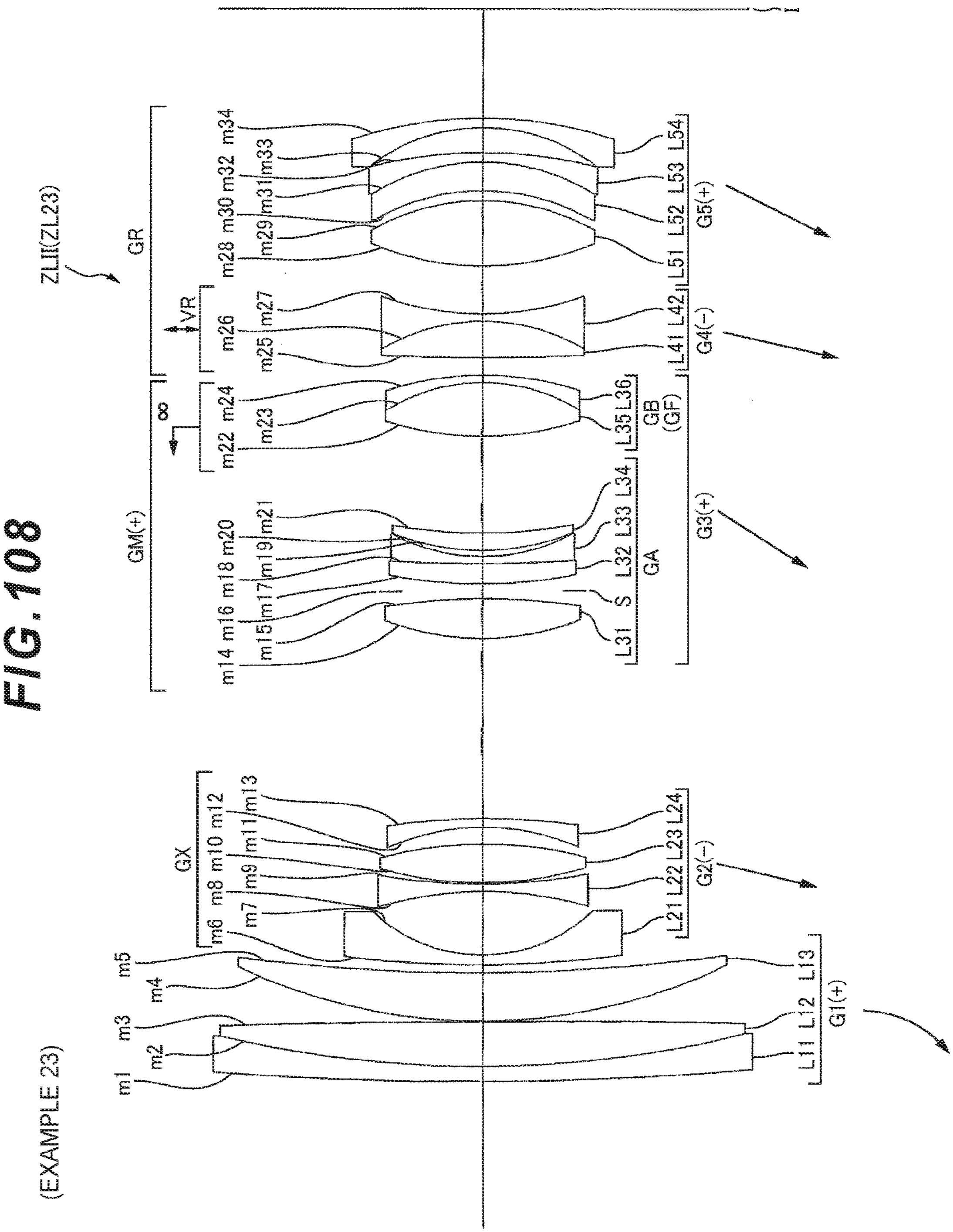
FIG. 108 is a cross-sectional view of a zoom optical system according to Example 23.

Example 23 is described with reference to FIG. 108 to FIG. 111 and Table 23. A zoom optical system ZLII (ZL23) according to Example 23 includes, as illustrated in FIG. 108, the first lens group G1 having positive refractive power, the second lens group G2 having negative refractive power, the third lens group G3 having positive refractive power, the fourth lens group G4 having negative refractive power, and the fifth lens group G5 having positive refractive power that are arranged in order from the object side.

The first lens group G1 includes: the cemented lens including the negative meniscus lens L11 having a concave surface facing the image side and the biconvex lens L12; and the positive meniscus lens L13 having a convex surface facing the object side that are arranged in order from the object side.

The second lens group G2 includes the negative meniscus lens L21 having a concave surface facing the image side, the biconcave lens L22, the biconvex lens L23, and the negative meniscus lens L24 having a concave surface facing the object side that are arranged in order from an object side. The biconcave lens L22 is a glass-molded aspherical lens with a lens surface, on the object side, having an aspherical shape.

The third lens group G3 includes the object side group GA and the image side group GB having positive refractive power that are arranged in order from the object side. The object side group GA includes: the biconvex lens L31; the aperture stop S; the cemented lens including the positive meniscus lens L32 having a convex surface facing the object side and the negative meniscus lens L33 having a concave surface facing the image side; and a positive meniscus lens L34 having a convex surface facing the object side that are arranged in order from the object side. The image side group GB includes the cemented lens including the biconvex lens L35 and the negative meniscus lens L36 having a concave surface facing the object side. The biconvex lens L31 is a glass-molded aspherical lens with lens surfaces, on the object side and on the image surface side, having an aspherical shape. The biconvex lens L35 is a glass-molded aspherical lens with a lens surface, on the object side, having an aspherical shape.

The fourth lens group G4 includes a cemented lens including the biconvex lens L41 and the biconcave lens L42 arranged in order from the object side.

The fifth lens group G5 includes: the biconvex lens L51; the cemented lens including the positive meniscus lens L52 having a convex surface facing the image side and the negative meniscus lens L53 having a concave surface facing the object side; and the negative meniscus lens L54 having a concave surface facing the object side that are arranged in order from the object side.

The zooming from the wide angle end state to the telephoto end state is achieved with: the first lens group G1, the second lens group G2, the third lens group G3, the fourth lens group G4, and the fifth lens group G5 each moved toward the object side in such a manner that the distance between the first lens group G1 and the second lens group G2 increases, the distance between the second lens group G2 and the third lens group G3 decreases, the distance between the third lens group G3 and the fourth lens group G4 increases, and the distance between the fourth lens group G4 and the fifth lens group G5 decreases.

Focusing from infinity to the short-distant object is achieved with the image side group GB (=focusing lens group GF) forming the third lens group G3 moved toward the object side.

When image blur occurs, image blur correction (vibration isolation) on the image surface I is performed with the fourth lens group G4 serving as the vibration-proof lens group VR moved with a displacement component in the direction orthogonal to the optical axis. In Example 23, in the wide angle end state, the shifted amount of the vibration-proof lens group VR is −0.421 mm when the correction angle is 0.664°. In the intermediate focal length state, the shifted amount of the vibration-proof lens group VR is −0.397 mm when the correction angle is 0.469°. In the telephoto end state, the shifted amount of the vibration-proof lens group VR is −0.464 mm when the correction angle is 0.327°.

In Table 23 below, specification values in Example 23 are listed. Surface numbers 1 to 34 in Table 23 respectively correspond to the optical surfaces m1 to m34 in FIG. 108.

TABLE 23

[Lens specifications]

| Surface number | R | D | νd | nd |
|---|---|---|---|---|
| Obj surface | ∞ | | | |
| 1 | 397.6225 | 2.00 | 22.74 | 1.80809 |
| 2 | 126.6607 | 6.12 | 67.90 | 1.59319 |
| 3 | −1629.7121 | 0.10 | | |
| 4 | 66.2175 | 6.51 | 54.61 | 1.72916 |
| 5 | 204.9442 | D5 (variable) | | |
| 6 | 119.6650 | 1.35 | 35.72 | 1.90265 |
| 7 | 18.8679 | 8.64 | | |
| *8 | −41.4130 | 1.00 | 51.16 | 1.75501 |
| 9 | 67.3512 | 0.19 | | |
| 10 | 43.6021 | 5.30 | 22.74 | 1.80809 |
| 11 | −47.3970 | 2.28 | | |
| 12 | −27.7631 | 1.20 | 58.12 | 1.62299 |
| 13 | −74.8409 | D13 (variable) | | |
| *14 | 30.2719 | 5.48 | 53.94 | 1.71300 |
| *15 | −65.5930 | 1.00 | | |
| 16 | ∞ | 1.00 | (aperture stop) | |
| 17 | 58.3076 | 2.76 | 82.57 | 1.49782 |
| 18 | 153.8064 | 1.00 | 35.72 | 1.90265 |
| 19 | 22.3628 | 0.82 | | |
| 20 | 28.2979 | 2.36 | 82.57 | 1.49782 |
| 21 | 60.0000 | D21 (variable) | | |
| *22 | 35.7069 | 7.36 | 67.02 | 1.59201 |
| 23 | −21.0000 | 1.00 | 23.80 | 1.84666 |
| 24 | −36.3549 | D24 (variable) | | |
| 25 | 333.6098 | 4.93 | 23.80 | 1.84666 |
| 26 | −23.0108 | 1.00 | 34.92 | 1.80100 |

TABLE 23-continued

| | | | | |
|---|---|---|---|---|
| 27 | 34.3183 | D27 (variable) | | |
| 28 | 33.2532 | 8.91 | 81.56 | 1.49710 |
| 29 | −26.1918 | 1.34 | | |
| 30 | −25.2656 | 3.92 | 22.74 | 1.80809 |
| 31 | −24.0934 | 1.35 | 52.33 | 1.75500 |
| 32 | −50.9794 | 3.37 | | |
| 33 | −21.5738 | 1.30 | 54.61 | 1.72916 |
| 34 | −47.3035 | D34 (variable) | | |
| Img surface | ∞ | | | |

[Aspherical data]

| Surface number | κ | A4 | A6 | A8 | A10 |
|---|---|---|---|---|---|
| 8th surface | 0.00 | 3.02942E−06 | −2.29162E−09 | 1.69922E−11 | 2.36654E−14 |
| 14th surface | 0.00 | −4.74032E−06 | 1.79300E−09 | 2.08922E−11 | 0.00000E+00 |
| 15th surface | 0.00 | 6.90940E−06 | −9.71049E−09 | 7.91702E−11 | −1.50000E−13 |
| 22nd surface | 0.00 | −7.40532E−07 | 1.38738E−09 | −6.12998E−12 | 0.00000E+00 |

[Various data]

Zoom ratio 4.13

| | Wide angle end | | Intermediate | | Telephoto end |
|---|---|---|---|---|---|
| f | 24.7 | ~ | 49.5 | ~ | 102.0 |
| FNO | 2.9 | ~ | 3.9 | ~ | 4.1 |
| 2ω | 82.4 | ~ | 47.2 | ~ | 23.5 |
| Y | 19.1 | ~ | 21.4 | ~ | 21.6 |
| TL(air) | 146.4 | ~ | 159.9 | ~ | 195.1 |
| BF(air) | 14.9 | ~ | 32.8 | ~ | 43.9 |

[Variable distance data]

| | Upon focusing on infinity | | | Upon focusing on short distant object | | |
|---|---|---|---|---|---|---|
| | Wide angle end | Intermediate | Telephoto end | Wide angle end | Intermediate | Telephoto end |
| f | 24.7 | 49.5 | 102.0 | 24.7 | 49.5 | 102.0 |
| D5 | 1.10 | 13.06 | 44.28 | | | |
| D13 | 24.59 | 8.18 | 1.10 | | | |
| D21 | 13.15 | 13.15 | 13.15 | 12.34 | 10.61 | 1.63 |
| D24 | 2.50 | 5.87 | 6.56 | 3.31 | 8.42 | 18.08 |
| D27 | 6.56 | 3.19 | 2.50 | | | |
| D34 | 14.92 | 32.82 | 43.94 | | | |

[Lens group data]

| | Group starting surface | Group focal length |
|---|---|---|
| First lens group | 1 | 120.70 |
| Second lens group | 6 | −19.97 |
| Third lens group | 14 | 32.84 |
| Fourth lens group | 25 | −53.72 |
| Fifth lens group | 28 | 218.02 |

[Conditional expression corresponding value]

| | |
|---|---|
| Conditional expression(JK1) | $\|fF\|/fM = 1.135$ |
| Conditional expression(JK2) | $(-fXn)/fM = 0.608$ |
| Conditional expression(JK3) | $dAB/\|fF\| = 0.353$ |
| Conditional expression(JK4) | $ndp + 0.0075 \times \nu dp - 2.175 = -0.080$ |
| Conditional expression(JK5) | $\nu dp = 67.02$ |
| Conditional expression(JL1) | $\|(rB + rA)/(rB - rA)\| = 3.940$ |
| Conditional expression(JL2) | $\|fF\|/fM = 1.135$ |
| Conditional expression(JL3) | $dAB/\|fF\| = 0.353$ |
| Conditional expression(JL4) | $(-fXn)/fM = 0.608$ |
| Conditional expression(JL5) | $ndp + 0.0075 \times \nu dp - 2.175 = -0.080$ |
| Conditional expression(JL6) | $\nu dp = 67.02$ |
| Conditional expression(JM1) | $dV/\|fV\| = 0.047$ |

TABLE 23-continued

| | |
|---|---|
| Conditional expression(JM2) | \|fF\|/fM = 1.135 |
| Conditional expression(JM3) | dAB/\|fF\| = 0.353 |
| Conditional expression(JM4) | (−fXn)/fM = 0.608 |
| Conditional expression(JM5) | ndp + 0.0075 × νdp − 2.175 = −0.080 |
| Conditional expression(JM6) | νdp = 67.02 |
| Conditional expression(JN1) | \|fF\|/fM = 1.135 |
| Conditional expression(JN2) | dV/\|fV\| = 0.047 |
| Conditional expression(JN3) | dAB/\|fF\| = 0.353 |
| Conditional expression(JN4) | (−fXn)/fM = 0.608 |
| Conditional expression(JN5) | ndp + 0.0075 × νdp − 2.175 = −0.080 |
| Conditional expression(JN6) | νdp = 67.02 |

It can be seen in Table 23 that the zoom optical system ZL23 according to this Example satisfies the conditional expressions (JK1) to (JK5), (JL1) to (JL6), (JM1) to (JM6), and (JN1) to (JN6).

Figure 109A:
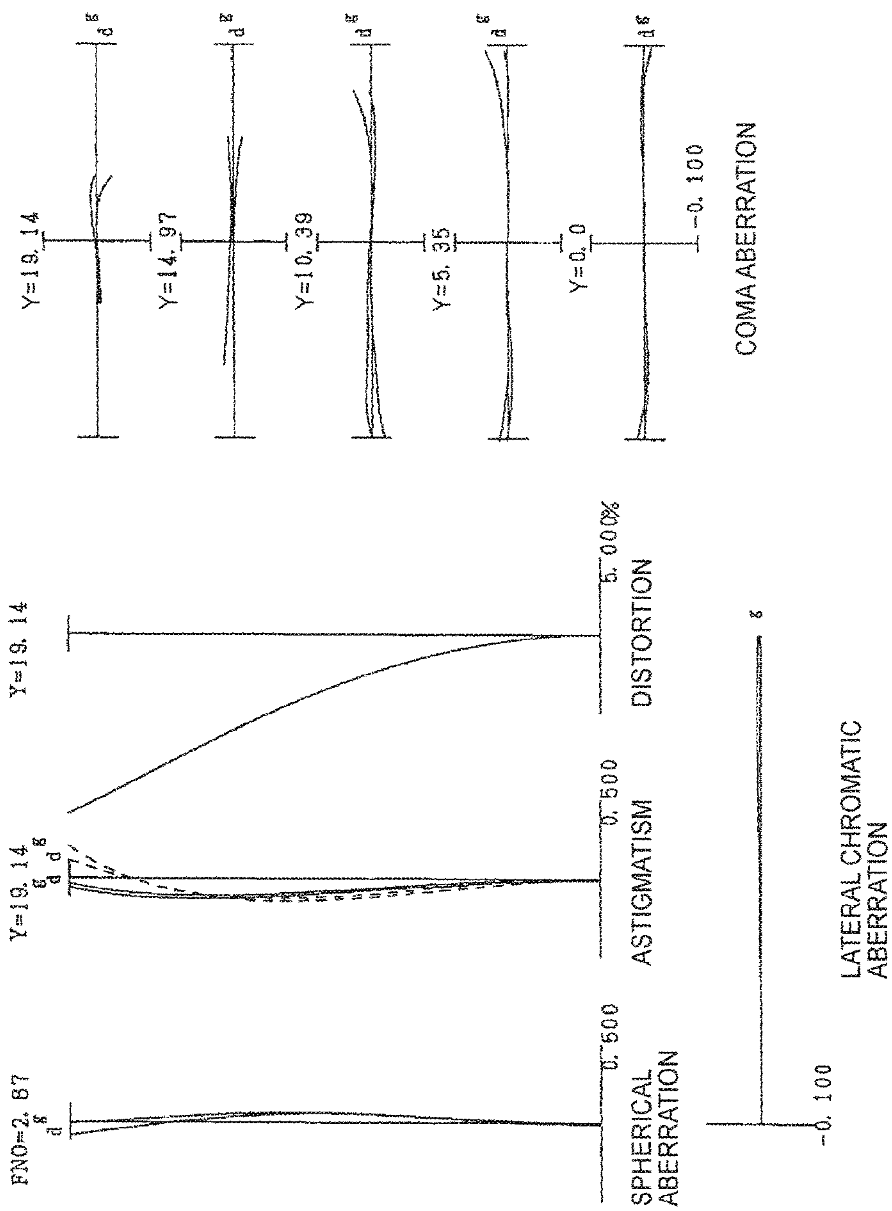
FIGS. 109A, 109B, and 109C are graphs showing various aberrations of the zoom optical system according to Example 23 upon focusing on infinity respectively in the wide angle end state, the intermediate focal length state, and the telephoto end state.
Figure 109B:
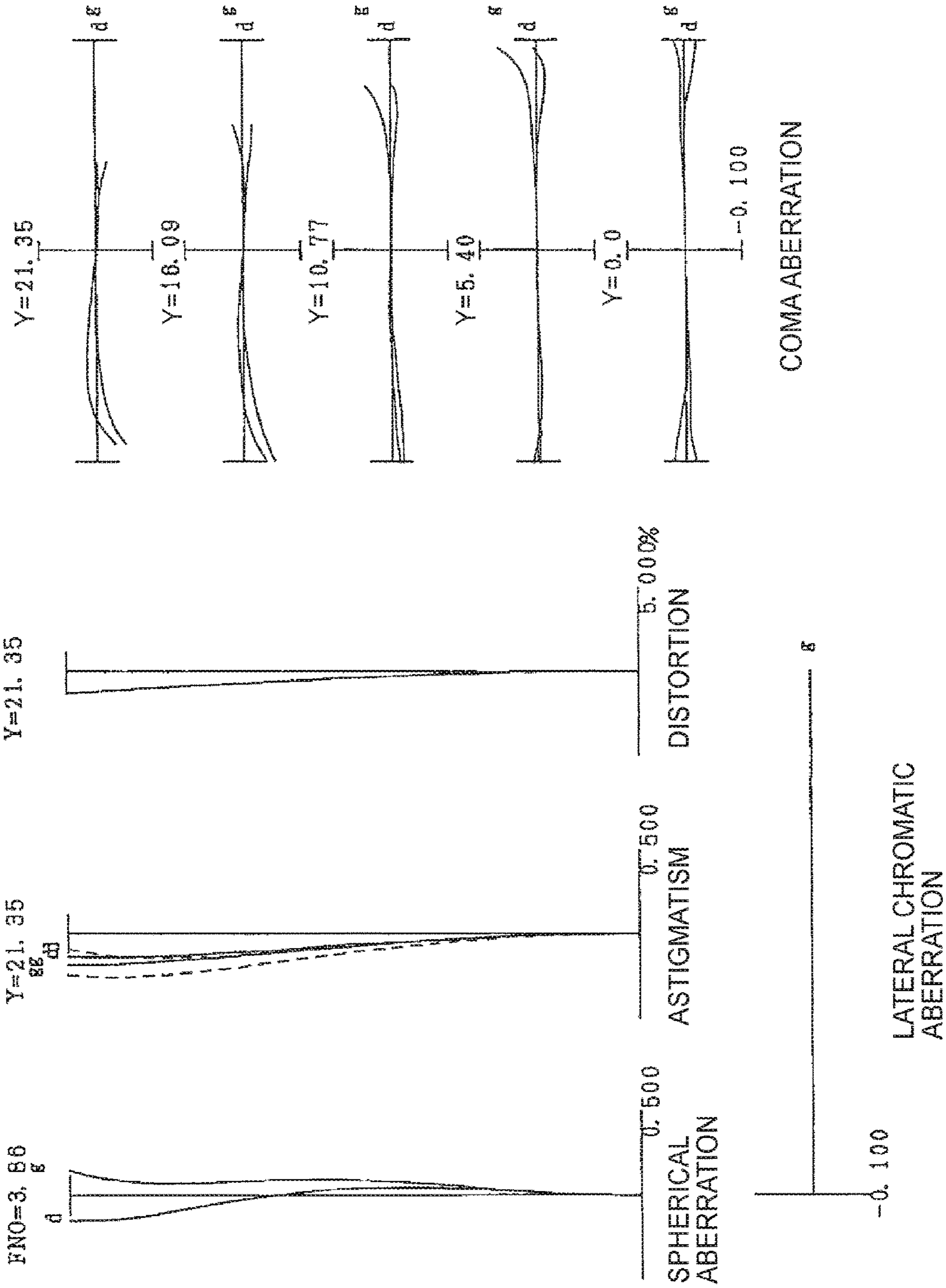
Figure 109C:
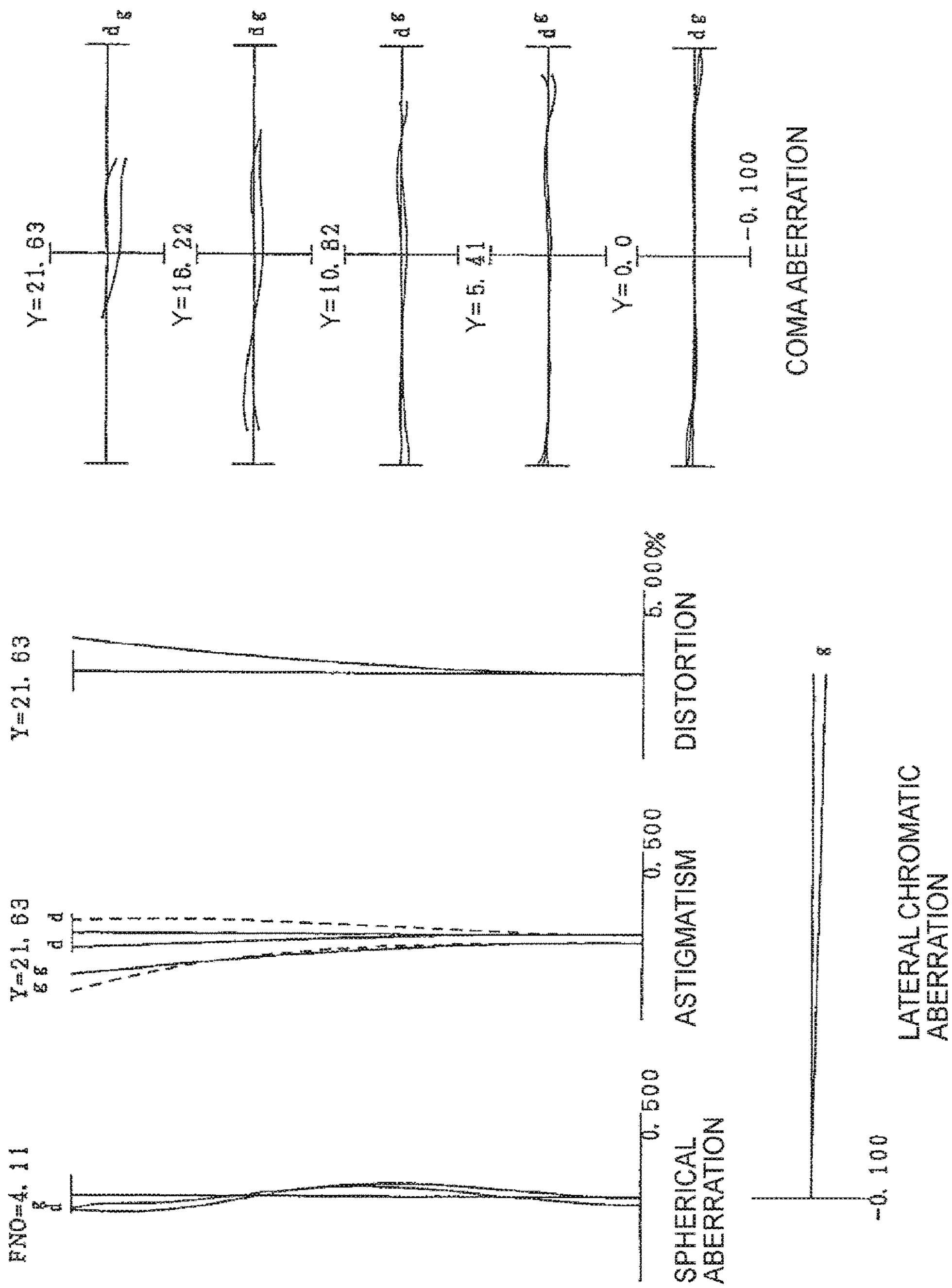
Figure 110A:
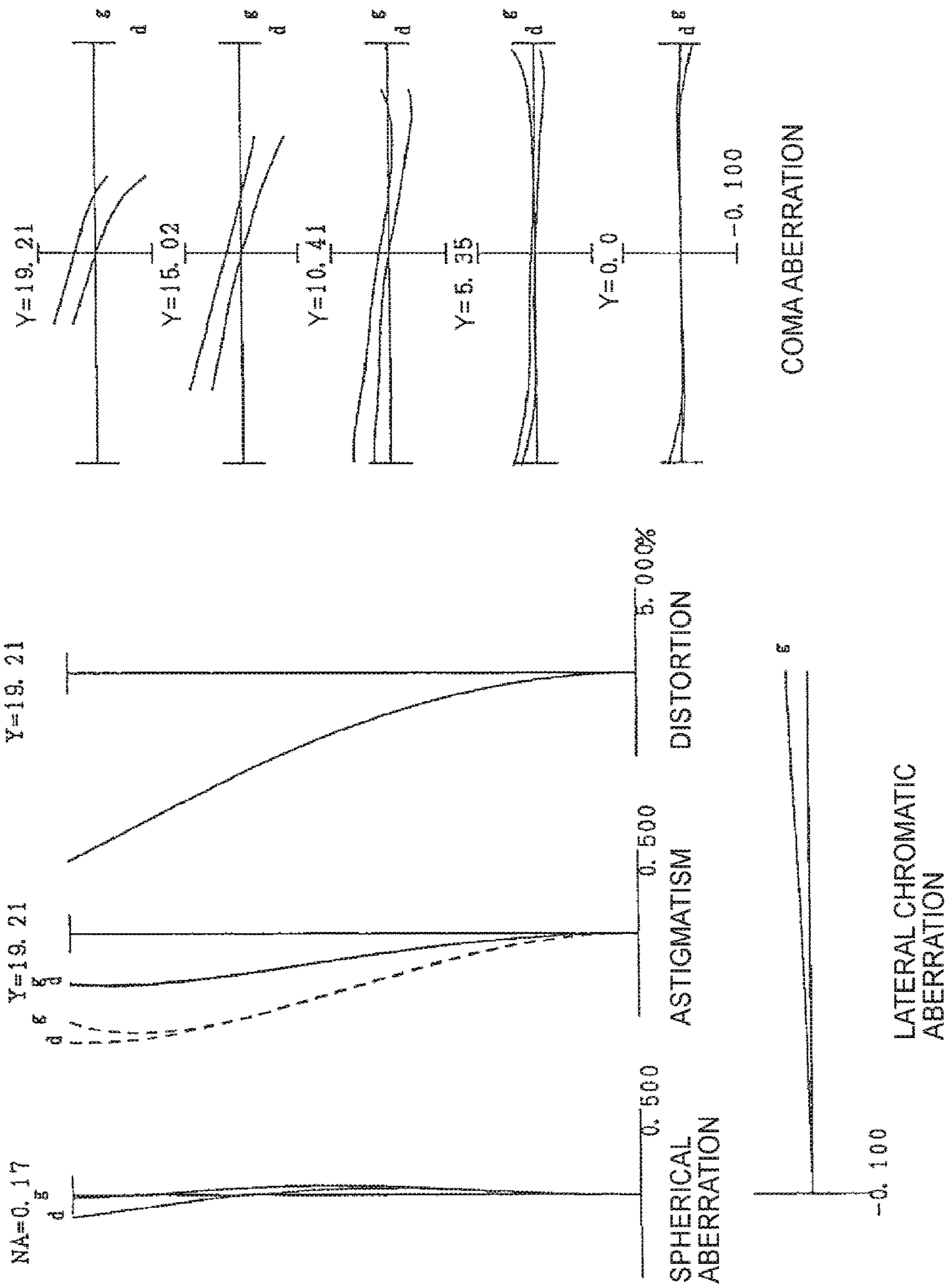
FIGS. 110A, 110B, and 110C are graphs showing various aberrations of the zoom optical system according to Example 23 upon focusing on a short distant object respectively in the wide angle end state, the intermediate focal length state, and the telephoto end state.
Figure 110B:
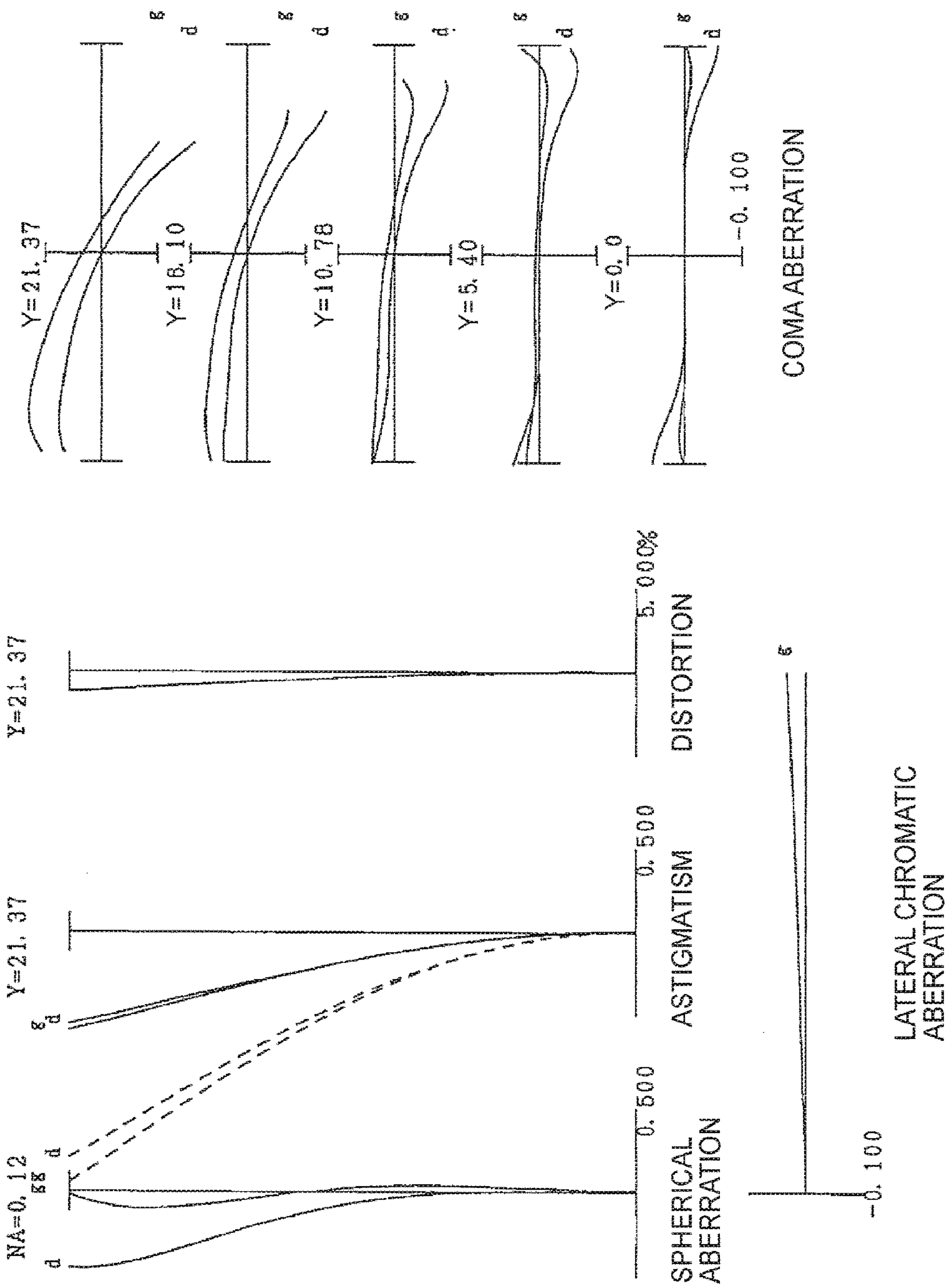
Figure 110C:
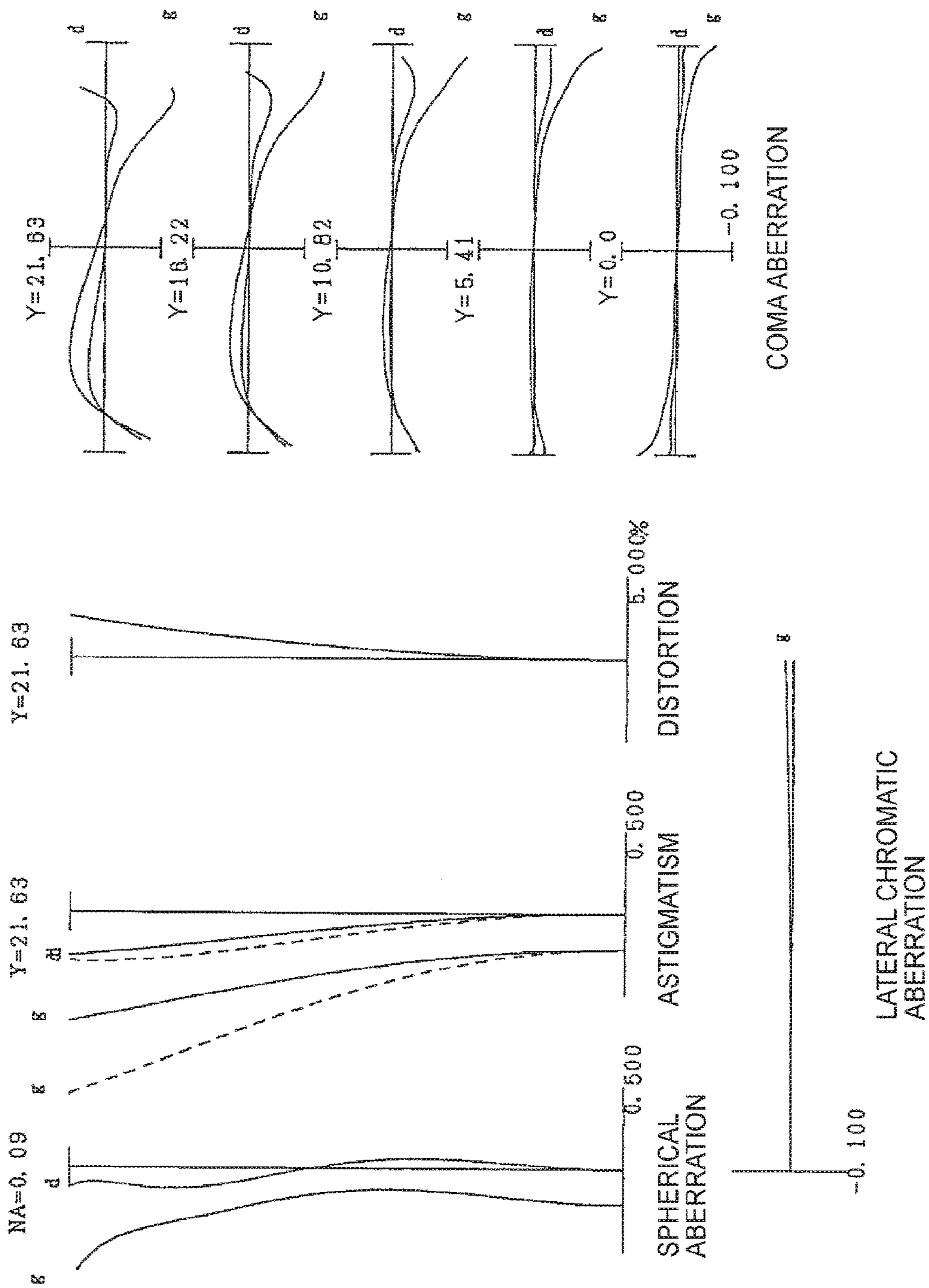
Figure 111A:
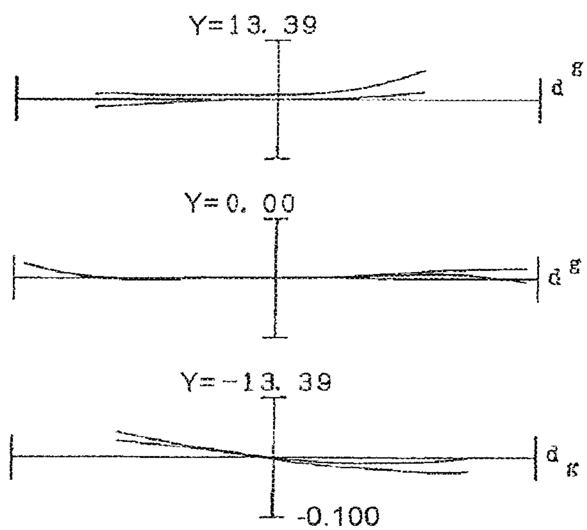
FIGS. 111A, 111B, and 111C are graphs showing coma aberrations of the zoom optical system according to Example 23 upon focusing on infinity with image blur correction performed, respectively in the wide angle end state, the intermediate focal length state, and the telephoto end state.
Figure 111B:
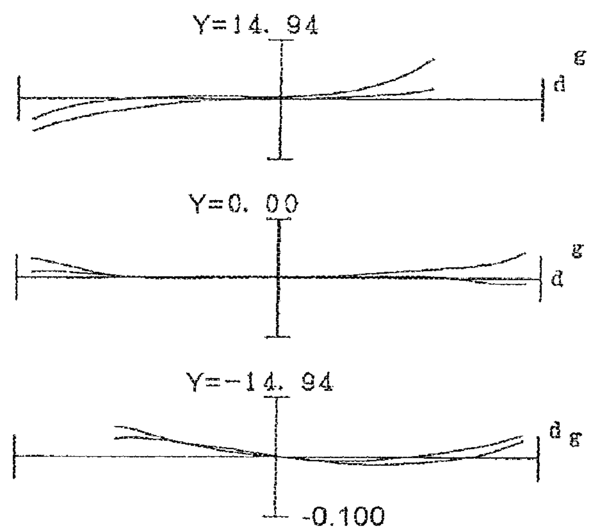
Figure 111C:
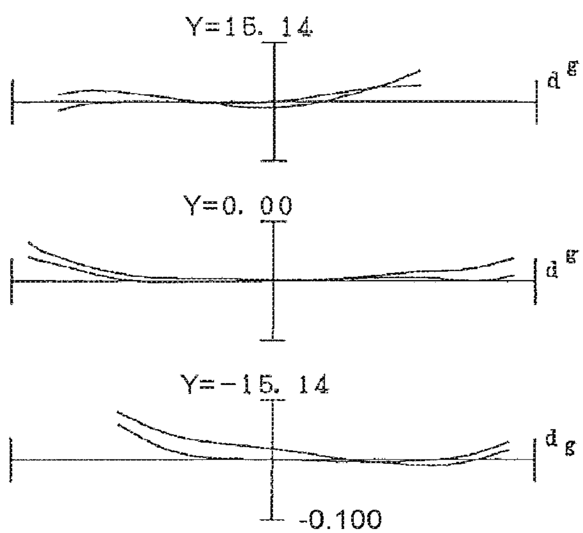

FIG. 109 is various aberration graphs (a spherical aberration graph, an astigmatism graph, a distortion graph, a lateral chromatic aberration graph, and a coma aberration graph) of the zoom optical system ZL23 according to Example 23 upon focusing on infinity with FIG. 109A corresponding to the wide angle end state, FIG. 109B corresponding to the intermediate focal length state, and FIG. 109C corresponding to the telephoto end state. FIG. 110 is various aberration graphs (a spherical aberration graph, an astigmatism graph, a distortion graph, a lateral chromatic aberration graph, and a coma aberration graph) of the zoom optical system ZL23 according to Example 23 upon focusing on a short distant object with FIG. 110A corresponding to the wide angle end state, FIG. 110B corresponding to the intermediate focal length state, and FIG. 110C corresponding to the telephoto end state. FIG. 111 is a coma aberration graph at the time of image blur correction for the zoom optical system ZL23 according to Example 23 upon focusing on infinity with FIG. 111A corresponding to the wide angle end state, FIG. 111B corresponding to the intermediate focal length state, and FIG. 111C corresponding to the telephoto end state.

It can be seen in the aberration graphs in FIG. 109 to FIG. 111 that the zoom optical system ZL23 according to Example 23 can achieve an excellent optical performance with various aberrations successfully corrected from the wide angle end state to the telephoto end state and from the infinity focusing state to the short-distant object focusing state. Furthermore, it can be seen that a high imaging performance can be achieved upon image blur correction.

Example 24

Figure 112:
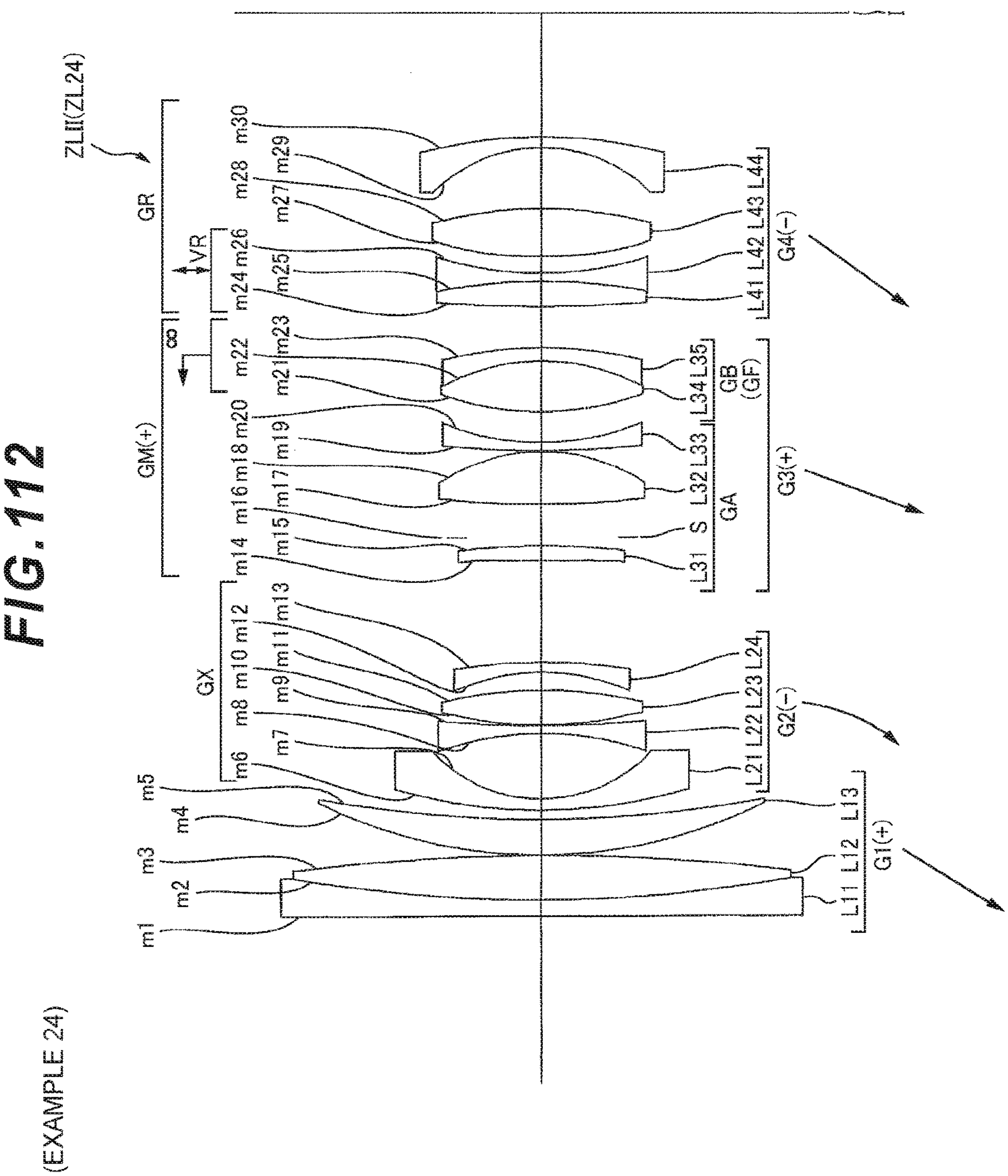
FIG. 112 is a cross-sectional view of a zoom optical system according to Example 24.

Example 24 is described with reference to FIG. 112 to FIG. 115 and Table 24. A zoom optical system ZLII (ZL24) according to Example 24 includes, as illustrated in FIG. 112, the first lens group G1 having positive refractive power, the second lens group G2 having negative refractive power, the third lens group G3 having positive refractive power, and the fourth lens group G4 having negative refractive power that are arranged in order from the object side.

The first lens group G1 includes: the cemented lens including a plano-concave lens L11 having a concave surface facing the image side and the biconvex lens L12; and the positive meniscus lens L13 having a convex surface facing the object side that are arranged in order from the object side.

The second lens group G2 includes the negative meniscus lens L21 having a concave surface facing the image side, the biconcave lens L22, the biconvex lens L23, and the negative meniscus lens L24 having a concave surface facing the object side that are arranged in order from an object side. The biconcave lens L22 is a glass-molded aspherical lens with a lens surface, on the object side, having an aspherical shape.

The third lens group G3 includes the object side group GA and the image side group GB having positive refractive power that are arranged in order from the object side. The object side group GA includes the biconvex lens L31, the aperture stop S, the biconvex lens L32, and the negative meniscus lens L33 having a concave surface facing the image side that are arranged in order from the object side. The image side group GB includes the cemented lens including the biconvex lens L34 and the negative meniscus lens L35 having a concave surface facing the object side. The biconvex lens L31 is a glass-molded aspherical lens with lens surfaces, on the object side and on the image surface side, having an aspherical shape. The biconvex lens L34 is a glass-molded aspherical lens with a lens surface, on the object side, having an aspherical shape.

The fourth lens group G4 includes: the cemented lens including the biconvex lens L41 and the biconcave lens L42; the biconvex lens L43; and the negative meniscus lens L44 having a concave surface facing the object side that are arranged in order from the object side.

The zooming from the wide angle end state to the telephoto end state is achieved with: the first lens group G1, the second lens group G2, the third lens group G3, and the fourth lens group G4 each moved toward the object side in such a manner that the distance between the first lens group G1 and the second lens group G2 increases, the distance between the second lens group G2 and the third lens group G3 decreases, and the distance between the third lens G3 and the fourth lens G4 decreases.

Focusing from infinity to the short-distant object is achieved with the image side group GB (=focusing lens group GF) forming the third lens group G3 moved toward the object side.

When image blur occurs, image blur correction (vibration isolation) on the image surface I is performed with the cemented lens including the biconvex lenses L41 and the biconcave lens L42 forming the fourth lens group G4, and serving as the vibration-proof lens group VR moved with a displacement component in the direction orthogonal to the optical axis. In Example 24, in the wide angle end state, the shifted amount of the vibration-proof lens group VR is −0.508 mm when the correction angle is 0.664°. In the intermediate focal length state, the shifted amount of the vibration-proof lens group VR is −0.445 mm when the correction angle is 0.469°. In the telephoto end state, the shifted amount of the vibration-proof lens group VR is −0.457 mm when the correction angle is 0.401°.

In Table 24 below, specification values in Example 24 are listed. Surface numbers 1 to 30 in Table 24 respectively correspond to the optical surfaces m1 to m30 in FIG. 112.

TABLE 24

[Lens specifications]

| Surface number | R | D | νd | nd |
|---|---|---|---|---|
| Obj surface | ∞ | | | |
| 1 | ∞ | 2.00 | 22.74 | 1.80809 |
| 2 | 145.2414 | 5.36 | 67.90 | 1.59319 |
| 3 | −208.7932 | 0.10 | | |
| 4 | 51.2812 | 4.29 | 54.61 | 1.72916 |
| 5 | 123.8115 | D5 (variable) | | |
| 6 | 53.8612 | 1.35 | 35.72 | 1.90265 |
| 7 | 15.5357 | 7.82 | | |
| *8 | −31.1374 | 1.00 | 51.16 | 1.75501 |
| 9 | 101.4389 | 0.10 | | |
| 10 | 39.7482 | 4.19 | 22.74 | 1.80809 |
| 11 | −43.3059 | 2.15 | | |
| 12 | −21.9691 | 1.20 | 58.12 | 1.62299 |
| 13 | −56.9086 | D13 (variable) | | |
| *14 | 213.8825 | 1.79 | 51.16 | 1.75501 |
| *15 | −72.7193 | 1.00 | | |
| 16 | ∞ | 3.98 | (aperture stop) | |
| 17 | 97.9971 | 6.38 | 82.57 | 1.49782 |
| 18 | −18.5448 | 0.10 | | |
| 19 | 94.3665 | 1.00 | 37.18 | 1.83400 |
| 20 | 26.1587 | D20 (variable) | | |
| *21 | 30.3808 | 6.11 | 67.02 | 1.59201 |
| 22 | −21.3812 | 1.60 | 23.80 | 1.84666 |
| 23 | −42.2061 | D23 (variable) | | |
| 24 | 141.2342 | 3.02 | 22.74 | 1.80809 |
| 25 | −55.9270 | 1.00 | 42.73 | 1.83481 |
| 26 | 35.7911 | 2.00 | | |
| *27 | 48.1163 | 5.74 | 81.56 | 1.49710 |
| 28 | −42.2113 | 7.39 | | |
| 29 | −15.9575 | 1.30 | 50.67 | 1.67790 |
| 30 | −48.0365 | D30 (variable) | | |
| Img surface | ∞ | | | |

[Aspherical data]

| Surface number | κ | A4 | A6 | A8 | A10 |
|---|---|---|---|---|---|
| 8th surface | 0.00 | 3.84120E−06 | −6.26512E−09 | 3.47226E−11 | 3.83750E−13 |
| 14th surface | 0.00 | −4.20763E−05 | 2.15227E−08 | −1.41711E−09 | 0.00000E+00 |
| 15th surface | 0.00 | −1.39681E−06 | 5.82933E−08 | −5.07924E−10 | 1.00000E−17 |
| 21st surface | 0.00 | −8.84366E−07 | 3.28772E−08 | −5.31778E−11 | 0.00000E+00 |
| 27th surface | 0.00 | 1.93046E−05 | −6.37415E−09 | 1.44751E−10 | 0.00000E+00 |

[Various data]

Zoom ratio 2.75

| | Wide angle end | | Intermediate | | Telephoto end |
|---|---|---|---|---|---|
| f | 24.7 | ~ | 49.5 | ~ | 67.9 |
| FNO | 2.9 | ~ | 4.0 | ~ | 4.1 |
| 2ω | 82.4 | ~ | 47.1 | ~ | 34.7 |
| Y | 19.1 | ~ | 21.6 | ~ | 21.6 |
| TL(air) | 108.8 | ~ | 127.9 | ~ | 142.1 |
| BF(air) | 14.9 | ~ | 30.6 | ~ | 36.3 |

TABLE 24-continued

[Variable distance data]

| | Upon focusing on infinity | | | Upon focusing on short distant object | | |
|---|---|---|---|---|---|---|
| | Wide angle end | Intermediate | Telephoto end | Wide angle end | Intermediate | Telephoto end |
| f | 24.7 | 49.5 | 67.9 | 24.7 | 49.5 | 67.9 |
| D5 | 1.10 | 14.75 | 26.43 | | | |
| D13 | 12.16 | 3.25 | 1.10 | | | |
| D20 | 3.76 | 3.76 | 3.76 | 2.98 | 1.76 | 0.50 |
| D23 | 4.96 | 3.57 | 2.50 | 5.73 | 5.57 | 5.75 |
| D30 | 14.90 | 30.58 | 36.31 | | | |

[Lens group data]

| | Group starting surface | Group focal length |
|---|---|---|
| First lens group | 1 | 100.26 |
| Second lens group | 6 | −18.73 |
| Third lens group | 14 | 24.21 |
| Fourth lens group | 24 | −43.18 |

[Conditional expression corresponding value]

| | |
|---|---|
| Conditional expression(JK1) | $\lvert fF\rvert/fM = 1.537$ |
| Conditional expression(JK2) | $(-fXn)/fM = 0.774$ |
| Conditional expression(JK3) | $dAB/\lvert fF\rvert = 0.101$ |
| Conditional expression(JK4) | $ndp + 0.0075 \times \nu dp - 2.175 = -0.080$ |
| Conditional expression(JK5) | $\nu dp = 67.02$ |
| Conditional expression(JL1) | $\lvert(rB + rA)/(rB - rA)\rvert = 13.391$ |
| Conditional expression(JL2) | $\lvert fF\rvert/fM = 1.537$ |
| Conditional expression(JL3) | $dAB/\lvert fF\rvert = 0.101$ |
| Conditional expression(JL4) | $(-fXn)/fM = 0.774$ |
| Conditional expression(JL5) | $ndp + 0.0075 \times \nu dp - 2.175 = -0.080$ |
| Conditional expression(JL6) | $\nu dp = 67.02$ |
| Conditional expression(JM1) | $dV/\lvert fV\rvert = 0.036$ |
| Conditional expression(JM2) | $\lvert fF\rvert/fM = 1.537$ |
| Conditional expression(JM3) | $dAB/\lvert fF\rvert = 0.101$ |
| Conditional expression(JM4) | $(-fXn)/fM = 0.774$ |
| Conditional expression(JM5) | $ndp + 0.0075 \times \nu dp - 2.175 = -0.080$ |
| Conditional expression(JM6) | $\nu dp = 67.02$ |

It can be seen in Table 24 that the zoom optical system ZL24 according to this Example satisfies the conditional expressions (JK1) to (JK5), (JL1) to (JL6), and (JM1) to (JM6).

Figure 113A:
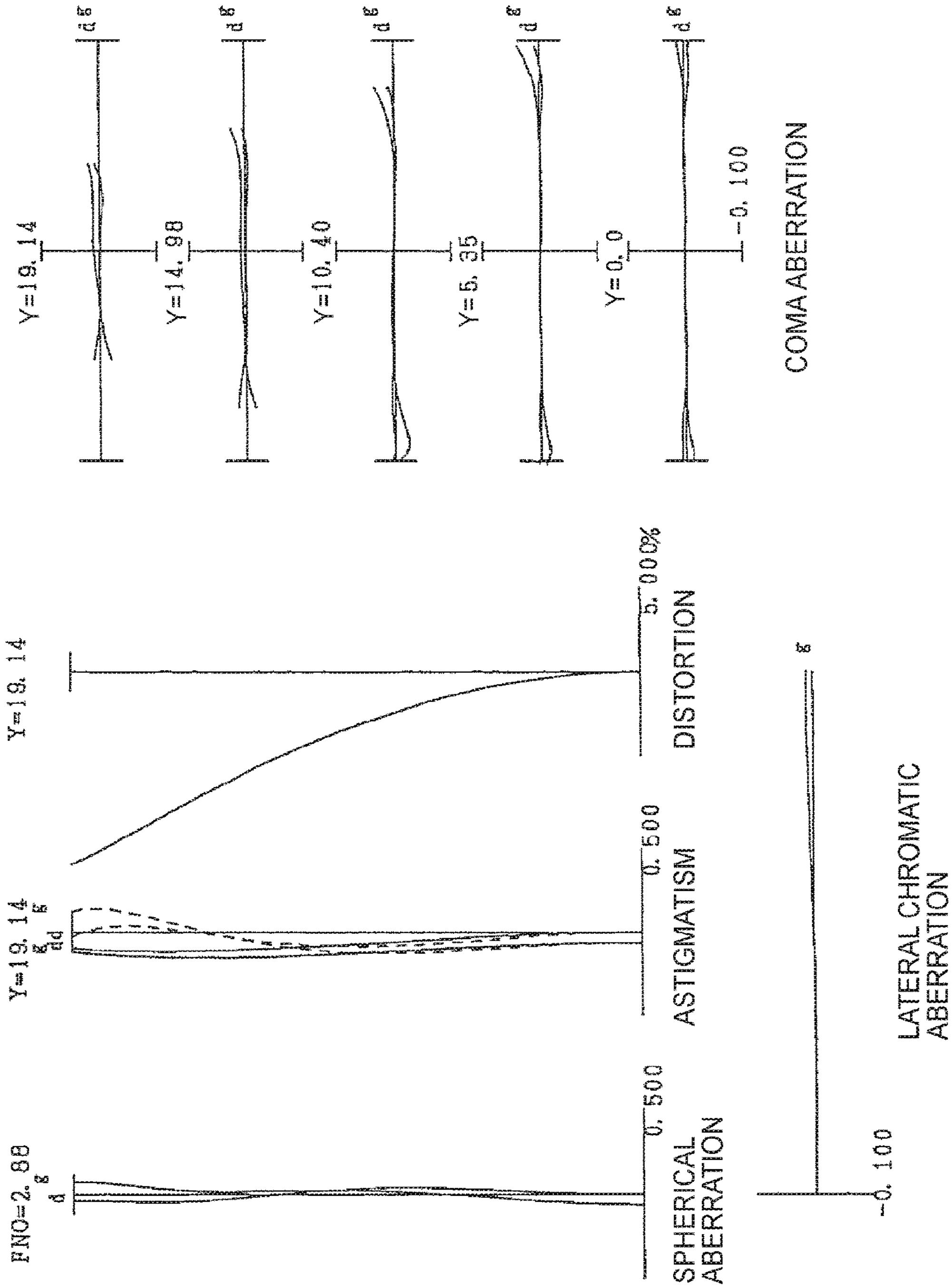
FIGS. 113A, 113B, and 113C are graphs showing various aberrations of the zoom optical system according to Example 24 upon focusing on infinity respectively in the wide angle end state, the intermediate focal length state, and the telephoto end state.
Figure 113B:
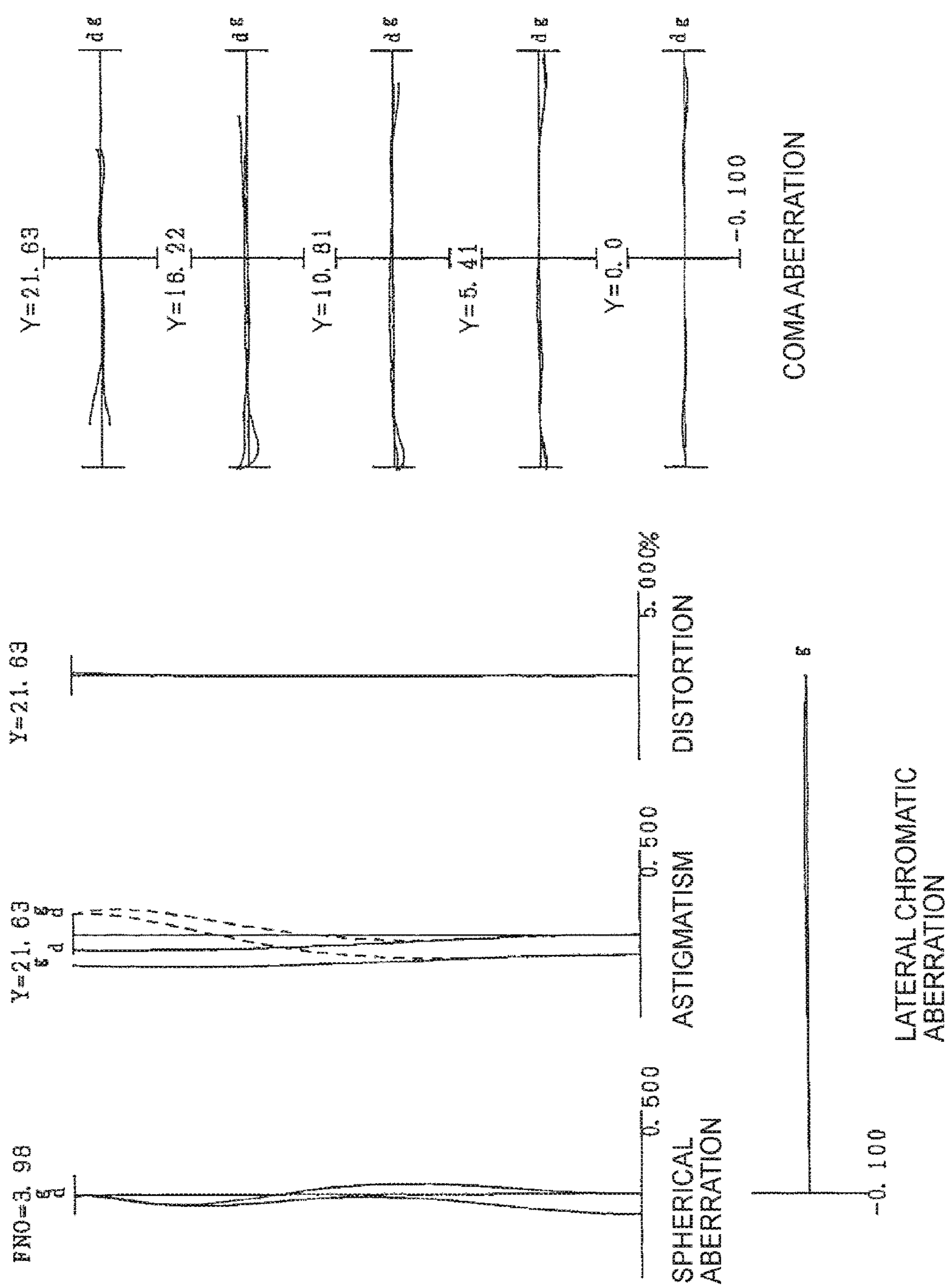
Figure 113C:
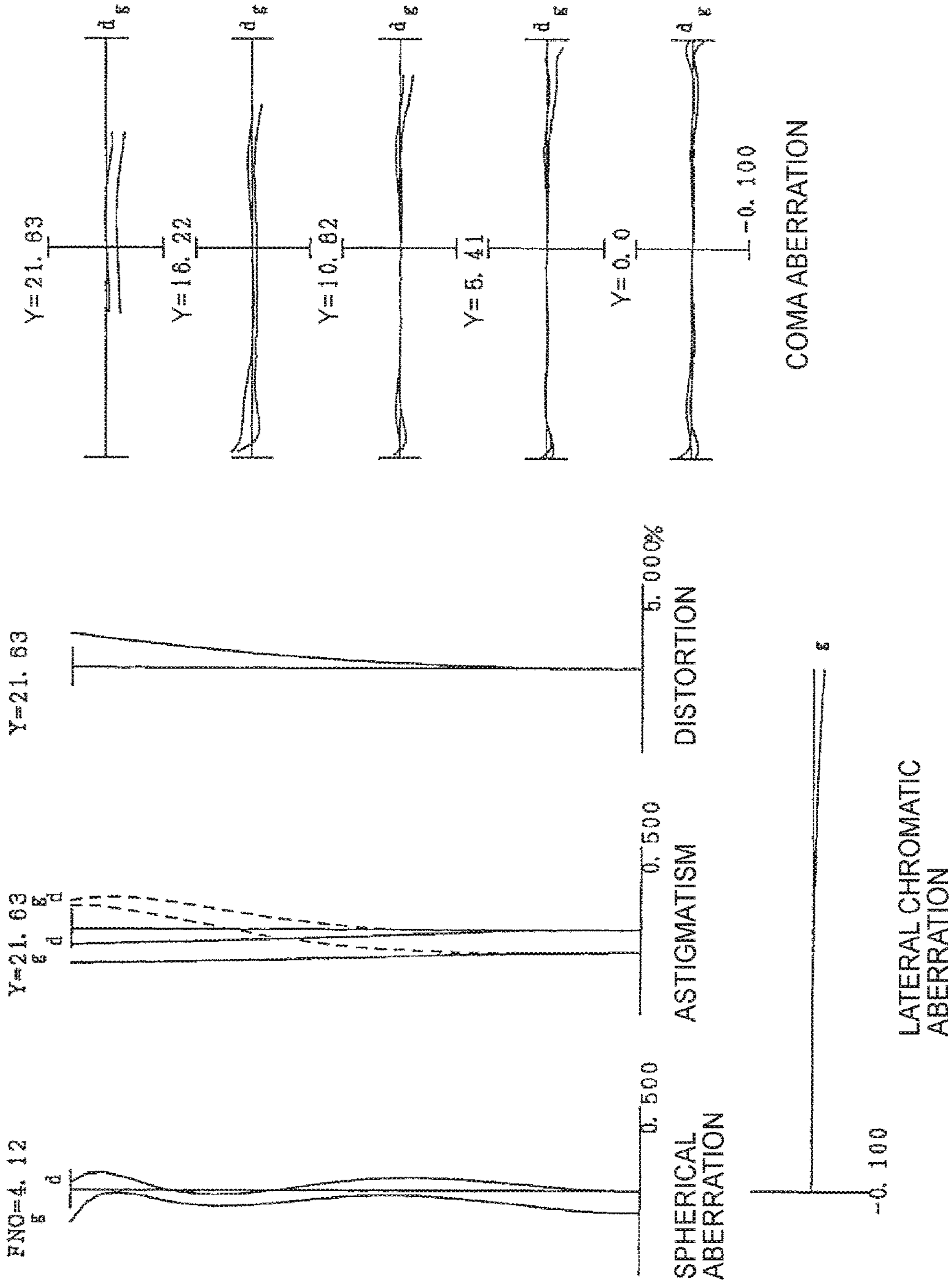
Figure 114A:
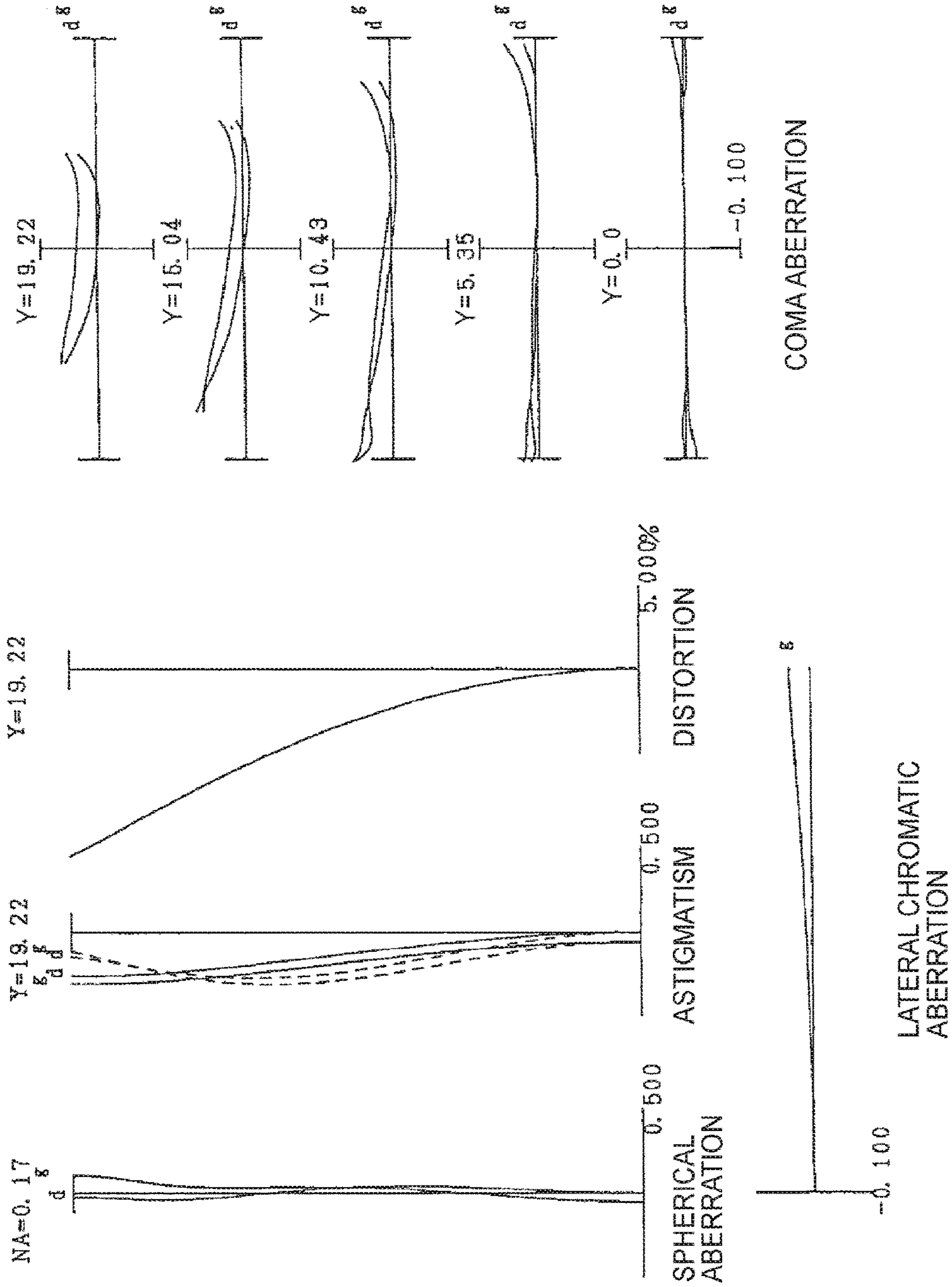
FIGS. 114A, 114B, and 114C are graphs showing various aberrations of the zoom optical system according to Example 24 upon focusing on a short distant object respectively in the wide angle end state, the intermediate focal length state, and the telephoto end state.
Figure 114B:
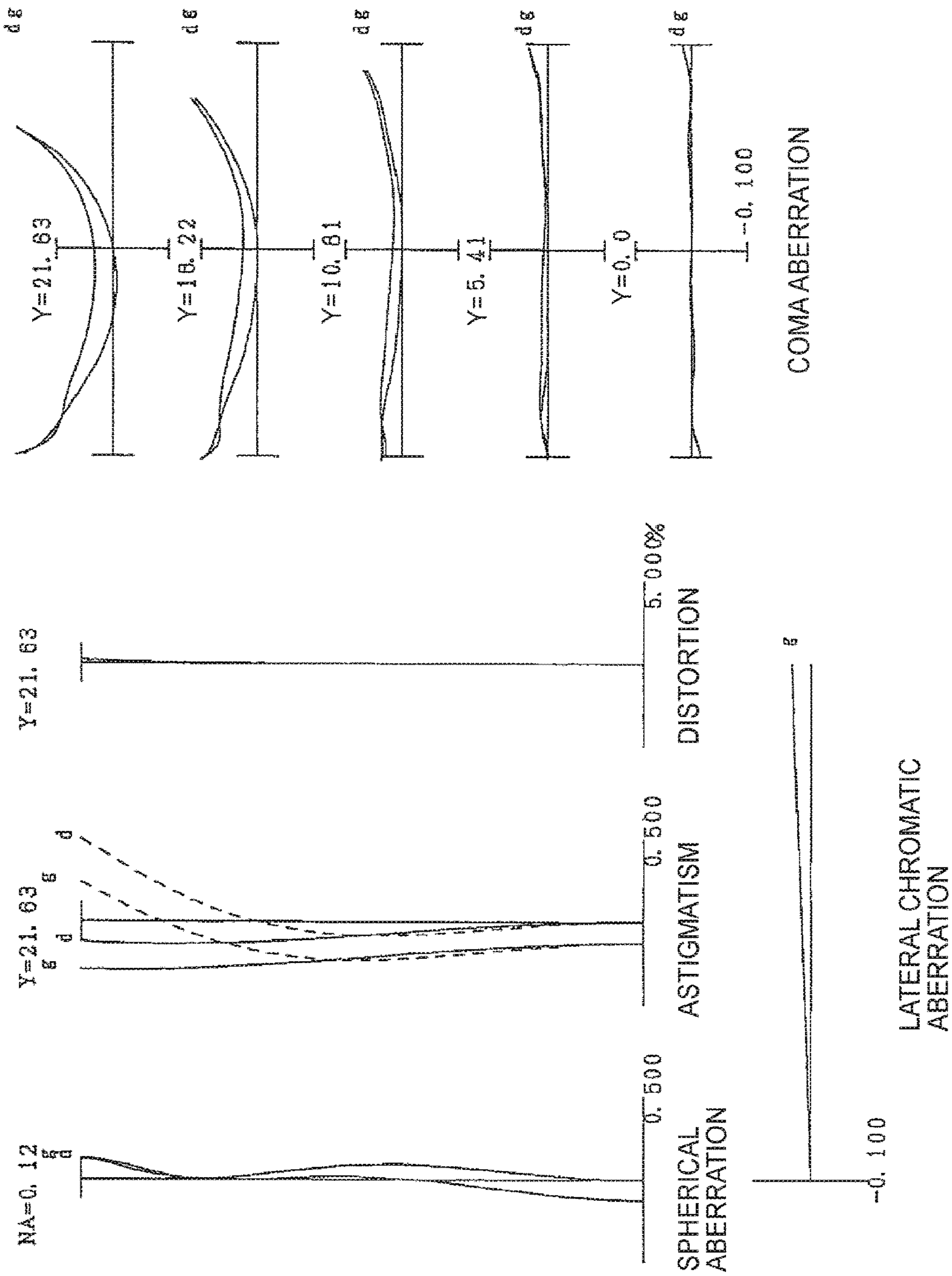
Figure 114C:
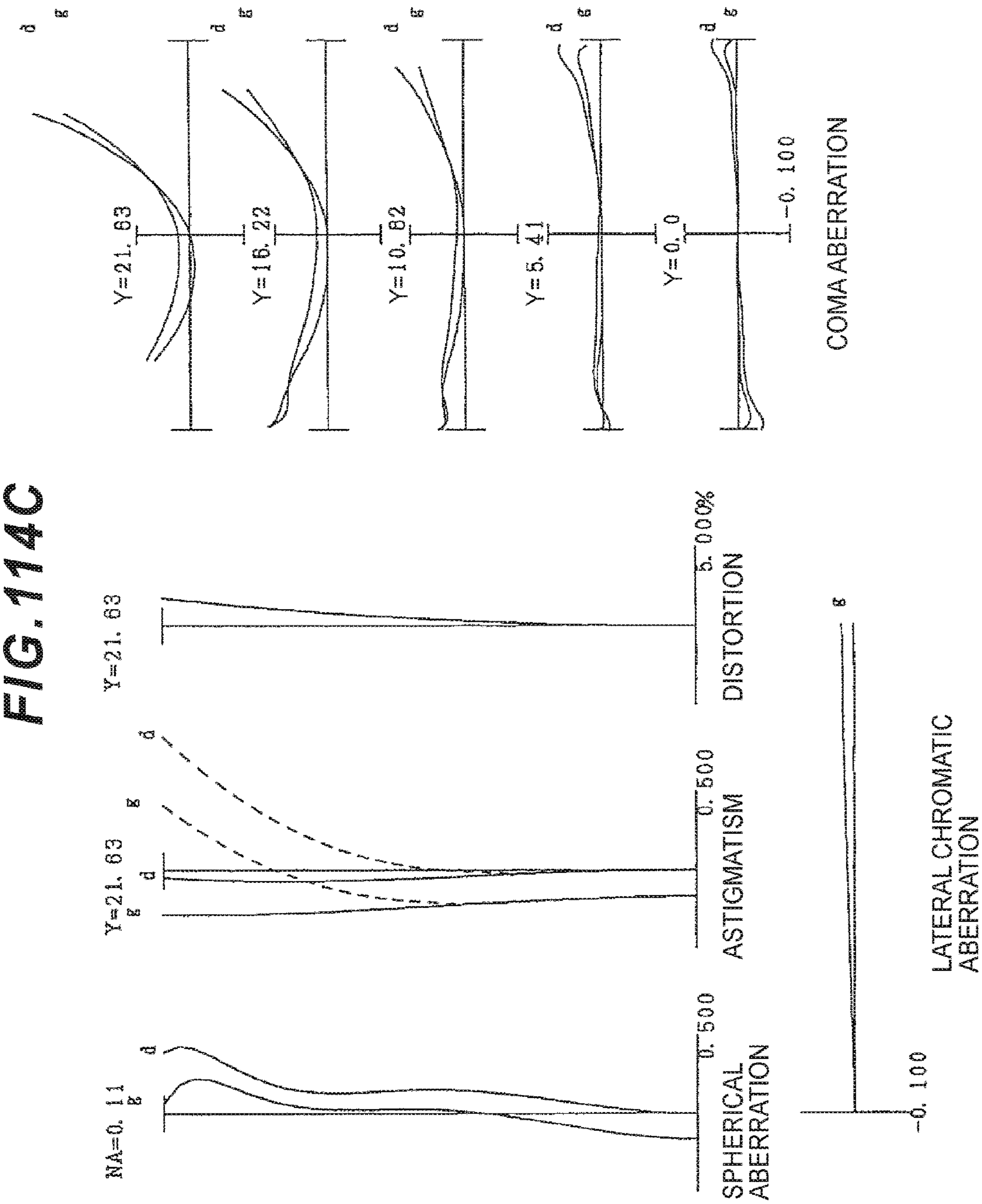
Figure 115A:
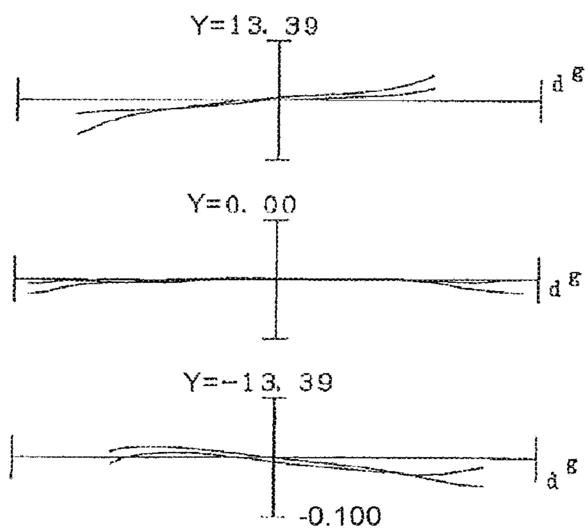
FIGS. 115A, 115B, and 115C are graphs showing coma aberrations of the zoom optical system according to Example 24 upon focusing on infinity with image blur correction performed, respectively in the wide angle end state, the intermediate focal length state, and the telephoto end state.
Figure 115B:
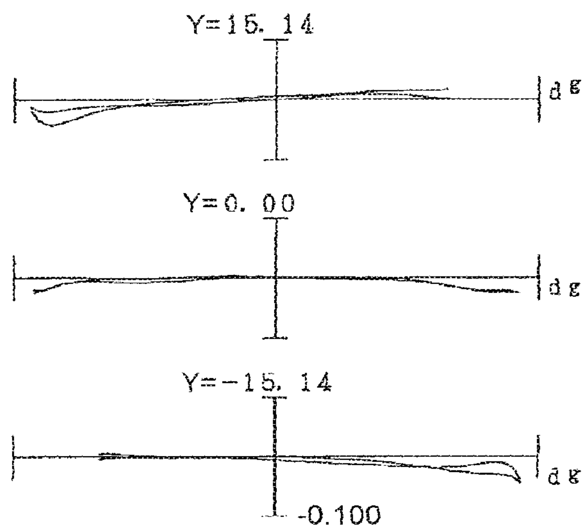
Figure 115C:
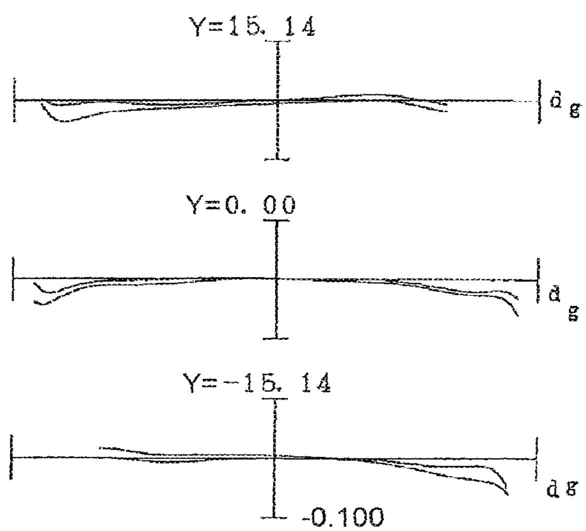

FIG. 113 is various aberration graphs (a spherical aberration graph, an astigmatism graph, a distortion graph, a lateral chromatic aberration graph, and a coma aberration graph) of the zoom optical system ZL24 according to Example 24 upon focusing on infinity with FIG. 113A corresponding to the wide angle end state, FIG. 113B corresponding to the intermediate focal length state, and FIG. 113C corresponding to the telephoto end state. FIG. 114 is various aberration graphs (a spherical aberration graph, an astigmatism graph, a distortion graph, a lateral chromatic aberration graph, and a coma aberration graph) of the zoom optical system ZL24 according to Example 24 upon focusing on a short distant object with FIG. 114A corresponding to the wide angle end state, FIG. 114B corresponding to the intermediate focal length state, and FIG. 114C corresponding to the telephoto end state. FIG. 115 is a coma aberration graph at the time of image blur correction for the zoom optical system ZL24 according to Example 24 upon focusing on infinity with FIG. 115A corresponding to the wide angle end state, FIG. 115B corresponding to the intermediate focal length state, and FIG. 115C corresponding to the telephoto end state.

It can be seen in the aberration graphs in FIG. 113 to FIG. 115 that the zoom optical system ZL24 according to Example 24 can achieve an excellent optical performance with various aberrations successfully corrected from the wide angle end state to the telephoto end state and from the infinity focusing state to the short-distant object focusing state. Furthermore, it can be seen that a high imaging performance can be achieved upon image blur correction.

Example 25

Figure 116:
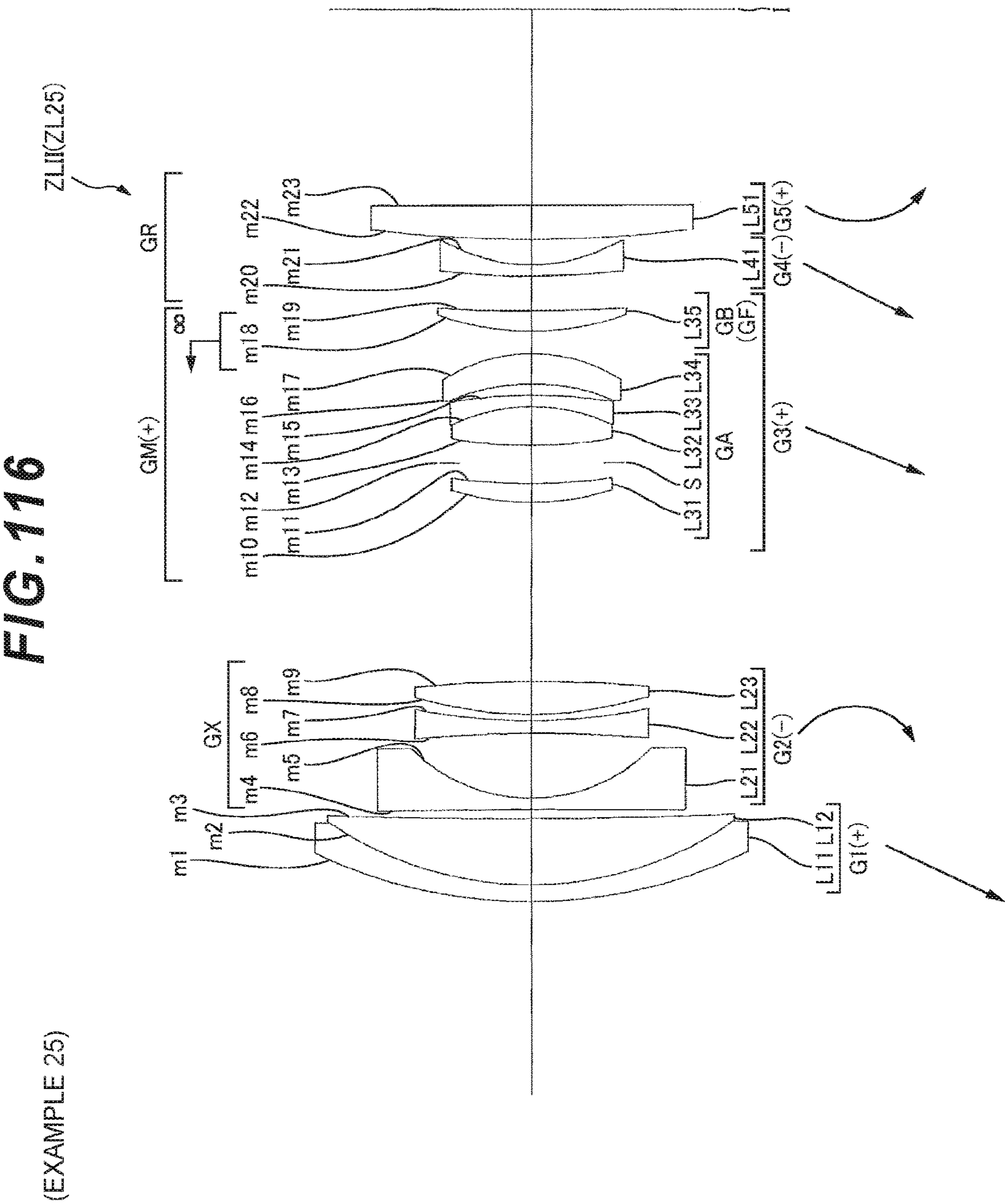
FIG. 116 is a cross-sectional view of a zoom optical system according to Example 25.

Example 25 is described with reference to FIG. 116 to FIG. 119 and Table 25. A zoom optical system ZLII (ZL25) according to Example 25 includes, as illustrated in FIG. 116, the first lens group G1 having positive refractive power, the second lens group G2 having negative refractive power, the third lens group G3 having positive refractive power, the fourth lens group G4 having negative refractive power, and the fifth lens group G5 having positive refractive power that are arranged in order from the object side.

The first lens group G1 includes the cemented lens including the negative meniscus lens L11 having a concave surface facing the image side and the positive meniscus lens L12 having a convex surface facing the object side that are arranged in order from the object side.

The second lens group G2 includes the biconcave lens L21, the biconcave lens L22, and the biconvex lens L23 that are arranged in order from the object side. The biconcave lens L22 is a glass-molded aspherical lens with a lens surface, on the object side, having an aspherical shape.

The third lens group G3 includes the object side group GA and the image side group GB having positive refractive power that are arranged in order from the object side. The object side group GA includes: the positive meniscus lens L31 having a convex surface facing the object side; the aperture stop S; the cemented lens including the biconvex lens L32 and the negative meniscus lens L33 having a concave surface facing the object side; and the positive meniscus lens L34 having a convex surface facing the image side that are arranged in order from the object side. The image side group GB includes a positive meniscus lens L35 having a convex surface facing the object side. The positive meniscus lens L34 is a glass-molded aspherical lens with a lens surface, on the object side, having an aspherical shape.

The fourth lens group G4 includes a negative meniscus lens L41 having a concave surface facing the image side. The negative meniscus lens L41 is a glass-molded aspherical lens with lens surfaces, on the object side and on the image surface side, having an aspherical shape.

The fifth lens group G5 includes the plano-convex lens L51 having a convex surface facing the object side.

The zooming from the wide angle end state to the telephoto end state is achieved with: the first lens group G1 moved toward the object side, the second lens group G2 moved toward the image surface side and then moved toward the object side, the third lens group G3 and the fourth lens group G4 moved toward the object side, and the fifth lens group G5 moved toward the object side and then moved toward the image side in such a manner that the distance between the first lens group G1 and the second lens group G2 increases, the distance between the second lens group G2 and the third lens group G3 decreases, the distance between the third lens group G3 and the fourth lens group G4 decreases, and the distance between fourth lens group G4 and the fifth lens group G5 increases.

Focusing from infinity to the short-distant object is achieved with the image side group GB (=focusing lens group GF) forming the third lens group G3 moved toward the object side.

In Table 25 below, specification values in Example 25 are listed. Surface numbers 1 to 23 in Table 25 respectively correspond to the optical surfaces m1 to m23 in FIG. 116.

TABLE 25

[Lens specifications]

| Surface number | R | D | νd | nd |
|---|---|---|---|---|
| Obj surface | ∞ | | | |
| 1 | 36.6683 | 1.48 | 23.78 | 1.84666 |
| 2 | 26.2009 | 5.77 | 52.33 | 1.75500 |
| 3 | 361.1070 | D3 (variable) | | |
| 4 | −988.0287 | 1.00 | 35.25 | 1.91082 |
| 5 | 12.7389 | 5.67 | | |
| *6 | −91.2065 | 1.10 | 40.10 | 1.85135 |
| 7 | 42.5712 | 0.55 | | |
| 8 | 29.0506 | 2.84 | 20.88 | 1.92286 |
| 9 | −105.9692 | D9 (variable) | | |
| 10 | 19.3382 | 1.70 | 63.34 | 1.61800 |
| 11 | 42.9857 | 1.80 | | |
| 12 | ∞ | 1.50 | (aperture stop) | |
| 13 | 34.2676 | 3.37 | 70.32 | 1.48749 |
| 14 | −14.1924 | 1.00 | 25.45 | 1.80518 |
| 15 | −36.1986 | 0.98 | | |
| *16 | −17.6970 | 2.65 | 54.61 | 1.72916 |
| 17 | −12.3843 | D17 (variable) | | |
| 18 | 20.7895 | 1.76 | 55.52 | 1.69680 |
| 19 | 122.6193 | D19 (variable) | | |
| *20 | 59.8462 | 1.00 | 40.10 | 1.85135 |
| *21 | 12.8981 | D21 (variable) | | |
| 22 | 92.0042 | 3.06 | 40.98 | 1.58144 |
| 23 | ∞ | D23 (variable) | | |
| Img surface | ∞ | | | |

[Aspherical data]

| Surface number | κ | A4 | A6 | A8 | A10 |
|---|---|---|---|---|---|
| 6th surface | 0.00 | 5.44650E−06 | 1.29656E−09 | 2.84992E−10 | 3.06572E−12 |
| 16th surface | 0.00 | −1.22072E−04 | 1.22532E−07 | 4.84068E−10 | −4.09604E−11 |
| 20th surface | 0.00 | 1.71663E−04 | −5.28544E−06 | 5.66102E−08 | −2.66106E−10 |
| 21st surface | 0.00 | 1.44420E−04 | −5.59342E−06 | 5.88893E−08 | −2.77861E−10 |

TABLE 25-continued

[Various data]

Zoom ratio 2.89

| | Wide angle end | | Intermediate | | Telephoto end |
|---|---|---|---|---|---|
| f | 18.5 | ~ | 27.9 | ~ | 53.5 |
| FNO | 2.9 | ~ | 3.4 | ~ | 4.3 |
| 2ω | 75.2 | ~ | 52.4 | ~ | 28.1 |
| Y | 13.2 | ~ | 14.3 | ~ | 14.3 |
| TL(air) | 77.7 | ~ | 80.0 | ~ | 94.4 |
| BF(air) | 17.0 | ~ | 22.6 | ~ | 14.4 |

[Variable distance data]

| | Upon focusing on infinity | | | Upon focusing on short distant object | | |
|---|---|---|---|---|---|---|
| | Wide angle end | Intermediate | Telephoto end | Wide angle end | Intermediate | Telephoto end |
| f | 18.5 | 27.9 | 53.5 | 18.5 | 27.9 | 53.5 |
| D3 | 0.80 | 5.65 | 14.75 | | | |
| D9 | 15.54 | 7.64 | 0.80 | | | |
| D17 | 1.96 | 1.96 | 1.96 | 1.42 | 1.06 | 0.04 |
| D19 | 2.99 | 2.19 | 1.00 | 3.52 | 3.09 | 2.93 |
| D21 | 2.22 | 2.78 | 24.28 | | | |
| D23 | 17.01 | 22.58 | 14.40 | | | |

[Lens group data]

| | Group starting surface | Group focal length |
|---|---|---|
| First lens group | 1 | 56.37 |
| Second lens group | 4 | −19.13 |
| Third lens group | 10 | 15.30 |
| Fourth lens group | 20 | −19.50 |
| Fifth lens group | 22 | 158.24 |

[Conditional expression corresponding value]

| | |
|---|---|
| Conditional expression(JK1) | $\|fF\|/fM = 2.331$ |
| Conditional expression(JK2) | $(-fXn)/fM = 1.250$ |
| Conditional expression(JK3) | $dAB/\|fF\| = 0.055$ |
| Conditional expression(JK4) | $ndp + 0.0075 \times \nu dp - 2.175 = -0.062$ |
| Conditional expression(JK5) | $\nu dp = 55.52$ |
| Conditional expression(JN1) | $\|fF\|/fM = 2.331$ |
| Conditional expression(JN3) | $dAB/\|fF\| = 0.055$ |
| Conditional expression(JN4) | $(-fXn)/fM = 1.250$ |
| Conditional expression(JN5) | $ndp + 0.0075 \times \nu dp - 2.175 = -0.062$ |
| Conditional expression(JN6) | $\nu dp = 55.52$ |

It can be seen in Table 25 that the zoom optical system ZL25 according to this Example satisfies the conditional expressions (JK1) to (JK5), (JN1), and (JN3) to (JN6).

Figure 117A:
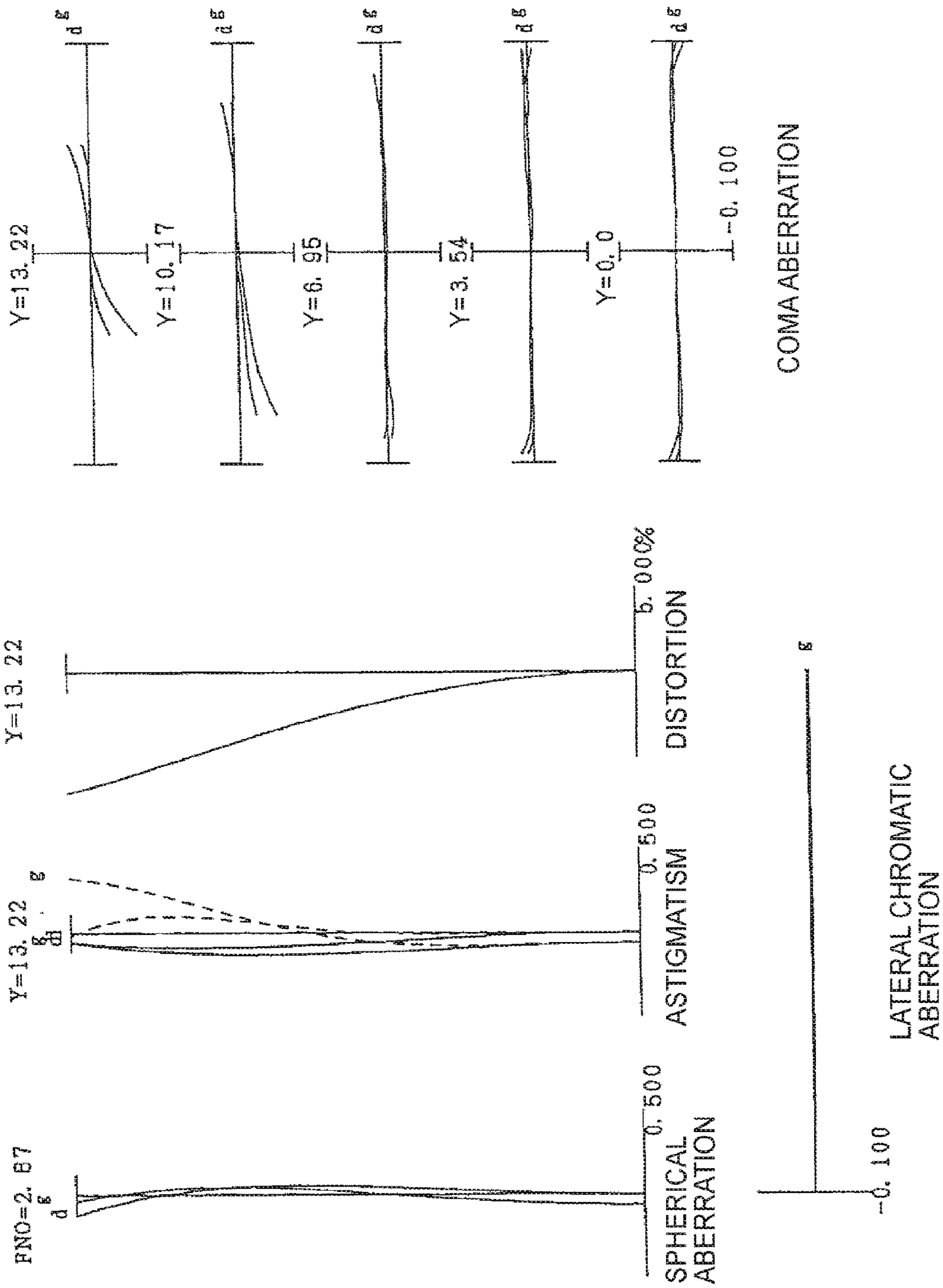
FIGS. 117A, 117B, and 117C are graphs showing various aberrations of the zoom optical system according to Example 25 upon focusing on infinity respectively in the wide angle end state, the intermediate focal length state, and the telephoto end state.
Figure 117B:
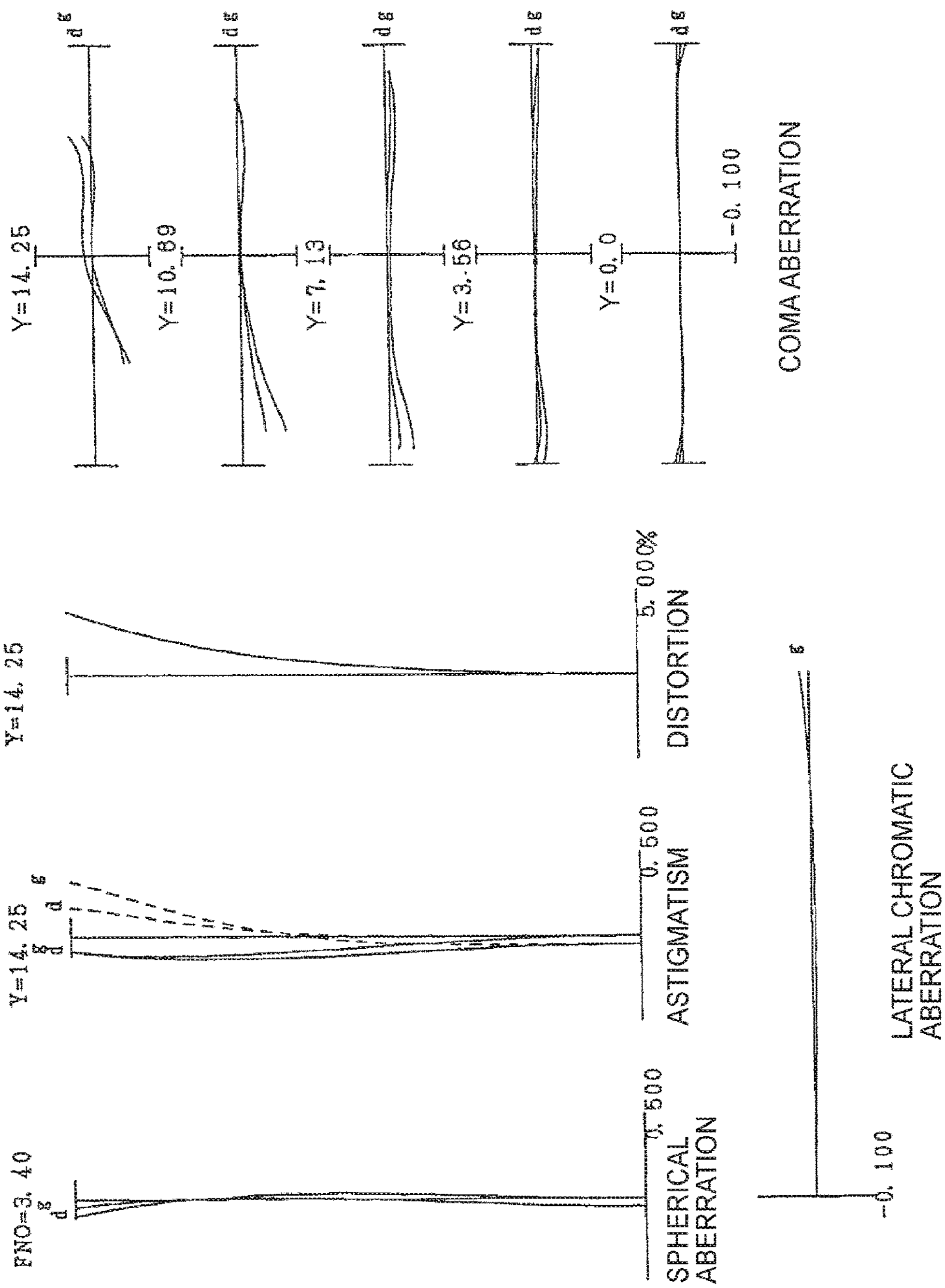
Figure 117C:
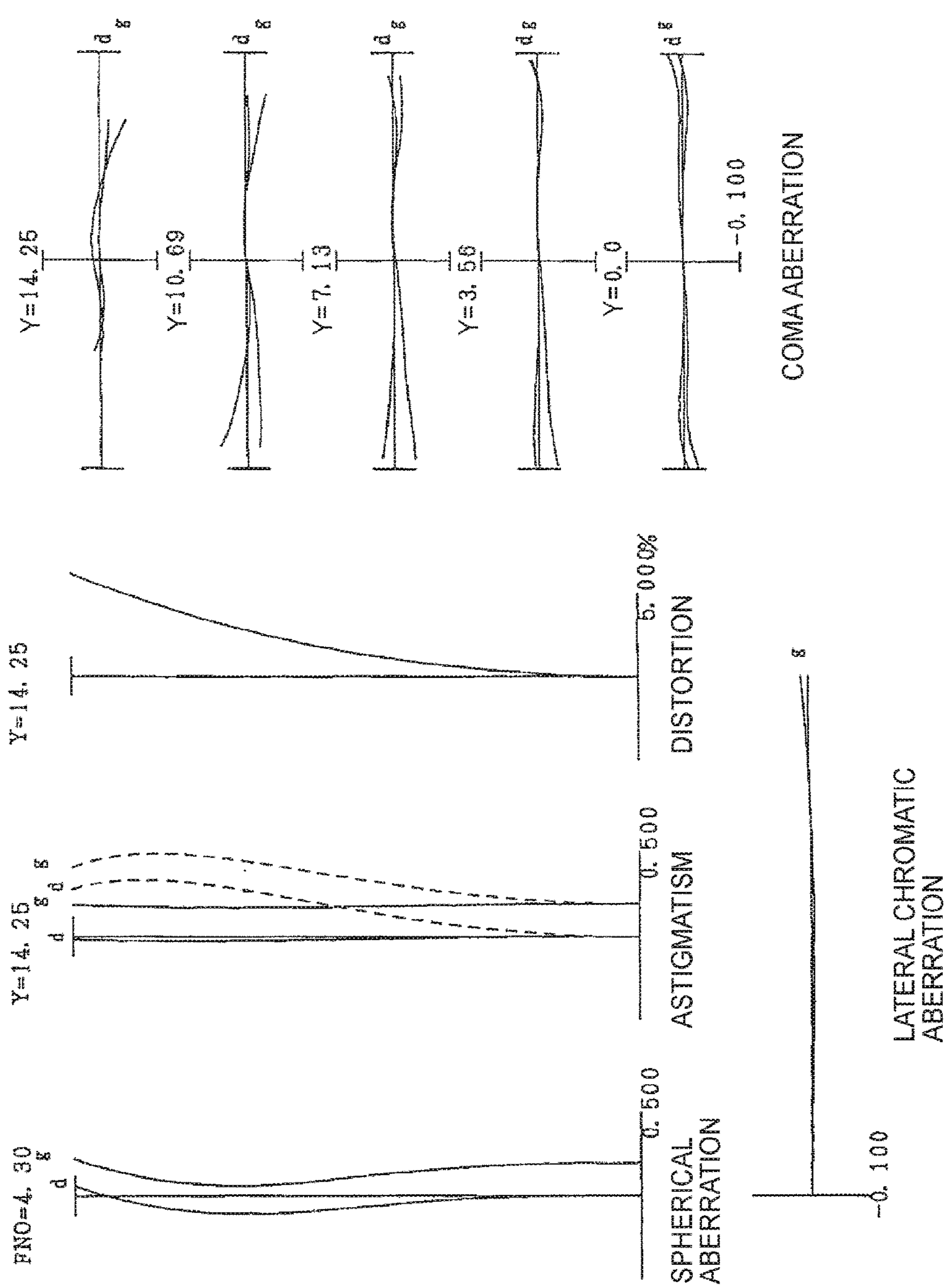
Figure 118A:
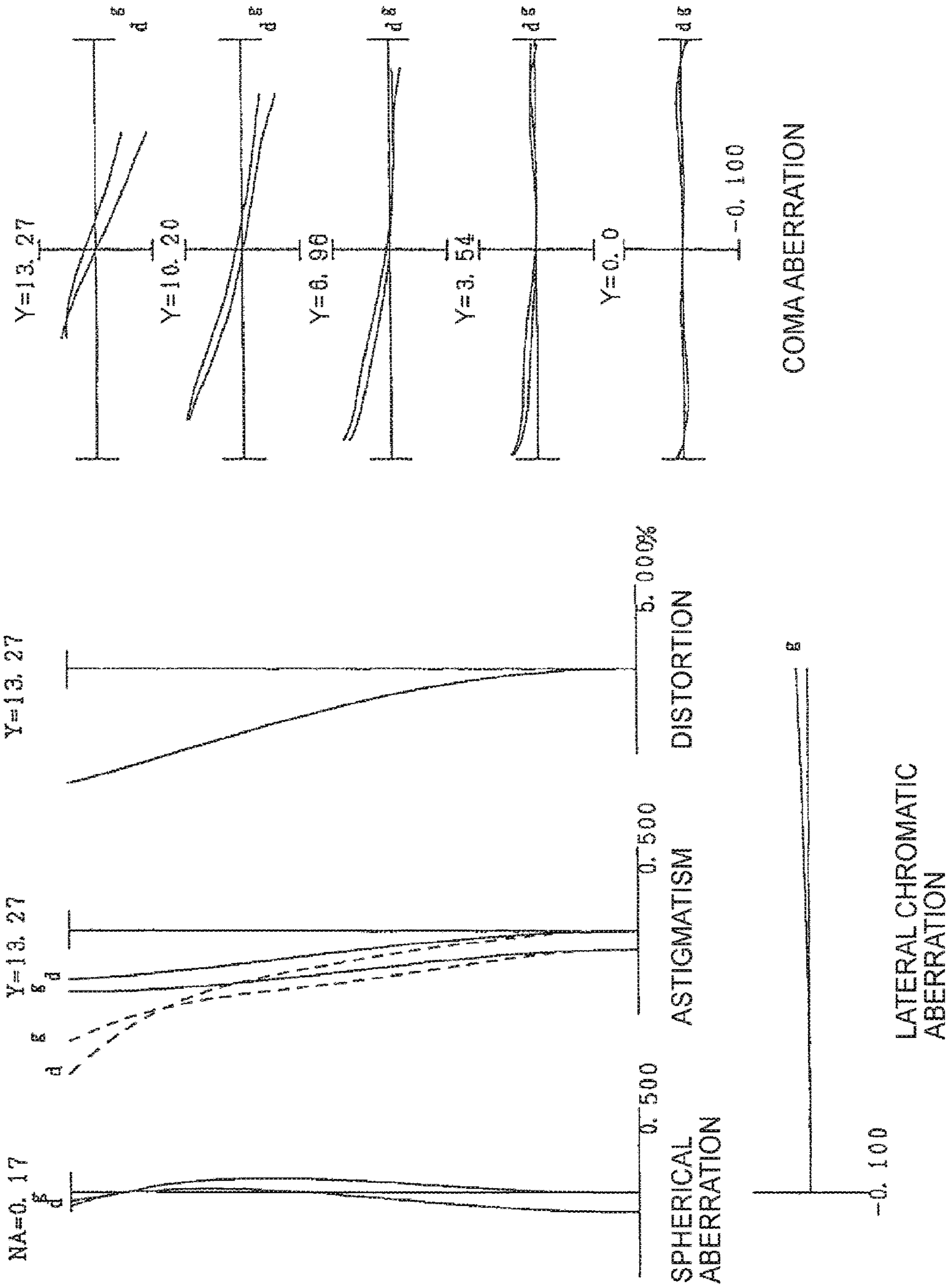
FIGS. 118A, 118B, and 118C are graphs showing various aberrations of the zoom optical system according to Example 25 upon focusing on a short distant object respectively in the wide angle end state, the intermediate focal length state, and the telephoto end state.
Figure 118B:
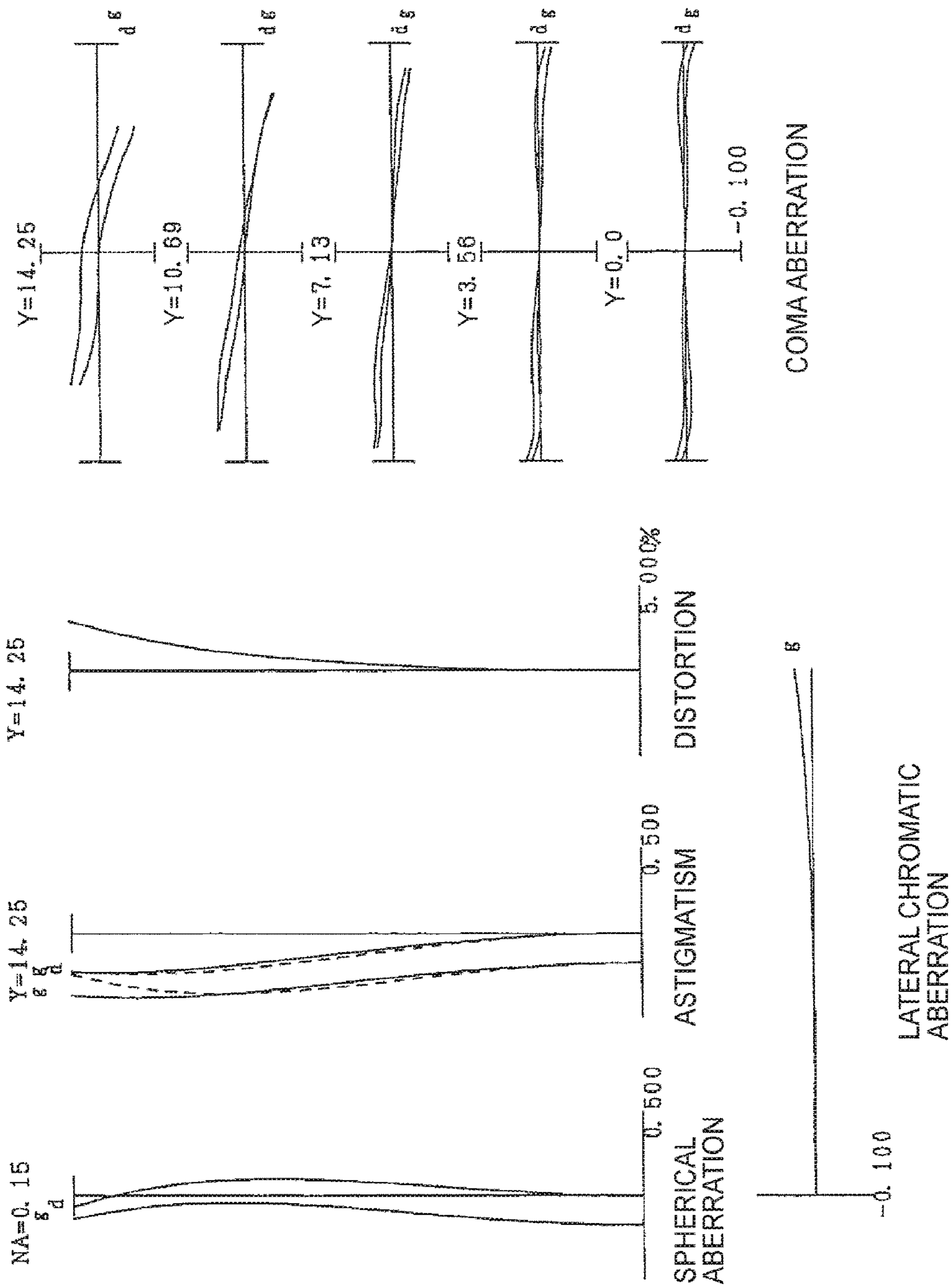
Figure 118C:
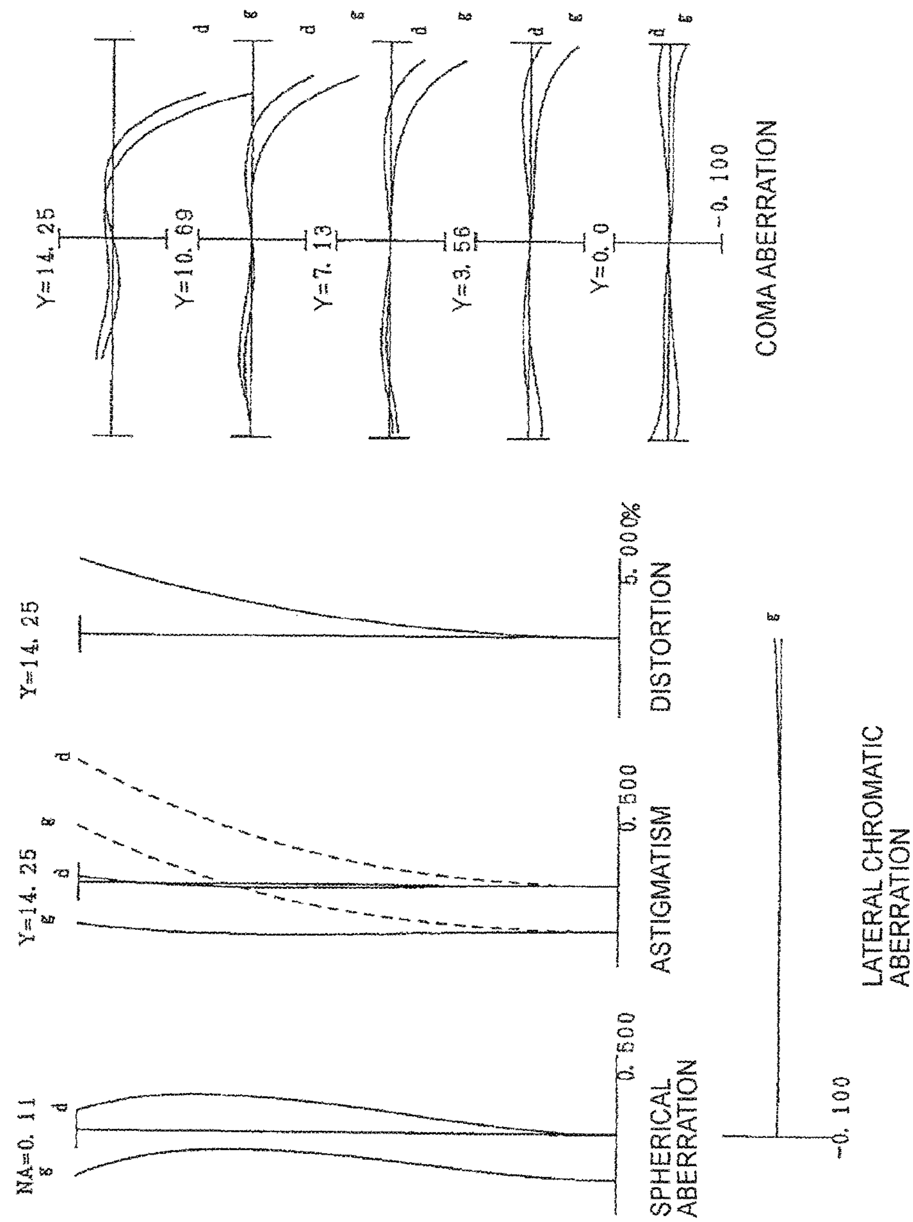
Figure 119A:
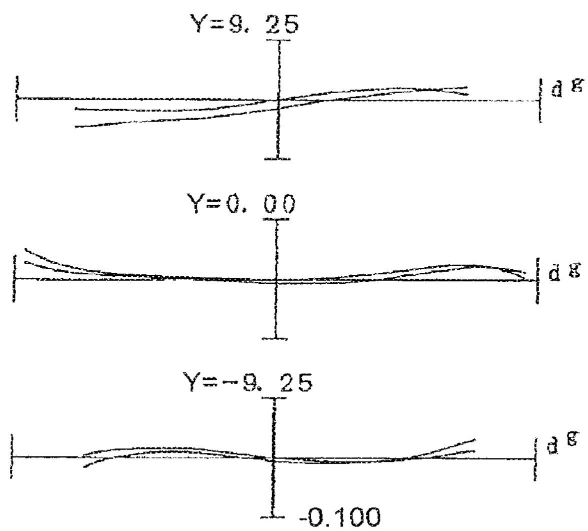
FIGS. 119A, 119B, and 119C are graphs showing coma aberrations of the zoom optical system according to Example 25 upon focusing on infinity with image blur correction performed, respectively in the wide angle end state, the intermediate focal length state, and the telephoto end state.
Figure 119B:
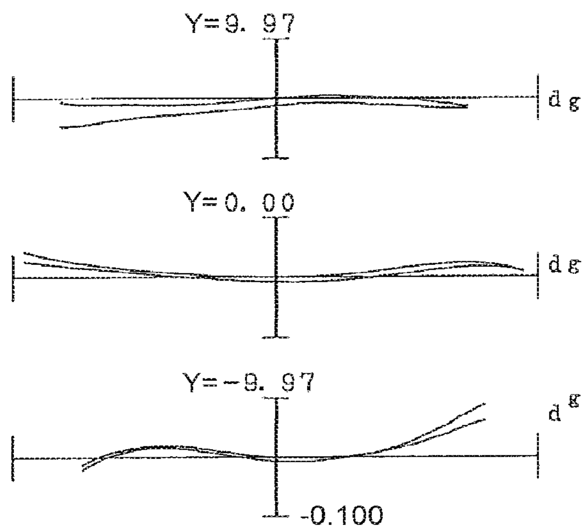
Figure 119C:
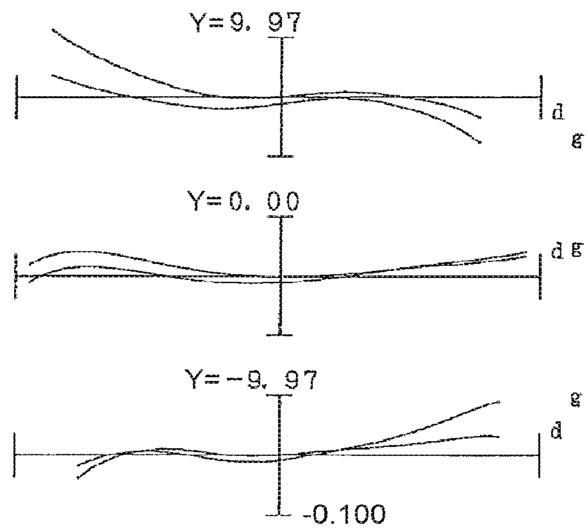

FIG. 117 is various aberration graphs (a spherical aberration graph, an astigmatism graph, a distortion graph, a lateral chromatic aberration graph, and a coma aberration graph) of the zoom optical system ZL25 according to Example 25 upon focusing on infinity with FIG. 117A corresponding to the wide angle end state, FIG. 117B corresponding to the intermediate focal length state, and FIG. 117C corresponding to the telephoto end state. FIG. 118 is various aberration graphs (a spherical aberration graph, an astigmatism graph, a distortion graph, a lateral chromatic aberration graph, and a coma aberration graph) of the zoom optical system ZL25 according to Example 25 upon focusing on a short distant object with FIG. 118A corresponding to the wide angle end state, FIG. 118B corresponding to the intermediate focal length state, and FIG. 118C corresponding to the telephoto end state. FIG. 119 is a coma aberration graph at the time of image blur correction for the zoom optical system ZL25 according to Example 25 upon focusing on infinity with FIG. 119A corresponding to the wide angle end state, FIG. 119B corresponding to the intermediate focal length state, and FIG. 119C corresponding to the telephoto end state.

It can be seen in the aberration graphs in FIG. 117 to FIG. 119 that the zoom optical system ZL25 according to Example 25 can achieve an excellent optical performance with various aberrations successfully corrected from the wide angle end state to the telephoto end state and from the infinity focusing state to the short-distant object focusing state. Furthermore, it can be seen that a high imaging performance can be achieved upon image blur correction.

Example 26

Figure 120:
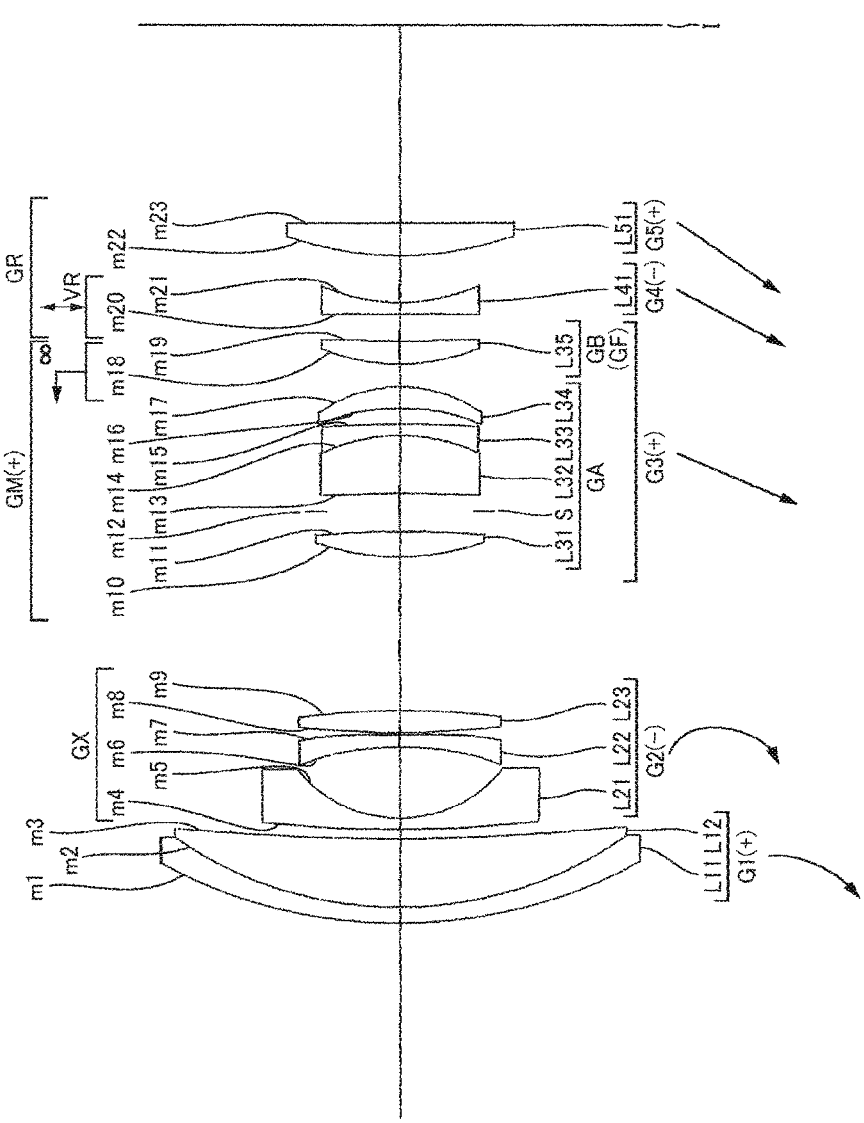

Example 26 is described with reference to FIG. 120 to FIG. 123 and Table 26. A zoom optical system ZLII (ZL26) according to Example 26 includes, as illustrated in FIG. 120, the first lens group G1 having positive refractive power, the second lens group G2 having negative refractive power, the third lens group G3 having positive refractive power, the fourth lens group G4 having negative refractive power, and the fifth lens group G5 having positive refractive power that are arranged in order from the object side.

The first lens group G1 includes the cemented lens including the negative meniscus lens L11 having a concave surface facing the image side and the positive meniscus lens L12 having a convex surface facing the object side that are arranged in order from the object side.

The second lens group G2 includes the negative meniscus lens L21 having a concave surface facing the image side, the negative meniscus lens L22 having a concave surface facing the object side, and the biconvex lens L23 that are arranged in order from the object side. The negative meniscus lens L22 is a glass-molded aspherical lens with lens surfaces, on the object side and on the image surface side, having an aspherical shape.

The third lens group G3 includes the object side group GA and the image side group GB having positive refractive power that are arranged in order from the object side. The object side group GA includes: the biconvex lens L31; the aperture stop S; the cemented lens including the positive meniscus lens L32 having a convex surface facing the image side and the negative meniscus lens L33 having a concave surface facing the object side; and the positive meniscus lens L34 having a convex surface facing the image side that are arranged in order from the object side. The image side group GB includes the positive meniscus lens L35 having a convex surface facing the object side. The biconcave lens L31 is a glass-molded aspherical lens with a lens surface, on the object side, having an aspherical shape. The positive meniscus lens L34 is a glass-molded aspherical lens with a lens surface, on the object side, having an aspherical shape.

The fourth lens group G4 includes a biconcave lens L41. The biconcave lens L41 is a glass-molded aspherical lens with lens surfaces, on the object side and on the image surface side, having an aspherical shape.

The fifth lens group G5 includes the plano-convex lens L51 having a convex surface facing the object side.

The zooming from the wide angle end state to the telephoto end state is achieved with: the first lens group G1 moved toward the object side, the second lens group G2 moved toward the image surface side and then moved toward the object side, and the third lens group G3, the fourth lens group G4, and the fifth lens group G5 moved toward the object side in such a manner that the distance between the first lens group G1 and the second lens group G2 increases, the distance between the second lens group G2 and the third lens group G3 decreases, the distance between the third lens group G3 and the fourth lens group G4 decreases, and the distance between the fourth lens group G4 and the fifth lens group G5 decreases.

Focusing from infinity to the short-distant object is achieved with the image side group GB (=focusing lens group GF) forming the third lens group G3 moved toward the object side.

When image blur occurs, image blur correction (vibration isolation) on the image surface I is performed with the fourth lens group G4 serving as the vibration-proof lens group VR moved with a displacement component in the direction orthogonal to the optical axis. In Example 26, in the wide angle end state, the shifted amount of the vibration-proof lens group VR is −0.142 mm when the correction angle is 0.664°. In the intermediate focal length state, the shifted amount of the vibration-proof lens group VR is −0.142 mm when the correction angle is 0.519°. In the telephoto end state, the shifted amount of the vibration-proof lens group VR is −0.136 mm when the correction angle is 0.387°.

In Table 26 below, specification values in Example 26 are listed. Surface numbers 1 to 23 in Table 26 respectively correspond to the optical surfaces m1 to m23 in FIG. 120.

TABLE 26

[Lens specifications]

| Surface number | R | D | νd | nd |
|---|---|---|---|---|
| Obj surface | ∞ | | | |
| 1 | 36.5281 | 1.40 | 17.98 | 1.94594 |
| 2 | 29.1276 | 5.83 | 52.33 | 1.75500 |
| 3 | 158.4438 | D3 (variable) | | |
| 4 | 91.2316 | 1.00 | 40.66 | 1.88300 |
| 5 | 9.7507 | 6.11 | | |
| *6 | −25.4624 | 1.10 | 40.10 | 1.85135 |
| *7 | −171.2605 | 0.14 | | |
| 8 | 64.1510 | 1.87 | 17.98 | 1.94594 |
| 9 | −60.1639 | D9 (variable) | | |
| *10 | 17.6788 | 2.18 | 58.16 | 1.62263 |
| 11 | −71.7572 | 1.80 | | |
| 12 | ∞ | 1.50 | (aperture stop) | |
| 13 | −129.8844 | 5.00 | 82.57 | 1.49782 |
| 14 | −13.2317 | 1.00 | 28.69 | 1.79504 |
| 15 | −75.6261 | 1.33 | | |
| *16 | −17.8346 | 1.81 | 58.16 | 1.62263 |
| 17 | −10.4367 | D17 (variable) | | |
| 18 | 15.0659 | 2.01 | 82.57 | 1.49782 |
| 19 | 244.7635 | D19 (variable) | | |
| *20 | −273.7319 | 1.00 | 40.10 | 1.85135 |
| *21 | 13.8657 | D21 (variable) | | |
| 22 | 24.2495 | 2.85 | 33.72 | 1.64769 |
| 23 | ∞ | D23 (variable) | | |
| Img surface | ∞ | | | |

TABLE 26-continued

[Aspherical data]

| Surface number | κ | AA | A6 | A8 | A10 |
|---|---|---|---|---|---|
| 6th surface | 0.00 | −3.45636E−05 | −6.64811E−07 | 2.82299E−09 | −7.04101E−11 |
| 7th surface | 0.00 | −6.04474E−05 | −4.14108E−07 | −2.06673E−09 | 0.00000E+00 |
| 10th surface | 0.00 | −2.20361E−05 | −2.04696E−08 | −1.19959E−09 | 0.00000E+00 |
| 16th surface | 0.00 | −1.68079E−04 | 4.19181E−07 | −1.19913E−08 | 6.38223E−11 |
| 20th surface | 0.00 | 1.19790E−04 | −5.17513E−06 | 8.76145E−08 | −6.53217E−10 |
| 21st surface | 0.00 | 6.19772E−05 | −4.74095E−06 | 8.40067E−08 | −6.36691E−10 |

[Various data]

Zoom ratio 2.94

| | Wide angle end | | Intermediate | | Telephoto end |
|---|---|---|---|---|---|
| f | 16.5 | ~ | 26.9 | ~ | 48.5 |
| FNO | 2.9 | ~ | 3.3 | ~ | 4.1 |
| 2ω | 81.7 | ~ | 55.8 | ~ | 31.9 |
| Y | 12.5 | ~ | 14.1 | ~ | 14.3 |
| TL(air) | 77.2 | ~ | 83.7 | ~ | 98.0 |
| BF(air) | 17.0 | ~ | 23.9 | ~ | 35.5 |

[Variable distance data]

| | Upon focusing on infinity | | | Upon focusing on short distant object | | |
|---|---|---|---|---|---|---|
| | Wide angle end | Intermediate | Telephoto end | Wide angle end | Intermediate | Telephoto end |
| f | 16.5 | 26.9 | 48.5 | 16.5 | 26.9 | 48.5 |
| D3 | 0.80 | 8.80 | 18.28 | | | |
| D9 | 13.20 | 5.98 | 0.80 | | | |
| D17 | 1.95 | 1.95 | 1.95 | 1.50 | 1.06 | 0.05 |
| D19 | 2.29 | 2.09 | 1.00 | 2.74 | 2.99 | 2.91 |
| D21 | 3.99 | 3.01 | 2.51 | | | |
| D23 | 17.01 | 23.94 | 35.52 | | | |

[Lens group data]

| | Group starting surface | Group focal length |
|---|---|---|
| First lens group | 1 | 66.25 |
| Second lens group | 4 | −13.76 |
| Third lens group | 10 | 15.90 |
| Fourth lens group | 20 | −15.48 |
| Fifth lens group | 22 | 37.44 |

[Conditional expression corresponding value]

| | |
|---|---|
| Conditional expression(JK1) | $|fF|/fM = 2.022$ |
| Conditional expression(JK2) | $(-fXn)/fM = 0.865$ |
| Conditional expression(JK3) | $dAB/|fF| = 0.061$ |
| Conditional expression(JK4) | $ndp + 0.0075 \times \nu dp - 2.175 = -0.058$ |
| Conditional expression(JK5) | $\nu dp = 82.57$ |
| Conditional expression(JM1) | $dV/|fV| = 0.162$ |
| Conditional expression(JM2) | $|fF|/fM = 2.022$ |
| Conditional expression(JM3) | $dAB/|fF| = 0.061$ |
| Conditional expression(JM4) | $(-fXn)/fM = 0.865$ |
| Conditional expression(JM5) | $ndp + 0.0075 \times \nu dp - 2.175 = -0.058$ |
| Conditional expression(JM6) | $\nu dp = 82.57$ |
| Conditional expression(JN1) | $|fF|/fM = 2.022$ |
| Conditional expression(JN2) | $dV/|fV| = 0.162$ |
| Conditional expression(JN3) | $dAB/|fF| = 0.061$ |
| Conditional expression(JN4) | $(-fXn)/fM = 0.865$ |
| Conditional expression(JN5) | $ndp + 0.0075 \times \nu dp - 2.175 = -0.058$ |
| Conditional expression(JN6) | $\nu dp = 82.57$ |

It can be seen in Table 26 that the zoom optical system ZL26 according to this Example satisfies the conditional expressions (JK1) to (JK5), (JM1) to (JM6), and (JN1) to (JN6).

FIG. 121 is various aberration graphs (a spherical aberration graph, an astigmatism graph, a distortion graph, a lateral chromatic aberration graph, and a coma aberration graph) of the zoom optical system ZL26 according to Example 26 upon focusing on infinity with FIG. 121A corresponding to the wide angle end state, FIG. 121B corresponding to the intermediate focal length state, and FIG. 121C corresponding to the telephoto end state. FIG. 122 is various aberration graphs (a spherical aberration graph, an astigmatism graph, a distortion graph, a lateral chromatic aberration graph, and a coma aberration graph) of the zoom optical system ZL26 according to Example 26 upon focusing on a short distant object with FIG. 122A corresponding to the wide angle end state, FIG. 122B corresponding to the intermediate focal length state, and FIG. 122C corresponding to the telephoto end state. FIG. 123 is a coma aberration graph at the time of image blur correction for the zoom optical system ZL26 according to Example 26 upon focusing on infinity with FIG. 123A corresponding to the wide angle end state, FIG. 123B corresponding to the intermediate focal length state, and FIG. 123C corresponding to the telephoto end state.

It can be seen in the aberration graphs in FIG. 121 to FIG. 123 that the zoom optical system ZL26 according to Example 26 can achieve an excellent optical performance with various aberrations successfully corrected from the wide angle end state to the telephoto end state and from the infinity focusing state to the short-distant object focusing state. Furthermore, it can be seen that a high imaging performance can be achieved upon image blur correction.

Example 27

Example 27 is described with reference to FIG. 124 to FIG. 127 and Table 27. A zoom optical system ZLII (ZL27) according to Example 27 includes, as illustrated in FIG. 124, the first lens group G1 having positive refractive power, the second lens group G2 having negative refractive power, the third lens group G3 having positive refractive power, the fourth lens group G4 having negative refractive power, and the fifth lens group G5 having positive refractive power that are arranged in order from the object side.

The first lens group G1 includes the cemented lens including the negative meniscus lens L11 having a concave surface facing the image side and the positive meniscus lens L12 having a convex surface facing the object side that are arranged in order from the object side.

The second lens group G2 includes the negative meniscus lens L21 having a concave surface facing the image side, the negative meniscus lens L22 having a concave surface facing the object side, and the biconvex lens L23 that are arranged in order from the object side. The negative meniscus lens L22 is a glass-molded aspherical lens with lens surfaces, on the object side and on the image surface side, having an aspherical shape.

The third lens group G3 includes the object side group GA and the image side group GB having positive refractive power that are arranged in order from the object side. The object side group GA includes: the positive meniscus lens L31 having a convex surface facing the object side; the aperture stop S; the cemented lens including the biconvex lens L32 and the negative meniscus lens L33 having a concave surface facing the object side; the positive meniscus lens L34 having a convex surface facing the image side; and the negative meniscus lens L35 having a concave surface facing the image side that are arranged in order from the object side. The image side group GB includes a positive meniscus lens L36 having a convex surface facing the object side. The positive meniscus lens L31 is a glass-molded aspherical lens with a lens surface, on the object side, having an aspherical shape. The positive meniscus lens L34 is a glass-molded aspherical lens with a lens surface, on the object side, having an aspherical shape.

The fourth lens group G4 includes the biconcave lens L41. The biconcave lens L41 is a glass-molded aspherical lens with lens surfaces, on the object side and on the image surface side, having an aspherical shape.

The fifth lens group G5 includes the plano-convex lens L51 having a convex surface facing the object side.

The zooming from the wide angle end state to the telephoto end state is achieved with: the first lens group G1 moved toward the object side, the second lens group G2 moved toward the image surface side and then moved toward the object side, and the third lens group G3, the fourth lens group G4, and the fifth lens group G5 moved toward the object side in such a manner that the distance between the first lens group G1 and the second lens group G2 increases, the distance between the second lens group G2 and the third lens group G3 decreases, the distance between the third lens group G3 and the fourth lens group G4 decreases, and the distance between the fourth lens group G4 and the fifth lens group G5 decreases and then increases.

Focusing from infinity to the short-distant object is achieved with the image side group GB (=focusing lens group GF) forming the third lens group G3 moved toward the object side.

When image blur occurs, image blur correction (vibration isolation) on the image surface I is performed with the fourth lens group G4 serving as the vibration-proof lens group VR moved with a displacement component in the direction orthogonal to the optical axis. In Example 27, in the wide angle end state, the shifted amount of the vibration-proof lens group VR is −0.149 mm when the correction angle is 0.664°. In the intermediate focal length state, the shifted amount of the vibration-proof lens group VR is −0.153 mm when the correction angle is 0.519°. In the telephoto end state, the shifted amount of the vibration-proof lens group VR is −0.142 mm when the correction angle is 0.387°.

In Table 27 below, specification values in Example 27 are listed. Surface numbers 1 to 25 in Table 27 respectively correspond to the optical surfaces m1 to m25 in FIG. 124.

TABLE 27

[Lens specifications]

| Surface number | R | D | νd | nd |
|---|---|---|---|---|
| Obj surface | ∞ | | | |
| 1 | 33.8994 | 1.40 | 17.98 | 1.94594 |
| 2 | 27.5398 | 6.01 | 52.33 | 1.75500 |
| 3 | 126.6471 | D3 (variable) | | |
| 4 | 92.3727 | 1.00 | 40.66 | 1.88300 |
| 5 | 9.6821 | 6.44 | | |
| *6 | −23.7193 | 1.10 | 40.10 | 1.85135 |
| *7 | −83.8988 | 0.10 | | |
| 8 | 89.2398 | 1.85 | 17.98 | 1.94594 |
| 9 | −53.5878 | D9 (variable) | | |
| *10 | 25.3700 | 1.50 | 54.04 | 1.72903 |
| 11 | 230.2228 | 1.80 | | |
| 12 | ∞ | 1.50 | (aperture stop) | |
| 13 | 30.9780 | 6.02 | 70.32 | 1.48749 |
| 14 | −10.4882 | 1.00 | 34.92 | 1.80100 |
| 15 | −22.5902 | 0.93 | | |
| *16 | −14.7775 | 1.52 | 54.04 | 1.72903 |
| 17 | −10.5863 | 0.10 | | |
| 18 | 22.5542 | 1.00 | 28.69 | 1.79504 |
| 19 | 13.5152 | D19 (variable) | | |
| 20 | 13.1123 | 2.16 | 82.57 | 1.49782 |
| 21 | 348.8524 | D21 (variable) | | |
| *22 | −197.6815 | 1.00 | 40.10 | 1.85135 |
| *23 | 14.3470 | D23 (variable) | | |
| 24 | 24.2369 | 2.60 | 32.18 | 1.67270 |
| 25 | ∞ | D25 (variable) | | |
| Img surface | ∞ | | | |

[Aspherical data]

| Surface number | κ | A4 | A6 | A8 | A10 |
|---|---|---|---|---|---|
| 6th surface | 0.00 | −2.49546E−05 | −5.89565E−07 | 1.60407E−09 | −1.06140E−10 |
| 7th surface | 0.00 | −5.60606E−05 | −3.05064E−07 | −5.86297E−09 | 0.00000E+00 |
| 10th surface | 0.00 | −2.37796E−05 | 5.72212E−08 | −2.69510E−09 | 0.00000E+00 |
| 16th surface | 0.00 | −1.20110E−04 | 2.92716E−07 | −8.67042E−09 | 2.49045E−11 |
| 22nd surface | 0.00 | 1.11744E−04 | −5.34712E−06 | 1.11410E−07 | −9.54835E−10 |
| 23rd surface | 0.00 | 6.73836E−05 | −4.97046E−06 | 1.05990E−07 | −9.01623E−10 |

[Various data]

Zoom ratio 2.94

| | Wide angle end | | Intermediate | | Telephoto end |
|---|---|---|---|---|---|
| f | 16.5 | ~ | 26.9 | ~ | 48.5 |
| FNO | 2.9 | ~ | 3.4 | ~ | 4.1 |
| 2ω | 81.7 | ~ | 55.8 | ~ | 32.3 |
| Y | 12.5 | ~ | 14.0 | ~ | 14.3 |
| TL(air) | 77.6 | ~ | 82.5 | ~ | 98.0 |
| BF(air) | 17.0 | ~ | 22.6 | ~ | 34.6 |

[Variable distance data]

| | Upon focusing on infinity | | | Upon focusing on short distant object | | |
|---|---|---|---|---|---|---|
| | Wide angle end | Intermediate | Telephoto end | Wide angle end | Intermediate | Telephoto end |
| f | 16.5 | 26.9 | 48.5 | 16.5 | 26.9 | 48.5 |
| D3 | 0.80 | 8.10 | 17.74 | | | |
| D9 | 13.14 | 5.41 | 0.80 | | | |
| D19 | 1.95 | 1.95 | 1.95 | 1.52 | 1.06 | 0.03 |
| D21 | 2.56 | 2.73 | 1.00 | 2.99 | 3.62 | 2.92 |

TABLE 27-continued

| | | | |
|---|---|---|---|
| D23 | 3.17 | 2.70 | 2.85 |
| D25 | 17.00 | 22.63 | 34.64 |

[Lens group data]

| | Group starting surface | Group focal length |
|---|---|---|
| First lens group | 1 | 63.70 |
| Second lens group | 4 | −13.85 |
| Third lens group | 10 | 15.94 |
| Fourth lens group | 22 | −15.68 |
| Fifth lens group | 24 | 36.03 |

[Conditional expression corresponding value]

| | |
|---|---|
| Conditional expression(JK1) | \|fF\|/fM = 1.713 |
| Conditional expression(JK2) | (−fXn)/fM = 0.869 |
| Conditional expression(JK3) | dAB/\|fF\| = 0.071 |
| Conditional expression(JK4) | ndp + 0.0075 × νdp − 2.175 = −0.058 |
| Conditional expression(JK5) | νdp = 82.57 |
| Conditional expression(JL1) | \|(rB + rA)/(rB − rA)\| = 66.085 |
| Conditional expression(JL2) | \|fF\|/fM = 1.713 |
| Conditional expression(JL3) | dAB/\|fF\| = 0.071 |
| Conditional expression(JL4) | (−fXn)/fM = 0.869 |
| Conditional expression(JL5) | ndp + 0.0075 × νdp − 2.175 = −0.058 |
| Conditional expression(JL6) | νdp = 82.57 |
| Conditional expression(JM1) | dV/\|fV\| = 0.182 |
| Conditional expression(JM2) | \|fF\|/fM = 1.713 |
| Conditional expression(JM3) | dAB/\|fF\| = 0.071 |
| Conditional expression(JM4) | (−fXn)/fM = 0.869 |
| Conditional expression(JM5) | ndp + 0.0075 × νdp − 2.175 = −0.058 |
| Conditional expression(JM6) | νdp = 82.57 |
| Conditional expression(JN1) | \|fF\|/fM = 1.713 |
| Conditional expression(JN2) | dV/\|fV\| = 0.182 |
| Conditional expression(JN3) | dAB/\|fF\| = 0.071 |
| Conditional expression(JN4) | (−fXn)/fM = 0.869 |
| Conditional expression(JN5) | ndp + 0.0075 × νdp − 2.175 = −0.058 |
| Conditional expression(JN6) | νdp = 82.57 |

It can be seen in Table 27 that the zoom optical system ZL27 according to this Example satisfies the conditional expressions (JK1) to (JK5), (JL1) to (JL6), (JM1) to (JM6), and (JN1) to (JN6).

FIG. 125 is various aberration graphs (a spherical aberration graph, an astigmatism graph, a distortion graph, a lateral chromatic aberration graph, and a coma aberration graph) of the zoom optical system ZL27 according to Example 27 upon focusing on infinity with FIG. 125A corresponding to the wide angle end state, FIG. 125B corresponding to the intermediate focal length state, and FIG. 125C corresponding to the telephoto end state. FIG. 126 is various aberration graphs (a spherical aberration graph, an astigmatism graph, a distortion graph, a lateral chromatic aberration graph, and a coma aberration graph) of the zoom optical system ZL27 according to Example 27 upon focusing on a short distant object with FIG. 126A corresponding to the wide angle end state, FIG. 126B corresponding to the intermediate focal length state, and FIG. 126C corresponding to the telephoto end state. FIG. 127 is a coma aberration graph at the time of image blur correction for the zoom optical system ZL27 according to Example 27 upon focusing on infinity with FIG. 127A corresponding to the wide angle end state, FIG. 127B corresponding to the intermediate focal length state, and FIG. 127C corresponding to the telephoto end state.

It can be seen in the aberration graphs in FIG. 125 to FIG. 127 that the zoom optical system ZL27 according to Example 27 can achieve an excellent optical performance with various aberrations successfully corrected from the wide angle end state to the telephoto end state and from the infinity focusing state to the short-distant object focusing state. Furthermore, it can be seen that a high imaging performance can be achieved upon image blur correction.

Example 28

Example 28 is described with reference to FIG. 128 to FIG. 131 and Table 28. A zoom optical system ZLII (ZL28) according to Example 28 includes, as illustrated in FIG. 128, the first lens group G1 having positive refractive power, the second lens group G2 having negative refractive power, the third lens group G3 having positive refractive power, the fourth lens group G4 having negative refractive power, and the fifth lens group G5 having positive refractive power that are arranged in order from the object side.

The first lens group G1 includes the cemented lens including the negative meniscus lens L11 having a concave surface facing the image side and the positive meniscus lens L12 having a convex surface facing the object side that are arranged in order from the object side.

The second lens group G2 includes the negative meniscus lens L21 having a concave surface facing the image side, the negative meniscus lens L22 having a concave surface facing the object side, and the biconvex lens L23 that are arranged in order from the object side. The negative meniscus lens L22 is a glass-molded aspherical lens with lens surfaces, on the object side and on the image surface side, having an aspherical shape.

The third lens group G3 includes the object side group GA and the image side group GB having positive refractive power that are arranged in order from the object side. The object side group GA includes: the biconvex lens L31; the aperture stop S; the cemented lens including the positive meniscus lens L32 having a convex surface facing the image side and the negative meniscus lens L33 having a concave surface facing the object side; the positive meniscus lens L34 having a convex surface facing the image side; and the negative meniscus lens L35 having a concave surface facing the image side that are arranged in order from the object side. The image side group GB includes a biconvex lens L36. The biconvex lens L31 is a glass-molded aspherical lens with a lens surface, on the object side, having an aspherical shape. The positive meniscus lens L34 is a glass-molded aspherical lens with a lens surface, on the object side, having an aspherical shape.

The fourth lens group G4 includes the biconcave lens L41. The biconcave lens L41 is a glass-molded aspherical lens with lens surfaces, on the object side and on the image surface side, having an aspherical shape.

The fifth lens group G5 includes the plano-convex lens L51 having a convex surface facing the object side.

The zooming from the wide angle end state to the telephoto end state is achieved with: the first lens group G1 moved toward the object side, the second lens group G2 moved toward the image surface side and then moved toward the object side, and the third lens group G3, the fourth lens group G4, and the fifth lens group G5 moved toward the object side in such a manner that the distance between the first lens group G1 and the second lens group G2 increases, the distance between the second lens group G2 and the third lens group G3 decreases, the distance between the third lens group G3 and the fourth lens group G4 increases and then decreases, and the distance between the fourth lens group G4 and the fifth lens group G5 decreases and then increases.

Focusing from infinity to the short-distant object is achieved with the image side group GB (=focusing lens group GF) forming the third lens group G3 moved toward the object side.

When image blur occurs, image blur correction (vibration isolation) on the image surface I is performed with the fourth lens group G4 serving as the vibration-proof lens group VR moved with a displacement component in the direction orthogonal to the optical axis. In Example 28, in the wide angle end state, the shifted amount of the vibration-proof lens group VR is −0.143 mm when the correction angle is 0.664°. In the intermediate focal length state, the shifted amount of the vibration-proof lens group VR is −0.144 mm when the correction angle is 0.519°. In the telephoto end state, the shifted amount of the vibration-proof lens group VR is −0.144 mm when the correction angle is 0.387°.

In Table 28 below, specification values in Example 28 are listed. Surface numbers 1 to 25 in Table 28 respectively correspond to the optical surfaces m1 to m25 in FIG. 128.

TABLE 28

[Lens specifications]

| Surface number | R | D | νd | nd |
|---|---|---|---|---|
| Obj surface | ∞ | | | |
| 1 | 37.6690 | 1.40 | 17.98 | 1.94594 |
| 2 | 30.7768 | 5.49 | 52.33 | 1.75500 |
| 3 | 153.0002 | D3 (variable) | | |
| 4 | 105.2565 | 1.00 | 40.66 | 1.88300 |
| 5 | 10.1696 | 7.24 | | |
| *6 | −20.8194 | 1.10 | 40.10 | 1.85135 |
| *7 | −52.3791 | 0.10 | | |
| 8 | 1331.6674 | 1.74 | 17.98 | 1.94594 |
| 9 | −40.6822 | D9 (variable) | | |
| *10 | 23.8959 | 2.11 | 54.04 | 1.72903 |
| 11 | −42.1515 | 1.80 | | |
| 12 | ∞ | 1.50 | (aperture stop) | |
| 13 | −361.9871 | 3.86 | 70.32 | 1.48749 |
| 14 | −8.7743 | 1.00 | 34.92 | 1.80100 |
| 15 | −11.3715 | 0.10 | | |
| *16 | −21.9272 | 0.95 | 54.04 | 1.72903 |
| 17 | −24.9045 | 0.10 | | |
| 18 | 21.1771 | 1.00 | 28.69 | 1.79504 |
| 19 | 9.8802 | D19 (variable) | | |
| 20 | 12.1120 | 2.81 | 82.57 | 1.49782 |
| 21 | −70.6477 | D21 (variable) | | |
| *22 | −6109.2098 | 1.00 | 40.10 | 1.85135 |
| *23 | 12.6136 | D23 (variable) | | |
| 24 | 23.1959 | 2.53 | 32.18 | 1.67270 |
| 25 | ∞ | D25 (variable) | | |
| Img surface | ∞ | | | |

[Aspherical data]

| Surface number | κ | A4 | A6 | A8 | A10 |
|---|---|---|---|---|---|
| 6th surface | 0.00 | −4.88185E−05 | 2.75927E−08 | −3.15364E−09 | −7.98095E−11 |
| 7th surface | 0.00 | −7.62891E−05 | 2.27328E−07 | −8.08982E−09 | 0.00000E+00 |

TABLE 28-continued

| | | | | | |
|---|---|---|---|---|---|
| 10th surface | 0.00 | −7.94822E−05 | −3.39871E−08 | −6.07178E−09 | 0.00000E+00 |
| 16th surface | 0.00 | −3.91116E−05 | 3.34980E−07 | −1.57304E−09 | 1.71741E−11 |
| 22nd surface | 0.00 | 7.48094E−05 | −2.63577E−06 | 6.19261E−08 | −5.37903E−10 |
| 23rd surface | 0.00 | 3.43492E−05 | −2.41206E−06 | 5.49617E−08 | −3.93573E−10 |

[Various data]
Zoom ratio 2.94

| | Wide angle end | | Intermediate | | Telephoto end |
|---|---|---|---|---|---|
| f | 16.5 | ~ | 27.0 | ~ | 48.5 |
| FNO | 2.9 | ~ | 3.4 | ~ | 4.1 |
| 2ω | 81.7 | ~ | 55.7 | ~ | 32.5 |
| Y | 12.5 | ~ | 13.9 | ~ | 14.3 |
| TL (air) | 77.7 | ~ | 82.5 | ~ | 98.0 |
| BF (air) | 17.0 | ~ | 22.9 | ~ | 31.9 |

[Variable distance data]

| | Upon focusing on infinity | | | Upon focusing on short distant object | | |
|---|---|---|---|---|---|---|
| | Wide angle end | Intermediate | Telephoto end | Wide angle end | Intermediate | Telephoto end |
| f | 16.5 | 27.0 | 48.5 | 16.5 | 27.0 | 48.5 |
| D3 | 0.80 | 7.52 | 18.90 | | | |
| D9 | 14.16 | 5.88 | 0.80 | | | |
| D19 | 5.41 | 5.41 | 5.41 | 5.02 | 4.62 | 3.60 |
| D21 | 0.87 | 1.48 | 1.00 | 1.27 | 2.27 | 2.82 |
| D23 | 2.64 | 2.49 | 3.14 | | | |
| D25 | 17.00 | 22.88 | 31.90 | | | |

[Lens group data]

| | Group starting surface | Group focal length |
|---|---|---|
| First lens group | 1 | 69.12 |
| Second lens group | 4 | −13.69 |
| Third lens group | 10 | 17.00 |
| Fourth lens group | 22 | −14.78 |
| Fifth lens group | 24 | 34.48 |

[Conditional expression corresponding value]

| | |
|---|---|
| Conditional expression(JK1) | $\lvert fF\rvert/fM = 1.416$ |
| Conditional expression(JK2) | $(-fXn)/fM = 0.923$ |
| Conditional expression(JK3) | $dAB/\lvert fF\rvert = 0.258$ |
| Conditional expression(JK4) | $ndp + 0.0075 \times \nu dp - 2.175 = -0.058$ |
| Conditional expression(JK5) | $\nu dp = 82.57$ |
| Conditional expression(JL1) | $\lvert(rB + rA)/(rB - rA)\rvert = 9.854$ |
| Conditional expression(JL2) | $\lvert fF\rvert/fM = 1.416$ |
| Conditional expression(JL3) | $dAB/\lvert fF\rvert = 0.258$ |
| Conditional expression(JL4) | $(-fXn)/fM = 0.923$ |
| Conditional expression(JL5) | $ndp + 0.0075 \times \nu dp - 2.175 = -0.058$ |
| Conditional expression(JL6) | $\nu dp = 82.57$ |
| Conditional expression(JM1) | $dV/\lvert fV\rvert = 0.212$ |
| Conditional expression(JM2) | $\lvert fF\rvert/fM = 1.416$ |
| Conditional expression(JM3) | $dAB/\lvert fF\rvert = 0.258$ |
| Conditional expression(JM4) | $(-fXn)/fM = 0.923$ |
| Conditional expression(JM5) | $ndp + 0.0075 \times \nu dp - 2.175 = -0.058$ |
| Conditional expression(JM6) | $\nu dp = 82.57$ |
| Conditional expression(JN1) | $\lvert fF\rvert/fM = 1.416$ |
| Conditional expression(JN2) | $dV/\lvert fV\rvert = 0.212$ |
| Conditional expression(JN3) | $dAB/\lvert fF\rvert = 0.258$ |
| Conditional expression(JN4) | $(-fXn)/fM = 0.923$ |
| Conditional expression(JN5) | $ndp + 0.0075 \times \nu dp - 2.175 = -0.058$ |
| Conditional expression(JN6) | $\nu dp = 82.57$ |

It can be seen in Table 28 that the zoom optical system ZL28 according to this Example satisfies the conditional expressions (JK1) to (JK5), (JL1) to (JL6), (JM1) to (JM6), and (JN1) to (JN6).

FIG. 129 is various aberration graphs (a spherical aberration graph, an astigmatism graph, a distortion graph, a lateral chromatic aberration graph, and a coma aberration graph) of the zoom optical system ZL28 according to Example 28 upon focusing on infinity with FIG. 129A corresponding to the wide angle end state, FIG. 129B corresponding to the intermediate focal length state, and FIG. 129C corresponding to the telephoto end state. FIG. 130 is various aberration graphs (a spherical aberration graph, an astigmatism graph, a distortion graph, a lateral chromatic aberration graph, and a coma aberration graph) of the zoom optical system ZL28 according to Example 28 upon focusing on a short distant object with FIG. 130A corresponding to the wide angle end state, FIG. 130B corresponding to the intermediate focal length state, and FIG. 130C corresponding to the telephoto end state. FIG. 131 is a coma aberration graph at the time of image blur correction for the zoom optical system ZL28 according to Example 28 upon focusing on infinity with FIG. 131A corresponding to the wide angle end state, FIG. 131B corresponding to the intermediate focal length state, and FIG. 131C corresponding to the telephoto end state.

It can be seen in the aberration graphs in FIG. 129 to FIG. 131 that the zoom optical system ZL28 according to Example 28 can achieve an excellent optical performance with various aberrations successfully corrected from the wide angle end state to the telephoto end state and from the infinity focusing state to the short-distant object focusing state. Furthermore, it can be seen that a high imaging performance can be achieved upon image blur correction.

Example 29

Example 29 is described with reference to FIG. 132 to FIG. 135 and Table 29. A zoom optical system ZLII (ZL29) according to Example 29 includes, as illustrated in FIG. 132, the first lens group G1 having positive refractive power, the second lens group G2 having negative refractive power, the third lens group G3 having positive refractive power, the fourth lens group G4 having negative refractive power, and the fifth lens group G5 having positive refractive power that are arranged in order from the object side.

The first lens group G1 includes the cemented lens including the negative meniscus lens L11 having a concave surface facing the image side and the positive meniscus lens L12 having a convex surface facing the object side that are arranged in order from the object side.

The second lens group G2 includes the negative meniscus lens L21 having a concave surface facing the image side, the negative meniscus lens L22 having a concave surface facing the object side, and the biconvex lens L23 that are arranged in order from the object side. The negative meniscus lens L22 is a glass-molded aspherical lens with lens surfaces, on the object side and on the image surface side, having an aspherical shape.

The third lens group G3 includes the object side group GA and the image side group GB having positive refractive power that are arranged in order from the object side. The object side group GA includes: the positive meniscus lens L31 having a convex surface facing the object side; the aperture stop S; the cemented lens including the biconvex lens L32 and the negative meniscus lens L33 having a concave surface facing the object side; a biconcave lens L34; and the negative meniscus lens L35 having a concave surface facing the image side that are arranged in order from the object side. The image side group GB includes the biconvex lens L36. The positive meniscus lens L31 is a glass-molded aspherical lens with a lens surface, on the object side, having an aspherical shape. The biconcave lens L34 is a glass-molded aspherical lens with a lens surface, on the object side, having an aspherical shape.

The fourth lens group G4 includes the biconcave lens L41. The biconcave lens L41 is a glass-molded aspherical lens with lens surfaces, on the object side and on the image surface side, having an aspherical shape.

The fifth lens group G5 includes the plano-convex lens L51 having a convex surface facing the object side.

The zooming from the wide angle end state to the telephoto end state is achieved with: the first lens group G1 moved toward the object side, the second lens group G2 moved toward the image surface side and then moved toward the object side, and the third lens group G3, the fourth lens group G4, and the fifth lens group G5 moved toward the object side in such a manner that the distance between the first lens group G1 and the second lens group G2 increases, the distance between the second lens group G2 and the third lens group G3 decreases, the distance between the third lens group G3 and the fourth lens group G4 increases and then decreases, and the distance between the fourth lens group G4 and the fifth lens group G5 decreases and then increases.

Focusing from infinity to the short-distant object is achieved with the image side group GB (=focusing lens group GF) forming the third lens group G3 moved toward the object side.

When image blur occurs, image blur correction (vibration isolation) on the image surface I is performed with the fourth lens group G4 serving as the vibration-proof lens group VR moved with a displacement component in the direction orthogonal to the optical axis. In Example 29, in the wide angle end state, the shifted amount of the vibration-proof lens group VR is −0.119 mm when the correction angle is 0.664°. In the intermediate focal length state, the shifted amount of the vibration-proof lens group VR is −0.117 mm when the correction angle is 0.520°. In the telephoto end state, the shifted amount of the vibration-proof lens group VR is −0.120 mm when the correction angle is 0.387°.

In Table 29 below, specification values in Example 29 are listed. Surface numbers 1 to 25 in Table 29 respectively correspond to the optical surfaces m1 to m25 in FIG. 132.

TABLE 29

[Lens specifications]

| Surface number | R | D | νd | nd |
|---|---|---|---|---|
| Obj surface | ∞ | | | |
| 1 | 35.9311 | 1.40 | 17.98 | 1.94594 |
| 2 | 29.3530 | 5.87 | 52.33 | 1.75500 |
| 3 | 144.9525 | D3 (variable) | | |
| 4 | 90.5280 | 1.00 | 40.66 | 1.88300 |
| 5 | 9.9424 | 6.38 | | |
| *6 | −24.8978 | 1.10 | 40.10 | 1.85135 |
| *7 | −109.2593 | 0.10 | | |
| 8 | 72.2923 | 1.85 | 17.98 | 1.94594 |
| 9 | −64.1394 | D9 (variable) | | |
| *10 | 22.0322 | 1.46 | 54.04 | 1.72903 |
| 11 | 78.6588 | 1.80 | | |
| 12 | ∞ | 1.50 | (aperture stop) | |
| 13 | 39.3804 | 7.28 | 70.32 | 1.48749 |
| 14 | −8.3594 | 1.00 | 34.92 | 1.80100 |
| 15 | −10.9912 | 0.10 | | |
| *16 | −1463.0009 | 0.90 | 54.04 | 1.72903 |
| 17 | 399.2118 | 0.10 | | |
| 18 | 29.7363 | 1.00 | 28.69 | 1.79504 |
| 19 | 14.1659 | D19 (variable) | | |
| 20 | 12.0460 | 2.69 | 67.90 | 1.59319 |
| 21 | −161.5248 | D21 (variable) | | |
| *22 | −112.0734 | 1.00 | 40.10 | 1.85135 |
| *23 | 12.0674 | D23 (variable) | | |
| 24 | 25.4959 | 2.47 | 32.18 | 1.67270 |
| 25 | ∞ | D25 (variable) | | |
| Img surface | ∞ | | | |

[Aspherical data]

| Surface number | κ | A4 | A6 | A8 | A10 |
|---|---|---|---|---|---|
| 6th surface | 0.00 | −4.90680E−05 | −2.96114E−07 | 1.23159E−09 | −1.00914E−10 |
| 7th surface | 0.00 | −7.33376E−05 | −3.11275E−09 | −6.22074E−09 | 0.00000E+00 |
| 10th surface | 0.00 | −4.70151E−05 | −2.47124E−08 | −8.76074E−09 | 0.00000E+00 |
| 16th surface | 0.00 | −1.00072E−04 | −6.68495E−08 | −6.27648E−11 | 1.61473E−12 |
| 22nd surface | 0.00 | 9.60313E−05 | −3.64209E−06 | 6.01110E−08 | −4.07929E−10 |
| 23rd surface | 0.00 | 2.02167E−05 | −3.49227E−06 | 6.09640E−08 | −3.91518E−10 |

[Various data]
Zoom ratio 2.94

| | Wide angle end | | Intermediate | | Telephoto end |
|---|---|---|---|---|---|
| f | 16.5 | ~ | 26.9 | ~ | 48.5 |
| FNO | 2.9 | ~ | 3.5 | ~ | 4.1 |
| 2ω | 81.7 | ~ | 55.9 | ~ | 32.5 |
| Y | 12.5 | ~ | 13.9 | ~ | 14.3 |
| TL(air) | 77.1 | ~ | 80.8 | ~ | 98.0 |
| BF(air) | 16.7 | ~ | 24.1 | ~ | 32.9 |

[Variable distance data]

| | Upon focusing on infinity | | | Upon focusing on short distant object | | |
|---|---|---|---|---|---|---|
| | Wide angle end | Intermediate | Telephoto end | Wide angle end | Intermediate | Telephoto end |
| f | 16.5 | 26.9 | 48.5 | 16.5 | 26.9 | 48.5 |
| D3 | 0.80 | 5.95 | 18.25 | | | |
| D9 | 13.15 | 4.94 | 0.80 | | | |
| D19 | 1.82 | 1.82 | 1.82 | 1.54 | 1.29 | 0.61 |
| D21 | 1.65 | 1.75 | 1.00 | 1.93 | 2.28 | 2.21 |

TABLE 29-continued

| | | | |
|---|---|---|---|
| D23 | 3.73 | 3.21 | 4.27 |
| D25 | 17.00 | 24.11 | 32.86 |

[Lens group data]

| | Group starting surface | Group focal length |
|---|---|---|
| First lens group | 1 | 65.87 |
| Second lens group | 4 | −13.88 |
| Third lens group | 10 | 14.23 |
| Fourth lens group | 22 | −12.75 |
| Fifth lens group | 24 | 37.90 |

[Conditional expression corresponding value]

| | |
|---|---|
| Conditional expression(JK1) | \|fF\|/fM = 1.336 |
| Conditional expression(JK2) | (−fXn)/fM = 0.976 |
| Conditional expression(JK3) | dAB/\|fF\| = 0.096 |
| Conditional expression(JK4) | ndp + 0.0075 × νdp − 2.175 = −0.073 |
| Conditional expression(JK5) | νdp = 67.90 |
| Conditional expression(JL1) | \|(rB + rA)/(rB − rA)\| = 12.364 |
| Conditional expression(JL2) | \|fF\|/fM = 1.336 |
| Conditional expression(JL3) | dAB/\|fF\| = 0.096 |
| Conditional expression(JL4) | (−fXn)/fM = 0.976 |
| Conditional expression(JL5) | ndp + 0.0075 × νdp − 2.175 = −0.073 |
| Conditional expression(JL6) | νdp = 67.90 |
| Conditional expression(JM1) | dV/\|fV\| = 0.335 |
| Conditional expression(JM2) | \|fF\|/fM = 1.336 |
| Conditional expression(JM3) | dAB/\|fF\| = 0.096 |
| Conditional expression(JM4) | (−fXn)/fM = 0.976 |
| Conditional expression(JM5) | ndp + 0.0075 × νdp − 2.175 = −0.073 |
| Conditional expression(JM6) | νdp = 67.90 |
| Conditional expression(JN1) | \|fF\|/fM = 1.336 |
| Conditional expression(JN2) | dV/\|fV\| = 0.335 |
| Conditional expression(JN3) | dAB/\|fF\| = 0.096 |
| Conditional expression(JN4) | (−fXn)/fM = 0.976 |
| Conditional expression(JN5) | ndp + 0.0075 × νdp − 2.175 = −0.073 |
| Conditional expression(JN6) | νdp = 67.90 |

It can be seen in Table 29 that the zoom optical system ZL29 according to this Example satisfies the conditional expressions (JK1) to (JK5), (JL1) to (JL6), (JM1) to (JM6), and (JN1) to (JN6).

FIG. 133 is various aberration graphs (a spherical aberration graph, an astigmatism graph, a distortion graph, a lateral chromatic aberration graph, and a coma aberration graph) of the zoom optical system ZL29 according to Example 29 upon focusing on infinity with FIG. 133A corresponding to the wide angle end state, FIG. 133B corresponding to the intermediate focal length state, and FIG. 133C corresponding to the telephoto end state. FIG. 134 is various aberration graphs (a spherical aberration graph, an astigmatism graph, a distortion graph, a lateral chromatic aberration graph, and a coma aberration graph) of the zoom optical system ZL29 according to Example 29 upon focusing on a short distant object with FIG. 134A corresponding to the wide angle end state, FIG. 134B corresponding to the intermediate focal length state, and FIG. 134C corresponding to the telephoto end state. FIG. 135 is a coma aberration graph at the time of image blur correction for the zoom optical system ZL29 according to Example 29 upon focusing on infinity with FIG. 135A corresponding to the wide angle end state, FIG. 135B corresponding to the intermediate focal length state, and FIG. 135C corresponding to the telephoto end state.

It can be seen in the aberration graphs in FIG. 133 to FIG. 135 that the zoom optical system ZL29 according to Example 29 can achieve an excellent optical performance with various aberrations successfully corrected from the wide angle end state to the telephoto end state and from the infinity focusing state to the short-distant object focusing state. Furthermore, it can be seen that a high imaging performance can be achieved upon image blur correction.

Example 30

Example 30 is described with reference to FIG. 136 to FIG. 139 and Table 30. A zoom optical system ZLII (ZL30) according to Example 30 includes, as illustrated in FIG. 136, the first lens group G1 having positive refractive power, the second lens group G2 having negative refractive power, the third lens group G3 having positive refractive power, the fourth lens group G4 having negative refractive power, and the fifth lens group G5 having positive refractive power that are arranged in order from the object side.

The first lens group G1 includes the cemented lens including the negative meniscus lens L11 having a concave surface facing the image side and the positive meniscus lens L12 having a convex surface facing the object side that are arranged in order from the object side.

The second lens group G2 includes the negative meniscus lens L21 having a concave surface facing the image side, the negative meniscus lens L22 having a concave surface facing the object side, and the biconvex lens L23 that are arranged in order from the object side. The negative meniscus lens L22 is a glass-molded aspherical lens with lens surfaces, on the object side and on the image surface side, having an aspherical shape.

The third lens group G3 includes the object side group GA and the image side group GB having positive refractive power that are arranged in order from the object side. The object side group GA includes: the positive meniscus lens L31 having a convex surface facing the object side; the aperture stop S; the cemented lens including the biconvex lens L32 and a biconcave lens L33; and the positive meniscus lens L34 having a convex surface facing the image side that are arranged in order from the object side. The image side group GB includes the positive meniscus lens L35 having a convex surface facing the object side. The positive meniscus lens L31 is a glass-molded aspherical lens with a lens surface, on the object side, having an aspherical shape. The positive meniscus lens L34 is a glass-molded aspherical lens with a lens surface, on the object side, having an aspherical shape.

The fourth lens group G4 includes the biconcave lens L41. The biconcave lens L41 is a glass-molded aspherical lens with lens surfaces, on the object side and on the image surface side, having an aspherical shape.

The fifth lens group G5 includes the plano-convex lens L51 having a convex surface facing the object side.

The zooming from the wide angle end state to the telephoto end state is achieved with: the first lens group G1 moved toward the object side, the second lens group G2 moved toward the image surface side and then moved toward the object side, and the third lens group G3, the fourth lens group G4, and the fifth lens group G5 moved toward the object side in such a manner that the distance between the first lens group G1 and the second lens group G2 increases, the distance between the second lens group G2 and the third lens group G3 decreases, the distance between the third lens group G3 and the fourth lens group G4 increases and then decreases, and the distance between the fourth lens group G4 and the fifth lens group G5 decreases and then increases.

Focusing from infinity to the short-distant object is achieved with the image side group GB (=focusing lens group GF) forming the third lens group G3 moved toward the object side.

When image blur occurs, image blur correction (vibration isolation) on the image surface I is performed with the fourth lens group G4 serving as the vibration-proof lens group VR moved with a displacement component in the direction orthogonal to the optical axis. In Example 30, in the wide angle end state, the shifted amount of the vibration-proof lens group VR is −0.149 mm when the correction angle is 0.664°. In the intermediate focal length state, the shifted amount of the vibration-proof lens group VR is −0.148 mm when the correction angle is 0.472°. In the telephoto end state, the shifted amount of the vibration-proof lens group VR is −0.138 mm when the correction angle is 0.369°.

In Table 30 below, specification values in Example 30 are listed. Surface numbers 1 to 23 in Table 30 respectively correspond to the optical surfaces m1 to m23 in FIG. 136.

TABLE 30

[Lens specifications]

| Surface number | R | D | νd | nd |
|---|---|---|---|---|
| Obj surface | ∞ | | | |
| 1 | 39.2657 | 1.40 | 17.98 | 1.94594 |
| 2 | 32.0347 | 5.41 | 54.61 | 1.72916 |
| 3 | 212.2782 | D3 (variable) | | |
| 4 | 98.5206 | 1.00 | 40.66 | 1.88300 |
| 5 | 10.2718 | 5.76 | | |
| *6 | −28.7616 | 1.10 | 40.10 | 1.85135 |
| *7 | −227.7422 | 0.10 | | |
| 8 | 43.7706 | 1.81 | 17.98 | 1.94594 |
| 9 | −144.7057 | D9 (variable) | | |
| *10 | 18.8952 | 1.81 | 40.10 | 1.85135 |
| 11 | 174.2175 | 1.80 | | |
| 12 | ∞ | 1.50 | (aperture stop) | |
| 13 | 37.6452 | 4.77 | 82.57 | 1.49782 |
| 14 | −12.1742 | 1.00 | 28.69 | 1.79504 |
| 15 | 109.6975 | 1.86 | | |
| *16 | −23.7259 | 2.77 | 61.25 | 1.58913 |
| 17 | −10.9579 | D17 (variable) | | |
| 18 | 14.9105 | 1.96 | 82.57 | 1.49782 |
| 19 | 126.8885 | D19 (variable) | | |
| *20 | −104.1893 | 1.00 | 40.10 | 1.85135 |
| *21 | 14.8854 | D21 (variable) | | |
| 22 | 25.1236 | 2.47 | 27.57 | 1.75520 |
| 23 | ∞ | D23 (variable) | | |
| Img surface | ∞ | | | |

[Aspherical data]

| Surface number | κ | A4 | A6 | A8 | A10 |
|---|---|---|---|---|---|
| 6th surface | 0.00 | −4.72972E−05 | −5.73102E−07 | 2.68294E−09 | −3.91891E−11 |
| 7th surface | 0.00 | −6.48435E−05 | −3.58350E−07 | −2.56642E−10 | 0.00000E+00 |
| 10th surface | 0.00 | −3.56816E−06 | 2.00247E−08 | 4.46645E−10 | 0.00000E+00 |

TABLE 30-continued

| | | | | | |
|---|---|---|---|---|---|
| 16th surface | 0.00 | −1.64136E−04 | 3.66711E−07 | −1.61799E−08 | 1.14197E−10 |
| 20th surface | 0.00 | 8.65735E−05 | −3.88224E−06 | 7.16573E−08 | −5.59042E−10 |
| 21st surface | 0.00 | 4.14922E−05 | −3.47282E−06 | 6.38155E−08 | −4.78441E−10 |

[Various data]
Zoom ratio 3.24

| | Wide angle end | | Intermediate | | Telephoto end |
|---|---|---|---|---|---|
| f | 16.5 | ~ | 32.6 | ~ | 53.4 |
| FNO | 2.9 | ~ | 3.5 | ~ | 4.1 |
| 2ω | 81.7 | ~ | 46.9 | ~ | 29.1 |
| Y | 12.4 | ~ | 14.3 | ~ | 14.3 |
| TL(air) | 76.5 | ~ | 85.0 | ~ | 102.0 |
| BF(air) | 17.0 | ~ | 25.9 | ~ | 37.1 |

[Variable distance data]

| | Upon focusing on infinity | | | Upon focusing on short distant object | | |
|---|---|---|---|---|---|---|
| | Wide angle end | Intermediate | Telephoto end | Wide angle end | Intermediate | Telephoto end |
| f | 16.5 | 32.6 | 53.4 | 16.5 | 32.6 | 53.4 |
| D3 | 0.80 | 10.93 | 21.12 | | | |
| D9 | 13.98 | 3.53 | 0.80 | | | |
| D17 | 2.10 | 2.10 | 2.10 | 1.58 | 0.78 | 0.06 |
| D19 | 2.56 | 2.94 | 1.00 | 3.08 | 4.26 | 3.04 |
| D21 | 2.54 | 2.07 | 2.41 | | | |
| D23 | 17.00 | 25.92 | 37.06 | | | |

[Lens group data]

| | Group starting surface | Group focal length |
|---|---|---|
| First lens group | 1 | 70.16 |
| Second lens group | 4 | −14.24 |
| Third lens group | 10 | 16.74 |
| Fourth lens group | 20 | −15.24 |
| Fifth lens group | 22 | 33.27 |

[Conditional expression corresponding value]

| | |
|---|---|
| Conditional expression(JK1) | $\|fF\|/fM = 2.016$ |
| Conditional expression(JK2) | $(-fXn)/fM = 0.850$ |
| Conditional expression(JK3) | $dAB/\|fF\| = 0.062$ |
| Conditional expression(JK4) | $ndp + 0.0075 \times \nu dp - 2.175 = -0.058$ |
| Conditional expression(JK5) | $\nu dp = 82.57$ |
| Conditional expression(JM1) | $dV/\|fV\| = 0.158$ |
| Conditional expression(JM2) | $\|fF\|/fM = 2.016$ |
| Conditional expression(JM3) | $dAB/\|fF\| = 0.062$ |
| Conditional expression(JM4) | $(-fXn)/fM = 0.850$ |
| Conditional expression(JM5) | $ndp + 0.0075 \times \nu dp - 2.175 = -0.058$ |
| Conditional expression(JM6) | $\nu dp = 82.57$ |
| Conditional expression(JN1) | $\|fF\|/fM = 2.016$ |
| Conditional expression(JN2) | $dV/\|fV\| = 0.158$ |
| Conditional expression(JN3) | $dAB/\|fF\| = 0.062$ |
| Conditional expression(JN4) | $(-fXn)/fM = 0.850$ |
| Conditional expression(JN5) | $ndp + 0.0075 \times \nu dp - 2.175 = -0.058$ |
| Conditional expression(JN6) | $\nu dp = 82.57$ |

It can be seen in Table 30 that the zoom optical system ZL30 according to this Example satisfies the conditional expressions (JK1) to (JK5), (JM1) to (JM6), and (JN1) to (JN6).

FIG. 137 is various aberration graphs (a spherical aberration graph, an astigmatism graph, a distortion graph, a lateral chromatic aberration graph, and a coma aberration graph) of the zoom optical system ZL30 according to Example 30 upon focusing on infinity with FIG. 137A corresponding to the wide angle end state, FIG. 137B corresponding to the intermediate focal length state, and FIG. 137C corresponding to the telephoto end state. FIG. 138 is various aberration graphs (a spherical aberration graph, an astigmatism graph, a distortion graph, a lateral chromatic aberration graph, and a coma aberration graph) of the zoom optical system ZL30 according to Example 30 upon focusing on a short distant object with FIG. 138A corresponding to the wide angle end state, FIG. 138B corresponding to the intermediate focal length state, and FIG. 138C corresponding to the telephoto end state. FIG.

139 is a coma aberration graph at the time of image blur correction for the zoom optical system ZL30 according to Example 30 upon focusing on infinity with FIG. 139A corresponding to the wide angle end state, FIG. 139B corresponding to the intermediate focal length state, and FIG. 139C corresponding to the telephoto end state.

It can be seen in the aberration graphs in FIG. 137 to FIG. 139 that the zoom optical system ZL30 according to Example 30 can achieve an excellent optical performance with various aberrations successfully corrected from the wide angle end state to the telephoto end state and from the infinity focusing state to the short-distant object focusing state. Furthermore, it can be seen that a high imaging performance can be achieved upon image blur correction.

Example 31

Example 31 is described with reference to FIG. 140 to FIG. 143 and Table 31. A zoom optical system ZLII (ZL31) according to Example 31 includes, as illustrated in FIG. 140, the first lens group G1 having positive refractive power, the second lens group G2 having negative refractive power, the third lens group G3 having positive refractive power, and the fourth lens group G4 having negative refractive power that are arranged in order from the object side.

The first lens group G1 includes the cemented lens including the negative meniscus lens L11 having a concave surface facing the image side and the positive meniscus lens L12 having a convex surface facing the object side that are arranged in order from the object side.

The second lens group G2 includes the negative meniscus lens L21 having a concave surface facing the image side, the negative meniscus lens L22 having a concave surface facing the object side, and the biconvex lens L23 that are arranged in order from the object side. The negative meniscus lens L22 is a glass-molded aspherical lens with lens surfaces, on the object side and on the image surface side, having an aspherical shape.

The third lens group G3 includes the object side group GA and the image side group GB having positive refractive power that are arranged in order from the object side. The object side group GA includes: the positive meniscus lens L31 having a convex surface facing the object side; the aperture stop S; the cemented lens including the biconvex lens L32 and the biconcave lens L33; and the positive meniscus lens L34 having a convex surface facing the image side that are arranged in order from the object side. The image side group GB includes the positive meniscus lens L35 having a convex surface facing the object side. The positive meniscus lens L31 is a glass-molded aspherical lens with a lens surface, on the object side, having an aspherical shape. The positive meniscus lens L34 is a glass-molded aspherical lens with a lens surface, on the object side, having an aspherical shape.

The fourth lens group G4 includes the biconcave lens L41 and the plano-convex lens L42 having a convex surface facing the object side that are arranged in order from the object side. The biconcave lens L41 is a glass-molded aspherical lens with lens surfaces, on the object side and on the image surface side, having an aspherical shape.

The zooming from the wide angle end state to the telephoto end state is achieved with: the first lens group G1 moved toward the object side, the second lens group G2 moved toward the image surface side and then moved toward the object side, and the third lens group G3 and the fourth lens group G4 moved toward the object side in such a manner that the distance between the first lens group G1 and the second lens group G2 increases, the distance between the second lens group G2 and the third lens group G3 decreases, and the distance between the third lens group G3 and the fourth lens group G4 increases and then decreases.

Focusing from infinity to the short-distant object is achieved with the image side group GB (=focusing lens group GF) forming the third lens group G3 moved toward the object side.

When image blur occurs, image blur correction (vibration isolation) on the image surface I is performed with the biconcave lens L41 forming the fourth lens group G4 serving as the vibration-proof lens group VR moved with a displacement component in the direction orthogonal to the optical axis. In Example 31, in the wide angle end state, the shifted amount of the vibration-proof lens group VR is −0.157 mm when the correction angle is 0.664°. In the intermediate focal length state, the shifted amount of the vibration-proof lens group VR is −0.162 mm when the correction angle is 0.472°. In the telephoto end state, the shifted amount of the vibration-proof lens group VR is −0.146 mm when the correction angle is 0.369°.

In Table 31 below, specification values in Example 31 are listed. Surface numbers 1 to 23 in Table 31 respectively correspond to the optical surfaces m1 to m23 in FIG. 140.

TABLE 31

[Lens specifications]

| Surface number | R | D | νd | nd |
|---|---|---|---|---|
| Obj surface | ∞ | | | |
| 1 | 37.2595 | 1.40 | 17.98 | 1.94594 |
| 2 | 30.3215 | 5.43 | 54.61 | 1.72916 |
| 3 | 191.3214 | D3 (variable) | | |
| 4 | 134.9736 | 1.00 | 40.66 | 1.88300 |
| 5 | 10.2676 | 5.70 | | |
| *6 | −32.2878 | 1.10 | 40.10 | 1.85135 |
| *7 | −249.3634 | 0.10 | | |
| 8 | 43.7941 | 1.80 | 17.98 | 1.94594 |
| 9 | −160.6246 | D9 (variable) | | |
| *10 | 18.8735 | 1.78 | 40.10 | 1.85135 |
| 11 | 132.0272 | 1.80 | | |
| 12 | ∞ | 1.50 | (aperture stop) | |
| 13 | 32.7740 | 4.92 | 82.57 | 1.49782 |
| 14 | −12.5016 | 1.00 | 28.69 | 1.79504 |

TABLE 31-continued

| | | | | |
|---|---|---|---|---|
| 15 | 92.7101 | 1.79 | | |
| *16 | −22.1018 | 2.82 | 61.25 | 1.58913 |
| 17 | −10.8359 | D17 (variable) | | |
| 18 | 15.4516 | 1.92 | 82.57 | 1.49782 |
| 19 | 126.0321 | D19 (variable) | | |
| *20 | −104.9496 | 1.00 | 40.10 | 1.85135 |
| *21 | 15.5828 | 2.05 | | |
| 22 | 25.3403 | 2.30 | 27.57 | 1.75520 |
| 23 | ∞ | D23 (variable) | | |
| Img surface | ∞ | | | |

[Aspherical data]

| Surface number | κ | A4 | A6 | A8 | A10 |
|---|---|---|---|---|---|
| 6th surface | 0.00 | −4.17899E−05 | −4.91408E−07 | 1.22049E−09 | −4.60622E−11 |
| 7th surface | 0.00 | −6.39202E−05 | −3.13505E−07 | −2.48667E−09 | 0.00000E+00 |
| 10th surface | 0.00 | −3.22843E−06 | 3.45613E−08 | 1.52095E−10 | 0.00000E+00 |
| 16th surface | 0.00 | −1.67711E−04 | 3.82028E−07 | −1.87748E−08 | 1.37248E−10 |
| 20th surface | 0.00 | 8.68143E−05 | −3.88707E−06 | 6.90451E−08 | −5.08312E−10 |
| 21st surface | 0.00 | 4.57778E−05 | −3.40999E−06 | 5.93726E−08 | −4.04483E−10 |

[Various data]
Zoom ratio 3.24

| | Wide angle end | | Intermediate | | Telephoto end |
|---|---|---|---|---|---|
| f | 16.5 | ~ | 32.5 | ~ | 53.4 |
| FNO | 2.9 | ~ | 3.5 | ~ | 4.3 |
| 2ω | 81.7 | ~ | 47.0 | ~ | 29.1 |
| Y | 12.4 | ~ | 14.3 | ~ | 14.3 |
| TL(air) | 93.4 | ~ | 110.9 | ~ | 137.4 |
| BF(air) | 17.0 | ~ | 24.4 | ~ | 36.3 |

[Variable distance data]

| | Upon focusing on infinity | | | Upon focusing on short distant object | | |
|---|---|---|---|---|---|---|
| | Wide angle end | Intermediate | Telephoto end | Wide angle end | Intermediate | Telephoto end |
| f | 16.5 | 32.5 | 53.4 | 16.5 | 32.5 | 53.4 |
| D3 | 0.80 | 11.80 | 20.57 | | | |
| D9 | 14.21 | 3.89 | 0.80 | | | |
| D17 | 2.21 | 2.21 | 2.21 | 1.65 | 0.73 | 0.50 |
| D19 | 2.80 | 3.25 | 1.00 | 3.36 | 4.73 | 2.71 |
| D23 | 17.00 | 24.44 | 36.31 | | | |

[Lens group data]

| | Group starting surface | Group focal length |
|---|---|---|
| First lens group | 1 | 67.35 |
| Second lens group | 4 | −14.35 |
| Third lens group | 10 | 17.12 |
| Fourth lens group | 20 | −34.24 |

[Conditional expression corresponding value]

| | |
|---|---|
| Conditional expression(JK1) | $\lvert fF\rvert/fM = 2.055$ |
| Conditional expression(JK2) | $(-fXn)/fM = 0.838$ |
| Conditional expression(JK3) | $dAB/\lvert fF\rvert = 0.063$ |
| Conditional expression(JK4) | $ndp + 0.0075 \times \nu dp - 2.175 = -0.058$ |
| Conditional expression(JK5) | $\nu dp = 82.57$ |
| Conditional expression(JM1) | $dV/\lvert fV\rvert = 0.129$ |
| Conditional expression(JM2) | $\lvert fF\rvert/fM = 2.055$ |
| Conditional expression(JM3) | $dAB/\lvert fF\rvert = 0.063$ |

TABLE 31-continued

| | |
|---|---|
| Conditional expression(JM4) | (−fXn)/fM = 0.838 |
| Conditional expression(JM5) | ndp + 0.0075 × νdp − 2.175 = −0.058 |
| Conditional expression(JM6) | νdp = 82.57 |

It can be seen in Table 31 that the zoom optical system ZL31 according to this Example satisfies the conditional expression (JK1) to (JK5) and (JM1) to (JM6).

FIG. 141 is various aberration graphs (a spherical aberration graph, an astigmatism graph, a distortion graph, a lateral chromatic aberration graph, and a coma aberration graph) of the zoom optical system ZL31 according to Example 31 upon focusing on infinity with FIG. 141A corresponding to the wide angle end state, FIG. 141B corresponding to the intermediate focal length state, and FIG. 141C corresponding to the telephoto end state. FIG. 142 is various aberration graphs (a spherical aberration graph, an astigmatism graph, a distortion graph, a lateral chromatic aberration graph, and a coma aberration graph) of the zoom optical system ZL31 according to Example 31 upon focusing on a short distant object with FIG. 142A corresponding to the wide angle end state, FIG. 142B corresponding to the intermediate focal length state, and FIG. 142C corresponding to the telephoto end state. FIG. 143 is a coma aberration graph at the time of image blur correction for the zoom optical system ZL31 according to Example 31 upon focusing on infinity with FIG. 143A corresponding to the wide angle end state, FIG. 143B corresponding to the intermediate focal length state, and FIG. 143C corresponding to the telephoto end state.

It can be seen in the aberration graphs in FIG. 141 to FIG. 143 that the zoom optical system ZL31 according to Example 31 can achieve an excellent optical performance with various aberrations successfully corrected from the wide angle end state to the telephoto end state and from the infinity focusing state to the short-distant object focusing state. Furthermore, it can be seen that a high imaging performance can be achieved upon image blur correction.

Example 32

Example 32 is described with reference to FIG. 144 to FIG. 147 and Table 32. A zoom optical system ZLII (ZL32) according to Example 32 includes, as illustrated in FIG. 144, the first lens group G1 having positive refractive power, the second lens group G2 having negative refractive power, the third lens group G3 having positive refractive power, the fourth lens group G4 having negative refractive power, and the fifth lens group G5 having positive refractive power that are arranged in order from the object side.

The first lens group G1 includes the cemented lens including the negative meniscus lens L11 having a concave surface facing the image side and the positive meniscus lens L12 having a convex surface facing the object side that are arranged in order from the object side.

The second lens group G2 includes the negative meniscus lens L21 having a concave surface facing the image side, the negative meniscus lens L22 having a concave surface facing the object side, and the biconvex lens L23 that are arranged in order from the object side. The negative meniscus lens L22 is a glass-molded aspherical lens with lens surfaces, on the object side and on the image surface side, having an aspherical shape.

The third lens group G3 includes the object side group GA and the image side group GB having positive refractive power that are arranged in order from the object side. The object side group GA includes: the biconvex lens L31; the aperture stop S; the cemented lens including the biconvex lens L32 and the biconcave lens L33; and the positive meniscus lens L34 having a convex surface facing the image side that are arranged in order from the object side. The image side group GB includes the positive meniscus lens L35 having a convex surface facing the object side. The biconvex lens L31 is a glass-molded aspherical lens with lens surfaces, on the object side and on the image surface side, having an aspherical shape. The positive meniscus lens L34 is a glass-molded aspherical lens with a lens surface, on the object side, having an aspherical shape.

The fourth lens group G4 includes the biconcave lens L41. The biconcave lens L41 is a glass-molded aspherical lens with a lens surface, on the image surface side, having an aspherical shape.

The fifth lens group G5 includes the plano-convex lens L51 having a convex surface facing the object side.

The zooming from the wide angle end state to the telephoto end state is achieved with: the first lens group G1 moved toward the object side, the second lens group G2 moved toward the image surface side and then moved toward the object side, and the third lens group G3, the fourth lens group G4, and the fifth lens group G5 moved toward the object side in such a manner that the distance between the first lens group G1 and the second lens group G2 increases, the distance between the second lens group G2 and the third lens group G3 decreases, the distance between the third lens group G3 and the fourth lens group G4 increases and then decreases, and the distance between the fourth lens group G4 and the fifth lens group G5 decreases and then increases.

Focusing from infinity to the short-distant object is achieved with the image side group GB (=focusing lens group GF) forming the third lens group G3 moved toward the object side.

When image blur occurs, image blur correction (vibration isolation) on the image surface I is performed with the fourth lens group G4 serving as the vibration-proof lens group VR moved with a displacement component in the direction orthogonal to the optical axis. In Example 32, in the wide angle end state, the shifted amount of the vibration-proof lens group VR is −0.189 mm when the correction angle is 0.664°. In the intermediate focal length state, the shifted amount of the vibration-proof lens group VR is −0.190 mm when the correction angle is 0.426°. In the telephoto end state, the shifted amount of the vibration-proof lens group VR is −0.145 mm when the correction angle is 0.327°.

In Table 32 below, specification values in Example 32 are listed. Surface numbers 1 to 23 in Table 32 respectively correspond to the optical surfaces m1 to m23 in FIG. 144.

TABLE 32

[Lens specifications]

| Surface number | R | D | νd | nd |
|---|---|---|---|---|
| Obj surface | ∞ | | | |
| 1 | 45.8874 | 1.50 | 17.98 | 1.94594 |
| 2 | 37.3615 | 5.50 | 52.34 | 1.75500 |
| 3 | 323.7680 | D3 (variable) | | |
| 4 | 140.8508 | 1.00 | 40.66 | 1.88300 |
| 5 | 11.0397 | 6.53 | | |
| *6 | −21.1084 | 1.00 | 52.19 | 1.73878 |
| *7 | −98.9946 | 0.10 | | |
| 8 | 70.2805 | 1.69 | 17.98 | 1.94594 |
| 9 | −92.1974 | D9 (variable) | | |
| *10 | 22.5197 | 4.22 | 47.98 | 1.76169 |
| *11 | −78.0166 | 1.80 | | |
| 12 | ∞ | 1.50 | (aperture stop) | |
| 13 | 49.1316 | 5.00 | 82.57 | 1.49782 |
| 14 | −13.1671 | 1.00 | 32.35 | 1.85026 |
| 15 | 101.7221 | 2.56 | | |
| *16 | −61.2541 | 2.57 | 69.31 | 1.57174 |
| 17 | −13.4270 | D17 (variable) | | |
| 18 | 18.2771 | 2.04 | 82.57 | 1.49782 |
| 19 | 119.6079 | D19 (variable) | | |
| 20 | −162.3503 | 1.00 | 40.10 | 1.85135 |
| *21 | 17.4138 | D21 (variable) | | |
| 22 | 31.4780 | 3.05 | 27.57 | 1.75520 |
| 23 | ∞ | D23 (variable) | | |
| Img surface | ∞ | | | |

[Aspherical data]

| Surface number | κ | A4 | A6 | A8 | A10 |
|---|---|---|---|---|---|
| 6th surface | 0.00 | −6.56786E−05 | −6.01492E−07 | 8.47437E−09 | −8.17300E−11 |
| 7th surface | 0.00 | −8.13714E−05 | −8.69532E−08 | 2.87236E−10 | 0.00000E+00 |
| 10th surface | 0.00 | −1.46882E−05 | 2.47912E−07 | −4.38965E−09 | 0.00000E+00 |
| 11th surface | 0.00 | −3.21954E−06 | 2.40618E−07 | −5.20291E−09 | 0.00000E+00 |
| 16th surface | 0.00 | −7.48031E−05 | 2.72716E−07 | −7.00743E−09 | 4.39288E−11 |
| 21st surface | 0.00 | −2.40674E−05 | 1.83152E−07 | −4.07579E−09 | 3.04708E−11 |

[Various data]
Zoom ratio 4.13

| | Wide angle end | | Intermediate | | Telephoto end |
|---|---|---|---|---|---|
| f | 16.5 | ~ | 40.1 | ~ | 68.0 |
| FNO | 2.9 | ~ | 3.9 | ~ | 4.3 |
| 2ω | 81.7 | ~ | 38.5 | ~ | 23.2 |
| Y | 12.2 | ~ | 14.3 | ~ | 14.3 |
| TL(air) | 83.5 | ~ | 97.7 | ~ | 125.5 |
| BF(air) | 13.0 | ~ | 25.7 | ~ | 48.7 |

[Variable distance data]

| | Upon focusing on infinity | | | Upon focusing on short distant object | | |
|---|---|---|---|---|---|---|
| | Wide angle end | Intermediate | Telephoto end | Wide angle end | Intermediate | Telephoto end |
| f | 16.5 | 40.1 | 68.0 | 16.5 | 40.1 | 68.0 |
| D3 | 0.80 | 15.31 | 25.34 | | | |
| D9 | 15.08 | 1.96 | 0.80 | | | |
| D17 | 2.49 | 2.49 | 2.49 | 1.85 | 0.24 | 0.10 |
| D19 | 4.08 | 6.04 | 1.00 | 4.73 | 8.29 | 3.39 |
| D21 | 5.98 | 4.11 | 5.16 | | | |
| D23 | 13.00 | 25.69 | 48.66 | | | |

TABLE 32-continued

| [Lens group data] | | |
|---|---|---|
| | Group starting surface | Group focal length |
| First lens group | 1 | 74.60 |
| Second lens group | 4 | −13.20 |
| Third lens group | 10 | 18.68 |
| Fourth lens group | 20 | −18.43 |
| Fifth lens group | 22 | 41.68 |

| [Conditional expression corresponding value] | |
|---|---|
| Conditional expression(JK1) | $\|fF\|/fM = 2.304$ |
| Conditional expression(JK2) | $(-fXn)/fM = 0.707$ |
| Conditional expression(JK3) | $dAB/\|fF\| = 0.058$ |
| Conditional expression(JK4) | $ndp + 0.0075 \times \nu dp - 2.175 = -0.058$ |
| Conditional expression(JK5) | $\nu dp = 82.57$ |
| Conditional expression(JM1) | $dV/\|fV\| = 0.280$ |
| Conditional expression(JM2) | $\|fF\|/fM = 2.304$ |
| Conditional expression(JM3) | $dAB/\|fF\| = 0.058$ |
| Conditional expression(JM4) | $(-fXn)/fM = 0.707$ |
| Conditional expression(JM5) | $ndp + 0.0075 \times \nu dp - 2.175 = -0.058$ |
| Conditional expression(JM6) | $\nu dp = 82.57$ |
| Conditional expression(JN1) | $\|fF\|/fM = 2.304$ |
| Conditional expression(JN2) | $dV/\|fV\| = 0.280$ |
| Conditional expression(JN3) | $dAB/\|fF\| = 0.058$ |
| Conditional expression(JN4) | $(-fXn)/fM = 0.707$ |
| Conditional expression(JN5) | $ndp + 0.0075 \times \nu dp - 2.175 = -0.058$ |
| Conditional expression(JN6) | $\nu dp = 82.57$ |

It can be seen in Table 32 that the zoom optical system ZL32 according to this Example satisfies the conditional expressions (JK1) to (JK5), (JM1) to (JM6), and (JN1) to (JN6).

FIG. 145 is various aberration graphs (a spherical aberration graph, an astigmatism graph, a distortion graph, a lateral chromatic aberration graph, and a coma aberration graph) of the zoom optical system ZL32 according to Example 32 upon focusing on infinity with FIG. 145A corresponding to the wide angle end state, FIG. 145B corresponding to the intermediate focal length state, and FIG. 145C corresponding to the telephoto end state. FIG. 146 is various aberration graphs (a spherical aberration graph, an astigmatism graph, a distortion graph, a lateral chromatic aberration graph, and a coma aberration graph) of the zoom optical system ZL32 according to Example 32 upon focusing on a short distant object with FIG. 146A corresponding to the wide angle end state, FIG. 146B corresponding to the intermediate focal length state, and FIG. 146C corresponding to the telephoto end state. FIG. 147 is a coma aberration graph at the time of image blur correction for the zoom optical system ZL32 according to Example 32 upon focusing on infinity with FIG. 147A corresponding to the wide angle end state, FIG. 147B corresponding to the intermediate focal length state, and FIG. 147C corresponding to the telephoto end state.

It can be seen in the aberration graphs in FIG. 145 to FIG. 147 that the zoom optical system ZL32 according to Example 32 can achieve an excellent optical performance with various aberrations successfully corrected from the wide angle end state to the telephoto end state and from the infinity focusing state to the short-distant object focusing state. Furthermore, it can be seen that a high imaging performance can be achieved upon image blur correction.

Example 33

Example 33 is described with reference to FIG. 148 to FIG. 151 and Table 33. A zoom optical system ZLII (ZL33) according to Example 33 includes, as illustrated in FIG. 148, the first lens group G1 having positive refractive power, the second lens group G2 having negative refractive power, the third lens group G3 having positive refractive power, the fourth lens group G4 having negative refractive power, and the fifth lens group G5 having positive refractive power that are arranged in order from the object side.

The first lens group G1 includes the cemented lens including the negative meniscus lens L11 having a concave surface facing the image side and the positive meniscus lens L12 having a convex surface facing the object side that are arranged in order from the object side.

The second lens group G2 includes the negative meniscus lens L21 having a concave surface facing the image side, the biconcave lens L22, and the positive meniscus lens L23 having a convex surface facing the object side that are arranged in order from the object side. The biconcave lens L22 is a glass-molded aspherical lens with lens surfaces, on the object side and on the image surface side, having an aspherical shape.

The third lens group G3 includes the object side group GA and the image side group GB having positive refractive power that are arranged in order from the object side. The object side group GA includes: the positive meniscus lens L31 having a convex surface facing the object side; the aperture stop S; the cemented lens including the biconvex lens L32 and the negative meniscus lens L33 having the concave surface facing the object side; and the positive meniscus lens L34 having a convex surface facing the image side that are arranged in order from the object side. The image side group GB includes the biconvex lens L35. The positive meniscus lens L31 is a glass-molded aspherical lens with a lens surface, on the object side, having an aspherical shape. The positive meniscus lens L34 is a glass-molded aspherical lens with a lens surface, on the object side, having an aspherical shape.

The fourth lens group G4 includes the biconcave lens L41. The biconcave lens L41 is a glass-molded aspherical lens with a lens surface, on the image surface side, having an aspherical shape.

The fifth lens group G5 includes the plano-convex lens L51 having a convex surface facing the object side.

The zooming from the wide angle end state to the telephoto end state is achieved with: the first lens group G1 moved toward the object side, the second lens group G2 moved toward the image surface side and then moved toward the object side, and the third lens group G3, the fourth lens group G4, and the fifth lens group G5 moved toward the object side in such a manner that the distance between the first lens group G1 and the second lens group G2 increases, the distance between the second lens group G2 and the third lens group G3 decreases, the distance between the third lens group G3 and the fourth lens group G4 decreases, and the distance between the fourth lens group G4 and the fifth lens group G5 increases.

Focusing from infinity to the short-distant object is achieved with the image side group GB (=focusing lens group GF) forming the third lens group G3 moved toward the object side.

When image blur occurs, image blur correction (vibration isolation) on the image surface I is performed with the fourth lens group G4 serving as the vibration-proof lens group VR moved with a displacement component in the direction orthogonal to the optical axis. In Example 33, in the wide angle end state, the shifted amount of the vibration-proof lens group VR is −0.129 mm when the correction angle is 0.767°. In the intermediate focal length state, the shifted amount of the vibration-proof lens group VR is −0.114 mm when the correction angle is 0.536°. In the telephoto end state, the shifted amount of the vibration-proof lens group VR is −0.116 mm when the correction angle is 0.422°.

In Table 33 below, specification values in Example 33 are listed. Surface numbers 1 to 23 in Table 33 respectively correspond to the optical surfaces m1 to m23 in FIG. 148.

TABLE 33

[Lens specifications]

| Surface number | R | D | νd | nd |
|---|---|---|---|---|
| Obj surface | ∞ | | | |
| 1 | 42.6649 | 1.50 | 17.98 | 1.94594 |
| 2 | 33.9782 | 4.33 | 46.60 | 1.80400 |
| 3 | 159.3713 | D3 (variable) | | |
| 4 | 231.5864 | 1.00 | 40.66 | 1.88300 |
| 5 | 9.6693 | 4.88 | | |
| *6 | −144.6832 | 1.00 | 40.10 | 1.85135 |
| *7 | 64.0000 | 0.43 | | |
| 8 | 27.6064 | 1.87 | 17.98 | 1.94594 |
| 9 | 180.3050 | D9 (variable) | | |
| *10 | 18.1446 | 1.36 | 40.10 | 1.85135 |
| 11 | 36.2222 | 1.80 | | |
| 12 | ∞ | 1.50 | (aperture stop) | |
| 13 | 30.5754 | 4.65 | 82.57 | 1.49782 |
| 14 | −19.8920 | 0.90 | 25.45 | 1.80518 |
| 15 | −2398.7427 | 1.33 | | |
| *16 | −16.4870 | 2.00 | 67.02 | 1.59201 |
| 17 | −9.3211 | D17 (variable) | | |
| 18 | 16.0663 | 1.92 | 82.57 | 1.49782 |
| 19 | −92.5945 | D19 (variable) | | |
| *20 | −129.7857 | 1.00 | 40.10 | 1.85135 |
| *21 | 13.7524 | D21 (variable) | | |
| 22 | 24.7189 | 1.70 | 30.13 | 1.69895 |
| 23 | ∞ | D23 (variable) | | |
| Img surface | ∞ | | | |

[Aspherical data]

| Surface number | κ | A4 | A6 | A8 | A10 |
|---|---|---|---|---|---|
| 6th surface | 0.00 | 7.24202E−05 | −3.04361E−07 | −7.53193E−09 | 0.00000E+00 |
| 7th surface | 0.00 | 3.00588E−05 | −4.27011E−07 | −1.14290E−08 | 0.00000E+00 |
| 10th surface | 0.00 | −2.81460E−05 | 9.76630E−08 | −7.99018E−09 | 0.00000E+00 |
| 16th surface | 0.00 | −2.41098E−04 | 1.15336E−07 | −7.22175E−09 | −1.23487E−11 |
| 20th surface | 0.00 | 1.00855E−04 | −2.22406E−06 | −9.91620E−09 | 4.72846E−10 |
| 21st surface | 0.00 | 1.24785E−05 | −1.73565E−06 | −3.98232E−09 | 3.04446E−10 |

TABLE 33-continued

| [Various data] Zoom ratio 3.30 | | | | | |
|---|---|---|---|---|---|
| | Wide angle end | | Intermediate | | Telephoto end |
| f | 12.4 | ~ | 25.3 | ~ | 40.8 |
| FNO | 2.9 | ~ | 3.6 | ~ | 4.2 |
| 2ω | 82.3 | ~ | 46.3 | ~ | 29.7 |
| Y | 9.3 | ~ | 10.5 | ~ | 10.8 |
| TL(air) | 73.3 | ~ | 80.5 | ~ | 95.0 |
| BF(air) | 17.0 | ~ | 28.8 | ~ | 37.0 |

[Variable distance data]

| | Upon focusing on infinity | | | Upon focusing on short distant object | | |
|---|---|---|---|---|---|---|
| | Wide angle end | Intermediate | Telephoto end | Wide angle end | Intermediate | Telephoto end |
| f | 12.4 | 25.3 | 40.8 | 12.4 | 25.3 | 40.8 |
| D3 | 0.80 | 7.95 | 18.34 | | | |
| D9 | 16.98 | 4.97 | 0.80 | | | |
| D17 | 1.76 | 1.76 | 1.76 | 1.32 | 0.71 | 0.26 |
| D19 | 2.24 | 1.48 | 1.00 | 2.68 | 2.53 | 2.50 |
| D21 | 1.36 | 2.31 | 2.98 | | | |
| D23 | 17.00 | 28.84 | 36.97 | | | |

[Lens group data]

| | Group starting surface | Group focal length |
|---|---|---|
| First lens group | 1 | 75.04 |
| Second lens group | 4 | −14.01 |
| Third lens group | 10 | 14.43 |
| Fourth lens group | 20 | −14.56 |
| Fifth lens group | 22 | 35.37 |

[Conditional expression corresponding value]

| | |
|---|---|
| Conditional expression(JK1) | $\lvert fF\rvert/fM = 1.917$ |
| Conditional expression(JK2) | $(-fXn)/fM = 0.971$ |
| Conditional expression(JK3) | $dAB/\lvert fF\rvert = 0.064$ |
| Conditional expression(JK4) | $ndp + 0.0075 \times \nu dp - 2.175 = -0.058$ |
| Conditional expression(JK5) | $\nu dp = 82.57$ |
| Conditional expression(JM1) | $dV/\lvert fV\rvert = 0.205$ |
| Conditional expression(JM2) | $\lvert fF\rvert/fM = 1.917$ |
| Conditional expression(JM3) | $dAB/\lvert fF\rvert = 0.064$ |
| Conditional expression(JM4) | $(-fXn)/fM = 0.971$ |
| Conditional expression(JM5) | $ndp + 0.0075 \times \nu dp - 2.175 = -0.058$ |
| Conditional expression(JM6) | $\nu dp = 82.57$ |
| Conditional expression(JN1) | $\lvert fF\rvert/fM = 1.917$ |
| Conditional expression(JN2) | $dV/\lvert fV\rvert = 0.205$ |
| Conditional expression(JN3) | $dAB/\lvert fF\rvert = 0.064$ |
| Conditional expression(JN4) | $(-fXn)/fM = 0.971$ |
| Conditional expression(JN5) | $ndp + 0.0075 \times \nu dp - 2.175 = -0.058$ |
| Conditional expression(JN6) | $\nu dp = 82.57$ |

It can be seen in Table 33 that the zoom optical system ZL33 according to this Example satisfies the conditional expressions (JK1) to (JK5), (JM1) to (JM6), and (JN1) to (JN6).

FIG. 149 is various aberration graphs (a spherical aberration graph, an astigmatism graph, a distortion graph, a lateral chromatic aberration graph, and a coma aberration graph) of the zoom optical system ZL33 according to Example 33 upon focusing on infinity with FIG. 149A corresponding to the wide angle end state, FIG. 149B corresponding to the intermediate focal length state, and FIG. 149C corresponding to the telephoto end state. FIG. 150 is various aberration graphs (a spherical aberration graph, an astigmatism graph, a distortion graph, a lateral chromatic aberration graph, and a coma aberration graph) of the zoom optical system ZL33 according to Example 33 upon focusing on a short distant object with FIG. 150A corresponding to the wide angle end state, FIG. 150B corresponding to the intermediate focal length state, and FIG. 150C corresponding to the telephoto end state. FIG. 151 is a coma aberration graph at the time of image blur correction for the zoom optical system ZL33 according to Example 33 upon focusing on infinity with FIG. 151A corresponding to the wide angle end state, FIG. 151B corresponding to the intermediate focal length state, and FIG. 151C corresponding to the telephoto end state.

It can be seen in the aberration graphs in FIG. 149 to FIG. 151 that the zoom optical system ZL33 according to Example 33 can achieve an excellent optical performance with various aberrations successfully corrected from the wide angle end state to the telephoto end state and from the infinity focusing state to the short-distant object focusing state. Furthermore, it can be seen that a high imaging performance can be achieved upon image blur correction.

Example 34

Example 34 is described with reference to FIG. 152 to FIG. 155 and Table 34. A zoom optical system ZLII (ZL34) according to Example 34 includes, as illustrated in FIG. 152, the first lens group G1 having positive refractive power, the second lens group G2 having negative refractive power, the third lens group G3 having positive refractive power, the fourth lens group G4 having negative refractive power, and the fifth lens group G5 having positive refractive power that are arranged in order from the object side.

The first lens group G1 includes the cemented lens including the negative meniscus lens L11 having a concave surface facing the image side and the positive meniscus lens L12 having a convex surface facing the object side that are arranged in order from the object side.

The second lens group G2 includes the negative meniscus lens L21 having a concave surface facing the image side, the biconcave lens L22, and the positive meniscus lens L23 having a convex surface facing the object side that are arranged in order from the object side. The biconcave lens L22 is a glass-molded aspherical lens with lens surfaces, on the object side and on the image surface side, having an aspherical shape.

The third lens group G3 includes the object side group GA and the image side group GB having positive refractive power that are arranged in order from the object side. The object side group GA includes: the positive meniscus lens L31 having a convex surface facing the object side; the aperture stop S; the cemented lens including the biconvex lens L32 and the negative meniscus lens L33 having a concave surface facing the object side; and the positive meniscus lens L34 having a convex surface facing the image side that are arranged in order from the object side. The image side group GB includes the cemented lens including the negative meniscus lens L35 having a concave surface facing the image side, and the biconvex lens L36. The positive meniscus lens L31 is a glass-molded aspherical lens with a lens surface, on the object side, having an aspherical shape. The positive meniscus lens L34 is a glass-molded aspherical lens with a lens surface, on the object side, having an aspherical shape.

The fourth lens group G4 includes the biconcave lens L41. The biconcave lens L41 is a glass-molded aspherical lens with a lens surface, on the image surface side, having an aspherical shape.

The fifth lens group G5 includes the plano-convex lens L51 having a convex surface facing the object side.

The zooming from the wide angle end state to the telephoto end state is achieved with: the first lens group G1, the second lens group G2, the third lens group G3, the fourth lens group G4, and the fifth lens group G5 each moved toward the object side in such a manner that the distance between the first lens group G1 and the second lens group G2 increases, the distance between the second lens group G2 and the third lens group G3 decreases, the distance between the third lens group G3 and the fourth lens group G4 decreases, and the distance between the fourth lens group G4 and the fifth lens group G5 increases.

Focusing from infinity to the short-distant object is achieved with the image side group GB (=focusing lens group GF) forming the third lens group G3 moved toward the object side.

When image blur occurs, image blur correction (vibration isolation) on the image surface I is performed with the fourth lens group G4 serving as the vibration-proof lens group VR moved with a displacement component in the direction orthogonal to the optical axis. In Example 34, in the wide angle end state, the shifted amount of the vibration-proof lens group VR is −0.117 mm when the correction angle is 0.767°. In the intermediate focal length state, the shifted amount of the vibration-proof lens group VR is −0.103 mm when the correction angle is 0.536°. In the telephoto end state, the shifted amount of the vibration-proof lens group VR is −0.109 mm when the correction angle is 0.422°.

In Table 34 below, specification values in Example 34 are listed. Surface numbers 1 to 24 in Table 34 respectively correspond to the optical surfaces m1 to m24 in FIG. 152.

TABLE 34

[Lens specifications]

| Surface number | R | D | νd | nd |
|---|---|---|---|---|
| Obj surface | ∞ | | | |
| 1 | 41.0387 | 1.50 | 17.98 | 1.94594 |
| 2 | 33.2111 | 4.39 | 46.60 | 1.80400 |
| 3 | 167.0985 | D3 (variable) | | |
| 4 | 521.1609 | 1.00 | 42.73 | 1.83481 |
| 5 | 9.2341 | 4.89 | | |
| *6 | −500.5038 | 1.00 | 40.10 | 1.85135 |
| *7 | 55.5356 | 0.49 | | |
| 8 | 29.8211 | 1.80 | 17.98 | 1.94594 |
| 9 | 240.2636 | D9 (variable) | | |
| *10 | 43.0468 | 1.08 | 40.10 | 1.85135 |
| 11 | 298.9859 | 1.80 | | |
| 12 | ∞ | 1.50 | (aperture stop) | |
| 13 | 882.4766 | 2.44 | 82.57 | 1.49782 |
| 14 | −12.8062 | 0.90 | 39.61 | 1.80440 |
| 15 | −48.5711 | 0.50 | | |
| *16 | −45.5329 | 2.17 | 61.25 | 1.58913 |
| 17 | −10.8642 | D17 (variable) | | |
| 18 | 23.6501 | 0.85 | 25.45 | 1.80518 |
| 19 | 16.9311 | 2.87 | 82.57 | 1.49782 |
| 20 | −20.3779 | D20 (variable) | | |

TABLE 34-continued

| | | | | |
|---|---|---|---|---|
| *21 | −4198.2163 | 0.90 | 40.10 | 1.85135 |
| *22 | 11.8449 | D22 (variable) | | |
| 23 | 28.5733 | 1.70 | 30.13 | 1.69895 |
| 24 | ∞ | D24 (variable) | | |
| Img surface | ∞ | | | |

[Aspherical data]

| Surface number | κ | A4 | A6 | A8 | A10 |
|---|---|---|---|---|---|
| 6th surface | 0.00 | 7.53002E−05 | 2.66920E−07 | −1.57255E−08 | 0.00000E+00 |
| 7th surface | 0.00 | 3.00588E−05 | 5.32743E−08 | −2.15009E−08 | 0.00000E+00 |
| 10th surface | 0.00 | −5.13064E−05 | −8.94237E−08 | −1.30090E−08 | 0.00000E+00 |
| 16th surface | 0.00 | −1.89235E−04 | 5.82030E−07 | 4.84663E−09 | −3.16900E−11 |
| 21st surface | 0.00 | 1.05691E−04 | −1.83434E−06 | −1.41531E−08 | 3.60695E−10 |
| 22nd surface | 0.00 | 6.69976E−06 | −2.04472E−06 | −1.53304E−08 | 3.78430E−10 |

[Various data]
Zoom ratio 3.30

| | Wide angle end | | Intermediate | | Telephoto end |
|---|---|---|---|---|---|
| f | 12.4 | ~ | 25.3 | ~ | 40.8 |
| FNO | 2.9 | ~ | 3.9 | ~ | 4.1 |
| 2ω | 82.3 | ~ | 46.2 | ~ | 29.6 |
| Y | 9.3 | ~ | 10.6 | ~ | 10.8 |
| TL (air) | 71.9 | ~ | 79.1 | ~ | 93.6 |
| BF (air) | 17.0 | ~ | 30.0 | ~ | 37.0 |

[Variable distance data]

| | Upon focusing on infinity | | | Upon focusing on short distant object | | |
|---|---|---|---|---|---|---|
| | Wide angle end | Inter-mediate | Telephoto end | Wide angle end | Inter-mediate | Telephoto end |
| f | 12.4 | 25.3 | 40.8 | 12.4 | 25.3 | 40.8 |
| D3 | 0.80 | 6.10 | 17.49 | | | |
| D9 | 16.46 | 4.29 | 0.80 | | | |
| D17 | 1.62 | 1.62 | 1.62 | 1.28 | 0.81 | 0.43 |
| D20 | 2.32 | 1.49 | 1.00 | 2.66 | 2.30 | 2.19 |
| D22 | 2.81 | 3.27 | 5.34 | | | |
| D24 | 17.00 | 30.01 | 36.96 | | | |

[Lens group data]

| | Group starting surface | Group focal length |
|---|---|---|
| First lens group | 1 | 69.70 |
| Second lens group | 4 | −14.01 |
| Third lens group | 10 | 12.79 |
| Fourth lens group | 21 | −13.87 |
| Fifth lens group | 23 | 40.88 |

[Conditional expression corresponding value]

| | |
|---|---|
| Conditional expression (JK1) | $\|fF\|/fM = 1.982$ |
| Conditional expression (JK2) | $(-fXn)/fM = 1.096$ |
| Conditional expression (JK3) | $dAB/\|fF\| = 0.064$ |
| Conditional expression (JK4) | $ndp + 0.0075 \times \nu dp - 2.175 = -0.058$ |
| Conditional expression (JK5) | $\nu dp = 82.57$ |
| Conditional expression (JM1) | $dV/\|fV\| = 0.385$ |
| Conditional expression (JM2) | $\|fF\|/fM = 1.982$ |
| Conditional expression (JM3) | $dAB/\|fF\| = 0.064$ |
| Conditional expression (JM4) | $(-fXn)/fM = 1.096$ |
| Conditional expression (JM5) | $ndp + 0.0075 \times \nu dp - 2.175 = -0.058$ |
| Conditional expression (JM6) | $\nu dp = 82.57$ |
| Conditional expression (JN1) | $\|fF\|/fM = 1.982$ |
| Conditional expression (JN2) | $dV/\|fV\| = 0.385$ |
| Conditional expression (JN3) | $dAB/\|fF\| = 0.064$ |
| Conditional expression (JN4) | $(-fXn)/fM = 1.096$ |
| Conditional expression (JN5) | $ndp + 0.0075 \times \nu dp - 2.175 = -0.058$ |
| Conditional expression (JN6) | $\nu dp = 82.57$ |

It can be seen in Table 34 that the zoom optical system ZL34 according to this Example satisfies the conditional expressions (JK1) to (JK5), (JM1) to (JM6), and (JN1) to (JN6).

FIG. 153 is various aberration graphs (a spherical aberration graph, an astigmatism graph, a distortion graph, a lateral chromatic aberration graph, and a coma aberration graph) of the zoom optical system ZL34 according to Example 34 upon focusing on infinity with FIG. 153A corresponding to the wide angle end state, FIG. 153B corresponding to the intermediate focal length state, and FIG. 153C corresponding to the telephoto end state. FIG. 154 is various aberration graphs (a spherical aberration graph, an astigmatism graph, a distortion graph, a lateral chromatic aberration graph, and a coma aberration graph) of the zoom optical system ZL34 according to Example 34 upon focusing on a short distant object with FIG. 154A corresponding to the wide angle end state, FIG. 154B corresponding to the intermediate focal length state, and FIG. 154C corresponding to the telephoto end state. FIG. 155 is a coma aberration graph at the time of image blur correction for the zoom optical system ZL34 according to Example 34 upon focusing on infinity with FIG. 155A corresponding to the wide angle end state, FIG. 155B corresponding to the intermediate focal length state, and FIG. 155C corresponding to the telephoto end state.

It can be seen in the aberration graphs in FIG. 153 to FIG. 155 that the zoom optical system ZL34 according to Example 34 can achieve an excellent optical performance with various aberrations successfully corrected from the wide angle end state to the telephoto end state and from the infinity focusing state to the short-distant object focusing state. Furthermore, it can be seen that a high imaging performance can be achieved upon image blur correction.

Example 35

Example 35 is described with reference to FIG. 156 to FIG. 159 and Table 35. A zoom optical system ZLII (ZL35) according to Example 35 includes, as illustrated in FIG. 156, the first lens group G1 having positive refractive power, the second lens group G2 having negative refractive power, the third lens group G3 having positive refractive power, the fourth lens group G4 having negative refractive power, and the fifth lens group G5 having positive refractive power that are arranged in order from the object side.

The first lens group G1 includes the cemented lens including the negative meniscus lens L11 having a concave surface facing the image side and the positive meniscus lens L12 having a convex surface facing the object side that are arranged in order from the object side.

The second lens group G2 includes the negative meniscus lens L21 having a concave surface facing the image side, the negative meniscus lens L22 having a concave surface facing the image side, and the positive meniscus lens L23 having a convex surface facing the object side that are arranged in order from the object side. The negative meniscus lens L22 is a glass-molded aspherical lens with lens surfaces, on the object side and on the image surface side, having an aspherical shape.

The third lens group G3 includes the object side group GA and the image side group GB having positive refractive power that are arranged in order from the object side. The object side group GA includes: the positive meniscus lens L31 having a convex surface facing the object side; the aperture stop S; the cemented lens including the biconvex lens L32 and the negative meniscus lens L33 having a concave surface facing the object side; and the positive meniscus lens L34 having a convex surface facing the image side that are arranged in order from the object side. The image side group GB includes the biconvex lens L35. The positive meniscus lens L31 is a glass-molded aspherical lens with a lens surface, on the object side, having an aspherical shape. The positive meniscus lens L34 is a glass-molded aspherical lens with a lens surface, on the image surface side, having an aspherical shape.

The fourth lens group G4 includes the biconcave lens L41. The biconcave lens L41 is a glass-molded aspherical lens with a lens surface, on the image surface side, having an aspherical shape.

The fifth lens group G5 includes the plano-convex lens L51 having a convex surface facing the object side.

The zooming from the wide angle end state to the telephoto end state is achieved with: the first lens group G1 moved toward the object side, the second lens group G2 moved toward the image surface side and then moved toward the object side, and the third lens group G3, the fourth lens group G4, and the fifth lens group G5 moved toward the object side in such a manner that the distance between the first lens group G1 and the second lens group G2 increases, the distance between the second lens group G2 and the third lens group G3 decreases, the distance between the third lens group G3 and the fourth lens group G4 decreases, and the distance between the fourth lens group G4 and the fifth lens group G5 increases.

Focusing from infinity to the short-distant object is achieved with the image side group GB (=focusing lens group GF) forming the third lens group G3 moved toward the object side.

When image blur occurs, image blur correction (vibration isolation) on the image surface I is performed with the fourth lens group G4 serving as the vibration-proof lens group VR moved with a displacement component in the direction orthogonal to the optical axis. In Example 35, in the wide angle end state, the shifted amount of the vibration-proof lens group VR is −0.090 mm when the correction angle is 0.657°. In the intermediate focal length state, the shifted amount of the vibration-proof lens group VR is −0.074 mm when the correction angle is 0.434°. In the telephoto end state, the shifted amount of the vibration-proof lens group VR is −0.072 mm when the correction angle is 0.339°.

In Table 35 below, specification values in Example 35 are listed. Surface numbers 1 to 23 in Table 35 respectively correspond to the optical surfaces m1 to m23 in FIG. 156.

TABLE 35

[Lens specifications]

| Surface number | R | D | νd | nd |
|---|---|---|---|---|
| Obj surface | ∞ | | | |
| 1 | 51.0809 | 1.50 | 17.98 | 1.94594 |
| 2 | 46.4942 | 2.93 | 46.60 | 1.80400 |
| 3 | 228.7461 | D3 (variable) | | |
| 4 | 70.0563 | 1.00 | 40.66 | 1.88300 |
| 5 | 9.1493 | 4.76 | | |
| *6 | 259.1277 | 1.00 | 40.10 | 1.85135 |
| *7 | 28.4168 | 0.37 | | |
| 8 | 16.9265 | 1.91 | 17.98 | 1.94594 |
| 9 | 37.6302 | D9 (variable) | | |
| *10 | 16.1146 | 0.91 | 45.45 | 1.80139 |
| 11 | 21.7610 | 1.80 | | |
| 12 | ∞ | 1.50 | (aperture stop) | |
| 13 | 46.3877 | 2.56 | 82.57 | 1.49782 |
| 14 | −14.0243 | 0.90 | 23.78 | 1.84666 |
| 15 | −30.1385 | 0.55 | | |
| *16 | −27.4566 | 1.89 | 58.16 | 1.62263 |
| 17 | −9.4604 | D17 (variable) | | |
| 18 | 17.7225 | 1.57 | 82.57 | 1.49782 |
| 19 | −130.4521 | D19 (variable) | | |
| *20 | −330.7048 | 1.00 | 40.10 | 1.85135 |
| *21 | 11.0749 | D21 (variable) | | |
| 22 | 26.2408 | 1.51 | 30.13 | 1.69895 |
| 23 | ∞ | D23 (variable) | | |
| Img surface | ∞ | | | |

[Aspherical data]

| Surface number | κ | A4 | A6 | A8 | A10 |
|---|---|---|---|---|---|
| 6th surface | 0.00 | 4.58823E−05 | −6.02477E−07 | 1.64703E−09 | 0.00000E+00 |
| 7th surface | 0.00 | 3.00588E−05 | −5.71646E−07 | −1.87171E−09 | 0.00000E+00 |
| 10th surface | 0.00 | −1.14380E−04 | −2.04290E−07 | −5.40507E−08 | 0.00000E+00 |
| 16th surface | 0.00 | −2.20534E−04 | 6.27017E−07 | 1.51567E−08 | −1.50349E−10 |
| 20th surface | 0.00 | 8.78409E−05 | −1.44739E−06 | −9.85122E−08 | 1.92159E−09 |
| 21st surface | 0.00 | −4.65898E−05 | −1.28759E−06 | −9.81776E−08 | 1.84980E−09 |

[Various data]
Zoom ratio 3.75

| | Wide angle end | | Intermediate | | Telephoto end |
|---|---|---|---|---|---|
| f | 9.3 | ~ | 21.3 | ~ | 34.8 |
| FNO | 2.9 | ~ | 3.9 | ~ | 4.3 |
| 2ω | 81.3 | ~ | 41.0 | ~ | 25.8 |
| Y | 6.9 | ~ | 7.8 | ~ | 7.9 |
| TL (air) | 65.6 | ~ | 68.4 | ~ | 87.0 |
| BF (air) | 13.0 | ~ | 25.6 | ~ | 34.6 |

[Variable distance data]

| | Upon focusing on infinity | | | Upon focusing on short distant object | | |
|---|---|---|---|---|---|---|
| | Wide angle end | Inter-mediate | Telephoto end | Wide angle end | Inter-mediate | Telephoto end |
| f | 9.3 | 21.3 | 34.8 | 9.3 | 21.3 | 34.8 |
| D3 | 0.80 | 4.82 | 15.65 | | | |
| D9 | 18.19 | 4.27 | 0.80 | | | |
| D17 | 2.22 | 2.22 | 2.22 | 1.79 | 1.15 | 0.89 |
| D19 | 2.22 | 1.46 | 1.00 | 2.64 | 2.53 | 2.33 |
| D21 | 1.52 | 2.34 | 5.10 | | | |
| D23 | 13.00 | 25.64 | 34.57 | | | |

TABLE 35-continued

| [Lens group data] | | |
|---|---|---|
| | Group starting surface | Group focal length |
| First lens group | 1 | 82.42 |
| Second lens group | 4 | −12.96 |
| Third lens group | 10 | 11.56 |
| Fourth lens group | 20 | −12.57 |
| Fifth lens group | 22 | 37.54 |

| [Conditional expression corresponding value] | |
|---|---|
| Conditional expression (JK1) | $\|fF\|/fM = 2.722$ |
| Conditional expression (JK2) | $(-fXn)/fM = 1.121$ |
| Conditional expression (JK3) | $dAB/\|fF\| = 0.071$ |
| Conditional expression (JK4) | $ndp + 0.0075 \times \nu dp - 2.175 = -0.058$ |
| Conditional expression (JK5) | $\nu dp = 82.57$ |
| Conditional expression (JM1) | $dV/\|fV\| = 0.406$ |
| Conditional expression (JM2) | $\|fF\|/fM = 2.722$ |
| Conditional expression (JM3) | $dAB/\|fF\| = 0.071$ |
| Conditional expression (JM4) | $(-fXn)/fM = 1.121$ |
| Conditional expression (JM5) | $ndp + 0.0075 \times \nu dp - 2.175 = -0.058$ |
| Conditional expression (JM6) | $\nu dp = 82.57$ |
| Conditional expression (JN1) | $\|fF\|/fM = 2.722$ |
| Conditional expression (JN2) | $dV/\|fV\| = 0.406$ |
| Conditional expression (JN3) | $dAB/\|fF\| = 0.071$ |
| Conditional expression (JN4) | $(-fXn)/fM = 1.121$ |
| Conditional expression (JN5) | $ndp + 0.0075 \times \nu dp - 2.175 = -0.058$ |
| Conditional expression (JN6) | $\nu dp = 82.57$ |

It can be seen in Table 35 that the zoom optical system ZL35 according to this Example satisfies the conditional expressions (JK1) to (JK5), (JM1) to (JM6), and (JN1) to (JN6).

FIG. 157 is various aberration graphs (a spherical aberration graph, an astigmatism graph, a distortion graph, a lateral chromatic aberration graph, and a coma aberration graph) of the zoom optical system ZL35 according to Example 35 upon focusing on infinity with FIG. 157A corresponding to the wide angle end state, FIG. 157B corresponding to the intermediate focal length state, and FIG. 157C corresponding to the telephoto end state. FIG. 158 is various aberration graphs (a spherical aberration graph, an astigmatism graph, a distortion graph, a lateral chromatic aberration graph, and a coma aberration graph) of the zoom optical system ZL35 according to Example 35 upon focusing on a short distant object with FIG. 158A corresponding to the wide angle end state, FIG. 158B corresponding to the intermediate focal length state, and FIG. 158C corresponding to the telephoto end state. FIG. 159 is a coma aberration graph at the time of image blur correction for the zoom optical system ZL35 according to Example 35 upon focusing on infinity with FIG. 159A corresponding to the wide angle end state, FIG. 159B corresponding to the intermediate focal length state, and FIG. 159C corresponding to the telephoto end state.

It can be seen in the aberration graphs in FIG. 157 to FIG. 159 that the zoom optical system ZL35 according to Example 35 can achieve an excellent optical performance with various aberrations successfully corrected from the wide angle end state to the telephoto end state and from the infinity focusing state to the short-distant object focusing state. Furthermore, it can be seen that a high imaging performance can be achieved upon image blur correction.

Example 36

Example 36 is described with reference to FIG. 160 to FIG. 163 and Table 36. A zoom optical system ZLII (ZL36) according to Example 36 includes, as illustrated in FIG. 160, the first lens group G1 having positive refractive power, the second lens group G2 having negative refractive power, the third lens group G3 having positive refractive power, the fourth lens group G4 having positive refractive power, and the fifth lens group G5 having negative refractive power that are arranged in order from the object side.

The first lens group G1 includes the cemented lens including the negative meniscus lens L11 having a concave surface facing the image side and the positive meniscus lens L12 having a convex surface facing the object side that are arranged in order from the object side.

The second lens group G2 includes the negative meniscus lens L21 having a concave surface facing the image side, the negative meniscus lens L22 having a concave surface facing the object side, and the biconvex lens L23 that are arranged in order from the object side. The negative meniscus lens L22 is a glass-molded aspherical lens with lens surfaces, on the object side and on the image surface side, having an aspherical shape.

The third lens group G3 includes the object side group GA and the image side group GB having negative refractive power that are arranged in order from the object side. The object side group GA includes: the positive meniscus lens L31 having a convex surface facing the object side; the aperture stop S; the cemented lens including the biconvex lens L32 and the negative meniscus lens L33 having a concave surface facing the object side; and the negative meniscus lens L34 having a concave surface facing the image side that are arranged in order from the object side. The image side group GB includes the negative meniscus lens L35 having a concave surface facing the image side. The positive meniscus lens L31 is a glass-molded aspherical lens with a lens surface, on the object side, having an aspherical shape. The negative meniscus lens L34 is a glass-molded aspherical lens with a lens surface, on the object side, having an aspherical shape.

The fourth lens group G4 includes the biconvex lens L41.

The fifth lens group G5 includes the biconcave lens L51 and the plano-convex lens L52 having a convex surface facing the object side that are arranged in order from the object side. The biconcave lens L51 is a glass-molded aspherical lens with lens surfaces, on the object side and on the image surface side, having an aspherical shape.

The zooming from the wide angle end state to the telephoto end state is achieved with: the first lens group G1 moved toward the object side, the second lens group G2 moved toward the image surface side and then moved toward the object side, and the third lens group G3, the fourth lens group G4, and the fifth lens group G5 each moved toward the object side in such a manner that the distance between the first lens group G1 and the second lens group G2 increases, the distance between the second lens group G2 and the third lens group G3 decreases, the distance between the third lens group G3 and the fourth lens group G4 increases, and the distance between the fourth lens group G4 and the fifth lens group G5 decreases.

Focusing from infinity to the short-distant object is achieved with the image side group GB (=focusing lens group GF) forming the third lens group G3 moved toward the image side.

When image blur occurs, image blur correction (vibration isolation) on the image surface I is performed with the biconcave lens L51 forming the fifth lens group G5 serving as the vibration-proof lens group VR moved with a displacement component in the direction orthogonal to the optical axis. In Example 36, in the wide angle end state, the shifted amount of the vibration-proof lens group VR is −0.185 mm when the correction angle is 0.664°. In the intermediate focal length state, the shifted amount of the vibration-proof lens group VR is −0.186 mm when the correction angle is 0.520°. In the telephoto end state, the shifted amount of the vibration-proof lens group VR is −0.183 mm when the correction angle is 0.387°.

In Table 36 below, specification values in Example 36 are listed. Surface numbers 1 to 25 in Table 36 respectively correspond to the optical surfaces m1 to m25 in FIG. 160.

TABLE 36

[Lens specifications]

| Surface number | R | D | νd | nd |
|---|---|---|---|---|
| Obj surface | ∞ | | | |
| 1 | 31.3787 | 1.40 | 17.98 | 1.94594 |
| 2 | 25.8482 | 5.59 | 52.33 | 1.75500 |
| 3 | 88.0110 | D3 (variable) | | |
| 4 | 94.0313 | 1.00 | 40.66 | 1.88300 |
| 5 | 9.7840 | 6.32 | | |
| *6 | −34.5984 | 1.10 | 42.71 | 1.82080 |
| *7 | −460.7224 | 1.11 | | |
| 8 | 98.7113 | 1.76 | 17.98 | 1.94594 |
| 9 | −64.5703 | D9 (variable) | | |
| *10 | 17.7201 | 1.45 | 54.04 | 1.72903 |
| 11 | 34.5176 | 1.80 | | |
| 12 | ∞ | 1.50 | (aperture stop) | |
| 13 | 17.3794 | 6.43 | 82.57 | 1.49782 |
| 14 | −11.9300 | 1.00 | 23.78 | 1.84666 |
| 15 | −14.0311 | 0.12 | | |
| *16 | 500.8042 | 0.90 | 40.10 | 1.85135 |
| 17 | 47.8924 | D17 (variable) | | |
| 18 | 61.4713 | 1.00 | 67.90 | 1.59319 |
| 19 | 16.3627 | D19 (variable) | | |
| 20 | 17.9950 | 2.28 | 82.57 | 1.49782 |
| 21 | −59.3167 | D21 (variable) | | |
| *22 | −90.4295 | 1.00 | 24.06 | 1.82115 |
| *23 | 19.2966 | 3.17 | | |
| 24 | 33.0683 | 2.03 | 22.74 | 1.80809 |
| 25 | ∞ | D25 (variable) | | |
| Img surface | ∞ | | | |

[Aspherical data]

| Surface number | κ | A4 | A6 | A8 | A10 |
|---|---|---|---|---|---|
| 6th surface | 0.00 | −7.02036E−05 | −2.95397E−08 | 2.81097E−10 | −1.35280E−10 |
| 7th surface | 0.00 | −1.08565E−04 | 3.26827E−07 | −1.15001E−08 | 0.00000E+00 |
| 10th surface | 0.00 | −3.45329E−05 | 9.24026E−08 | −8.23372E−09 | 0.00000E+00 |
| 16th surface | 0.00 | −1.10206E−04 | −2.93723E−07 | −1.23313E−09 | −3.17553E−11 |
| 22nd surface | 0.00 | 7.03563E−05 | −3.25833E−06 | 5.59796E−08 | −4.39781E−10 |
| 23rd surface | 0.00 | 4.73428E−05 | −2.90162E−06 | 4.80962E−08 | −3.49905E−10 |

TABLE 36-continued

[Various data]
Zoom ratio 2.94

| | Wide angle end | | Intermediate | | Telephoto end |
|---|---|---|---|---|---|
| f | 16.5 | ~ | 26.8 | ~ | 48.5 |
| FNO | 2.9 | ~ | 3.6 | ~ | 4.1 |
| 2ω | 81.7 | ~ | 58.3 | ~ | 33.0 |
| Y | 12.5 | ~ | 13.6 | ~ | 14.1 |
| TL (air) | 77.7 | ~ | 81.3 | ~ | 98.0 |
| BF (air) | 17.0 | ~ | 22.8 | ~ | 32.9 |

[Variable distance data]

| | Upon focusing on infinity | | | Upon focusing on short distant object | | |
|---|---|---|---|---|---|---|
| | Wide angle end | Inter-mediate | Tele-photo end | Wide angle end | Inter-mediate | Tele-photo end |
| f | 16.5 | 26.8 | 48.5 | 16.5 | 26.8 | 48.5 |
| D3 | 0.80 | 5.86 | 18.37 | | | |
| D9 | 13.94 | 5.21 | 0.80 | | | |
| D17 | 0.40 | 0.40 | 0.40 | 1.38 | 2.52 | 3.85 |
| D19 | 2.22 | 3.12 | 3.54 | 1.24 | 1.00 | 0.08 |
| D21 | 2.41 | 2.95 | 1.00 | | | |
| D25 | 17.00 | 22.82 | 32.93 | | | |

[Lens group data]

| | Group starting surface | Group focal length |
|---|---|---|
| First lens group | 1 | 66.00 |
| Second lens group | 4 | −14.12 |
| Third lens group | 10 | 23.82 |
| Fourth lens group | 20 | 28.01 |
| Fifth lens group | 22 | −42.97 |

[Conditional expression corresponding value]

| | |
|---|---|
| Conditional expression (JK1) | $\|fF\|/fM = 1.591$ |
| Conditional expression (JK2) | $(-fXn)/fM = 0.593$ |
| Conditional expression (JK3) | $dAB/\|fF\| = 0.093$ |
| Conditional expression (JK6) | $ndn + 0.0075 \times \nu dn - 2.175 = -0.073$ |
| Conditional expression (JK7) | $\nu dn = 67.90$ |
| Conditional expression (JL1) | $\|(rB + rA)/(rB - rA)\| = 21.049$ |
| Conditional expression (JL2) | $\|fF\|/fM = 1.591$ |
| Conditional expression (JL3) | $dAB/\|fF\| = 0.093$ |
| Conditional expression (JL4) | $(-fXn)/fM = 0.593$ |
| Conditional expression (JL7) | $ndn + 0.0075 \times \nu dn - 2.175 = -0.073$ |
| Conditional expression (JL8) | $\nu dn = 67.90$ |
| Conditional expression (JM1) | $dV/\|fV\| = 0.164$ |
| Conditional expression (JM2) | $\|fF\|/fM = 1.591$ |
| Conditional expression (JM3) | $dAB/\|fF\| = 0.093$ |
| Conditional expression (JM4) | $(-fXn)/fM = 0.593$ |
| Conditional expression (JM7) | $ndn + 0.0075 \times \nu dn - 2.175 = -0.073$ |
| Conditional expression (JM8) | $\nu dn = 67.90$ |
| Conditional expression (JN1) | $\|fF\|/fM = 1.591$ |
| Conditional expression (JN2) | $dV/\|fV\| = 0.164$ |
| Conditional expression (JN3) | $dAB/\|fF\| = 0.093$ |
| Conditional expression (JN4) | $(-fXn)/fM = 0.593$ |
| Conditional expression (JN7) | $ndn + 0.0075 \times \nu dn - 2.175 = -0.073$ |
| Conditional expression (JN8) | $\nu dn = 67.90$ |

It can be seen in Table 36 that the zoom optical system ZL36 according to this Example satisfies the conditional expressions (JK1) to (JK3), (JK6), (JK7), (JL1) to (JL4), (JL7), (JL8), (JM1) to (JM4), (JM7), (JM8), (JN1) to (JN4), (JN7), and (JN8).

FIG. 161 is various aberration graphs (a spherical aberration graph, an astigmatism graph, a distortion graph, a lateral chromatic aberration graph, and a coma aberration graph) of the zoom optical system ZL36 according to Example 36 upon focusing on infinity with FIG. 161A corresponding to the wide angle end state, FIG. 161B corresponding to the intermediate focal length state, and FIG. 161C corresponding to the telephoto end state. FIG. 162 is various aberration graphs (a spherical aberration graph, an astigmatism graph, a distortion graph, a lateral chromatic aberration graph, and a coma aberration graph) of the zoom optical system ZL36 according to Example 36 upon focusing on a short distant object with FIG. 162A corresponding to the wide angle end state, FIG. 162B corresponding to the intermediate focal length state, and FIG. 162C corresponding to the telephoto end state. FIG. 163 is a coma aberration graph at the time of image blur correction for the zoom optical system ZL36 according to Example 36 upon focusing on infinity with FIG. 163A corresponding to the wide angle end state, FIG. 163B corresponding to the intermediate focal length state, and FIG. 163C corresponding to the telephoto end state.

It can be seen in the aberration graphs in FIG. 161 to FIG. 163 that the zoom optical system ZL36 according to Example 36 can achieve an excellent optical performance with various aberrations successfully corrected from the wide angle end state to the telephoto end state and from the infinity focusing state to the short-distant object focusing state. Furthermore, it can be seen that a high imaging performance can be achieved upon image blur correction.

Example 37

Example 37 is described with reference to FIG. 164 to FIG. 167 and Table 37. A zoom optical system ZLII (ZL37) according to Example 37 includes, as illustrated in FIG. 164, the first lens group G1 having positive refractive power, the second lens group G2 having negative refractive power, the third lens group G3 having positive refractive power, the fourth lens group G4 having negative refractive power, and the fifth lens group G5 having positive refractive power that are arranged in order from the object side.

The first lens group G1 includes the cemented lens including the negative meniscus lens L11 having a concave surface facing the image side and the positive meniscus lens L12 having a convex surface facing the object side that are arranged in order from the object side.

The second lens group G2 includes the negative meniscus lens L21 having a concave surface facing the image side, the negative meniscus lens L22 having a concave surface facing the image side, and the positive meniscus lens L23 having a convex surface facing the object side that are arranged in order from the object side. The negative meniscus lens L22 is a glass-molded aspherical lens with lens surfaces, on the object side and on the image surface side, having an aspherical shape.

The third lens group G3 includes the object side group GA and the image side group GB having positive refractive power that are arranged in order from the object side. The object side group GA includes: the positive meniscus lens L31 having a convex surface facing the object side; the aperture stop S; the cemented lens including the biconvex lens L32 and the negative meniscus lens L33 having a concave surface facing the object side; and the positive meniscus lens L34 having a convex surface facing the image side that are arranged in order from the object side. The image side group GB includes the positive meniscus lens L35 having a convex surface facing the object side. The positive meniscus lens L31 is a glass-molded aspherical lens with a lens surface, on the object side, having an aspherical shape. The positive meniscus lens L34 is a glass-molded aspherical lens with a lens surface, on the image surface side, having an aspherical shape.

The fourth lens group G4 includes the biconcave lens L41. The biconcave lens L41 is a glass-molded aspherical lens with lens surfaces, on the object side and on the image surface side, having an aspherical shape.

The fifth lens group G5 includes the plano-convex lens L51 having a convex surface facing the object side.

The zooming from the wide angle end state to the telephoto end state is achieved with: the first lens group G1 moved toward the object side, the second lens group G2 moved toward the image surface side and then moved toward the object side, and the third lens group G3, the fourth lens group G4, and the fifth lens group G5 moved toward the object side in such a manner that the distance between the first lens group G1 and the second lens group G2 increases, the distance between the second lens group G2 and the third lens group G3 decreases, the distance between the third lens group G3 and the fourth lens group G4 decreases, and the distance between the fourth lens group G4 and the fifth lens group G5 increases.

Focusing from infinity to the short-distant object is achieved with the image side group GB (=focusing lens group GF) forming the third lens group G3 moved toward the object side.

When image blur occurs, image blur correction (vibration isolation) on the image surface I is performed with the fourth lens group G4 serving as the vibration-proof lens group VR moved with a displacement component in the direction orthogonal to the optical axis. In Example 37, in the wide angle end state, the shifted amount of the vibration-proof lens group VR is −0.071 mm when the correction angle is 0.657°. In the intermediate focal length state, the shifted amount of the vibration-proof lens group VR is −0.062 mm when the correction angle is 0.433°. In the telephoto end state, the shifted amount of the vibration-proof lens group VR is −0.060 mm when the correction angle is 0.339°.

In Table 37 below, specification values in Example 37 are listed. Surface numbers 1 to 23 in Table 37 respectively correspond to the optical surfaces m1 to m23 in FIG. 164.

TABLE 37

[Lens specifications]

| Surface number | R | D | νd | nd |
|---|---|---|---|---|
| Obj surface | ∞ | | | |
| 1 | 53.1551 | 1.50 | 17.98 | 1.94594 |
| 2 | 46.7292 | 4.20 | 49.62 | 1.77250 |
| 3 | 282.4154 | D3 (variable) | | |
| 4 | 66.2821 | 1.00 | 40.66 | 1.88300 |
| 5 | 9.1032 | 4.68 | | |
| *6 | 107.6212 | 1.00 | 40.10 | 1.85135 |
| *7 | 22.7268 | 0.28 | | |
| 8 | 13.8002 | 2.03 | 17.98 | 1.94594 |
| 9 | 26.1074 | D9 (variable) | | |
| *10 | 33.1702 | 0.71 | 45.45 | 1.80139 |
| 11 | 37.4535 | 1.80 | | |

TABLE 37-continued

| | | | | | |
|---|---|---|---|---|---|
| 12 | | ∞ | 1.50 | (aperture stop) | |
| 13 | | 26.6043 | 3.68 | 70.32 | 1.48749 |
| 14 | | −8.5245 | 0.90 | 23.78 | 1.84666 |
| 15 | | −12.3206 | 0.10 | | |
| 16 | | −20.4613 | 1.76 | 59.46 | 1.58313 |
| *17 | | −8.8729 | D17 (variable) | | |
| 18 | | 13.1305 | 1.32 | 82.57 | 1.49782 |
| 19 | | 41.4579 | D19 (variable) | | |
| *20 | | −44.5994 | 1.00 | 40.10 | 1.85135 |
| *21 | | 10.7829 | D21 (variable) | | |
| 22 | | 25.6050 | 1.49 | 30.13 | 1.69895 |
| 23 | ∞ | | D23 (variable) | | |
| Img surface | ∞ | | | | |

[Aspherical data]

| Surface number | κ | A4 | A6 | A8 | A10 |
|---|---|---|---|---|---|
| 6th surface | 0.00 | 3.49775E−05 | 2.03744E−07 | −3.87240E−09 | 0.00000E+00 |
| 7th surface | 0.00 | 3.00588E−05 | 4.54650E−07 | −8.42603E−09 | 0.00000E+00 |
| 10th surface | 0.00 | −2.05375E−04 | −1.16277E−06 | −6.81490E−08 | 0.00000E+00 |
| 17th surface | 0.00 | 2.63944E−04 | −2.28950E−06 | 4.31206E−08 | 0.00000E+00 |
| 20th surface | 0.00 | 3.75891E−04 | −2.46541E−05 | 6.07004E−07 | −6.07981E−09 |
| 21st surface | 0.00 | 1.49191E−04 | −2.01441E−05 | 5.16615E−07 | −5.33008E−09 |

[Various data]
Zoom ratio 3.75

| | Wide end angle | | Intermediate | | Telephoto end |
|---|---|---|---|---|---|
| f | 9.3 | ~ | 21.3 | ~ | 34.8 |
| FNO | 2.9 | ~ | 4.3 | ~ | 4.6 |
| 2ω | 81.3 | ~ | 41.0 | ~ | 25.8 |
| Y | 6.9 | ~ | 7.8 | ~ | 8.0 |
| TL (air) | 65.9 | ~ | 69.6 | ~ | 86.2 |
| BF (air) | 13.0 | ~ | 24.8 | ~ | 33.7 |

[Variable distance data]

| | Upon focusing on infinity | | | Upon focusing on short distant object | | |
|---|---|---|---|---|---|---|
| | Wide angle end | Inter-mediate | Tele-photo end | Wide angle end | Inter-mediate | Tele-photo end |
| f | 9.3 | 21.3 | 34.8 | 9.3 | 21.3 | 34.8 |
| D3 | 0.80 | 5.74 | 15.53 | | | |
| D9 | 17.51 | 4.34 | 0.80 | | | |
| D17 | 2.09 | 2.09 | 2.09 | 1.70 | 1.12 | 0.93 |
| D19 | 1.65 | 1.23 | 1.00 | 2.05 | 2.20 | 2.16 |
| D21 | 1.94 | 2.44 | 4.09 | | | |
| D23 | 13.00 | 24.85 | 33.70 | | | |

[Lens group data]

| | Group starting surface | Group focal length |
|---|---|---|
| First lens group | 1 | 86.74 |
| Second lens group | 4 | −12.62 |
| Third lens group | 10 | 10.00 |
| Fourth lens group | 20 | −10.12 |
| Fifth lens group | 22 | 36.63 |

[Conditional expression corresponding value]

| | |
|---|---|
| Conditional expression (JK1) | \|fF\|/fM = 3.800 |
| Conditional expression (JK2) | (−fXn)/fM = 1.262 |
| Conditional expression (JK3) | dAB/\|fF\| = 0.055 |
| Conditional expression (JK4) | ndp + 0.0075 × νdp − 2.175 = −0.058 |
| Conditional expression (JK5) | νdp = 82.57 |
| Conditional expression (JN1) | \|fF\|/fM = 3.800 |
| Conditional expression (JN2) | dV/\|fV\| = 0.404 |
| Conditional expression (JN3) | dAB/\|fF\| = 0.055 |

TABLE 37-continued

| | |
|---|---|
| Conditional expression (JN4) | (−fXn)/fM = 1.262 |
| Conditional expression (JN5) | ndp + 0.0075 × vdp − 2.175 = −0.058 |
| Conditional expression (JN6) | vdp = 82.57 |

It can be seen in Table 37 that the zoom optical system ZL37 according to this Example satisfies the conditional expression (JK1) to (JK5) and (JN1) to (JN6).

FIG. 165 is various aberration graphs (a spherical aberration graph, an astigmatism graph, a distortion graph, a lateral chromatic aberration graph, and a coma aberration graph) of the zoom optical system ZL37 according to Example 37 upon focusing on infinity with FIG. 165A corresponding to the wide angle end state, FIG. 165B corresponding to the intermediate focal length state, and FIG. 165C corresponding to the telephoto end state. FIG. 166 is various aberration graphs (a spherical aberration graph, an astigmatism graph, a distortion graph, a lateral chromatic aberration graph, and a coma aberration graph) of the zoom optical system ZL37 according to Example 37 upon focusing on a short distant object with FIG. 166A corresponding to the wide angle end state, FIG. 166B corresponding to the intermediate focal length state, and FIG. 166C corresponding to the telephoto end state. FIG. 167 is a coma aberration graph at the time of image blur correction for the zoom optical system ZL37 according to Example 37 upon focusing on infinity with FIG. 167A corresponding to the wide angle end state, FIG. 167B corresponding to the intermediate focal length state, and FIG. 167C corresponding to the telephoto end state.

It can be seen in the aberration graphs in FIG. 165 to FIG. 167 that the zoom optical system ZL37 according to Example 37 can achieve an excellent optical performance with various aberrations successfully corrected from the wide angle end state to the telephoto end state and from the infinity focusing state to the short-distant object focusing state. Furthermore, it can be seen that a high imaging performance can be achieved upon image blur correction.

Example 38

Example 38 is described with reference to FIG. 168 to FIG. 171 and Table 38. A zoom optical system ZLII (ZL38) according to Example 38 includes, as illustrated in FIG. 168, the first lens group G1 having positive refractive power, the second lens group G2 having negative refractive power, the third lens group G3 having positive refractive power, the fourth lens group G4 having negative refractive power, and the fifth lens group G5 having positive refractive power that are arranged in order from the object side.

The first lens group G1 includes the cemented lens including the negative meniscus lens L11 having a concave surface facing the image side and the positive meniscus lens L12 having a convex surface facing the object side that are arranged in order from the object side.

The second lens group G2 includes the negative meniscus lens L21 having a concave surface facing the image side, the negative meniscus lens L22 having a concave surface facing the object side, and the biconvex lens L23 that are arranged in order from the object side. The negative meniscus lens L22 is a glass-molded aspherical lens with lens surfaces, on the object side and on the image surface side, having an aspherical shape.

The third lens group G3 includes the object side group GA and the image side group GB having positive refractive power that are arranged in order from the object side. The object side group GA includes: the positive meniscus lens L31 having a convex surface facing the object side; the aperture stop S; the cemented lens including the biconvex lens L32 and the biconcave lens L33; and the biconvex lens L34. The image side group GB includes the positive meniscus lens L35 having a convex surface facing the object side. The positive meniscus lens L31 is a glass-molded aspherical lens with a lens surface, on the object side, having an aspherical shape. The biconvex lens L34 is a glass-molded aspherical lens with a lens surface, on the object side, having an aspherical shape.

The fourth lens group G4 includes the negative meniscus lens L41 having a concave surface facing the image side and a positive meniscus lens L42 having a convex surface facing the object side that are arranged in order from the object side. The negative meniscus lens L41 is a glass-molded aspherical lens with lens surfaces, on the object side and on the image surface side, having an aspherical shape.

The fifth lens group G5 includes the plano-convex lens L51 having a convex surface facing the object side.

The zooming from the wide angle end state to the telephoto end state is achieved with: the first lens group G1 moved toward the object side, the second lens group G2 moved toward the image surface side and then moved toward the object side, the third lens group G3 and the fourth lens group G4 moved toward the object side, and the fifth lens group G5 fixed in such a manner that the distance between the first lens group G1 and the second lens group G2 increases, the distance between the second lens group G2 and the third lens group G3 decreases, the distance between the third lens group G3 and the fourth lens group G4 increases, and the distance between the fourth lens group G4 and the fifth lens group G5 increases.

Focusing from infinity to the short-distant object is achieved with the image side group GB (=focusing lens group GF) forming the third lens group G3 moved toward the object side.

When image blur occurs, image blur correction (vibration isolation) on the image surface I is performed with the negative meniscus lens L41 forming the fourth lens group G4 serving as the vibration-proof lens group VR moved with a displacement component in the direction orthogonal to the optical axis. In Example 38, in the wide angle end state, the shifted amount of the vibration-proof lens group VR is −0.195 mm when the correction angle is 0.664°. In the intermediate focal length state, the shifted amount of the vibration-proof lens group VR is −0.229 mm when the correction angle is 0.472°. In the telephoto end state, the shifted amount of the vibration-proof lens group VR is −0.243 mm when the correction angle is 0.369°.

In Table 38 below, specification values in Example 38 are listed. Surface numbers 1 to 25 in Table 38 respectively correspond to the optical surfaces m1 to m25 in FIG. 168.

TABLE 38

[Lens specifications]

| Surface number | R | D | νd | nd |
|---|---|---|---|---|
| Obj surface | ∞ | | | |
| 1 | 39.2736 | 1.40 | 17.98 | 1.94594 |
| 2 | 32.2014 | 5.24 | 54.61 | 1.72916 |
| 3 | 170.2584 | D3 (variable) | | |
| 4 | 126.0761 | 1.00 | 40.66 | 1.88300 |
| 5 | 10.8699 | 5.87 (variable) | | |
| *6 | −27.7763 | 1.10 | 40.10 | 1.85135 |
| *7 | −572.4387 | 0.25 | | |
| 8 | 64.8806 | 1.84 | 17.98 | 1.94594 |
| 9 | −69.0576 | D9 (variable) | | |
| *10 | 15.3606 | 1.90 | 40.10 | 1.85135 |
| 11 | 88.6041 | 1.80 | | |
| 12 | ∞ | 1.50 | (aperture stop) | |
| 13 | 12.9024 | 2.75 | 82.57 | 1.49782 |
| 14 | −32.4325 | 1.00 | 28.69 | 1.79504 |
| 15 | 11.9088 | 2.39 | | |
| *16 | 47.0932 | 1.37 | 61.25 | 1.58913 |
| 17 | −41.7476 | D17 (variable) | | |
| 18 | 17.4125 | 2.43 | 82.57 | 1.49782 |
| 19 | 125522.6100 | D19 (variable) | | |
| *20 | 191.9512 | 1.00 | 40.10 | 1.85135 |
| *21 | 16.2810 | 1.54 | | |
| 22 | 24.7940 | 1.68 | 23.47 | 1.79816 |
| 23 | 78.0304 | D23 (variable) | | |
| 24 | 53.6440 | 2.03 | 70.32 | 1.48749 |
| 25 | ∞ | D25 (variable) | | |
| Img surface | ∞ | | | |

[Aspherical data]

| Surface number | κ | A4 | A6 | A8 | A10 |
|---|---|---|---|---|---|
| 6th surface | 0.00 | −6.15138E−05 | −1.22714E−07 | 2.85742E−09 | −1.48646E−11 |
| 7th surface | 0.00 | −8.15979E−05 | 7.12457E−08 | 4.52409E−10 | 0.00000E+00 |
| 10th surface | 0.00 | −1.10452E−05 | 4.45196E−08 | 4.92428E−10 | 0.00000E+00 |
| 16th surface | 0.00 | −6.45246E−05 | −2.47179E−07 | −4.16089E−09 | −1.98995E−10 |
| 20th surface | 0.00 | 2.84055E−05 | −1.57415E−06 | 4.74078E−08 | −4.66542E−10 |
| 21st surface | 0.00 | 2.79016E−05 | −1.57812E−06 | 3.70868E−08 | −3.33684E−10 |

[Various data]
Zoom ratio 3.24

| | Wide angle end | | Intermediate | | Telephoto end |
|---|---|---|---|---|---|
| f | 16.5 | ~ | 32.6 | ~ | 53.4 |
| FNO | 2.9 | ~ | 3.7 | ~ | 4.1 |
| 2ω | 81.7 | ~ | 47.0 | ~ | 29.0 |
| Y | 12.4 | ~ | 14.3 | ~ | 14.3 |
| TL (air) | 76.5 | ~ | 85.0 | ~ | 98.2 |
| BF (air) | 15.0 | ~ | 15.0 | ~ | 15.0 |

[Variable distance data]

| | Upon focusing on infinity | | | Upon focusing on short distant object | | |
|---|---|---|---|---|---|---|
| | Wide angle end | Intermediate | Telephoto end | Wide angle end | Intermediate | Telephoto end |
| f | 16.5 | 32.6 | 53.4 | 16.5 | 32.6 | 53.4 |
| D3 | 1.06 | 11.63 | 22.04 | | | |
| D9 | 15.36 | 4.78 | 0.80 | | | |
| D17 | 2.94 | 2.94 | 2.94 | 2.18 | 0.75 | 0.00 |
| D19 | 1.00 | 4.71 | 5.22 | 1.76 | 6.91 | 8.16 |
| D23 | 3.03 | 7.84 | 14.02 | | | |
| D25 | 15.00 | 15.00 | 15.01 | | | |

TABLE 38-continued

| [Lens group data] | | |
|---|---|---|
| | Group starting surface | Group focal length |
| First lens group | 1 | 74.13 |
| Second lens group | 4 | −14.07 |
| Third lens group | 10 | 18.25 |
| Fourth lens group | 20 | −41.09 |
| Fifth lens group | 24 | 110.04 |

| [Conditional expression corresponding value] | |
|---|---|
| Conditional expression (JK1) | \|fF\|/fM = 1.917 |
| Conditional expression (JK2) | (−fXn)/fM = 0.771 |
| Conditional expression (JK3) | dAB/\|fF\| = 0.084 |
| Conditional expression (JK4) | ndp + 0.0075 × νdp − 2.175 = −0.058 |
| Conditional expression (JK5) | νdp = 82.57 |
| Conditional expression (JM1) | dV/\|fV\| = 0.073 |
| Conditional expression (JM2) | \|fF\|/fM = 1.917 |
| Conditional expression (JM3) | dAB/\|fF\| = 0.084 |
| Conditional expression (JM4) | (−fXn)/fM = 0.771 |
| Conditional expression (JM5) | ndp + 0.0075 × νdp − 2.175 = −0.058 |
| Conditional expression (JM6) | νdp = 82.57 |
| Conditional expression (JN1) | \|fF\|/fM = 1.917 |
| Conditional expression (JN2) | dV/\|fV\| = 0.073 |
| Conditional expression (JN3) | dAB/\|fF\| = 0.084 |
| Conditional expression (JN4) | (−fXn)/fM = 0.771 |
| Conditional expression (JN5) | ndp + 0.0075 × νdp − 2.175 = −0.058 |
| Conditional expression (JN6) | νdp = 82.57 |

It can be seen in Table 38 that the zoom optical system ZL38 according to this Example satisfies the conditional expressions (JK1) to (JK5), (JM1) to (JM6), and (JN1) to (JN6).

FIG. 169 is various aberration graphs (a spherical aberration graph, an astigmatism graph, a distortion graph, a lateral chromatic aberration graph, and a coma aberration graph) of the zoom optical system ZL38 according to Example 38 upon focusing on infinity with FIG. 169A corresponding to the wide angle end state, FIG. 169B corresponding to the intermediate focal length state, and FIG. 169C corresponding to the telephoto end state. FIG. 170 is various aberration graphs (a spherical aberration graph, an astigmatism graph, a distortion graph, a lateral chromatic aberration graph, and a coma aberration graph) of the zoom optical system ZL38 according to Example 38 upon focusing on a short distant object with FIG. 170A corresponding to the wide angle end state, FIG. 170B corresponding to the intermediate focal length state, and FIG. 170C corresponding to the telephoto end state. FIG. 171 is a coma aberration graph at the time of image blur correction for the zoom optical system ZL38 according to Example 38 upon focusing on infinity with FIG. 171A corresponding to the wide angle end state, FIG. 171B corresponding to the intermediate focal length state, and FIG. 171C corresponding to the telephoto end state.

It can be seen in the aberration graphs in FIG. 169 to FIG. 171 that the zoom optical system ZL38 according to Example 38 can achieve an excellent optical performance with various aberrations successfully corrected from the wide angle end state to the telephoto end state and from the infinity focusing state to the short-distant object focusing state. Furthermore, it can be seen that a high imaging performance can be achieved upon image blur correction.

Example 39

Example 39 is described with reference to FIG. 172 to FIG. 175 and Table 39. A zoom optical system ZLII (ZL39) according to Example 39 includes, as illustrated in FIG. 172, the first lens group G1 having positive refractive power, the second lens group G2 having negative refractive power, the third lens group G3 having positive refractive power, the fourth lens group G4 having positive refractive power, the fifth lens group G5 having negative refractive power, and the sixth lens group G6 having negative refractive power that are arranged in order from the object side.

The first lens group G1 includes: the cemented lens including the plano-concave lens L11 having a concave surface facing the image side and the biconvex lens L12; and the positive meniscus lens L13 having a convex surface facing the object side that are arranged in order from the object side.

The second lens group G2 includes the negative meniscus lens L21 having a concave surface facing the image side, the biconcave lens L22, the biconvex lens L23, and the negative meniscus lens L24 having a concave surface facing the object side that are arranged in order from an object side. The biconcave lens L22 is a glass-molded aspherical lens with a lens surface, on the object side, having an aspherical shape.

The third lens group G3 includes the object side group GA and the image side group GB having negative refractive power that are arranged in order from the object side. The object side group GA includes the biconvex lens L31, the aperture stop S, and the cemented lens including the negative meniscus lens L32 having a convex surface facing the image side and the biconvex lens L33 that are arranged in order from the object side. The image side group GB includes the negative meniscus lens L34 having a concave surface facing the image side. The biconvex lens L31 is a glass-molded aspherical lens with lens surfaces, on the object side and on the image surface side, having an aspherical shape.

The fourth lens group G4 includes a cemented lens including the biconvex lens L41 and the negative meniscus lens L42 having a concave surface facing the object side that are arranged in order from the object side. The biconvex lens L41 is a glass-molded aspherical lens with a lens surface, on the object side, having an aspherical shape.

The fifth lens group G5 includes the negative meniscus lens L51 having a concave surface facing the image side.

The sixth lens group G6 includes: the biconvex lens L61; a cemented lens including the positive meniscus lens L62 having a convex surface facing the image side and a negative meniscus lens L63 having a concave surface facing the object side; and a negative meniscus lens L64 having a concave surface facing the object side that are arranged in order from the object side.

The zooming from the wide angle end state to the telephoto end state is achieved with: the first lens group G1, the second lens group G2, the third lens group G3, the fourth lens group G4, the fifth lens group G5, and the sixth lens group G6 moved toward the object side in such a manner that the distance between the first lens group G1 and the second lens group G2 increases, the distance between the second lens group G2 and the third lens group G3 decreases, the distance between the third lens group G3 and the fourth lens group G4 increases and then decreases, the distance between the fourth lens group G4 and the fifth lens group G5 increases, and the distance between the fifth lens group G5 and the sixth lens group G6 decreases.

Focusing from infinity to the short-distant object is achieved with the image side group GB (=focusing lens group GF) forming the third lens group G3 moved toward the image side.

When image blur occurs, image blur correction (vibration isolation) on the image surface I is performed with the fifth lens group G5 serving as the vibration-proof lens group VR moved with a displacement component in the direction orthogonal to the optical axis. In Example 39, in the wide angle end state, the shifted amount of the vibration-proof lens group VR is −0.377 mm when the correction angle is 0.664°. In the intermediate focal length state, the shifted amount of the vibration-proof lens group VR is −0.359 mm when the correction angle is 0.469°. In the telephoto end state, the shifted amount of the vibration-proof lens group VR is −0.390 mm when the correction angle is 0.363°.

In Table 39 below, specification values in Example 39 are listed. Surface numbers 1 to 33 in Table 39 respectively correspond to the optical surfaces m1 to m33 in FIG. 172.

TABLE 39

[Lens specifications]

| Surface number | R | D | νd | nd |
|---|---|---|---|---|
| Obj surface | ∞ | | | |
| 1 | ∞ | 2.00 | 22.74 | 1.80809 |
| 2 | 168.6059 | 5.45 | 67.90 | 1.59319 |
| 3 | −204.1381 | 0.10 | | |
| 4 | 47.0069 | 4.19 | 54.61 | 1.72916 |
| 5 | 85.1045 | D5 (variable) | | |
| 6 | 57.0314 | 1.35 | 35.72 | 1.90265 |
| 7 | 17.0881 | 8.40 | | |
| *8 | −35.0755 | 1.00 | 51.16 | 1.75501 |
| 9 | 63.8129 | 0.10 | | |
| 10 | 40.8145 | 5.10 | 22.74 | 1.80809 |
| 11 | −52.9940 | 2.58 | | |
| 12 | −23.0315 | 1.20 | 58.12 | 1.62299 |
| 13 | −51.0036 | D13 (variable) | | |
| *14 | 74.2220 | 4.11 | 54.04 | 1.72903 |
| *15 | −69.8827 | 1.00 | | |
| 16 | ∞ | 5.48 | (aperture stop) | |
| 17 | 59.9122 | 1.00 | 33.72 | 1.64769 |
| 18 | 28.9118 | 6.78 | 82.57 | 1.49782 |
| 19 | −25.7826 | D19 (variable) | | |
| 20 | 1008.1852 | 1.00 | 56.24 | 1.65100 |
| 21 | 30.4711 | D21 (variable) | | |
| *22 | 27.9558 | 5.40 | 67.02 | 1.59201 |
| 23 | −42.4982 | 1.00 | 35.72 | 1.90265 |
| 24 | −64.8363 | D24 (variable) | | |
| 25 | 223.4467 | 1.00 | 35.25 | 1.74950 |
| 26 | 31.2261 | D26 (variable) | | |
| 27 | 33.7181 | 7.66 | 81.56 | 1.49710 |
| 28 | −23.5370 | 0.14 | | |
| 29 | −30.5959 | 7.89 | 22.74 | 1.80809 |
| 30 | −18.2842 | 1.35 | 40.66 | 1.88300 |
| 31 | −46.5493 | 3.09 | | |
| 32 | −19.1643 | 1.30 | 54.61 | 1.72916 |
| 33 | −95.9930 | D33 (variable) | | |
| Img surface | ∞ | | | |

[Aspherical data]

| Surface number | κ | A4 | A6 | A8 | A10 |
|---|---|---|---|---|---|
| 8th surface | 0.00 | 2.89684E−06 | −1.52154E−09 | 9.65135E−12 | 1.80551E−13 |
| 14th surface | 0.00 | 6.80639E−06 | 8.87567E−08 | 3.26125E−11 | 0.00000E+00 |

TABLE 39-continued

| | | | | | |
|---|---|---|---|---|---|
| 15th surface | 0.00 | 2.37132E−05 | 9.36004E−08 | 2.05650E−10 | −1.50000E−13 |
| 22nd surface | 0.00 | 1.59007E−07 | 1.94525E−09 | −5.68547E−11 | 0.00000E+00 |

[Various data]
Zoom ratio 3.34

| | Wide angle end | | Intermediate | | Telephoto end |
|---|---|---|---|---|---|
| f | 24.7 | ~ | 49.5 | ~ | 82.5 |
| FNO | 2.9 | ~ | 3.9 | ~ | 4.1 |
| 2ω | 82.4 | ~ | 47.2 | ~ | 28.8 |
| Y | 19.1 | ~ | 21.5 | ~ | 21.6 |
| TL (air) | 128.0 | ~ | 142.7 | ~ | 166.0 |
| BF (air) | 14.9 | ~ | 31.1 | ~ | 39.2 |

[Variable distance data]

| | Upon focusing on infinity | | | Upon focusing on short distant object | | |
|---|---|---|---|---|---|---|
| | Wide angle end | Inter-mediate | Tele-photo end | Wide angle end | Inter-mediate | Tele-photo end |
| f | 24.7 | 49.5 | 82.5 | 24.7 | 49.5 | 82.5 |
| D5 | 1.10 | 13.39 | 32.72 | | | |
| D13 | 17.85 | 5.59 | 1.10 | | | |
| D19 | 1.61 | 1.61 | 1.61 | 2.52 | 4.25 | 7.87 |
| D21 | 6.67 | 6.51 | 6.55 | 5.76 | 3.86 | 0.29 |
| D24 | 1.50 | 3.27 | 3.61 | | | |
| D26 | 4.69 | 1.57 | 1.54 | | | |
| D33 | 14.89 | 31.13 | 39.20 | | | |

[Lens group data]

| | Group starting surface | Group focal length |
|---|---|---|
| First lens group | 1 | 111.42 |
| Second lens group | 6 | −18.73 |
| Third lens group | 14 | 38.98 |
| Fourth lens group | 22 | 36.75 |
| Fifth lens group | 25 | −48.54 |
| Sixth lens group | 27 | −703.75 |

[Conditional expression corresponding value]

| | |
|---|---|
| Conditional expression (JL1) | \|(rB + rA)/(rB − rA)\| = 23.228 |
| Conditional expression (JL2) | \|fF\|/fM = 1.239 |
| Conditional expression (JL3) | dAB/\|fF\| = 0.136 |
| Conditional expression (JL4) | (−fXn)/fM = 0.480 |
| Conditional expression (JL7) | ndn + 0.0075 × νdn − 2.175 = −0.102 |
| Conditional expression (JL8) | νdn = 56.24 |
| Conditional expression (JM1) | dV/\|fV\| = 0.032 |
| Conditional expression (JM2) | \|fF\|/fM = 1.239 |
| Conditional expression (JM3) | dAB/\|fF\| = 0.136 |
| Conditional expression (JM4) | (−fXn)/fM = 0.480 |
| Conditional expression (JM7) | ndn + 0.0075 × νdn − 2.175 = −0.102 |
| Conditional expression (JM8) | νdn = 56.24 |
| Conditional expression (JN1) | \|fF\|/fM = 1.239 |
| Conditional expression (JN2) | dV/\|fV\| = 0.032 |
| Conditional expression (JN3) | dAB/\|fF\| = 0.136 |
| Conditional expression (JN4) | (−fXn)/fM = 0.480 |
| Conditional expression (JN7) | ndn + 0.0075 × νdn − 2.175 = −0.102 |
| Conditional expression (JN8) | νdn = 56.24 |

It can be seen in Table 39 that the zoom optical system ZL39 according to this Example satisfies the conditional expressions (JL1) to (JL4), (JL7), (JL8), (JM1) to (JM4), (JM7), (JM8), (JN1) to (JN4), (JN7), and (JN8).

FIG. 173 is various aberration graphs (a spherical aberration graph, an astigmatism graph, a distortion graph, a lateral chromatic aberration graph, and a coma aberration graph) of the zoom optical system ZL39 according to Example 39 upon focusing on infinity with FIG. 173A corresponding to the wide angle end state, FIG. 173B corresponding to the intermediate focal length state, and FIG. 173C corresponding to the telephoto end state. FIG. 174 is various aberration graphs (a spherical aberration graph, an astigmatism graph, a distortion graph, a lateral chromatic aberration graph, and a coma aberration graph) of the zoom optical system ZL39 according to Example 39 upon focusing on a short distant object with FIG. 174A corresponding to the wide angle end state, FIG. 174B corresponding to the intermediate focal length state, and FIG. 174C corresponding to the telephoto end state. FIG. 175 is a coma aberration graph at the time of image blur correction for the zoom optical system ZL39 according to Example 39 upon focusing on infinity with FIG. 175A corresponding to the wide angle end state, FIG. 175B corresponding to the intermediate focal length state, and FIG. 175C corresponding to the telephoto end state.

It can be seen in the aberration graphs in FIG. 173 to FIG. 175 that the zoom optical system ZL39 according to Example 39 can achieve an excellent optical performance with various aberrations successfully corrected from the wide angle end state to the telephoto end state and from the infinity focusing state to the short-distant object focusing state. Furthermore, it can be seen that a high imaging performance can be achieved upon image blur correction.

Examples described above can achieve the zoom optical system featuring a small size, small variation of image magnification upon focusing, and an excellent optical performance.

Elements of the embodiments are described above to facilitate the understanding of the present invention. It is a matter of course that the present invention is not limited to these. The following configurations can be appropriately employed without compromising the optical performance of the zoom optical system according to the present application.

The numerical values of the configuration with the four groups, five groups, or six groups are described as an example of values of the zoom optical system ZLII according to the 11th to the 14th embodiments. However, this should not be construed in a limiting sense, and the present invention can be applied to a configuration with other number of groups (for example, seven groups or the like). More specifically, a configuration further provided with a lens or a lens group closest to an object or further provided with a lens or a lens group closest to the image may be employed. The first to the sixth lens groups, the front-side lens group, the intermediate lens group, and the rear-side lens group are each a portion including at least one lens separated from another lens with a distance varying upon zooming. The focusing lens group GF is a portion including at least one lens separated from another lens with a distance varying upon focusing. The vibration-proof lens group is a portion including at least one lens and is defined by a portion that moves upon image stabilization and a portion that does not move upon image stabilization.

In the zoom optical system ZLII according to the 11th to the 14th embodiments may have the following configuration. Specifically, upon focusing on a short-distant object from infinity, part of a lens group, one entire lens group, or a plurality of lens groups may be moved in the optical axis direction as the focusing lens group. The focusing lens group may be applied to auto focusing, and can be suitably driven by a motor (such as an ultrasonic motor for example) for auto focusing.

In the zoom optical system ZLII according to the 11th to the 14th embodiments, any of the lens group may be entirely or partially moved with a component in a direction orthogonal to the optical axis, or may be moved and rotated (swing) within an in-plane direction including the optical axis, to serve as the vibration-proof lens group for correcting image blur due to camera shake or the like. At least part of the fourth lens group G4 or at least part of the fifth lens group G5 is especially preferably used as the vibration-proof lens group.

In the zoom optical system ZLII according to the 11th to the 14th embodiments, the lens surface may be formed to have a spherical surface or a planer surface, or may be formed to have an aspherical shape. The lens surface having a spherical surface or a planer surface features easy lens processing and assembly adjustment, which leads to the processing and assembly adjustment less likely to involve an error compromising the optical performance, and thus is preferable. Furthermore, there is an advantage that a rendering performance is not largely compromised even when the image surface is displaced. The lens surface having an aspherical shape may be achieved with any one of an aspherical shape formed by grinding, a glass-molded aspherical shape obtained by molding a glass piece into an aspherical shape, and a composite type aspherical surface obtained by providing an aspherical shape resin piece on a glass surface. A lens surface may be a diffractive surface. The lens may be a gradient index lens (GRIN lens) or a plastic lens.

In the zoom optical system ZLII according to the 11th to the 14th embodiments, the aperture stop S is preferably disposed in the neighborhood of the third lens group G3. Alternatively, a lens frame may serve as the aperture stop so that the member serving as the aperture stop needs not to be provided.

In the zoom optical system ZLII according to the 11th to the 14th embodiments, the lens surfaces may be provided with an antireflection film featuring high transmittance over a wide range of wavelengths to achieve an excellent optical performance with reduced flare and ghosting and increased contract.

The zoom optical system ZLII according to the 11th to the 14th embodiment has a zooming rate of about 300 to 450%.

EXPLANATION OF NUMERALS AND CHARACTERS

ZLI (ZL1 to ZL14) zoom optical system (1st to 10th embodiments)
ZLII (ZL15 to ZL39) zoom optical system (11th to 14th embodiments)
G1 first lens group
G2 second lens group
G3 third lens group
GA object side group
GB image side group
G4 fourth lens group
G5 fifth lens group
G6 sixth lens group
GX front-side lens group
GM intermediate lens group
GR rear-side lens group
GF focusing lens group
VR vibration-proof lens group
S aperture stop
I image surface
1, 11 camera (optical device)

The invention claimed is:

1. A zoom optical system comprising in order from an object side:

a first lens group having positive refractive power, a front-side lens group, an intermediate lens group having positive refractive power, and a rear-side lens group, wherein the front-side lens group is composed of one or more lens groups and has a negative lens group, the intermediate lens group is composed of one or more lens groups, at least part of the intermediate lens group is a focusing lens group, the rear-side lens group is composed of one or more lens groups, upon zooming, the first lens group is moved with respect to an image surface, a distance between the first lens group and the front-side lens group is changed, a distance between the front-side lens group and the intermediate lens group is changed, and a distance between the intermediate lens group and rear-side lens group is changed, a vibration-proof lens group that is disposed closer to an image than the focusing lens group, and is configured to be movable with a displacement component in a direction orthogonal to an optical axis, and the following conditional expression is satisfied:

$$-15.00<fV/fRF<10.000$$

where, fV denotes a focal length of the vibration-proof lens group, and fRF denotes a focal length of a lens group closest to an object in the rear-side lens group.

2. The zoom optical system according to claim 1, wherein the following conditional expressions are satisfied:

$$-0.150<DVW/fV<1.000$$

$$32.000\leq W\omega$$

where, DVW denotes a distance between the vibration-proof lens group and a next lens in the wide angle end state, Wω denotes half angle of the view in the wide angle end state.

3. The zoom optical system according to claim 1, further comprising the rear-side lens group is composed of two or more lens groups.

4. The zoom optical system according to claim 1, wherein the following conditional expressions are satisfied:

$$0.001<(DMRT-DMRW)/fF<1.000$$

$$32.000\leq W\omega$$

$$T\omega\leq 20.000$$

where, DMRW denotes a distance between the intermediate lens group and a lens group closest to an object in the rear-side lens group in the wide angle end state, DMRT denotes a distance between the intermediate lens group and a lens group closest to an object in the rear-side lens group in the telephoto end state, fF denotes a focal length of the focusing lens group, Wω denotes a half angle of view in the wide angle end state, and Tω denotes a half angle of view in the telephoto end state.

5. The zoom optical system according to claim 1, wherein the lens group closest to the image in the front-side lens group includes an aperture stop and a lens that is disposed next to an image side of the aperture stop and has a convex surface facing the object side.

6. The zoom optical system according to claim 1, wherein the following conditional expressions are satisfied:

$$-1.000<DVW/fV<1.000$$

$$32.000\leq W\omega$$

$$0.010<fF/fXR<10.000$$

where, DVW denotes a distance between the vibration-proof lens group and a next lens in the wide angle end state, Wω denotes a half angle of view in the wide angle end state, fF denotes a focal length of the focusing lens group, and fXR denotes a focal length of a lens group closest to an image in the front-side lens group.

7. The zoom optical system according to claim 1, wherein the following conditional expression is satisfied:

$$0.010<fF/fW<8.000$$

where, fF denotes a focal length of the focusing lens group, and fW denotes a focal length of the entire system in the wide angle end state.

8. The zoom optical system according to claim 1, wherein the following conditional expressions are satisfied:

$$0.010<fF/fXR<10.000$$

$$0.100<DGXR/fXR<1.500$$

where, fF denotes a focal length of the focusing lens group, fXR denotes a focal length of a lens group closest to an image in the front-side lens group, and DGXR denotes a thickness of a lens group closest to an image in the front-side lens group on an optical axis.

9. The zoom optical system according to claim 1, wherein the following conditional expression is satisfied:

$$-20.000<fF/fV<20.000$$

where, fF denotes a focal length of the focusing lens group.

10. The zoom optical system according to claim 1, wherein the following conditional expressions are satisfied:

$$-1.000<DVW/fV<1.000$$

$$32.000\leq W\omega$$

$$0.010<fF/fXR<10.000$$

$$0.100<DGXR/fXR<1.500$$

where, DVW denotes a distance between the vibration-proof lens group and a next lens in the wide angle end state, Wω denotes a half angle of view in the wide angle end state, fF denotes a focal length of the focusing lens group, fXR denotes a focal length of a lens group closest to an image in the front-side lens group, and DGXR denotes a thickness of a lens group closest to an image in the front-side lens group on an optical axis.

11. The zoom optical system according to claim 1, wherein at least part of the lens group closest to an object in the rear-side lens group is the vibration-proof lens group.

12. The zoom optical system according to claim 1, wherein a vibration-proof lens group disposed between the focusing lens group and a lens disposed closest to the image surface is provided, the vibration-proof lens group is movable with a displacement component in a direction orthogonal to an optical axis, a lens surface closest to an object in the focusing lens group is convex toward the object side, and the following conditional expressions are satisfied:

$$0.000<(rB+rA)/(rB-rA)<1.000$$

$$0.000<(rC+rB)/(rC-rB)<10.000$$

where, rA denotes a radius of curvature of a lens surface facing a lens surface closest to an object in the focusing lens group with a distance in between, and rB denotes a radius of curvature of the lens surface closest to an object in the focusing lens group, and rC denotes a radius of curvature of the lens surface closest to the image surface in the focusing lens group.

13. The zoom optical system according to claim 1, wherein a vibration-proof lens group disposed between the focusing lens group and a lens disposed closest to the image surface is provided, the vibration-proof lens group is movable with a displacement component in a direction orthogonal to an optical axis, and the following conditional expression is satisfied:

$$1.050<(rB+rA)/(rB-rA)$$

where, rA denotes a radius of curvature of a lens surface facing a lens surface closest to an object in the focusing lens group with a distance in between, and rB denotes a radius of curvature of the lens surface closest to an object in the focusing lens group.

14. The zoom optical system according to claim 1, wherein the following conditional expression is satisfied:

$$32.000\leq W\omega$$

where, Wω denotes a half angle of view in the wide angle end state.

15. The zoom optical system according to claim 1, wherein the following conditional expression is satisfied:

$$T\omega\leq 20.000$$

where, Tω denotes a half angle of view in the telephoto end state.

16. The zoom optical system according to claim 1, wherein in the intermediate lens group is moved with respect to the image surface upon zooming.

17. The zoom optical system according to claim 1, wherein the lens group closest to the image in the front-side lens group is moved with respect to the image surface upon zooming.

18. The zoom optical system according to claim 1, wherein the lens group closest to an object in the rear-side lens group is moved with respect to the image surface upon zooming.

19. An optical device comprising the zoom optical system according to claim 1.

20. The method for manufacturing a zoom optical system comprising in order from an object side, a first lens group having positive refractive power, a front-side lens group, an intermediate lens group having positive refractive power, and a rear-side lens group, wherein the front-side lens group is composed of one or more lens groups and has a negative lens group, the intermediate lens group is composed of one or more lens groups, at least part of the intermediate lens group is a focusing lens group, the rear-side lens group is composed of one or more lens groups, and lenses are arranged in a lens barrel in a manner that upon zooming, the first lens group is moved with respect to an image surface, a distance between the first lens group and the front-side lens group is changed, a distance between the front-side lens group and the intermediate lens group is changed, and a distance between the intermediate lens group and rear-side lens group is changed, a vibration-proof lens group that is disposed closer to an image than the focusing lens group, and is configured to be movable with a displacement component in a direction orthogonal to an optical axis, and the following conditional expression is satisfied:

$$-15.00<fV/fRF<10.000$$

where, fV denotes a focal length of the vibration-proof lens group, and fRF denotes a focal length of a lens group closest to an object in the rear-side lens group.

* * * * *